US008930228B1

(12) United States Patent
Ball

(10) Patent No.: US 8,930,228 B1
(45) Date of Patent: Jan. 6, 2015

(54) INTERACTIVE SYSTEMS AND METHODS FOR INSURANCE-RELATED ACTIVITIES

(75) Inventor: Robert Ball, Atlanta, GA (US)

(73) Assignee: The Guardian Life Insurance Company of America, New York, NY (US)

( * ) Notice: Subject to any disclaimer, the term of this patent is extended or adjusted under 35 U.S.C. 154(b) by 0 days.

(21) Appl. No.: 13/476,372

(22) Filed: May 21, 2012

Related U.S. Application Data

(60) Division of application No. 12/113,087, filed on Apr. 30, 2008, now Pat. No. 8,185,463, which is a continuation-in-part of application No. 11/891,616, filed on Aug. 10, 2007, which is a continuation-in-part of application No. 11/510,537, filed on Aug. 25, 2006, now Pat. No. 8,073,714.

(60) Provisional application No. 60/763,200, filed on Jan. 27, 2006.

(51) Int. Cl.
*G06Q 40/00* (2012.01)
*G06Q 50/22* (2012.01)

(52) U.S. Cl.
CPC ................ *G06Q 40/00* (2013.01); *G06Q 50/22* (2013.01)
USPC ................... 705/4; 705/35; 705/36 R; 705/38

(58) Field of Classification Search
CPC ........ G06Q 40/00; G06Q 40/08; G06Q 50/22
USPC ....................................... 705/4, 35, 36 R, 38
See application file for complete search history.

(56) References Cited

U.S. PATENT DOCUMENTS

| | | | |
|---|---|---|---|
| 3,406,467 | A | 10/1968 | Davis et al. |
| 4,837,693 | A | 6/1989 | Schotz |
| 5,182,705 | A | 1/1993 | Barr et al. |
| 5,479,344 | A | 12/1995 | Keziah, Jr. |
| 5,523,942 | A | 6/1996 | Tyler et al. |
| 5,819,263 | A | 10/1998 | Bromley et al. |

(Continued)

FOREIGN PATENT DOCUMENTS

| | | | |
|---|---|---|---|
| WO | WO 01/33476 | A2 | 5/2001 |
| WO | WO02/056143 | A2 | 7/2002 |

OTHER PUBLICATIONS

Danna Voth, "Drowning in Data-Comprehensive Portfolio Management Software Throws a Lifeline to Investors Overwhelmed by the Task of Tracking Their Assets", Worth, May 2007.

(Continued)

*Primary Examiner* — Daniel Felten
(74) *Attorney, Agent, or Firm* — McGuireWoods LLP

(57) ABSTRACT

Systems and methods for performing insurance related activities are provided. Software can be implemented to provide an application that includes an interactive interface for use by insurance professionals in managing clients, marketing insurance, and storing information. The application can include multiple layers directed to particular stages of the insurance-client relationship. Aggregation services can also be incorporated into the application. Interactive insurance-and-client specific display pages can be incorporated to aid in understanding a client's current insurance information and to generate presentations. "Value" calculators may be implemented to illustrate a comparison of a client's current level of protection to a client's current financial state. Interactive tools for evaluating a customer's financial condition during retirement and how life insurance affects a customer's financial condition are also provided.

12 Claims, 448 Drawing Sheets

(56) References Cited

U.S. PATENT DOCUMENTS

| | | | | |
|---|---|---|---|---|
| 5,884,283 | A | 3/1999 | Manos | |
| 5,903,873 | A | 5/1999 | Peterson et al. | |
| 5,956,691 | A * | 9/1999 | Powers | 705/4 |
| 5,991,744 | A | 11/1999 | DiCresce | |
| 6,009,402 | A | 12/1999 | Whitworth | |
| 6,012,043 | A | 1/2000 | Albright et al. | |
| D424,541 | S | 5/2000 | Mugura | |
| 6,064,986 | A | 5/2000 | Edelman | |
| 6,076,072 | A | 6/2000 | Libman | |
| D427,576 | S | 7/2000 | Coleman | |
| 6,092,050 | A | 7/2000 | Lungren et al. | |
| D437,601 | S | 2/2001 | Utsuki et al. | |
| 6,430,542 | B1 | 8/2002 | Moran | |
| 6,456,979 | B1 | 9/2002 | Flagg | |
| 6,584,446 | B1 | 6/2003 | Buchanan et al. | |
| 6,611,807 | B1 * | 8/2003 | Bernheim et al. | 705/36 R |
| 6,684,190 | B1 | 1/2004 | Powers et al. | |
| 6,996,782 | B2 | 2/2006 | Parker et al. | |
| 7,062,458 | B2 | 6/2006 | Maggioncalda et al. | |
| D526,323 | S | 8/2006 | McDougall et al. | |
| D526,324 | S | 8/2006 | McDougall et al. | |
| D526,653 | S | 8/2006 | McDougall et al. | |
| D527,735 | S | 9/2006 | McDougall et al. | |
| 7,328,183 | B1 | 2/2008 | Leisle | |
| D586,821 | S | 2/2009 | Koh | |
| D589,522 | S | 3/2009 | Jewitt et al. | |
| D589,528 | S | 3/2009 | Koh | |
| 8,010,433 | B1 | 8/2011 | Fisher, III | |
| 8,073,714 | B1 | 12/2011 | Ball | |
| 8,185,463 | B1 | 5/2012 | Ball | |
| 2001/0009004 | A1 | 7/2001 | Groat et al. | |
| 2001/0014873 | A1 | 8/2001 | Henderson et al. | |
| 2001/0023414 | A1 | 9/2001 | Kumar et al. | |
| 2002/0007332 | A1 | 1/2002 | Johnson et al. | |
| 2002/0019791 | A1 | 2/2002 | Goss et al. | |
| 2002/0046110 | A1 | 4/2002 | Gallagher | |
| 2002/0095363 | A1 | 7/2002 | Sloan et al. | |
| 2002/0103733 | A1 | 8/2002 | Barrington et al. | |
| 2002/0123949 | A1 | 9/2002 | VanLeeuwen | |
| 2002/0138389 | A1 | 9/2002 | Martone et al. | |
| 2002/0143680 | A1 | 10/2002 | Walters et al. | |
| 2002/0147618 | A1 | 10/2002 | Mezrah et al. | |
| 2002/0198743 | A1 | 12/2002 | Ariathurai et al. | |
| 2003/0167220 | A1 | 9/2003 | Schoen et al. | |
| 2004/0039588 | A1 | 2/2004 | Libman | |
| 2004/0128171 | A1 | 7/2004 | Rees et al. | |
| 2004/0177022 | A1 | 9/2004 | Williams et al. | |
| 2004/0215493 | A1 | 10/2004 | Koppes et al. | |
| 2004/0243451 | A1 | 12/2004 | Winklevoss et al. | |
| 2004/0254881 | A1 | 12/2004 | Kumar et al. | |
| 2005/0010510 | A1 | 1/2005 | Brose et al. | |
| 2005/0027632 | A1 | 2/2005 | Zeitoun et al. | |
| 2006/0090141 | A1 | 4/2006 | Loui et al. | |
| 2006/0155590 | A1 | 7/2006 | Graham | |
| 2007/0027736 | A1 | 2/2007 | Reynolds et al. | |
| 2010/0004957 | A1 | 1/2010 | Ball | |

OTHER PUBLICATIONS

Bob Ball and Kathy Readinger, "Producers Eye Account Aggregation As Key to Service Philosophy", National Underwriter Life & Health, Jul. 2007.

Robert Regis Hyle, "Guardian Offers Customers Daily Look at New Worth", (Industry Intelligence, News, Insights, Innovations, Financial Tools), National Underwriter Publication, TechDecisions for Insurance, vol. 8, No. 4, Apr. 2006.

"GBS Agency Expert" GBS, Inc., http://www.gbsinc.com (Feb. 16, 2006), 122 pages.

"WebWriter," Insurance Systems, Inc., http://www.insurancesystems.ca/insurancesoftware.htm, pp. 1-4 (Feb. 14, 2006).

"ProSpector tm," Sintech Software, Inc., http://www.sintechsoft.com (Feb. 14, 2006), 32 pages.

"IncomeMAX," Cygnus Software, Inc., http://www.cygnussoft.com (Feb, 14, 2006), 46 pages.

"AccountantsWorld/Financial Calculators" AccountantsWorld, LLC, http://www.accountantsoffice.com (Aug. 18, 2006), 49 pages.

* cited by examiner

120

130

190

230

260

270

280

310

330

360

380

380

380

410

420

420

432

420

420

442

420

480

490

500

500

500

560

570

580

590

590

570

620

630

640

650

660

660

660

700

710

720

730

732

740

750

760

770

790

810

830

840

850

860

880

882

890

920

940

960

990

990

990

990

990

1040

1060

1102

1110

1130

1140

1150

1160

1170

1180

1190

1200

1210

1220

1230

1240

1240

1280

Figure 129:
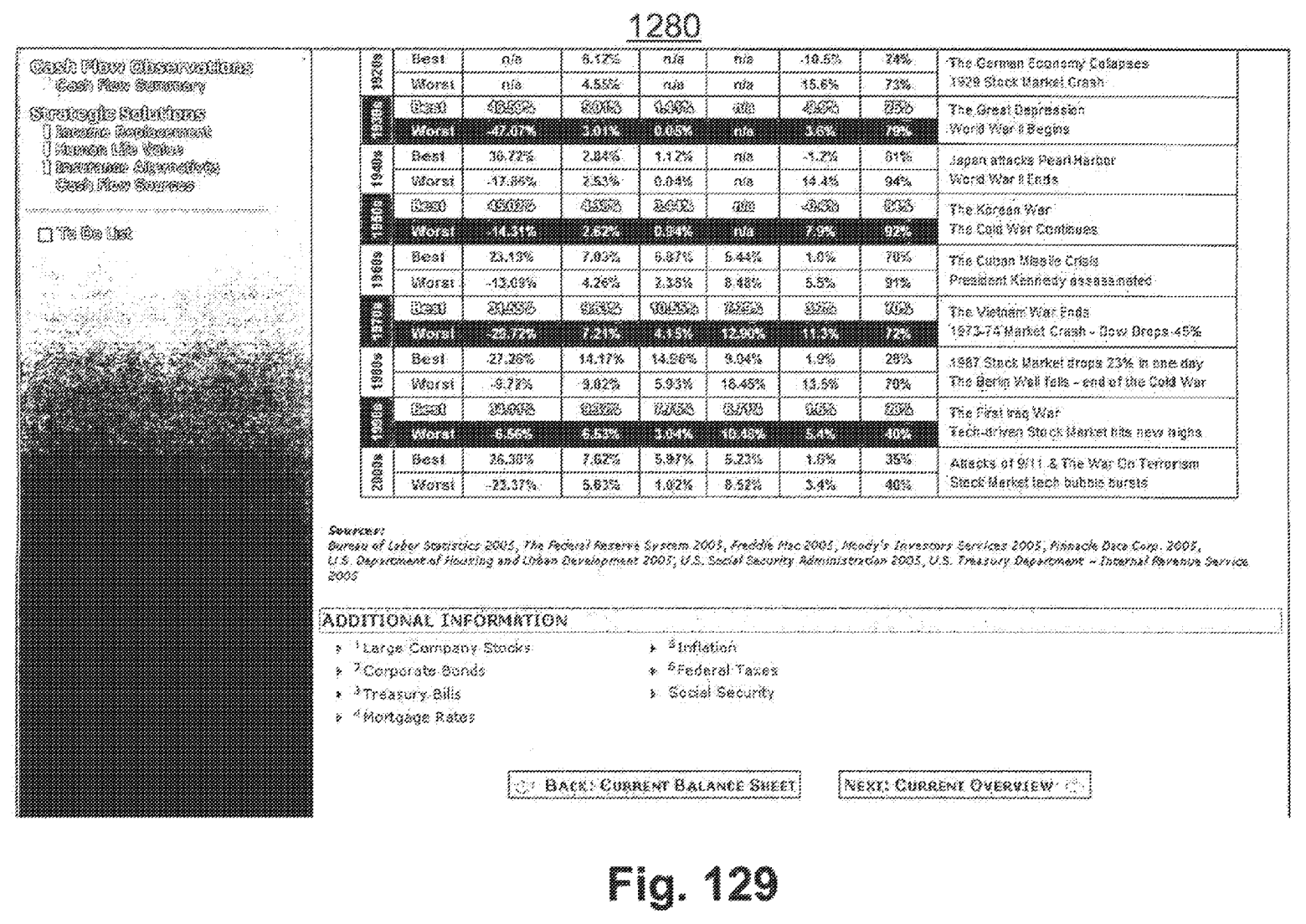

1280

Cash Flow Observations
Cash Flow Summary
Strategic Solutions
Income Replacement
Human Life Value
Insurance Alternatives
Cash Flow Sources ☐ To Do List

| | | | | | | | | |
|---|---|---|---|---|---|---|---|---|
| 1920s | Best | n/a | 6.12% | n/a | n/a | -10.5% | 74% | The German Economy Collapses |
| | Worst | n/a | 4.55% | n/a | n/a | 15.6% | 73% | 1929 Stock Market Crash |
| 1930s | Best | [illegible] | [illegible] | [illegible] | n/a | [illegible] | [illegible] | The Great Depression |
| | Worst | -47.07% | 3.01% | 0.05% | n/a | 3.6% | 79% | World War II Begins |
| 1940s | Best | 36.72% | 2.84% | 1.12% | n/a | -1.2% | 81% | Japan attacks Pearl Harbor |
| | Worst | -17.86% | 2.53% | 0.04% | n/a | 14.4% | 94% | World War II Ends |
| 1950s | Best | [illegible] | [illegible] | [illegible] | n/a | [illegible] | [illegible] | The Korean War |
| | Worst | -14.31% | 2.62% | 0.94% | n/a | 7.9% | 92% | The Cold War Continues |
| 1960s | Best | 23.13% | 7.83% | 6.87% | 5.44% | 1.0% | 70% | The Cuban Missile Crisis |
| | Worst | -13.08% | 4.26% | 3.38% | 8.48% | 5.5% | 91% | President Kennedy assassinated |
| 1970s | Best | [illegible] | [illegible] | [illegible] | [illegible] | [illegible] | [illegible] | The Vietnam War Ends |
| | Worst | -28.72% | 7.21% | 4.15% | 12.90% | 11.3% | 72% | 1973-74 Market Crash - Dow Drops 45% |
| 1980s | Best | 27.26% | 14.17% | 14.86% | 9.04% | 1.9% | 28% | 1987 Stock Market drops 23% in one day |
| | Worst | -9.77% | 9.82% | 5.93% | 16.45% | 13.5% | 70% | The Berlin Wall falls - end of the Cold War |
| 1990s | Best | [illegible] | [illegible] | [illegible] | [illegible] | [illegible] | [illegible] | The First Iraq War |
| | Worst | 6.56% | 6.53% | 3.04% | 10.43% | 5.4% | 40% | Tech-driven Stock Market hits new highs |
| 2000s | Best | 36.38% | 7.62% | 5.97% | 5.23% | 1.6% | 35% | Attacks of 9/11 & The War On Terrorism |
| | Worst | -22.37% | 5.83% | 1.02% | 8.52% | 3.4% | 40% | Stock Market tech bubble bursts |

*Sources:*
*Bureau of Labor Statistics 2005, The Federal Reserve System 2005, Freddie Mac 2005, Moody's Investors Services 2005, Pinnacle Data Corp. 2005, U.S. Department of Housing and Urban Development 2005, U.S. Social Security Administration 2005, U.S. Treasury Department – Internal Revenue Service 2005*

ADDITIONAL INFORMATION

- [1] Large Company Stocks
- [2] Corporate Bonds
- [3] Treasury Bills
- [4] Mortgage Rates
- [5] Inflation
- [6] Federal Taxes
- Social Security

BACK: CURRENT BALANCE SHEET    NEXT: CURRENT OVERVIEW

| Year | Annual Outlay | After Tax Earnings | End of Year A/T Investment Value | Policy Net Death Benefit |
|---|---|---|---|---|
| 1 | $1,300 | $0 | $1,300 | $1,000,000 |
| 2 | $1,300 | $78 | $2,678 | $1,000,000 |
| 3 | $1,300 | $161 | $4,139 | $1,000,000 |
| 4 | $1,300 | $248 | $5,687 | $1,000,000 |
| 5 | $1,300 | $341 | $7,328 | $1,000,000 |
| 6 | $1,300 | $440 | $9,068 | $1,000,000 |
| 7 | $1,300 | $544 | $10,912 | $1,000,000 |
| 8 | $1,300 | $655 | $12,867 | $1,000,000 |
| 9 | $1,300 | $772 | $14,939 | $1,000,000 |
| 10 | $1,300 | $896 | $17,135 | $1,000,000 |
| 11 | $1,300 | $1,028 | $19,463 | $1,000,000 |
| 12 | $1,300 | $1,168 | $21,931 | $1,000,000 |
| 13 | $1,300 | $1,316 | $24,547 | $1,000,000 |
| 14 | $1,300 | $1,473 | $27,320 | $1,000,000 |
| 15 | $1,300 | $1,639 | $30,259 | $1,000,000 |
| 16 | $1,300 | $1,816 | $33,375 | $1,000,000 |
| 17 | $1,300 | $2,003 | $36,678 | $1,000,000 |
| 18 | $1,300 | $2,201 | $40,179 | $1,000,000 |
| 19 | $1,300 | $2,411 | $43,890 | $1,000,000 |
| 20 | $1,300 | $2,633 | $47,823 | $1,000,000 |
| 21 | $1,300 | $2,869 | $51,992 | $1,000,000 |
| 22 | $1,300 | $3,120 | $56,412 | $1,000,000 |
| 23 | $1,300 | $3,385 | $61,097 | $1,000,000 |
| 24 | $1,300 | $3,666 | $66,063 | $1,000,000 |
| 25 | $1,300 | $3,964 | $71,327 | $1,000,000 |
| 26 | $1,300 | $4,280 | $76,907 | $1,000,000 |
| 27 | $1,300 | $4,614 | $82,821 | $1,000,000 |
| 28 | $1,300 | $4,969 | $89,090 | $1,000,000 |
| 29 | $1,300 | $5,345 | $95,735 | $1,000,000 |

Figure 175:
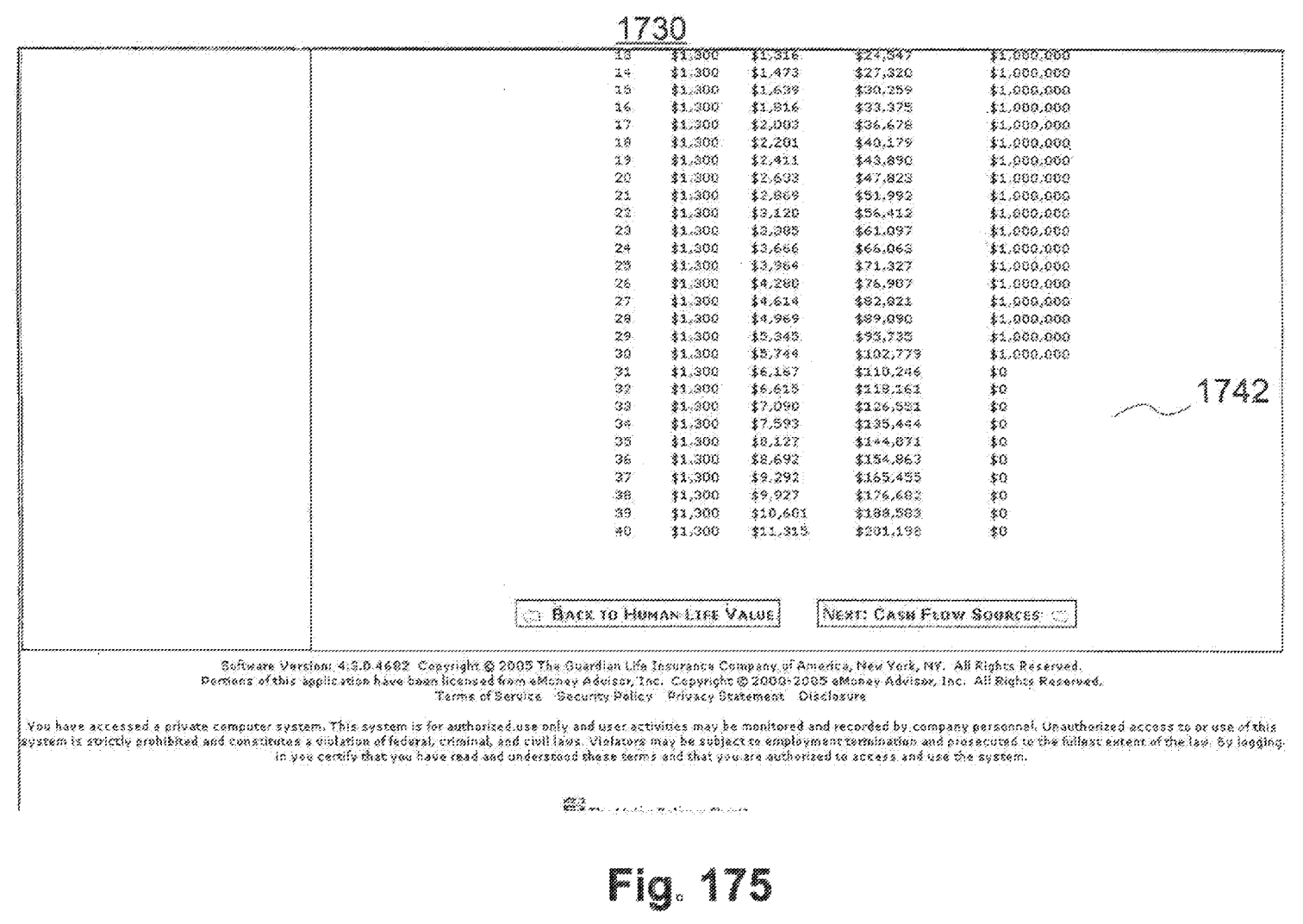

1730

| | | | | |
|---|---|---|---|---|
| 13 | $1,300 | $1,316 | $24,547 | $1,000,000 |
| 14 | $1,300 | $1,473 | $27,320 | $1,000,000 |
| 15 | $1,300 | $1,639 | $30,259 | $1,000,000 |
| 16 | $1,300 | $1,816 | $33,375 | $1,000,000 |
| 17 | $1,300 | $2,003 | $36,678 | $1,000,000 |
| 18 | $1,300 | $2,201 | $40,179 | $1,000,000 |
| 19 | $1,300 | $2,411 | $43,890 | $1,000,000 |
| 20 | $1,300 | $2,633 | $47,823 | $1,000,000 |
| 21 | $1,300 | $2,869 | $51,992 | $1,000,000 |
| 22 | $1,300 | $3,120 | $56,412 | $1,000,000 |
| 23 | $1,300 | $3,385 | $61,097 | $1,000,000 |
| 24 | $1,300 | $3,666 | $66,063 | $1,000,000 |
| 25 | $1,300 | $3,964 | $71,327 | $1,000,000 |
| 26 | $1,300 | $4,280 | $76,907 | $1,000,000 |
| 27 | $1,300 | $4,614 | $82,821 | $1,000,000 |
| 28 | $1,300 | $4,969 | $89,090 | $1,000,000 |
| 29 | $1,300 | $5,345 | $95,735 | $1,000,000 |
| 30 | $1,300 | $5,744 | $102,779 | $1,000,000 |
| 31 | $1,300 | $6,167 | $110,246 | $0 |
| 32 | $1,300 | $6,615 | $118,161 | $0 |
| 33 | $1,300 | $7,090 | $126,551 | $0 |
| 34 | $1,300 | $7,593 | $135,444 | $0 |
| 35 | $1,300 | $8,127 | $144,871 | $0 |
| 36 | $1,300 | $8,692 | $154,863 | $0 |
| 37 | $1,300 | $9,292 | $165,455 | $0 |
| 38 | $1,300 | $9,927 | $176,682 | $0 |
| 39 | $1,300 | $10,601 | $188,583 | $0 |
| 40 | $1,300 | $11,315 | $201,198 | $0 |

1742

BACK TO HUMAN LIFE VALUE    NEXT: CASH FLOW SOURCES

Software Version: 4.3.0.4682 Copyright © 2005 The Guardian Life Insurance Company of America, New York, NY. All Rights Reserved.
Portions of this application have been licensed from eMoney Advisor, Inc. Copyright © 2000-2005 eMoney Advisor, Inc. All Rights Reserved.
Terms of Service Security Policy Privacy Statement Disclosure You have accessed a private computer system. This system is for authorized use only and user activities may be monitored and recorded by company personnel. Unauthorized access to or use of this system is strictly prohibited and constitutes a violation of federal, criminal, and civil laws. Violators may be subject to employment termination and prosecuted to the fullest extent of the law. By logging in you certify that you have read and understood these terms and that you are authorized to access and use the system.

Figure 437:
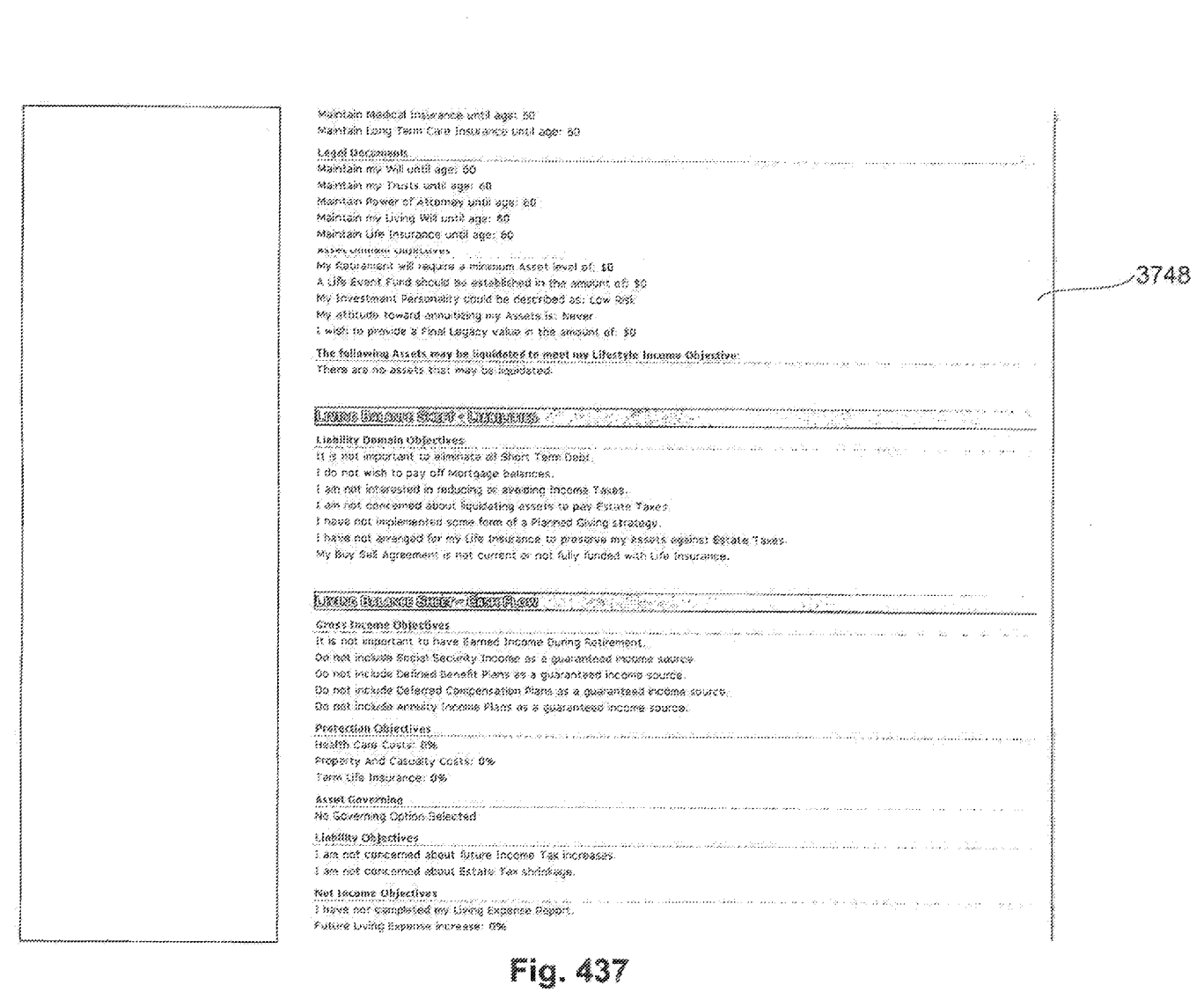

Maintain Medical Insurance until age: 60
Maintain Long Term Care Insurance until age: 60

Legal Documents
Maintain my Will until age: 60
Maintain my Trusts until age: 60
Maintain Power of Attorney until age: 60
Maintain my Living Will until age: 60
Maintain Life Insurance until age: 60

Asset Domain Objectives
My Retirement will require a minimum Asset level of: $0
A Life Event Fund should be established in the amount of: $0
My Investment Personality could be described as: Low Risk
My attitude toward annuitizing my Assets is: Never
I wish to provide a Final Legacy value in the amount of: $0

The following Assets may be liquidated to meet my Lifestyle Income Objective:
There are no assets that may be liquidated.

Living Balance Sheet - Liabilities

Liability Domain Objectives
It is not important to eliminate all Short Term Debt.
I do not wish to pay off Mortgage balances.
I am not interested in reducing or avoiding Income Taxes.
I am not concerned about liquidating assets to pay Estate Taxes.
I have not implemented some form of a Planned Giving strategy.
I have not arranged for my Life Insurance to preserve my Assets against Estate Taxes.
My Buy Sell Agreement is not current or not fully funded with Life Insurance.

Living Balance Sheet - Cash Flow

Gross Income Objectives
It is not important to have Earned Income During Retirement.
Do not include Social Security Income as a guaranteed income source.
Do not include Defined Benefit Plans as a guaranteed income source.
Do not include Deferred Compensation Plans as a guaranteed income source.
Do not include Annuity Income Plans as a guaranteed income source.

Protection Objectives
Health Care Costs: 0%
Property And Casualty Costs: 0%
Term Life Insurance: 0%

Asset Governing
No Governing Option Selected

Liability Objectives
I am not concerned about future Income Tax increases.
I am not concerned about Estate Tax shrinkage.

Net Income Objectives
I have not completed my Living Expense Report.
Future Living Expense increase: 0%

INTERACTIVE SYSTEMS AND METHODS FOR INSURANCE-RELATED ACTIVITIES

RELATED APPLICATIONS

This application is a Divisional of Ser. No. 12/113,087 filed on Apr. 30, 2008, which is a Continuation-in-Part of U.S. patent application Ser. No. 11/891,616 filed on Aug. 10, 2007, which is a Continuation-in-Part of U.S. patent application Ser. No. 11/510,537 filed on Aug. 25, 2006, which claims the benefit of U.S. Provisional Patent Application No. 60/763, 200, all of which are hereby incorporated herein by reference.

RELATED PATENT APPLICATION

Copyright Notice

The present application includes material that is subject to copyright protection. The copyright owner does not object to the facsimile reproduction of the application by any person as the application appears in the records of the U.S. Patent and Trademark Office, but otherwise reserves all rights in the copyright.

FIELD OF THE INVENTION

Interactive tools for assisting insurance professionals in performing activities such as marketing services to new or existing clients, managing client relationships, and prospecting for new clients.

BACKGROUND OF THE INVENTION

Historically insurance professionals have relied on traditional paper and notebook type techniques for tasks such as client management, organization, sales, and marketing. Transitioning to computer-based solutions can be complex and confusing to such professionals who may not already have familiarity with using personal computers and the Internet. In addition, many who are presently practicing in the insurance field commenced their careers well before the prevalence of personal computers and the Internet. The insurance field is also one in which professionals practicing in that field tend to adopt and maintain the traditional ways of conducting business. However, many of those who are entering the insurance field as professionals are typically individuals who are accustomed and more comfortable interacting with an electronic world of personal computers and the Internet than traditional techniques. As such, electronic solutions and features for insurance professionals that can meet the variable needs of interested parties are needed in the insurance field.

Moreover, known software applications for insurance and investment professionals do not provide adequate support for a broad range of activities or services that are needed by these professionals. For example, such known software applications are inadequate in meeting the needs of insurance and investment professionals in areas such as interactive insurance and retirement reports, client organizers, interactive insurance and retirement calculators, client data gathering tools, automatic configuration based on client data, etc.

As such, a need exists for improved software and system solutions in the insurance field and for retirement planning

SUMMARY OF THE INVENTION

In accordance with the principles of the invention, methods and systems for providing interactive insurance related tools and applications are provided.

For example, a method or system for assisting insurance professionals in marketing insurance is provided. The method or system can include implementing a multilayer software application for insurance professionals. The application is multilayered in that it includes separate functional layers for performing activities to complete a particular task that corresponds to that that layer. The application may include a first layer for performing data gathering for client information. The application may include a second layer for automatically generating reports and related action steps based on the gathered data. The application may also include a third layer for delivering the reports to the client (e.g., such as by generating a document, mailing a document, or reviewing the reports with the client electronically). The application can also store client-specific user activity within the application such as to record client information and to track a current state of interactions with a client. To access the application, insurance professionals may be required to be registered and authenticated before logging into the application.

The second layer can be directed to generating interactive insurance reports that are configured to include multiple sections (e.g., each report has the same general structure and is specific to a particular insurance category). A first section of a report can be for displaying a summary of a client's current insurance protection for a particular type of insurance. The report can include an assessment section specifying an assessment of the client's current level of protection for the current insurance category (displayed category). The report can include an action steps section that lists action steps that are applicable to the particular insurance category of protection. The action steps can be selected to indicate that they are to be completed in order to make progress with marketing efforts or discussions with the client.

Each layer can, if desired, include one or more features. For example, the second layer can, for example, include an income replacement calculator for displaying an impact to a client's financial state if the client was currently disabled. The second layer can, for example, include a human value calculator for displaying an impact to the surviving family of a client if the client is considered currently deceased.

The software application can be configured to include a Workflow Wizard® software or module that sequentially displays sections of the wizard for interaction by the user in a sequence that is consistent with the three layers. It should be noted that the use of the term Workflow Wizard® by itself hereinafter refers to Workflow Wizard® software or module.

The application can be configured as a network application that provides access to insurance professionals and provides access (e.g., through a client website) to clients. The application can incorporate an aggregation service that provides an interface for the client to view client account information from various sources (e.g., banks, lenders, stock accounts, etc.) through the interface and which aggregates such information to better reflect the client's current financial state. The aggregation service can be incorporated into the features of the application so as to better the analysis performed by the insurance professionals.

A feature that can be provided to insurance professionals, which can also be used by the professionals for illustration to clients, is a tool for evaluating a client's current level of protection to the client's current financial state. The feature can be specifically configured for a particular type of insurance such as life insurance or disability. The feature can involve a method or system for interactively analyzing and illustrating a client's insurance needs. After storing client information, an interactive interface can be displayed that is configured to permit a user to display a current financial state of a client and to compare the current financial state to a modified version of the current financial state that reflects a change in the client's financial state that would occur if a need for a particular type of insurance is currently triggered. The interface can also include options that provide the user with the opportunity to interact with the interface to enter insurance related parameters (e.g., insurance and financial data) to recalculate and redisplay the modified version of the current financial state based on the entered parameters. One option can be to allow the user to specify an additional level of insurance protection to be able to evaluate the impact of the hypothetical addition to the analysis. Another option can for example provide the user with an opportunity to select to payoff debts in calculating the modified version of the current financial state.

The interface can be configured to display the current financial state in numerical values or in other forms such as a graphical view (or combinations thereof). In one embodiment, the interactive interface can be configured to provide side-by-side tabular information for the current financial state and the modified version of the current financial state.

The interactive interface can, for example, be displayed in a browser. As previously mentioned, aggregation services can also be used in this context to update client information to maintain the validity of the analysis.

Another aspect of embodiments of the invention is related to interactive reports that comprise various specific sections for the benefit of the insurance professional and the client. For example, a method or system can be implemented for providing an interactive insurance-specific client information display page. The method or system can involve storing insurance-related client information for a particular client. A software application can be implemented that displays an insurance-specific-client-information display page. The display page can be configured to include a title indicating a type of insurance, a text section providing general information regarding the type of insurance, a summary section providing a summary of a client's current insurance coverage for the type of insurance based on the stored client information, and an assessment section that is selectable by the user to specify a level of adequacy of the client's insurance coverage. The display page can also include a plurality of selectable action steps that are specific to the type of insurance and which the user can select for action in furthering client sales interaction, and a plurality of selectable tasks that are specific to the type of insurance and are specifically for the user to select to perform tasks within the software application. The display page can be configured for particular type of insurance such as life insurance or disability insurance.

The application can be configured to store the status of the selected action steps for later review by the user. To assist in viewing different display pages, the display page can includes links for related-insurance types (examples of which are provided in the FIGS.).

Another aspect of embodiments of the invention relates to organizational tools for insurance professionals. For example, a method or system can be implemented for providing an insurance services environment to insurance professionals. The method or system can include implementing a network application that provides an insurance services environment to insurance professionals via a client-server arrangement, wherein the network application remotely stores client information entered by the insurance professionals via the network application. The method or system can further include providing a Workflow Wizard® to the insurance professionals using the network application that sequentially displays pages to an interacting user in multiple stages comprising data gathering and presentation. If desired, the display pages can include a display page for selecting client-specific alerts. The delivery stage can include providing access to client-specific content through a personal website for the client. The presentation stage can include an interactive calculator interface for evaluating whether a client's current insurance coverage is sufficient for protecting the client's current financial state. The presentation stage can, for example, include generating reports. If desired, the network application can include a dashboard for pursuing various daily client tracking and status activities of an insurance professional.

Other features can include a to do list feature and a self insurance calculator.

A system and method provides a customer with interactive tools for evaluating how life insurance affects a user's financial condition. A tool can be provided for illustrating the advantages of certain financial options. A plurality of financial options, such as term and permanent life insurance as well as investment options (e.g., CD, bonds, mutual fund, 401K), can be displayed on a page. Different financial factors can be associated with each financial option. In response to selection of a financial option, the financial factor(s) associated with the selected option can be identified and prominently displaying on the display page (e.g., by highlighting the factor). For example, in response to selection of the permanent life insurance option, all or substantially all financial factors can be highlighted.

Financial factors can be associated with one or more categories or domains such as protection, assets or asset building, liabilities and cash flow. The one or more factors can be displayed in a table on the display page, which can be arranged to illustrate the factors within each category. Moreover, the table can be arranged in columns and rows. The categories and factors can be positioned in the columns and rows. Each category can be displayed on the display page in a different color such that the one or more factors can be displayed in substantially the same color as the category with which the one or more factors is associated. In one embodiment, a cursor or pointer can be positioned proximate the one or more factors such that an indicia appears. The indicia can be a field containing a description of the factor.

Using another tool, a user can be provided with an illustration to show the benefits associated with purchasing permanent life insurance. In particular, the tool can be used to compare term and permanent life insurance yearly premiums against maximum yearly tax deferred funding limit set by the government. A display page can be provided and can comprise a data entry section having one or more data fields for inputting information therein, and a permanent life insurance option, a term life insurance option, and/or a source option. A user can be provided with an opportunity to input information in at least one data field and to select at least one option. A selection of at least one option can be received and at least one value can be calculated based on the inputted information and the selected option. The value can be displayed on the life insurance chart as a visual indicator representing a funding limit and another visual indicator representing a life insurance premium. In response to the selection of the permanent life insurance option, a first life insurance premium can be calculated; and a first visual indicator representing the calculated first premium can be displayed on the chart. In response to the selection of the term life insurance option, a second life insurance premium can be calculated and a second visual indicator representing the calculated second premium can be displayed on the chart.

In one embodiment, after selection of a source option, the source of the funding limit can be displayed on the chart. In response to selection of the term life insurance option and after calculation of the at least one value, the visual indicator representing the life insurance premium and the visual indicator representing the funding limit can be displayed. The life insurance premium can be a term life insurance premium and the funding limit can be a maximum funding limit or a minimum funding limit. The minimum funding limit can be a term life insurance premium. In some embodiments, a funding limit option can also be provided, a maximum and/or minimum funding limit can be calculated; and the maximum and/or minimum funding limit can be displayed on the chart.

Yet another tool provides a user the ability to calculate and display an amount of money hypothetically saved (realized wealth) and spent (lost wealth) during a user's lifetime. A plurality of data entry fields can be provided on a display page. Information inputted by a user into the data entry fields can be received and realized wealth and/or lost wealth can be calculated based on the inputted information. Realized wealth and/or lost wealth can be displayed on the display page. The information inputted into the data entry fields can be a study period, income, percentage increase in income, after tax rate of return, taxes, debt, lifestyle and savings. The realized wealth and lost wealth can be displayed on at least one of a chart, a graph, a table and a written field.

Another tool can be provided which shows the user the correlation between a user's lifestyle and the amount of money a user leaves to his/her legacy. A field for choosing a governing factor and a plurality of data entry fields for inputting information for a first scenario and a second scenario are provided. For example, the data entry fields can be a rate of return, a tax rate, an inflation rate or a study period data. A selection of a governing factor, which can be net income or legacy value, can be received. Moreover, a user inputted asset value and additional information can be received in the data entry fields. A plurality of values for each of the first and second scenarios can be determined based on the governing factor, asset value and information. The plurality of values can be monetary values for periods of time during the study period. A first display representing the first scenario and a second display representing the second scenario can be displayed such that the first and second displays can change depending on the governing factor, asset value and information. The first and second display can be selected from the group consisting of a graph, a chart and a table. A summary area can also be provided and one or more of the plurality of values associated with the first and second scenarios can be displayed in the summary area.

In an alternative method, a plurality of data entry fields can be provided for inputting information for a first scenario and a second scenario. A death benefit value can be receiving for a life insurance policy inputted into a first data entry field of one of the first and second scenario. Additional information inputted by the user in the data entry fields can be received and a plurality of values can be determined for each of the first and second scenarios based on the inputted death benefit value and information. A first display representing the first scenario and a second display representing the second scenario can be displayed to a user. The first and second displays can change depending on the inputted death benefit value and information. In a preferred embodiment, the first and second display can be a graph, a chart or a table. The first and second scenarios can have data entry fields for interest income, tax rate, asset value, age at annuitization, age, gender, annuity option, annuity type, inflation rate or study period. A summary area can also be provided and one or more of the plurality of values associated with the first and second scenarios can be displayed in the summary area. The plurality of values can be monetary values for periods of time during the study period.

In another alternative method, a plurality of data entry fields can be provided for inputting information. A monetary value inputted by a user in a first data entry field and additional information inputted by the user in additional data entry fields can be received. The data entry fields can include a starting monetary value, an annual distribution, an inflation rate, a study period and/or a portfolio model. A selection of one of a plurality of portfolio models can be received. A plurality of values as a function of the inputted monetary value and information can be determined and a first display which changes depending on the inputted monetary value and information can be displayed. Moreover, numerical value (which can be a percentage) representing the probability that the monetary value will be greater than zero during a study period can also be displayed. The display can be a graph, a chart or a table.

In another alternative method, a plurality of data entry fields can be provided for inputting information for a first strategy and a second strategy. Term life insurance information in at least one data entry field of the first strategy, permanent life insurance information in at least one data entry field of the second strategy; and additional information in additional data entry fields can be received. The data entry fields can be organized by categories, which can be selected to incorporate a number of aspects of a user's financial condition. For example, data entry fields can be arranged in domains or categories such as protection, assets, liabilities and/or cash flow. A plurality of values for each of the first and second strategies can be calculated based on the term life insurance information, permanent life insurance information and additional information. A first display representing the first strategy and a second display representing the second strategy can be displayed. The first display can change depending on the term life insurance information and additional information. The second display can change depending on the permanent life insurance information and additional information. The displays can be a graph, chart or table. Moreover, a summary area can be provided in which one or more of the plurality of values associated with the first strategy and/or second strategy can be displayed. In one embodiment, term and permanent life insurance information can be provided automatically or by input of information by a user.

Yet another tool can be provided which enables a user to analyze how various combinations of protection, assets, liabilities and cash flow affects a user's income during his/her lifetime and how much money a user leaves to his/her legacy at death. A plurality of categories or domains for a first scenario representing different aspects of a user's financial condition can be provided, wherein the categories can include data entry fields capable of receiving information for a first strategy and a second strategy. Categories or domains can be provided for at least protection, assets, liabilities and cash flow. Insurance information, mortgage information, loan information, asset information and/or tax information can be received in the data entry fields for the first scenario. A plurality of values can be calculated for the first scenario for each of the first and second strategies based on the information received in the data entry fields. A selection of at least one of a summary display page for the first strategy, a detailed display page for the first strategy, a summary display page for the second strategy, a detailed display page for the second strategy, and a chart can be received. In response to receiving the selection the plurality of values one of the summary display page for the first strategy, the detailed display page for the first strategy, the summary display page for the second strategy, the detailed display page for the second strategy, and the chart can be displayed on a screen. Displaying the chart can comprise graphically displaying at least one value for each of the first and second strategies.

In some embodiments, a plurality of categories can be provided for a second scenario representing different aspects of a user's financial condition, wherein the categories comprise data entry fields capable of receiving information for a first strategy and a second strategy. Insurance information, mortgage information, loan information, asset information and/or tax information can be received in the data entry fields for the second scenario. A plurality of values can be calculated for the second scenario for each of the first and second strategies based on the information received in the data entry fields. The step of displaying can comprise displaying the plurality of values for the first and second strategy on the summary display page for the first strategy, the detailed display page for the first strategy, the summary display page for the second strategy, the detailed display page for the second strategy, and/or the chart.

A system and method can also provide a customer with interactive tools for evaluating his/her financial condition during retirement. Such a system enables a customer to create and analyze retirement strategies. For one tool, a user can be provided with a summary of assets, liabilities, protection and cash flow. Information about a life insurance policy can be received by the system, and the cash value and death benefit of the life insurance policy can be calculated/determined. The summary of assets can show a graphic illustration of the cash value of the life insurance policy. A button may be provided which enables a user to selectively display on the graphic a representation of the death benefit of the insurance policy. For example, the cash value can be represented in a pie chart with the death benefit being wrapped around or surrounding the pie chart.

A user can also be provided with a tool that allows a user to input a number of inputs such as income and various tax amounts (e.g., federal, state). Once information is entered by a user, a graph (e.g., a bar graph) may be displayed that illustrates the amount and/or percentage of income that goes to taxes and the amount that is kept by a customer. A button can be provided which allows a user to display additional tax categories (e.g., real estate, sales tax). When additional taxes are entered, the graph can be updated to illustrate the new tax information.

Moreover, a user can be provided with a chart having various financial categories and a number of selectable options affecting a user's financial condition. The chart can be used to illustrate a user's financial balance. As a user selects the options, an illustration such as a bar can be displayed relative to one or more financial categories on the chart. The illustration can show an increase or decrease in a user's financial condition. As the user selects additional options, the effects on a particular financial category can become magnified (e.g., the bars can increase in size).

Using another tool, a user can be provided with a summary of assets, liabilities, protection and cash flow in the form of a graphic (e.g., a pie chart). The graphic can have a legend illustrating the breakdown of the graphic. The graphic can show assets by liquidity and tax status (qualified/non-qualified); liabilities by interest rate and time to pay down; cash flow by protection, assets, liabilities, earned/unearned, and guaranteed/variable. In an embodiment using a pie chart, each category can be represented by a piece of the pie.

Using yet another tool, a user can be provided with a number of data entry fields for entering information about a current investment strategy, an alternative investment strategy and a retirement strategy. Based on the inputted information, a number of values can be calculated/determined. For the current and alternative, a user can enter any combination of information pertaining to assets, liabilities, cash flow and protection (e.g., life insurance). For the retirement strategy, a user can enter information about the expected number of years in retirement, income inflow during retirement, distribution of assets when retired, return rate, tax rate, as well as the cash flow in the current and alternate strategies. In one embodiment, for each of the current and alternative strategy, a user can select to distribute money during retirement by interest only, flat withdrawal or amortized. Any combination of these distribution methods can be used to distribute money during retirement. The scenarios can be shown in summary form (e.g., in a graph or table) or a detailed breakdown (for each year of a study period) on a table or chart. Further, the current and/or alternate strategies pre-retirement (accumulation period) can be shown on the same table, chart, graph or other illustration with the retirement strategy.

Using another tool, a user can evaluate a lifestyle income objective. In particular, a user can input information about the amount of money a user predicts he/she will need each year during retirement. This amount can be plotted on a graph or chart. Income information (e.g., income from social security or part time job) can be inputted, automatically or by a user, in one or more data entry fields. The information can include an amount of money, years during which income will be received and a percentage increase in income (if any). This information can be plotted on the graph or chart to illustrate whether a user has enough income to meet his/her predicted income needs.

A user can also be provided with a tool that can show cash flow over time. In one embodiment, the tool can be a diagram having different sections/areas showing information in data fields for gross income, protection, assets, liabilities and net income. Data entry fields may also be provided for inputting additional information such as percentage rates affecting cash flow (e.g., premium cost increase, tax increase, cost of living). A slider can be provided that enables a user to move through cash flow in various years during retirement. The slider can have indicia indicating the age of a user. As a user moves the slider, the information/values for a particular year can be shown/updated in the data fields and may change between years.

Using another tool, a user can be provided with a diagram (e.g., graph) illustrating asset cash flow during retirement. Data entry fields can be provided for entering an asset value and an outflow or cash flow model (e.g., how money will be paid out to a user during retirement). Cash flow information calculated from previously inputted financial information can be shown and used in creating the diagram. The diagram can show depletion in assets over a period of time (e.g., during retirement), illustrating continuing depletion after a user's assets have already been completely depleted. Such a diagram can illustrate to a user that his/her asset(s) may not be enough to live on through retirement. Moreover, one or more data entry fields can be provided for inputting information about life event(s) during retirement (e.g., college, new car purchase, vacation, medical expenses), including a description of the life event and the value associated with the life event. The diagram can be updated based on inputted life event information and can illustrate to a user how life events can further affect retirement cash flow.

Yet another tool can illustrate estate planning or legacy strategies. For example, a user can input information and/or select scenarios related to asset depletion, reverse mortgage, planned giving, and estate transfer. For each scenario, the value of assets, cash flow during lifetime and amount left to legacy can be illustrated side-by-side, for example, using thumbnails. The thumbnail can show a monetary value or an illustration representing financial information. The tool can also be used to illustrate one strategy at a time or all strategies at the same time so that the difference between strategies is apparent to a user.

Furthermore, a Personal Financial Biography$^{SM}$ module can also be provided. A user can input any information he/she desires in data entry fields, including biographical information, which can be received and stored by the system. Upon request for the personal biographical information, the information can be retrieved and displaying on a screen. The data entry fields can include pre-inputted information pertaining to a theme(s) and information pertaining to the theme can be entered by a user in the data entry fields.

BRIEF DESCRIPTION OF THE DRAWINGS

Further features of the invention, its nature and various advantages will be more apparent from the following detailed description, taken in conjunction with the accompanying drawings in which like reference characters refer to like parts throughout, and in which.

DETAILED DESCRIPTION OF PREFERRED EMBODIMENTS

Software applications, tools, or features are provided for insurance professionals that are intuitive, easy to comprehend, and easy to install. Software, for example, is implemented that can aid those with little software or Internet experience to collect client information, manage clients, track progress with respect to clients, generate reports, and evaluate insurance weaknesses. A networked solution can be provided to alleviate data storage needs of insurance professionals and to increase marketing opportunities by way of sharing client information. Aggregation services can be combined with software features to increase the usefulness of the software overtime in analyzing the insurance needs of clients. Software can also be implemented with color coordination and navigation tools to ease a user's comprehension and interaction with the software. Another aspect can involve detailed data collection and automatic use of collected data and the automatic configuration of the software (e.g., options, pages) based on the collected data. These and other features that show a general step forward in the insurance field are also described herein.

Figure 1:
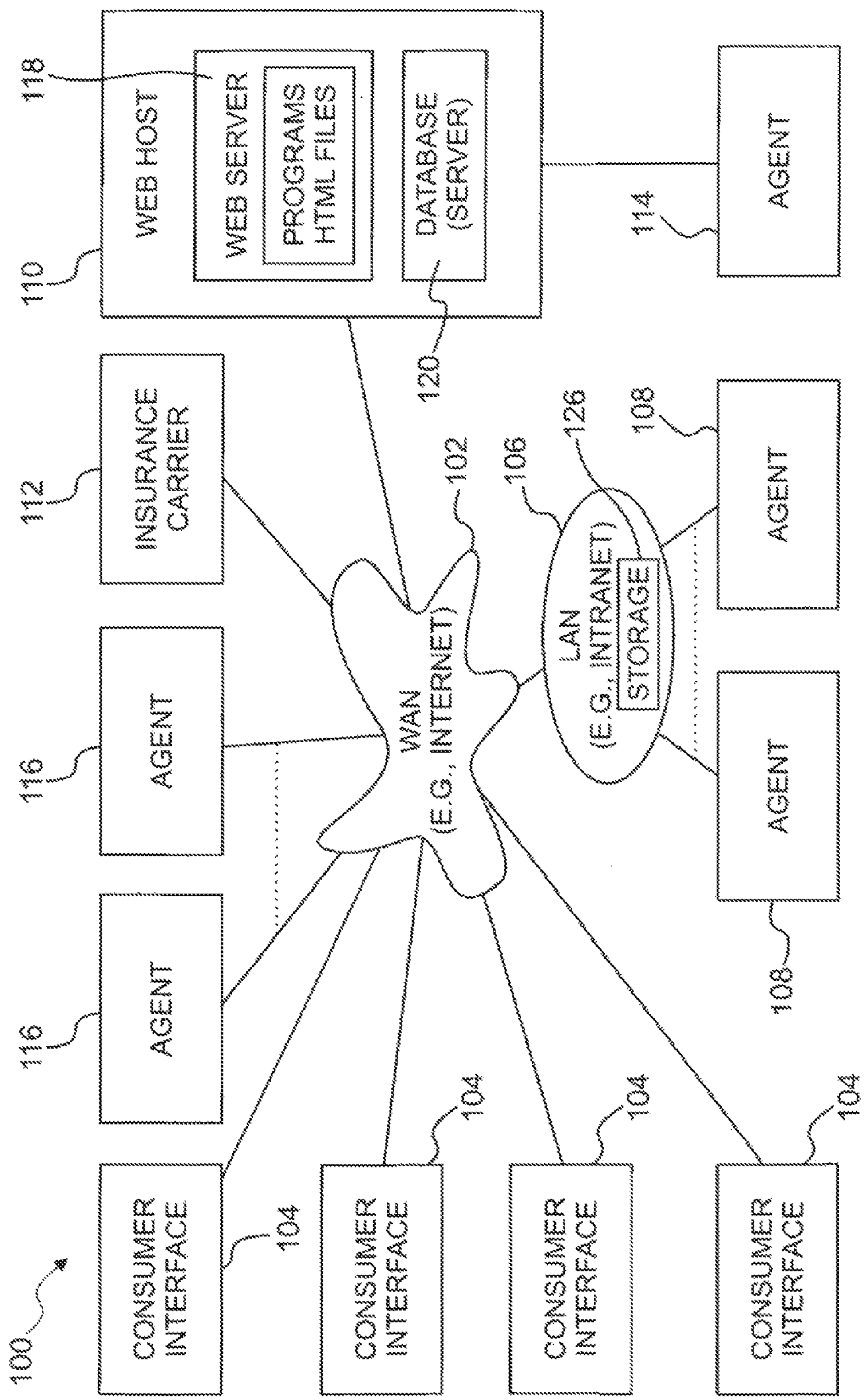
FIG. 1 is a functional block diagram of illustrative systems for providing software-implemented insurance related services in accordance with one embodiment of the invention.

With reference now to FIG. 1, an environment such as environment 100 may be used by insurance agents for receiving insurance related services to, for example, assist the insurance agent in managing, marketing, and providing insurance services. Environment 100 may include wide area network ("WAN") 102 (e.g., the Internet), WAN consumer interfaces 104, insurance carrier equipment 112, web host equipment 110, and agent equipment 116. If desired, a configuration may be implemented in which insurance carrier equipment 112 and web host equipment 110 are combined (e.g., to provide the insurance carrier as also the web host) If desired, environment 100 may be configured to include local area network ("LAN") 106 (e.g., an intranet) and LAN agent interface equipment 108. If desired, environment 100 may be configured to include agent equipment 114 that is directly connected to web host equipment 110 and/or to include a direct connection from insurance carrier equipment 112 to web host equipment 110. If desired, environment 100 may also be configured in other ways. For example, there may be fewer or greater number of components (e.g., equipment or consumer interfaces) in environment 100. Environment 100 may include software applications implemented in environment 100 to support interactive tools for insurance professionals and to provide an interface for consumers.

Web host equipment 110 may be central to providing insurance tools. If desired, however, a distributed architecture may be used. Web host equipment 110 may include equipment such as web server 118 and database 120. Database 120 can be part of web server 118, a separate database server, multiple servers, or other such host equipment. One or more applications for providing interactive insurance tools may be implemented on web server 118 to provide insurance related services. Database 120 may store information related to consumers, agents, or insurance carriers that use the tools and services that are available in environment 100.

Web host equipment 110 may have been implemented by an insurance carrier to assist the agents and representatives of the insurance carrier by providing interactive tools available through agent equipment 116 that can drive and manage business for the agents.

Agents preferably interact with insurance related services, available via WAN 102, such as insurance services tools using agent interface equipment 116. Agent interface equipment 116 preferably includes personal computers such as laptops, workstations, or other type of computer equipment that includes a suitable interface for implementing one or more of the insurance tools available via environment 100. For example, for tools related to data collection and compilation, a computer that provides a convenient interface for data entry such as a full keyboard would be preferred. However, the use of other features may not require such functionality for each instance of their use. LAN 106 may be an enterprise platform implementation in which some or all of the functionality and services available from web host 110 is implemented in LAN 106 to supplement or replace web host equipment 110. Agent interface equipment 108 may comprise equipment such as that mentioned above in connection with agent interface equipment 116. As mentioned above, web host equipment 110 may be configured to include a direct connection with agent interface equipment 114. Agent interface equipment 114 may comprise equipment such as that mentioned above in connection with agent interface equipment 116.

Consumers may preferably interact with insurance related services available via WAN 102 using consumer interfaces 104. Consumer interfaces 104 may include personal computers, personal digital assistants, minicomputers, or other computer equipment that has a suitable communications connection with WAN 102.

Insurance carrier equipment 112 can include an interface for an insurance carrier to interact with web host equipment 110. If desired, insurance carrier equipment 112 may allow an insurance carrier to interact with agents via WAN 102. If desired, insurance carrier equipment 112 may be configured to have a direct connection or a private network connection to web host equipment 110 that is in addition or an alternative to a WAN connection. Insurance carrier equipment 112 may comprise computer equipment such as a personal computer (e.g., a PC on a LAN of the insurance carrier) or other computer equipment suitable for communicating with web host equipment 110.

One or more insurance carriers may participate in environments 100 such as through a plurality of insurance carrier equipment 112. However, preferably, environment 100 is configured to include a private communications network that is sponsored by one particular company, an insurance carrier, to provide tools and assistance to their agents through networked applications and databases. The private communications network can be implemented at least partially through a public packet data network such as the Internet. The applications and services may be branded with the carrier's logo and details.

Communications links within environment 100 may be wireless links, wired links, or combinations thereof. Suitable links may be used for the communications links in environment 100 to allow sufficient data throughput and interaction between end-users (e.g., agents, consumers, insurance carriers, web host provider, etc.). Techniques for implementing such communications links are known to those of ordinary skilled in the art.

Environment 100 may provide a variety of insurance related services to insurance agents. For example, environment 100 may be used to provide insurance services tools to insurance agents to assist them in marketing insurance products, managing information, educating clients, generating presentations, managing clients or developing prospects, or other tools or services illustratively described herein. An interactive application for providing insurance related tools and functionality for insurance professionals can be provided at least based in part on the process illustratively shown in FIG. 2.

Figure 2:
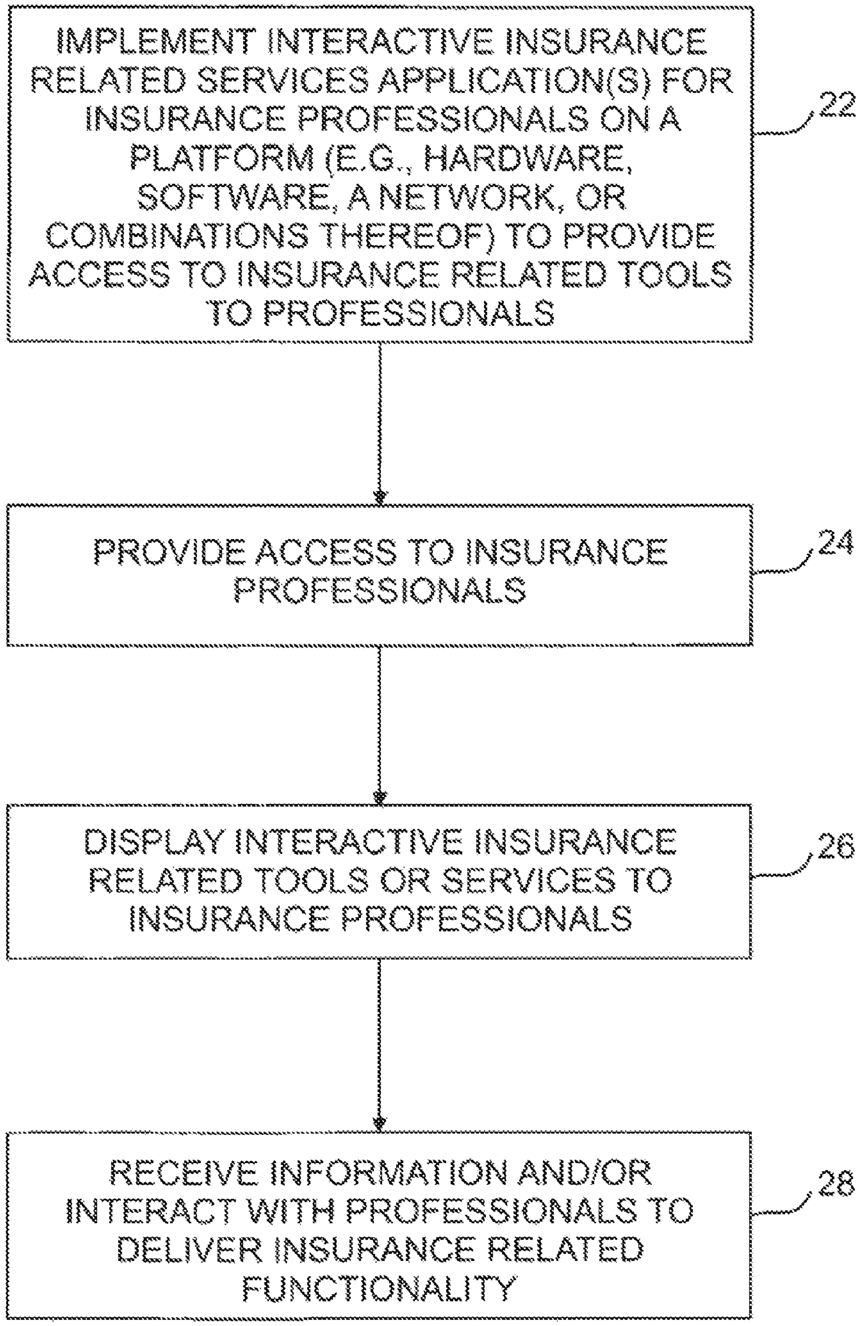
FIG. 2 is a flow chart for providing interactive insurance related services to insurance professionals in accordance with one embodiment of the invention.

With reference now to FIG. 2, at step 22, an interactive insurance related services application specifically configured for insurance professionals or one or more such applications is implemented on a platform to provide access to insurance related tools or services to insurance professionals such as to assist and support the professionals. The platform can comprise hardware, software, a network, or combinations thereof. For example, the combination of the application and the platform can be considered agent-interface equipment (e.g., agent interface equipment 116 of FIG. 1). At step 24, insurance professionals can be provided access to the application. In providing access, authentication techniques are preferably implemented to provide access only to intended types of users and in addition only to those users who are registered to use the application. As such, the general public would not be provided access to the application. At step 26, interactive tools or services are displayed to insurance professionals. For example, after a user is authenticated, an application that implements insurance-related interactive tools or services displays the tools or services to the user. At step 28, the application receives information and/or interacts with one or more insurance professionals to deliver insurance related functionality to the professional. Accordingly, through interaction with the application, functionality, such as client tracking, data organization, data collection, or preparation of presentations, an insurance agent can benefit from insurance related services that are designed to enhance and improve the professionals business operations including its efficiency and speed of service.

Figure 3:
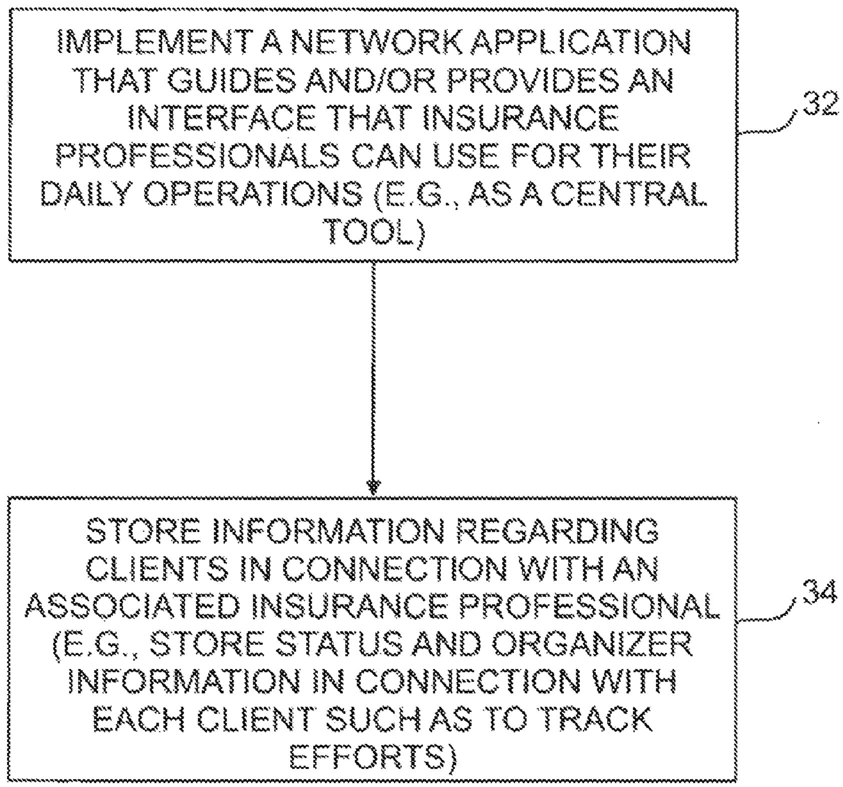
FIG. 3 is a flow chart for providing a network application to insurance professionals in accordance with one embodiment of the invention.

Illustrative steps involved in for example providing network-based insurance related software tools or services to insurance professionals are shown in FIG. 3. With reference now to FIG. 3, at step 32, a network-based application is implemented that is configured to guide and/or provide a user interface for insurance professionals that can, for example, be used for the daily operations of insurance professionals. The network-based application is for example a web application that is configured using HTTP communications in a client-server arrangement. The application is preferably configured to be a central interface for insurance professionals in conducting their daily business operations. As such, insurance professionals would interact with the application to use its various features to achieve their business needs. At step 34, in response to interaction with insurance professionals, information is stored regarding clients or potential clients in connection with an associated insurance professional. For convenience, "clients" as used herein refers to clients and potential clients if the combined meaning is applicable in the given context. The status information that is stored is, for example, regarding a particular client or status information regarding the extent of progress with respect to a particular client.

Further by way of example, an organizer tool can be provided that stores information for organizing an insurance professional's client information, tasks, reminders, alerts, etc. (e.g., with respect to an individual client). This implementation allows an insurance professional to be able to review information on the state of discussions with a particular client and to, for example, pick up on discussions from where the professional left off without having to recall from personal memory or by maintaining notes on such activity. For example, the application preferably provides a record of activity completed with respect to a particular client and would preferably provide a record of desired activity that remains to be completed (e.g., using a to do list feature).

If desired, calendar information that is specific to a client or potential client can also be stored. For example, the calendar can be used to generate automatic alerts for the insurance professional in connection with each client. The information is preferably stored on a server that is remote from the insurance professional. This implementation provides the advantages of improved data security and portability. For example, an insurance agent would be able to access the data and application from any network-connected computer without having to be tied to the storage on his personal computer or the enterprise server of the professional's company. Improved data security is provided in such a system because the customer data can, for example, be encrypted in communications, and the server for the network-based application can be implemented with a higher level of physical and electronic security (including back-up services) than would likely be available by the system of the insurance professional. In addition, network-based implementations reduce the cost and complication that is imposed on insurance professionals to provide such security and storage capabilities on their own. If desired, in some embodiments of the systems and methods illustratively described herein, other ways of providing such insurance applications and services can be implemented. For example, the application can be configured as a software resident application on an insurance professional's computer or can be implemented as a combination of a resident application and network-based application. Thus, the interface can be an application provided through a browser or an application interface that is displayable without the need to open a browser. Another variation may be to provide only local storage of client information or provide a combination of local and remote storage (e.g., to provide limited duplication of the data).

Figure 4:
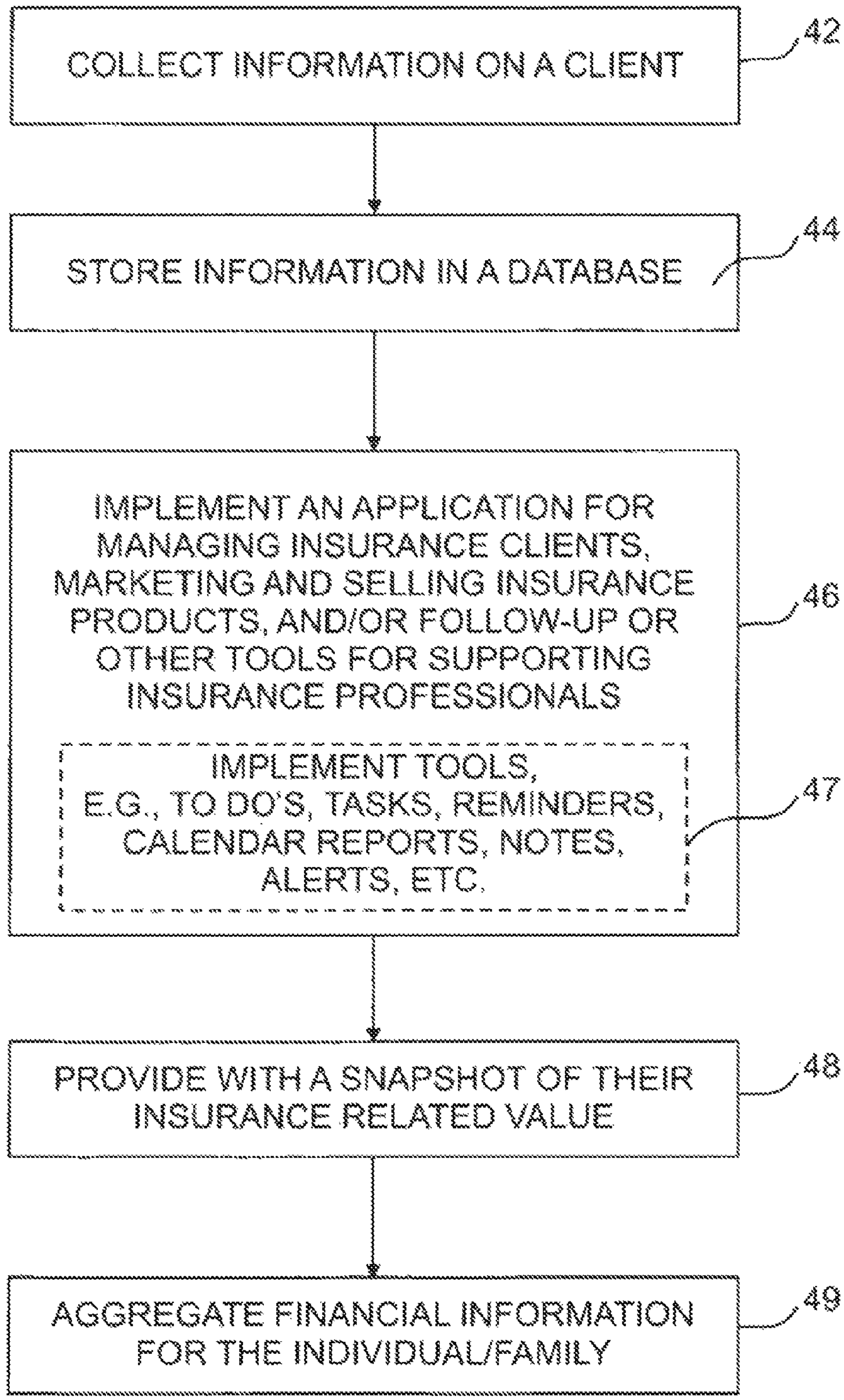
FIG. 4 is a flow chart for providing a software application for insurance professionals in accordance with one embodiment of the invention.

An application can be implemented to provide a combination of different tools and services to insurance professionals. The application can be a single application, combination of different applications (e.g., that are electronically connected, that are separately selectable for execution, etc.), or can comprise one or more modules, applets, applications, or other software that is executable for providing desired functionality. Illustrative steps in providing an application that provides various tools and services including a snapshot of a client's insurance related value are shown in FIG. 4. At step 42, user interface and input functionality is implemented to collect information with respect to a client. For example, an insurance professional interacts with the user interface to collect and input data regarding a particular client and can do so for multiple clients. At step 44, the information is stored in a database for later retrieval by the insurance agent or possibly the client. As illustratively described, the database is preferably stored on a server remote from the insurance profession, but other embodiments can also be implemented if desired. At step 46, insurance related tools and services are implemented and/or provided for performing activity such as managing insurance clients, marketing, and selling insurance products, providing follow-up, or other tools for supporting insurance professionals. Preferably, the application would be a central source or outlet for the insurance professional such that it would provide a comprehensive and sole resource or interface for the professional. This for example would provide the advantage of simplifying computer interactions for insurance professionals such that they only need to interact with this application (e.g., as a dedicated terminal) rather to navigate multiple applications and interact with the operating system which can often times be confusing for less experienced computer users.

Step 46 may for example include step 47. At step 47, various specific tools or services can be provided to insurance professionals. The tools or services can, for example, include a "to do" or tasks feature, reminders, calendar, reports, notes, alerts, etc. (e.g., that can be configured to be specific to each particular client).

At step 48, a snapshot feature is provided. The snapshot feature can provide a tool for both presenting information and illustrating the insurance related needs or value of an individual or a family in connection the information. For the sake of clarity and convenience, the term individual or client is used herein to refer to an individual client or an individual client's family (i.e., immediate family or dependents) where applicable in the given context. The snapshot can be interactive to allow variations of the information to illustratively present different scenarios (e.g., levels of insurance protection). The snapshot is preferably configured as a tool for illustrating, in connection with a particular category of insurance (e.g., life insurance, disability, etc.), the real life impact on the financial state (e.g., income difference) if an event that would typically trigger the insurance coverage occurred. Thus, the snapshot would be able to display insurance related values (e.g., related to that insurance category) for an individual or a family that would exist before and after the triggering event. In addition, the snapshot can be configured to provide insurance-related parameters. The insurance related parameters can, for example, be used for controlling how the insurance proceed(s) would be applied or managed, and to illustratively vary a snapshot view for analysis by the insurance professional to illustrate for the client.

The snapshot feature can be implemented as a module or a component of a network application. In one embodiment, the module can require communications from an insurance agent's computer to a remote processor that performs the calculations and transmits information, such as, the resultant data to the insurance agent for display. In another embodiment, or in combination with such an embodiment, processing and calculations can be performed locally such that a noticeable delay between selecting a "calculate button" and the display of the resulting information does not exist (e.g., in a network application, there may be a delay involved in sending and receiving information in connection with the calculation). A benefit of the network-based implementation is that a user would not need to install a resident application on their computer.

Enhanced functionality of the insurance snapshot feature can be realized by combining this feature with an aggregation feature. Aggregation provides a functionality in which current financial information about an individual can be aggregated, stored, and updated. For example, an individual would provide account or personal information to an insurance professional. The information is used to automatically access electronic information (e.g., nightly, in real time, periodically, etc.) to provide a resource for viewing the current financial state of an individual in various categories (e.g., bank accounts, investments, mortgage, credit card debts, investment property, etc.) and preferably in all categories. The aggregate feature in combination with the snapshot feature provides a tool by which an individual or insurance professional can periodically evaluate whether the individual's insurance coverage matches the individual's current financial state (e.g., should the individual now increase or decrease his or her insurance coverage). The aggregated information can also be provided to the insurance professional to conduct such an analysis.

An application (e.g., a network application) can be specifically configured to match or present an insurance carrier's approach for marketing insurance. The application can, thus, integrate the insurance carrier's techniques, its insurance approach, and concepts from its instructions and teaching materials for its insurance professionals. Consequently, the application facilitates an integrated interface for the insurance professionals that provides a seamless connection in thought from instructions and teaching materials to the information displayed in the application, and the interactions and "look-and-feel" therein. Such an approach, for example, provides continuity with the insurance carrier's business approach and presents the application to be intuitive to the user, who may be well familiar with the insurance carrier's philosophy, but may not be as well versed in computers, the Internet, or software application. Illustrative steps involved for implementing such an approach are shown in FIG. 5.

Figure 5:
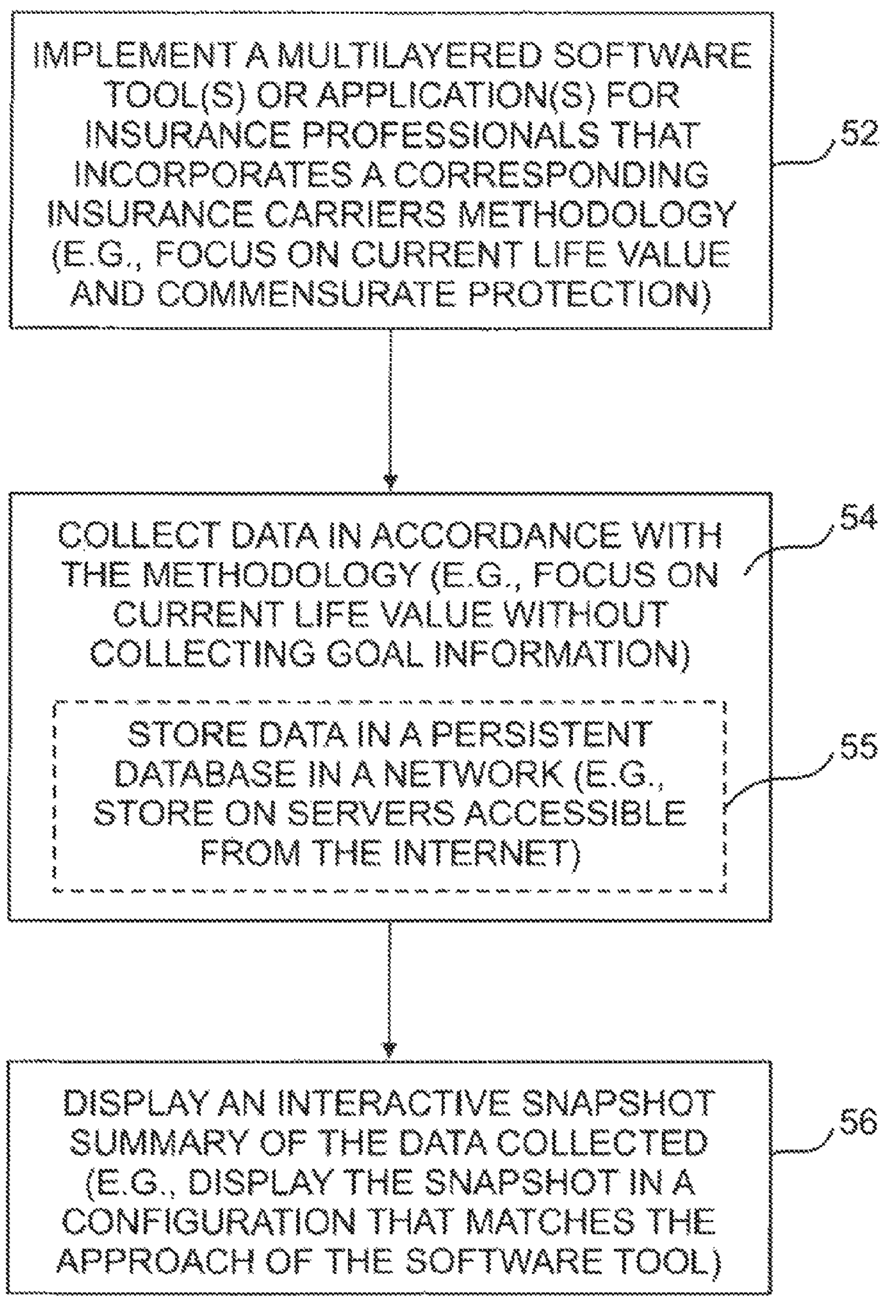
FIG. 5 is a flow chart for implementing a multi-layered software and tool in accordance with one embodiment of the invention.

With reference now to FIG. 5, at step 52, a multi-layered software tool(s) or application(s) for insurance professionals is implemented that incorporates a corresponding insurance carriers methodology. The methodology may in particular be that in which the focus is on the life value or current life value of an individual and providing commensurate insurance protection. For example, the evaluation of an individual's insurance protection would be based on whether the protection is commensurate with the individual's current financial value (e.g., what would be required, taking into consideration the future wages and year of retirement of an individual, to provide the same financial picture for the individual's family). Such an approach preferably does not take into consideration the individuals goals or objectives such as goals with respect to financial condition, savings, or investment goals, which are future term activity which may not be germane to better understanding the current financial picture of that individual. A benefit of providing a multi-layered software tool or application is that it provides a convenient interface for the insurance professional to implement the many different but related functions that an insurance carrier would need for business operations. Thus, for example, issues that often times arise with respect to interoperability of applications and inheritance of persistent data from one application to another can be automatically solved.

At step 54, the software tool(s) or application(s) is implemented to collect data in accordance with the methodology (e.g., focus on current life value without collecting financial or investment goal information). For example, the software tool may provide insurance professionals with a data entry section specifically configured to match the insurance carrier's methodology. The data collection can for example have a sequence that matches the methodology. The data collection can for example focus on the current life value of the individual without collecting or prompting for information on investment needs, educational funding for children, etc. A look and feel through colors can be implemented to match the methodology. Step 54 may include step 55. At step 55, the collected data is stored in a persistent database in a network that is accessible by the insurance professionals. For example, the information can be collected by way of computer input by an insurance agent at an agent's computer and stored on a server that is accessible from the Internet using the multilayered software tool or application.

At step 56, an interactive snapshot summary of the financial and insurance information of the individual collected at step 54 or aggregated is displayed. The snap shot display can be structured for example to display the snapshot in a configuration that matches the methodology of the software. For example, the information can be displayed in a single page in a hierarchy that matches the methodology. In addition, color schemes can be used to provide the display to be intuitive in connection with the methodology and the configuration of the software. The feature can be interactive in that items of information displayed in the snapshot can be selected to display underlying information with respect to the selected information.

Figure 6:
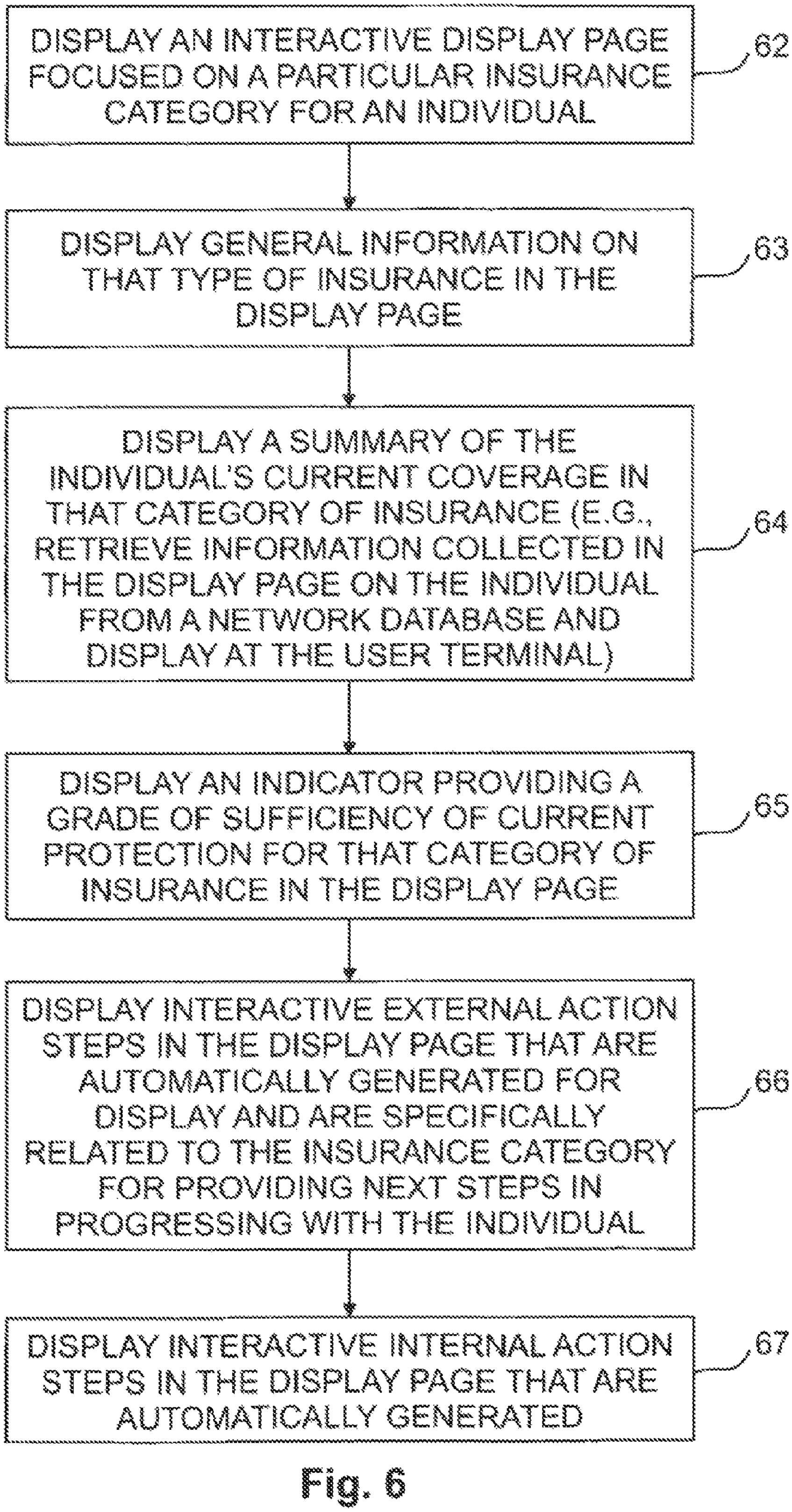
FIG. 6 is a flow chart for providing client and insurance category focused display pages in accordance with one embodiment of the invention.

A component of the software application can be an interactive insurance information display page that is specific to an individual. Illustrative steps involved in providing such a software feature are shown in FIG. 6. At step 62, an interactive display page is displayed that is focused on a particular insurance category (e.g., life, disability, etc.) for an individual. At step 63, general information on that type of insurance is displayed in the display page (e.g., so as to occupy one section of the display page that is dedicated to such information). At step 64, a summary of the individual's current insurance coverage in that category is displayed in the display page (e.g., so as to occupy one section of the display page that is dedicated to such information). Step 64 can involve retrieving information that was previously collected on the individual from a network database and displaying the information at the user terminal. Alternatively, the information can be stored or cached locally.

At step 65, an indicator is displayed that provides a grade of sufficiency for the current insurance coverage of the individual for the insurance category (e.g., so as to occupy one section of the display page that is dedicated to such information). The indicator is displayed in the display page to provide convenient sufficiency indicator to the viewer. The grade that is assigned can be subjective or objective. For example, the grade may be selected by the insurance agent after reviewing the individuals insurance information or if desired, can be automatically selected based on an algorithm that compares the individual's information to a database of insurance information to perform an evaluation. The indicator can be set from the interactive insurance display page or from a different page as a precursor to generating the interactive insurance display page.

At step 66, interactive action steps that are related to external tasks are automatically generated and displayed (e.g., so as to occupy one section of the display page that is dedicated to such information). The action steps are specifically related to the insurance category of the current interactive display page. The action steps are preferably a list of steps suggested for interaction with the client in connection with current insurance category. For example, a database can be implemented that would store sets of action items in association with different insurance categories. Each set would be configured to cover the steps needed to, for example, gather, analyze, or consider relevant information in connection with a particular insurance category with respect to a client. This would provide a tool for an insurance agent such that an automatic list can be generated and tracked for each client. If implemented as a network application, the list can be automatically updated without the need for periodic upgrades such that new strategies or legal requirements can be compiled and addressed with the database of action steps. The external action steps can provide intuitive next steps but can also be implemented as a comprehensive list of actions for the insurance agent's consideration. The external action steps relate to activities that the client needs to perform with an insurance agent, some other client representative or acquaintance, or individually. The action steps displayed in the display page can be displayed on the basis of some level of intelligence or filtering. For example, steps that were selected and marked as being completed are preferably not displayed again when an insurance agent returns to the same page. Thus, the action steps can reflect the state of interaction or progress with respect to a particular client. The information can be persistent. Therefore, an insurance professional would not need to personally track progress or what has been covered with each client. The software automatically provides such functionality and allows the insurance professional to pick up where he or she left off with each client. In addition, filtering based on the information collected on a client can be implemented such as to not display action items that are not applicable to the client (e.g., if the client does not have children, certain action steps may not be applicable and should not be displayed).

At step 67, interactive internal action steps are automatically generated and displayed (e.g., so as to occupy one section of the display page that is dedicated to such information). Internal action steps are actions that are suggested to the insurance professional to be performed in the software application. The internal action steps are specifically related to the insurance category of the current interactive display page. For example, a database can be implemented that would store sets of internal action items in association with different insurance categories. Each set would be configured to cover the steps needed to support the insurance agent to market the current insurance category (the displayed insurance category) or to market other products. This would provide a tool for an insurance agent such that an automatic list can be generated and tracked for each client. If implemented as a network application, the list can be automatically updated without the need for periodic upgrades of a resident application such that new strategies or legal requirements can be complied with in the database of internal action steps. The internal action steps can provide intuitive next steps but can also be implemented as a comprehensive list of actions for the insurance agent's consideration. The internal action steps displayed in the display page can be displayed on the basis of some level of intelligence or filtering. For example, steps that were selected and marked as being completed are preferably not displayed again when an insurance agent returns to the same page. Thus, the action steps can reflect the state of interaction or progress with respect to a particular client. The information can be persistent. Therefore, an insurance professional would not need to personally track progress or what has been covered with each client. The software tool automatically provides such functionality and allows the insurance professional to pick up where he or she left off for each client. In addition, filtering based on the information collected on a client can be implemented such as to not display internal action items that are not applicable to the client (e.g., if the client does not have children, certain action steps may not be applicable and should not be displayed).

By implementing an interactive display page for a particular insurance category that includes a general information section, client summary section, grade indicator, external action steps, and internal action steps, a software tool can be provided that integrates information, organizational needs, client specific data, and a grade indicators together as a convenient tool for quickly viewing information and status with respect to a client for a particular insurance category and to generate a report on the basis of the information.

Figure 7:
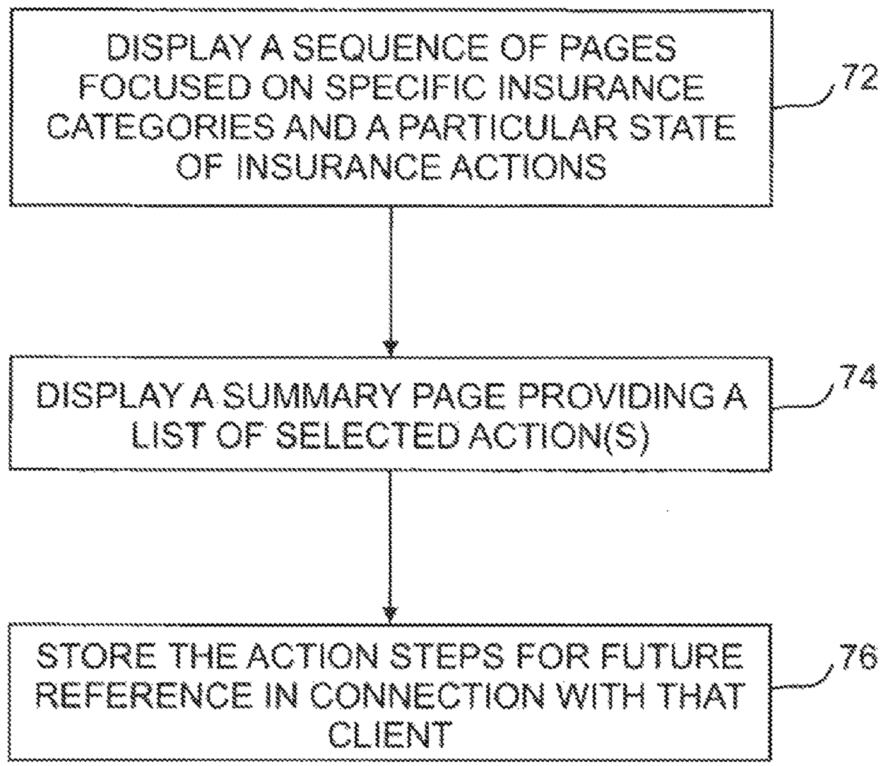
FIG. 7 is a flow chart of a software tool in accordance with one embodiment of the invention.

Interactive insurance display pages can be implemented to provide a particular software tool. For example, a sequential methodology can be implemented such that the pages for different insurance categories can be implemented to be displayed in sequence and automatically summarized at the end of the sequence. For example, with reference now to FIG. 7, a sequence of interactive insurance display pages that are each focused on a specific insurance category and include action steps that reflect the state of interactions with a corresponding or with the application with respect to a particular client (e.g., such as that illustratively described in connection with FIG. 6) can be displayed. At step 74, an interactive summary page is displayed that provides a list of selected action steps. Thus, the summary page can display a compilation of the actions selected in each interactive insurance display page as a summary of selected actions to be completed. At step 74, the action steps can be selectable so as to allow the user to reconsider a selected items to remove that step from the list. At step 76, information with respect to the action steps (e.g., which ones selected or not selected) are stored for future reference in connection with that client (e.g., to reflect the status of work with that client).

Figure 8:
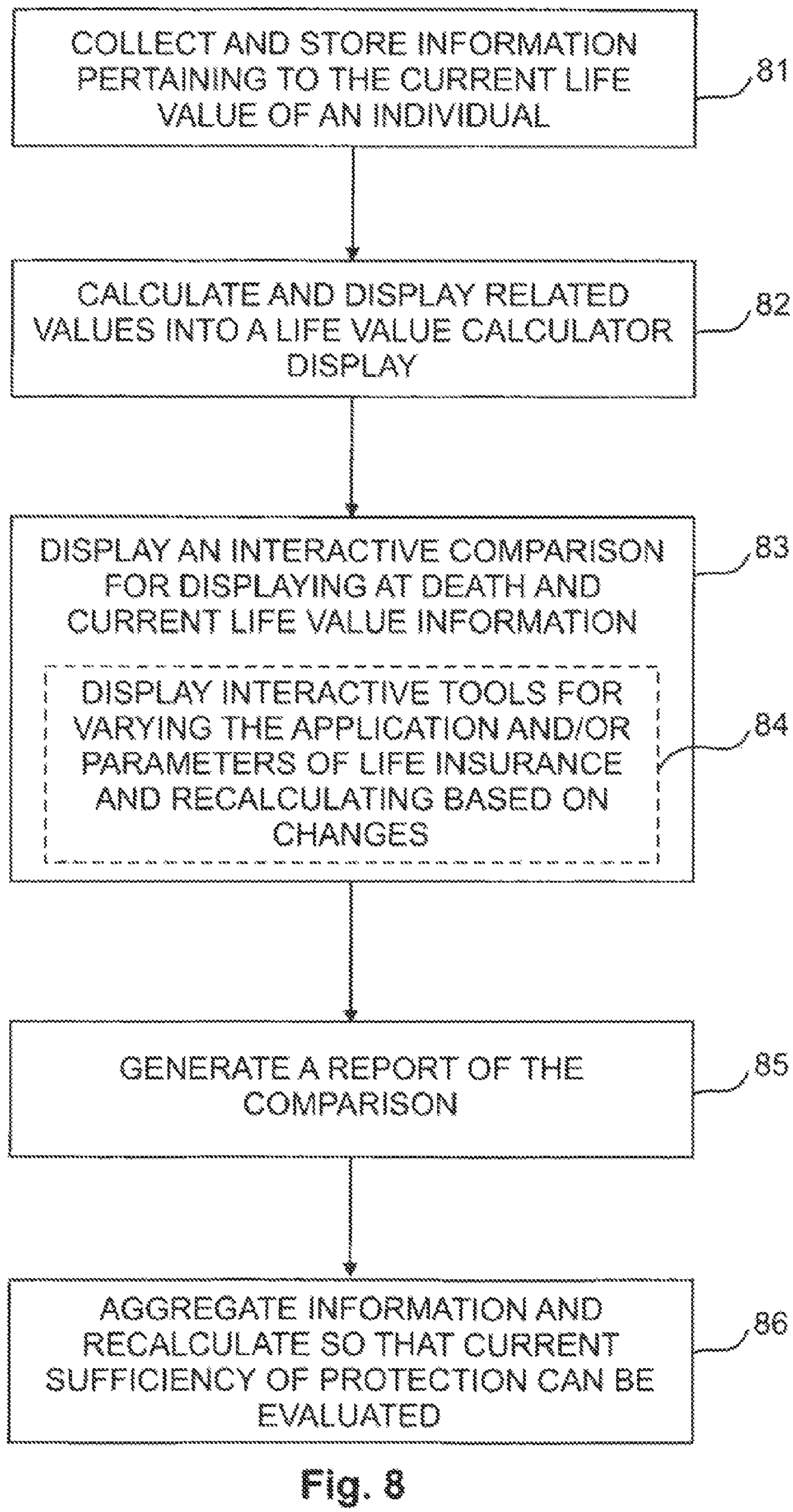
FIG. 8 is a flow chart directed to a life value tool in accordance with one embodiment of the invention.

A current value snapshot feature can be specifically implemented for life insurance. For example, with reference now to FIG. 8, at step 81, information pertaining to the current life value of an individual can be collected and stored. At step 82, the software, calculates values relating to the current life value based on the collected information and displays the values in an interactive life value calculator display page. At step 83, an interactive comparison for illustrating the at death and the current life value related information of a particular individual are displayed in the interactive life value calculator display page based in the information that was inputted and calculated. Step 83 may include step 84, which is implemented to allow for user variation of the displayed values to vary the snapshot. At step 84, interactive tools for varying the application and/or parameters of life insurance are displayed and recalculated based on the changes. At step 85, a report option can be included as part of the page for generating a report of the current comparison information. At step 86, an aggregation feature can be used to update and recalculate relevant values so that the current sufficiency of the client's life insurance protection can be periodically evaluated. In one particular embodiment, this feature is part of a network application in which recalculation would require communications to and from a server to redisplay the information. In other words, relevant signals and data are transmitted to a server that calculates and returns the relevant results.

Figure 9:
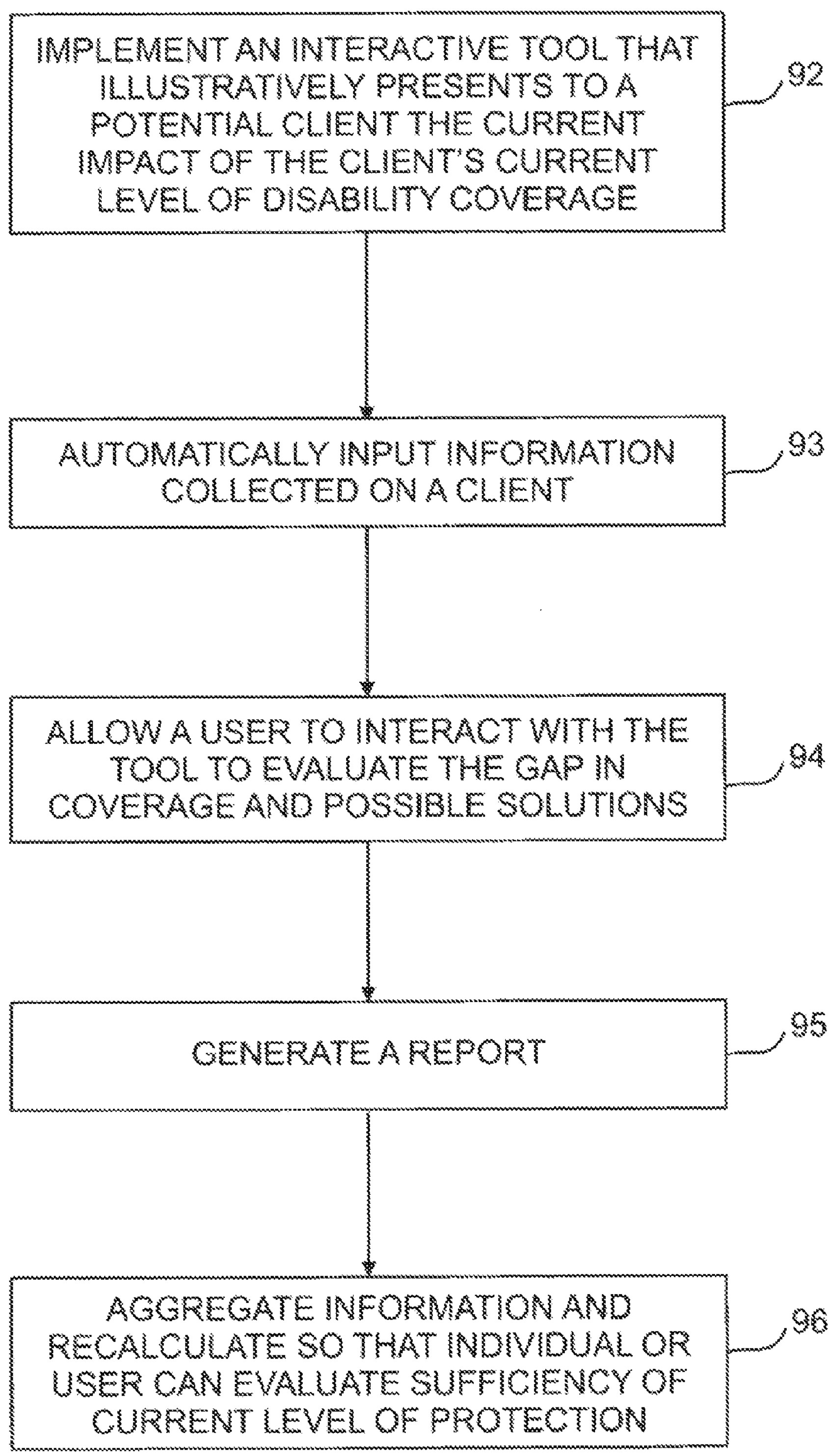
FIG. 9 is a flow chart directed to a disability value tool in accordance with one embodiment of the invention.

A similar feature can be provided for other insurance categories such as disability. Illustrative steps involved in implementing such a feature for disability insurance is shown in FIG. 9. At step 92, an interactive tool is implemented that illustratively presents to a potential client or a software user, the current impact of the client's current level of disability coverage. At step 93, information that was collected from the client are automatically collected and input for use in the insurance disability coverage evaluation. At step 94, a user (e.g., an insurance agent) is allowed to interact with the tool to evaluate whether a gap in the client's disability insurance coverage exists and to interact with the tool to suggest possible solutions (e.g., impact of different coverage). At step 95, a report may be generated that comprises the information displayed with respect to the client' disability coverage. At step 96, an aggregation feature can be implemented so that client information can be updated and the disability coverage and related financial data can be recalculated and displayed to allow for an evaluation of the sufficiency of the current level of protection.

Figure 10:
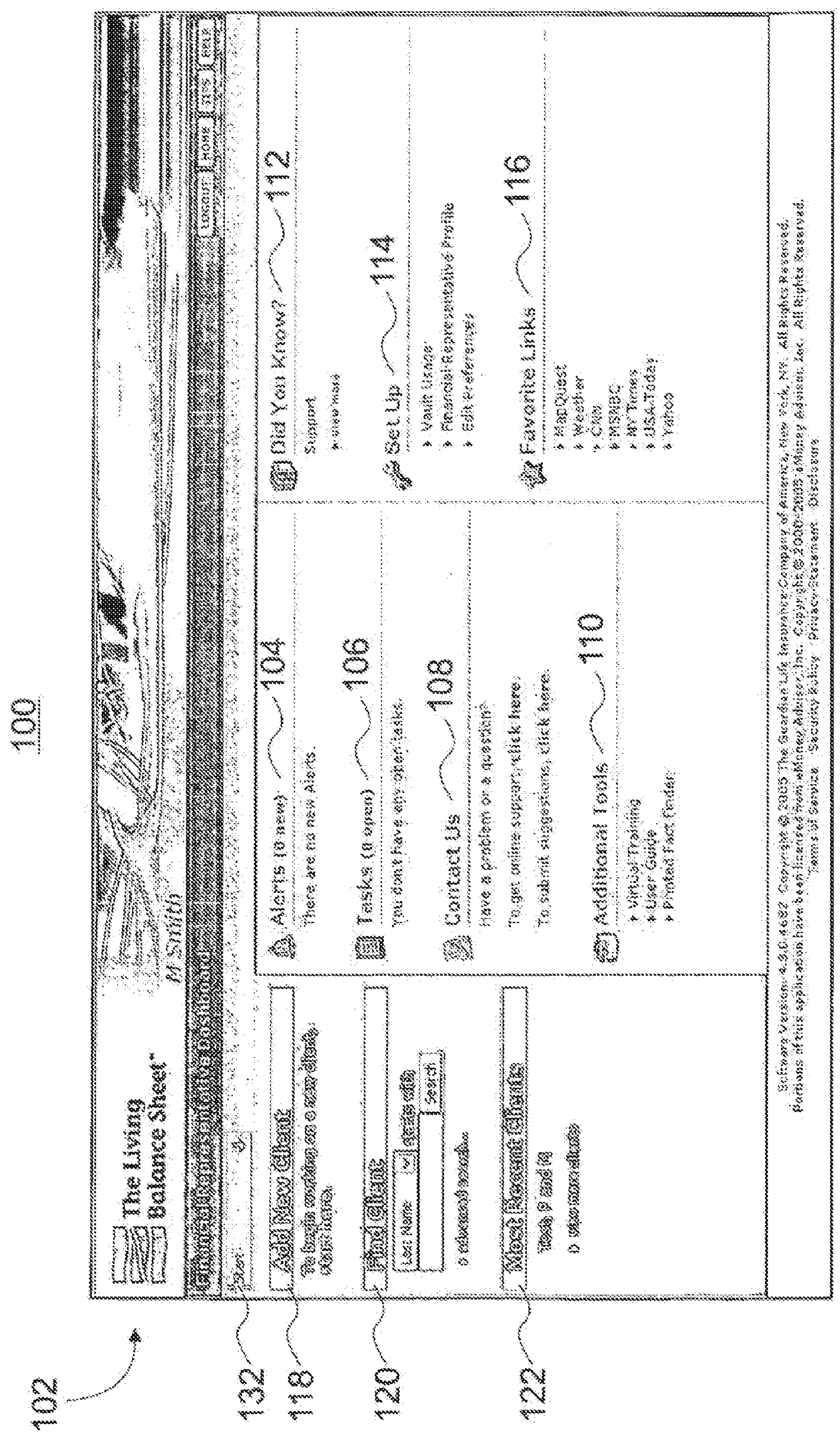
FIGS. 10 to 265 are diagrams of illustrative display pages for implementing interactive methods and systems for insurance related activities in accordance with embodiments of the invention.
Figure 203:
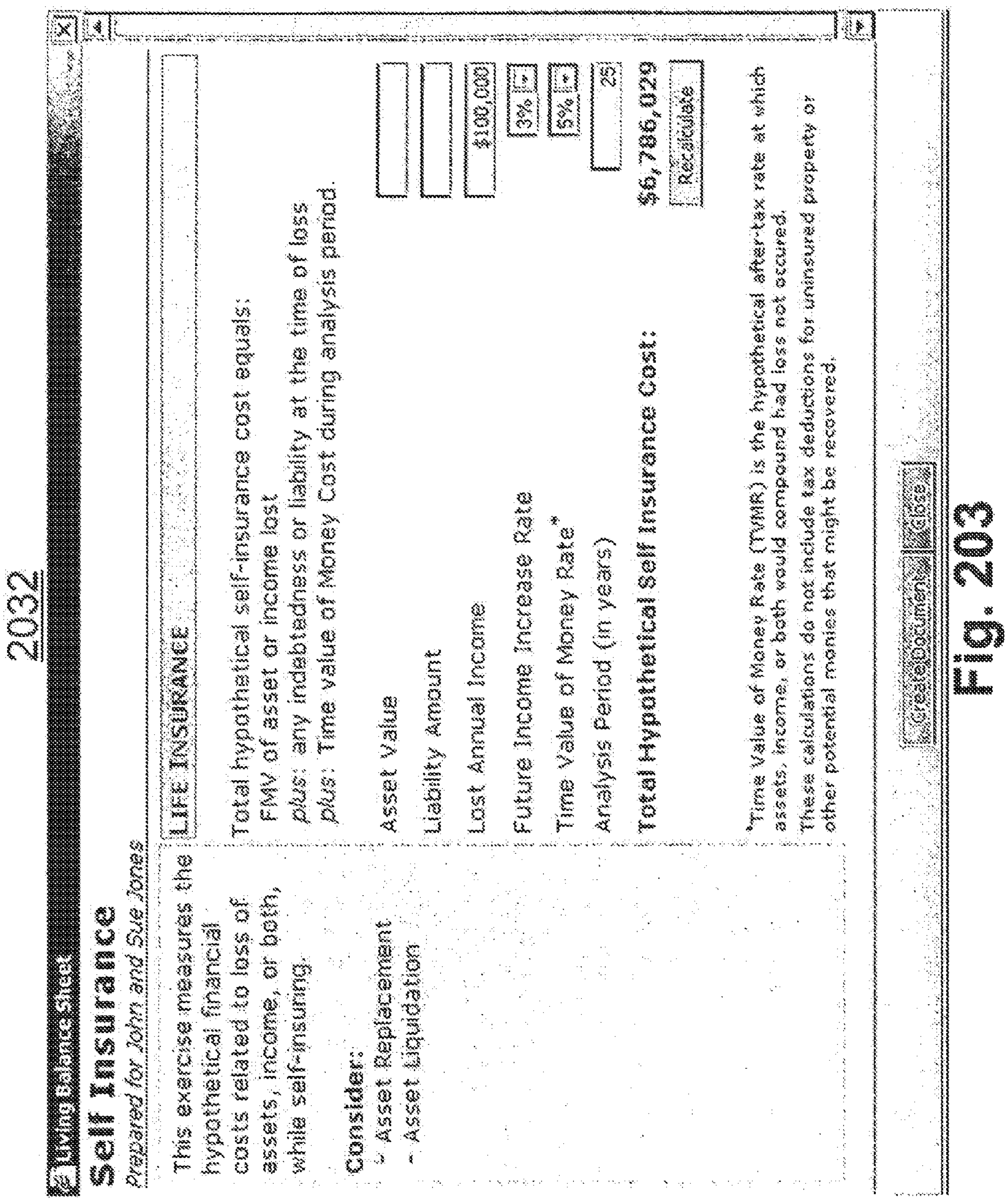

FIGS. 10 to 203 show illustrative display pages for implementing interactive methods and systems for insurance related activities in accordance with embodiments of the invention such as to, for example, implement the illustrative steps and processes described in FIGS. 2-9.

FIG. 10 is a diagram of an illustrative financial representative dashboard display page 100. Display page 100 can be displayed after a user, which is commonly an insurance agent, is authenticated (e.g., using an ID and password). Display page 100 includes a banner 102 that displays text identifying the current user and a branding component. Display page 100 is preferably the initial display page that is presented to a user when the user logs into the software. Display page 100 includes alerts section 104, tasks section 106, "contact us" section 108, additional tools section 110, did you know section 112, setup section 114, and favorite links section 116.

Display page 100 also includes add new client section 118, find client section 120, most recent clients section 122, and start section 132.

Add new client section 118 preferably includes a link or button that is used to access an add-new-client feature. Find client section 120 preferably includes functionality to identify a client for which information was previously stored. This feature, for example, allows an agent to quickly find and access the information of a client. Find client section 120 can include a search functionality such as to allow the user to search client information based on parameters such as last name, first name, or other search criteria. Most recent clients section 122 is preferably a tool that allows a user to pull up a recently viewed client.

Alerts section 104 displays the user's alerts that were triggered based on some preset parameter. The alerts can be client specific. Tasks section 106 displays any open tasks of the user. Contact us section 108 provides links to customer or technical support. Additional tools section 110 includes selectable links for additional tools that the user may require such as a user guide, virtual training, and a fact finder. Did you know section 112 displays links and information that are related to supporting the user in using the site (e.g., technical and/or educational support). Setup section 114 can include links for the user to customize or setup the software to the user's preferences or needs. Setup section 114 includes a vault usage link (for viewing information on client vault usage), a financial representative profile link (for displaying and updating the user's profile information), and edit preferences link (for selecting software preferences of the user). Favorites link 116 contains links to various external websites.

Figure 11:
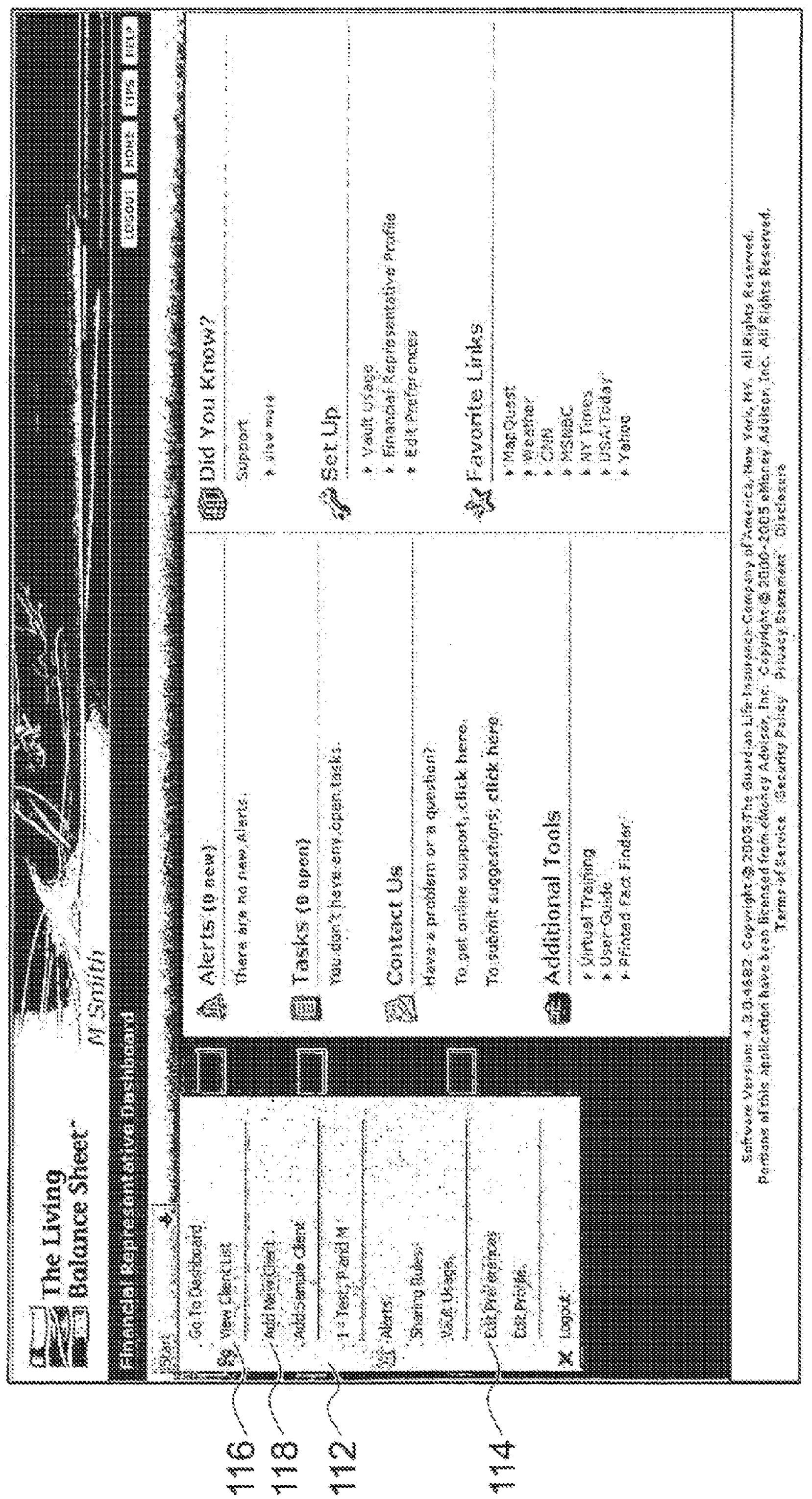
Figure 12:
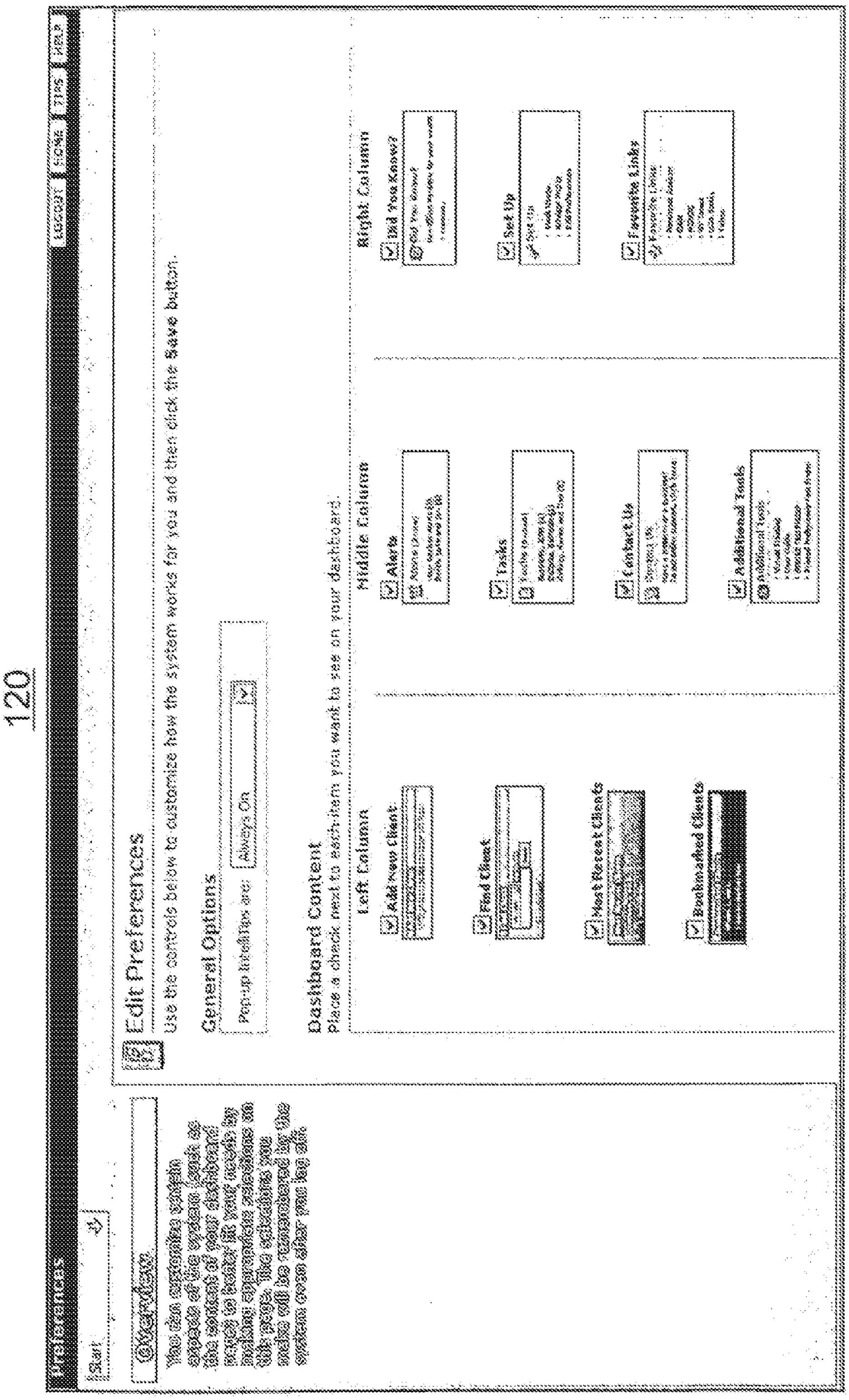
Figure 13:
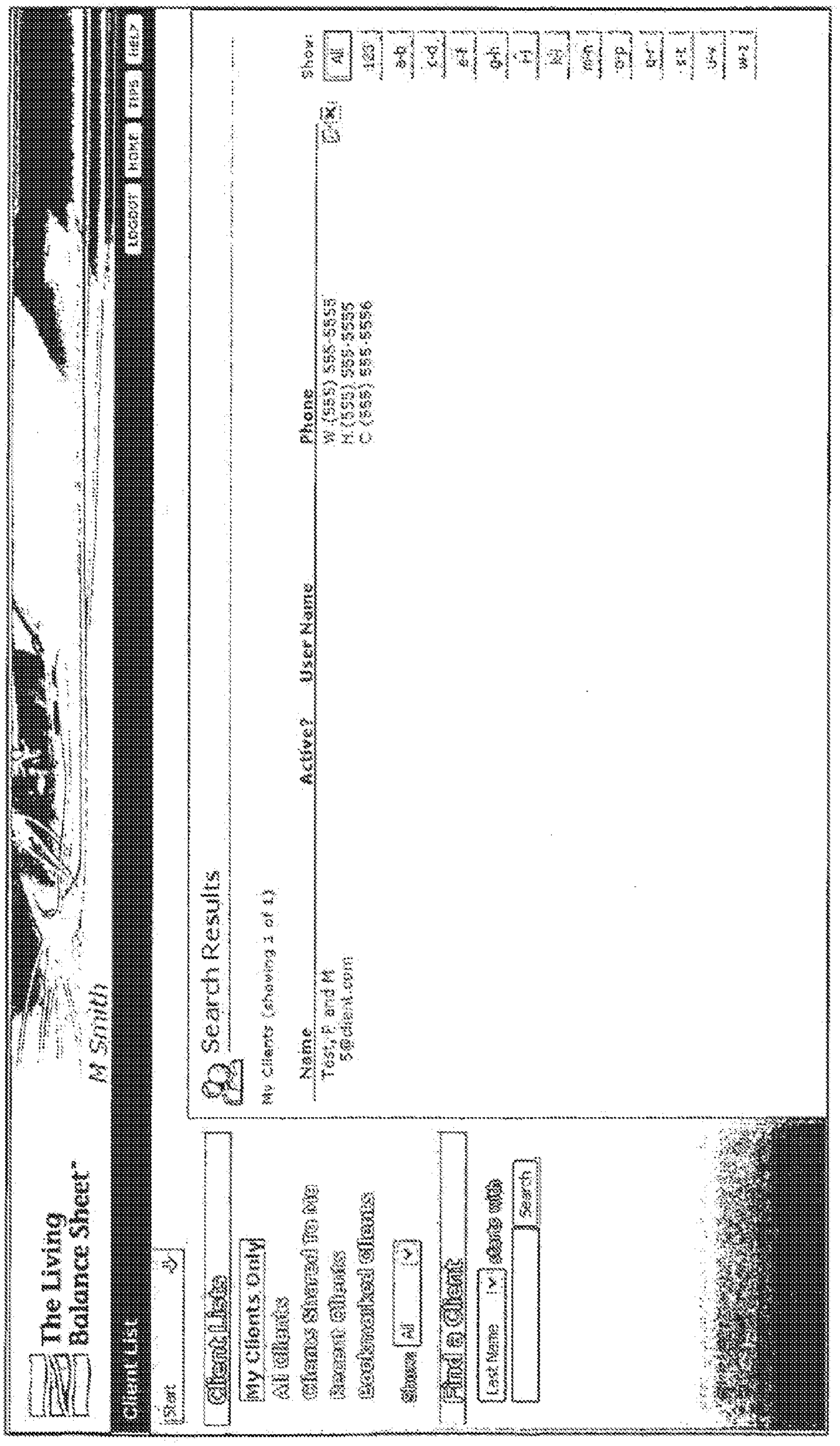

Start section 132 can be a pull-down menu that users can access to navigate within the software. As shown in FIG. 11, start pull-down menu 112 can include various options, such as, go to dashboard, view client lists, add new client, most recent client section, alerts, sharing rules, vault usage, edit preferences, edit profile, and logout. By selecting, for example, edit preferences option 114, an edit preferences display page can be displayed such as that illustratively displayed in FIG. 12. Edit preferences display page 120 contains various options for personalizing the software to the user's preferences. For example, as shown, the user can select the dashboard content by selecting corresponding check boxes associated with possible sections that can be displayed in the dashboard. Display page 120 can also allow for setting other preferences such as to select whether automatically displayed context sensitive tips are to be always active when the user is navigating within the software. Another displayed option in start pull-down menu 112 of FIG. 11 is view client list option 116. Client list display page 130 of FIG. 13 can be displayed when view client list 116 of FIG. 11 is selected. Client list display page 130 displays a list of the user's clients. If desired, the software can be configured to not only display a list of the current user's clients but also additional clients based on selected criteria. For example, display page 130 can include a my clients only option (to limit the client list to the user's clients), an all clients option (to display all clients available), a clients shared to me option (to display clients that other users have decided to share with the current user), a recent clients options (to display recently added clients or clients for which the user recently modified or added their personal information), and bookmarked clients options (to display a list of clients that the user bookmarked for quick reference).

Figure 14:
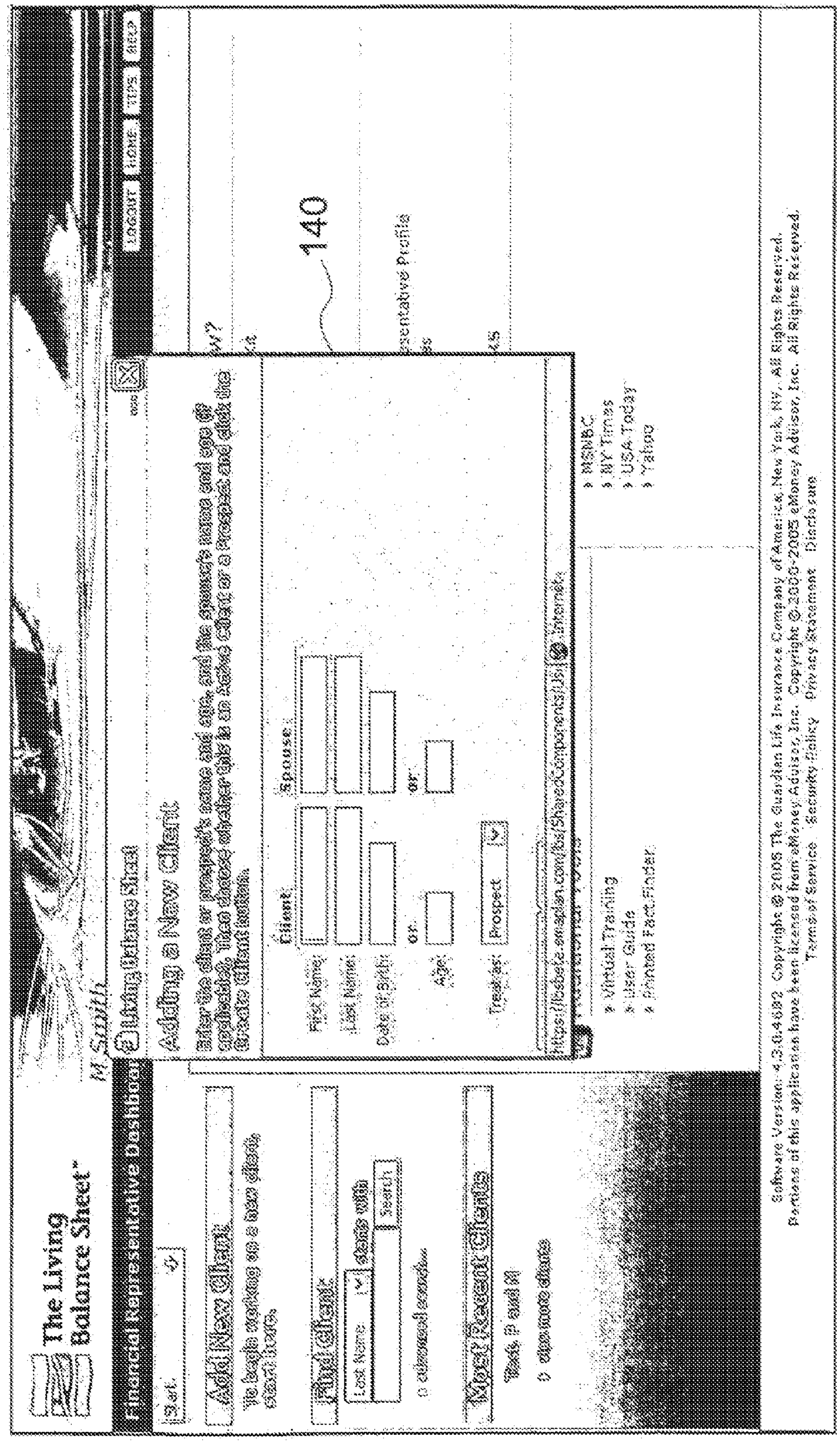

From start pull-down menu 112 of FIG. 11, add new client option 118 can be selected. In response, add new client window 140 of FIG. 14 can be displayed. Window 140 contains data entry field for entering the name, date of birth (or age) of the client and spouse (if any). Window 140 also includes an option to allow the user to identify the client as a prospect or an active client. Window 140 may include a button for the user to submit the new client information. In response, a Workflow Wizard® mode can be triggered. If desired, the Workflow Wizard® mode can also be entered using other techniques such as by way of the start pull-down menu 112 of FIG. 11.

Figure 15:
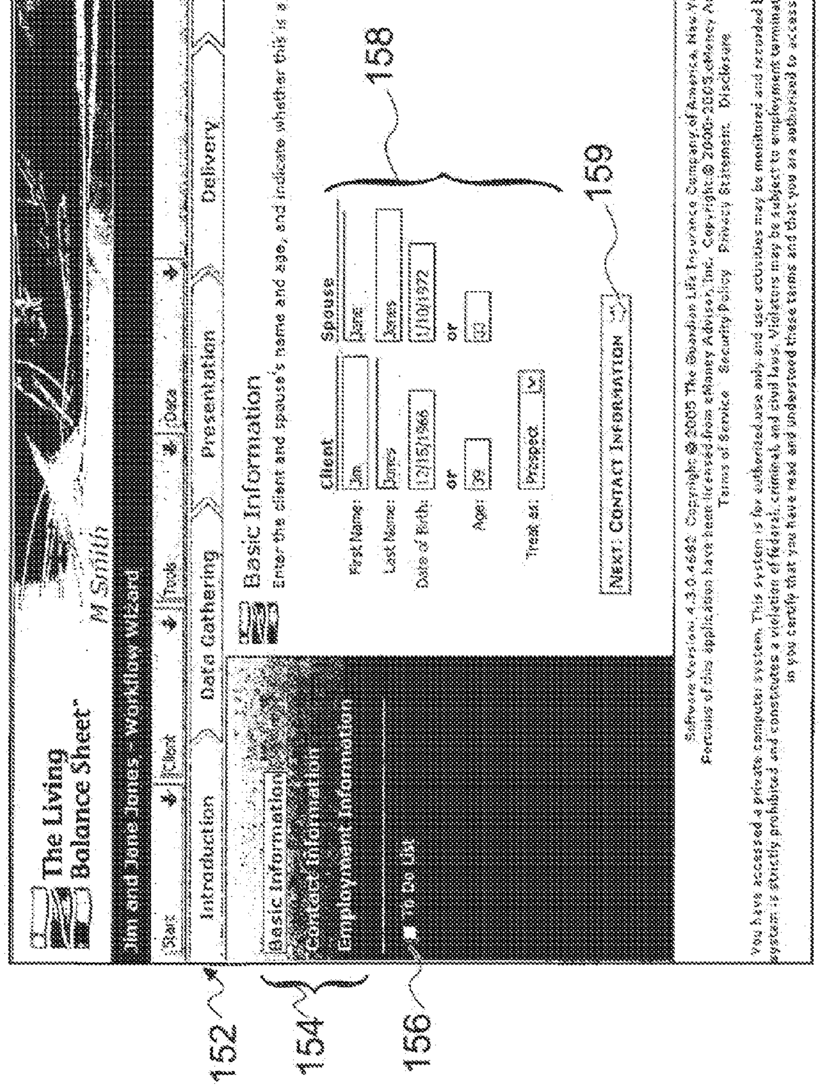

FIG. 15 shows an illustrative basic information display page 150, which can be an initial page in the Workflow Wizard® mode. Basic information display page 150 includes Workflow Wizard® navigation tools 152 and 154. Workflow stage navigation tool 152 displays the text identifying the stages of the Workflow Wizard®, which are introduction, data gathering, presentation, and delivery. The information is displayed within arrows to indicate the sequence of the stages. The current stage is highlighted to indicate the user's current position within the stages. As shown in FIG. 15, the user is currently in the introduction stage. Introduction navigation tools 154 display navigation links for sections within the introduction stage. A user can, for example, "click" on Employment Information to move forward to that section. Alternatively, the user can select next button 159 to move or to sequentially move to the next section in the Workflow Wizard®. The automatic sequence provides a convenient and efficient tool for users to interact with the software. Basic information section 158 can be automatically populated with information entered in window 140 (of FIG. 14) or could be manually entered or modified when displayed in basic information display page 150. A "to do list" option 156 can also be displayed to allow the user to select a link to access, setup, or modify a to do list (e.g., specifically for the current client). As shown, within introduction navigation tools 154, the user's current position is highlighted (e.g., "basic information" is highlighted) to show the current position of the user within the current stage of the Workflow Wizard®.

Figure 16:
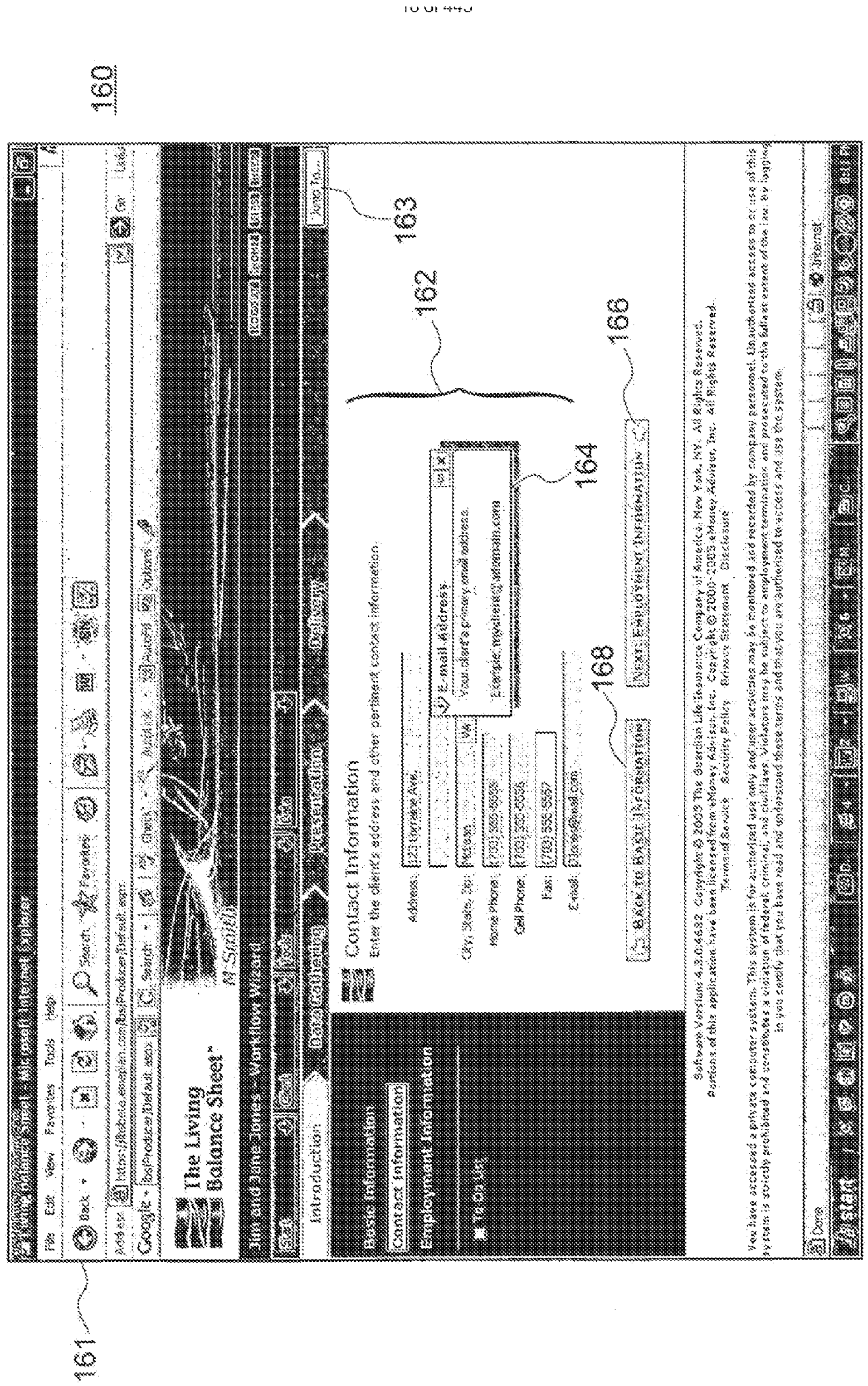

By for example, selecting next 159, the user can move to the next section of the introduction stage. For example as shown in FIG. 16, contact information display page 160 can be displayed. Display page 160 can include contact information section 162 for allowing the user to enter the client contact information. An automatic pop-up tip feature can be implemented for assisting users in interacting with the software. For example, tip 164 is a pop-up window that is displayed over the current display page in close proximity to the user's current data entry field. For example, when the user moves the cursor to the email field to enter the client's e-mail contact, tip 164 can be automatically generated to inform and help the user in entering the e-mail address. The pop-up tip can be generated using java or other appropriate software that permits pop-up windows to dynamically appear (e.g., without using "refresh") in connection with the user's current data entry field. Next button 166 can be used to move to the next section within the current Workflow Wizard® stage. Back button 168 can be used to move to the previous section within the current Workflow Wizard® stage. If desired, the Workflow Wizard® mode can be implemented such that the user cannot use the browser's navigation buttons 161 (e.g., "back") to move within the software. For example, selecting the browser's back button will not cause the previous page to be displayed but rather displays a warning such as the page has expired. As such, the navigation tools, the next and back buttons 166 and 168, and jump to button 163 are preferably used for navigation within the software application. Jump-to button 163 can be selected to display a list of selectable navigation points for jumping to those points using the software. Next and back buttons 166 and 168 can also be buttons for indicating that the user-entered information in a current display page should be saved (e.g., by pressing the next button) or cancelled (e.g., by pressing the back button).

Within the Workflow Wizard®, navigation tools 152 and 154 (of FIG. 15) are preferably a persistent feature of the display pages. As such, when the user leaves the Workflow Wizard® mode, navigation tools 152 and 154 are no longer displayed.

Figure 17:
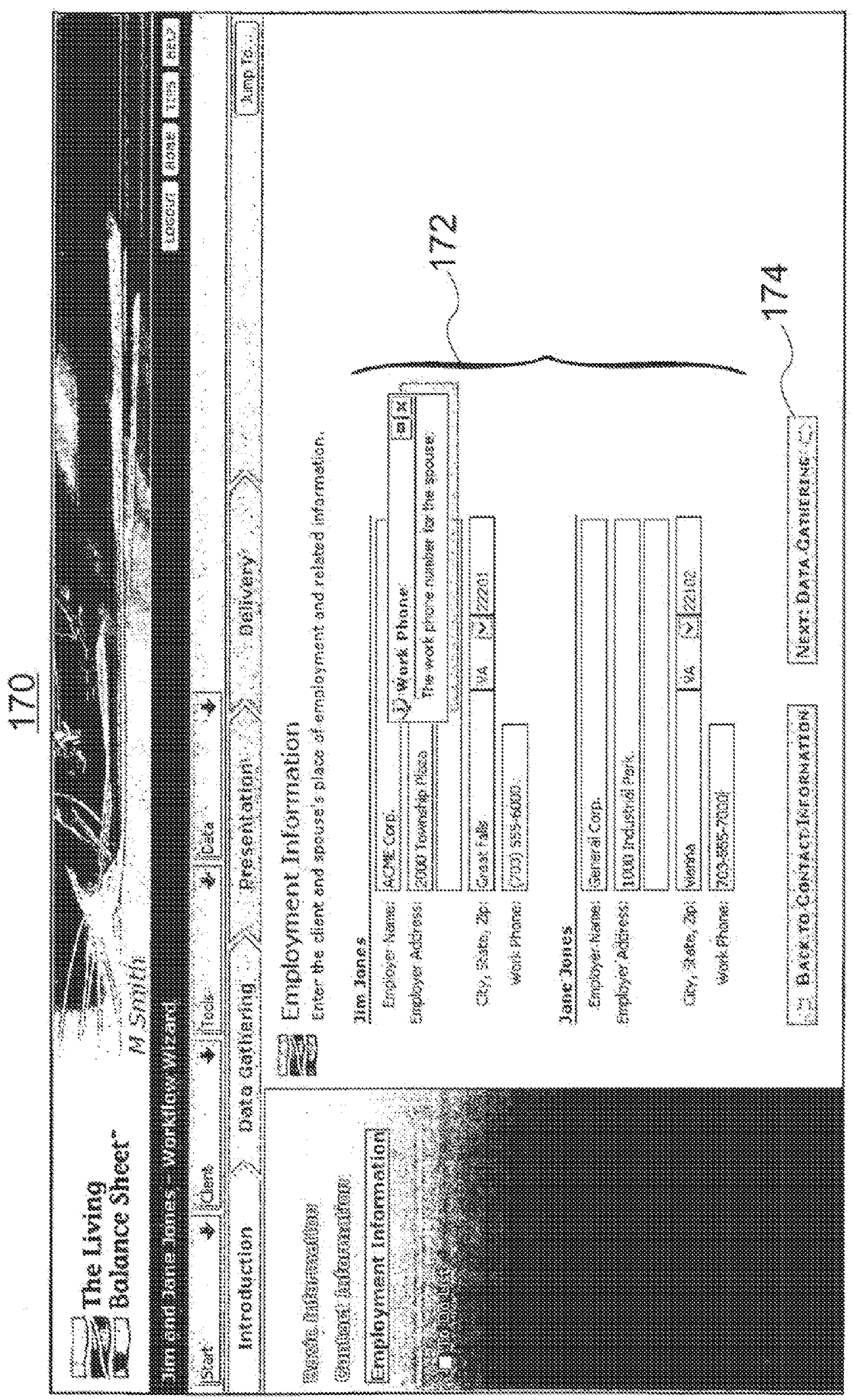

With reference to FIG. 17, employment information display page 170 can be displayed when a user selects next button 166 (of FIG. 16). Employment information display page 170 provides preconfigured data entry fields 172 for the user to enter the client and, if applicable, spousal employment information. Next button 174 can be used to save and display the next section, which in this case will be an initial section in the next stage of the Workflow Wizard®.

Client & spouse basic information display page 180 can be displayed when the user selects next button 174 (of FIG. 17). Display page 180 is a section within the data gathering stage of the Workflow Wizard®. As shown, "data gathering" is now highlighted in the workflow stage navigation tool. Section navigation tool 182 has been updated to display the sections and subsections of the current stage. The current display page is also highlighted. As shown, each subsection link includes an associated color, which is preferably used in a consistent way throughout the software to improve the intuitiveness of the application. For example, subsections within the basic information section are associated with the color grey except for income, which is associated with green. Protection is associated with the color orange. Assets are associated with the color blue. Liabilities are associated with the color red. Cash flow is associated with the color light green.

Figure 18:
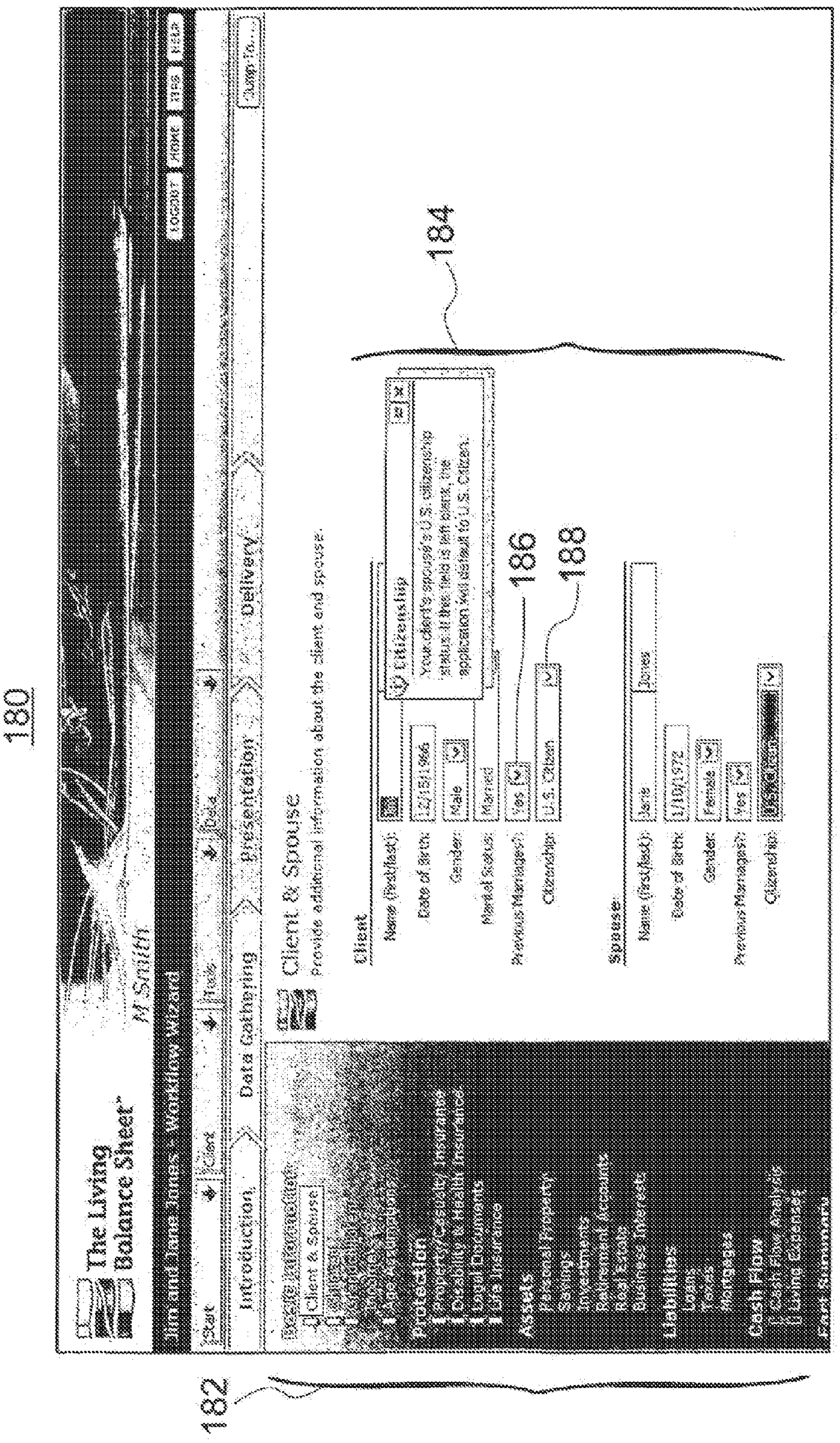
Figure 19:
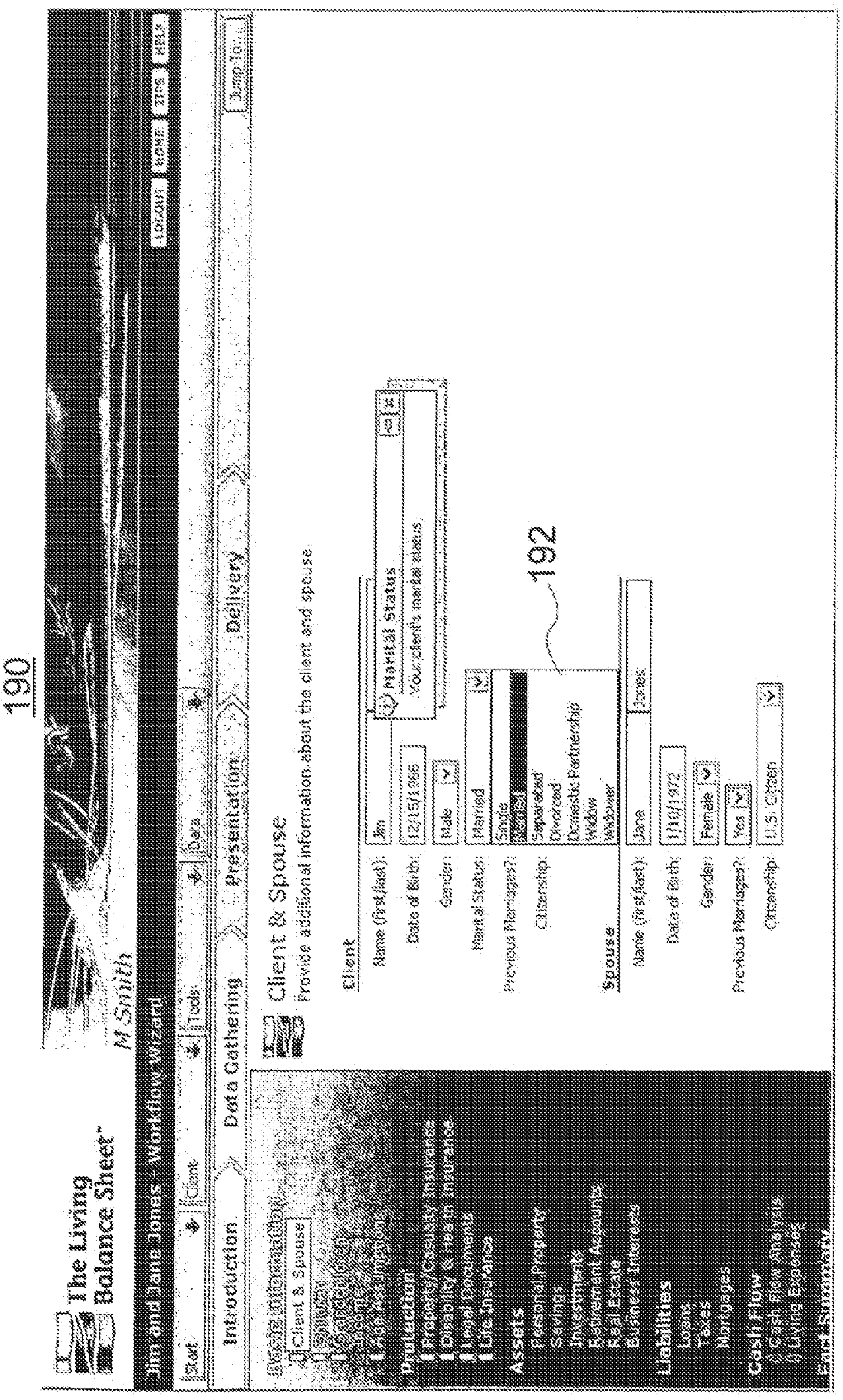

Client & spouse basic information display page 180 is configured to permit the data entry of additional information for the client and spouse. For example, marriage option 192 of FIG. 19 can be displayed that provides options using a pull-down menu to select one of the following: single, married, separated, divorced, domestic partnership, widow, or widower. In display page 180, a next button and cancel button are displayed but are out of view in the illustrations of FIGS. 18 and 19. A user can select the next button to save the data entry and selections made within that page or select the cancel button to cancel the data entry and selections, which are the common mode of operation within the Workflow Wizard® mode. The cancel and save buttons, which are labeled "Cancel: Don't Save Changes" and "Done: Save Changes" are also navigational tools for moving forward and backward within the Workflow Wizard®. The buttons can include arrows to communicate such functionality. Add child display page 200 of FIG. 20 can be displayed when a user selects the next button.

Add child display page 200 provides the user with an opportunity to add a child and related information to the current client information. In addition to the navigation tools, display page 200 can include child details section 202, delete section 204, help section 206 and save and cancel buttons 208 and 210. Child details section 202 can be configured to allow the user to enter child related details such as name, date of birth, gender, special needs, marital status, from pervious marriage, and citizenship. Help section 206 can be automatically displayed to provide instructional information and to educate the user as to the pertinence of the requested information. Delete section 204 preferable provides the user with option to delete the child entry. By selecting that entry, the inclusion of the child in the client's information can be quickly deleted.

Figure 20:
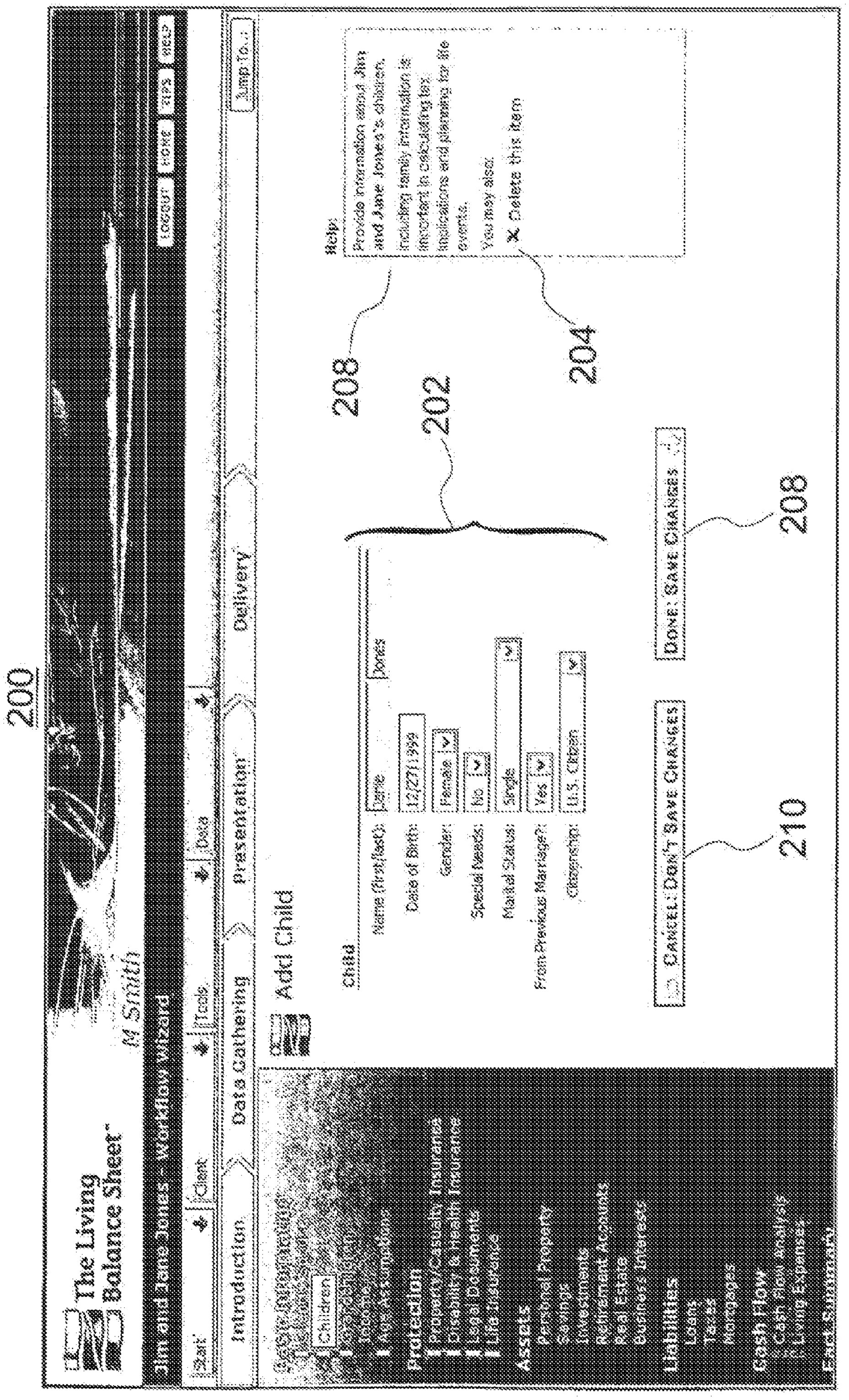
Figure 21:
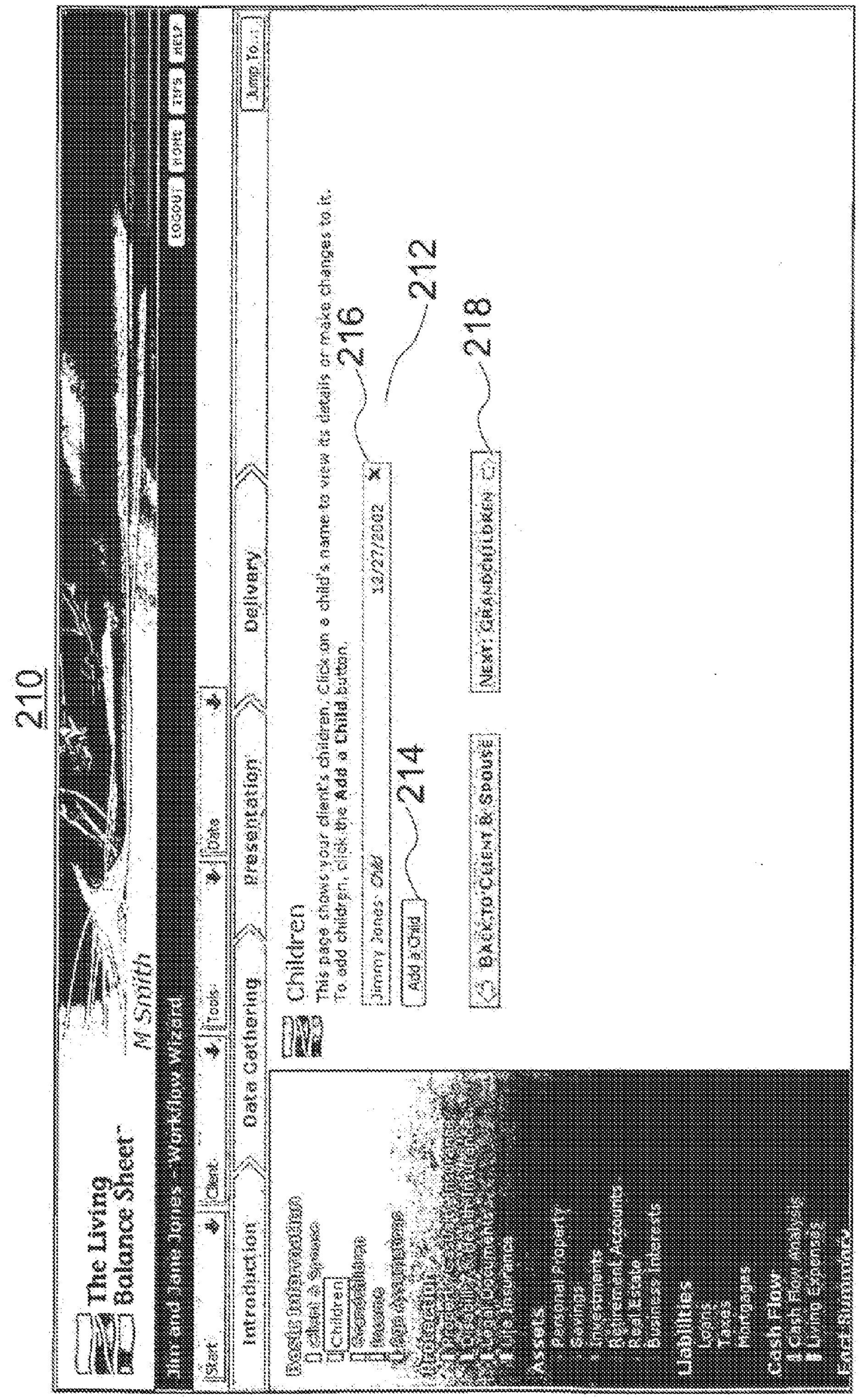

Children display page 210 of FIG. 21 can be displayed when a user selects save button 208 of FIG. 20. Children display page 210 displays children summary section 212 and "add a child" button 214. Children summary section 212 displays a list of selectable items that inform the user of the children associated with the current client including the children's names and date of birth. The items can include delete icon 206 that can be selected (e.g., a mouse click, double click, a combination of click and confirm, etc.) to delete that child from the client's information.

"Add a child" button 214 can be used to add a child and related information for the client (e.g., using add-child display page 200 of FIG. 20).

Figure 22:
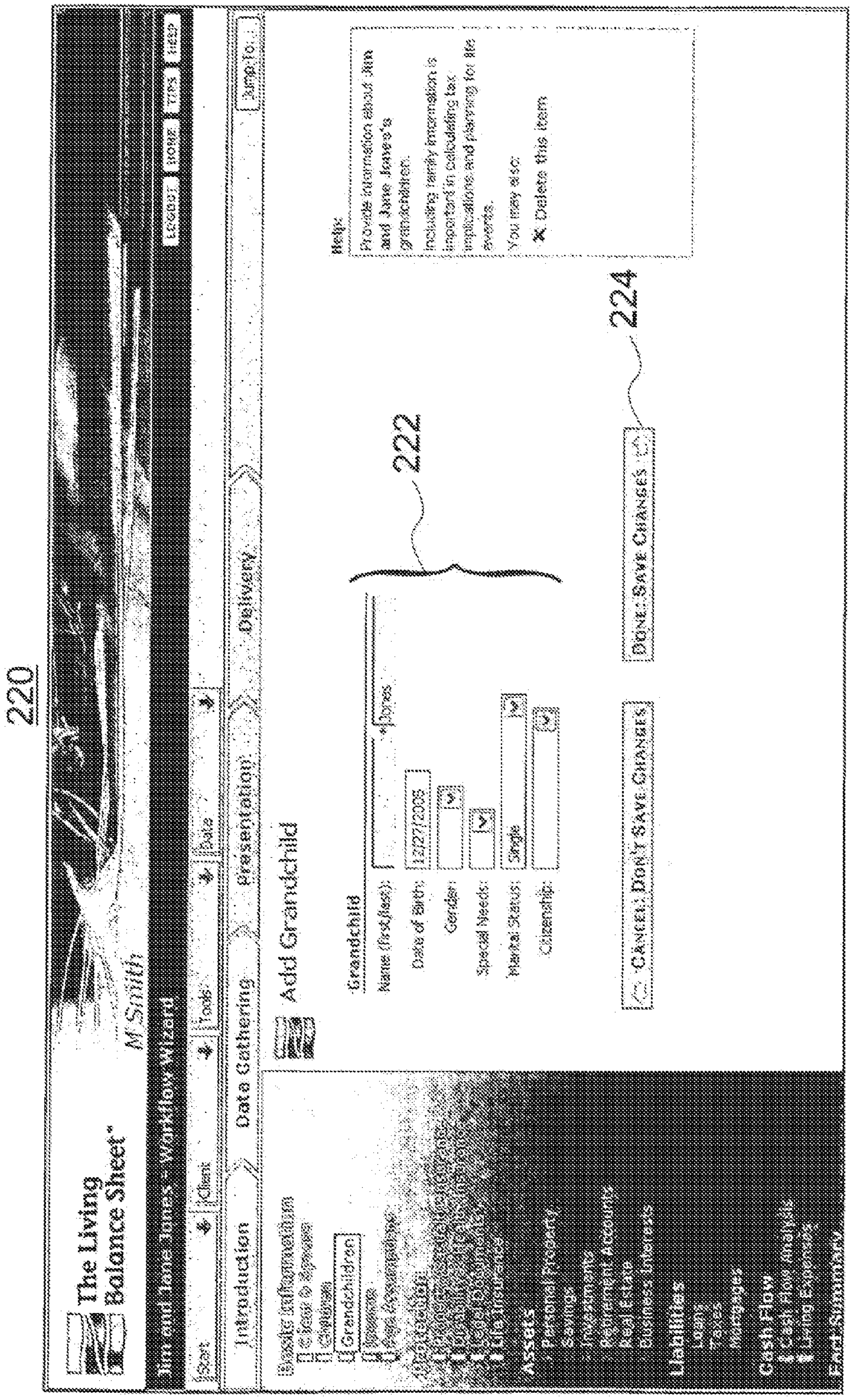
Figure 23:
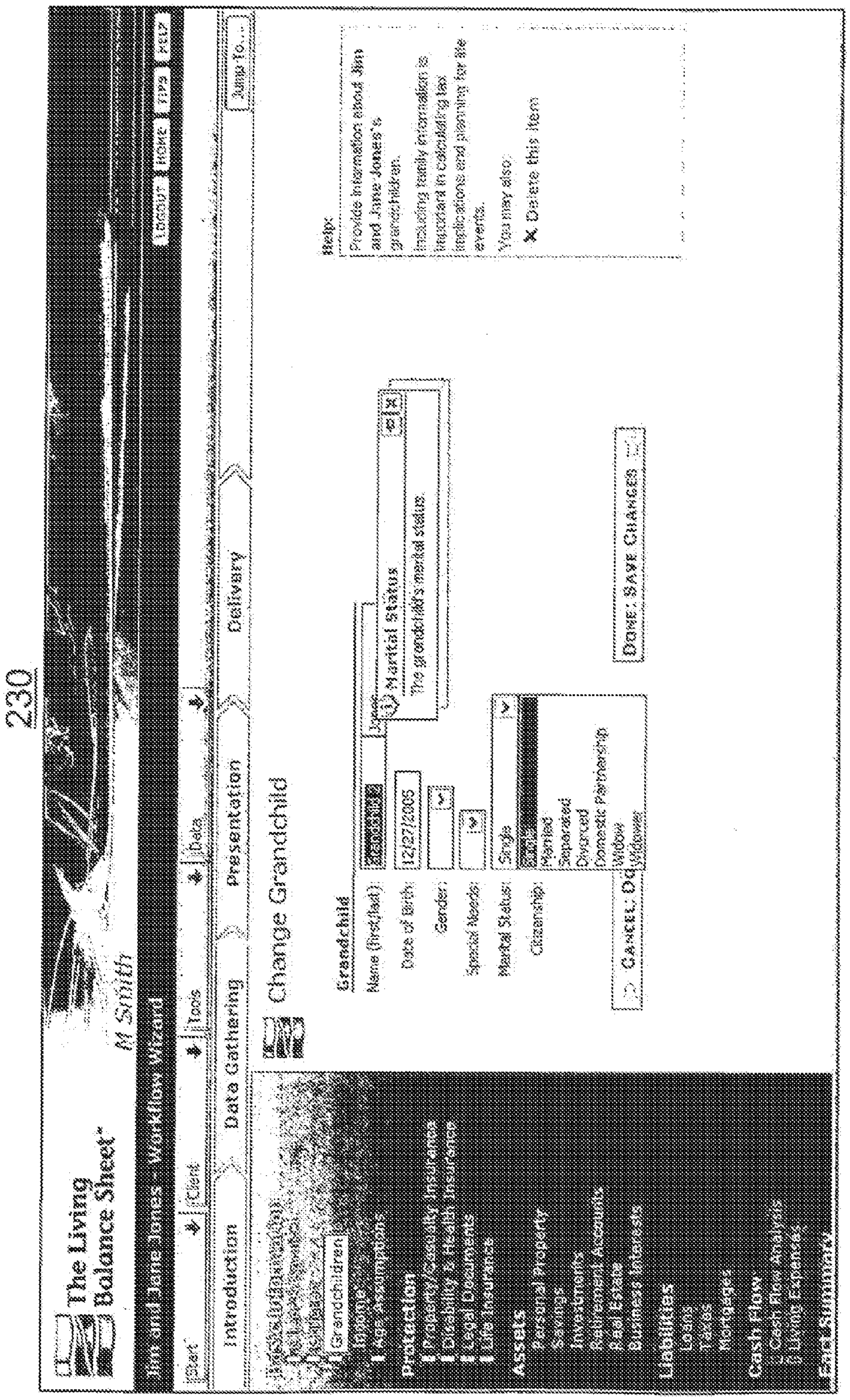

Add grandchild display page 220 of FIG. 22 can be displayed when a user selects next button 218 of FIG. 21. Display page 220 provides the user with the opportunity to add grandchildren information for the client such as to add a grandchild and related grandchild information to the client information. Section 222 can be used for the entry of detailed grandchild information. Add grandchild display page 220 is structured and contains the same functionality as add child display page 200 of FIG. 20, but add grandchild display page 220 is specific to adding a grandchild. After the user enters grandchild information in display page 220 and selects save button 224, a grandchildren summary display page can be displayed having the same structure and functionality as children summary display page 210 of FIG. 21, but the grandchildren summary display page would be specific to the client's grandchildren. If a user selects, a grandchild from the list of grandchildren in the grandchildren display page, change grandchild display page 230 of FIG. 23 can be displayed to allow the user to change or update the information of that grandchild (e.g., display page 230 would have the same functionality as add grandchild display page 220 of FIG. 22 such as to provide an edit function for a grandchild that is already associated with the client). A similar functionality and display page can also be implemented for the client's children.

Figure 24:
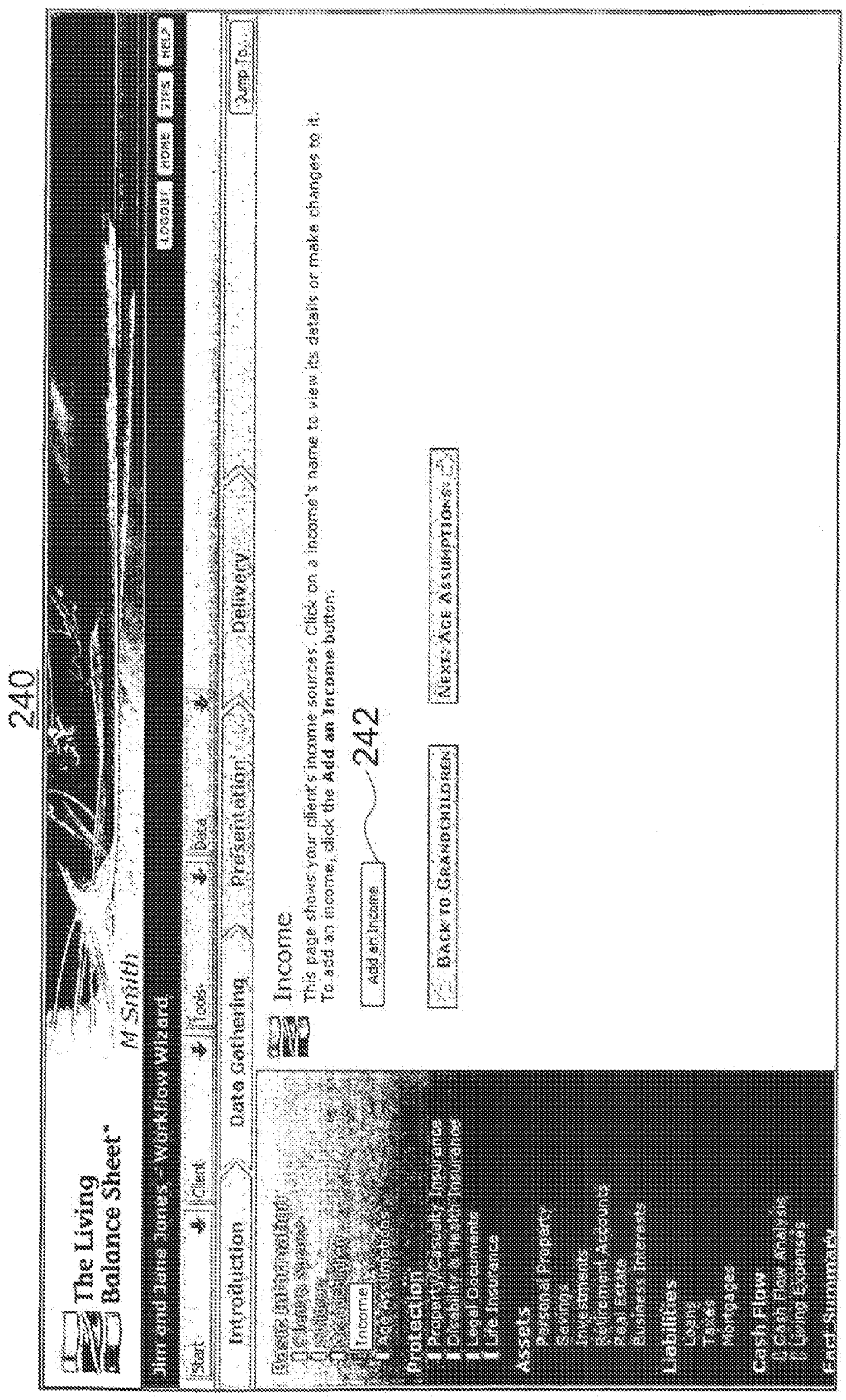

The next subsection can be an income section. For example, as shown in FIG. 24, an income display page 240 can be displayed. An income display page 240 can provide a summary of the income information for the client using a selectable list of income items. If no income information has yet been entered and saved, income display page 240 would reflect that status. Income display page 240, as shown, includes add an income button 242 to enter an income item. Navigation tools can also be displayed to allow the user to move forwards or backwards to different subsections of the Workflow Wizard® (e.g., to skip the current subsection and move to the next subsection).

Figure 25:
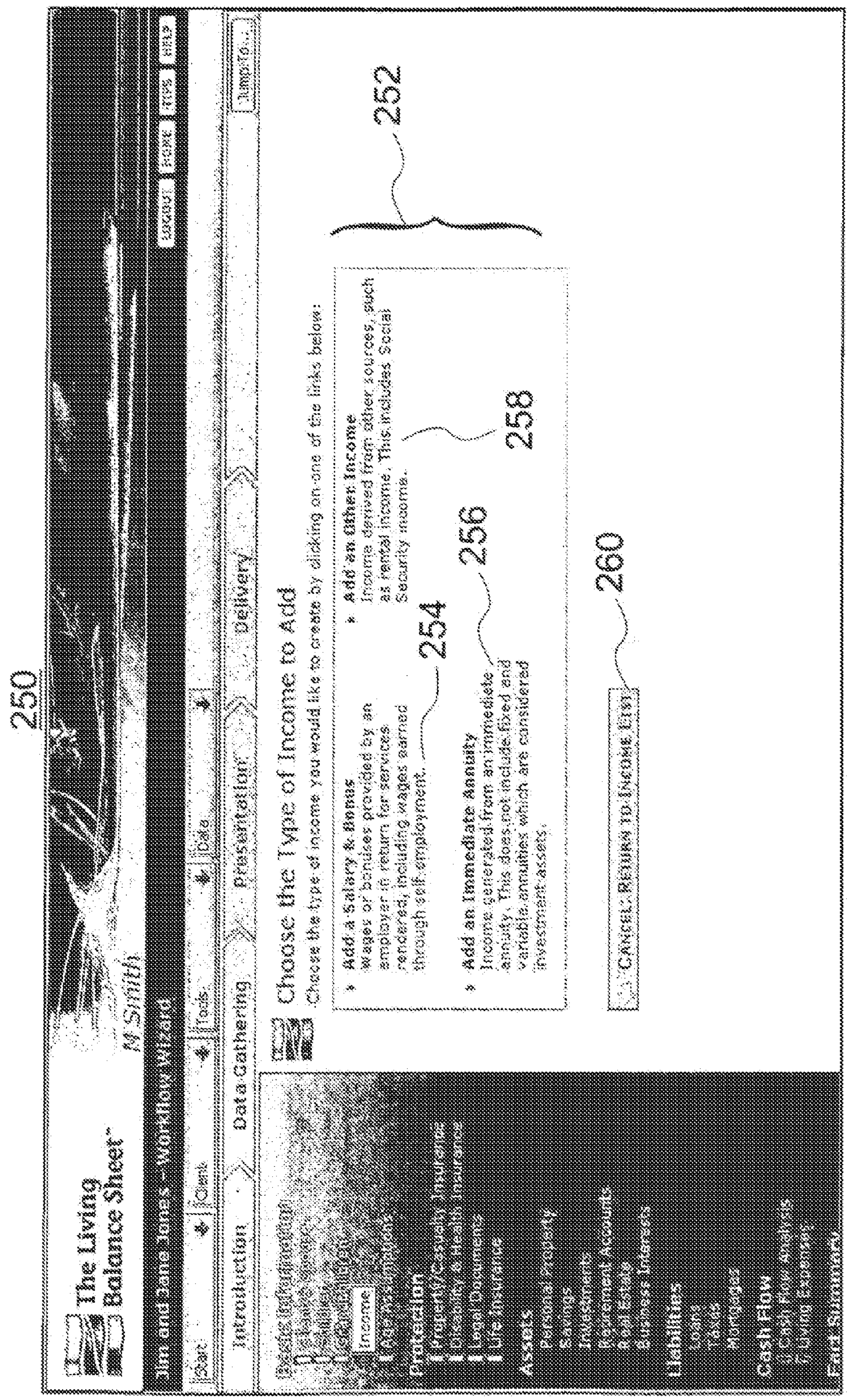

Type of income display page 250 of FIG. 25 is, for example, displayed when a user selects add an income button 242 of FIG. 24. Type of income display page 250 includes income type selection section 252 that contains different options corresponding to different types of income. Each one of the income type options can include supplementary text informing the user of the type of income that is related to that option such as the text shown for the various options shown in FIG. 25. Income type selection section 252 as shown includes add a salary & bonus option 254, add an immediate annuity option 256, and add an other income option 258. Add a salary & bonus option 254 provides the user with an opportunity to enter salary and bonus information related to the client (e.g., the client or spouse). Add an immediate annuity option 256 provides the user with an opportunity to enter information related to an immediate annuity. Add another income option 258 provides the user with an opportunity to enter information on income derived from other sources such as rental income.

Figure 26:
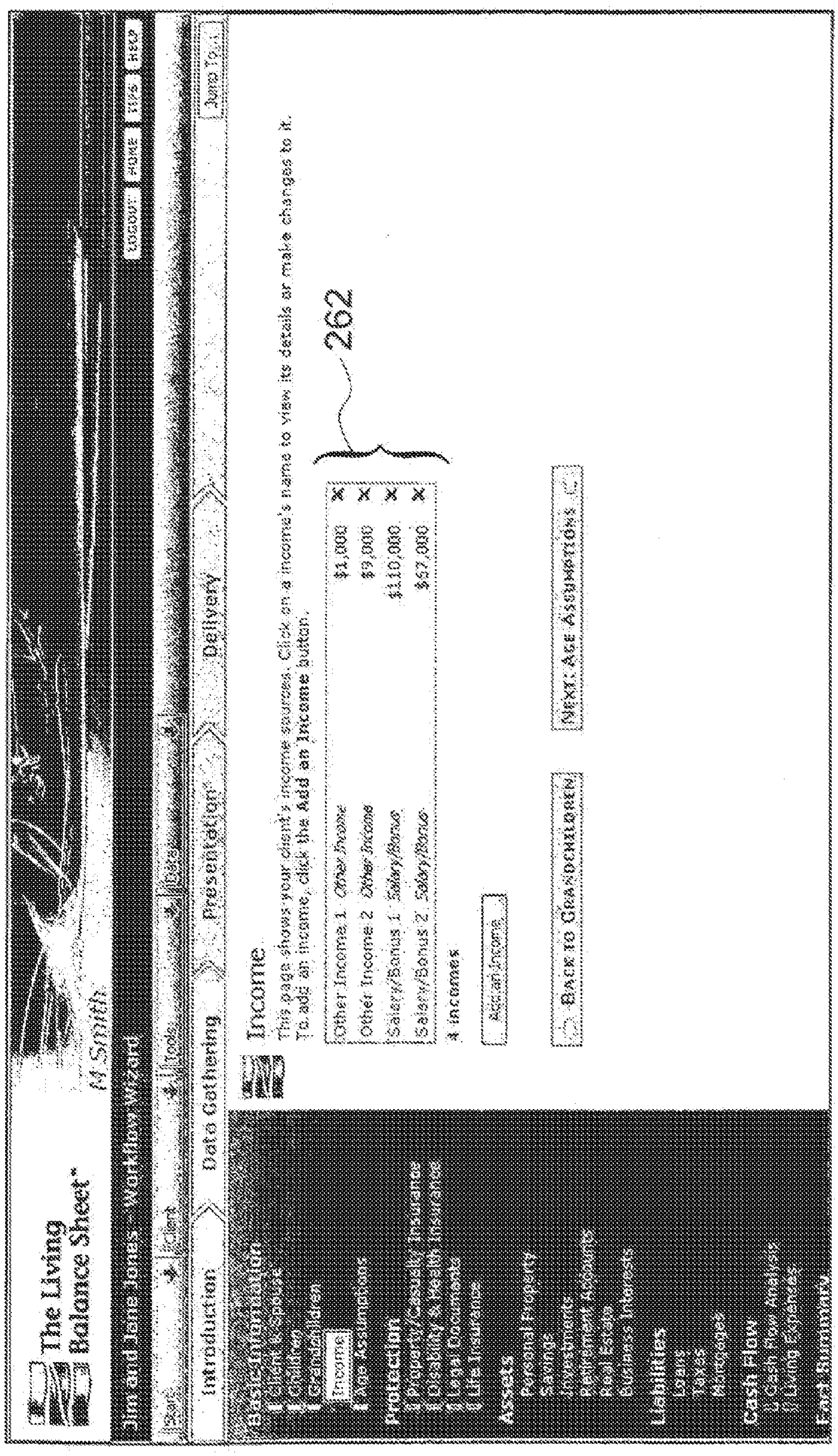

FIG. 26 shows income display page 260 that is illustrative of the income display page after income data has been entered for a client. Summary section 262 shows four income sources of the client and identifies the type and amount of income. A delete option is also displayed for each income item to allow the user to delete an item from the list and thus, change the client's saved information. A user can select income items in section 262 to change or update related information. For example, change salary & bonus display page 270 can be displayed when a user selects the "Salary/Bonus 2" item from section 262 of FIG. 26. Change salary & bonus display page 270 includes data entry options and fields for the user to enter or change salary and bonus information for the selected item. The specific information can for example include annual amount, owner (e.g., who is the owner of that income), the destination (e.g., a pull-down menu where a user can select from core cash account or another destination such as a disability policy), and whether the income is guaranteed. Note that when a user selects to add a new salary & bonus income from type of income display page 250 of FIG. 25, a display page that is preferably the same as display page 270 of FIG. 27 in functionality and structure would be displayed except that it would be configured for the entry of new information (e.g., there would be a title space for "Add Salary & Bonus" and the data field may be left empty or at a preset default value).

Figure 27:
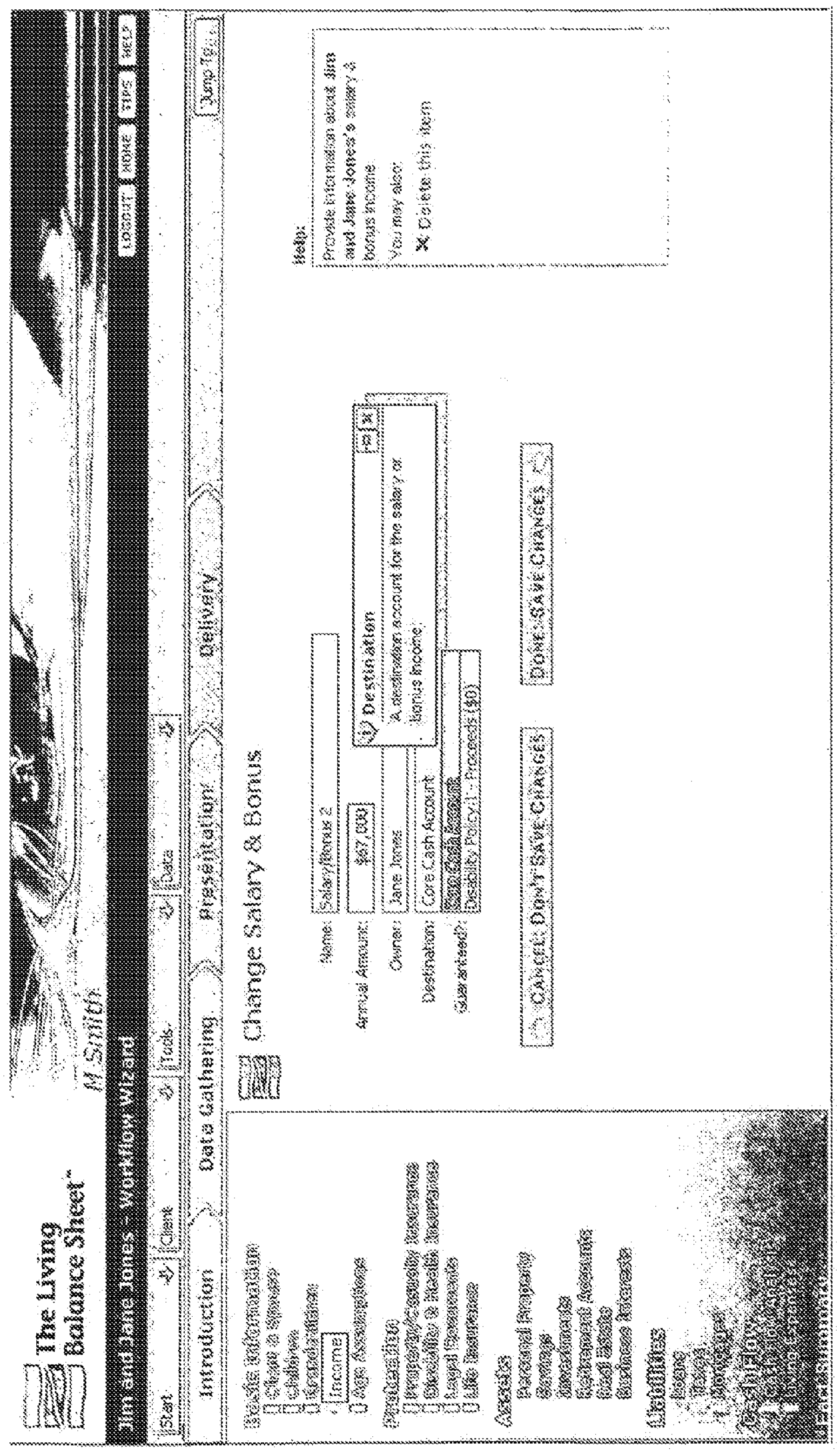
Figure 28:
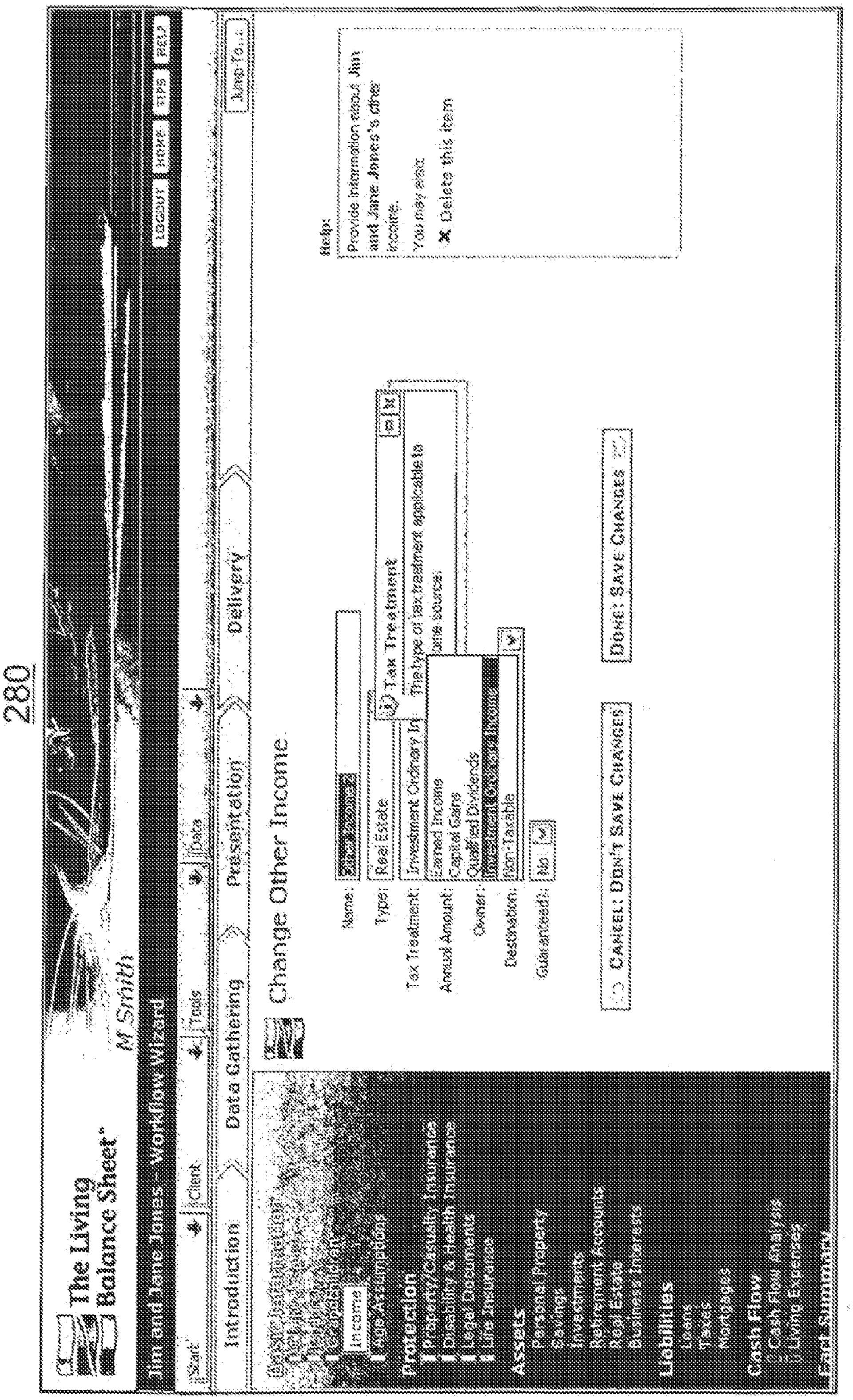

In another example, change other income display page 280 can be displayed when a user selects the "Other Income 2" item from section 262 of FIG. 26. Change other income display page 280 includes data entry options and fields for the user to enter or change other income information for the selected item. The specific information can for example include the type (e.g., using a pull-down menu that lists income sources), tax treatment (e.g., an option that allows the user to identify the tax treatment for the income such as a pull-down menu for choosing the expected tax treatment to be one of earned income, capital gains, qualified dividends, investment ordinary income, or nontaxable), annual amount, owner (e.g., who is the owner of that income), the destination (e.g., a pull-down menu where a user can select from core cash account or another destination such as disability policy), and whether the income is guaranteed. Note that when a user selects to add a new "other income" type of income from display page 250 of FIG. 25, a display page that is preferably the same in functionality and structure as display page 270 of FIG. 27 is displayed except that it would be configured for the entry of new information (e.g., there would be a title space for "Add Other Income" and the data fields may be left empty or at a preset default value).

Figure 29:
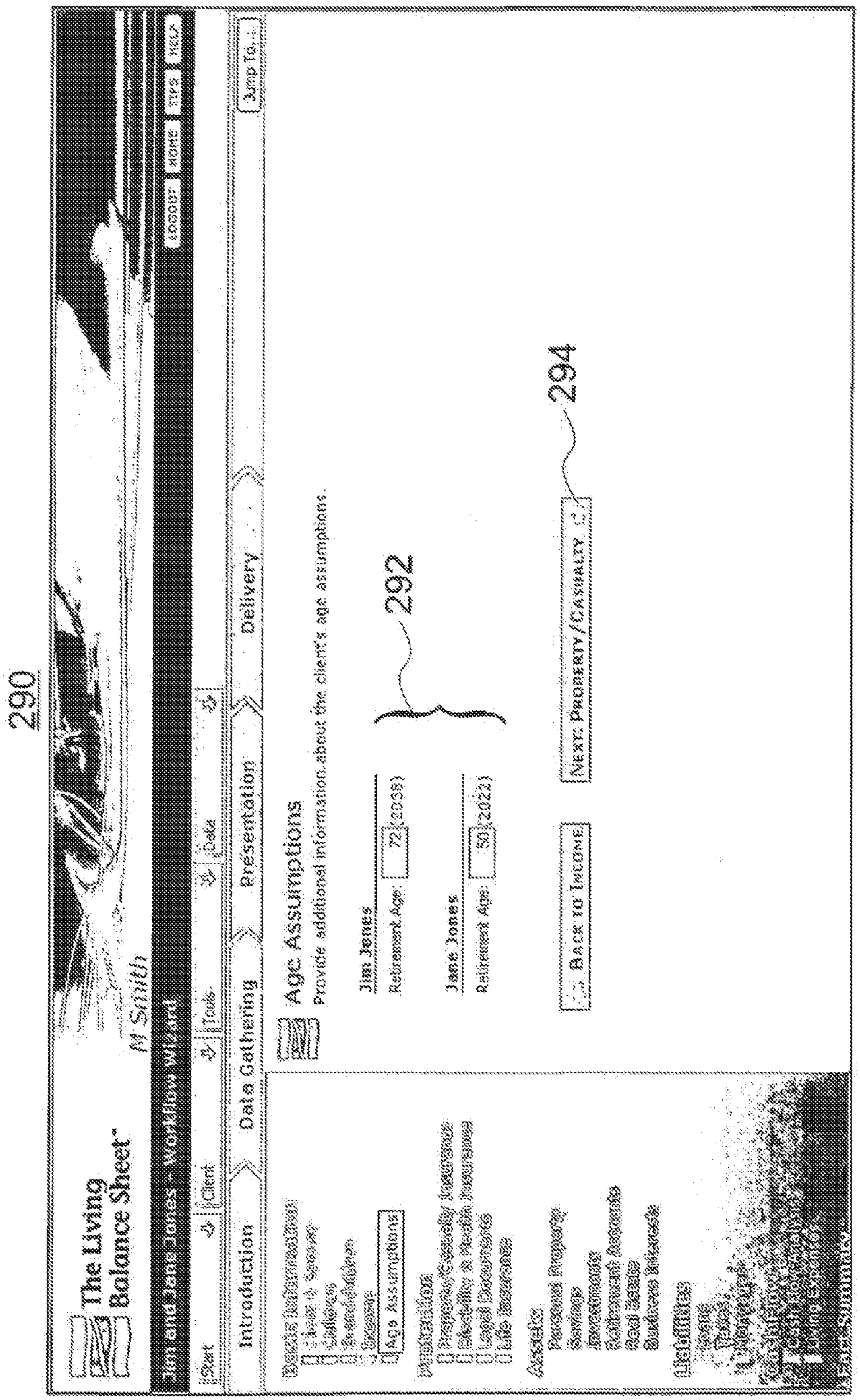

Age assumptions display page 290 of FIG. 29 can be displayed when for example, a user selects the next or save button in income display page 260 of FIG. 26. Age assumption display page 290 provides the user with the opportunity to enter assumptions with respect to the expected retirement age of the client. Section 292 of display page 294 as shown includes data entry fields for the client and spouse in which the user can enter a particular age. Section 292 can include a dynamically updated year next to the age entry field that shows the year with which the retirement age corresponds. Note that if the client did not have a spouse and as such, no such information was added to the client information during the basic information subsection of the Workflow Wizard®, the software would have the intelligence to vary the display pages to reflect that fact. As such, age assumptions display page 290 would be displayed without a data entry field for the spouse if a spouse had not been previously added to the client's information. Preferably, the software incorporates such intelligence and data persistence in the Workflow Wizard® to, for example, provide a clean interface for the user and to automatically enter or update information for the user. Display page 290 includes next button 294, which the user can select to save the entered information and move to the next subsection.

Figure 30:
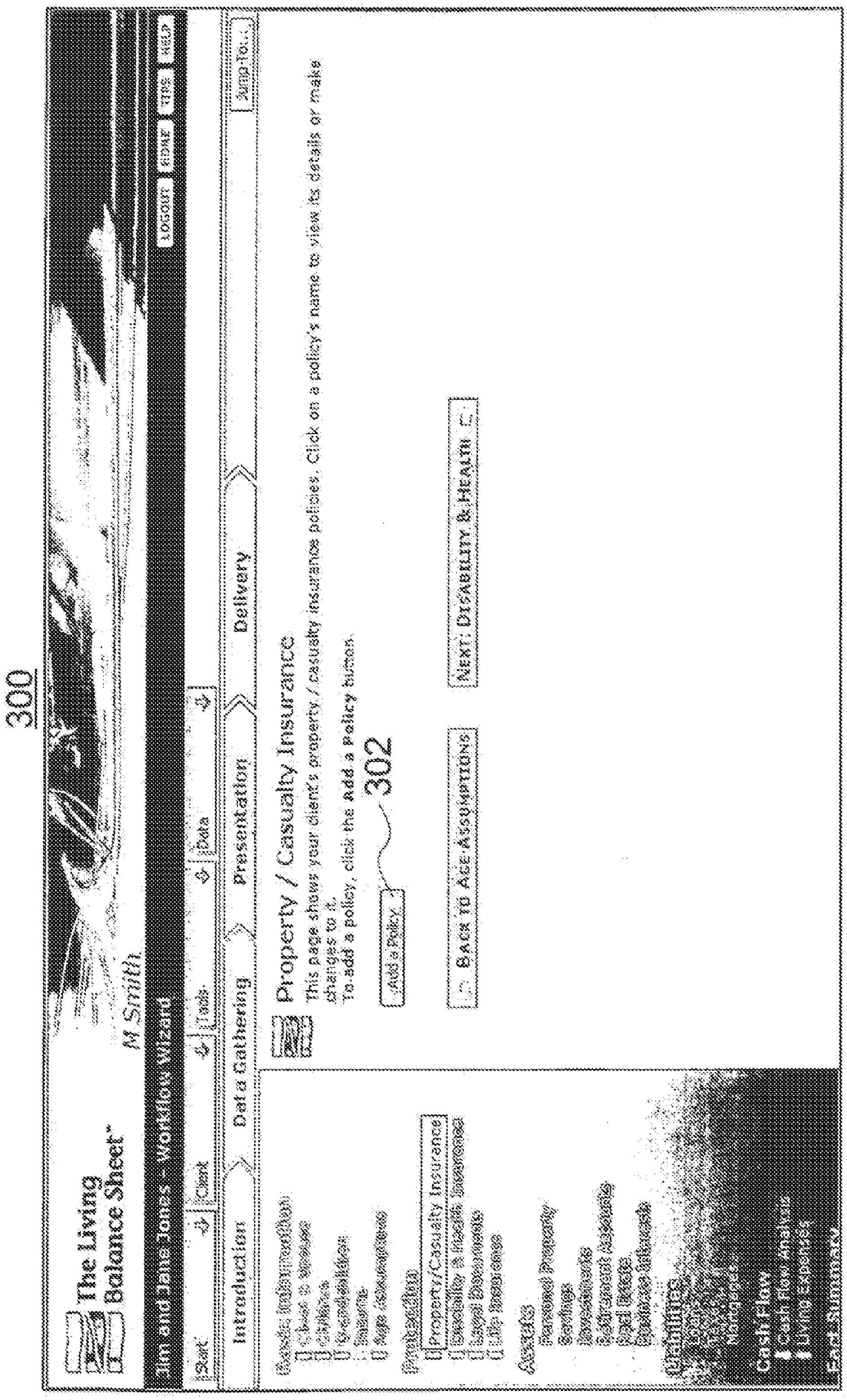
Figure 31:
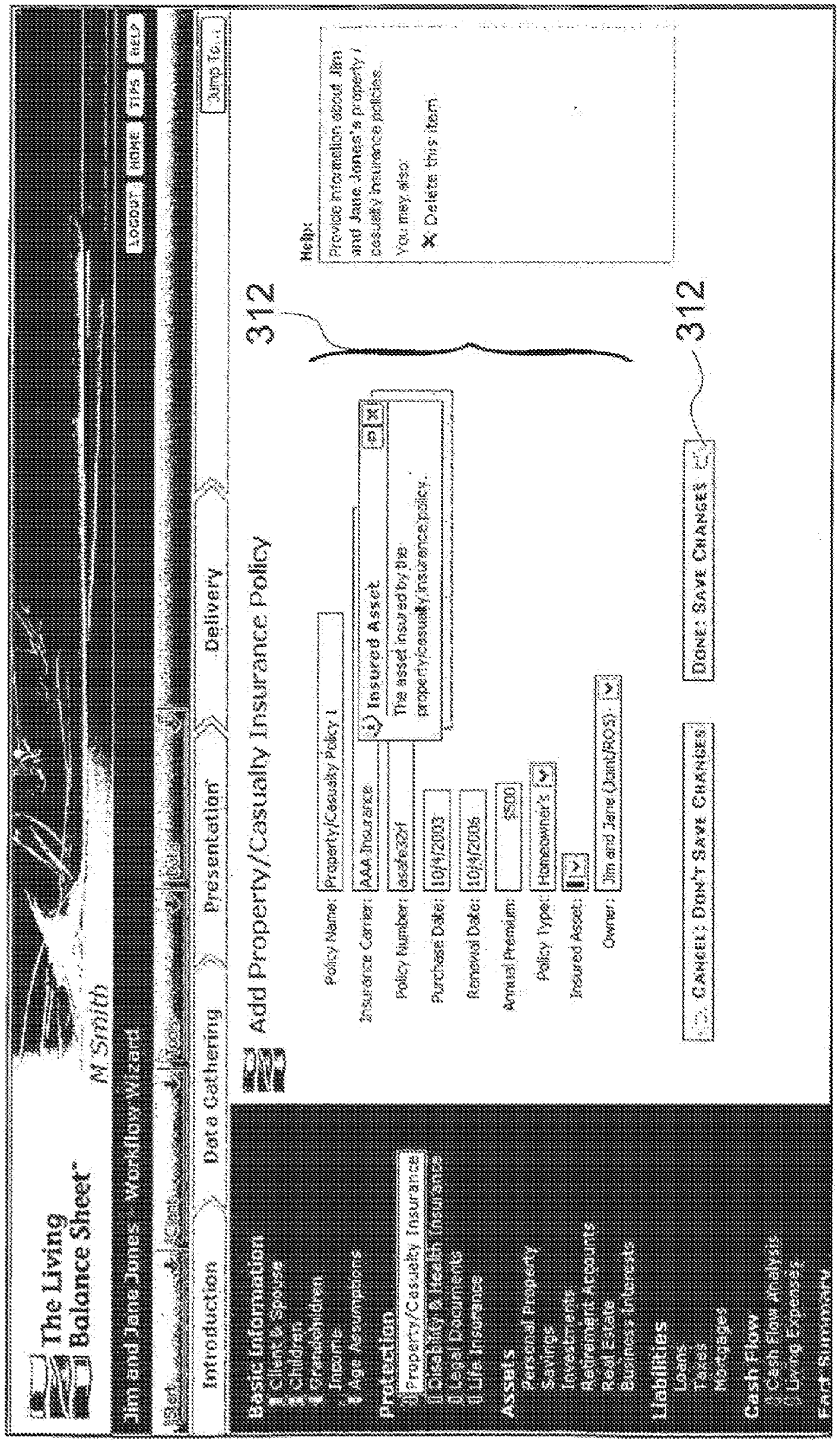
Figure 32:
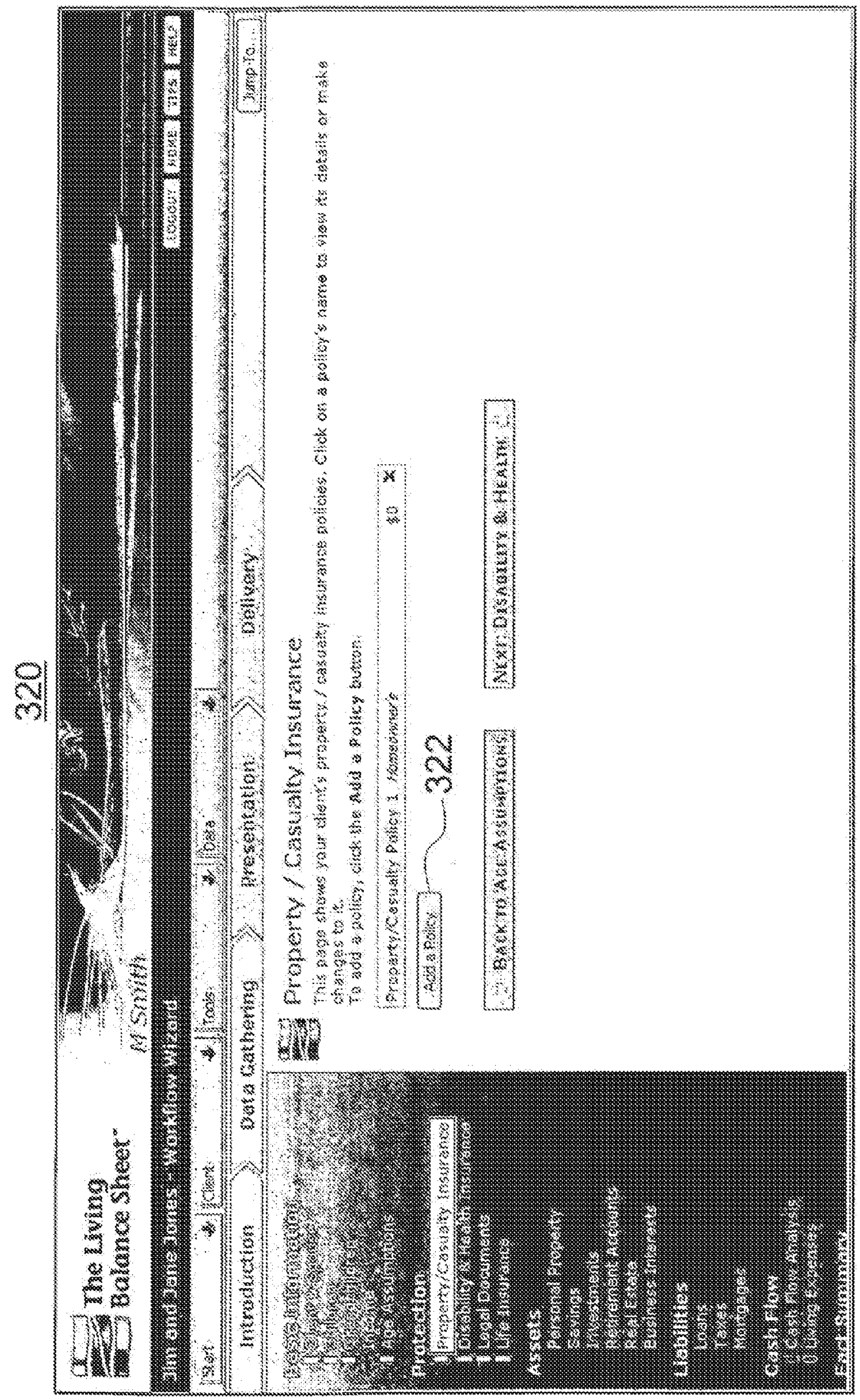
Figure 33:
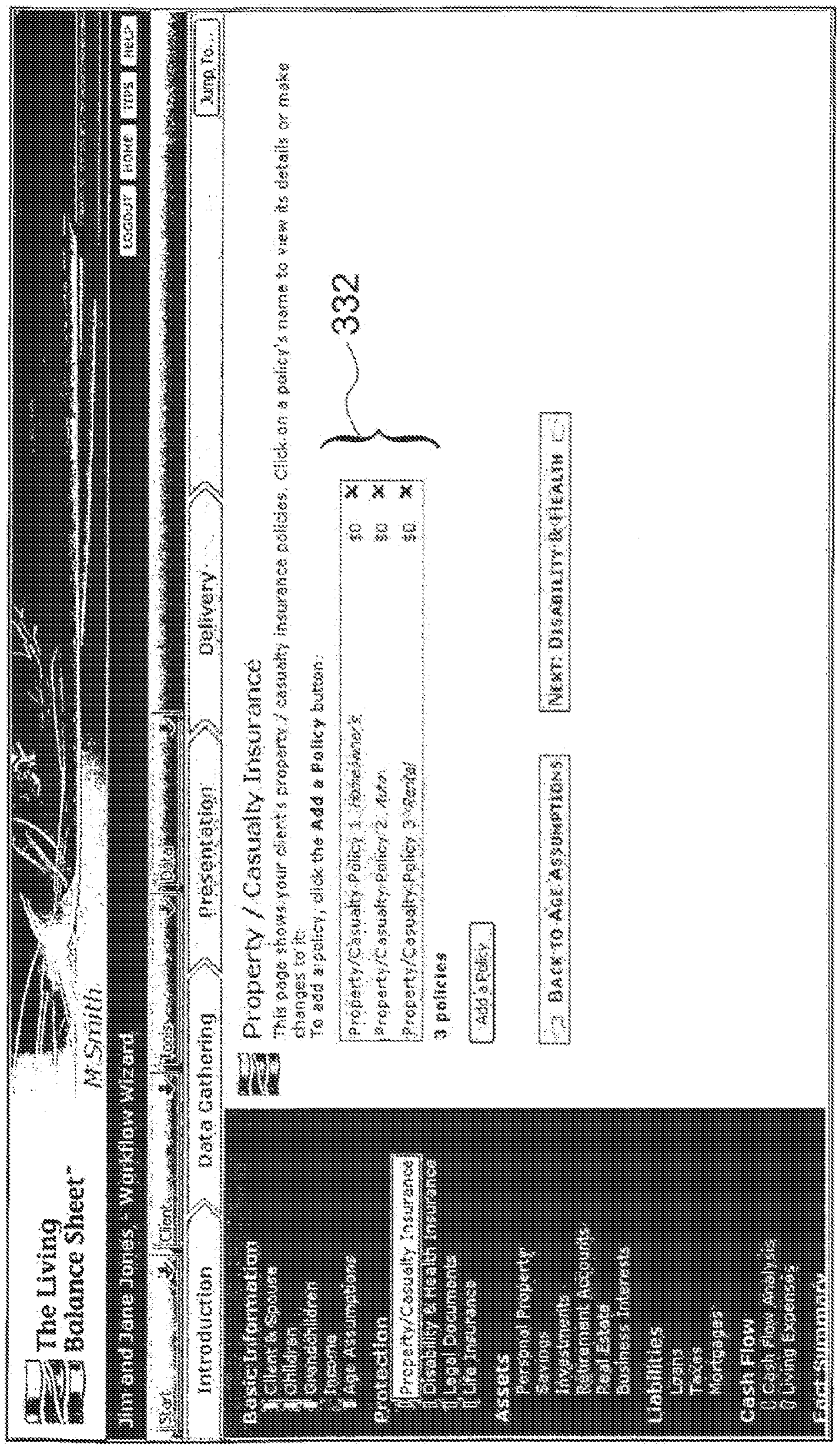

Property/casualty insurance display page 300 of FIG. 30 can be displayed when the user selects next button 294 of FIG. 29. Property/casualty insurance display page 300 preferably displays a summary of the client's property and casualty information if such information has been added for that client. Display page 300 as shown also includes add a policy button 302 for adding a policy to the client information. Add property/casualty insurance policy display page 310 of FIG. 31 can be displayed when a user selects add policy button 302 of FIG. 30. Display page 310 can include options and data entry fields for adding a property/casualty insurance policy of the client such as the fields and options shown in section 312 of display page 310. As shown, the user can enter a policy name, insurance carrier, policy number, purchase date, renewal date, annual premium, policy type, insured asset, and owner. After certain data is entered, the user can select next or save button 312, which would in response, cause property/casualty insurance display page 320 of FIG. 32 to be displayed. As shown, display page 320 now reflects the policy that was added using add property/casualty insurance policy display page 310 of FIG. 31. Specifically, "Property/Casualty Policy 1" is now identified to be a policy of the client in display page 320 of FIG. 32 where before the corresponding data entry, display page 300 of FIG. 30 showed no such policy. Using add a policy button 322, a user can continue to add policies, which would again be summarized in the property/casualty insurance display page such as that shown in property/casualty insurance display page 330 of FIG. 33. As shown in display page, each item in list 332 can be selectable to access a display page to change or update the related information for that item. In addition, the summary item can include information such as the insurance type (e.g., homeowner's, auto, rental, etc.).

Figure 34:
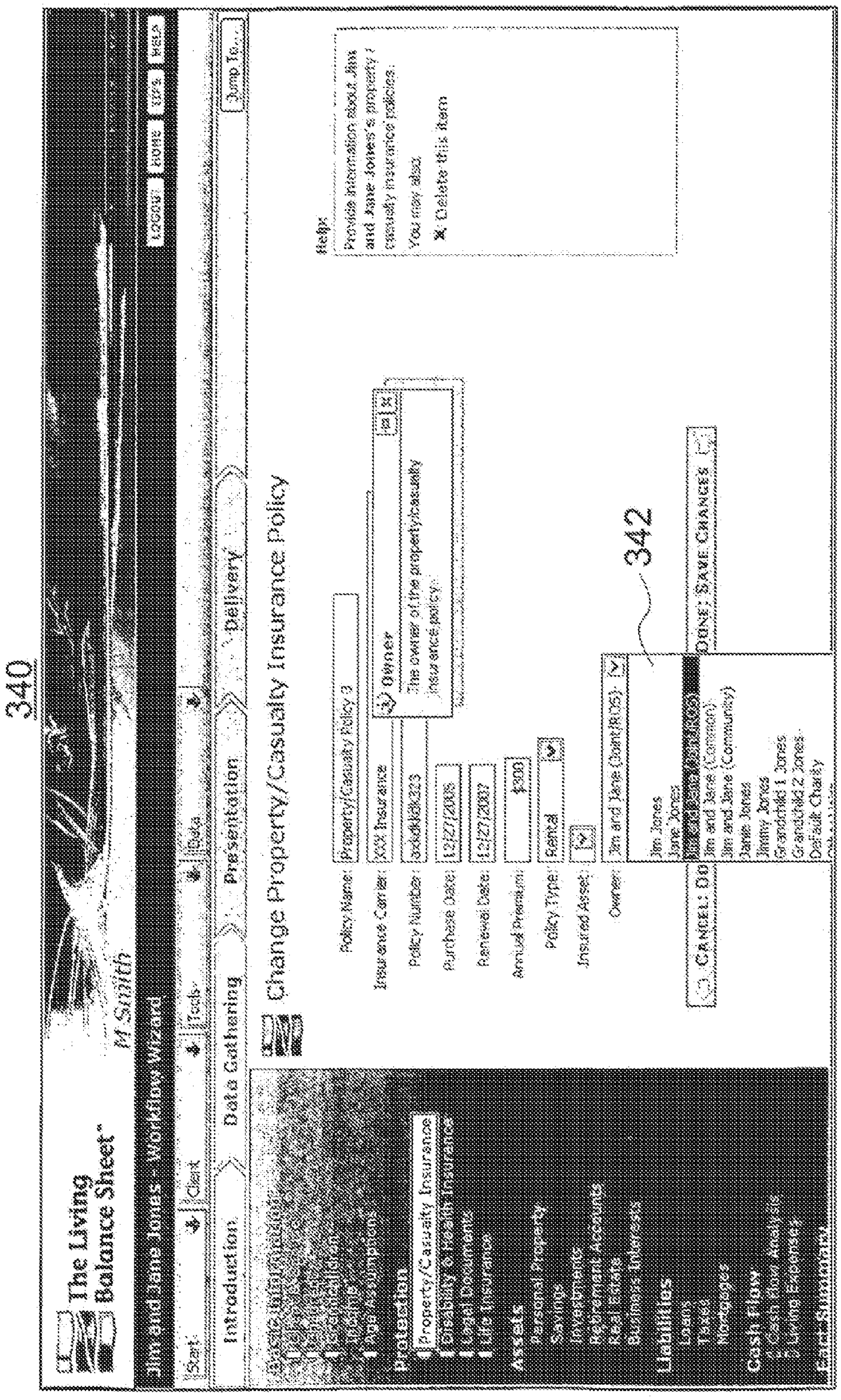
Figure 35:
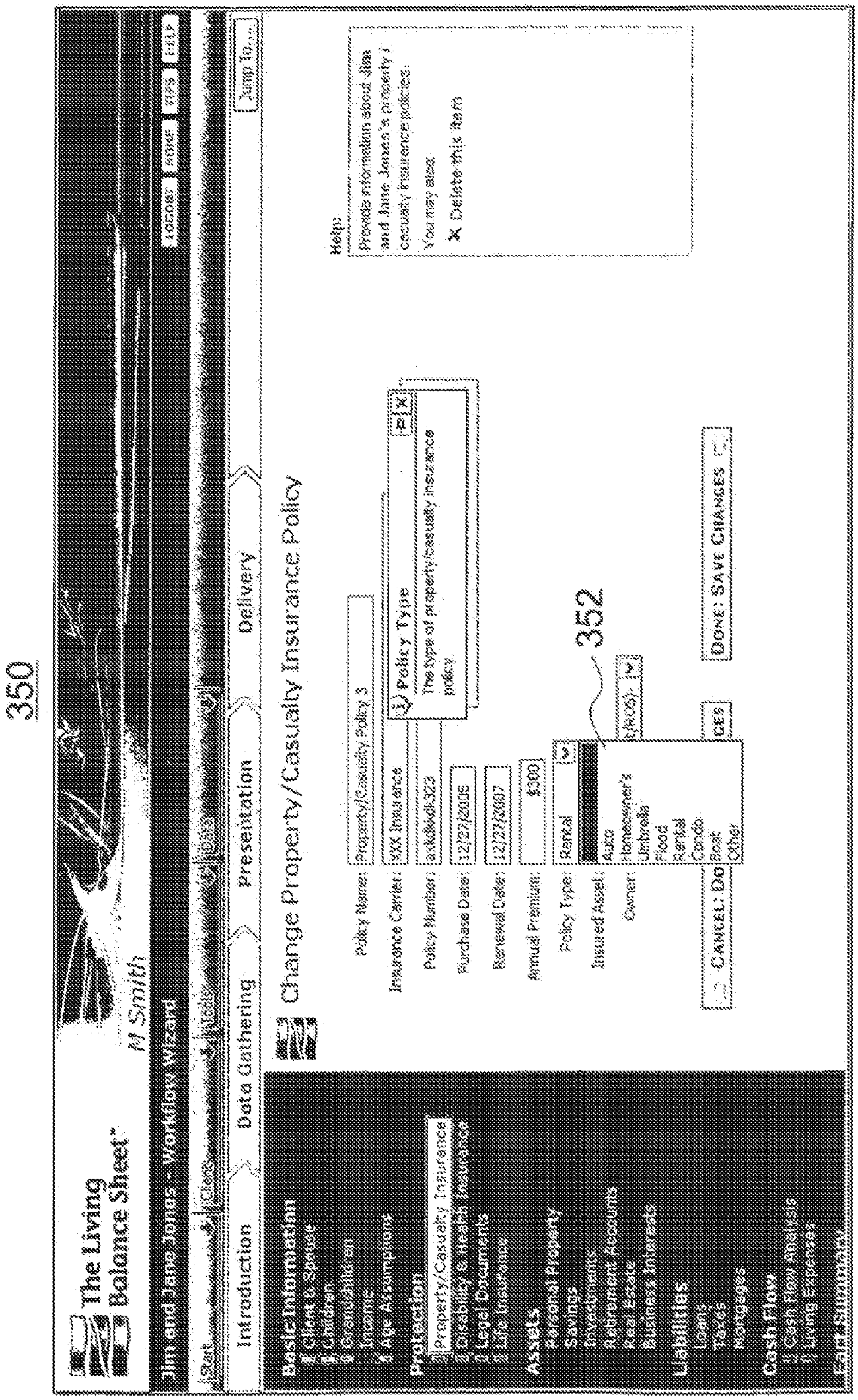

FIGS. 34 and 35 show that a user can access a "change" display page when the user selects a policy from the list of policies in a display page such as display page 330. FIGS. 34 and 35 also illustrate certain pull-down menu functionality. Owner pull-down menu 342 shows that the software automatically generates pull-down menu options based on information that was previously entered for the client. Thus, in the given example, owner pull-down menu 342 provides as selectable items the name of the client, the spouse, individual children, individual grandchildren, or other possible owners such as a default charity, other heirs, or a default trust. In addition, menu 342 can provide a level of sophistication where joint ownership can be specified including the type of joint ownership such as common, community, or joint with a right of survival. Pull-down menu 352 of FIG. 35 shows the range of policy types that a user can select from for data entry purposes such as auto, homeowner's umbrella, flood, rental, condo, boat, and other.

As shown, the next subsection within the protection section is disability and health insurance. Disability and health insurance display page 360 can be displayed when a user first moves from the previous subsection to the disability and health insurance subsection. As in other "home" subsection screens, disability and health insurance display page 360 preferably displays summary information which in this case would be a summary of the client's disability and health insurance policies and also would allow the user to add or change information.

Figure 36:
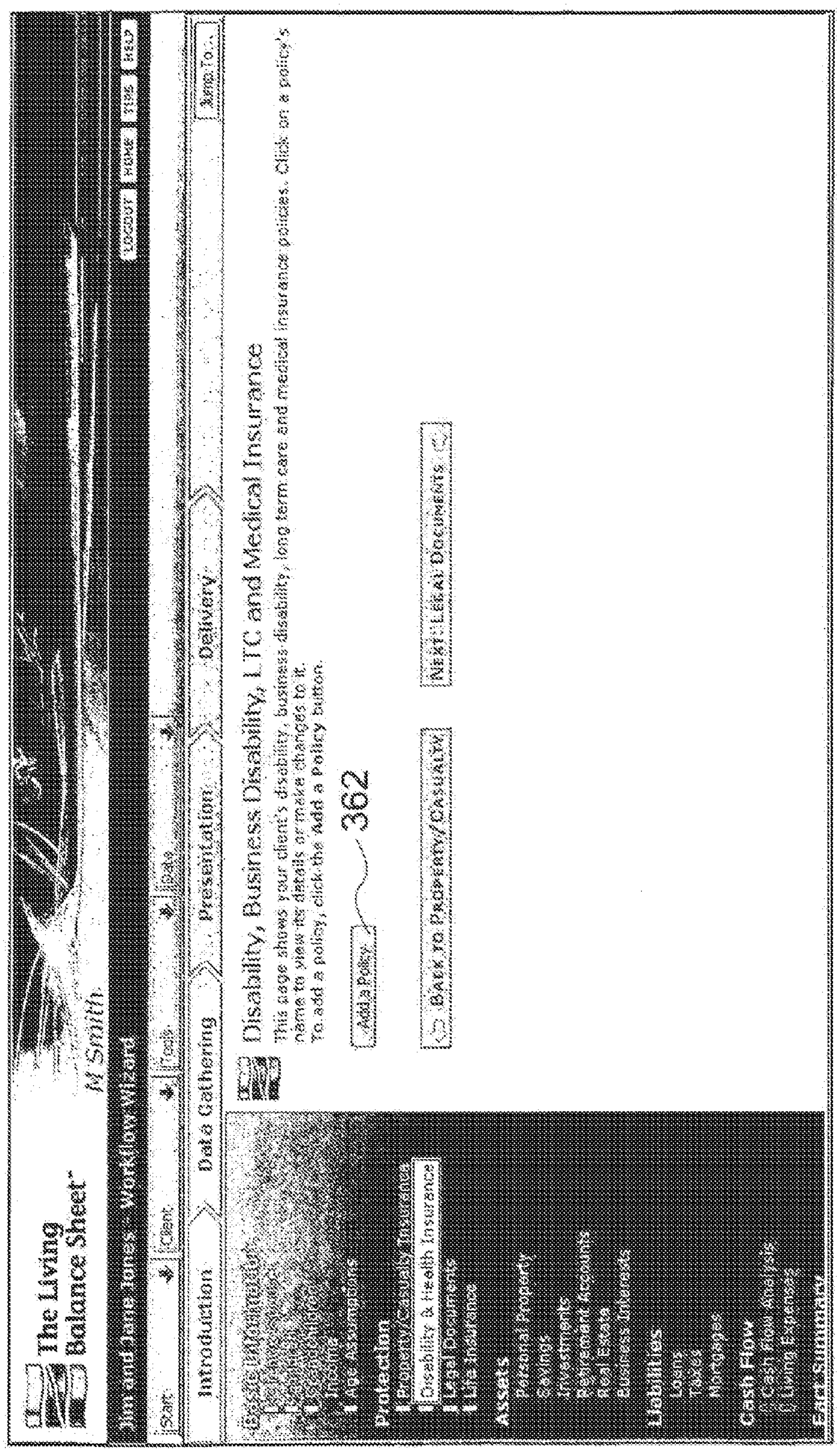
Figure 37:
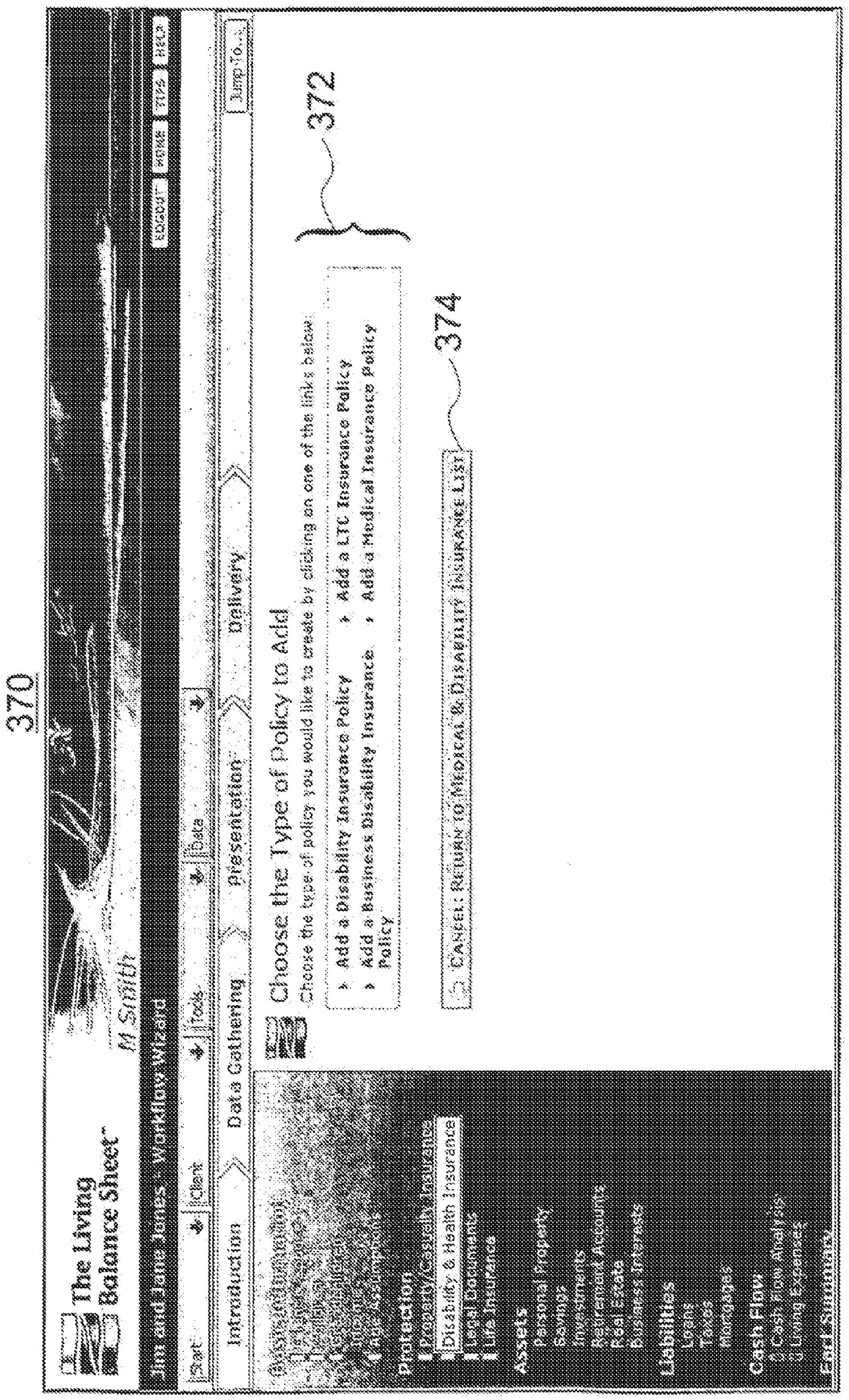

Type of policy display page 370 of FIG. 37 can be displayed when a user selects add a policy button 362 of FIG. 36. Display page 370 as shown includes choose type section 272 for allowing the user to select a type of policy to add to the client information. As shown, section 272 includes options for adding a disability insurance policy, adding a business disability insurance policy, adding a long-term care insurance policy, and adding a medical insurance policy. Cancel button 374 can return the user to disability and health insurance display page 360 of FIG. 36.

Figure 38:
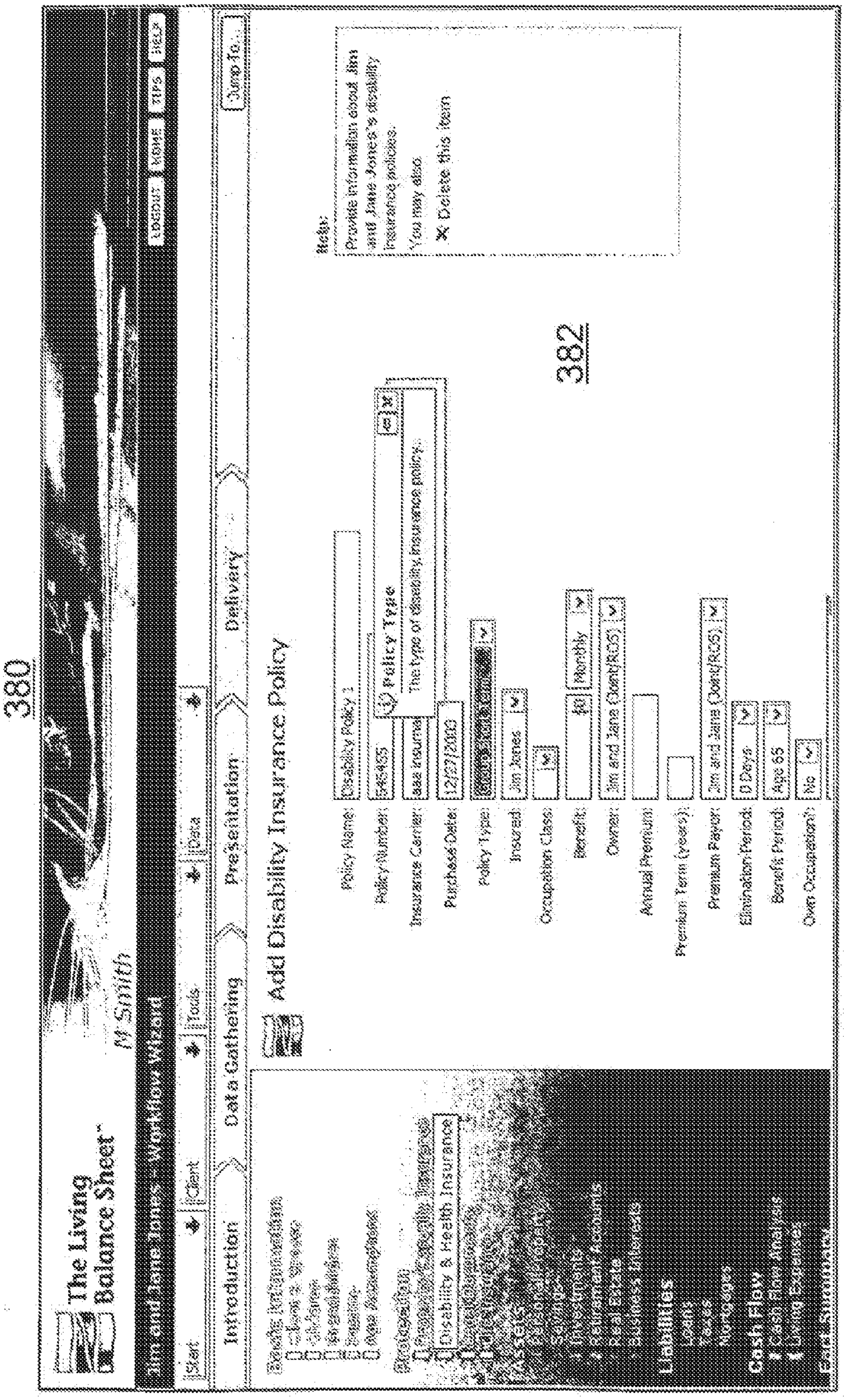
Figure 39:
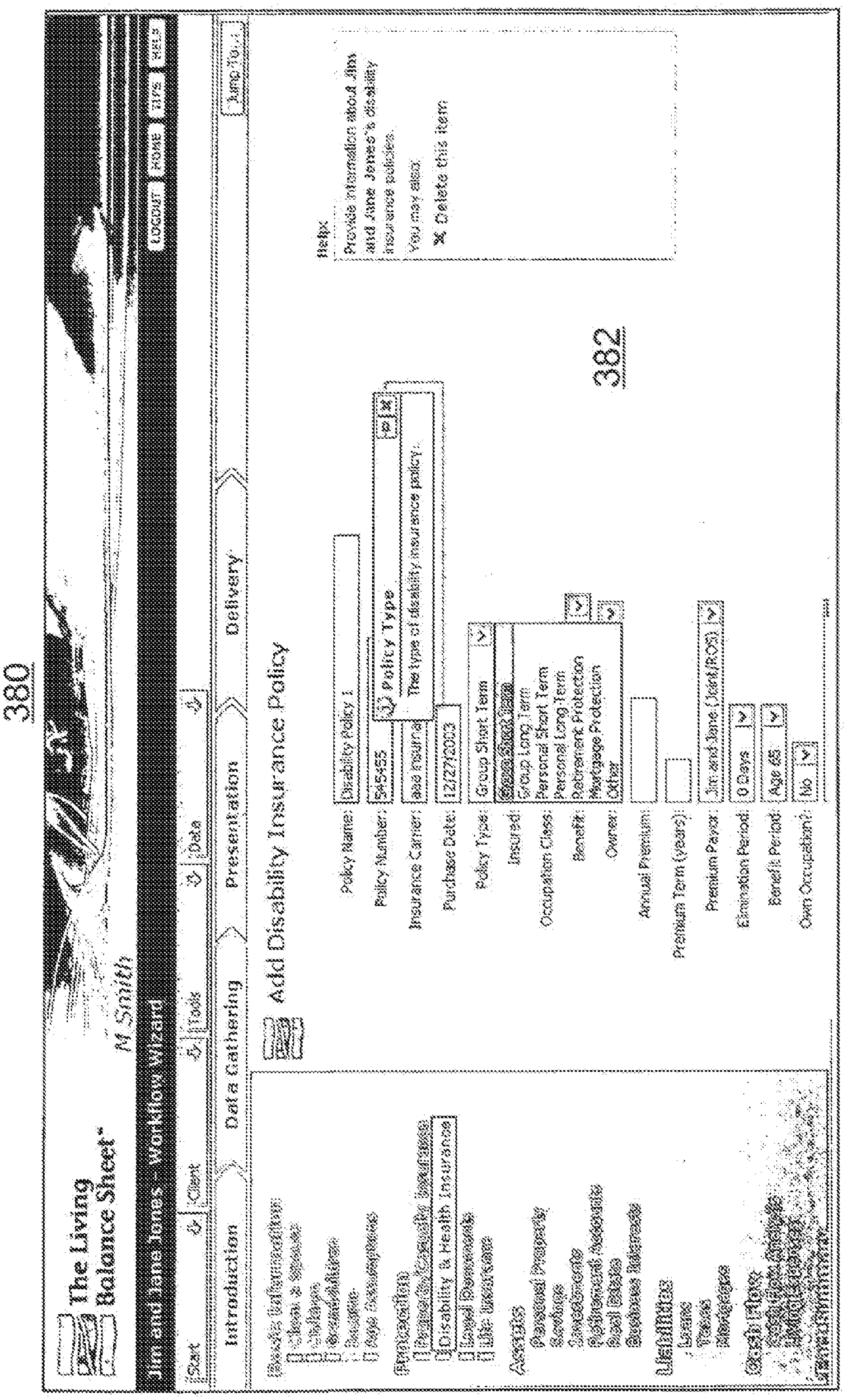
Figure 40:
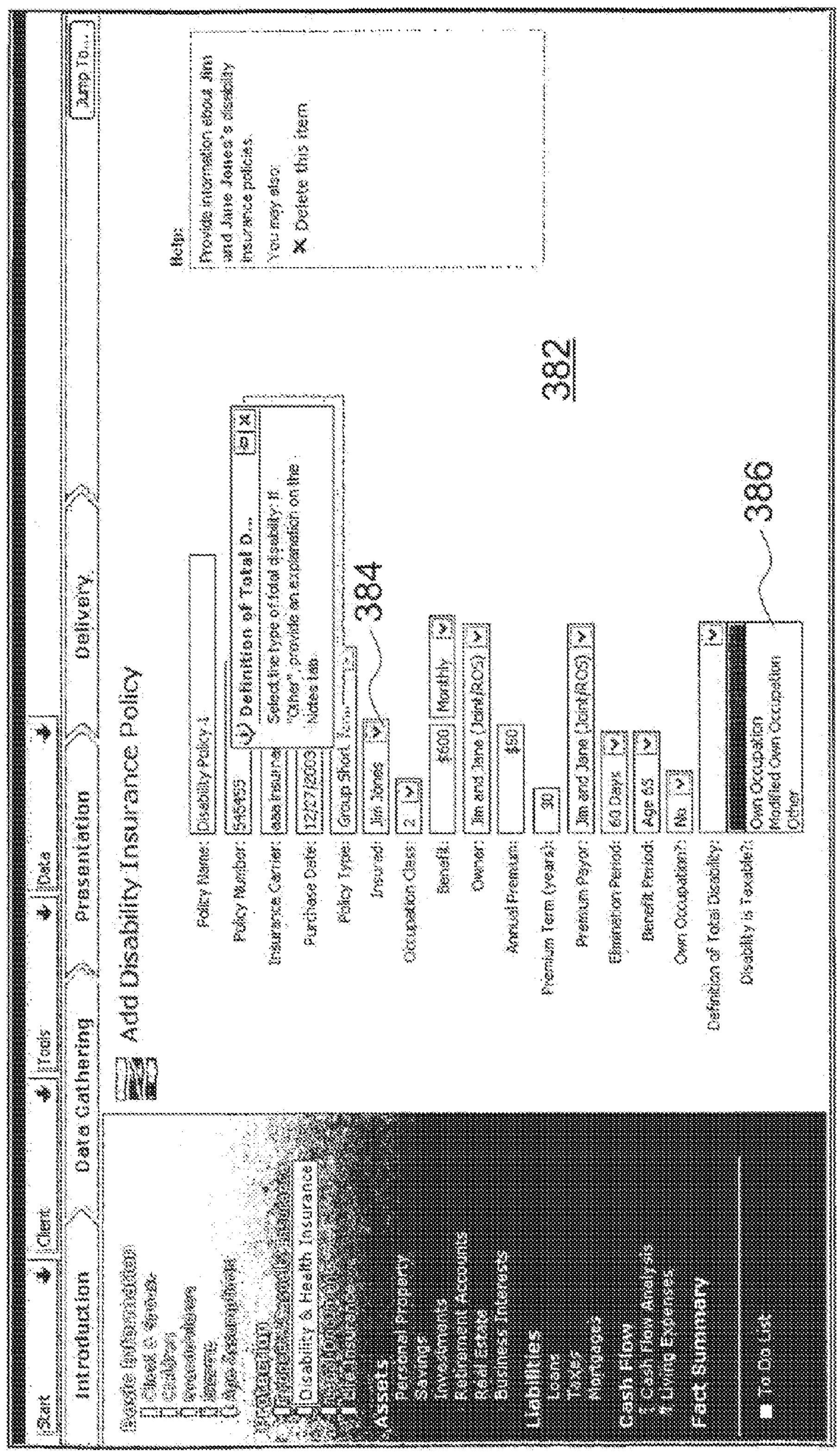

Add disability insurance policy display page 380 of FIGS. 38 to 40 can be displayed when a user selects an option for adding a disability insurance policy in choose type display page 370 of FIG. 37. Display page 380 provides the user with the opportunity to enter and save detailed information related to a disability insurance policy of the client. Specifically, display page 380 as shown includes section 382 for data entry and option selections with respect to the insurance policy. In section 382, a user can enter a policy name, policy number, insurance carrier, purchase date, policy type, insured, occupation class, benefit (e.g., monthly, yearly, etc.), owner, annual premium, premium term, premium payer, elimination period, benefit period, own occupation, definition of total disability, whether the disability is taxable.

Pull-down menus can be incorporated to assist with the user's interaction. For example, section 382 of FIG. 39 shows a pull-down menu for policy type that includes options for selecting the policy type to be group short term, group long term, personal short term, personal long term, retirement protection, mortgage protection, or other. Another example is pull-down menu 386 of FIG. 40 in which the user is provided with the option to select whether the disability is taxable and is given the options of own occupation, modified own occupation, or other. Related help would be included for the various options and functionality to help the user in interacting with the software. Pull-down menus can be automatically generated that are customized for the current client. Insured option 384 can automatically list the names of the client, spouse, or other possible insured for which data has been saved in connection with the current client.

Figure 41:
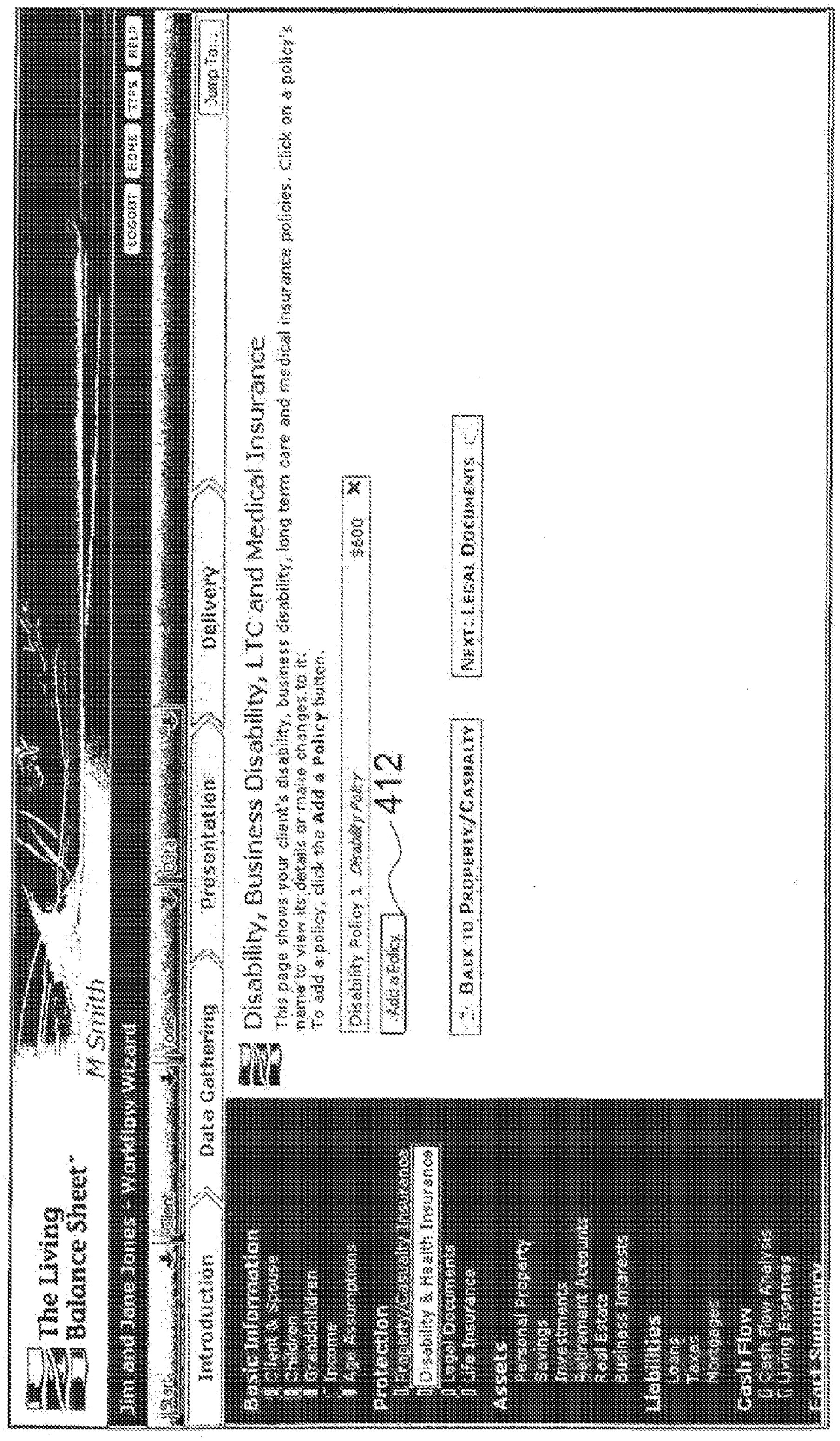
Figure 42:
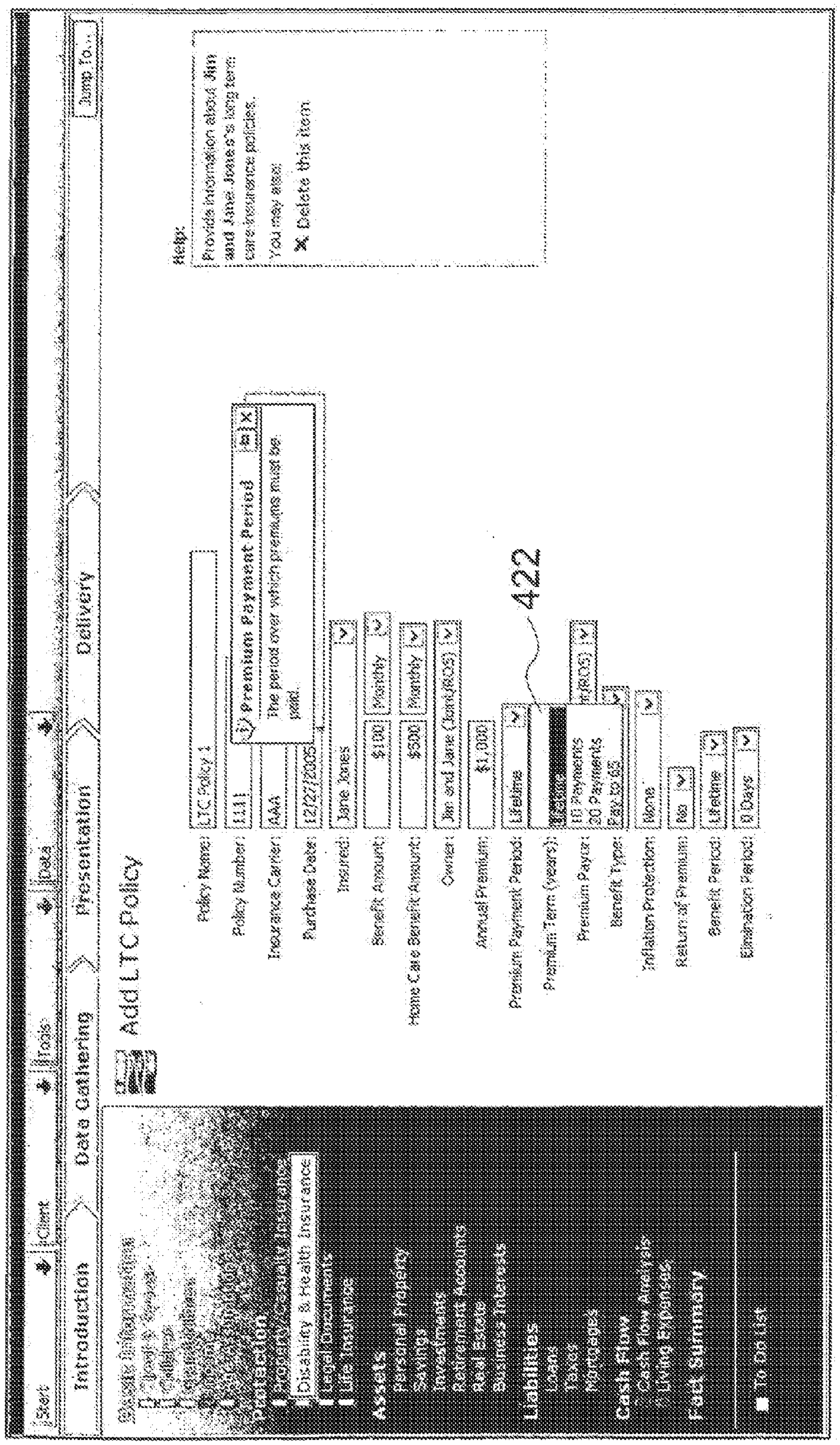
Figure 43:
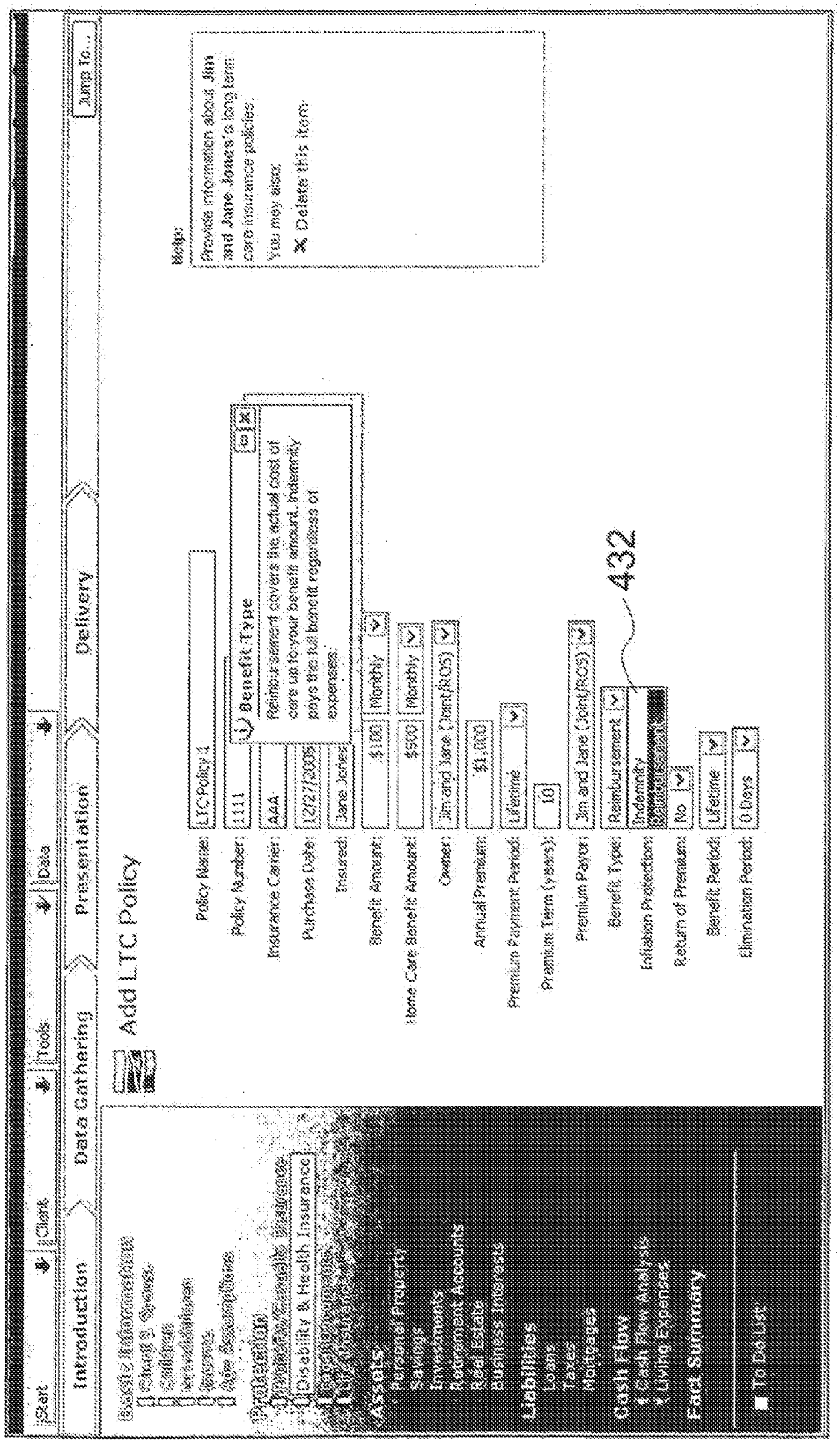

Although not visible in FIGS. 38 to 40, display page 380 can include a save button to allow the user to return to the disability and health insurance policy display page. For example, as shown in FIG. 41, disability and health insurance display page 410 can be displayed when a user selects a save button from display page 380 of FIG. 40. As shown, display page 410 includes a summary of the policy that was entered using display page 380 of FIGS. 38-40. The summary can include the policy name, policy type, the benefit, or other characteristics. The summary can be selected to change the saved policy information.

Figure 44:
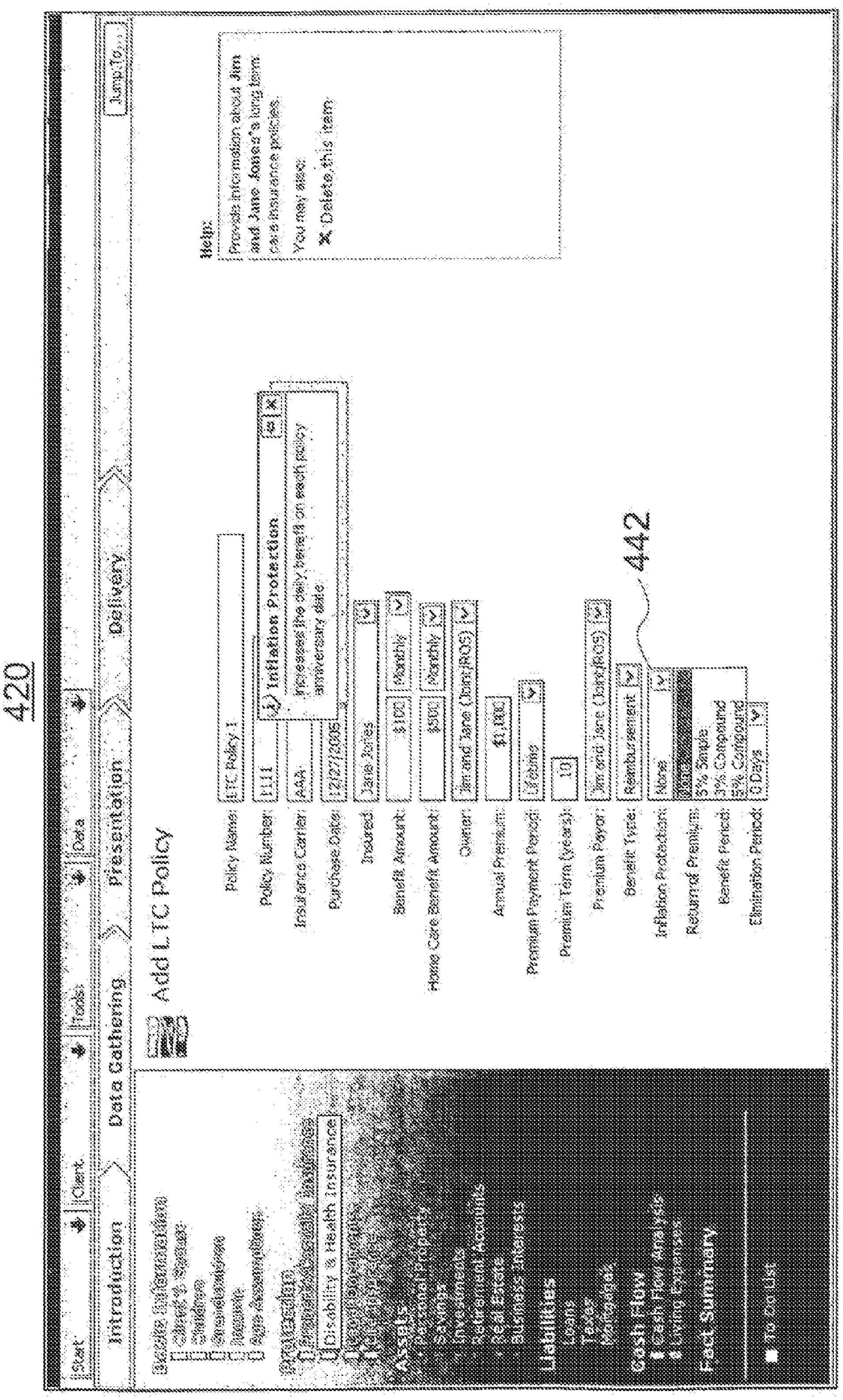
Figure 45:
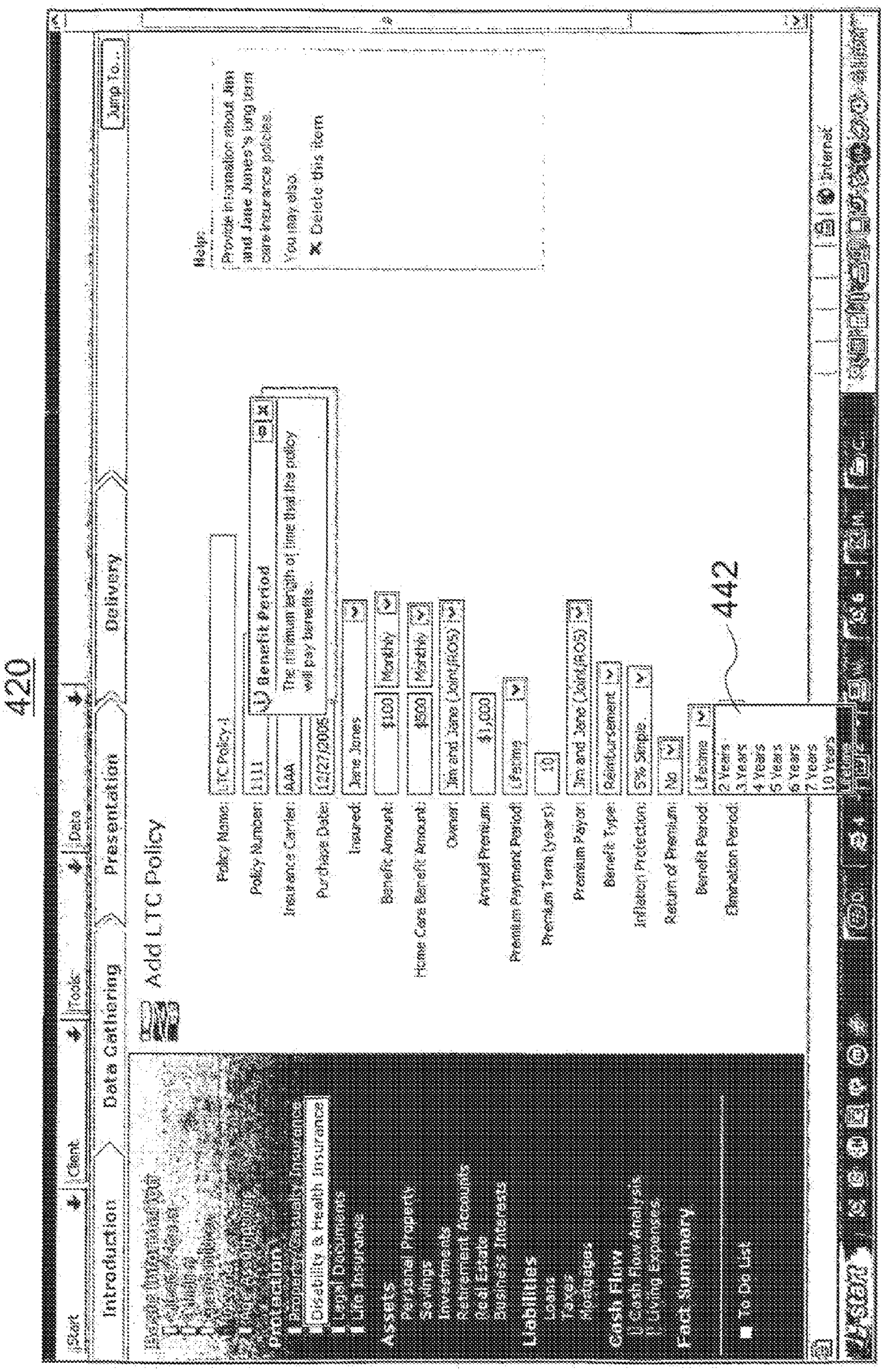
Figure 46:
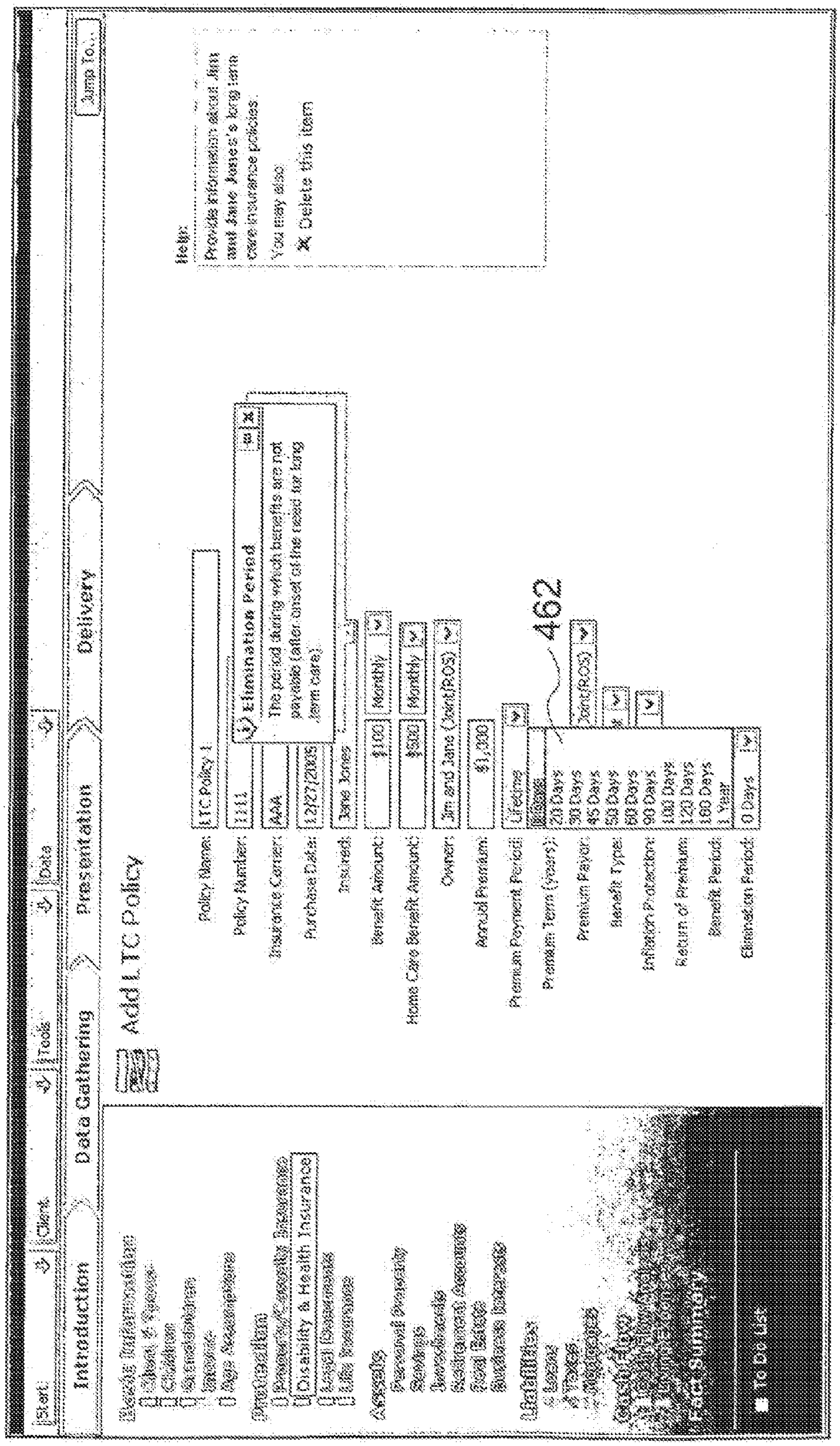
Figure 47:
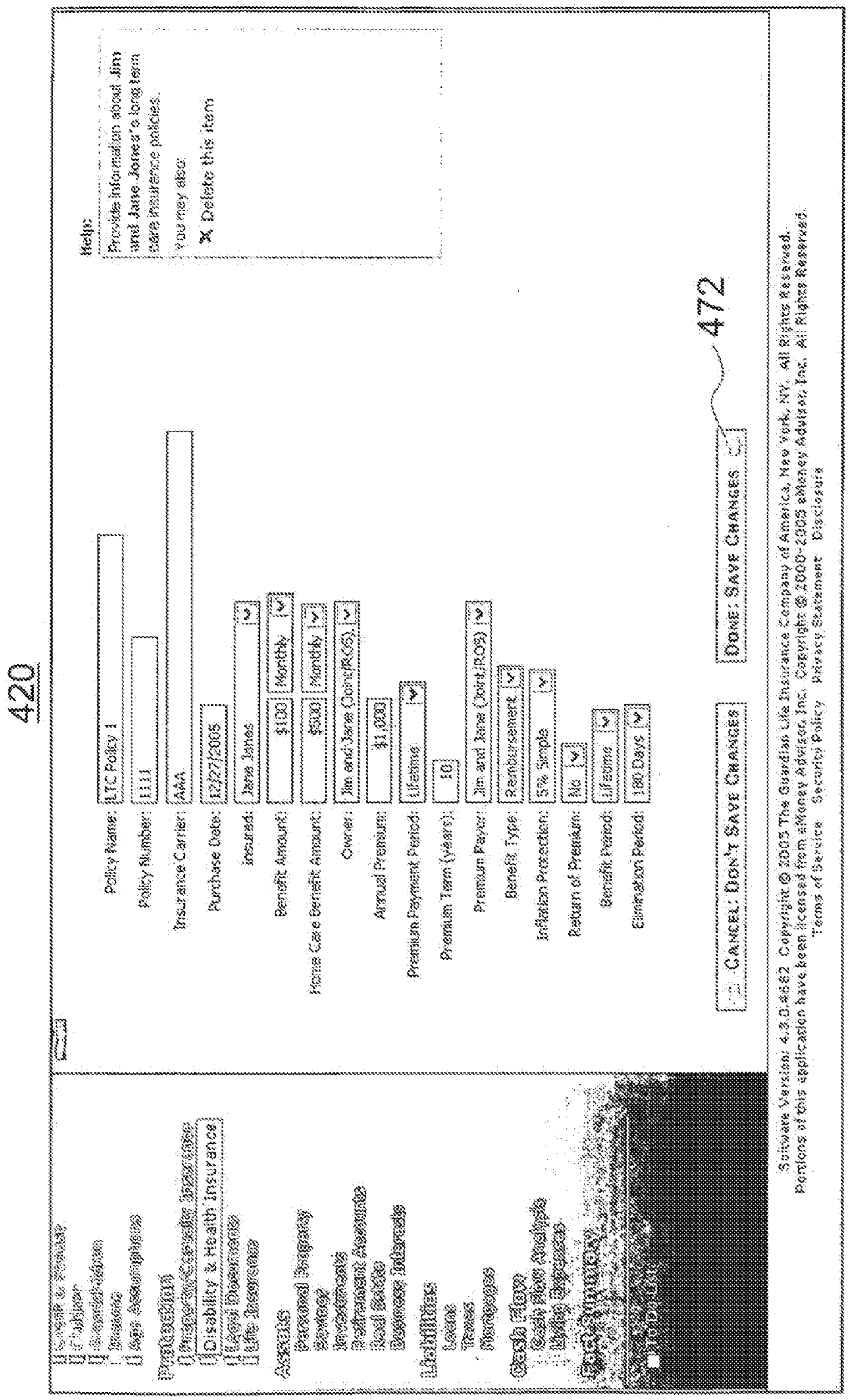
Figure 48:
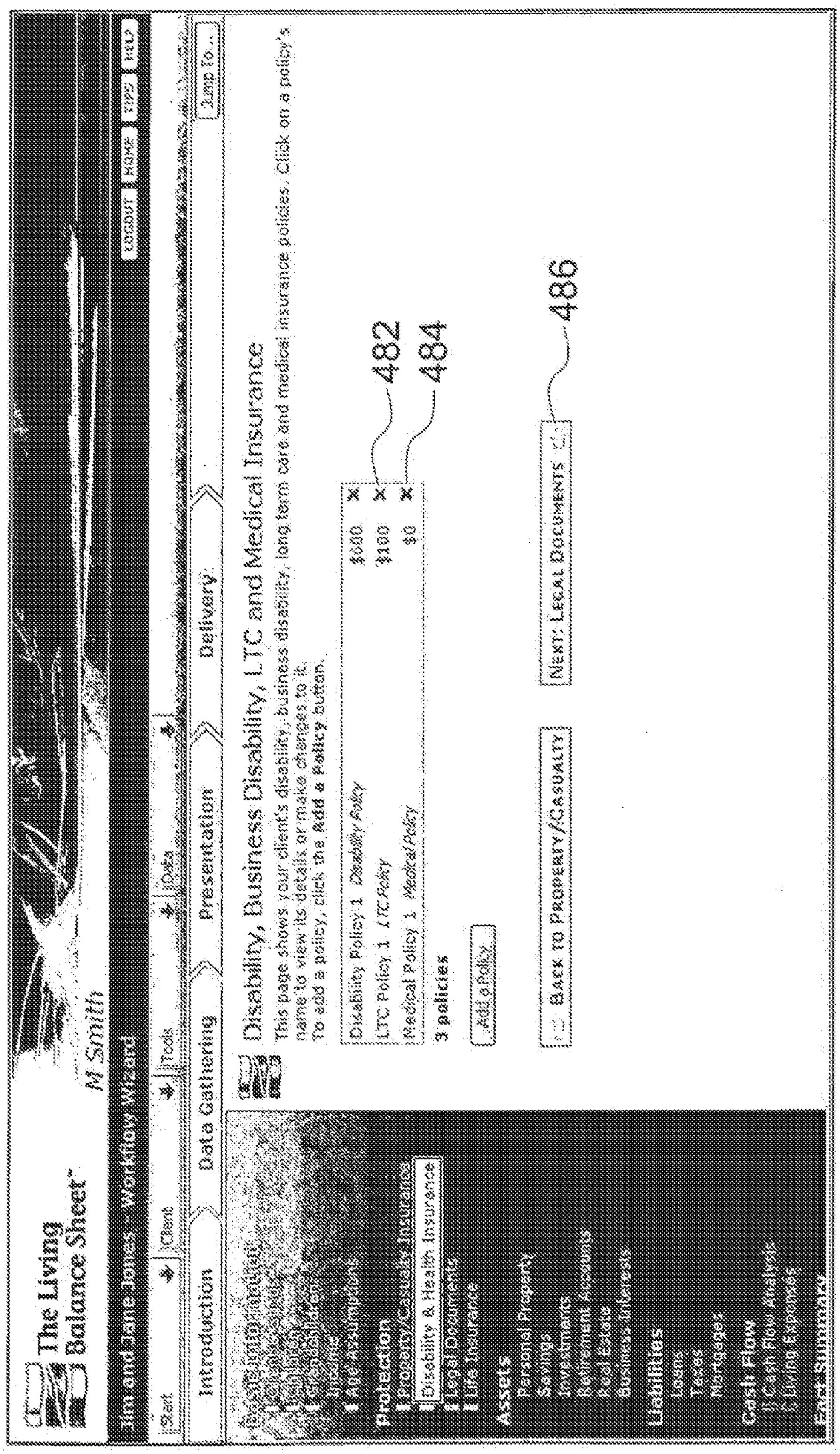
Figure 49:
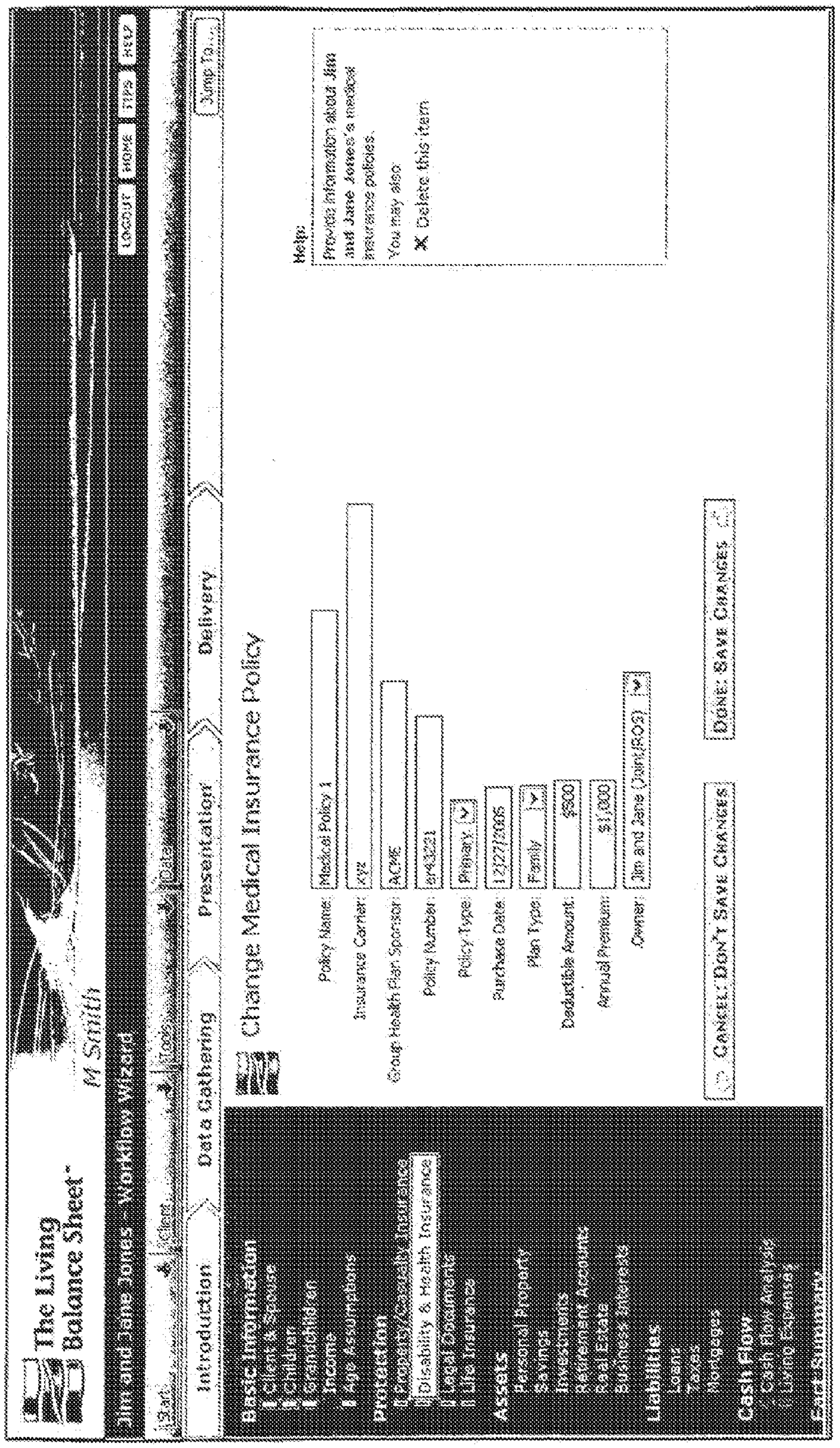

Add LTC policy display page 420 of FIGS. 42-47 can be displayed when a user takes the steps in the software for adding a long term care ("LTC") policy to the client information. Add LTC policy display page 420 provides the user with an opportunity to add an LTC policy of the client and related information to the client information. Display page 420 as shown includes data entry and pull-down menus for entering LTC related information such as policy name, policy number, insurance carrier, purchase date, insured, benefit amount (e.g., amount and periodic rate), home care benefit amount (e.g., amount and periodic rate), owner, annual premium, premium payment period, premium payer, benefit type, inflation protection, return of premium, benefit period, and elimination period. Preconfigured or dynamically configured pull-down menus can be used to assist in the interaction with display page 420. For example, premium payment period 422 can be configured to display certain choices for the duration of payments such as lifetime, 10 payments, 20 payments, or pay to 65. Another LTC related pull-down menu is benefit type menu 432 of FIG. 43. Menu 432 permits the user to enter the benefit type to be indemnity or reimbursement. Inflation protection menu 442 of FIG. 44 is another LTC related option that is provided to users. As shown, inflation protection menu 442 provides the user with the option to select from none, 5% simple, 3% compound, and 5% compound. Benefit period menu 452 of FIG. 45 provides the user with further functionality by providing the user to select the benefit period from a generated list of possible benefit periods (e.g., 2 years, 3 years, 4 years, 5 years, 6 years, 7 years, 10 years, and lifetime). The user can also specify an elimination period using pull-down menu 462 of FIG. 46, which, as shown, provides the options of 0, 20, 30, 45, 50, 60, 90, 100, 120, or 180 days or 1 year. Done button 472 of FIG. 47 can be selected to save the entered information and return to the disability and health insurance display page such disability and health insurance display page 480 which now reflects the addition of LTC Policy 1 482 via display page 420 of FIGS. 42 to 47. Display page 480 also shows that a medical policy (medical policy 1 484) was previously added for the client. Change medical insurance policy display page 490 can be displayed when a user selects medical policy 1 484 of FIG. 48. Change medical insurance policy page 490 displays saved information relating to the client's "medical policy 1" and permits the user to update and change the saved information. Display page 490 provides the user with the opportunity to enter medical insurance policy related information for the client. For example, the user can enter or change a policy name, insurance carrier, group health plan sponsor, policy number, purchase date, plan type, deductible amount, annual premium, and owner. An add medical insurance policy display page having the same functionality and structure was preferably used to initially add the policy to the client's information.

Figure 50:
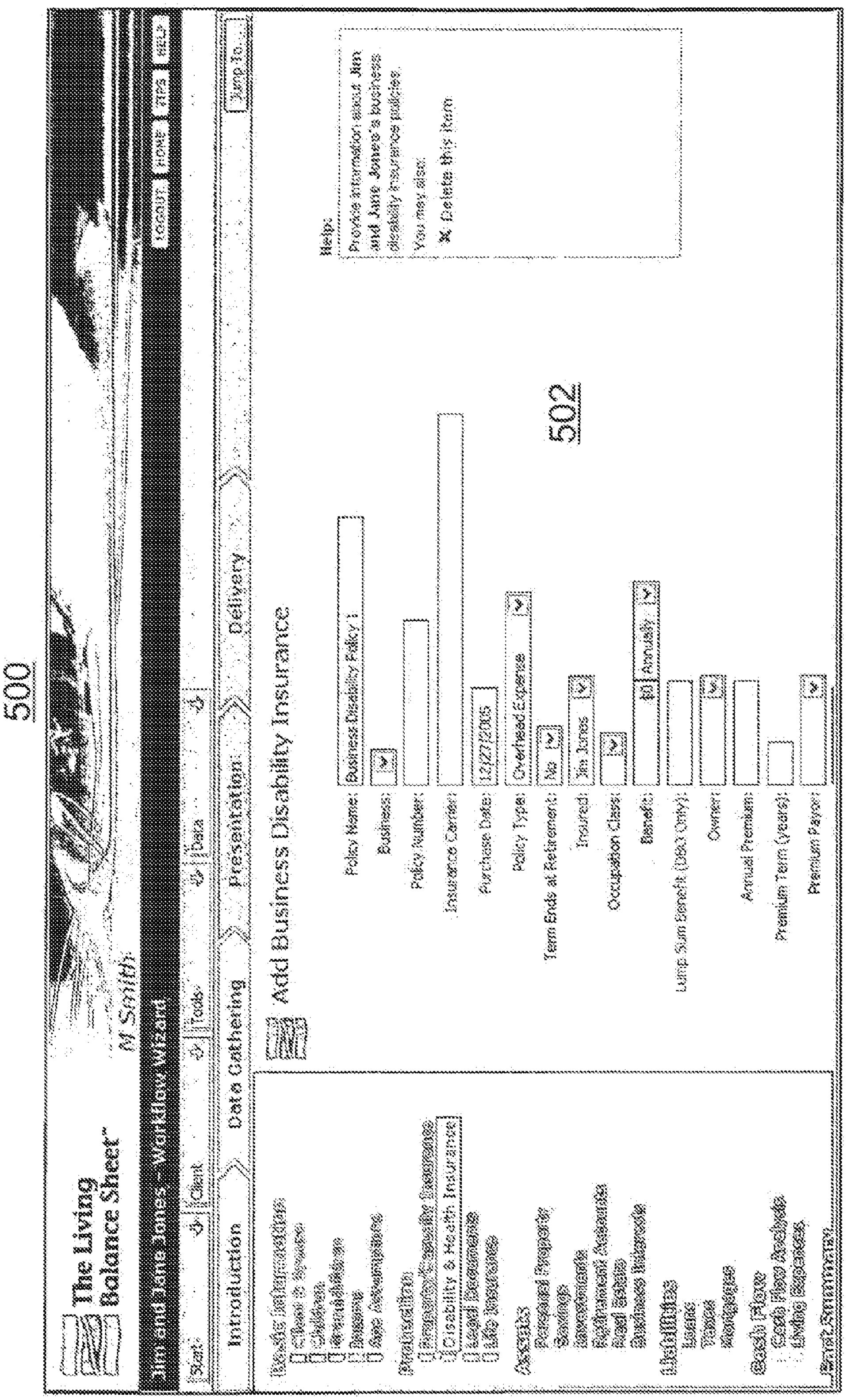
Figure 51:
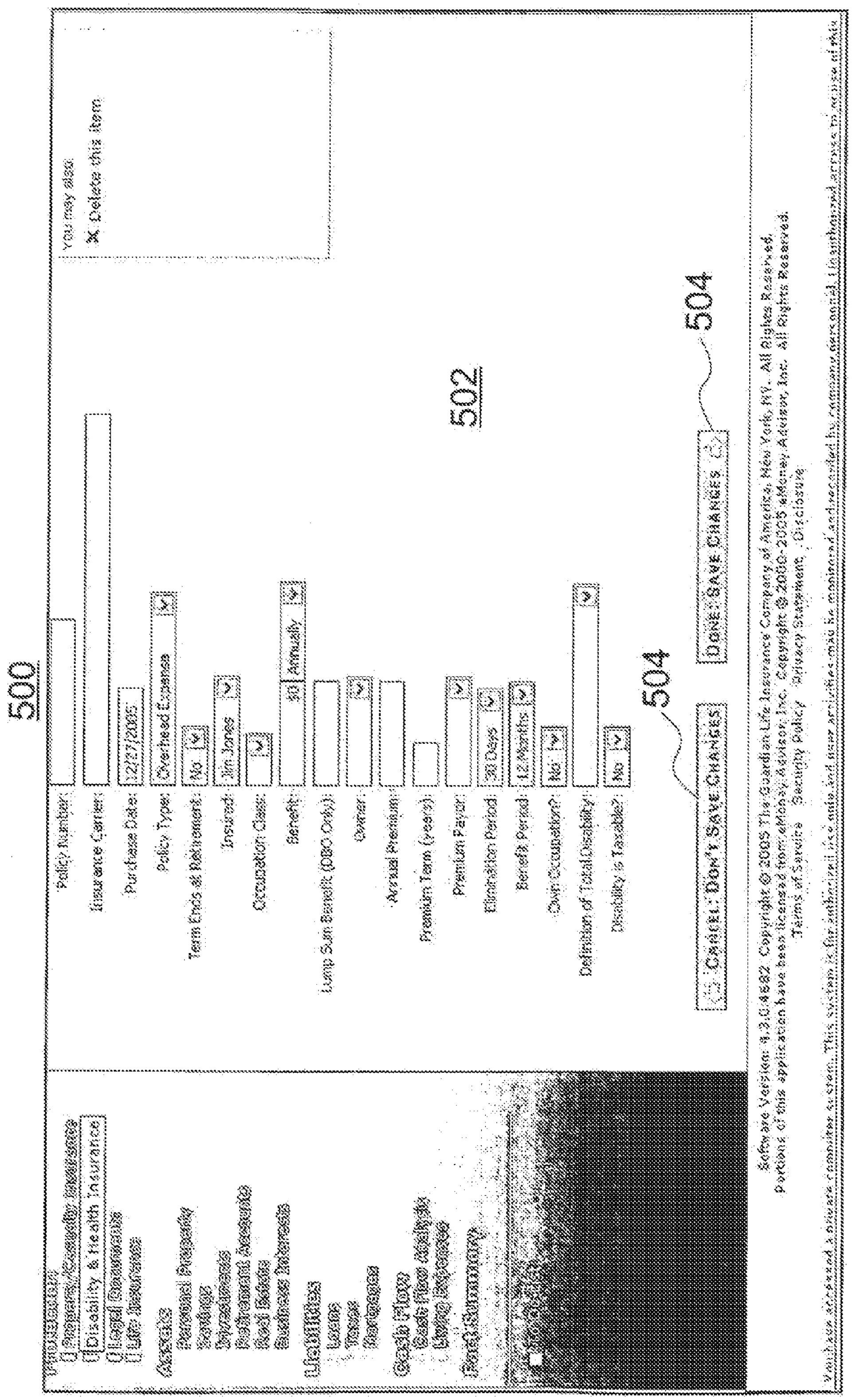
Figure 52:
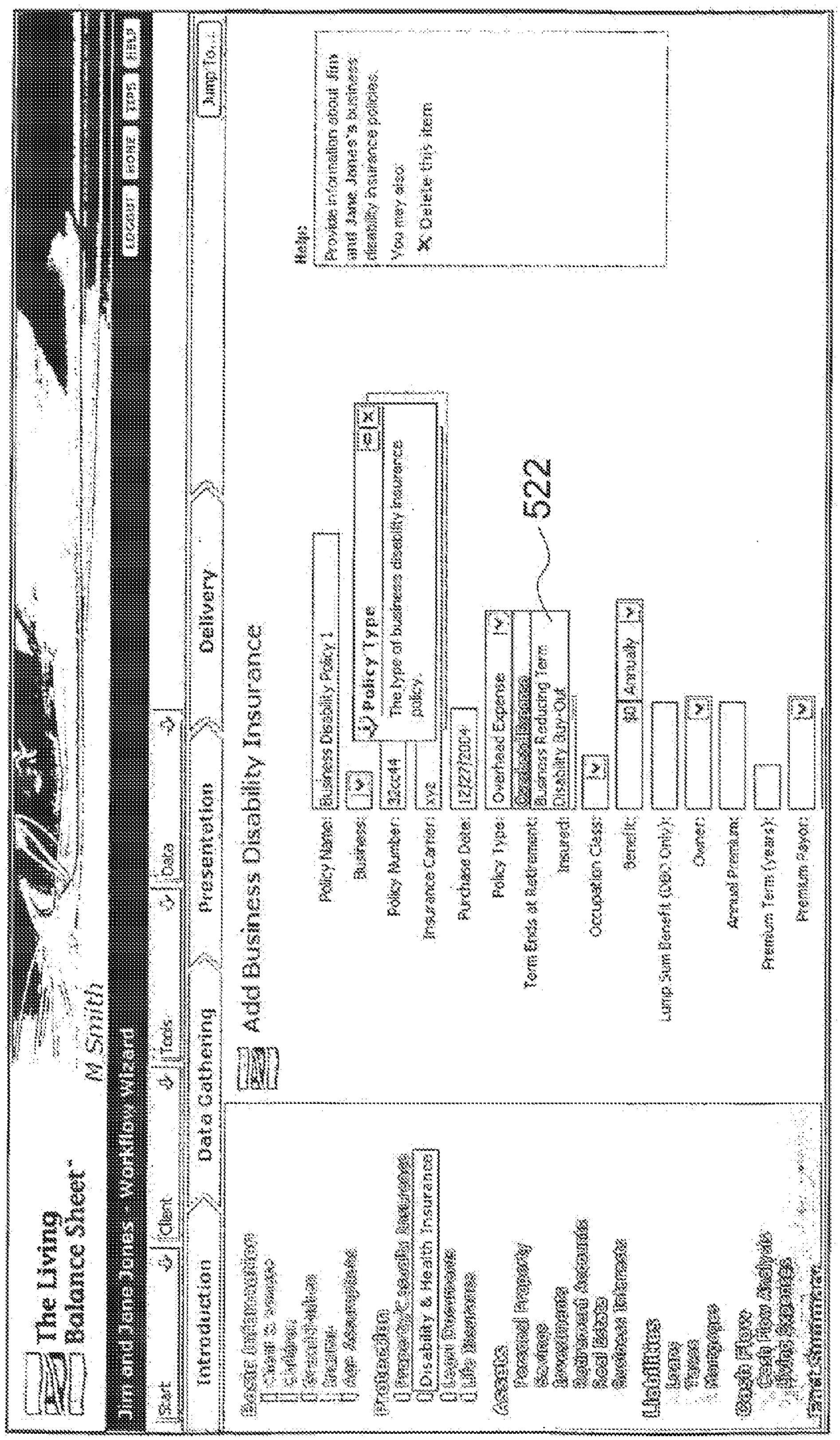
Figure 53:
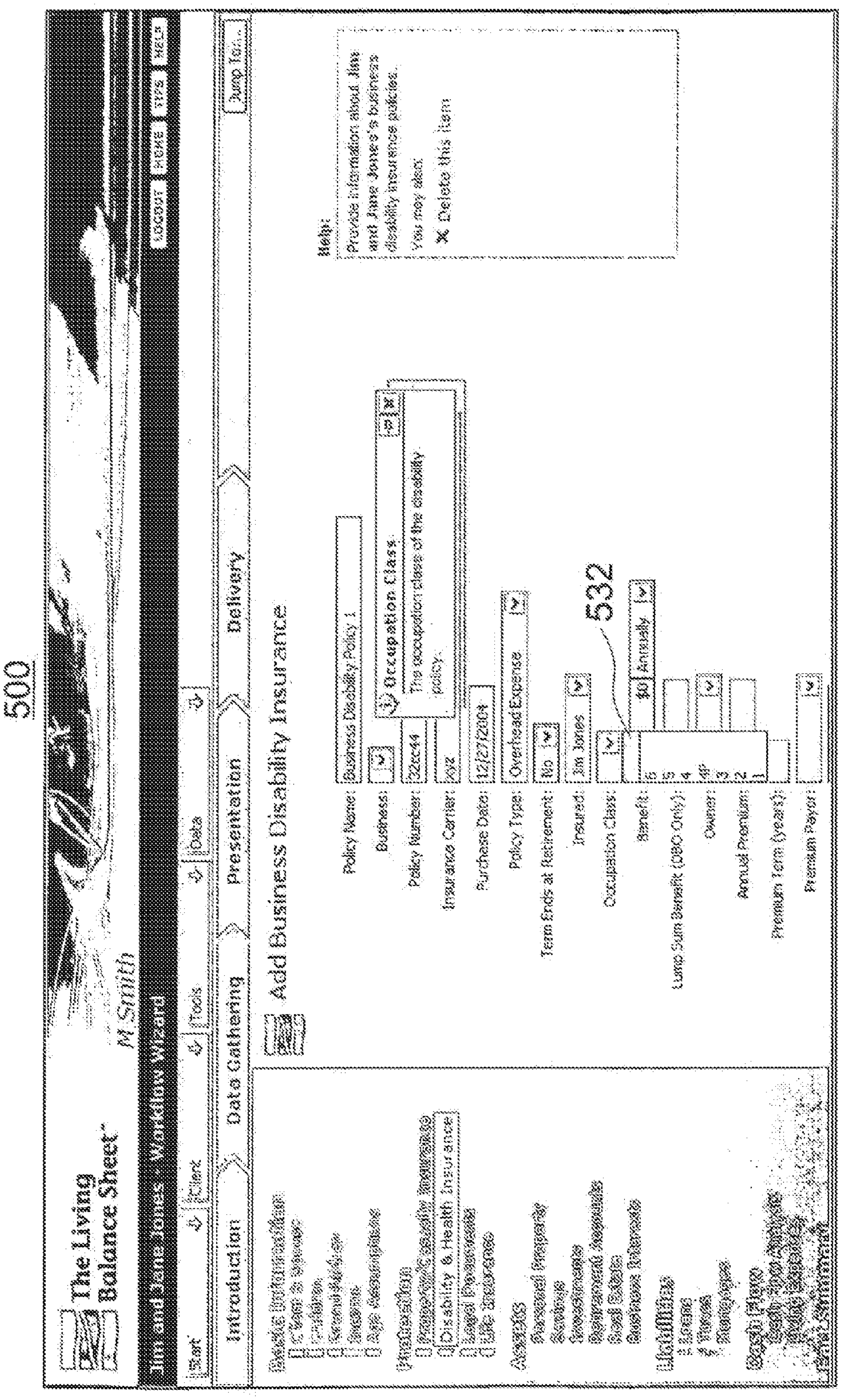
Figure 54:
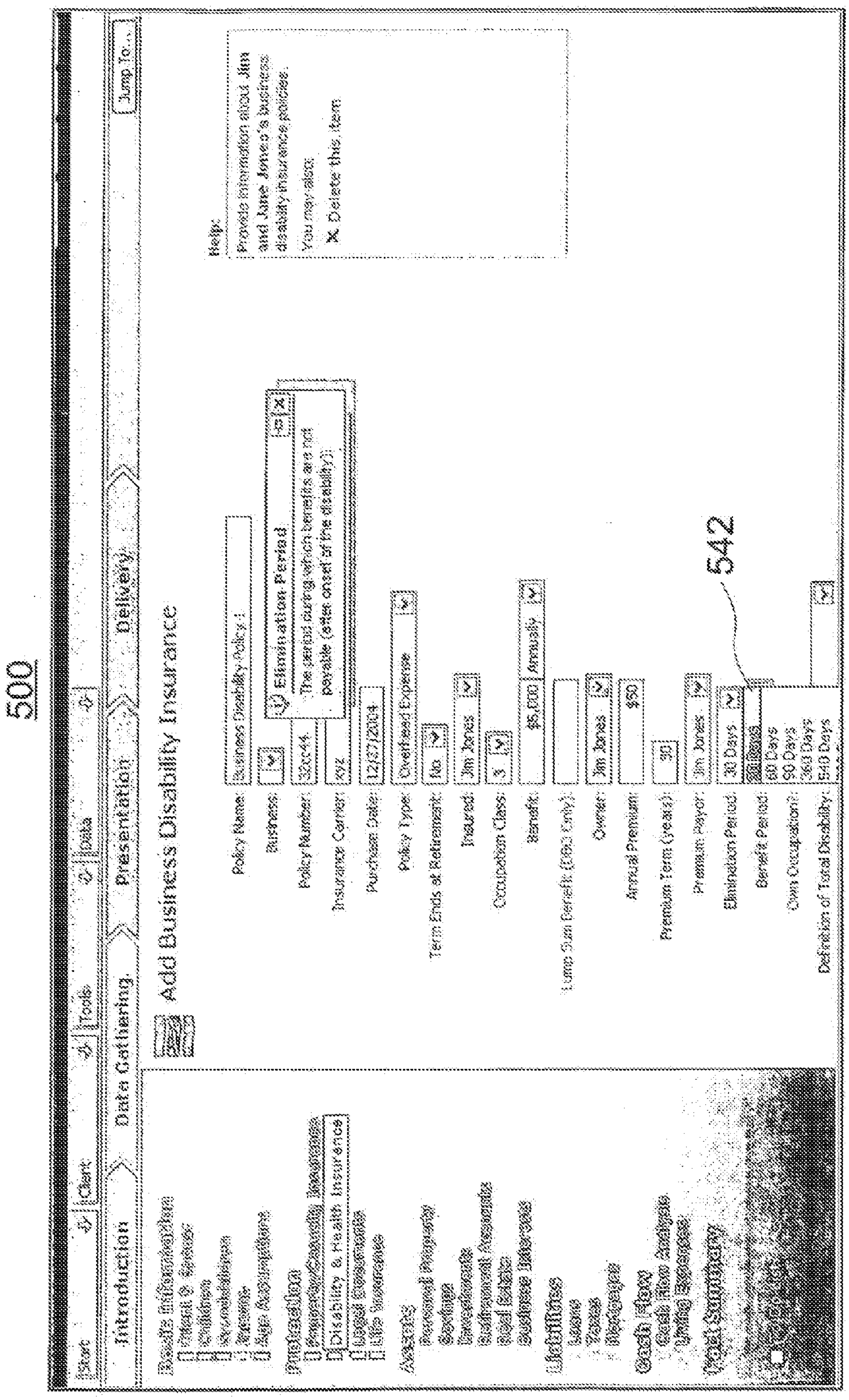
Figure 55:
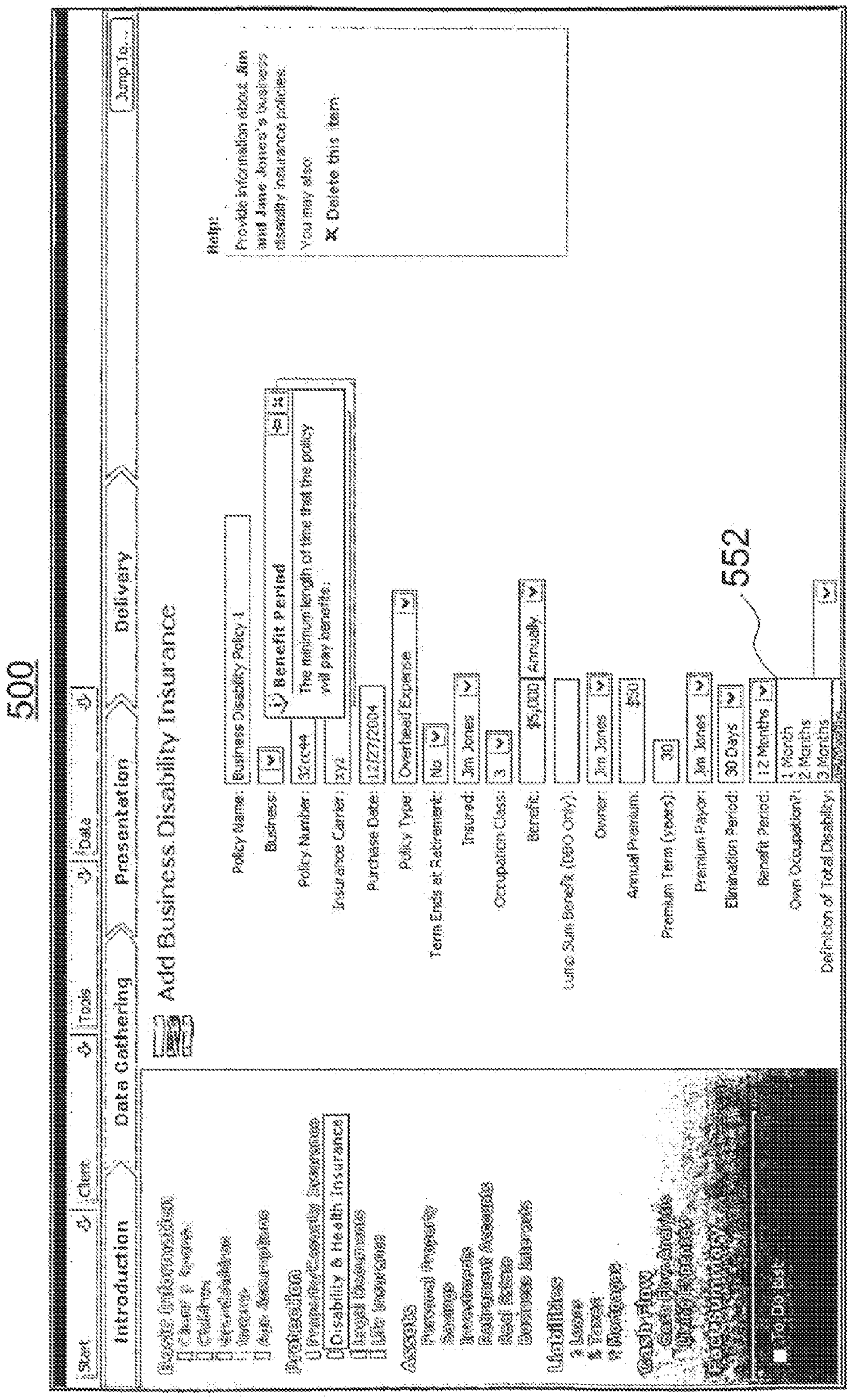

A user may also add one or more business disability insurance policies of the client. For example, add business disability insurance display page 500 of FIGS. 50 and 51 can be displayed when a user selects to add a business disability insurance policy by selecting a corresponding option in choose type display page 370 of FIG. 37. Display page 500 includes a data entry section 502 for entering information related to a business disability policy of the client. Cancel and done buttons 504 are also included in display page 500. Data entry section 502 provides the user with the opportunity to enter a policy name (which may have been automatically populated by the software with some default name), business, policy number, insurance carrier, purchase date, policy type, whether the term ends at retirement, insured, occupation class, benefit (e.g., amount and frequency), lump sum payment, owner, annual premium, premium term, premium payer, elimination period, benefit period, own occupation, definition of total disability, and whether the disability is taxable.

FIGS. 52-55 show a sequence of data entry in add business disability insurance display page 500. For example, a user can use policy type pull-down menu 522 to select the policy type of the policy to be overhead expense, business reducing term, or disability buy-out. A user can use occupation class pull-down menu 532 to select the occupation class of the disability policy, which as shown can be 1, 2, 3, 4, 4P, 5, and 6. Elimination period pull-down menu 542 can be used to select the elimination period of the policy such as to select 30, 60, 90, 260, 540 or 720 days. Benefit period pull-down menu 552 can be used to select the minimum length of time that the policy will pay benefits, which as shown can be 1, 2, 3, 12, 24, and 36 months.

Figure 57:
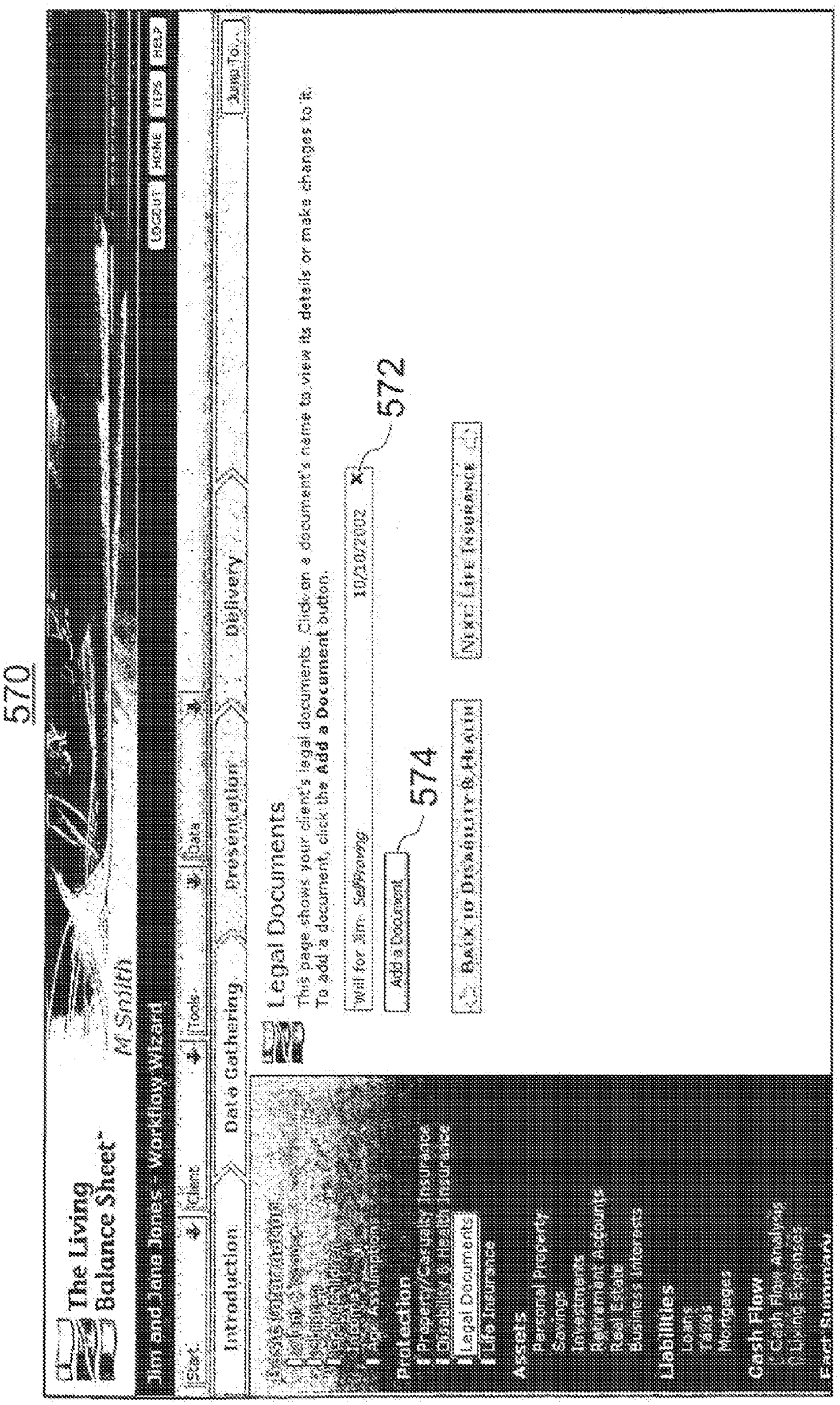

The next subsection in the protection section of the Workflow Wizard®, as shown, is the legal documents section. For example, when a user selects next button 486 of FIG. 48, legal documents display page 560 can be displayed. Legal documents display page 560 can provide the user with the opportunity to add one or more legal documents and to display a summary of already added legal documents. For example, as shown in FIG. 57, legal documents display page 570 includes a summary including selectable summary item 572 for a legal document that a user previously added using for example add comment button 574. The summary item can include the name of the document and information related to the documents such as whether a will is self proving. Each item in the summary can be used to select a legal document and to change and update the related information for that document.

Figure 58:
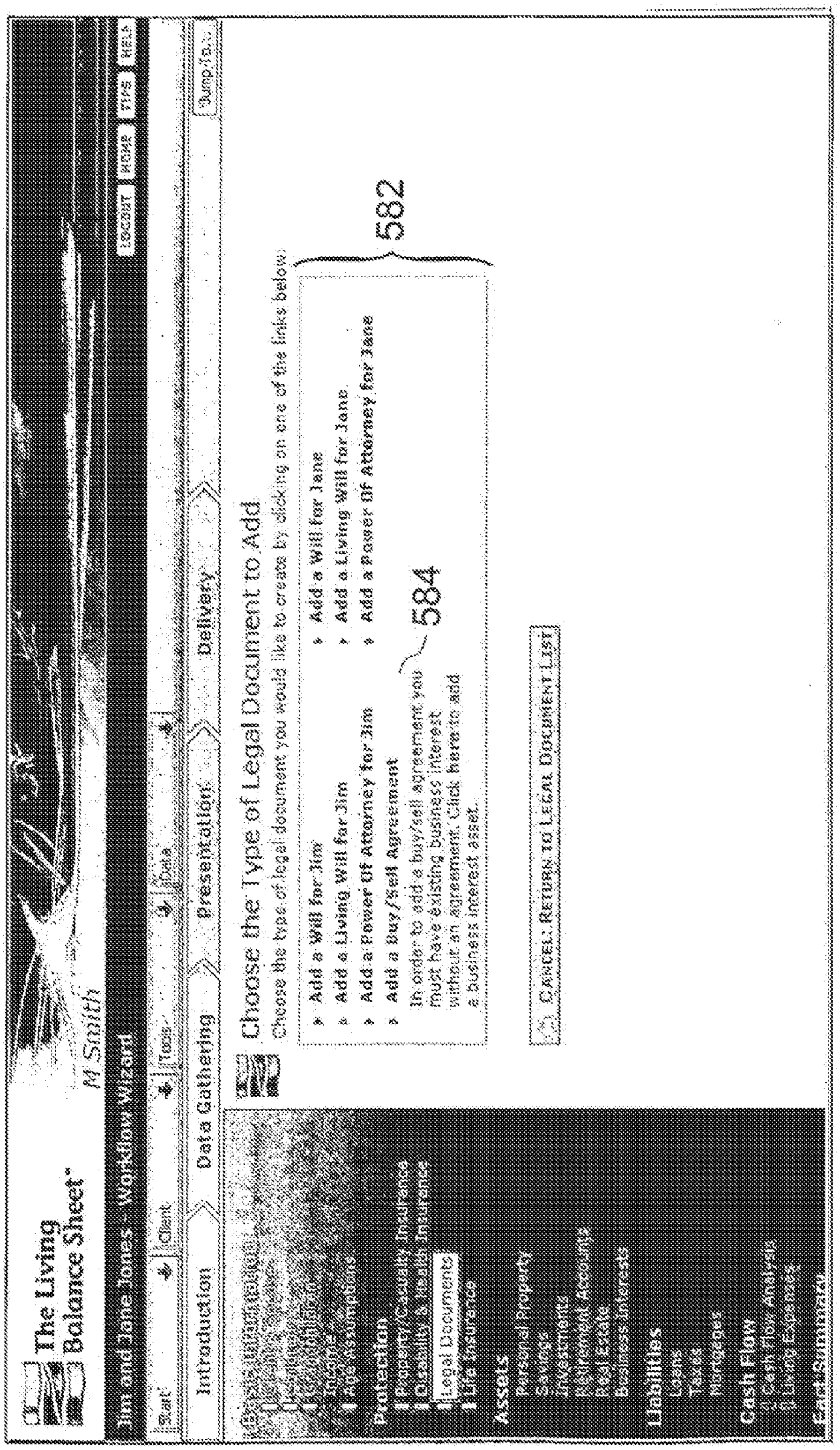

Type of legal document display page 580 of FIG. 58 can be displayed when a user, for example, selects add a document button 574 of FIG. 57. Display page 580 includes options 582 for selecting different types of legal documents (e.g., a will, a living will, a power of attorney, an agreement, etc.). The options can be automatically customized for the client such that for example there would be specific options listed for the client (e.g., add a will for Jim) and for the spouse (e.g., add a will for Jane). Note that the option for adding a buy/sell agreement requires that the client information already reflect an existing business interest. As such, add agreement option 584 includes a link for adding a business interest so that option 584 can be used.

Figure 59:
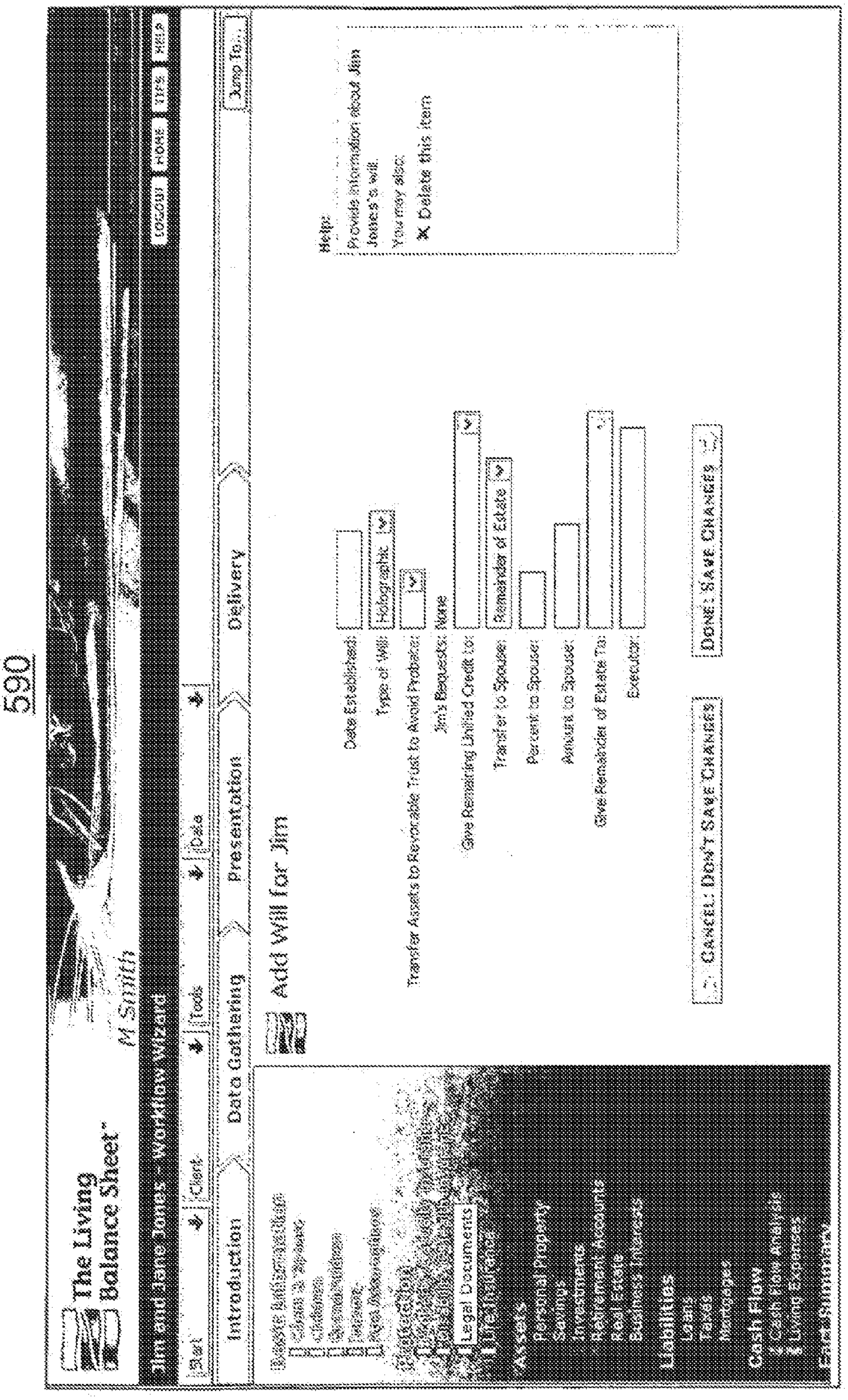
Figure 60:
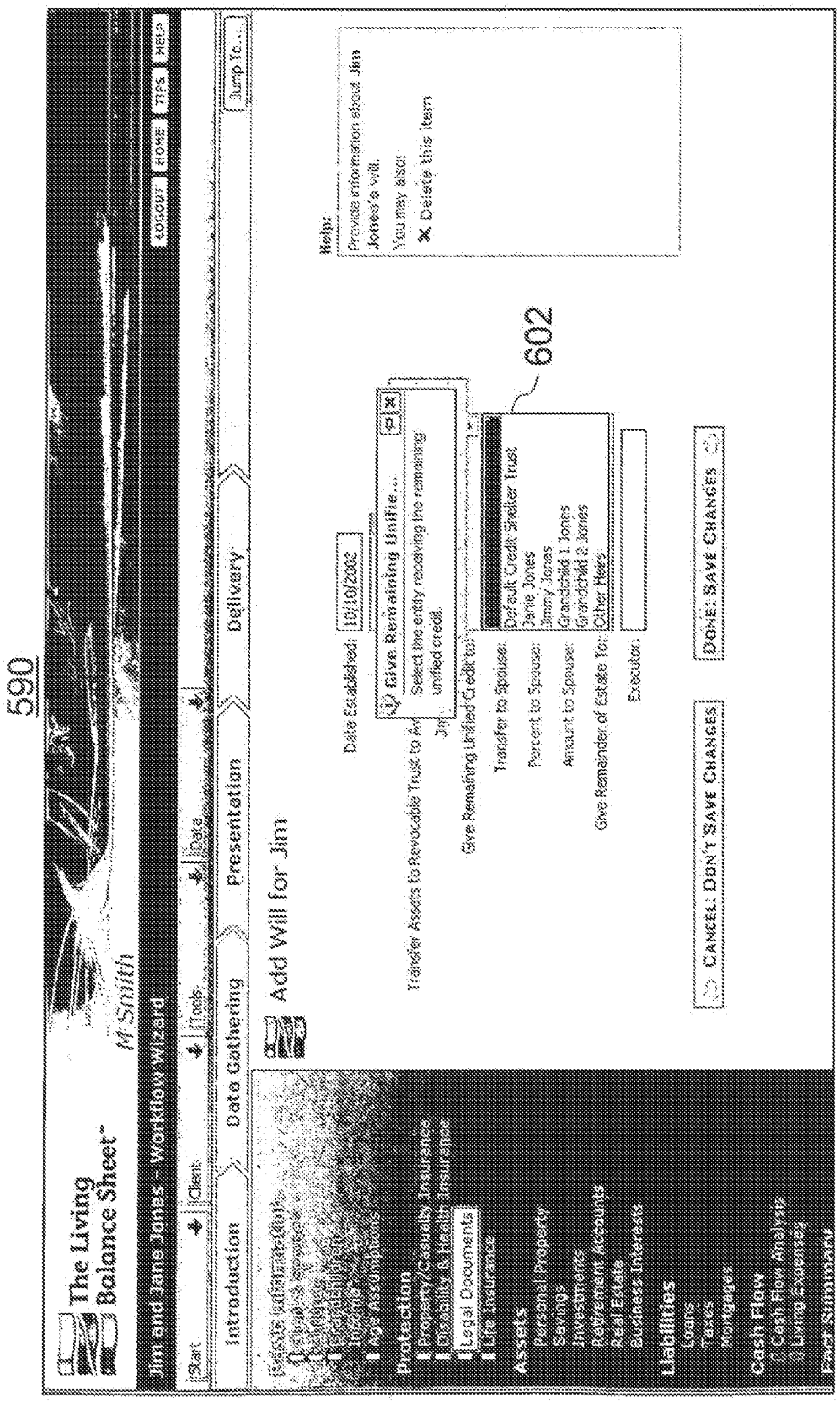
Figure 61:
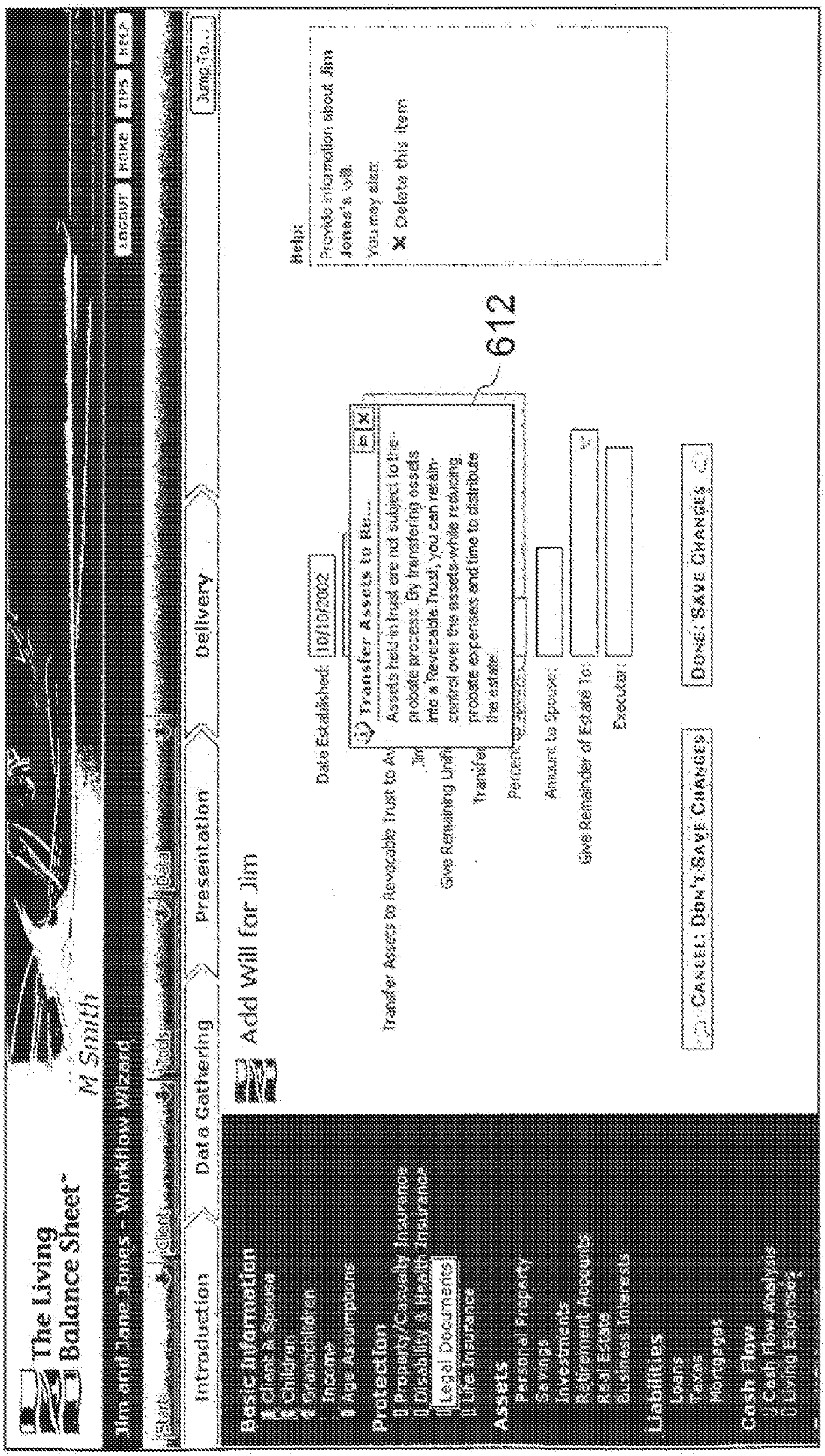

Add will for client display page 590 of FIGS. 59-61 can be displayed when a user selects the option of adding a will for the current client ("Jim") from option 582 of FIG. 58. Display page 590 includes data entry fields and menus for the client's will related information such as data established, type of will, whether it includes a transfer of assets to an irrevocable trust, the client's bequests, identifying who to give the remaining unified credit, identifying of what is to be transferred to spouse (e.g., remainder, percentage, amount), who to give the remainder of the estate to, and the executor. For example, a user can select pull-down menu 602 to select the entity that is to receive the remaining unified credit such as by selecting, as shown, a default credit shelter trust, the spouse, individual children or grandchildren, or other heirs. As previously discussed, pop-up tips such as tip 612 can be automatically displayed to educate and assist the user in the data entry process. As shown, tip 612 clarifies the meaning of the data entry option for transferring assets to a revocable trust.

Figure 62:
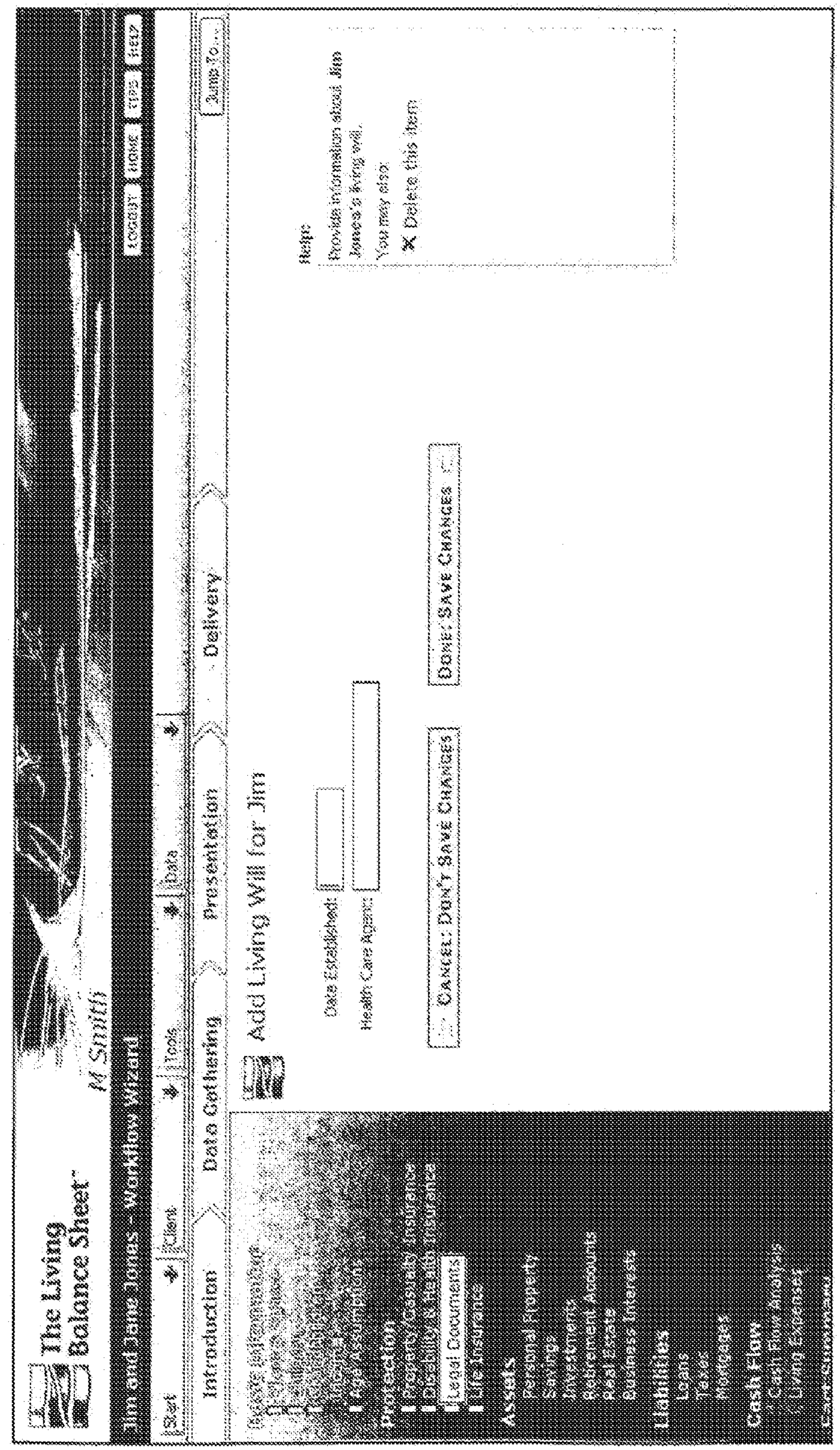
Figure 63:
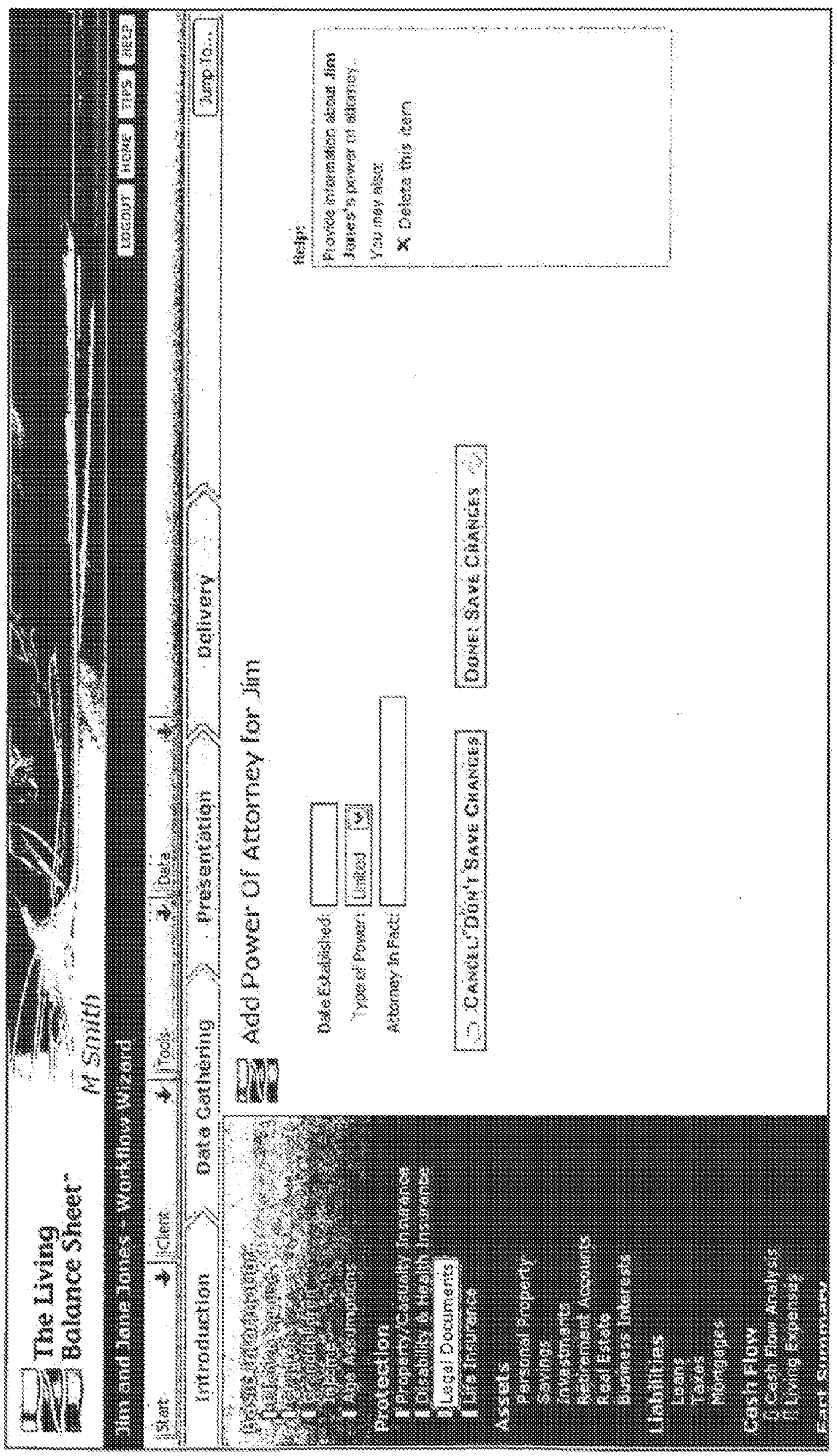
Figure 64:
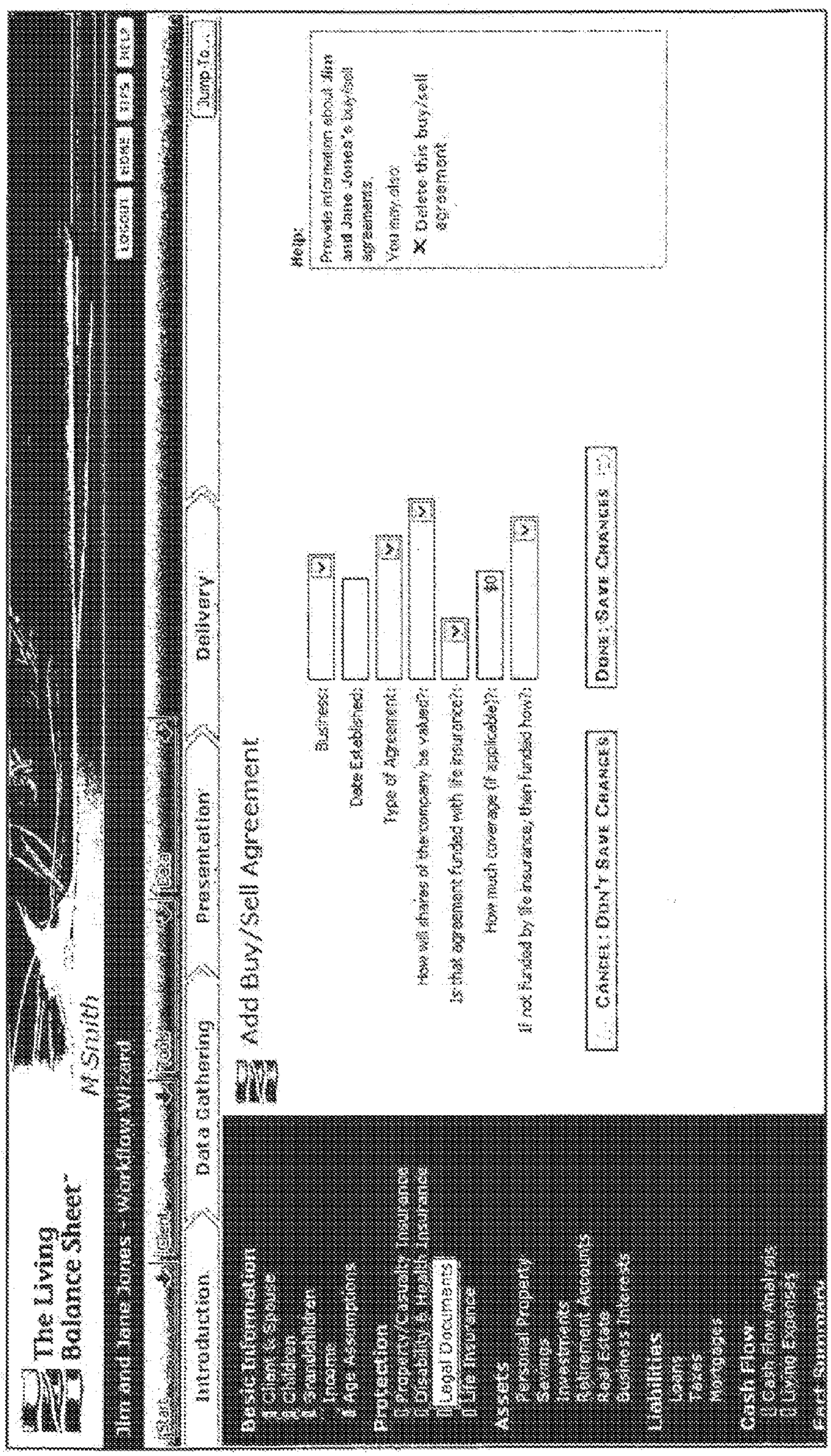

Add living will for client display page 620 of FIG. 62 can be displayed when a user selects that option from display page 580 of FIG. 58. Display page 620 can be used to enter living will related information for the client such as the date established and the health care agent. Add power of attorney for client display page 630 of FIG. 63 can be displayed when a user selects that option from display page 580 of FIG. 58. Display page 630 can be used to enter power of attorney related information for the client such as the date established, type of power, and attorney in fact. Add buy/sell agreement display page 640 of FIG. 64 can be displayed when a user selects that option from display page 580 of FIG. 58. Display page 640 can be used to enter buy/sell business agreement related information for the client such as the business, date established, type of agreement, how will shares of company be valued, is the agreement funded with life insurance, the coverage (if applicable), and how funded.

Figure 56:
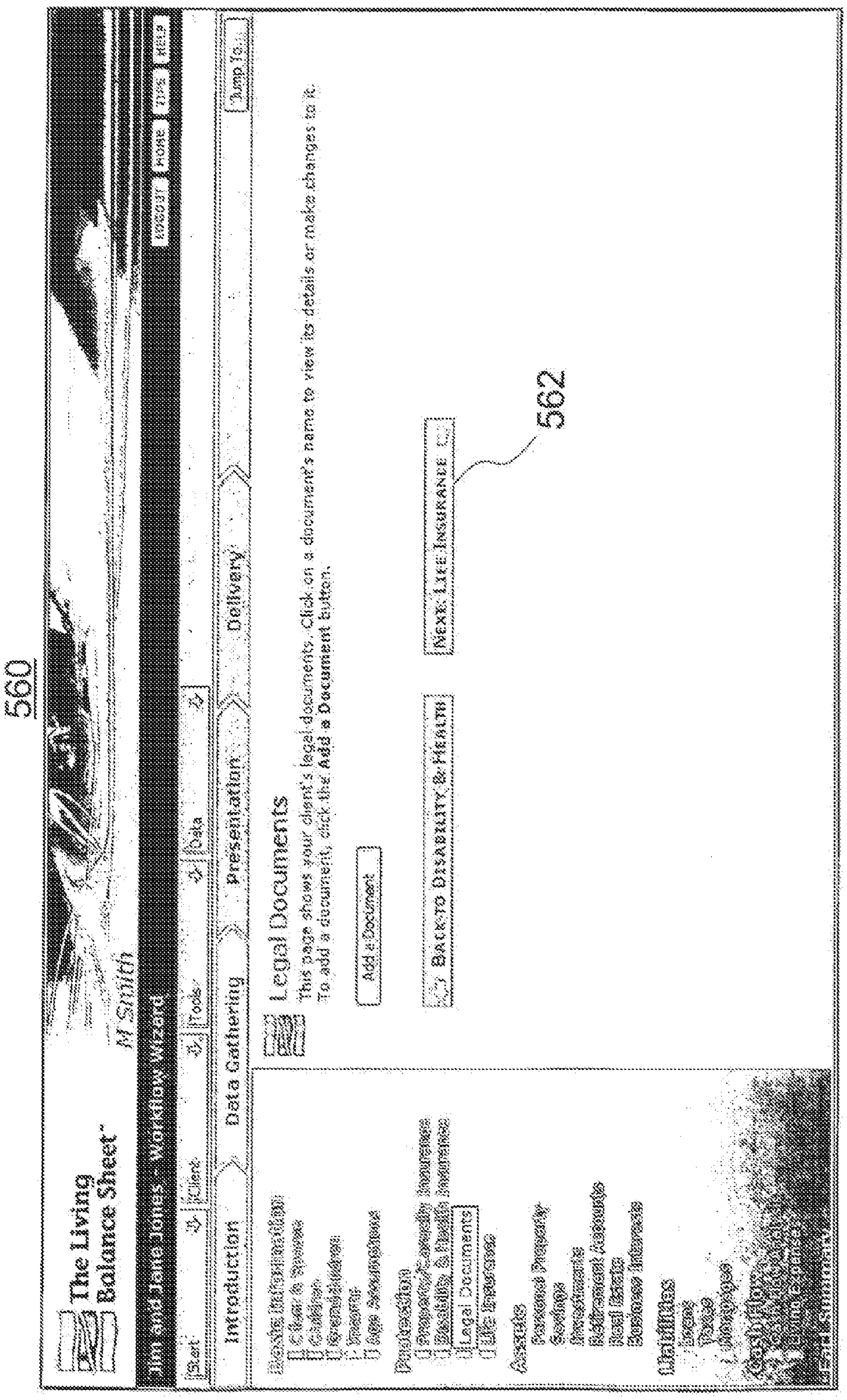
Figure 65:
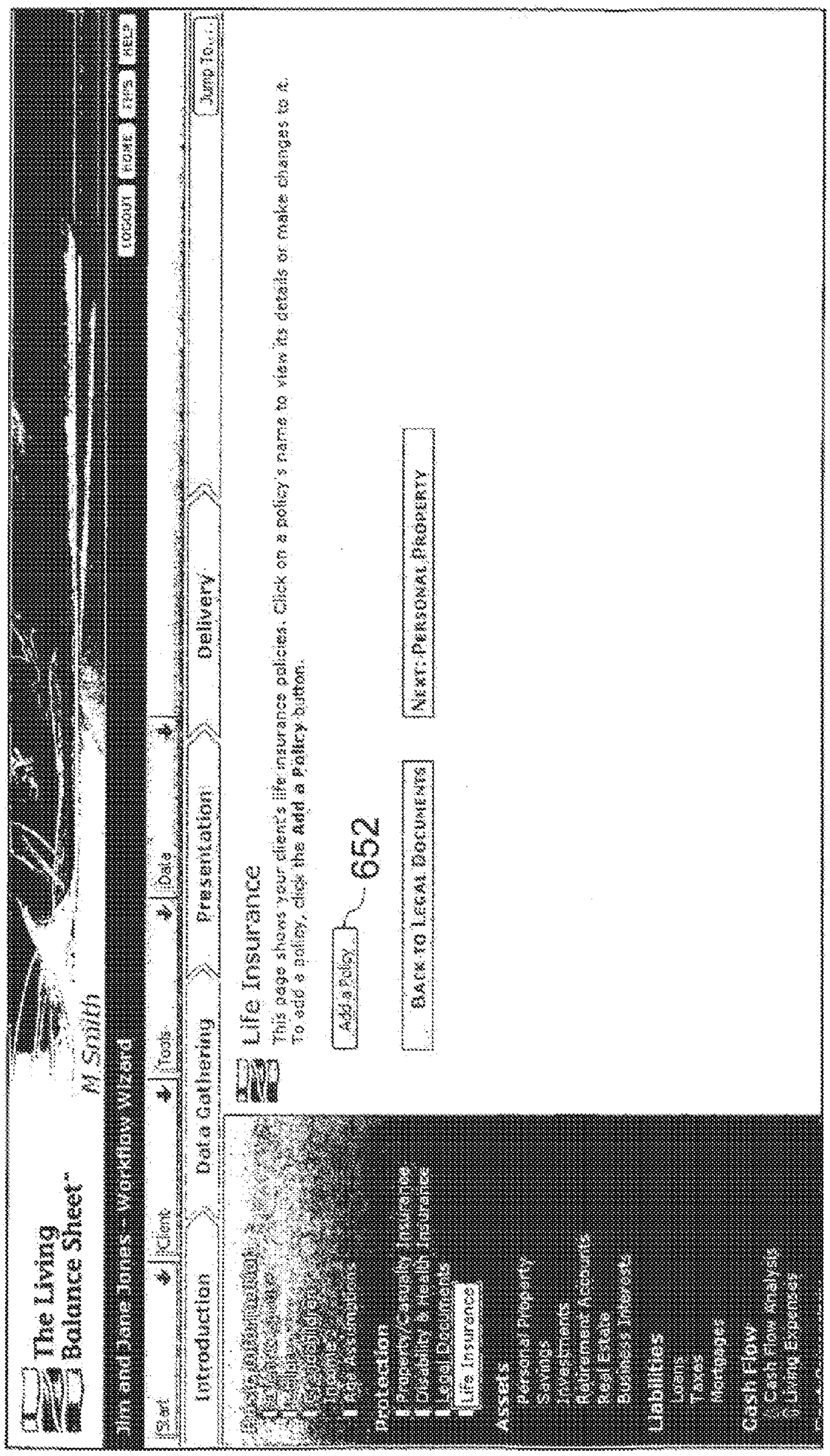
Figure 66:
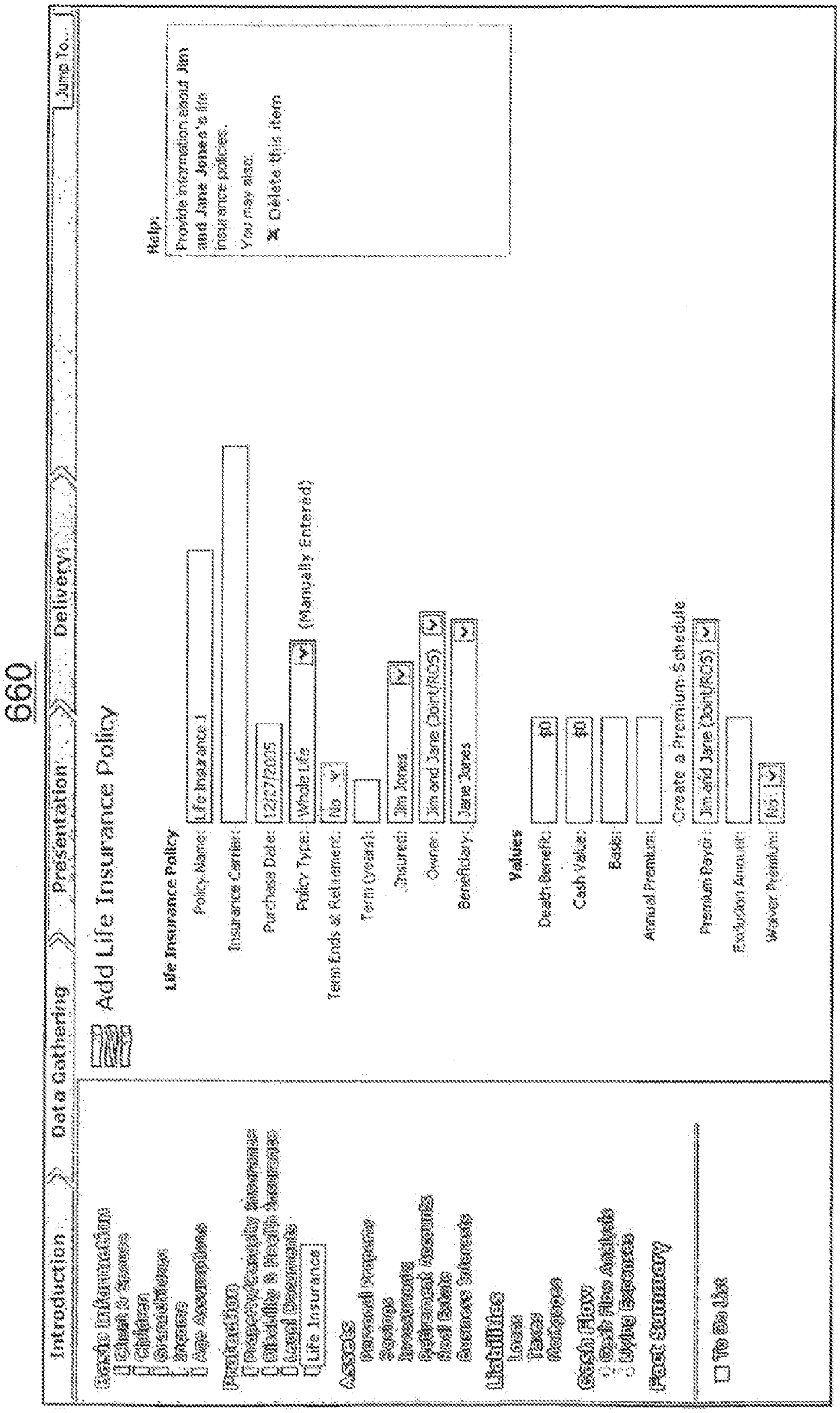
Figure 67:
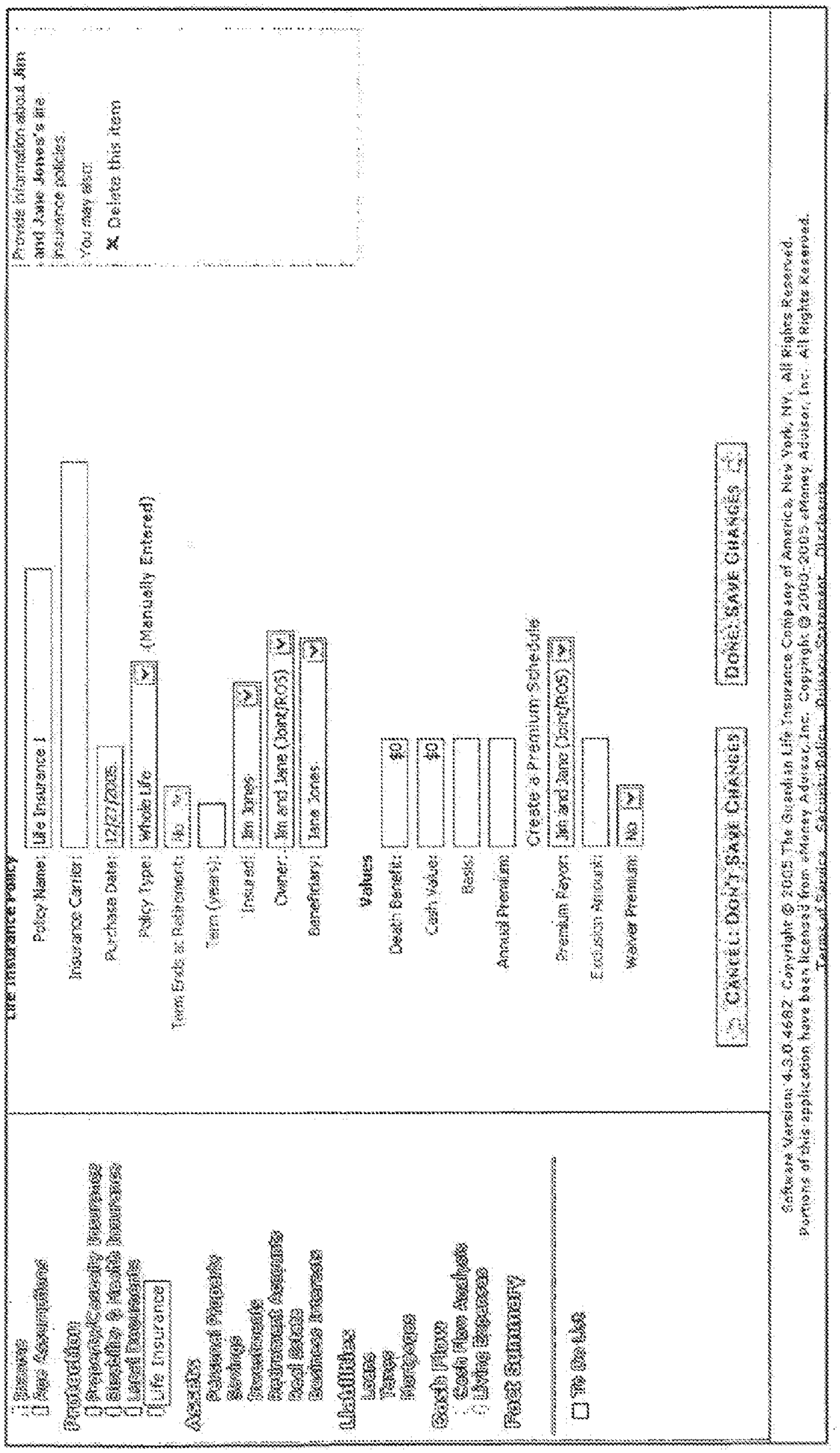
Figure 68:
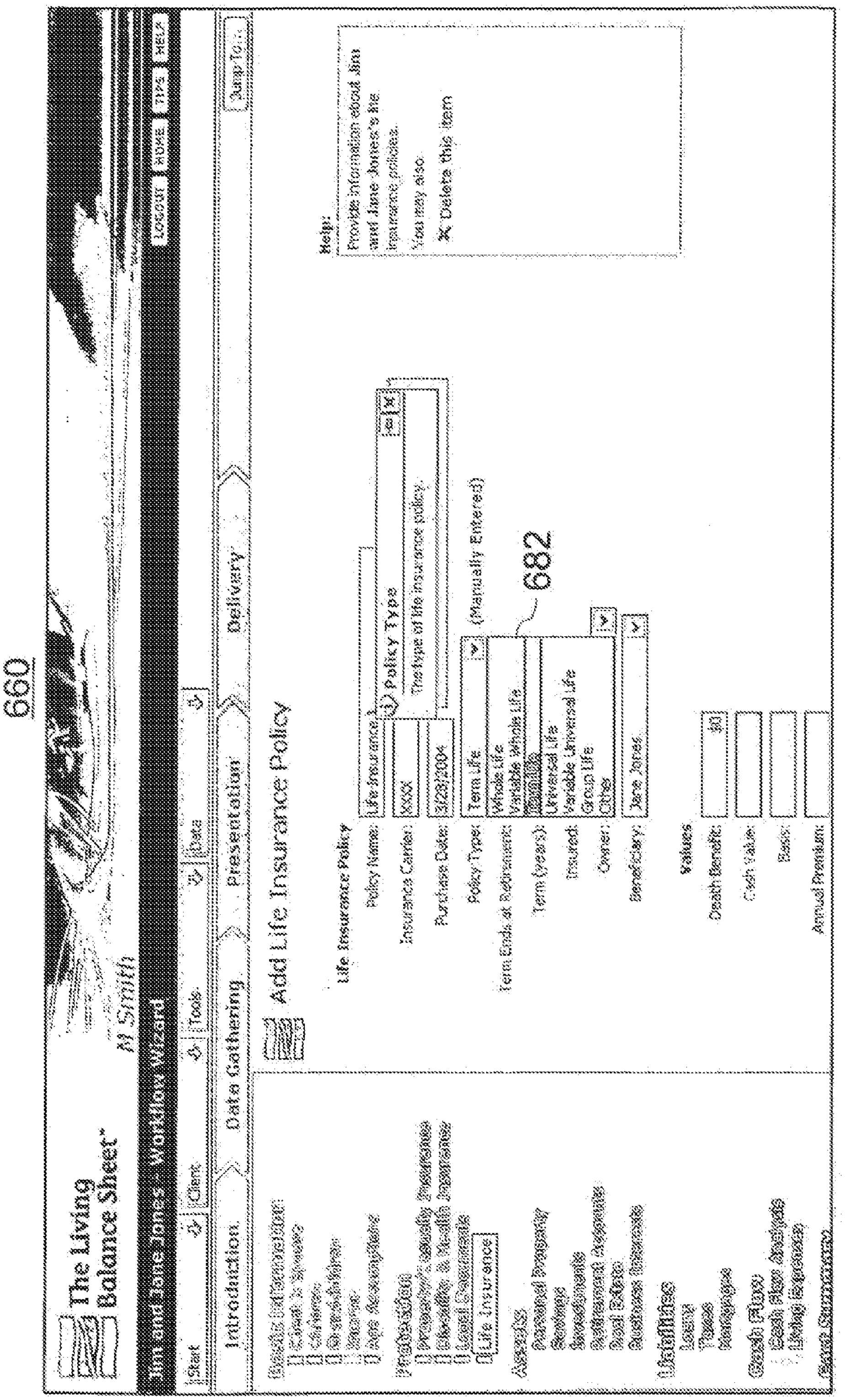

The next subsection in the protection section of the Workflow Wizard®, as shown, is the life insurance section. For example, when a user selects next button 562 of FIG. 56, life insurance display page 650 of FIG. 65 can be displayed. Life insurance display page 650 can provide the user with the opportunity to add one or more life insurance policies and to display a summary of any already added insurance policies. Add life insurance policy display page 660 of FIGS. 66-68 can be displayed when a user selects add a policy button 652 of FIG. 65. Add life insurance policy display page 660 provides the user with an opportunity to enter life insurance policy related information for a client. For example, as shown, display page 660 can include data entry fields and options for entering a policy name, insurance carrier, purchase date, policy type, term ends at retirement (if applicable), term, insured, owner, beneficiary, death benefit, cash value, basis, annual premium, premium payer, exclusion amount, and premium waiver. The menu options can include policy type 682 of FIG. 68 that allows the user to select the policy type to be whole life, variable whole life, term life, universal life, variable universal life, group life, and other. When the user saves the entered information, the life insurance display page can be displayed such as display page 690 of FIG. 69, which now reflects the addition of the life insurance policy 692 that was accomplished using add life insurance display page 660 of FIGS. 66-68. Summary item 692 includes details with respect to the insurance such as the policy type and death benefit. A user can select item 692 to access a change display page to update or change the items of saved information.

Figure 69:
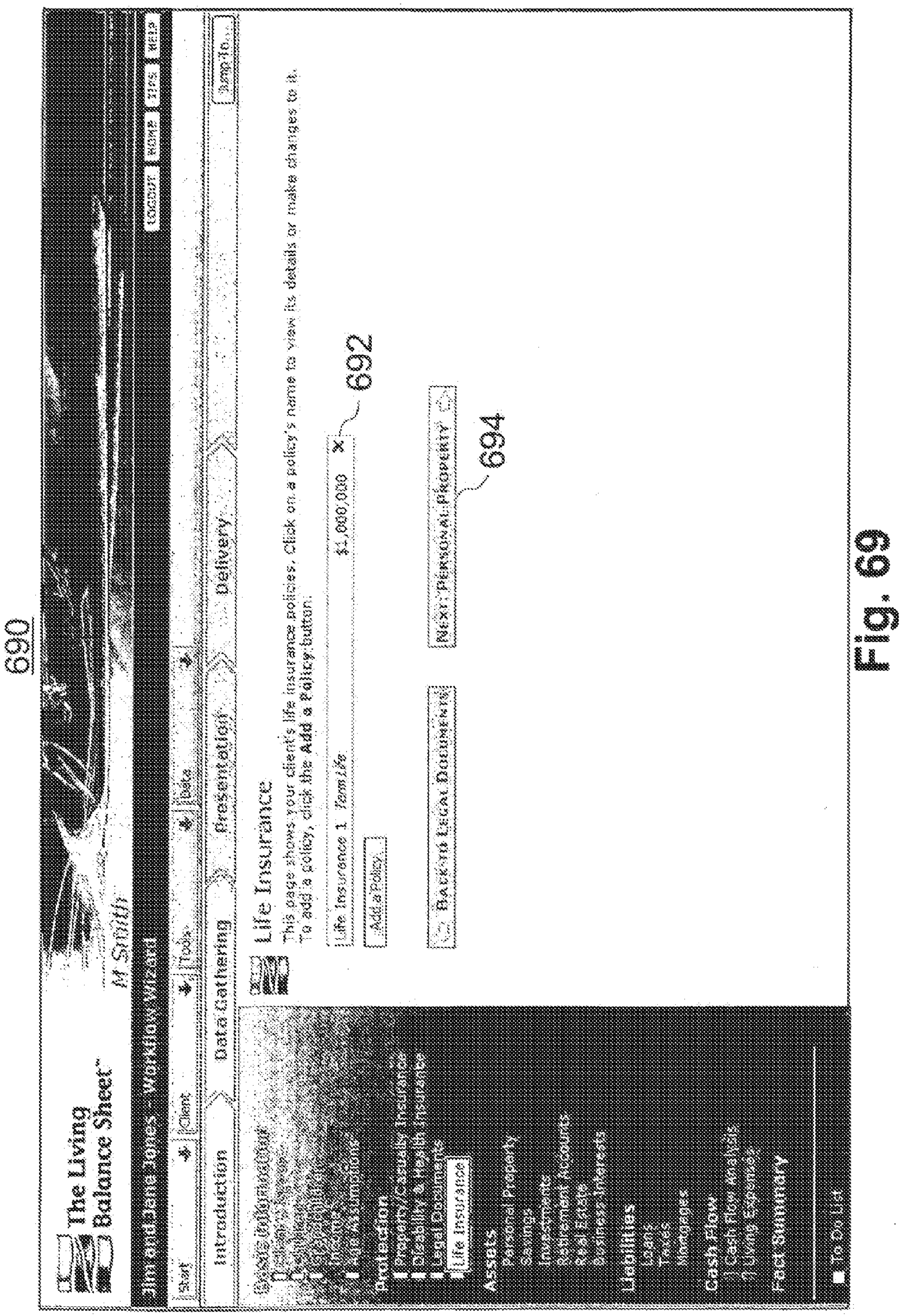
Figure 70:
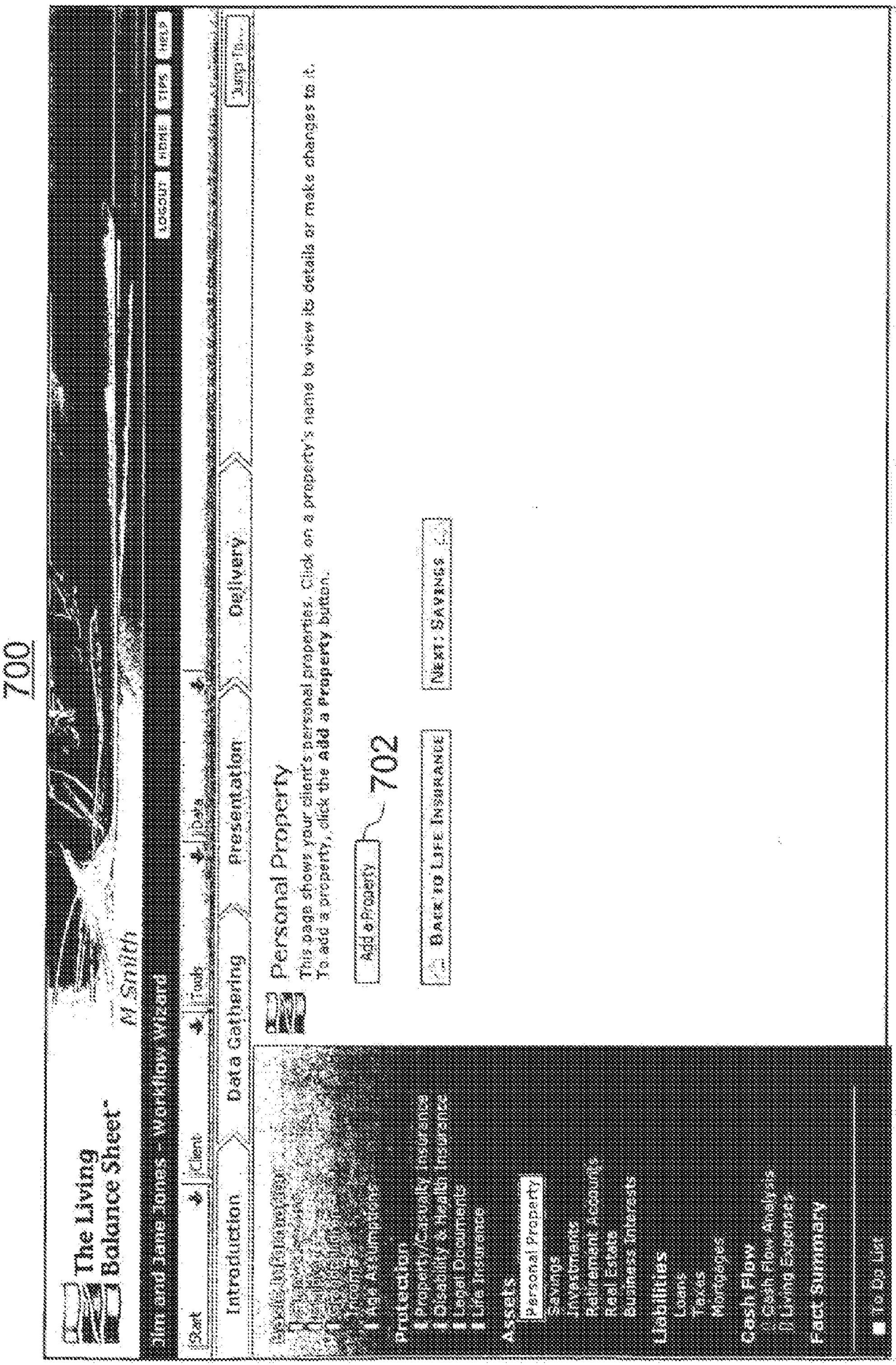
Figure 71:
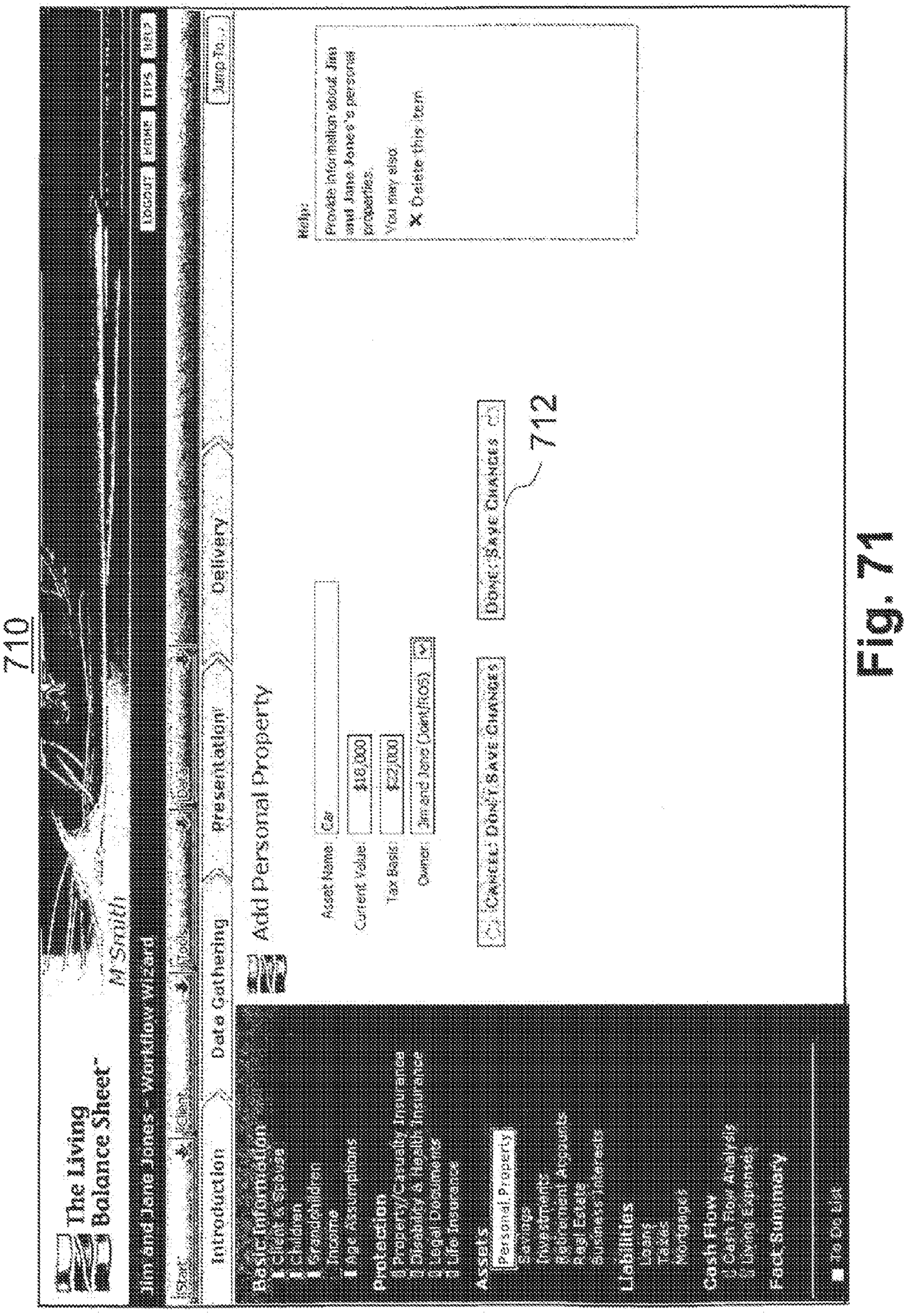

By selecting next button 692 of FIG. 69, a user can move to personal property display page 700 of FIG. 70, which corresponds to the "personal property" subsection of the assets section. Personal property display page 700 is preferably structured in the same way other initial or top-level subsection display pages (e.g., capability of a summary list and a button for adding new items) such as life insurance display page 690 of FIG. 69, legal documents display page 560 of FIG. 56, disability and health insurance display page 480 of FIG. 48, income display page 260 of FIG. 26. Add personal property display page 710 of FIG. 71 can be displayed when a user selects add a property button 702 of FIG. 70. Add personal property display page 710 includes a section for entering details related to a particular personal property of the client. As shown, the user can enter an asset name, current value, tax basis, and owner. By selecting done button 712, the user can add the property to the client's information and save the related information. In response, the user would be returned to personal property display page 700 of FIG. 70, which would be updated in the summary section to show the addition of the new personal property and for possibly repeating the process to add other personal property items. For example as shown in personal property display page 720 of FIG. 72, the user has added two personal property items that are reflected in summary section 722. A user can select one of the summary items in that section to access a change personal property display page to update or to change the data that was previously entered for that particular personal property. Summary section 722 can, for example, display the name of the personal property, the personal property type, and current value, as shown.

Figure 72:
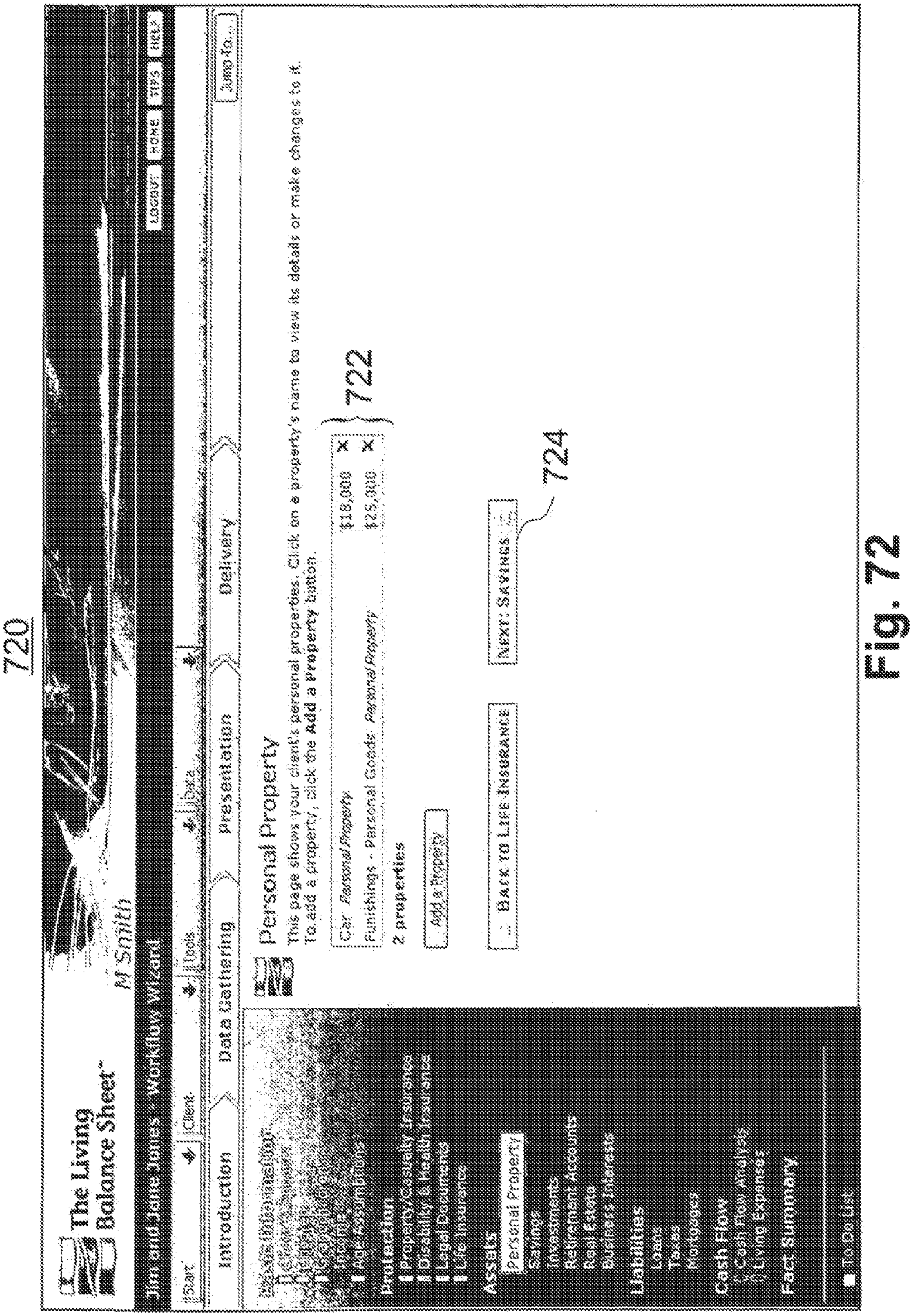
Figure 73:
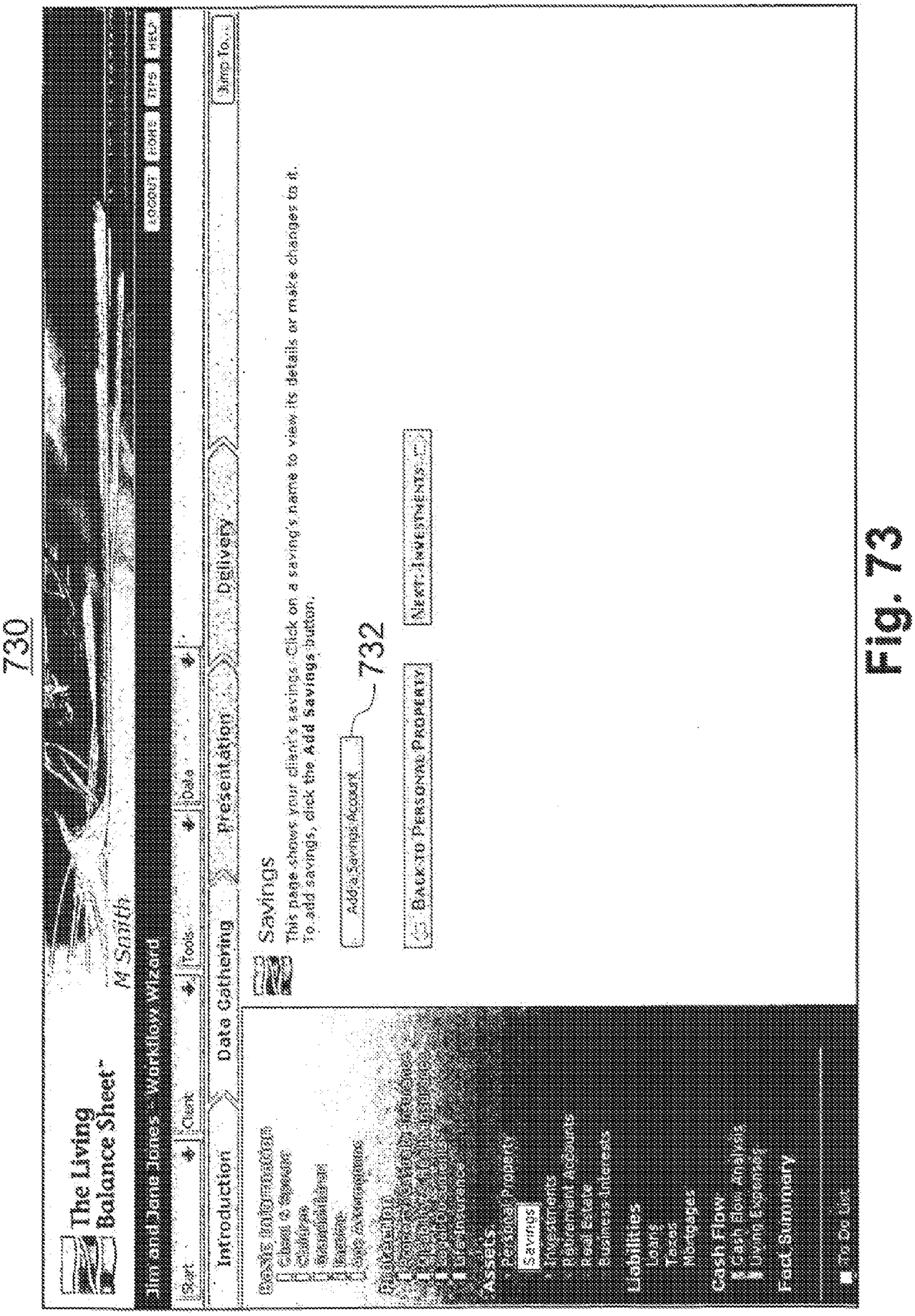
Figure 74:
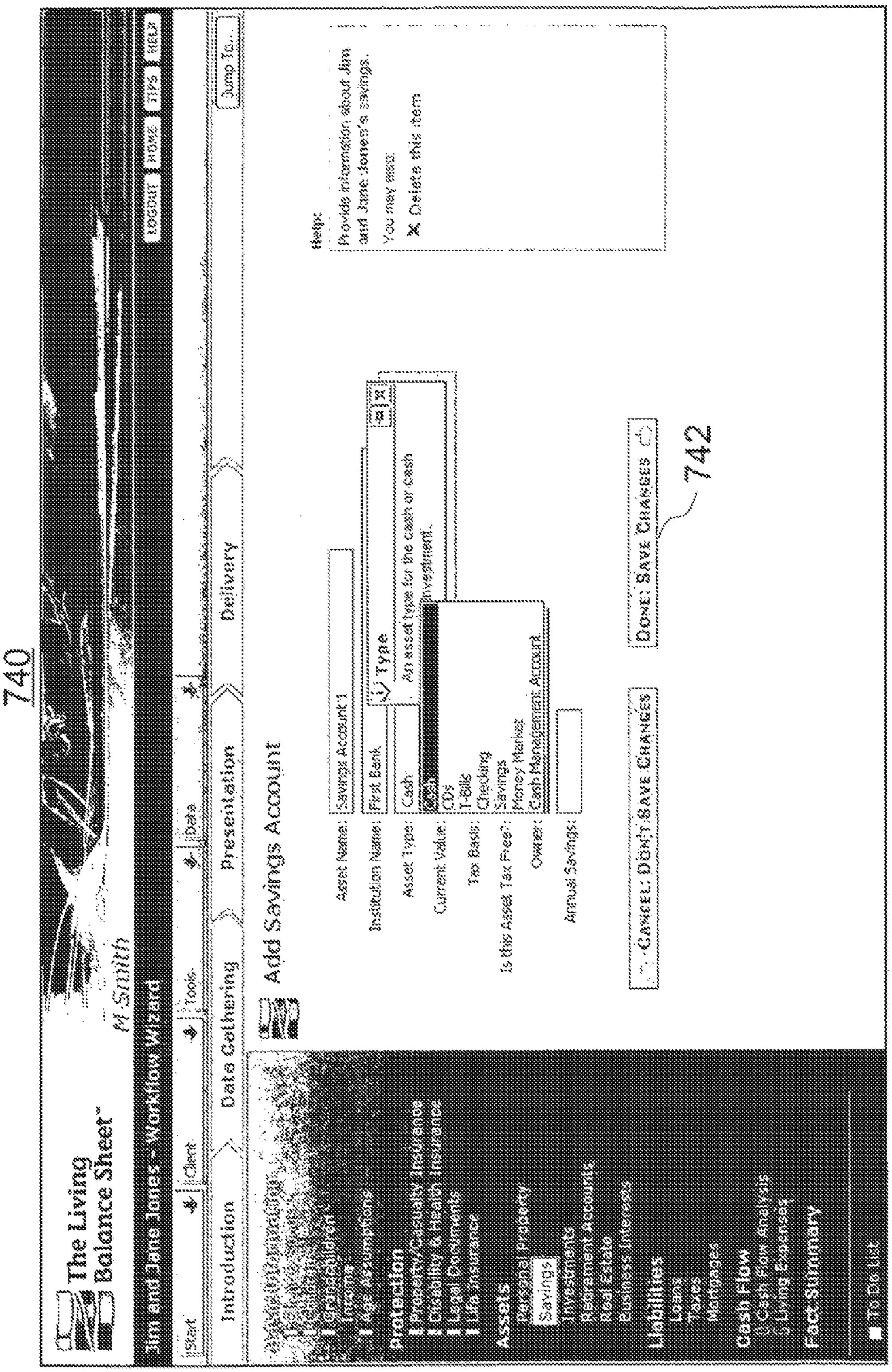

By selecting next button 724 of FIG. 72, a user can move to savings display page 730 of FIG. 73, which as shown corresponds to the "savings" subsection of the assets section. Savings display page 700 is preferably structured in the same way as other initial or top-level subsection display pages (e.g., capability of a summary list and a button for adding new items) such as life insurance display page 690 of FIG. 69, legal documents display page 560 of FIG. 56, disability and health insurance display page 480 of FIG. 48, income display page 260 of FIG. 26. Add savings display page 740 of FIG. 74 can be displayed when a user selects add a property button 732 of FIG. 73. Add savings display page 740 includes a section for entering details related to a particular personal property of the client. As shown, the user can enter an asset name, institution name, asset type (e.g., using a pull-down menu that includes cash, CDs, T-Bills, checking, savings, money market, and cash management account), current value, tax basis, whether the asset is tax-free, owner, and annual savings (e.g., the projected annual savings). By selecting done button 742, the user can add the property to the client's information and save the related information. In response, the user would be returned to savings display page 730 of FIG. 73, which would be updated in the summary section to show the addition of the new savings account and which could be used to repeat the process for adding other savings accounts. For example, as shown in savings display page 750 of FIG. 75, the user has previously added two savings accounts that are reflected in summary section 722. A user can select one of the summary items in that section to access a change savings display page to update or change the data that was previously entered for that particular personal property. Summary section 752 can, for example, display the name of the savings account, the type, and current value, as shown.

Figure 75:
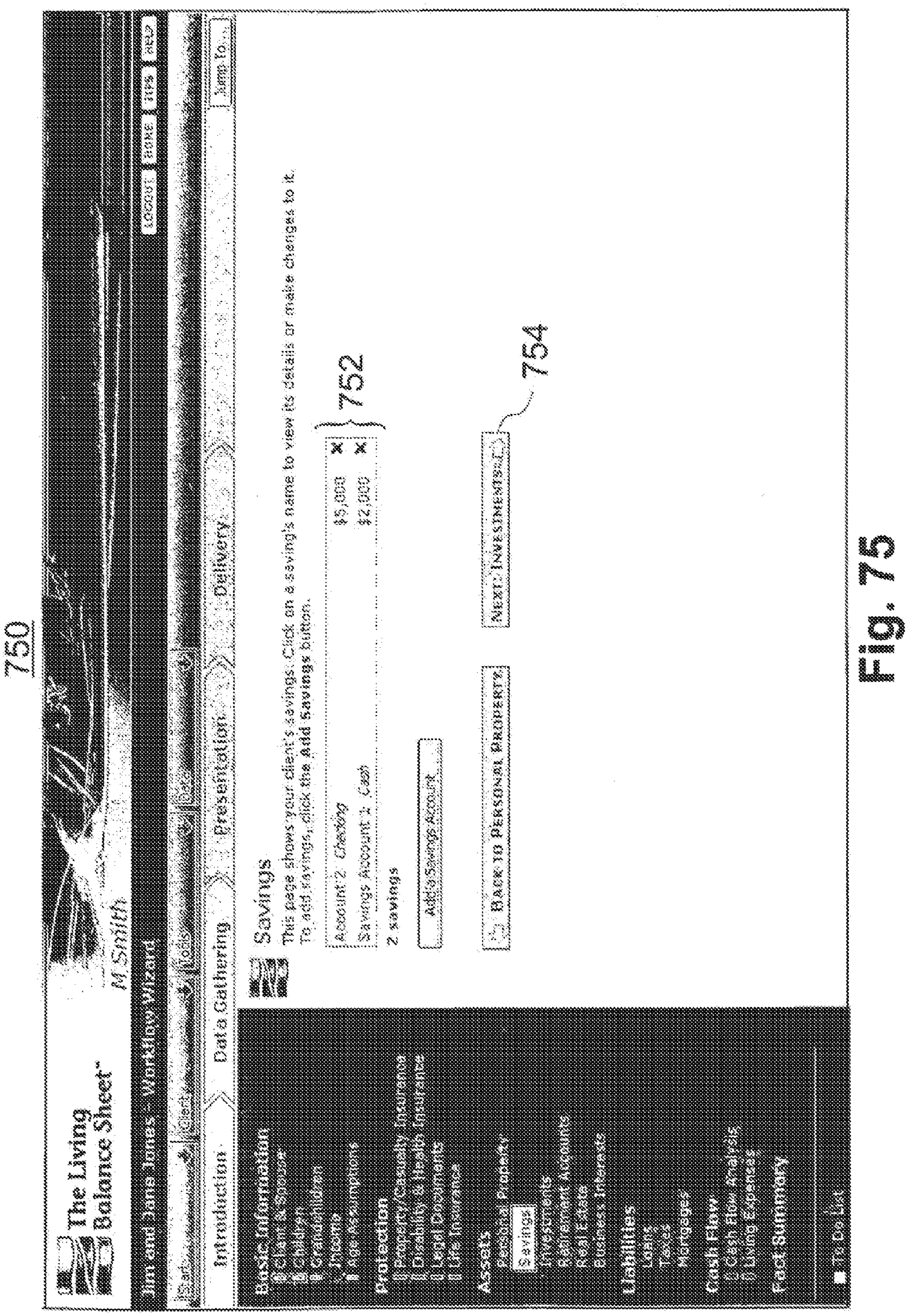
Figure 76:
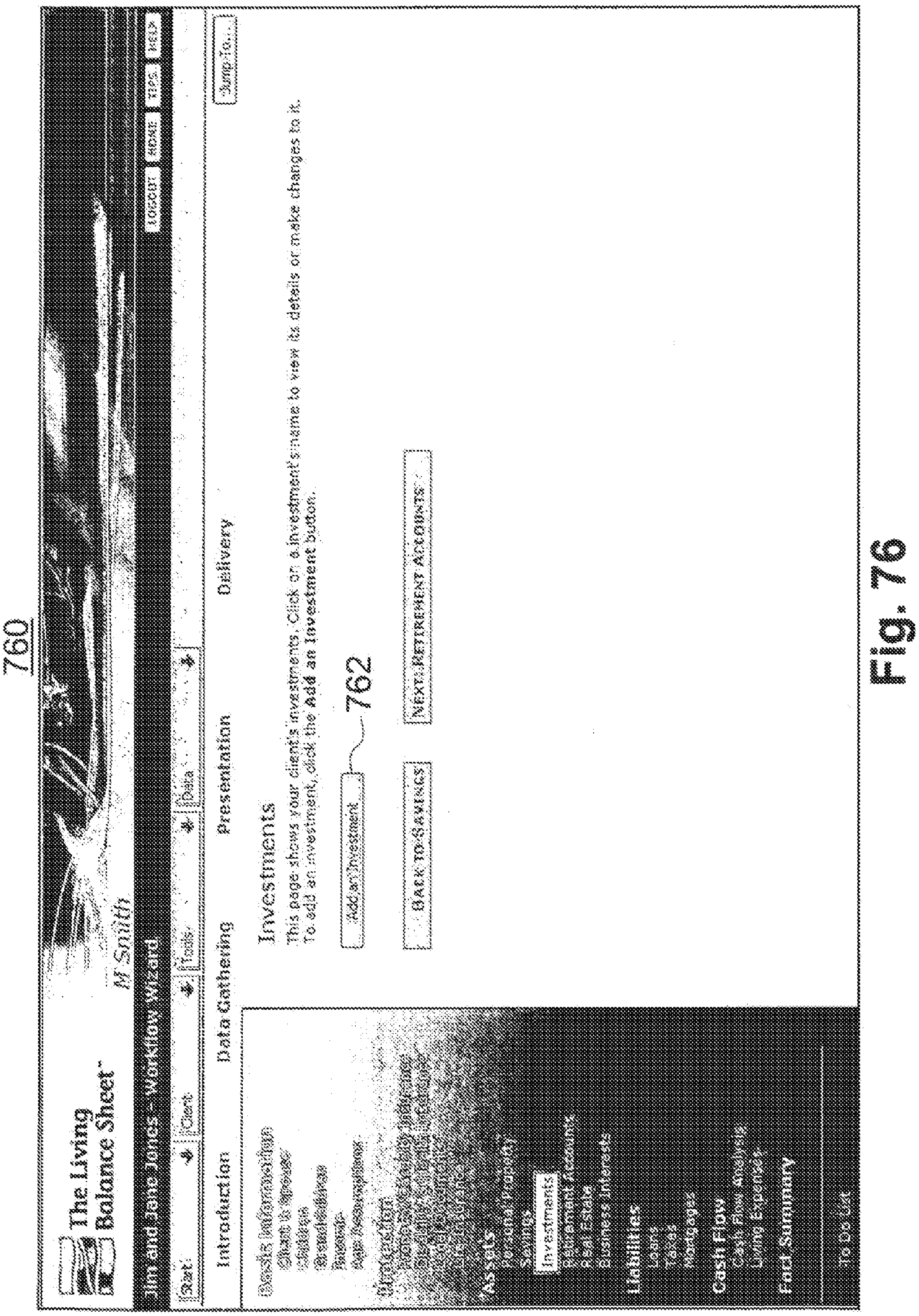

By selecting next button 754 of FIG. 75, a user can move to investments display page 760 of FIG. 76, which as shown corresponds to the "investments" subsection of the assets section. Investments display page 760 is preferably structured in the same way as other initial or top-level subsection display pages (e.g., having the capability of a summary list and a button for adding new items), such as, life insurance display page 690 of FIG. 69, legal documents display page 560 of FIG. 56, disability and health insurance display page 480 of FIG. 48, or income display page 260 of FIG. 26. Investment type display page 770 of FIG. 77 can be displayed when a user selects add an investment button 762 of FIG. 76. Investment type display page 770 provides the user with options for selecting the type of investment that is to be added to the client's information. As shown, the user can select from the option of adding a taxable investment 772, adding a 529 plan 774, adding an annuity 776, or adding a deferred compensation plan 778.

Figure 77:
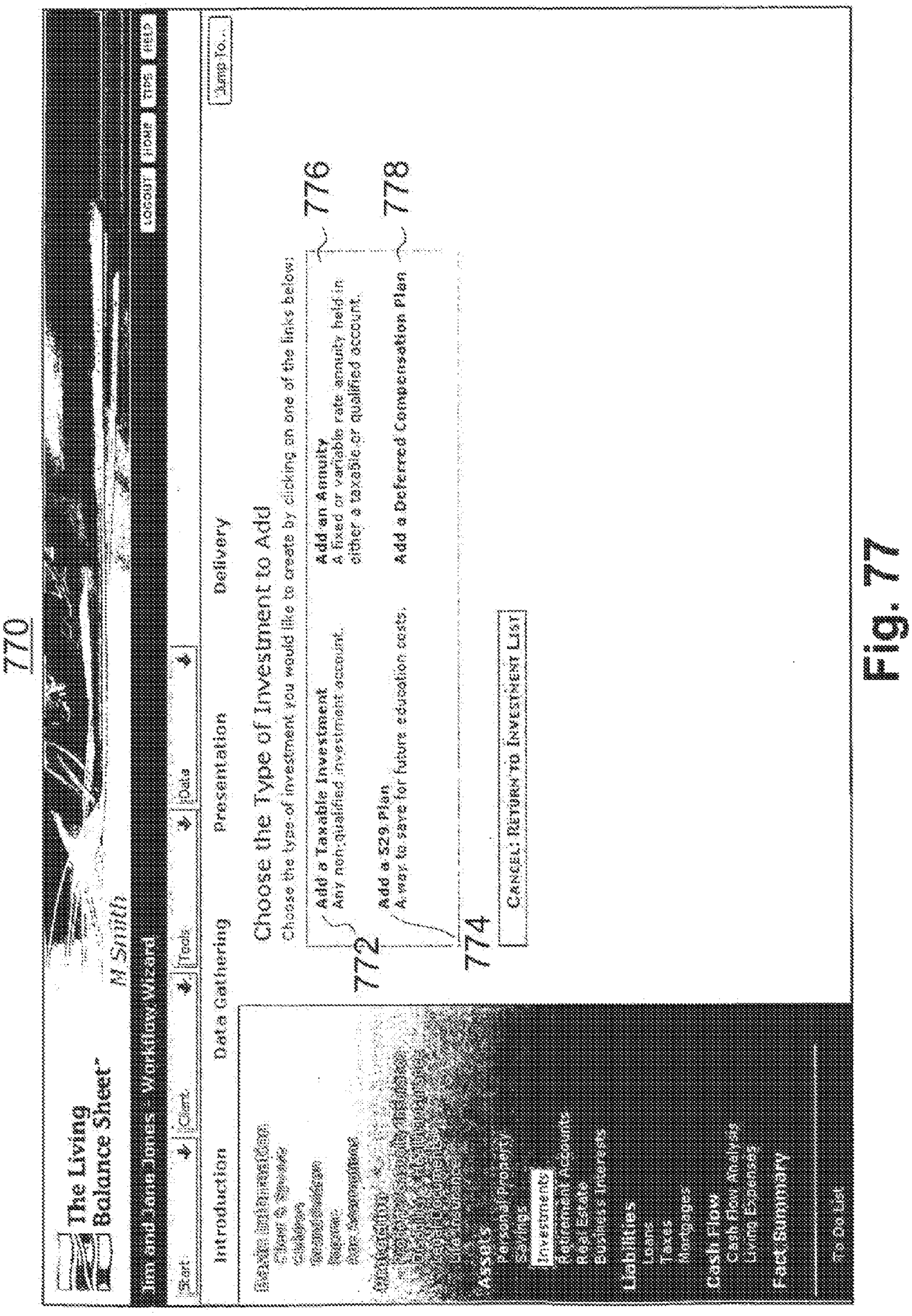
Figure 78:
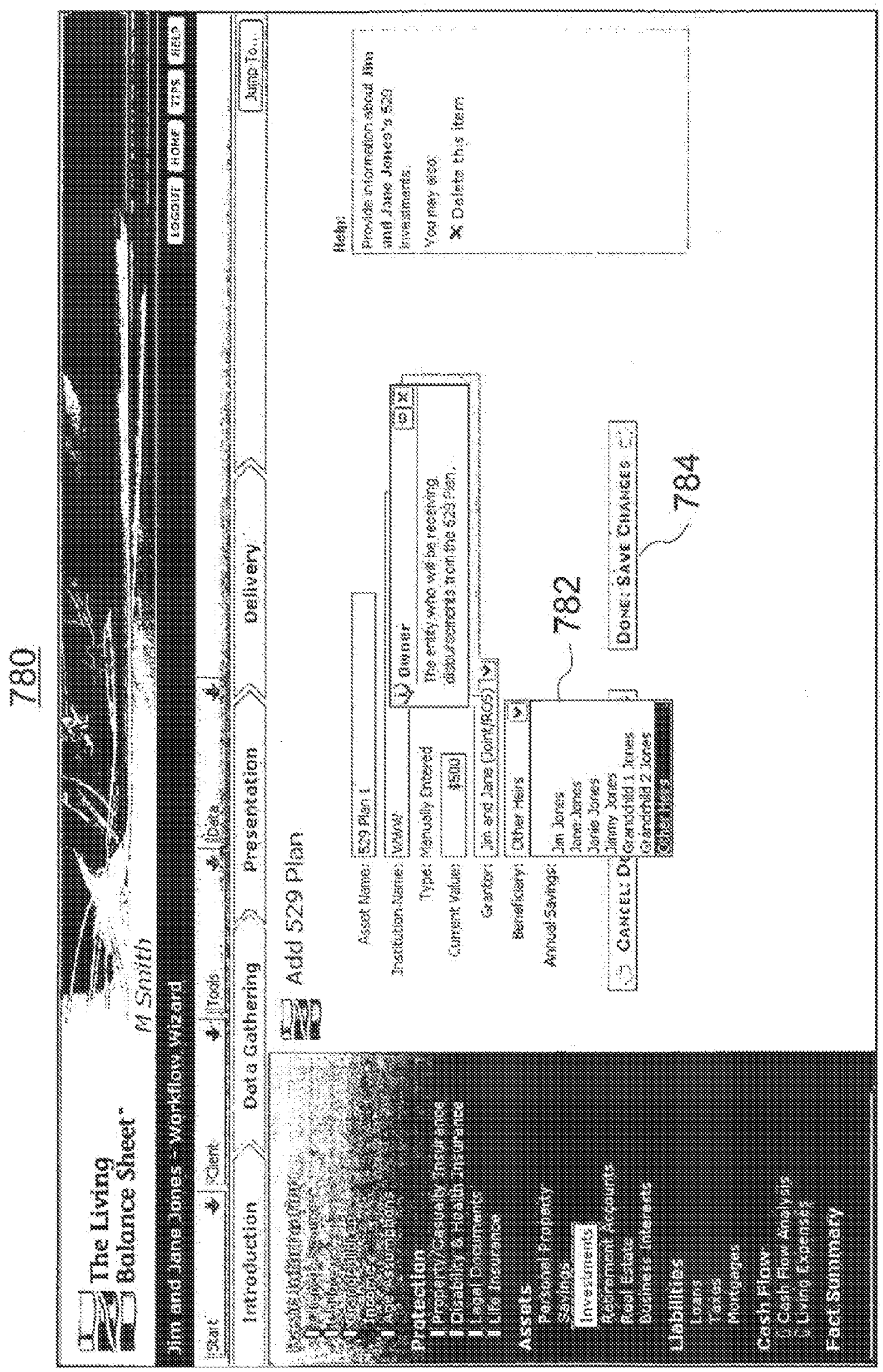
Figure 79:
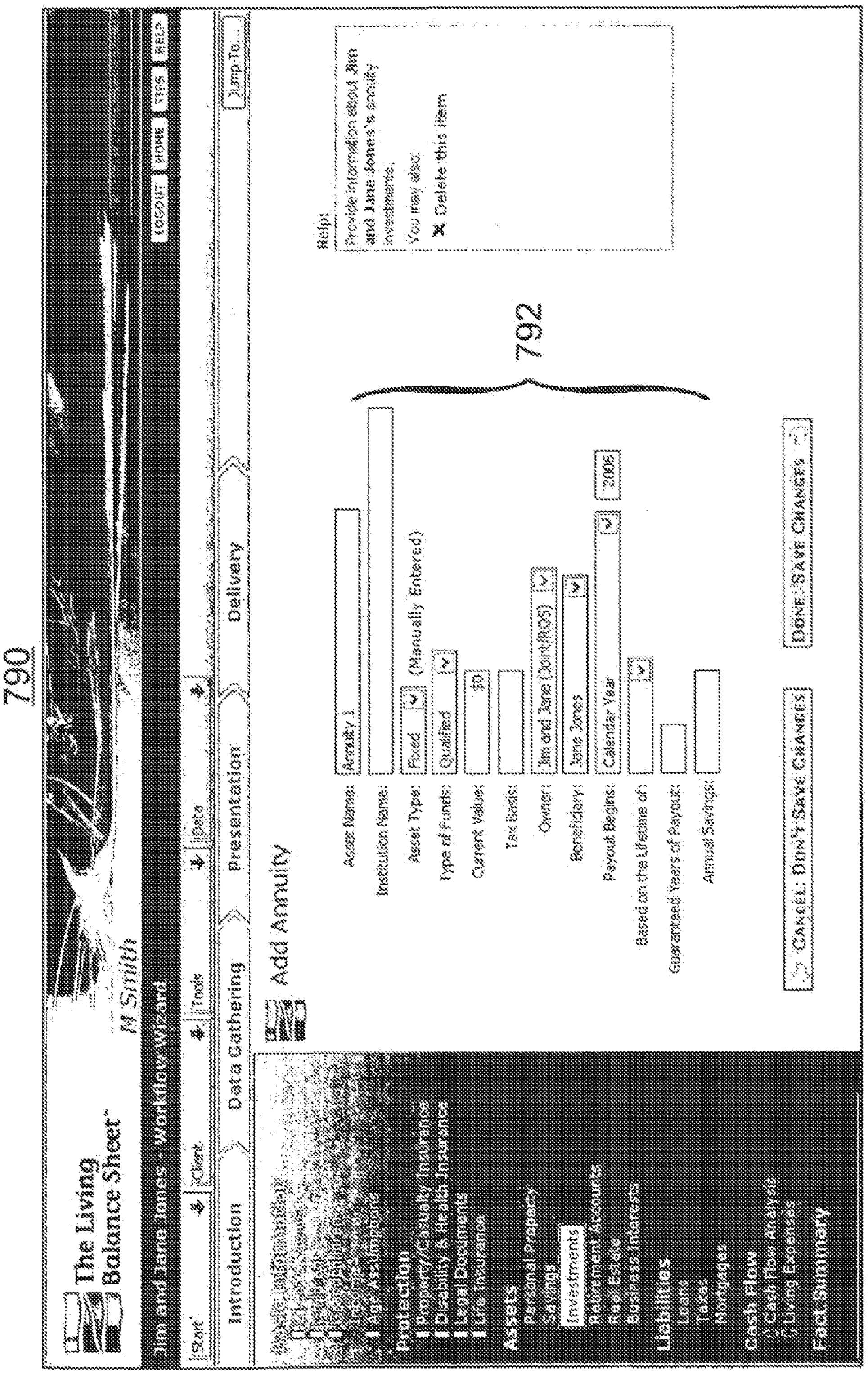

Add 529 display page 780 of FIG. 78 can be displayed when a user selects option 774 of FIG. 77. Add 529 display page 780 includes a section for entering details related to a particular 529 plan of the client. As shown, the user can enter an asset name, institution name, type, current value, grantor, beneficiary (e.g., such as using pull-down menu 782 that automatically generates applicable menu options such as the client, spouse, individual children or grandchildren, or "other heirs"), and the annual savings (e.g., the projected annual savings). By selecting done button 784, the user can add the 529 plan to the client's information and save the related information. In response, the user would be returned to investments display page 760 of FIG. 76, which would be updated in the summary section to show the addition of the new investment item and which could be used to repeat the process for adding other investments.

Figure 80:
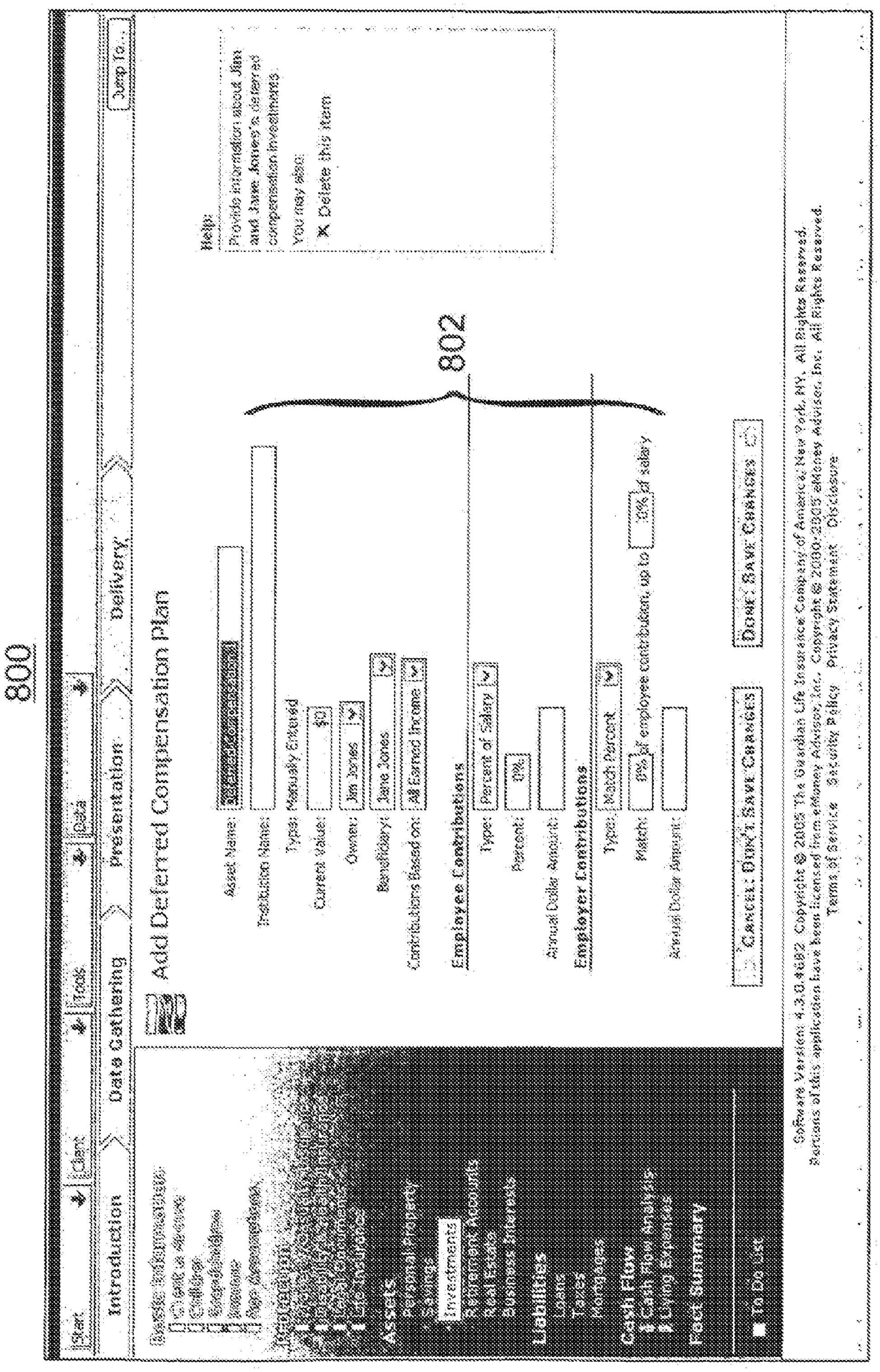

For example, the user can repeat the process to add an annuity. After the user selects add button 762 of FIG. 76 and option 776 of FIG. 77, add annuity display page 790 can be displayed for adding an annuity and related information to the client's information. Add annuity display page 790 includes section 792 for entering annuity related information. As shown, the user can enter an asset name, institution name, asset type, type of funds, current value, owner, beneficiary, when the payout begins, the person whose lifetime the annuity is based on, whether it includes guaranteed years of payout, and the annual savings (e.g., the estimated annual savings). Add deferred compensation display page 800 of FIG. 80 can be displayed when for example user selects add button 762 of FIG. 76 and option 778 of FIG. 77. Add deferred compensation display page 800 of FIG. 80 can be displayed to allow the user to add a particular deferred compensation plan and related plan information to the client information. As shown, the user can enter an asset name, institution name, type, current value, owner, beneficiary, and on what the contributions are based. In addition, display page 800 also provides options and data entry fields for specifying information relating to employee contributions (e.g., type, percentage, or annual dollar amount) and employer contributions (e.g., type, such as match percent, the percentage to match, and the maximum match percentage).

Figure 81:
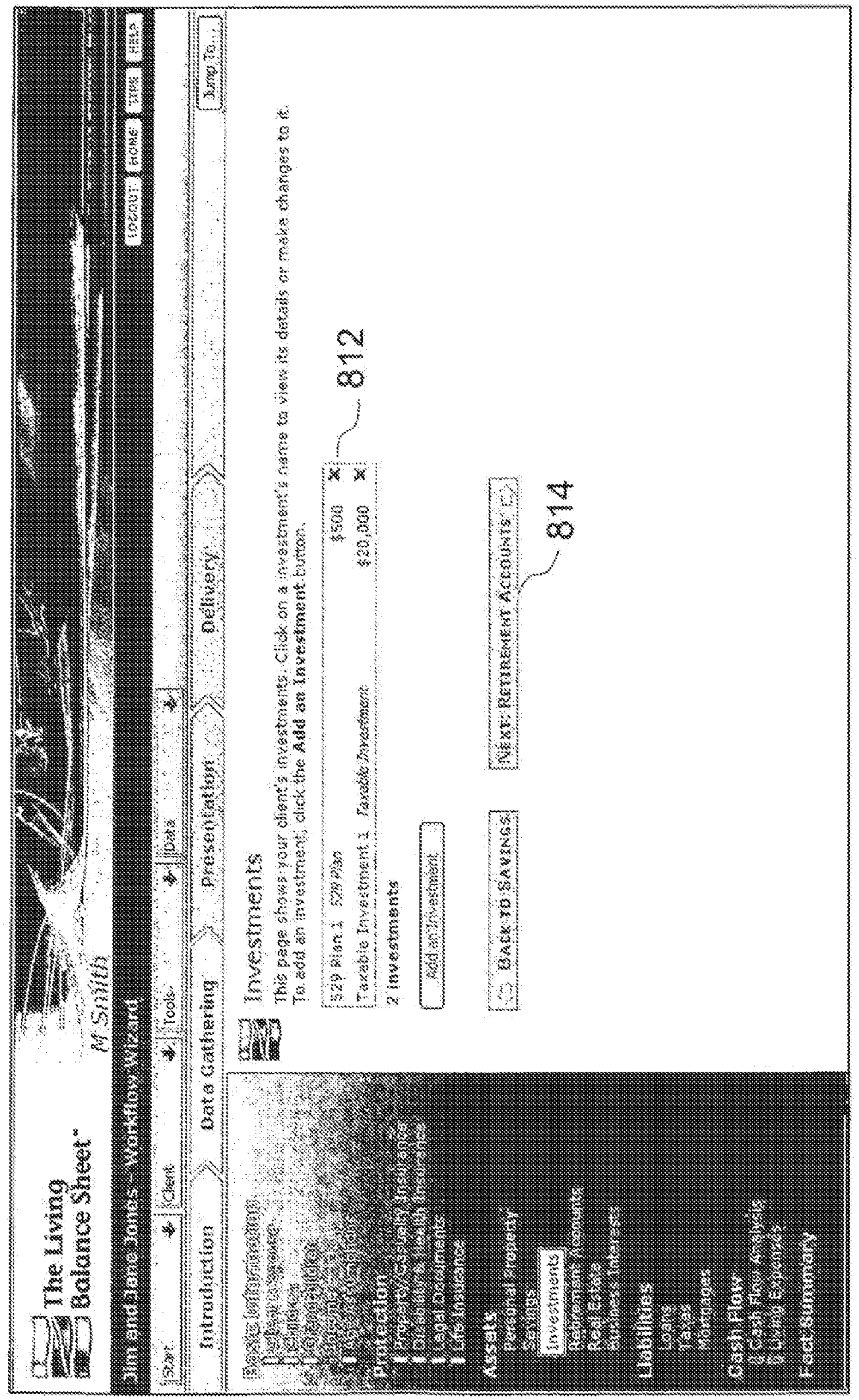
Figure 82:
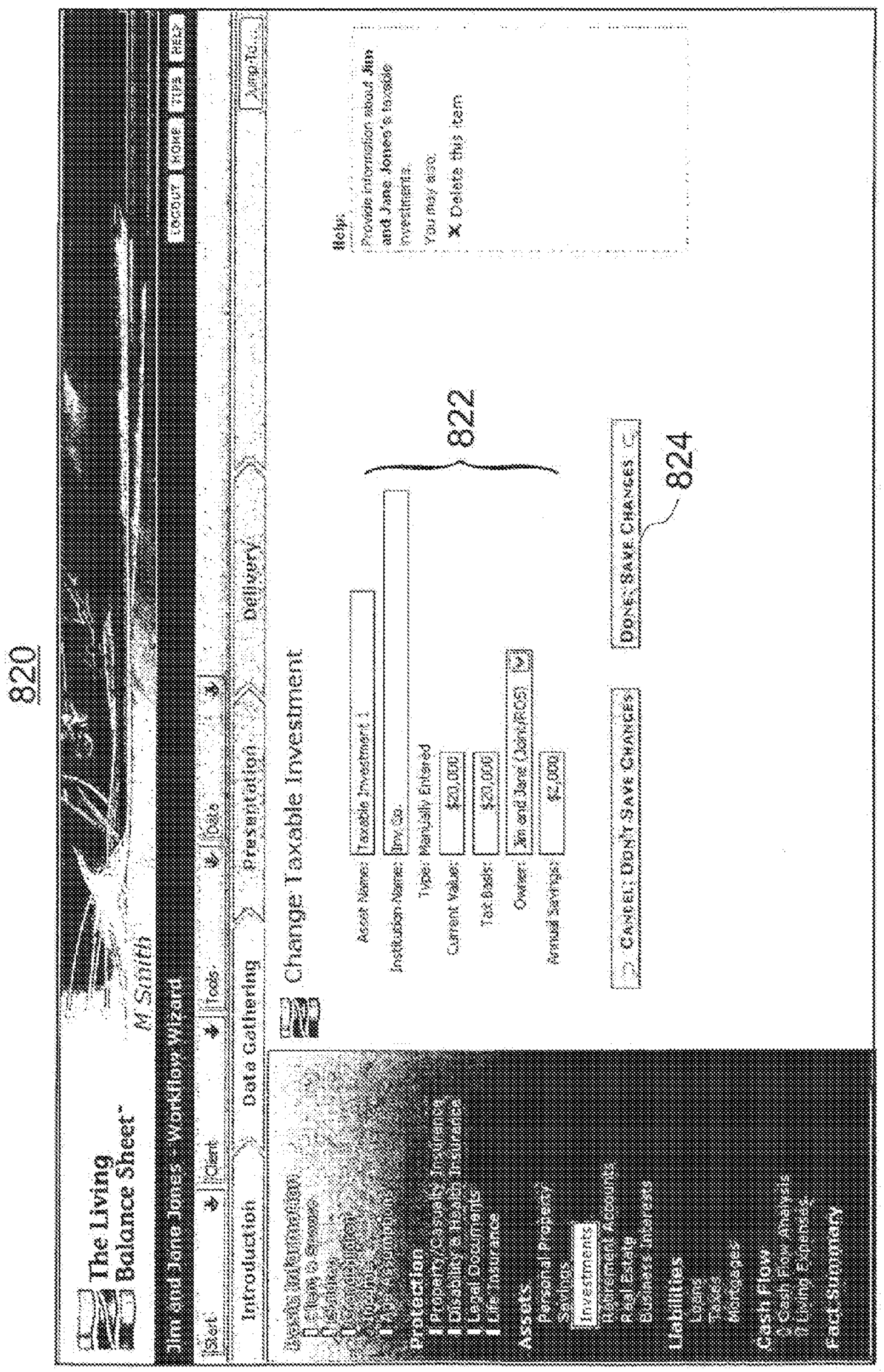

Investment display page 810 of FIG. 81 can be displayed after the user has performed the process of adding two investments: "529 Plan 1" and "Taxable Investment 1." The two investments are reflected in summary section 812. Summary section 812 displays information such as the asset name, investment type, and current value. If a user selects one of the items in summary section 812, a change display page for that item would be displayed for updating or changing the related information. For example, if one of the items was a taxable investment, change taxable investment display page 820 of FIG. 82 can be displayed, which is structured and functions the same as an add taxable investment display page but is repopulated with information that was entered or selected by the user. Change taxable investment display page includes a details section relating to the added-taxable investment and related information such as asset name, institution name, type, current value, tax basis, owner, and annual savings. Done button 824 can be used to save any updates or new data that was entered or selected in display page 820 and to return the user to a display page such as an investment display page 812 of FIG. 81.

Figure 83:
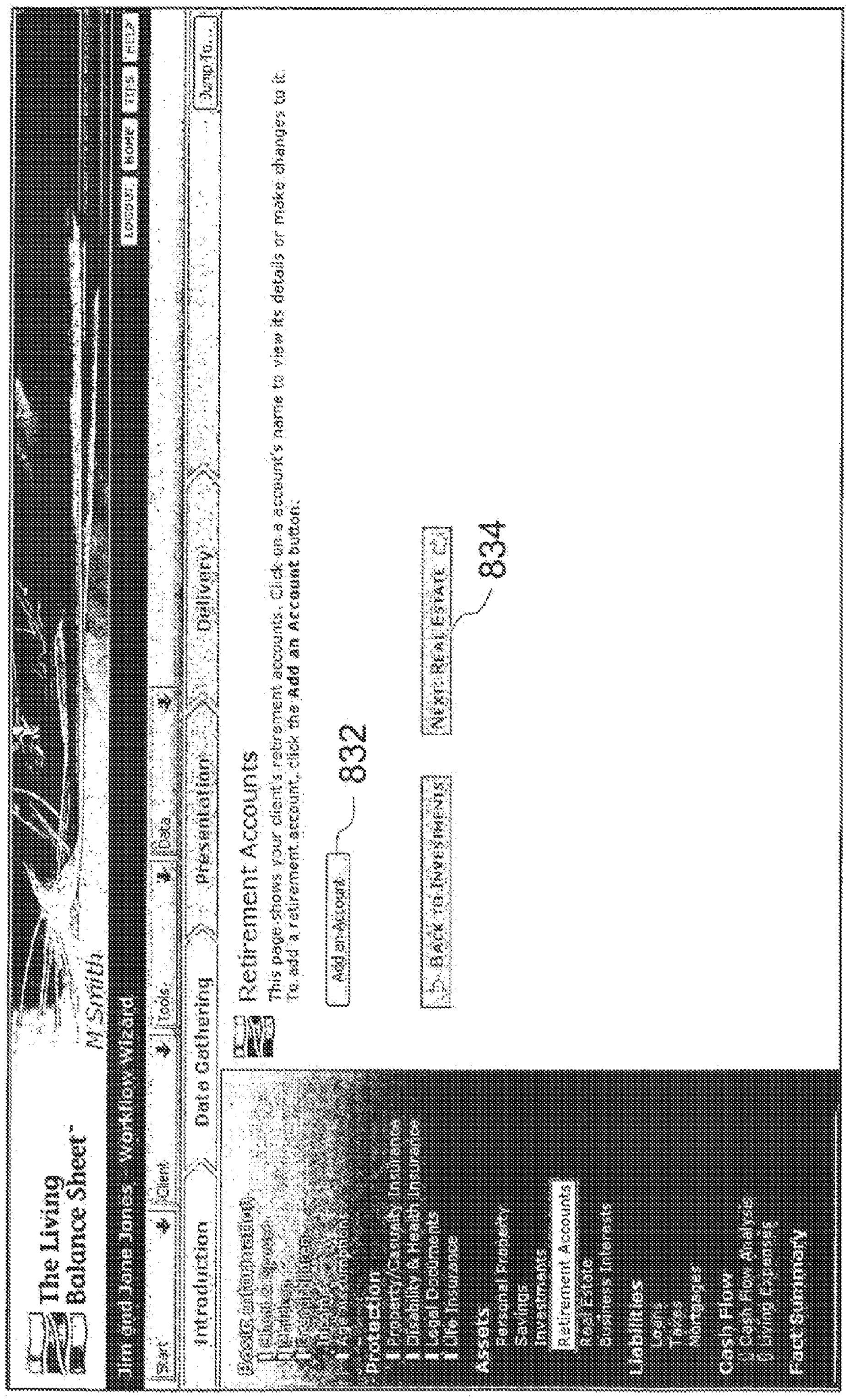

By selecting next button 814 of FIG. 81, a user can move to retirement accounts display page 830 of FIG. 83, which as shown corresponds to the "retirement accounts" subsection of the assets section. Retirement accounts display page 830 is preferably structured in the same way as other initial or top-level subsection display pages (e.g., capability of a summary list and a button for adding new items), such as, life insurance display page 690 of FIG. 69, legal documents display page 560 of FIG. 56, disability and health insurance display page 480 of FIG. 48, or income display page 260 of FIG. 26. Retirement account type display page 840 of FIG. 84 can be displayed when a user selects add an account button 832 of FIG. 83. Retirement account type display page 840 provides the user with options for selecting the type of retirement account that is to be added to the client's information. As shown, the user can select from the option of adding a qualified retirement plan 842 or adding a Roth IRA plan 844.

Figure 84:
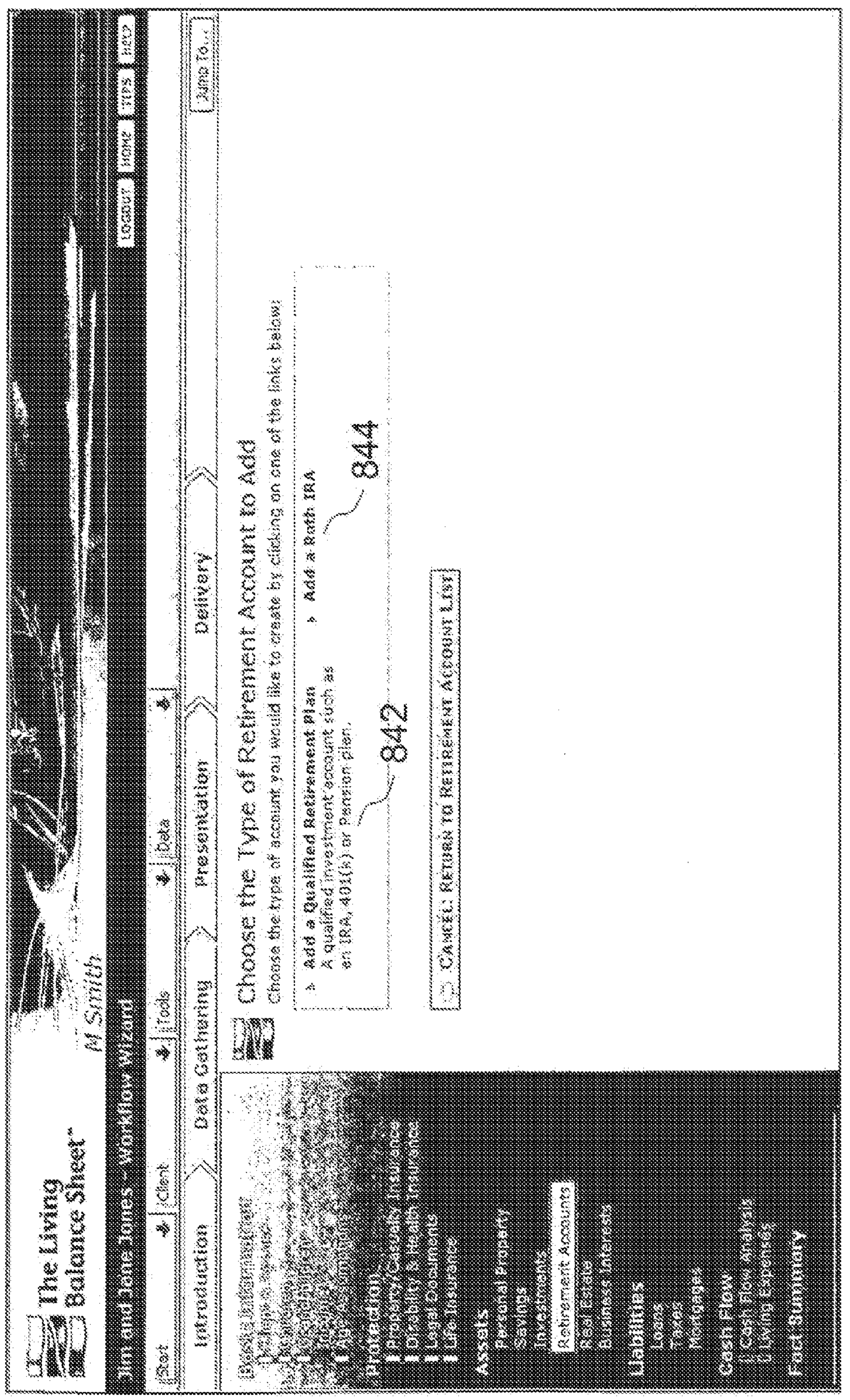
Figure 85:
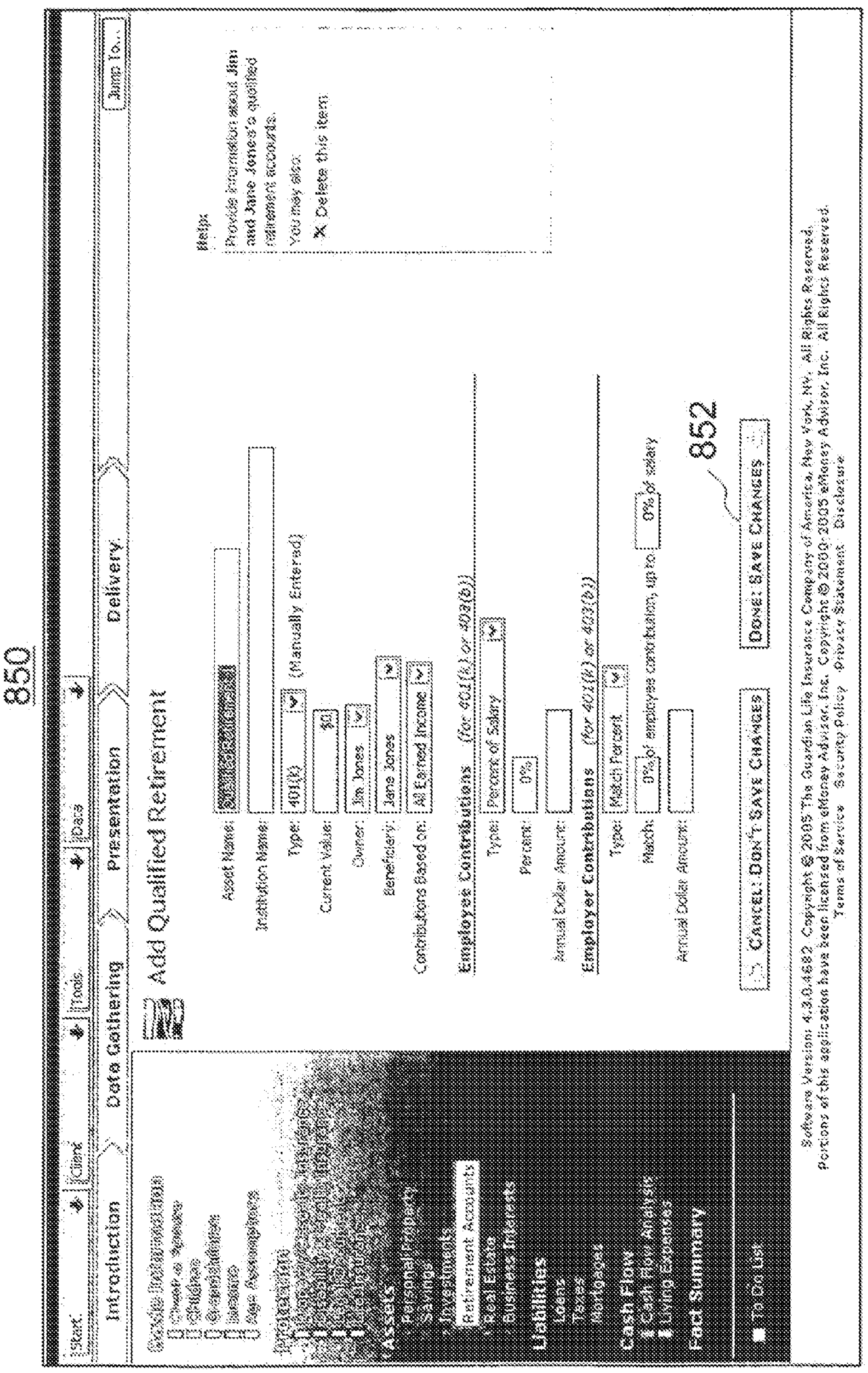

Add qualified retirement account display page 850 of FIG. 85 can be displayed when a user selects option 842 of FIG. 84. Add qualified retirement account display page 850 includes a section for entering details related to a particular qualified retirement account of the client. As shown, the user can enter (which can involve various forms of data entry such as selecting an item from a pull-down menu) an asset name, institution name, type, current value, owner, beneficiary, and the basis for contributions into the account. Data fields can also include fields for entering information relating to employee and employer contributions such as those related to 401k or 403 (b) accounts (type, percent of salary, matching, minimum for matching, and level of matching). By selecting done button 852, the user can add the retirement account from display page 850 to the client's information and save the account related information that was entered. In response, the user would be returned to retirement accounts display page 830 of FIG. 83, which would be updated in the summary section to show the addition of the new retirement account and which could be used to repeat the process for adding other retirement accounts. For example, the user can repeat the process to add a Roth IRA, which would have the same data fields as for example display page 850 except that it would not have sections for employee and employer contributions. Changes to saved data can be implemented through a change display page in the same way as is described above in connection with other subsections.

Figure 86:
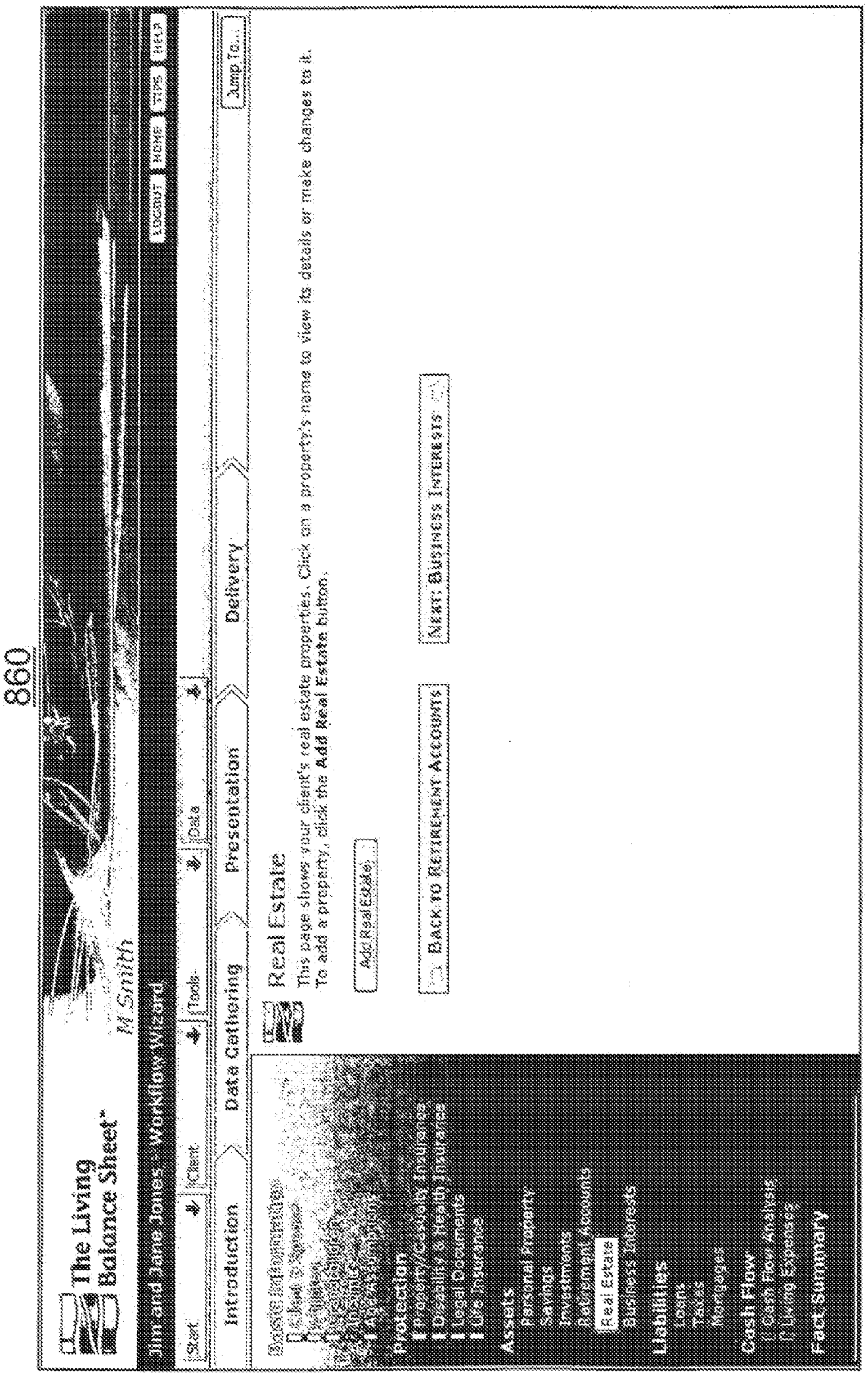
Figure 87:
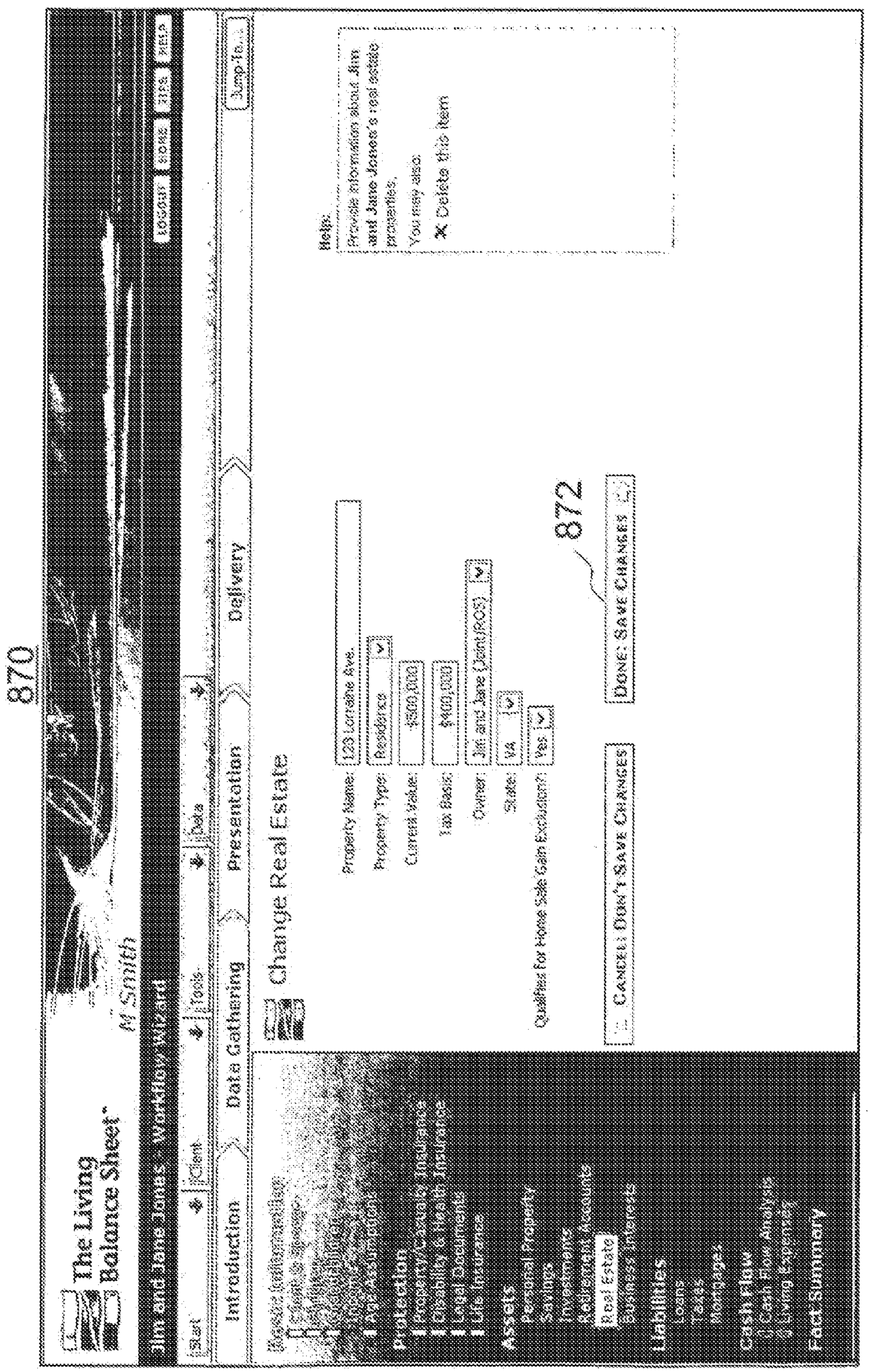

By selecting next button 834 of FIG. 83, a user can move to real estate display page 860 of FIG. 86, which as shown corresponds to the "real estate" subsection of the assets section. Real estate display page 860 is preferably structured in the same way as other initial or top-level subsection display pages (e.g., capability of a summary list and a button for adding new items), such as, life insurance display page 690 of FIG. 69, legal documents display page 560 of FIG. 56, disability and health insurance display page 480 of FIG. 48, and income display page 260 of FIG. 26. Change real estate display page 870 of FIG. 87 can be displayed when a user selects a real estate item from the summary section of display page 860 (e.g., if the user had previously added a real estate item for the client). An add real estate display page having the same structure and functionality as the change real estate display page 870 can be displayed if the user is adding a new real estate item (e.g., user selects the add real estate button of FIG. 86 to add real estate). Change real estate display page 870 includes a section for entering details related to a particular real estate property of the client. As shown, the user can enter an asset name, property type, current value, tax basis, owner, location state, and whether it qualifies for home sale gain exclusion. By selecting done button 872, the user can save the changes to the real estate identified in display page 870. In response, the user can be returned to real estate display page 880 of FIG. 88, which would be updated in the summary section to show the added or updated real estate items. Summary section 882 of display page 880 can show summary information regarding individual real estate property such as the address, type of property, and current value.

Figure 88:
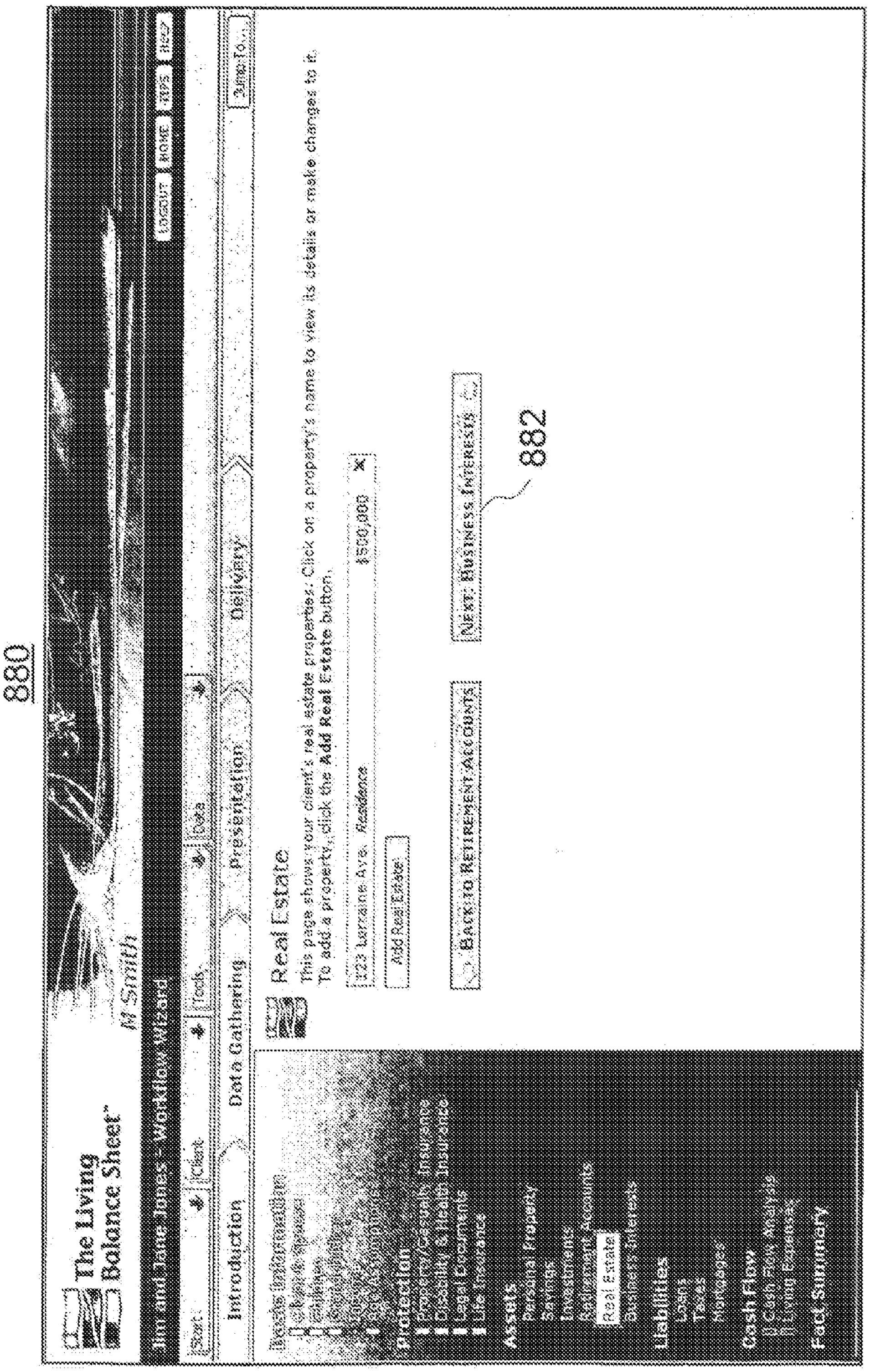
Figure 89:
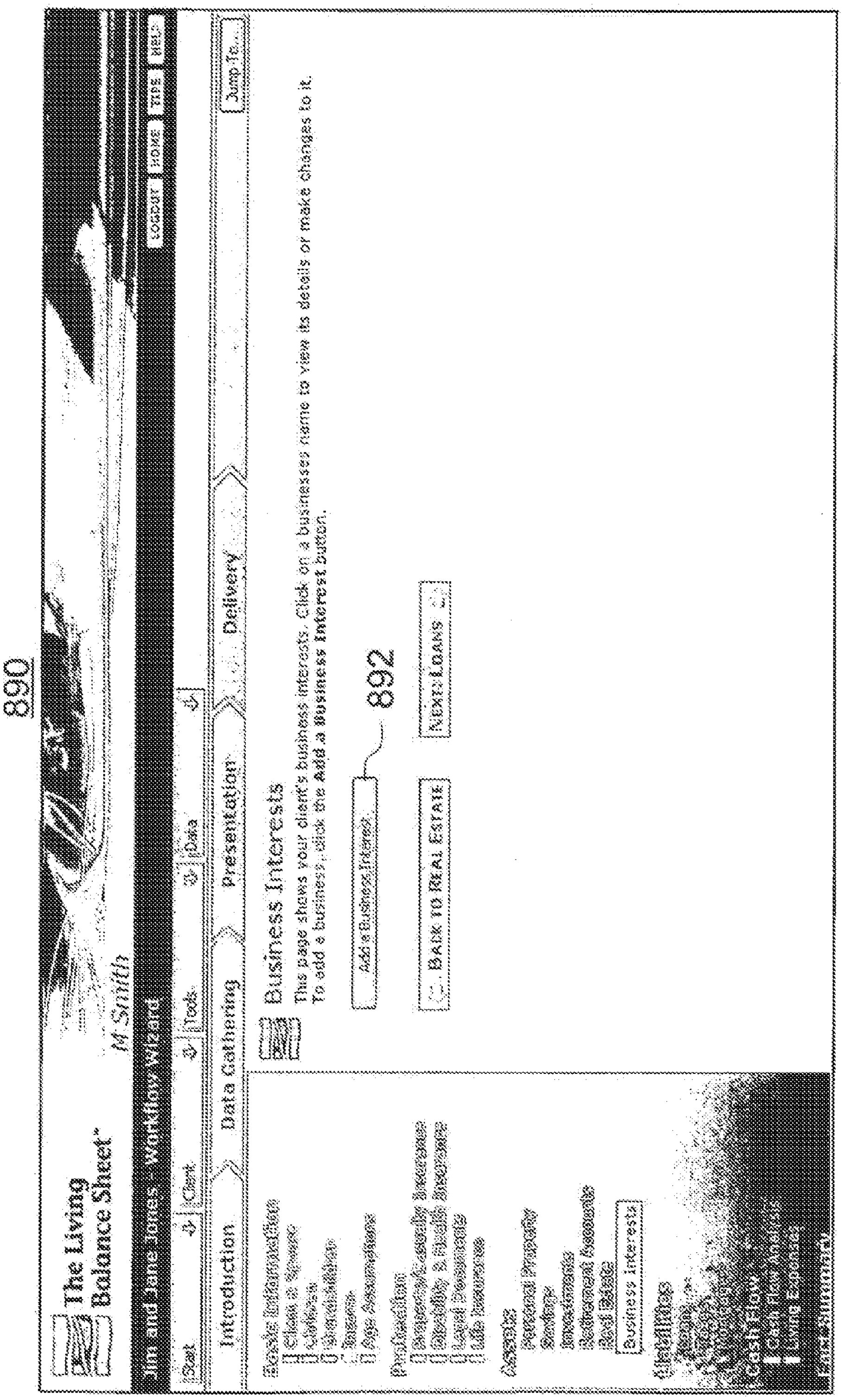
Figure 90:
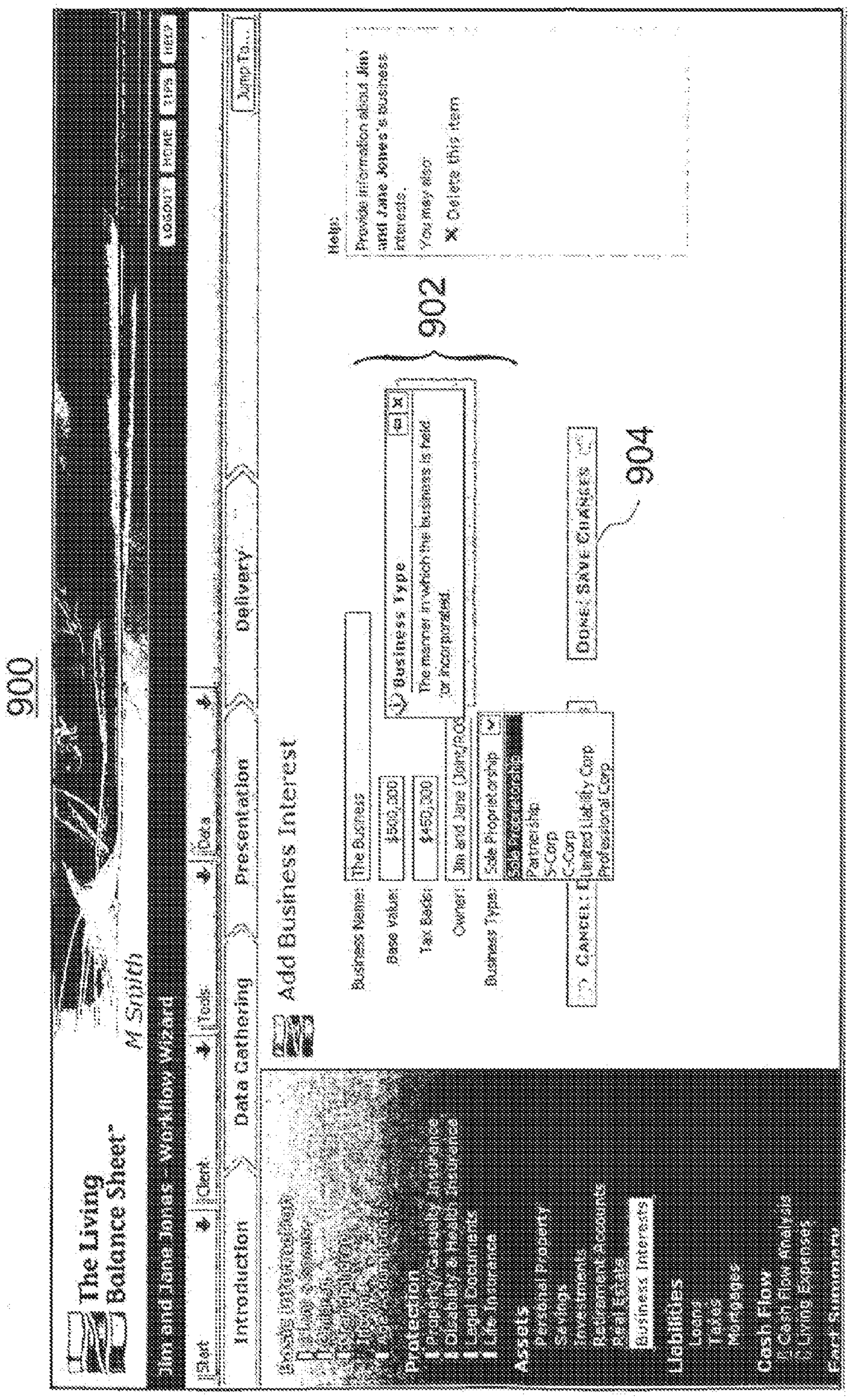

By selecting next button 882 of FIG. 88, a user can move to business interests display page 890 of FIG. 89, which as shown corresponds to the "business interests" subsection of the assets section. Business interests display page 890 is preferably structured in the same way as other initial or top-level subsection display pages (e.g., capability of a summary list and a button for adding new items), such as, life insurance display page 690 of FIG. 69, legal documents display page 560 of FIG. 56, disability and health insurance display page 480 of FIG. 48, or income display page 260 of FIG. 26. Add business interests display page 900 of FIG. 90 can be displayed when a user selects add a business interest button 892 of FIG. 89 to add a business interest to the client's information. A change business interests display page having the same structure and functionality as the add business interest display page 870 can be displayed if the user select a previously added business interest from the summary section of the business interest display page. Add business interests display page 900 includes section 902 for entering details related to a particular business interest of the client. As shown, the user can enter a business name, basis value, tax basis, and business type. By selecting done button 904, the user can add the business interest and save the related information entered in display page 900. In response, the user can be returned to business interests display page 910 of FIG. 91, which would be updated in summary section 912 to show the added business interest. Summary section 912 of display page 910 can display summary information with respect to the name of the business interest, type of business, and base value.

Figure 91:
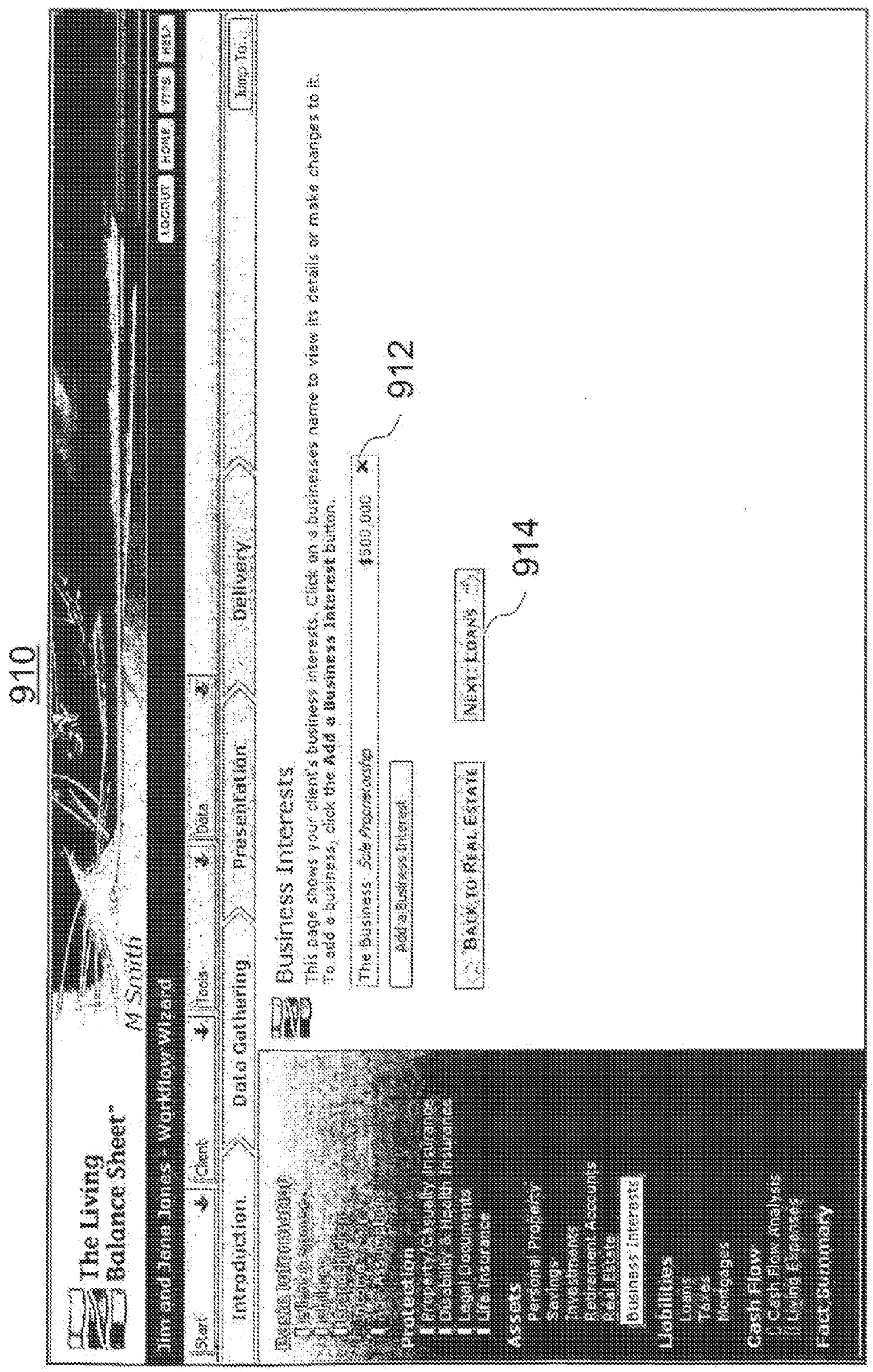
Figure 92:
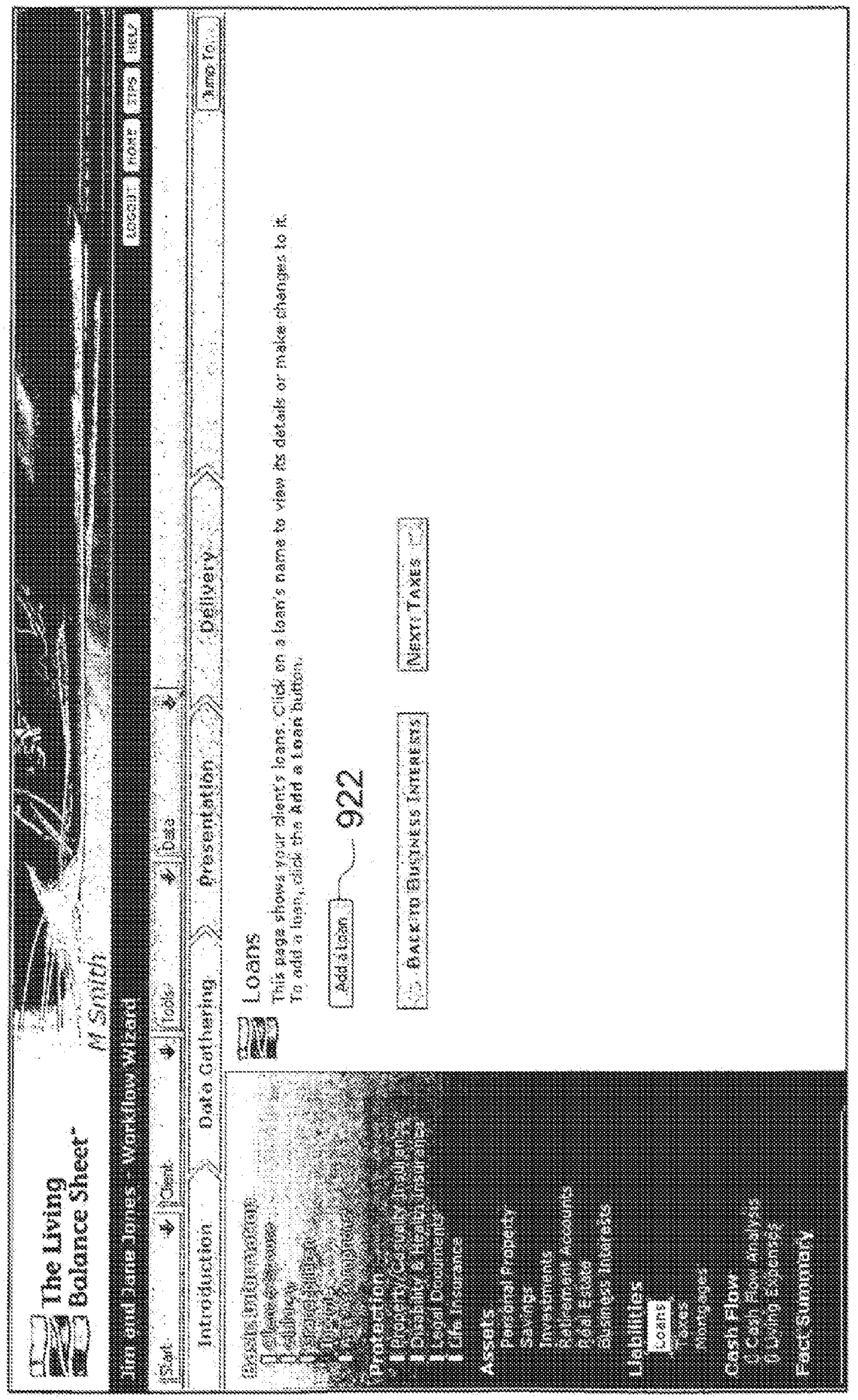
Figure 93:
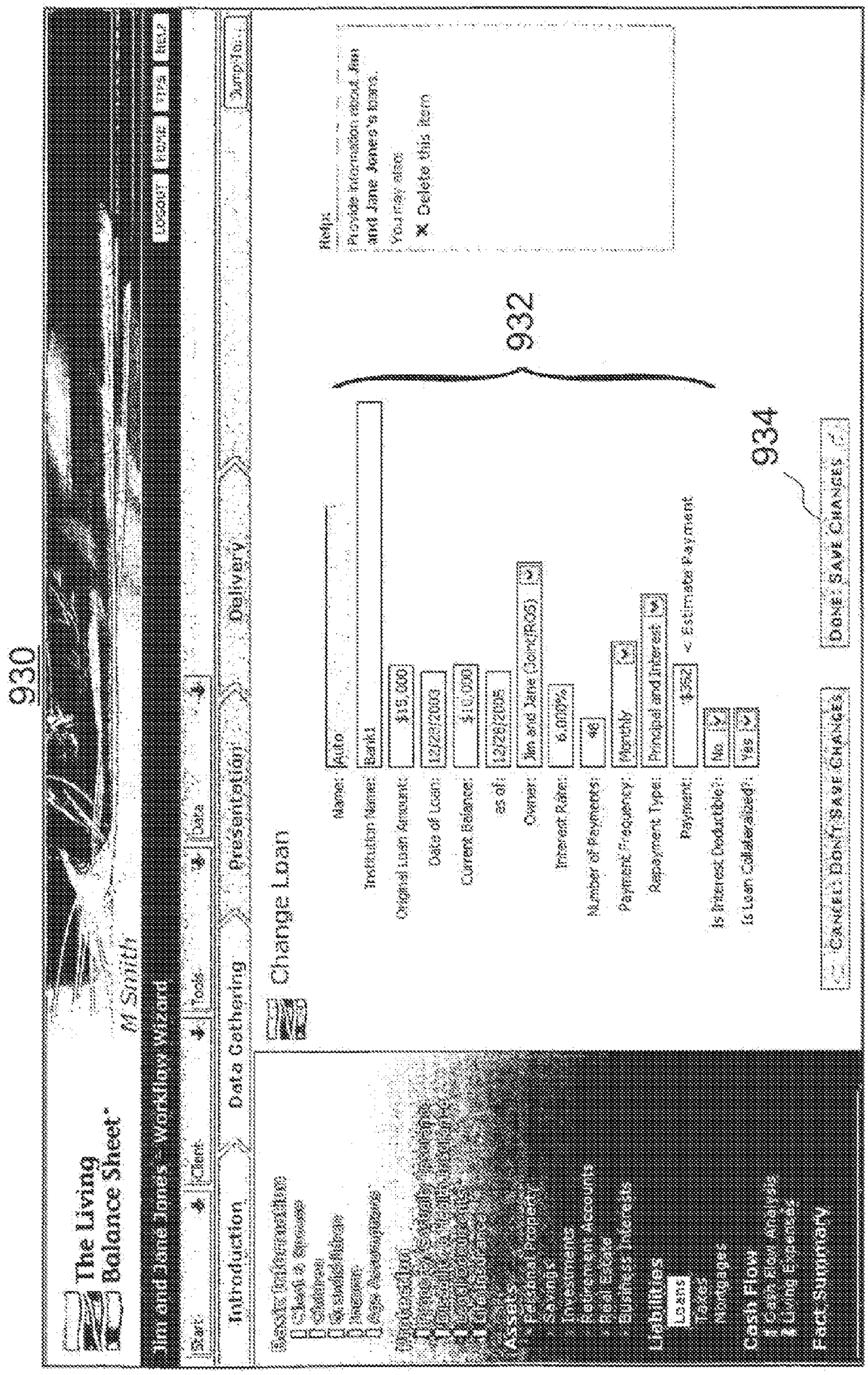

By selecting next button 914 of FIG. 91, a user can move to loans display page 920 of FIG. 92, which as shown corresponds to the "loans" subsection of the liabilities section, which follows the assets section. Loans display page 920 is preferably structured in the same way as other initial or top-level subsection display pages (e.g., capability of a summary list and a button for adding new items), such as, life insurance display page 690 of FIG. 69, legal documents display page 560 of FIG. 56, disability and health insurance display page 480 of FIG. 48, or income display page 260 of FIG. 26. Change loan display page 930 of FIG. 93 can be displayed when a user selects a loan from the summary section of display page 920 (if the user had previously added a loan item for the client). An add loan display page having the same structure and functionality as change loan display page 930 can be displayed if the user is adding a new loan item (e.g., user selected the add a loan button 922 of FIG. 92). Change loan display page 930 includes section 932 for entering details related to a particular loan of the client. As shown, the user can enter (e.g., so as to update data) a loan name, institution name, original loan amount, date of loan, current balance, the "as of date for the current balance, owner, interest rate, number of payments, payment frequency, repayment type, payment, whether the interest is deductible, or whether the loan is collateralized. By selecting done button 934, the user can save the changes to the loan identified in display page 930. In response, the user can be returned to loans display page 940 of FIG. 94, which would be updated in summary section 942 to show the added or updated loan items. Summary section 942 of display page 940 can show summary information regarding individual loans such as the name of the loan, type of loan, and current balance.

Figure 94:
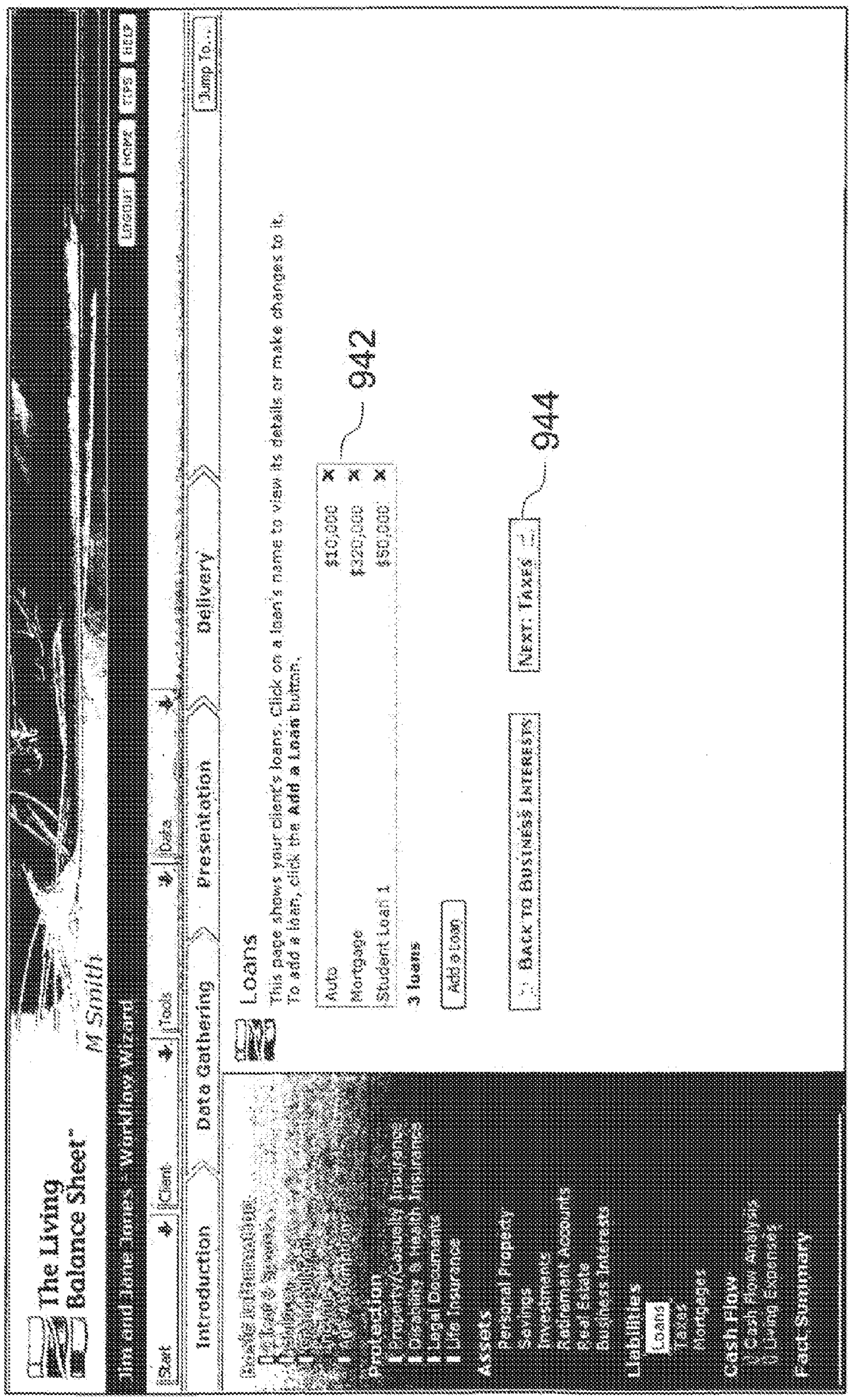
Figure 95:
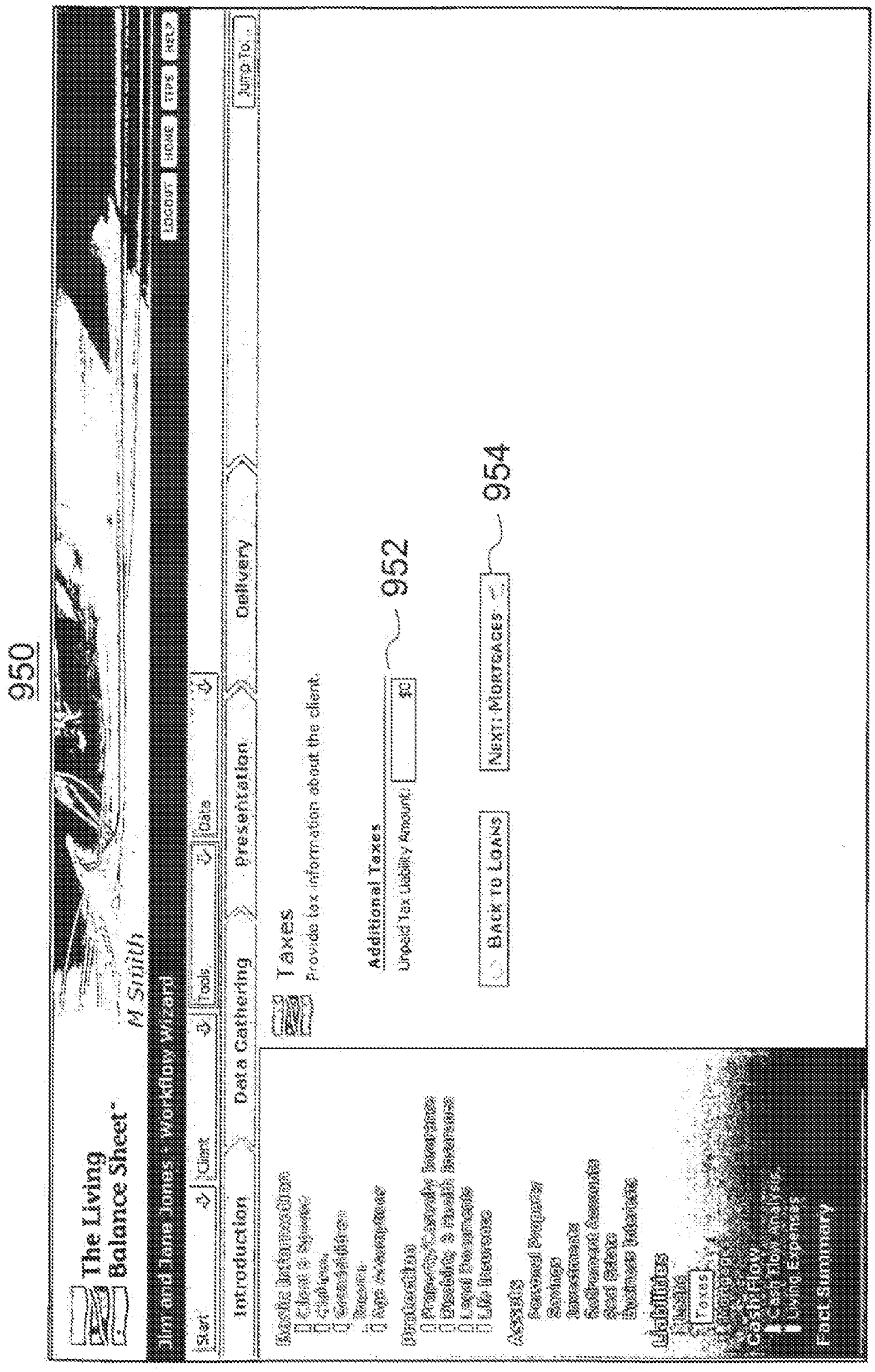

By selecting next button 944 of FIG. 94, a user can move to taxes display page 950 of FIG. 95, which as shown corresponds to the "taxes" subsection of the liabilities section. Tax display page 950 permits the user to enter and save the tax information of the client such as any unpaid tax liability amount that is due by the client. Additional taxes section 952 can be used for such data entry.

Figure 96:
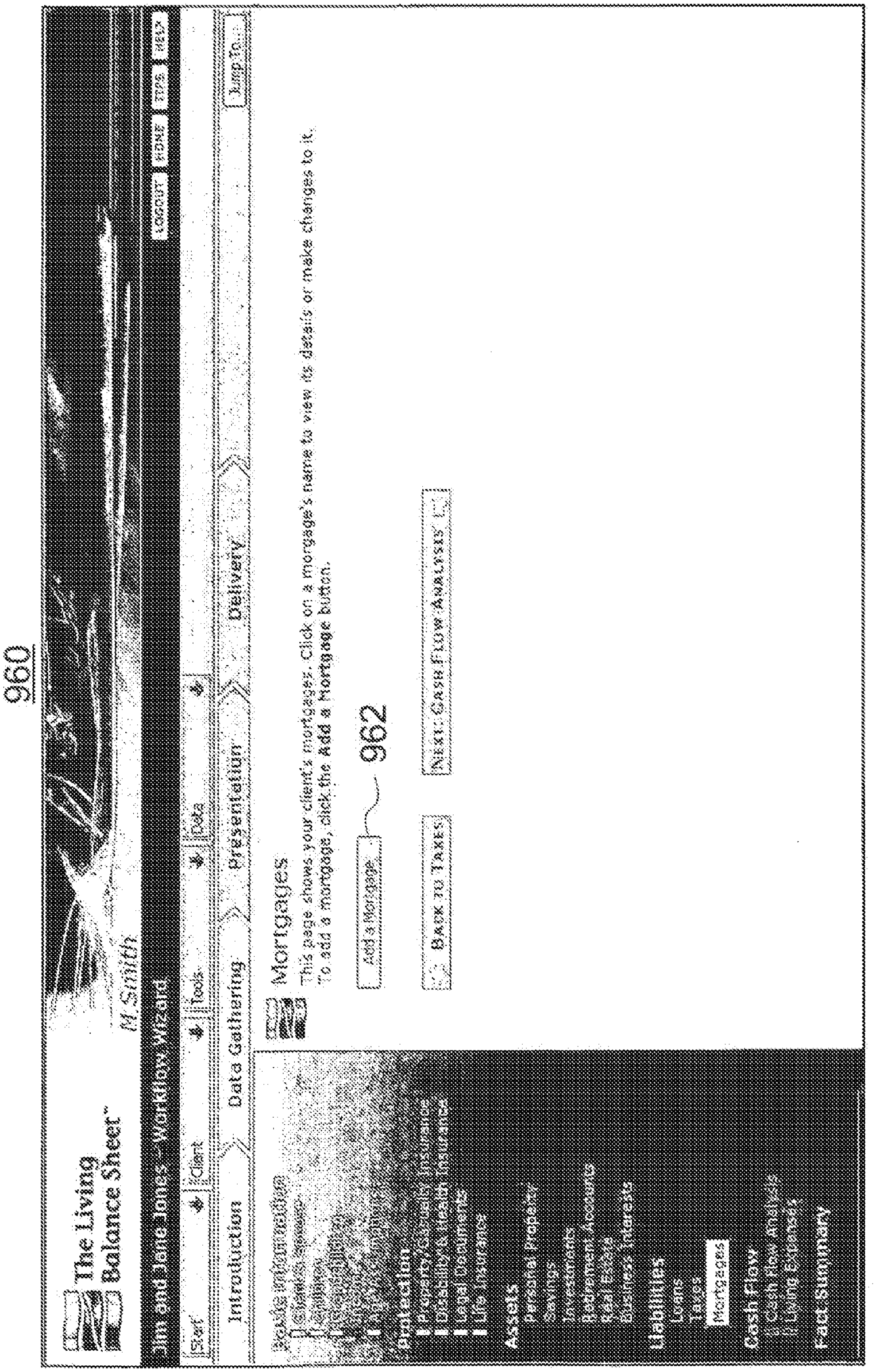
Figure 97:
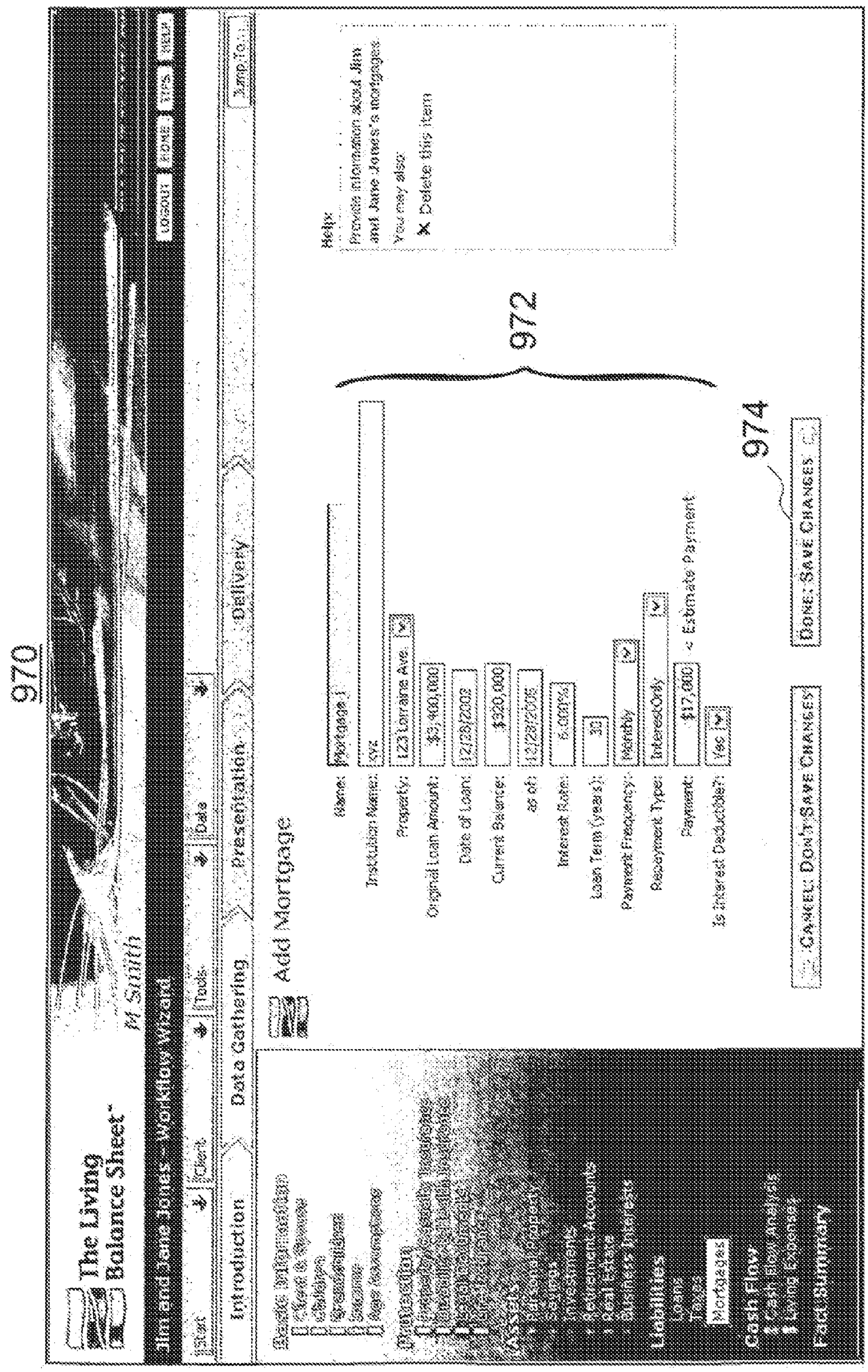
Figure 98:
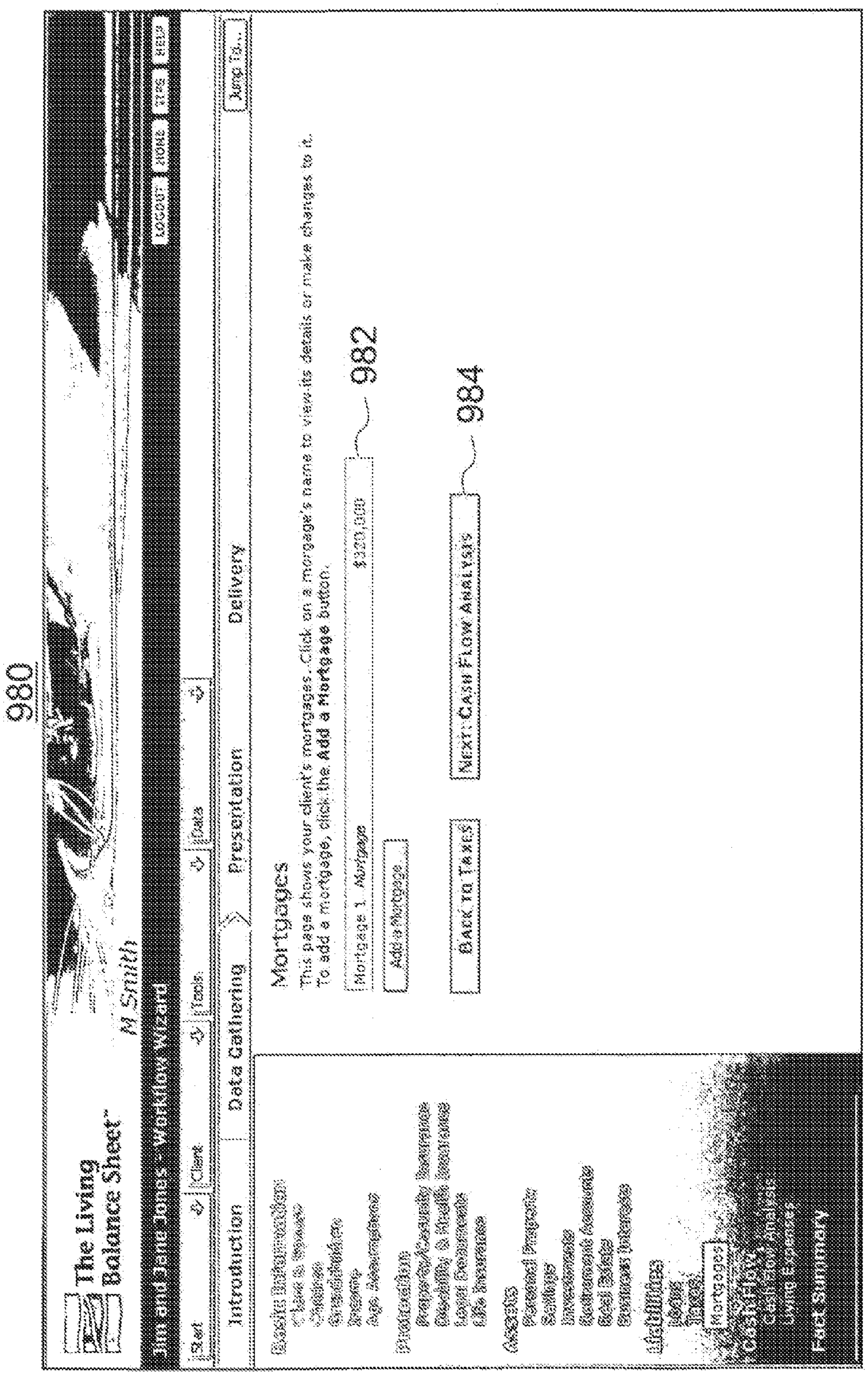

By selecting next button 954 of FIG. 95, a user can move to mortgages display page 960 of FIG. 96, which as shown corresponds to the "mortgages" subsection of the liabilities section. Mortgages display page 960 is preferably structured in the same way as other initial or top-level subsection display pages (e.g., capability of a summary list and a button for adding new items) such as life insurance display page 690 of FIG. 69, legal documents display page 560 of FIG. 56, disability and health insurance display page 480 of FIG. 48, income display page 260 of FIG. 26. Add mortgage display page 972 of FIG. 97 can be displayed when a user selects add a mortgage button 962 of FIG. 96 to add a mortgage to the client's information. A change mortgage display page having the same structure and functionality as the add mortgage display page 970 can be displayed if the user selects a previously added mortgage from a summary section of the mortgages display page. Add mortgage display page 970 includes section 972 for entering details related to a particular mortgage of the client. As shown, the user can enter a mortgage name, institution, mortgage property (which can for example be selected from an automatically generated list of already entered properties), original loan amount, date of loan, current balance, the as of date for the current balance, the interest rate, loan term, payment frequency, repayment type, payment (e.g., estimated payment), and whether the interest is deductible. By selecting done button 974, the user can add the mortgage and save the related information entered in display page 970. In response, the user can be returned to mortgages display page 980 of FIG. 98, which would be updated in summary section 982 to show the added mortgage. Summary section 982 of display page 980 can display summary information with respect to the name of the mortgage and other values from add mortgage display page 970.

Figure 99:
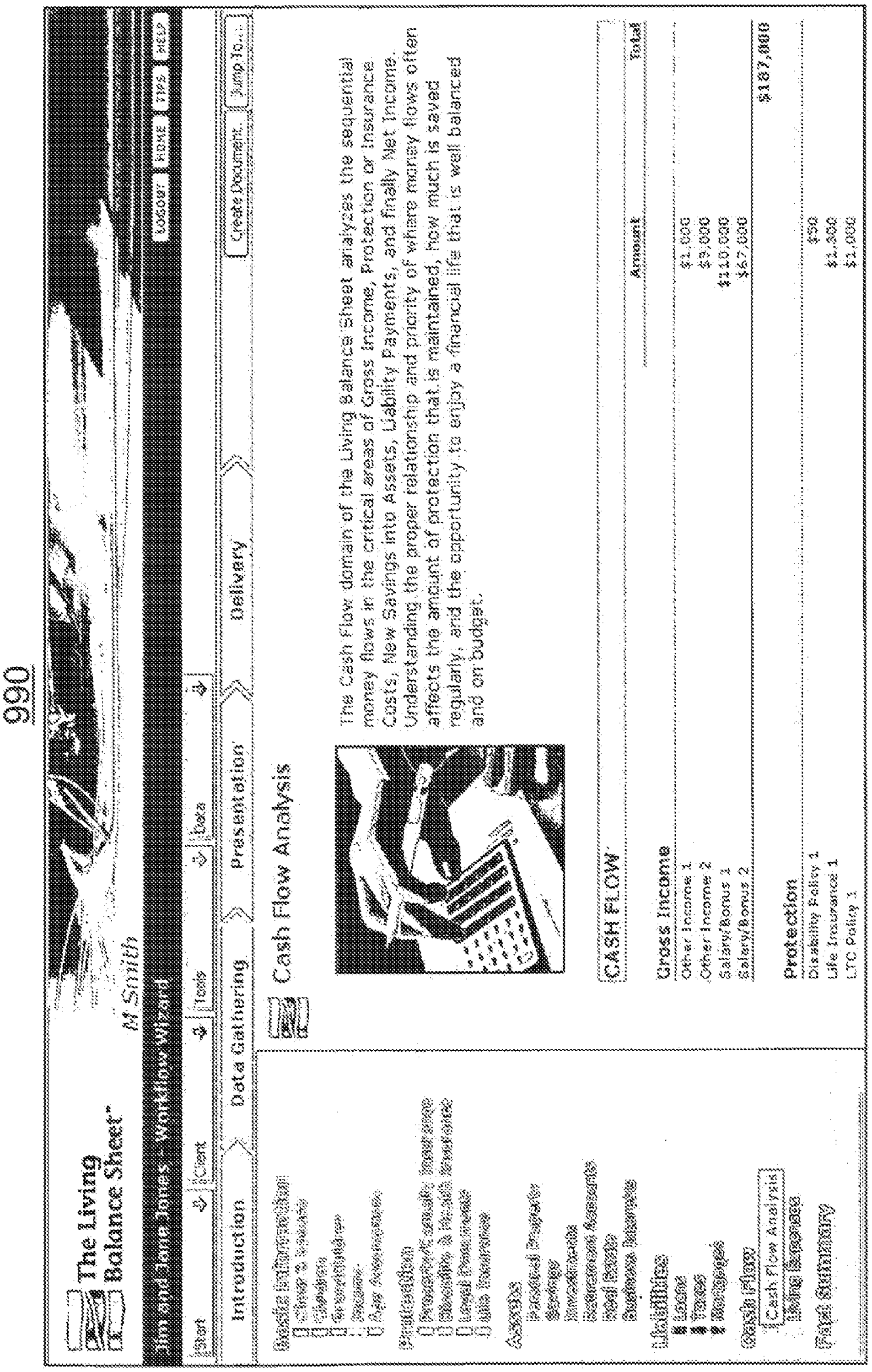

The next section of the Workflow Wizard® can comprise a cash flow section that as shown in FIG. 99 includes a cash flow analysis and living expenses subsections. Cash flow analysis display page 990 of the cash flow analysis subsection can be displayed when for example a user selects next button 984 of FIG. 98. Cash flow analysis display page 990, which is more fully shown by the combination of FIGS. 99 and 100, generates a report and analysis based on the saved client information. Information saved with respect to the gross income, protection (e.g., insurance protection), asset building (e.g., retirement and savings accounts), and liability payments (e.g., mortgages or loans) are retrieved and/or calculated and displayed in display page 990 in a table format. As shown, subtotals are generated for the different categories and a net income value is calculated and displayed. Individual line items can if desired be selectable to quickly move the user to a corresponding display page.

Figure 101:
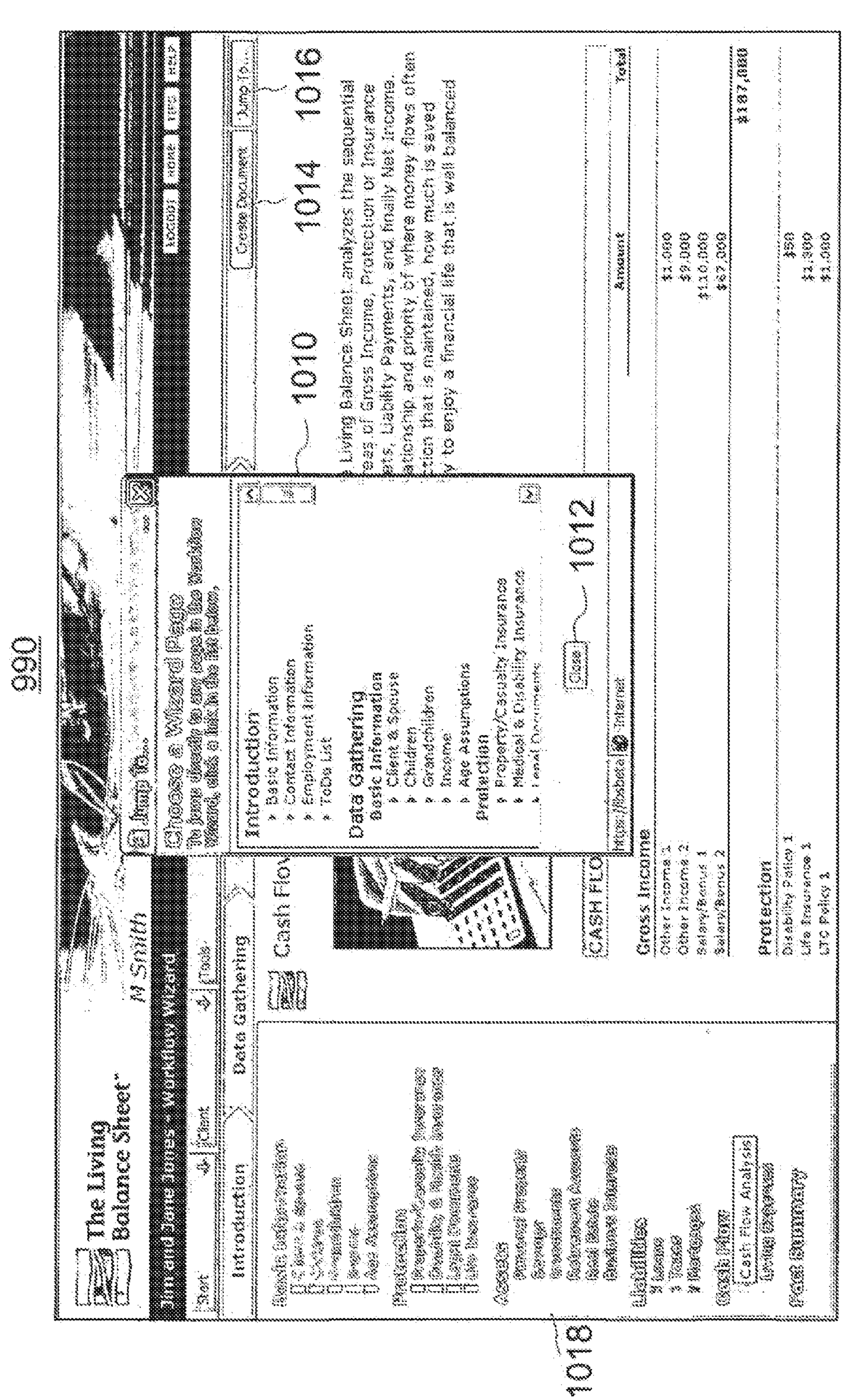
Figure 102:
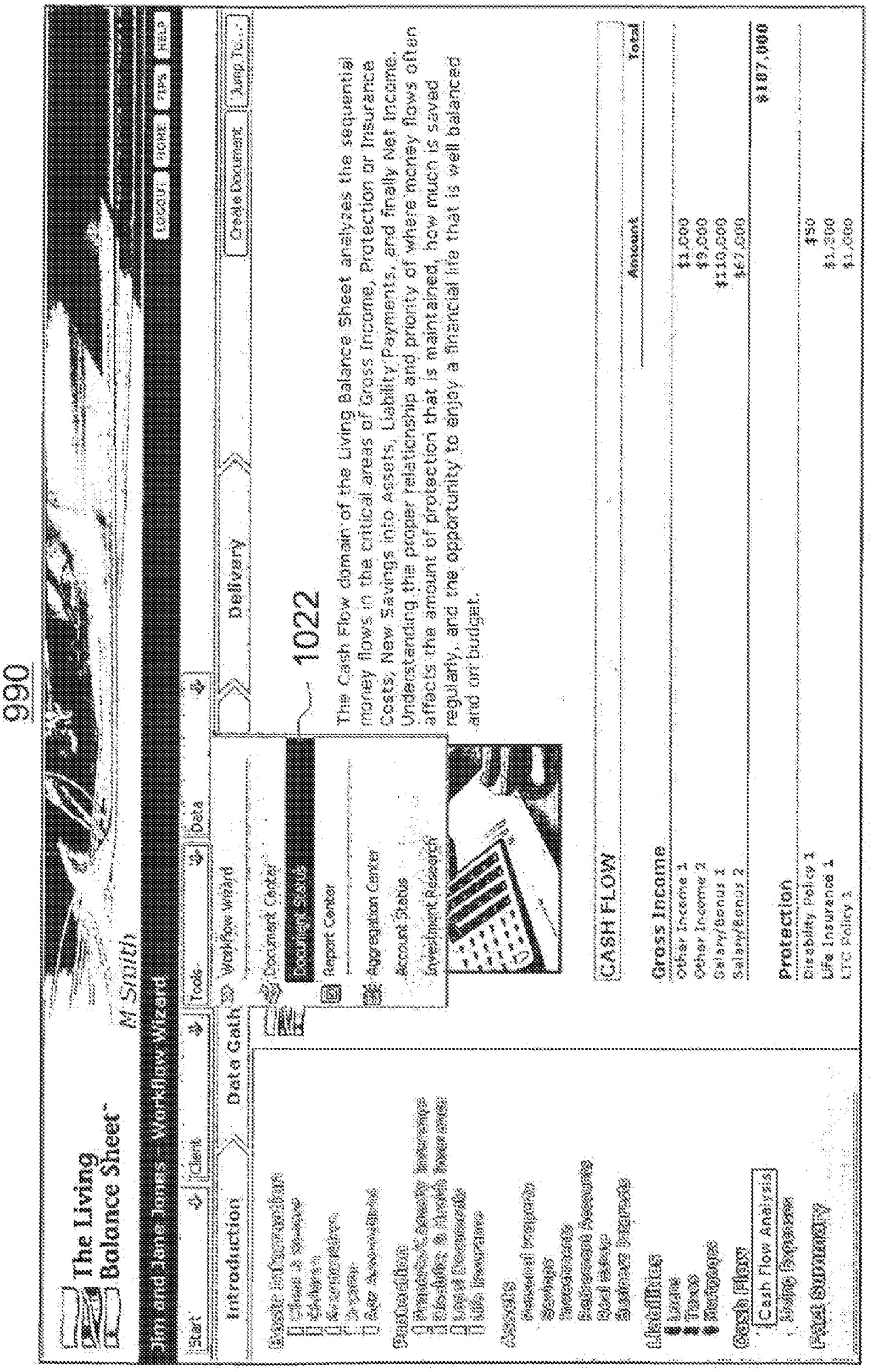

As shown, cash flow display page 990 of FIG. 101 can include jump to button 1016, which is a functionality that is also included in other figures. Using jump to button 1016, a user can jump between display pages within the Workflow Wizard® without having to view the sequence of display pages that are between two end pages. When jump to button 1016 is selected, wizard page pop-up window 1010 is displayed. Window 1010 displays the outline of the Workflow Wizard® such as by displaying the sections and subsections. The displayed information in window 1010 can be a redisplay of the Workflow Wizard®. By selecting an item in window 1010, the software will automatically move the user to a display page corresponding to the selected item. Close button 1012 can be used to close window 1012. Create document button 1014 can be used to generate reports and other documents for the user that would be automatically populated with the client's information. For example, create document button 1014 when selected will cause the software to generate a cash flow document based on the contents and information in the cash flow analysis of display page 990.

Figure 103:
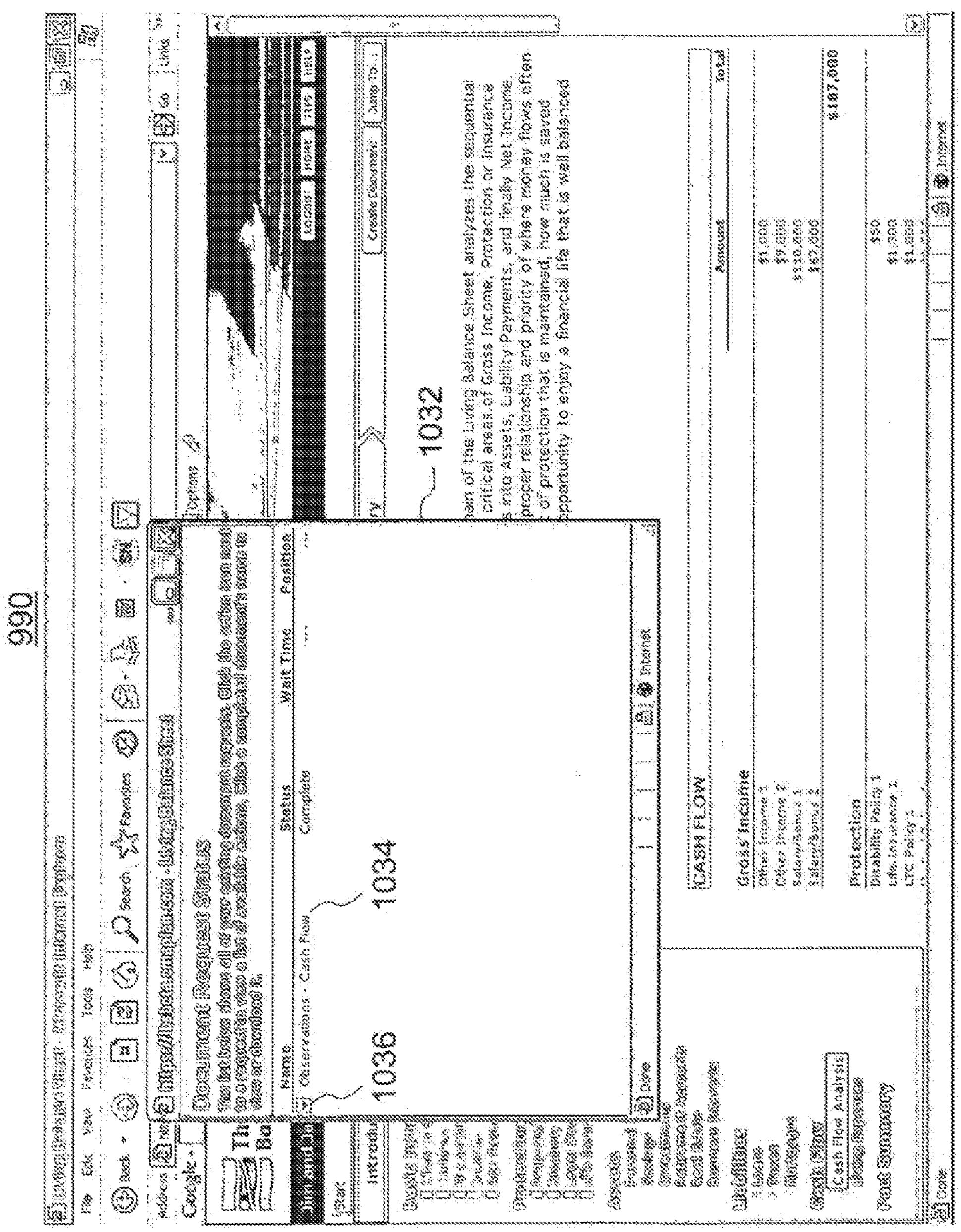
Figure 104:
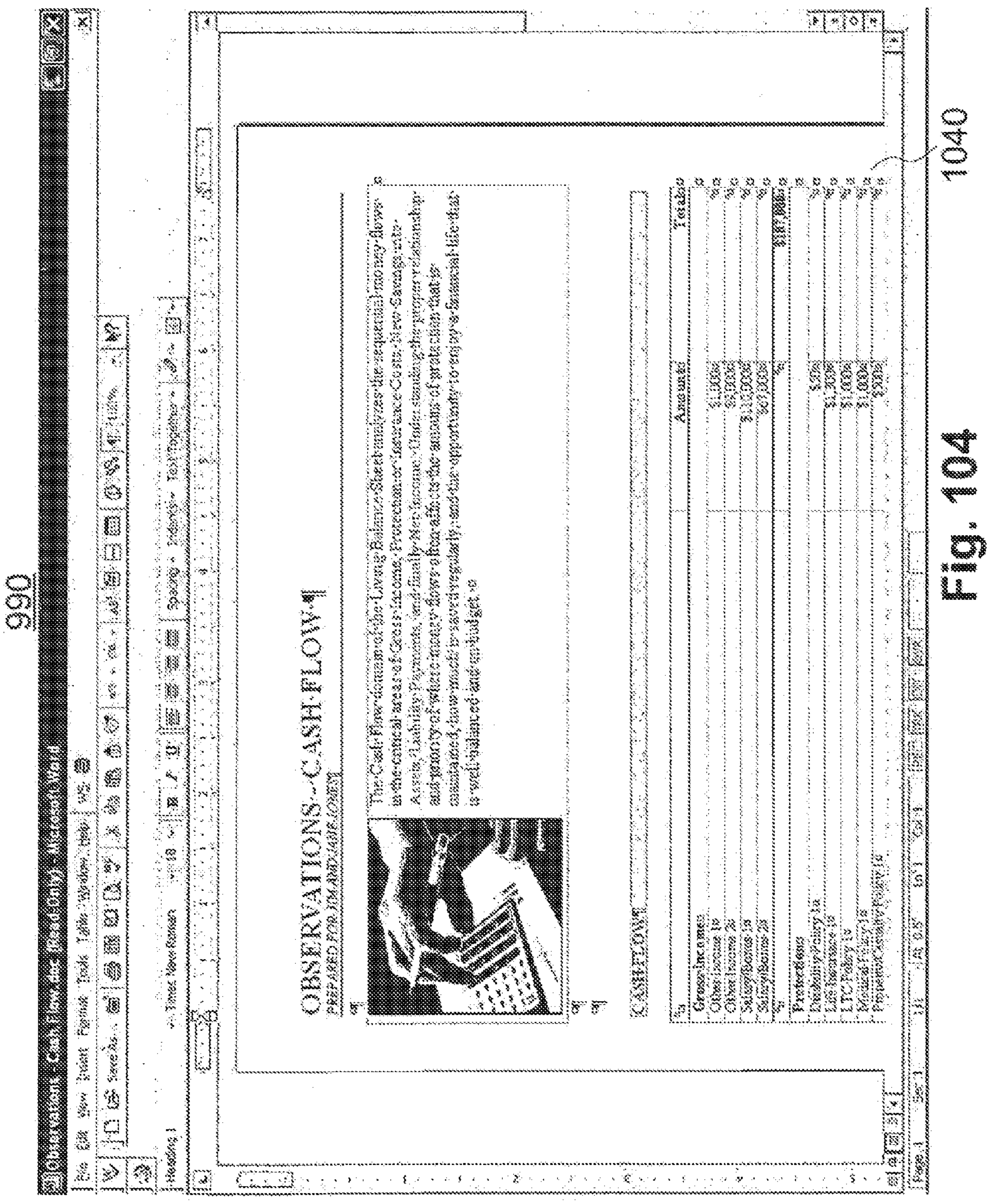
Figure 105:
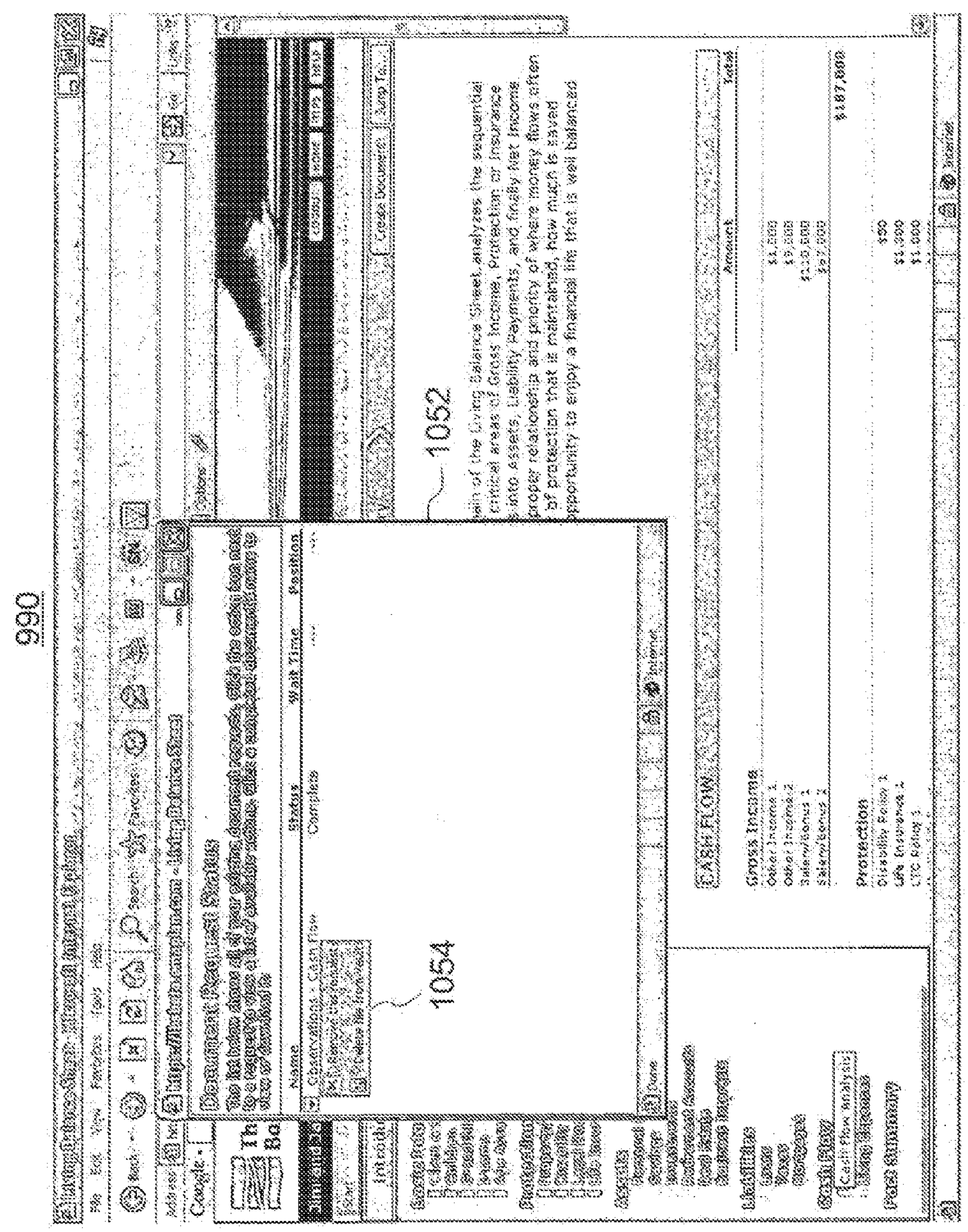

In some instances, the document may not be immediately generated or available such as for example when the bulk of the processing occurs remotely such as at the server. To check the status of a document, a user is allowed to pull down the tools menu and select document status option 1022. In response to such a selection, document request status window 1032 of FIG. 103 can be displayed. Window 1032 as shown can include list 1034 of the documents requested by the user along with the status of the document request and if not completed, the expected wait time for the completion of the requested document and the position in the queue for document creation. Arrow 1036 can provide the user with an opportunity to view additional options that are related to a document listed in window 1032. When a user selects (e.g., double clicks) a completed document list 1034, the document can be opened for user review. For example, as shown in FIG. 104, observations-cash flow report 104 can be displayed when it is selected from list 1034 of FIG. 103. The report is opened by an application that is appropriate for the document type of the report. As shown, the report is opened in a word processor application in a read only format. As such, the user may print, send (e.g., via e-mail), or save the document or perform other related functions in connection with the document. When a user selects arrow 1032 of FIG. 103, additional options with respect to the document that is associated with that arrow are displayed. For example, in FIG. 105, options 1054 are displayed, which provide the user with the option for removing that particular document request from the list or deleting a related file from the vault.

Figure 100:
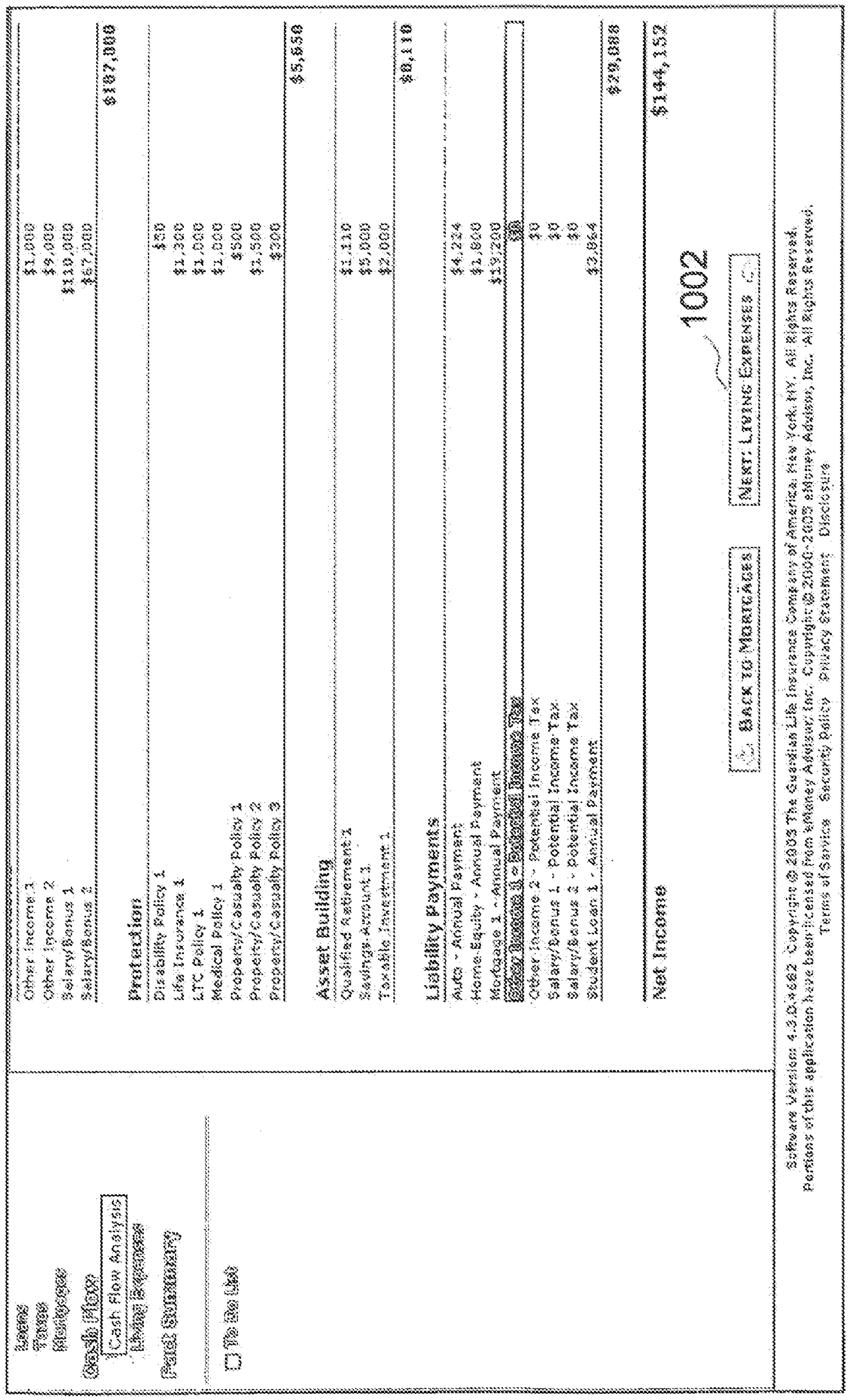
Figure 106:
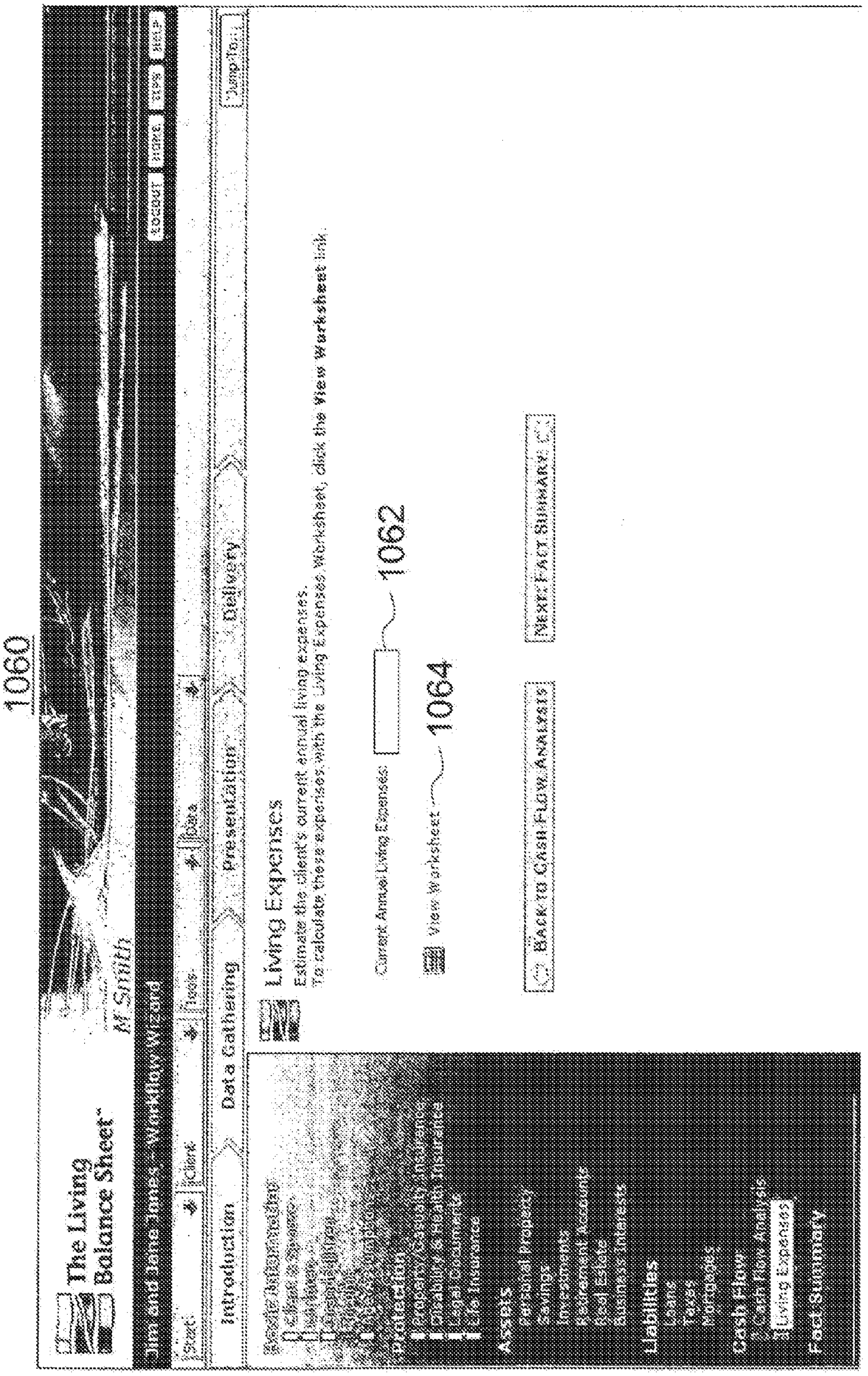
Figure 107:
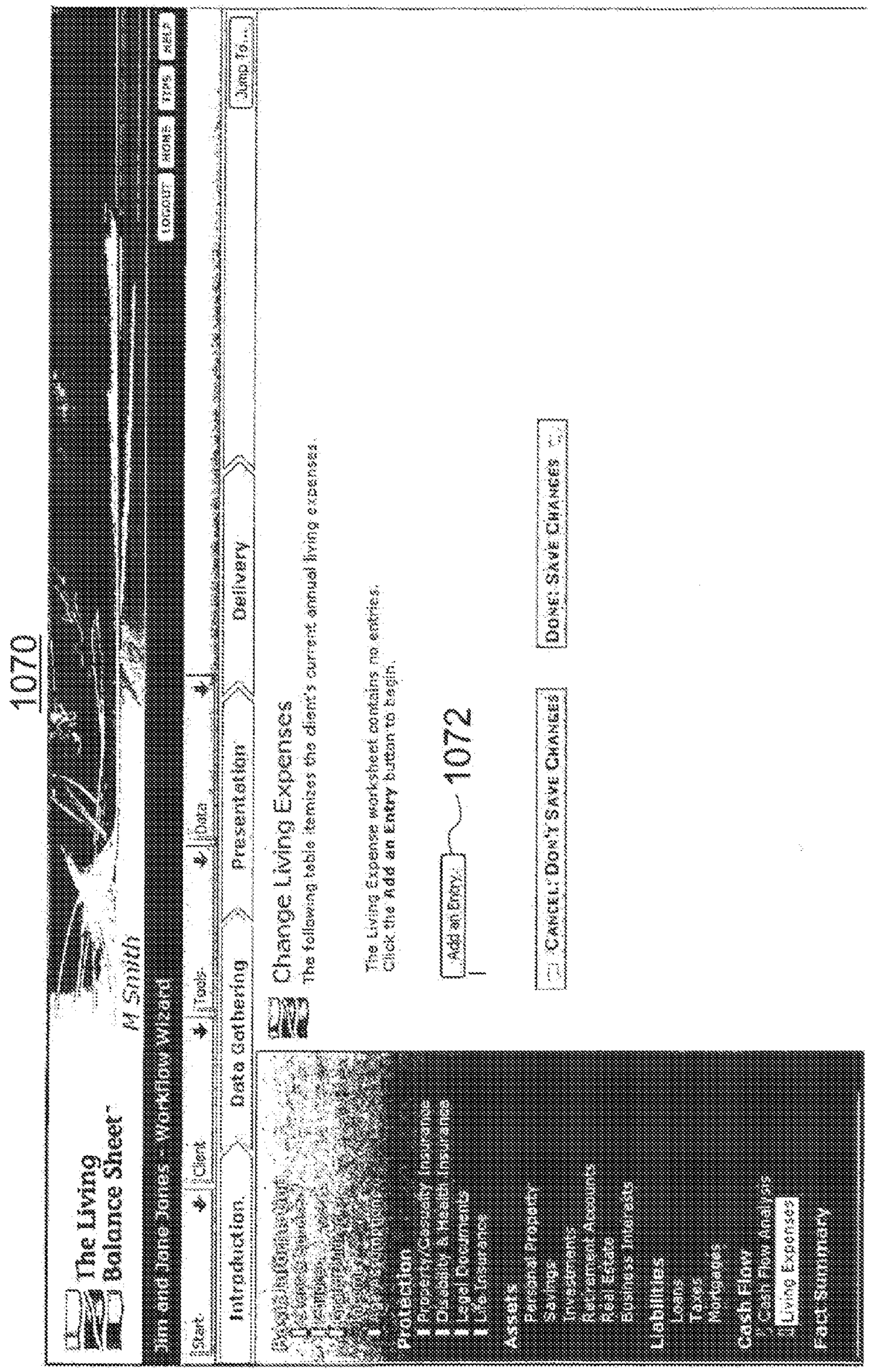
Figure 108:
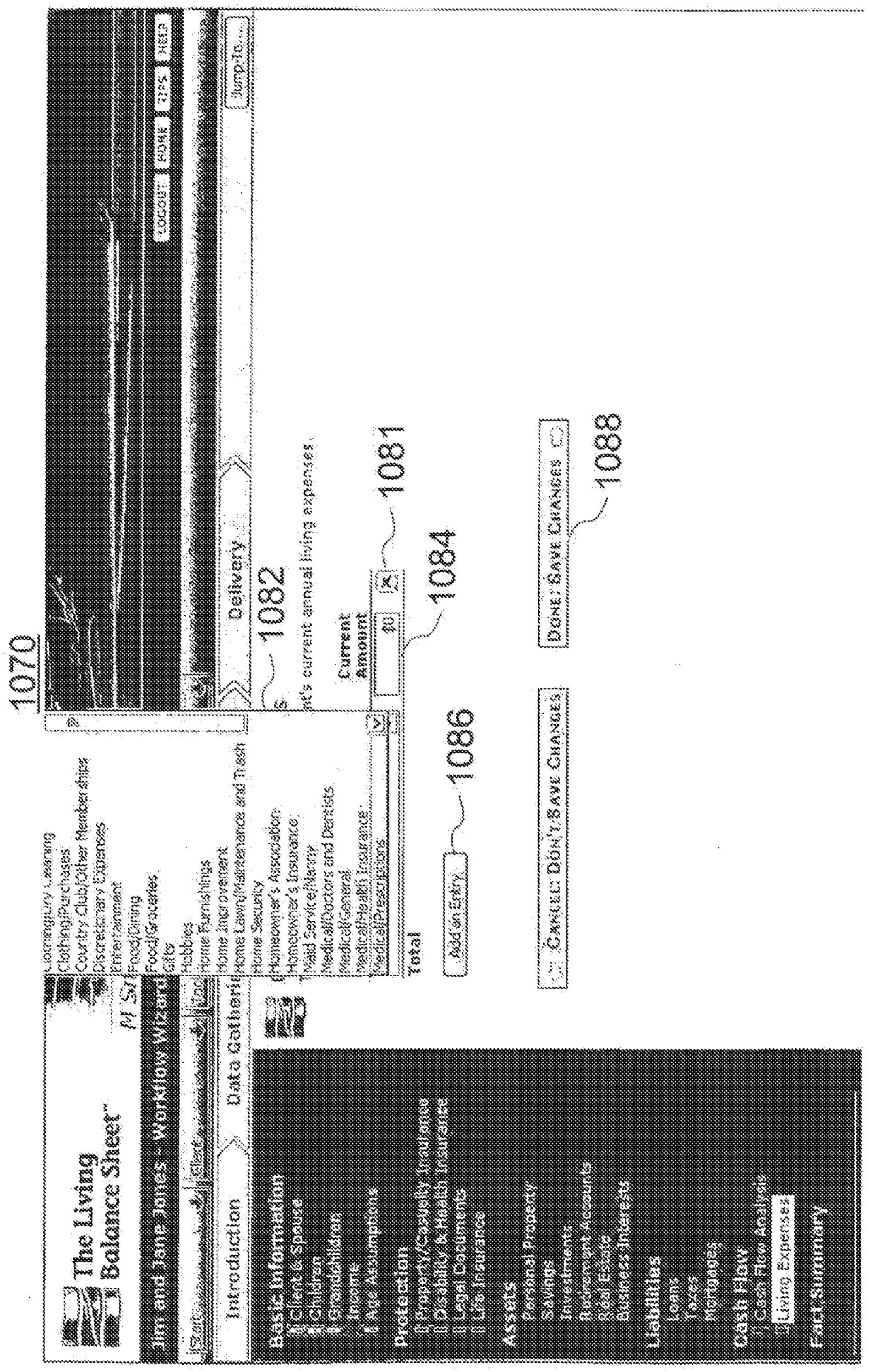
Figure 109:
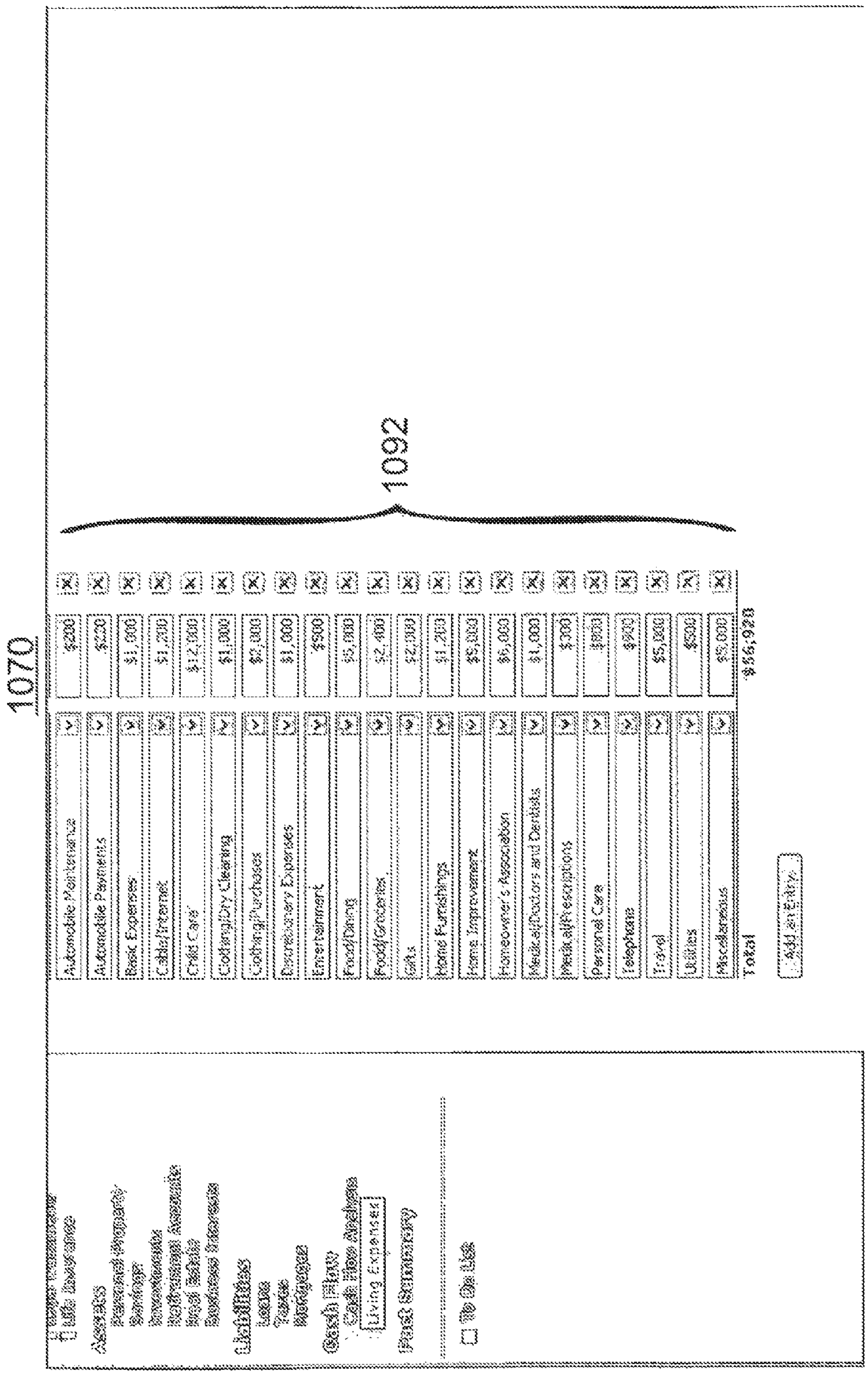
Figure 110:
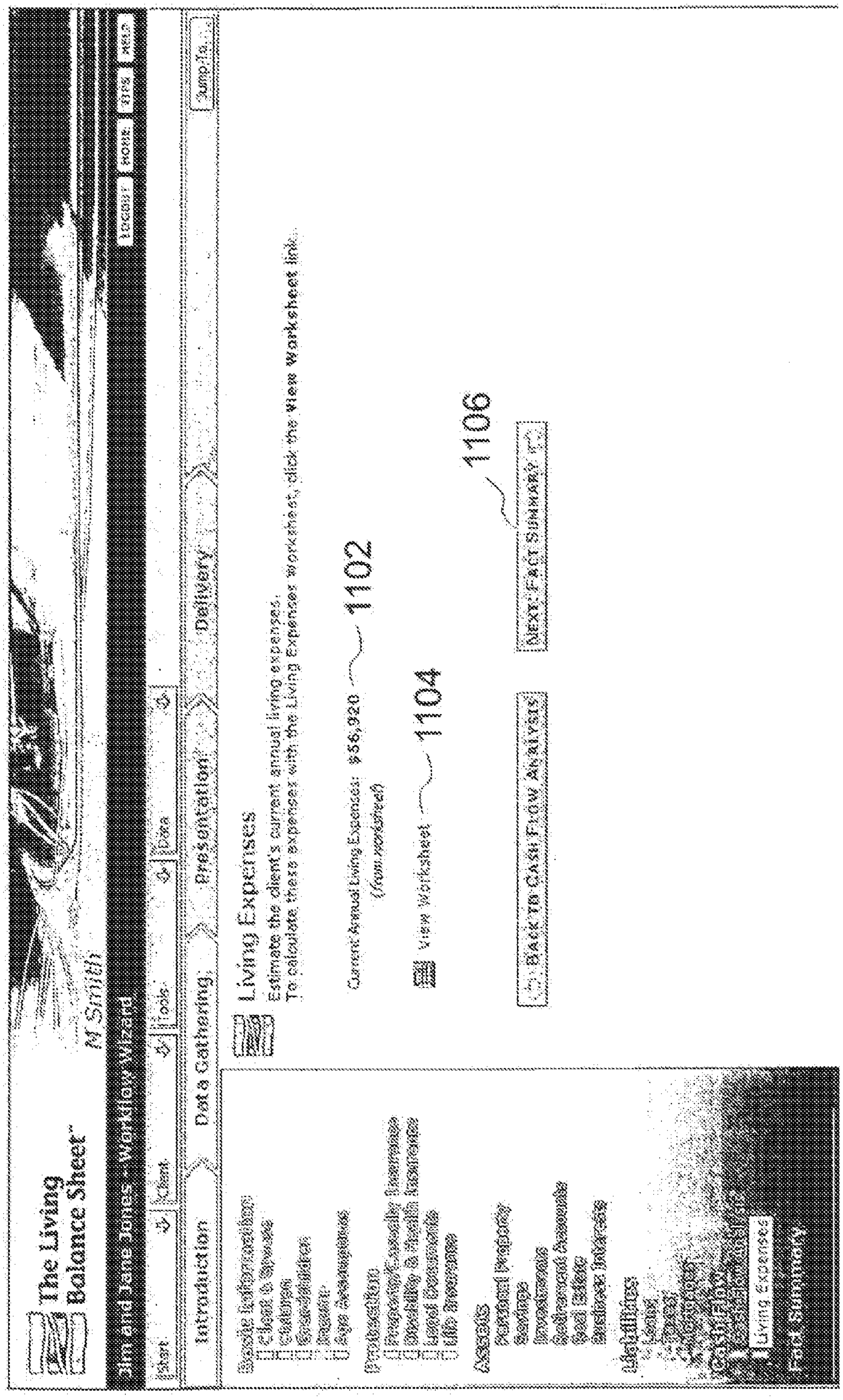
Figure 111:
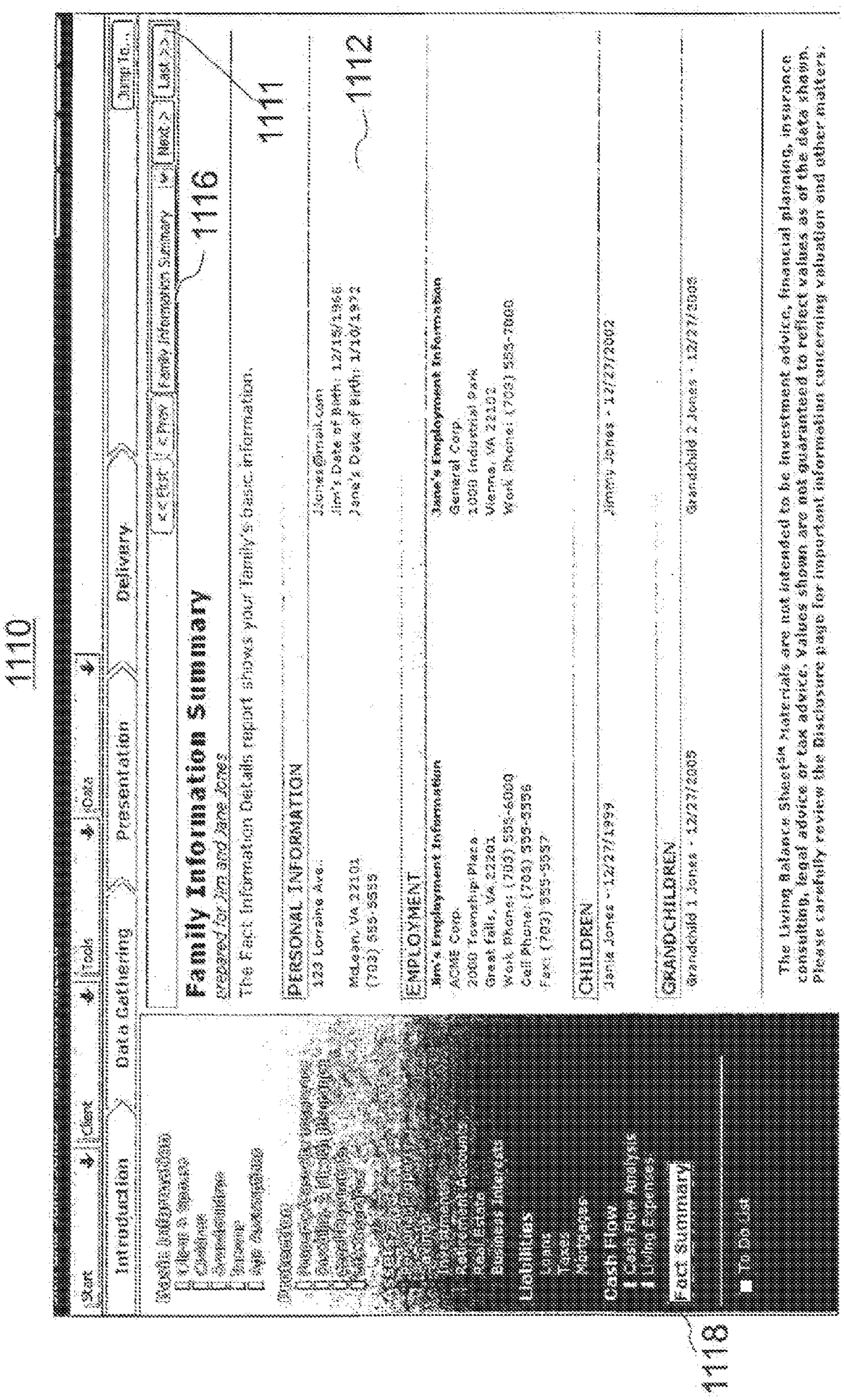

A user can for example move to the next subsection, which is the living expenses subsection of the cash flow section, by selecting next button 1002 of display page 990 of FIG. 100. In response, living expenses display page 1060 can be displayed. Living expenses display page 1060, as shown, provides the user with the option of estimating the client's current annual living expenses by entering the estimate in field 1062 or to use an interactive worksheet for generating an estimate through a detailed approach by using worksheet option 1064. Change living expenses display page 1070 can be displayed when the user selects worksheet option 1064 of FIG. 106. Change living expenses display page 1070 includes a summary of expense entries added by the user and includes add an entry button 1072 for adding entries. By selecting add an entry button 1072, expense entry 1081 is automatically added to display page 1070 for interaction by the user. Entry 1081 includes pull-down menu 1082, current amount field 1082, and an option for deleting that entry ("X"). Pull-down menu 1082 can be preconfigured with a comprehensive list of different categories of living expenses as for example shown. A user can select a category and enter an estimated annual amount for that category to configure the expense based on that client's information. To add new entries, the user can select add an entry button 1086 and make a selection or enter data within the new entry to add the information. By repeating the process, the user can complete a detailed worksheet of the current client's annual expenses such as that shown in FIG. 109. When a user selects, done button 1088 (as shown in FIG. 108), the entered or selected information is saved for the current client. In response living expenses display page 1102 is displayed, which includes an automatically calculated total of the expenses entered in the worksheet of change living expenses display page 1070 of FIG. 107109. To return to the worksheet, a user can select view worksheet option 1104 of FIG. 110. To continue to the next section of the Workflow Wizard®, a user can select next button 1106.

Figure 112:
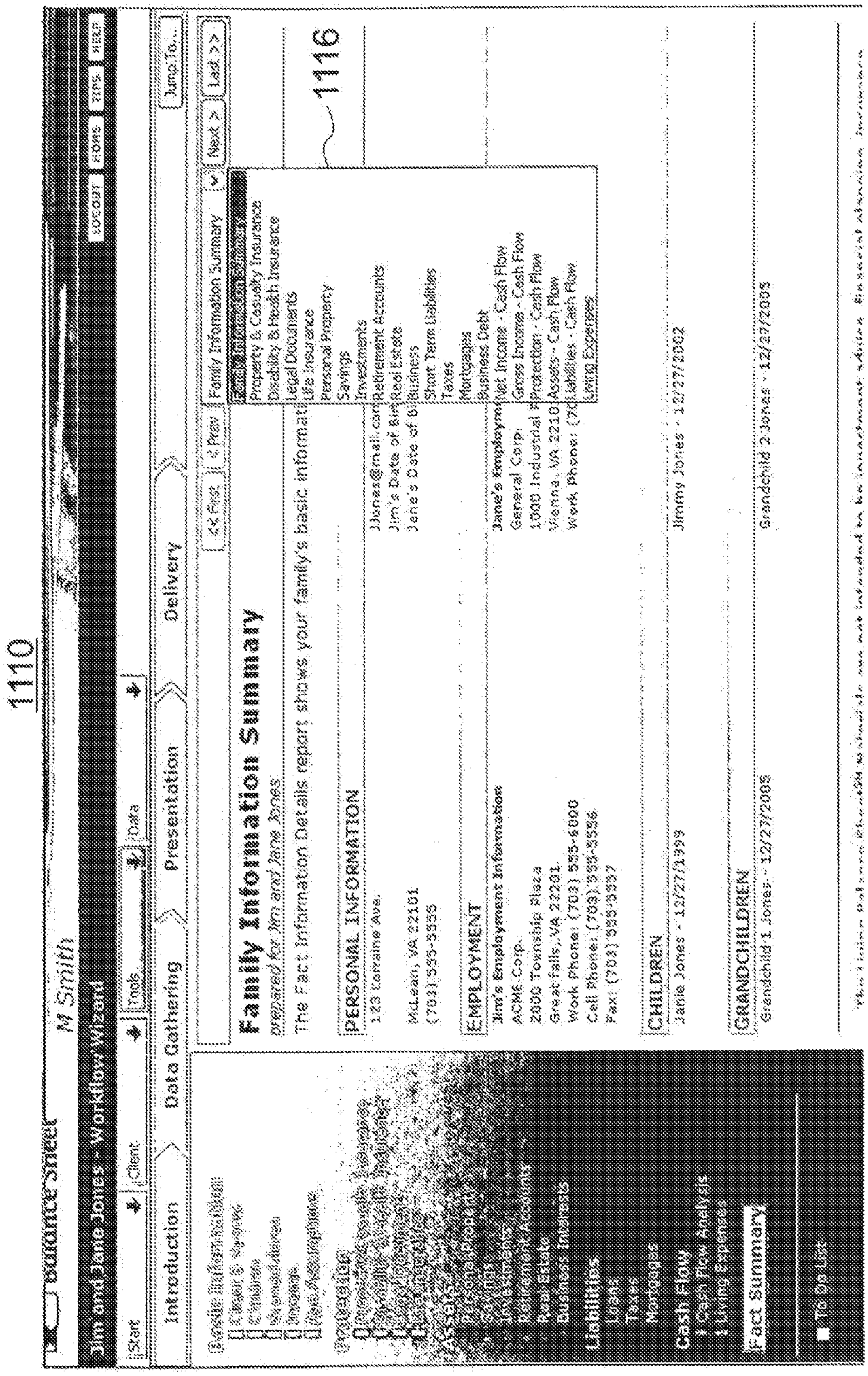

Within the data gathering section, the Workflow Wizard® can include a fact summary section for summarizing the client information that has been entered or calculated in the data gathering stage of the wizard. The fact summary can be segmented to correspond to the data gathering sections and if appropriate the subsections of the data gathering stage. For example, family information summary display page 1110 can be displayed when a user selects next button 1106 of FIG. 110. Family information summary display page 1110 can include summary section 1112 for summarizing the client information that was entered or calculated as part of the basic information section of the data gathering stage. Fact summary section 1118 can include a navigation tool that is specifically for that section. For example, navigation tools 1114 can be implemented in the fact summary section for moving within that section. Tools 1114 can include buttons for moving to the next, previous, last, or first display pages in fact summary section 1118. Switching to this type of navigation method can be beneficial to the user because there is no need to signal to the system that a user desires to further save the information. Preferably, the display pages in fact summary section 1118 only display viewable information that cannot be edited or changed by the user within the displayed pages of that section. Navigation tool 1116 can also include a pull-down menu of quick links to the various display pages within fact summary section 1116 such as that shown in menu 1116 of FIG. 112. For example, a user can move to property & casualty insurance summary display page 1130 (or to the summary display pages of FIGS. 114-124) by selecting a listing for that item in menu 1116 or by selecting the next button of navigation tools 1114 if display page 1130 is the next display page in the sequence of display pages in this section.

Figure 113:
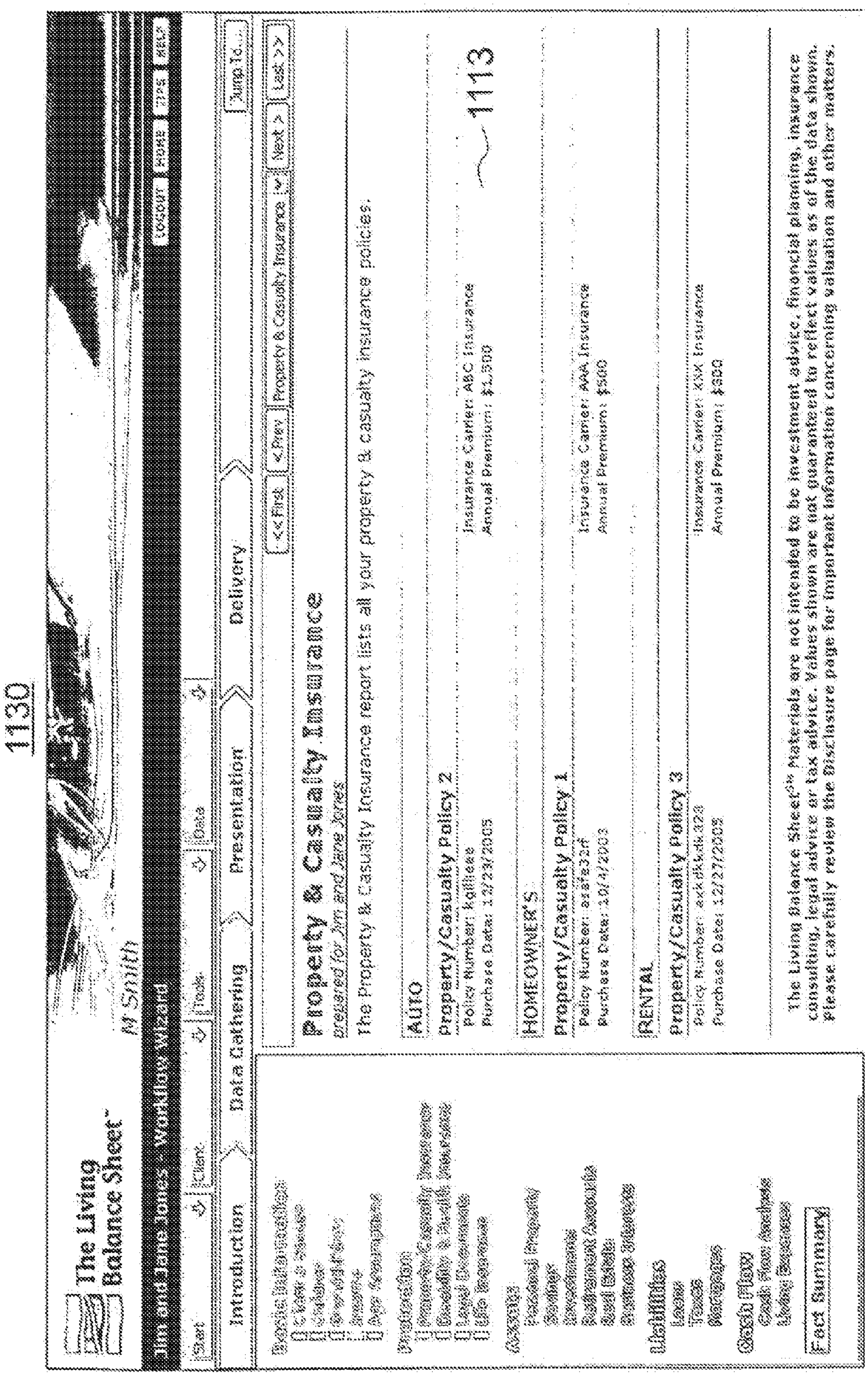
Figure 114:
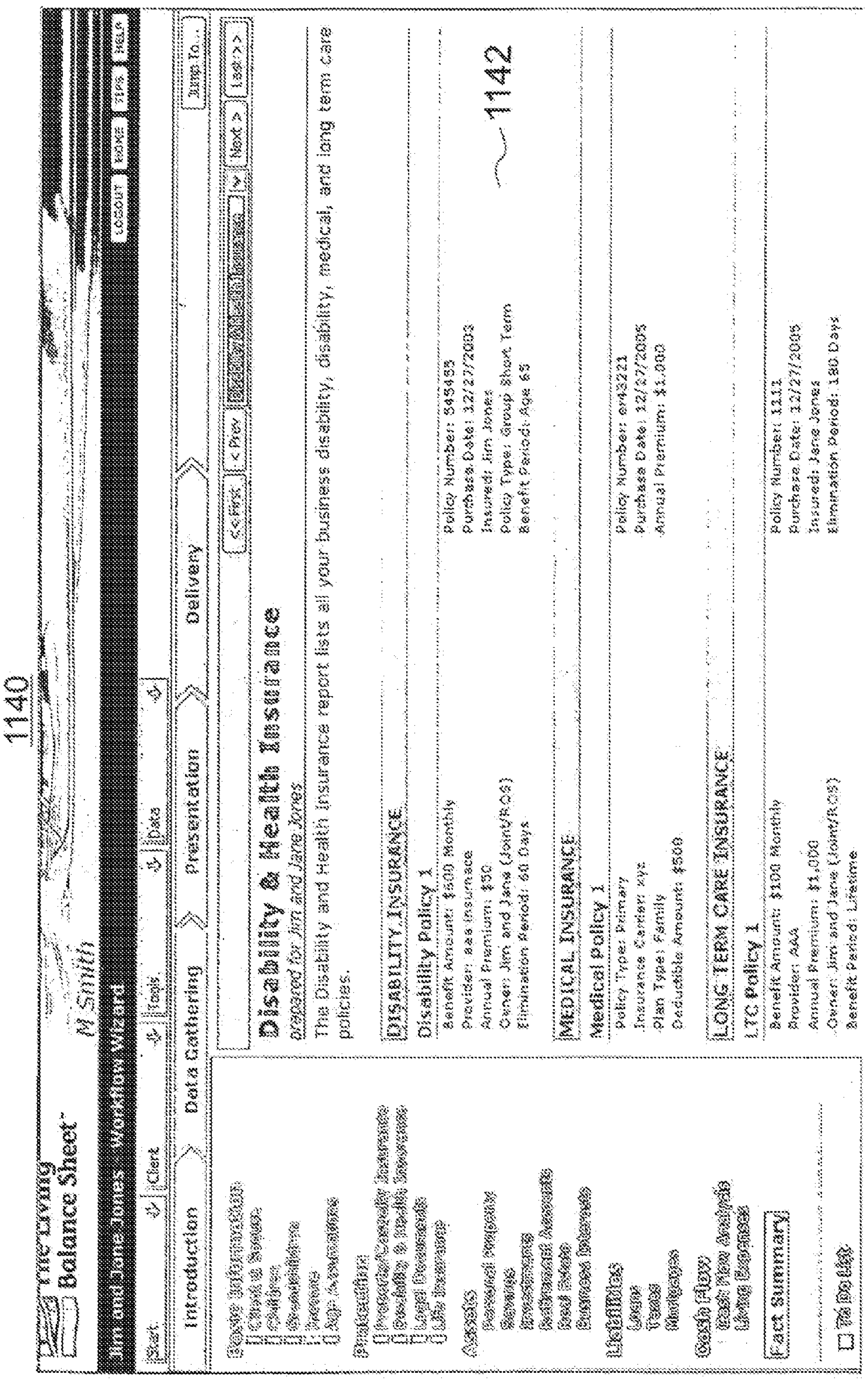
Figure 115:
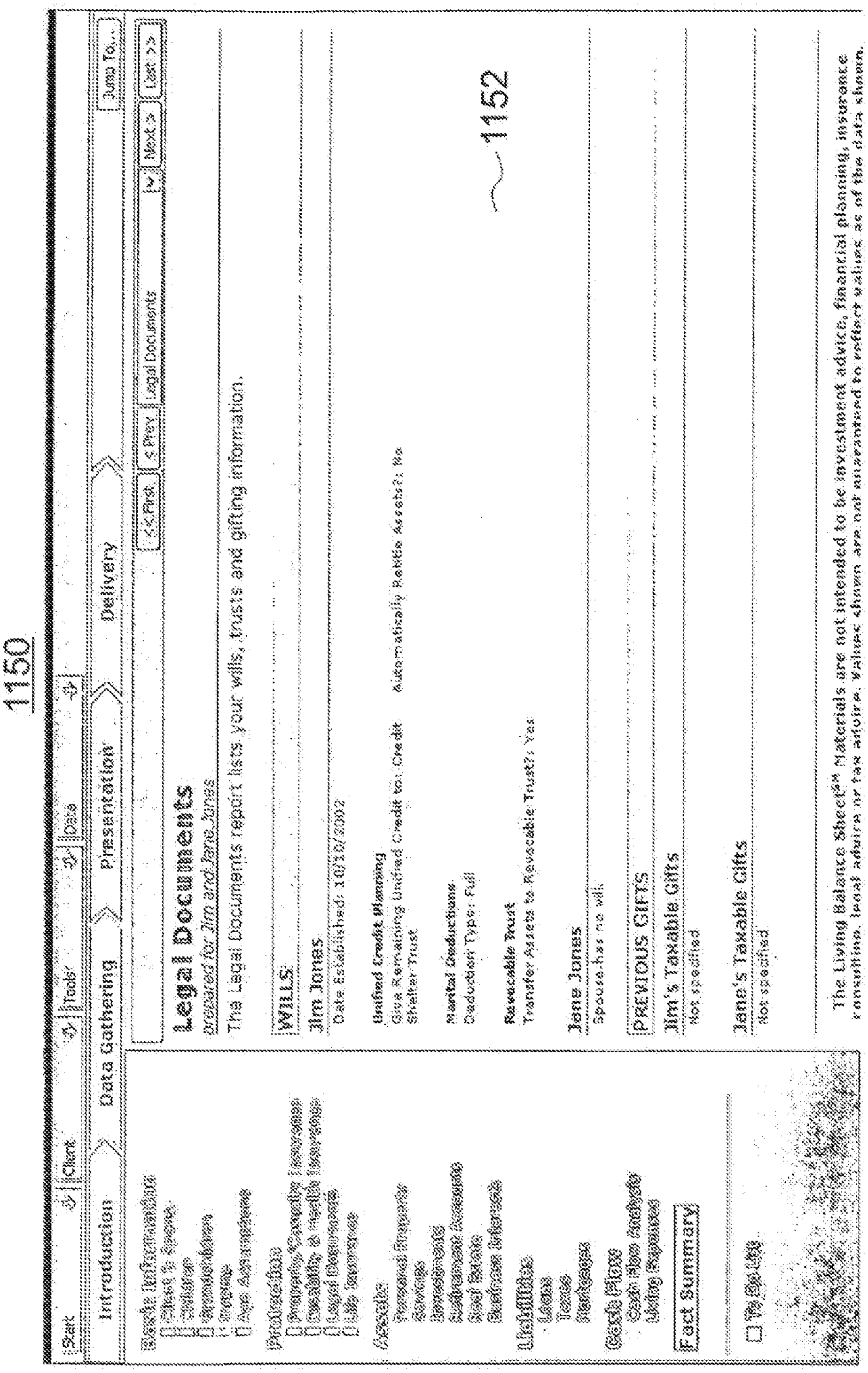
Figure 116:
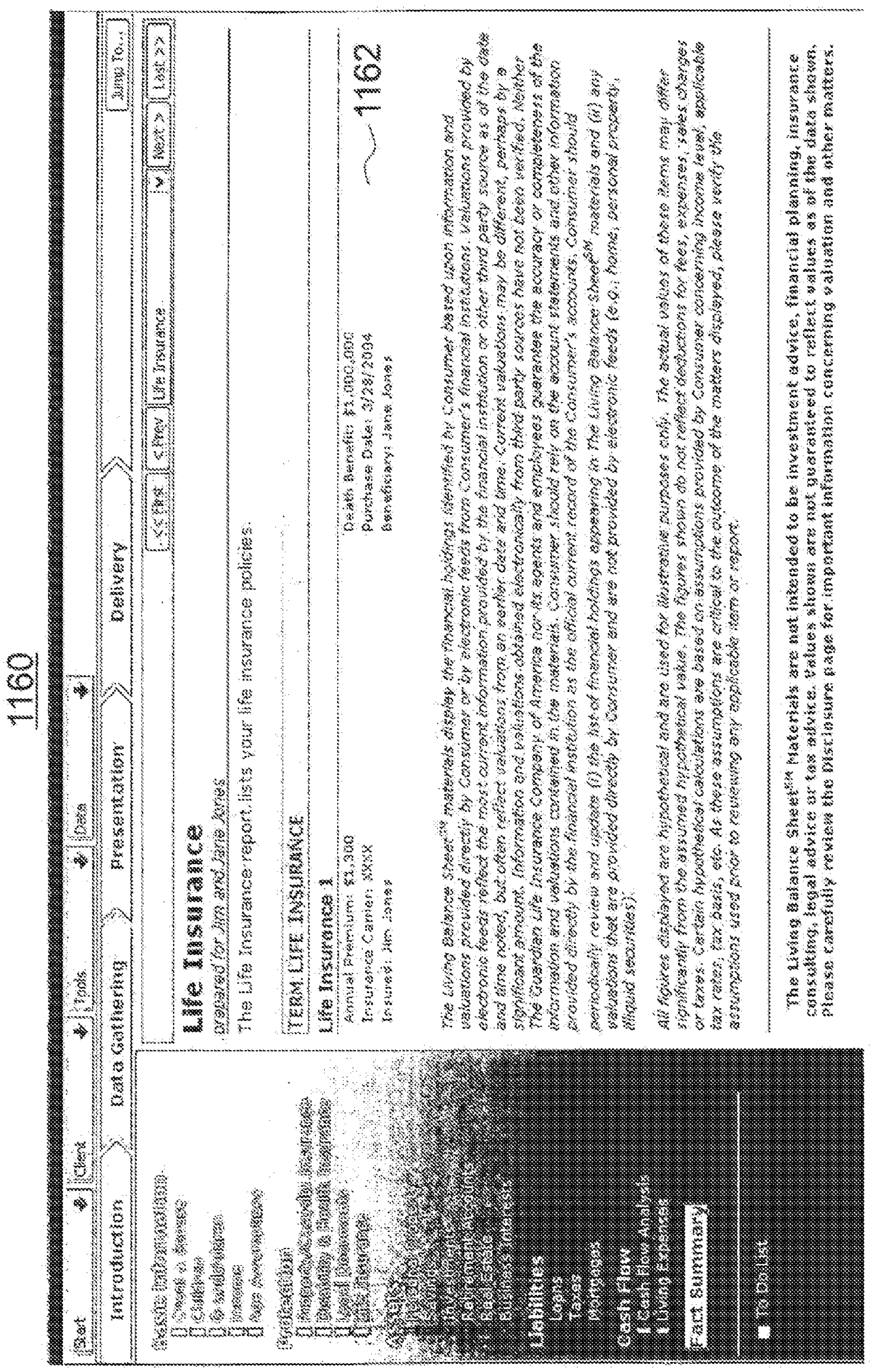
Figure 117:
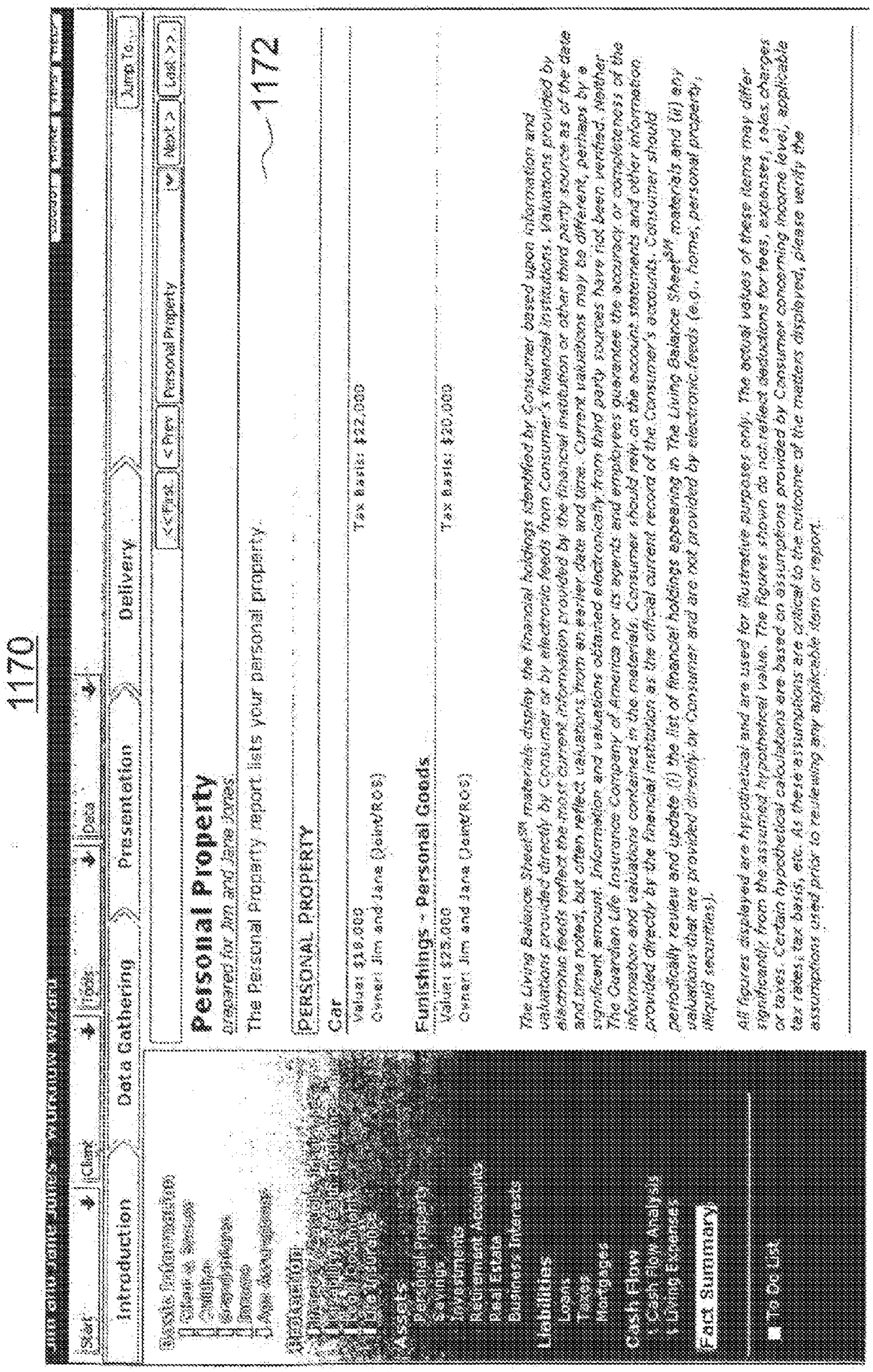

A brief description of summary display pages that can be displayed in fact summary section 1118 follows. Property & casualty insurance summary display page 1130 of FIG. 113 can include summary section 1132 that displays a summary of the client information that was entered or calculated as part of the property/casualty insurance subsection of the data gathering stage. Disability & health insurance summary display page 1140 of FIG. 114 can include summary section 1142 that displays a summary of the client information that was entered or calculated as part of the disability & health insurance subsection of the data gathering stage. Legal documents summary display page 1150 of FIG. 115 can include summary section 1152 that displays a summary of the client information that was entered or calculated as part of the legal documents subsection of the data gathering stage. Life insurance summary display page 1160 of FIG. 116 can include summary section 1162 that displays a summary of the client information that was entered or calculated as part of the life insurance subsection of the data gathering stage. Personal property summary display page 1170 of FIG. 117 can include summary section 1172 that displays a summary of the client information that was entered or calculated as part of the personal property subsection of the data gathering stage.

Figure 118:
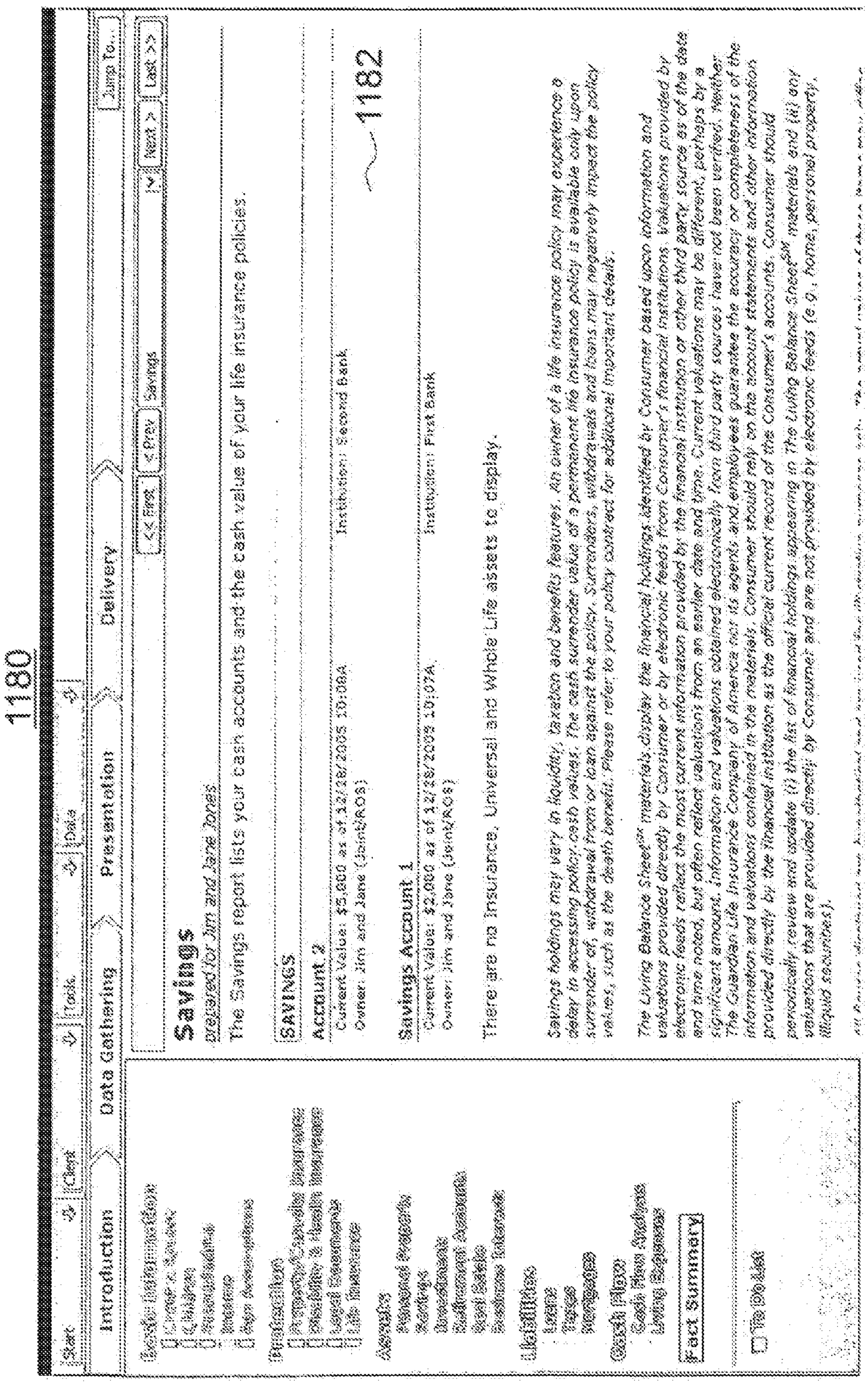
Figure 119:
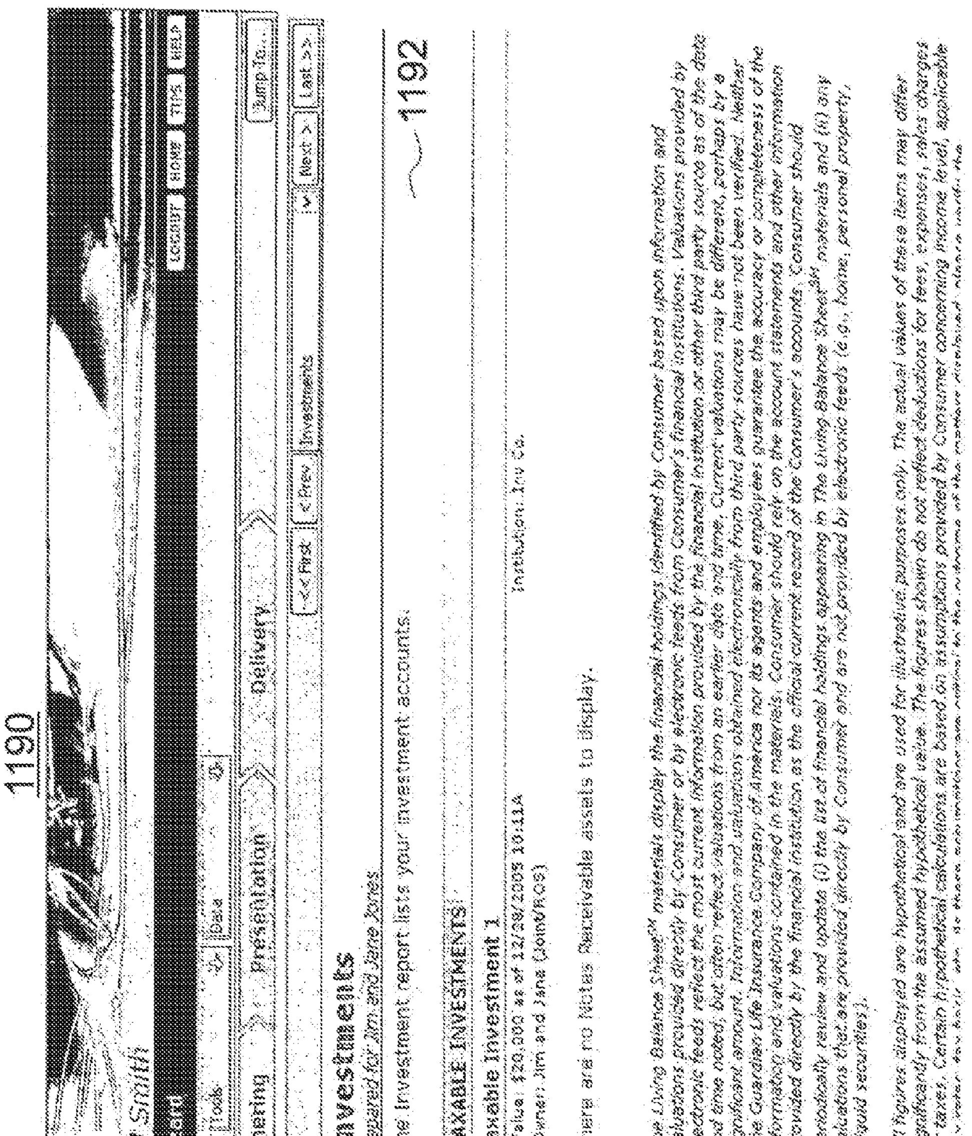
Figure 120:
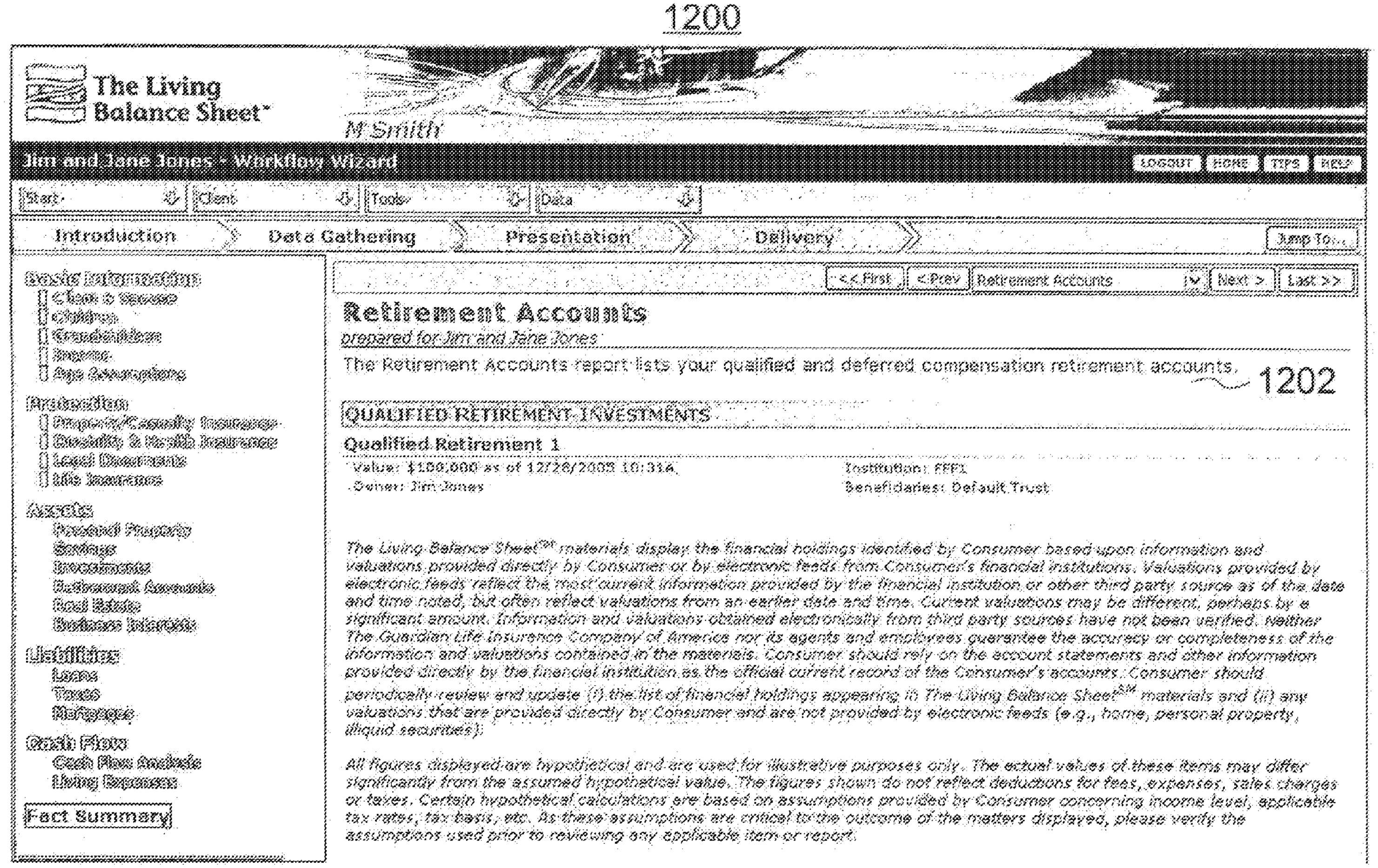
Figure 121:
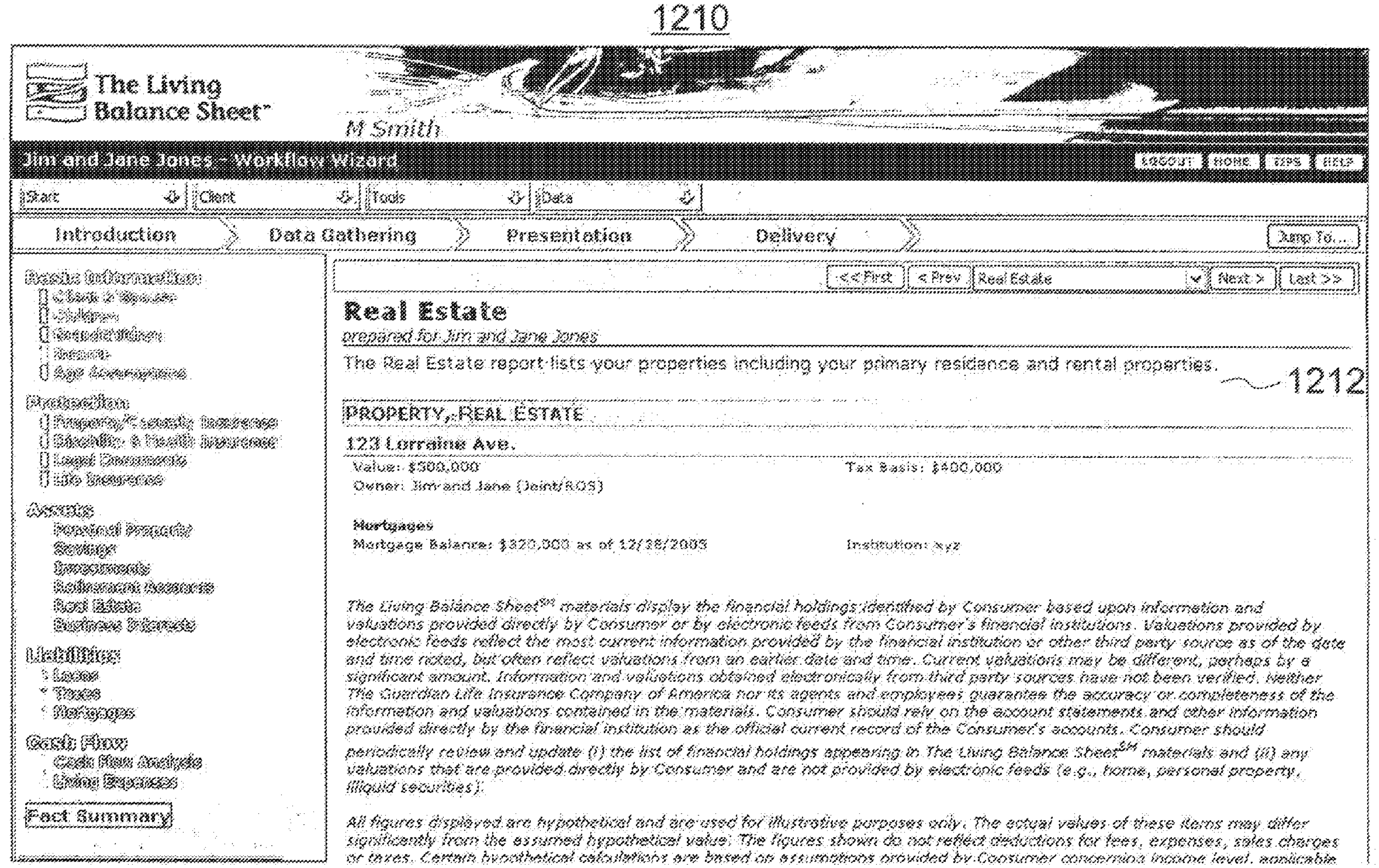
Figure 122:
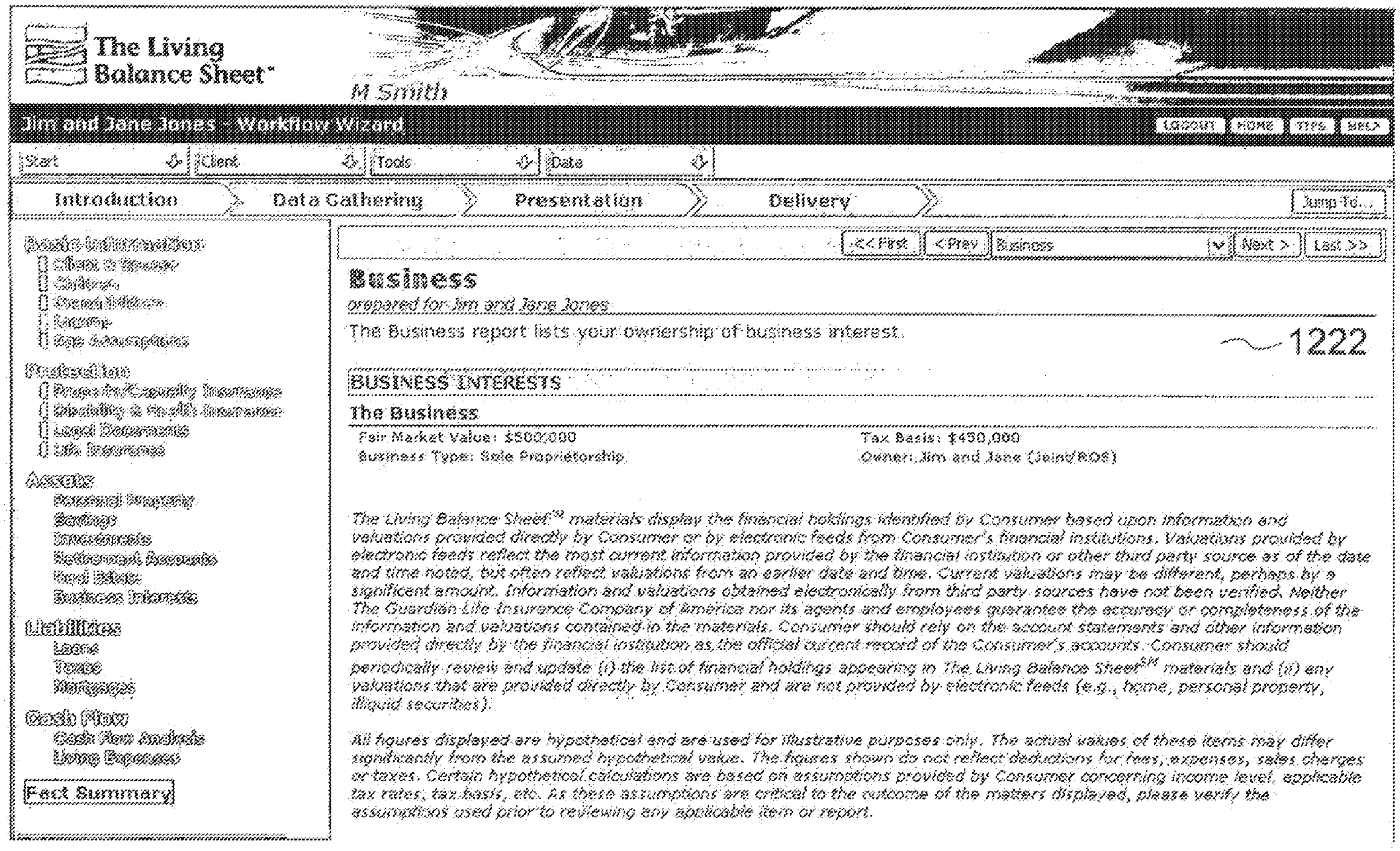
Figure 123:
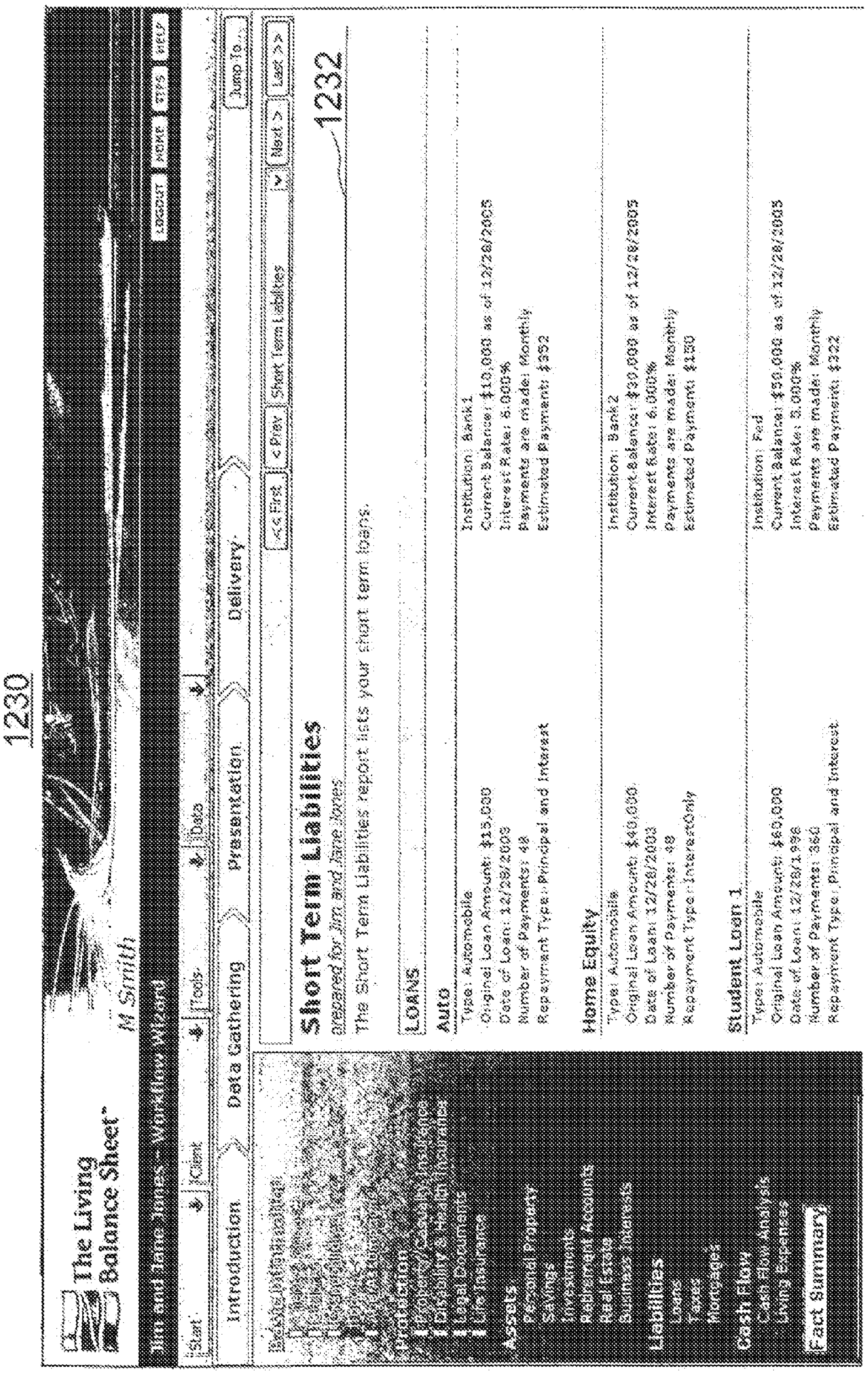
Figure 124:
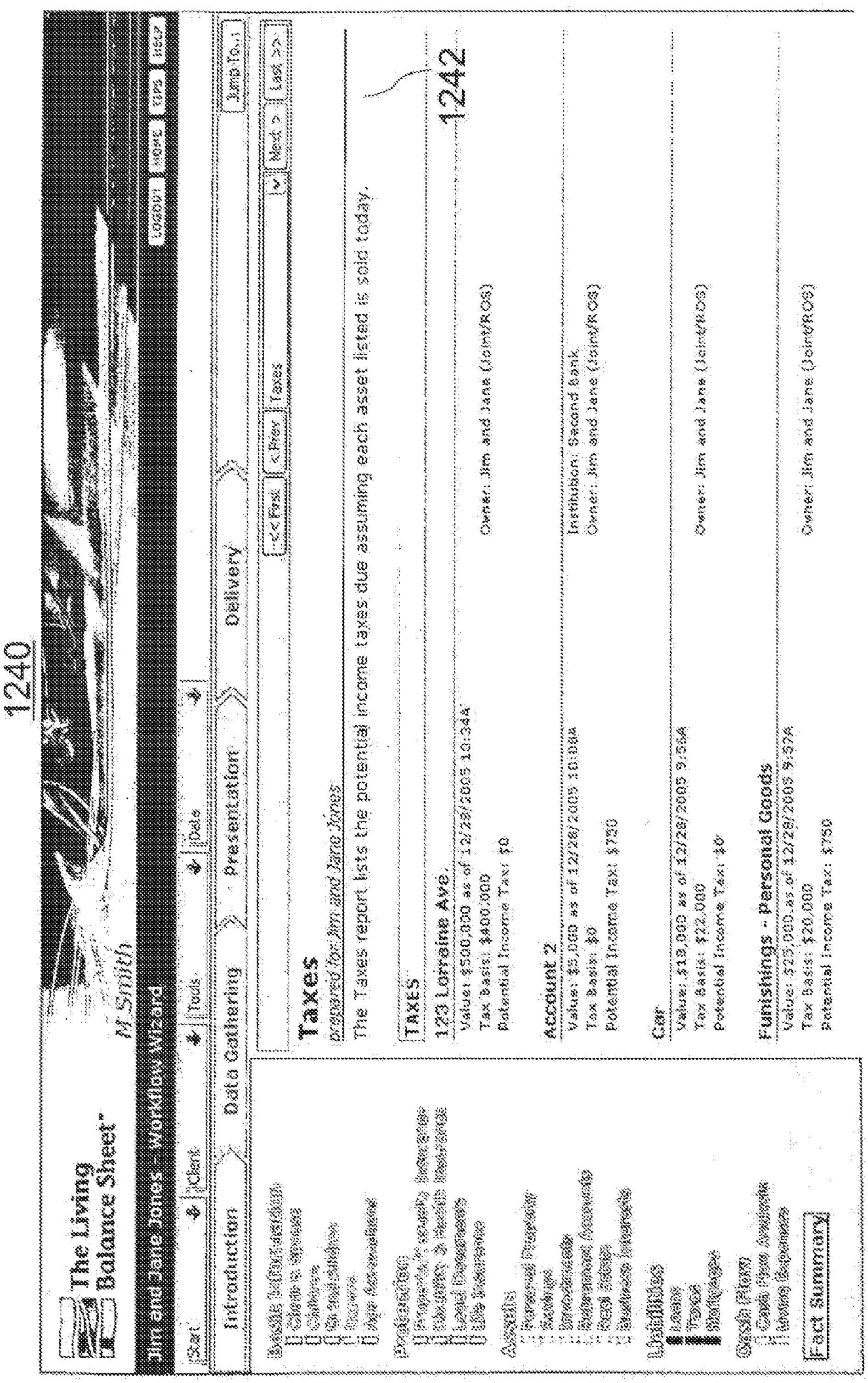
Figure 125:
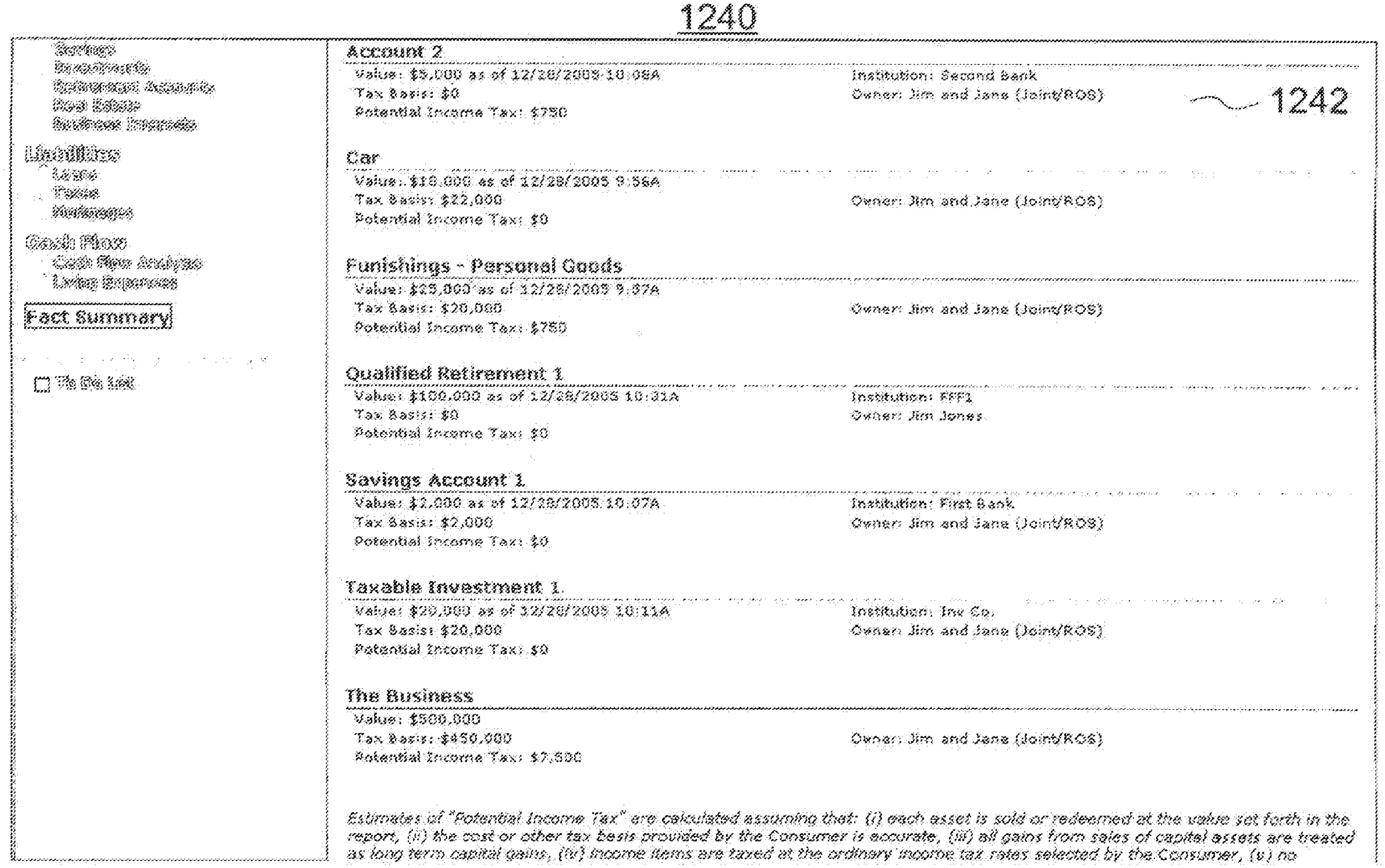
Figure 126:
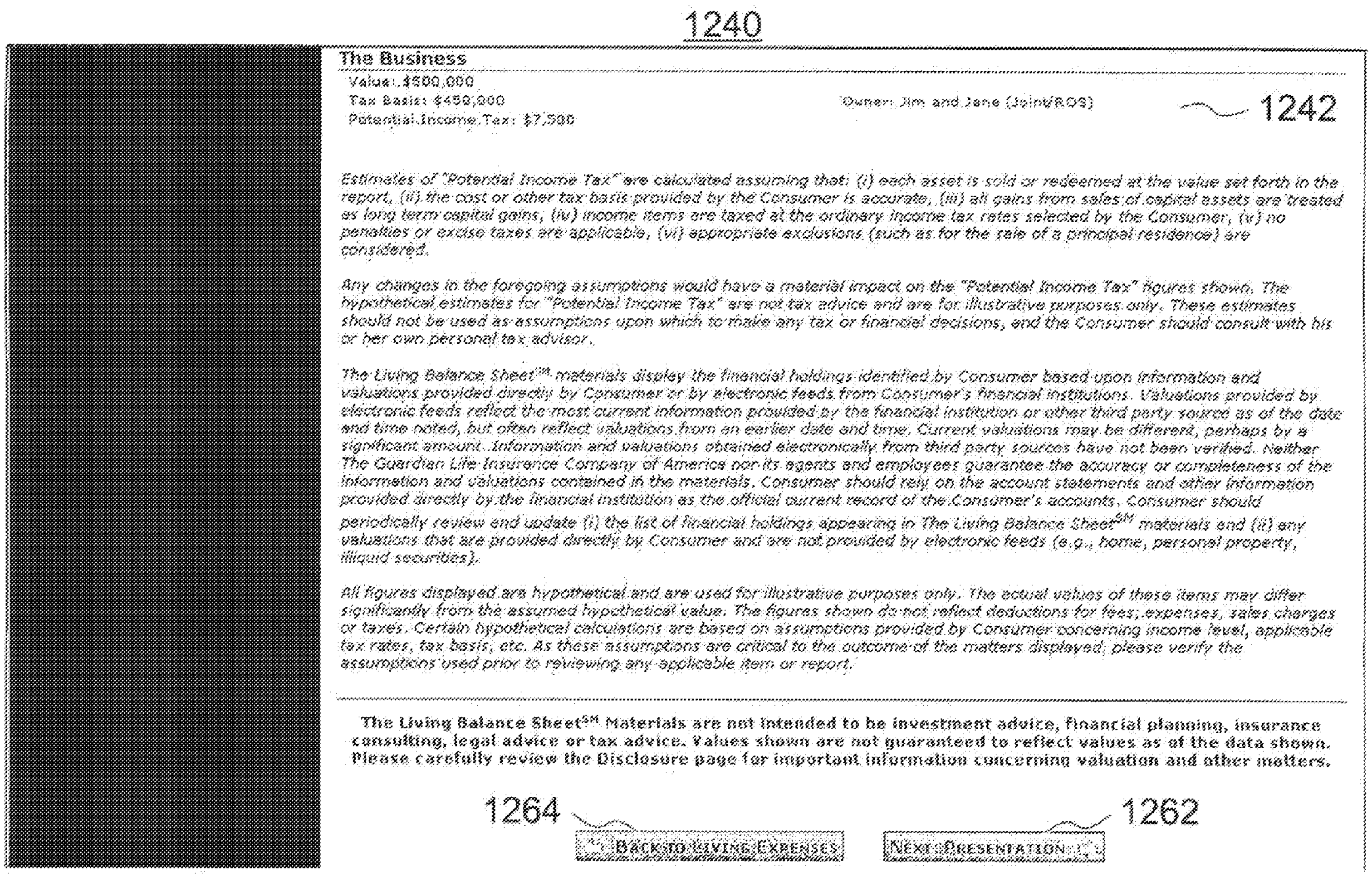

Savings summary display page 1180 of FIG. 118 can include summary section 1182 that displays a summary of the client information that was entered or calculated as part of the savings subsection of the data gathering stage. Investments summary display page 1190 of FIG. 119 can include summary section 1192 that displays a summary of the client information that was entered or calculated as part of the investments subsection of the data gathering stage. Retirement accounts summary display page 1200 of FIG. 120 can include summary section 1202 that displays a summary of the client information that was entered or calculated as part of the retirement accounts subsection of the data gathering stage. Real estate summary display page 1210 of FIG. 121 can include summary section 1212 that displays a summary of the client information that was entered or calculated as part of the real estate subsection of the data gathering stage. Business summary display page 1220 of FIG. 122 can include summary section 1222 that displays a summary of the client information that was entered or calculated as part of the business interests subsection of the data gathering stage. Short-term liabilities summary display page 1230 of FIG. 123 can include summary section 1232 that displays a summary of the client information that was entered or calculated as part of the loans subsection (e.g., a summary of the short term loans of the user) of the data gathering stage. Taxes summary display page 1240 of FIGS. 124-126 can include summary section 1242 that displays a summary of the client information that was entered or calculated as part of the taxes subsection (e.g., a summary of the client's assets and the amount of potential taxes owed if the assets were sold today) of the data gathering stage. As shown, display page 1240 can include a display of the estimated current value of the asset, the tax basis of the asset, and potential income tax due if sold today. Taxes summary display page 1240 can include next button 1262 and back button 1264 if that display page is the last display page in the fact summary section. Back button 1264 can, for example, move the user to the immediate previous subsection, which as shown would be the living expenses subsection. Next button 1262 can move the user forward in the Workflow Wizard® to for example as shown to the presentation stage of the Workflow Wizard®.

Figure 127:
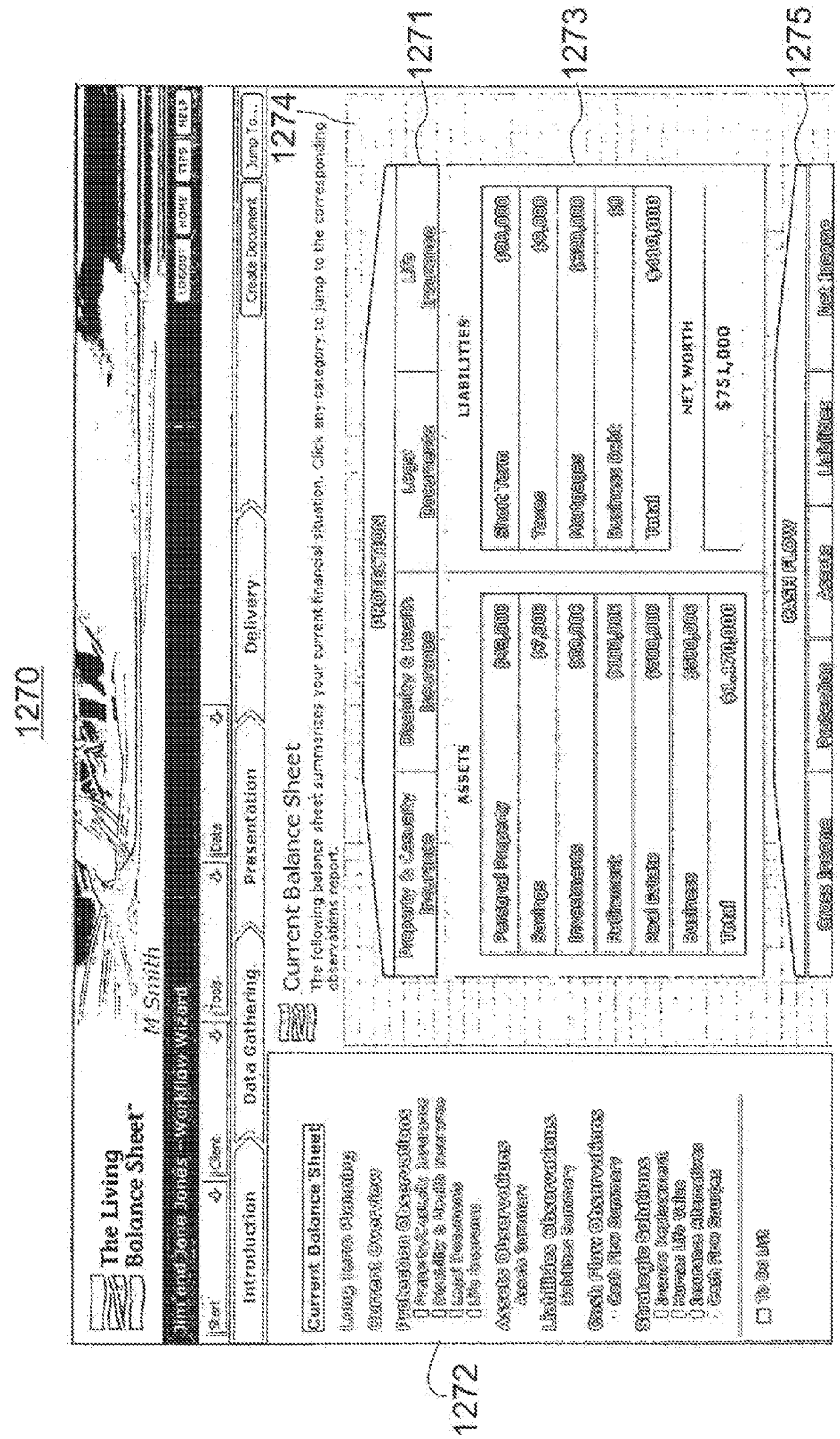

The presentation stage can be used to generate presentations for clients such as by sharing the presentation content with the client electronically during a meeting or using a paper version for discussions. Section 1272 of FIG. 127 shows an example of a sequence of sections and subsections for the presentation stage. As shown, a current balance sheet section is initially displayed, which can provide an effective starting point for discussion with a client and for understanding the client's life insurance needs. For example, current balance sheet display page 1270 can be displayed. Current balance sheet display page 1270 includes interactive summary section 1274. Summary section 1274 of current balance sheet display page 1270 can be structured in a particular way as shown. Section 1274 can have three layers: protection layer 1271, assets/liabilities layer 1273, and cash flow layer 1275. The layers can be coordinated to match the corresponding colors that were used in the data gathering section, mentioned above. Protection layer can comprise a horizontal row of protection related buttons, which as shown comprises a property & casualty insurance button, disability & health insurance button, legal documents button, and life insurance button. If desired, a corresponding button can be displayed for each subsection in the protection section of the data gathering stage or for each protection summary display page of the fact summary section of the data gathering stage.

Assets/liabilities layer 1273 can be positioned directly below protection layer 1271 as shown. Assets/liabilities layer 1273 can be divided into to an asset section and a liabilities section that can be displayed next to each as in the way shown in layer 1273. Assets/liabilities layer 1273 can comprise a vertical column for the assets section and for the liabilities section. The assets section can comprise a column of asset related buttons, which as shown comprises a personal property button, savings button, investments button, retirement button, real estate button, and business button. If desired, a corresponding button can be displayed for each subsection in the assets section of the data gathering stage or for each asset summary display page of the fact summary section of the data gathering stage. As shown, the asset buttons display a dollar value corresponding to the category of asset that is associated with the asset button. The value can be as a result of calculation based on client related data was entered during the data gathering stage. The assets section can include a total of the displayed dollar values for the asset categories. The liabilities section can comprise a column of liabilities related buttons, which as shown comprises a short-term loan button, taxes button, mortgages button, and business debt button. If desired, a corresponding button can be displayed for each subsection in the liabilities section of the data gathering stage or for each liabilities summary display page of the fact summary section of the data gathering stage. As shown, the liabilities buttons display a dollar value corresponding to the category of liabilities that is associated with the liabilities button. The value can be as a result of calculation based on client related data that was entered during the data gathering stage.

A total can also be displayed for the assets and liabilities and in addition, a net worth section displaying the current net worth based on the total values of the assets and liabilities can be displayed. A purpose of assets/liabilities layer 1273 is to provide a quick summary of the current net-worth of the client.

The cash flow layer can comprise a horizontal row of cash flow related buttons, which as shown comprises a gross income button, protection button, assets button, liabilities button, and net income button. If desired, a corresponding button can be displayed for each subsection in the cash flow section of the data gathering stage or for each cash flow summary display page of the fact summary section of the data gathering stage. As shown, in the FIGS., such specific correspondence does not exist with respect to cash flow layer 1275. Such "non-correspondence" could also be implemented in other layers if desired.

The buttons in section 1274 can for example be configured to be selected to display for the user a corresponding observation report, which is sometimes herein referred to as a summary display page (e.g., summary display pages of the fact summary section). Thus, section 1274 can provide an interface from which a user can understand the net worth of the client, the state of the underlying assets and liabilities, and quickly access more detailed summaries regarding each category for which a button is displayed. The interface can also provide ease to the user in walking through the different categories (e.g., with the client) and analyzing their needs. The structure of section 1274 can be used to quickly demonstrate the impact of insurance triggering events on the client and his or her family.

If desired, related dollar value can be displayed in protection layer 1274 and cash flow layer 1275, such as, by displaying the values within a corresponding button.

If desired, items displayed in section 1272 section can be "live" such that a user can "click" on an item to automatically jump to a corresponding display page. Such functionality can exist throughout the Workflow Wizard® if desired.

If desired, the buttons in the various layers can correspond to (e.g., have one to one correspondence) to display pages in the presentation stage, such as, the display pages of the protections observations section.

Figure 128:
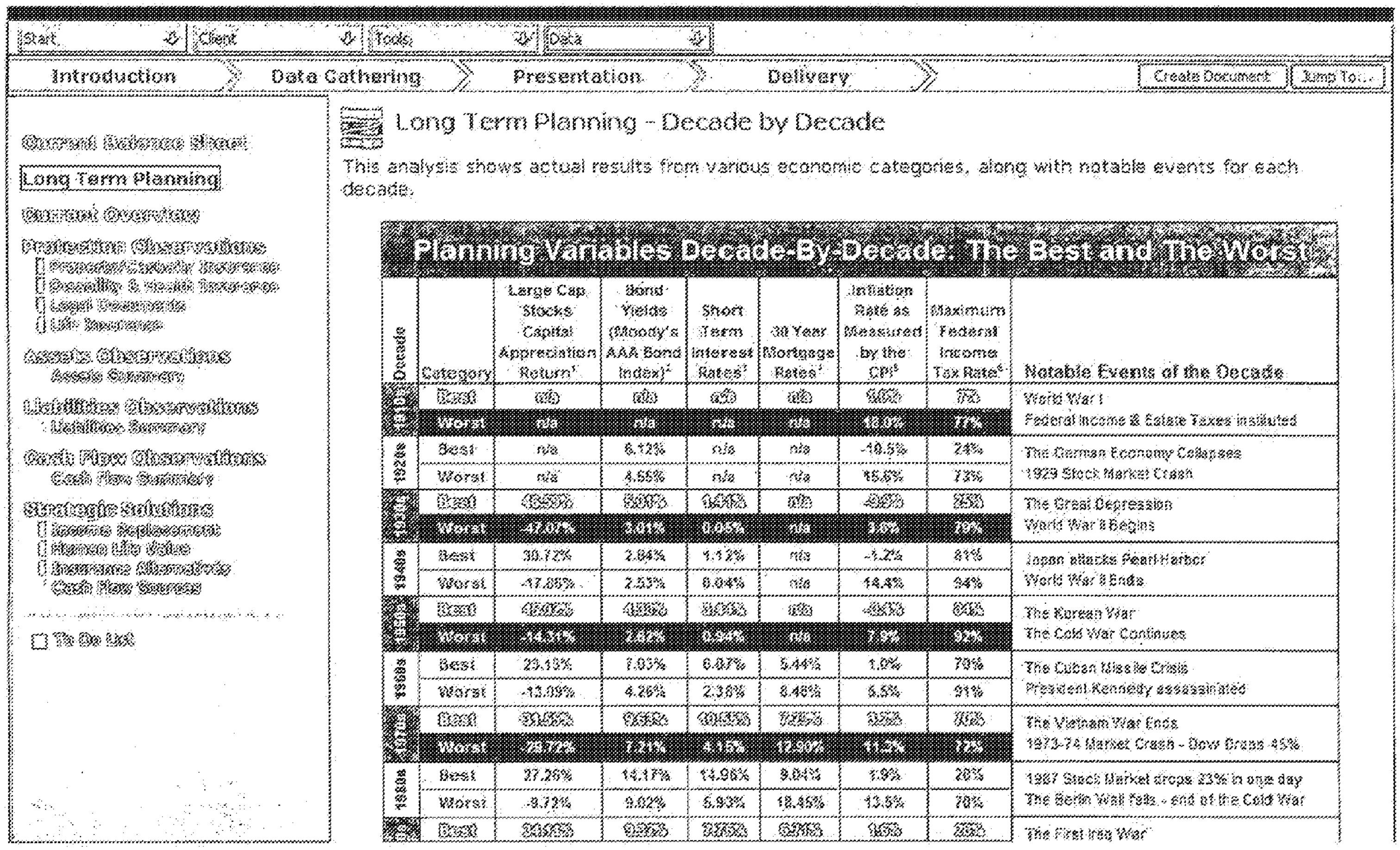

Current balance sheet display page 1270 can include next and back buttons (not visible) for moving to the next or previous display pages. Long term planning display page 1280 of FIGS. 128 and 129 can be displayed next. Display page 1280 can display information illustrating the uncertainties and randomness associated with the economic performance of certain long term planning strategies.

Figure 130:
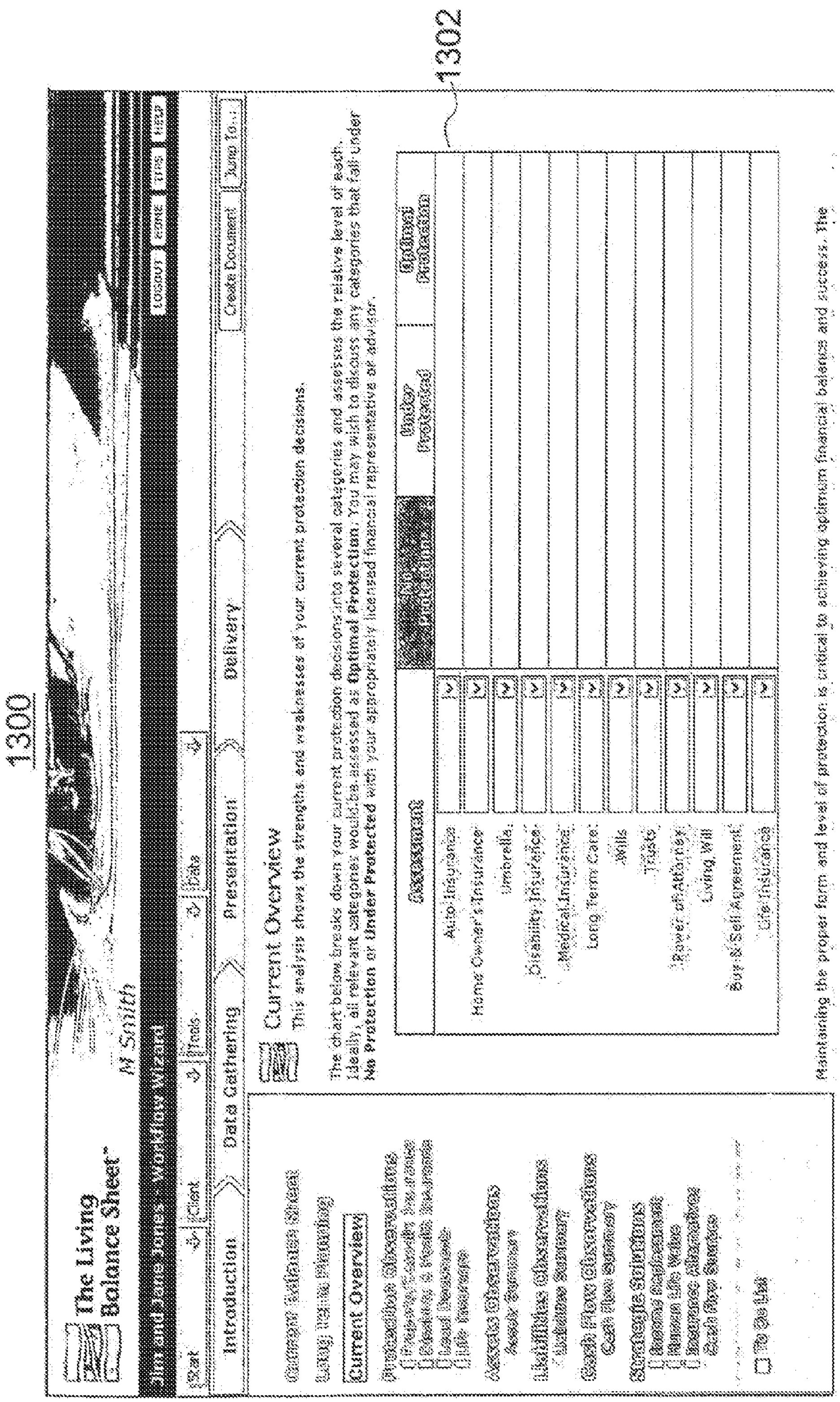
Figure 131:
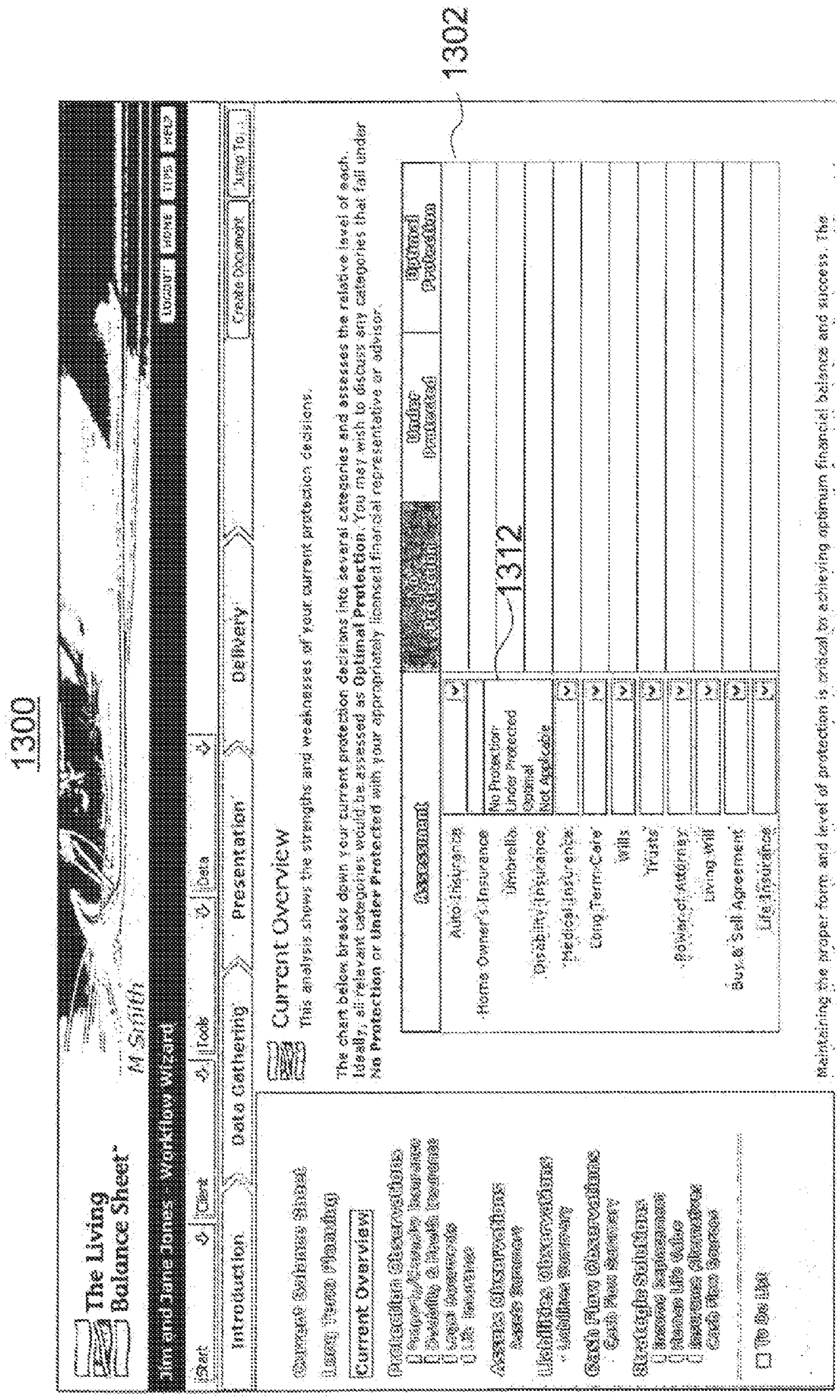
Figure 132:
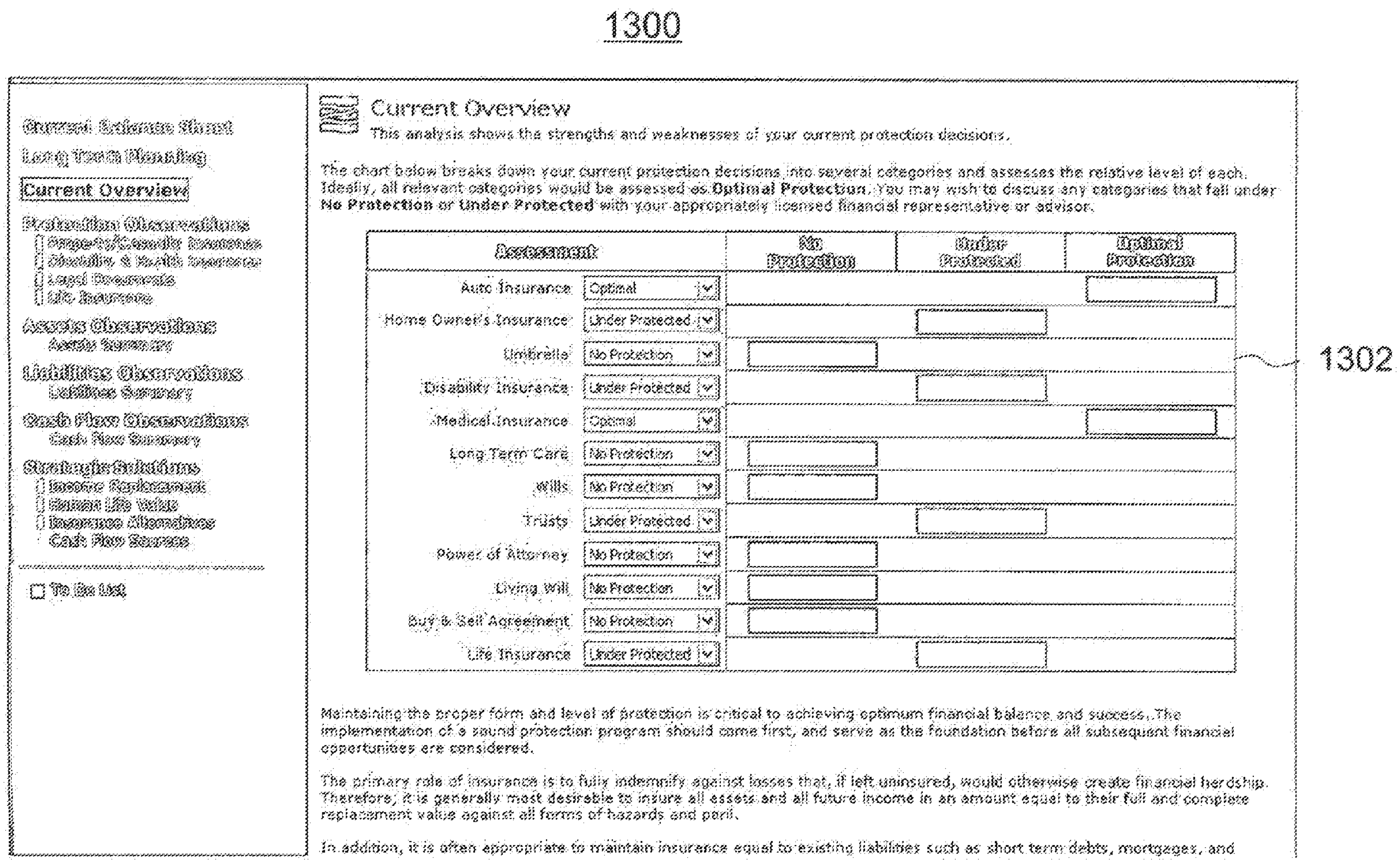

Next, a current protection overview display page can be displayed. For example, current overview display page 1300 of FIGS. 130-132 can be displayed. Current overview display page 1300 can include assessment matrix 1302 that is configured to illustrate the strengths and weaknesses of the client's current protection decisions. As shown, matrix 1302 is in the form of a matrix having a left column comprising rows that each correspond to a different protection category and a top row that comprises different protection levels (e.g., no protection, under protected, and optimal protection). A user can for example use a pull-down menu that is displayed for each protection category to select a protection level for that category. The selection can be based on a review of the client's information and based on the user's opinion as a specialist in this field. If desired, the protection levels can be automatically selected by a software program that reviews the client's information and automatically assigns levels based for example on expected levels of protection for similar clients.

If manually selected, the options in the pull-down menu (e.g., pull-down menu 1312 of FIG. 131) can be "no protection," "under protected," "optimal," and "not applicable." Selecting a particular level causes a box to be displayed in the column corresponding to that level of protection. If "not applicable" is selected, no such box is displayed. A color scheme can be used to further emphasize the need to have "optimal protection." For example, "no protection" is displayed as red, "under protected" as yellow, and "optimal protection" as green. By making selections, for example, using the pull-down menu for each category as shown, a user can fill the matrix with boxes that are displayed under corresponding protection levels (e.g., see matrix 1302 of FIG. 132). Matrix 1302 can be an important presentation and sales tools for illustrating to a client a picture of the client's protection picture and persuading the client with respect to taking action to address possible weaknesses. If desired, after a level is selected, the user can reassess and use the pull-down menu to reposition the box corresponding to that category to another protection level. Thus, matrix 1302 can remain interactive after initial protection level selections are made. Display page 1300 can include a next button (not visible) for saving selections and moving to the next display page. A previous button can also be included.

Figure 133:
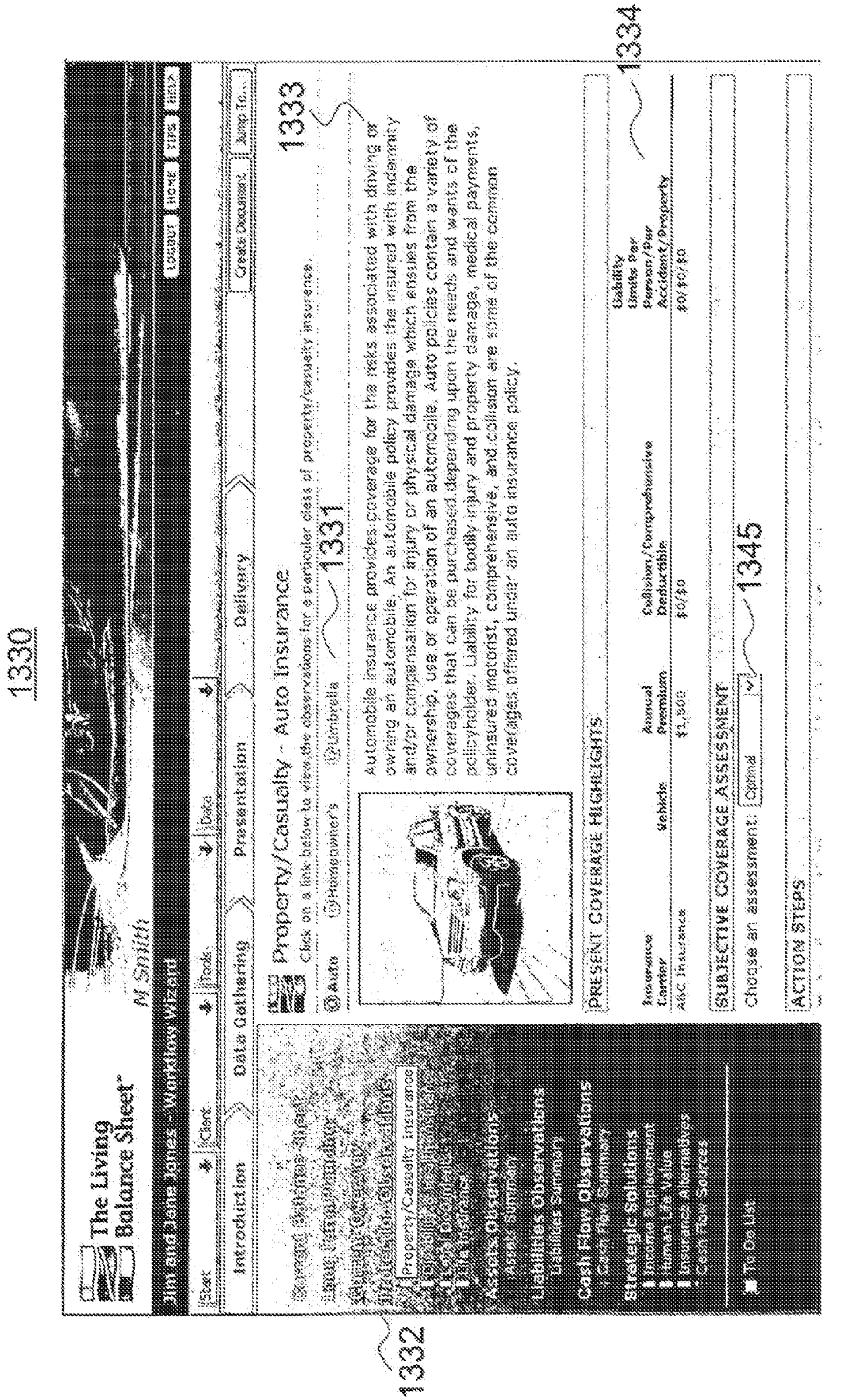
Figure 134:
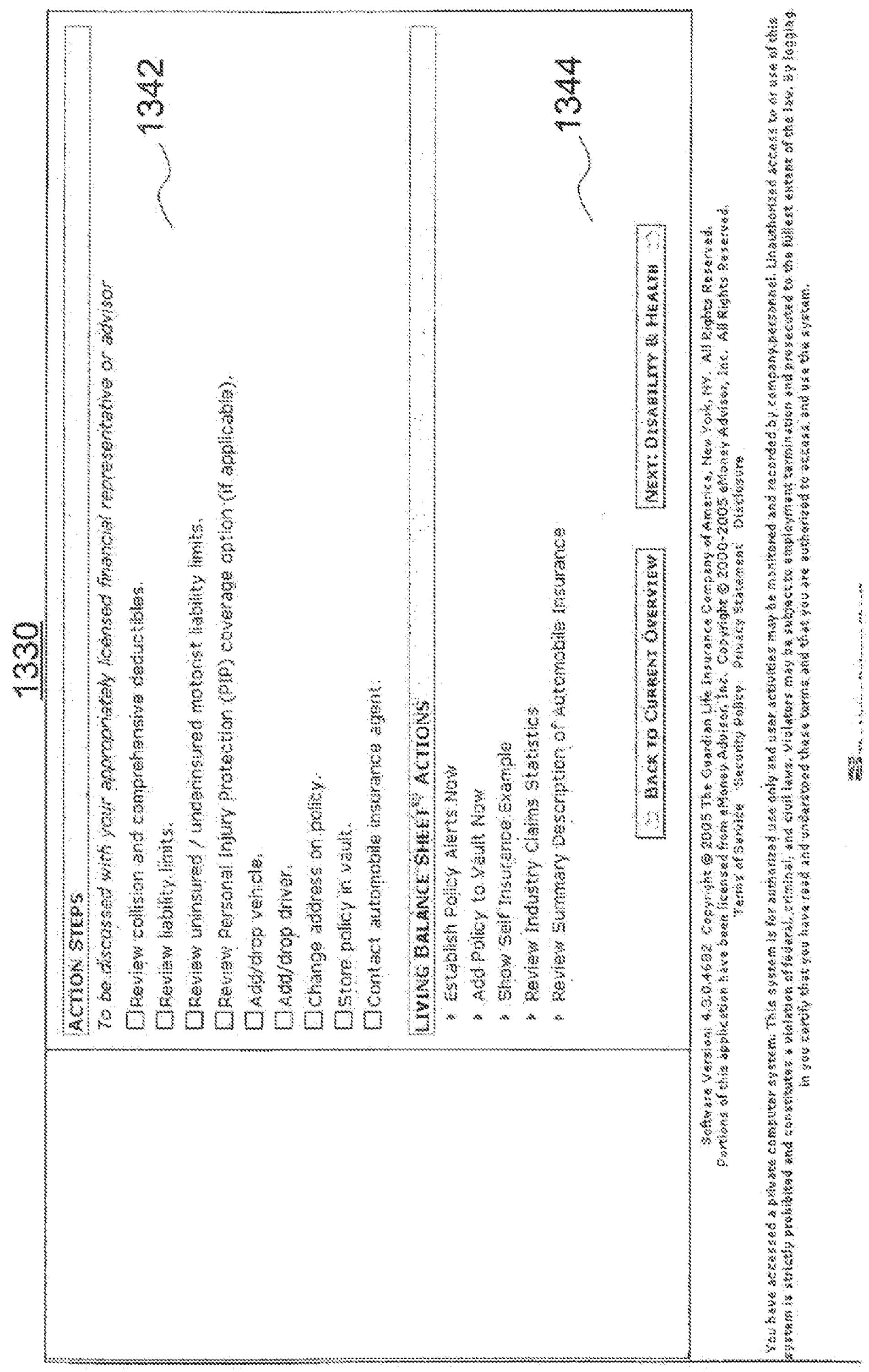
Figure 135:
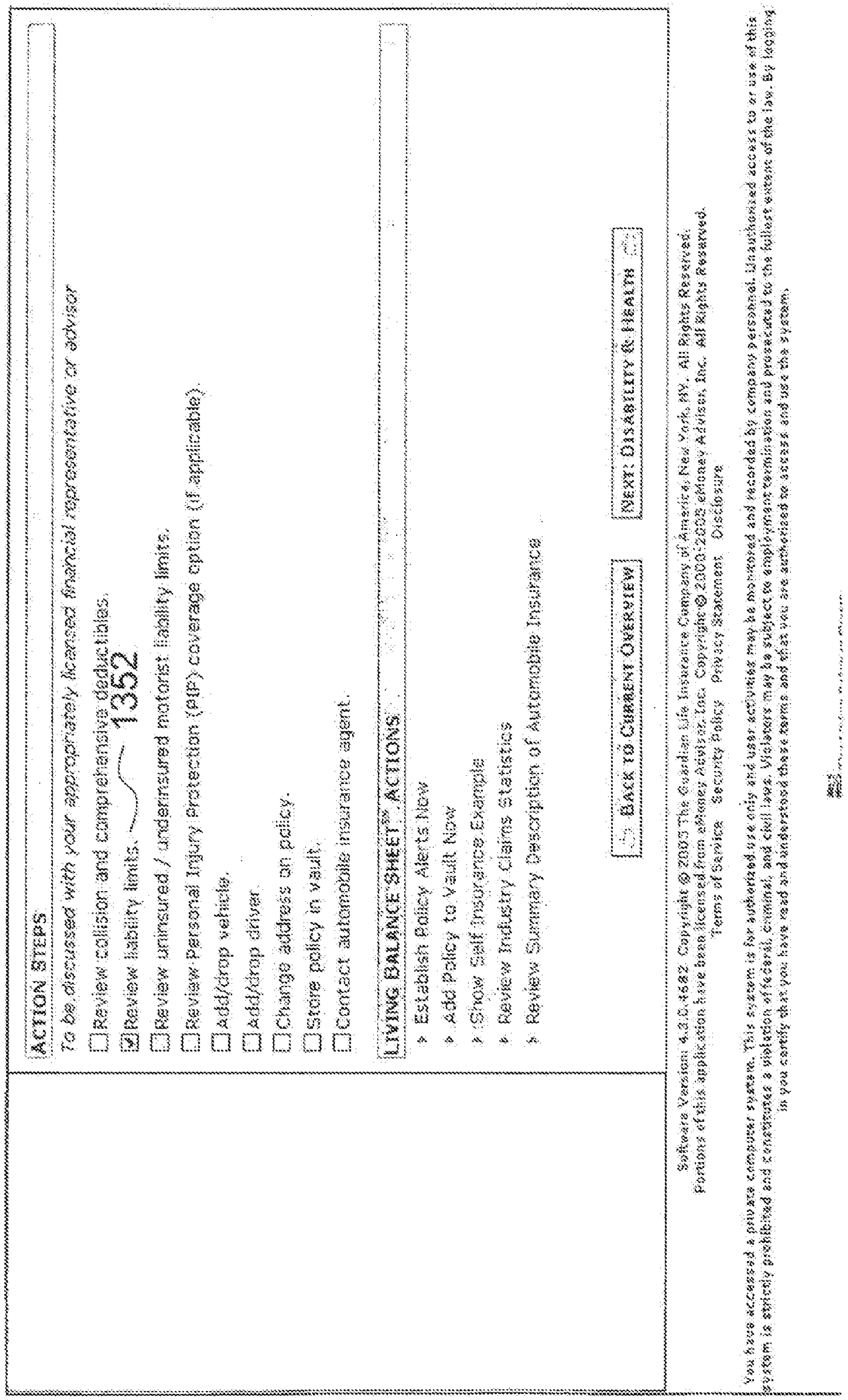

Protection observations section 1332 can be used to present an interactive insurance category specific tool for the users and clients such as to for example implement embodiments of the method and steps illustratively described in FIG. 6. Section 1332 can comprise insurance category specific display pages for each subsection property/casualty insurance, disability & health insurance, legal documents, and life insurance. For example, property/casualty auto insurance display page 1330 of FIGS. 133-135 can be displayed to view or access auto insurance related observations, information, assessment, action steps, and actions. Display page 1330 can include radio buttons for switching to the display pages of different types of property/casualty insurance (e.g., auto, homeowner's, and umbrella). Selecting a radio button can if desired automatically and immediately switch the display page to be specifically for the insurance type of the radio button that is selected. Display page 1330 can include information section 1333 for providing an explanation of the insurance that is currently the focus of display page 1330. Display page 1330 can include present coverage highlights section 1334 that displays a summary of the client's current insurance coverage for the current insurance category (e.g., property/casualty—auto insurance as displayed). Display page 1330 can include assessment section 1345 that displays an assessment of the client's level of protection under the current insurance category. The displayed level of protection can be the level that was selected in matrix 1302 of FIG. 130. As such, the assessment can be automatically selected. A pull-down menu can be implemented to allow the level to change while in display page 1330. Display page 1330 can include action steps section 1342 of FIG. 134. Action steps section 1342 as shown displays a list of selectable action steps that are needed to be taken by the client (e.g., to discuss the subject of the action step) to for example move the sales process or interaction with the client forward. A user can click in a checkbox associated with each action step to indicate that the selected action step is to be completed with respect to the current client. As shown in FIG. 135, a check can be displayed in a checkbox in response to the selection of action step 1352. A list of checked items from the various display pages for different insurance categories or types can be displayed at the end of protection observation section 1332. Display page 1330 can include actions section 1344 that includes selectable links for software internal actions or user-centered actions that the user should take with respect to the client and the current insurance category (e.g., property/casualty—auto insurance). A list of selected actions from the various display pages for different insurance categories or types can be displayed at the end of protection observation section 1332. A user can interact with the next and back buttons to save or cancel selections and to move to the next or previous display page or section.

The protection specific display pages in the protection observations section 1332 can be configured to function and be structured in the same way as display page 1330, but each would be specifically configured to match the specific insurance or protection category that is associated with that display page. The same structure and function can be implemented if a user selects a radio button such as the radio buttons in section 1331 to access a different type of property/casualty insurance. Radio buttons may also be a combination of a textual link and an indicator marking the currently selected link.

Figure 136:
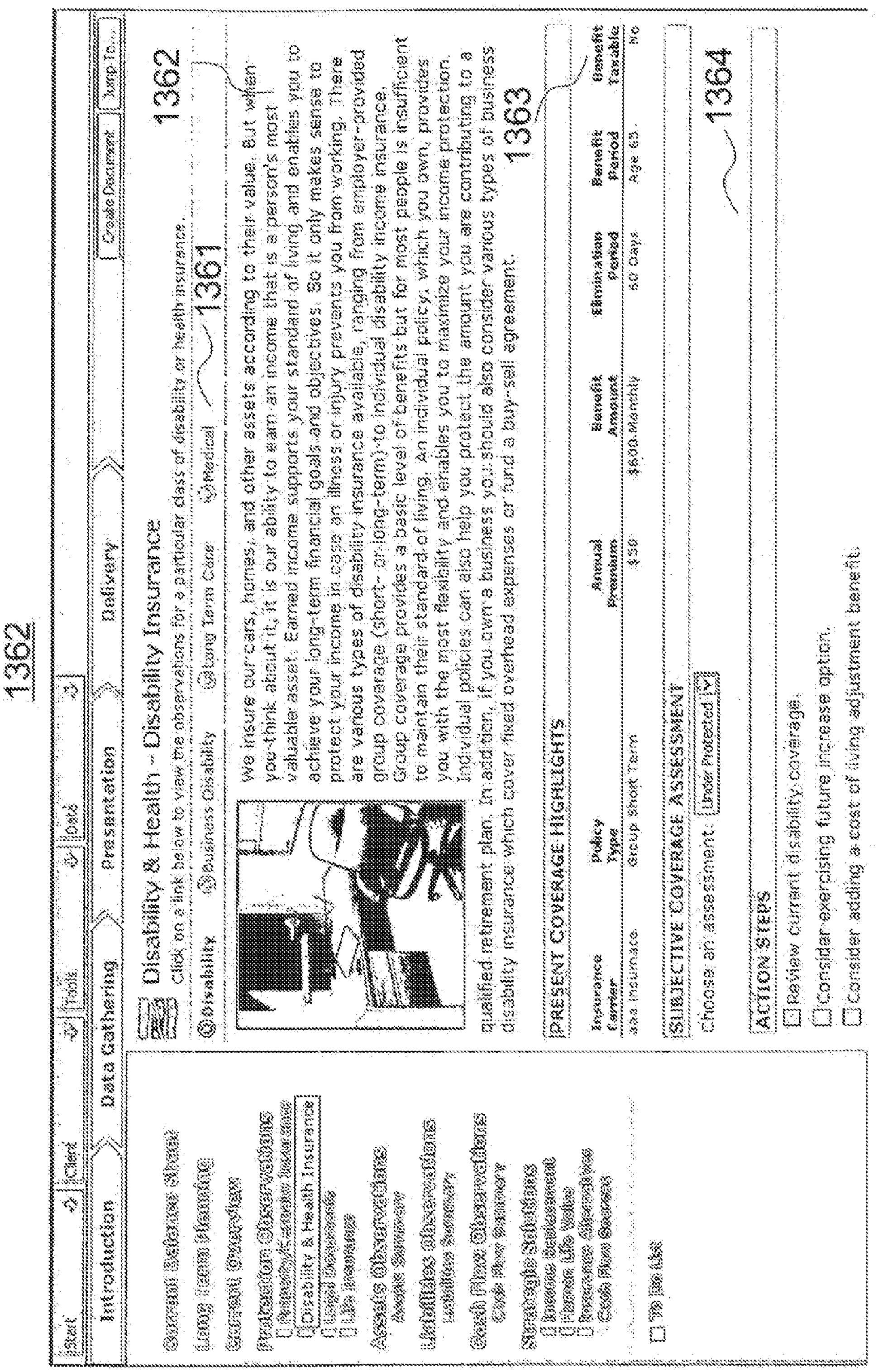
Figure 137:
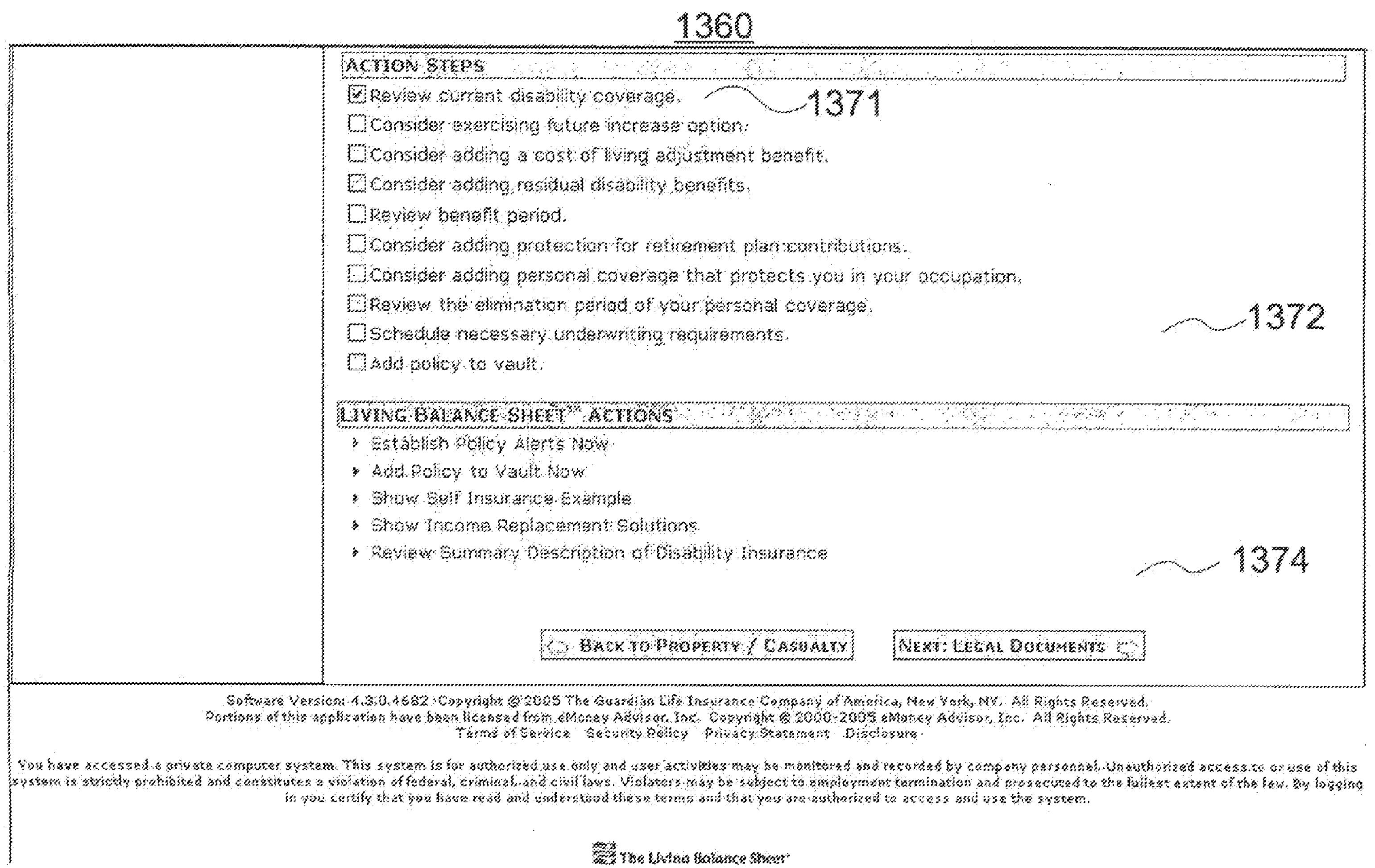
Figure 138:
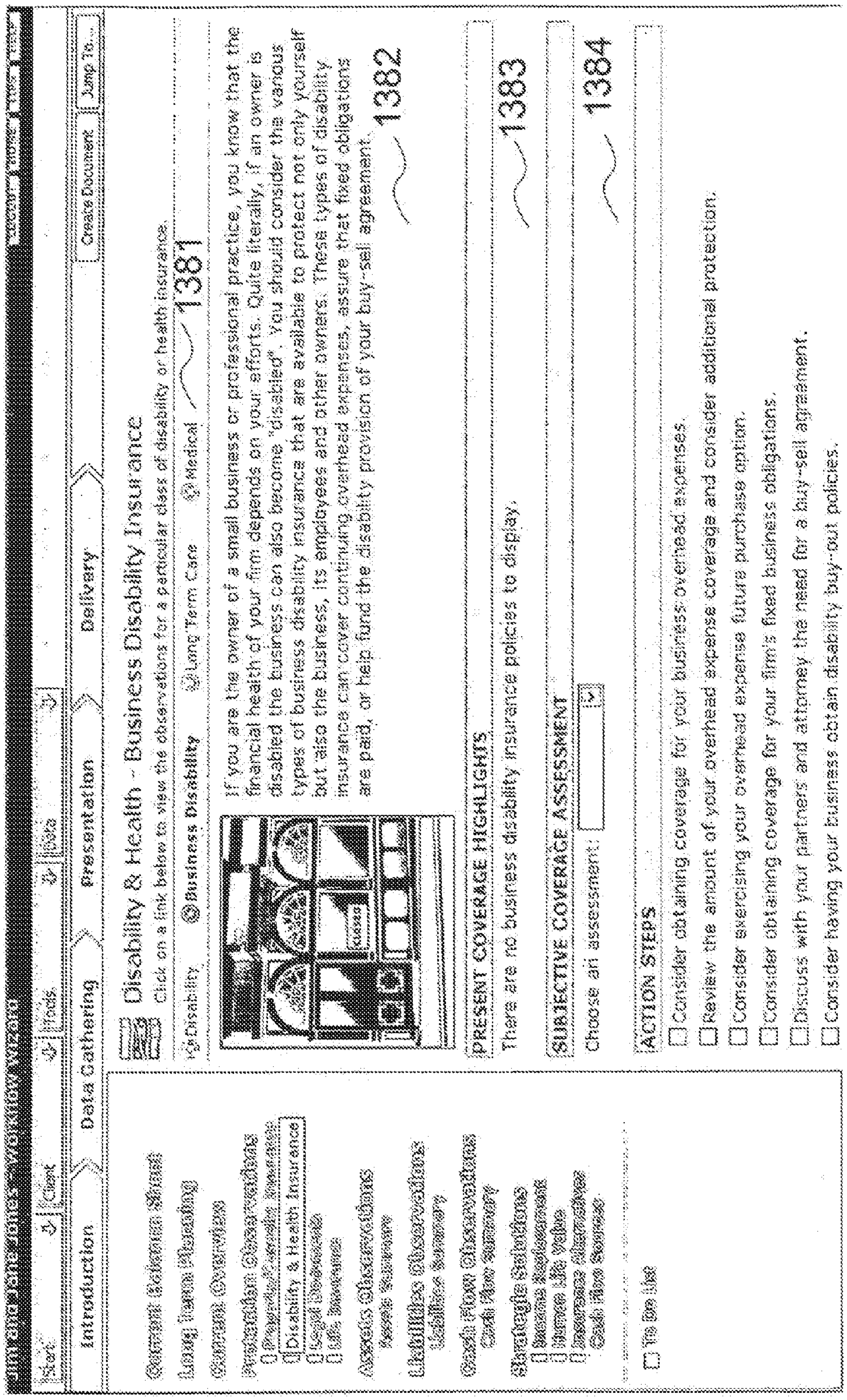

Other such display pages are illustratively shown in FIGS. 136-155. For example, FIGS. 136-137 show disability & health13 disability insurance display page 1360. Display page 1360 includes insurance type section 1361 and information section 1362. Display page 1360 can include present coverage highlights section 1363 that displays a summary of the client's current insurance coverage for the current insurance category. Display page 1360 can include assessment section 1364 that displays an assessment of the client's level of protection under the current insurance category. The displayed level of protection can be the level that was selected in matrix 1302 of FIG. 130. As such, the assessment can be automatically selected. A pull-down menu can be implemented to allow the level to be changed while in display page 1360. Display page 1360 can include action steps section 1372 of FIG. 137. Action steps section 1372 as shown displays a list of selectable action steps that are needed to be taken by the client (e.g., to discuss the subject of the action step) to for example move the sales process or interaction with the client forward. A user can click in a checkbox associated with each action step to indicate that the selected action step should be completed with respect to the current client. As shown in FIG. 138, a check can be displayed in a checkbox in response to the selection of action step 1371. A list of checked items from the various display pages for different insurance categories or types can be displayed at the end of protection observation section 1332. Display page 1360 can include actions section 1374 that includes selectable links for software internal actions or user-centered actions that the user should take with respect to the client and the current insurance category (e.g., property/casualty—auto insurance). A list of selected actions from the various display pages for different insurance categories or types can be displayed at the end of protection observation section 1332. A user can interact with the next and back buttons to save or cancel selections and to move to the next or previous display page or section.

Figure 139:
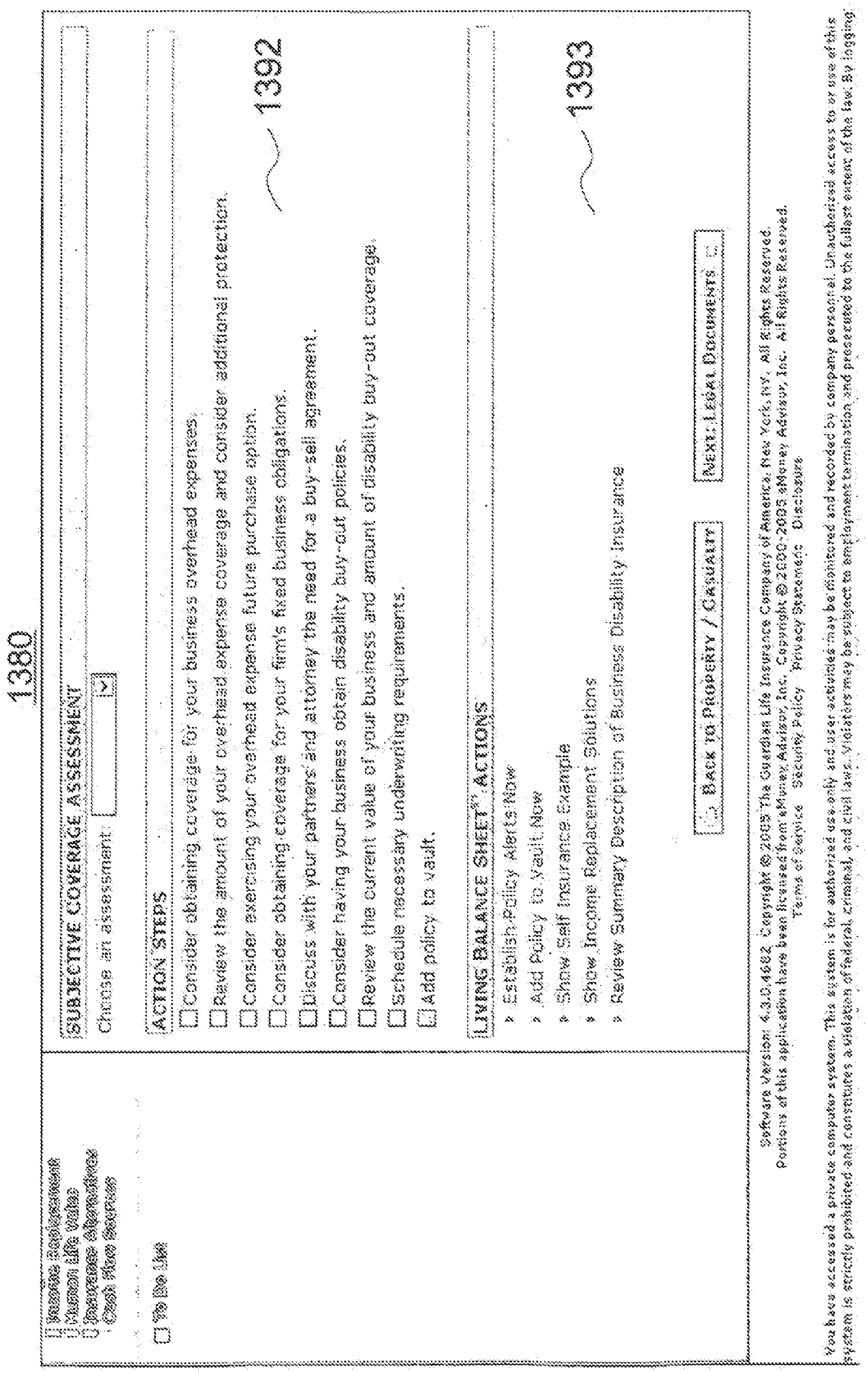

FIGS. 138-139 show disability & health13 business disability insurance display page 1380. Display page 1380 includes insurance type section 1381 and information section 1382. Display page 1380 can include present coverage highlights section 1383 that displays a summary of the client's current insurance coverage for the current insurance category. Display page 1380 can include assessment section 1384 that displays an assessment of the client's level of protection under the current insurance category. The displayed level of protection can be the level that was selected in matrix 1302 of FIG. 130. As such, the assessment can be automatically selected. A pull-down menu can be implemented to allow the level to be changed while in display page 1380. Display page 1380 can include action steps section 1392 of FIG. 139. Action steps section 1392 as shown displays a list of selectable action steps that are needed to be taken by the client (e.g., to discuss the subject of the action step) to for example move the sales process or interaction with the client forward. A user can click in a checkbox associated with each action item to indicate that the selected action step should be completed with respect to the current client. A list of selected action steps from the various display pages for different insurance categories or types can be displayed at the end of protection observation section 1332. Display page 1380 can include actions section 1394 that includes selectable links for software internal actions or user-centered actions that the user should take with respect to the client and the current insurance category (e.g., property/casualty—auto insurance). A list of selected actions from the various display pages for different insurance categories or types can be displayed at the end of protection observation section 1332. A user can interact with the next and back buttons to save or cancel selections and to move to the next or previous display page or section.

Figure 140:
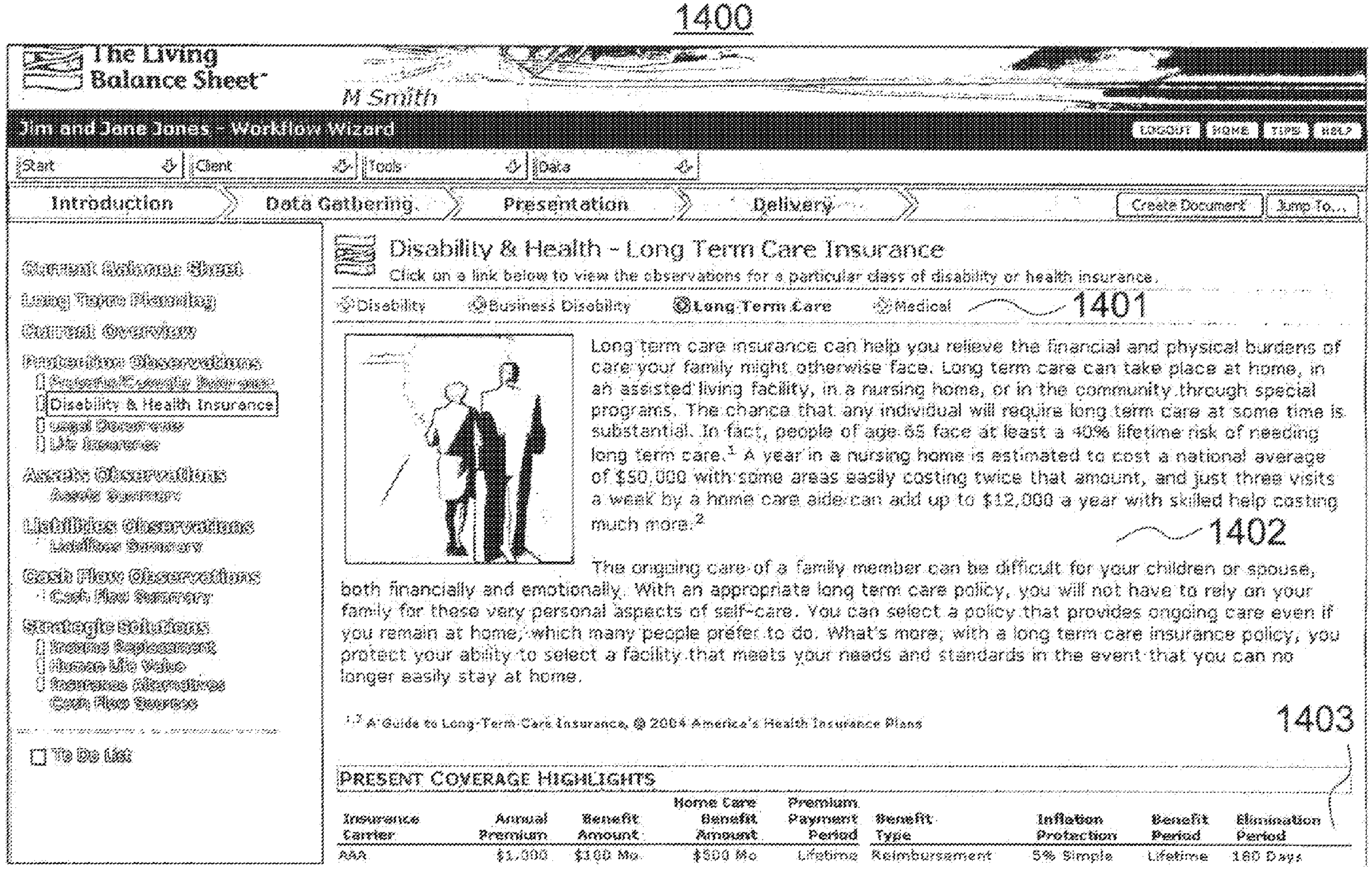
Figure 141:
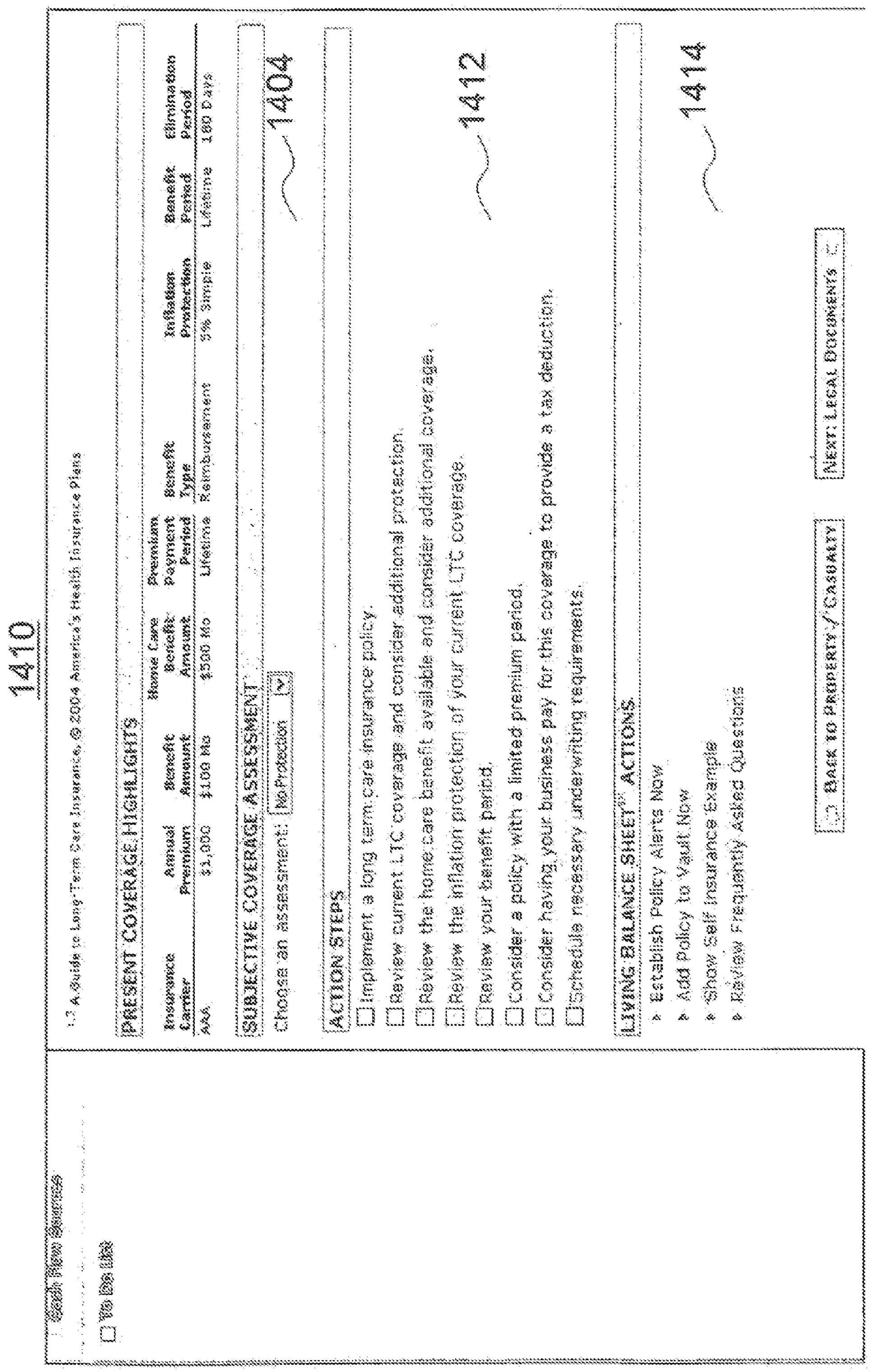

FIGS. 140-141 show disability & health13 long term insurance display page 1400. Display page 1400 includes insurance type section 1401 and information section 1402. Display page 1400 can include present coverage highlights section 1403 that displays a summary of the client's current insurance coverage for the current insurance category. Display page 1400 can include assessment section 1404 that displays an assessment of the client's level of protection under the current insurance category. The displayed level of protection can be the level that was selected in matrix 1302 of FIG. 130. As such, the assessment can be automatically selected. A pull-down menu can be implemented to allow the level to be changed while in display page 1400. Display page 1400 can include action steps section 1412 of FIG. 141. Action steps section 1412, as shown, displays a list of selectable action steps that are needed to be taken by the client (e.g., to discuss the subject of the action step) to, for example, move the sales process or interaction with the client forward. A user can click in a checkbox associated with each action item to indicate that the selected action step should be completed with respect to the current client. A list of selected action steps from the various display pages for different insurance categories or types can be displayed at the end of protection observation section 1332. Display page 1400 can include actions section 1414 that includes selectable links for software internal actions or user-centered actions that the user should take with respect to the client and the current insurance category (e.g., property/casualty—auto insurance). A list of selected actions from the various display pages for different insurance categories or types can be displayed at the end of protection observation section 1332. A user can interact with the next and back buttons to save or cancel selections and to move to the next or previous display page or section.

Figure 142:
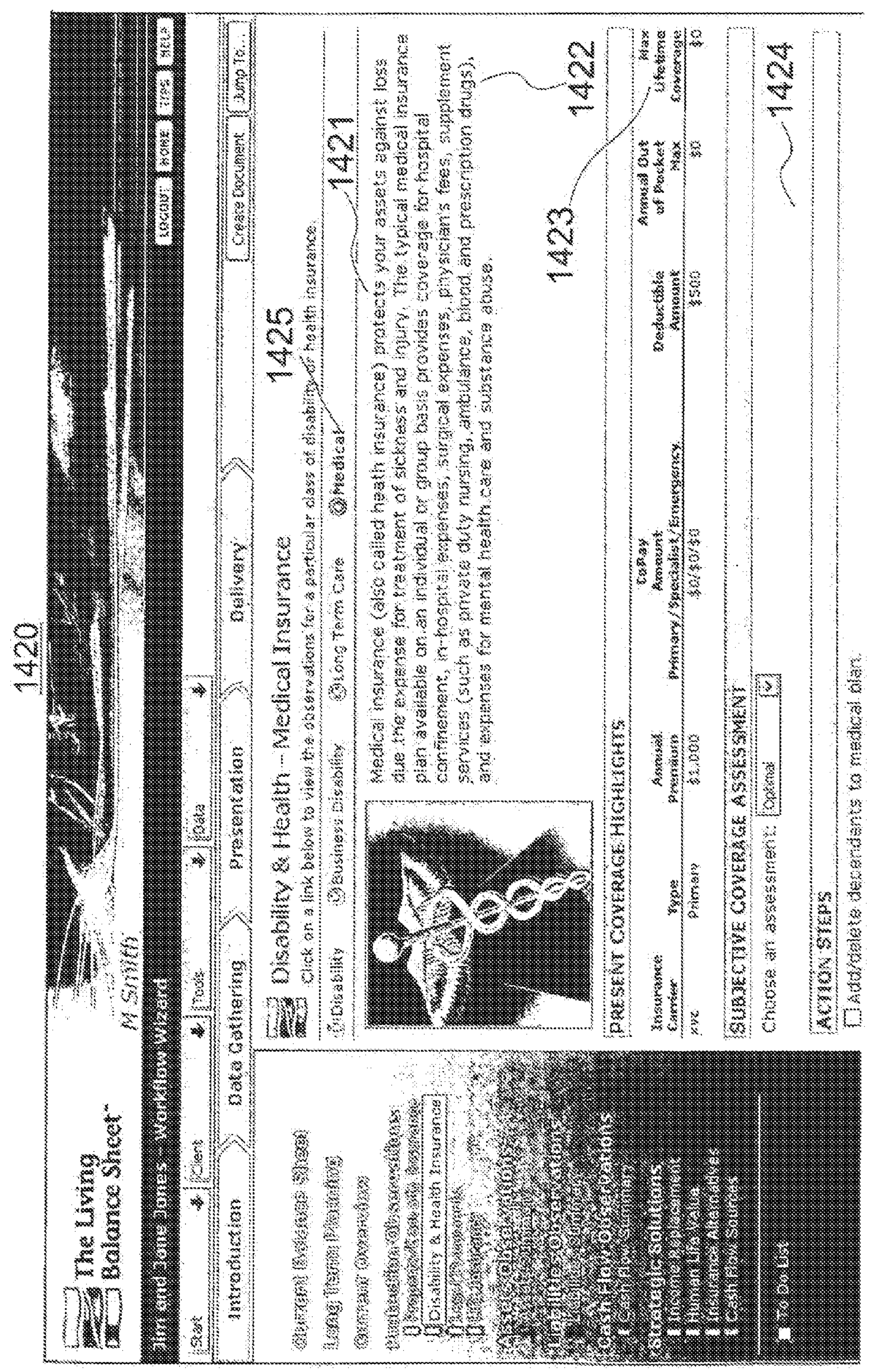
Figure 143:
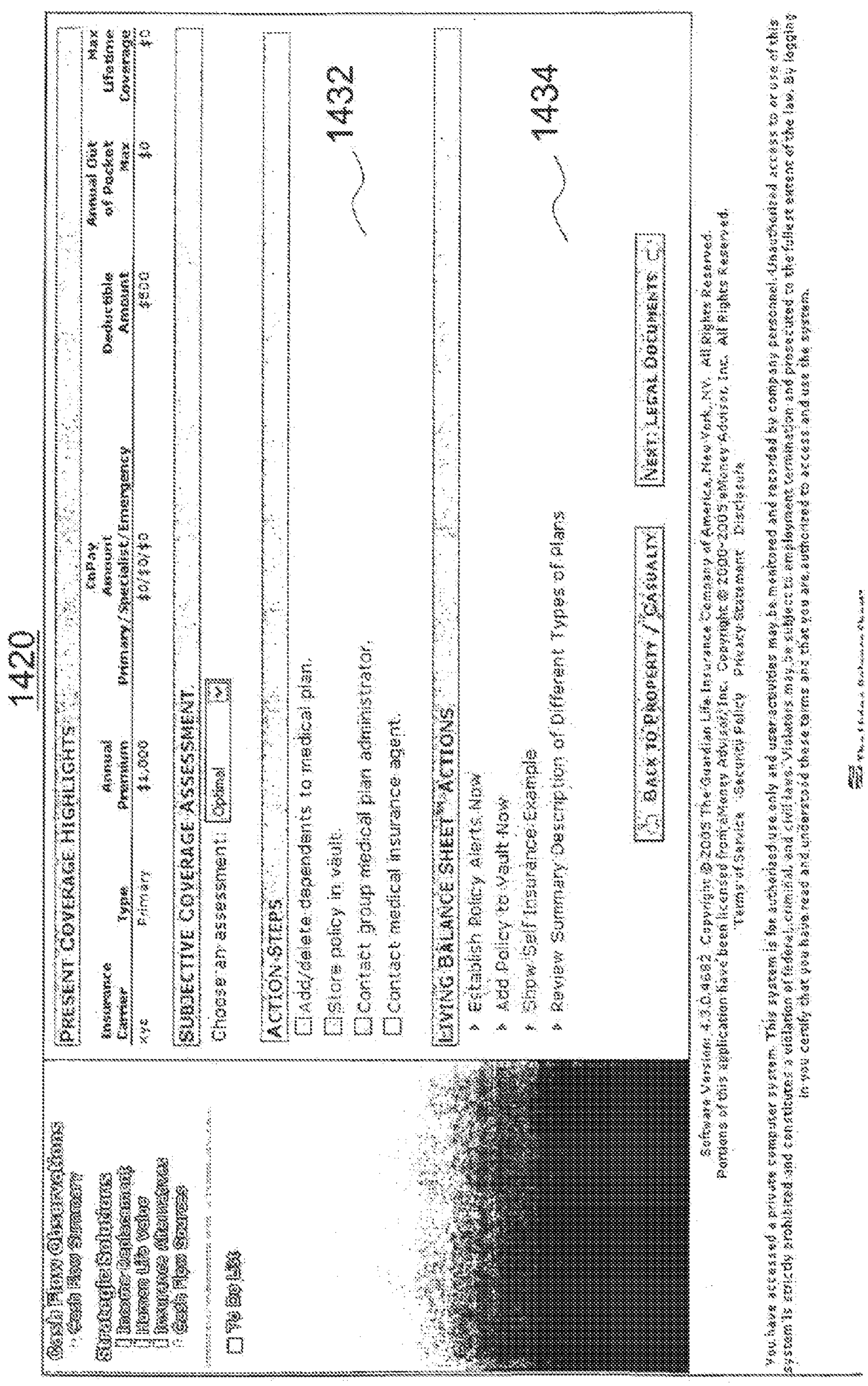

FIGS. 142-143 show disability & health—medical insurance display page 1420 (which can be displayed when the medical radio button 1425 is selected). Display page 1420 includes insurance type section 1421 and information section 1422. Display page 1420 can include present coverage highlights section 1423 that displays a summary of the client's current insurance coverage for the current insurance category. Display page 1420 can include assessment section 1424 that displays an assessment of the client's level of protection under the current insurance category. The displayed level of protection can be the level that was selected in matrix 1302 of FIG. 130. As such, the assessment can be automatically selected. A pull-down menu can be implemented to allow the level to be changed while in display page 1420. Display page 1420 can include action steps section 1432 of FIG. 143. Action steps section 1432 as shown displays a list of selectable action steps that are needed to be taken by the client (e.g. to discuss the subject of the action step) to for example move the sales process or interaction with the client forward. A user can click in a checkbox associated with each action item to indicate that the selected action step should be completed with respect to the current client. A list of selected action steps from the various display pages for different insurance categories or types can be displayed at the end of protection observation section 1332. Display page 1420 can include actions section 1434 that includes selectable links for software internal actions or user-centered actions that the user should take with respect to the client and the current insurance category (e.g., property/casualty—auto insurance). A list of selected actions from the various display pages for different insurance categories or types can be displayed at the end of protection observation section 1332. A user can interact with the next and back buttons to save or cancel selections and to move to the next or previous display page or section.

Figure 144:
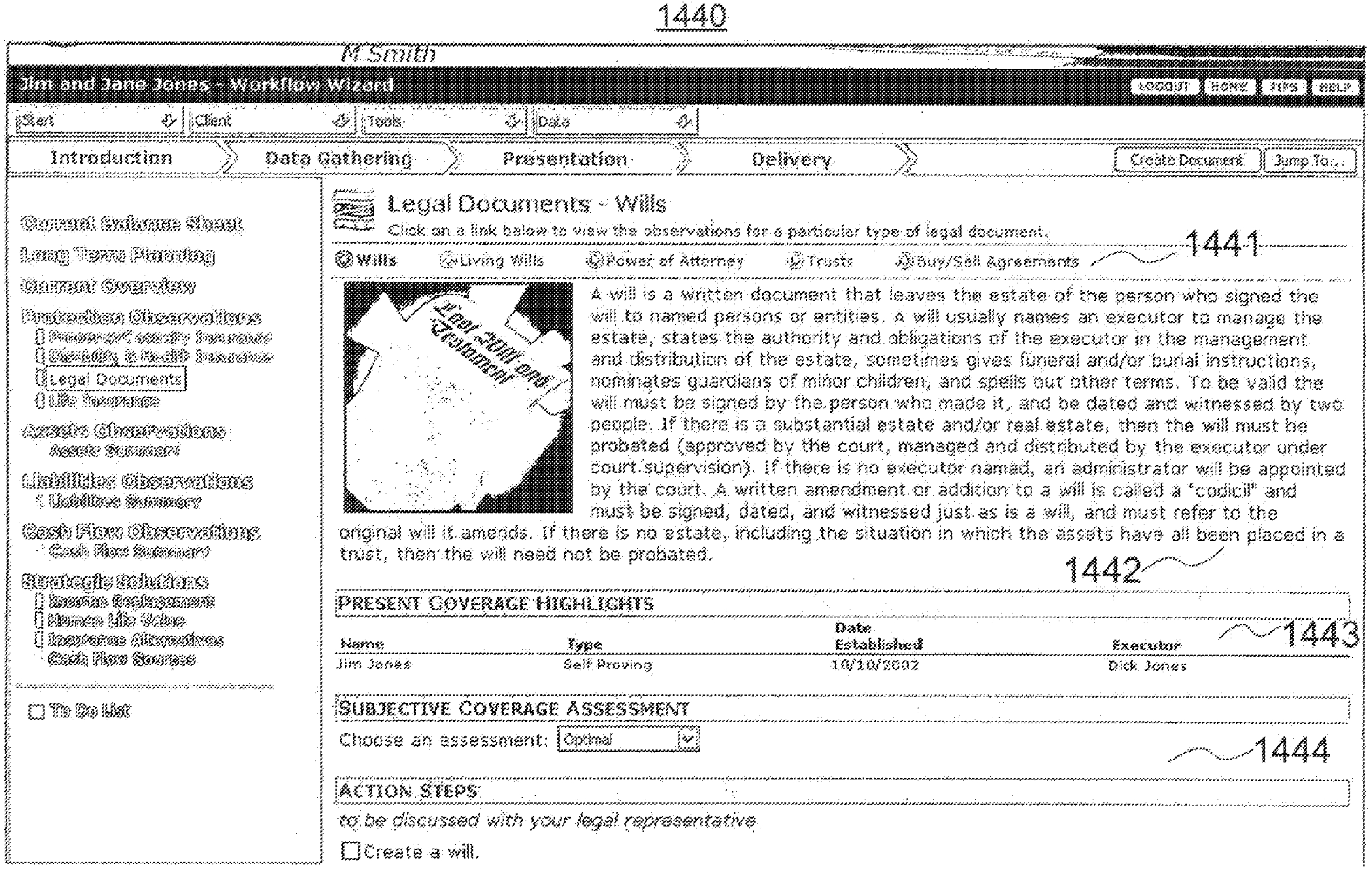
Figure 145:
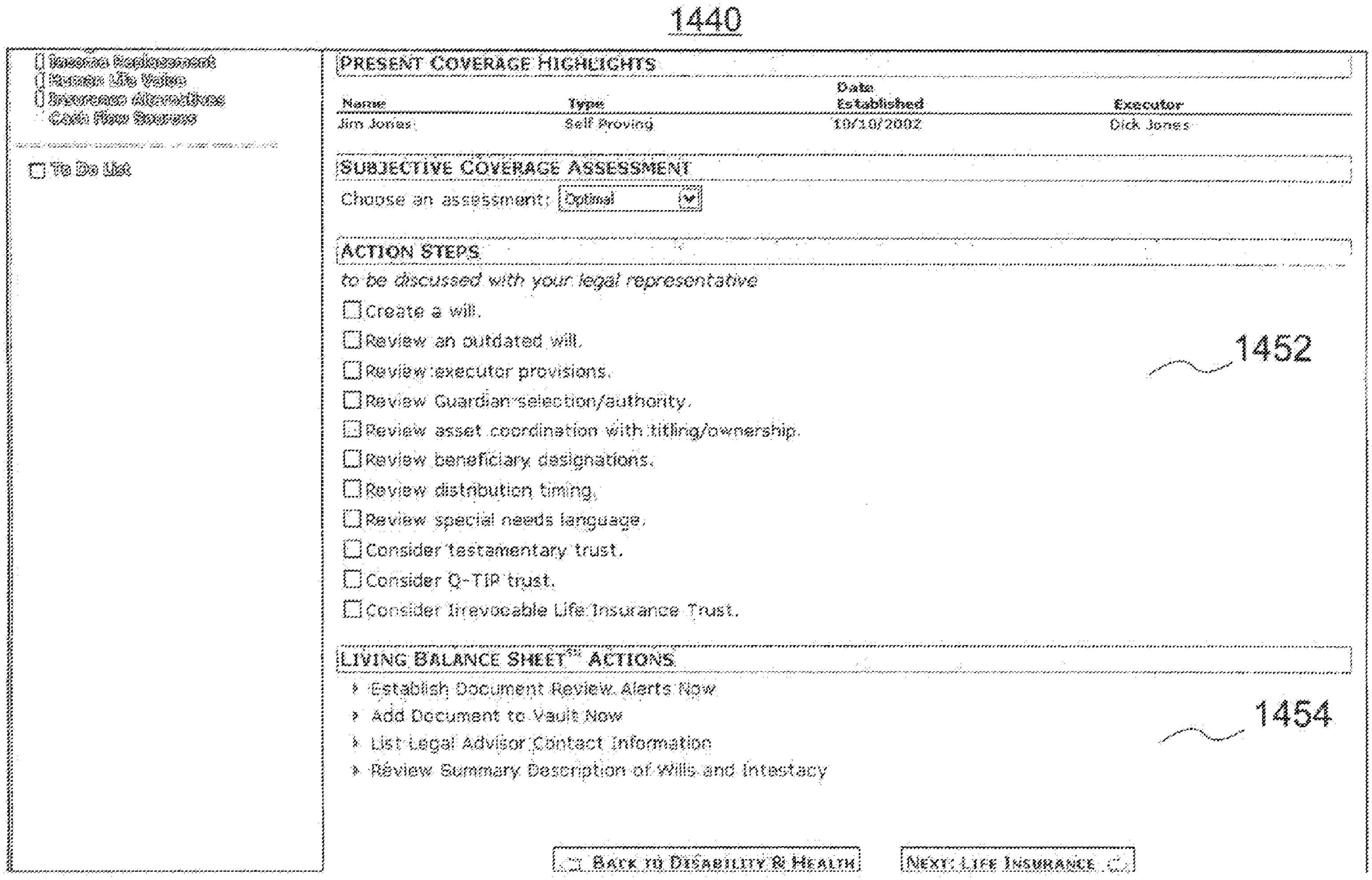

FIGS. 144-145 show legal documents—wills display page 1440. Display page 1440 includes legal document type section 1441 and information section 1442. Display page 1440 can include present coverage highlights section 1443 that displays a summary of the client's current legal document coverage for the current protection category. Display page 1440 can include assessment section 1444 that displays an assessment of the client's level of protection under the current legal document category. The displayed level of protection can be the level that was selected in matrix 1302 of FIG. 130. As such, the assessment can be automatically selected. A pull-down menu can be implemented to allow the level to be changed while in display page 1440. Display page 1440 can include action steps section 1452 of FIG. 145. Action steps section 1452 as shown displays a list of selectable action steps (e.g., specific to the current legal document category) that are needed to be taken by the client (e.g., to discuss the subject of the action step) to for example move the sales process or interaction with the client forward. A user can click in a checkbox associated with each action item to indicate that the selected action step should be completed with respect to the current client. A list of selected action steps from the various display pages for different insurance or protection categories or types can be displayed at the end of protection observation section 1332. Display page 1440 can include actions section 1454 that includes selectable links for software internal actions or user-centered actions that the user should take with respect to the client and the current protection category (e.g., legal documents—wills). A list of selected actions from the various display pages for different insurance protection categories or types can be displayed at the end of protection observation section 1332. A user can interact with the next and back buttons to save or cancel selections and to move to the next or previous display page or section.

Figure 146:
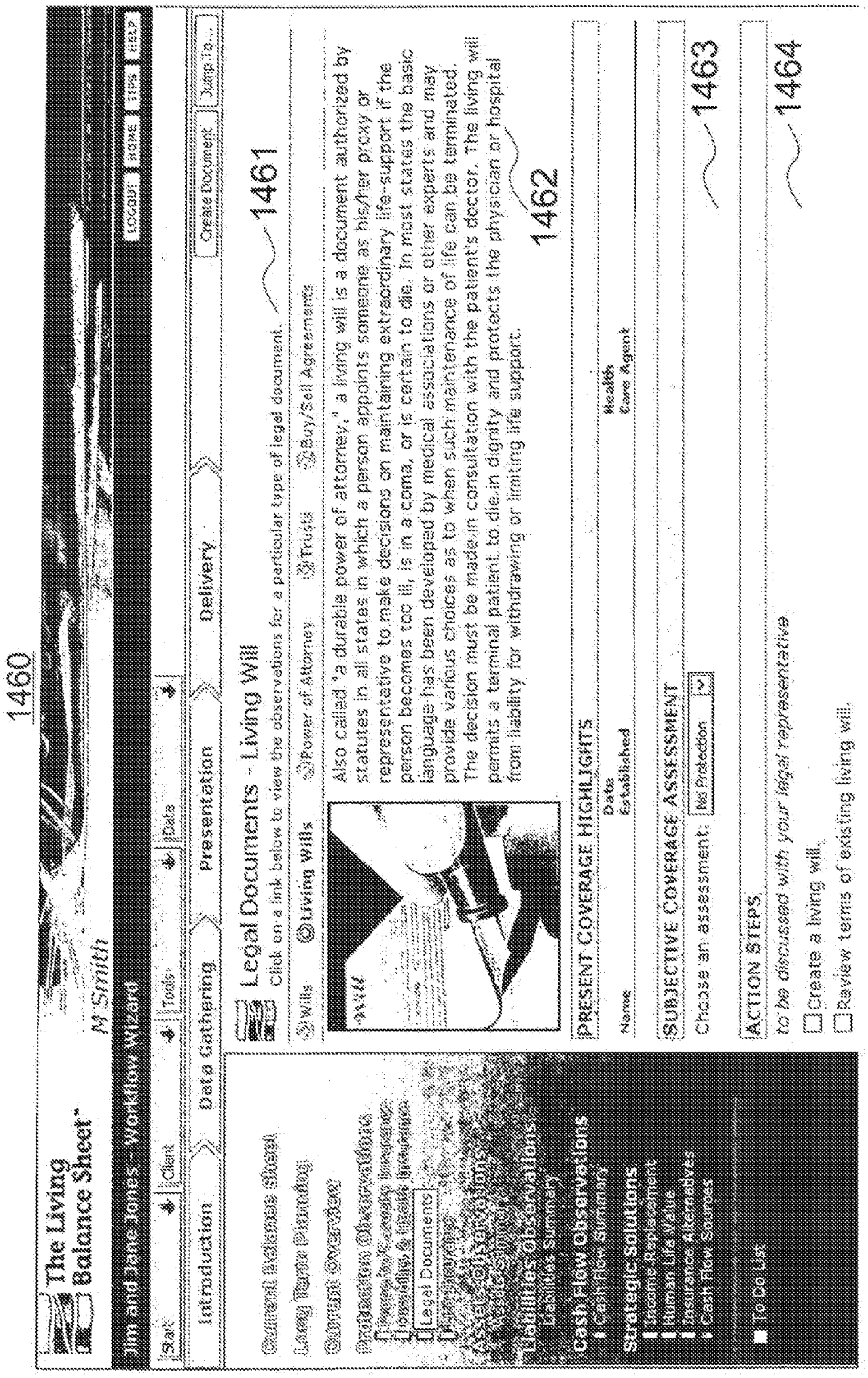
Figure 147:
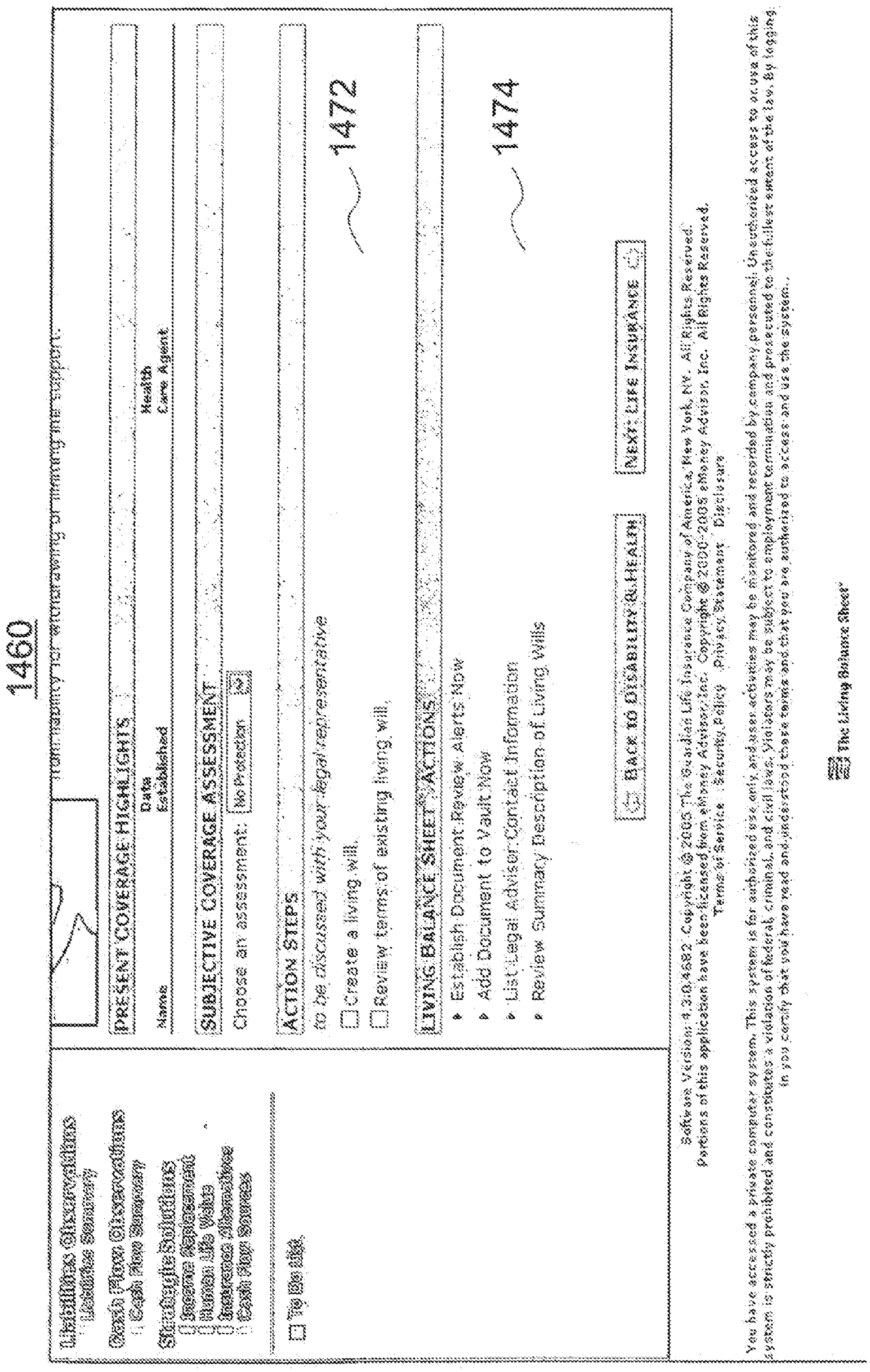

FIGS. 146-147 show legal documents—living will display page 1460. Display page 1460 includes legal document type section 1461 and information section 1462. Display page 1460 can include present coverage highlights section 1463 that displays a summary of the client's current legal document coverage for the current protection category. Display page 1460 can include assessment section 1464 that displays an assessment of the client's level of protection under the current legal document category. The displayed level of protection can be the level that was selected in matrix 1302 of FIG. 130. As such, the assessment can be automatically selected. A pull-down menu can be implemented to allow the level to be changed while in display page 1460. Display page 1460 can include action steps section 1472 of FIG. 147. Action steps section 1472 as shown displays a list of selectable action steps specific to the current category that are needed to be taken by the client (e.g., to discuss the subject of the action step) to for example move the sales process or interaction with the client forward. A user can click in a checkbox associated with each action item to indicate that the selected action step should be completed with respect to the current client. A list of selected action steps from the various display pages for different insurance or protection categories or types can be displayed at the end of protection observation section 1332. Display page 1460 can include actions section 1474 that includes selectable links for software internal actions or user-centered actions that the user should take with respect to the client and the current protection category (e.g., legal documents—wills). A list of selected actions from the various display pages for different insurance protection categories or types can be displayed at the end of protection observation section 1332. A user can interact with the next and back buttons to save or cancel selections and to move to the next or previous display page or section.

Figure 148:
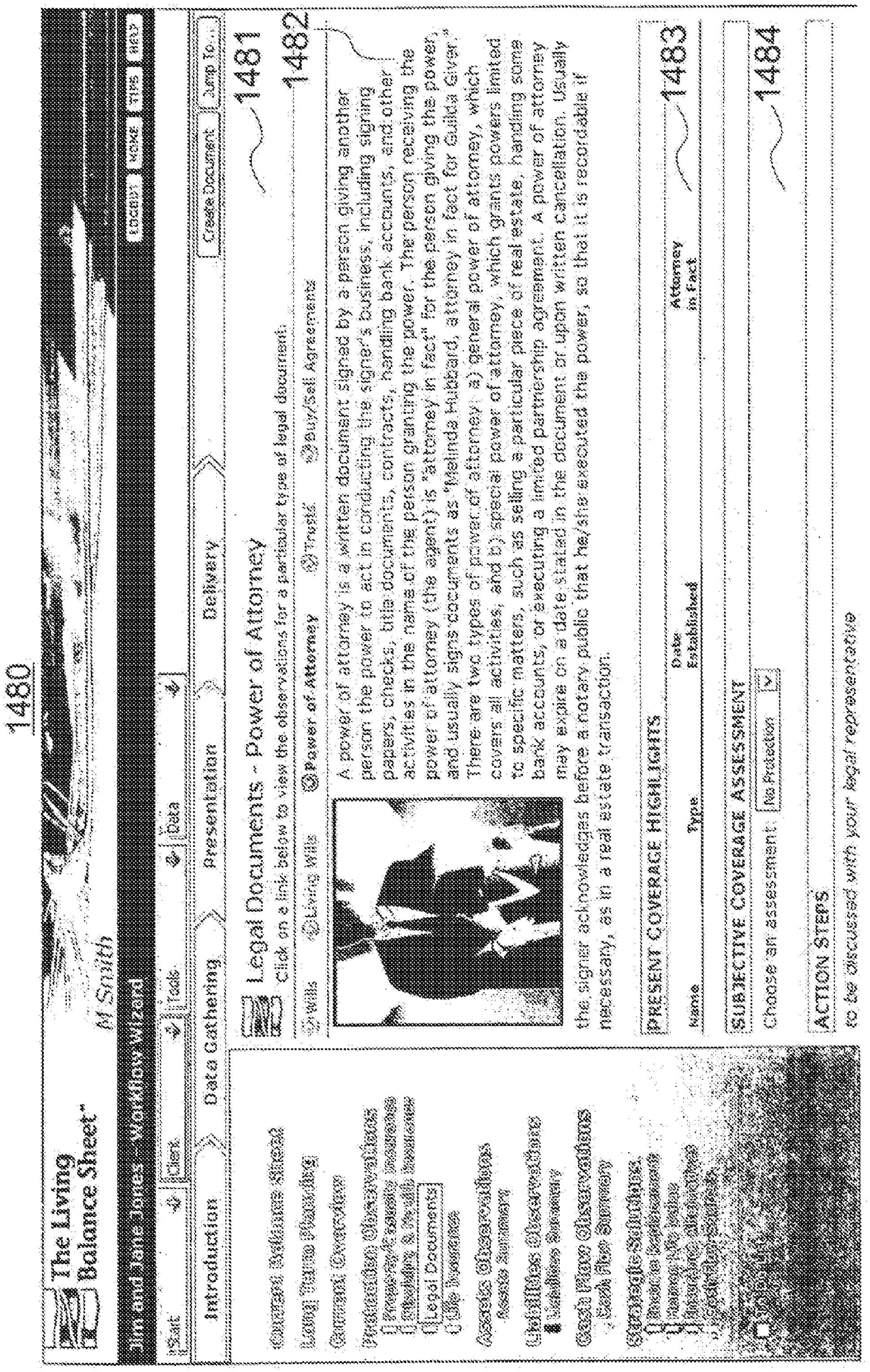
Figure 149:
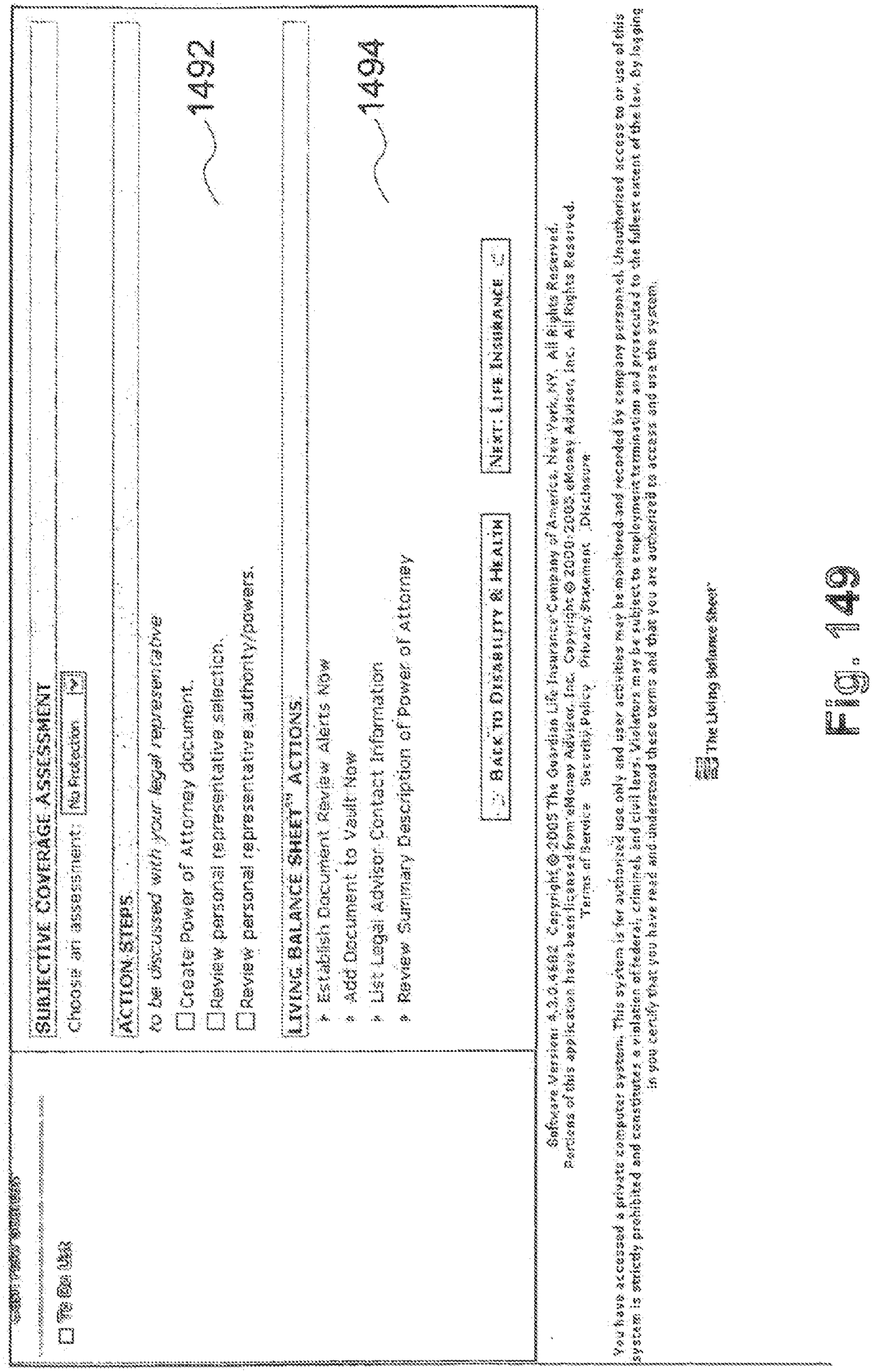

FIGS. 148-149 show legal documents—power of attorney display page 1480. Display page 1480 includes legal document type section 1481 and information section 1482. Display page 1480 can include present coverage highlights section 1483 that displays a summary of the client's current legal document coverage for the current protection category. Display page 1480 can include assessment section 1484 that displays an assessment of the client's level of protection under the current legal document category. The displayed level of protection can be the level that was selected in matrix 1302 of FIG. 130. As such, the assessment can be automatically selected. A pull-down menu can be implemented to allow the level to be changed while in display page 1480. Display page 1480 can include action steps section 1492 of FIG. 149. Action steps section 1492 as shown displays a list of selectable action steps (e.g., specific to the current category) that are needed to be taken by the client (e.g., to discuss the subject of the action step) to for example move the sales process or interaction with the client forward. A user can click in a checkbox associated with each action step to indicate that the selected action step should be completed with respect to the current client. A list of selected action steps from the various display pages for different insurance or protection categories or types can be displayed at the end of protection observation section 1332. Display page 1480 can include actions section 1494 that includes selectable links for software internal actions or user-centered actions that the user should take with respect to the client and the current protection category (e.g., property/casualty—auto insurance). A list of selected actions from the various display pages for different insurance protection categories or types can be displayed at the end of protection observation section 1332. A user can interact with the next and back buttons to save or cancel selections and to move to the next or previous display page or section.

Figure 150:
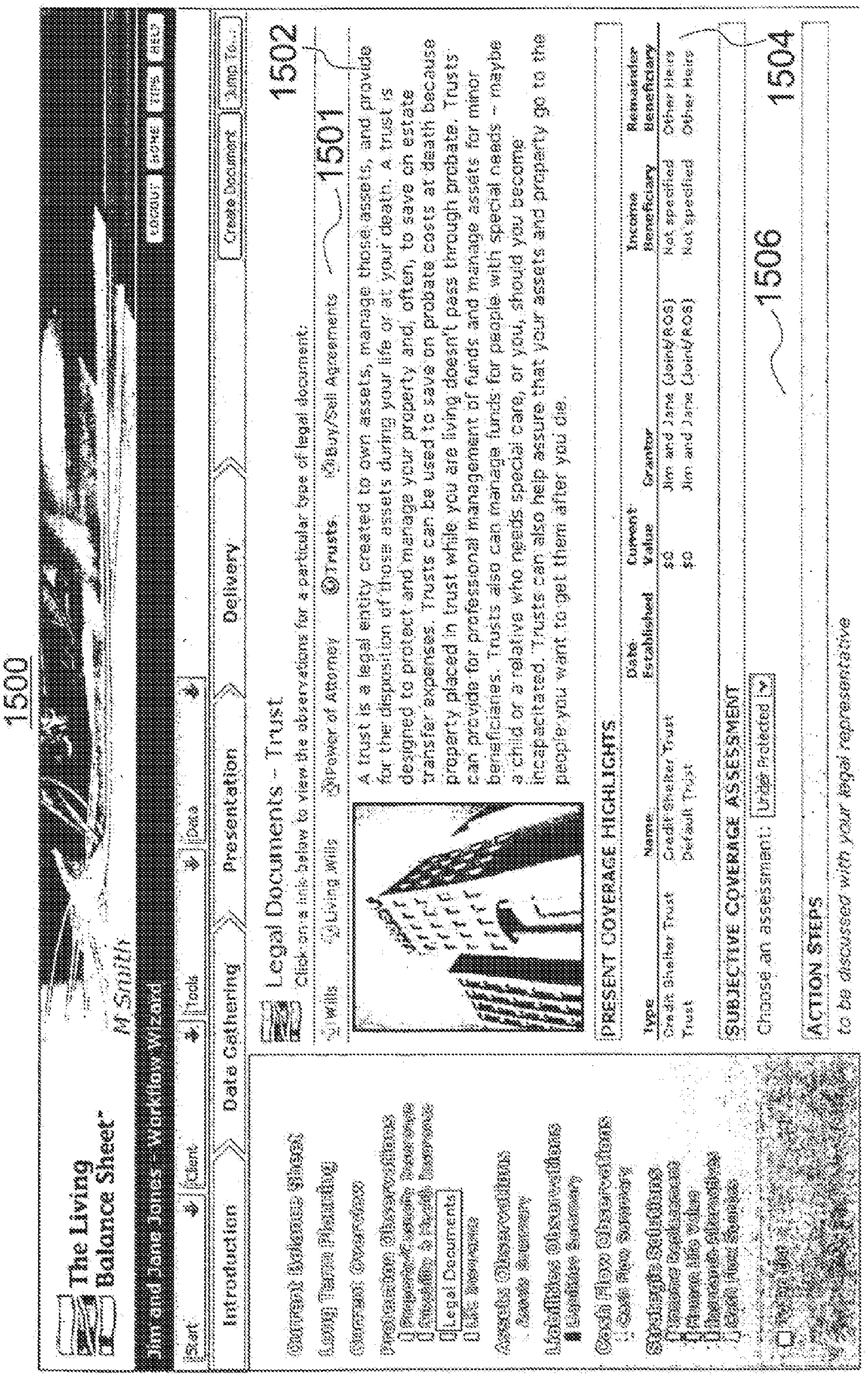
Figure 151:
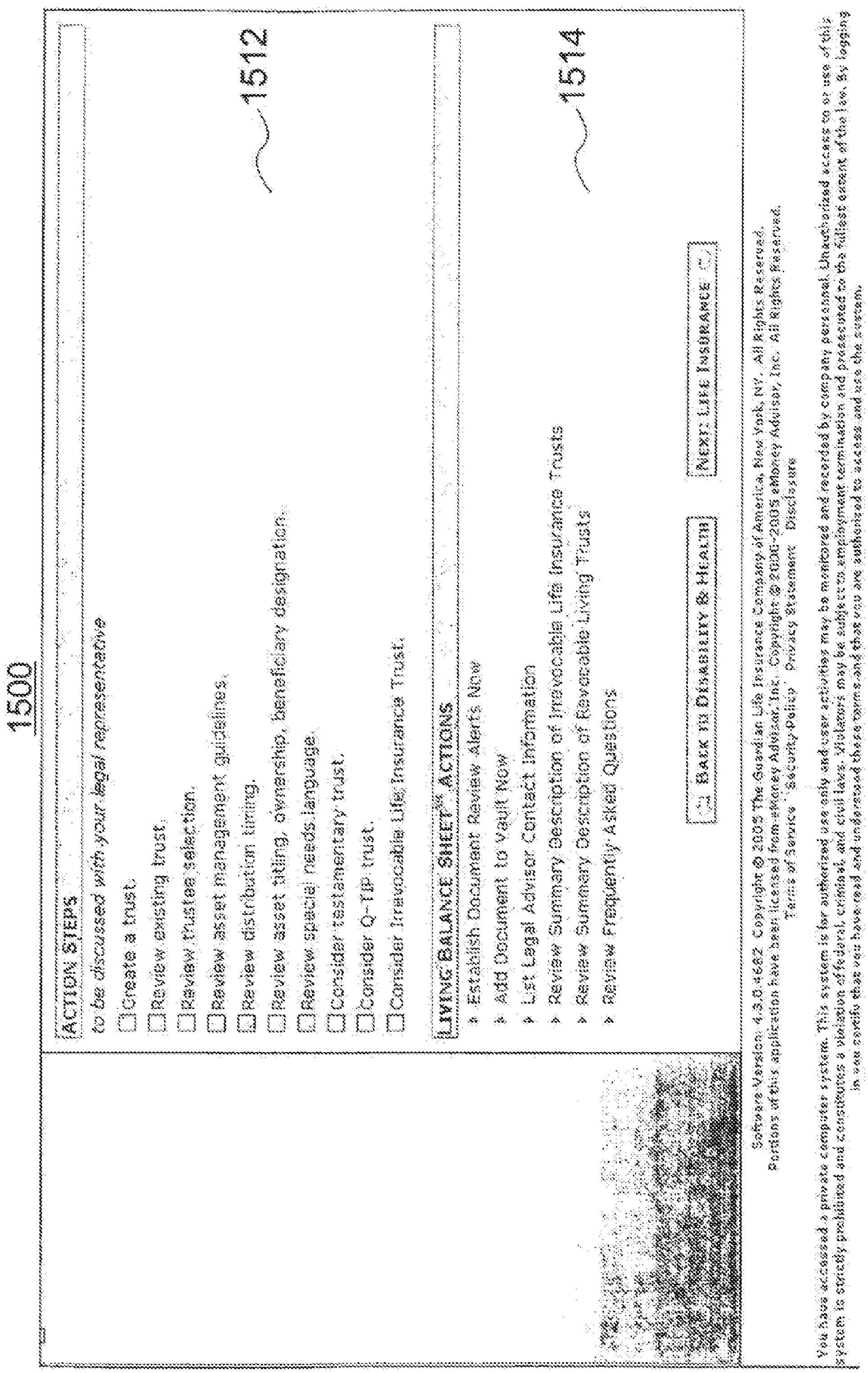

FIGS. 150-151 show legal documents—trusts display page 1500. Display page 1500 includes legal document type section 1501 and information section 1502. Display page 1500 can include present coverage highlights section 1504 that displays a summary of the client's current legal document coverage for the current protection category. Display page 1500 can include assessment section 1506 that displays an assessment of the client's level of protection under the current legal document category. The displayed level of protection can be the level that was selected in matrix 1302 of FIG. 130. As such, the assessment can be automatically selected. A pull-down menu can be implemented to allow the level to be changed while in display page 1500. Display page 1500 can include action steps section 1512 of FIG. 151. Action steps section 1512 as shown displays a list of selectable action steps (e.g., specific to the current category) that are needed to be taken by the client (e.g., to discuss the subject of the action step) to for example move the sales process or interaction with the client forward. A user can click in a checkbox associated with each action step to indicate that the selected action step should be completed with respect to the current client. A list of selected action steps from the various display pages for different insurance or protection categories or types can be displayed at the end of protection observation section 1332. Display page 1500 can include actions section 1514 that includes selectable links for software internal actions or user-centered actions that the user should take with respect to the client and the current protection category (e.g., legal documents—wills). A list of selected actions from the various display pages for different insurance protection categories or types can be displayed at the end of protection observation section 1332. A user can interact with the next and back buttons to save or cancel selections and to move to the next or previous display page or section.

Figure 152:
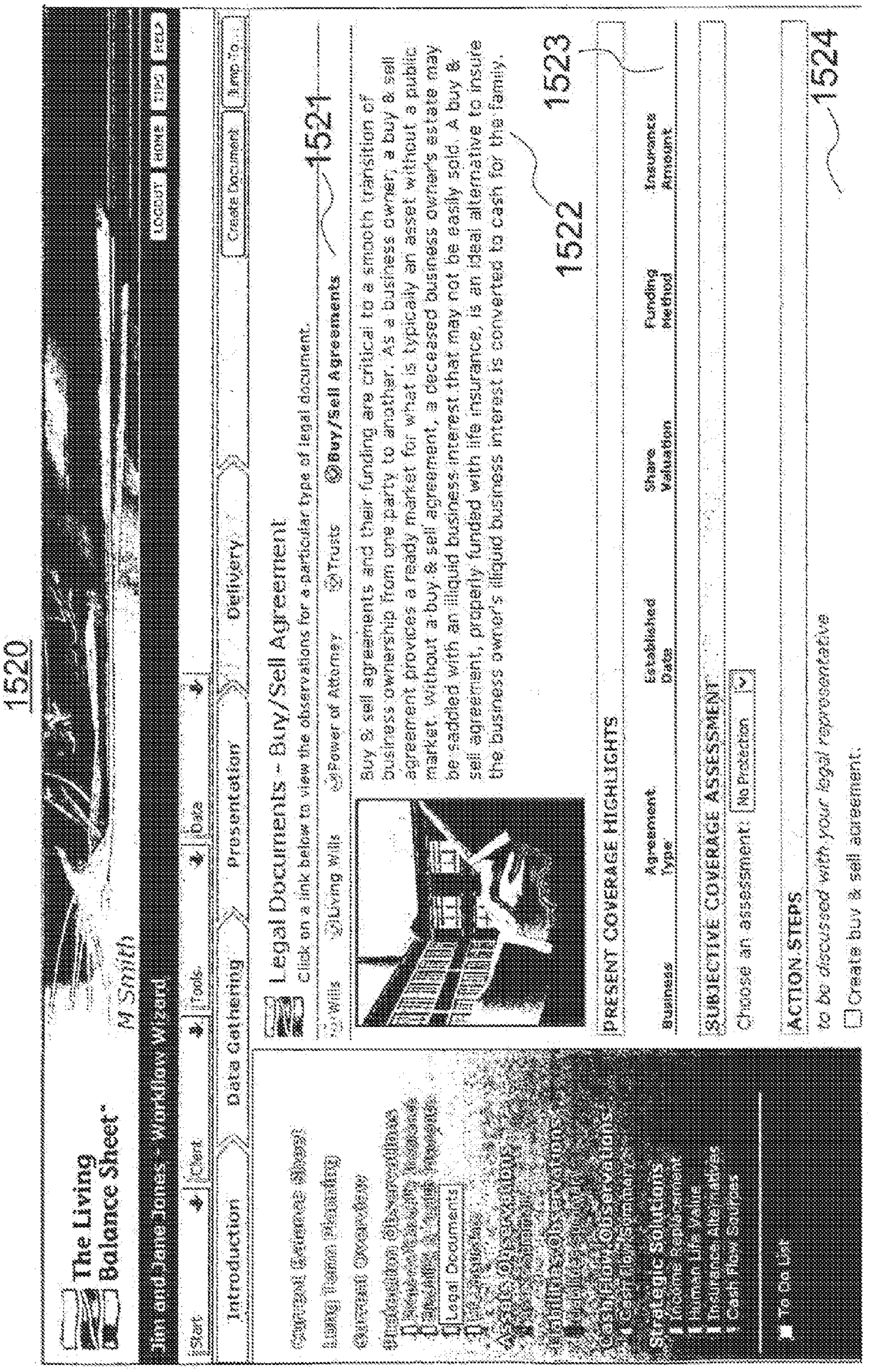
Figure 153:
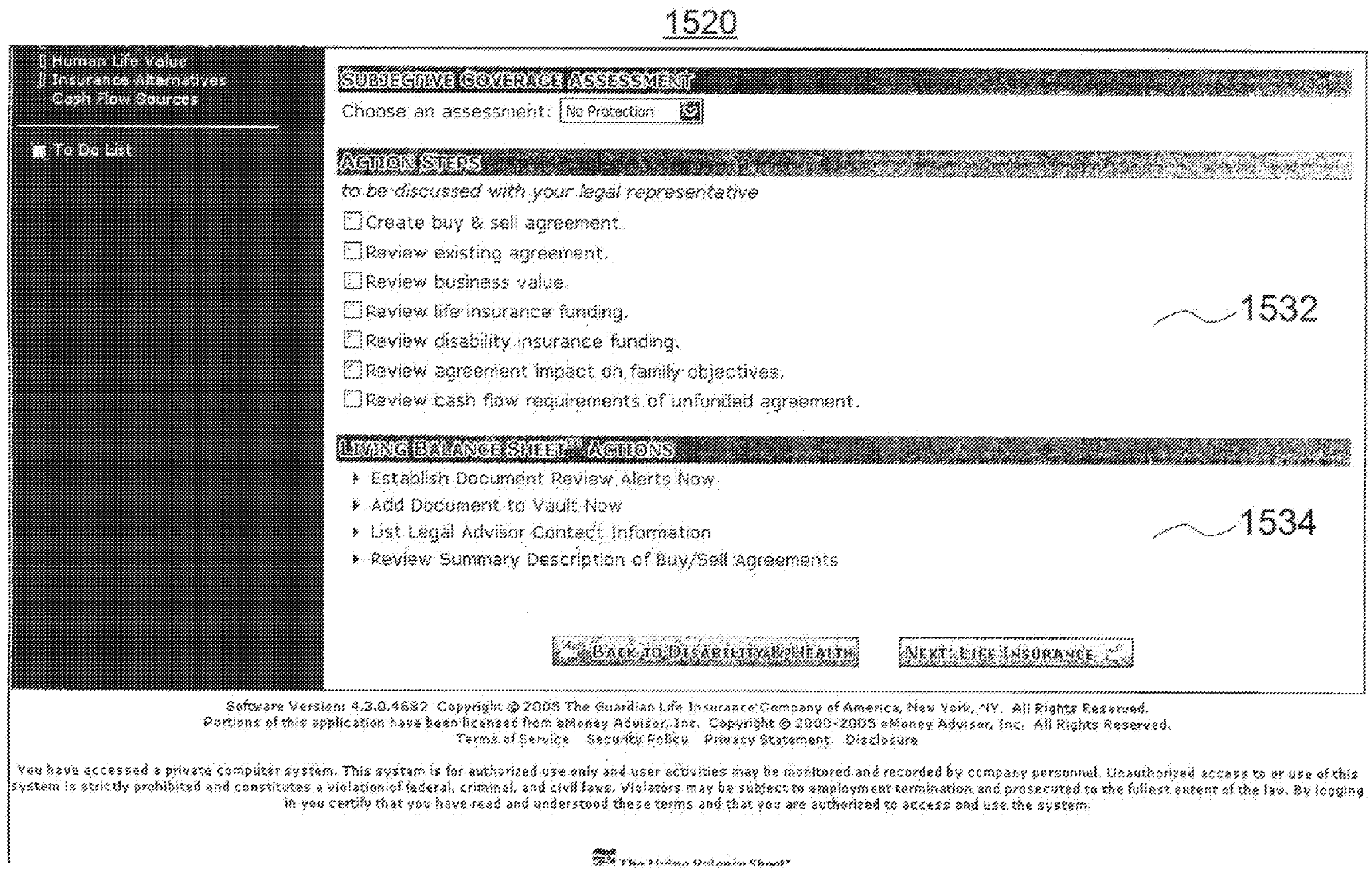

FIGS. 152-153 show legal documents—buy/sell agreements display page 1520. Display page 1520 includes legal documents type section 1521 and information section 1522. Display page 1520 can include present coverage highlights section 1523 that displays a summary of the client's current legal document coverage for the current protection category. Display page 1520 can include assessment section 1524 that displays an assessment of the client's level of protection under the current legal document category. The displayed level of protection can be the level that was selected in matrix 1302 of FIG. 130. As such, the assessment can be automatically selected. A pull-down menu can be implemented to allow the level to be changed while in display page 1520. Display page 1520 can include action steps section 1532 of FIG. 153. Action steps section 1532 as shown displays a list of selectable action steps (e.g., specific to the current category) that are needed to be taken by the client (e.g., to discuss the subject of the action step) to for example move the sales process or interaction with the client forward. A user can click in a checkbox associated with each action step to indicate that the selected action step should be completed with respect to the current client. A list of selected action steps from the various display pages for different insurance or protection categories or types can be displayed at the end of protection observation section 1332. Display page 1520 can include actions section 1534 that includes selectable links for software internal actions or user-centered actions that the user should take with respect to the client and the current protection category. A list of selected actions from the various display pages for different insurance protection categories or types can be displayed at the end of protection observation section 1332. A user can interact with the next and back buttons to save or cancel selections and to move to the next or previous display page or section.

Figure 154:
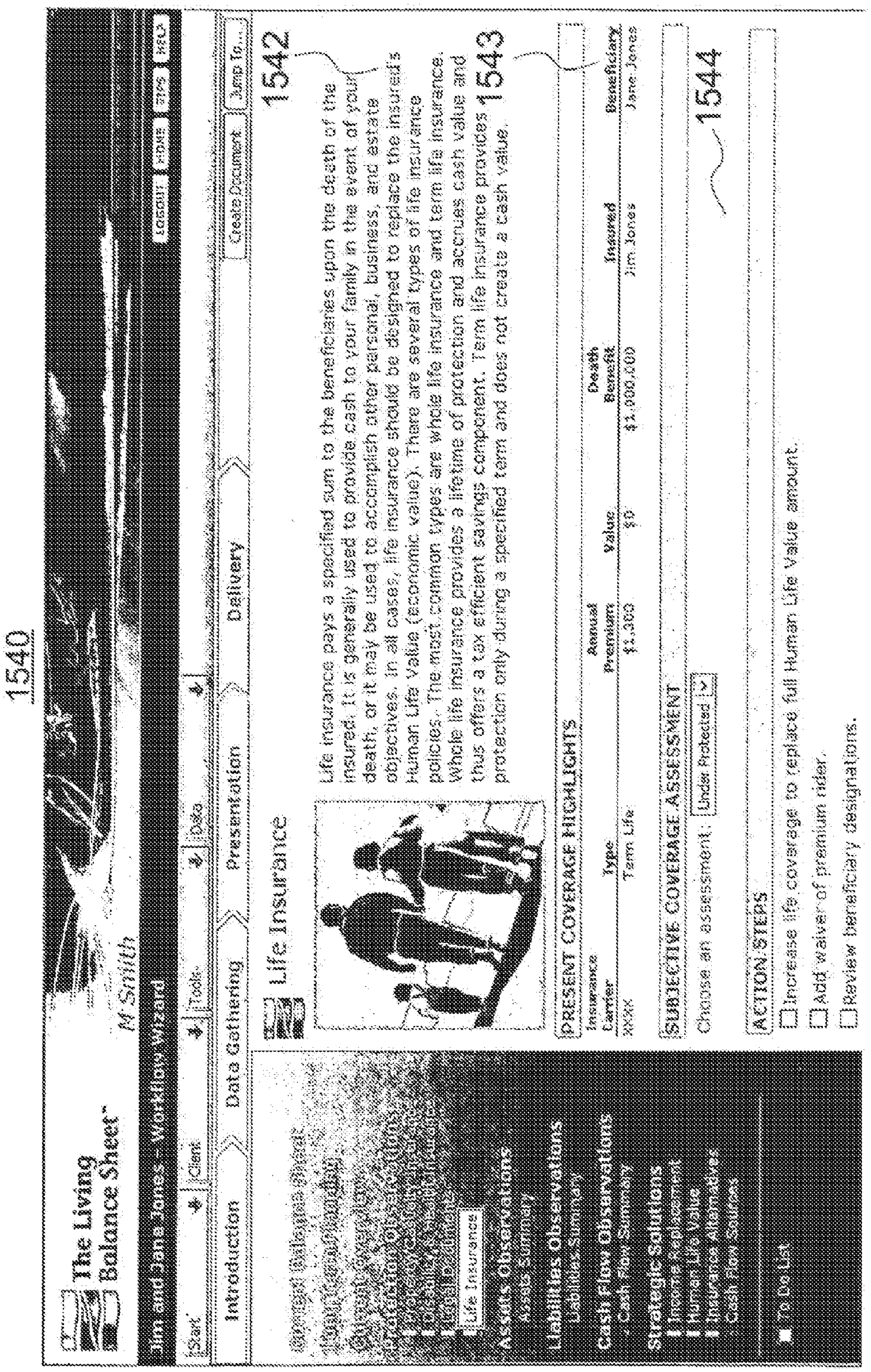
Figure 155:
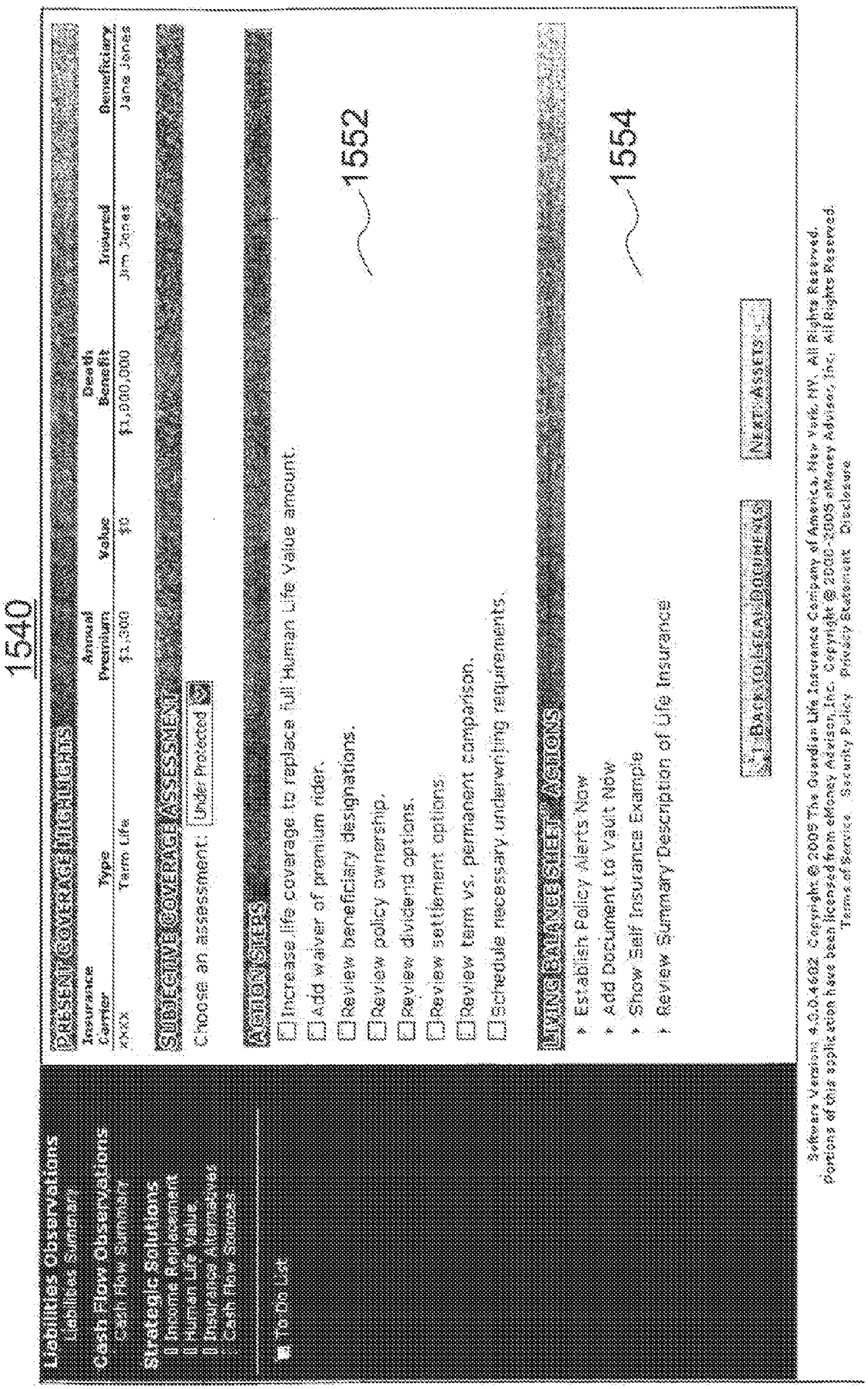

FIGS. 154-155 show life insurance display page 1540. Display page 1540 includes insurance type section 1541 and information section 1542. Display page 1540 can include present coverage highlights section 1543 that displays a summary of the client's current insurance coverage for the current insurance category. Display page 1540 can include assessment section 1544 that displays an assessment of the client's level of protection under the current insurance category. The displayed level of protection can be the level that was selected in matrix 1302 of FIG. 130. As such, the assessment can be automatically selected. A pull-down menu can be implemented to allow the level to be changed while in display page 1540. Display page 1540 can include action steps section 1552 of FIG. 155. Action steps section 1552, as shown, displays a list of selectable action steps (e.g., specific to life insurance) that are desired to be taken by the client (e.g., to discuss the subject of the action step) to, for example, move the sales process or interaction with the client forward. A user can click in one of the checkboxes associated with each action step to indicate that the selected action step should be completed. A list of selected action steps from the various display pages for different insurance protection categories or types can be displayed at the end of protection observation section 1332. Display page 1540 can include actions section 1554 of FIG. 155 that includes selectable links for internal software actions or user-centered actions that the user should take with respect to the client and the current insurance category (e.g., property/casualty—auto insurance). A user can interact with the next and back buttons to save or cancel selections and to move to the next or previous display page or section. If desired, a list summarizing the actions selected in the various display pages in connection with different insurance categories or insurance types can be displayed at the end of protection observation section 1332.

Figure 156:
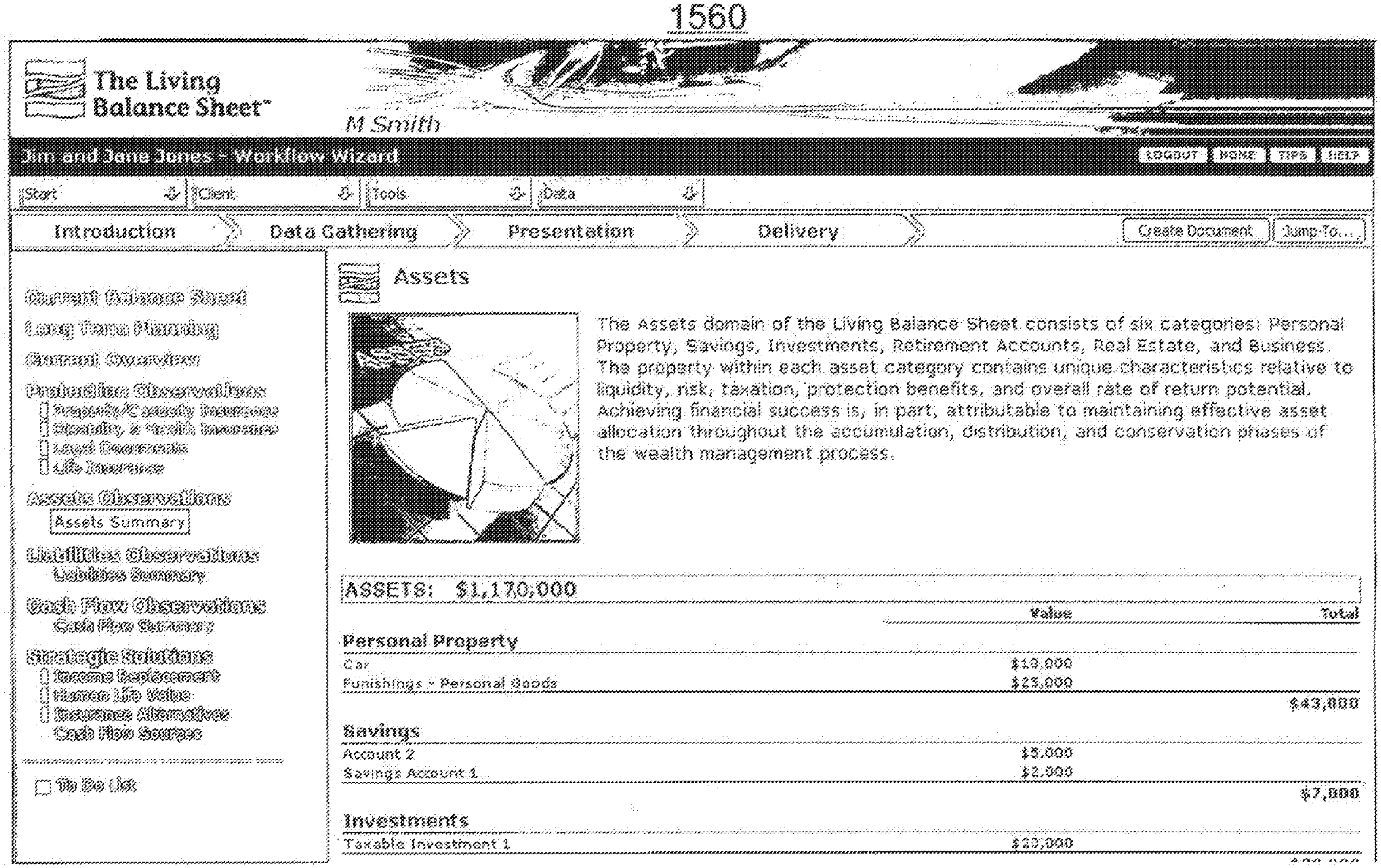
Figure 157:
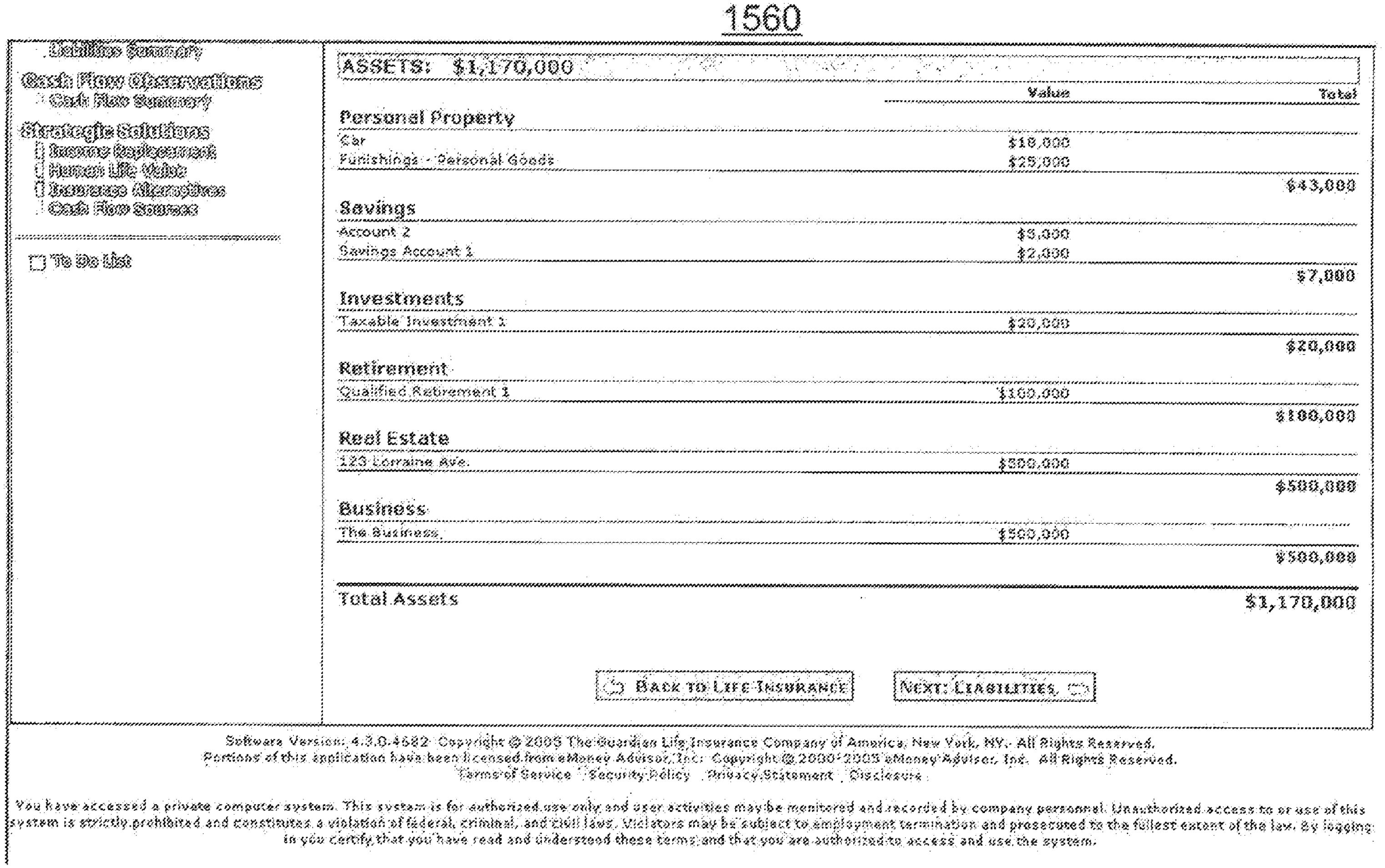

The next section in the presentation stage can be an asset observations section. For example, assets display page 1560 of FIGS. 156-157 can be displayed. Assets display page 1560 is preferably configured to provide an itemized summary/total of the client's assets, as for example entered and compiled during the data gathering stage. Assets display page 1560 can include a cumulative total per category and a total cumulative assets value for such information. For example, assets display page 1560 can include displayed sections for asset categories such as personal property, savings, investments, retirement, real estate, and business (e.g., such categories as were identified and entered during the data gathering stage). The displayed next and back button can be selected to move to the next or previous sections.

Figure 158:
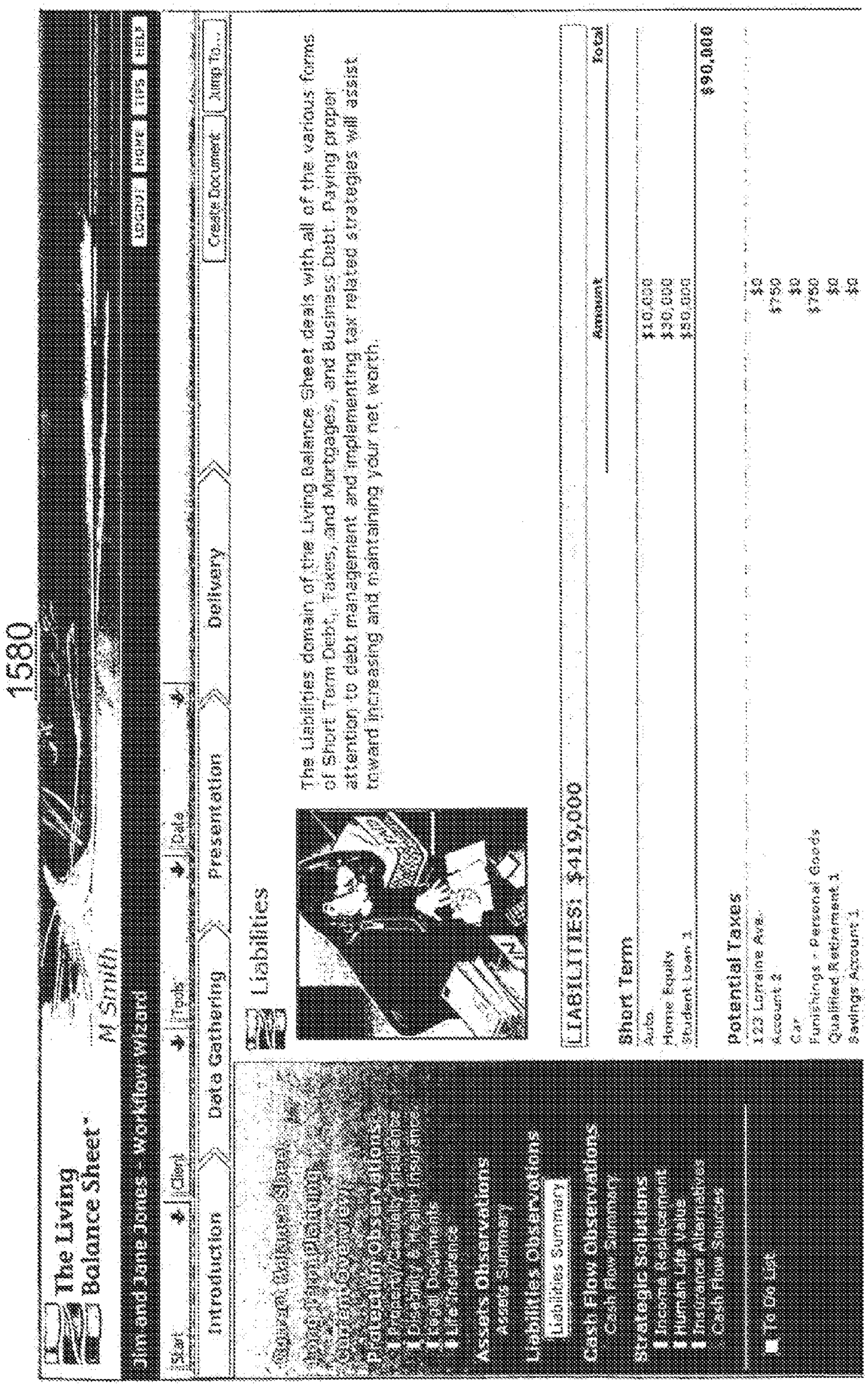
Figure 159:
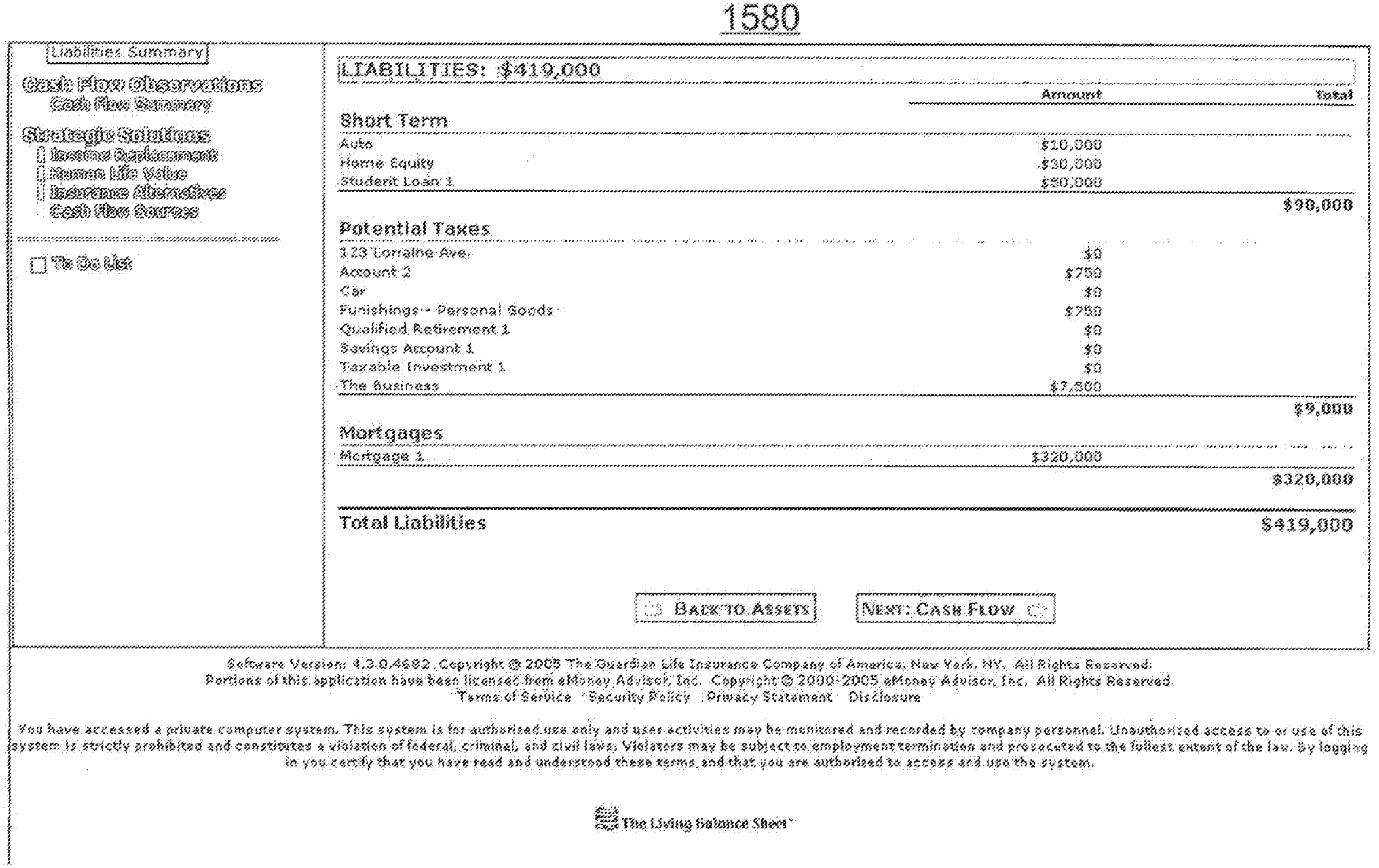

The next section in the presentation stage can be a liabilities observations section. For example, liabilities display page 1580 of FIGS. 158-159 can be displayed. Liabilities display page 1580 is preferably configured to provide an itemized summary/total of the client's liabilities that, for example, was entered or compiled during the data gathering stage. Liabilities display page 1580 can include a cumulative total per category and a total liabilities value for such information. For example, liabilities display page 1580 can include displayed sections for liabilities categories such as short-term liability, potential taxes, and mortgages (e.g., such liability categories as were identified and entered during the data gathering stage). The displayed next and back button can be selected to move to the next or previous sections.

The next section in the presentation stage can be a cash flow observations section. For example, cash flow display page 1600 of FIGS. 160-161 can be displayed. Cash flow display page 1600 is preferably configured to provide an itemized summary/total of the client's cash flow related information that, for example, was entered or compiled during the data gathering stage. Cash flow display page 1600 can include a cumulative total per category and a total a new income value for such information. For example, cash flow display page 16000 can include display sections for cash flow categories such as gross income, protection costs (i.e., costs of insurance protection), asset building savings (e.g., retirement, savings, etc.), and liability payments (e.g., car loan, student loan, etc.). For example, display screen 1600 can display itemized information and totals for such cash flow, costs, and liability payment-categories information that were identified and entered during the data gathering stage. The displayed next and back buttons can be selected to move to the next or previous sections.

The next section can be a strategic solutions section that provides illustrative presentation, information, calculators, and comparisons based on the client information that can quantify the strengths and weaknesses of the client's current level of protection and to illustrate possible ways of achieving preferred protection levels. As shown, the strategic solutions section can for example include multiple subsections such as income replacement, human life value, insurance alternatives, and cash flow sources.

Figure 162:
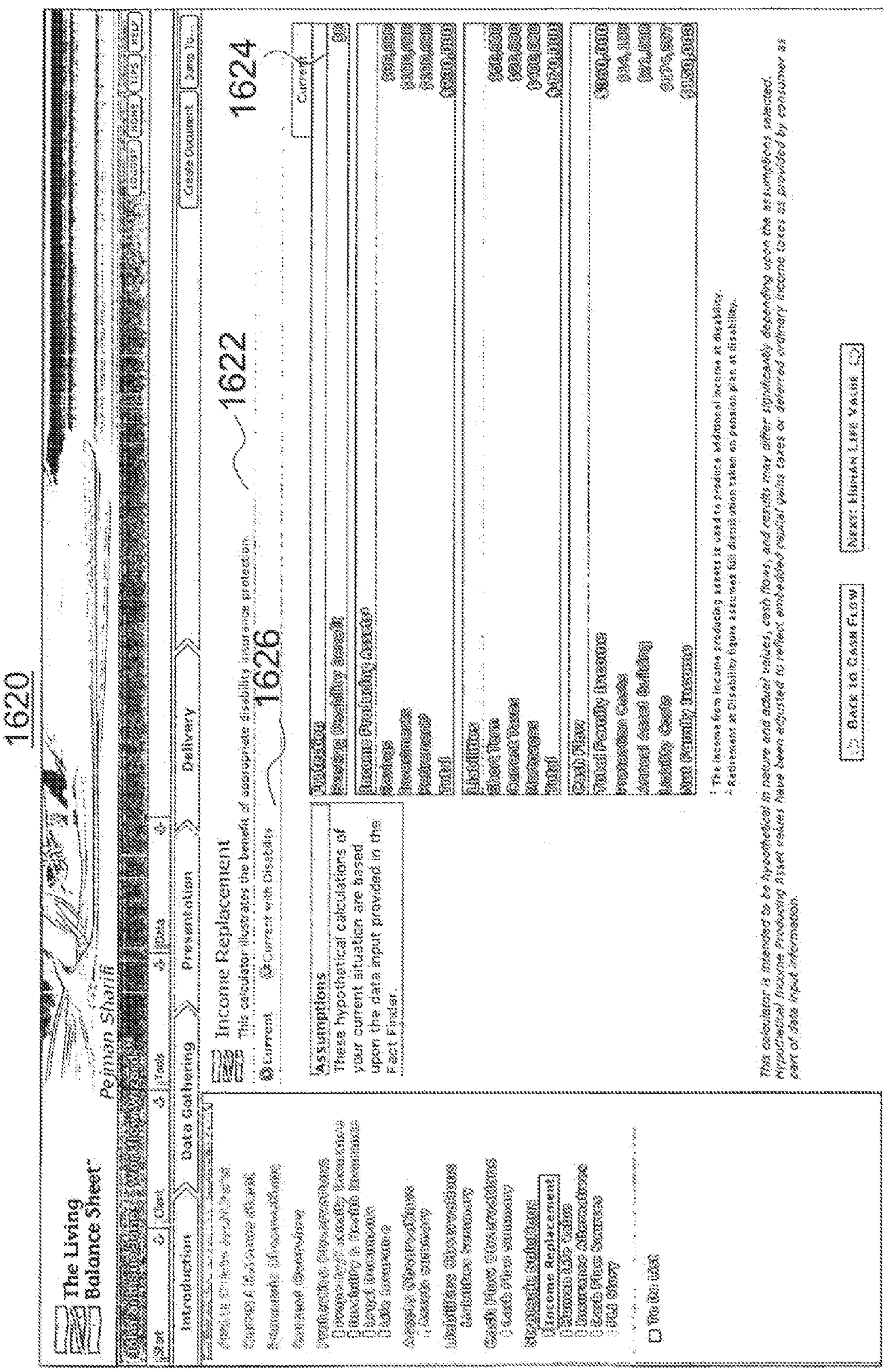

For example, as part of the income replacement section, income replacement calculator display page 1620 of FIG. 162 can be displayed. Income replacement calculator display page 1620 can be configured to display relevant financial and protection data relating to disability insurance protection. The purpose of display page 1620 can be to provide a comparative analysis of a client's current financial state and the client's financial state if the client is disabled now and must then rely on any existing disability insurance that the client owns. As shown, display page 1620 includes calculator display section 1622. Calculator display section 1622 can include "current" display section 1624 that displays a table of relevant financial and protection information of the client. The information is to reflect the current state of the client with respect to pertinent disability insurance related information. The information can be automatically populated from information that was previously entered, for example, during the data gathering stage. The display information can be displayed in appropriate categories such as protection, income producing assets, liabilities, and cash flow. Under protection, the existing annual amount of disability benefit that is covered under the client's disability protection can be displayed. Within the income producing assets category, the current client values for savings, investments, retirement, and a total of such values can be displayed. Under the liabilities category, the current client values for short-term liabilities, current taxes, mortgages, and a total thereof can be displayed. Under the cash flow category, the total family income, protection costs, annual savings (or asset building), liability costs, and the net family income, which would be the result of deducting protection costs, annual savings, and liability costs from the total family income, can be displayed. As shown, calculator display section 1622 can display the "current" state of financial and protection information.

Figure 163:
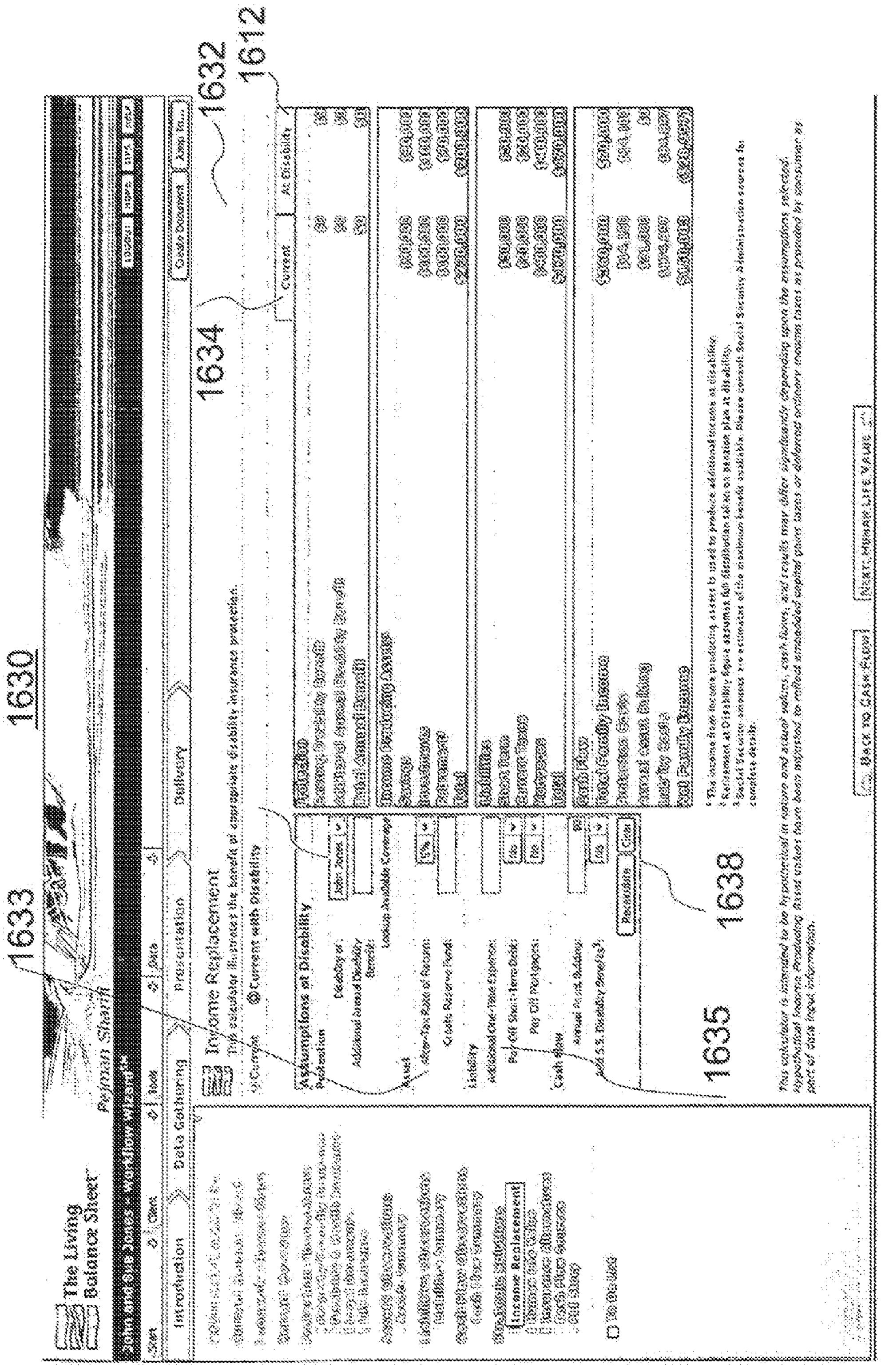

Radio buttons or links 1626 can be used to switch between different types of views. As shown, radio button 1626 reflects that the "current" view is displayed. If a user selects the "current with disability" radio button, additional information and functionality is added to display section 1622 to allow for the calculation and related analysis of the client's current financial state and the client's current financial state if the client was currently disabled. For example, with reference now to FIG. 163, calculator display section 1632 can be displayed that includes "current" display section 1634 and "at disability" display section 1636. In addition, assumptions section 1638 is displayed. The newly added "at disability" section 1636 is used to display a table of information that is also displayed as part of "current" display section 1634, but the values are revised to reflect the impact of becoming disabled to the current financial state of the client. As such, the client can visually see a detailed analysis of the likely impact of the client's current level of disability protection to the client's financial state if the client was to be currently disabled. The information is also displayed in a side-by-side manner to aid comprehension and the presentation value of the information that is displayed.

As shown, "at disability" section 1636 is displayed to reflect the current settings in assumptions section 1638 and possible underlying facts that were entered as part of the data gathering section. As such, the only numbers that are changed between "current" display section 1634 and "at disability" section 1636 are the retirement, total family income, annual savings, liability costs, and net family income information. The retirement asset value is changed to a lower amount to reflect a current payout under the retirement account (e.g., a lower payout based on user-selected tax assumption for the client). The value displayed for total family income in the "at disability" section reflects that the loss of the employment income of the client or family member that is disabled. A user can select to identify the disability to be one of the client or spouse using pull-down menu 1631. The total family income at disability also reflects the addition of the total annual disability benefit, which is in this example is $0 and the annual return on the total assets based on the after-tax rate of return that is specified using pull-down menu 1633. Assumptions section 1638 also reflects that at disability, the client will seek a certain amount of annual savings 1635. As shown, this amount is set to zero and is reflected in the "annual savings" line item of "at disability" section 1636. The liability costs is reduced from the "current" to the "at disability" value because the liability costs includes the income tax liability arising from employment income, which in this case would be reduced due to the lack of employment income caused by the disability. With this information, the client can now see that the impact of a disability on the client current financial situation will be such that the net family income value will drop from $150,003 to a negative dollar value, which clearly reflects the need for disability protection.

Note also that there is no difference shown between the "current" and "at disability" protection costs. This is because, in this example, the client did not have disability insurance and therefore, the data would not reflect a premium payment for disability insurance. If the client had some level of disability insurance, the premium for the insurance would be reflected in the difference between the two numbers (e.g., the obligation to pay the premium would end once the insurance is activated). Therefore, data that is entered or calculated within the Workflow Wizard® is automatically applied in other aspects of the wizard and application.

Figure 164:
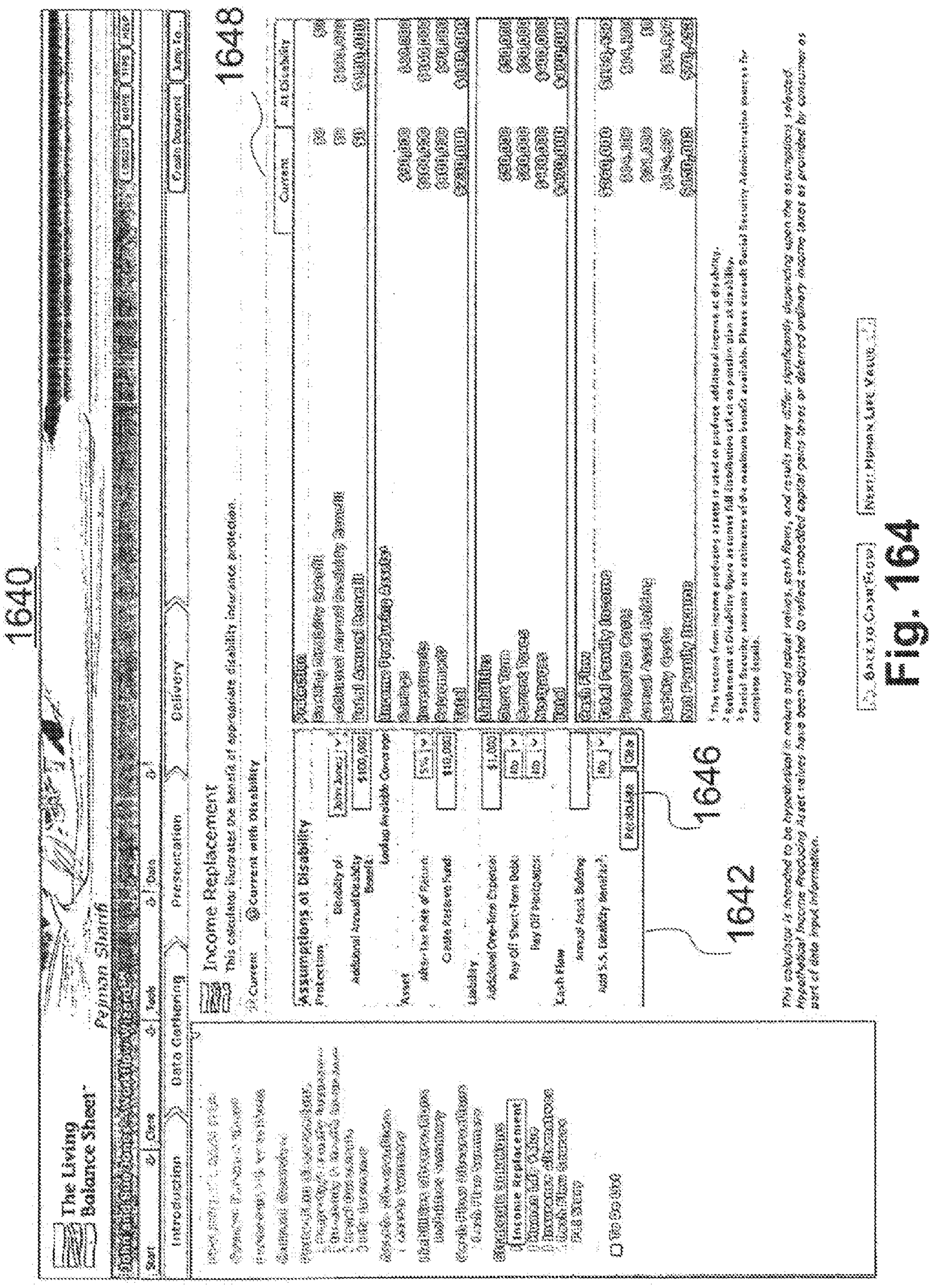

Now with reference to FIG. 164, the user may also interact with other features of assumptions section 1642 to further illustrate the "at disability" state of the client's financial condition. For example, the user may enter a value such as $100,000 in the additional annual disability benefit option of assumptions section 1642. If desired, lookup available coverage option 1644 can be displayed near the additional annual disability benefit option 1644 to allow the user to lookup additional coverage that may be available for the client (e.g., based on an automated evaluation or using lookup tables). The user may also be provided with options for entering values corresponding to creating a reserve fund and specifying an additional one-time expense that would be incurred at the time of the disability. After entering such information, the user can select recalculate button 1646. In response, "at disability" section 1648 is updated based on the new information in assumptions section 1642. As shown, "at disability" section 1648 now reflects that the client protection includes $100,000 of additional annual disability benefit. As shown, the updated savings value of $19,000 reflects a deduction from the $30,000 current savings value for the creation of the $10,000 reserve fund and the payment of the $1,000 additional one-time expense as selected in assumptions section 1642. The total family income and in turn, the net family income reflects the additional $100,000 income that is obtained from the assumed additional annual disability benefit. In addition, the information reflects the lower annual return that is received from the assets (e.g., savings) due to the reduction of the assets to create the reserve fund and to pay the one-time expense. As is comparatively evident again, the client will still face a significant change in financial condition given even this level of disability protection.

Figure 165:
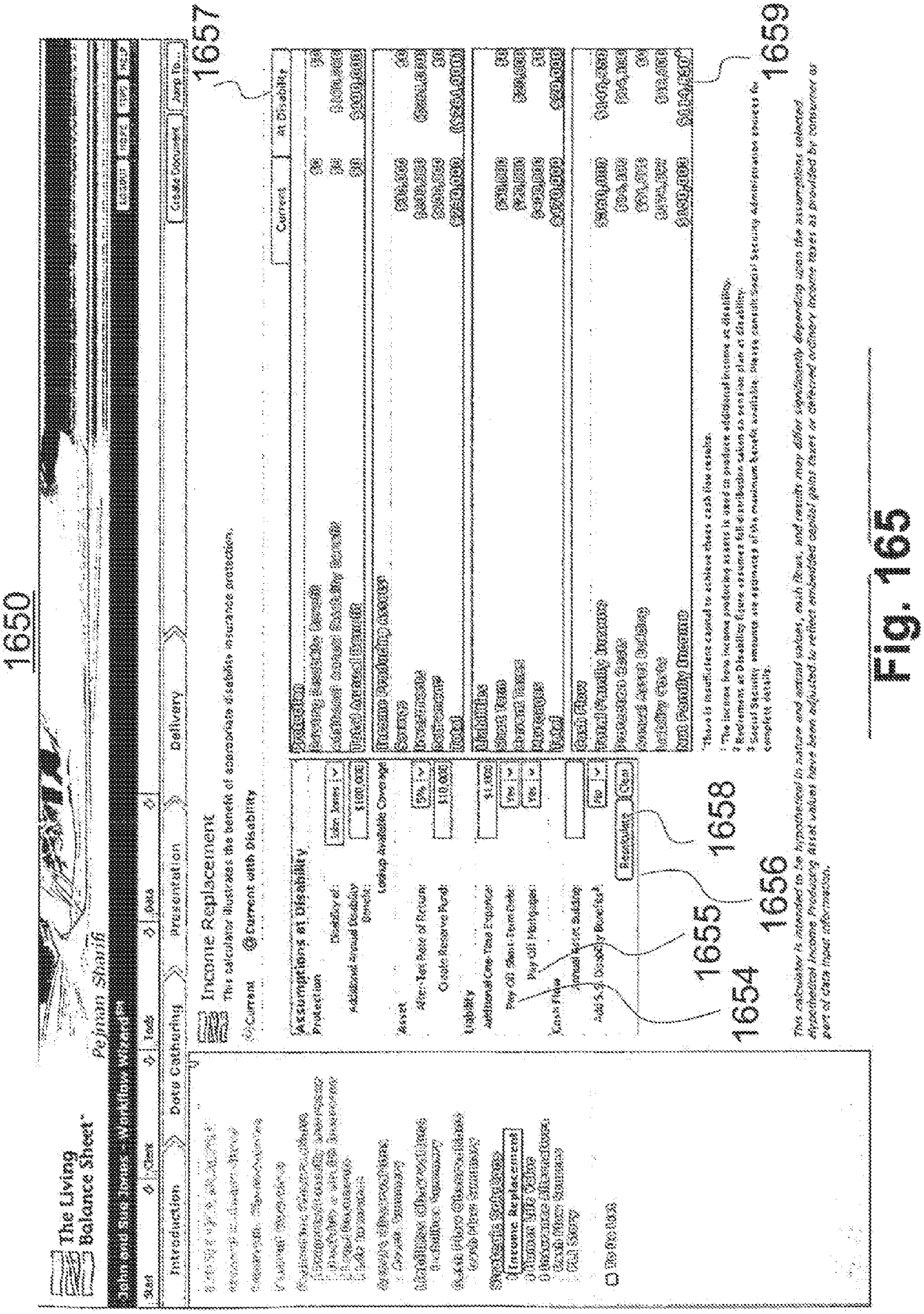

As shown in FIG. 165, other options in assumptions section 1652 can include pay off short-term debt option 1654, pay off mortgage option 1655, and add social security disability benefits option 1656. A user can switch option 1654 to "yes" to indicate that the "at disability" view should incorporate the payment of current short debt debts. A user can also switch option 1655 to "yes" to indicate that the "at disability" view should incorporate the pay off of the client mortgages. After, the client selects recalculate button 1658, "at disability" section 1657 is updated to incorporate the settings that were changed in assumptions section 1652. As such, section 1658 shows that the client's assets were applied to paying off the client's short term debt and to pay off the client's mortgage. However, the client had insufficient assets to accomplish the pay offs. Accordingly, a negative number of $387,750 is reflected in the assets section to show the inadequacy. As such, the calculation cannot provide a valid picture of a possible "at disability" view for the client. This is reflected by the asterisks 1659 and the related notation that states that there is insufficient capital to achieve these cash flow results. Note that the payment of the mortgages and short-term debts can result in a significant change in the client's liability costs, which is now shown to be zero. As such, the pay off options can be used to illustrate to the user the financial differences between paying off liabilities as a means of increasing net family income or for example maintaining the liabilities and purchasing additional disability benefits.

Figure 166:
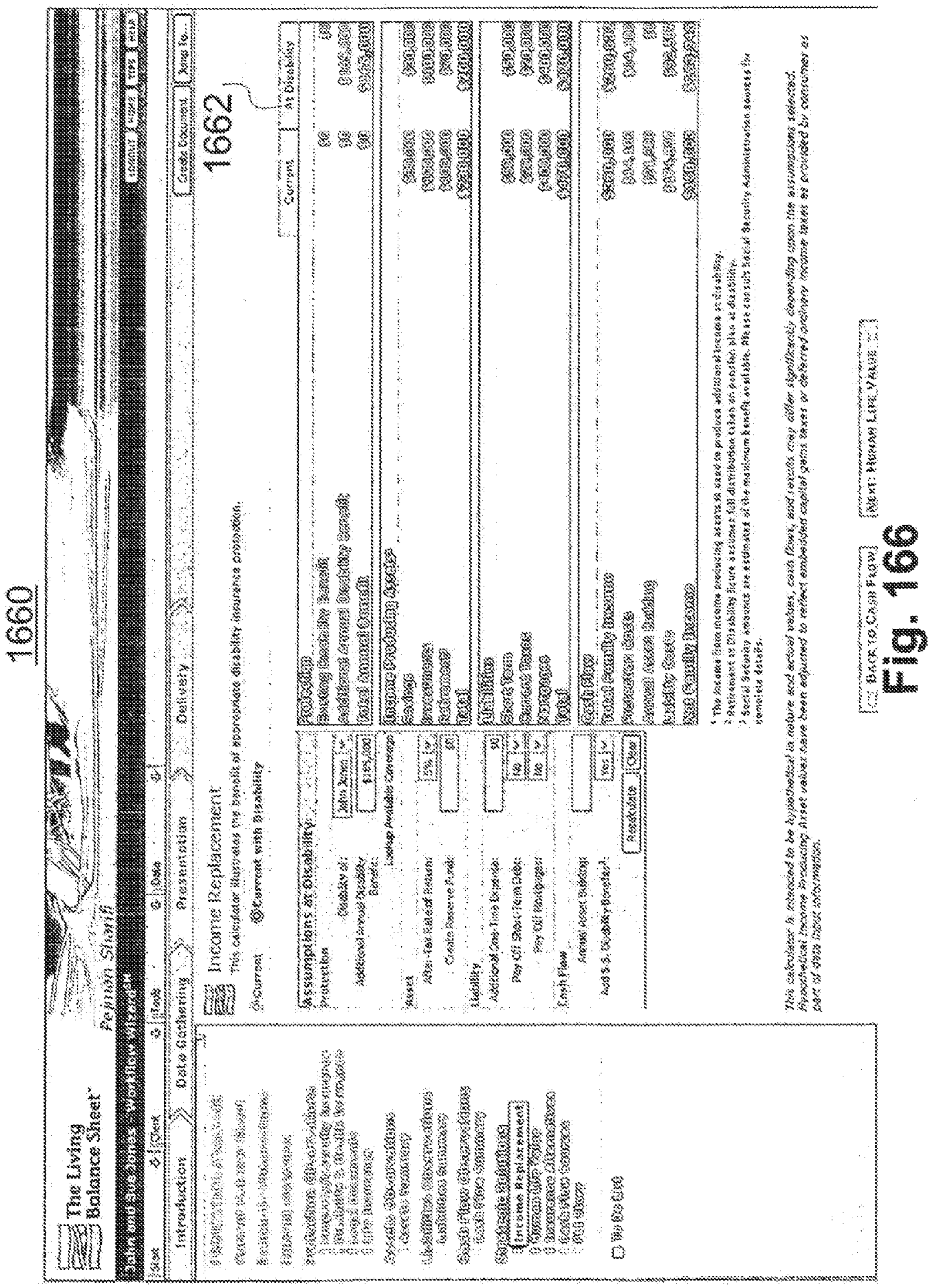
Figure 167:
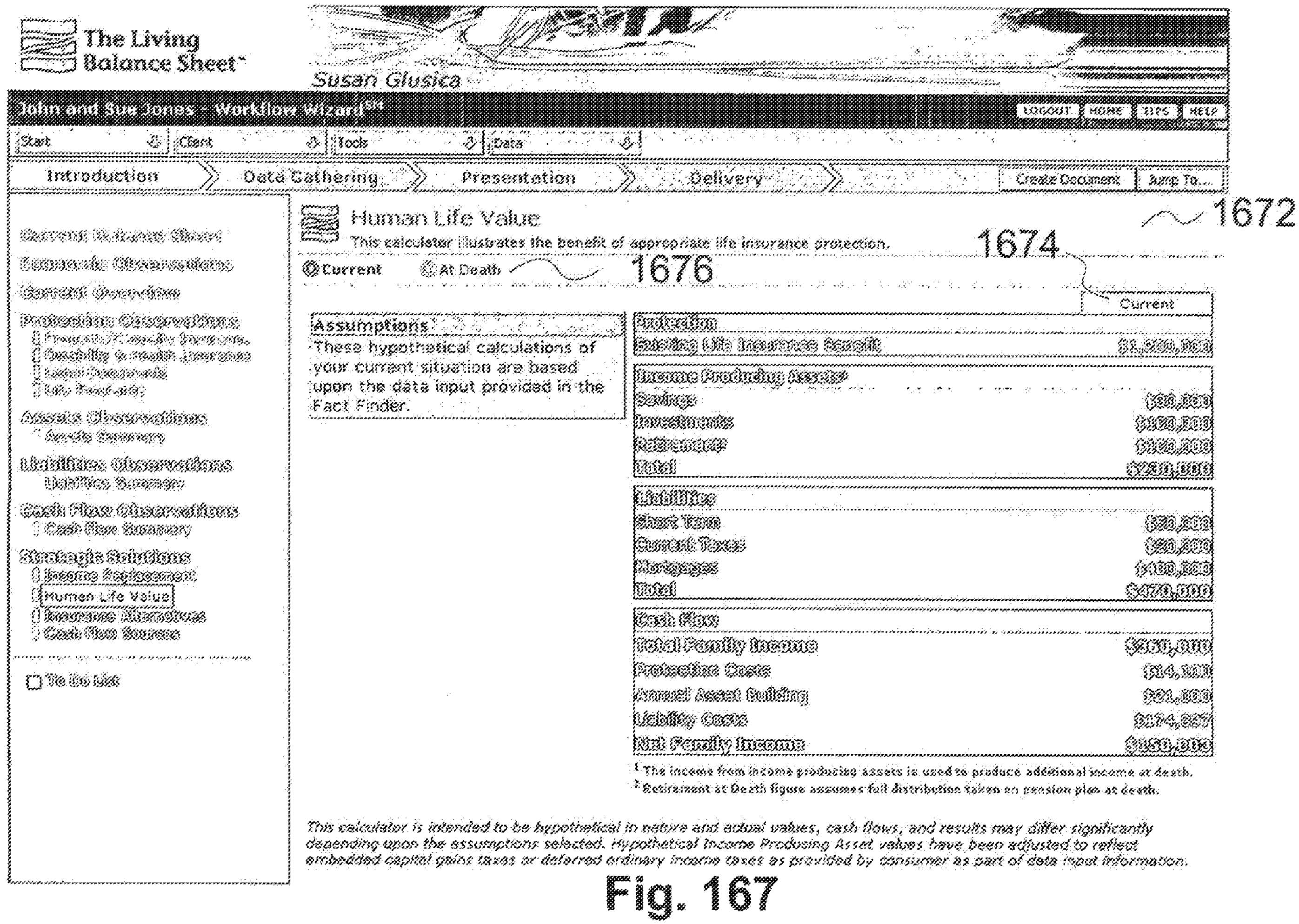

FIG. 166 illustrates display page 1660 that shows another set of assumptions at disability that are selected for analysis for the current client. As shown, the client's additional annual disability benefit has been raised to $165,000, the option to create a reserve fund has been set to zero, and the pay off short term debt and the client's mortgages options has been set to "no." In addition, the option for adding social security disability benefits to the analysis has been to switched to "yes" to include social security disability payments as part of the total family income. If desired, the protection costs section can be updated to reflect the additional cost of purchasing the additional disability benefit of $165,000. In addition, as shown in "at disability" section 1662 of FIG. 166, the additional disability benefit raises the client/family's income to $260,632, which results in a net family income of $153,945. As previously indicated, the total family income reflects any existing disability benefit, the additional disability benefit, family employment income excluding the income of the disabled family member, social security disability benefits, and a 5% return on the value of the income producing assets. The current example shows that the proposed additional disability benefits are probably sufficient for the client given the assumptions at disability that are presently selected. An additional annual disability benefit of approximately $165,000 appears to be appropriate given the existing settings.

As shown, assumptions section 1664 can be configured into sections that correspond to the sections of "at disability" section 1662, e.g., protection, assets, liability, and cash flow. As shown, the section can be displayed adjacent to each other with corresponding sections generally aligned.

Figure 160:
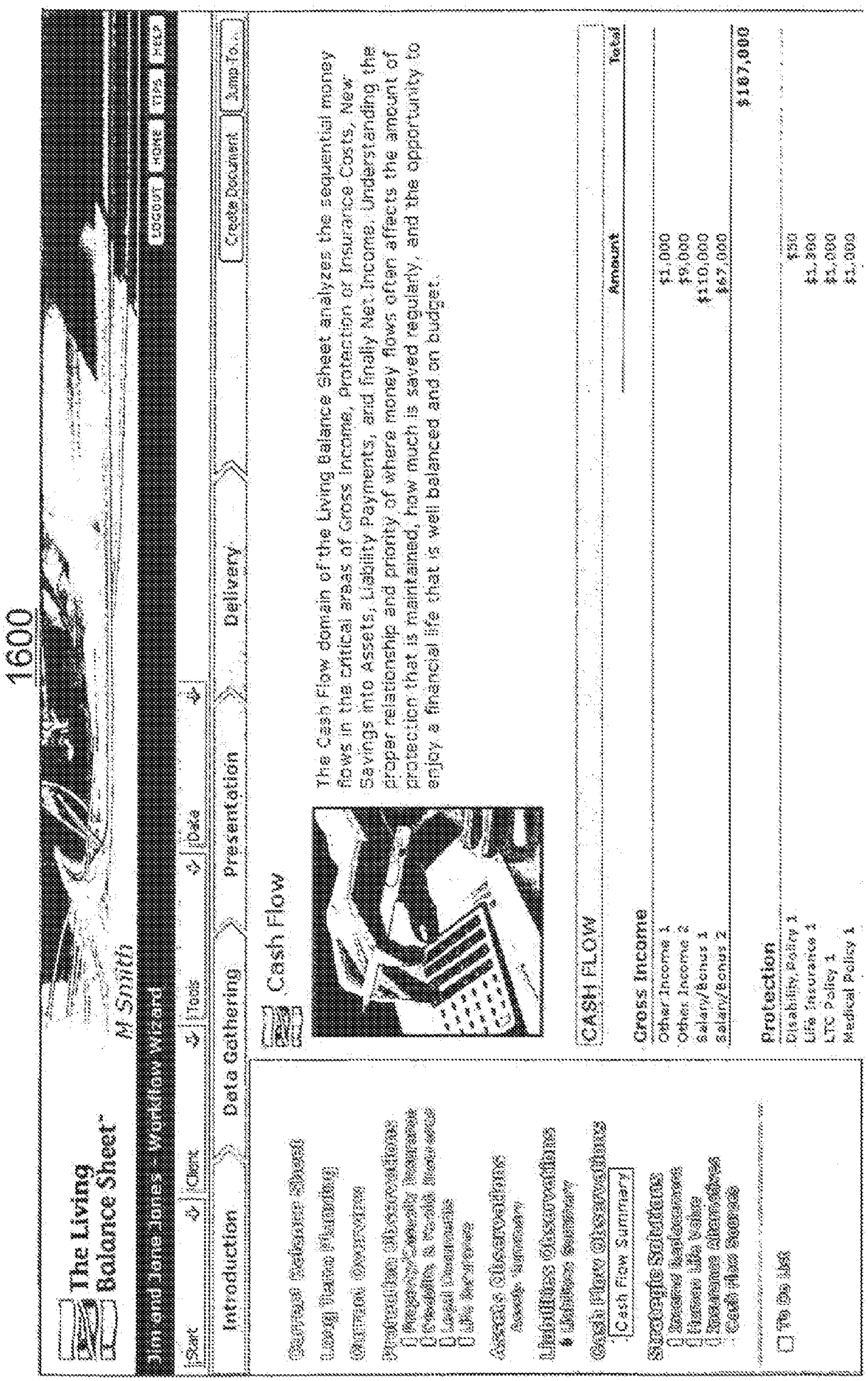
Figure 161:
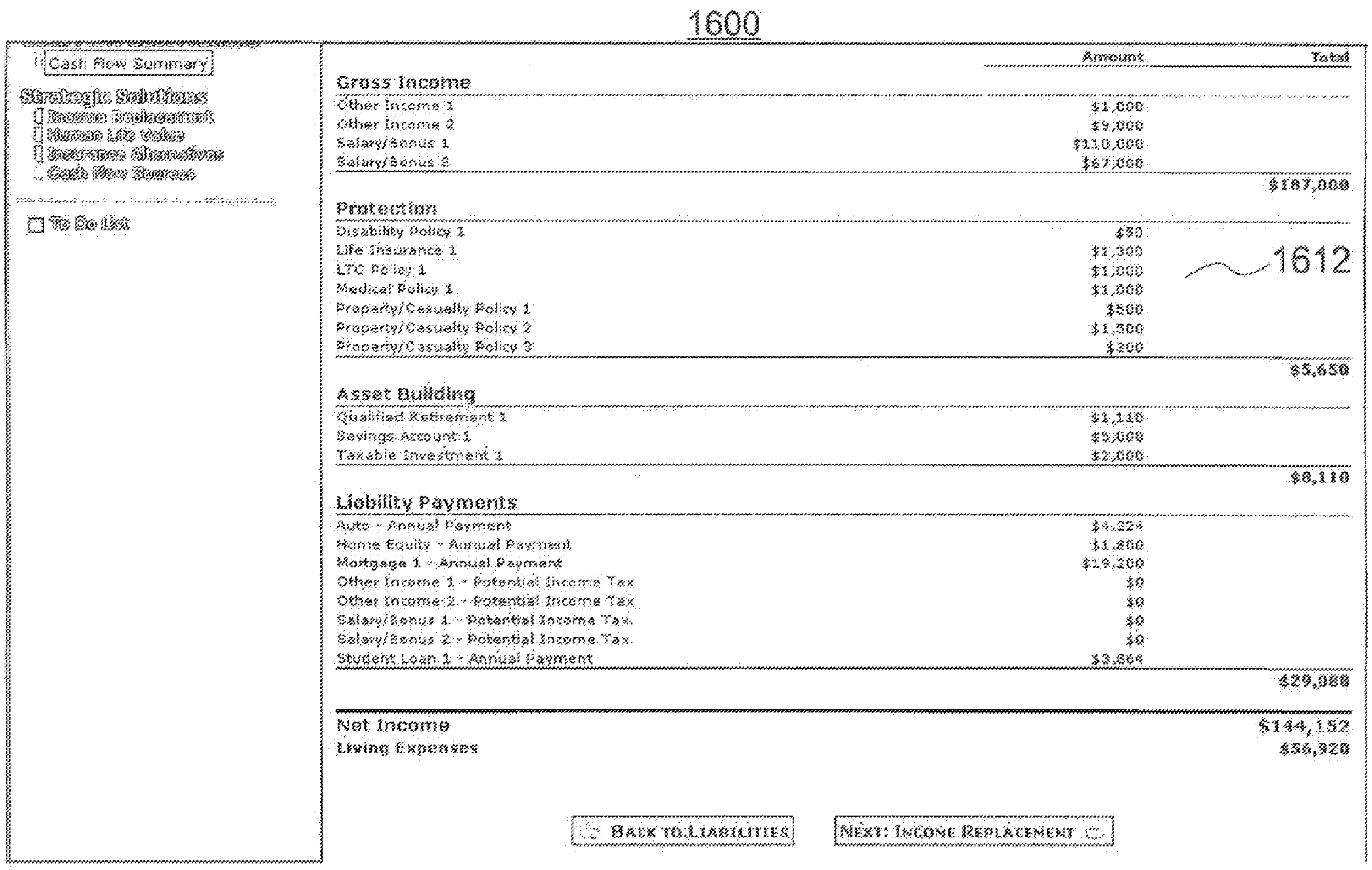

Note that the example client in FIGS. 162-166 is different than the example client of FIGS. 160-161 and other FIGS. herein.

As shown, the strategic solutions section can for example also include a human life value subsection. For example, as part of the human value subsection, human life value calculator display page 1670 can be displayed. Human life value calculator display page 1670 can be configured to display relevant financial and protection data relating to life insurance protection. The purpose of display page 1670 can be to provide a comparative analysis of a client's current financial state and the client's financial state "at death," i.e., if the client or spouse dies and therefore, must thus rely on any existing life insurance protection for their financial needs. As shown, display page 1670 includes calculator display section 1672. Calculator display section 1672 can include "current" display section 1674 that displays a table of relevant financial and protection information of the client. The information is to reflect the current state of the client with respect to life insurance protection, income producing assets, liabilities, and cash flow. The information can be automatically populated from information that was previously entered or compiled for example during the data gathering stage. The display information can be displayed in appropriate categories such as protection, income producing assets, liabilities, and cash flow. Under the protection category, the existing amount of life insurance benefit that is covered under the client's life insurance protection can be displayed. Within the income producing assets category, the current values for the client's savings, investments, retirement, and a total of such values can be displayed. Under the liabilities category, the current values for the client's short-term liabilities, current taxes, mortgages, and a total thereof can be displayed. Under the cash flow category, the total family income, protection costs, annual savings, liability costs, and the net family income, which is the result of deducting protection costs annual savings, and liability costs from the total family income, can be displayed.

Figure 168:
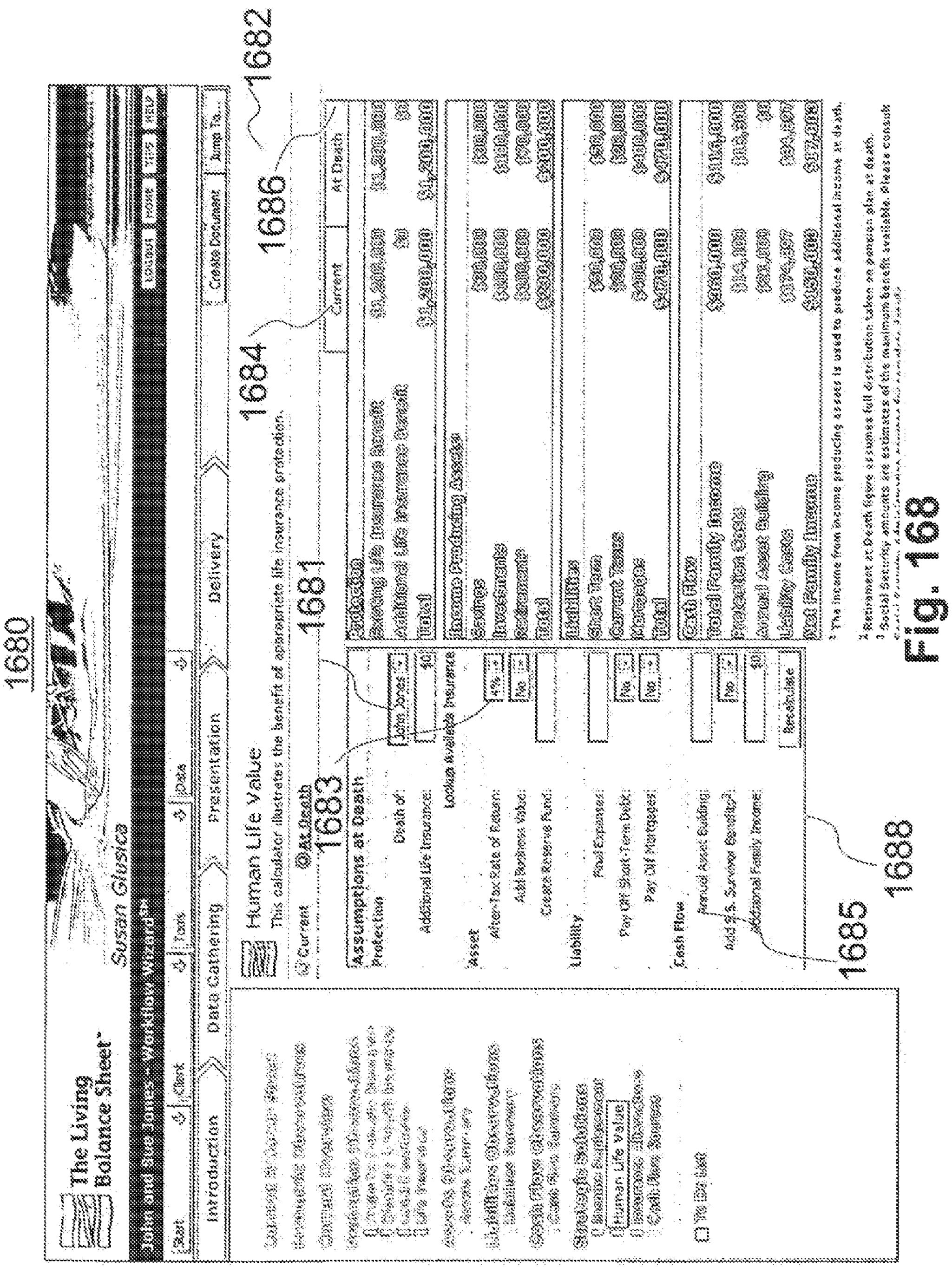

As discussed, calculator display section 1672 can display the "current" state of financial and protection information. Note that the values displayed in section 1674 preferably correspond to and were automatically populated using information that is displayed in a cash flow display page such as those shown in FIGS. 160-161 (note that FIGS. 160-161 illustrate data for a different client example). Radio buttons 1676 can be used to switch between different types of views. As shown, radio button 1676 reflects that the "current" view is displayed. If a user selects the "at death" radio button, additional information and functionality is added to display section 1672 to allow for the calculation and related analysis of the client's current financial state and the client's financial state at death. For example, with reference now to FIG. 168, calculator display section 1682 can be displayed that includes "current" display section 1684 and "at death" display section 1686. In addition, assumptions section 1688 is displayed. The newly added "at death" section 1686 is used to display a table of information that is also displayed as part of "current" display section 1684, but the values are revised to reflect the impact of the death of the client or spouse to the current financial state of the surviving family. As such, the client can visually see a detailed analysis of the likely impact of the client's current level of life insurance protection to the surviving family's financial state if the client or spouse dies. This information is also displayed in a side-by-side manner to aid comprehension and the presentation value of the information.

As shown, "at death" section 1686 is displayed to reflect the current settings in assumptions section 1688 and possible underlying facts that were gathered during the data gathering section. As such, the only numbers that are changed between "current" display section 1684 and "at death" section 1686 are the retirement, total family income, annual asset building, protection costs, liability costs, and net family income information. The retirement asset value is changed to reflect a current payout of the asset (e.g., the original asset minus income tax deductions). The value displayed for total family income in the "at death" section reflects that the loss of the employment income of the client or family member whose death is selected to be the focus of the analysis. As shown, a user can select to identify the analysis to be with respect to the client or spouse using pull-down menu 1681. The total family income at death also reflects an annual return on the life insurance benefit of $1,200,000 and on the total assets of $200,000 based on the after-tax rate of return that is specified using pull-down menu 1683. Note for example that in this case, the analysis is with respect to the client John Jones. A cash flow display page such as page 1600 of FIG. 160 (which is for another example "Jim Jones") and other data gathering and summary display pages and sections above may be used to view the specifics of the income that is attributed to John Jones (e.g., $290,000 annual salary or another combination of annual salary and other income such as $280,000 in salary and $10,000 in other income). A 4% after tax rate of return is selected for the analysis. Therefore, the annual income from the $1,200,000 life insurance benefit will be $48,000 and the annual income from the existing assets will be $8,000. The at-death income of the client's family will be reduced from $360,000 to $116,000, which is the total of the income from the life insurance, existing assets, and other pre-existing income (such as the income of the surviving spouse of $60, 000), as is displayed in "at death" section 1686. Assumptions section 1688 can also be configured to reflect that at death, the client, who at that point will be the surviving spouse or family, will seek a certain amount of annual savings 1685. As shown, this amount is set zero and is reflected in the "annual savings" line item of "at death" section 1686. The liability costs is also reduced to reflect that lack of income taxes that were attributed to the "deceased" client's current income. With this information, the client can now see that the impact of the client's (or spouse's) death on the current financial situation of the client's family will be such that the net family income will drop from $151,103 to $32,103, which is a significant change.

Note also that the display reflects a difference that exists between the "current" and "at death" protection costs. Specifically, a $1,200 difference is reflected between the two numbers. This number reflects that the client will no longer need to pay certain protection costs that were associated with the deceased spouse such as any life insurance premiums. For example, this information is automatically calculated based on protection information that was previously entered and compiled such as the protection information in the protection section of cash flow display page 1600 of FIG. 160. Thus, the software has the intelligence to automatically perform calculations in section 1682 that reflect the various aspects in which the client's death affects the surviving family's financial picture (e.g., protection costs for health insurance for the deceased can be automatically identified and eliminated from the protection costs "at death"). Therefore, data that is entered or calculated within the Workflow Wizard® can be automatically applied in other aspects of the wizard.

Figure 169:
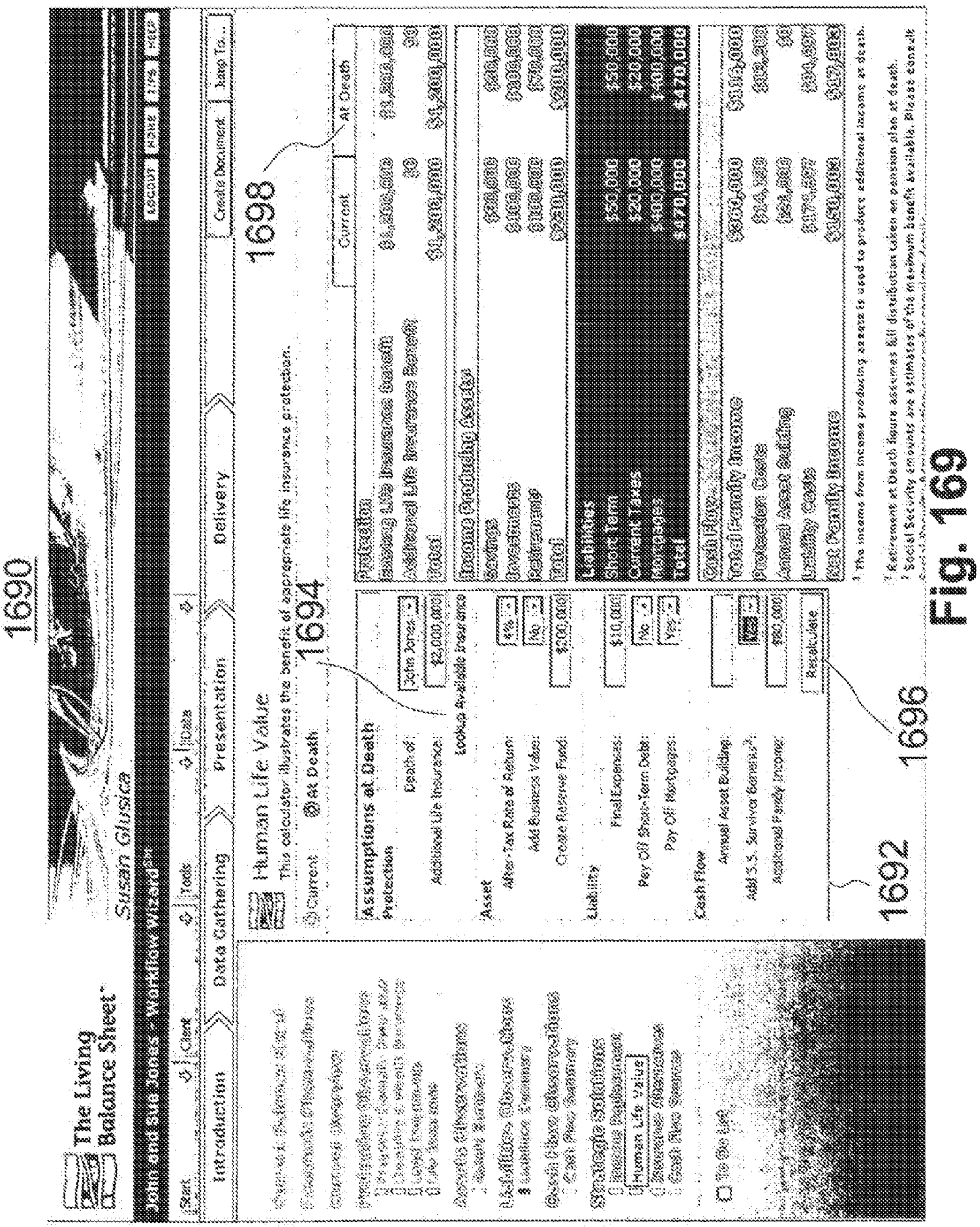
Figure 170:
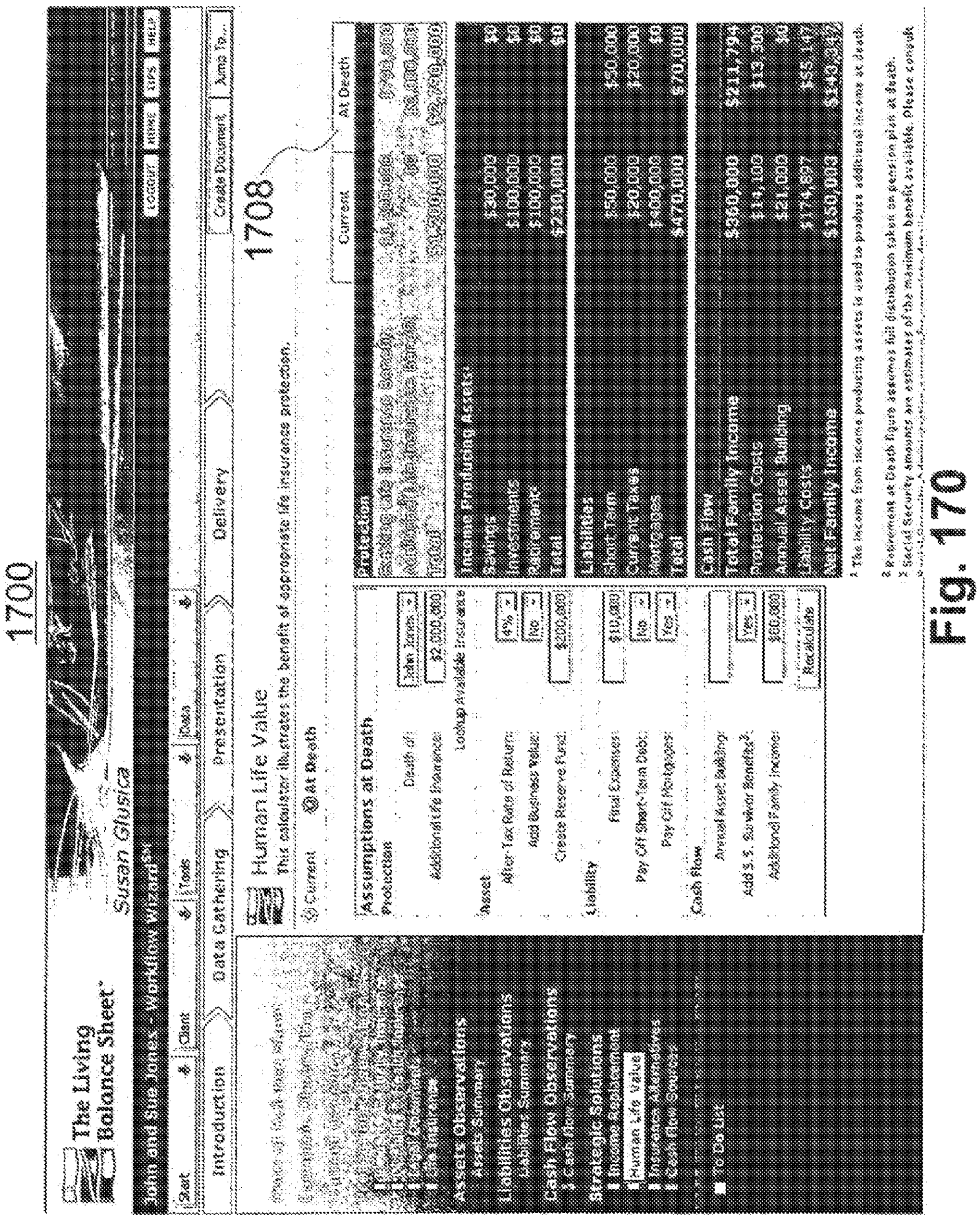

Now with reference to FIG. 169, the user may also interact with other features of assumptions section 1692 to further illustrate the "at death" state of the client's financial condition. For example, the user may enter a value such as $2,000, 000 in the additional life insurance option of assumptions section 1692. If desired, lookup available insurance option 1694 can be displayed near the additional life insurance option to allow the user to lookup additional coverage that may be available for the client (e.g., based on an automated evaluation or using lookup tables). The user may also be provided with options for entering values corresponding to creating a reserve fund and specifying final expenses (e.g., associated with funeral or other services) that would be incurred at the time of the death. For example, as shown, the user enters $200,000 to indicate that analysis should include the creation of a $200,000 reserve fund. The user is also shown to have entered $10,000 to indicate that the analysis should include final expenses of $10,000. The option to specify additional family income, which for example, may have not been accounted for during the data gathering stage, can also be included as shown. As shown, the user has also entered $80,000 to indicate that the analysis should include the inclusion of additional family income of $50,000. A user may have also selected the option to pay off mortgages and an after-tax rate of return of 4%.

After entering such information, the user can select recalculate button 1696. Until such time as recalculate button 1696 is selected, "at death" section 1698 may remain unchanged in response to the user interactions with assumptions section 1692. Once button 1696 is selected, "at death" section 1698 is updated based on the new information in assumptions section 1692. For example, human life value calculator display page 1700 can be displayed when the user selects recalculate button 1696 of FIG. 169. As shown, "at death" section 1708 now reflects that the client protection includes $2,000,000 of additional life insurance. The existing life insurance value of $790,000 reflects the creation of a reserve fund, the pay off of mortgages, and the payment of final expenses. The value also reflects that the savings and assets, which totaled $200,000, were first used as a resource for paying for the reserve fund, mortgages, and final expenses and to the extent that the assets were insufficient, the life insurance benefit was used to complete those payments. In response, the values for savings, investments, and mortgages have been updated to reflect a value of zero. In addition, liability costs have been updated in the "at death" section to no longer include annual mortgage or home equity loan payments that totaled $29,750, which amounts would be reflected in the cash flow figures. The total family income and in turn, the net family income reflects a 4% rate of return on the total remaining life insurance benefit of $2,790,000 and it also reflects the loss of the deceased's employment income and any other income that would be lost due to the client death. As a result, the surviving family will have approximately the same total family income but will have a lower net income due to the reduction in protection and liability costs. The income may also reflect that the user selected the option to add social security survivor benefits to the analysis, which can be automatically determined and included in the total family income. As such, the total of $211,794 reflects $111,600 of income from the life insurance benefit (at 4%), preexisting income of $60,000, additional income of $80,000 (selected in assumptions section), and $20,134 of social security benefit. Other options can include the option to pay off short-term debts, to add business value to the analysis, which would drag in information that was saved with respect to the client's business interest into the analysis such as to include the value of the business as an asset in the income producing assets section of display.

Figure 171:
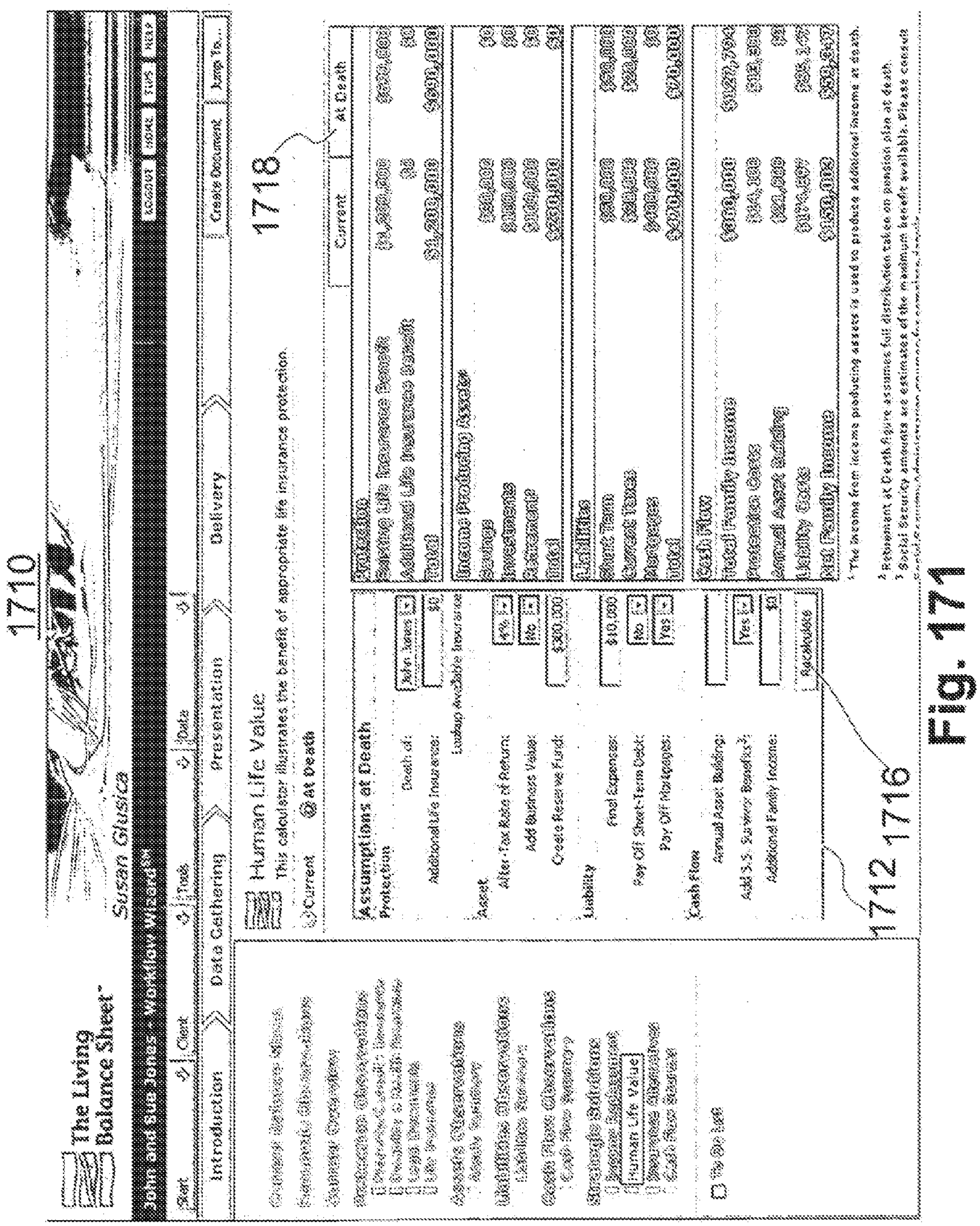

FIG. 171 provides another example of a human life value display page. In FIG. 171, the state of "at death" section 1718 reflects the state of that section after a user has made or entered selections in assumptions section 1712 and selected recalculate button 1716. Therefore, "at death" section 1718 is consistent with the current settings shown in assumptions section 1712. FIG. 171 shows that the user has selected to pay off short-term debts and mortgages, to create a reserve fund, and to pay final expenses of a specified amount. As a result, the "at death" life insurance benefit is reduced to $690,000. As a result of paying off the liabilities, the net income for the surviving family is approximately $100,000 less than the net family income as it currently stands. Therefore, the example can be used to illustrate to a client that the client's existing life insurance policy of $1,200,000 may not be sufficient if the client wants to pay off mortgages and to create a reserve fund.

As shown, assumptions section 1712 can be configured into sections that correspond to the sections of "at death" section 1718, e.g., protection, assets, liability, and cash flow. As shown, the sections (e.g., "current," "at death," and/or assumptions at death) can be displayed adjacent to each other with corresponding sections generally aligned for ease of understanding.

In addition, a color scheme matching the previously mentioned color scheme such that protections, assets, liabilities, and cash flow sections are colored to match the colors that were used for those categories in other sections of the application.

Calculations in support of the information displayed in the human life value calculator display page and the income replacement calculator display page can be performed locally at the user's computer, remotely at a server that supports the displayed page, or in combination thereof. For example, user selected options or user entered data can be sent to a server when a user presses the recalculate button. The data and/or options can be received by a server which performs the necessary calculations and transmits the results and any related information back for display on the user's computer.

Note also that typically the analysis with respect to life insurance or disability insurance is particularly applicable at a family level. Therefore, in the appropriate context, the term client may also be referring to the client's family or surviving family.

Figure 172:
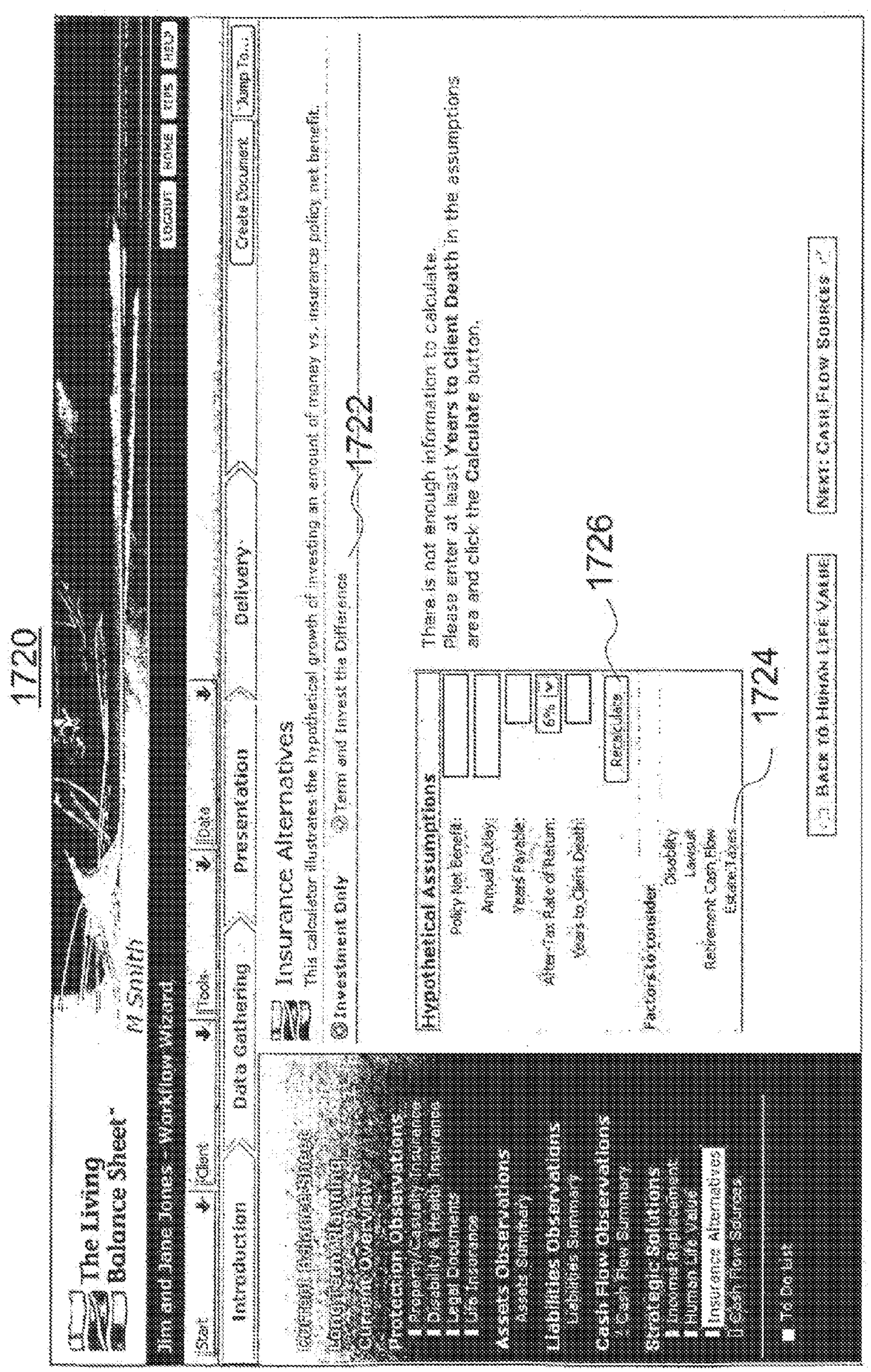
Figure 173:
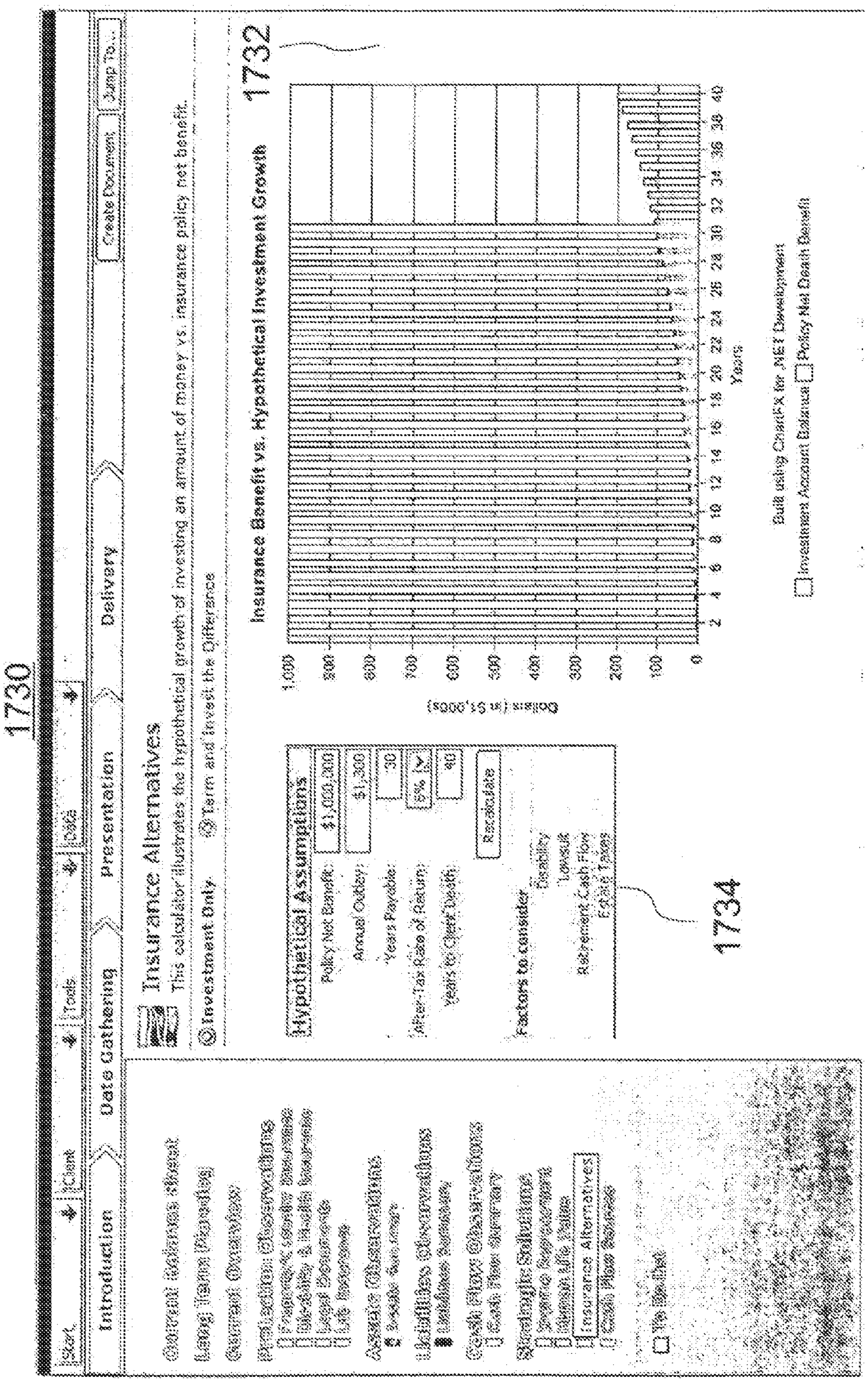
Figure 174:
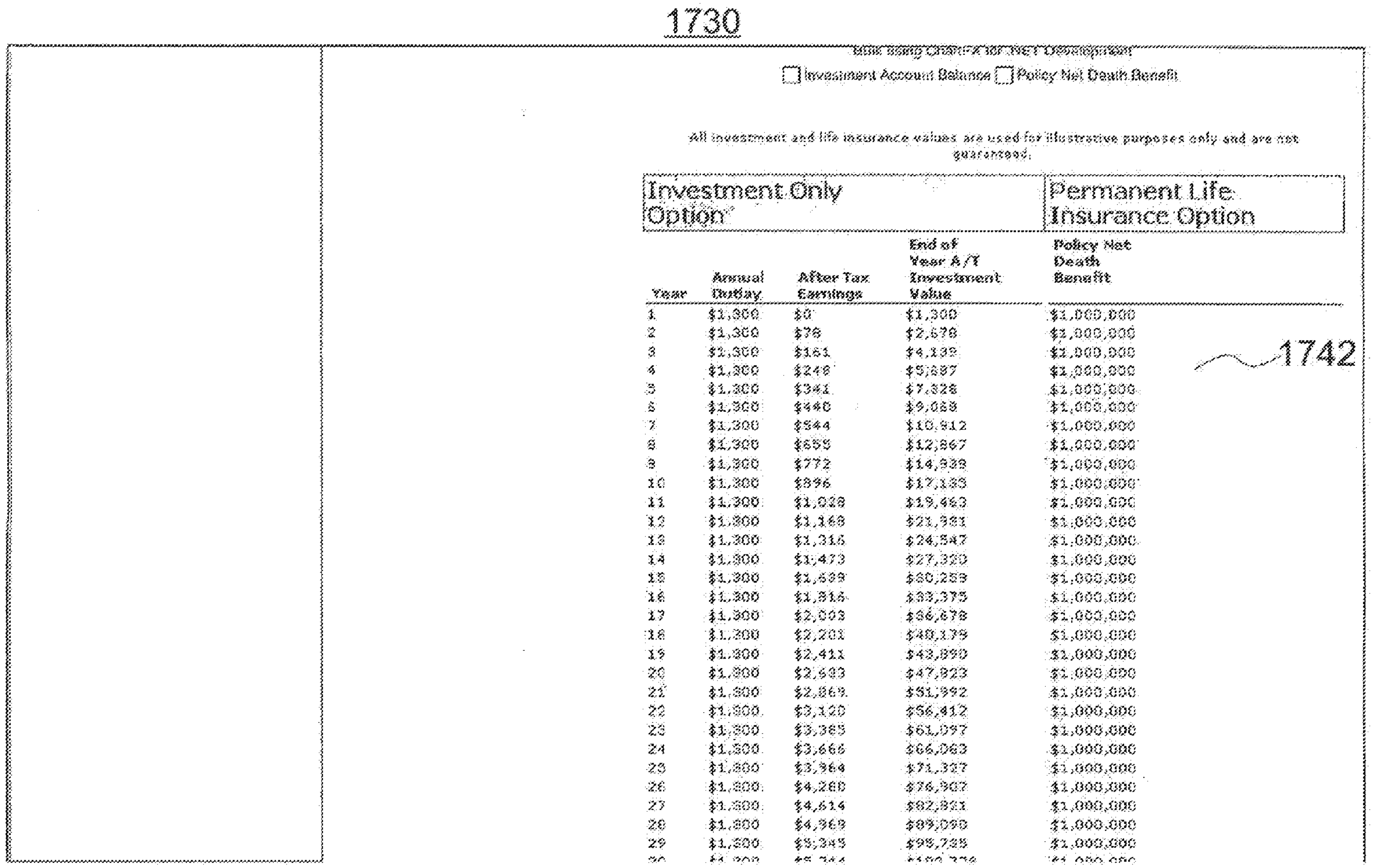
Figure 176:
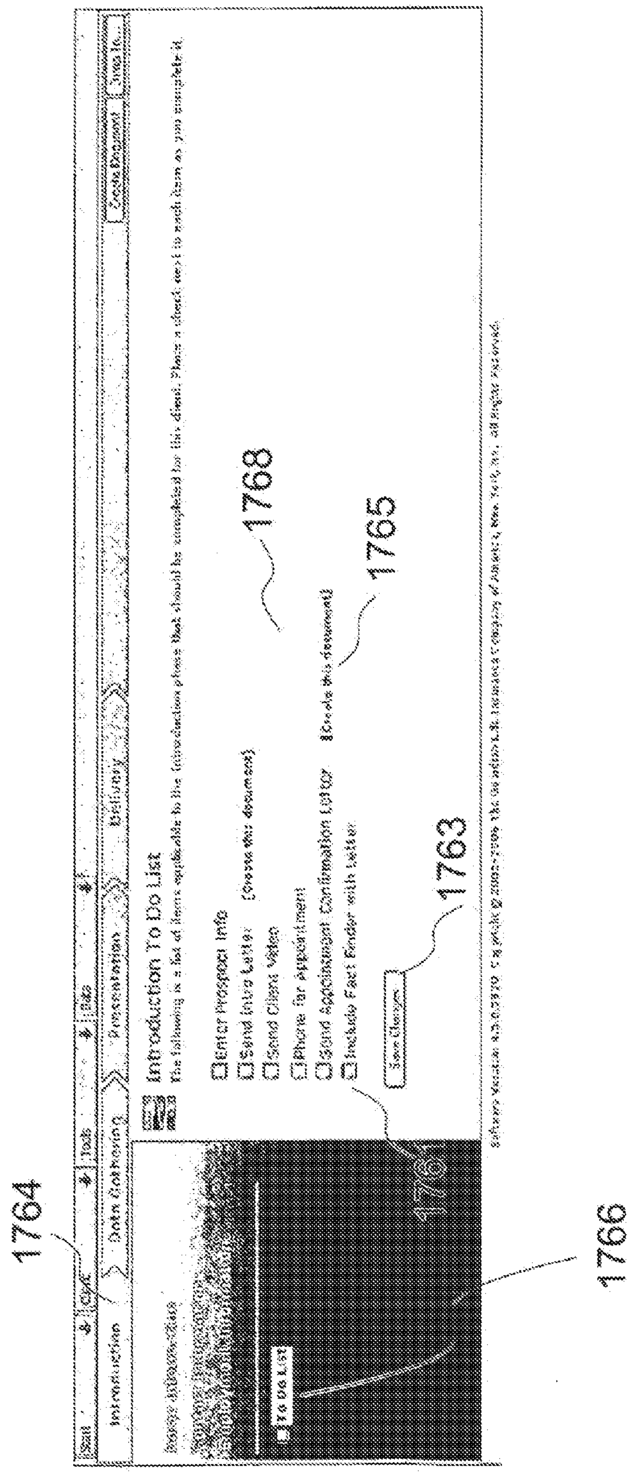

The next section can be an insurance alternatives section that can be used to compare personal savings versus life insurance. For example, a user can select the next button from a human life value calculator display page to proceed to an insurance alternatives display page such as insurance alternatives display page 1720 of FIG. 172. Display page 1720 can include radio buttons 1722 and assumptions section 1724. Assumptions section 1724 can be displayed to provide the user with the opportunity to enter relevant parameters such as the face amount of the insurance, annual outlay for savings, the after tax rate of return on the savings, and the number of years to client's death. By entering such parameters and selecting calculate button 1726, insurance alternatives display page 1730 of FIG. 173 can be displayed. Insurance alternatives display page 1730, as shown, includes graph 1732, which illustrates a comparison between insurance benefits and investment growth based on the parameters that the user entered in assumptions sections 1734. Graph 1732 shows the growth of the annual investment at the selected after tax rate in comparison to the benefit of permanent life insurance. Display page 1730 can include supporting data such as table 1742 of FIGS. 174-175 that shows numerical information with respect to the year-by-year comparison of savings (i.e., "investment only") versus life insurance. To vary the analysis, a user can change the parameters of assumptions section 1724 and select recalculate button 1726 to generate a new graph and supporting table. A user can also select radio buttons 1722 to toggle to a view of display page 1720 that illustrates a comparison between "term and invest the difference" versus permanent life. The "term and invest the difference" view can also include an assumption section for selecting relevant parameters and can also include a graph and table that illustrate a comparison between purchasing term life insurance and investing the difference between purchasing permanent life insurance and the term life insurance versus purchasing permanent life insurance.

Figure 177:
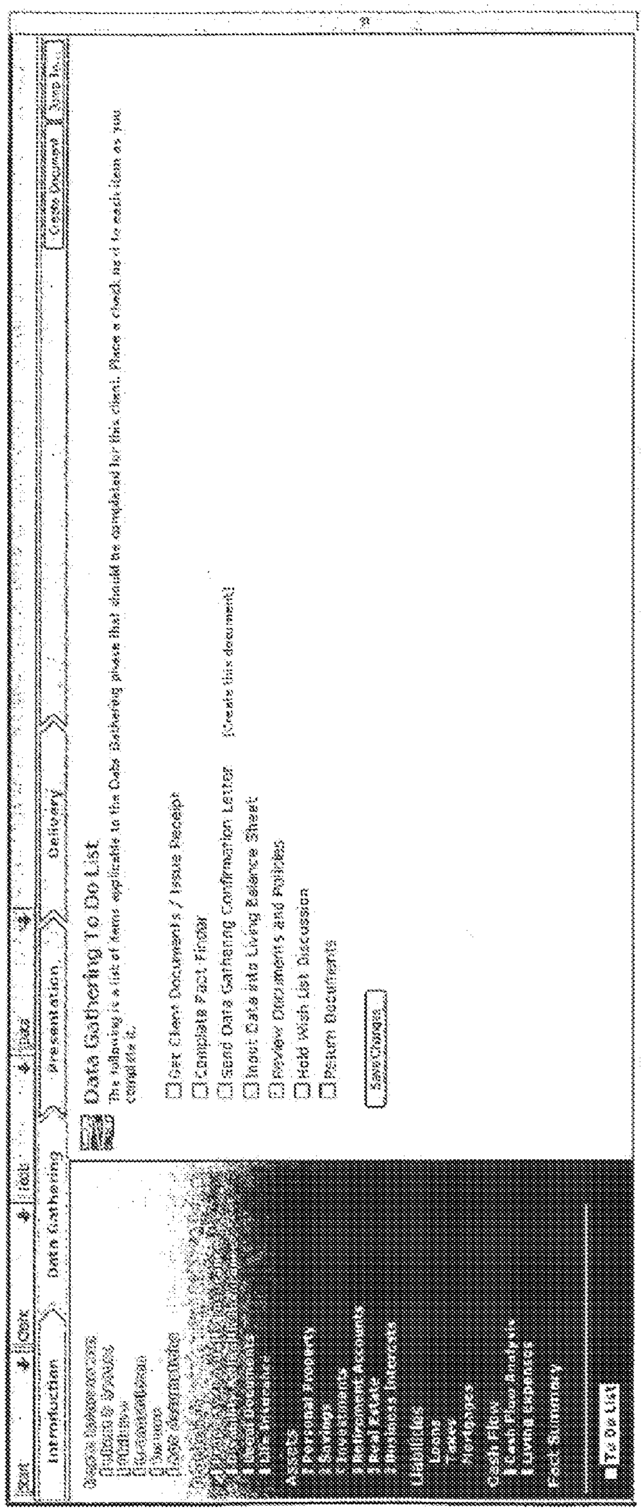
Figure 178:
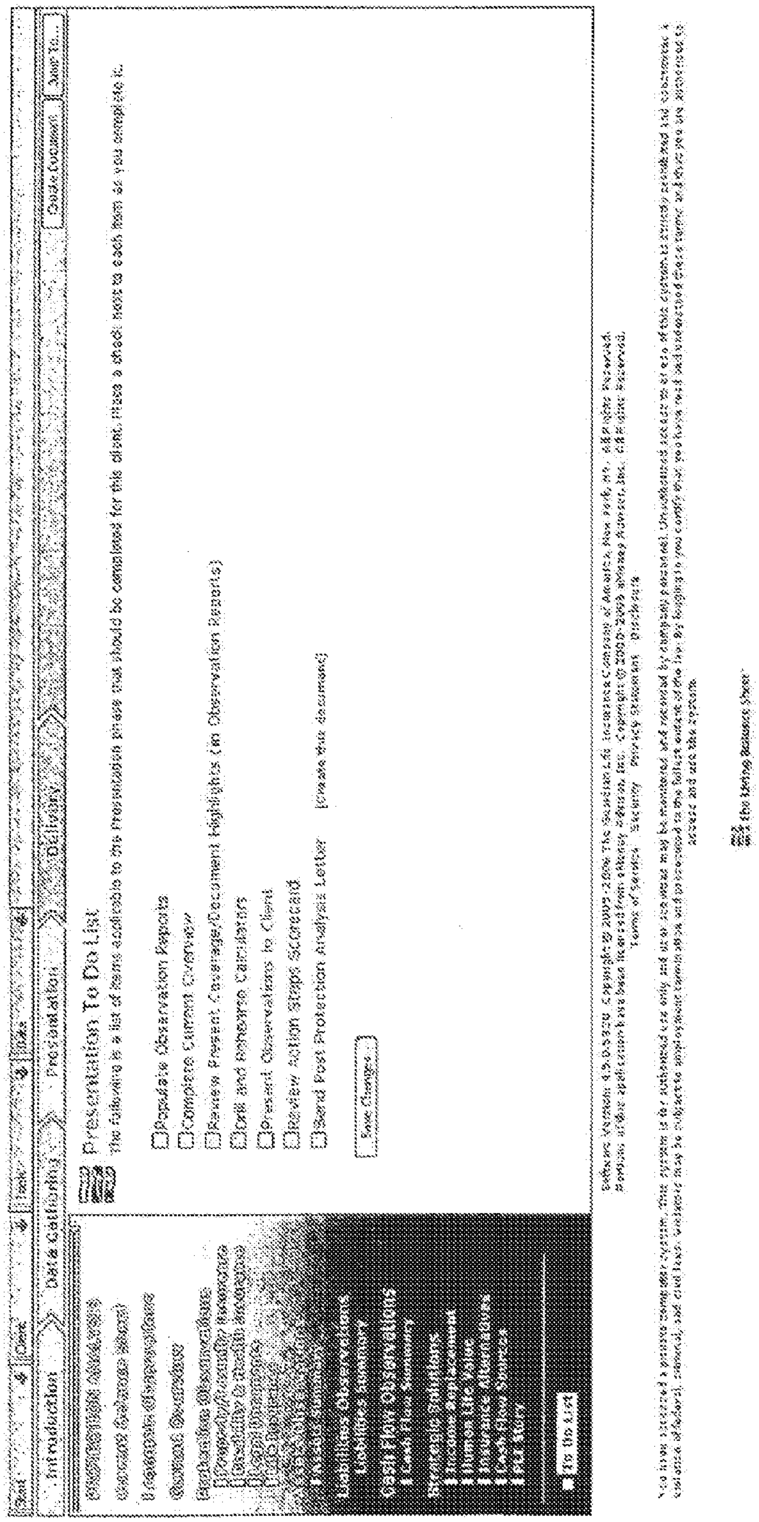
Figure 179:
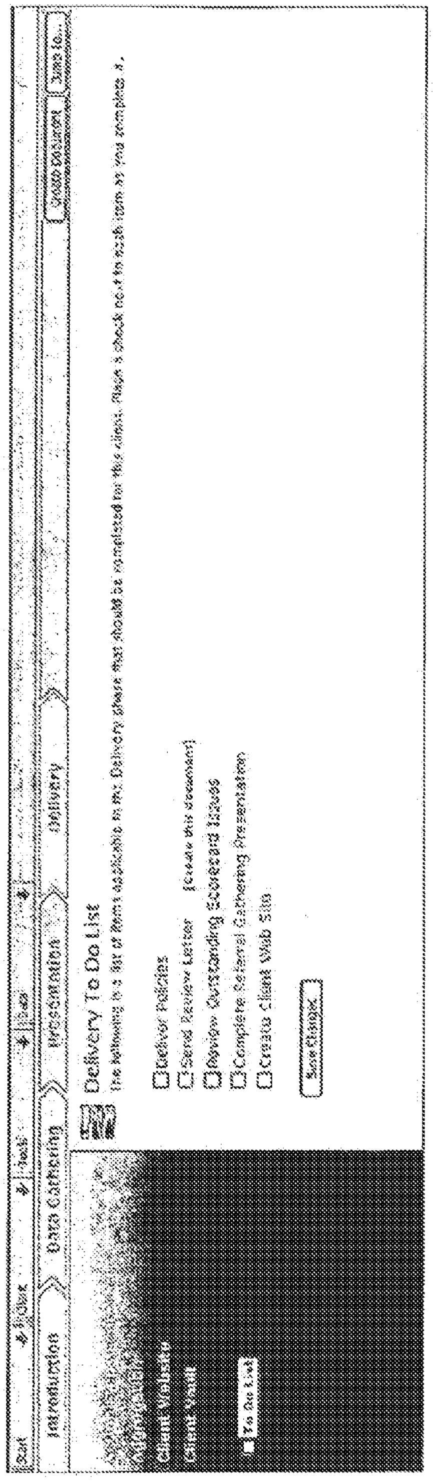

FIGS. 176-179 illustrate a "to do" feature, which also implements a form of client progress tracking. A to do list can be implemented to be used for each client so as to specify action items for the user for completion for each client. The to do list feature can have the functionality of allowing a user to indicate when an item is completed and to store that information such that when the user returns to work with that client at a later date, the user can review the to do list to identify where the user left off with that client. The to do list can be divided into categories to match the major stages, section, or subsections of the Workflow Wizard®. For example, display page 1762 can be displayed to provide a "to do" feature. Display page 1762 can be displayed in response to the user selecting to-do list option 1766 from a display page in the introduction stage of the Workflow Wizard® as is reflected by indicator 1764. Display page 1762 includes introduction to do list 1768, which comprises action items for the user that correspond to the introduction stage of the Workflow Wizard®. The user can interact with list 1768 to memorialize the completion of action items and to assess remaining action items. By checking a corresponding box 1761 and selecting save changes button 1763, the user can save the information that the selected action item (the checked item) on the list has been completed so that the check will remain in that box when the user returns to the to do list at a later time. List 1768 can include quick links such as link 1765 for automatically aiding the user in completing the tasks such as by automatically generating a letter identified in list 1768. The to do feature, thus provides a convenient central tool for client tracking. Other graphical indicators such as a progress bar or other forms of visual progress indicators can also be incorporated. FIG. 177 shows data gathering to do list 1772, which has the same functionality as list 1768 of FIG. 176, but is specific to the data gathering stage of the Workflow Wizard®. Therefore, progress in different stages of the wizard can be tracked separately. FIG. 178 shows presentation to do list 1782, which has the same functionality as list 1768 of FIG. 176, but is specific to the presentation stage of the Workflow Wizard®. FIG. 179 shows delivery to do list 1782, which has the same functionality as list 1768 of FIG. 176, but is specific to the delivery stage of the Workflow Wizard®.

Figure 180:
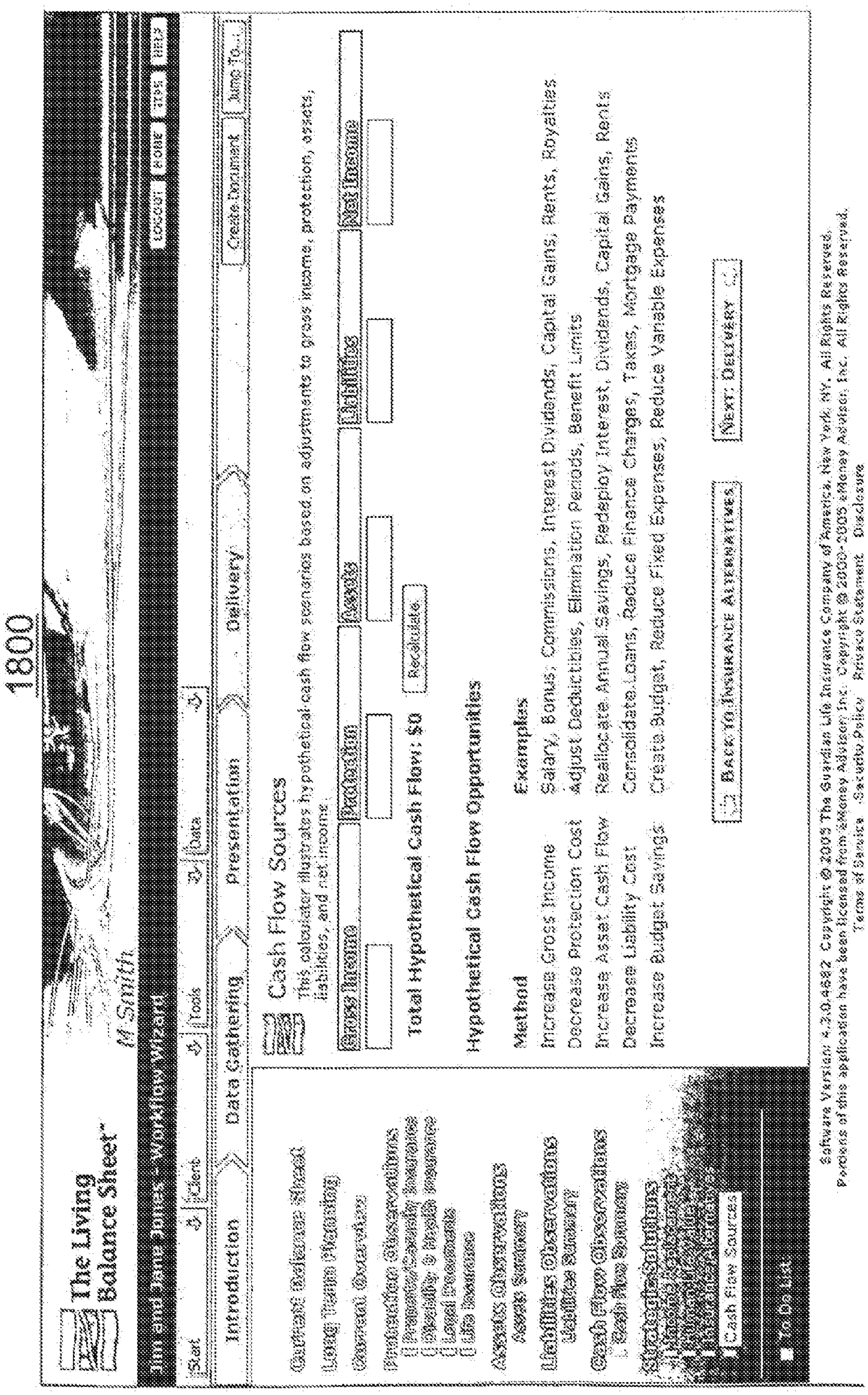
Figure 181:
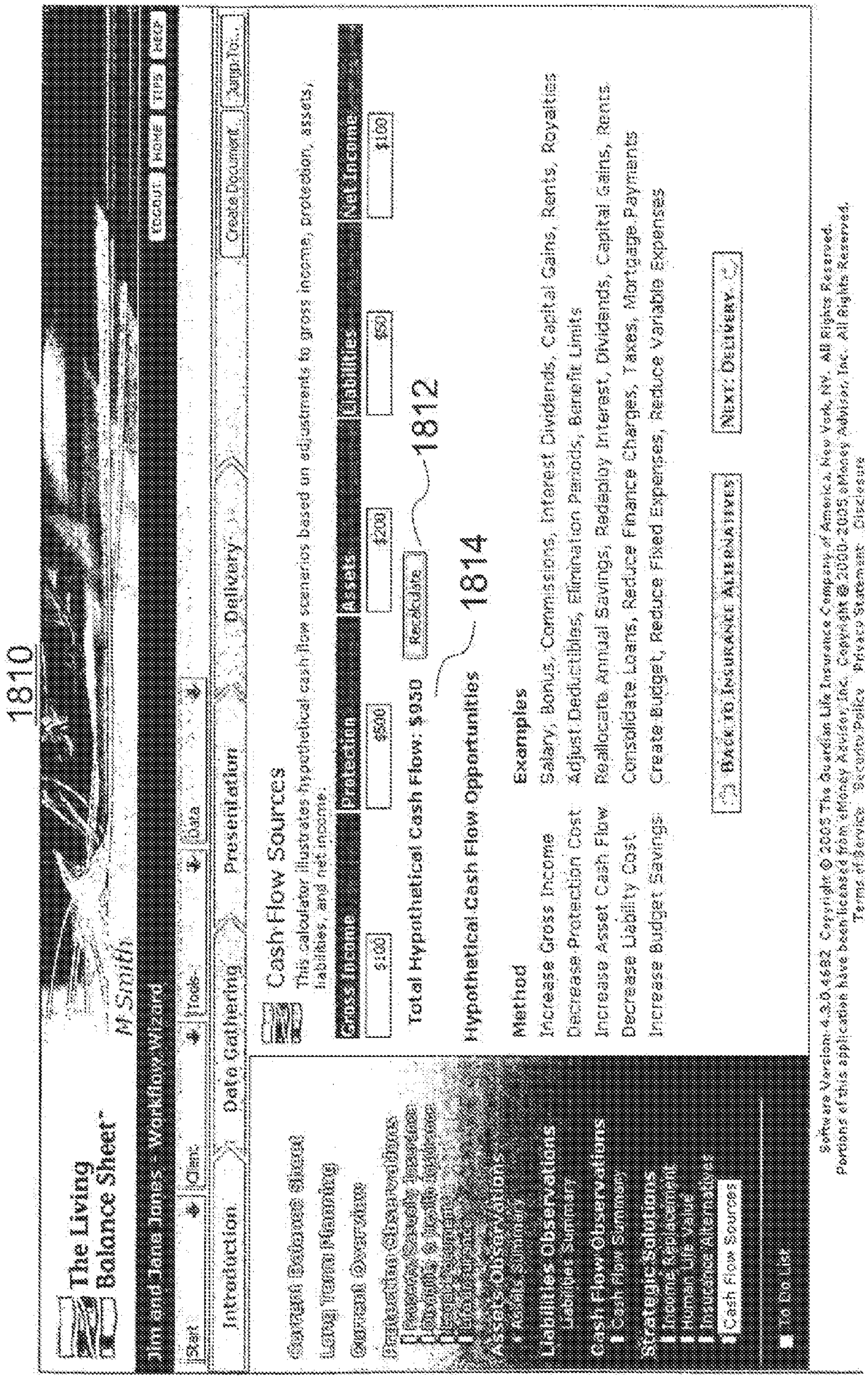

The next section as shown may be directed to identifying possible cash flow for use in purchasing need protection. For example, cash flow sources display page 1800 of FIG. 180 can be displayed. Cash flow sources display page 1800 can be configured such that it provides specific areas of cash flow that the user can use for noting possible sources of cash flow for purchasing improved protection in areas that were identified to be inadequately protected (e.g., identified by the user, such as an insurance agent, during the various applicable sections of the Workflow Wizard®). The user may have reviewed the client financial information and may have identified certain methods by which cash flow can be identified without changing the client's current financial state. Cash flow sources display page 1800 provide the user with boxes for different cash flow categories in which the user can note the cash flow resources that the user has identified. For example, as shown in FIG. 181, cash flow sources display page 1810 shows certain dollar figures that the user was able to identify under the gross income, protection, assets, liabilities, and net income categories of the client information. Recalculate button 1812 can be used to generate a total for the different categories, which is displayed as hypothetical cash flow 1814.

Figure 182:
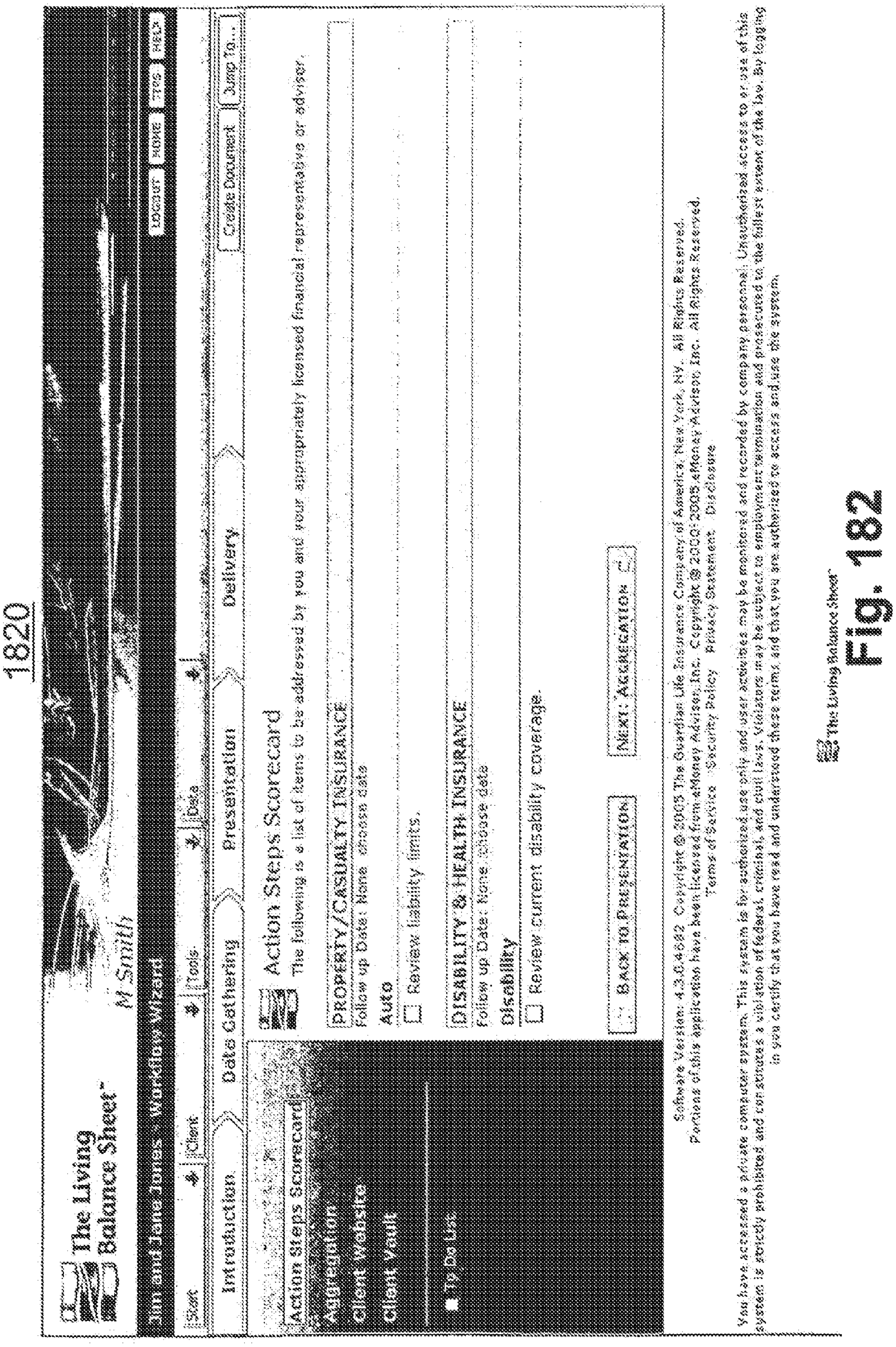

The next section as shown may be the first section of the delivery stage of the Workflow Wizard®. As shown, the next section can be an action steps scorecard that provides a summary of the action steps that were selected during the presentation stage such as during the protection observations section. For example, action steps scorecard display page 1820 of FIG. 182 can be displayed, which contains a summary of all of the action steps that the user selected in the Workflow Wizard®. In the given examples, action steps were only provided for selection during the protection observations section and the steps selected in that section are now again reflected in display page 1820. Display page 1820 can be divided by categories that correspond to the subsections of the protection observation section to indicate the applicability and relevance of each action step. Thus, this feature provides for an end summary of the action steps in the various relevant categories.

Figure 183:
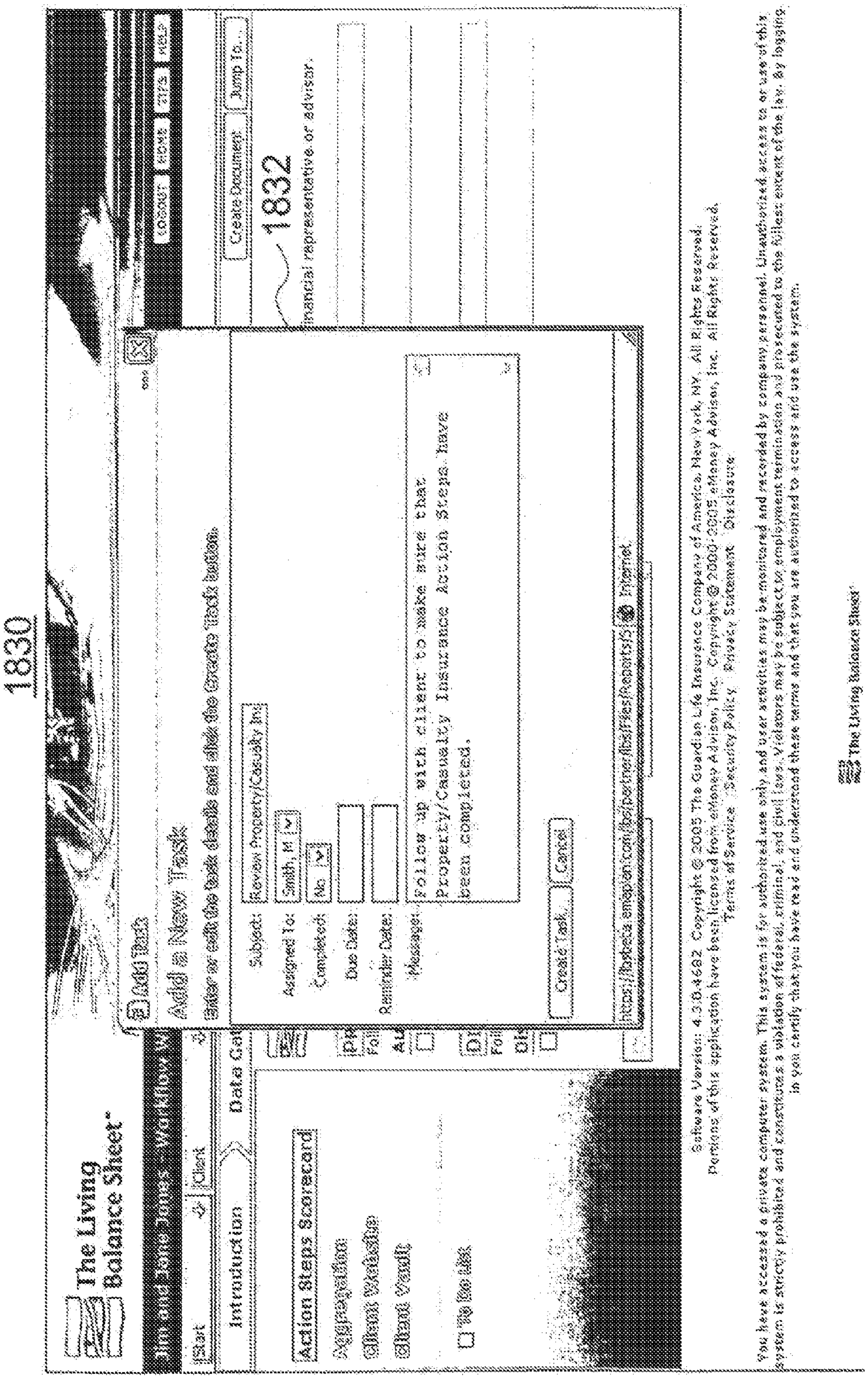
Figure 184:
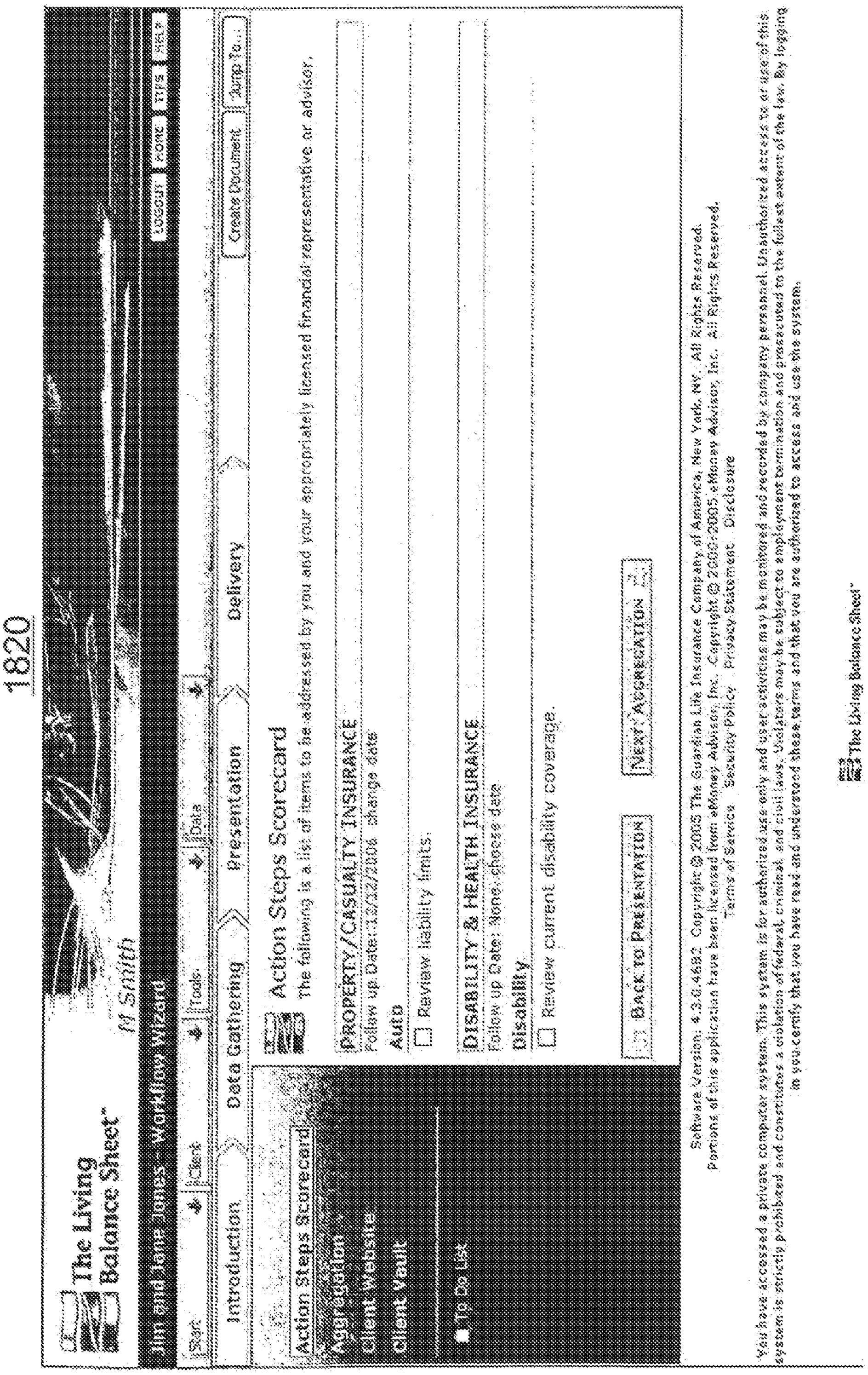
Figure 185:
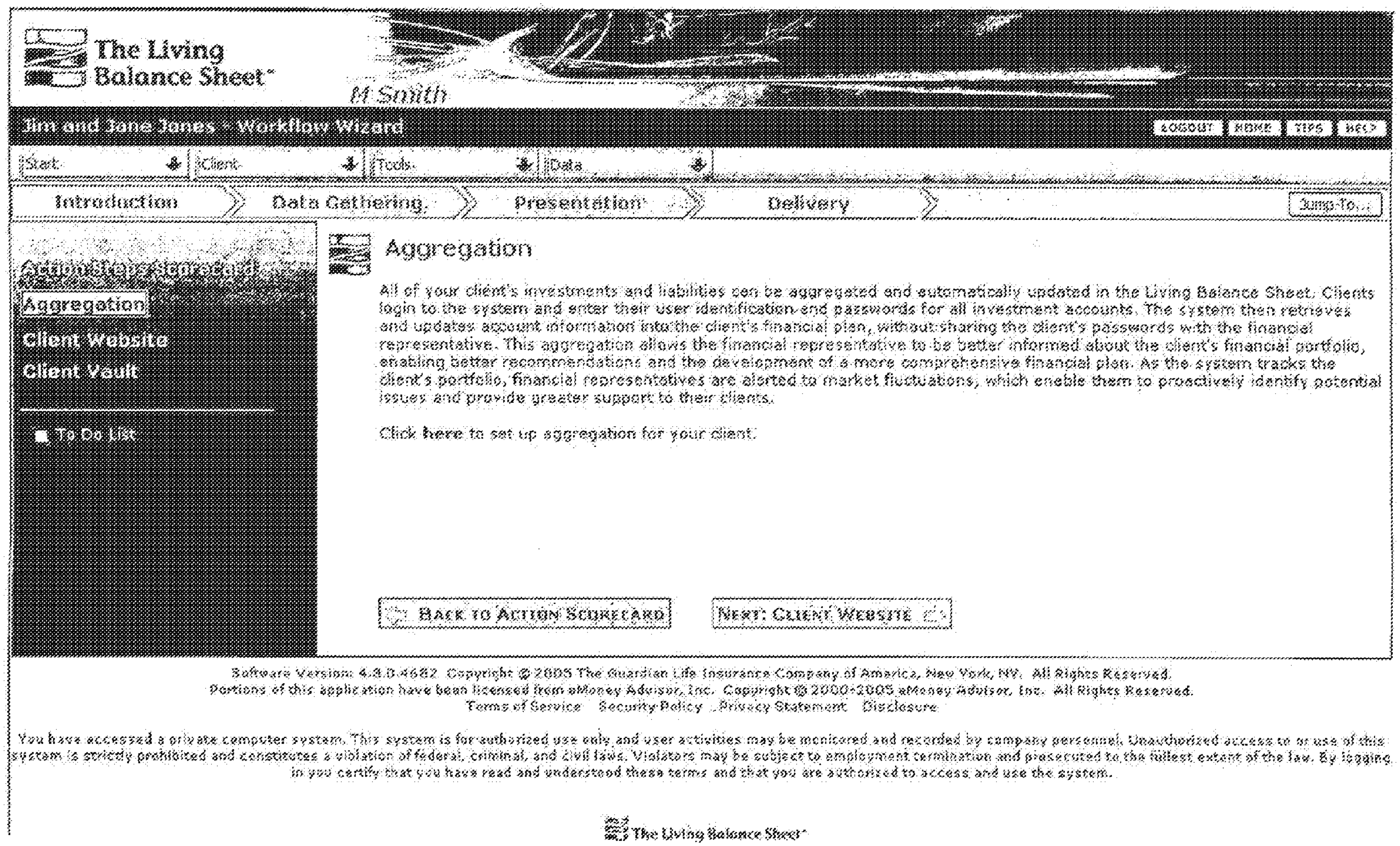

FIG. 183 illustrates that an add or edit task window can be displayed when a user selects an action step from display page 1820. Window 1832 can be used to further refine or specify the listed tasks such as by specifying a due date, a reminder date, assigned to, etc. Such parameters can be automatically operated to present the user with reminders, notices, calendars, task summaries, etc. If desired, display page 1820 can be used to generate new custom configured tasks by the user. When a user edits and saves the information in window 1832, the relevant information is updated in display page 1820 as is illustratively shown in FIG. 184.

The next sections can be used to implement client-side features and functionality for the client. For example, aggregation display page 1850 can be displayed for configuring or enabling aggregation for the client. Aggregation display page 1850 and related pages can be displayed to implement an aggregation service in which client information such as the current status of bank accounts, investment accounts, credit cards, frequent flier miles, or other client information can be collected periodically and aggregated for the client's viewing. In addition, the information can be used to update and change the financial information of the client in the application such that the information is automatically updated for the various aspects of the Workflow Wizard®. Thus, the pertinence and meaning of the various display pages that are described herein can vary as underlying information is updated using the aggregation service. Note that the user may not necessarily need to return to the Workflow Wizard® every time the user wants to, for example, view or update client information. The user can access the various display pages while outside of the Workflow Wizard®, but for example, the sequencing of the Workflow Wizard® may be excluded from such accessing technique. The aggregation service can involve a user providing the identity of a relevant institution and relevant login IDs and passwords, which can be automatically used to generate data updates. Such services are known to those of ordinary skill in the art.

Figure 186:
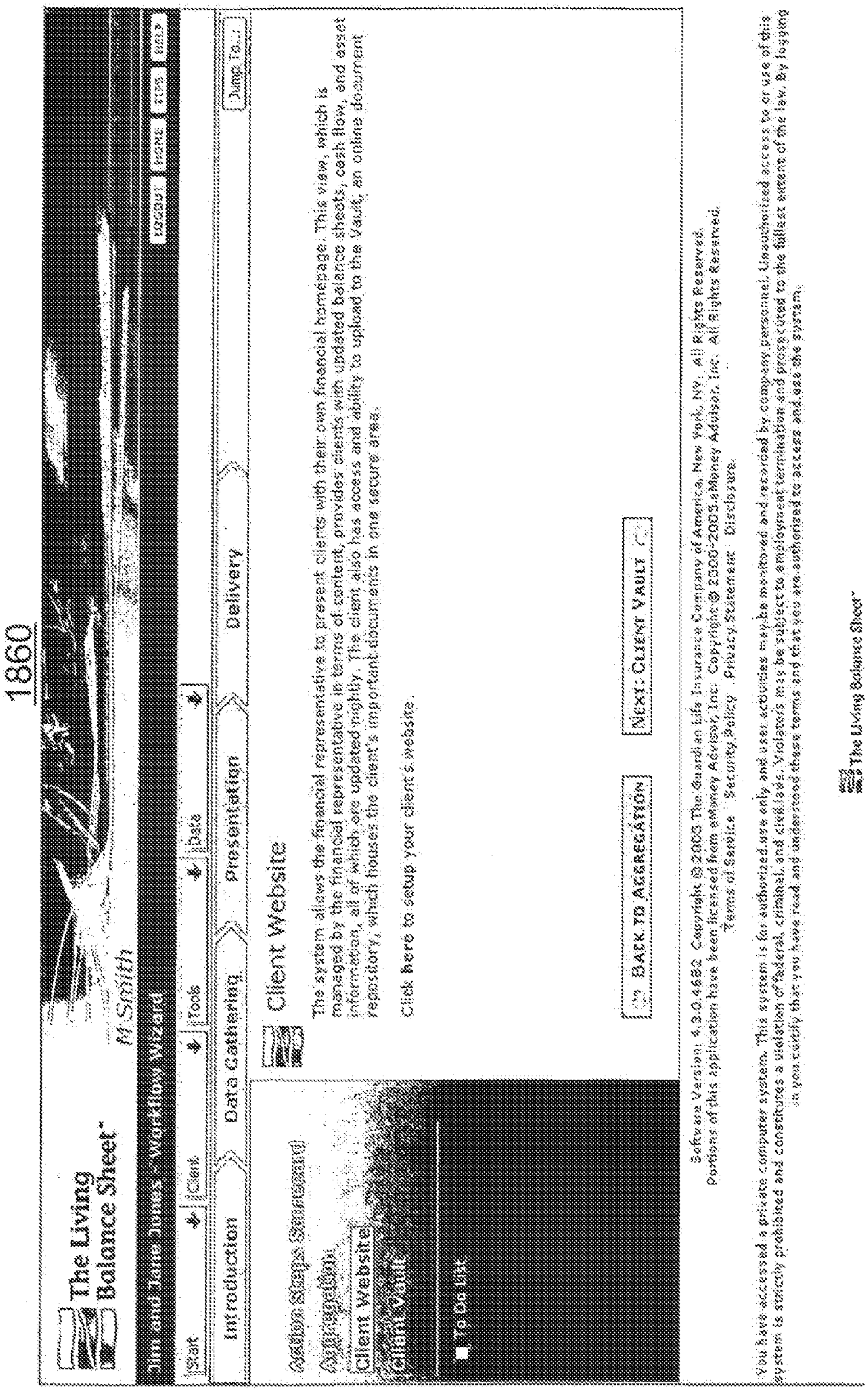

Client website display page 1860 of FIG. 186 and supporting pages can be used to establish a client website for the client. The client website can provide the user with the information from the aggregation feature and display certain "client" display pages. Examples of such client display pages are provided below. Preferably, clients are not provided access to the display pages and tools that are available to the users (e.g., the insurance professional). However, if desired, in some embodiments, such "professional" display pages can be configured to be for use by clients (e.g., publicly accessible). To setup the client website, the user may be required to specify a user name and password for the client. The user may also be given access to status information with respect to client usage.

Figure 187:
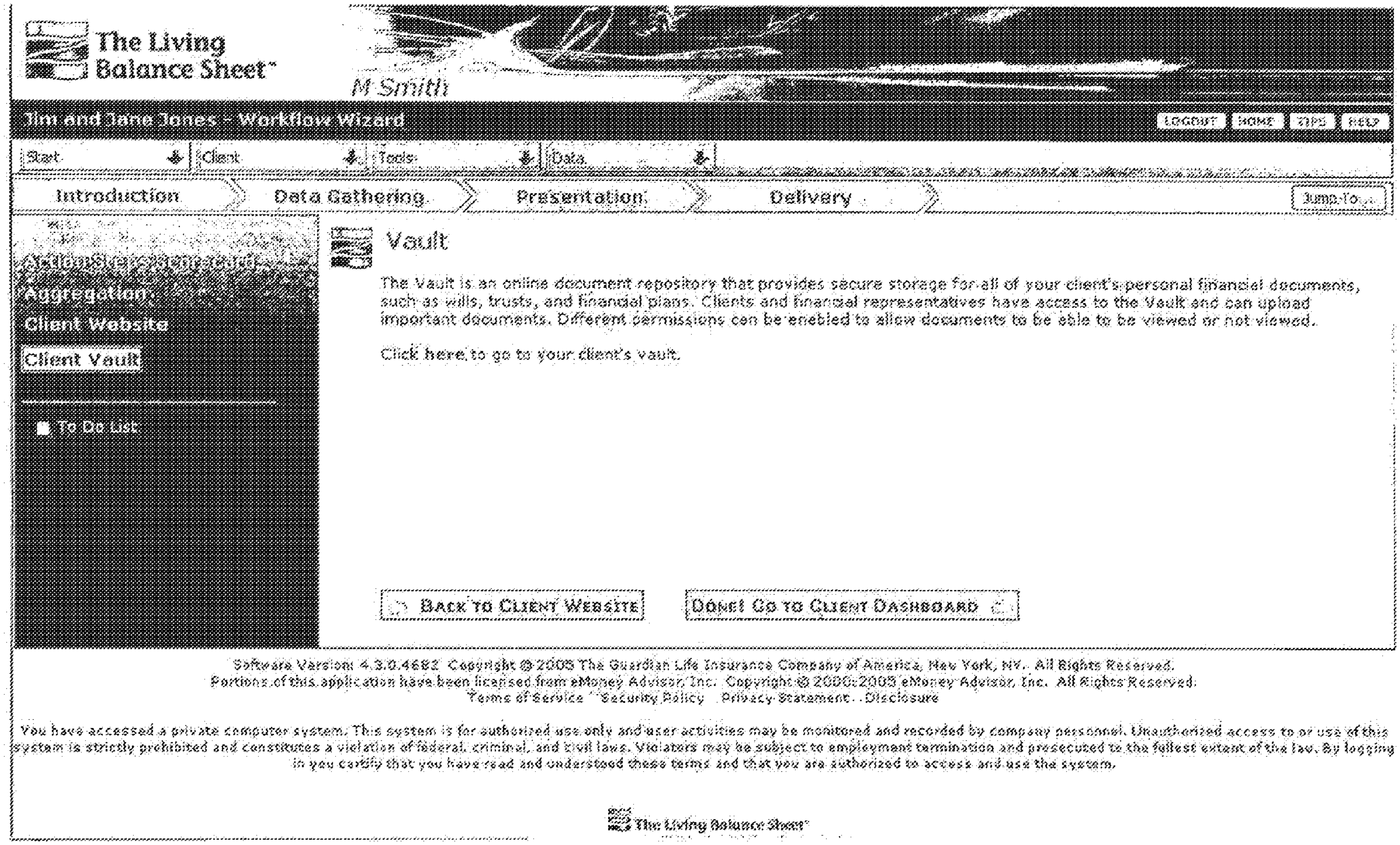
Figure 188:
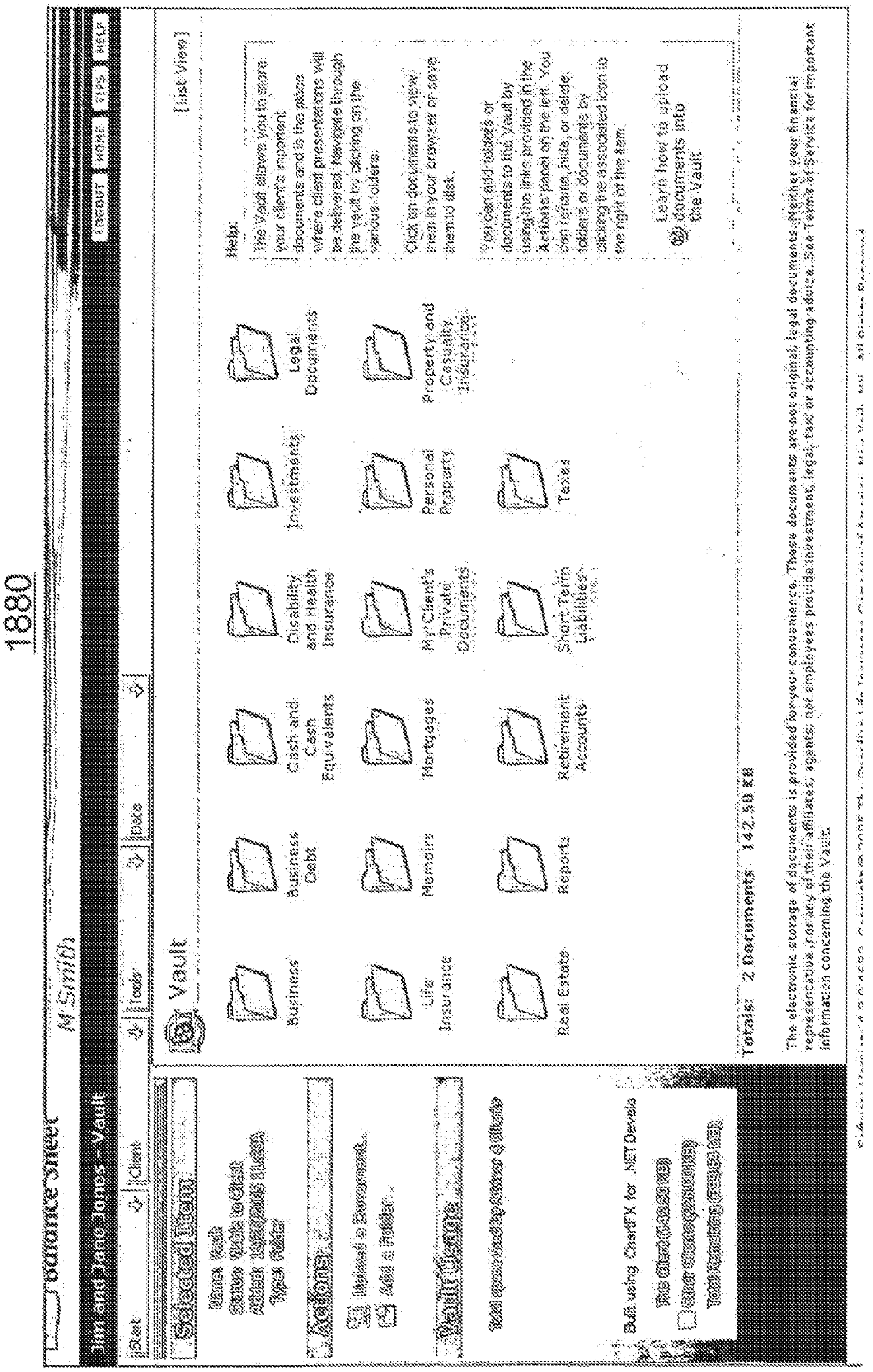

Vault website display page 1870 of FIG. 187 and supporting pages can be used to establish a document vault for the client. Once established, the user may be able to view vault display page 1880 of FIG. 188 which shows a top level view of the vault comprising folders by categories and usage statistics.

Figure 189:
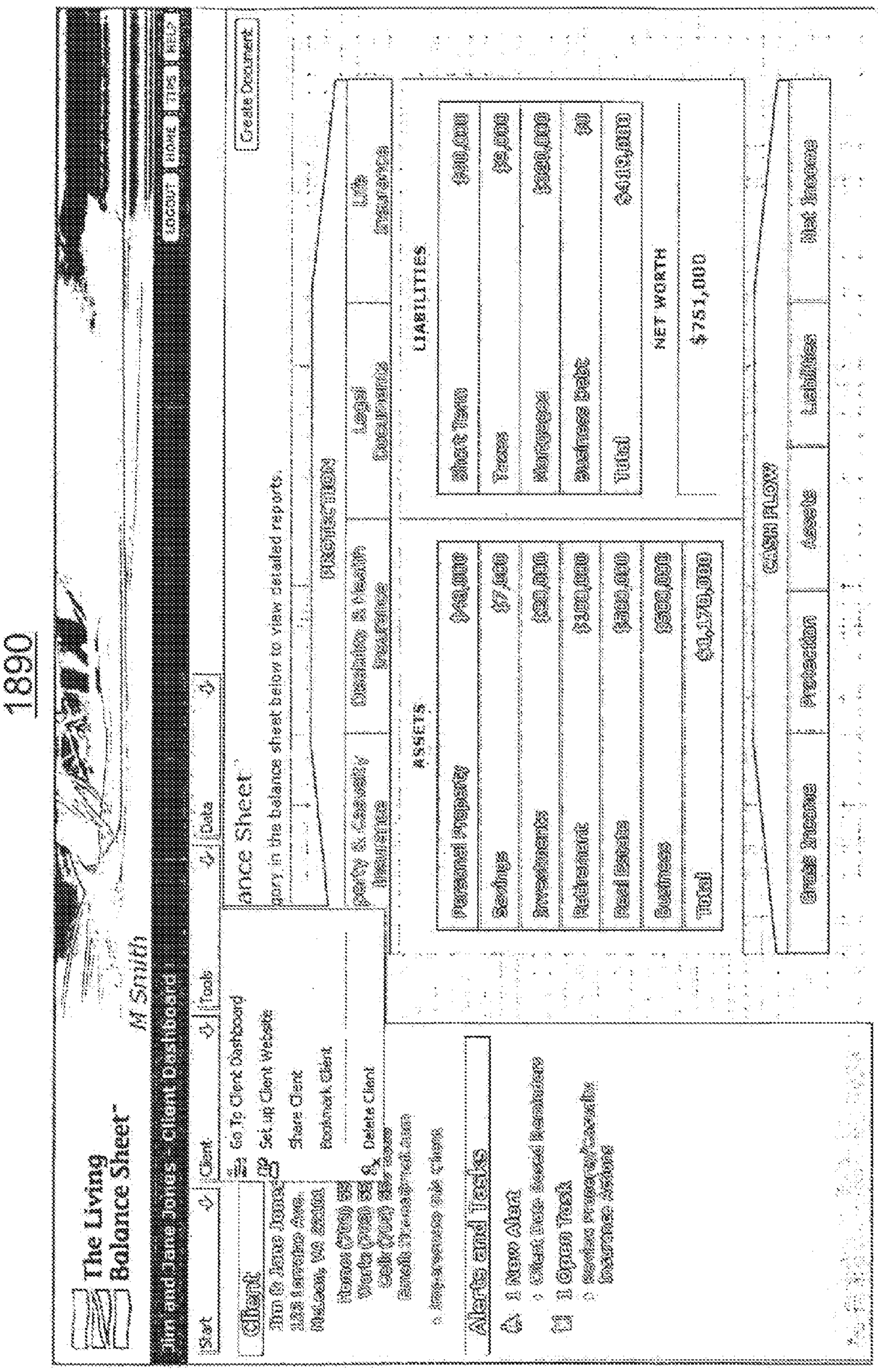
Figure 190:
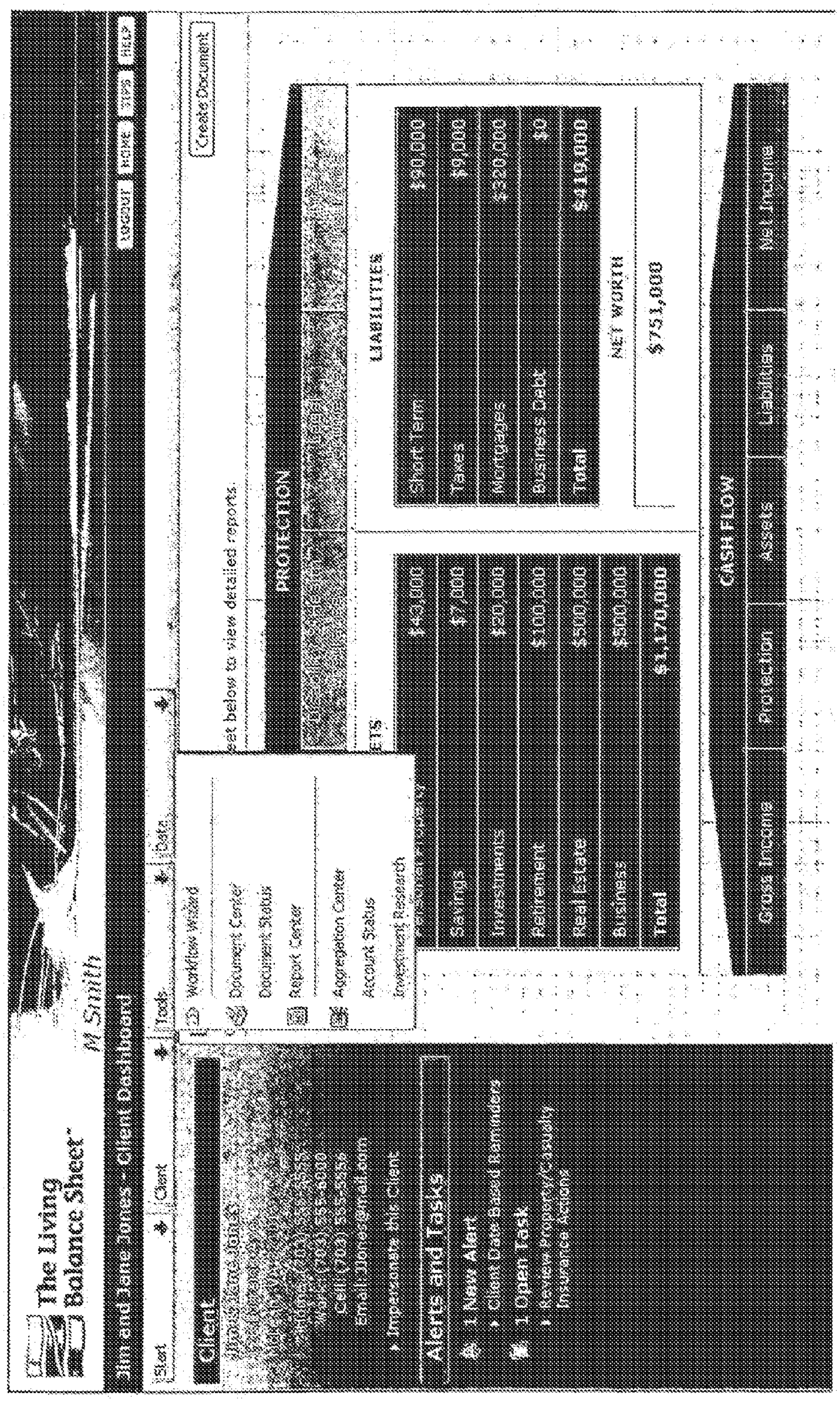
Figure 191:
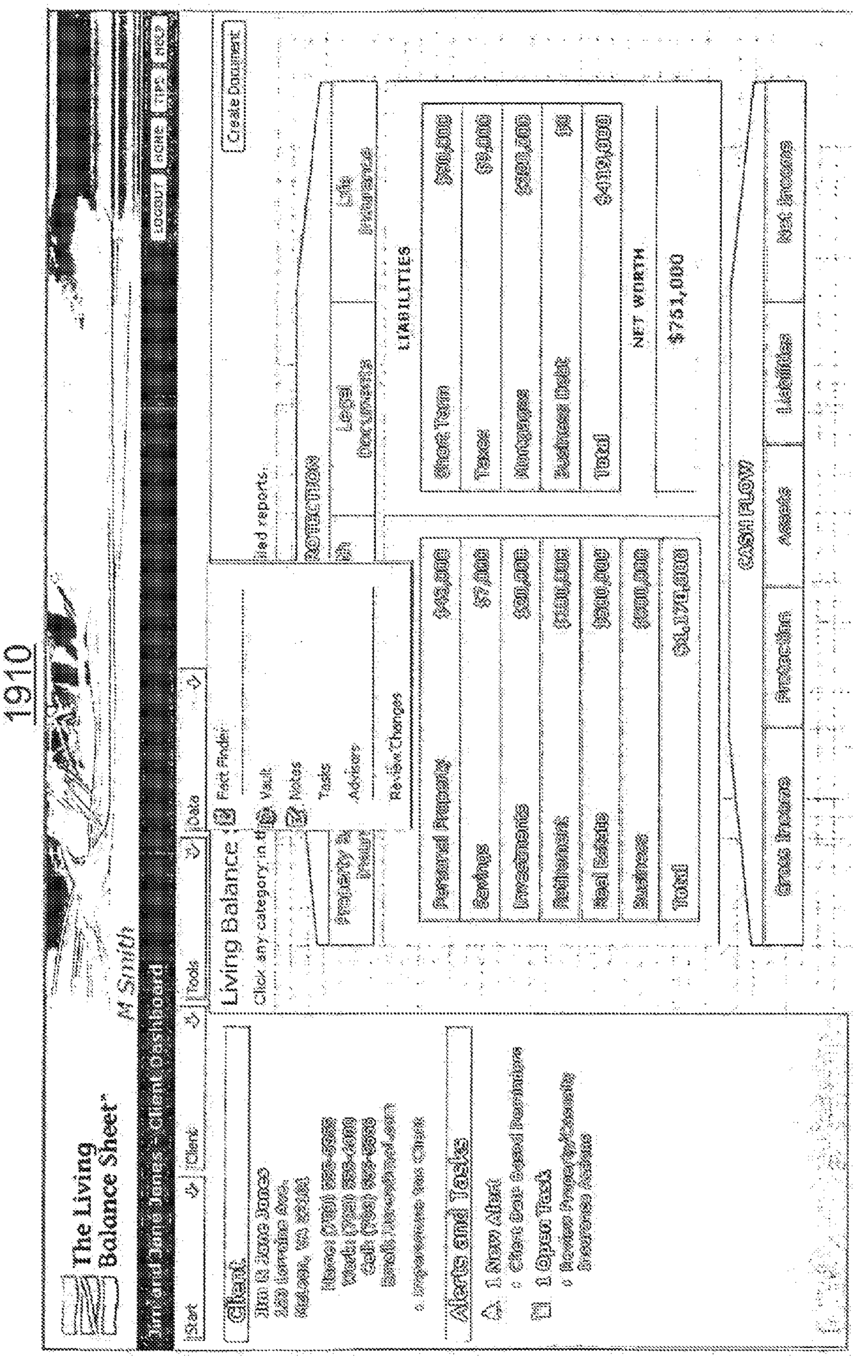
Figure 192:
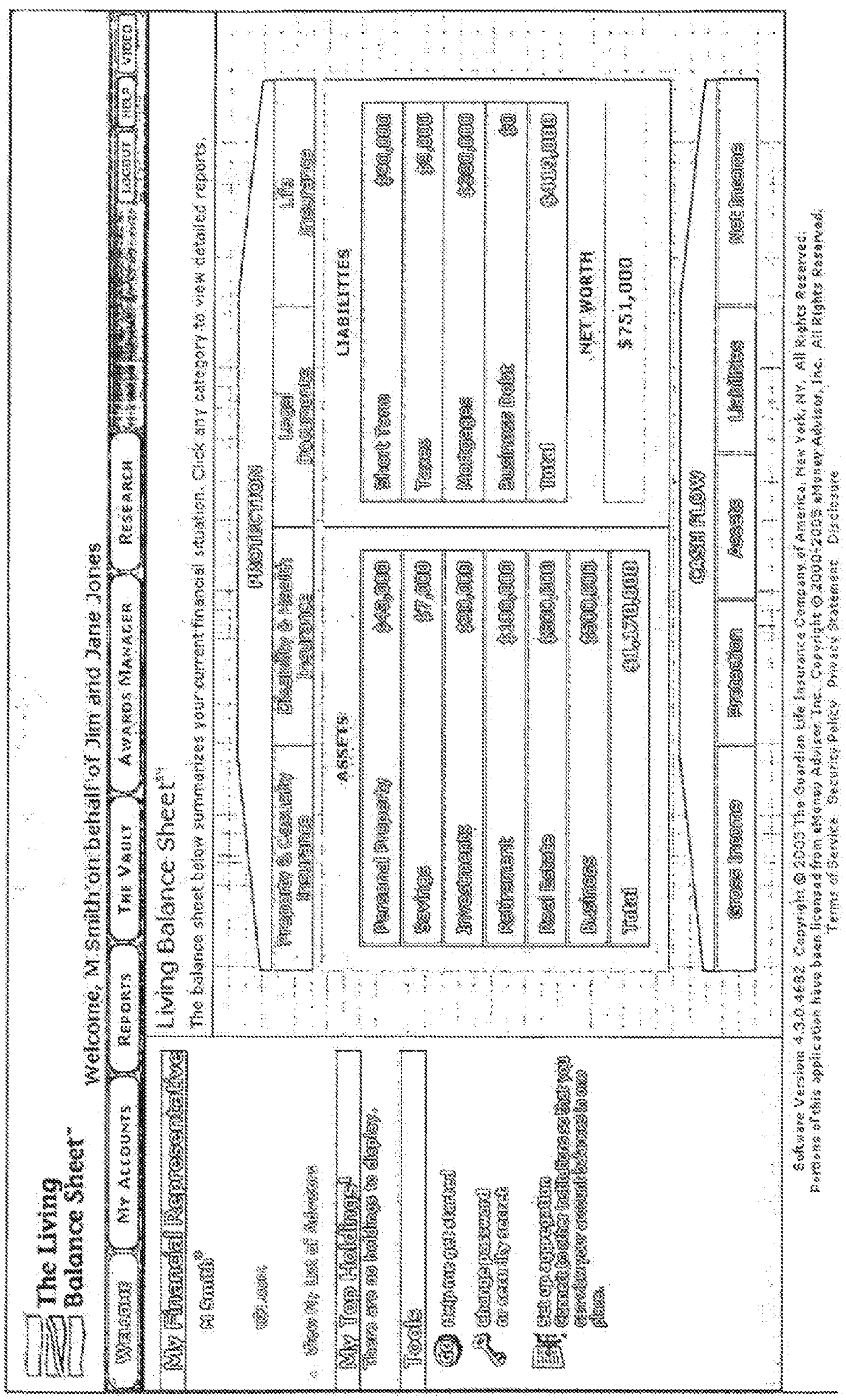
Figure 193:
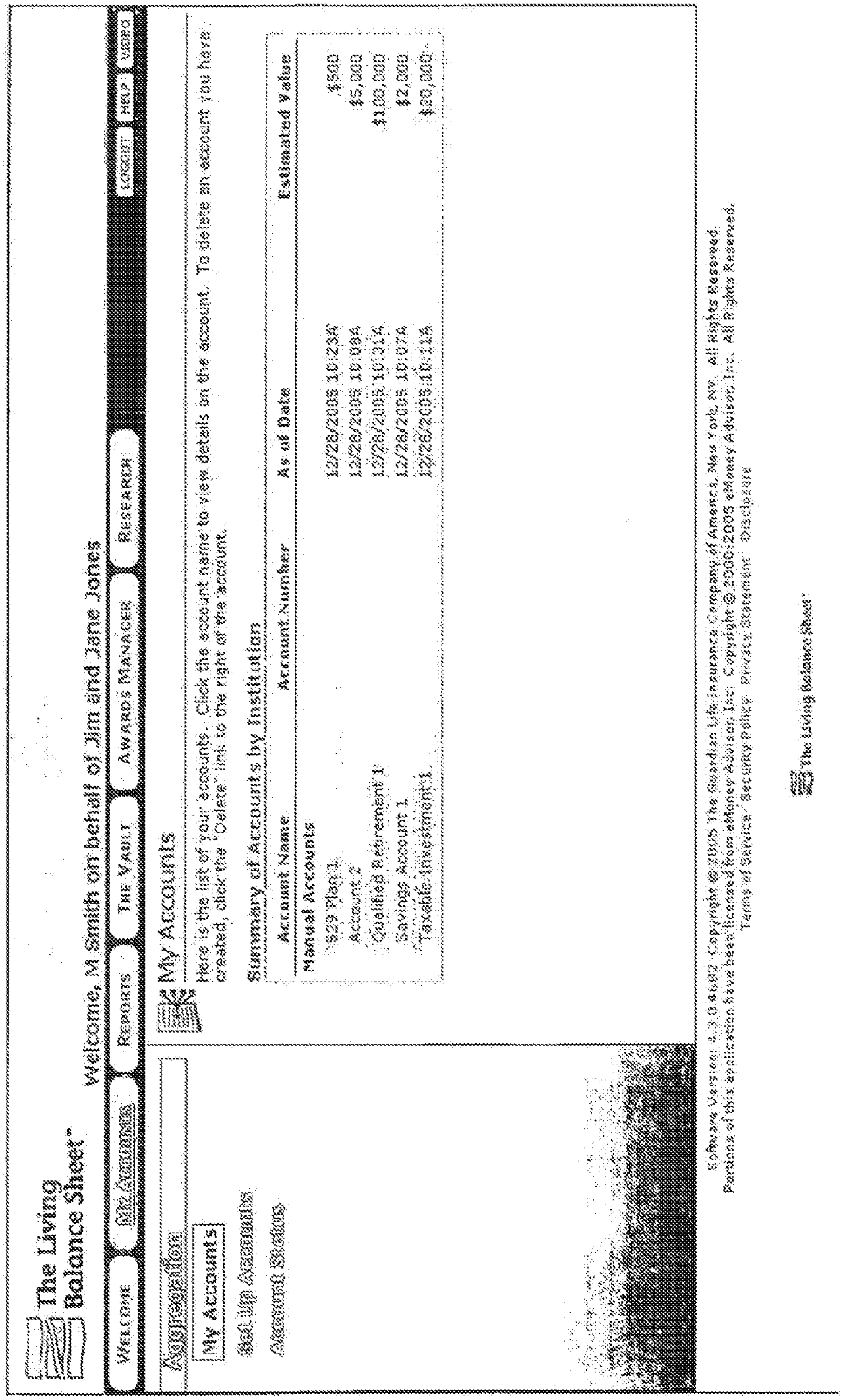
Figure 194:
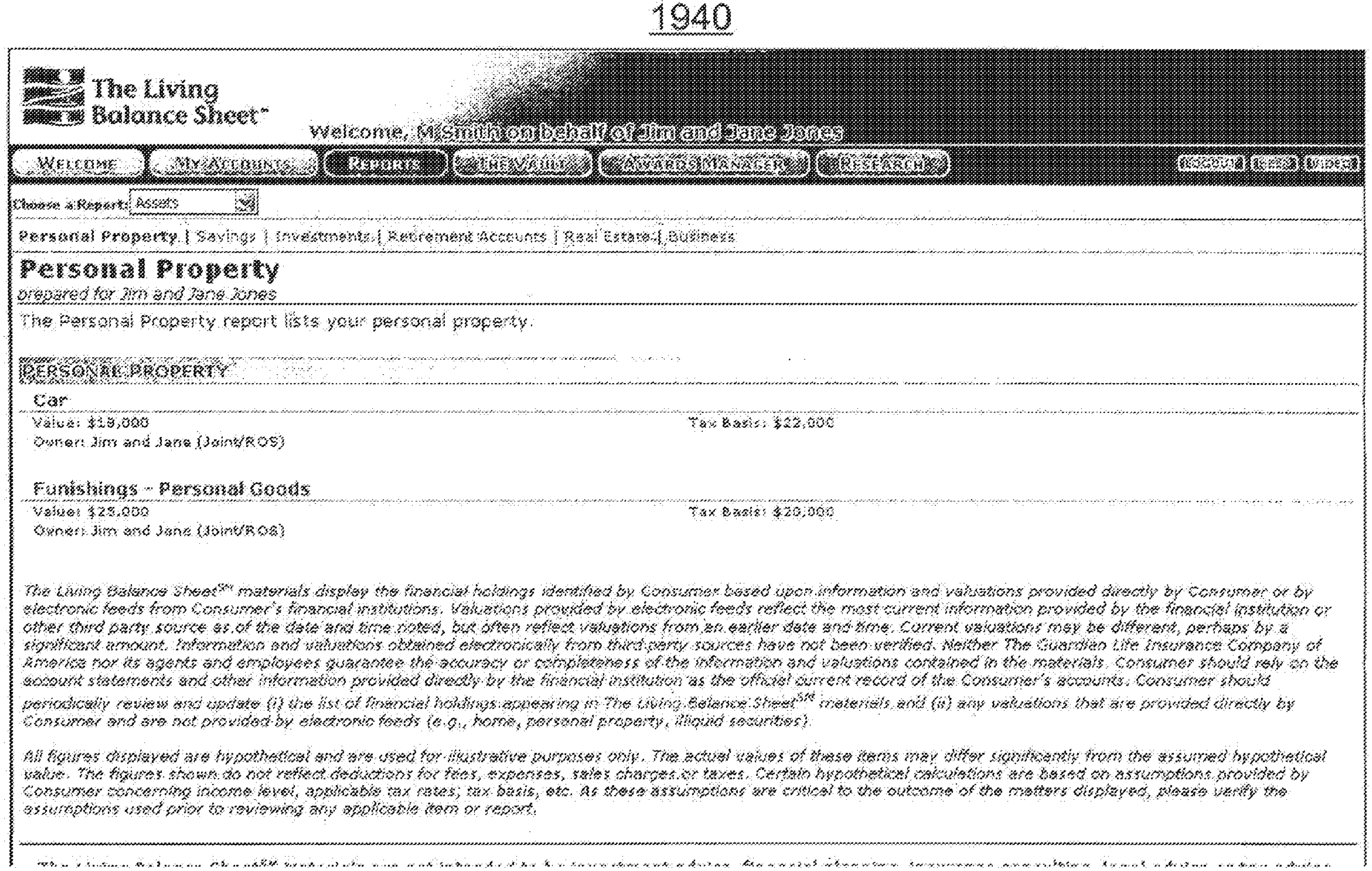
Figure 195:
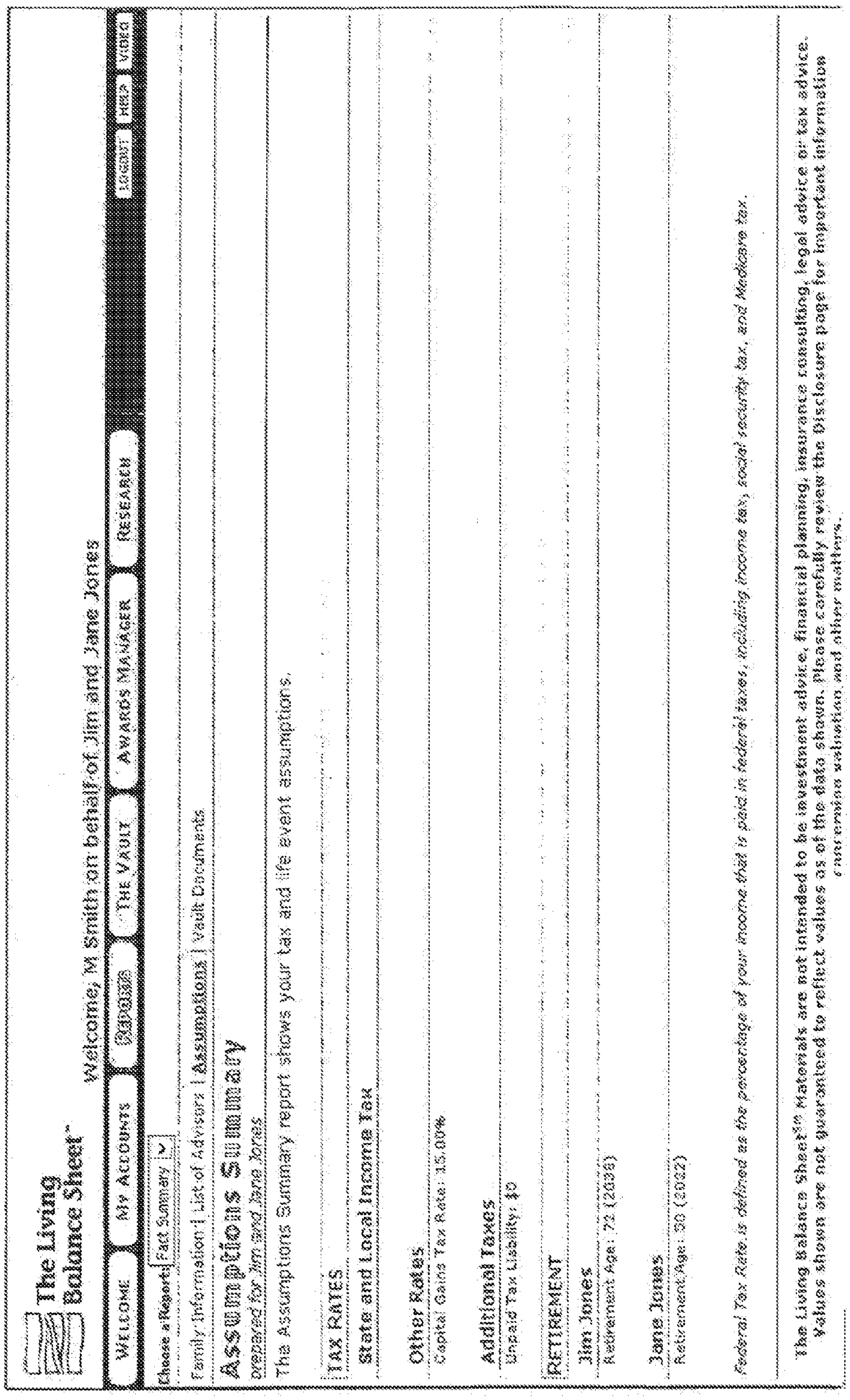

FIGS. 189-191 show different options for accessing tools, options, or display pages within the software.

Figure 196:
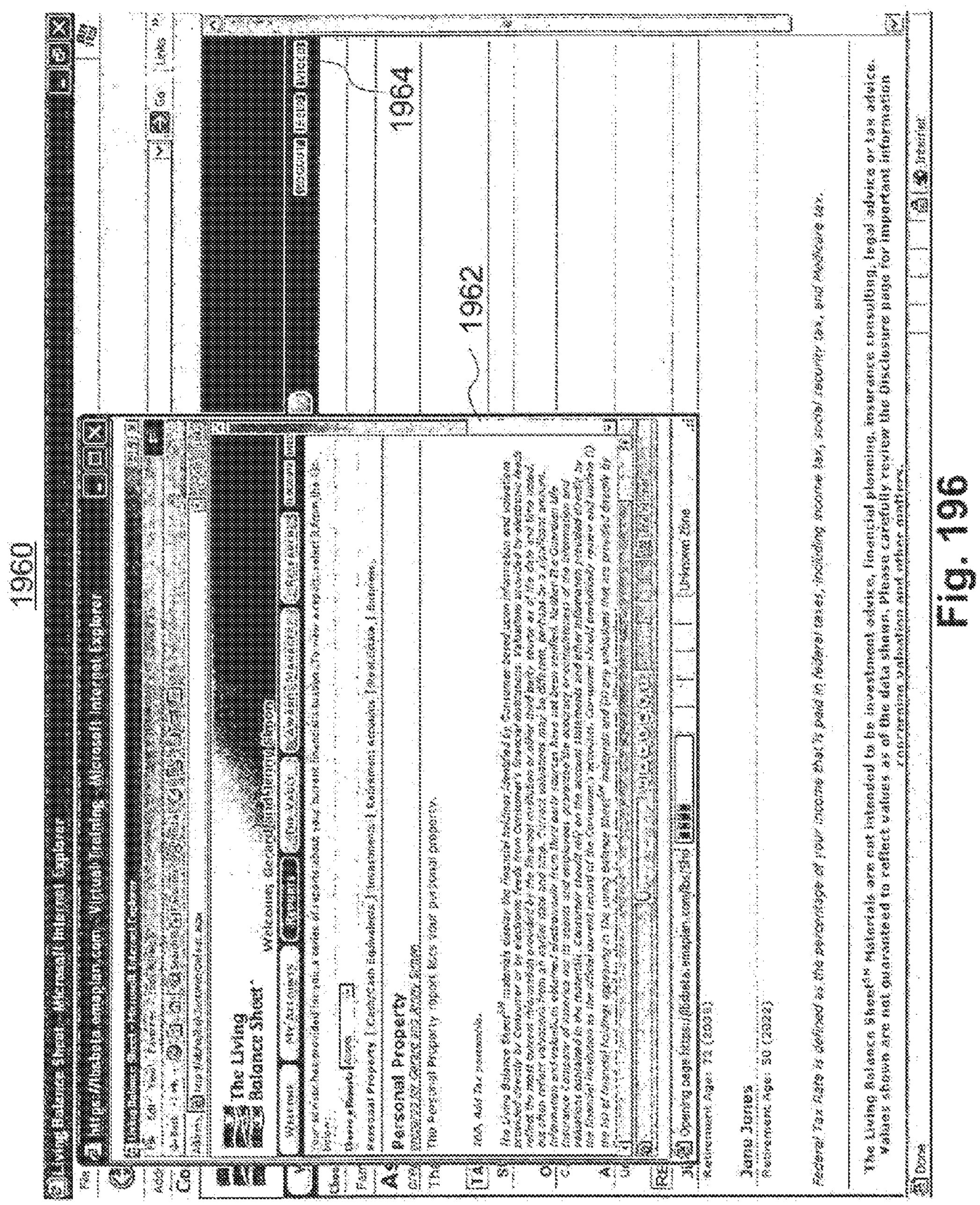

FIGS. 192-196 illustrate examples of display pages of a client website. After a client logs in and is authenticated, the client may be provided access to certain content. For example, Living Balance Sheet® display page 1920 of FIG. 192 can be displayed that provides summary information for the client and links to corresponding reports. Another example is accounts display page 1930 of FIG. 193 that provides information on the client's accounts and an estimated value, which may be based on the aggregation service. Various reports that were generated as part of the Workflow Wizard® in the above examples can also be made available to the client via the client website. For example, personal property report display page 1940 of FIG. 194 can be displayed that summarizes the client's personal property information. Assumptions summary display page 1950 of FIG. 195 can also be displayed to the user to show the tax and life event assumptions that have been used for the client. The client website may include video content to aid the user in understanding the various available features and to possibly educate the client or promote products or services. For example, as shown in FIG. 196, a user can select video button 1964 to receive such content. In response, video window 1962 can be displayed to play video that is related to the currently viewed display page.

Figure 197:
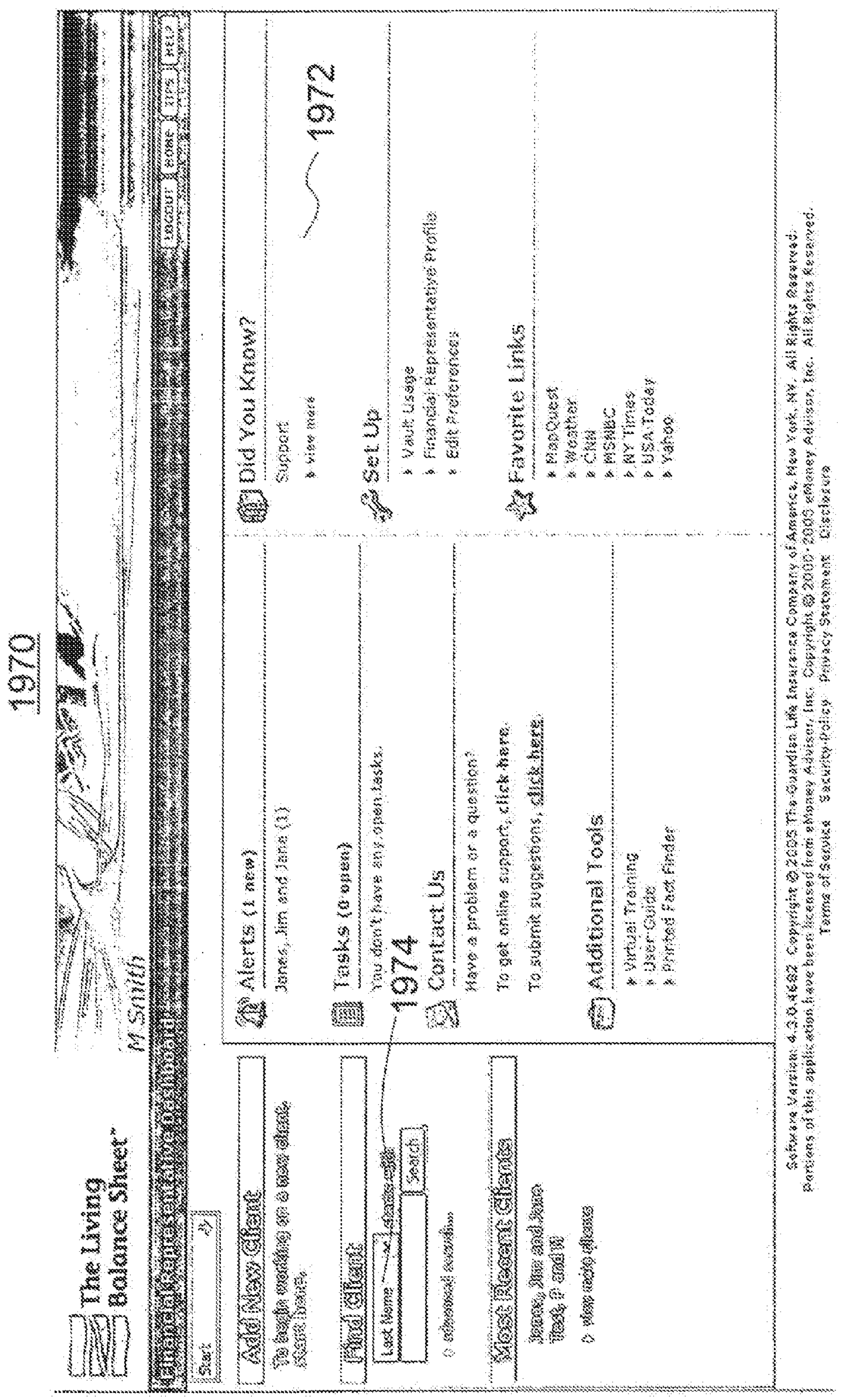

Various other user specific tools and functionality can also be implemented. For example, as shown in FIG. 197, dashboard display page 1970 can be displayed for the user (e.g., an insurance professional). Dashboard display page 1970 can provide the user with a convenient starting point for accessing various business-related links and functionality that may be needed to properly operate the user's insurance related business. For example, display page 1970 can include section 1972 that is divided into sections by categories such as alerts (e.g., to show any alerts that have been triggered for the user such as by a due date), tasks (e.g., any open tasks that are pending for the user such as from selected action steps or items with respect to a client), contact us (e.g., a section that provides quick access to contact information), additional tools, "did you know" (e.g., a section that provides support and education to the user), setup (e.g., for setting up various system aspects), and favorite links section. Display page 1970 can also include client section 1974 that provides options for adding a new client, finding a client within the client database, and active links to most recent clients that the user has interacted with recently.

Figure 198:
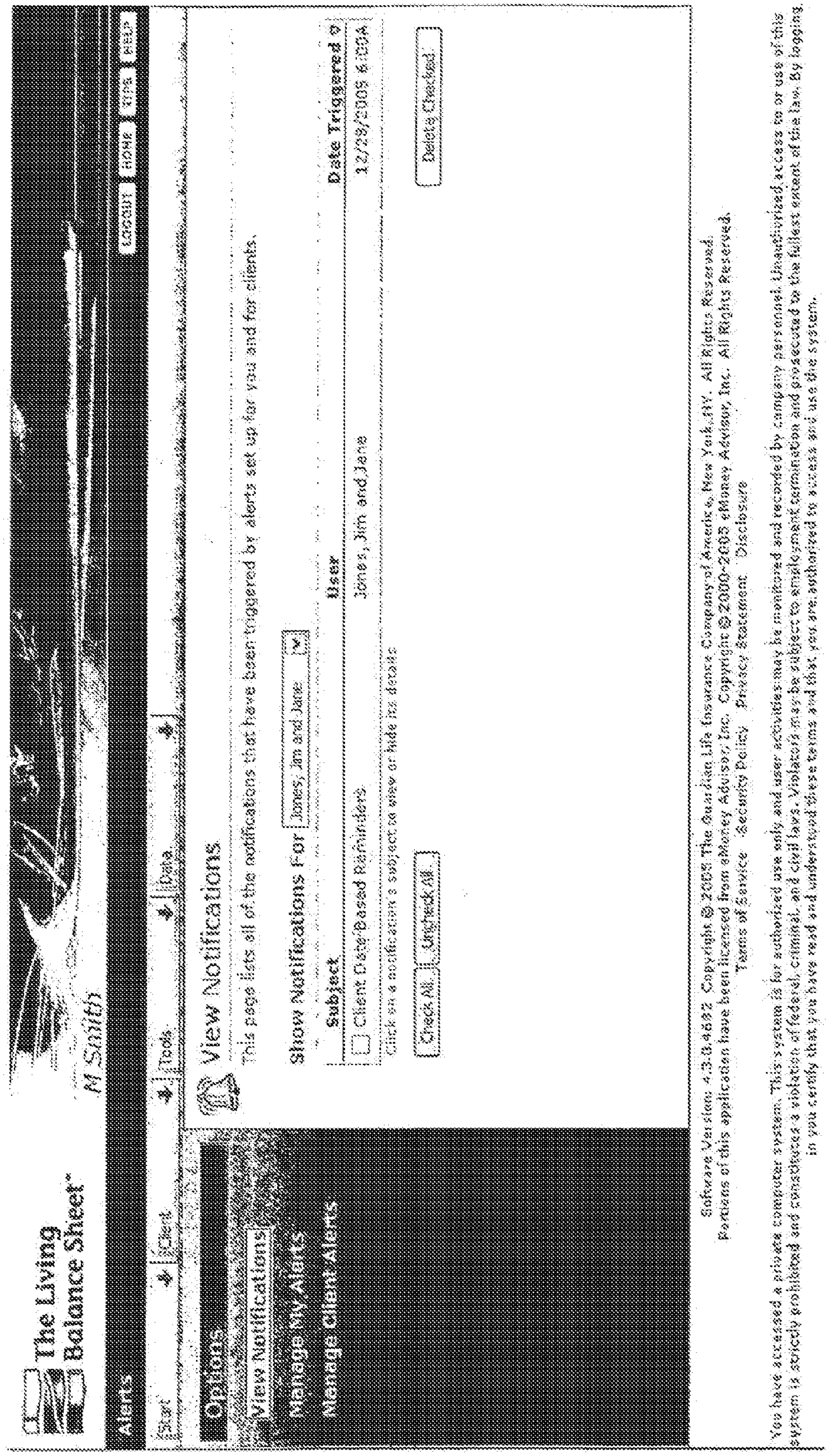
Figure 199:
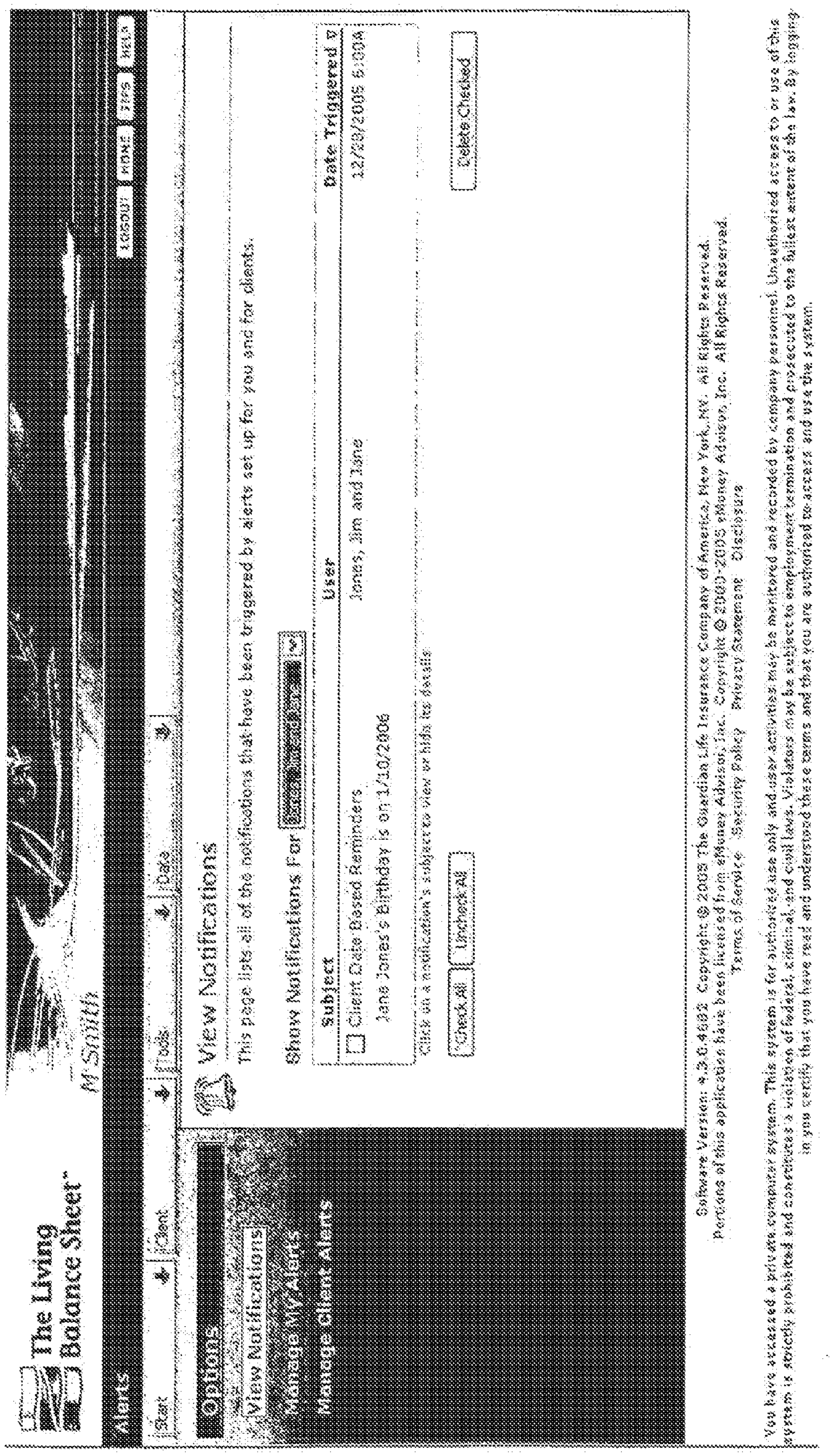
Figure 200:
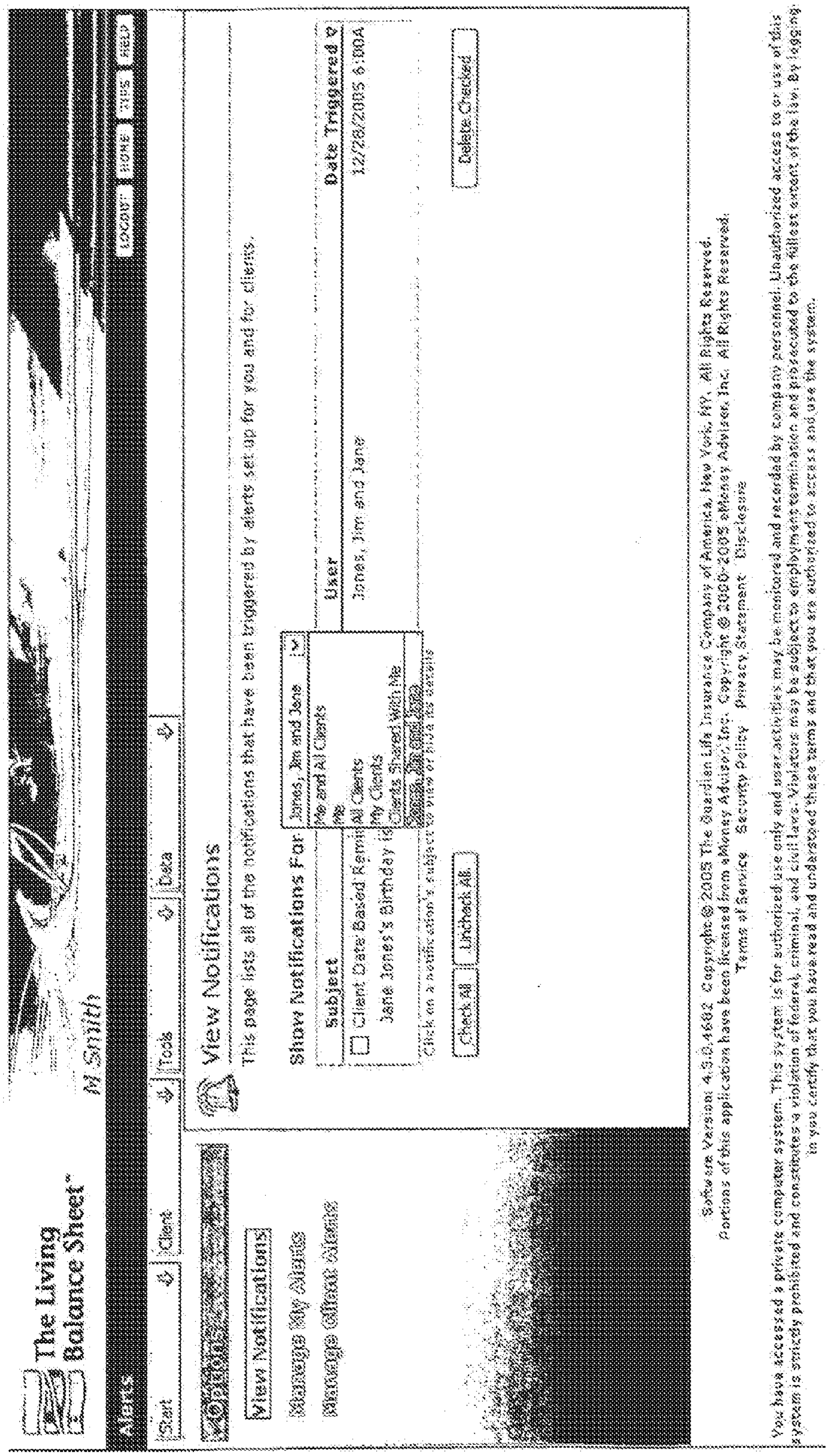
Figure 201:
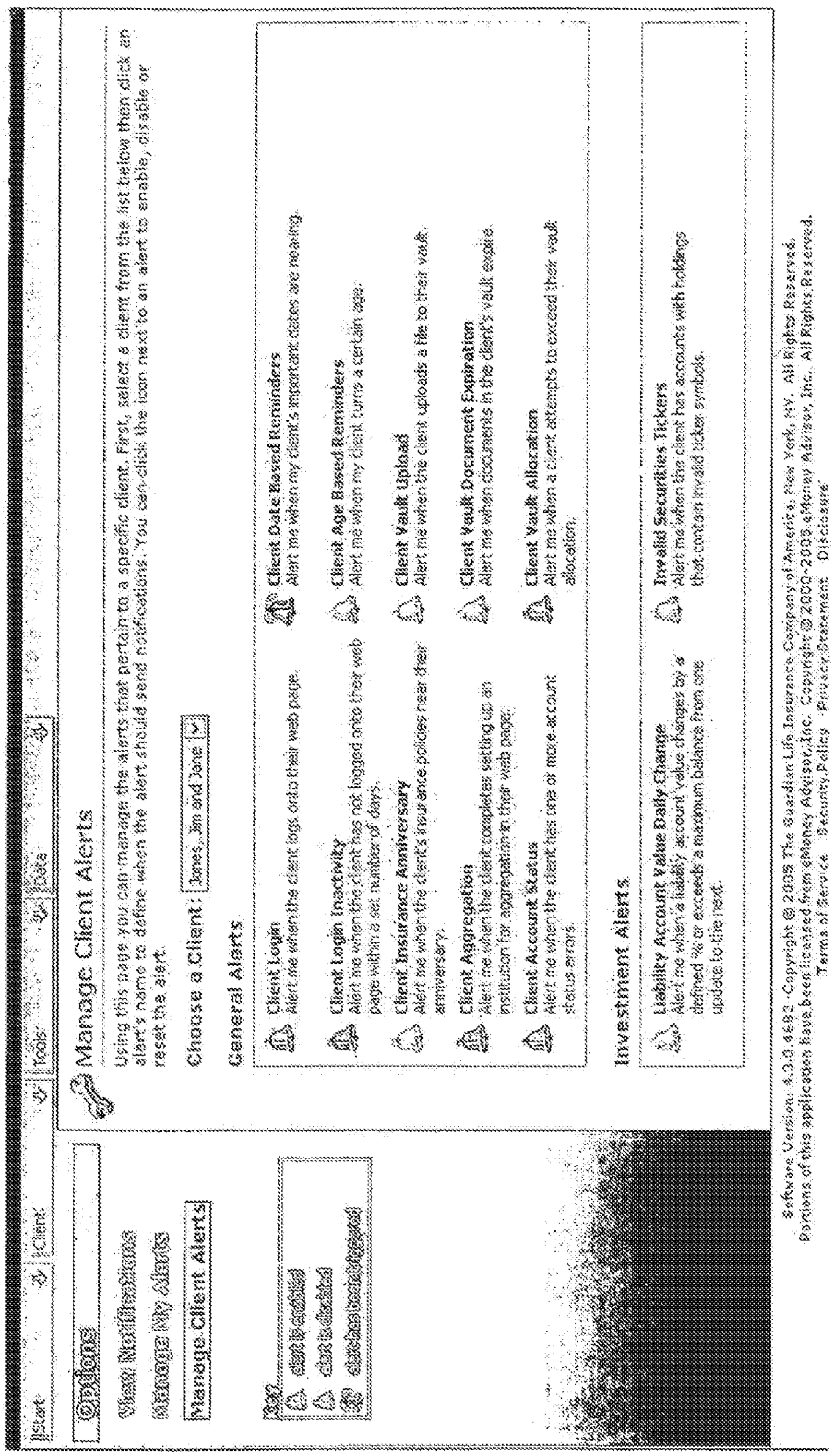

FIGS. 198-200 illustrate that a user can access a view notification display page by selecting the alerts section or a listed alert from dashboard display page 1970. FIGS. 198-200 also illustrate that the user can use a pull-down menu to select a range of notifications that can be displayed such as notifications for a specific client or all of the user's clients. FIG. 201 shows a manage client alerts display page in which preconfigured alerts that could be used for a client can be managed to be activated for the client currently listed in the choose a client section of the display page.

Figure 202:
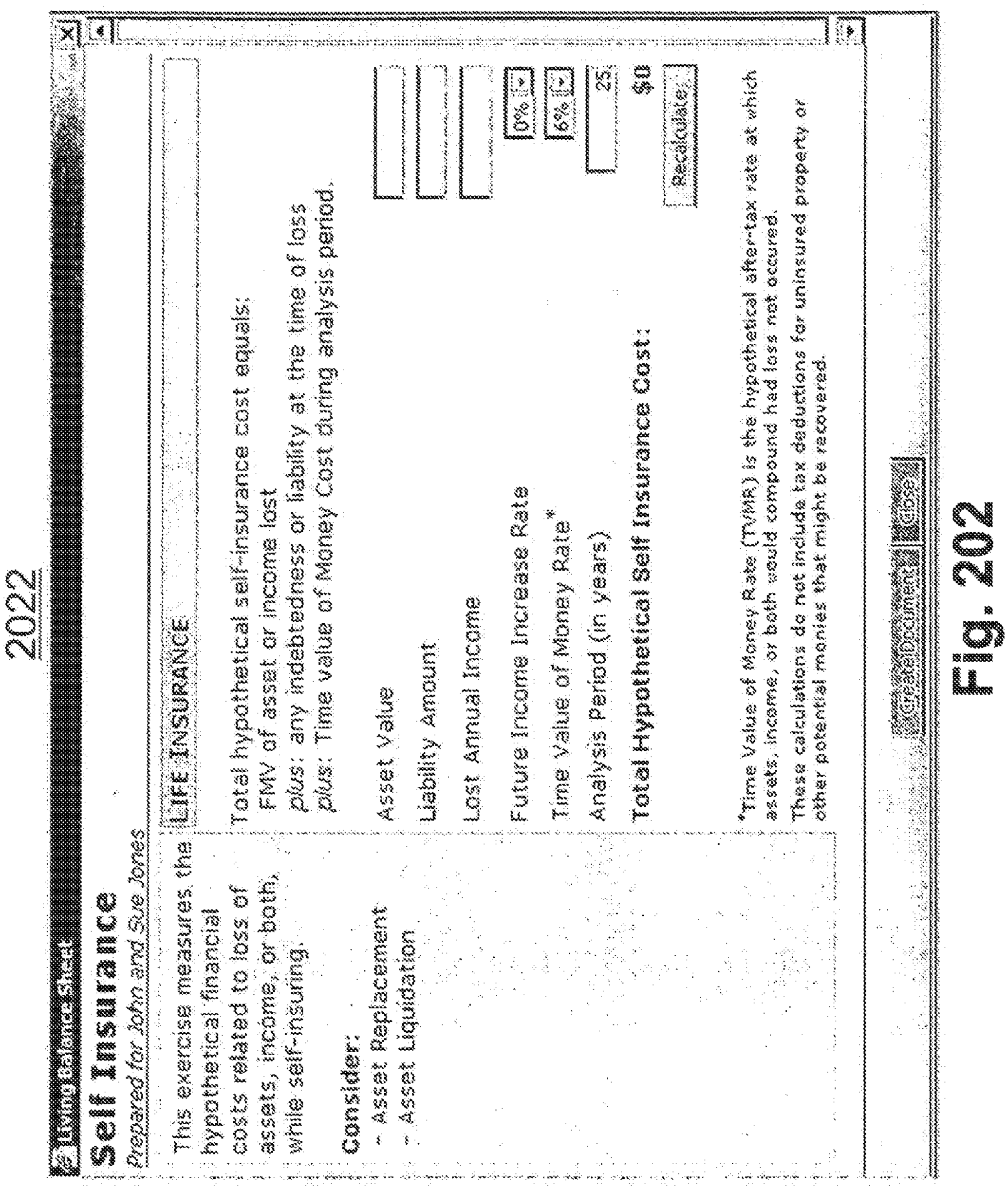

FIGS. 202 and 203 illustrate a self-insurance calculator feature. Self insurance calculator window 2022 can be displayed when a user selects Show Self Insurance Example from the Living Balance Sheet® Actions 1554 of FIG. 155. FIG. 155 shows life insurance display page 1540 in protection observations section 1332. The same or similar window as window 2022 can be displayed for other self insurance examples that are identified in the links of the action sections of the insurance protection observations of section 1332. Window 2022 can provide the user with a quick and visual tool to demonstrate that the cost of self-insurance can be much greater than obtaining appropriate insurance. For example, in window 2022, the user can enter a lost annual income of $100,000, select a future income increase rate of 3% per year, a time value of money rate of 6%, and an analysis period as show in window 2023 of FIG. 203. When the user selects the recalculate button the total hypothetical self insurance cost is displayed based on the provided assumptions. The lost annual income, liability amount, and asset value can be used in the calculator to evaluate self-insurance for different types of insurance coverage such as life insurance, or umbrella coverage.

Accordingly, insurance professionals can use such display pages and features to manage and improve many aspects of their business operations and that clients can benefit from such improved operations and information. The display pages can be used as part of a client meeting, to form reports for a client, to prepare for a meeting, to identify pertinent facts to discuss with a client, etc.

Although, the insurance-professional specific pages are particularly suited for insurance professionals, if desired, one or more of such pages can be configure for access and use by clients. The program can provide an agent or salesperson with various tools to create presentations to illustrate investment strategies to potential or current clients and, in a preferred embodiment, potentially demonstrate the desirability of life insurance, in particular, permanent life insurance. The program also provides methods of processing user requests and various investment scenarios given input (e.g., selection of an option(s) or input of monetary values, gender, age, investment preferences, etc) from a user (i.e., a customer or agent). It will be appreciated that the name used for options, fields, strategies, scenarios and links are for illustrative purposes only.

Figure 204:
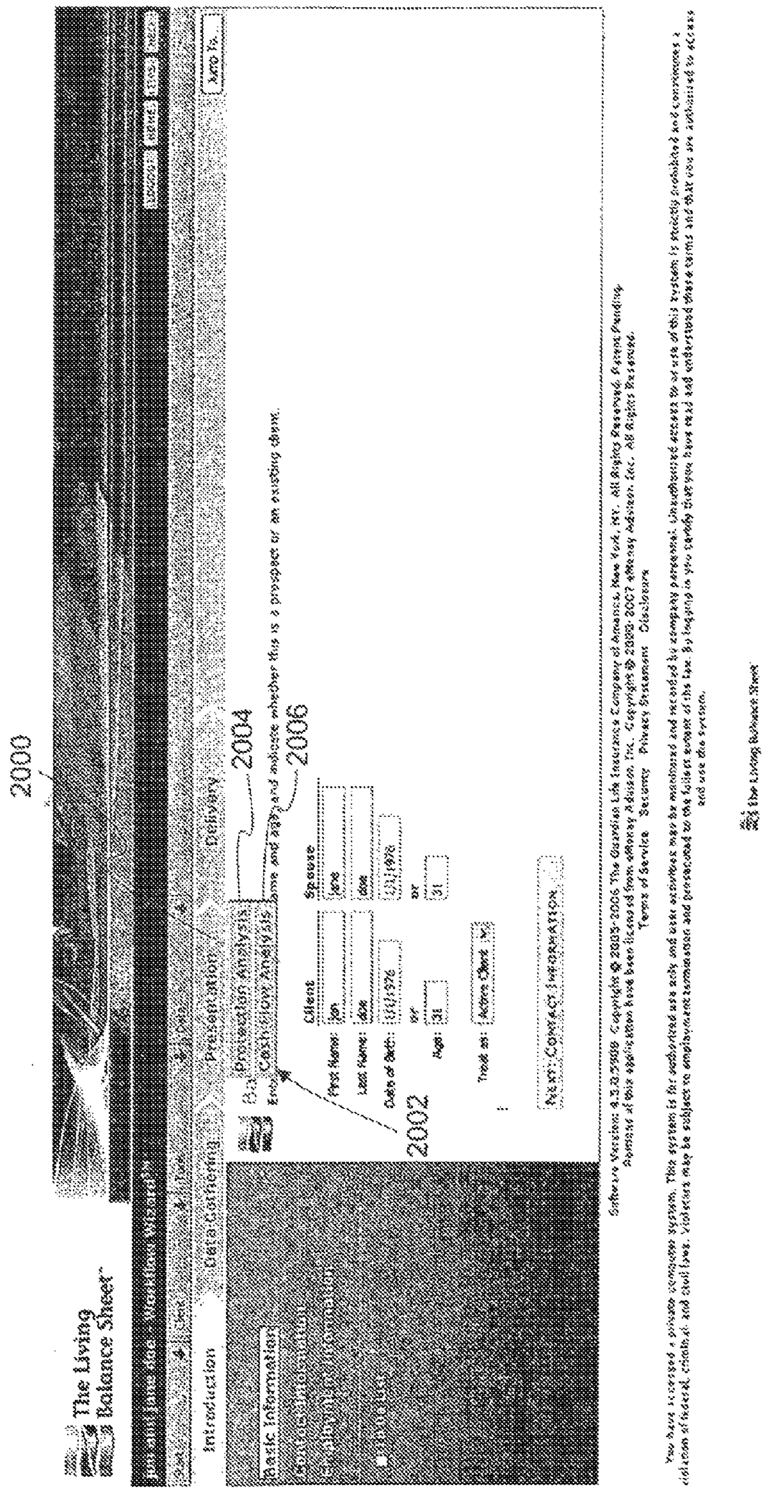

As shown in FIG. 204, a user can select or click on presentation tab 2000 that generates drop down menu 2002 containing one or more links to various presentation pages such as Protection Analysis link 2004 or Cash Flow Analysis link 2006.

Figure 205:
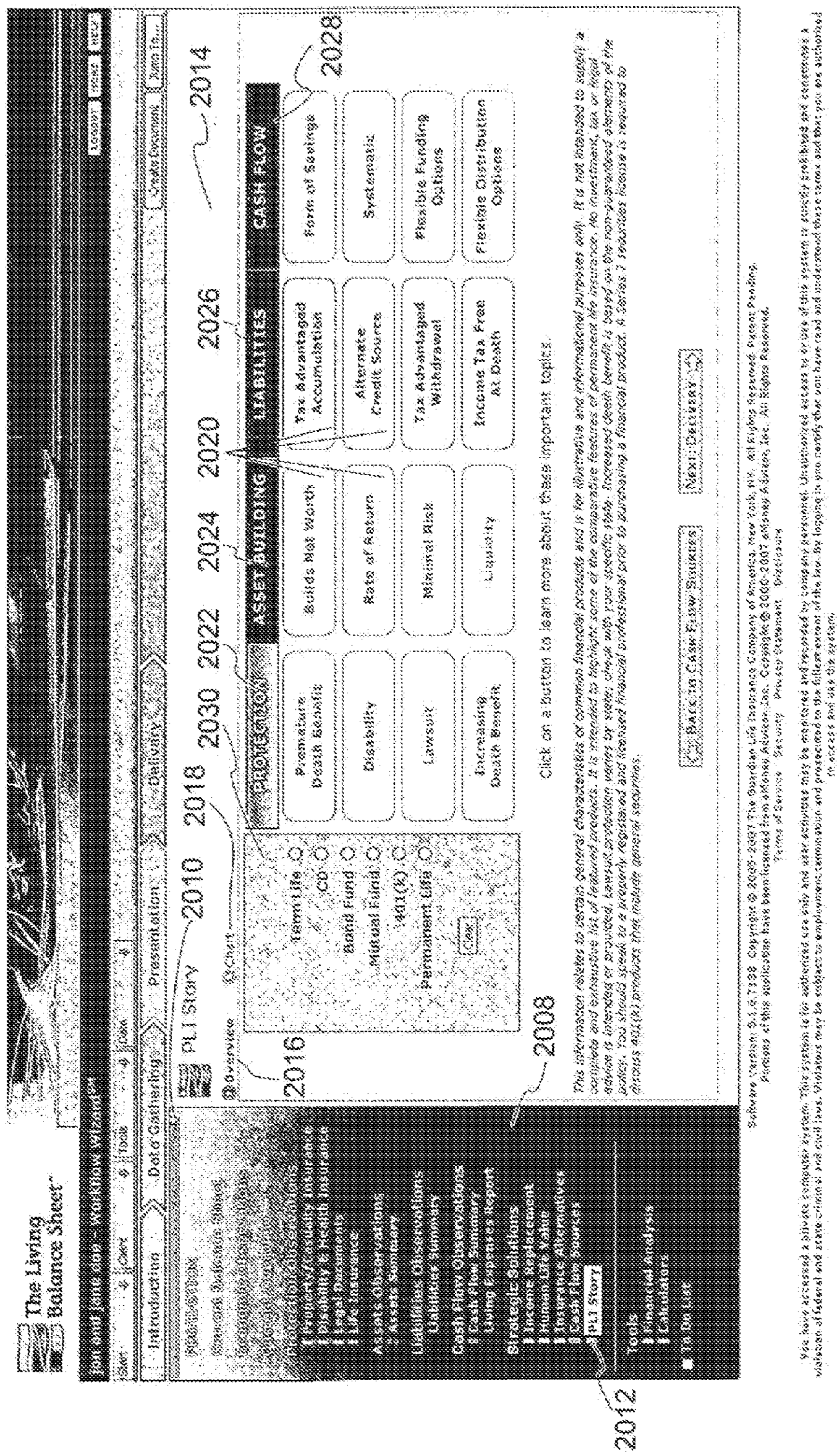
Figure 206:
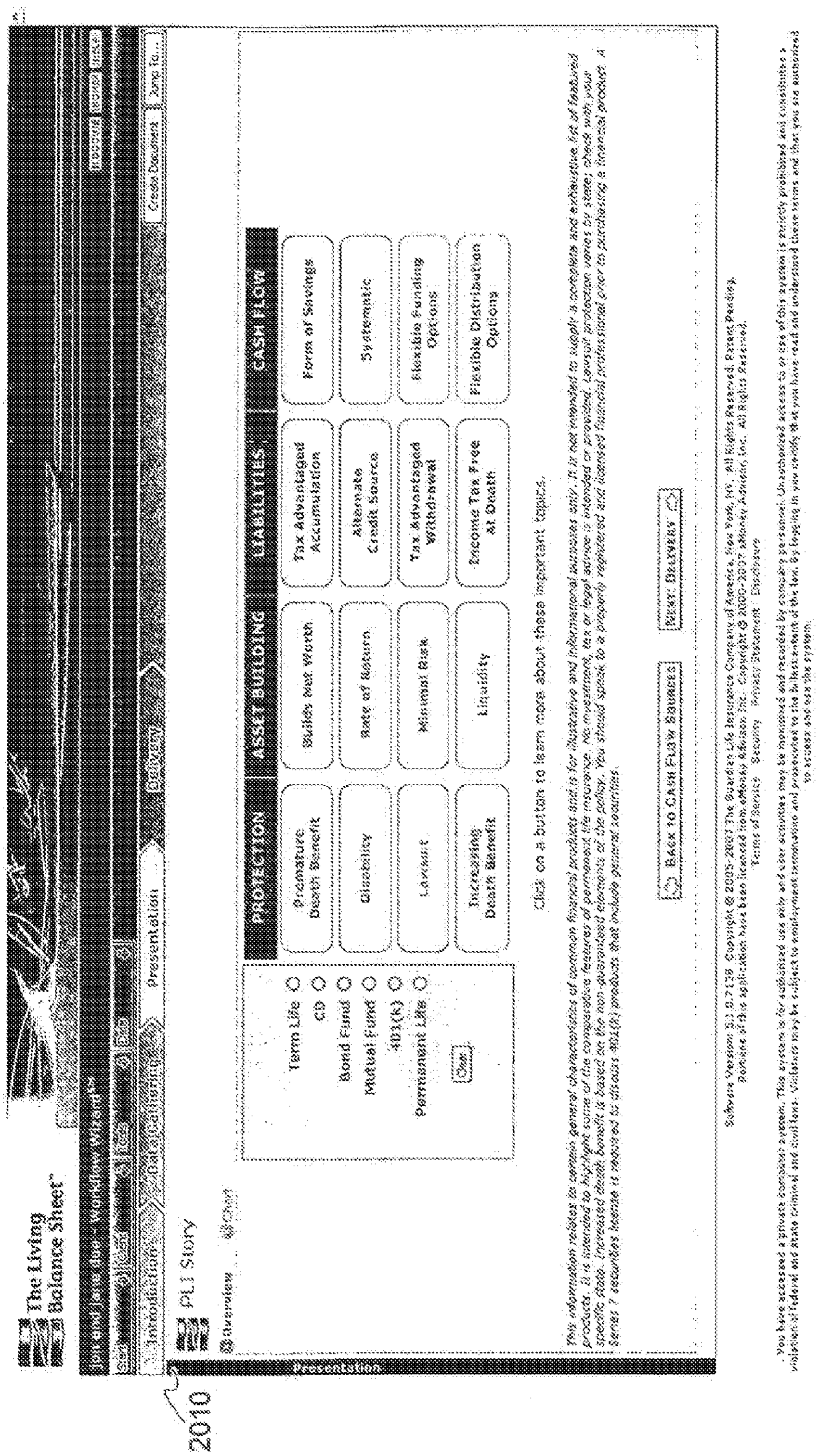
Figure 207:
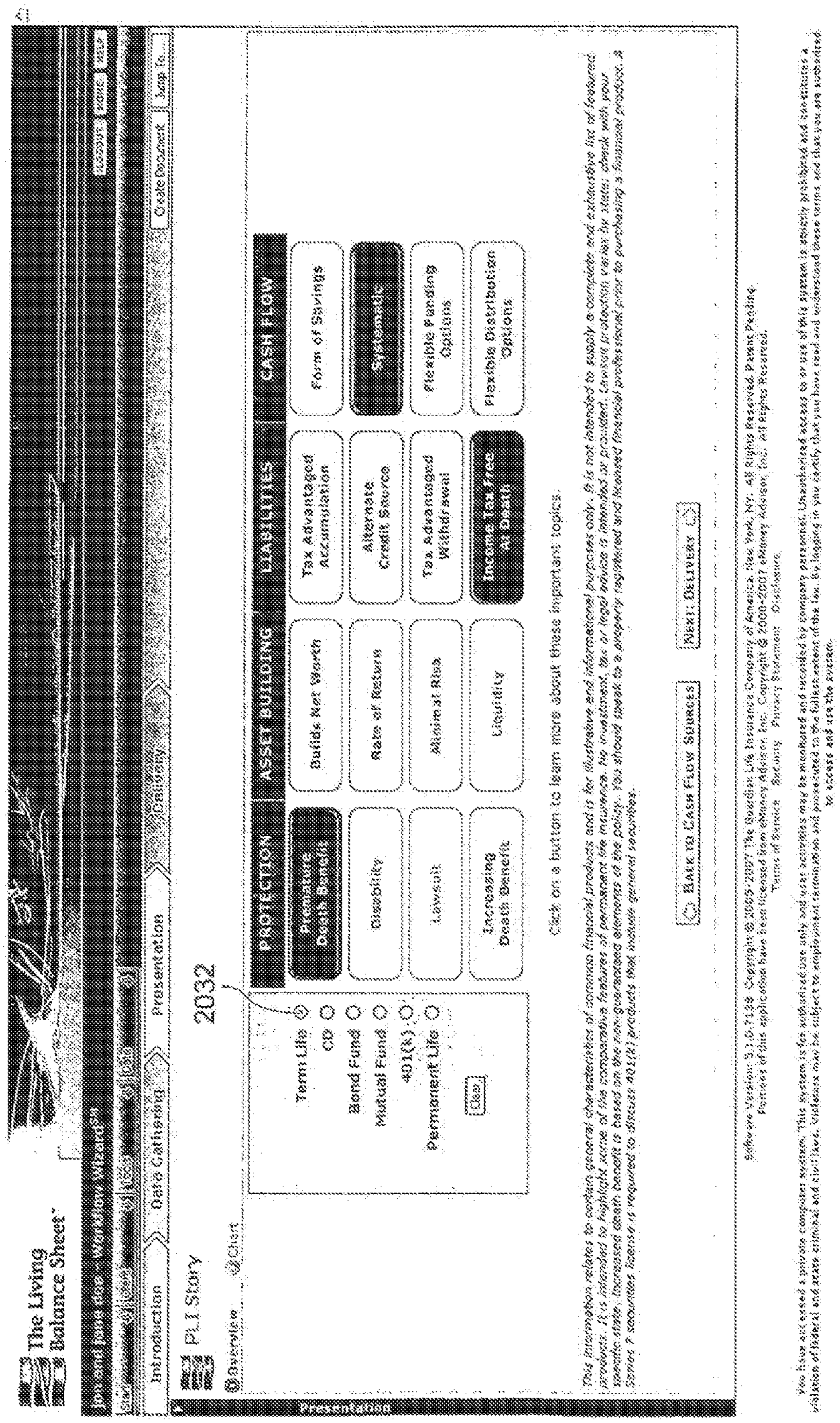
Figure 208:
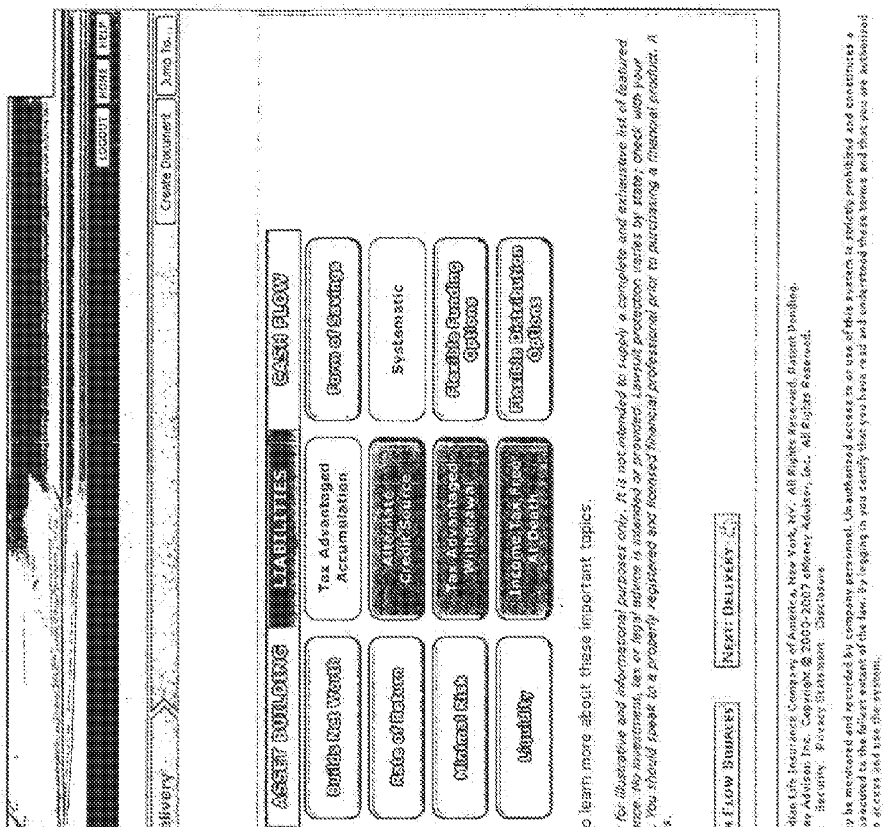
Figure 209:
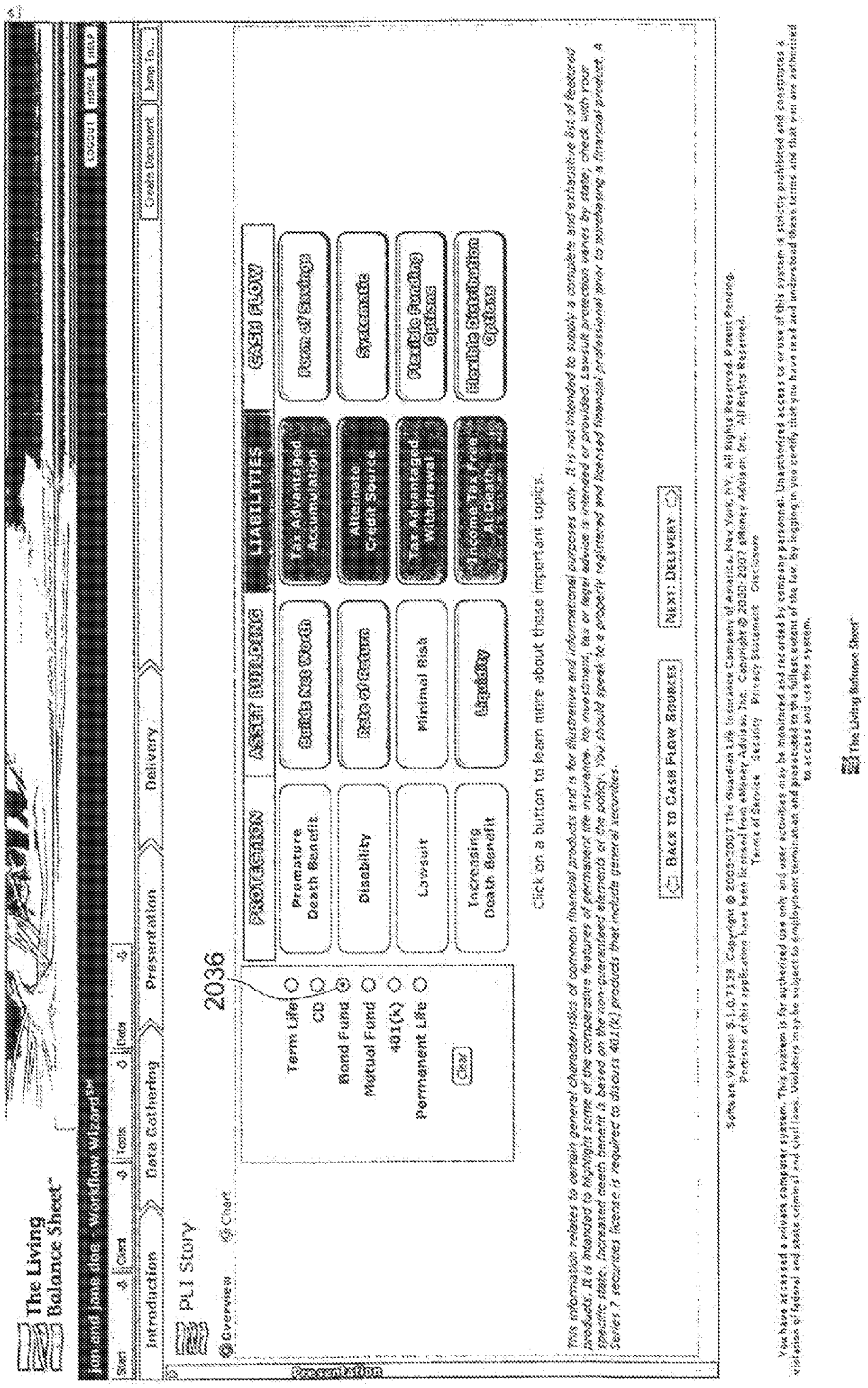
Figure 210:
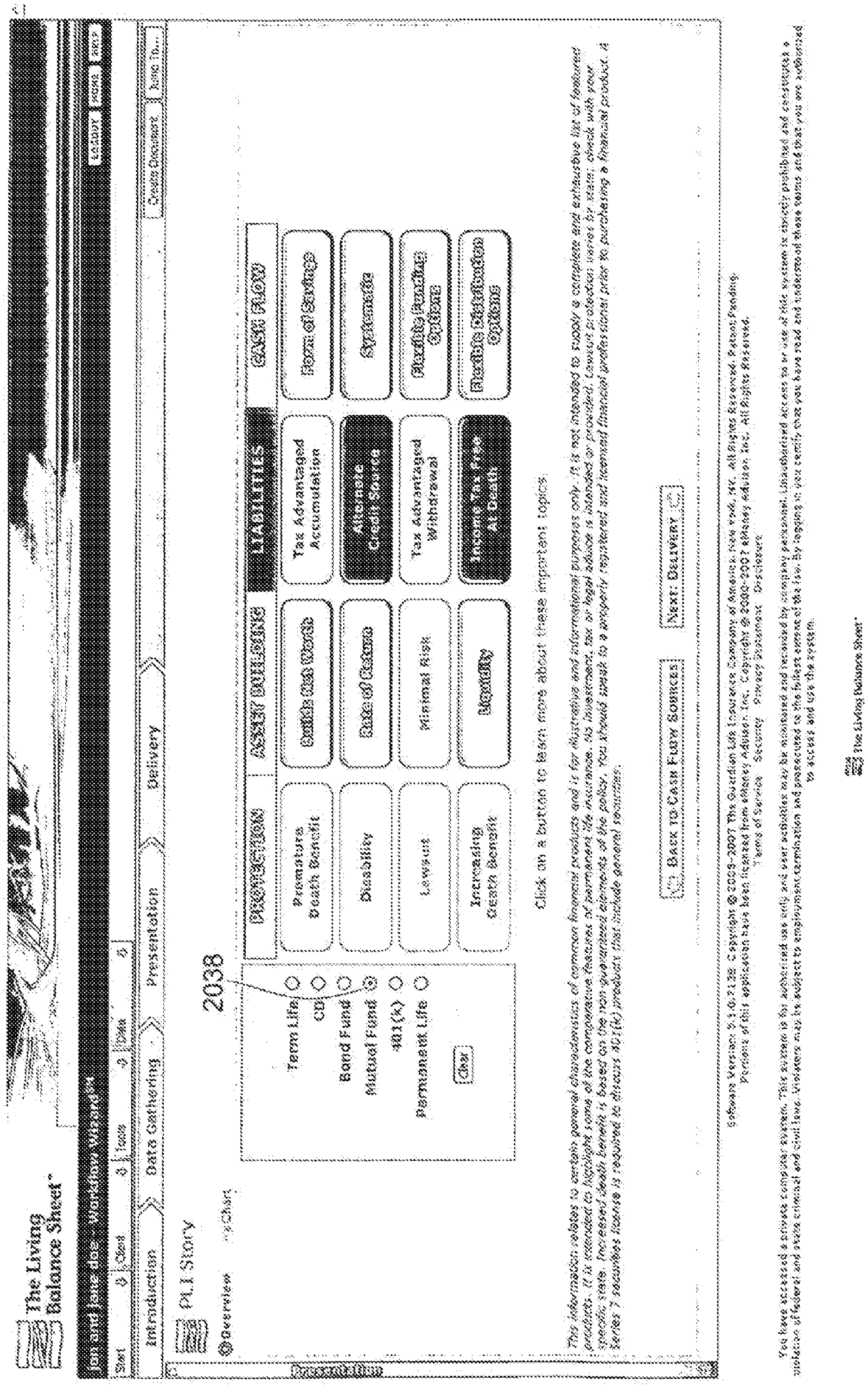
Figure 211:
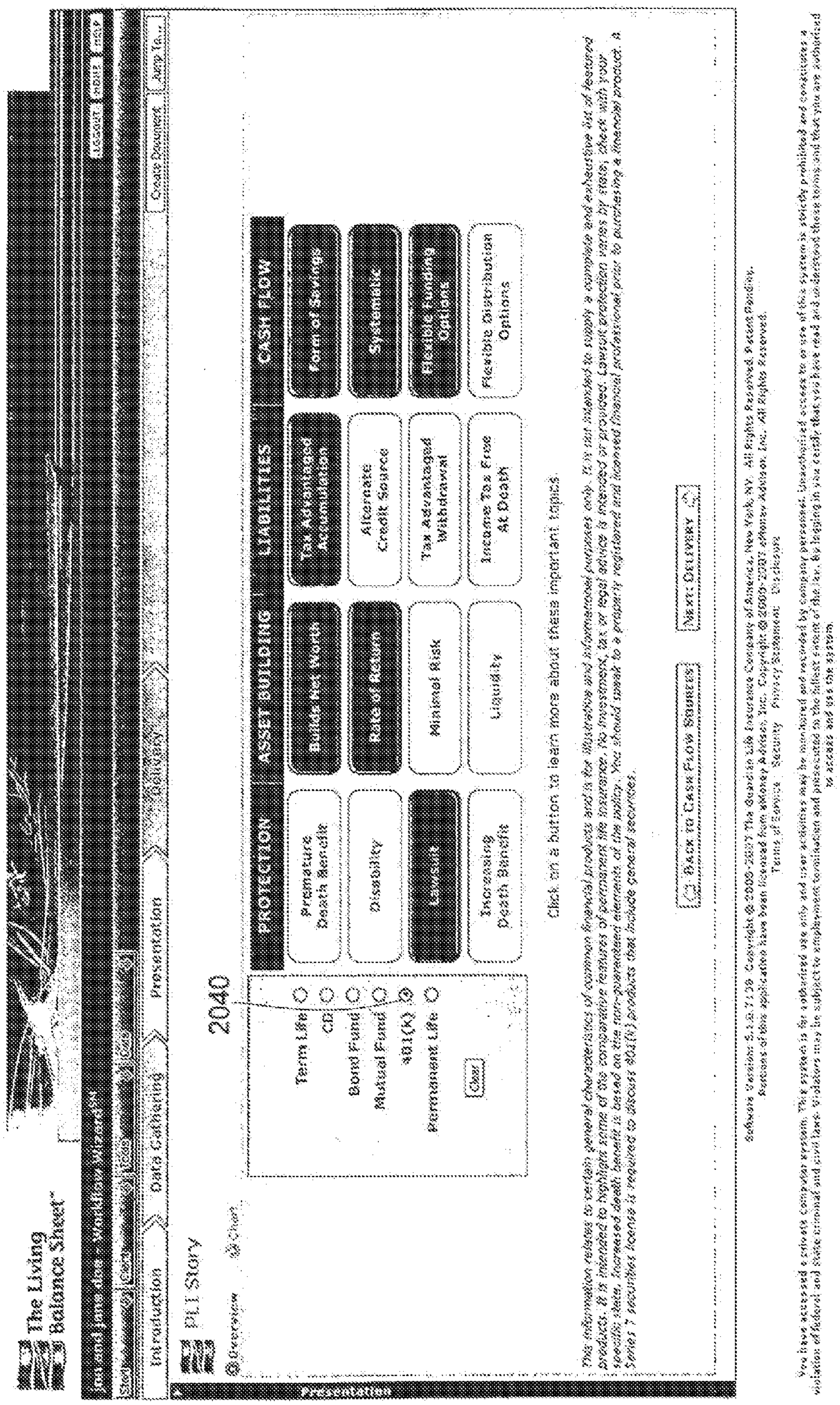
Figure 212:
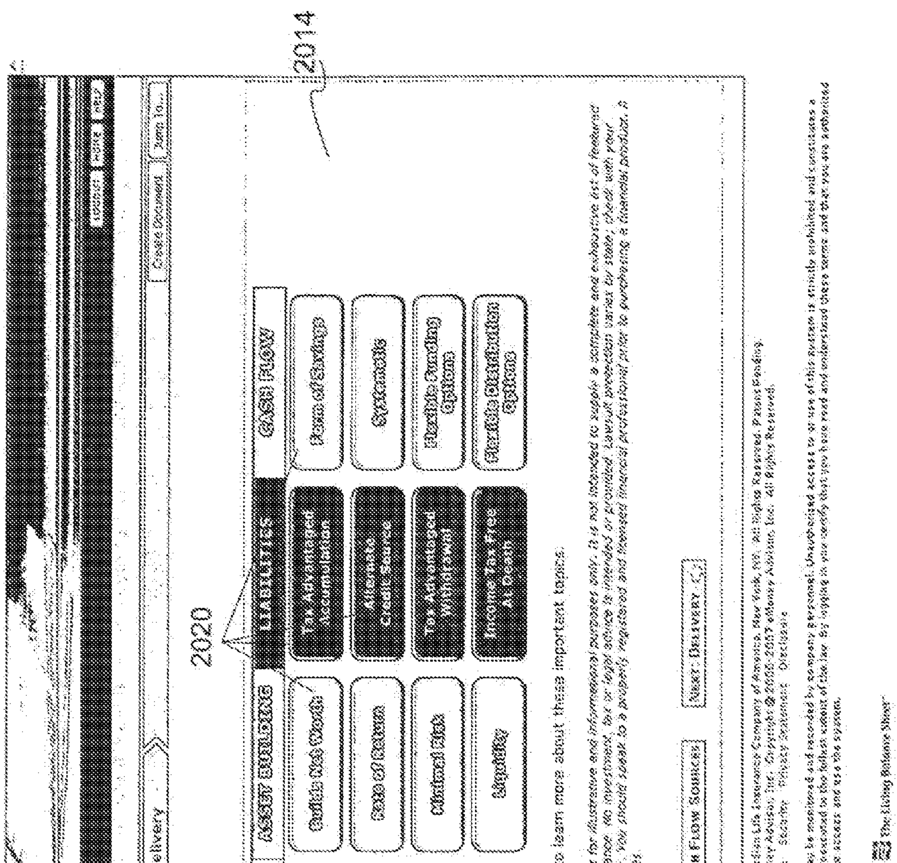

If a user chooses Protection Analysis link 2004, a page can be displayed on the screen which includes list of options field 2008 in FIG. 205. A user can choose a particular option to, for example, create a particular presentation. It should be noted that list of options field 2008 can be selectively expanded or hidden (FIG. 206) by, for example, selecting or clicking on an icon such as arrow icon 2010.

Within options field 2008 of Protection Analysis page, a user can select or click link 2012 such as Permanent Life Insurance or PLI story link. A number of options such as, for example, Overview option 2016 and Chart option 2018 may be included on page 2014. Option 2016, 2018 can be selected by, for example, positioning a pointer on the word "Overview" or "Chart" or selecting an area (e.g., circle or box) positioned adjacent to the words and clicking a mouse or pushing a key on a keyboard. When Overview option 2016 is selected, page 2014 can be arranged with a number of fields. In a preferred embodiment, the fields can be in rows which correspond to a particular category or interdependent financial domains such as, for example, Protection 2022, Assets or Asset Building 2024, Liabilities 2026, and Cash Flow 2028. It will be appreciated that the financial domains can be related to each other and, in additional to page 2014, the program can be configured to display the financial domains together on other display pages. In this way, a user can be given an overview of all factors affecting the user's financial condition. For example, as shown in FIG. 127, the interdependent domains can provide a platform for the presentation of the insurance provider's methodology and to integrate the application for user comprehensibility. Under each category are various subcategories 2020 such as, for example, Premature Death Benefit, Disability, Lawsuit and Increasing Death Benefit under Protection category 2022; Building Net Worth, Rate of Return, Minimal Risk and Liquidity under Asset Building category 2024; Tax Advantaged Accumulation, Alternative Credit Source, Tax Advantaged Withdrawal, and Income Tax Free at Death under Liabilities category 2026; and Form of Savings, Systematic, Flexible Funding Options, and Flexible Distribution Options under Cash Flow category 2028. Subcategories 2020 can represent various characteristics of different financial products/options such as term life insurance, CDs, bonds, mutual funds, 401(k) plans and permanent life insurance. Each category and associated subcategory can have a specific color associated therewith. For example, Protection 2022 and all subcategories thereunder can be yellow, Asset Building 2024 and all subcategories thereunder can be blue, Liabilities 2026 and all subcategories thereunder can be red, and Cash Flow 2028 and all subcategories thereunder can be green. Such a color scheme provides a clear visual representation of which categories and subcategories are associated with each other and which are relevant to a presentation for reasons which will become apparent below. Prior to choosing a financial option from financial options 2030, subcategories 2020 may be lighter in color, dulled, outlined in a color and/or a different color than the category (e.g., gray). In one embodiment, the categories/subcategories may not appear on the screen or otherwise be visible to a user until a particular financial option from list of options 2030 is chosen.

Figure 266:
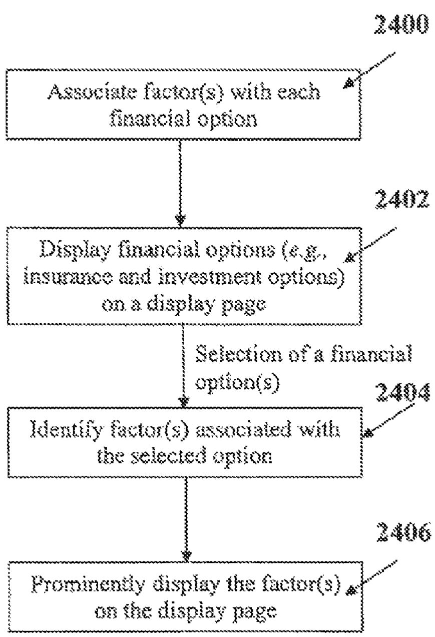
FIGS. 266-274 are flow charts for implementing software and tools in accordance with various embodiments of the invention.

A user may click or select a financial option (e.g., investment option or insurance option) from list of options 2030. The list of options 2030 can include Term Life, CD, Bond Fund, Mutual Fund, 401(k) and Permanent Life. In general, as illustrated in FIG. 266, one or more factors can be associated with each financial option (step 2400). The financial options can be displayed in a display page (step 2402) and a user may select at least one financial option. The factor(s) associated with the selected option can be identified (step 2404) and the factor(s) can be prominently displayed on a display page (step 2406).

In a preferred embodiment, as shown in FIG. 205, each financial option can have an area (e.g., a box or circle) which can be selected and provide an indication that the financial option has been selected (e.g., a check or other marking). As illustrated in FIGS. 207-212, upon clicking or selecting the financial option itself or selecting a specified area associated with the option (e.g., a circle next to the option), the program can process the request and various categories 2022, 2024, 2026, 2028 and/or subcategories 2020 will become prominently displayed (e.g., highlighted, become visible to a user or otherwise stand out) to illustrate to a user that the particular category 2022, 2024, 2026, 2028 and/or subcategory 2020 is affected by a particular financial option. It will be appreciated that more or less categories, subcategories or financial options may be provided than is shown in FIG. 205.

As shown in FIG. 207-212, when a user clicks or selects Term Life insurance option 2032, CD investment opinion 2034, Bond Fund investment option 2036, Mutual Fund investment opinion 2038, 401(k) investment option 2040 or Permanent Life insurance opinion 2042, the program can process the request and various subcategories 2020 can be displayed, highlighted or made to stand out in some way. For Term Life insurance option 2032 (FIG. 207), in a preferred embodiment, Premature Death Benefit, Income Tax Fee at Death and Systematic subcategories 2020 can appear on the screen or be highlighted in the same color as the top level category under which it falls. For CD investment option 2034 (FIG. 208), in a preferred embodiment, Builds Net Worth, Rate of Return, Minimal Risk, Liquidity, Alternate Credit Source, Tax Advantaged Withdrawal, Income Tax Free at Death, Form of Savings, Flexible Funding Options and Flexible Distribution Options subcategories 2020 can appear on the screen or be highlighted in the color of the category under which it falls. For Bond Fund investment option 2036 (FIG. 209), in a preferred embodiment, Builds Net Worth, Rate of Return, Liquidity, Tax Advantaged Accumulation, Alternate Credit Source, Tax Advantaged Withdrawal, Income Tax Free at Death, Form of Savings, Systematic, Flexible Funding Options and Flexible Distribution Options subcategories 2020 can appear on the screen or be highlighted in the color of the category under which it falls. For Mutual Fund investment option 2038 (FIG. 210), in a preferred embodiment, Builds Net Worth, Rate of Return, Liquidity, Alternate Credit Source, Income Tax Free at Death, Form of Savings, Systematic, Flexible Funding Options and Flexible Distribution Options subcategories 2020 can appear on the screen or be highlighted in the color of the category under which it falls. For 401(k) investment option 2040 (FIG. 211), in a preferred embodiment, Lawsuit, Builds Net Worth, Rate of Return, Tax Advantaged Accumulation, Form of Savings, Systematic, and Flexible Funding Options subcategories 2020 can appear on the screen or be highlighted in the color of the category under which it falls. In a preferred embodiment, for Permanent Life insurance option 2042 (FIG. 212), all subcategories 2020 can appear on the screen or be highlighted in the color of the category under which it falls, including Premature Death Benefit, Disability, Lawsuit, Increasing Death Benefit, Builds Net Worth, Rate of Return, Minimal Risk, Liquidity, Tax Advantaged Accumulation, Alternate Credit Source, Tax Advantaged Withdrawal, Income Tax Free at Death, Form of Savings, Systematic, Flexible Funding Options and Flexible Distribution Options subcategories.

Such an illustration provides an effective tool to show potential or existing customer the various factors that can be affected by making different financial decisions. In particular, more subcategories are prominent (highlighted, stand out or become visible to a user) when choosing Permanent Life insurance option 2044 than any other financial option, thus demonstrating to a customer the advantages of purchasing permanent life insurance. Those skilled in the art will appreciate that while specific subcategories 2020 are prominent when selecting a particular financial option 2032, 2034, 2036, 2038, 2040, 2042 from list of financial options 2030, more or less subcategories 2020 may stand out depending on the financial options, categories and subcategories chosen for display on page 2014.

Figure 213:
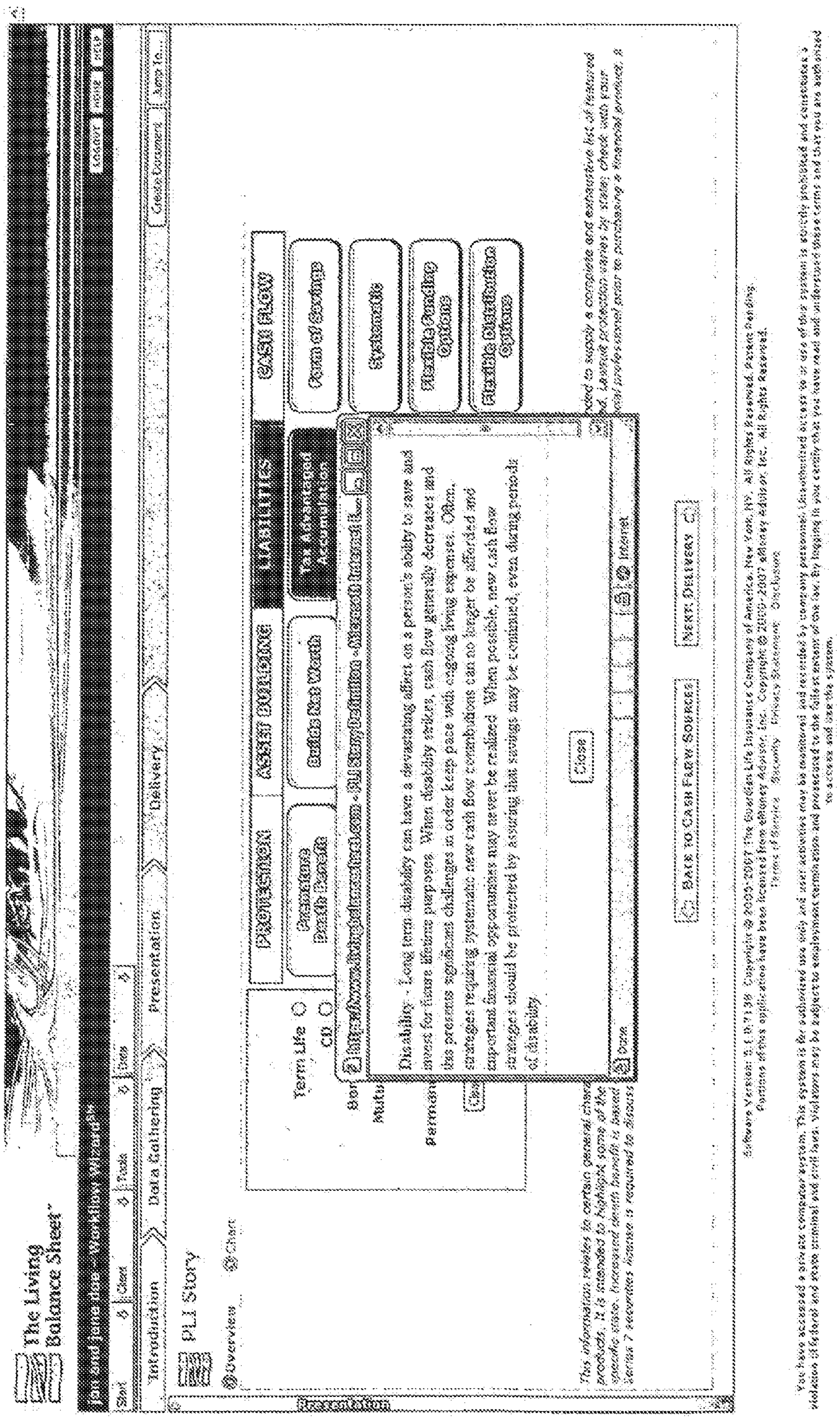

As shown in FIG. 213, in a preferred embodiment, a user can, for example, position a pointer over a particular subcategory 2020 and/or click a mouse or push a key on a keyboard to display details or definitions of subcategory 2020 (i.e., to explain the meaning of the subcategory to the user). In FIG. 213, for example, information about Disability is displayed to a user so that the user understands what is meant by Disability and how this subcategory is affected by the purchase of term life insurance.

Figure 214:
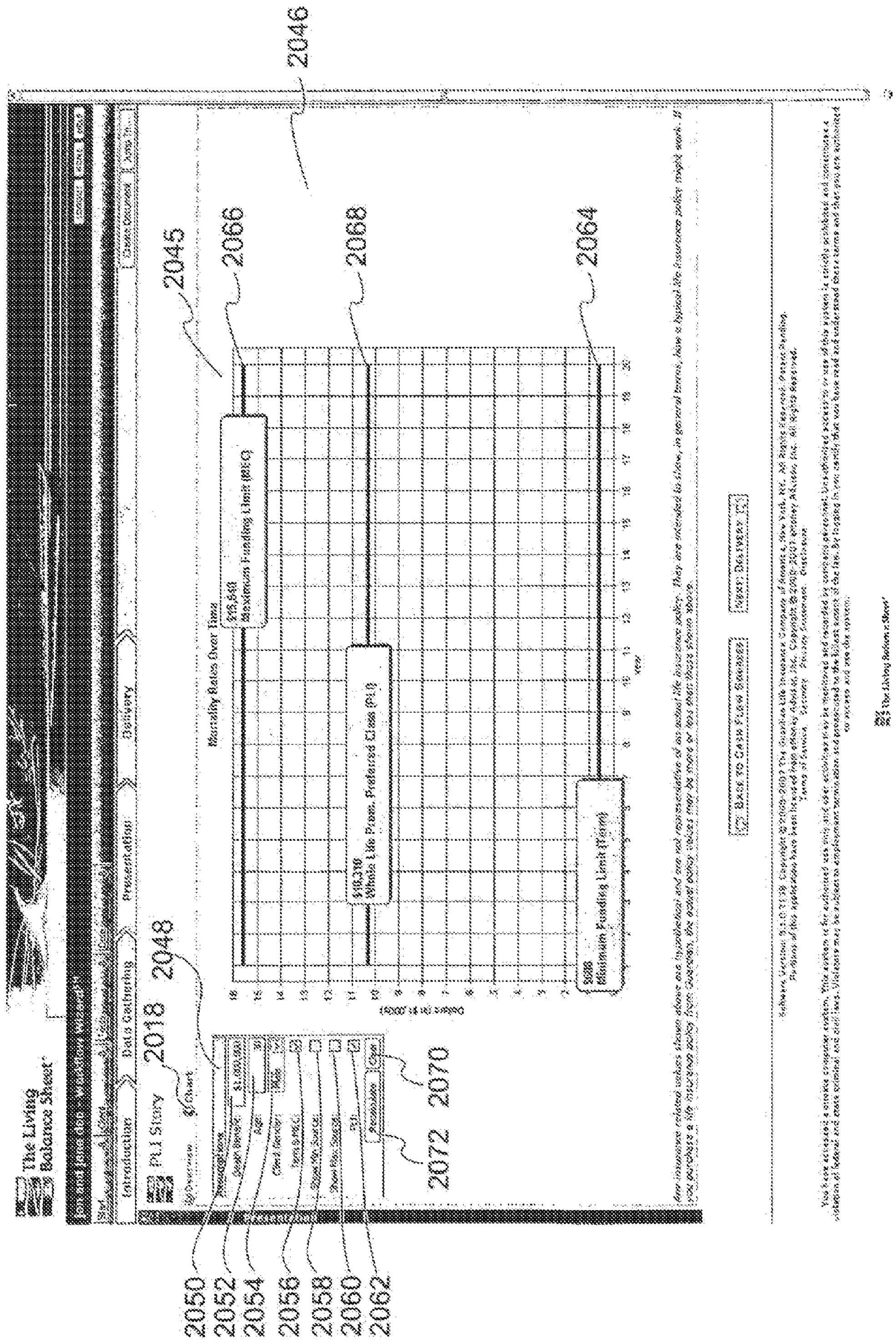
Figure 267:
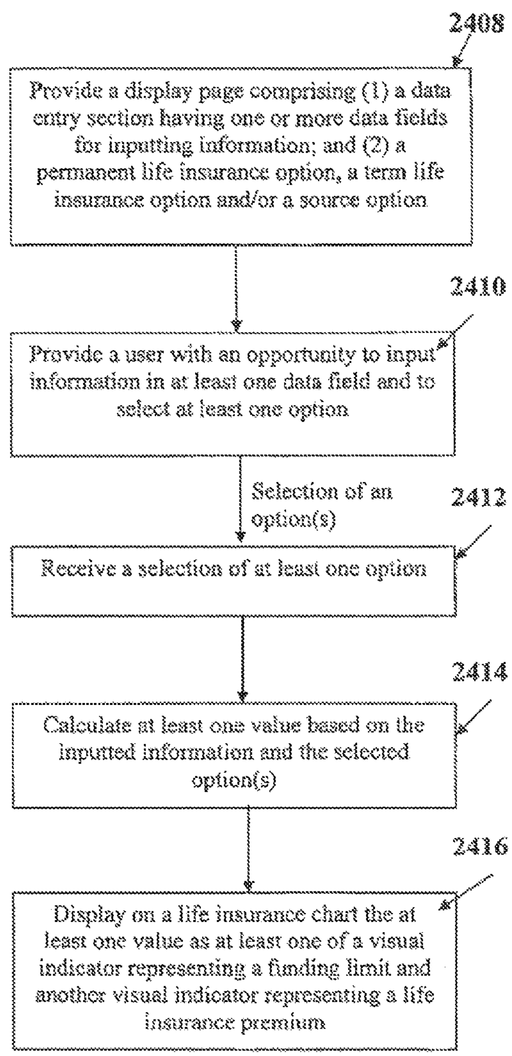

As shown in FIG. 214, a user can also select Chart option 2018 to graphically illustrate the advantage of purchasing permanent life insurance. Techniques can be implemented to analyze long term insurance benefits and to illustrate advantages. In general, as illustrated in FIG. 267, a method of presenting an interactive life insurance chart may include step 2408 of providing a display page comprising (1) a data entry section having one or more data fields for inputting information therein, and (2) at least one of a permanent life insurance option, a term life insurance option, and a source option. A user can be provided with an opportunity to input information in at least one data field and to select at least one option (step 2410). In response to selecting an option(s), the selection of the option(s) can be received by the program (step 2412). At least one value can be calculated based on the inputted information and the selected option(s) (step 2414). Finally, the at least one value can be displayed on the chart as at least one visual indicator representing a funding limit and another visual indicator representing a life insurance premium (step 2416).

For example, as shown in FIG. 214, PLI story display page 2046 can be displayed when a user selects Chart Option 2018. Page 2046 can include data entry section 2048 (with one or more data entry fields) for inputting various information such as the amount of life insurance or death benefit, current age of a customer, and gender. Each input can have its own data field such as death benefit field 2050, current age field 2052 and gender field 2054. Additionally, data entry section 2048 can have a plurality of options 2056, 2058, 2060, 2062 which can be selected by a user so that chart 2045 presents a certain display. For example, option 2056 can be a Term & MEC option, option 2058 can be a Show Min (Minimum) Source option, option 2060 can be a Show Max (Maximum) Source opinion, and option 2062 can be a PLI (Permanent Life Insurance) option. By selecting Term & MEC option 2056, the program can process the request and lines 2064 and 2066 can be displayed on chart 2045. For example, for a $1,000,000 term life insurance policy, line 2064 displays the minimum funding limit or the minimum to fund a term life insurance plan (i.e., the yearly premium)—in this case, $600 per year. In addition, in some embodiments, selecting option 2056 can also display a maximum funding limit or MEC (Modified Endowment Contract). Line 2066 illustrates the MEC, which is the maximum funding limit per year for tax deferred/tax free savings allowed by the federal government (IRS) for a life insurance policy. The maximum limit can be based on age of the insured (customer) and face amount of the policy. As shown in FIG. 214, a $1 million policy for a person 30 years olds, the current MEC is $15,640 but, as understood by those skilled in the art, may change from time to time. While Term and MEC are shown together, it should be understood that, in some embodiments, Term and MEC can appear separately.

Figure 216:
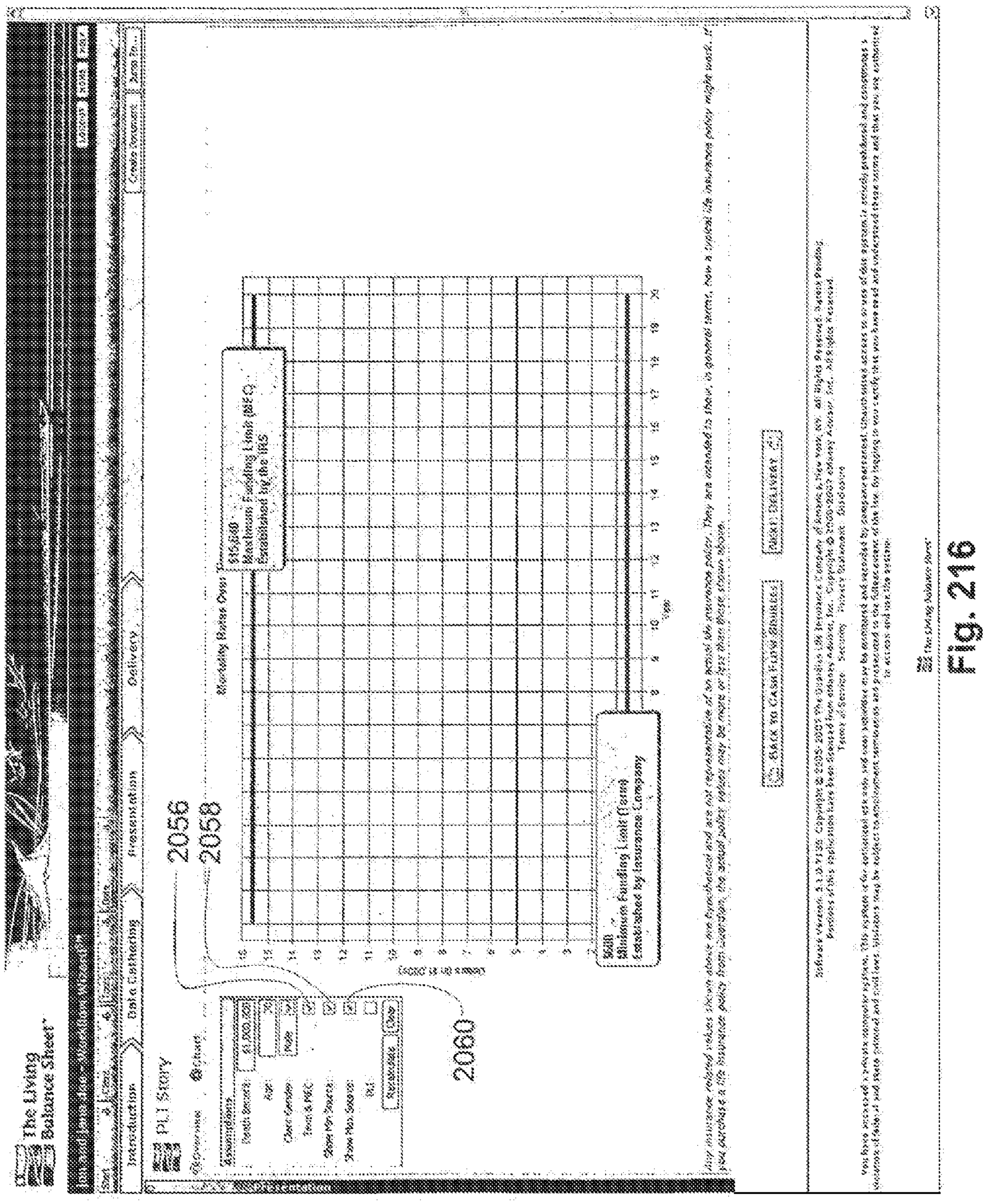

As shown in FIG. 216, by selecting Show Min. Source option 2058, text can be displayed which indicates to a user that an insurance company is responsible for setting the minimum term life insurance policy limit. Moreover, by selecting Show Max. Source option 2060, text can be displayed which indicates to a user that the U.S. government or Internal Revenue Service is responsible for setting the maximum funding limit for an insurance policy.

When PLI option 2062 is selected with Term & MEC option 2056, as shown in FIG. 214, the request can be processed and line 2068 is displayed on chart 2045. For a $1,000,000 permanent life insurance policy, line 2068 (FIG. 214) displays the cost to fund such a plan (i.e., the premium) is $10,310. Typically, a portion of the $10,310 premium can be invested and can be used to build up what is commonly referred to as cash value of the account. In this way, a person's money can be invested tax deferred/tax free.

Chart 2045 (FIG. 214) illustrates to a customer that by purchasing term life insurance, a customer is not taking full advantage of the tax deferred/tax free savings allowed by the federal government. Moreover, chart 2045 can be used to illustrate the advantage of purchasing permanent life insurance by selecting PLI option 2062. In particular, chart 2045 of FIG. 214215 illustrates that compared to purchasing term life insurance (which cost $600 per year) by purchasing permanent life insurance, a person can put more money in tax deferred/tax free savings and get closer to the maximum tax deferred/tax free savings allowed by the government. Term life insurance, on the other hand, does not allow for a customer to build cash value and invest money tax deferred or tax free. Moreover, by purchasing permanent life insurance, a person can over-fund the plan by paying above and beyond the cost of the policy premium (i.e., over-funding the plan). A person can invest up to the $15,640 a year (i.e., an additional $5,330 more than the $10,310 premium). The cash value can be invested tax deferred/tax free and can be borrowed during a customer's life time. At death, a customer's beneficiaries receive the full amount of the insurance policy, $1 million less any money which was borrowed from the cash value. Moreover, if a customer decides to give up or surrender all or a portion of his/her life insurance policy before death, the customer will receive the cash value or a percentage thereof from the insurance company. The cash value has grown tax deferred/tax free and if a customer is, for example, retired and in a lower income tax bracket, such an investment strategy can save a customer considerable amounts of money in income tax.

As such, PLI story display page 2046 interactively displays the relationship between term life, permanent life, and MEC to inform the user of expected PLI rates and its full long term advantages under the tax code.

Figure 215:
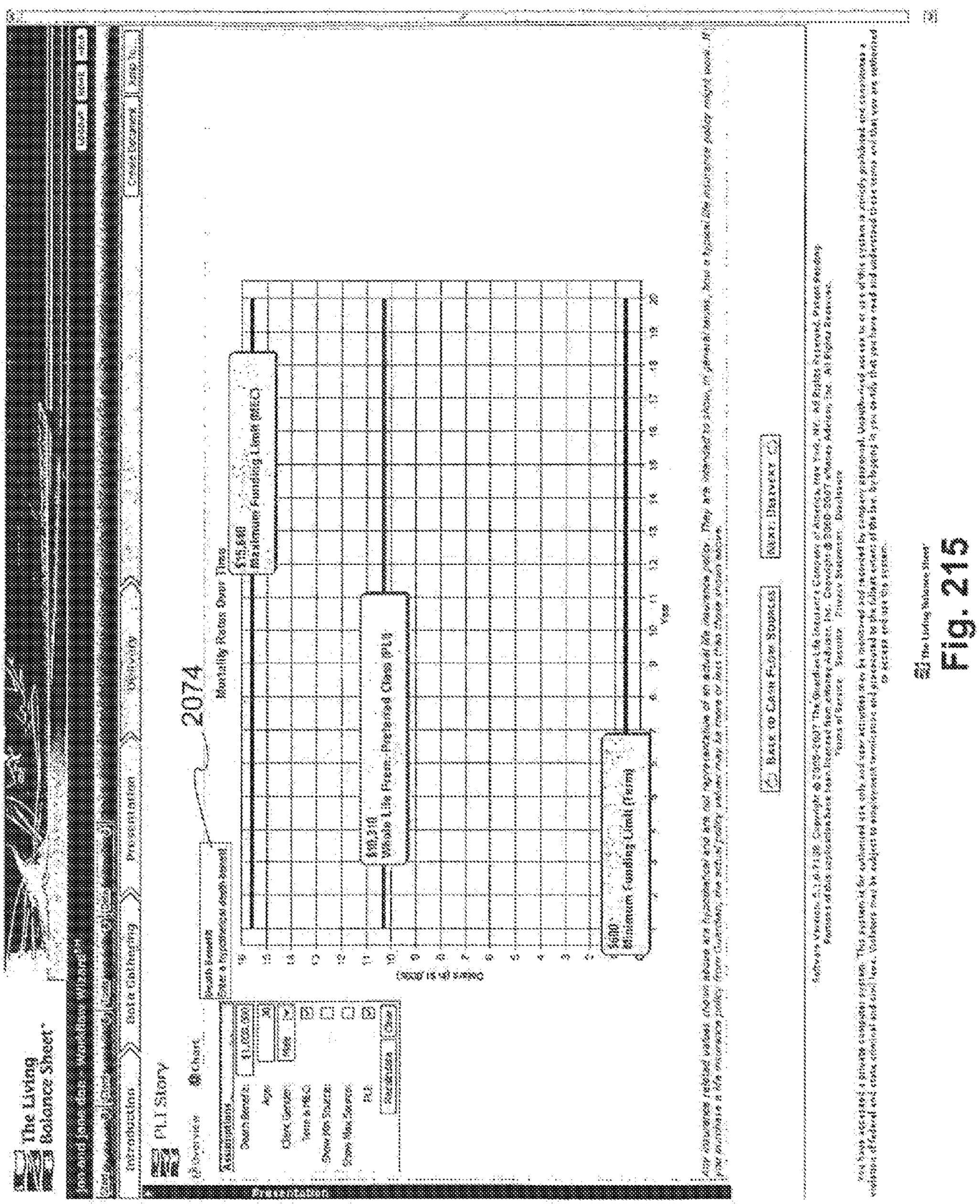

Clear button 2070 and recalculate button 2072 may also be provided. Clear button 2070 can be used to clear all inputted data from data entry section 2048 to allow for new data to be entered. Recalculate button 2072 can be used to provide a new illustration or chart upon input of new data in field 2050, 2052, 2054 (FIG. 214) and selection of one or more options 2056, 2058, 2060, 2062 (FIG. 214). In a preferred embodiment, as shown in FIG. 215, a pointer can be positioned on or around field 2050, 2052, 2054 (FIG. 214) or option 2056, 2058, 2060, 2062 (FIG. 214) so that an information message, such as box 2074, pops up/appears on a screen and provides information or instruction to the user as to what information needs to be entered. Such a box can be implemented for other options or fields as illustratively provided herein. If desired, information, including charts, can be automatically updated (e.g., as the user enters data, periodically, etc.).

Figure 217:
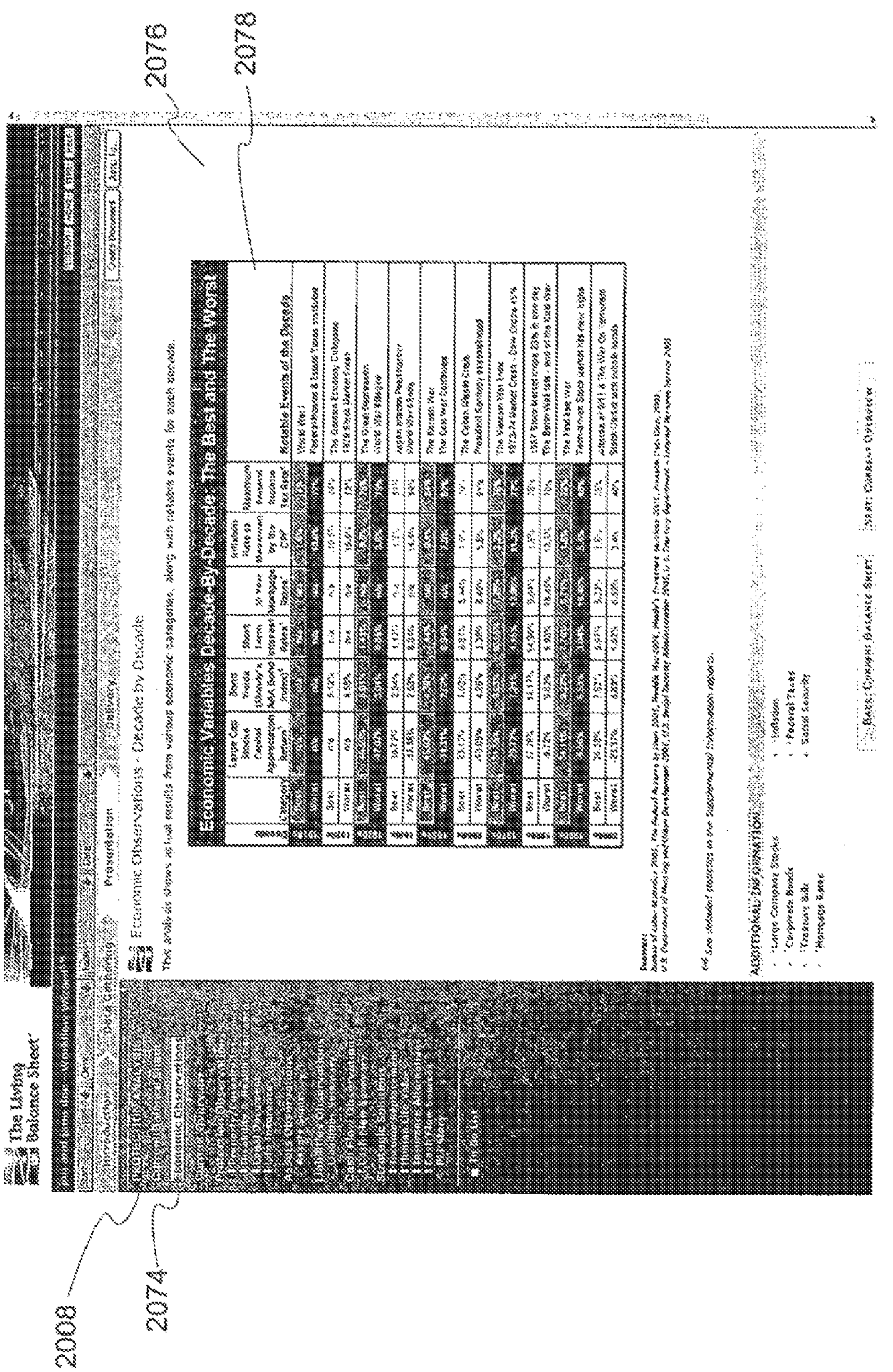

As shown in FIG. 217, economic overview page 2076 in field 2008 can be displayed in response to a user selecting economic analysis option 2074. In a preferred embodiment, as shown in FIG. 217, software can process the request and page 2076 displays chart 2078 of economic variables by decade. In particular, chart 2078 shows the best and worst percentage rates for categories such as capital appreciation return on large cap stocks, bond yields, short term interest rates, 30 year mortgage rates, inflation rates and maximum federal income tax rate. In addition, chart 2078 can also show notable national or world events which may have affected various categories.

Figure 218:
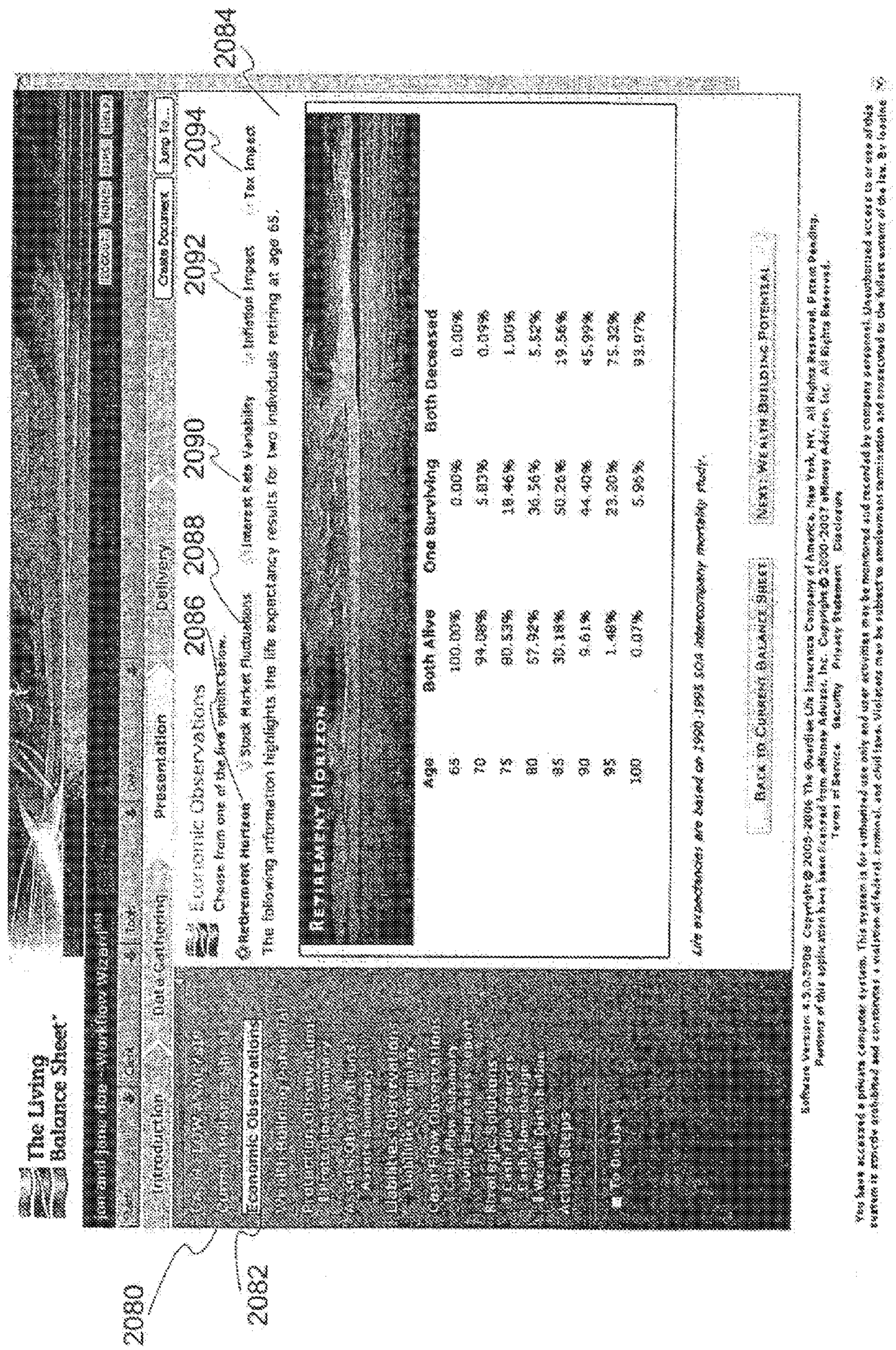

Instead of selecting Protection Analysis link 2004 (FIG. 204), a user can click or select Cash Flow Analysis link 2006 (FIG. 204). As shown in FIG. 218, software can process the request and, in response, list of options field 2080 can be displayed. A user can click or select a particular option to create a presentation. Within list of options field 2080 a user may select Economic Observations option 2082 to display Economic Observations Display page 2084. In response, for example, Retirement Horizon option 2086, Stock Market Fluctuations 2088, Interest Rate Variability 2090, Inflation Impact 2092 and Tax Impact 2094 can be displayed. Option 2086, 2088, 2090, 2092, 2094 can be selected by positioning a pointer on the word "Retirement Horizon," "Stock Market Fluctuations," "Interest Rate Variability," "Inflation Impact," and "Tax Impact" and, for example, clicking a computer mouse or pushing a key on a keyboard or similarly selecting an area (e.g., circle or box) positioned adjacent to the words.

When Retirement Horizon option 2086 is selected, software can process the request and the display page can be displayed to include retirement horizon information. Page 2084 can be arranged in a number of columns and rows showing life expectancies at various ages. In particular, mortality statistics can be presented that show the odds (e.g., as a percentage) of spouses surviving to certain ages if both spouses are alive or if one spouse is alive. Alternatively, section 2084 can show the odds of both spouses surviving to certain ages. Such mortality statistics can be used to illustrate to a customer that there is significant chance that one spouse will outlive the other spouse and will live well into old age and, thus, long term financial planning is important.

Figure 219:
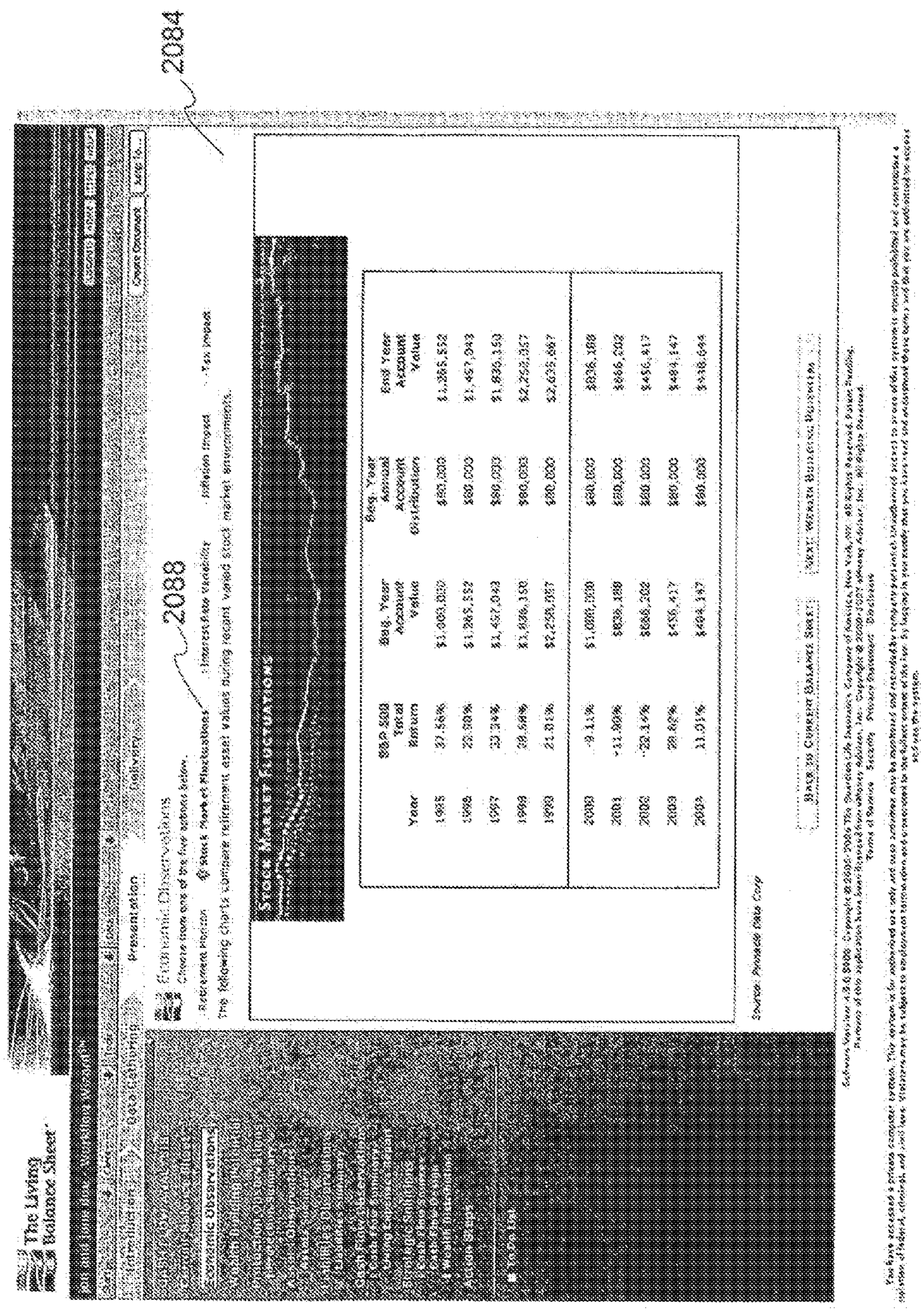

As shown in FIG. 219, when Stock Market Fluctuations option 2088 is selected, software can process the request and page 2084 can be arranged to show a hypothetical scenario tracking an investment in the stock market over a period of time with cost of living expenses being deducted. Specifically, Stock Market Fluctuations option 2088 can be designed to illustrate a retirement scenario. For example, page 2084 can show an investment in stocks which tracks the Standards & Poor's index over a number of years. In particular, page 2084 shows a retirement scenario in which a person retires in 1995 with $1 million and a person retires in 2000 with $1 million. Such an example illustrates that if a customer took out $80,000 each year for cost of living expenses, an investment of $1 million in 1995 would have resulted in a balance of $2,635,667 after 5 years. If the same person decided to retire in 2000 with $1 million and used $80,000 for living expenses that person would have only $448,644 after 5 years. Such a scenario illustrates the uncertainty of investments and the importance of financial planning.

Figure 220:
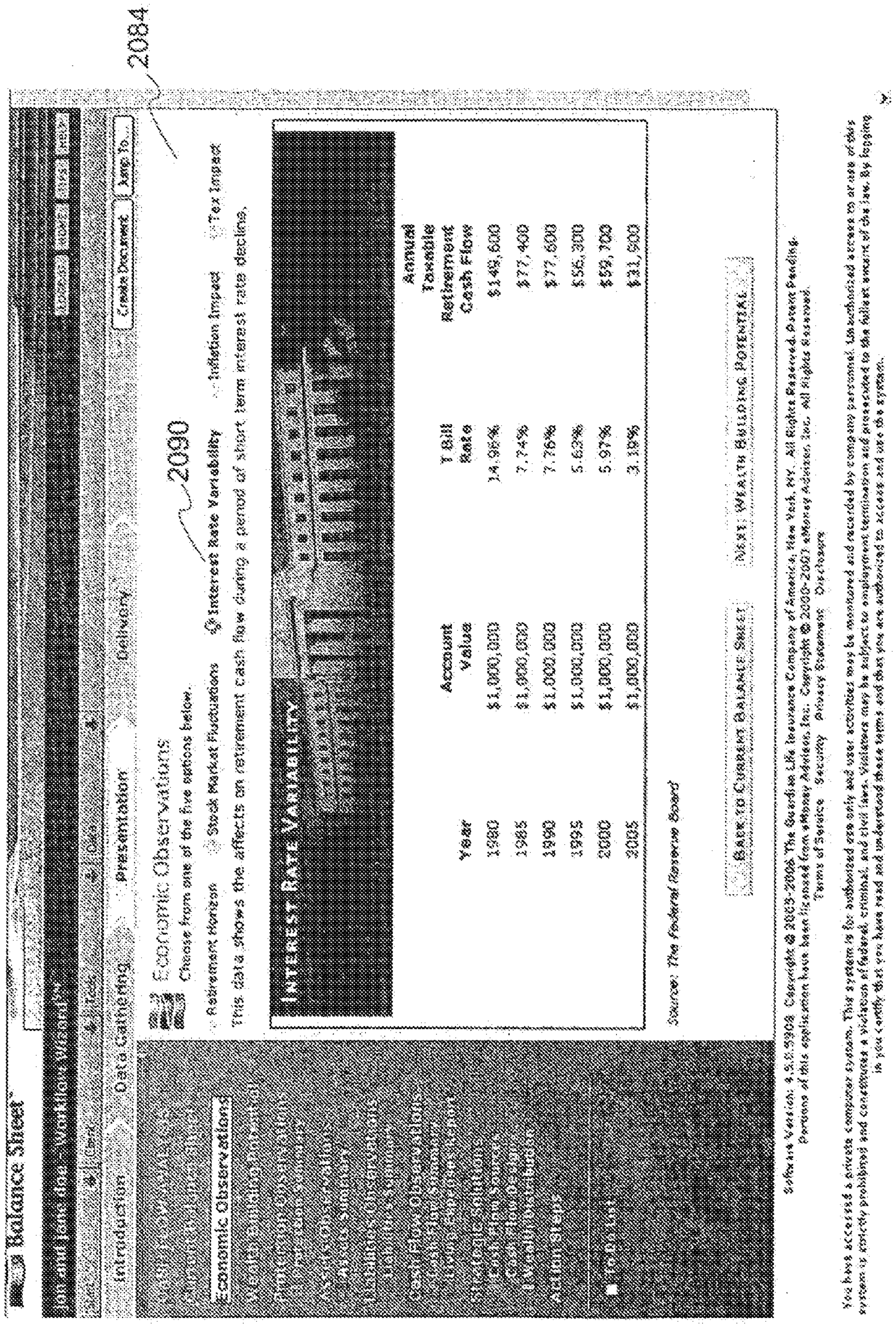

As shown in FIG. 220, when Interest Rate Variability option 2090 is selected, software can process the request and, in response, page 2084 can be arranged to show a hypothetical scenario tracking an investment in Treasury Bills in different years. In particular, Interest Rate Variability option 2090 can be designed to illustrate that retiring in different years can provide one with different levels of cash flow during retirement. Such a scenario may illustrate that in some years interest income alone may be inadequate to cover cost of living expenses. As such, the illustration can demonstrate to a customer the need for life insurance so that the customer can live off more than just interest income during retirement (e.g., spend principal) and still provide for his/her legacy at death. The term legacy can be any person including a spouse, child, other relative, friend or heir.

When planning for retirement, people have traditionally thought in terms of average return on money over years. As FIGS. 219 and 220 illustrate, such a method may be unreliable and leave a person with little or no money during retirement. Accordingly, these figures emphasize the importance of long term planning.

Figure 268:
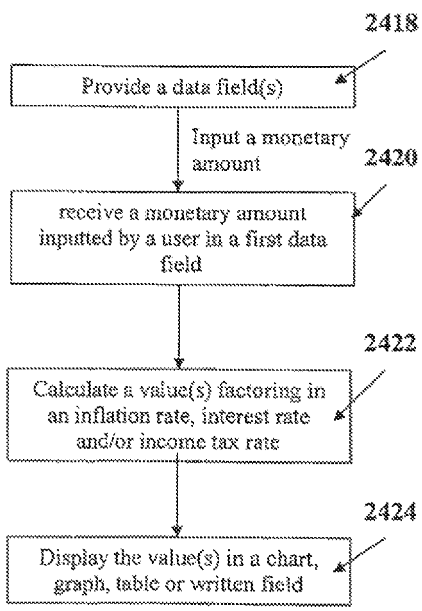

Tools for evaluating inflation in relation to life insurance can also be provided. An illustrative process for use in implementing such tools is illustrated in FIG. 268. As shown, one or more data fields can be provided to a user (step 2418), such that a user can input a monetary amount in a first data field (step 2420). In response to the input, one or more values can be calculated factoring in an inflation rate (step 2422). In response to determining the value(s), the value(s) can be displayed in a chart, graph, table or written field. The process may, for example, be implemented as part of an interactive software tool for insurance professionals.

Figure 221:
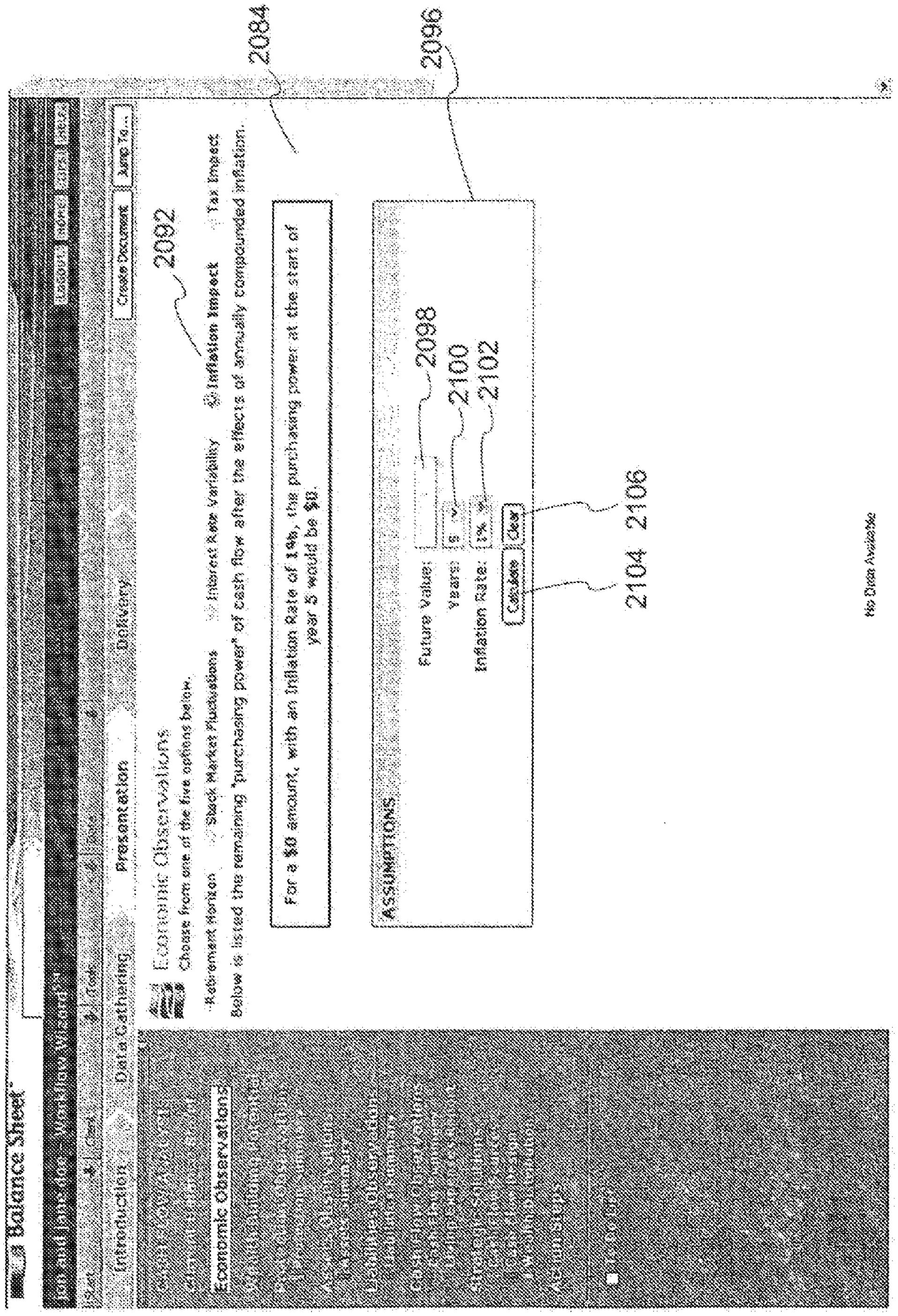
Figure 222:
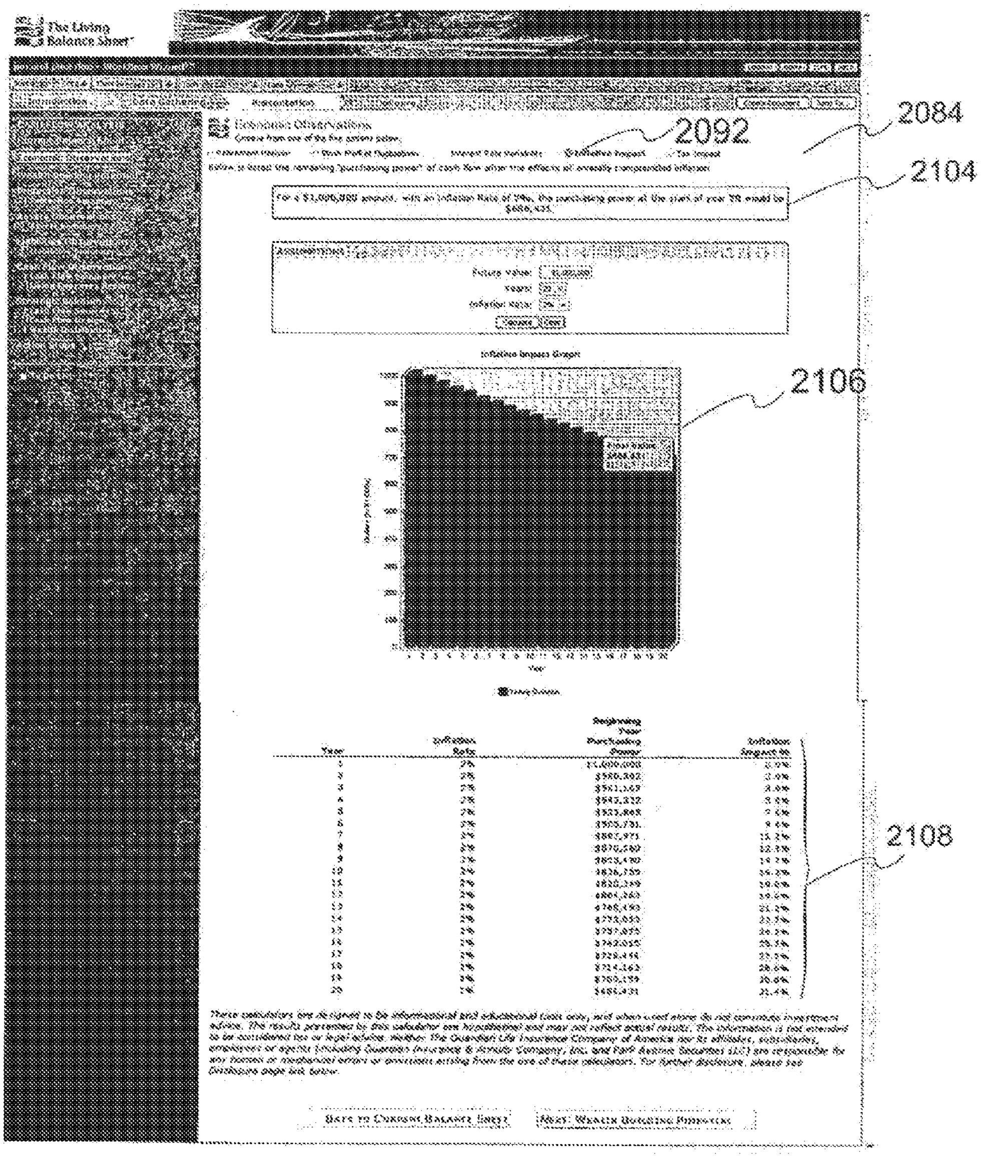

For example, as shown in FIGS. 221-222, assumptions data entry field 2096 can be displayed when a user selects inflation impact option 2092. Data entry field 2096 can provide fields for a user to input various information including, for example, an amount of money in field 2098, a number of years or study period in field 2100 and an inflation rate in field 2102. Calculate button 2104 can be provided to allow a user to initiate software to calculate the present value of money in a number of years and provide a graphical or tabular illustration. Moreover, clear button 2106 can also be provided to allow a user to clear fields 2098, 2100, 2102 so that a user can create an alternate scenario. Such a tool enables customers to have a realistic view of how much an amount of money today will be worth a certain number of years in the future. In other words, a customer's purchasing power in the future. As shown in FIG. 222, if a customer has $1 million today, 20 years from now with inflation at 2% every year, a user will have the equivalent of $668,431 as shown (the present value of money). Page 2084 can also provide summary area 2104 which summarizes the scenario for a customer (e.g., a single sentence showing all of the factors for a particular scenario). Display page 2084 can also include chart 2106 which illustrates graphically, the value of money for a certain period of time (yearly, monthly, 5-year period, etc.) for the study period. The chart may be, for example, a line chart, a bar chart, etc. In addition, page 2084 can also show table 2108 which illustrates numerically the value of money at various intervals during the study period and the annually compounded inflation rate. Similar to previous scenario, such a tool provides a ready source of analysis for an insurance professional and illustrates to a customer that the customer may have less money during retirement than he/she previously expected.

Tools for evaluating tax cost can also be provided. An illustrative process for use in implementing such tools is illustrated in FIG. 268. As shown in FIG. 268, one or more data fields can be provided to a user (step 2418) such that a user can input a monetary amount in a first data field which can be received by the program (step 2420). One or more values can be calculated factoring in an interest rate and/or an income tax rate (step 2422). Finally, the value(s) can be displayed in a chart, graph, table or written field.

Figure 223:
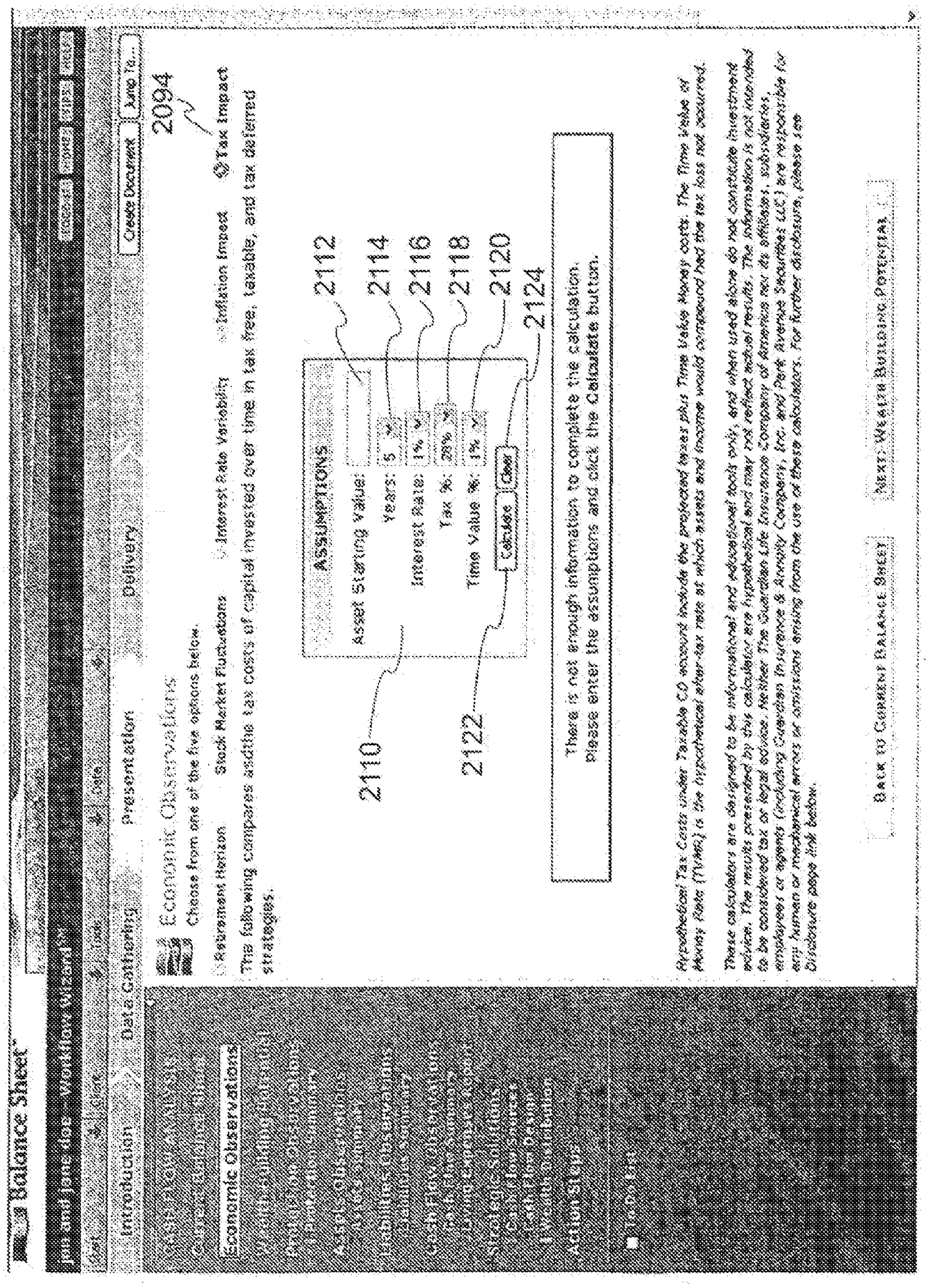
Figure 224:
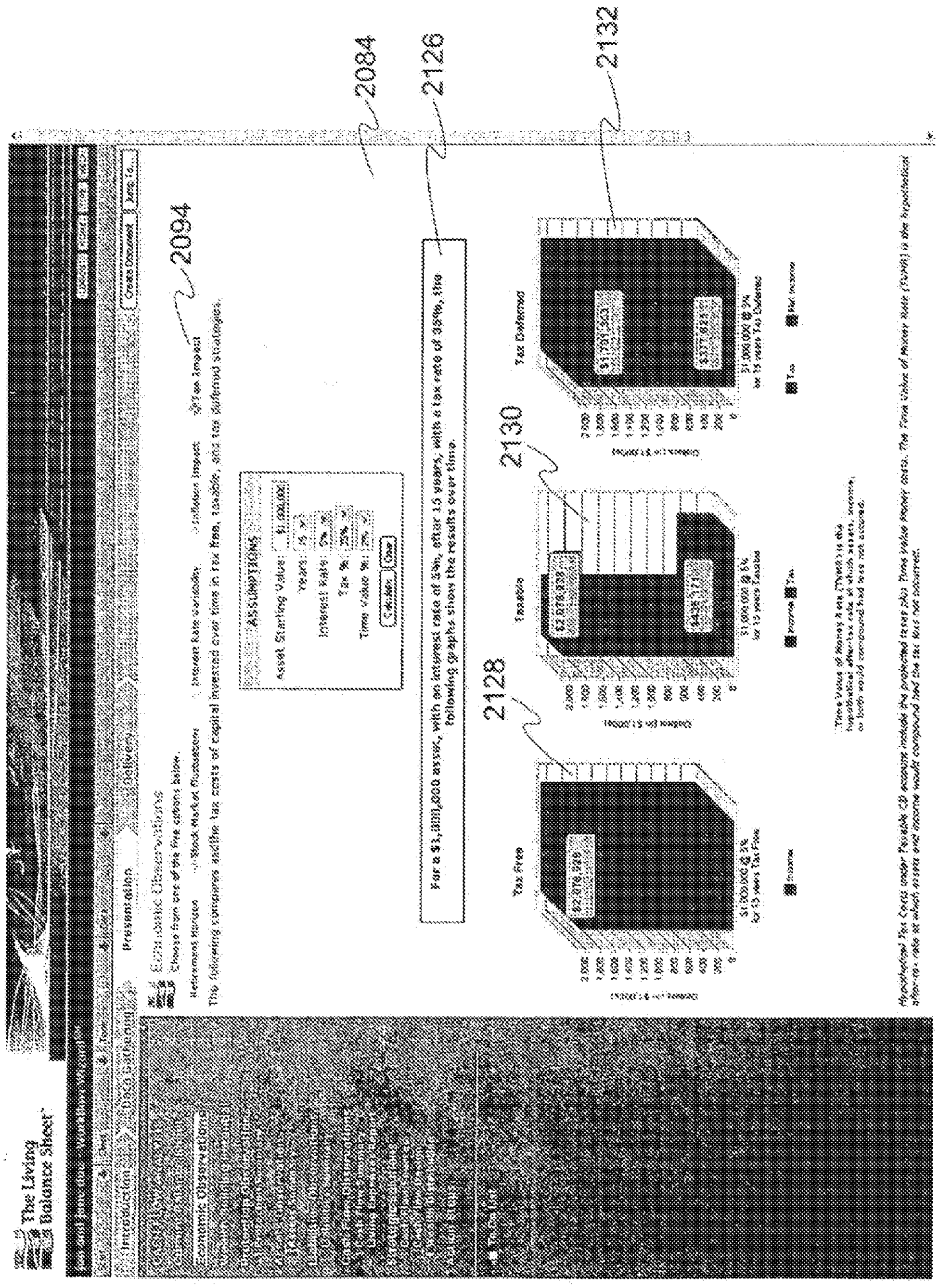

For example, as shown in FIG. 223, when Tax Impact option 2094 is selected, assumptions data entry field 2110 can be displayed and can be used to illustrate to a user tax costs of monies invested over a period of time when the investment is, for example, tax free, taxable and tax deferred. Data entry field 2110 can provide fields for a user to input various information including, for example, an asset starting value in field 2112, number of years or study period in field 2114, interest rate in field 2116, tax rate in field 2118 and time value of money in field 2120. The time value of money rate is the hypothetical after-tax rate at which assets, income or both would compound had loss not occurred (i.e., if a person did not have to pay tax on interest income). Calculate button 2122 can be selected to perform tax calculations. Moreover, clear button 2124 can also be provided to allow a user to clear fields 2112, 2114, 2116, 2118, 2120 so that a user can create an alternate scenario. Such a tool enables a user to generate a realistic view of a client's tax liability, factoring in, for example, inflation rate. As shown in FIG. 224, page 2084 can provide a graphical presentation (i.e., one or more charts). The chart may be, for example, a line chart, a bar chart, etc. The bars or lines representing income may be a first color (e.g., green) and the bars or lines representing tax may be a second color (e.g., red).

In particular, page 2084 can show chart 2128 illustrating a tax free investment, chart 2130 illustrating a taxable investment, and chart 2132 illustrating a tax deferred investment. As shown in the charts, if a customer has a tax free $1 million asset, the customer would not pay any tax. If, on the other hand, a customer has a taxable $1 million asset earning an interest rate of 5% and an income tax rate of 35%, over 15 years and a time value of money rate of 2%, the customer would have paid $436,171 in taxes and have a total income of $2,078,928. In other words, the client would have a net income of $1,642,755. If, however, the asset was a tax deferred investment, at the end of 15 years, the customer would have paid $377,625 and have a net income of $1,701,303. As a result of the 2% time value of money, the customer would have an additional $58,546 of net income investing in a tax deferred investment. Such a tool illustrates the advantages of saving money in tax deferred/tax free investments such as the cash value portion of permanent life insurance. Page 2084 can also provide summary area 2126 which puts the scenario in summary for a user (e.g., a single sentence showing all of the factors for a particular scenario). While the illustration is provided in a graphical form, those skilled in the art will appreciate that a tabular form can be used as well.

Figure 269:
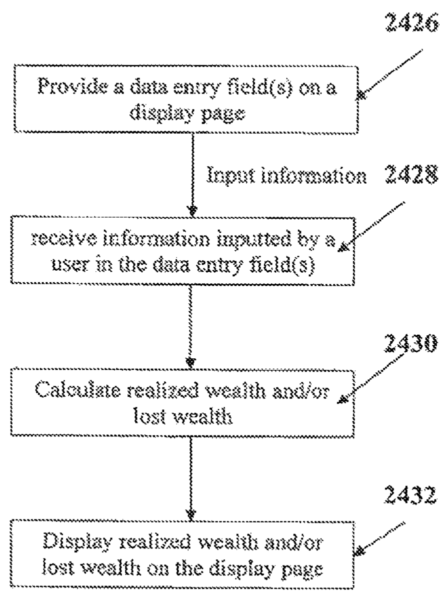

Tools for evaluating lost wealth can be provided. An illustrative process for use in implementing such tools is illustrated in FIG. 269. As illustrated in FIG. 269, one or more data entry fields can be provided (step 2426). Information inputted by a user in the data entry fields can be received by the program (step 2428). Realized and/or lost wealth can be calculated (step 2430). Thereafter, realized wealth and/or lost wealth can be displayed on the display page (step 2432).

Figure 225:
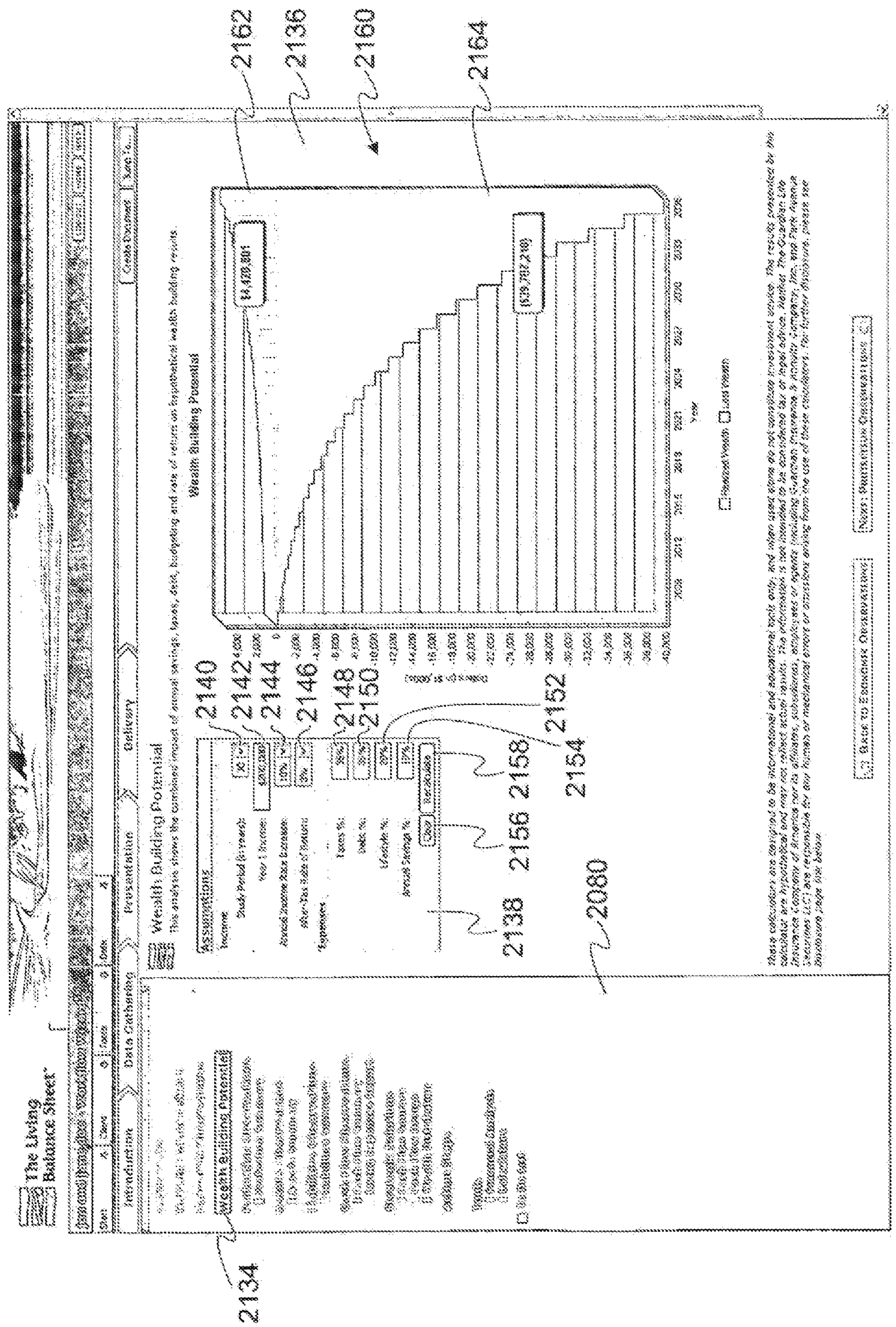

For example, as shown in FIG. 225, within list of options field 2080, a user may click or select Wealth Building Potential option 2134. In response, software can display Wealth Building Potential page 2136. Such a tool can illustrate to a client the combined impact on savings of, for example, annual saving, taxes, debt, and lifestyle expenses (living expenses). In particular, the tool can show a realistic view as to how much money a person can amass during his/her lifetime with expenses factored in and, thus, show a client why he/she will not have as much money at death as the client may have thought. The tool can also show loss of money—whether it is wasted on luxury goods, spent on taxes or services. Such an illustration can provide a client with an illustration of the total amount of money a client should have saved without any expenses.

In one embodiment as shown, data entry field 2138 can be provided in which a user can input various information into the field. For example, data entry field 2138 may have a section for income and a section for expenses. Data entry field 2138 can have field 2140 for a study period (years or months), field 2142 for yearly income, field 2144 for annual income rate increases (e.g., bonuses or raises), field 2146 for after-tax rate of return (e.g., interest income after taxes), field 2148 for percentage/amount of income going towards income tax, field 2150 for percentage/amount of income going towards debt (e.g., mortgage, student loans, credit cards payments), field 2152 for percentage/amount of income going towards lifestyle/living expenses (e.g., food, entertainment, vacations), and field 2154 for percentage/amount of income going towards savings. If desired, the fields can be dynamically updated without the need for a recalculate button so as a user changes percentage/amount in one field, one or more fields are automatically or dynamically updated to reflect a change in percentage/amount. For example, if field 2148 was 35%, field 2150 was 35%, field 2152 was 20% and field 2154 was 10%, changing field 2154 to 5% results in the program processing the information and changing the percentage rate in one or more fields 2148, 2150, 2152 to increase by a total of 5%. While data entry field 2138 does not have a field for inflation rate or other factors that may affect income, those skilled in the art will appreciate that such a field is contemplated so that the graphical illustration takes into account inflation.

Recalculate button 2158 can be provided to allow a program to calculate the amount of money that can be built up and/or lost over a period of time. If any information is missing from a field when recalculate button 2158 is clicked or selected, a message may be presented to user directing the user to the missing information and informing the user that the information is necessary to proceed to the next step. Those skilled in the art will appreciate that a message can be presented to the user, for example, in the form of a pop-up box where required information to create a presentation is missing. Moreover, clear button 2156 can also be provided to allow a user to clear fields 2140, 2142, 2144, 2146, 2148, 2150, 2152, 2154 so that a user can create an alternate scenario.

Once all required information is entered and a user clicks or selects recalculate button 2158, software can process the request (e.g., by sending it to a remote server). In response, chart 2160 can be displayed on the same page 2136 or a user may be directed to another page. Chart 2160 can illustrate amount of realized wealth 2162 (the amount of money which a person has saved) and/or amount of lost wealth 2164 (amounts of money which a person has paid out to taxes, living expenses, etc). The chart may be, for example, a line chart, a bar chart, etc. The bars or lines representing realized wealth may be a first color (e.g., green) and the bars or lines representing lost wealth may be a second color (e.g., red). The colors may provide a viewer with a clear visual representation of how much wealth a client is actually accumulated or lost. In addition or instead of the chart, realized wealth or lost wealth can be illustrates in tabular form with monetary values being presented in display page 2136.

Figure 226:
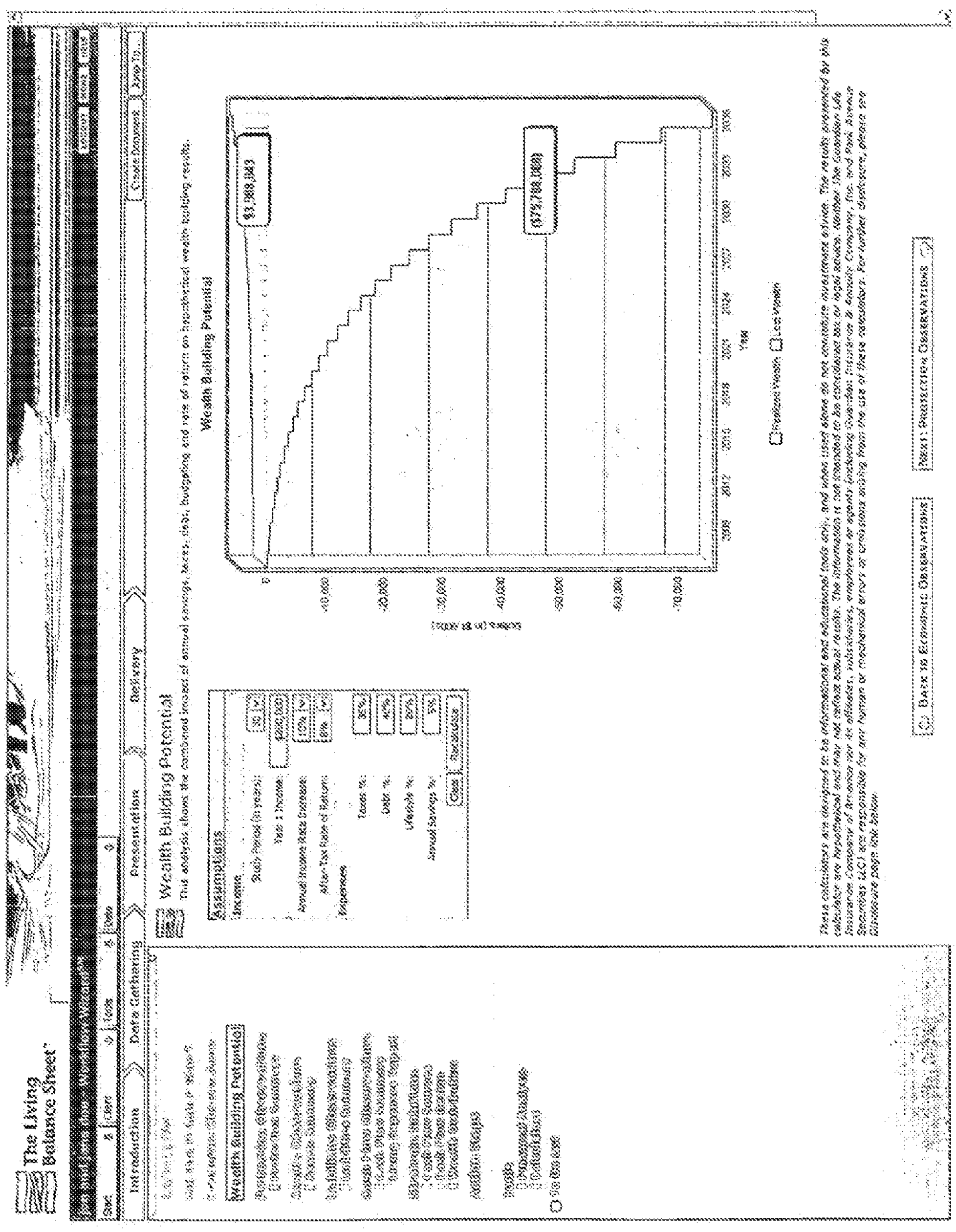

The Wealth Building Potential tool can graphically illustrate to a customer that increasing the percentage of income saved with a lower interest rate for investments (less risk) has a more dramatic effect on building wealth than saving less money and earning a high interest rate on investments (which may involve greater risk). As can be seen by comparing FIGS. 225 and 226, a 5% saver (i.e., a person who saves 5% of his/her salary per year) and earns 8% interest is going to build less wealth than a person who is a 10% saver and earns 3% interest. In particular, other factors being equal (i.e., 30 year period, $200,000 income, 10% salary increase per year), the 10% saver will have a realized wealth of $4,420,801 whereas the 5% saver will have a realized wealth of $3,988,843. Such a graphical illustration can show customers the impact that savings can have on wealth over time. The illustration also shows that the 5% saver has tens of millions of dollars of more lost wealth than the 10% saver. The illustration can show higher savings outpaces higher returns (higher interest rates) and gives better results, thus illustrating to a customer the advantages of higher savings and lower risk.

Figure 270:
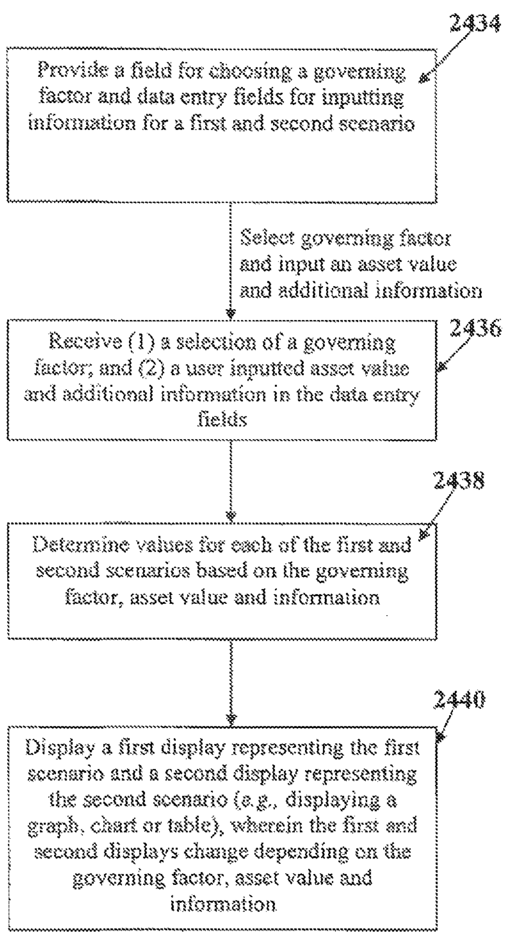

Tools for using governing factors to analyze client information can be provided. An illustrative process for use in implementing such tools is illustratively shown in FIG. 270. In general, as shown in FIG. 270, a field for choosing a governing factor and data entry fields (for inputting various information for a first and second scenario) may be provided (step 2434). A user can select/input a governing factor and input an asset value and additional information in the data entry field(s). The selection of the governing factor and input of an asset value (and additional information) can be received by the program (step 2436). The program can determine the values for each of the first and second scenarios based on the governing factor, asset value and the information inputted by a user (step 2438). A first display representing the first scenario and a second display representing the second scenario can be displayed in the form of a graph, chart or table (step 2440). The first and second displays can change depending on the governing factor, asset value and information inputted.

Figure 227:
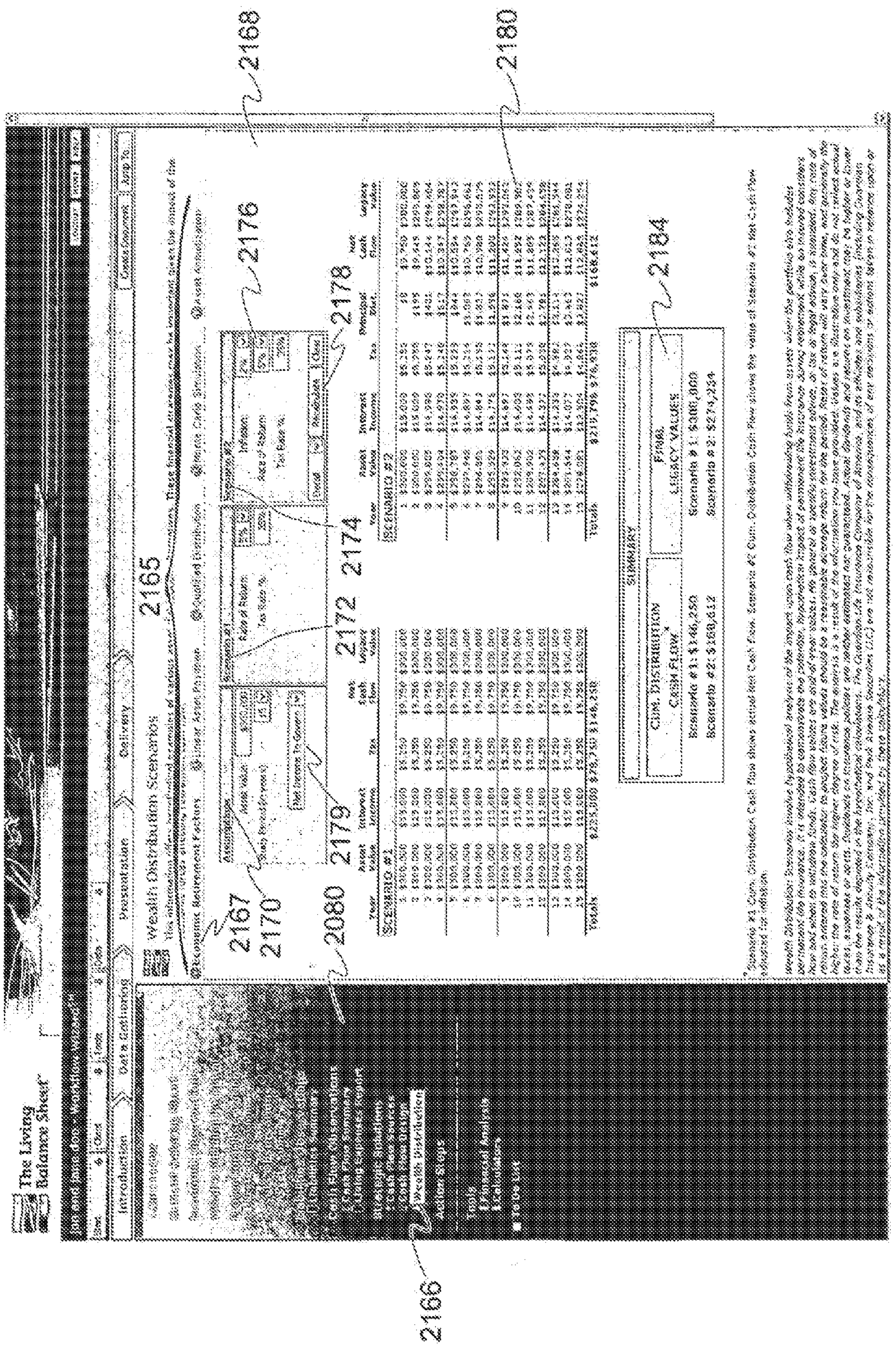

For example, as shown in FIG. 227, a user may click on link 2166, such as the Wealth Distribution link in options field 2080. Software can process the request and, in response, a user may then be presented with list 2165 of asset distribution scenarios. Such a tool can illustrate to a customer various alternatives or scenarios for asset distribution during a period of time. For example, if a user selects first option or Economic Retirement Factors option 2167, the program can process the request and page 2168 can be displayed. Such an option can be used to show a customer how much money the customer will receive from an investment during retirement and/or, upon death, how much will be left to the customer's legacy. Such a tool may also provide customer with a realistic view of wealth by factoring in income taxes and inflation rate.

In one embodiment, as shown, data entry field 2170 can be used to input various basic assumptions such as asset value, study period (e.g., months, years, days, etc.) and governing factors (e.g., net income or legacy to govern investment choices). In a scenario where legacy is the governing factor, the principal can remain unchanged (i.e., the program can calculate values based on the assumption of a fixed principal amount), indicating the customer's preference is to maximize the amount of money left to his/her legacy. In a scenario where net income governs, money will be deducted from the principal to maximize income during a customer's lifetime (i.e., a customer is more concerned about income during retirement and less concerned about his/her legacy). In such an embodiment, the program can calculate values based on the assumption that principal amount is changing. Data entry field 2172 can be used to input information about a first investment scenario (Scenario #1) such as rate of return (i.e., amount of money made on investments) and tax rate (i.e., income tax rate). Data entry field 2174 can be used to input information about a second investment scenario (Scenario #2). In particular, Scenario #2 can allow a user to input the same, different or additional information as was inputted for Scenario #1. One or more additional data fields 2176 may be provided which allows a user to input information such as inflation rate.

For example, as shown in FIG. 227, a user can enter an asset value of $300,000 and a study period of 15 years in data entry field 2170. Under data entry field 2172, a user can enter a 5% rate of return on his/her investment and an income tax rate of 35%. In data entry field 2174, a user can enter a 5% rate of return, a tax rate of 35% and an inflation rate of 2%. A user can then click on recalculate button 2178 which can result in a program processing the request and generating table 2180 illustrating Scenario #1 and #2 based on the inputted information. In the particular scenarios shown, a user has selected the "Net Income to Govern" option in field 2179. Scenario #1 of table 2180 illustrates that various factors such as asset and legacy value, interest income, taxes and cash flow will remain constant every year as inflation has not been taken into consideration. So, a customer presented with such a financial planning model would be under the impression that he/she would receive $146,250 ($9,750 per year) over the study period and the customer's legacy would receive the full $300,000 asset. Scenario #2 of table 2180 provides a more realistic scenario of the effect inflation will have on one or more of the factors (i.e., asset and legacy value, interest income, taxes, cash flow). Scenario #2 illustrates that in order to compensate for inflation, money may need to be taken out of principal so that a customer has the equivalent of $146,250 paid out over the study period. Factoring in inflation, $168,612 would have to be paid out to a customer to get the equivalent of $146,250 at the end of the study period. As principal is withdrawn, the value of the asset would be reduced and, consequently, this would reduce interest income. So, Scenario #2 illustrates that in order to get the equivalent cash flow to Scenario #1 which did not incorporate inflation, the amount of money left to a customer's legacy will be less than the $300,000 expected. In this case, the legacy value will be $274,254.

It should be appreciated that the side-by-side set up of Scenarios #1 and 2 on page 2168 enables a user to compare scenarios on the same screen, thereby avoid flipping between screens and simplifying the comparison. In the preferred embodiment, page 2168 can include summary area 2184 which can provide a customer with, for example, a quick overview of various scenarios placed side-by-side.

Figure 228:
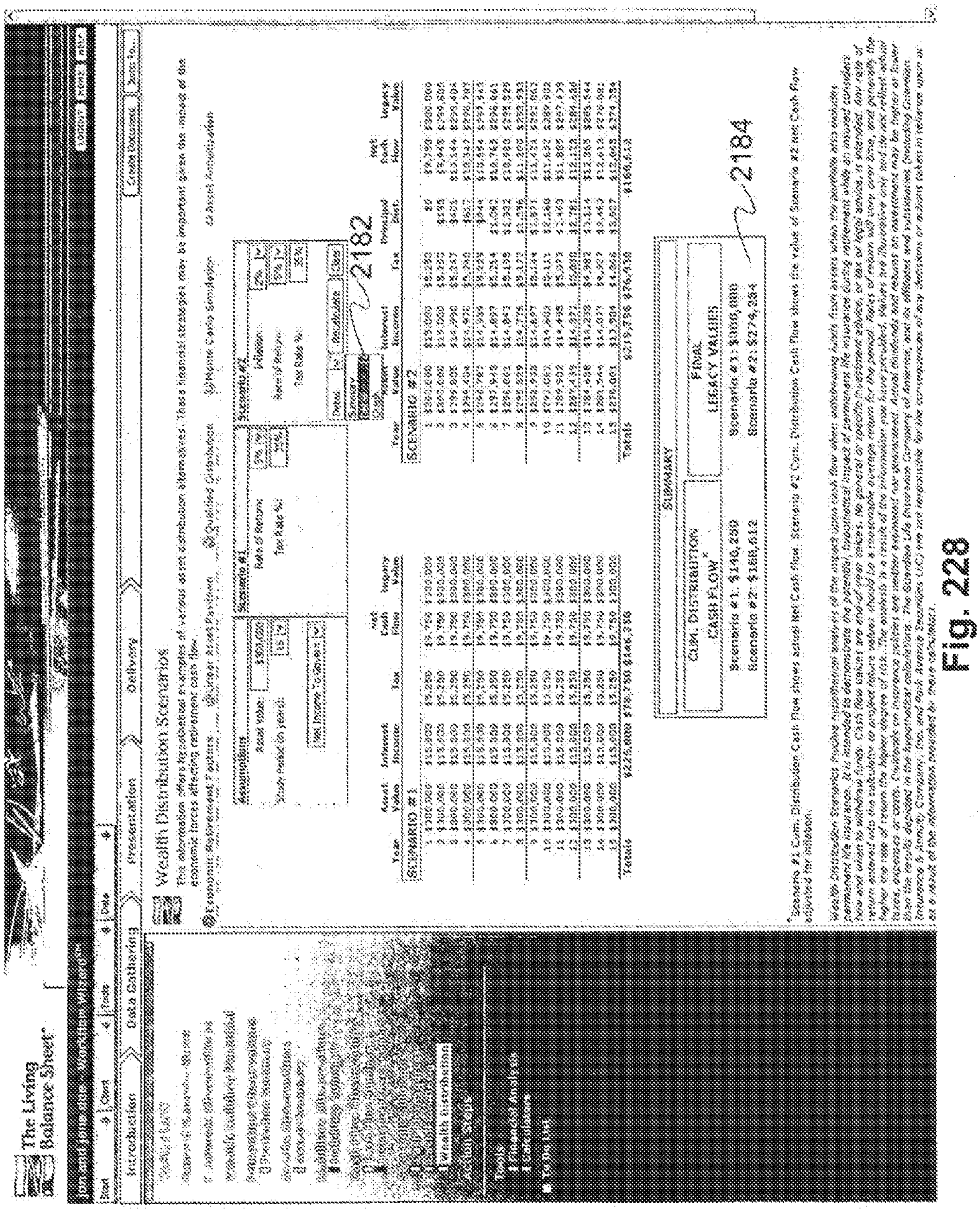
Figure 229:
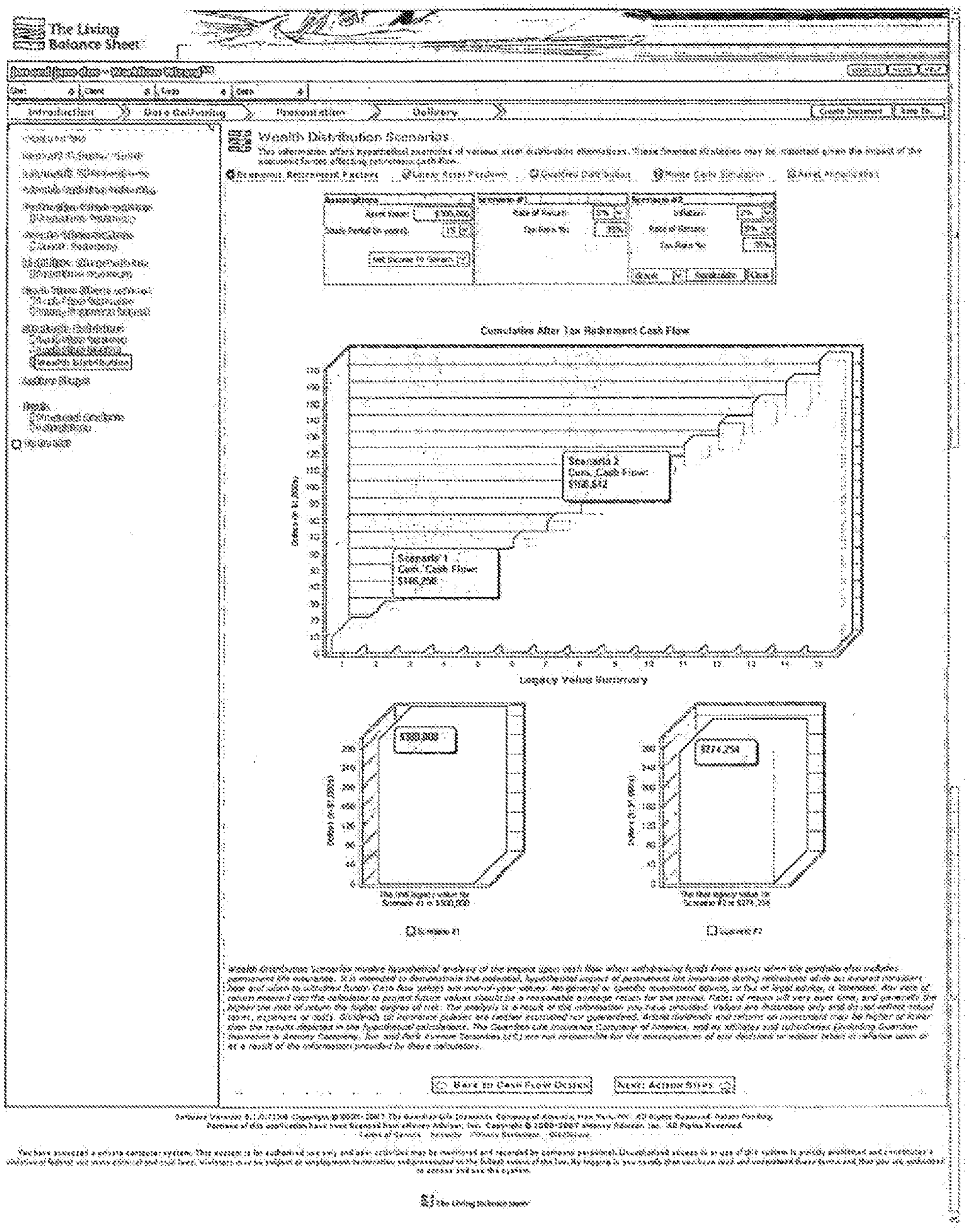

While table 2180 may be used to present scenarios to a customer, it will be appreciated that page 2168 can include option field 2182 (FIG. 228) which can allow a user to select alternative presentation methods such as a graph (e.g., bar graph as in FIG. 229 or line graph) or a brief summary. In one embodiment, a summary may only provide a user with the end of study period totals for asset value, interest income, tax, net cash flow, principal distribution and/or legacy value.

Figure 230:
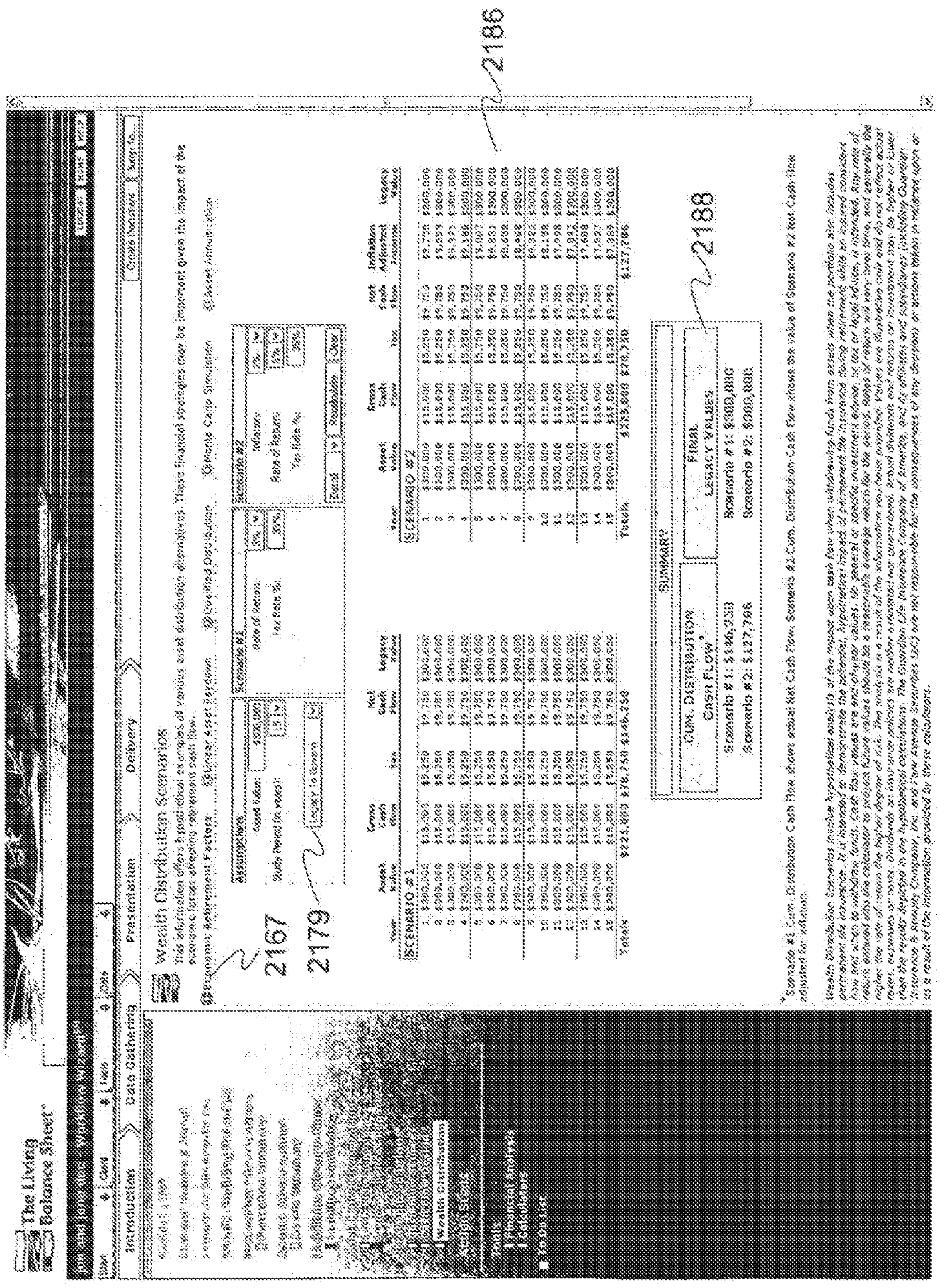

FIG. 230 illustrates a scenario which is similar to the scenario of FIG. 227, however, a user selects "Legacy to Govern" option in field 2179. As shown in table 2186 as well as summary area 2188, choosing the "Legacy to Govern" option keeps the asset and legacy value constant with other factors changing to accommodate for inflation. Such an illustration can show a customer that instead of receiving a cash flow of $146,250 over the 15 year study period (presumably up to death), when inflation is taken into consideration, the end of the study cash flow is actually $127,786. While a client provides her/her legacy with the full value of the asset (i.e., $300,000), the customer will not enjoy as much income during his/her lifetime. Those skilled in the art will appreciate that Economic Retirement Factors option 2167 can be used for other purposes such as providing a tool for determining how factors such as inflation rate, rate of return and tax rate would have to change so that a customer could maximize lifetime cash flow as well as legacy value of assets (i.e., provide legacy with the maximum amount of money). Economic Retirement Factors option 2167 can help illustrate the importance of purchasing life insurance. If a customer purchases life insurance, the customer can take distributions from principal during the customer's lifetime. Life insurance payout at death of a customer will compensate for a customer depleting assets during his/her lifetime. So, a customer gains the advantage of maximizing income during his/her lifetime while still providing for his/her legacy at death. The information for the scenarios is displayed side-by-side for comparison.

Figure 271:
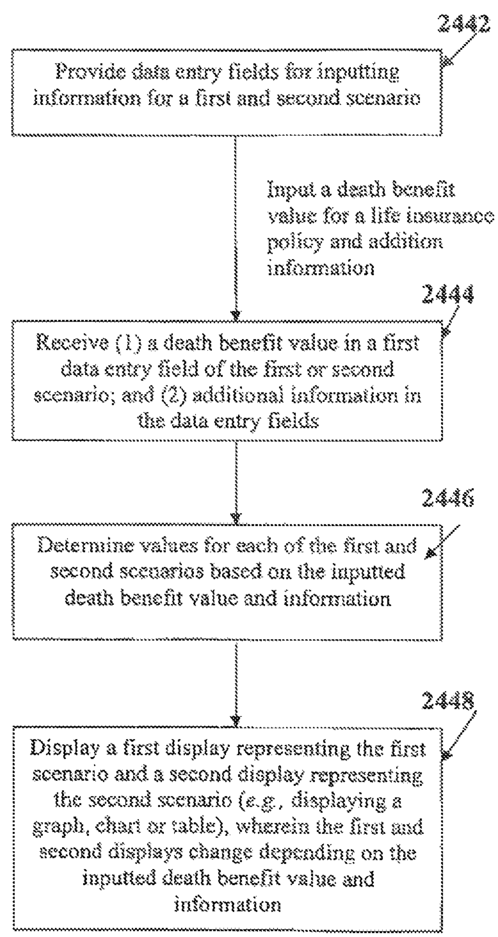

Tools for using a death benefit value to analyze client information can be provided. An illustrative process for use in implementing such tools is illustratively shown in FIG. 271. FIG. 271, for example, illustrates the steps of a method of presenting an interactive life insurance display page. Data entry fields can be provided for inputting information for a first and second scenario (step 2442). A user can input a death benefit value for a life insurance policy and additional information in the data entry fields. The program can receive the inputted death benefit value in a first data entry field of the first or second scenario and additional information inputted in the data entry fields (step 2444). Based on the inputted death benefit value and information, values for each of the first and second scenarios can be determined (step 2446). A first display representing the first scenario and a second display representing the second scenario can be displayed in the form of, for example, a graph, chart or table (step 2448). The first and second displays can change depending on the inputted death benefit value and information inputted by the user.

Figure 231:
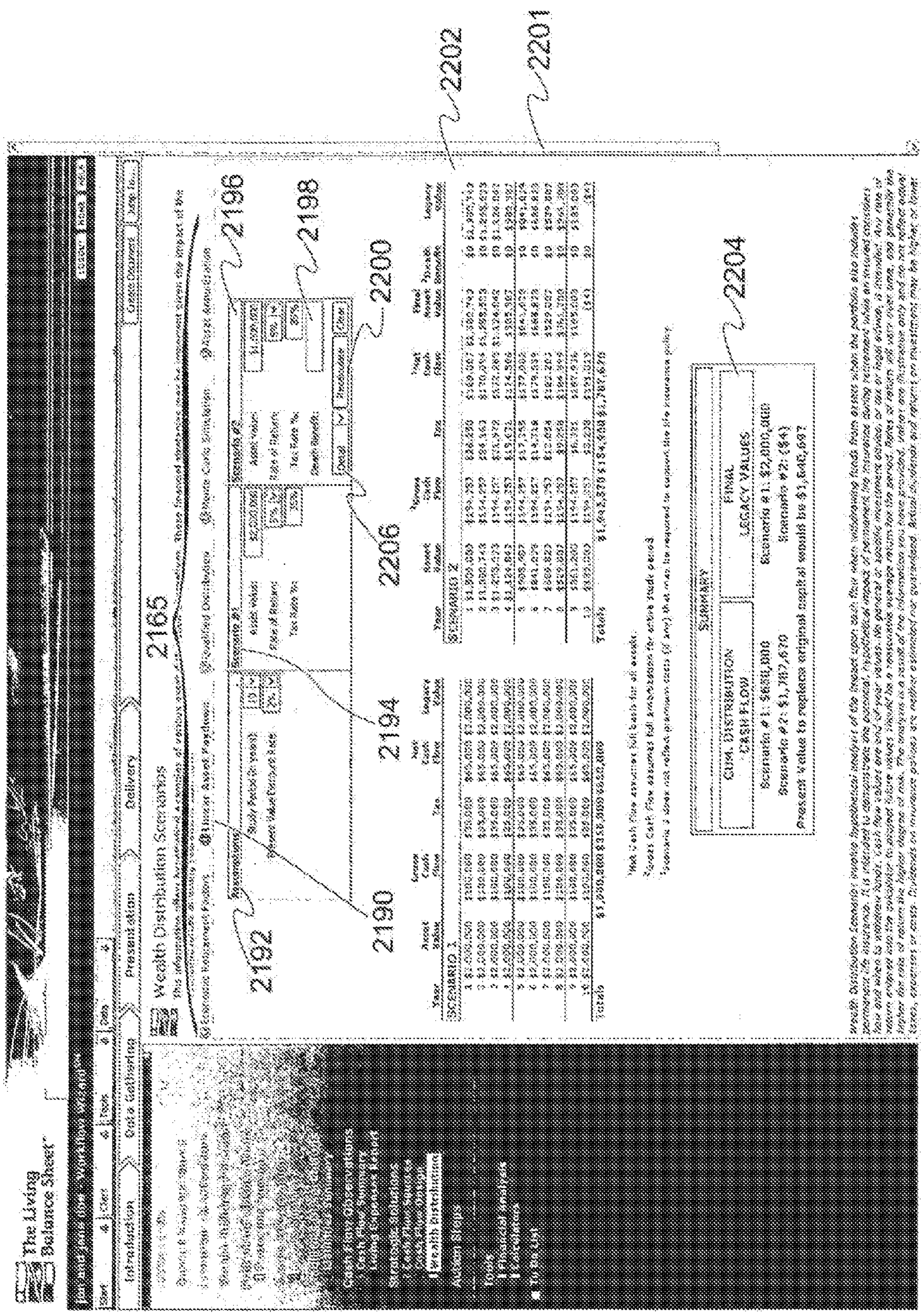

For example, as shown in FIG. 231, other options from the list 2165, such as Linear Asset Paydown option 2190 (in the context of a death benefit value), can provide a customer with an illustration of the advantages of purchasing life insurance. Assets for this option can include CDs, bonds, mutual funds, stocks or other assets that have already been taxed so that there is no tax upon distribution of monies; there is only tax on interest earned. One or more data fields may be provided for inputting various information. For example, data entry field 2192 can be used to input various basic assumptions such as the study period and present value discount rate (i.e., the after-tax rate at which investments, separate from the asset(s) being studied, are growing). Data entry field 2194 can be used to input information about a first investment scenario (Scenario #1) such as asset value, rate of return and tax rate. Data entry field 2196 can be used to input information about a second investment scenario (Scenario #2). In particular, Scenario #2 can allow a user to input the same, different or additional information as was inputted for Scenario #1. One or more additional fields 2198 may be provided which allows a user to input information such as the amount of death benefit from a life insurance policy.

In operation, for example, as shown in FIG. 231, a user can enter a study period of 10 years and a present value discount rate of 2% in data entry field 2192. Under data entry field 2194, a user can enter an asset value of $2,000,000, a 5% rate of return on his/her investment and an income tax rate of 35%. In data entry field 2196, a user can enter an asset value of $1,500,000, a 5% rate of return, and a tax rate of 35%. A user can then click recalculate button 2200. The program can process the request which can result in page 2201 with table 2202 being generated illustrating Scenario #1 and #2 based on the inputted information. In a preferred embodiment, Scenario #1 illustrates maximizing the amount of money left to a customer's legacy. In particular, the principal would remain constant and a customer would receive only interest income during his/her lifetime. Such a scenario would give a customer $650,000 of income during the last 10 years of his/her life with his/her legacy receiving $2,000,000. Moreover, in a preferred embodiment, Scenario #2 illustrates a scenario where a customer is more concerned about receiving income during his/her lifetime for cost of living expenses (e.g., during retirement) and less about the amount of money left to the customer's legacy. In such a scenario, a customer would receive linear distributions of $194,257 every year from the principal. The net cash flow received by the customer would increase every year as the amount of taxes paid on interest income would be reduced. This is due to the fact that the amount of interest income is being reduced as the value of the asset is reduced. The total income or cash flow a customer will receive for the 10 year study period is $1,787,670 which is more than the $650,000 the customer would receive had the customer maintained the principal (i.e., not taken principal distributions). The downside to Scenario #2 is a customer will not leave any money to his/her legacy.

Page 2201 can also have summary area 2204 which illustrates the results of Scenario #1 and #2 in a preferred side-by-side comparison. Additionally, page 2201 can provide the user with information on the amount of money (in this case, $1,640,697) needed to replace the original $1,500,000 that has been spent. In other words, a customer who invested $1,640,697 in year 1 in a separate investment (e.g., in a mutual fund or other asset(s) separate from the $1.5 million dollar asset) will have the present value equivalent of $1,500,000 at the end of 10 years. Having a separate investment assures that if a person lives more than 10 year during retirement, that person will have additional monies for living expenses after 10 years. Alternatively, if a person dies at the end of 10 years, his/her legacy will be provided with money.

It will be appreciated that while table 2202 may be used to present scenarios to a customer, page 2201 can have an option field 2206 (similar to option field 2182 in FIG. 228) which can allow a user to select alternative presentation methods such as a graph (e.g., bar or graph) or a summary. In one embodiment, a summary may only provide a user with the totals at the end of the study period for asset value, gross cash flow, tax, net cash flow, final asset value, death benefit and/or legacy value.

Figure 232:
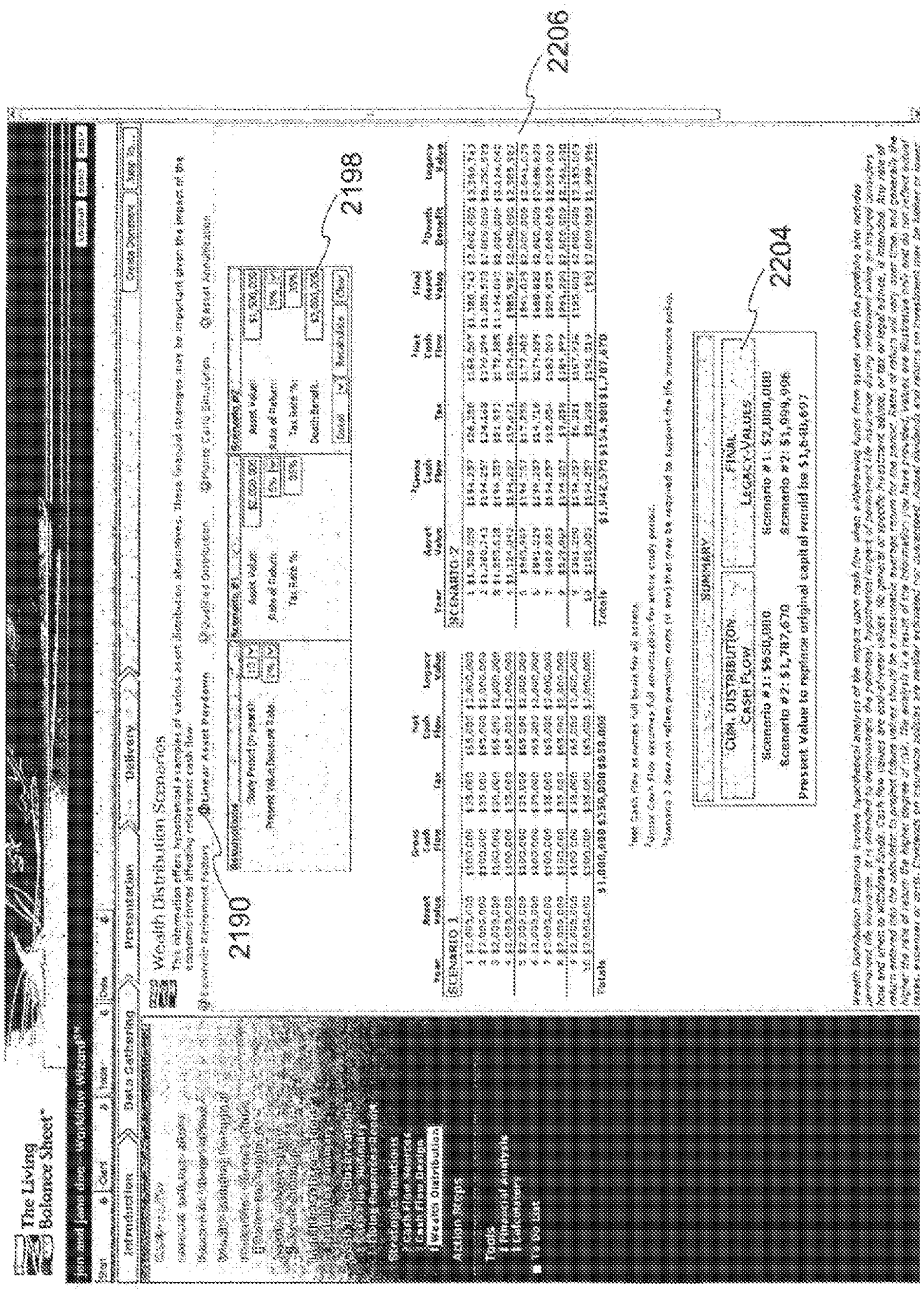
Figure 233:
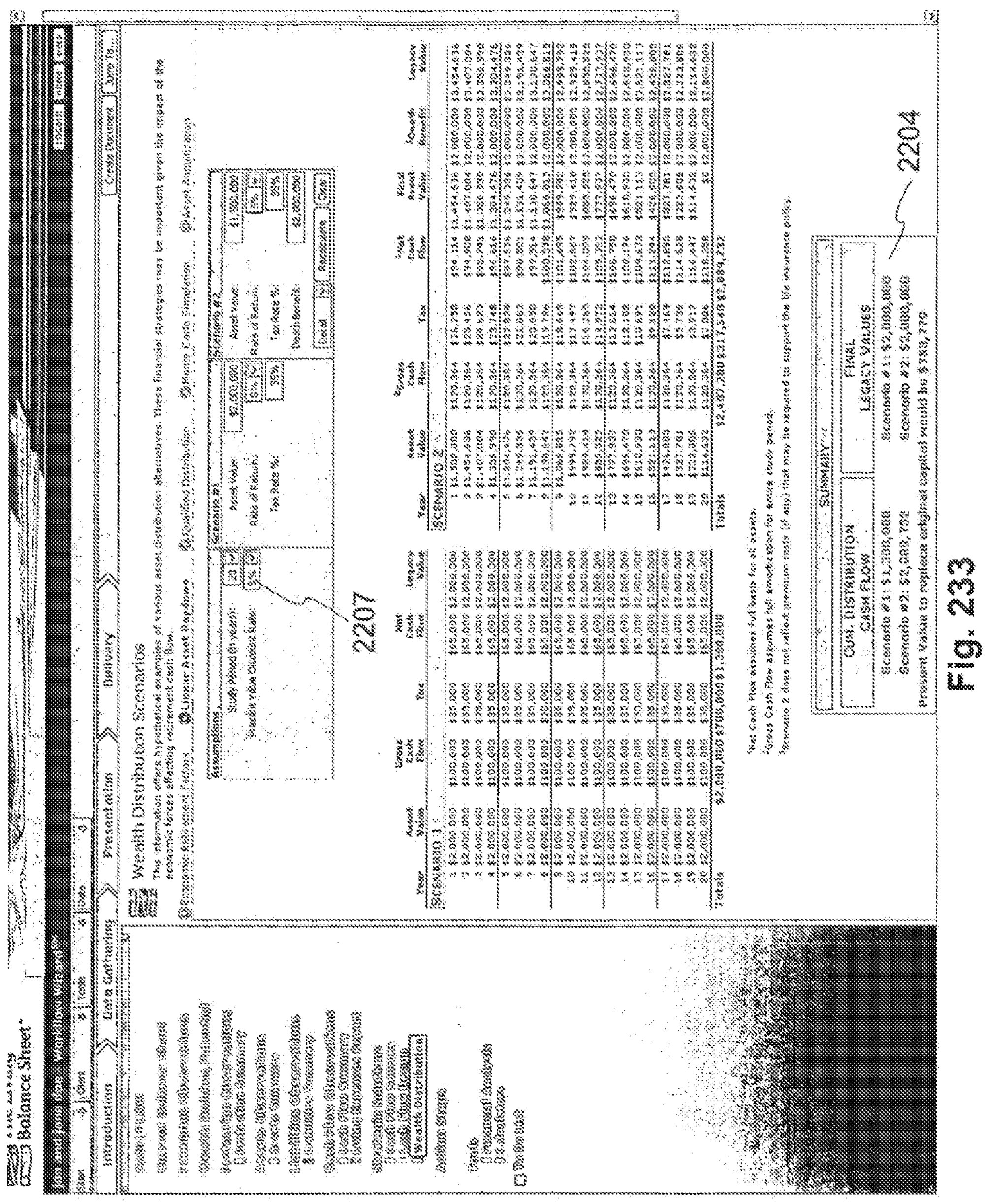

FIG. 232 illustrates an example which is similar to the example of FIG. 231, however, a user inputs a death benefit in field 2198. For, example, the death benefit can be $2,000,000. As shown in table 2026 as well as summary area 2204, adding a death benefit provides money to a customer's legacy at death which the legacy would not have otherwise received. In this case, the legacy value is $1,999,996 and the customer still has income during his/her lifetime of $1,787,670. Linear Asset Paydown option 2190 provides a customer with a valuable tool to recognize the benefit of life insurance. By purchasing life insurance a person having $1,500,000 in assets who purchased life insurance can receive more income during retirement/before death than a person with assets of $2,000,000 who is only living off interest. The person with life insurance will also be able to leave just as much money to his/her legacy at death than the person with $2,000,000 in assets. Similar to FIG. 231, FIG. 232 shows the amount of money (in this case, $1,640,697) needed to replace the original $1,500,000 that has been spent. As illustrated in FIG. 233, the higher the discount rate and the longer the period in field 2192, the less money is required to be invested in year 1 in a separate investment (e.g., a mutual fund) because money has time to grow. In particular, as shown in summary area 2204, only $753,779 is required at year 1 to replenish the original $1,500,000 asset. Such an illustration can demonstrate the benefit of retiring (or spending a pension) earlier rather than later so that the original investment of $753,779 has time to grow.

Figure 234:
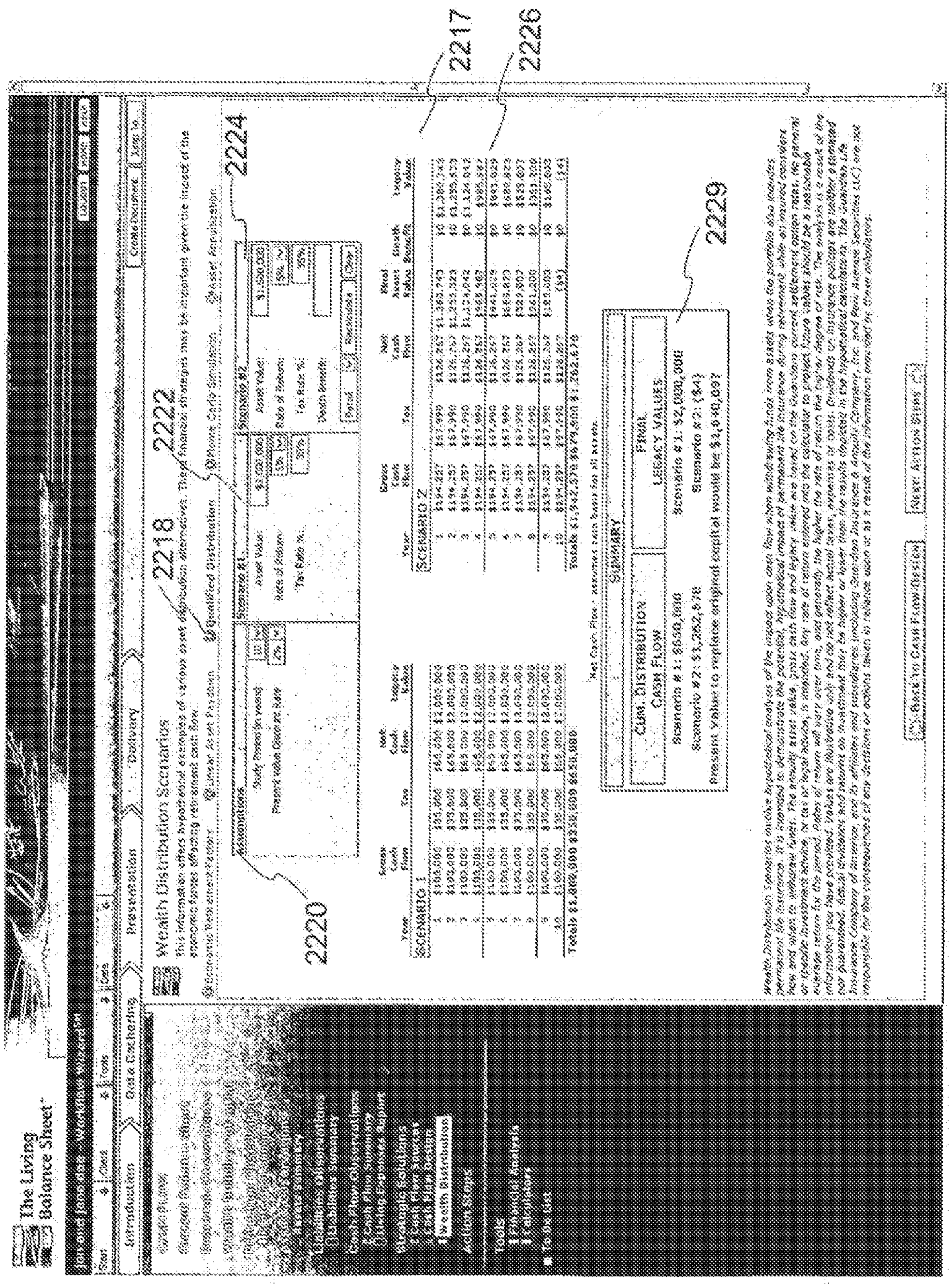

FIG. 234 illustrate another option, Qualified Distribution option 2218. On page 2217, Qualified Distribution option 2218 has data entry fields 2220, 2222, 2224. This option is similar to Linear Asset Paydown option 2190 except while Linear Asset Paydown option 2190 pertains to a taxable asset or investment such as a savings account or stocks Qualified Distribution option 2218 pertains to a tax deferred asset such as a 401(k) or IRA. In particular, the difference between the options can be seen when comparing the tax column of Scenario #2 of table 2202 and Scenario #2 of table 2226. In table 2202, the tax paid is tax on interest income on the principal. So, the amount of tax is the asset value multiplied by the rate or return multiplied by the tax rate. For example, the tax paid in year 1 would be 35% of $75,000 (which is 5% of $1,500,000) or $26,250. In table 2226, since the asset(s) was tax deferred, the tax paid is based on the amount of money distributed each year, namely $194,257. So, the tax paid would be 35% of $194,257 or $67,990. Similar to Linear Asset Paydown option 2190, Qualified Distribution option 2218 provides a tool to illustrate to a customer the advantage of purchasing life insurance.

Figure 235:
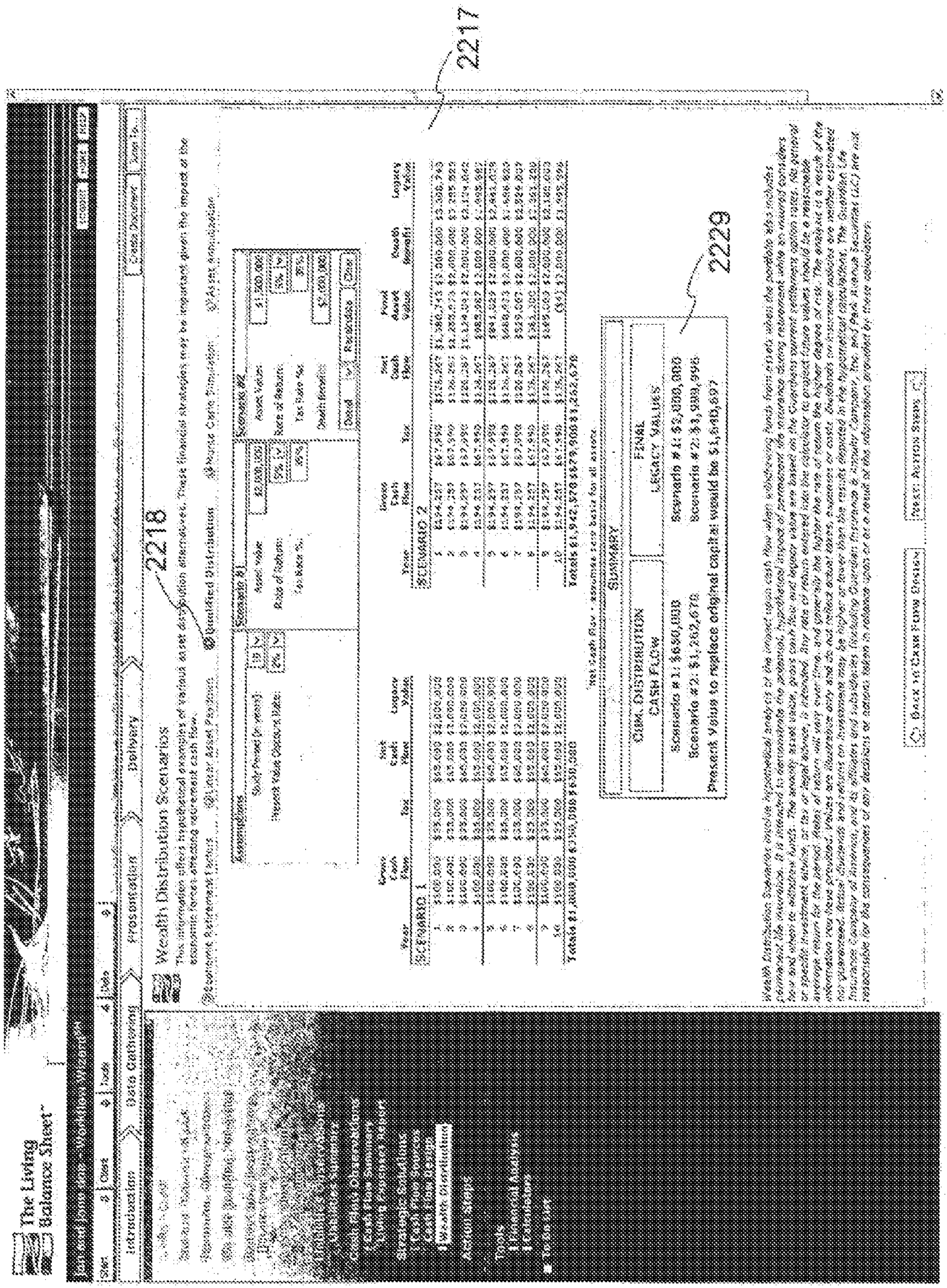

If the death benefit chosen is $2,000,000, as shown in FIG. 235, option 2218 illustrates to a customer that the customer can maximize income during his/her life and provide money to his/her legacy at death. Option 2218 also illustrates that by purchasing life insurance a person having $1,500,000 in assets who purchased life insurance can receive more income during retirement/before death than a person with assets of $2,000,000 who is only living off interest. The person with life insurance will also be able to leave an equivalent amount of money to his/her legacy at death as the person with $2,000,000 in assets.

Similar to page 2201, Qualified Distribution page 2217 of FIGS. 234 and 235 can also have summary area 2229 which illustrates the results of Scenario #1 and #2 in a preferred side-by-side comparison. Page 2217 can also provide the user with information on the amount of money (in this case, $1,640,697) needed to replace the original $1,500,000 that has been spent. In other words, a customer who invested $1,640,697 in year 1 in a separate investment (e.g., in a mutual fund or other asset(s) separate from the $1.5 million dollar asset) will have the present value equivalent of $1,500,000 at the end of 10 years. Having a separate investment assures that if a person lives more than 10 year during retirement, that person will have additional monies for living expenses after 10 years. Alternatively, if a person dies at the end of 10 years, his/her legacy will be provided with money. Similar to the illustration of FIG. 233, the higher the discount rate and the longer the period, the less money is required to be invested in year 1 because money has time to grow.

Figure 272:
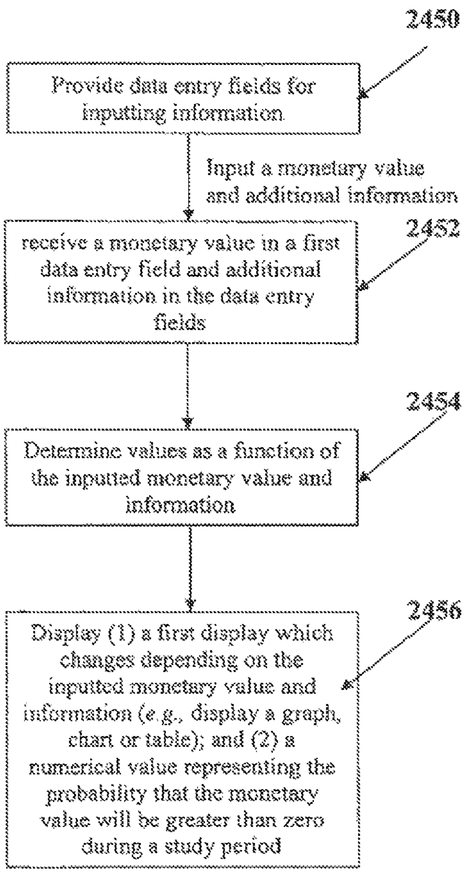

Tools for using Monte Carlo analysis to estimate a client's probability of success given a certain strategy can also be provided. An illustrative process for use in implementing such tools is illustratively shown in FIG. 272. In general, as shown in FIG. 272, data entry field for inputted information can be provided (step 2450). A user can input a monetary value and additional information in data entry fields. The program can receive a monetary value inputted in a first data entry field and additional information inputted in other data entry fields (step 2452). Values are determined as a function of the inputted monetary value and information (step 2454). A first display (e.g., in the form of a graph, chart or table), which can change depending on the inputted monetary value and information, and a numerical value (representing the probability that the monetary value will be greater than zero during a study period) can be displayed (step 2456).

Figure 236:
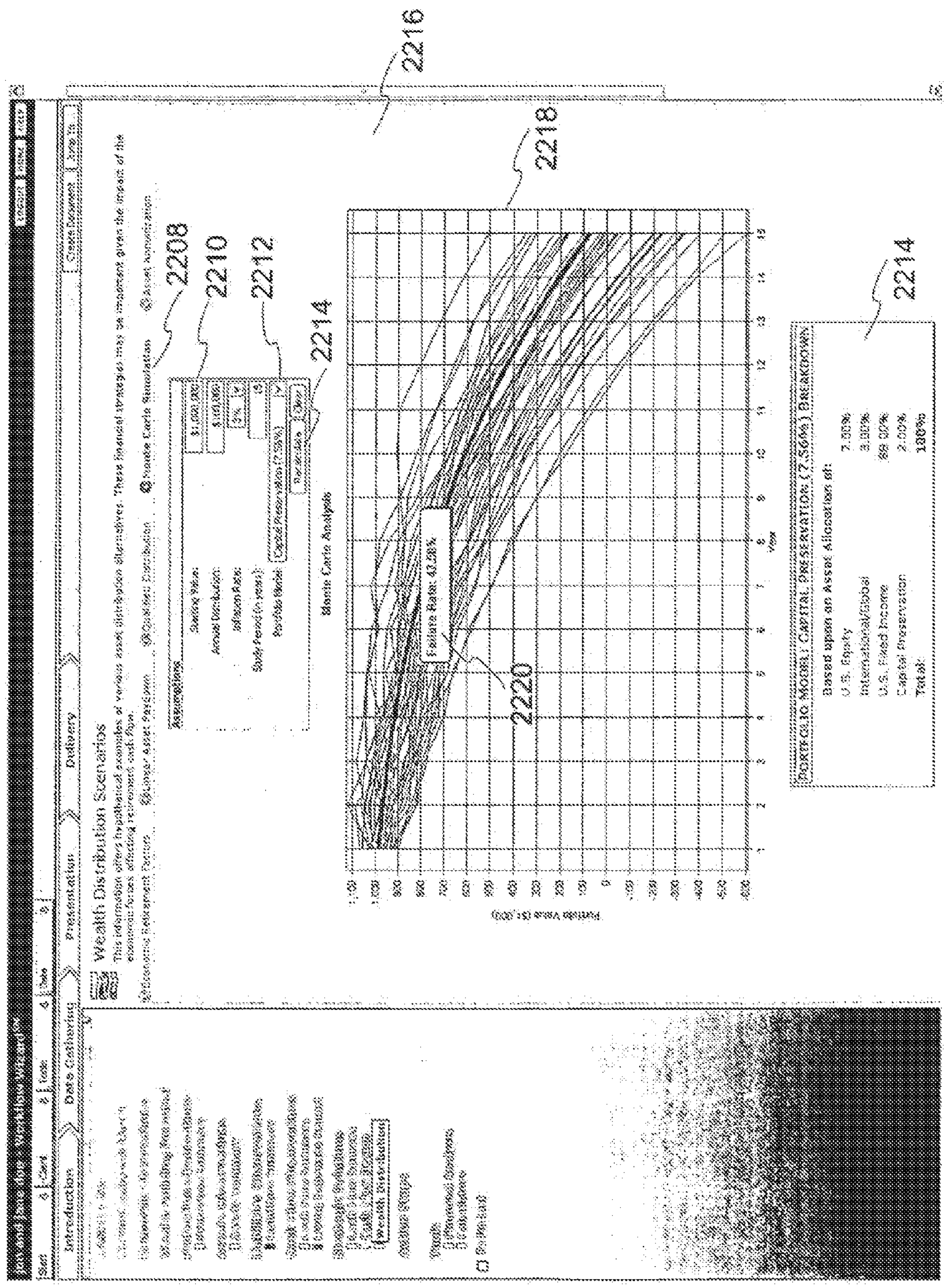
Figure 237:
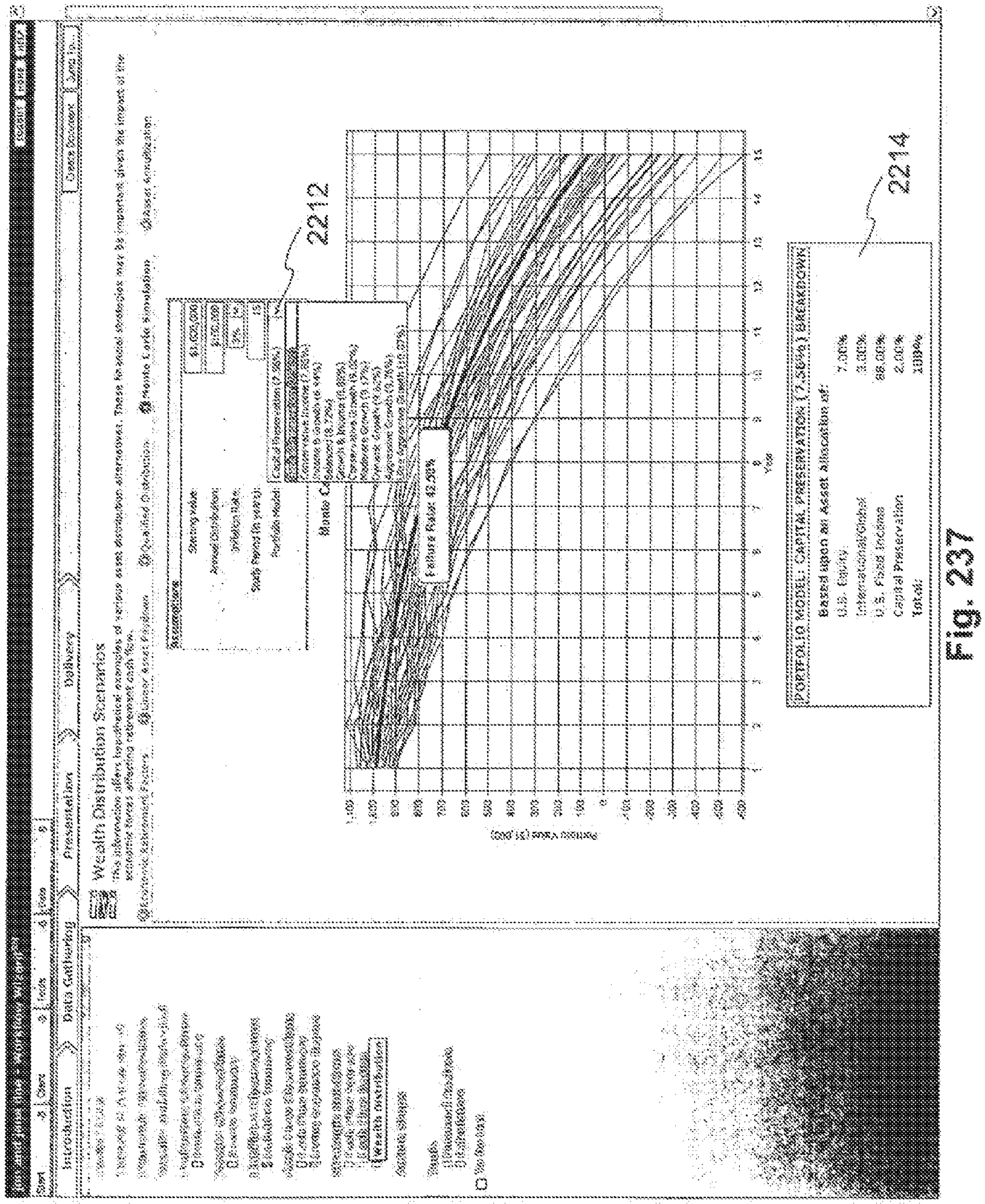

For example, FIG. 236 illustrates an option such as Monte Carlo option 2208 that can provide a customer with an illustration of the importance of life insurance. One or more data fields may be provided for inputting various information. In particular, data entry field 2210 can be used to input various basic assumptions such as the starting value of an asset, annual distribution (i.e., the amount of money a customer desires to remove from principal annually to, for example, pay for living expenses), inflation rate, study period and a portfolio model. Portfolio model field 2212 can allow a user to select different investment strategies with varying degrees of risk, gains or losses. In a preferred embodiment as shown in FIG. 237, portfolio model field 2212 can provide a user with a drop down menu, allowing the user to select from a number of different investment options. For example, the investment options can include capital preservations, conservative income, income & growth, balanced, growth and income, conservative growth, moderate growth, dynamic growth, aggressive growth and ultra aggressive growth. Each investment option can have a different percentage or rate of return. As with any investment, with greater rates of return comes greater risk.

In one example, as in FIG. 236, a user may choose a starting value of $1,000,000 with an annual distribution of $100,000 (e.g., for living expenses during retirement), 3% inflation, a study period of 15 years and a capital preservation portfolio model which, in this case, has an interest rate of 7.56%. Once a user chooses all fields in data entry field 2210, a user can select or click recalculate button 2214 to have the program run the particular scenario.

In response, chart 2218 can be provided on page 2216. Chart 2218 can provide a graphical illustration (e.g., bar or line graph) or, similar to FIG. 231, provides a tabular illustration with actual monetary values. Chart 2218 shows how the principal decreases over time as money is paid out factoring in interest income and inflation. Indicator field 2220 can be provided which gives a customer a visual representation of the percentage of time that such a scenario will fail or succeed. In FIG. 236, field 2220 indicates that the scenario chosen will fail 42.50% of the time. In other words, if a person has $1 million and requires $100,000 for expenses and has no other source of income, even with earning an interest rate of 7.56%, the person will completely deplete his/her money in 15 years 42.50% of the time. In a preferred embodiment, summary area 2214 is provided to show how a customer's assets are invested. For example, summary area 2214 can shows the percentage of the customer's assets in various investments such as U.S. Equity, International/Global investments, U.S. Fixed Income, Capital Preservation.

Figure 238:
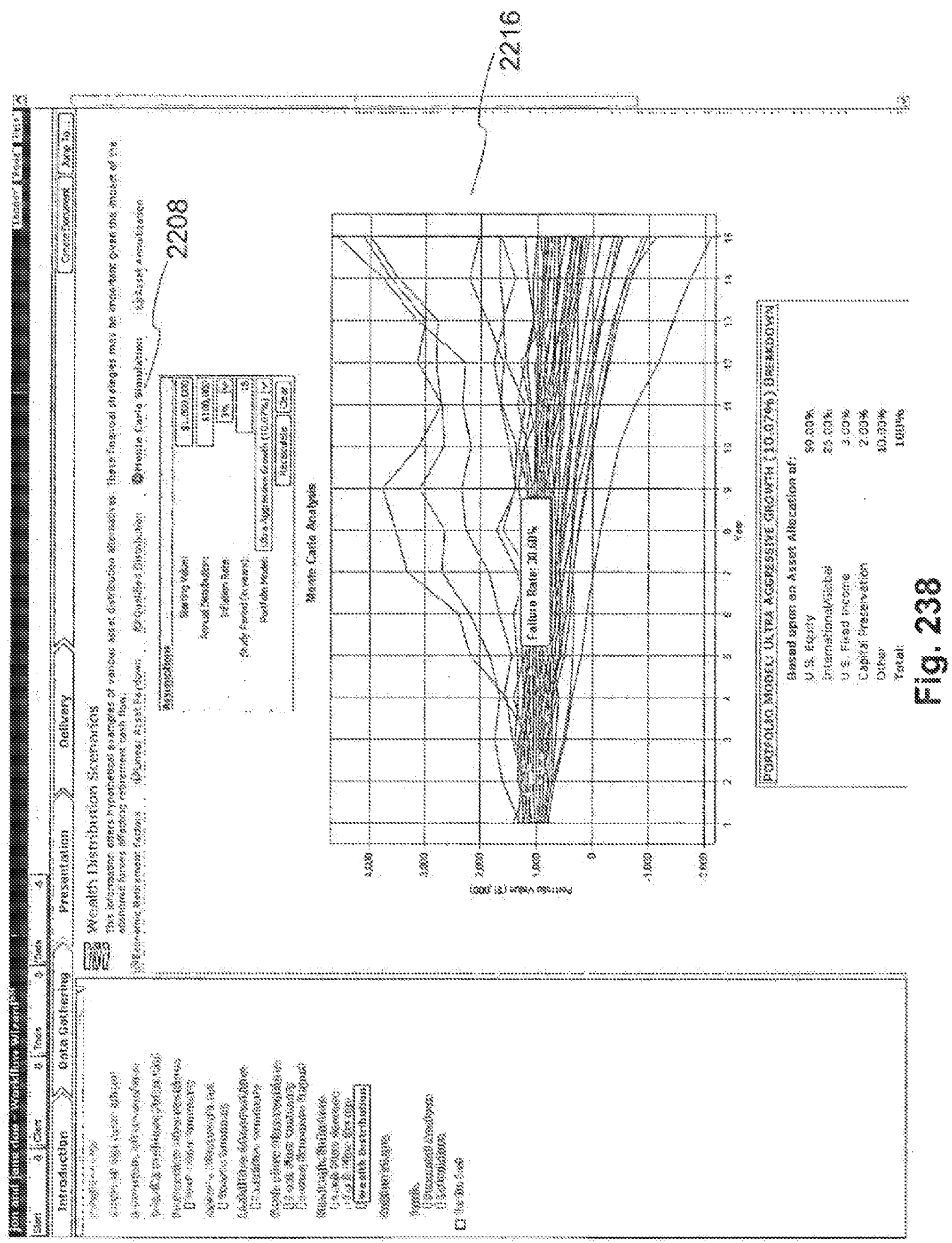
Figure 239:
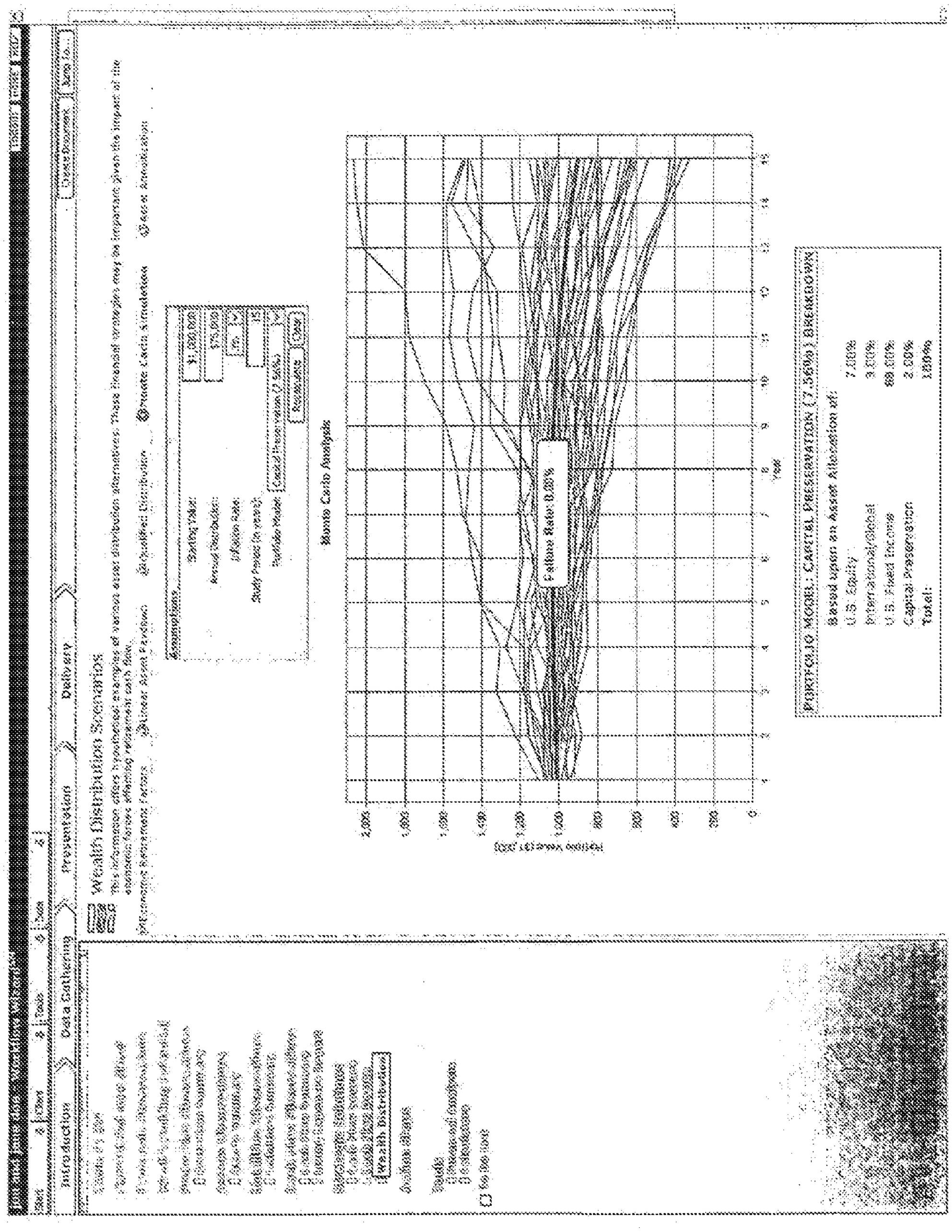

As shown in FIG. 238, in an alternative scenario, a user may select Ultra Aggressive Growth as the portfolio model. Even with a 10.07% interest rate, chart 2216 can illustrate that with all other factors being equal, a person will completely deplete his/her money in 15 years 30.60% of the time. Thus, Monte Carlo simulation option 2208 provides a tool for illustrating to a customer that regardless of earning a high interest rate, a customer can completely deplete his/her money during retirement. The option also illustrates the effects of withdrawing or removing money too early from an asset and how this can result in negative wealth. If a customer is concerned about his/her legacy, such a tool can demonstrate that there is a high probability that given the needs of a customer, a customer may completely deplete his/her money and have nothing left to leave to his/her legacy. As such, this tool illustrates that by purchasing life insurance, a customer can spend all his/her money during retirement/before death, have enough money to meet expenses and provide for his/her legacy at death. Moreover, the Monte Carlo simulations demonstrates to a person how to properly distribute money during his/her lifetime so as to avoid depleting savings. As shown in FIG. 239, an annual distribution of about 7.5% results in a failure rate of 0%. In particular, as illustrated in FIG. 239, disbursing $75,000 each year from $1 million will provide a person with income during retirement without the risk of spending all of the person's money.

Figure 240:
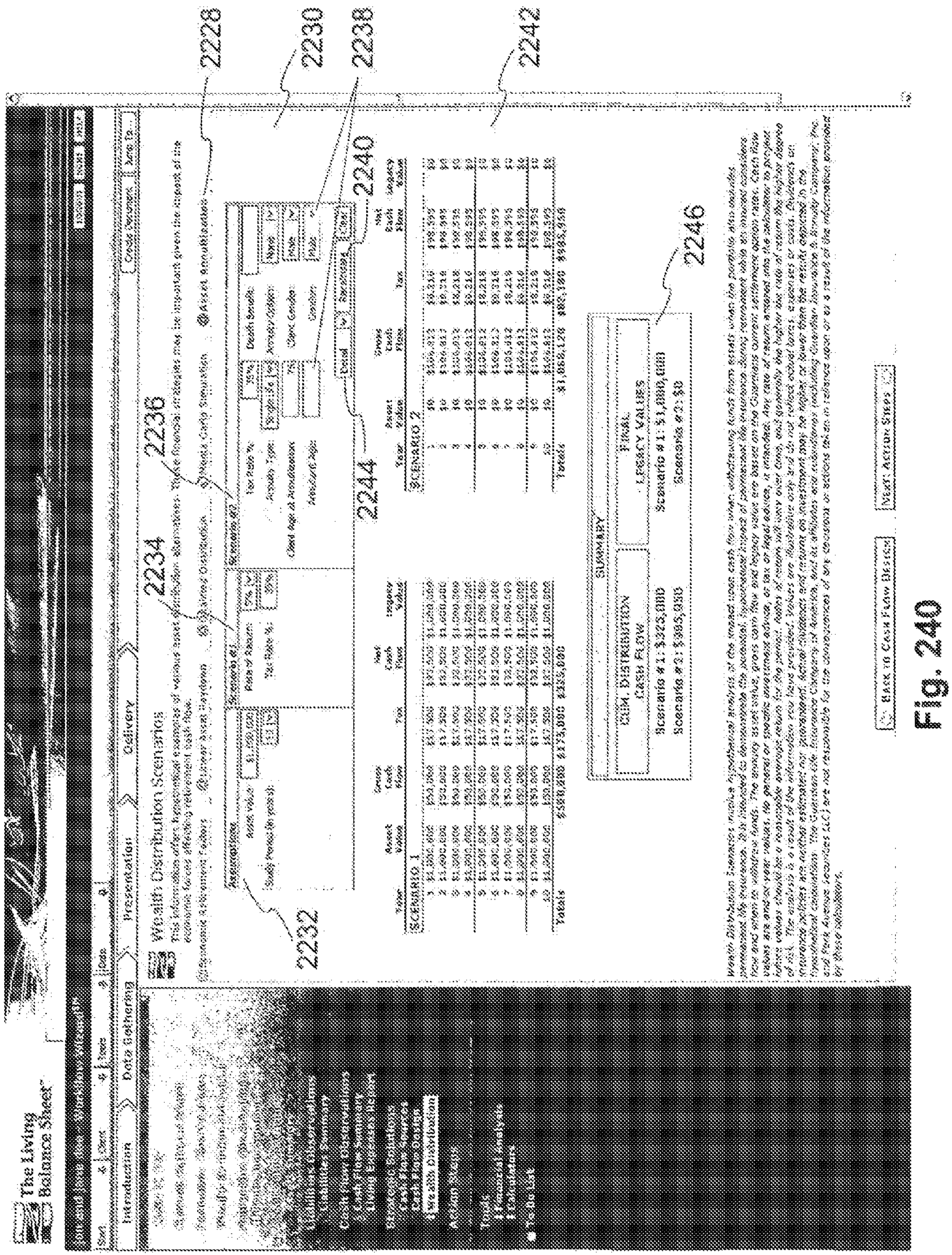
Figure 241:
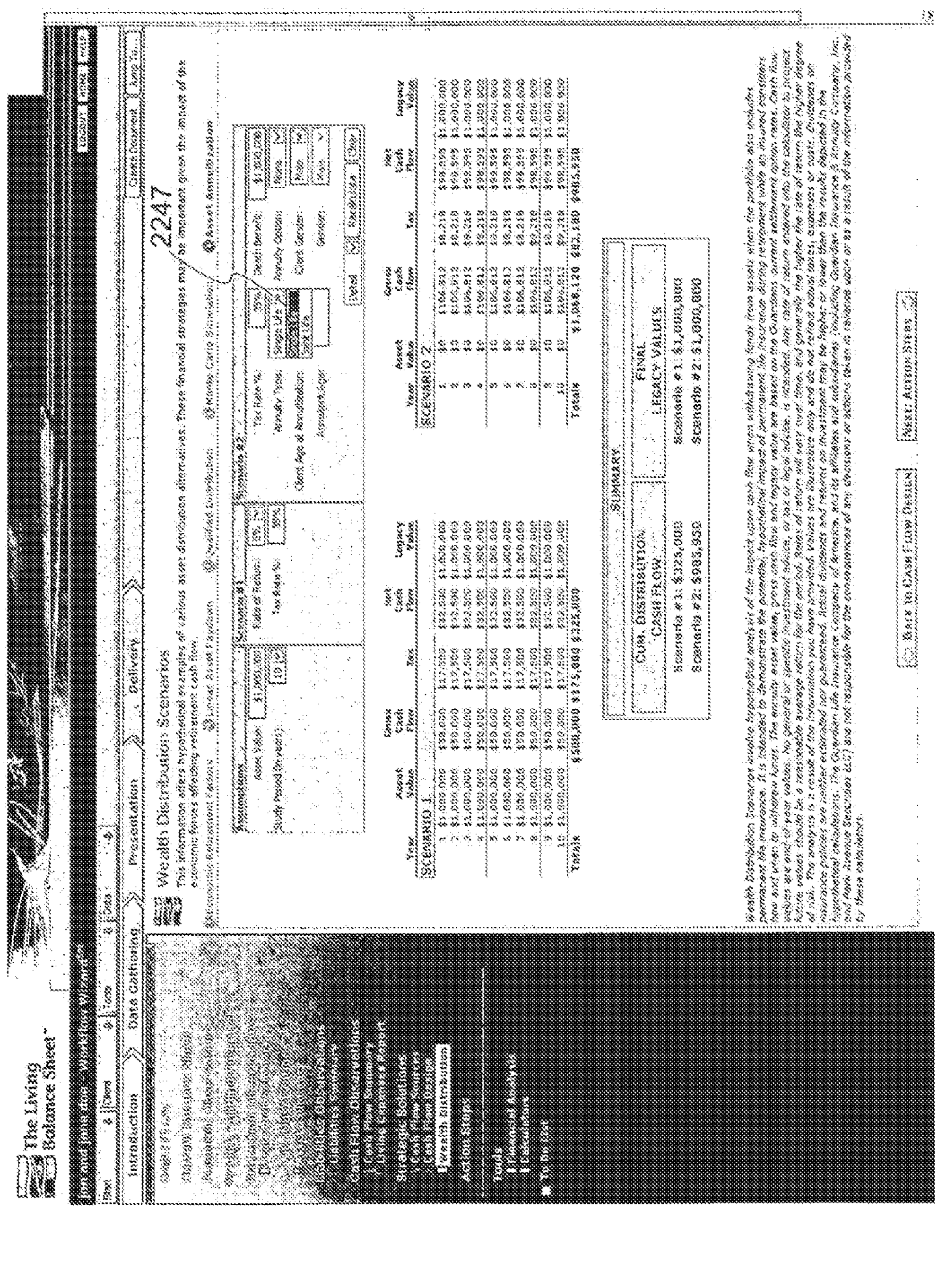
Figure 242:
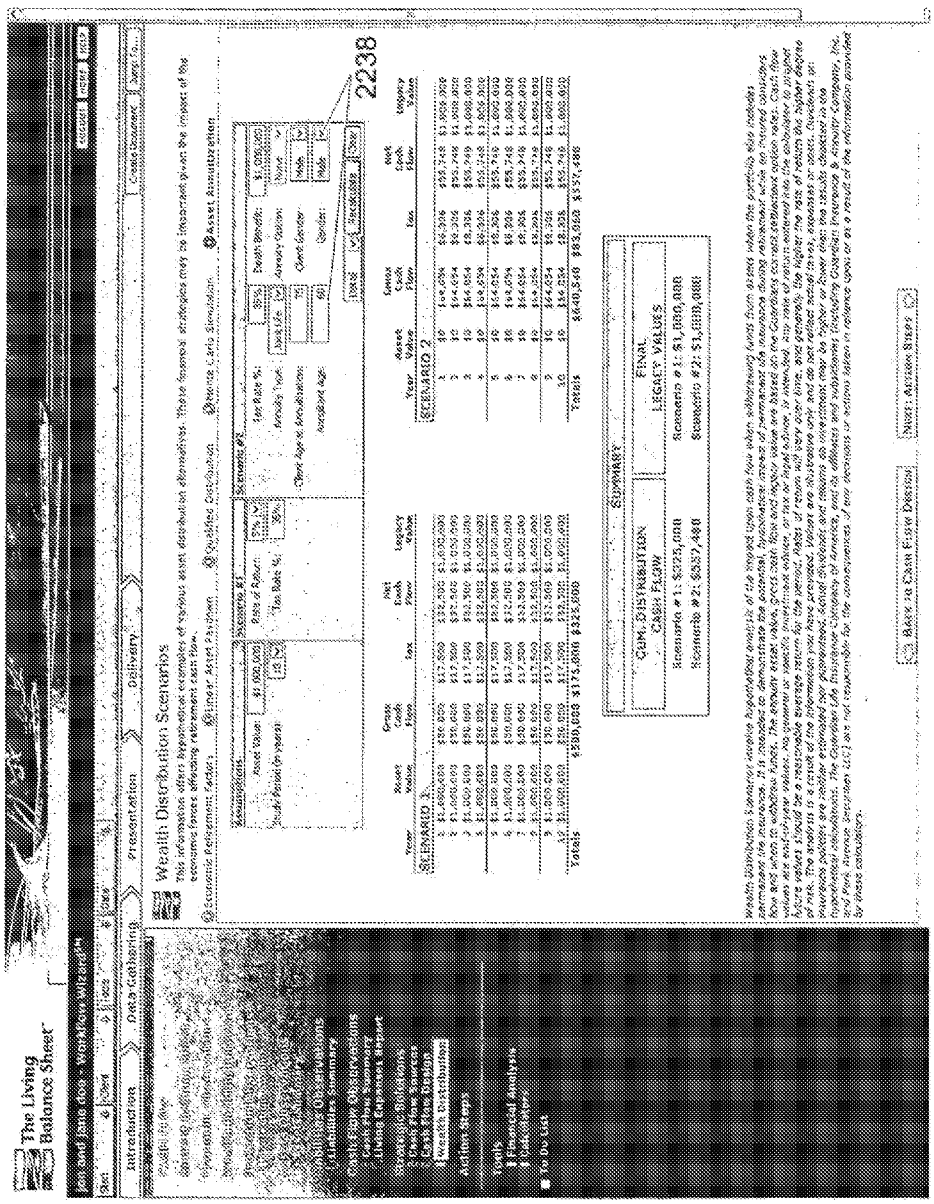
Figure 243:
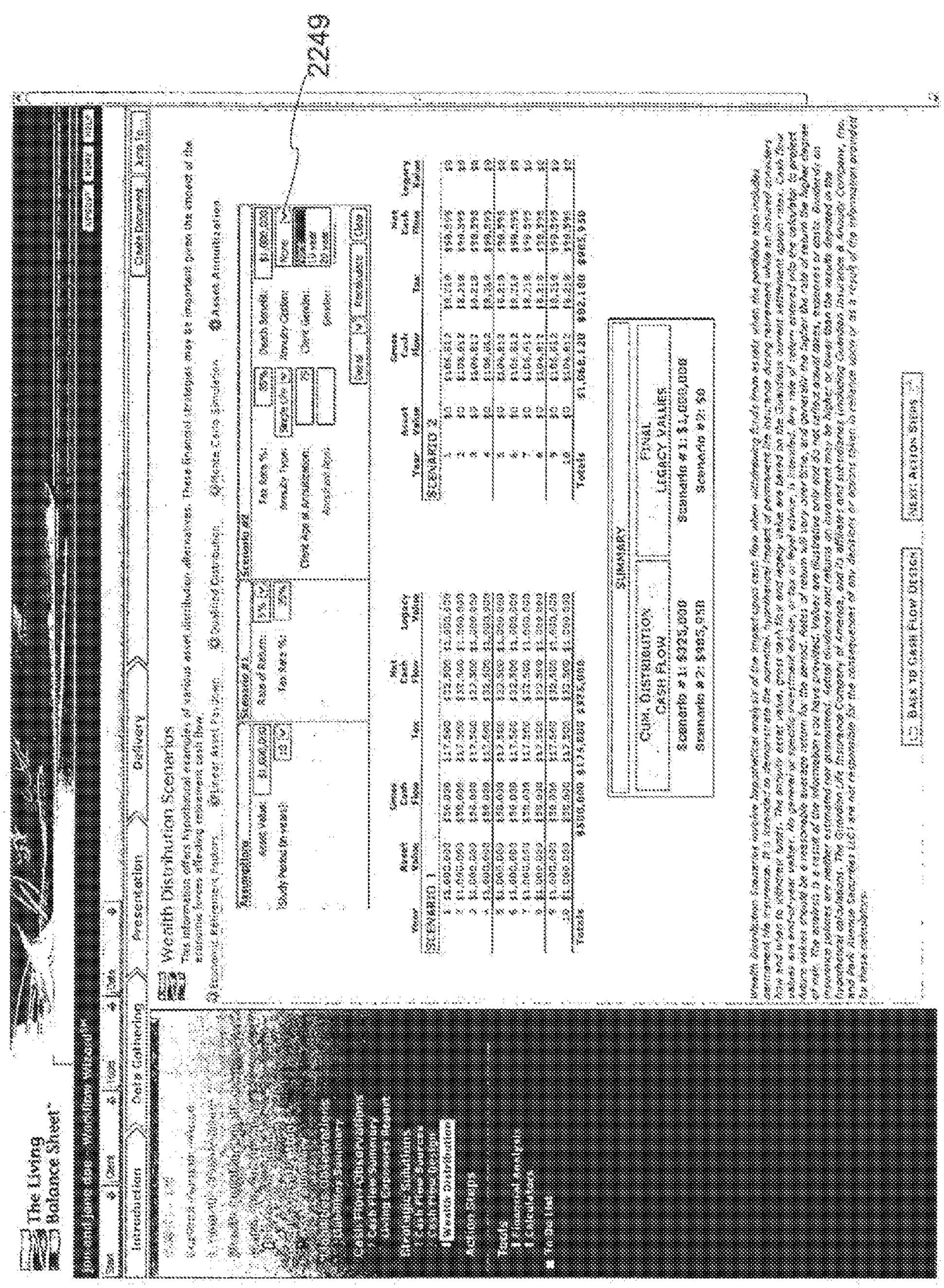

FIG. 240 shows another option, Asset Annuitization option 2228. If a user selects option 2228, page 2230 can be presented to the user. One or more data fields may be provided for inputting various information. Data entry field 2232 can be used to input various basic assumptions such as asset value and study period. Data entry field 2234 can be used to input information about a first investment scenario (Scenario #1) such as rate of return and tax rate. Data entry field 2236 can be used to input information about a second investment scenario (Scenario #2) such as purchase of life insurance and an annuity. For example, field 2236 can be used to input a death benefit, tax rate, annuity type, client age at annuitization, annuity option and client gender. One or more additional data fields 2238 may be provided which allows a user to input information such as annuitant age or gender of a second person depending on the annuity type chosen. Data entry field 2236 enables a user to customize an annuity. The type of annuity chosen by a user can affect gross and net cash flow. For example, as shown in FIG. 241, field 2247 can provide a user with a selection of single life or joint life annuity. If a joint life annuity is selected, data fields 2238 (annuitant age field and gender field) can receive information from a user as shown in FIG. 242. It will be appreciated that additional data fields 2238 can be locked prior to selection of annuity type, thereby preventing information from being inputted therein. As shown in FIG. 243, field 2249 can provide a user with a selection of an annuity option such as the annuity term (e.g., 10 or 20 years).

Figure 245:
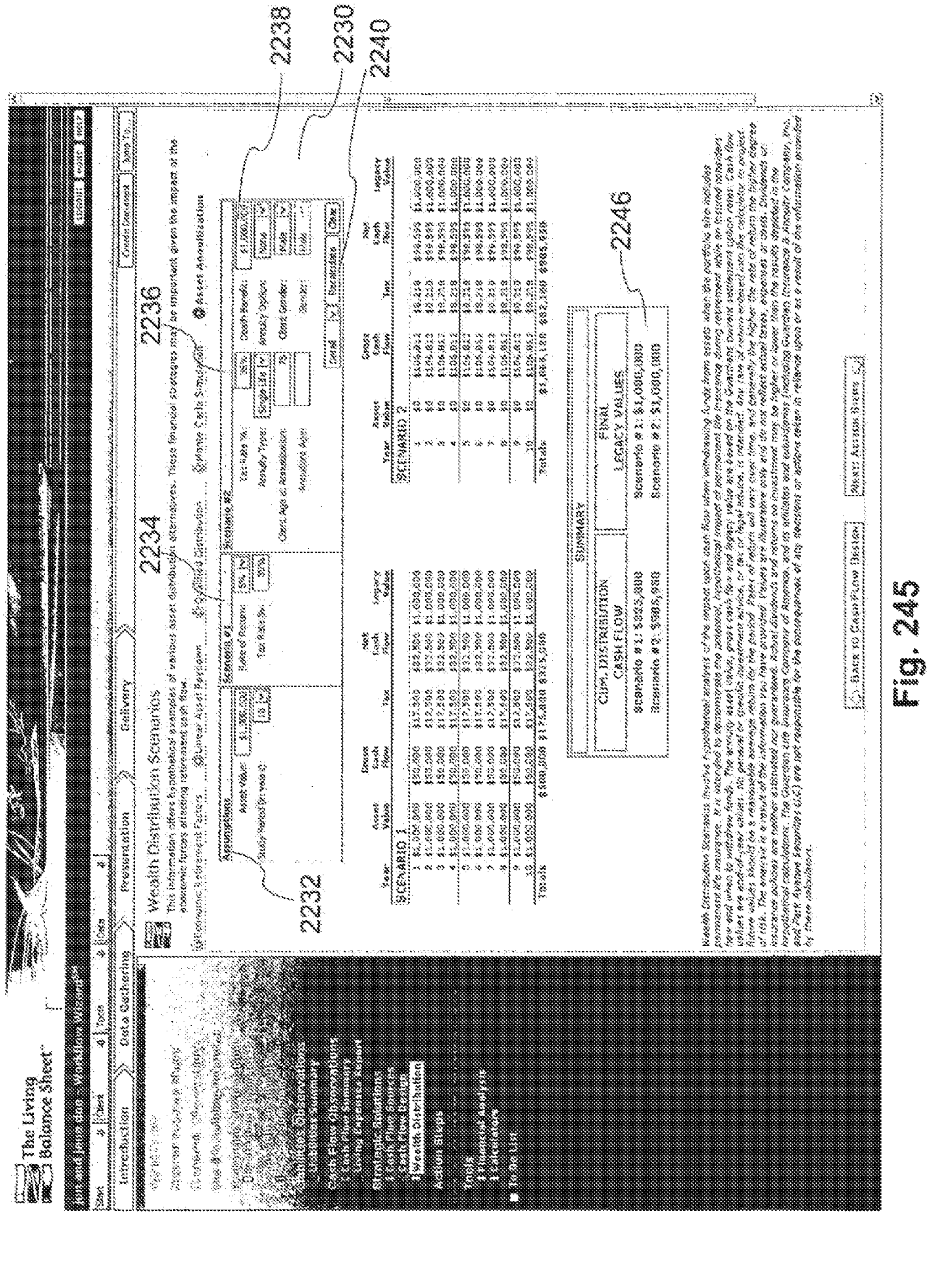

FIG. 240 illustrates a strategy with an asset value of $1,000,000 and a study period of 10 years being entered in data entry field 2232. Under data entry field 2234, a user can enter a 5% rate of return on investment(s) and an income tax rate of 35%. In data entry field 2236, a user can enter a tax rate of 35%, a single life annuity type, customer age at annuitization such as 75 years old and customer gender such as male. Those skilled in the art will recognize that page 2230 can also have option field 2244 which can allow a user to select alternative presentation methods such as a graph (e.g., bar graph as in FIG. 229, line graph, etc.) or a summary. A user can then click on or select recalculate button 2240. The request can be processed which can result in table 2242 being generated illustrating Scenario #1 and #2 based on the inputted information. Scenario #1 of table 2242 illustrates a cash flow of interest income each year and the principal remaining unchanged. Such a scenario provides a customer with $325,000 of cash flow during his/her lifetime and leaves $1,000,000 to his/her legacy. Scenario #2 illustrates an annuity which is being paid out over a 10 year period, providing a customer with $985,950 of cash flow. A comparison of Scenario #1 and #2 shows that the tax in Scenario #1 is $17,500 whereas, in Scenario #2, the tax is $8,218. This difference is related to the exclusion ratio. In other words, with an annuity, a certain amount of money paid each year is money that is deemed to be the customer's money. Anything above this amount of money (i.e. above the exclusion ratio) is taxed as income. As shown in FIG. 245, the more years in the study period, the more tax a customer will pay (from $8,218 to $37,384) because less money is considered to be that of the customer. In other words, in the embodiment shown, by year 13 most if not all of the money being paid out is considered interest income and not money that was investing in the annuity plan by the customer.

FIG. 240 demonstrates the trade-off of purchasing an annuity. While the customer will receive more money during his/her retirement than interest income, the customer's legacy will not receive any money. Similar to previous options, option 2228 can be used to illustrate to a customer the advantage of purchasing life insurance when investing in an annuity. As shown in FIG. 245, a user may input a death benefit of $1,000,000 into field 2238 of data entry field 2236 and select recalculate button 2240. Such a scenario illustrates that, by purchasing life insurance, a customer can maximize income during his/her lifetime while, at the same time, provide for his/her legacy. So, a person who purchases a $1,000,000 annuity and $1,000,000 life insurance policy will have more income during his/her lifetime than a person who is living off interest income from $1,000,000. Similar to the person in Scenario #1, the person in Scenario #2 will leave his/her legacy $1,000,000. In a preferred embodiment, page 2230 provides summary area 2246 to give a customer, for example, a quick overview of various scenarios placed side-by-side.

Figure 273:
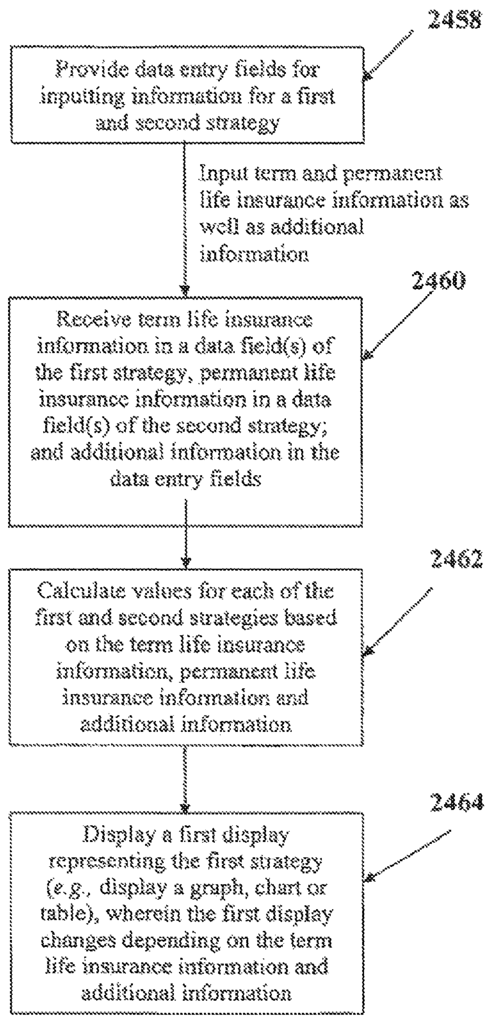

Tools for analyzing cash flow designs can be provided. An illustrative process for use in implementing such tools is illustratively provided in FIG. 273. As illustrated in FIG. 273, data entry fields can be provided for inputting information for a first and second strategy (step 2458). A user can input term and permanent life insurance information as well as additional information. In particular, the program can receive information about term life insurance inputted in a data field(s) of the first strategy; information about permanent life insurance inputted in a data field of the second strategy; and additional information inputted in the data entry fields (step 2460). Values can be calculated for each of the first and second strategies based on the term life insurance information, permanent life insurance information and/or additional information (step 2462). The program can display a first display representing the first strategy (e.g., in a graph, chart, or table) (step 2464). The first display can change depending on the term life insurance information and additional information. A second display representing the second strategy can also be displayed.

Figure 246:
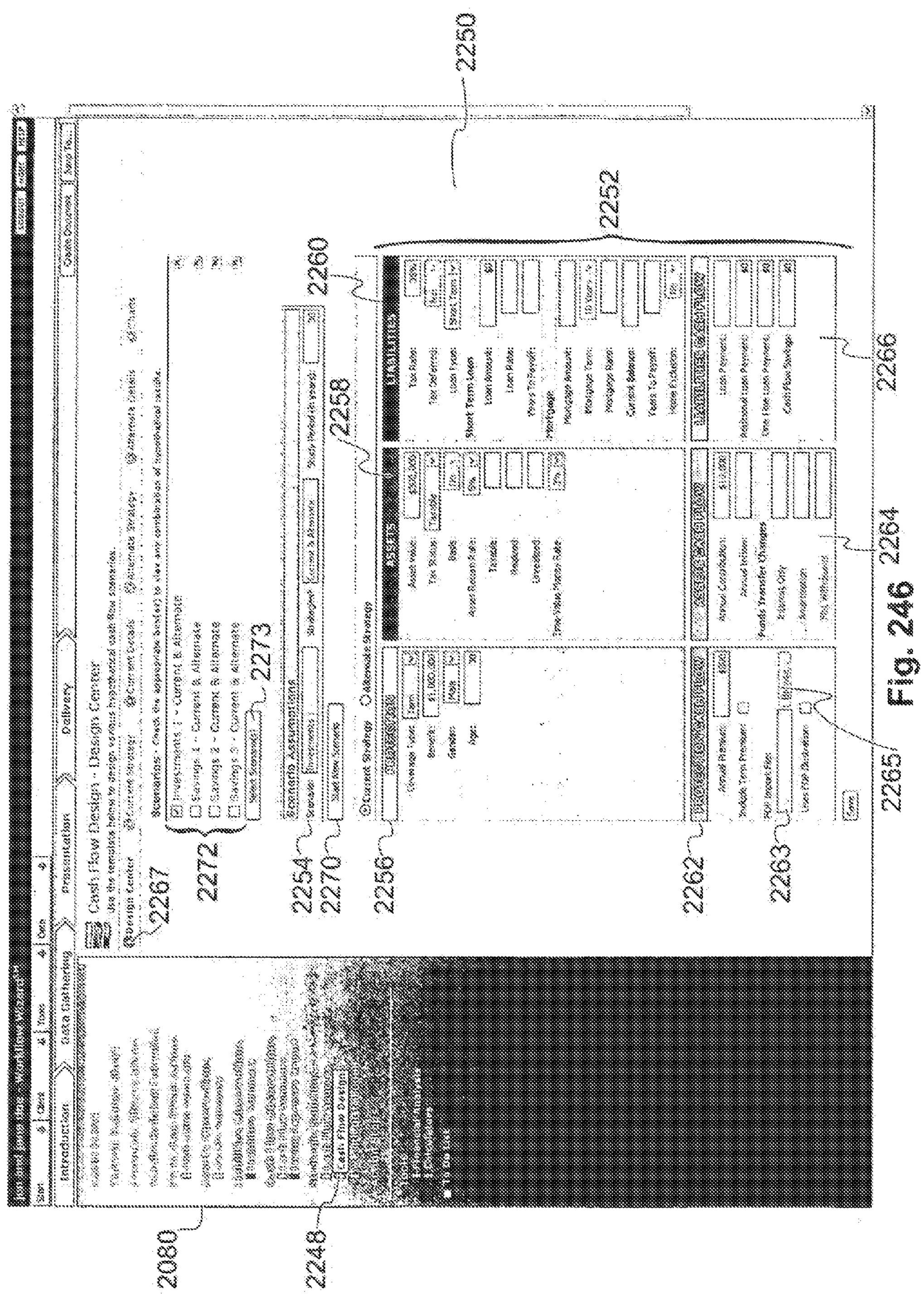
Figure 247:
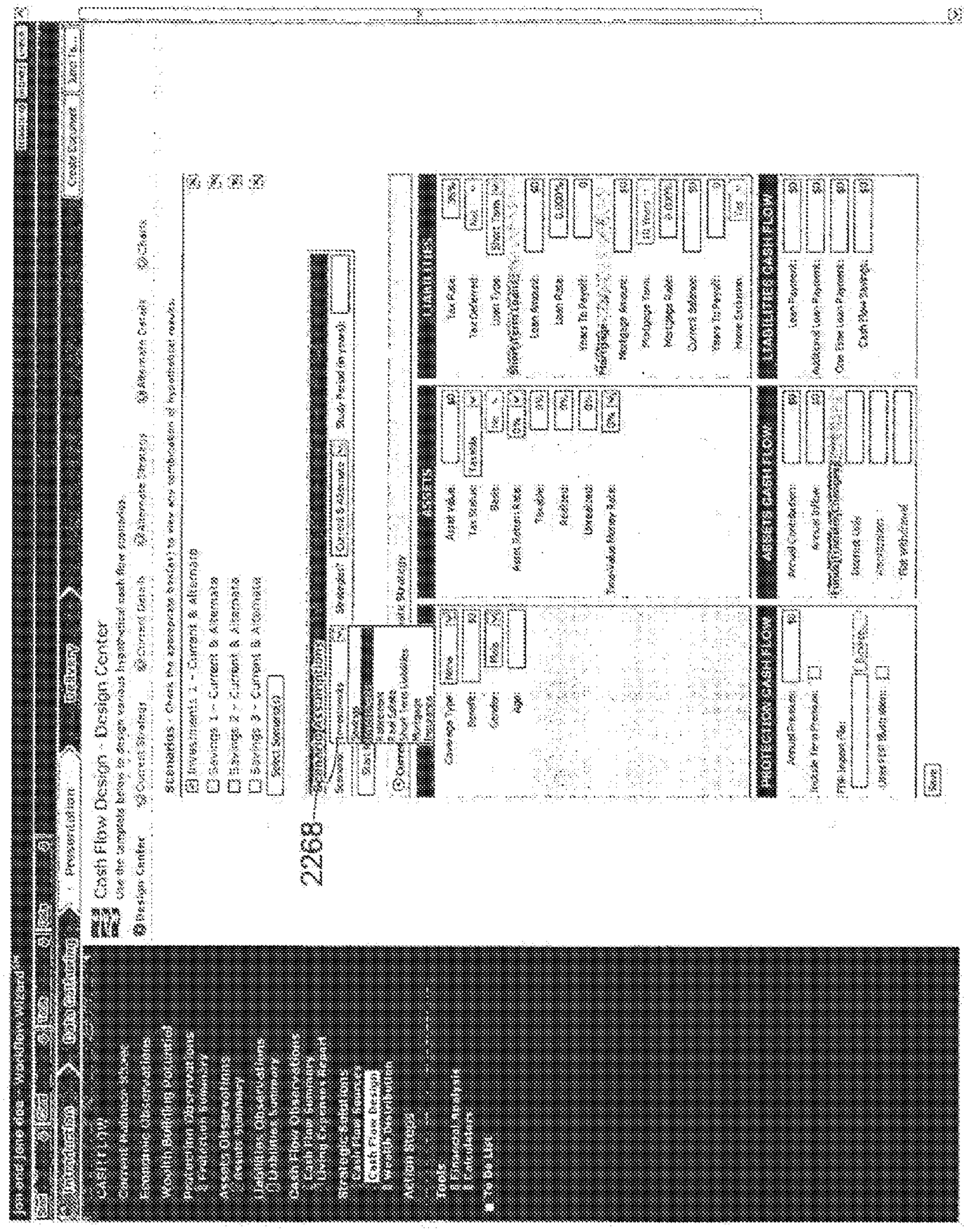

As shown in FIG. 246, another link in list of options field 2080 of the Cash Flow Analysis page is Cash Flow Design link 2248 which a user may click or select to display page 2250. Such a tool can provide customers with information about different hypothetical cash flow scenarios, factoring in information such as insurance, asset, loan, mortgage and tax information. In a preferred embodiment, such a tool can be used to build hypothetical scenarios to illustrate to a client the advantages of purchasing permanent life insurance. As shown, page 2250 may have area 2252 for inputting information for creating a scenario. In particular, area 2252 can have one or more data entry fields such as data entry fields 2256, 2258, 2260, 2262, 2264, 2266. Similar to page 2014 of FIG. 205, four interdependent financial categories or domains—protection, assets, liabilities and cash flow—appear on page 2250 to enable a user to input information on all factors affecting the user's financial condition. As shown in FIG. 246, the data entry fields can include protection (life insurance), assets, liabilities, protection cash flow (cost of life insurance), assets cash flow and liability cash flow. Data entry field 2254 can be used to input various basic assumptions such as the name of an investment scenario and study period (e.g., months, years, days, etc.). As shown in FIG. 247, drop down menu 2268 can be provided so that a user can select from a number of investment scenario names such as savings, investments, retirement, real estate, short term liabilities, mortgage and insurance. Other names may also be provided. Alternatively, a user may be able to input a name of the user's choosing using a keyboard. The name enables a user to determine the type of scenario for which information has been inputted.

A user can click button 2270 to create a new scenario. Once a scenario is created, it can be saved and can appear on page 2250 such as in area 2272. Area 2272 may have a list of all scenarios which have been saved. A user can click or select button 2273 and choose a scenario from area 2272 to retrieve an existing scenario (i.e., one in which information has already been inputted). It will be appreciated that the same title can be used for different scenario; however, the program will provide for separate version (e.g., Savings 1, Savings, 2, Savings 3, etc.). The saved scenarios can be unique to the specific customer.

The cash flow design tool can be used to create two or more strategies in the same scenario, for example, a current strategy and an alternate strategy. A user can select the strategy and enter information in the data entry fields for that strategy. It will be appreciated that certain fields in the data entry fields may be locked for certain strategies such that information is carried over from another strategy and fixed (i.e., new information cannot be inputted). For example, information can be inputted in a data field in the current strategy but the same data field may be fixed (cannot receive input or be modified) in the alternate strategy. Such a lock function ensures that certain information is not changed by the user so that a comparison of strategies is accurate.

Figure 250:
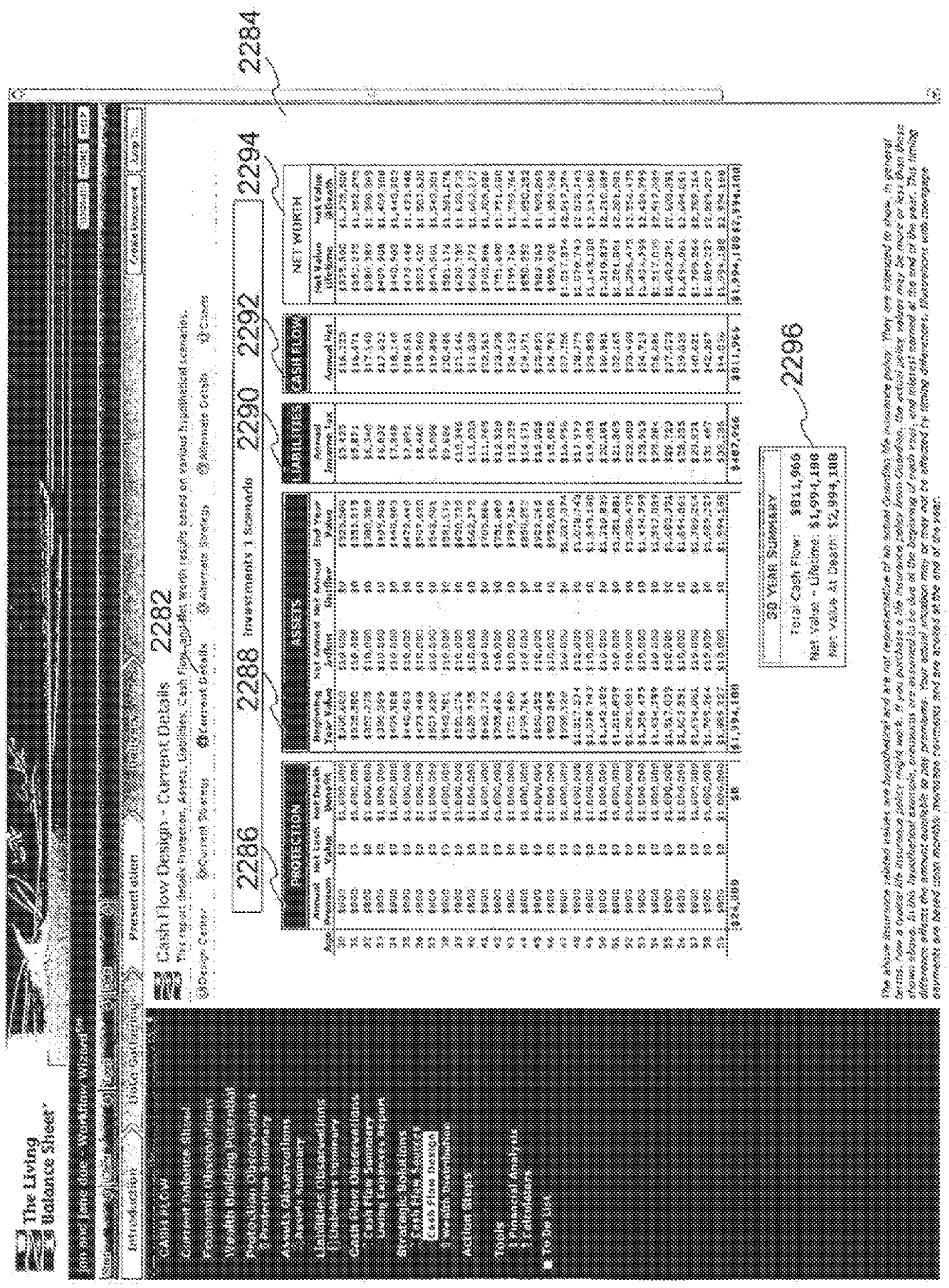
Figure 252:
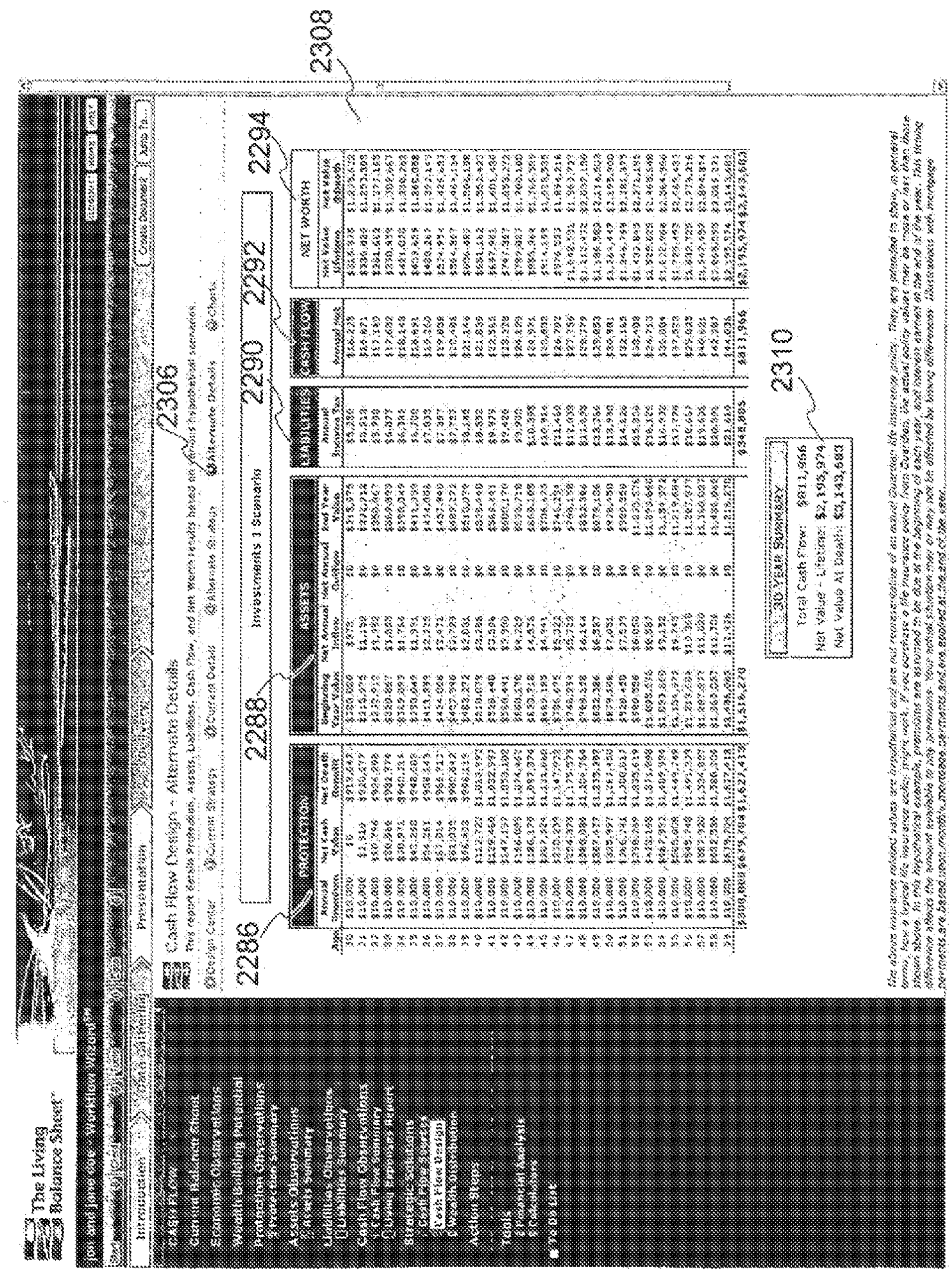

Page 2250 can also have a number of presentation options such as design center, current strategy, current details, alternate strategy, alternate detail and chart. In design center option 2267, data entry field 2256 can be used to input information about life insurance such as coverage type (e.g., term or permanent life insurance), amount of life insurance or benefit, gender as well as age of insured. Data entry field 2262 can be used to input information about life insurance premiums. Data entry field 2262 may have field 2263 which allows a user to enter a file name (e.g., a FDP Import file) of a previously run life policy illustration. Once the file is chosen, information automatically appears in various fields on page 2250. For example, the FDP import function may be used to obtain illustration data from an illustration of a policy and automatically populate various fields such as, for example, annual premiums in field 2262, benefit amount in field 2256 and/or the annual premium, net cash value and/or net death benefit in the protection table 2286 (FIGS. 250 and 252). The feature can, for example, be implemented to access and query another application or database (e.g., implemented on a separate server) to automatically retrieve or download pertinent details of insurance contracts (e.g., the current term used by an insurance provider). Browser button 2265 may also be provided to locate a file. Data entry field 2258 can be used to input information about assets, such as asset value, tax status (i.e., whether the asset is taxable, not taxable or tax deferred), basis (i.e., the amount of one's own money in an asset) asset return rate or interest rate, time-value money rate as well as whether capital gains is taxable (such as dividends), realized or unrealized. Data entry field 2264 can be used to input information about asset cash flow or the amount of money taken from income to be invested, including annual contribution or total amount invested, annual inflow (the amount of money being put into an investment) and fund transfer changes (e.g., withdrawal of interest, flat withdrawal or amortized withdrawal). Data entry field 2260 can be used to input a customer's liabilities, including income tax rate, information about loans (e.g., short term loans) and mortgages. Data entry field 2266 can be used to input liability cash flow, which comes from a customer's income stream, such as loan payments and money put towards savings. It should be noted that more or less fields and/or different fields may be provided.

Cash Flow Design page 2250 allows a user to compare different strategies to see the effects different investment options have on cash flow. The "Current Strategy" option may relate to strategies involving term life insurance and the "Alternate Strategy" option may relate to strategies involving permanent life insurance. For example, a user can formulate a scenario where a 30 year old male customer has $1 million in term], life insurance, a $300,000 asset(s) which is taxable and earning 5% interest, a 35% income tax rate, and a 3% time-value money rate. An annual premium for term life insurance can be $800, and $10,000 per year can be put towards the customer's asset(s) or invested. Time-value money rate is the after-tax rate one can invest interest income tax savings and term life insurance savings (i.e., savings accrued by purchasing permanent instead of term life insurance—in this example, $800 per year). The time-value money ratio enables a user to place economic value on saved money.

Figure 248:
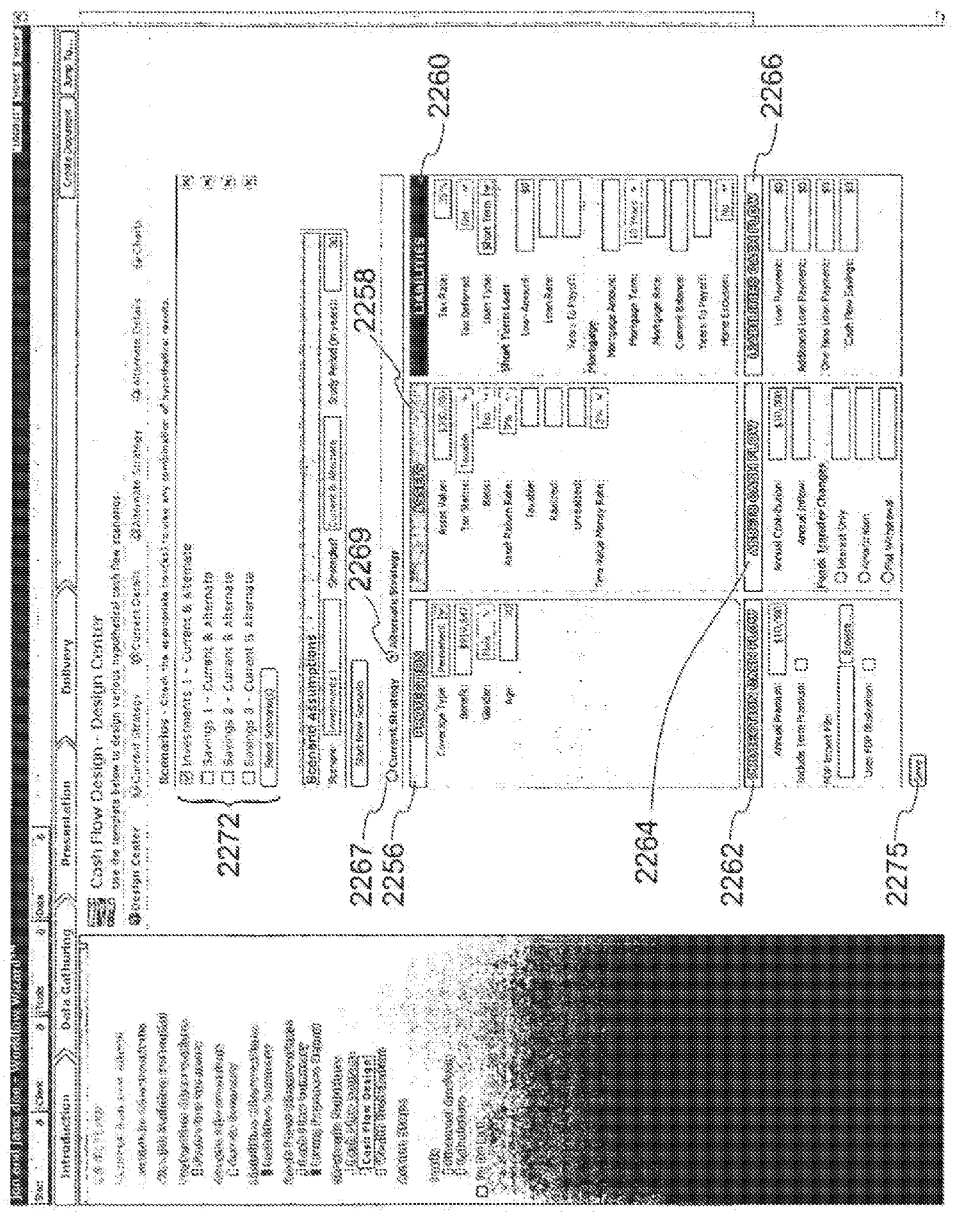
Figure 249:
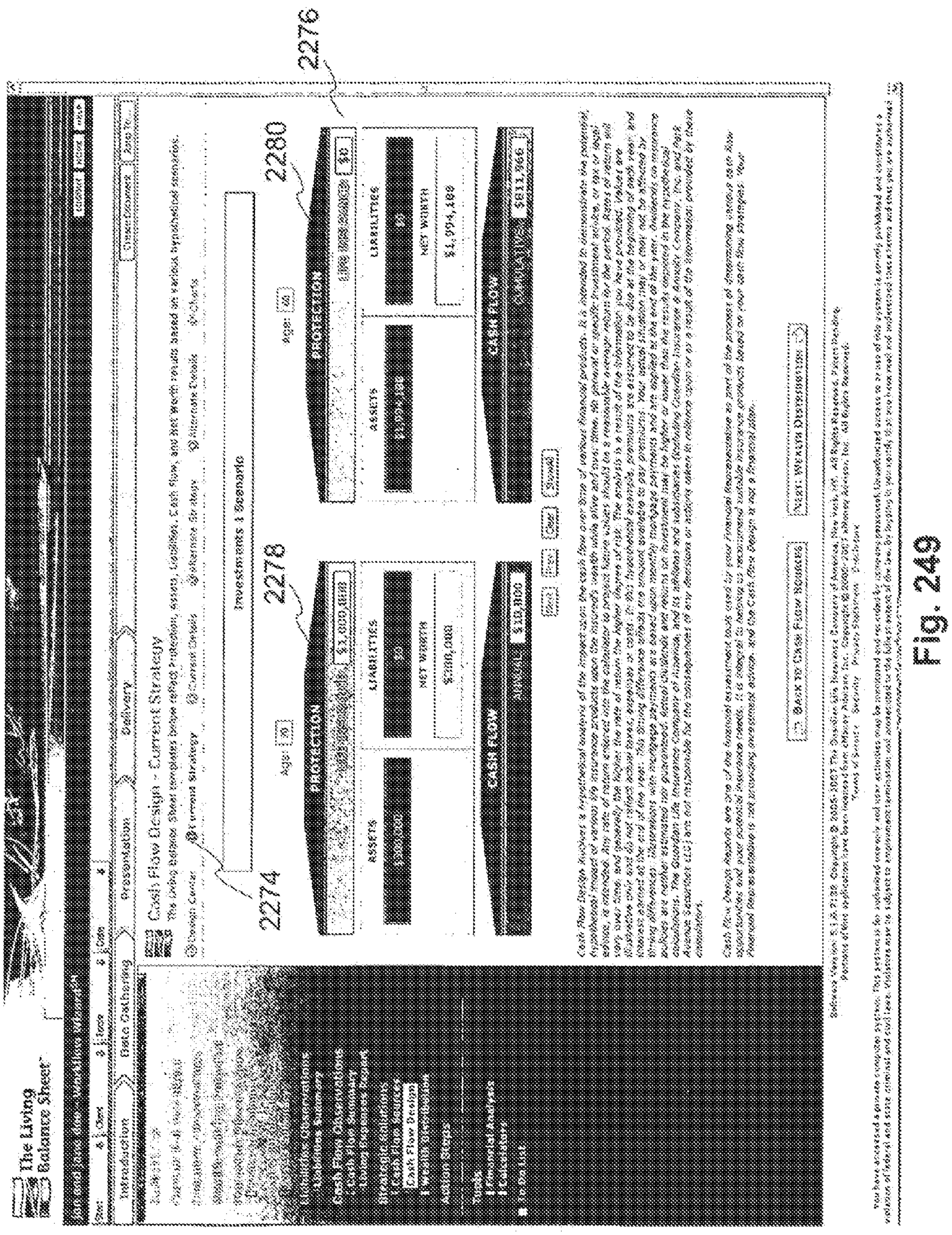

As shown in FIG. 248, a user can then choose "Alternate Strategy" option 2269 which can present to the user the same fields provided for the "Current Strategy" option. In a preferred embodiment, individual fields in data entry fields 2256, 2258, 2260, 2262, 2264, 2266 may be locked such that a user is prevented from editing various fields. Upon comparing "Current Strategy" to "Alternate Strategy," the locked fields can ensure that certain information is not changed by the user so that the comparison between strategies is accurate (i.e., comparing like scenarios). In one embodiment, individual fields that are locked may be faded or gray, providing a visual indication that the field cannot be modified. In other embodiments, the fields may not appear unless they can be edited by a user. It will be appreciated that when a user attempts to enter information in a field which is locked or cannot be altered, a visual display (e.g., a text box) may be provided with a statement indicating that the particular field cannot be modified in the strategy.

In the "Alternate Strategy," a user can input various assumptions in protection data entry field 2256 such as, for example, a customer has purchased permanent life insurance having a death benefit of $919,647. The amount of the death benefit may be based on the amount of annual contribution entered in data entry field 2264 of the "Current Strategy" option, namely $10,000. In a preferred embodiment, the amount of the death benefit can be automatically populated by the program based on the annual contribution from the "Current Strategy." This amount can be carried over or made to appear in the "Alternate Strategy" option. So, for $10,000 per year, a customer can get a life insurance policy with a starting death benefit of $919,647. In particular, "Alternate Strategy" can show the effect of investing in insurance instead of adding money to cash flow or annually contributing to an asset. Since this scenario is an investment scenario, the information can be saved and as "Investment 1" in area 2272.

Once all necessary information has been entered into the data entry fields, a user may select the "Save" button to save the inputting information. While information can be saved once information in both the "Current Strategy" and "Alternate Strategy" has been inputted, in an alternative embodiment a user can click or select the "Save" button 2275 after information in each strategy is inputted. Once all information has been entered, as shown in FIG. 248, current strategy option 2274 can provide a customer with an overview of the "Current Strategy" on page 2276. In particular, program can process the request and one or more diagrams can be provided on page 2276. Once again, the interdependent domains or categories—protection, assets, liabilities and cash flow—appear on the screen. First diagram 2278 can show a summary of a customer's protection, asset, liabilities, net worth and cash flow at the customer's current age (age 30). Second diagram 2280 can show a summary of the same or different factors at the end of the study period—in this case at age 60. In the "Current Strategy" a customer has purchased term life insurance, but as can be illustrated in diagram 2280, at age 60, life insurance is not indicated under protection. It is generally assumed in the life insurance industry that term life insurance will expire before a person dies and, thus, life insurance will have a value of $0 at death and not be factored into a person's net worth at death.

As shown in FIG. 250, a user may select current details option 2282 which can provide a detailed break-down of the "Current Strategy" on page 2284. In particular, the program can process the request and one or more tables can show various financial categories such as protection table 2286, assets table 2288, liabilities table 2290, cash flow table 2292 and net worth table 2294. Protection table 2286 can illustrate that paying $800 over 30 years will result in a death benefit of $0, assets table 2288 can illustrate that an original asset of $300,000 will be worth $1,994,188 at death which, as shown in net worth table 2294, will be left to a person's legacy. While net worth table 2294 shows a total net value at death of $2,994,188, in another embodiment, net worth table 2294 can show that the net value at death will be the same as the net value during a person's lifetime since ($1,994,188), as discussed above, it is assumed that a term life insurance policy will expire before death. Liabilities table 2290 also illustrates that the $1,994,188 figure does not take into account the tax liability or income tax of $487,966 that will have to be paid on interest income from the customer's asset(s). In this scenario, tax liability is shown, but not calculated into net wealth. It should be noted that the End Year Value in asset table 2288 reflects the total of the beginning year value, net annual inflow and interest for the year.

Page 2284 can also have summary area 2296 which can show total cash flow, net value during lifetime and net value at death. Accordingly, this tools gives a person a realistic view of assets by accounting for income tax and demonstrating that money to pay taxes will have to be paid by the customer from somewhere other than assets shown (e.g., paid from a savings account). In addition, such a tool also provide a user with a liability cash flow. In other word, cash flow table 2292 illustrates to a customer the amount of money that comes out of income every year. The Annual Net amount in cash flow table 2292 reflects the amount of money a person has to lay out every year such as for life insurance, savings and income tax. For example, at age 30, Annual Net is $16,225 which includes the $800 premium for term life insurance, the $10,000 Net Annual Inflow (the amount of money put towards savings), and the $5,425 of Annual Income Tax.

Figure 251:
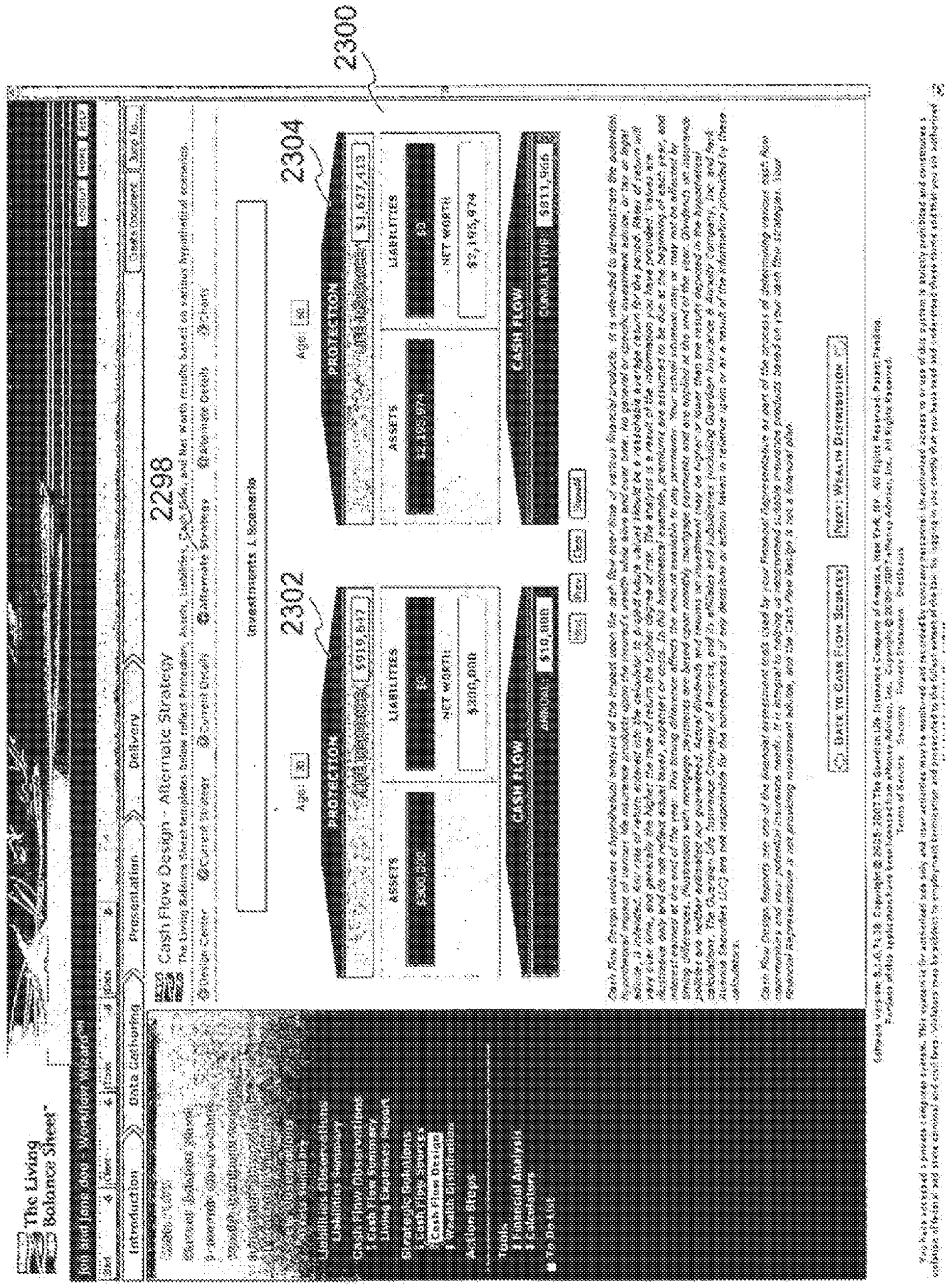

As shown in FIG. 251, a user can select alternate strategy option 2298. The program can process the request and can provide a customer with an overview of the "Alternate Strategy" on page 2300. As shown in FIG. 251, one or more diagrams can be provided on page 2300. Similar to the current strategy shown on page 2276, first diagram 3202 can show a summary of a customer's protection, asset, liabilities, net worth and cash flow at the customer's current age. Second diagram 2304 can show a summary of the same or different factors at the end of the study period—in this case at age 60.

Unlike term life insurance, permanent life insurance is assumed to remain in effect at a person's death and will be factored into a person's net worth at death as shown in diagram 2304. Such a tool provides a person with an overview of the benefits of purchasing permanent life insurance.

As shown in FIG. 252, a user may select alternate details option 2306. The program can process the request and can provide a customer with a detailed break-down of the "Alternate Strategy" on page 2308. Similar to current details page 2284, one or more tables can show various financial categories such as protection table 2286, assets table 2288, liabilities table 2290, cash flow 2292 and net worth table 2294. In particular, protection table 2286 can illustrate that paying $10,000 over 30 years will result in a death benefit of $1,627,413 and a cash value of $679,704. One benefit associated with purchasing permanent life insurance and reflected in page 2308 is that dividends from cash value can be used to purchase additional life insurance to increase the death benefit each year. Assets table 2288 can illustrate that an original asset of $300,000 factoring in cost savings associated with not paying term life insurance ($800 each year and factoring in the time-value money rate of 3%) as well as avoiding compound taxes will be worth $1,516,270 at the end of the study period. In general, the concept of compound taxes is that as one earns compound interest, income tax is also compounded. In the case shown in FIG. 252, the net annual inflow of assets table 2288 incorporates the amount saved by investment $800 instead of $10,000. So, for example, in year 1, the benefit of avoiding compound tax and time-value of money is $175 as illustrated by the net annual inflow being $975 as opposed to the $800 which was actually put into the asset. Similar to the cash flow in the "Current Strategy," the cash flow in the "Alternate Strategy" includes the amounts of money paid for insurance ($10,000), the net annual inflow, and the annual income tax. By reducing the net annual inflow, there is less money in taxable investments and, thus, less income tax. Moreover, since the net annual inflow for the "Alternate Strategy" already factors in tax, unlike the annual income tax for the Current Strategy, the net annual inflow is not taxed. For all these reasons, cash flow of the Alternate Strategy on page 2308 is the same as the cash flow of the Current Strategy on page 2284—$811,966. Such a scenario illustrates the advantages of investing interest income in a non-taxable asset such as life insurance instead of re-investing the income, thereby avoiding compound tax and taking advantage of the time-value of money.

Net worth table 2294 can show that the net value during a person's lifetime is the sum of cash value of the insurance policy and the value of assets. In this case the total net lifetime value is $2,195,974. Net worth table 2294 can also show that the net value at death is the sum of value of the insurance policy and the value of assets. In this case the total net at death value is $3,143,683. Liabilities table 2290 also illustrates that the $3,143,683 figure does not take into account the tax liability or income tax that will have to be paid on the interest income in the sum of $348,805. It should be noted that since the asset value remains lower each year, the annual income tax liability in the "Alternate Strategy" is less than the "Current Strategy."

Figure 253:
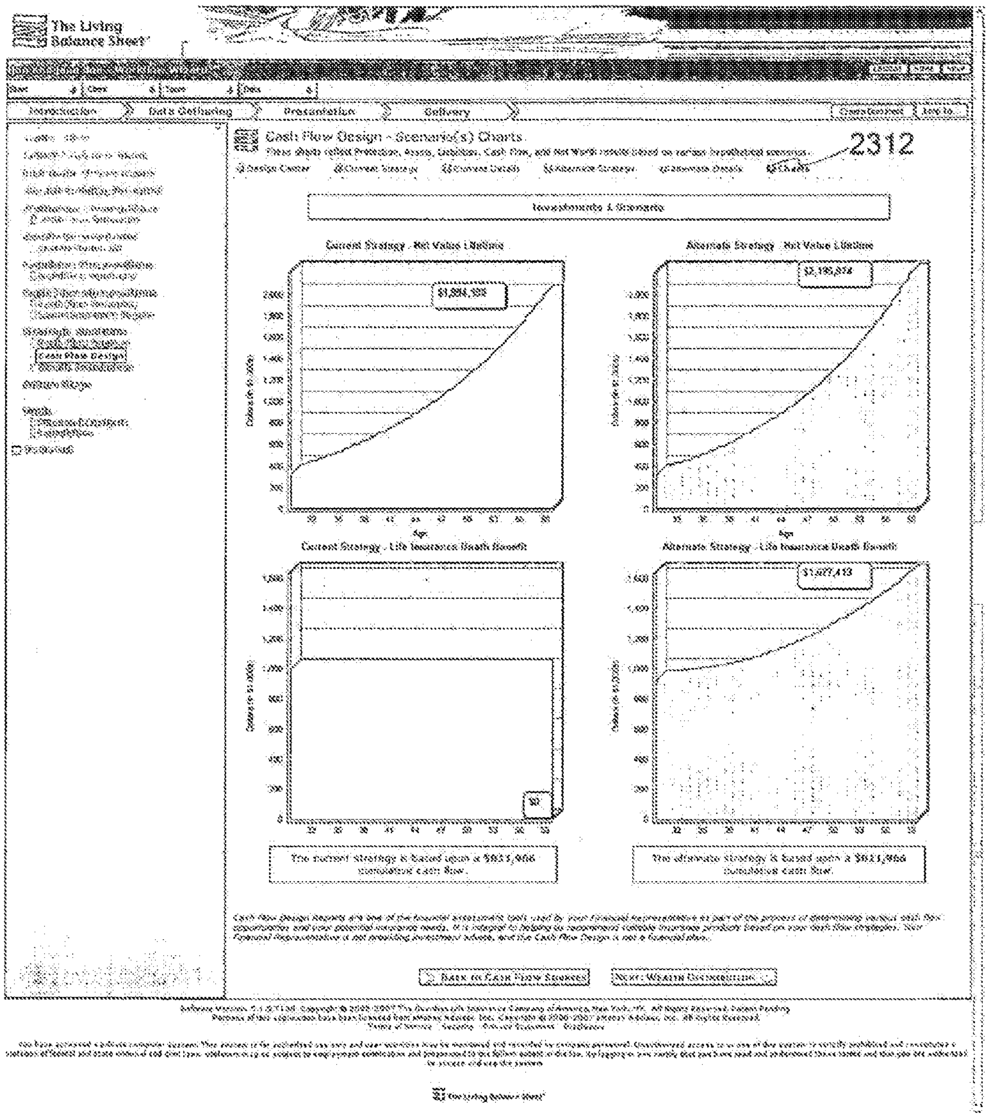

Additionally, cash flow design also provides a user with an illustration of the advantage of putting his/her money toward life insurance rather than assets that earn interest income. In particular, a person tax liability will be reduced and, even though a person is investing less money in assets, as shown in summary area 2310, net value of assets during lifetime as well as at death are higher in the "Alternate Strategy" than in the "Current Strategy." Net asset value during lifetime is higher because of the combination of the cash value of the insurance policy as well as the asset value. And, net asset value at death is also higher because permanent life insurance is deemed to be paid out at death, unlike term life. Accordingly, such a tool illustrates to a customer the advantages of purchasing permanent life insurance. To visually illustrate this point, chart option 2312 can be selected to put details of the "Current Strategy" and "Alternate Strategy" in a side-by-side comparison as shown in FIG. 253. While a bar chart is shown, it will be appreciated that the charts can be line charts or tabular charts showing monetary values in tabular form such as in FIG. 252.

Figure 254:
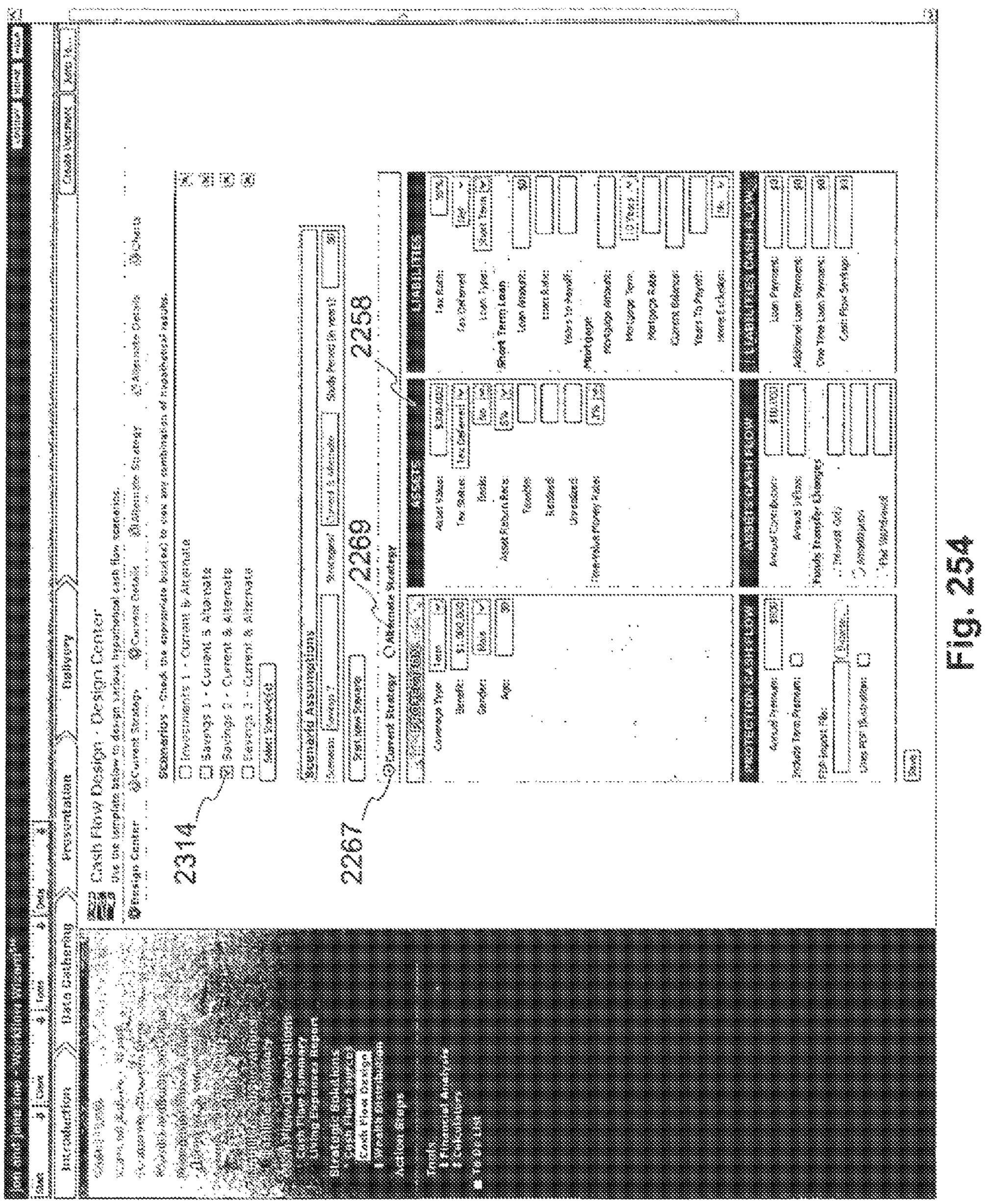
Figure 255:
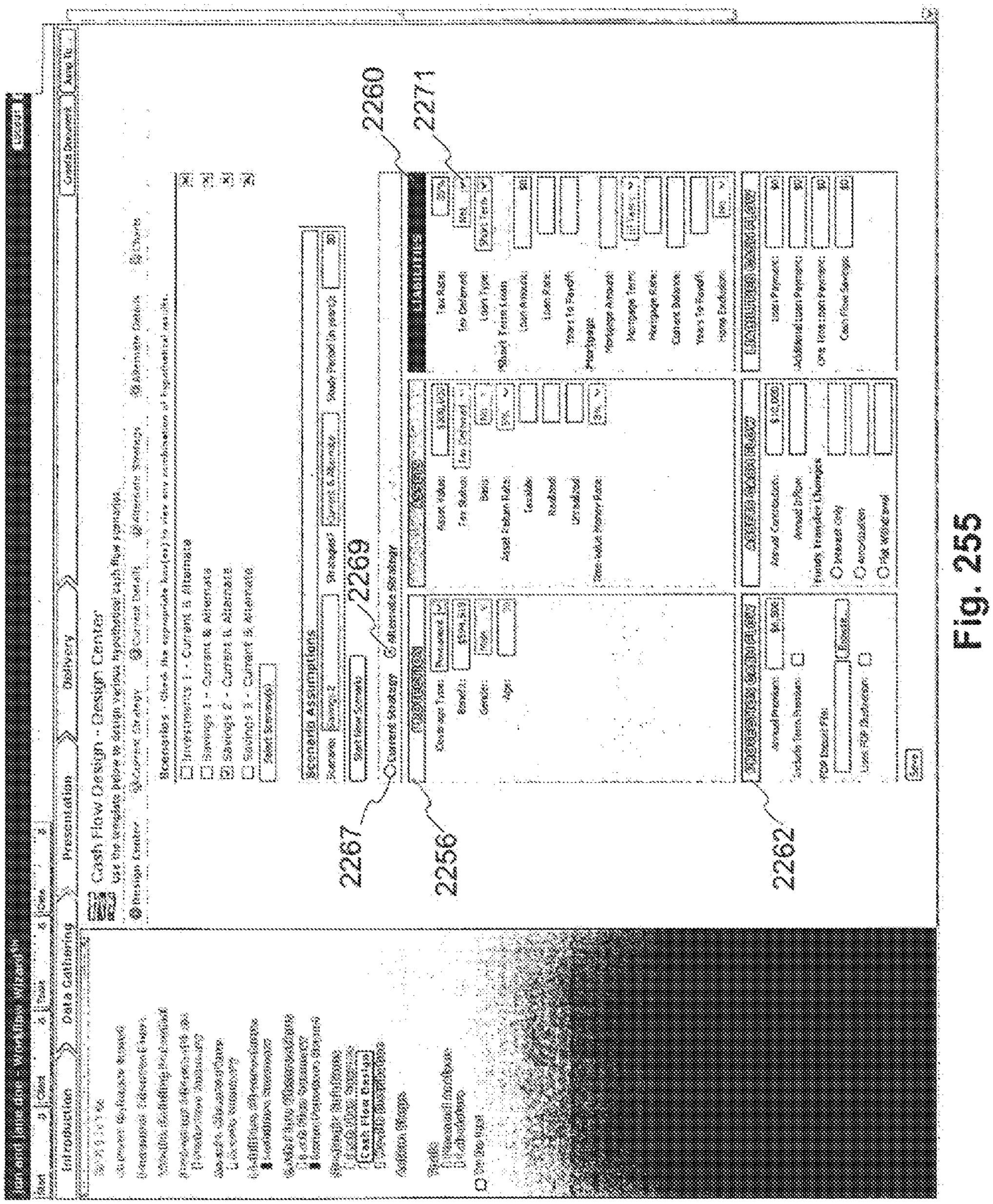

FIG. 254 illustrates alternative saving scenario 2314, namely "Savings 2." In Savings 2, the "Current Strategy" can be similar to the "Current Strategy" for Investment 1 of FIG. 248 except that asset field 2258 can indicate that the asset has tax deferred status. A user can then choose "Alternate Strategy" option 2269. As shown in FIG. 255, the program can process the request and can present to the user the same fields provided for "Current Strategy" option 2267. A user can input various assumptions in protection data entry field 2256 such as a customer has purchased permanent life insurance. In the "Alternative Scenario," the $10,000 annual contribution can be used for investing in permanent life insurance.

Figure 259:
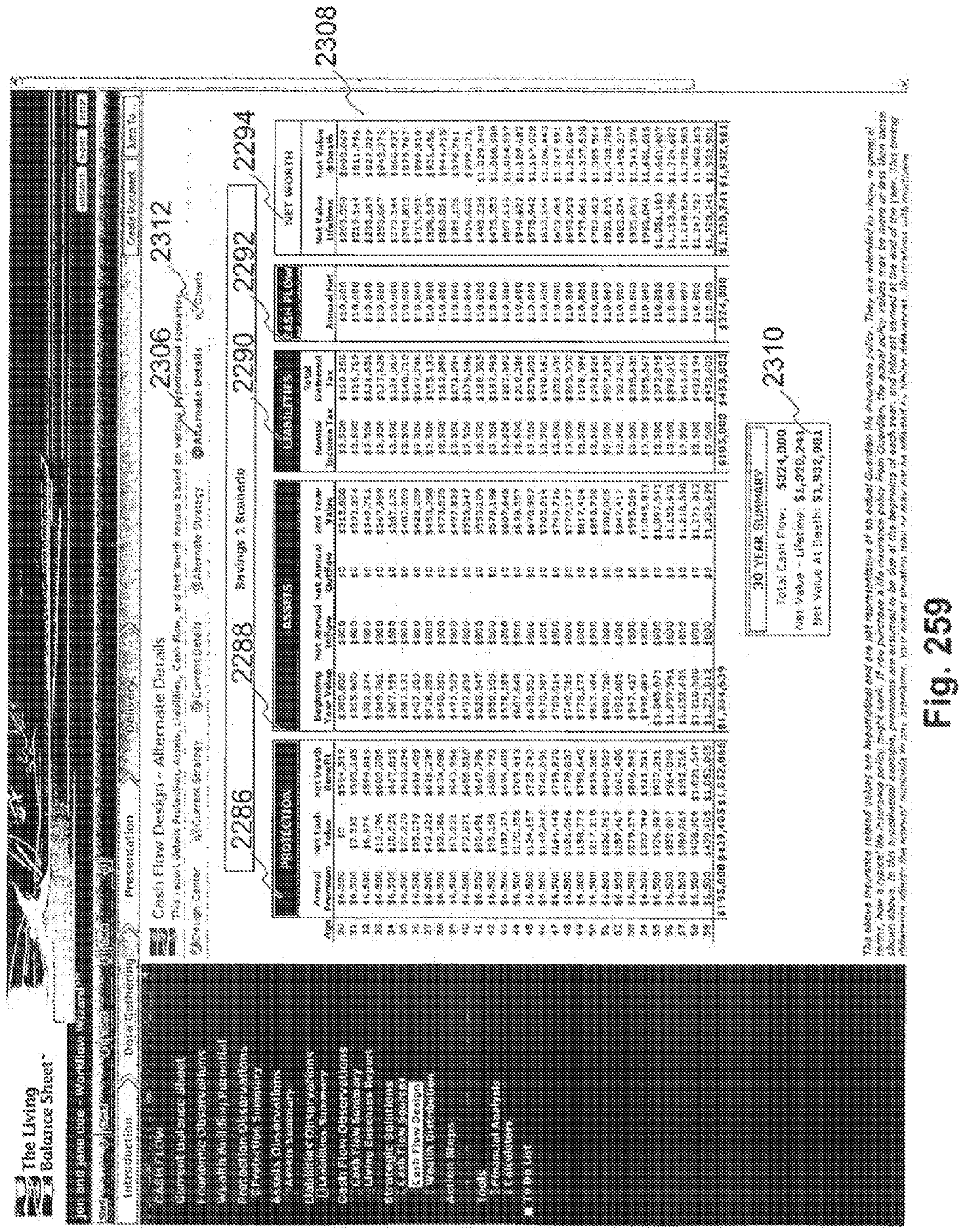

As shown in data entry field 2262, only $6500 goes towards paying the annual life insurance premium. $6500 can be used to purchase a policy with a death benefit of $594,519. Since the investment is tax-deferred such as a 401(k) or IRA, as shown in FIG. 259 under Annual Income Tax in the Liabilities table 2290, the remaining $3500 goes towards paying income tax on interest income. The money taxed by the government is money above the exclusion ratio of a tax-deferred investment (i.e., above the actual amount of money deemed contributed to the asset by the customer). Data entry field can provide a user with the ability to select net or gross tax deferred investment. While date entry field 2260 shows a tax deferred asset as being "Net" in field 2271, a user can use the drop-down menu to select "Gross." With the "Gross" option selected, the entire $10,000 would be put towards purchasing permanent life insurance, enabling a person to purchase more life insurance—$919,647. As a result, the tax owed on the tax deferred investment would have to be obtained/paid from another source.

Figure 256:
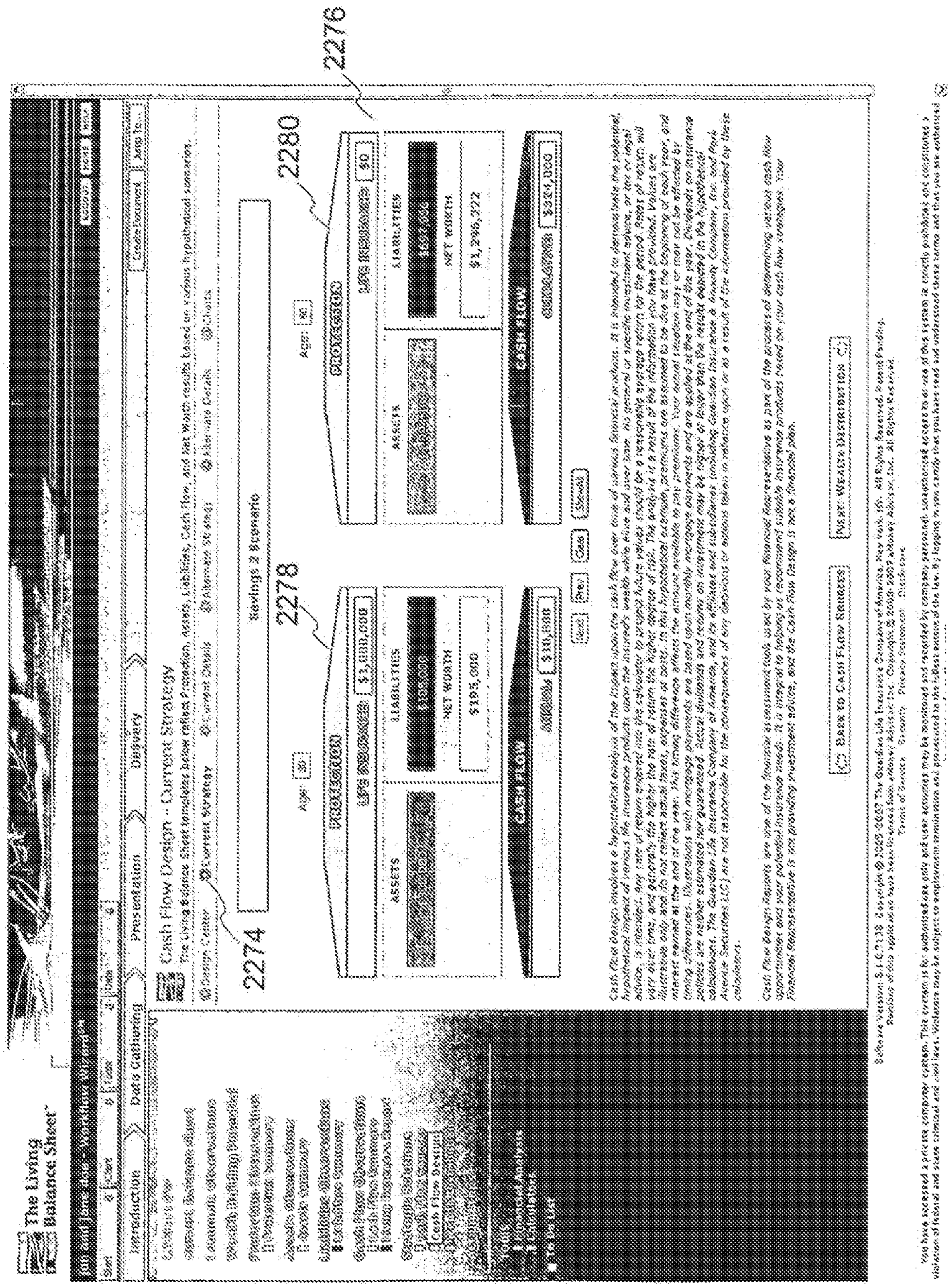

Once all necessary information has been entered into the data entry fields, a user may select current strategy option 2274. The program can process the request and, as shown in FIG. 256, can provide a customer with an overview of the "Current Strategy" on page 2276. One or more diagrams can be provided on page 2276. First diagram 2278 can show a summary of a customer's protection, asset, liabilities, net worth and cash flow at the customer's current age. Second diagram 2280 can show a summary of the same or different factors at the end of the study period—in this case at age 60. In the "Current Strategy" a customer has purchased term life insurance, but as can be illustrated in diagram 2280, at age 60, life insurance is not indicated under protection as term life insurance is assumed to expire prior to death.

Figure 257:
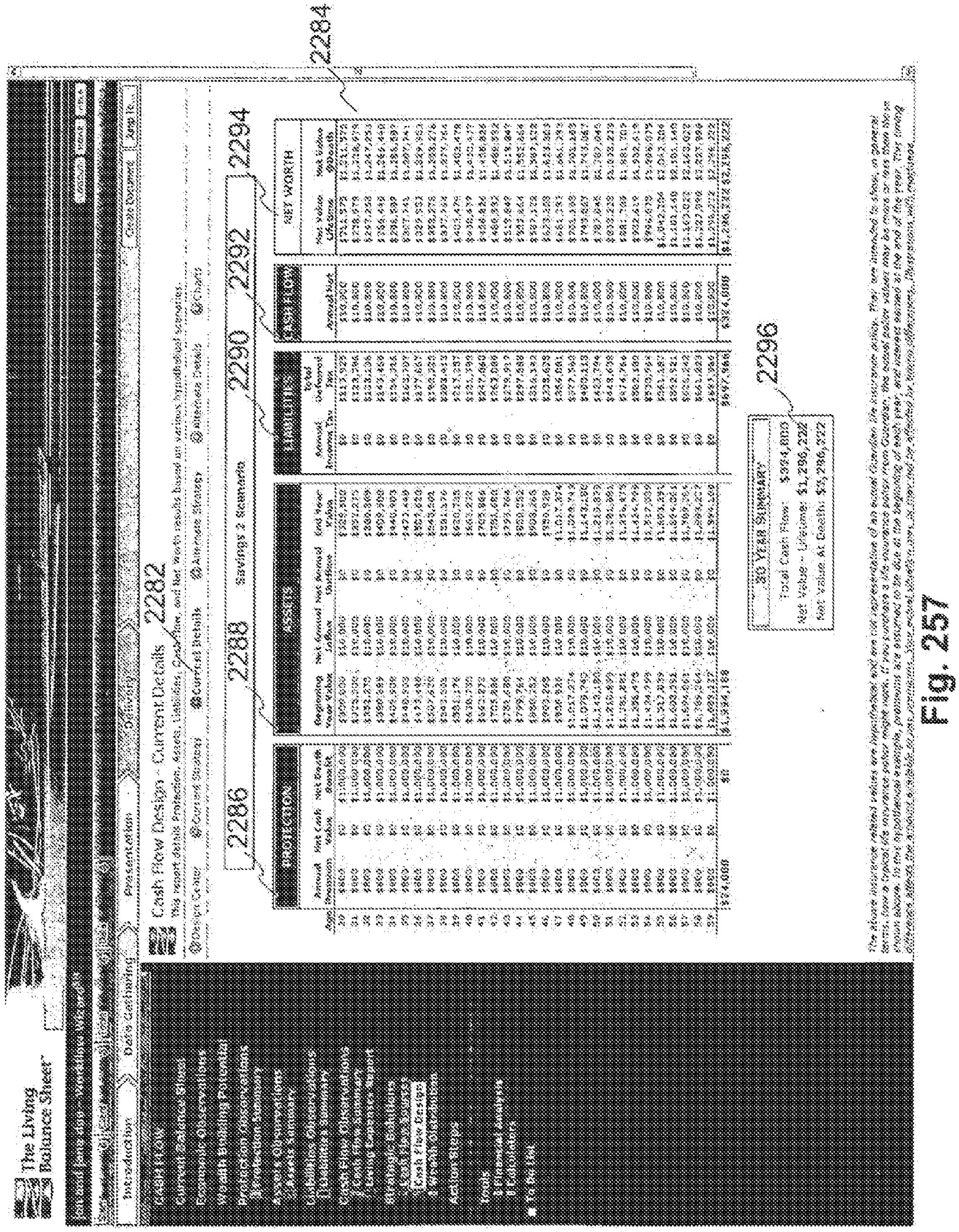

As shown in FIG. 257, a user may select current details option 2282. The program can process the request and can provide a customer with a detailed break-down of the "Current Strategy" on page 2284. Protection table 2286, assets table 2288, liabilities table 2290, cash flow table 2292 and net worth table 2294 can show year-by-year monetary values in tabular form. In particular, protection table 2286 can illustrate that paying $800 over 30 years will result in a death benefit of $0, assets table 2288 can illustrate that an original asset of $300,000 will be worth $1,994,188 at death. For any year, the net value lifetime (i.e., the amount of money a person actually has) is the end year value of the asset (in table 2288) less the total deferred tax on the assets (table 2290). At the end of the study period, in the "Savings 2" scenario, since tax is deferred and amounts to $697,966, the total net value at lifetime and at death reflect the total savings less the deferred tax. As such, the net value during lifetime equals $1,296,222 and net value at death is $2,296,222. Cash flow is $324,000, A comparison to FIG. 250, which shows a net value during lifetime of $1,994,188 and net value at death of $2,994,188 as well as cash flow of $811,966, demonstrates the effects different tax strategy (taxable compared to tax-deferred) have on a customer's financial condition. Summary area 2296 can also be provided. Similar to the "Investment 1" scenario discussed above, such a tool illustrates to a customer that term life insurance is deemed not to be in effect at death.

Figure 258:
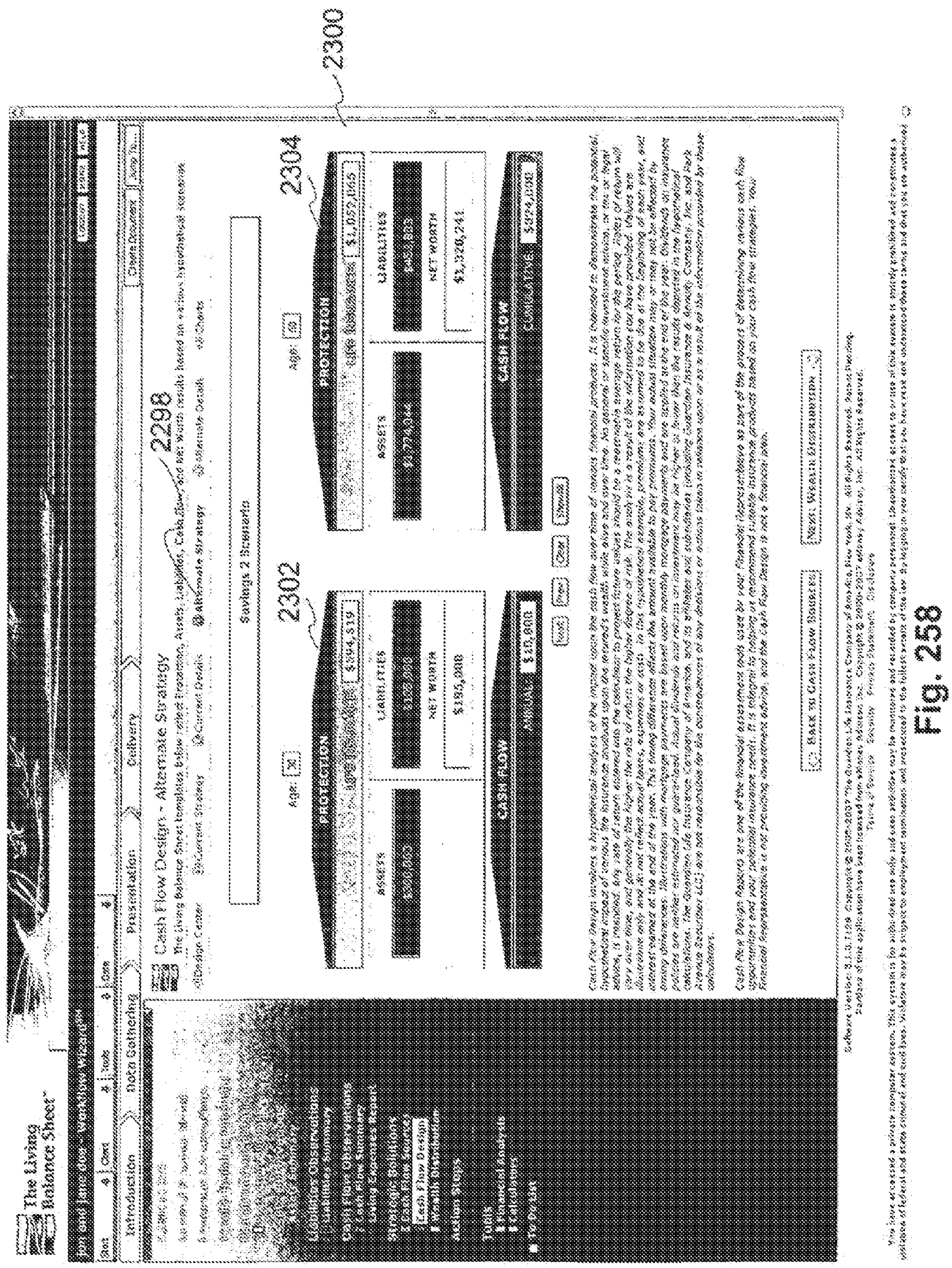

As shown in FIG. 258, a user may select alternate strategy option 2298 which can provide a customer with an overview of the "Alternate Strategy" on page 2300. As shown in FIG. 258, one or more diagrams can be provided on page 2300. Similar to current strategy shown on page 2276, first diagram 2302 can show a summary of a customer's protection, asset, liabilities, net worth and cash flow at the customer's current age. Second diagram 2304 can show a summary of the same or different factors at the end of the study period.

As shown in FIG. 259, a user may also select alternate details option 2306. The program can process the request and can provide a customer with a detailed break-down of "Alternate Strategy" on page 2308. Similar to current details page 2284, one or more tables can show various financial categories such as protection table 2286, assets table 2288, liabilities table 2290, cash flow table 2292 and net worth table 2294. In particular, protection table 2286 can illustrate that paying $6,500 over 30 years will result in a death benefit of $1,052, 065 and a cash value of $439,405. Assets table 2288 can illustrate that an original asset of $300,000 with $800 being invested every year will be worth $1,334,639. As can be seen on assets table 2288, the net annual inflow will be $800 each year. Since the investment is tax deferred, unlike previous "Investment 1" scenario, the net annual inflow amount does not take into account the saving factor associated with avoiding compound taxes and/or time value money rate. Only the savings associated with not paying a term life insurance premium is factored into the asset value. Liabilities table 2290 can provide a user with a realistic view of tax liabilities. Such a tool provides a user with an illustration of the advantage of putting his/her money toward life insurance rather than assets and earning interest income. Moreover, even though a person is investing less money in assets, as shown in summary area 2310, net value of assets during lifetime as well as at death are higher in the "Alternate Strategy" than in the "Current Strategy" when an asset is tax deferred. Specifically, net asset value during lifetime is higher because of the combination of cash value of the insurance policy as well as the asset value. Net asset value at death is also higher because permanent life insurance is deemed to be paid out at death, unlike term life. Accordingly, such a tool illustrates to a customer the advantages of purchasing permanent life insurance. While not shown, chart option 2312 can be selected to illustrate the "Current Strategy" and "Alternate Strategy" in a side-by-side comparison.

Figure 260:
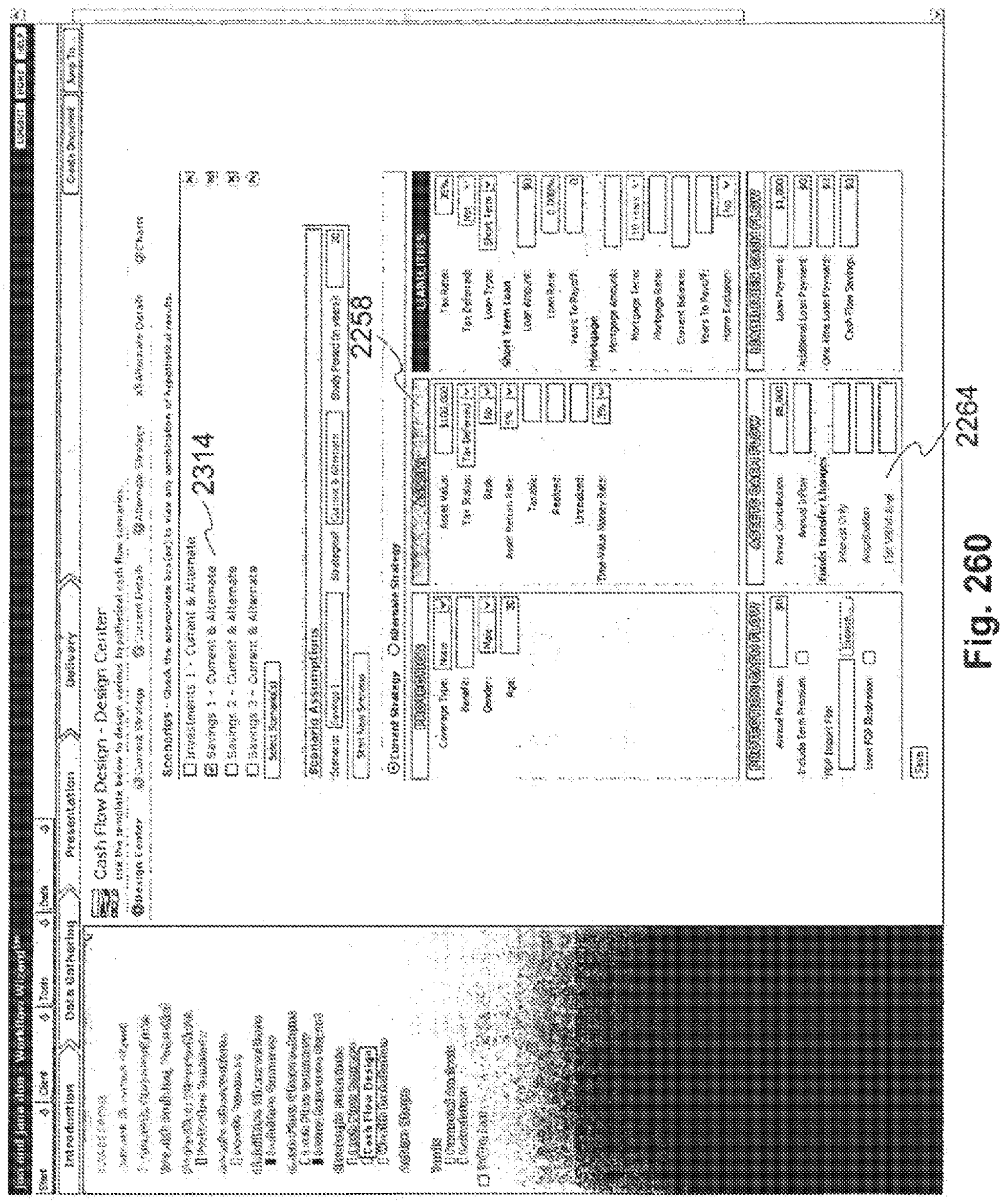

As shown in FIG. 260, in an alternative savings scenario, the only information that may be imputed is information on assets in fields 2258 and 2264. The Cash Flow Design tool allows a user to create virtually an unlimited number of scenarios factorings in insurance options, credit card debt, mortgage debt and selection, mutual funds or any combination thereof.

Figure 261:
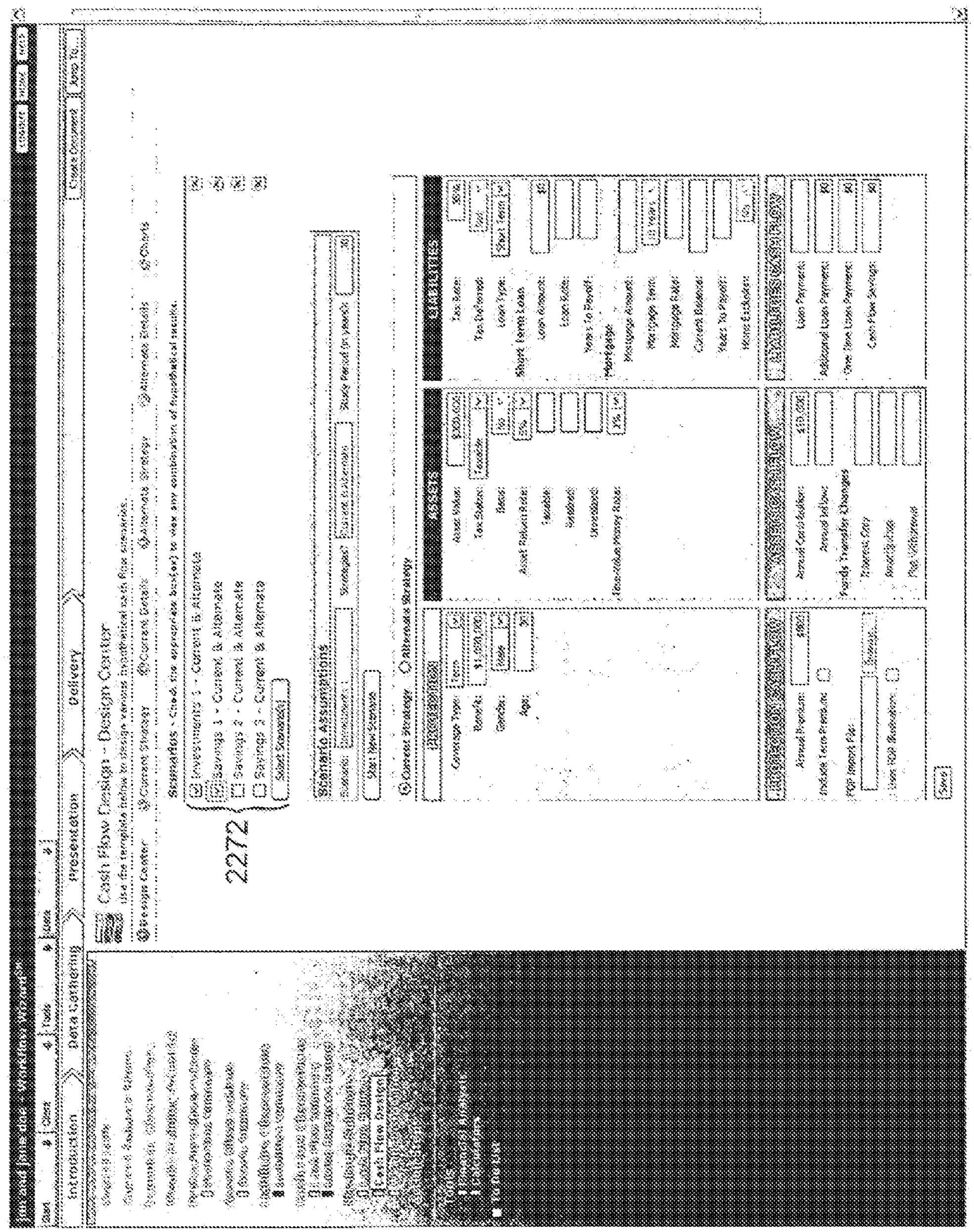
Figure 274:
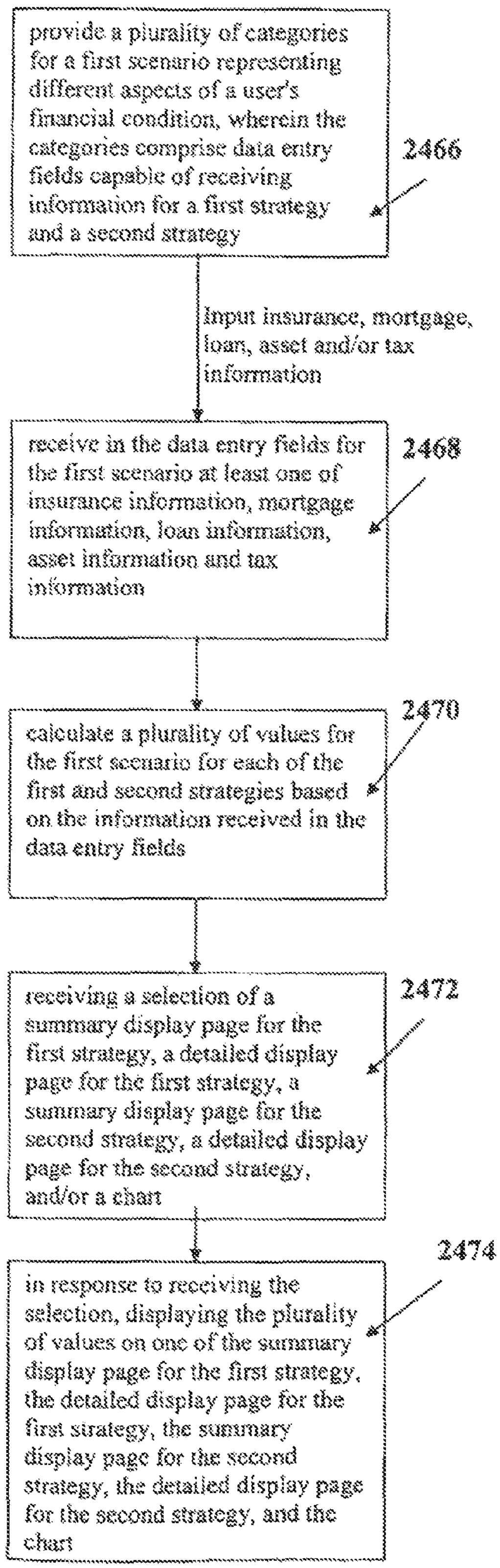

As shown in FIG. 261, one of the advantages of the cash flow design tool is that it enables a user to combine two or more scenarios such as illustrated in area 2272. In general, as illustrated in FIG. 274, a plurality of categories can be provided for a first scenario representing different aspects of a user's financial condition (step 2466). The categories can include data entry fields capable of receiving information for a first strategy and a second strategy. Insurance information, mortgage information, loan information, asset information and/or tax information can be received in the data entry fields for the first scenario (step 2468). A plurality of values can be calculated for the first scenario for each of the first and second strategies based on the information received in the data entry fields (step 2470). A selection of a summary display page for the first strategy, a detailed display page for the first strategy, a summary display page for the second strategy, a detailed display page for the second strategy, and/or a chart can be received (step 2472). In response to receiving the selection, the plurality of values can be displayed in the summary display page for the first strategy, the detailed display page for the first strategy, the summary display page for the second strategy, the detailed display page for the second strategy, or the chart (step 2474).

Moreover, a plurality of categories can be provided for a second scenario representing different aspects of a user's financial condition. The categories can include data entry fields capable of receiving information for a first strategy and a second strategy. Insurance information, mortgage information, loan information, asset information and/or tax information can be received in the data entry fields for the second scenario. A plurality of values can be calculated for the second scenario for each of the first and second strategies based on the information received in the data entry fields. The plurality of values for the first and second strategy can be displayed on the summary display page for the first strategy, the detailed display page for the first strategy, the summary display page for the second strategy, the detailed display page for the second strategy, or the chart.

Figure 262:
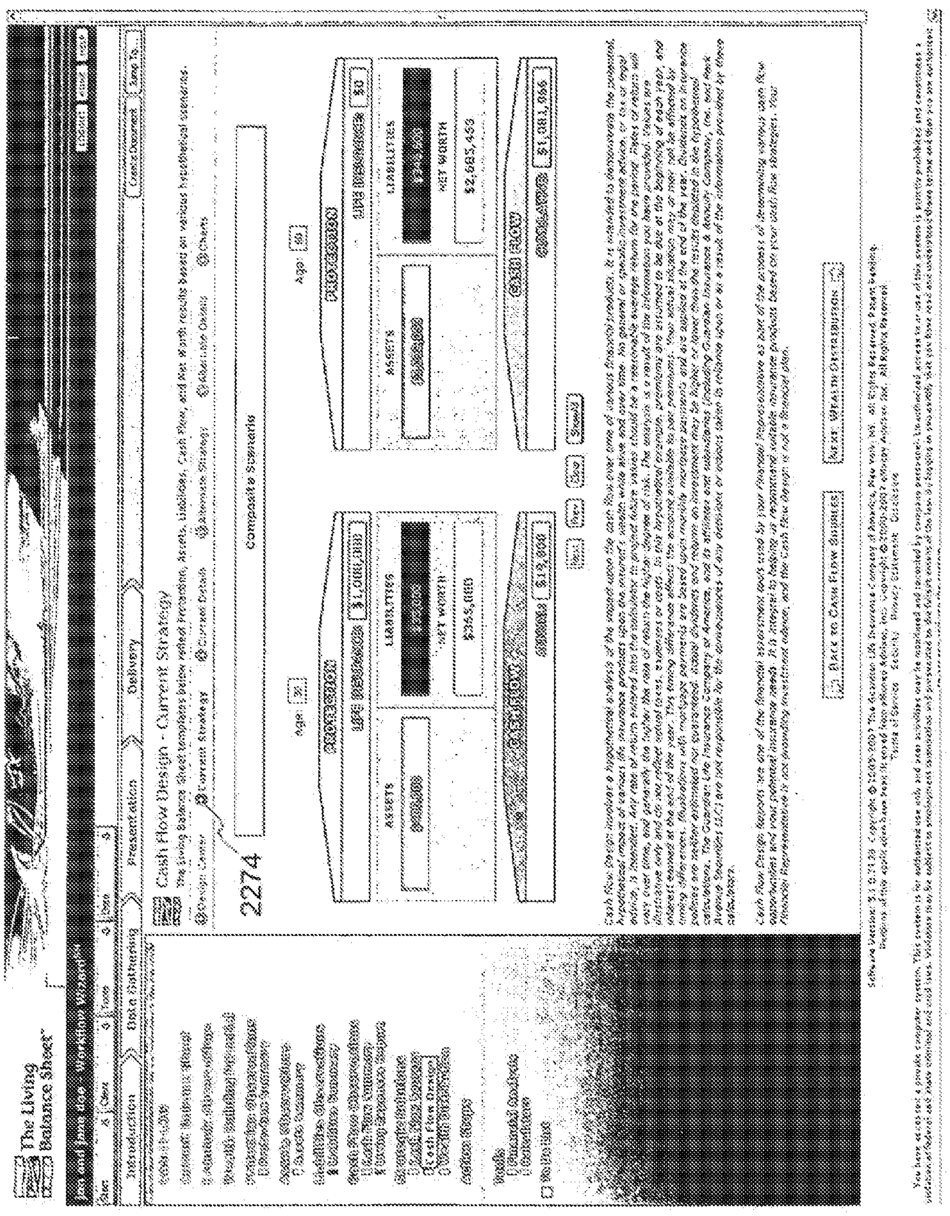
Figure 263:
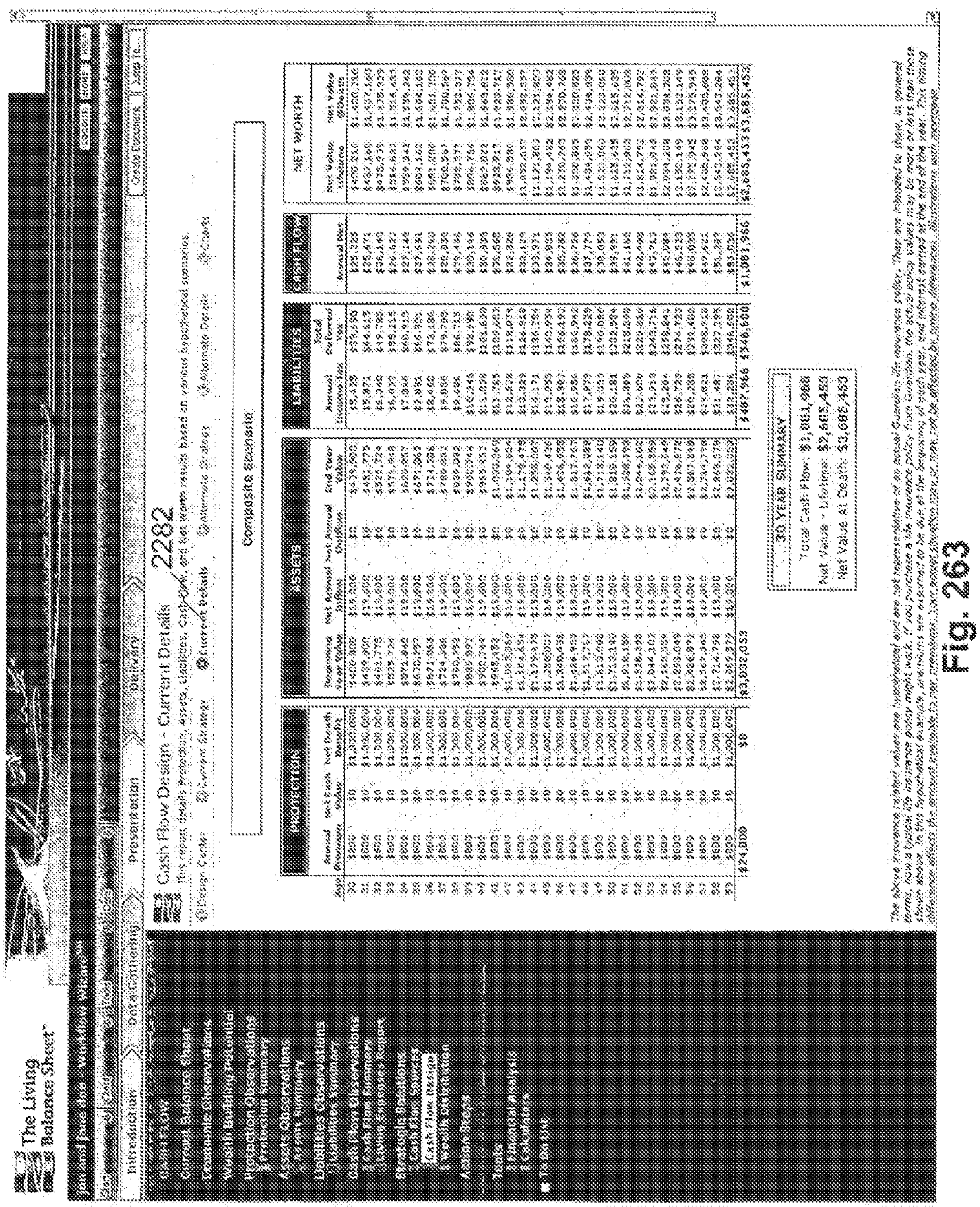
Figure 264:
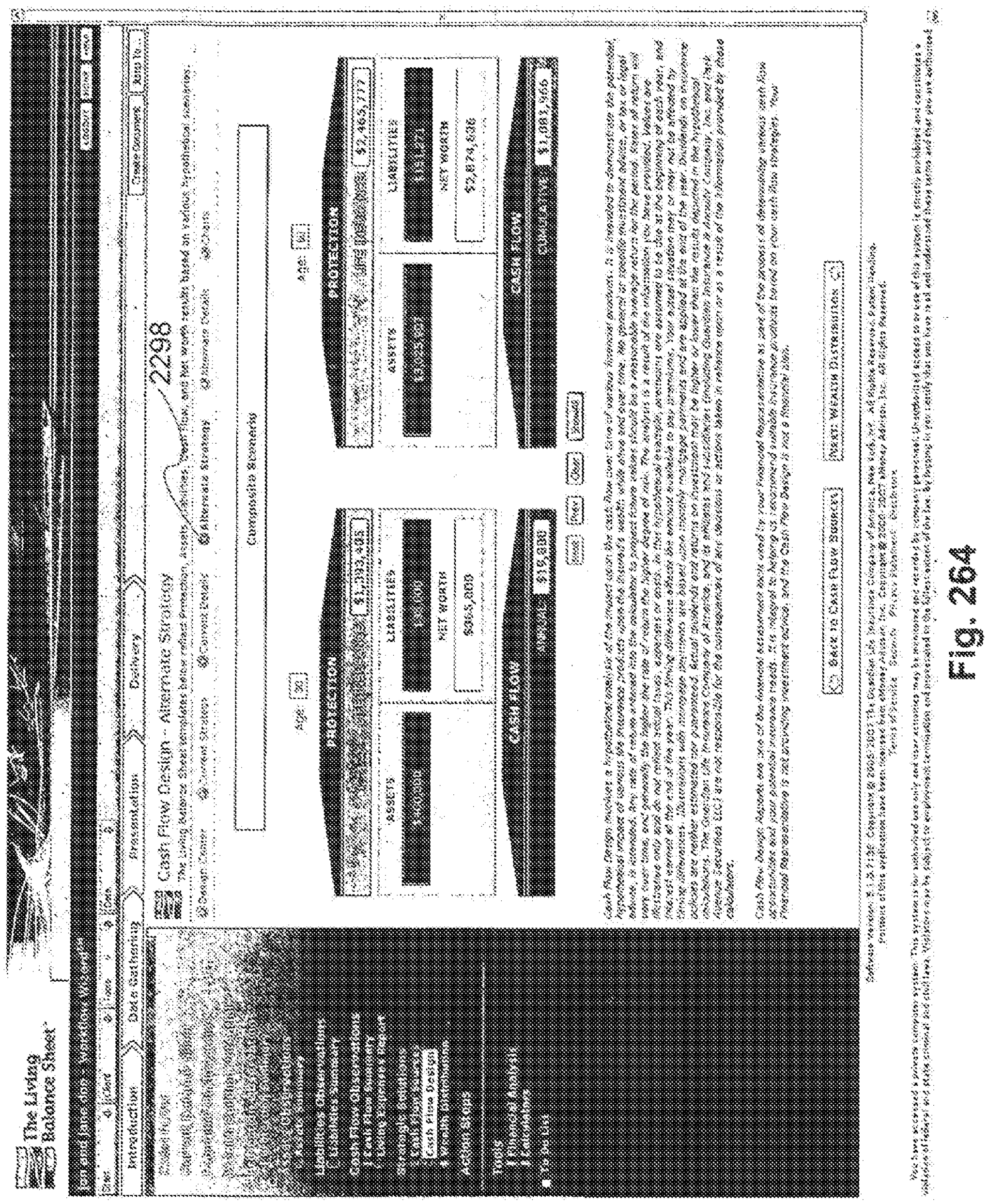
Figure 265:
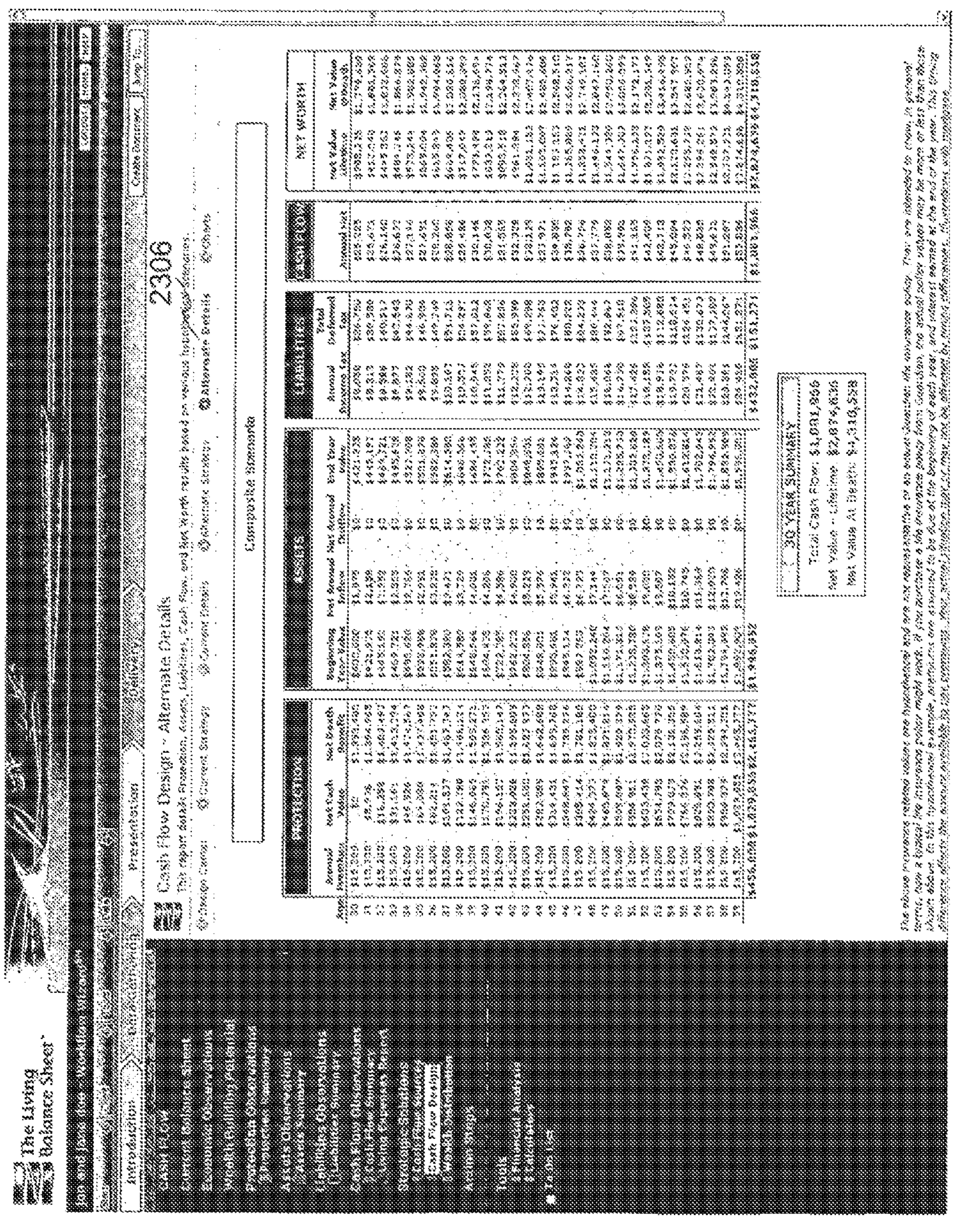

For example, a user may select Investment 1 and Savings 1 to provide a valuable investment tool. Similar to the previous examples, a user can select current strategy option 2274 to give an investment overview (FIG. 262), current details option 2282 to give a tabular view of investment scenarios (FIG. 263), alternate strategy option 2298 to give an alternative investment overview (FIG. 264), alternate details option 2306 to give a tabular view of alternative investment scenarios (FIG. 265) and a chart which illustrates a comparison between current and alternative investment scenarios (not shown). Monetary values can reflect information inputted for both the first and second scenarios.

Figure 275:
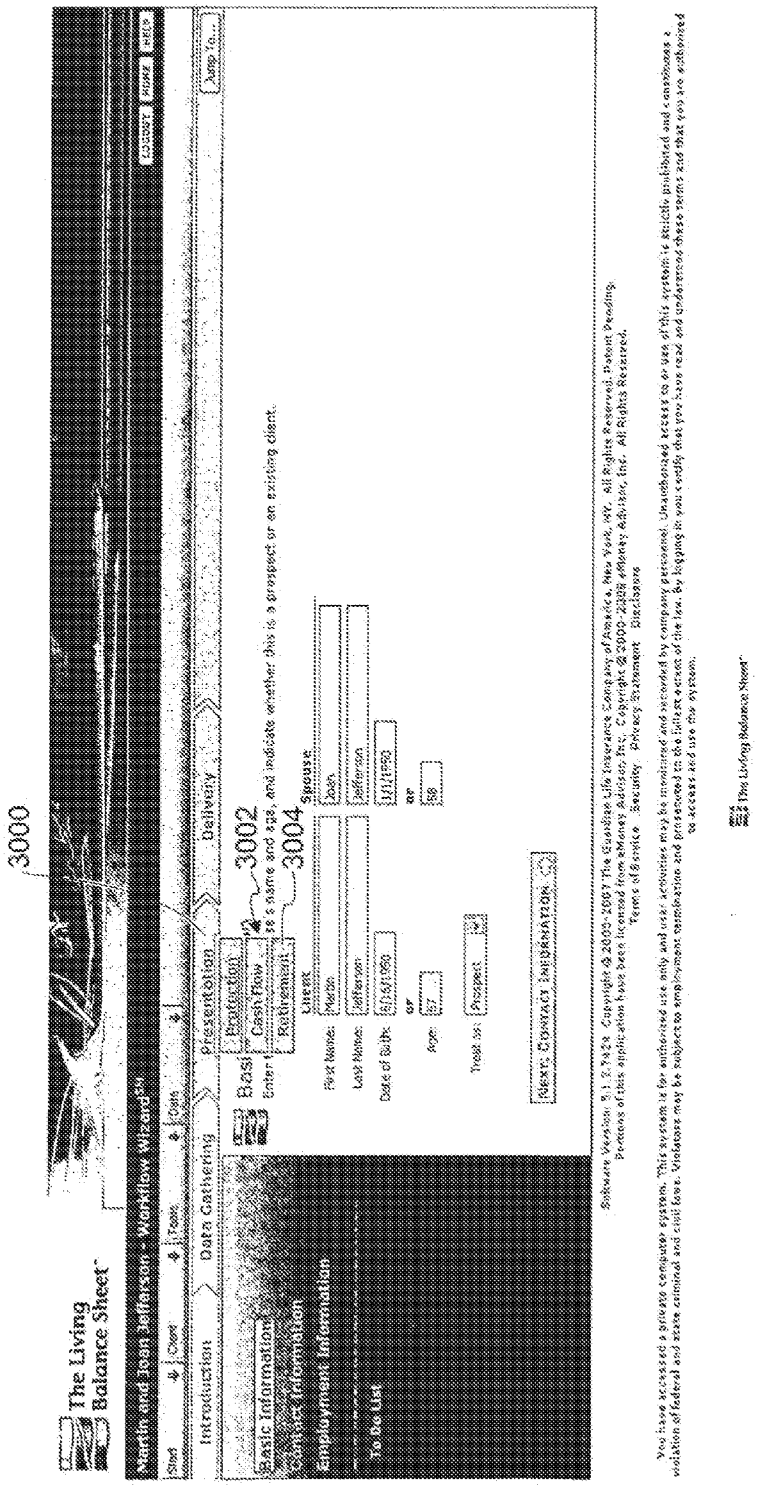
FIGS. 275-439 and 450-452 are diagrams of illustrative display pages for implementing interactive methods and systems for retirement related activities in accordance with embodiments of the invention.

A retirement component can be implemented to provide various retirement related features. One or more retirement related features can be implemented as standalone tools or can be incorporated into the systems, methods, or applications illustratively described herein. Combinations may provide particular advantages not provided by the prior art. The one or more retirement related features can provide tools for insurance professionals to, for example, illustrate the benefits of insurance for a particular customer or to analyze insurance for someone at or during retirement. The tools can also illustrate to a customer factors affecting retirement as well as the customers financial condition during retirement. As shown in FIG. 275, a user can select or click presentation tab 3000 to generate drop-down menu 3002 which can contain one or more links to various presentation pages such as retirement link 3004.

Retirement link 3004 can provide the user with a number of tools related to retirement. For example, if a user chooses retirement link 3004, a page such as current balance sheet page 3010 of FIG. 276 can be displayed. If desired, the selection of link 3004 may lead to some other resource such as those identified in retirement list of options field 3006.

Figure 276:
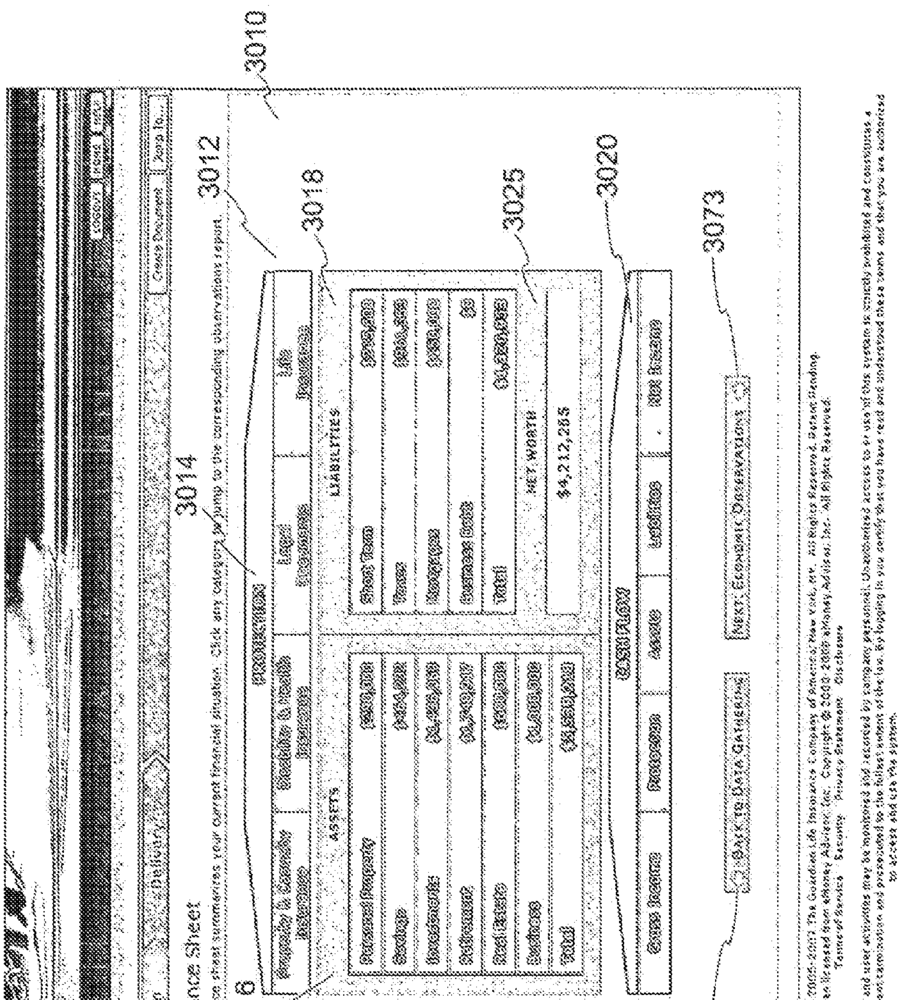

A user can choose a particular option, for example, to access a tool, set or category of tools, or to branch to another aspect of the interface. With reference now to FIG. 276, a user can select a link such as current balance sheet option 3008 to access current balance sheet display 3012. In the illustrative embodiment shown, current balance sheet display 3012 is a default resource for current balance sheet page 3010. However, other defaults may be also be used if desired. Current balance sheet display 3012 can provide a summary of the four interdependent domains or categories—protection, assets, liabilities and cash flow—displayed on a single page with links to various subcategories (related to protection, assets, liabilities and cash flow). For example, current balance sheet display 3012 can contain information related to the four interdependent domains or categories—protection category region 3014, assets category region 3016, liabilities category region 3018 and cash flow category region 3020. Current balance sheet display 3012 can also include net worth category region 3025. Category regions 3014, 3016, 3018, 3020 can include individual sub-category regions such as property & casualty insurance, disability & health insurance, legal documents and life insurance in protection category region 3014; personal property, savings, investments, retirement, real estate, business and total in assets category region 3016; short term liabilities, taxes, mortgages, business debt and total under liabilities category region 3018; and gross income, protection, assets, liabilities and net income under cash flow category region 3020.

Figure 277:
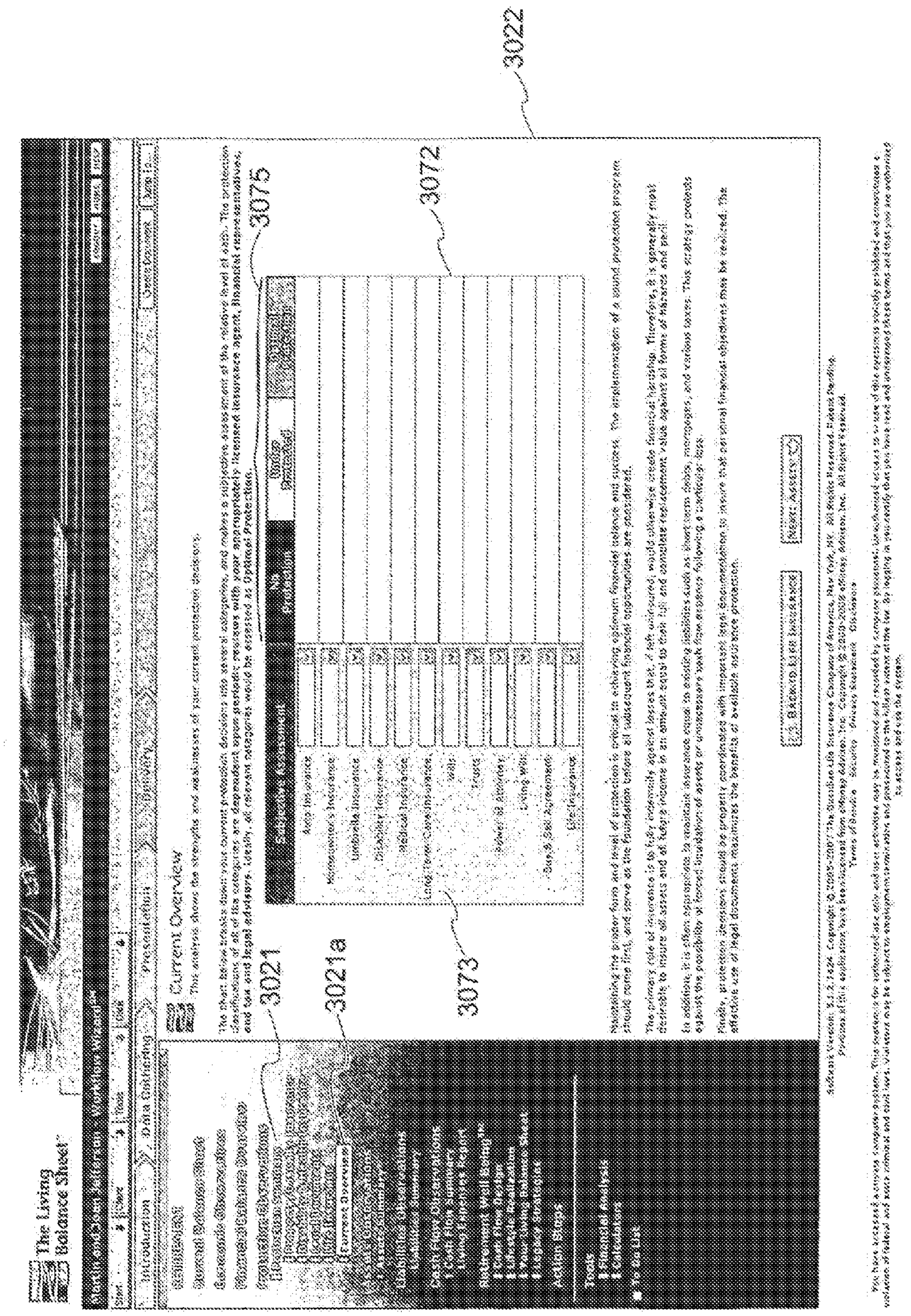
Figure 278:
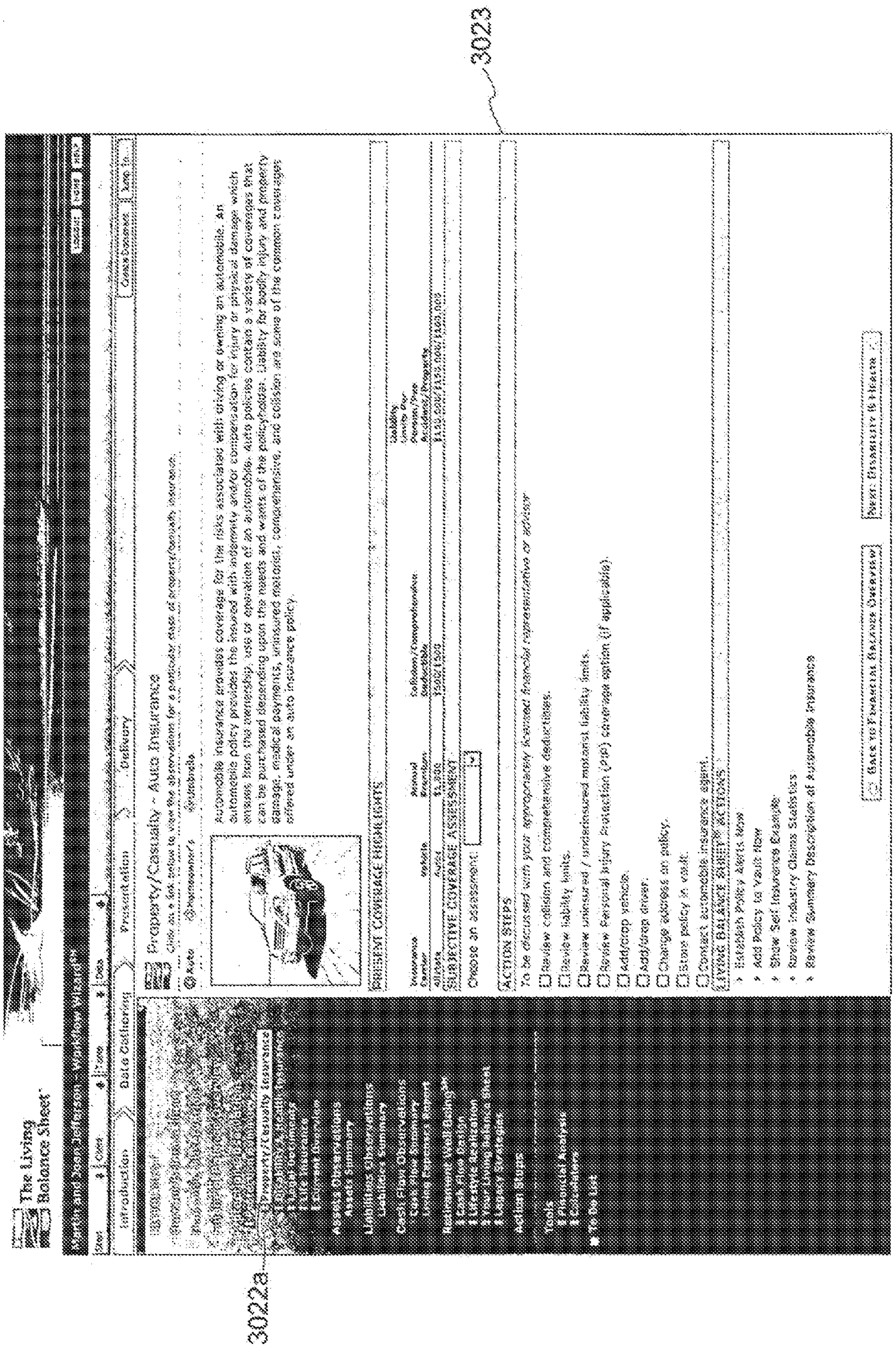
Figure 279:
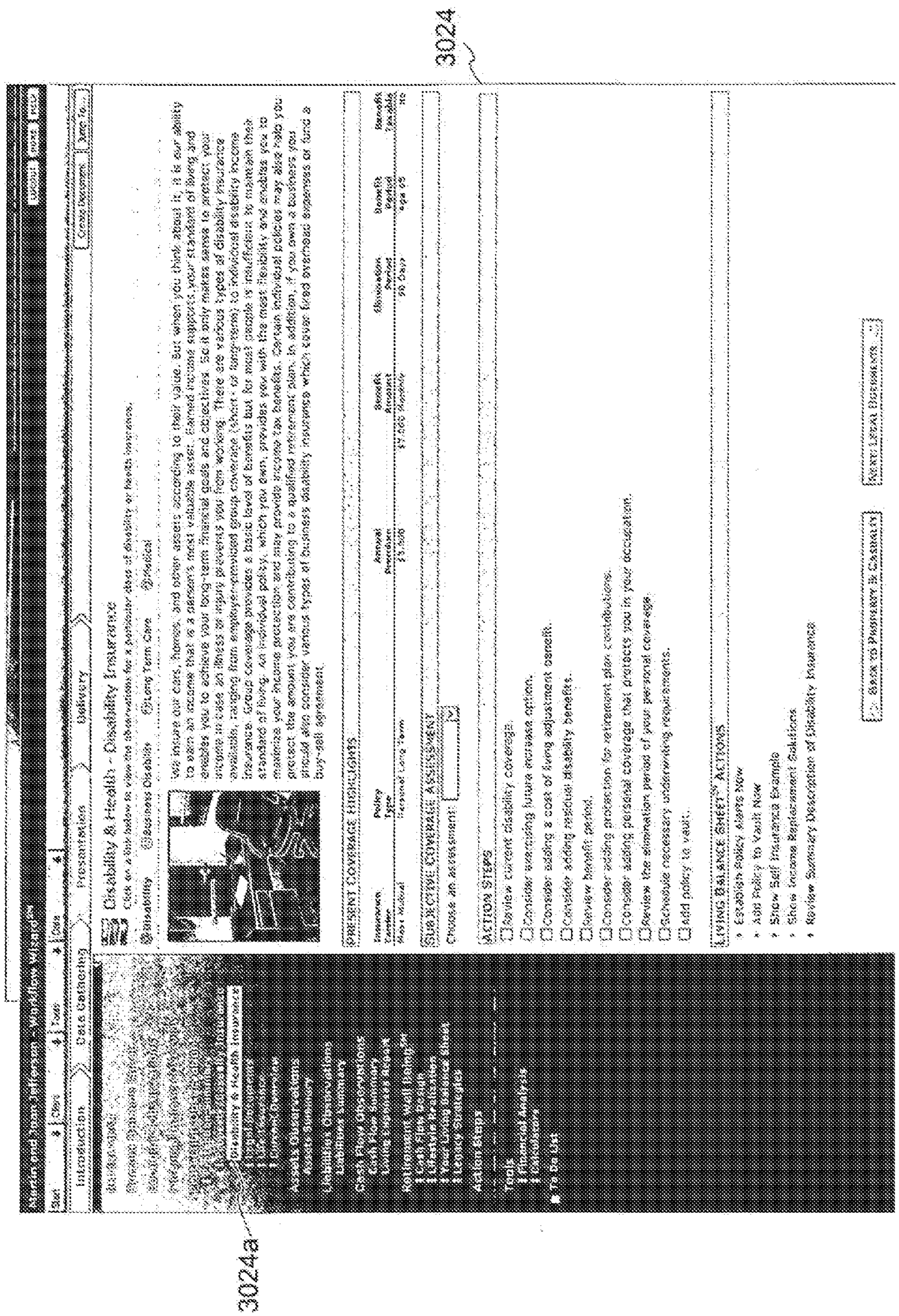
Figure 280:
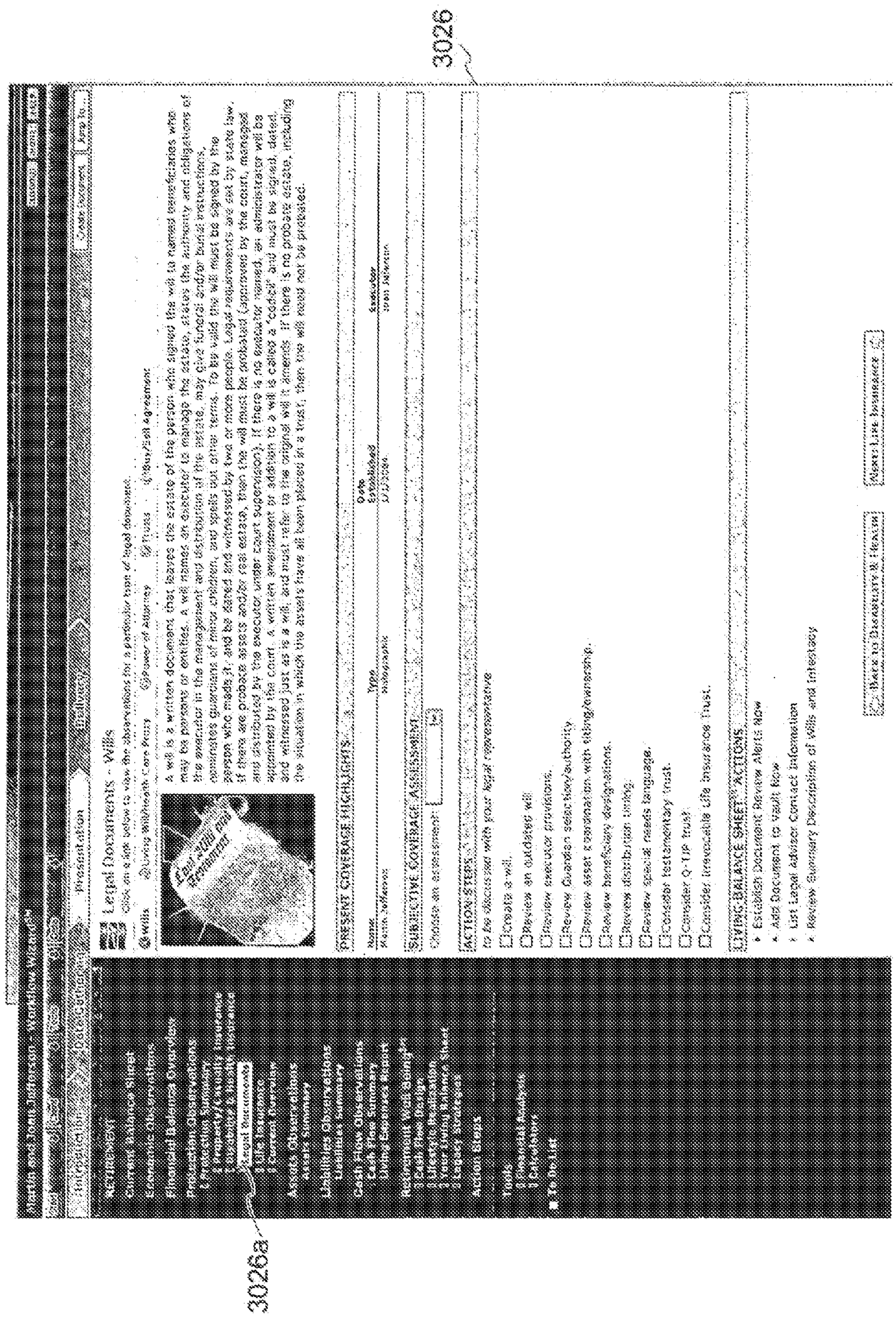
Figure 281:
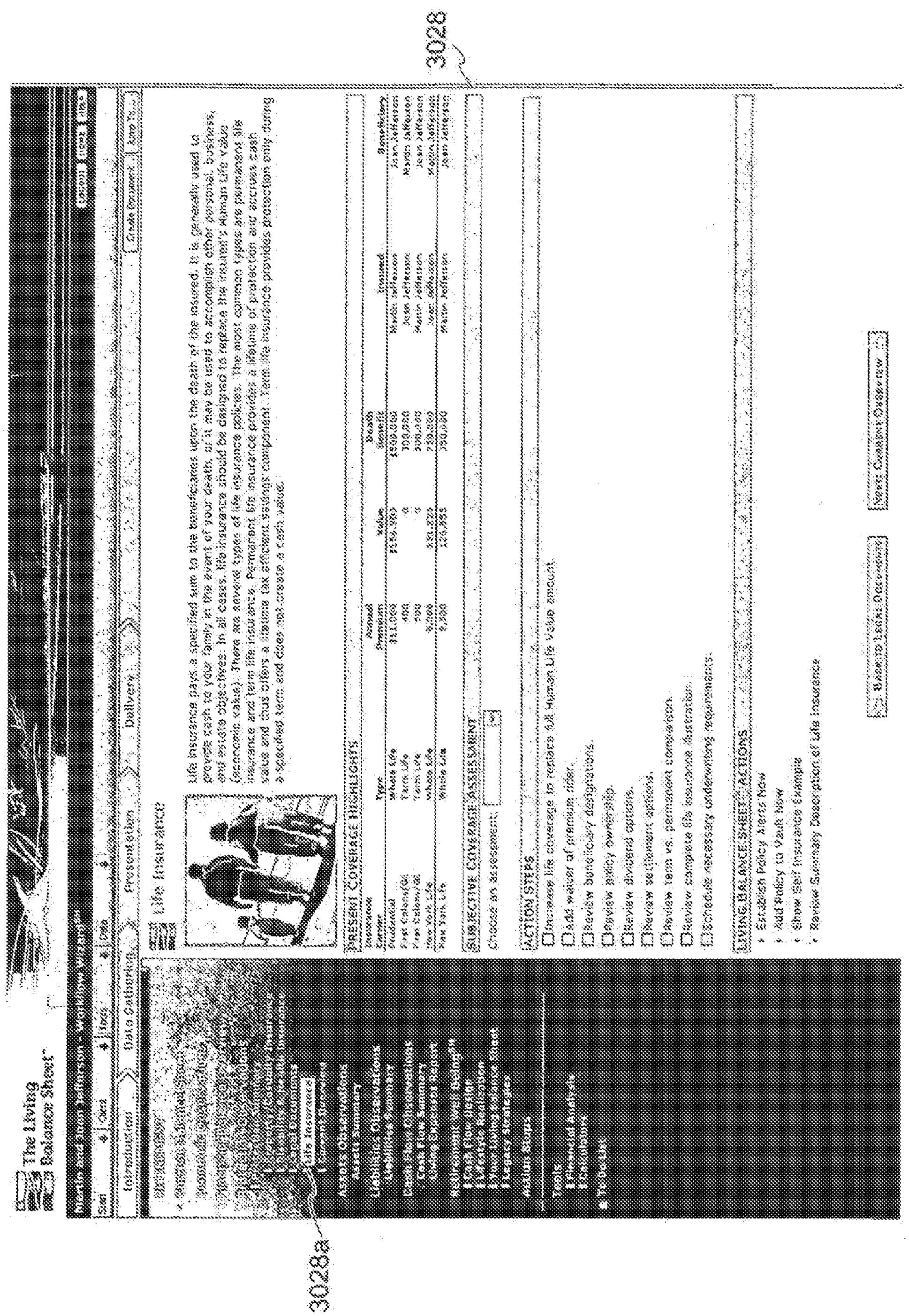

Each category and subcategory region can provide a link to another page such that by selecting or clicking a category or subcategory region with a cursor (e.g., by clicking on an option or link therein), in response to which, a display page associated with the selected category or subcategory region can be displayed. For example, protection summary link 3021 can be selected to access relates features. In response to the selection, with reference now to FIG. 277, protection summary link 3021 can be expanded revealing various subcategories. In addition, once expanded, current overview page 3022 can be displayed in response to selecting current overview option. Selecting or clicking property & casualty insurance, disability & health insurance, legal documents, or life insurance subcategory regions in Protection category region 3014 can result in displaying pages such as those illustrated in FIGS. 278-281: property & casualty insurance page 3023, disability & health insurance page 3024, legal documents page 3026, and life insurance page 3028, respectively.

Figure 282:
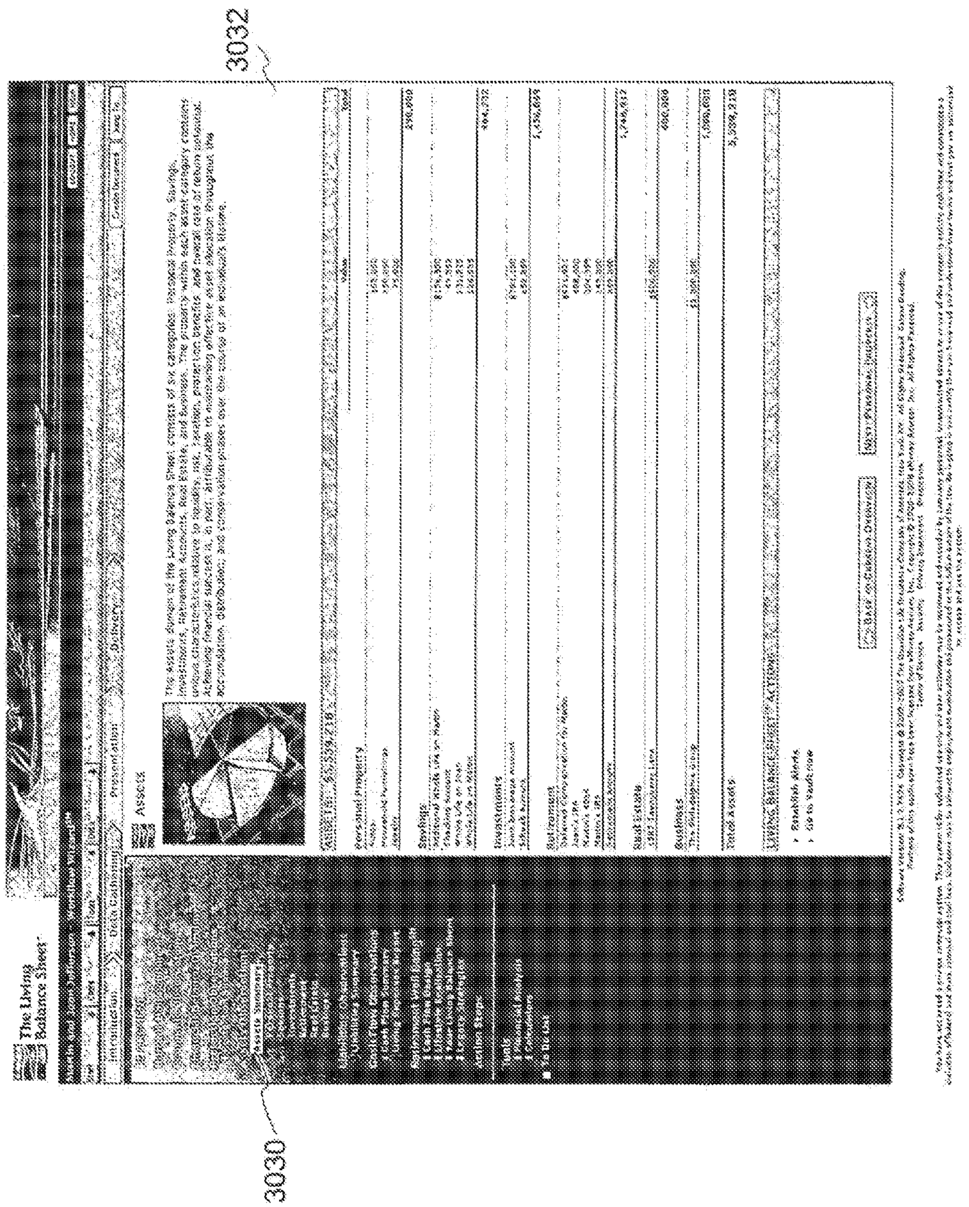
Figure 283:
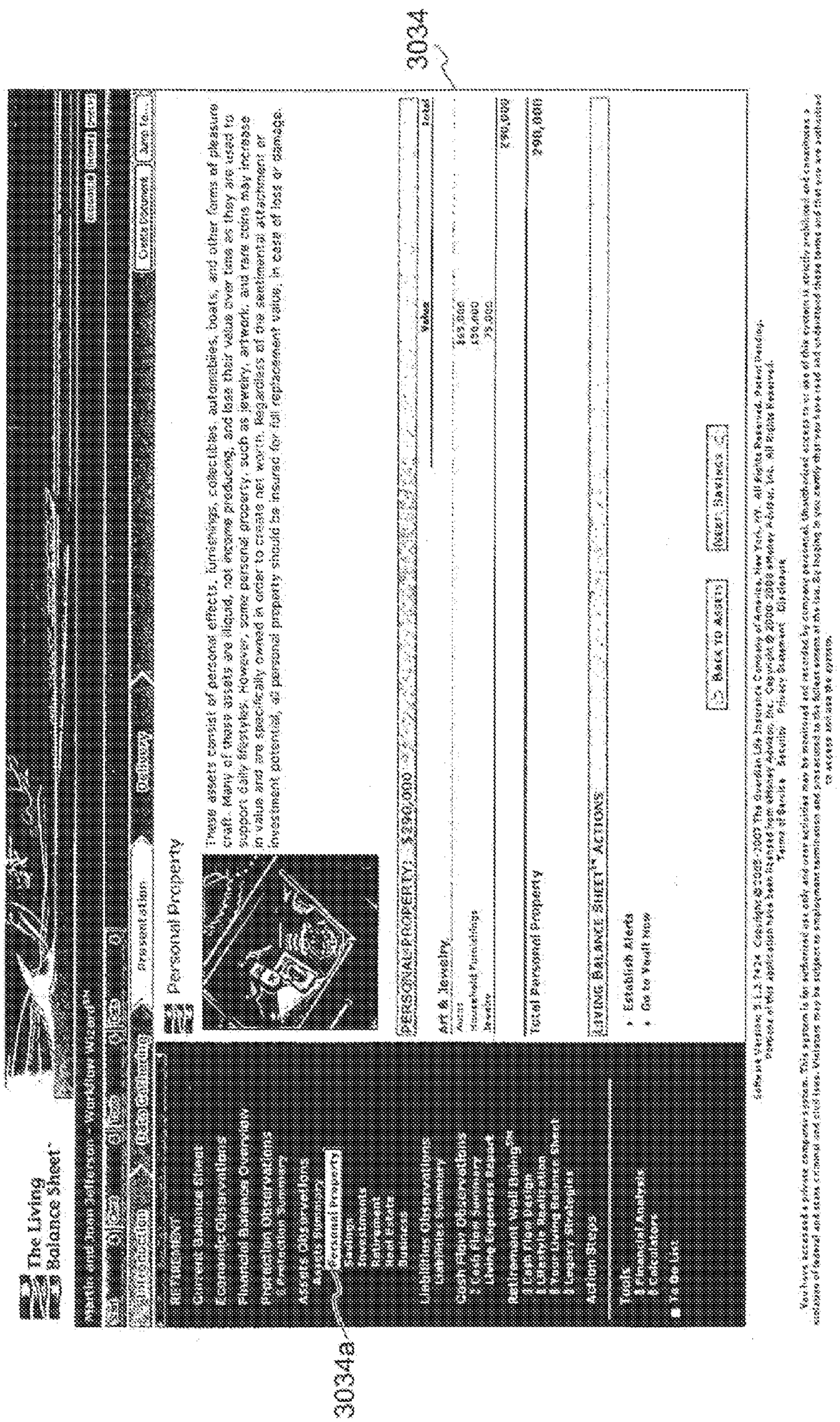

With reference to FIG. 276, by clicking on assets category 3016, an assets display page can be displayed. For example, assets display page 3032 of FIG. 282 can be displayed. Asset summary link 3030 of FIG. 282 can also be expanded revealing various related links. Alternatively, or in addition to, assets display page 3032 can be displayed by, for example, clicking on the total subcategory region in assets category region 3016 of FIG. 276. In assets display page 3032 of FIG. 282, clicking on personal property, savings, investments, retirement, real estate or business can result displaying pages such as those illustrated in FIGS. 283-289: personal property page 3034, savings page 3036, investments page 3038, retirement page 3040, real estate page 3042, and business page 3044, respectively.

Figure 290:
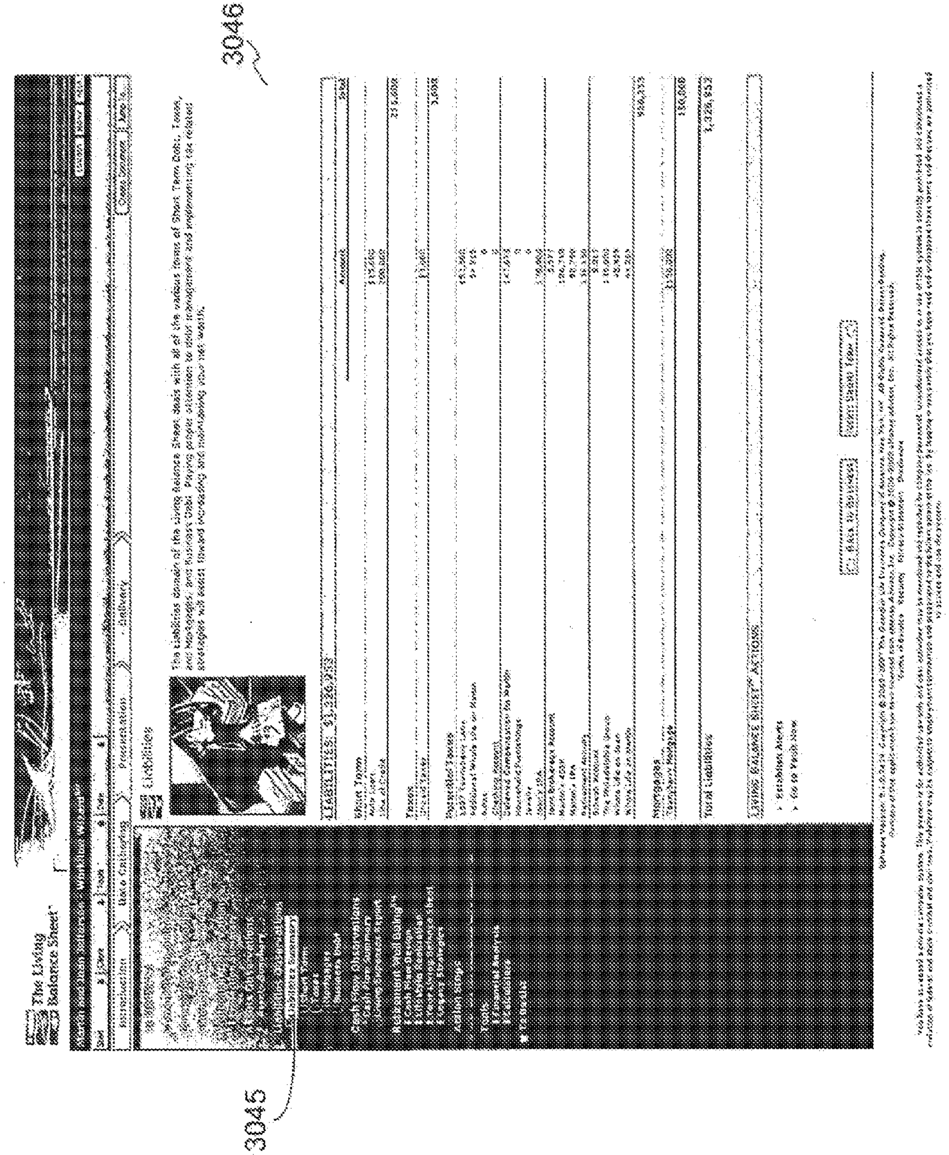
Figure 291:
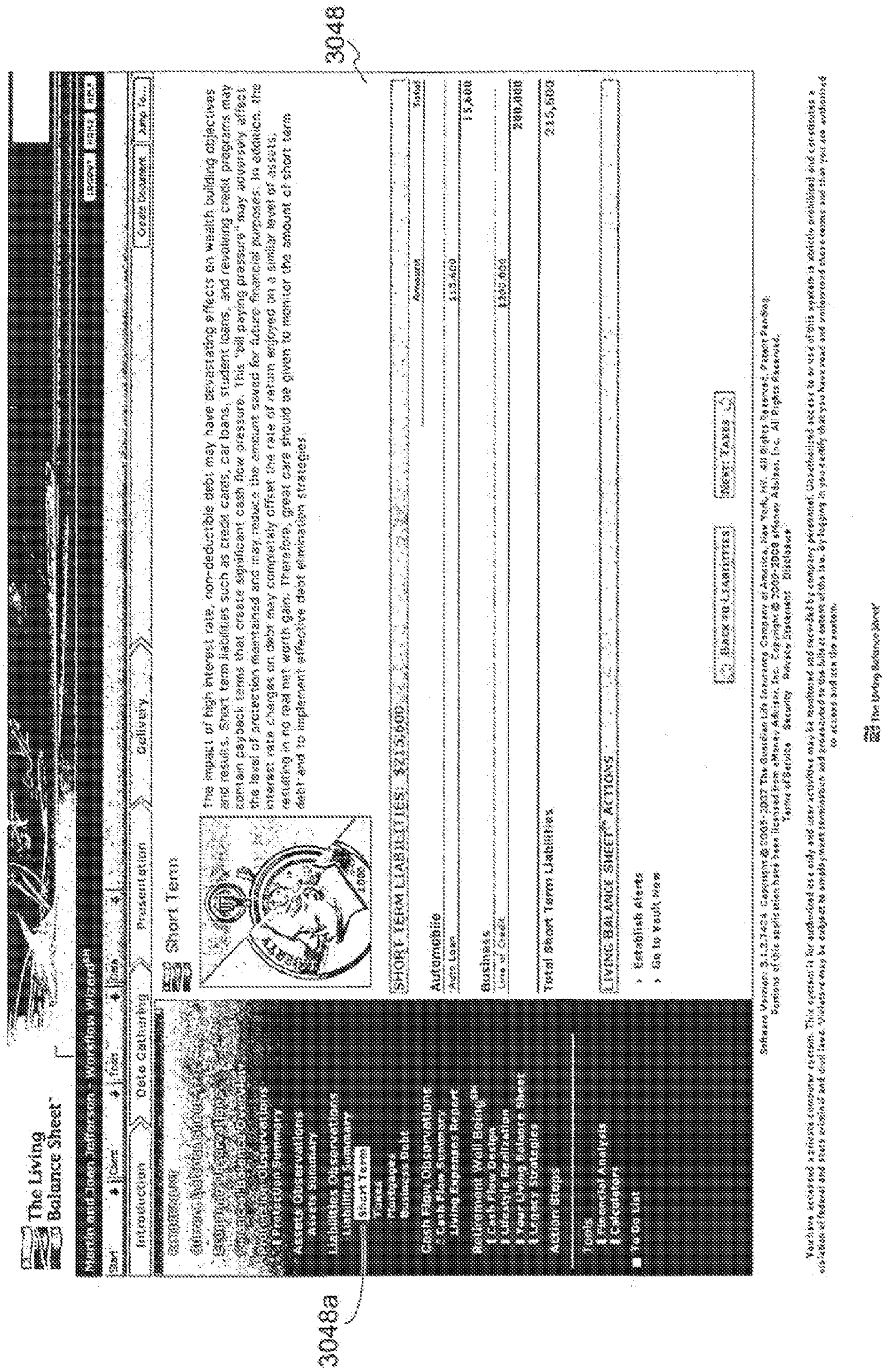
Figure 292:
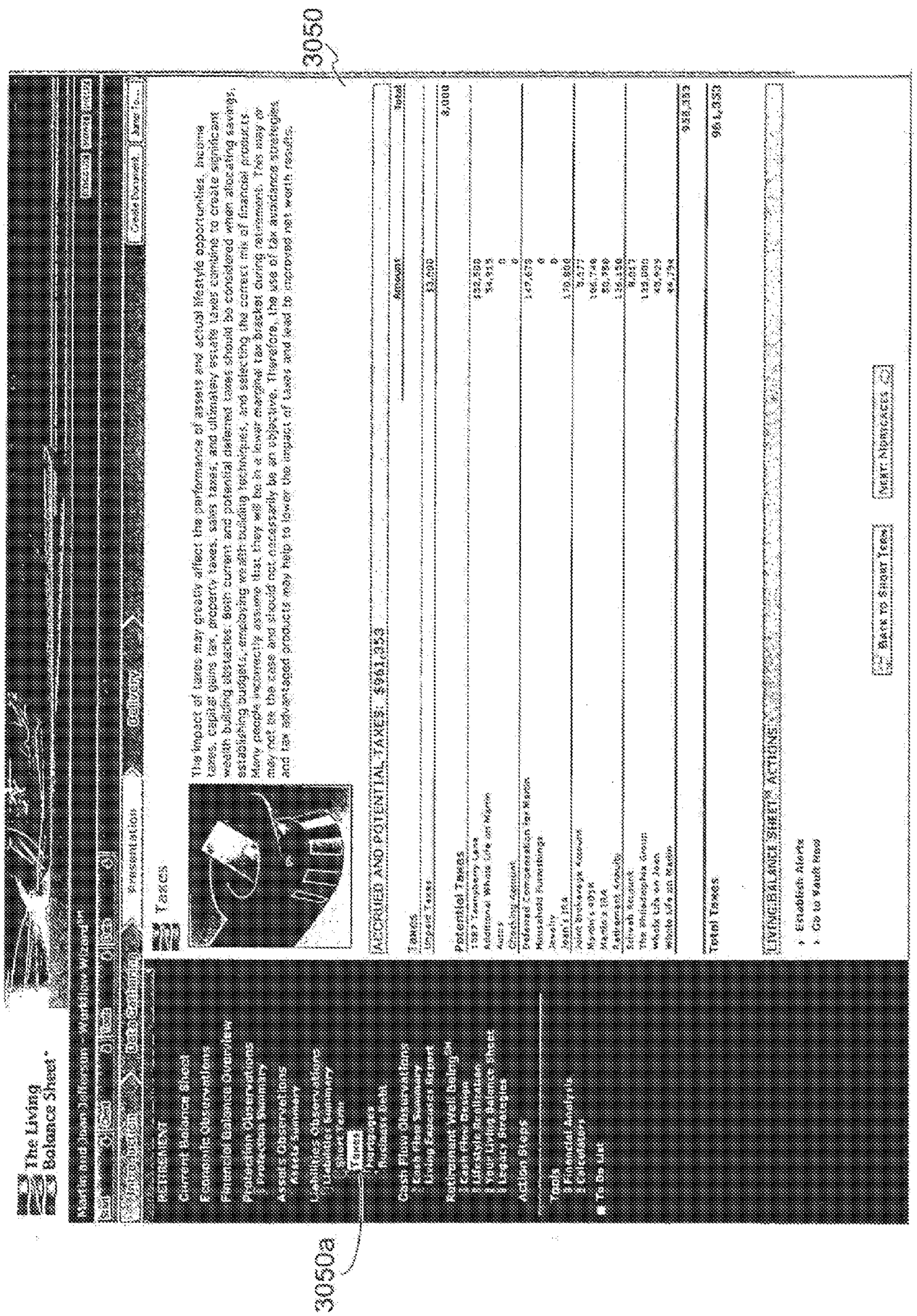
Figure 293:
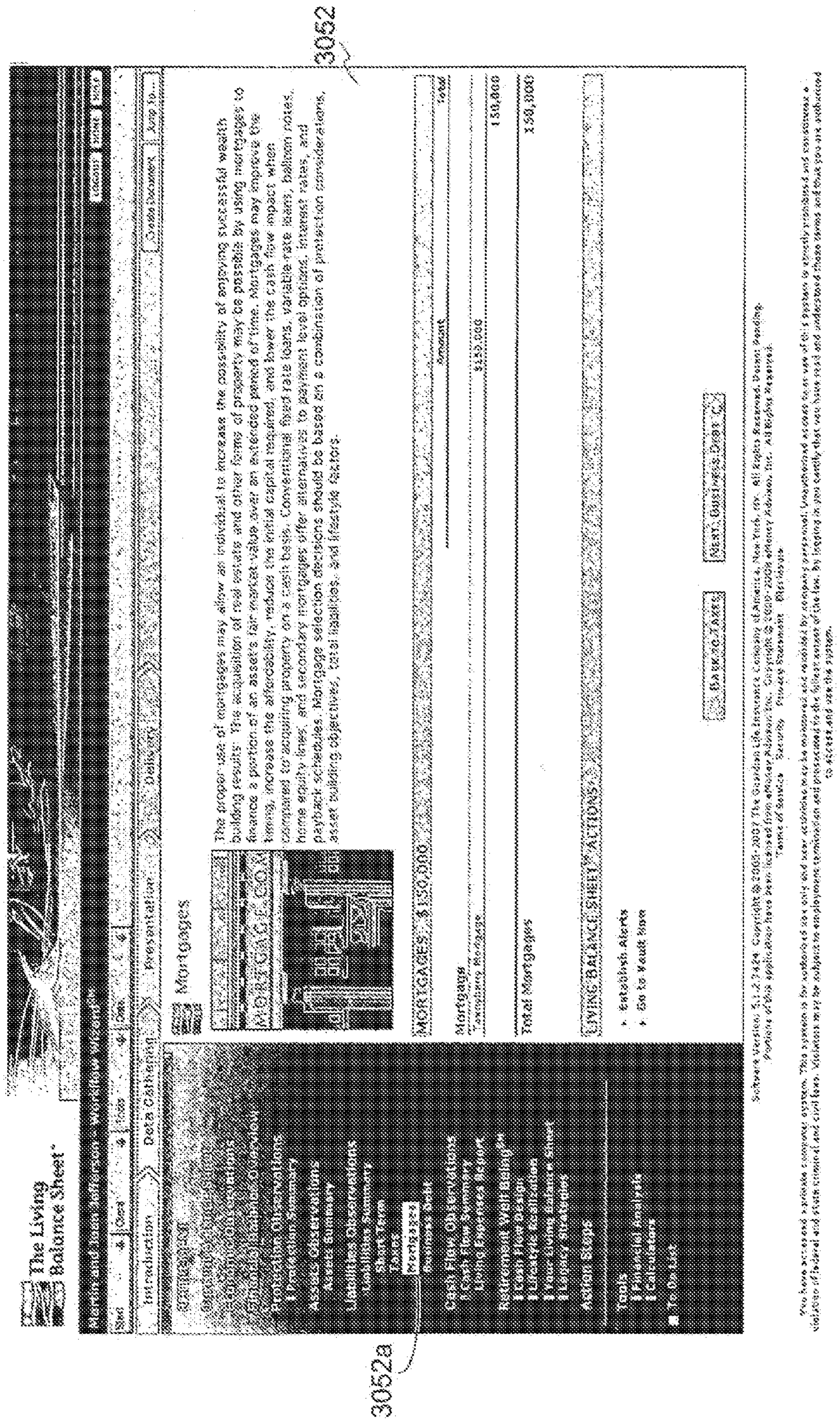
Figure 294:
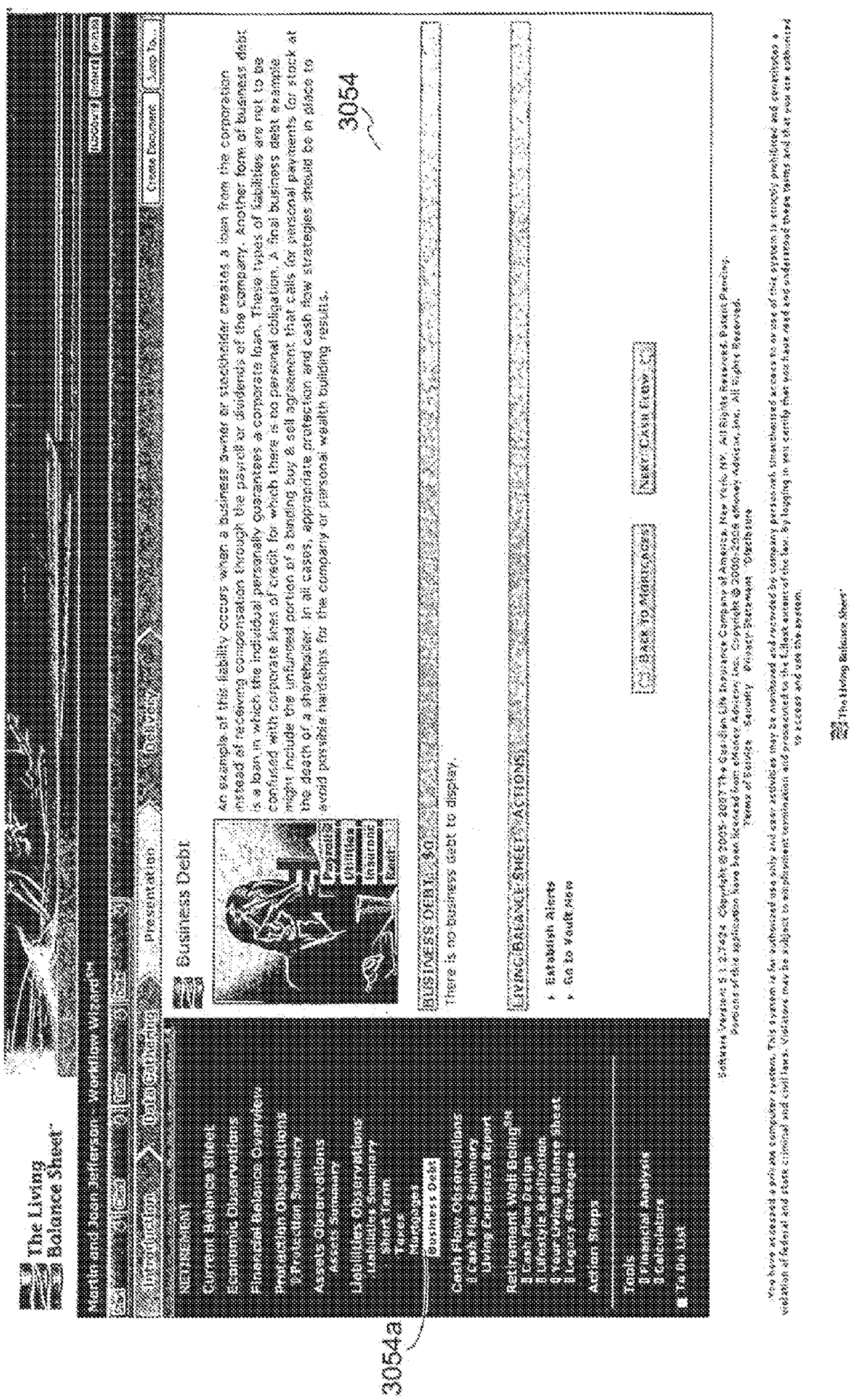

Selecting or clicking liabilities category region 3018 of FIG. 276 can result in liabilities page 3046 of FIG. 290 being displayed. Such a selection can also result in liabilities summary link 3045 being expanded to reveal various links. Liabilities page 3046 can also be displayed by selecting or clicking the total subcategory in liabilities category region 3018 of FIG. 276. In liabilities page 3046 of FIG. 290, selecting or clicking short term, taxes, mortgages, or business debt can result in displaying corresponding pages such as those illustrated in FIGS. 291-294: short term page 3048, taxes page 3050, mortgages page 3052, and business debt page 3054, respectively.

Figure 295:
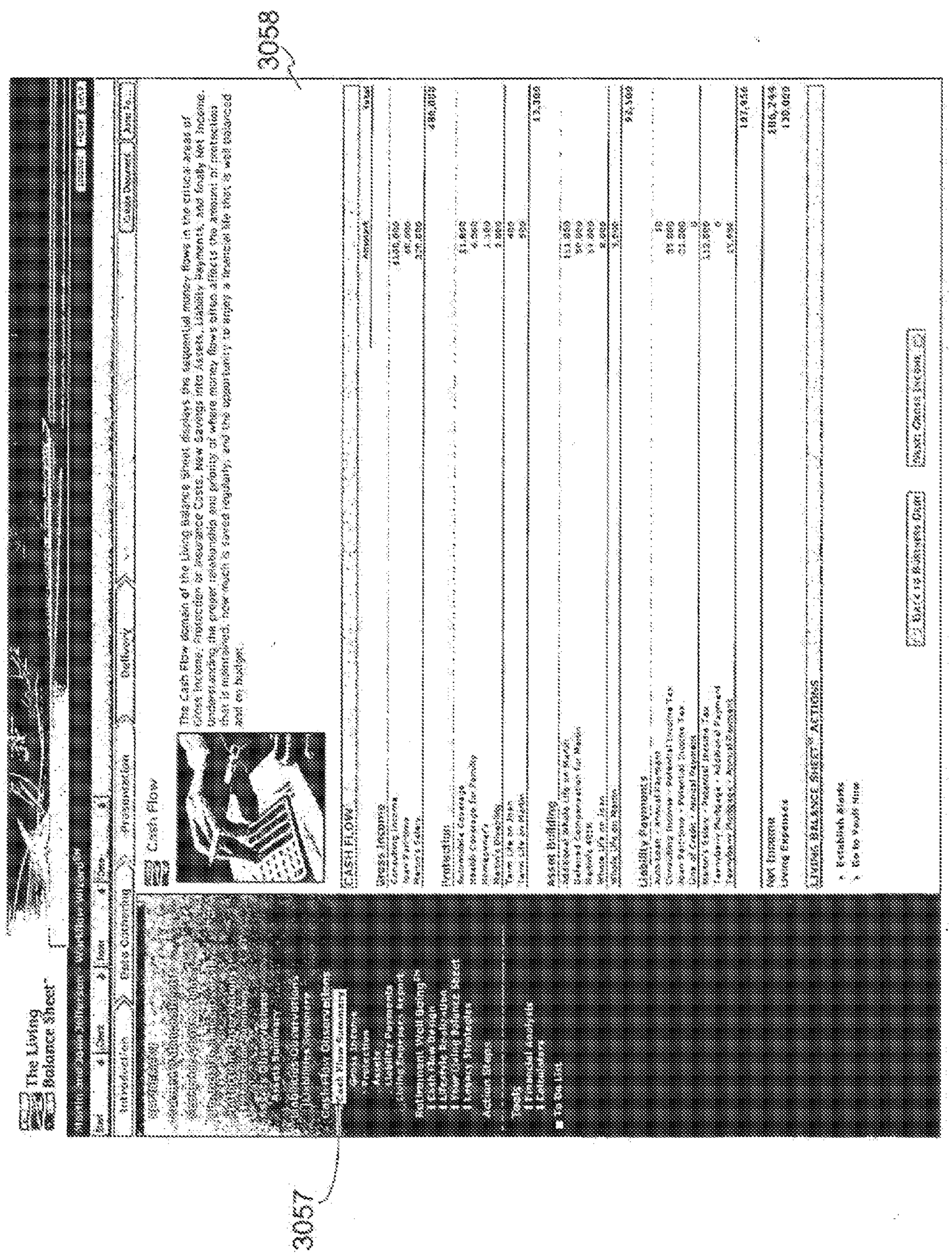
Figure 296:
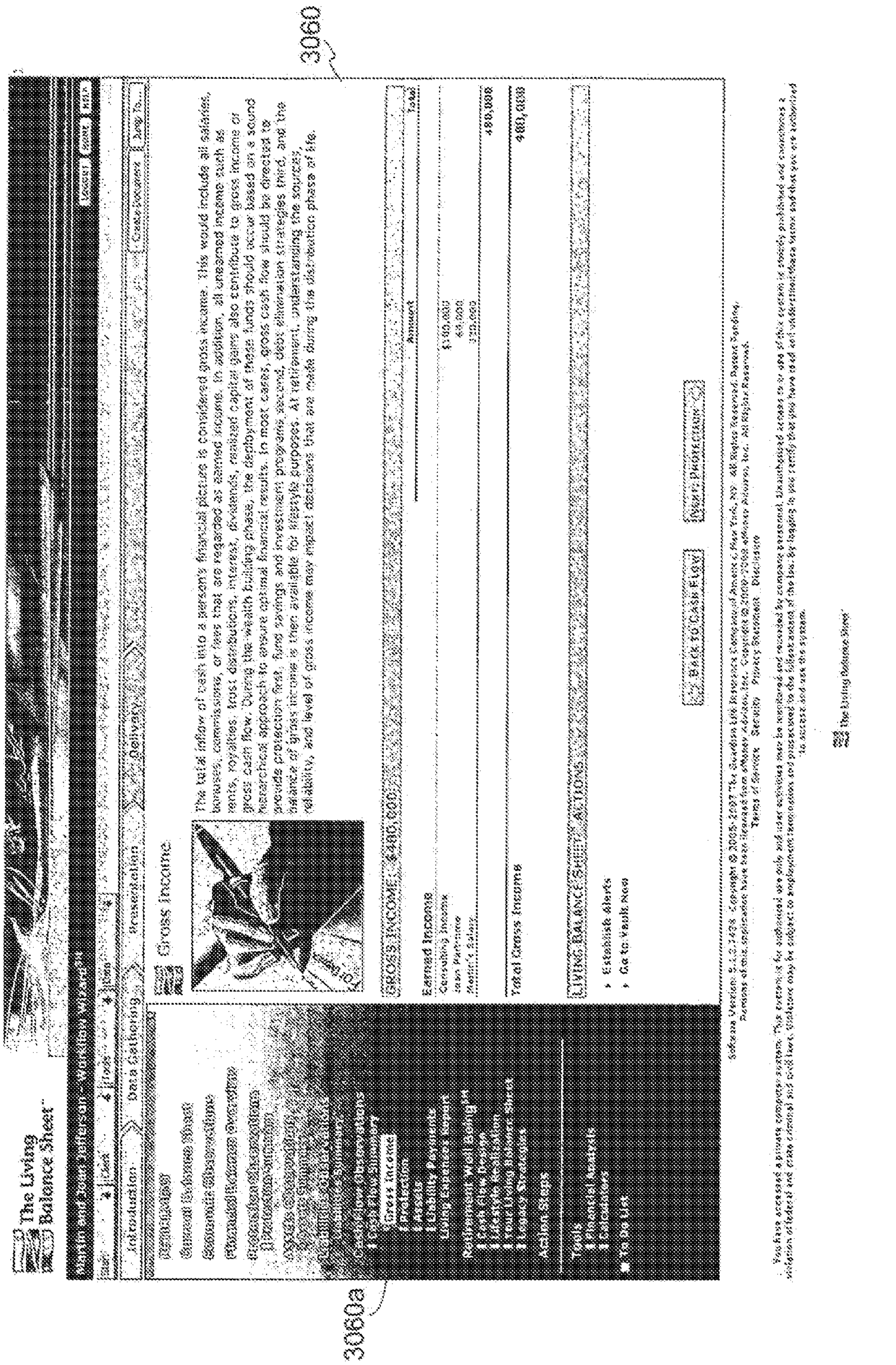
Figure 297:
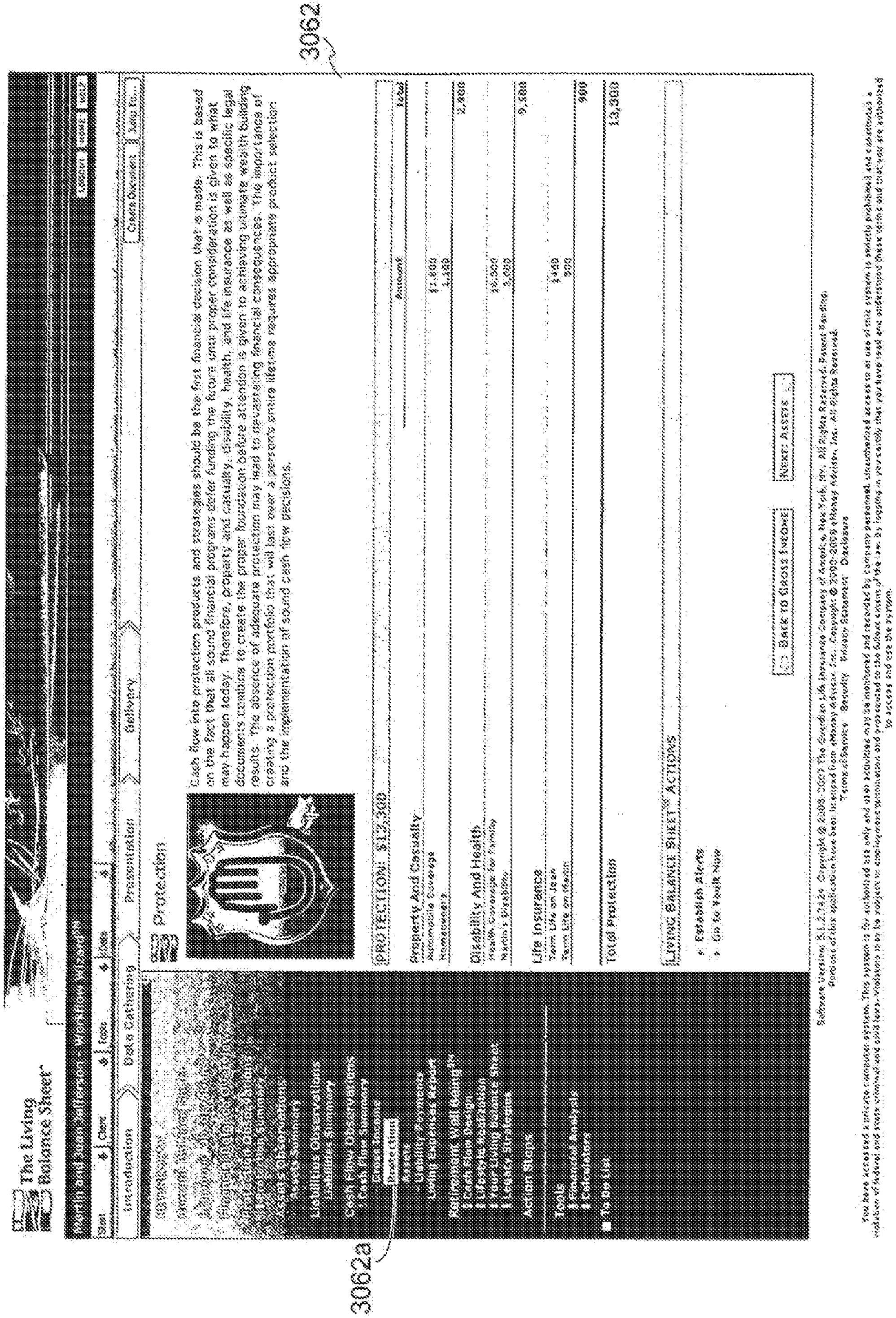
Figure 298:
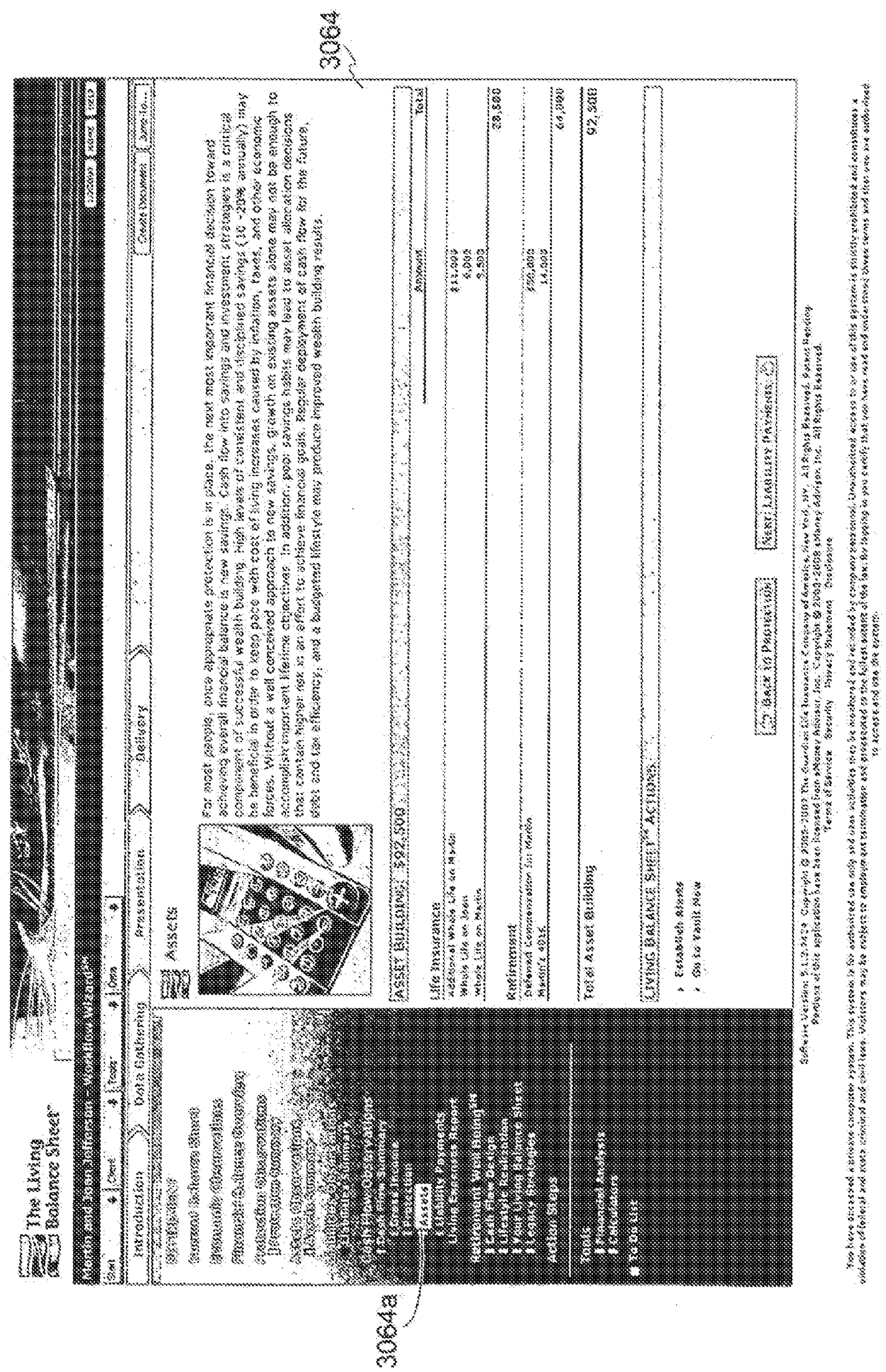
Figure 299:
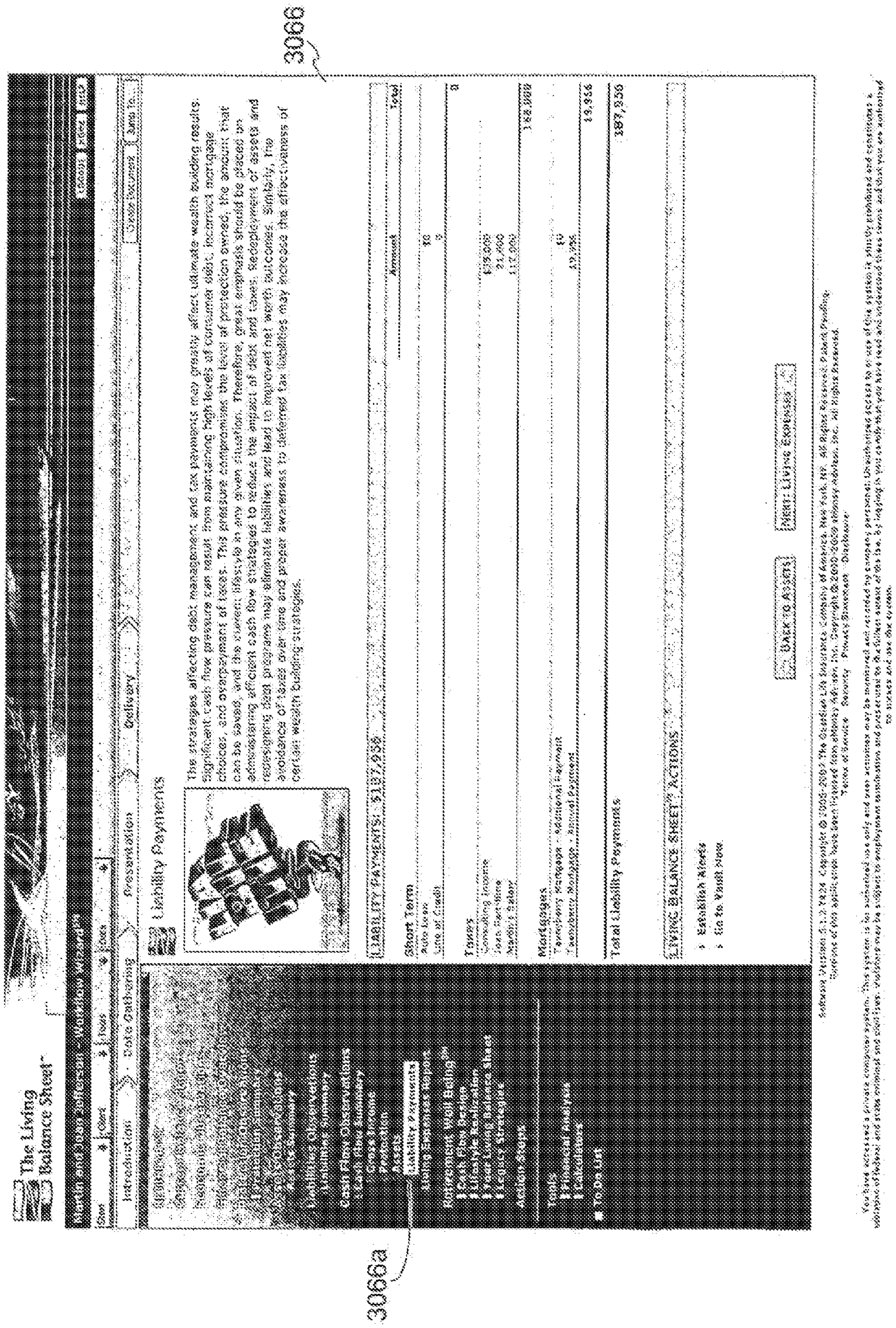
Figure 300:
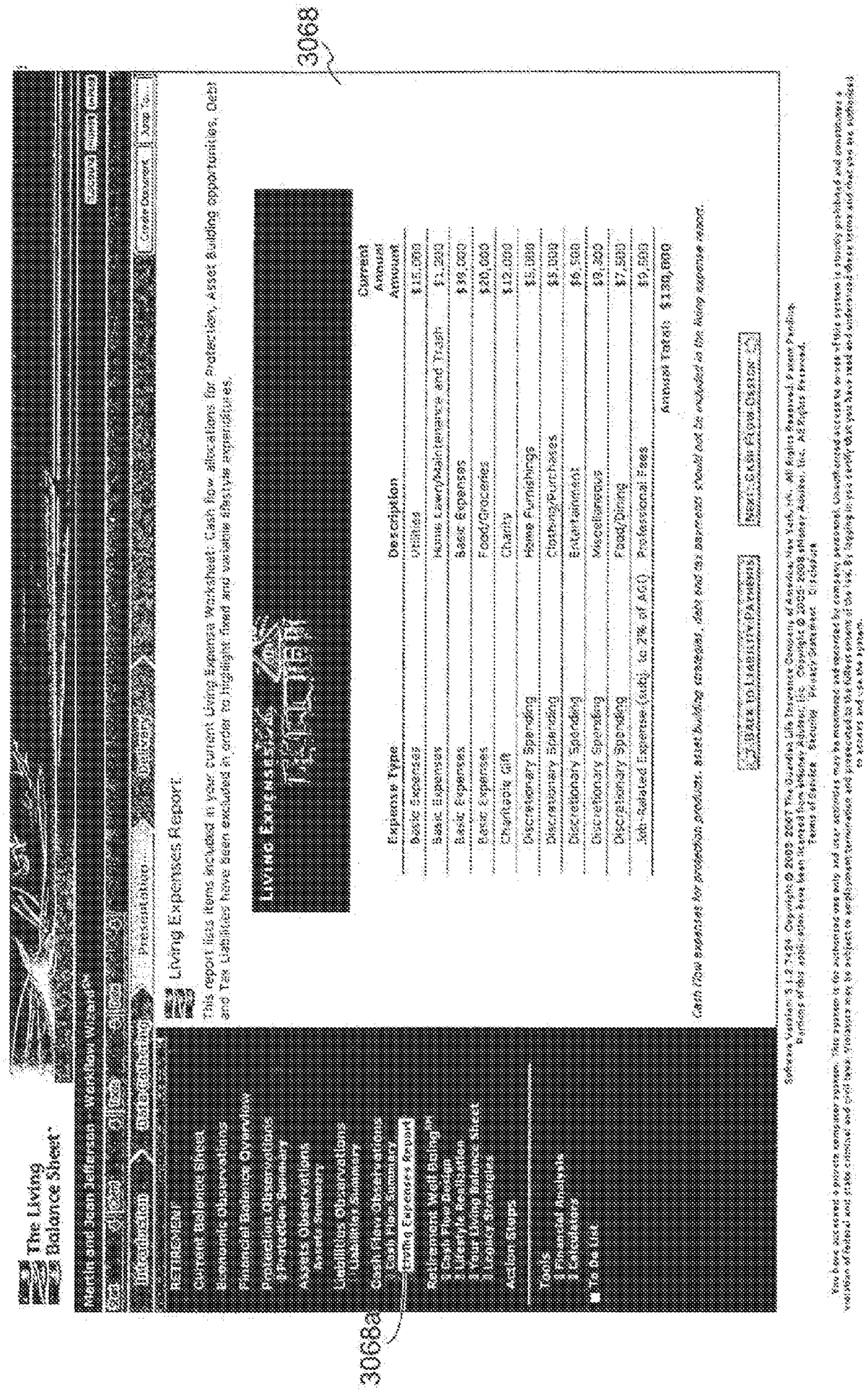
Figure 301:
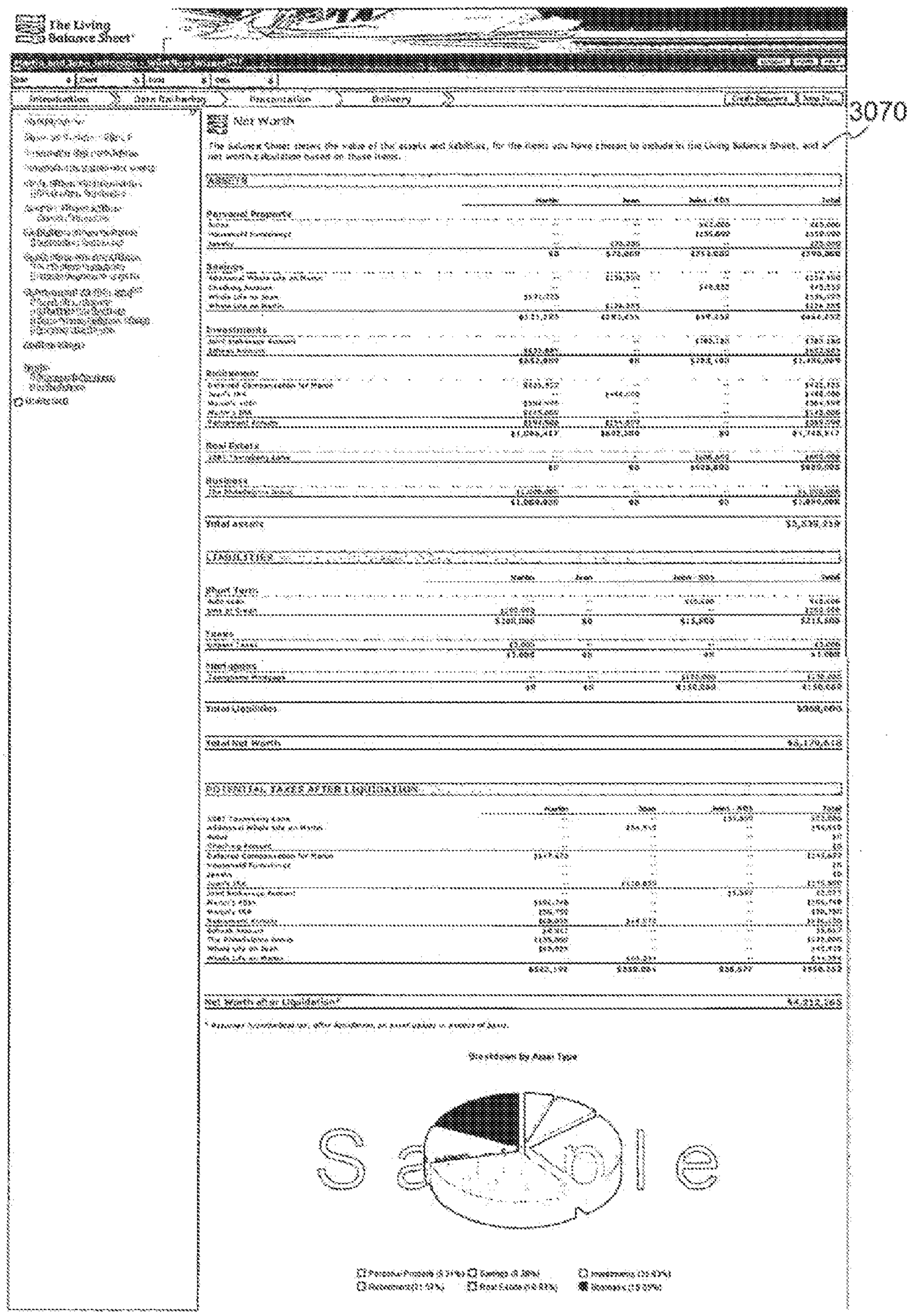

As shown in FIG. 295, by selecting or clicking Cash Flow category 3020, cash flow summary link 3057 can be expanded revealing various links and cash flow summary page 3058 can be displayed. As shown in FIGS. 296-300, selection or clicking gross income, protection, assets, liabilities or living expense report can result in gross income page 3060, protection page 3062, assets cash flow page 3064, liability payments page 3066, living expenses report page 3068, respectively, being displayed. Finally, if Net Worth category 3025 of FIG. 276 is selected or clicked, as shown in FIG. 301, net worth page 3070 can be displayed. It will be appreciated that while the various pages 3022, 3023, 3024, 3026, 3028, 3032, 3034, 3036, 3038, 3040, 3042, 3044, 3046, 3048, 3050, 3052, 3054, 3058, 3060, 3062, 3064, 3066, 3068 can be accessed by selecting or clicking the particular categories or subcategories, pages 3022, 3023, 3024, 3026, 3028, 3032, 3034, 3036, 3038, 3040, 3042, 3044, 3046, 3048, 3050, 3052, 3054, 3058, 3060, 3062, 3064, 3066, 3068 can also be accessed by directly selecting the links 3021*a*, 3022*a*, 3024*a*, 3026*a*, 3028*a*, 3030, 3034*a*, 3036*a*, 3038*a*, 3040*a*, 3042*a*, 3044*a*, 3045, 3048*a*, 3050*a*, 3052*a*, 3054*a*, 3057, 3060*a*, 3062*a*, 3064*a*, 3066*a*, 3068*a*, respectively, from list of options field 3006. The links can be selected after selecting and expanding links 3021, 3030, 3045, 3057.

Each page associated with a link in list of options field 3006, including pages 3022, 3023, 3024, 3026, 3028, 3032, 3034, 3036, 3038, 3040, 3042, 3044, 3046, 3048, 3050, 3052, 3054, 3058, 3060, 3062, 3064, 3066, 3068 can have one or more radio buttons 3071, 3073 (such as shown in FIG. 276) which can be populated with different names or titles. In particular, the name or titles can change depending on the page currently being viewed such that button 3071 includes a name or title representing the previous link and/or associated page and button 3073 includes a name or title representing the next link and/or associated page. A user can select/click button 3071 to move back to a previous link (and a page associated with the previous link) in list of options field 3006 or select/click button 3073 to move forward to the next link (and a page associated with the next link) in list of options field 3006.

A user can be provided with a tool to evaluate various protection categories. As show in FIG. 277, page 3022 can display diagram 3072 which can provide a user with an overview of the strengths and weaknesses of various protection categories. Diagram 3072 can have area 3073 containing a list of various types of protection such as auto insurance, homeowner's insurance, umbrella insurance, disability insurance, medical insurance, long term care insurance, will, trusts, power of attorney, living will, buy & sell agreement, and life insurance. Diagram 3072 can also have area 3075 that can include heading for levels of protection such as "No Protection," "Under Protected," and "Optimal Protection." The purpose and function of such a tool are described with reference to FIGS. 130-132 discussed above.

Figure 284:
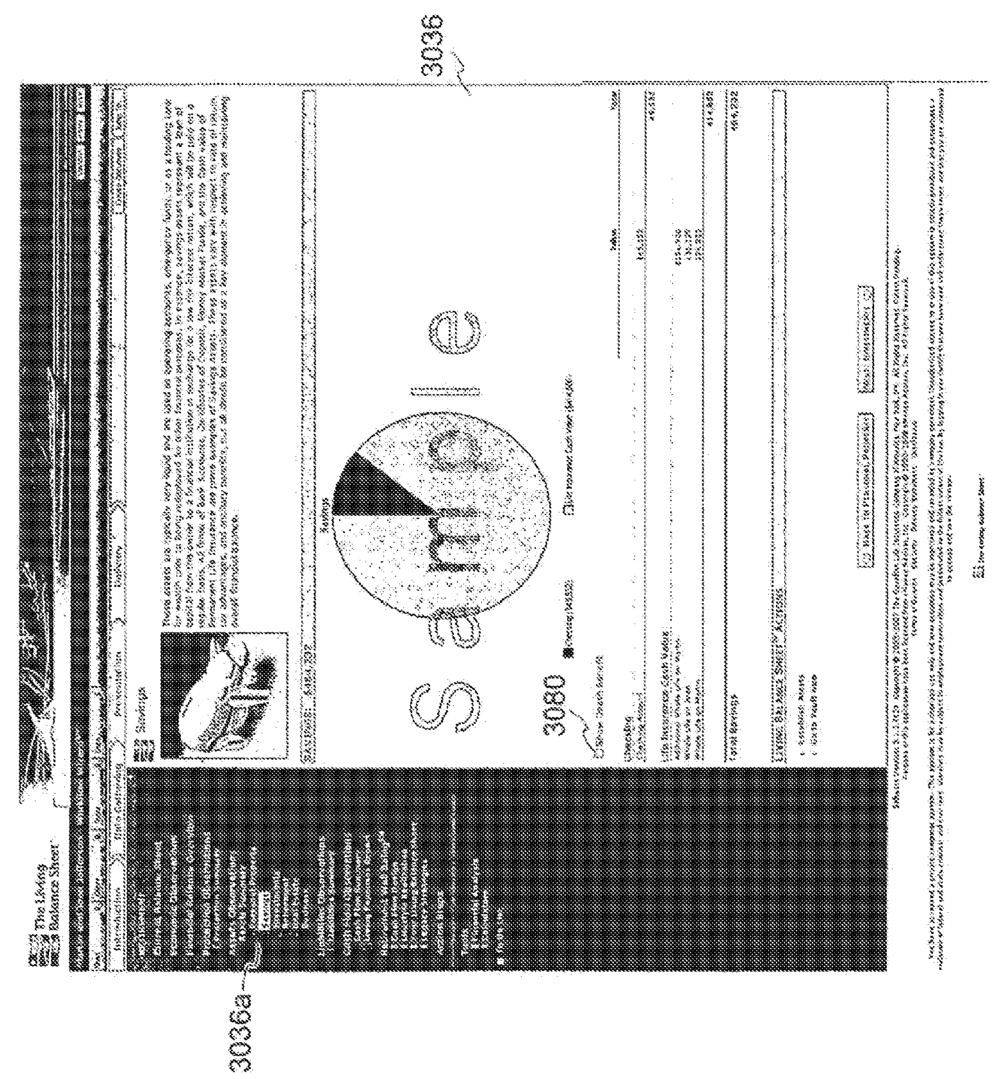
Figure 285:
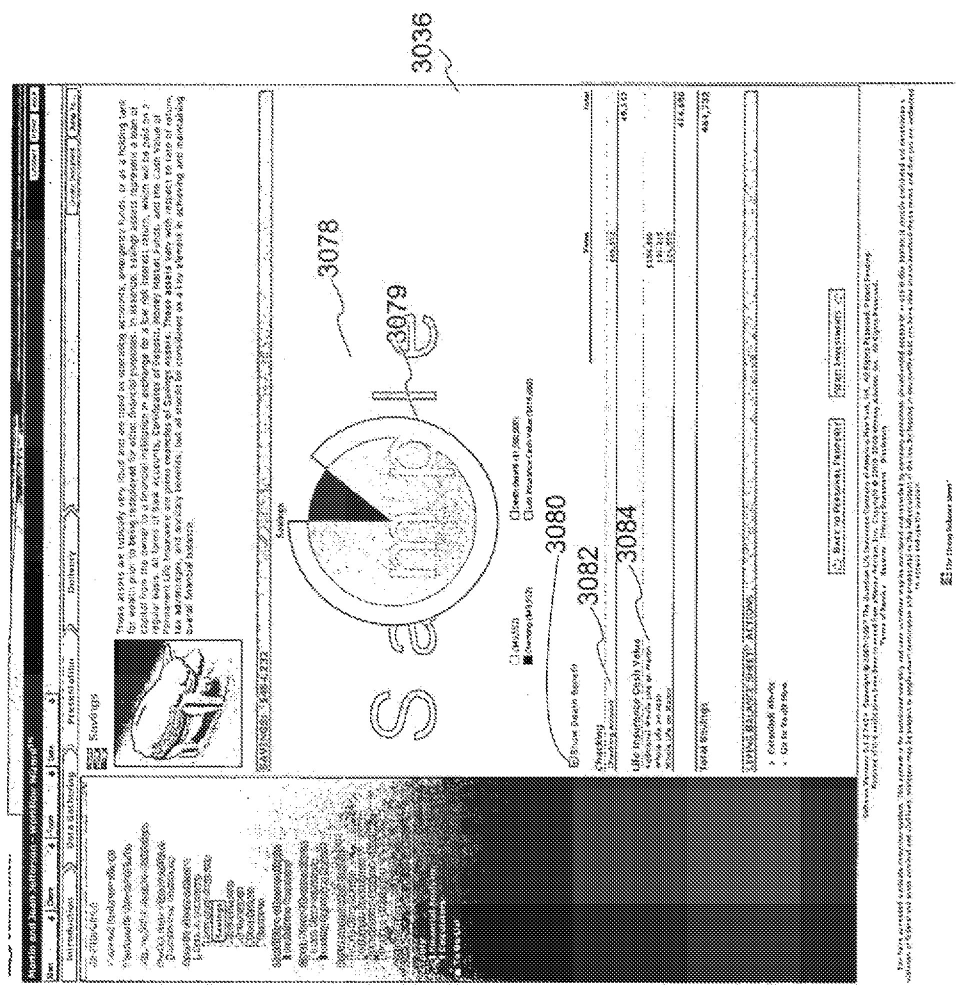
Figure 286:
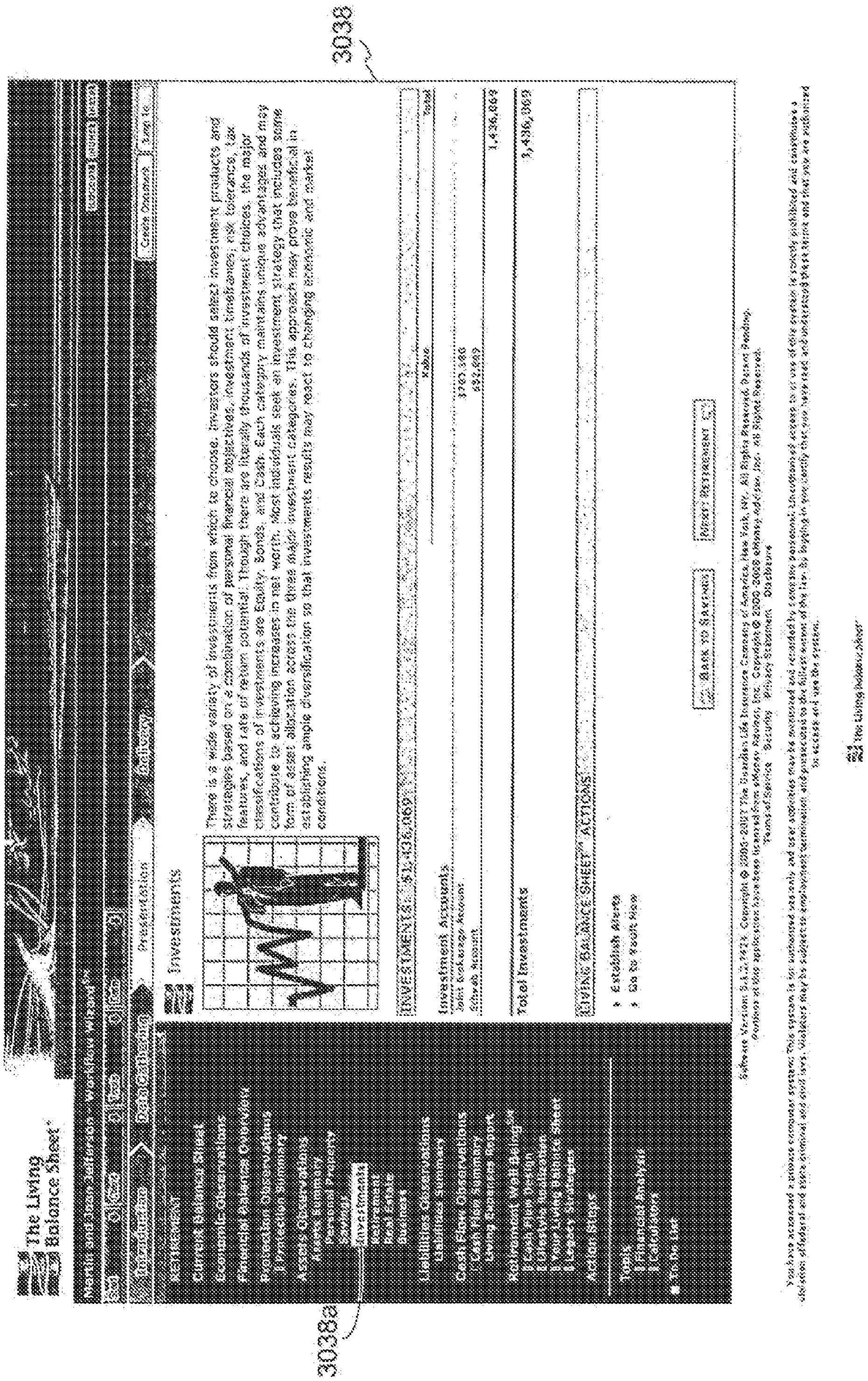
Figure 287:
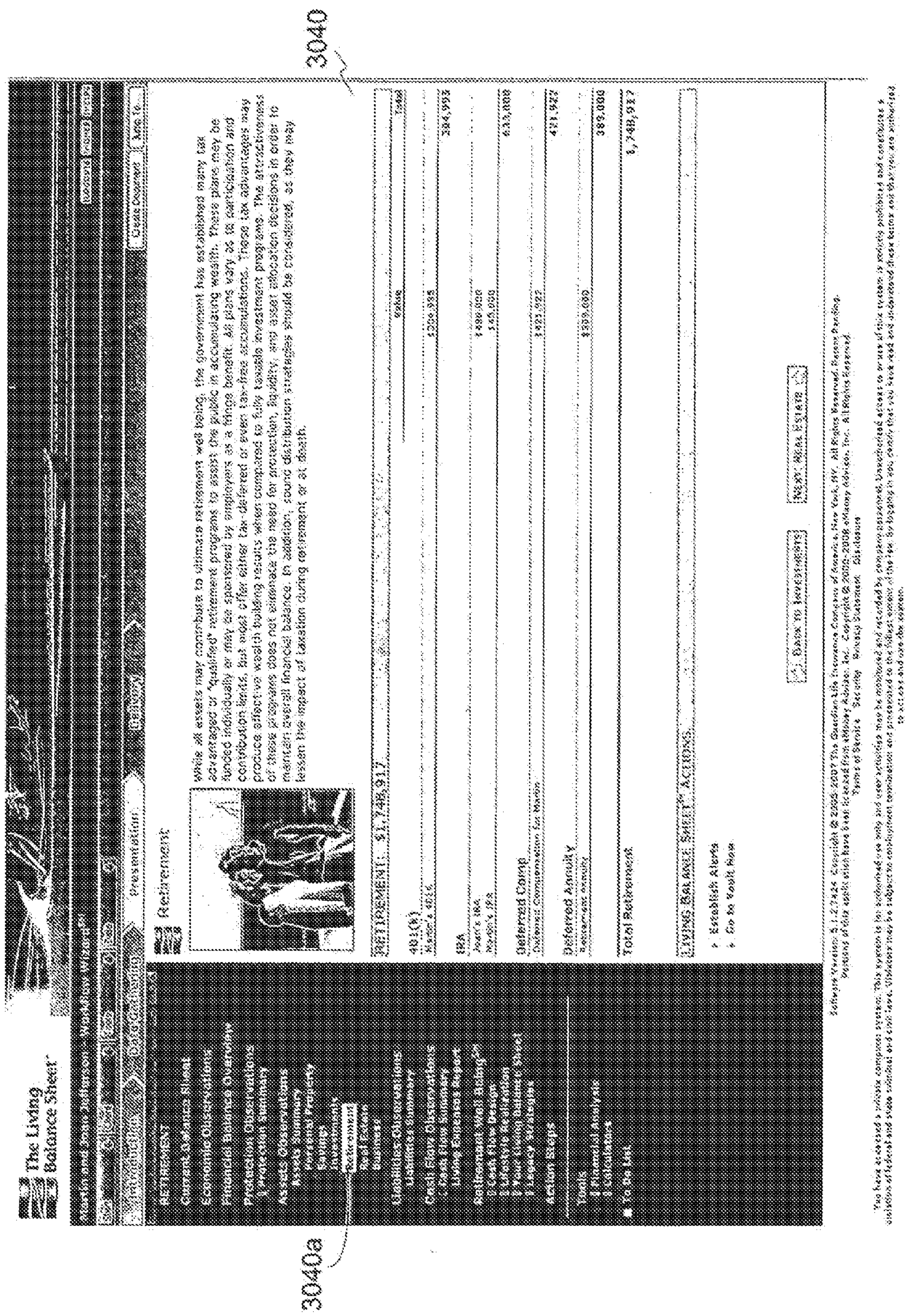
Figure 288:
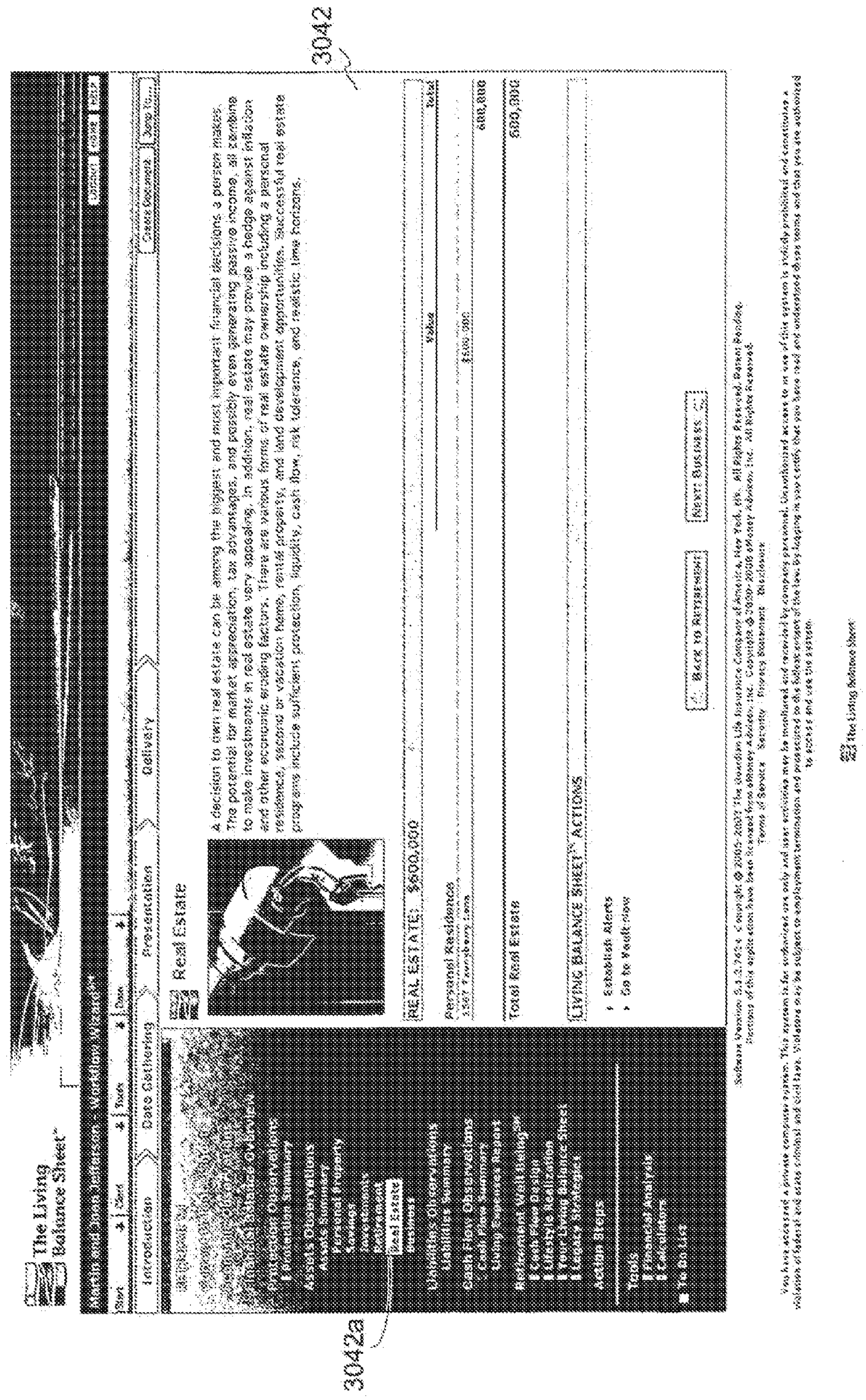
Figure 289:
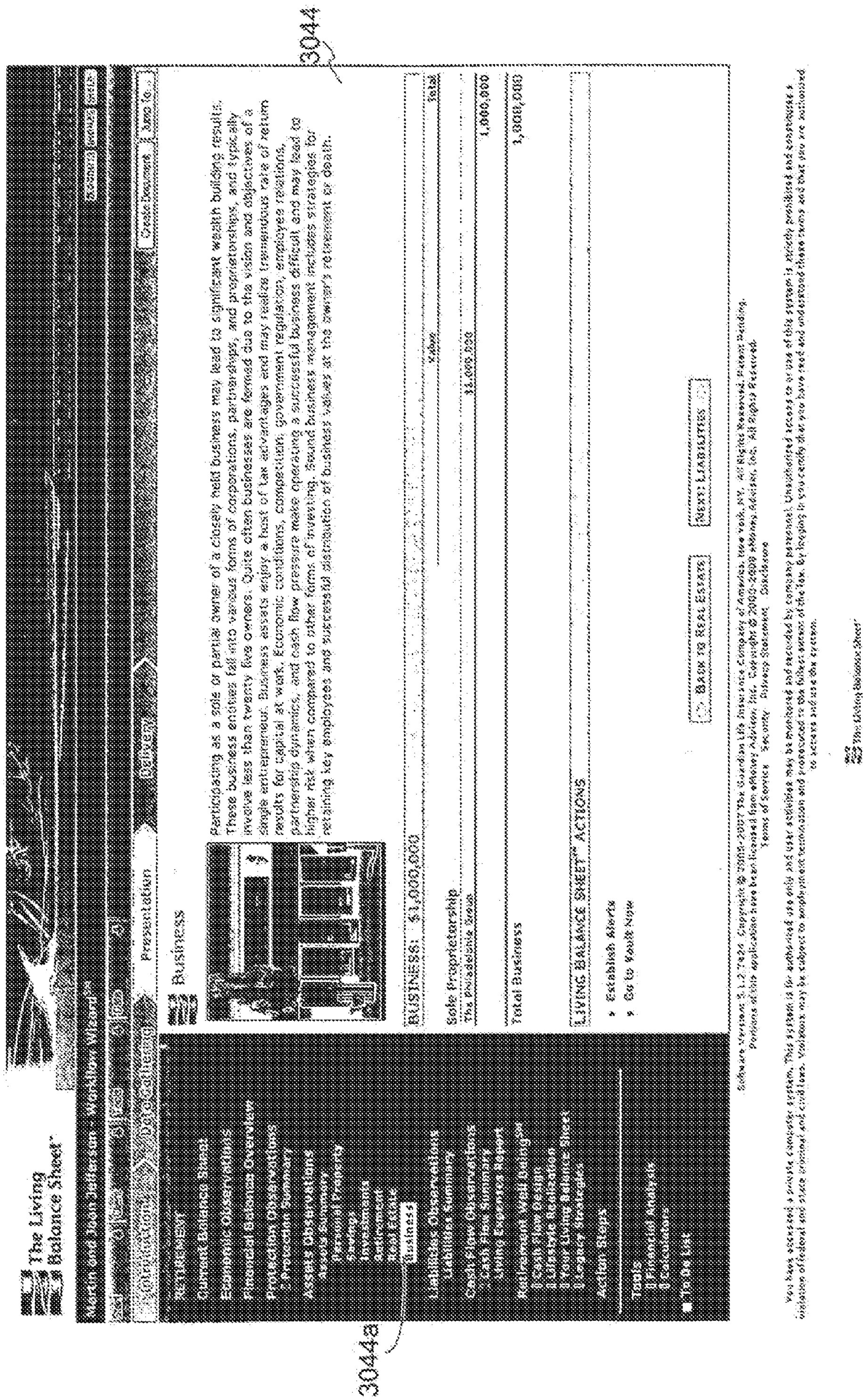
Figure 440:
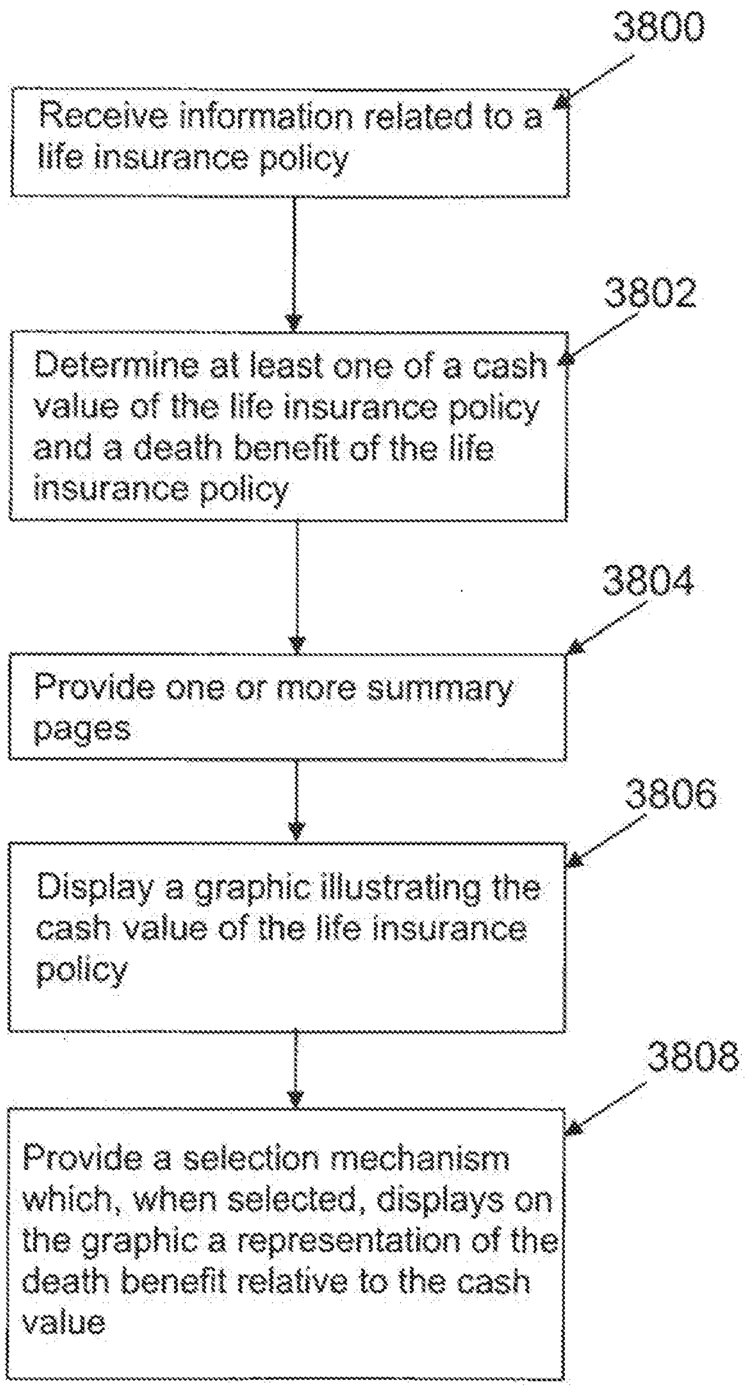
FIGS. 440-449 are flow charts for implementing software and tools in accordance with various embodiments of the invention.

A user can also be provided with information summarizing the user's savings. As shown in FIGS. 284 and 285, page 3036 can show an overview of savings. In general, as shown in FIG. 440, information related to a life insurance policy may be received (step 3800). At least one of a cash value of the life insurance policy and a death benefit of the life insurance policy can be determined (step 3802) and one or more summary pages can be provided (step 3804). A graphic illustrating the cash value of the life insurance policy can be displayed (step 3806), and a selection mechanism, which when selected displays a representation of the death benefit relative to the cash value on the graphic, can be provided (step 3808). Interactive savings tool 3078 can be provided to show a breakdown of various type of savings. In a preferred embodiment, interactive savings tool 3078 can include a display of a pie chart illustrating the amount of money in a checking account as well as the cash value of a life insurance policy. Including the cash value of the life insurance policy provides a view of a client current savings value. Button 3080 can be provided on page 3036 of FIG. 284 and, as shown in FIG. 285, can be selected by a user to include the death benefit on tool 3078. Such an illustration provides a customer with a visual illustration that cash value is similar to saving in that it can be spent during retirement. In a preferred embodiment, the death benefit is displayed in response to the selection to show that the death benefit can provide an additional layer (e.g., illustrated physically) of protection at death such as displayed as area 3079 wrapping around the cash value of the savings. Wrapping the death benefit around the outside of the cash value demonstrates that a customer can spend down cash value of a life insurance policy during retirement and the death benefit of the insurance policy will protect the user's legacy. Specifically, the cash value spent by the user will be offset at death by the death value of the policy. Page 3036 can also have an area 3082 which provides a summary of a user's accounts (e.g., checking account) as well as an area 3084 which provides a summary of life insurance policies for the user. Tool 3078 can illustrate that death benefit visually by "covering" only the saving portion of the pie chart and not the checking, or the non-death benefit, portion.

Pages 3022, 3023, 3024, 3026, 3028, 3032, 3034, 3036, 3038, 3040, 3042, 3044, 3046, 3048, 3050, 3052, 3054, 3058, 3060, 3062, 3064, 3066, 3068, 3070 can have areas (shown in FIGS. 277-301) for displaying protection, assets, liabilities and cash flow information about a user which has been previously inputted by a user or agent or representative. In creating the pages for presentation to a user, the program obtains the information displayed on the pages from a database or memory (e.g., such as information inputted or stored by an insurance professional about a client such as by using the Workflow Wizard® discussed above).

Figure 302:
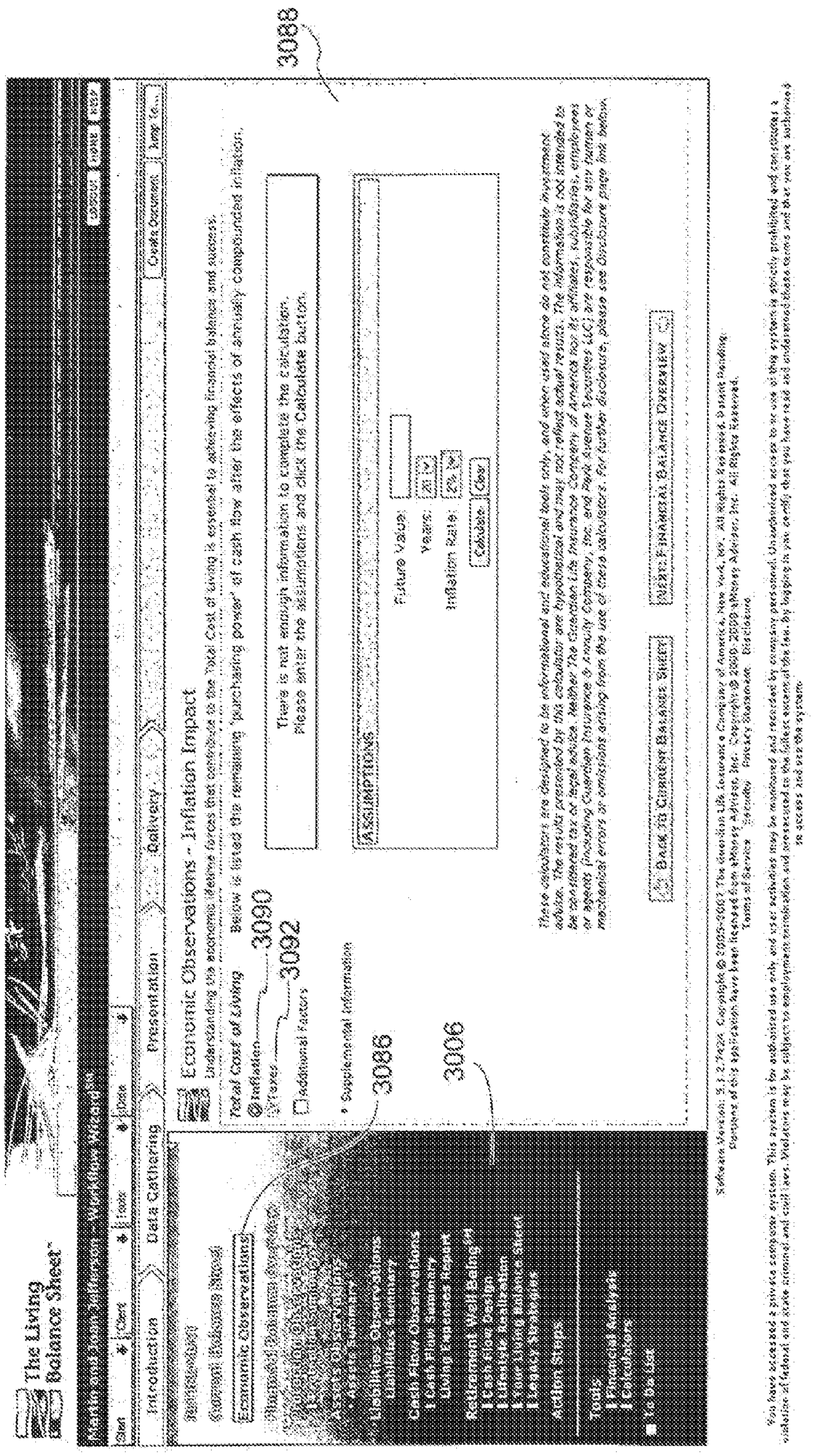

The program can provide the user with a tool to evaluate taxable income. When a user selects economic observation link 3086 from list of options field 3006 in FIG. 276, economic observation page 3088 can be displayed as shown in FIG. 302. Inflation option 3090 and tax option 3092 can appear on page 3088 and can be configured to be selected by a user. When inflation option 3090 is selected, page 3088 can provide a user with a tool to demonstrate the effects that compound inflation has on purchasing power. In particular, page 3088 provides a user with a tool to determine the present value of money and functions similarly to the tool described in FIGS. 221-222.

Figure 303:
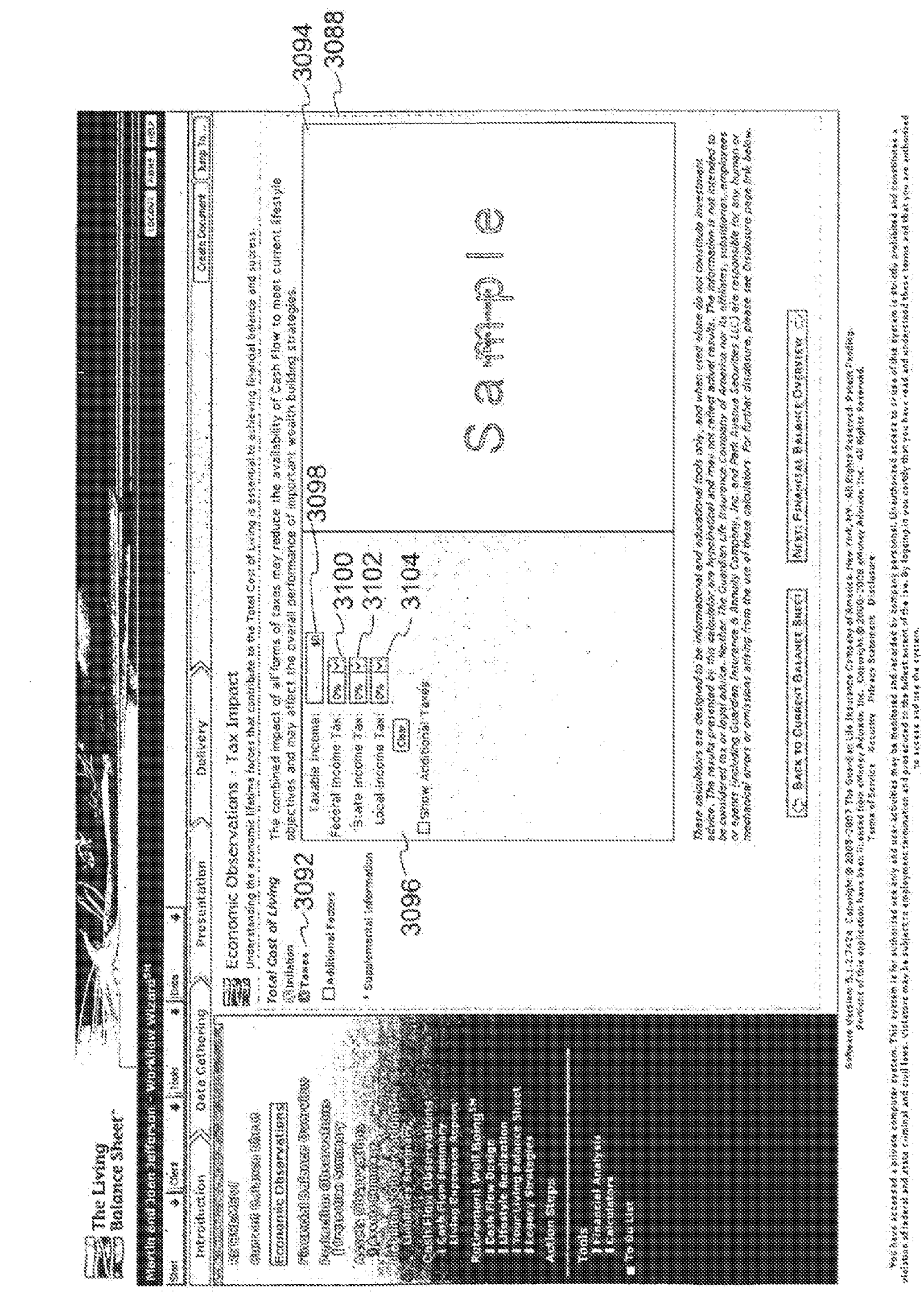
Figure 441:
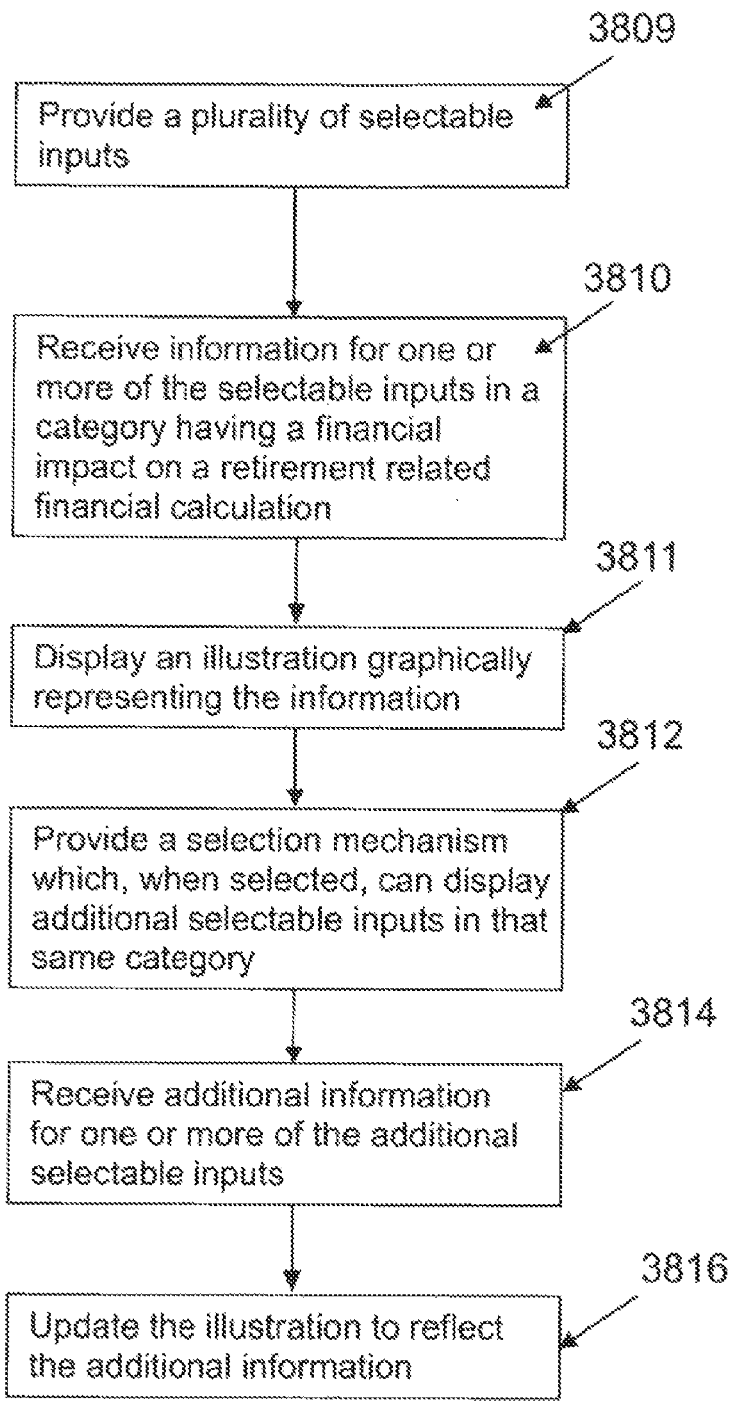

As shown in FIG. 302, a user can also select tax option 3092. After selection of tax option 3092, the program can process the request and present display 3094 on page 3088 (FIG. 303). With reference to FIG. 303, display 3094 can provide a user with an understanding of how taxes reduce available cash flow. In general, as shown in FIG. 441, a plurality of selectable inputs can be provided (step 3809). Information can be received for one or more of the selectable inputs in a category having a financial impact on a retirement related financial calculation (step 3810). In response to receiving information, an illustration graphically representing the information can be displayed (step 3811). A selection mechanism can be provided which, when selected, can display additional selectable inputs in that same category (step 3812). Additional information can be received for one or more of the additional selectable inputs (step 3814) and the illustration can be updated to reflect the additional information (step 3816).

Figure 304:
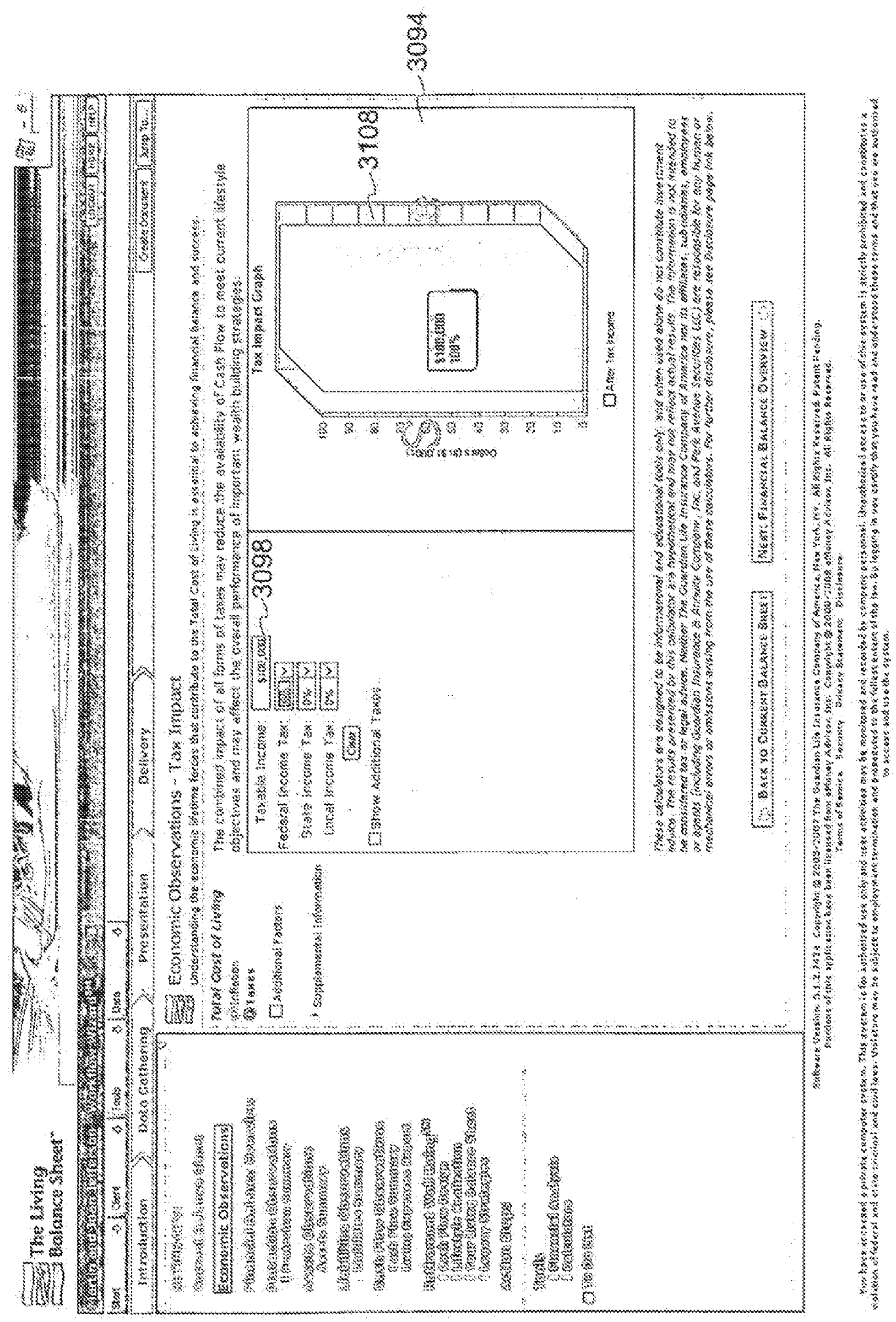
Figure 305:
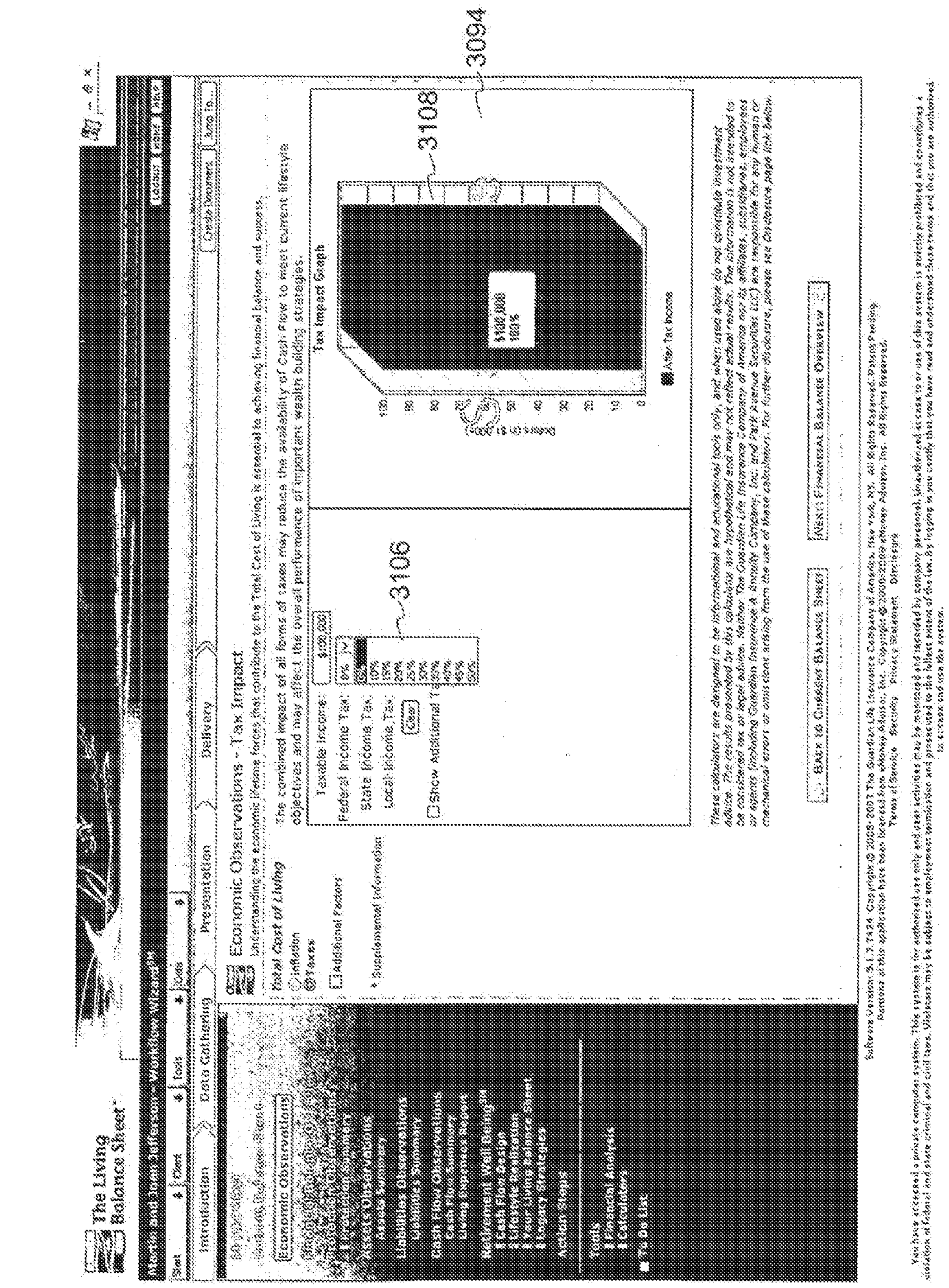

Data field 3096 can be provided which allows a user to enter income information in data entry field 3098, and tax information such as federal income tax percentage in data entry field 3100, state income tax percentage in field 3102 and/or local income tax percentage in field 3104. A data entry field or menu such as drop-down menu 3106 (such as shown in FIG. 305) can be provided which allows a user to select a particular percentage for fields 3100, 3102, 3104. While drop-down menus are provided to enter tax percentages, in an alternative embodiment, fields (similar to field 3098) can be provided so that a user can input any tax percentage using a keyboard. As shown in FIG. 304, upon receiving taxable income information in field 3098, the program can process the inputted information and in response can generate and an interactive display chart such as that shown in FIG. 304, at reference number 3108 in display 3094. While the chart is shown as a three dimension bar graph, the chart can be a two dimensional bar graph or a two or three dimension line graph, pie chart, or any other graph or chart. In another embodiment, the taxable and after-tax income may only be displayed as a number without a graph or chart. As shown in FIGS. 305-308, federal, state and local income tax percentages can be inputted, for example, by using a drop-down menu such as menu 3106 of FIG. 305. As each percentage is inputted, the program can, if desired, instantaneously update interactive chart 3108 (e.g. using local or remote processing) to reflect the portion of income that goes to pay taxes.

Figure 306:
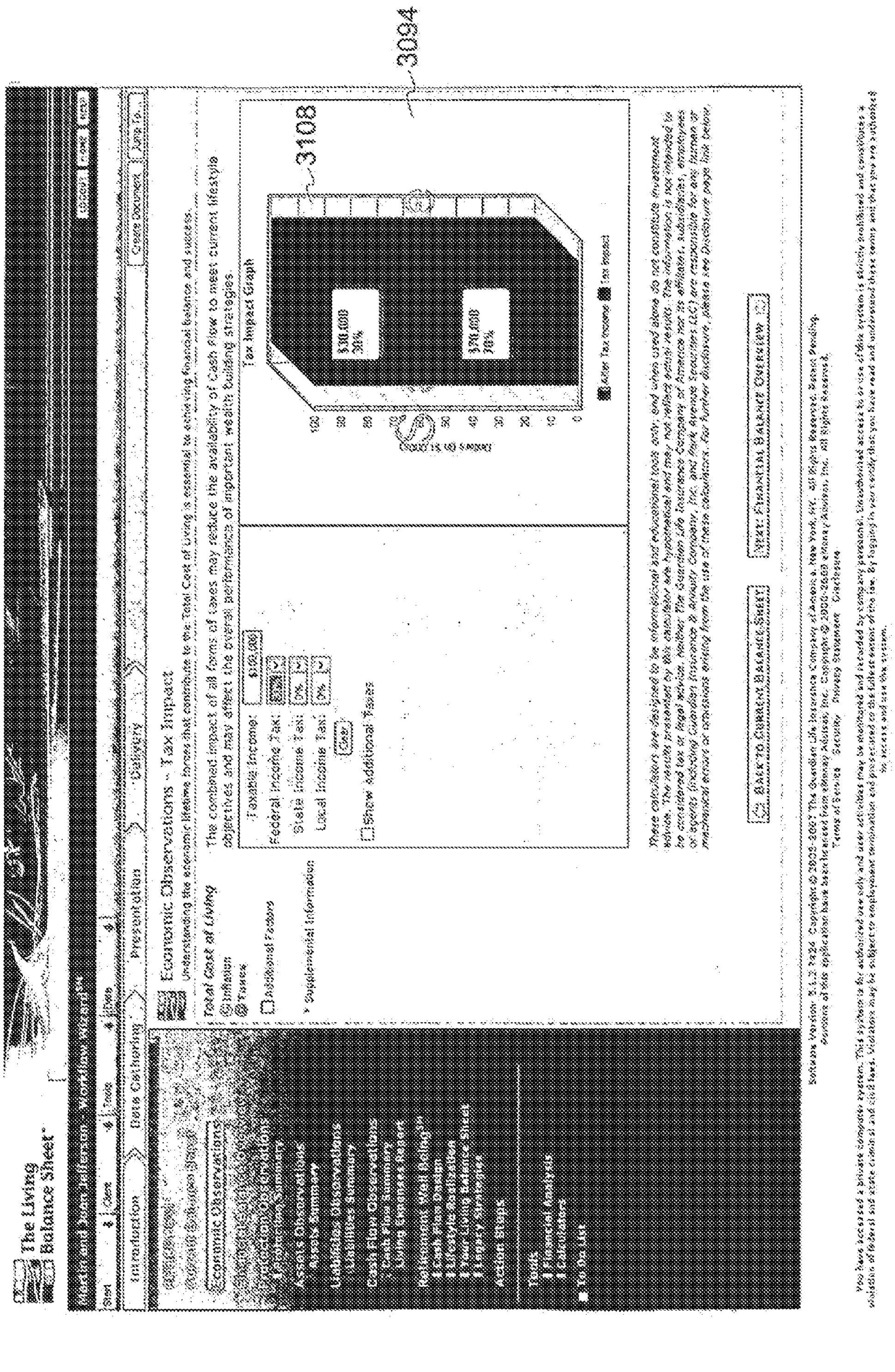
Figure 307:
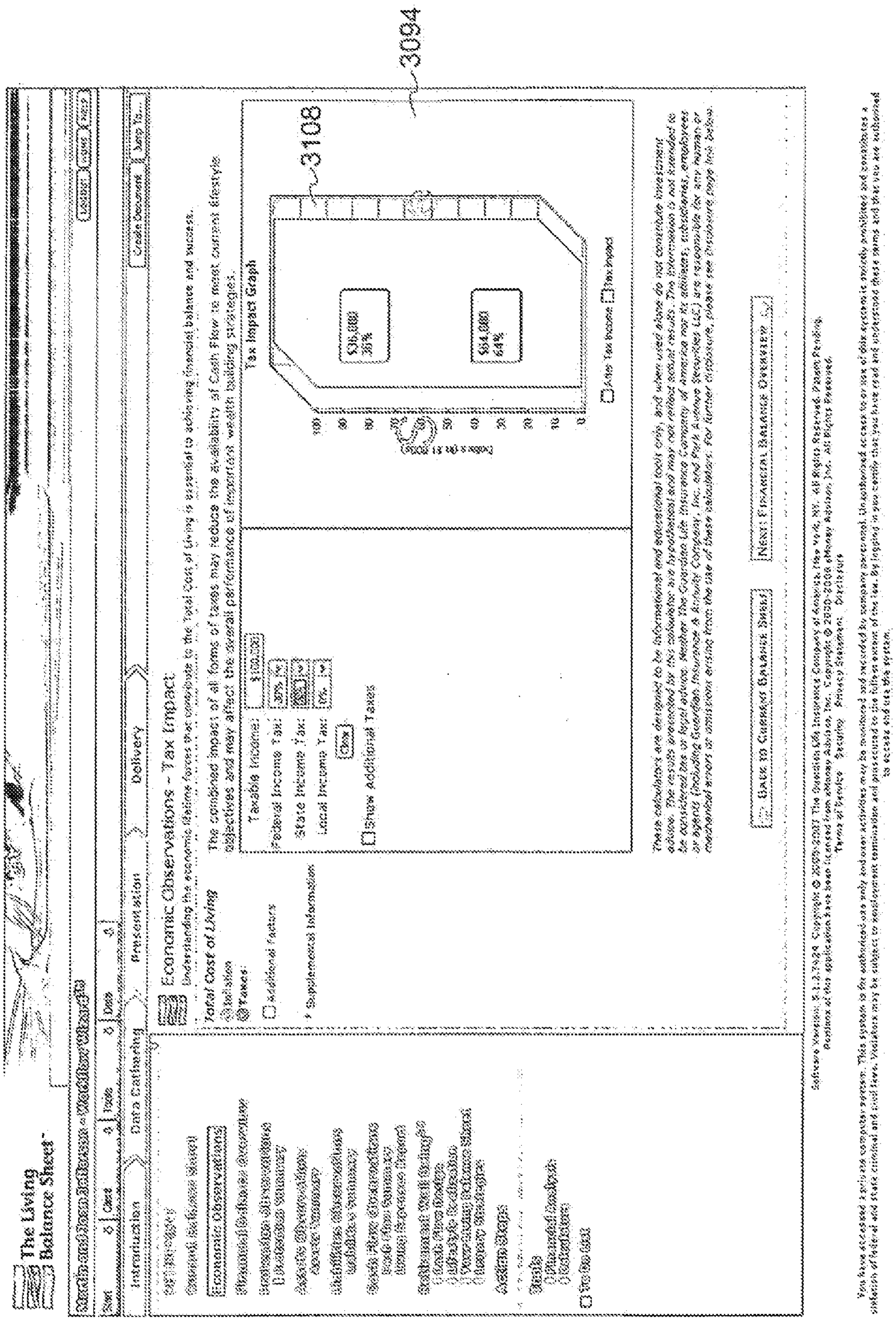
Figure 308:
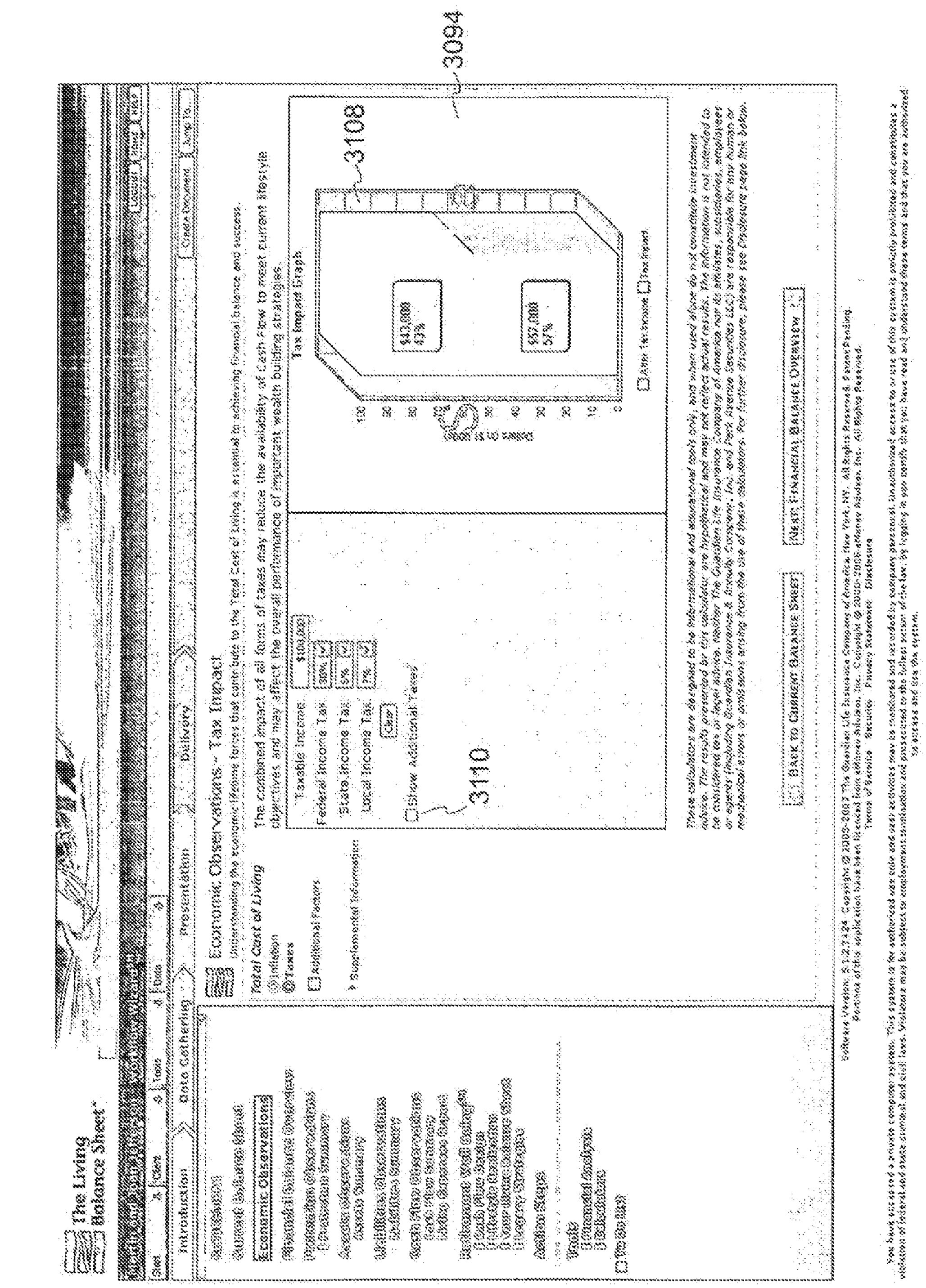

For example, as shown in FIG. 306, with taxable income of $100,000, if a 30% federal income tax rate is chosen, $30,000 and/or 30% will appear on chart 3108 whereas cash flow or after-tax income will appear as $70,000 and/or 70%. Additionally, as shown in FIG. 307, if a 6% state income tax rate is chosen, $36,000 and/or 36% will appear on chart 3108 whereas cash flow or after-tax income will appear as $64,000 and/or 64%. Moreover, as shown in FIG. 308, if a 7% local income tax rate is chosen, $43,000 and/or 43% will appear on chart 3108 whereas cash flow or after-tax income will appear as $57,000 and/or 57%. It will be appreciated that in order to distinguish after-tax income and taxable income, the portion of the chart representing after-tax income can be a different color than the portion of the chart representing taxable income.

Figure 309:
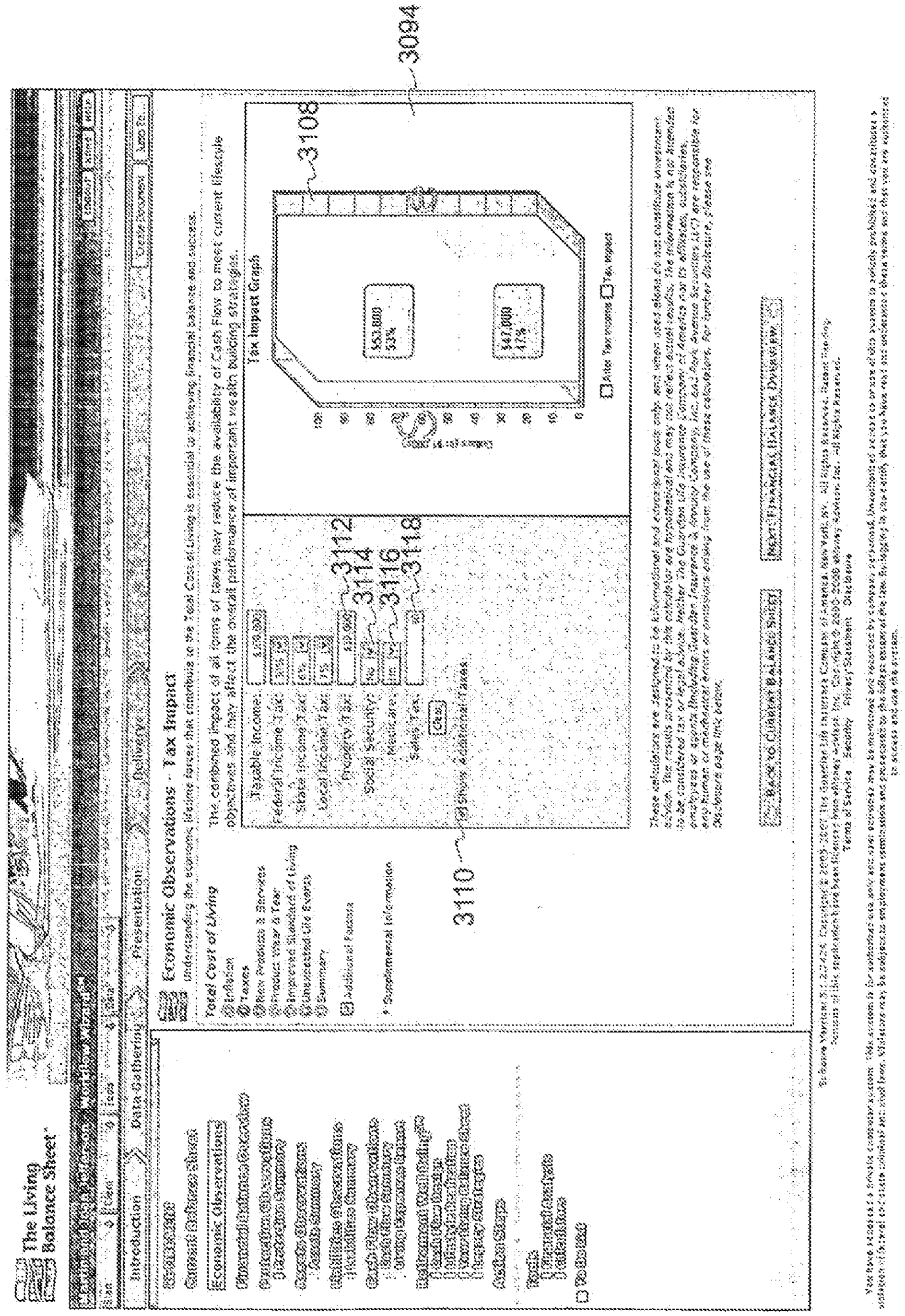
Figure 310:
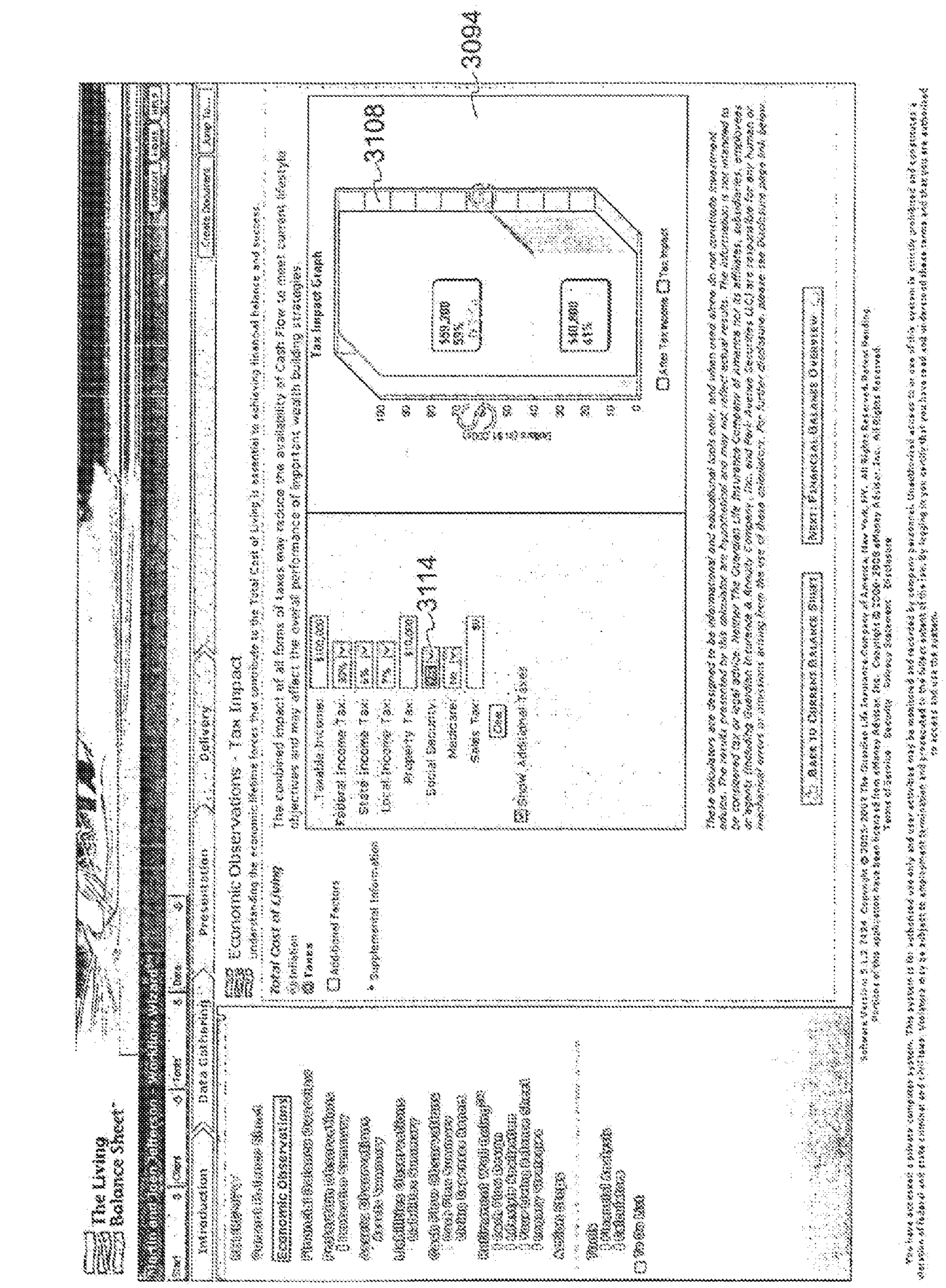
Figure 311:
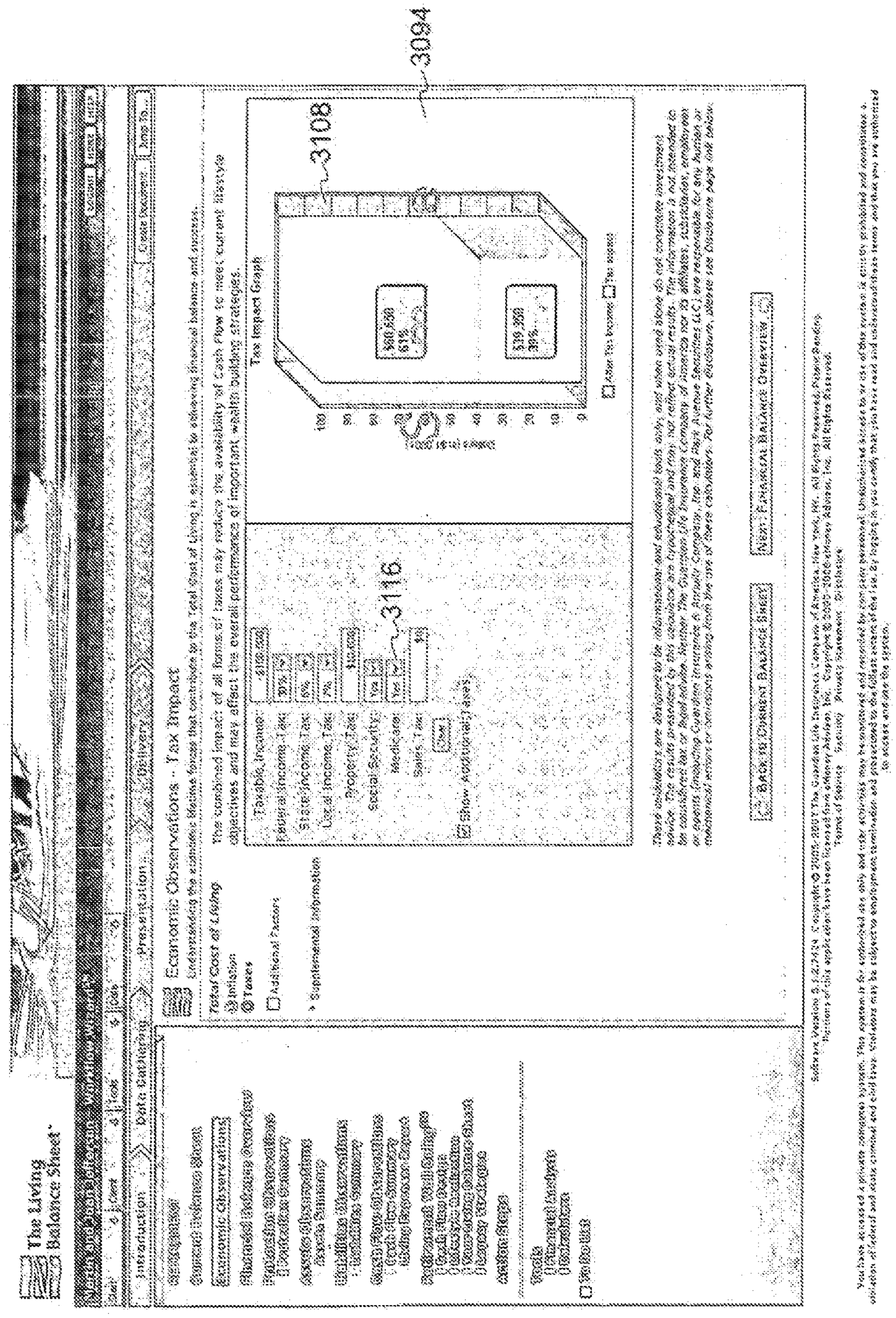
Figure 312:
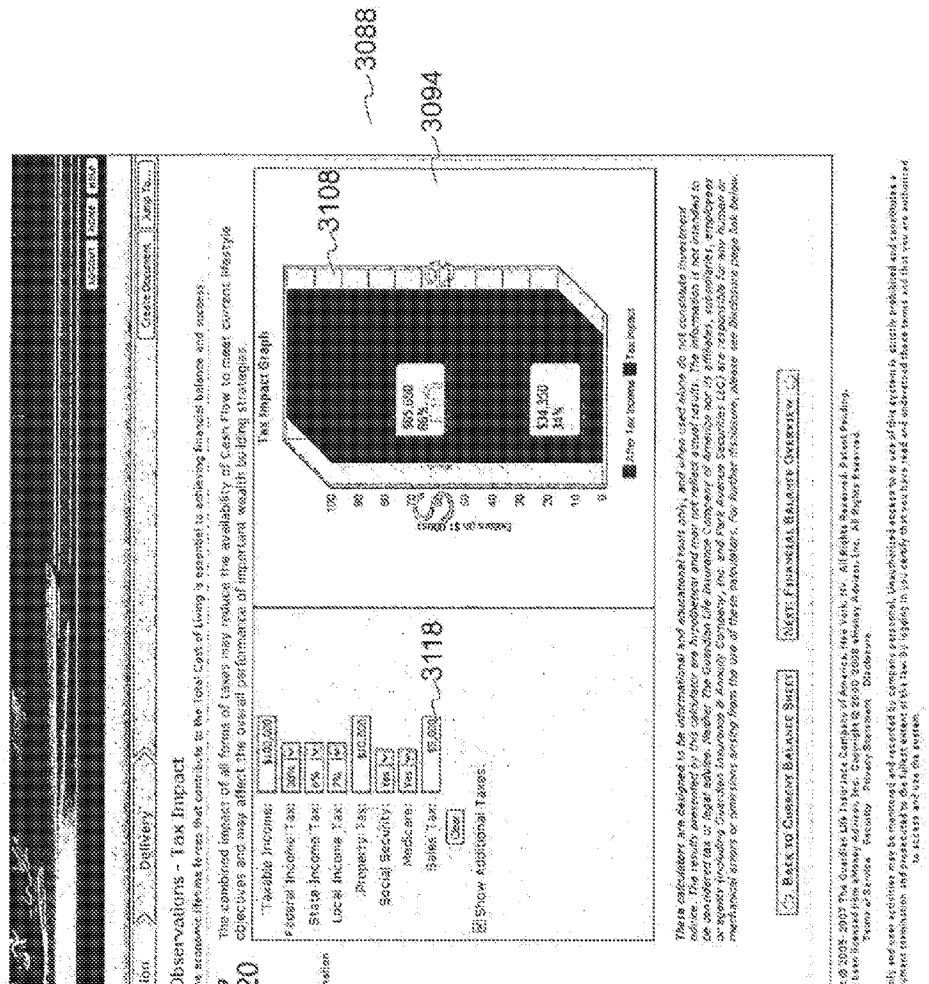

A user can also be provided with option 3110 of FIG. 308 such as a "Show Additional Taxes" option that enables additional tax fields to be displayed. Upon selection of option 3110 in FIG. 308, as shown in FIG. 309, the program can process the request and display, for example, property tax data entry field 3112, social security data entry field 3114, Medicare data entry field 3116 and sales tax data entry field 3118. A user can enter an amount of property tax such as $10,000 in field 3112 (FIG. 309), can indicate social security or Medicare tax applies in field 3114 (FIG. 310), 3116 (FIG. 311) and enter an amount of sales tax (e.g., paid over a period of time such as each year) in field 3118 (FIG. 312). Fields 3114 and 3116 (FIG. 309) provides a drop-down menu for a user to enter "yes" or "no" for social security tax and Medicare tax, and the program can automatically calculates these taxes based on income. Alternatively, fields 3114, 3116 can be arranged so that a user can type in an amount of tax. As shown in FIGS. 309-312, as a user inputs tax information in the various fields, the program can process the information and interactive chart 3108 can be updated to show the taxable income increasing and after-tax income decreasing.

Figure 313:
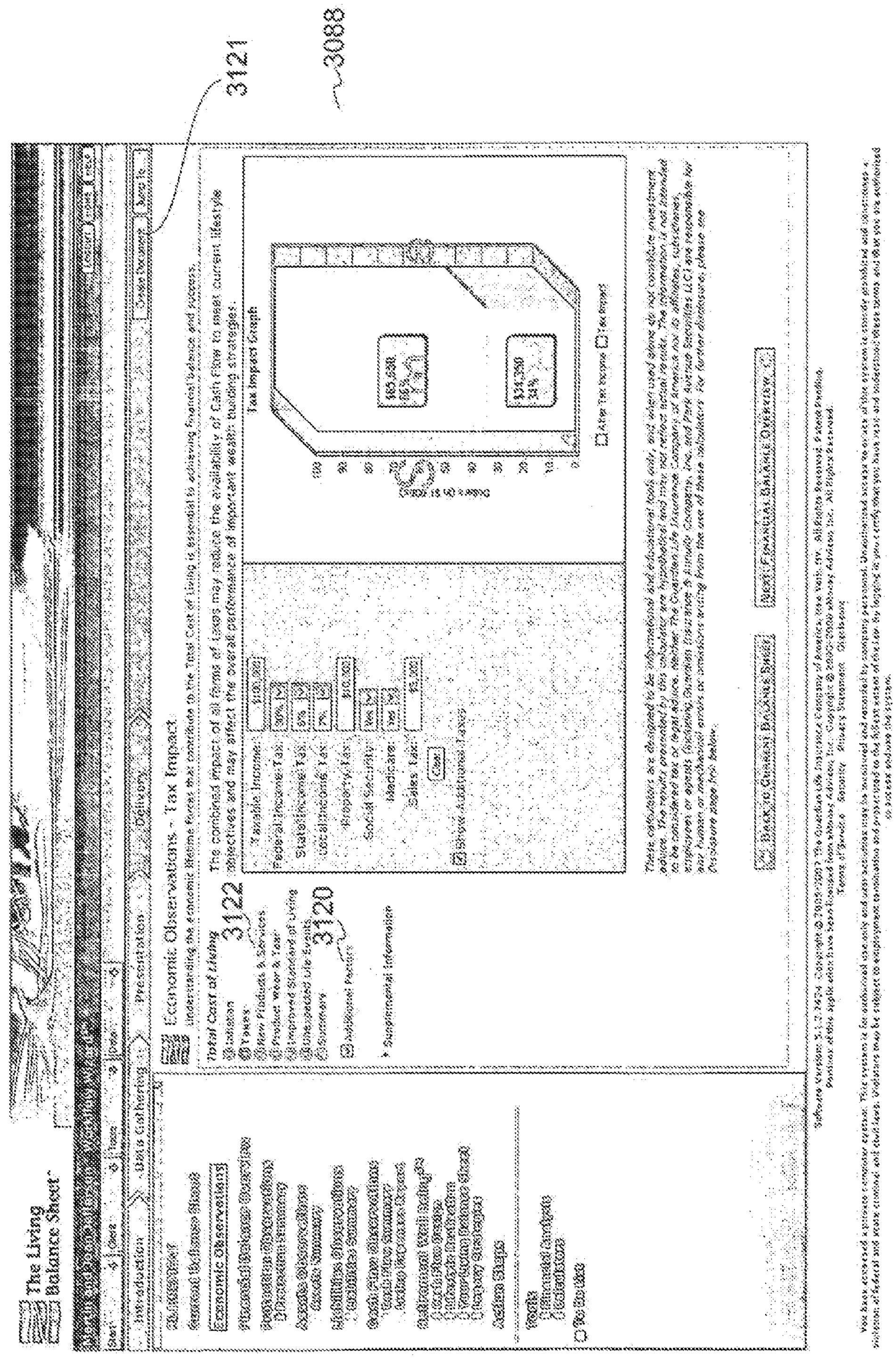

The user may be presented with graphics to enable an agent or representative to make or generate a presentation to a user (e.g., a live presentation such as one that can be varied with the application dynamically in a meeting with a client). Page 3088 can be provided with an option such as "Additional Factors" option 3120 (FIG. 312). After selection of option 3120, the program can process the request and, as shown in FIG. 313, can display additional cost of living factors on page 3088, including new products & services, product wear & tear, improved standard of living, unexpected life events and summary. Such a tool informs the client that there is more factors affecting wealth and savings than just taxes and inflation. The tool also illustrates to a client the factors that affects a client's wealth and savings so that a client is better prepared for life and retirement. In particular, the tool provides an insurance agent or other advisor with diagrams which serve as talking point for the agent or advisor to discuss with a client how new products & services, product wear & tear, improved standard of living, and unexpected life events affect wealth and savings. Understanding these factors may influence how a client plans for retirement, the type/amount of life insurance a client purchases and/or how a client invests.

Figure 314:
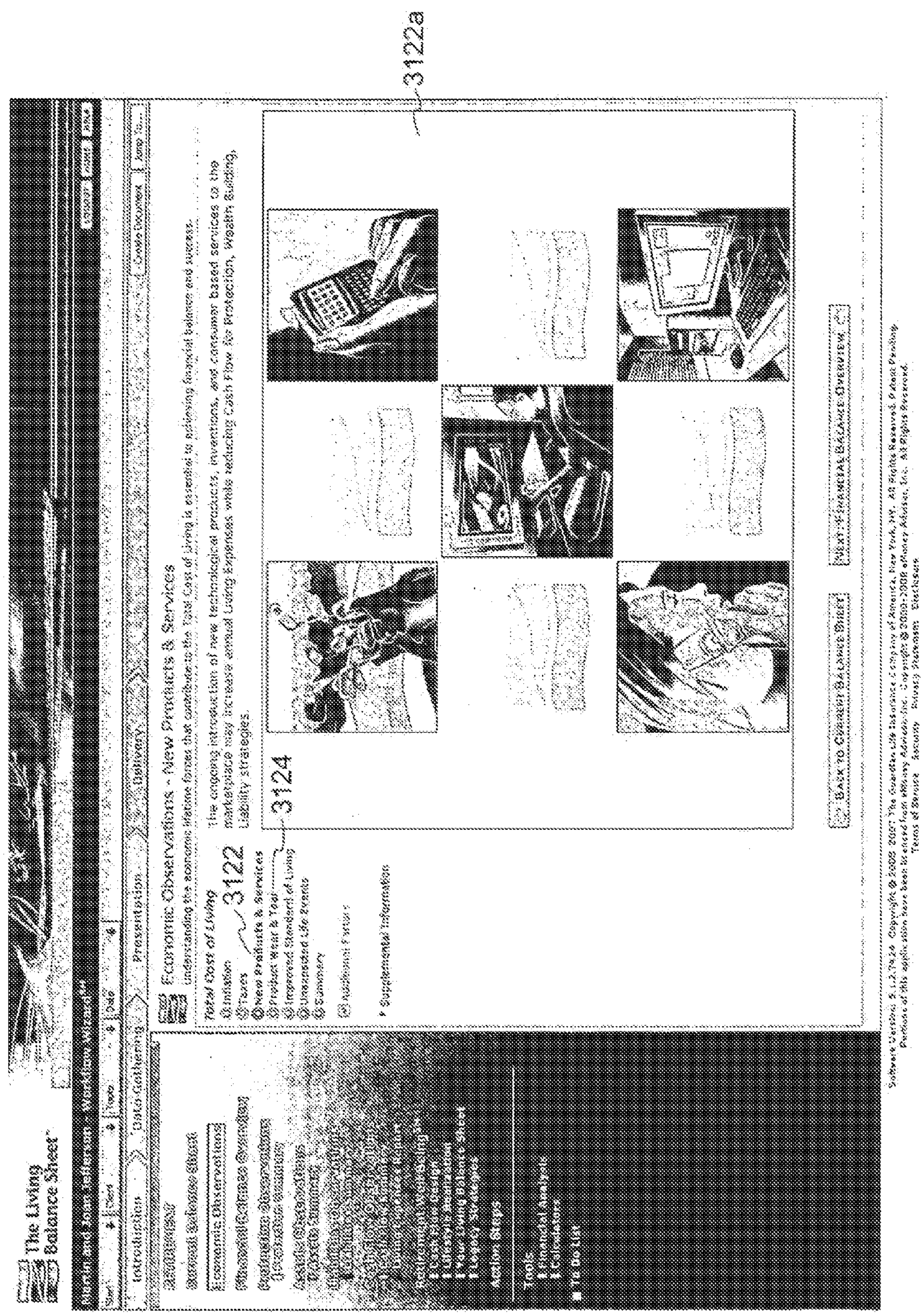
Figure 315:
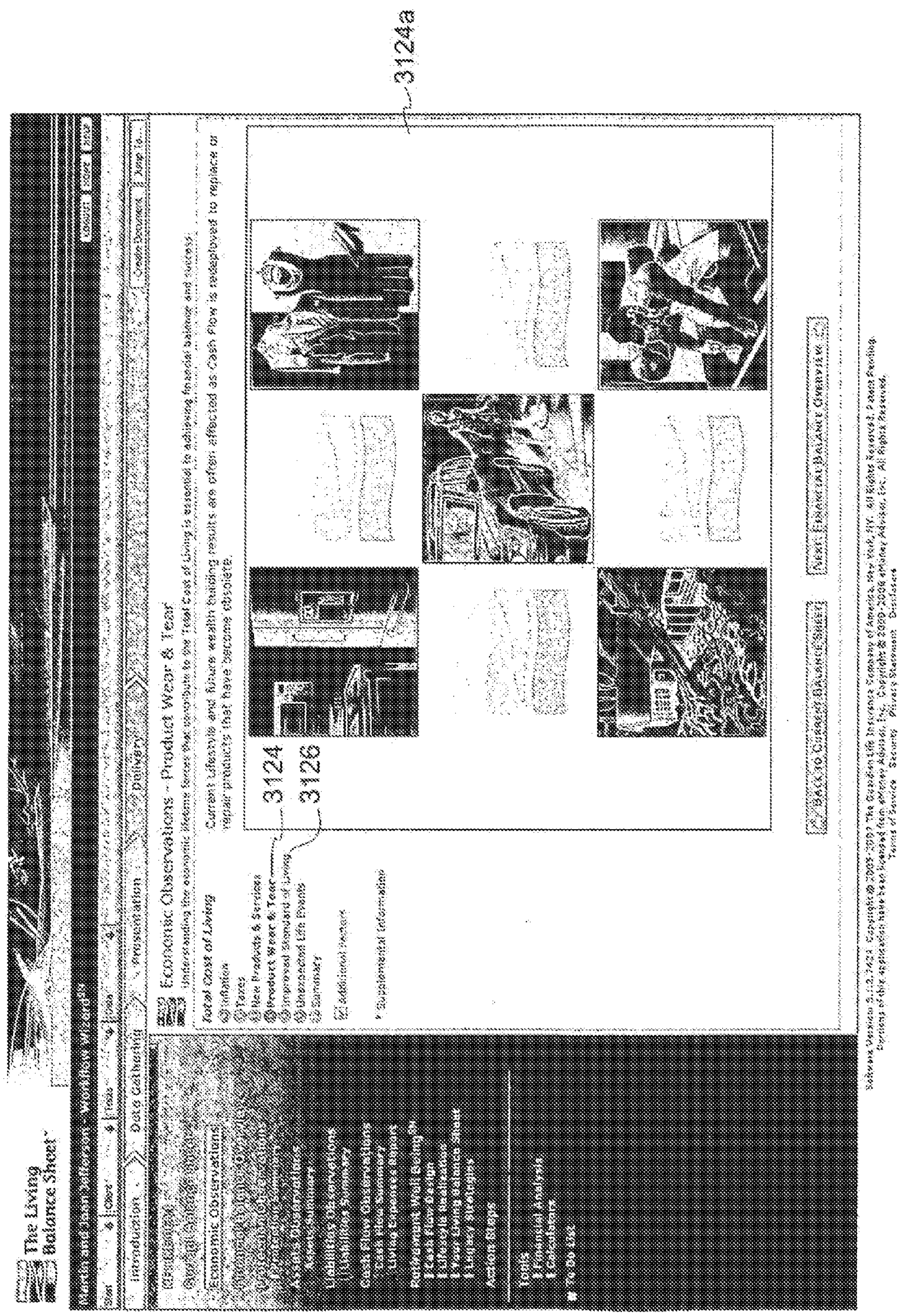
Figure 316:
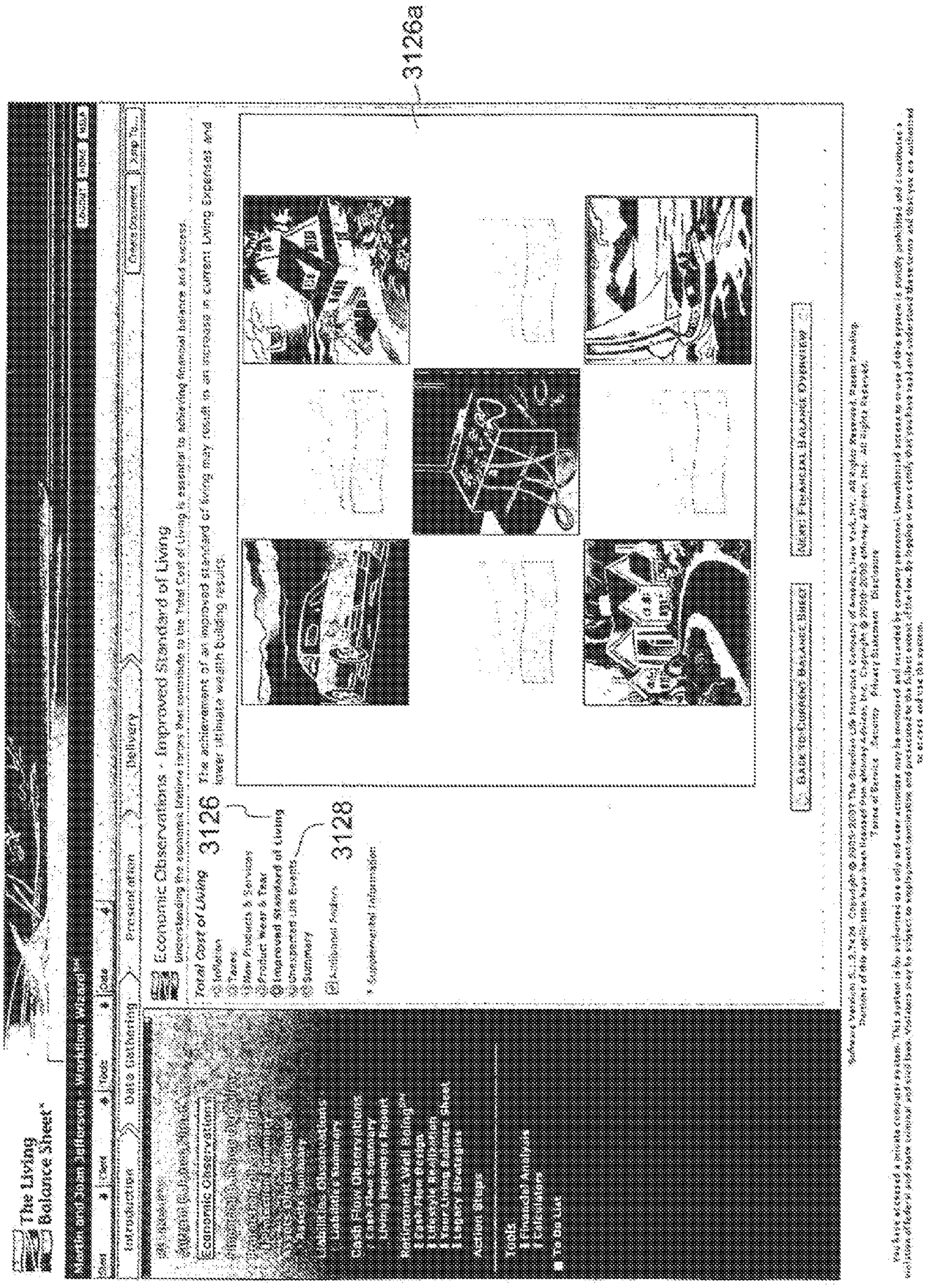
Figure 317:
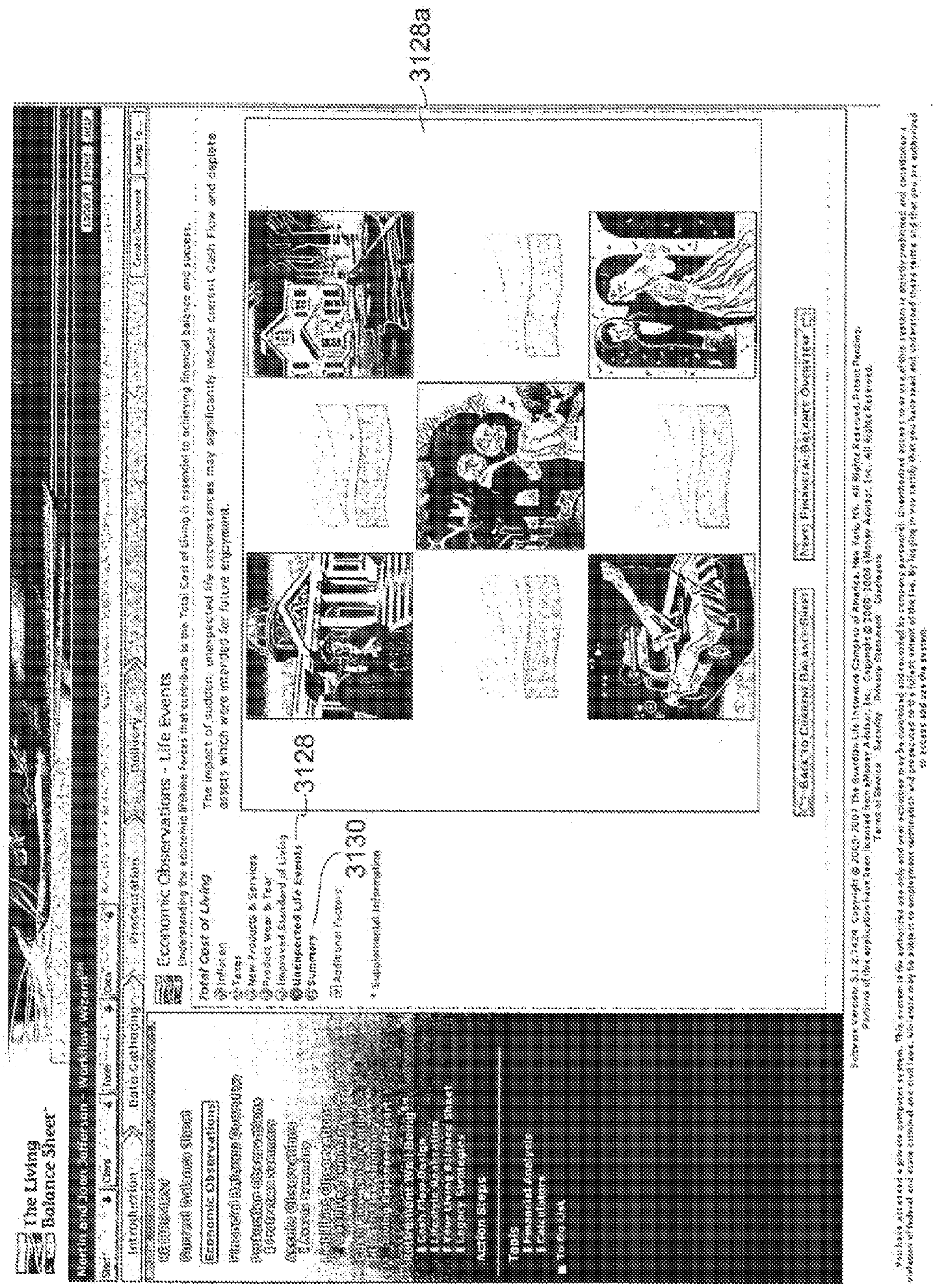

If a user selects new product & services option 3122 as shown in FIG. 313, the program can process the request and can display diagram 3122*a* (FIG. 314). If a user selects product wear & tear option 3124 as shown in FIG. 314, the program can process the request and can display diagram 3124*a* (FIG. 315). If a user selects improved standard of living option 3126 as shown in FIG. 315, the program can process the request and can display (in response thereto) diagram 3126*a* (FIG. 316). If a user selects unexpected life events option 3128 as shown in FIG. 316, the program can process the request and can display diagram 3128*a* (FIG. 317).

Displays 3122*a*, 3124*a*, 3126*a* and 3128*a* (of FIGS. 314-317) may be static. These displays can provide a written story and/or graphics to serve as talking points for a sales agent or representative to show factors affecting the cost of living and retirement income. In particular, display 3122*a* can be used to discuss that as new technology, inventions and consumer services become available, a customer may spend more income on new products and services, thereby increasing cost of living expenses and reducing retirement income. Display 3124*a* can be used to discuss how currently owned items or property need to be fixed or replaces and can deplete income. Display 3126*a* can be used to discuss that purchasing a luxury or addition car(s), second or vacation home, and luxury items (e.g., jewelry) can affect retirement income. Display 3128*a* can be used to discuss that unexpected life events such as funding graduate school, unexpected extra years in college, floods, death, disability, loss of job, accidents and marriage (e.g., larger wedding than expected) can increase cost of living expenses and deplete retirement income. Create document button 3121 (FIG. 313) can be provided which enables an agent or advisor to print the current screen to provide a copy to a client.

Figure 318:
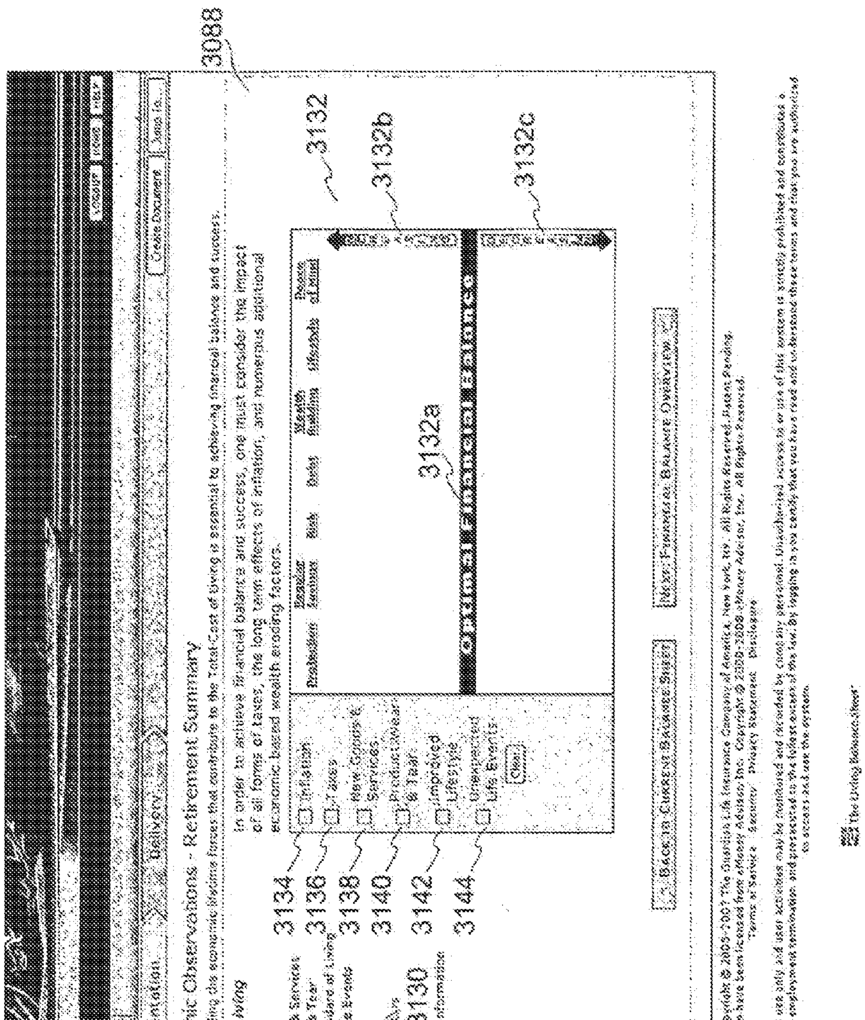

All of these cost of living factors can be evaluated in view of a user's optimal financial condition. As shown in FIG. 317, a user can also select summary option 3130. Thereafter, the program can process the request and display diagram 3132 on page 3088 (FIG. 318). Diagram 3132 can provide a user with a visual representation of the effect various financial factors have on a user's financial condition. For example, financial factors such as inflation, taxes, new goods & services, product wear & tear, improved lifestyle and unexpected life events can be analyzed. Such a tool can illustrate to a user how these financial factors can affect protection, savings, risk, debt, wealth building, lifestyle and peace of mind. Such a tool also illustrates that factors, other than inflation, affects their cost of living and can prevent a person from miscalculating how to save and live their lives. In particular, the tool can illustrate how these factors cause (1) protection to be lagging behind (i.e., do not have enough life insurance), (2) people to have less savings, (3) people to subject their money to more risk, (4) people to take on more debt (e.g., to replace existing property), (5) wealth building to slow down, (6) lifestyle to decrease over time as phase into retirement, and (6) people to have increasing concern about how they can retire and provide for their family.

The factors can be presented in the form of options such as inflation option 3134, taxes option 3136, new goods & services option 3138, product wear & tear option 3140, improved lifestyle option 3142 and unexpected life events option 3144. The factors can be the same factors, different factors, or more or less factors as those present upon selection of additional factors option 3120. Diagram 3132 can also have an indicator representing a user's optimal financial balance or condition (i.e., the optimal combination of protection, assets, liabilities and cash flow for a specific user). In a preferred embodiment, the optimal financial balance can be represented by line or bar 3132*a*. Various categories can be shown on diagram 3132 in columns such as protection, regular savings, risk, debt, wealth building, lifestyle and peace of mind. The display can also have increasing and/or decreasing indicators which can represent increases or decreases in these categories. In a preferred embodiment, the indicators can be arrows 3132*b*, 3132*c*. As a user selects various options 3134, 3136, 3138, 3140, 3142, 3144, the program can process the request and display one or more markers (e.g., bar, line, etc.) on diagram 3132 under one or more of the categories (i.e., protection, regular savings, risk, debt, wealth building, lifestyle and peace of mind) representing an increase or decrease in those categories.

Figure 319:
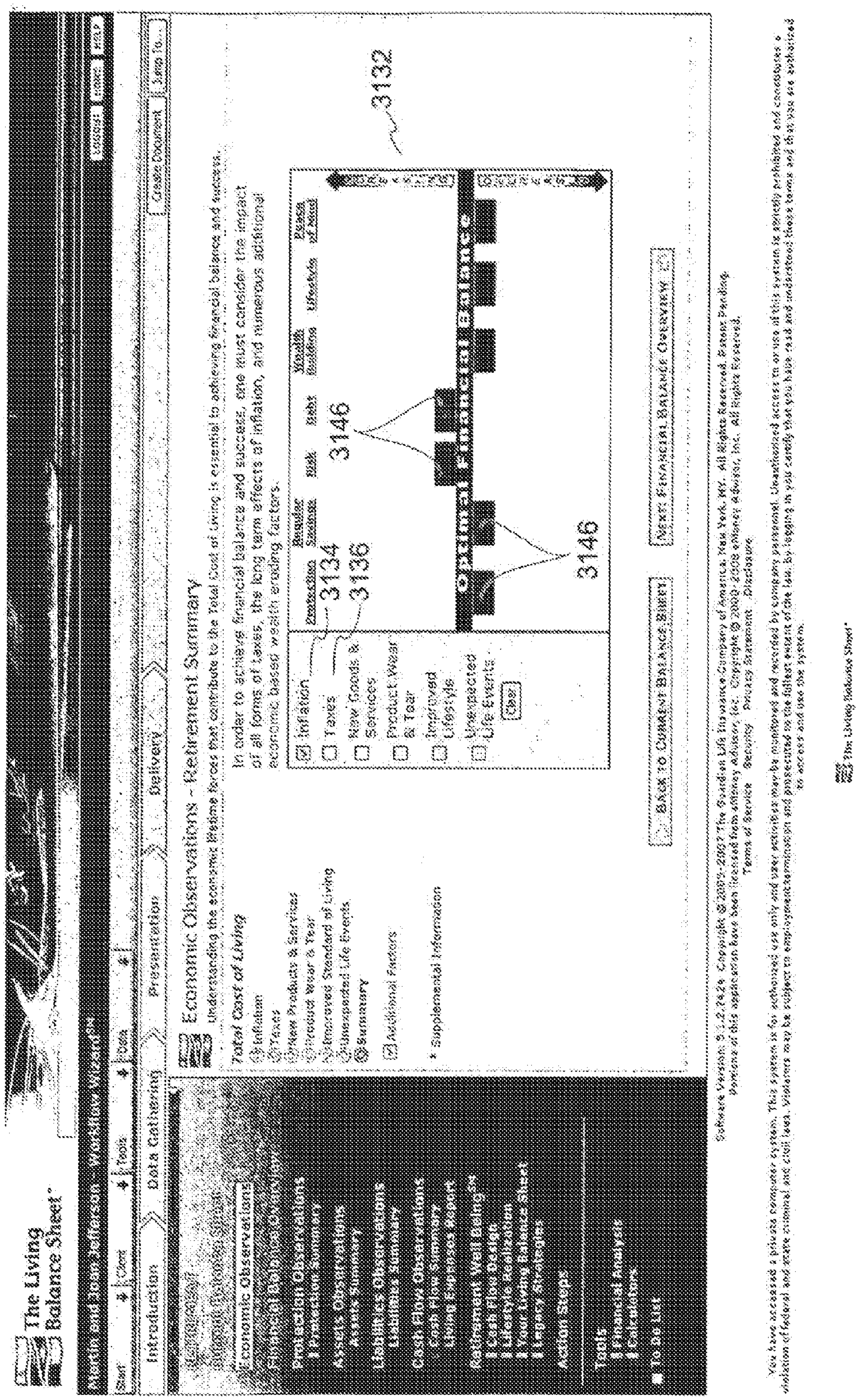
Figure 320:
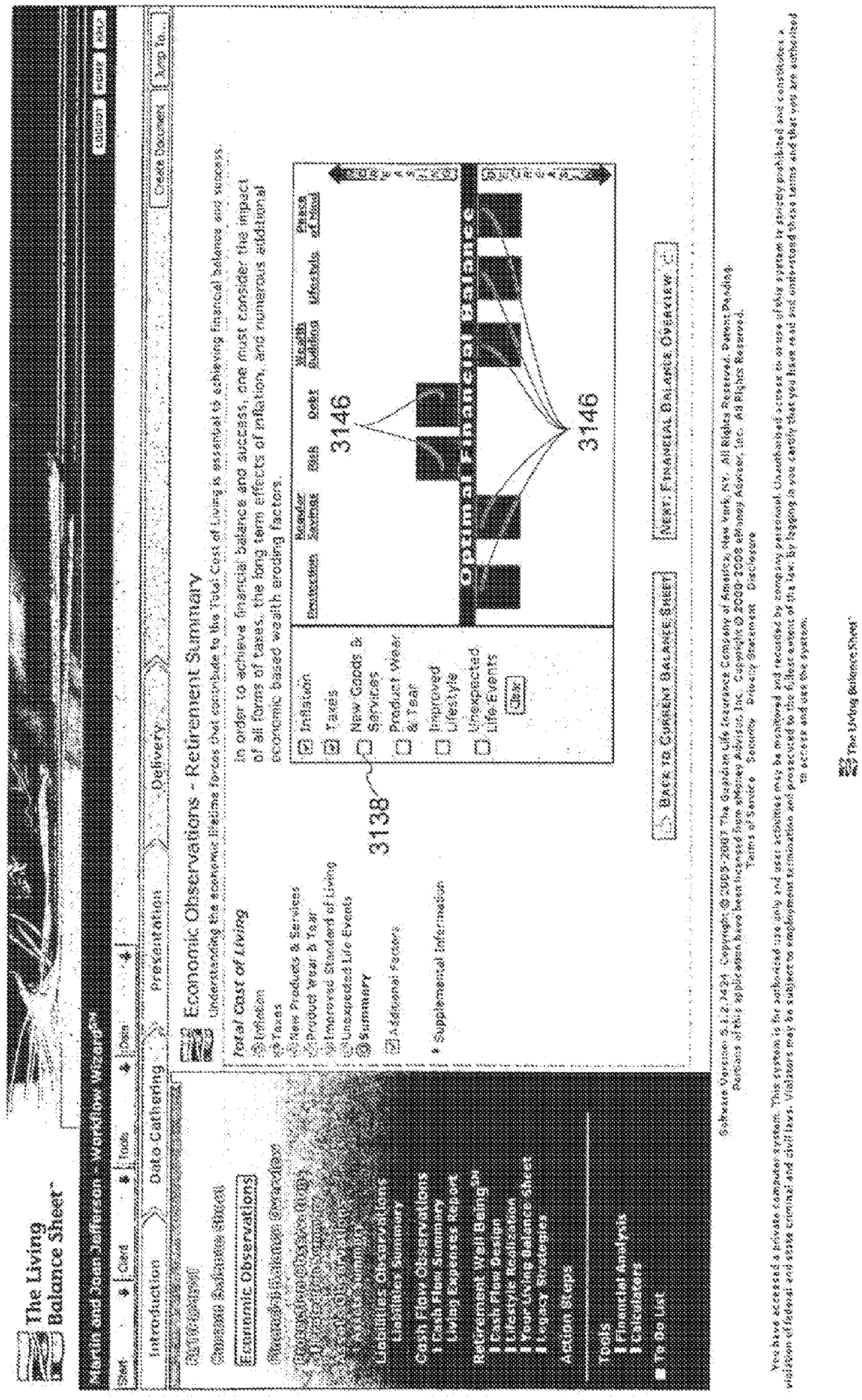
Figure 321:
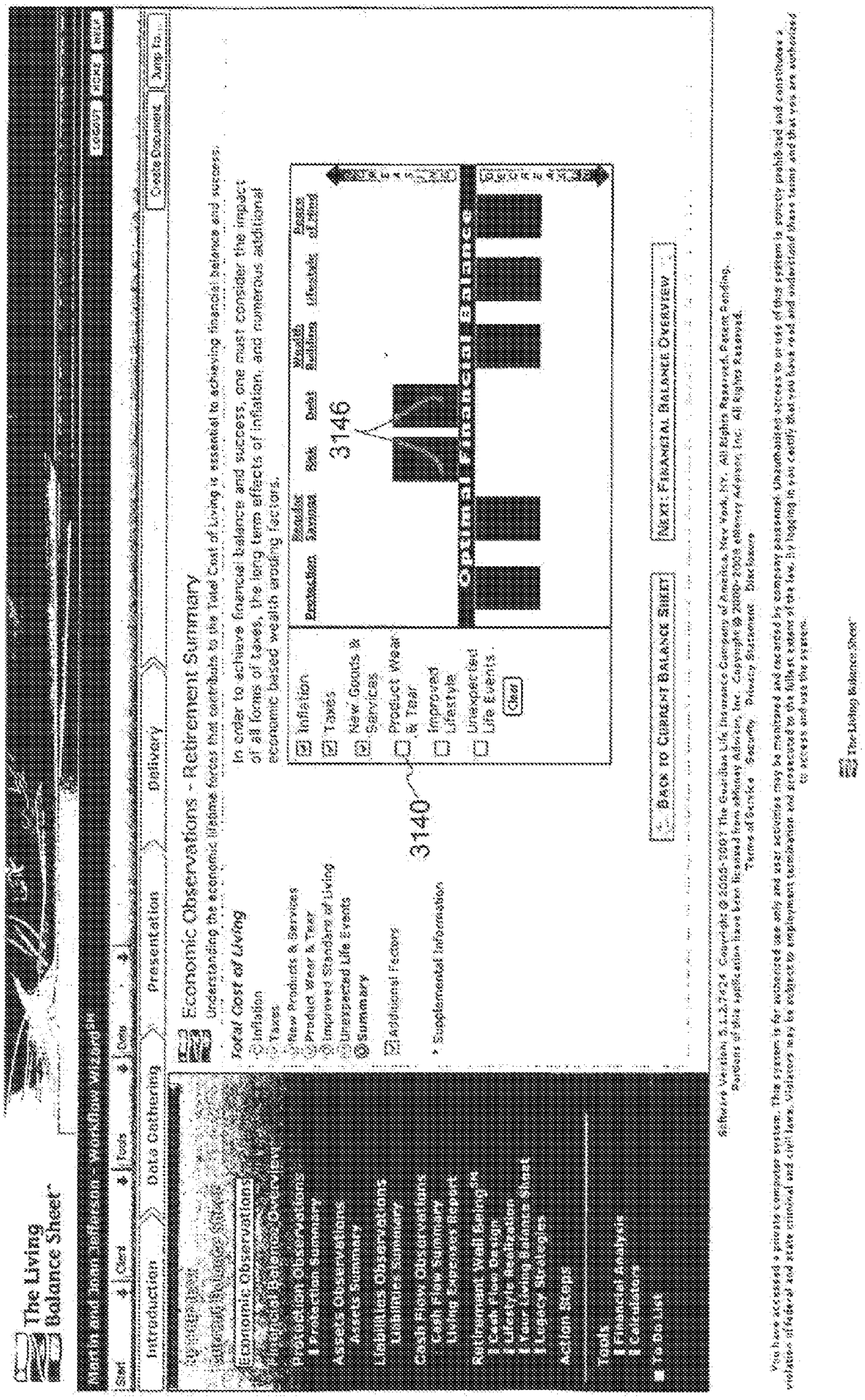
Figure 322:
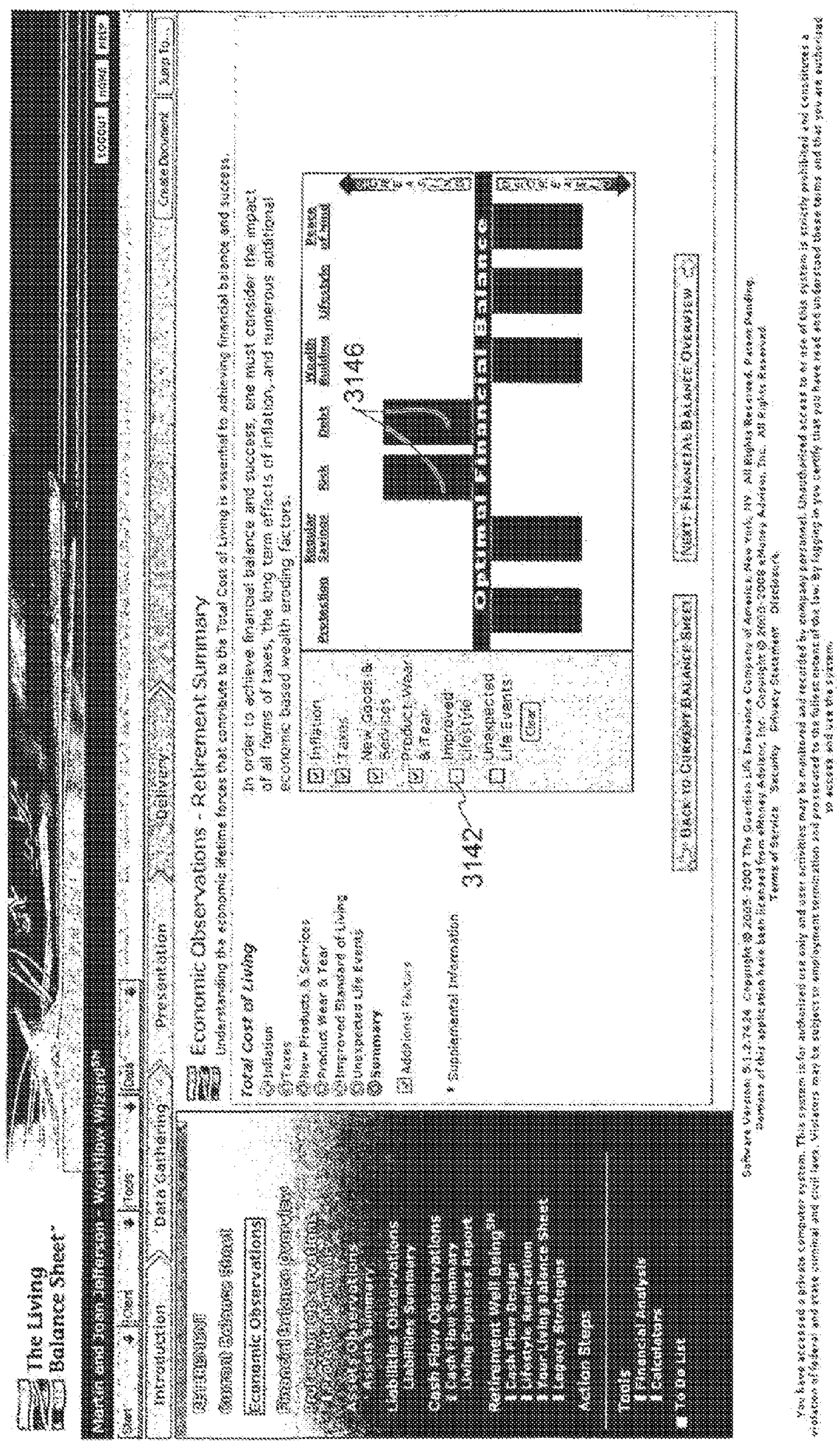
Figure 323:
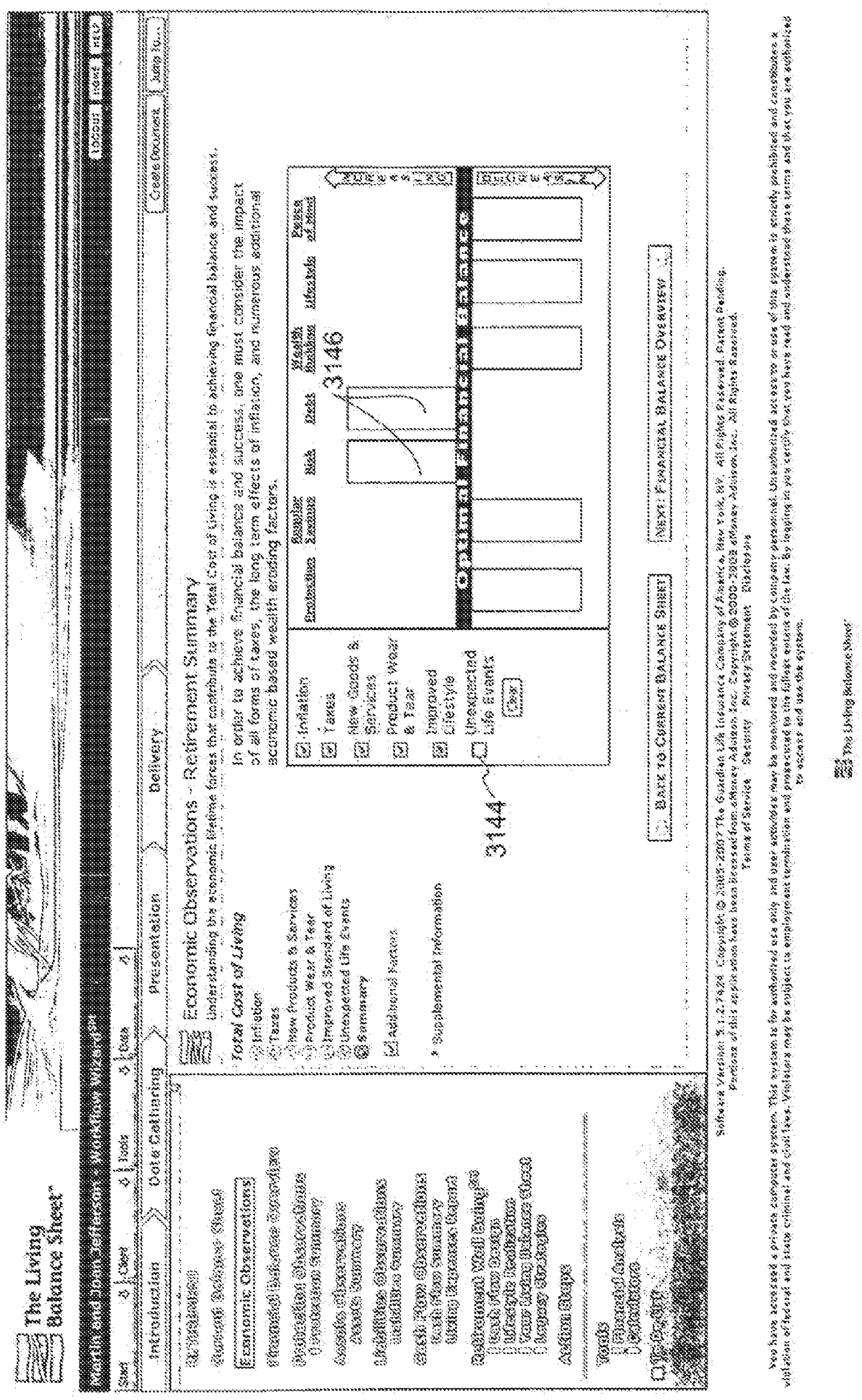
Figure 324:
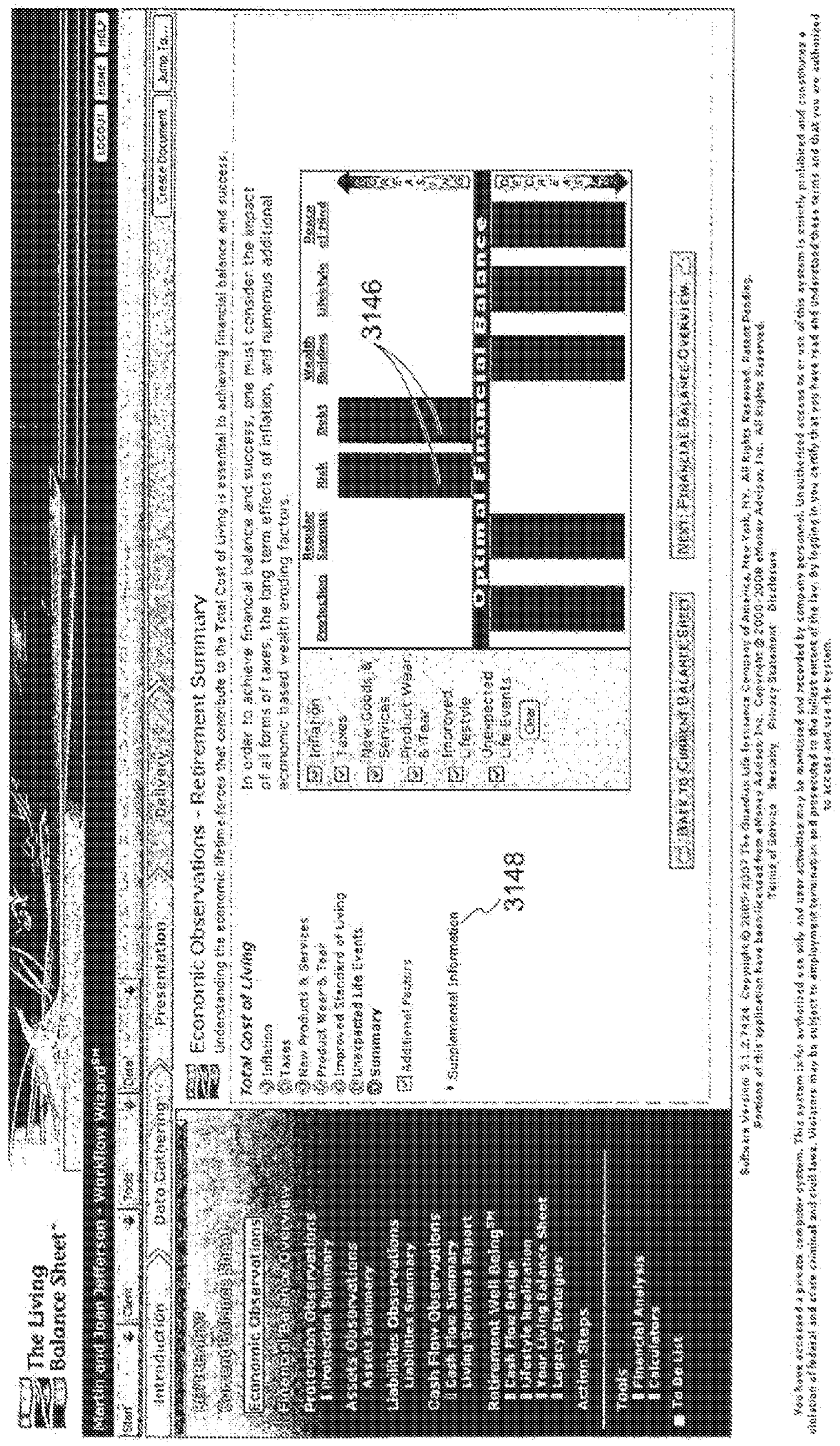
Figure 325:
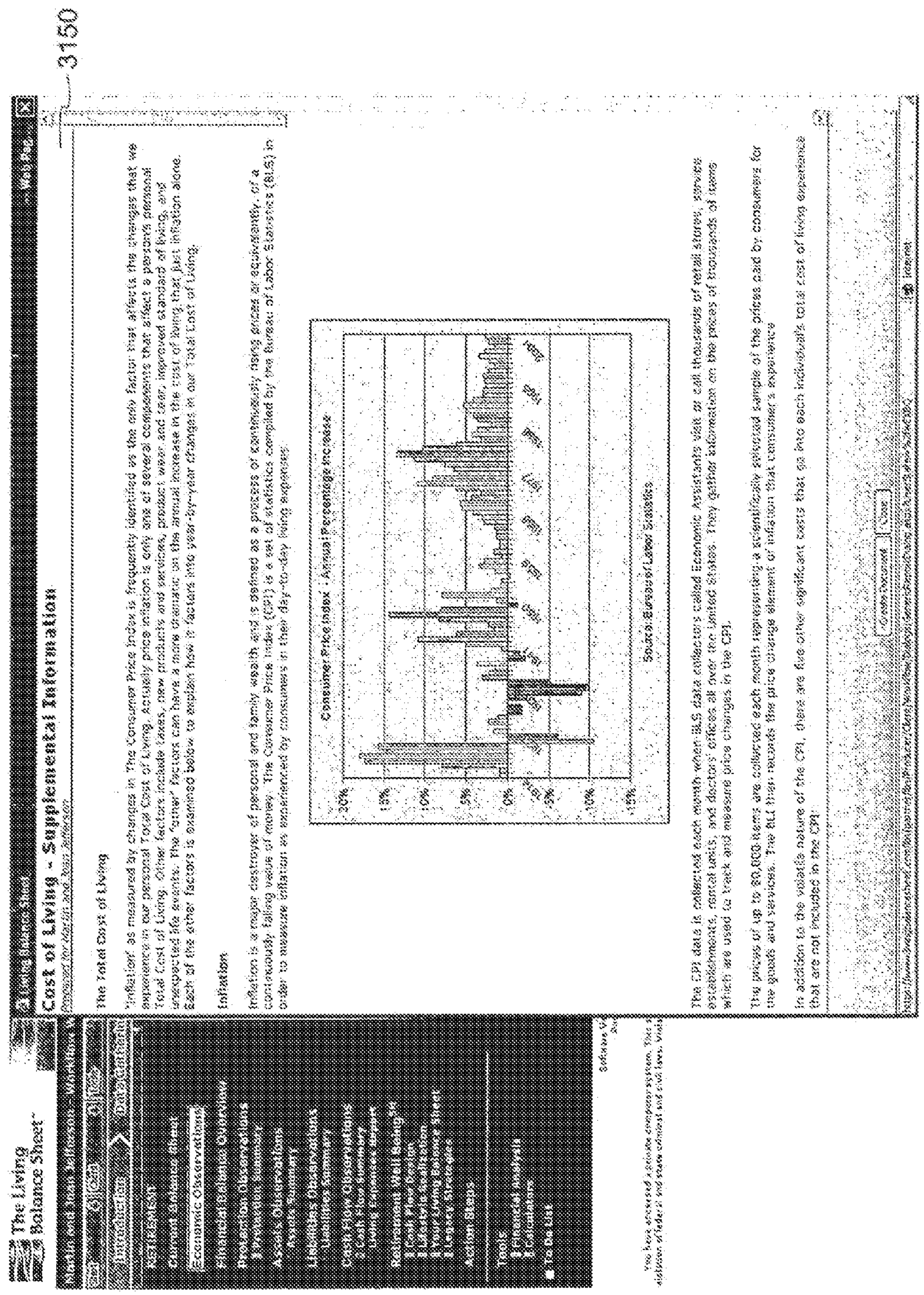
Figure 326:
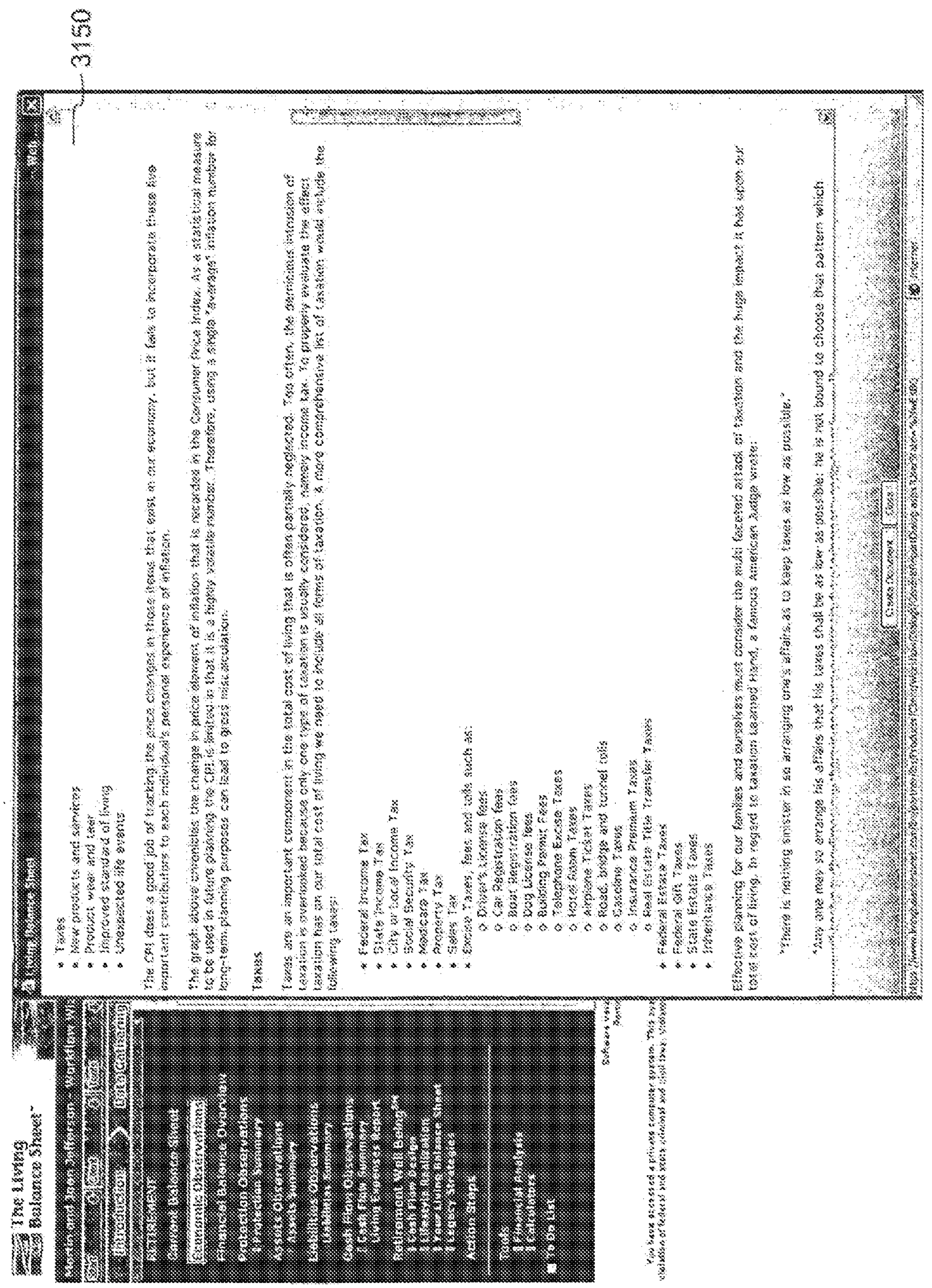
Figure 327:
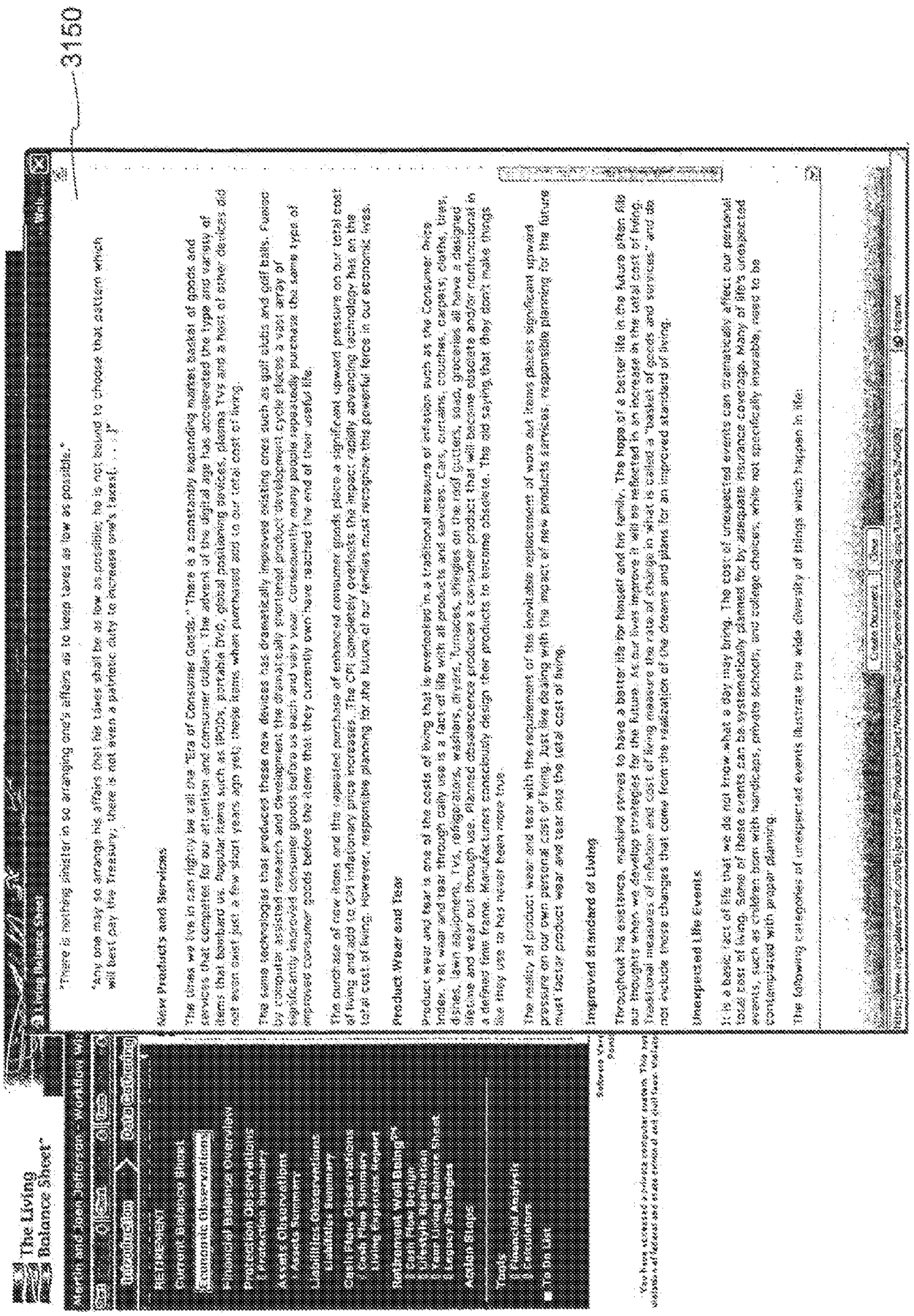
Figure 328:
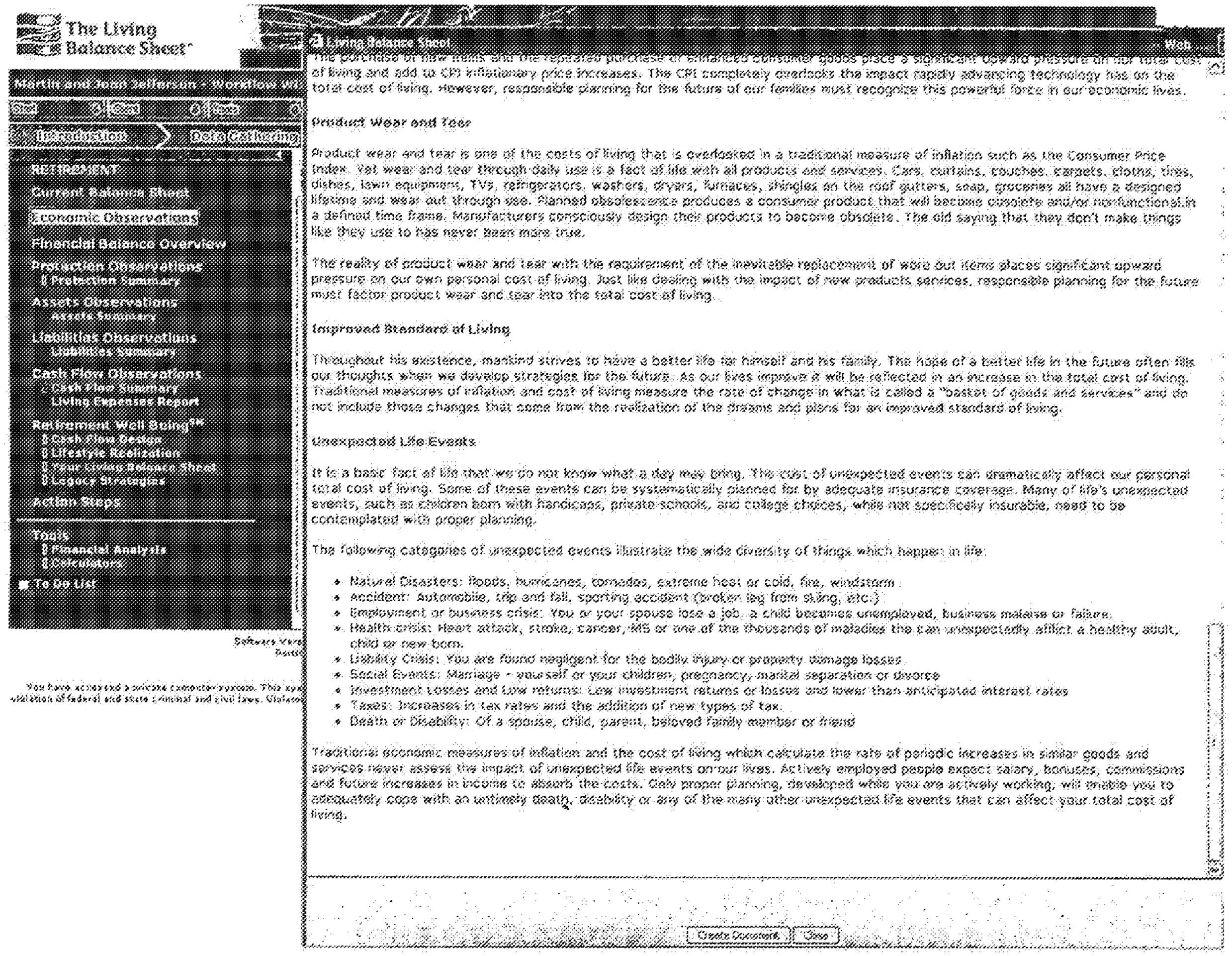
Figure 442:
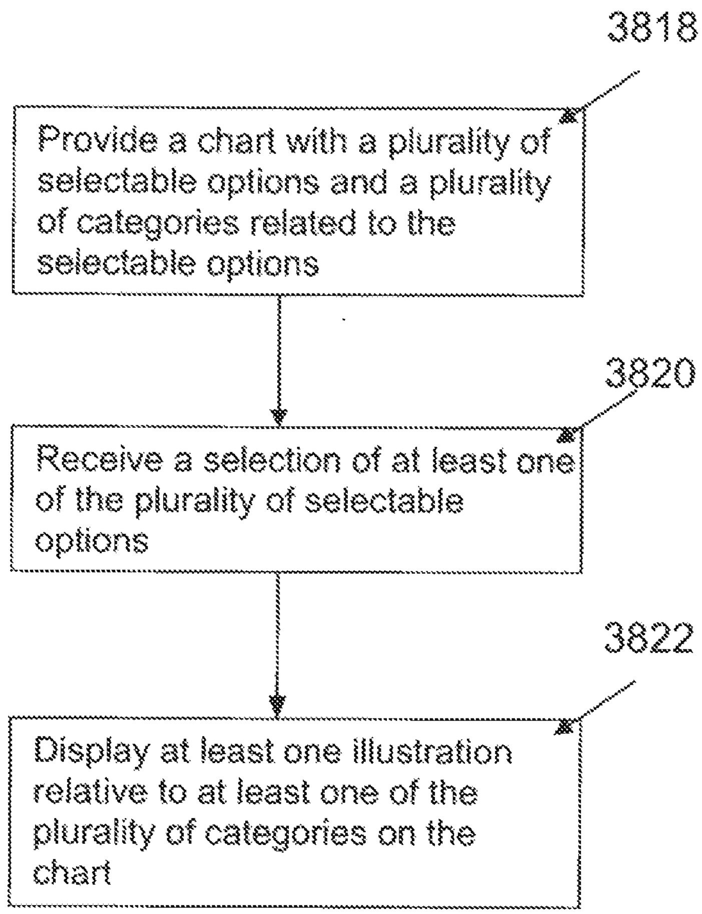

In general, as shown in FIG. 442, a chart with a plurality of selectable options and a plurality of categories related to the selectable options can be provided (step 3818). A selection of at least one of the plurality of selectable options can be received (step 3820). In response to receiving the selection, at least one illustration can be displayed relative to at least one of the plurality of categories on the chart (step 3822) such that the illustration represents a decrease and/or increase related to at least one of the plurality of categories. One or more options 3134, 3136, 3138, 3140, 3142, 3144 can be selected. A single option or combination of options can be selected by a user. As shown in FIG. 318, a user can select inflation option 3134. The program can process the request and, as shown in FIG. 319, can display markers 3146 (e.g., bars or lines) on diagram 3132. In a preferred embodiment, selection of option 3134 can show a decrease in protection, regular savings, wealth building, lifestyle and peace of mind and an increase in risk and debt. As shown in FIG. 319, a user can select taxes option 3136. The program can process the request and, as shown in FIG. 320, can increase the size of markers 3146. A user can continue to select additional options 3138, 3140, 3142, 3144 as shown in FIGS. 320-323, respectively. As a user selects additional options, markers 3146 increase in size. In a preferred embodiment, all options have the same effect on the various categories (i.e., protection, regular savings, risk, debt, wealth building, lifestyle and peace of mind) such that if all options 3134, 3136, 3138, 3140, 3142, 3144 are selected, markers 3146 will illustrate a significant impact on the categories such as shown in FIG. 324. The options 3134, 3136, 3138, 3140, 3142, 3144 can also be deselected to show that as a person starts to address the financial factors (e.g., inflation, taxes, new goods & services, product wear & tear, improved lifestyle and unexpected life events), there is a decreases in markers 3146 as financial pressure is taken off the person. If desired, the interactive tool can be vary the characteristics of the interaction with the tool based on a particular customer personal data.

As shown in FIG. 324, a user can also select supplemental information option 3148. The program can process the request and, as shown in FIG. 325-328, display information on the cost of living on page 3088 or may open another window such as window 3150 and display the information in window 3150.

Figure 329:
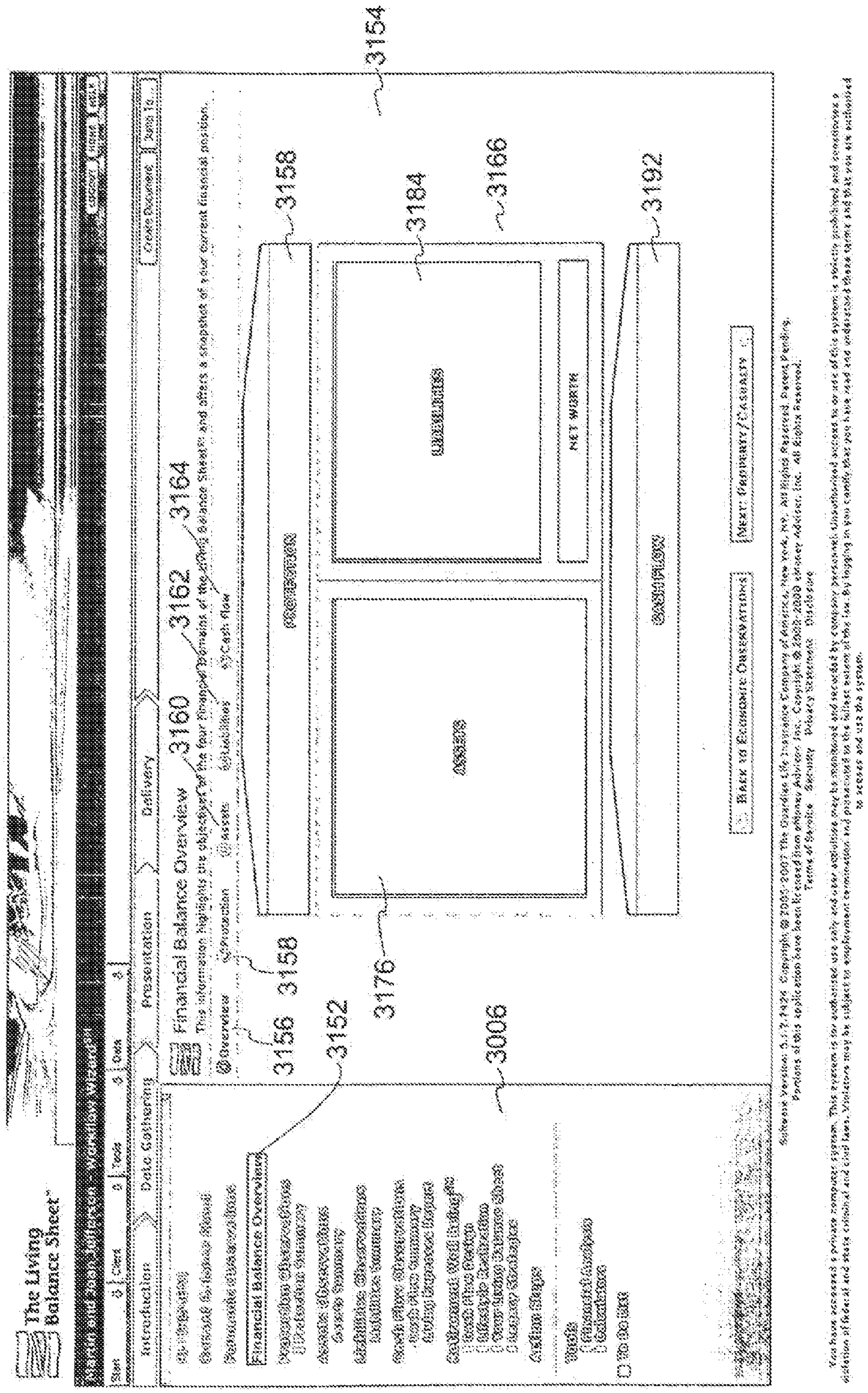

Furthermore, the program can enable a user to review financial objectives and a summary of the interdependent domains or categories. A user can select financial balance overview link 3152 from list of options field 3006 of FIG. 276. The program can process the request and display financial balance overview page 3154 as shown in FIG. 329. Page 3154 can provide a user with a number of options such as overview option 3156, protection option 3158, assets option 3160, liabilities option 3162 and cash flow option 3164. If overview option 3156 is selected, the program can process the request and present interactive diagram tool 3166 on page 3154. Interactive diagram tool 3166 can display the interdependent domains or categories protection, assets, liabilities and cash flow. It will be appreciated that, while in a preferred embodiment selection of financial observation overview link 3152 can automatically result in page 3154 being displayed with diagram 3166, selection of link 3152 can result in the program displaying pages and/or diagrams associated with another option 3158, 3160, 3162, 3164 instead.

Figure 330:
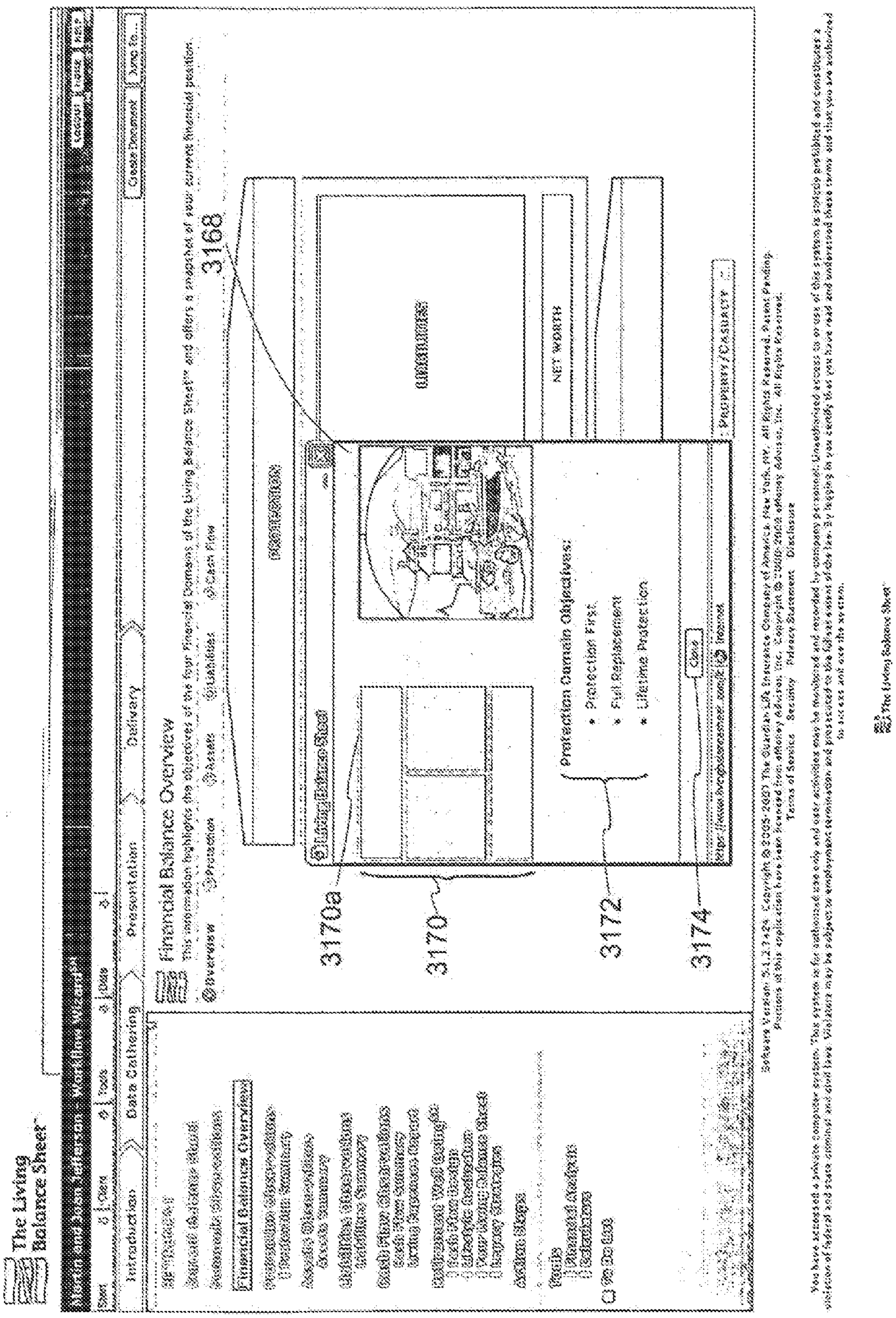

A user can select or click a particular category from diagram tool 3166. For example, as shown in FIG. 329, a user can select the protection category by clicking on protection section 3158. The program can process the request and, as shown in FIG. 330, information can be displayed, preferably, in window 3168. Window 3168 can have graphic 3170 providing a representation of diagram 3166 so as to illustrate to a user the category being discussed. For example, area 3170*a* of graphic 3170 can be highlighted to show that the protection category is being discussed. Area 3170*a* can be highlighted in the same color as protection section 3158 (e.g., both area 3170*a* and section 3158 can be yellow). Discussion area 3172 can also be displayed to provide a user with protection objective(s). In order to close window 3168, button 3174 can be provided. Upon clicking button 3174, the program can process the request and window 3168 can be closed/disappear. Button 3174 can provide the same function in other windows as well.

Figure 331:
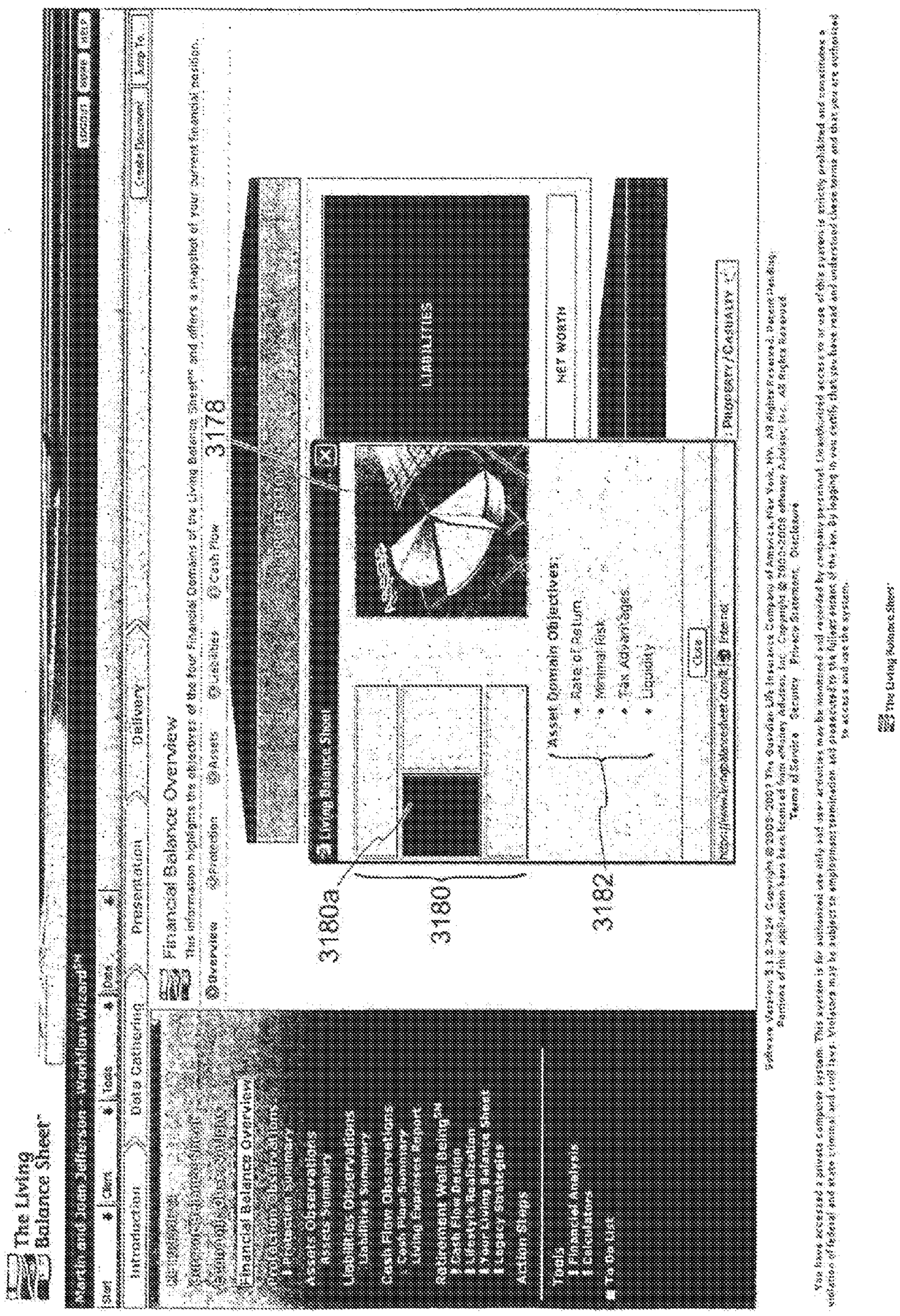

Alternatively, a user can select the assets category by clicking on assets section 3176 (FIG. 329). The program can process the request and, as shown in FIG. 331, information can be displayed, preferably, in window 3178. Window 3178 can have graphic 3180 providing a representation of diagram 3166 so as to illustrate to a user the category being discussed. For example, area 3180*a* of graphic 3180 can be highlighted to show that the assets category is being discussed. Area 3180*a* can be highlighted in the same color as assets section 3176 (e.g., both area 3180*a* and section 3176 can be blue). Discussion area 3182 can also be displayed to provide a user with asset objective(s).

Figure 332:
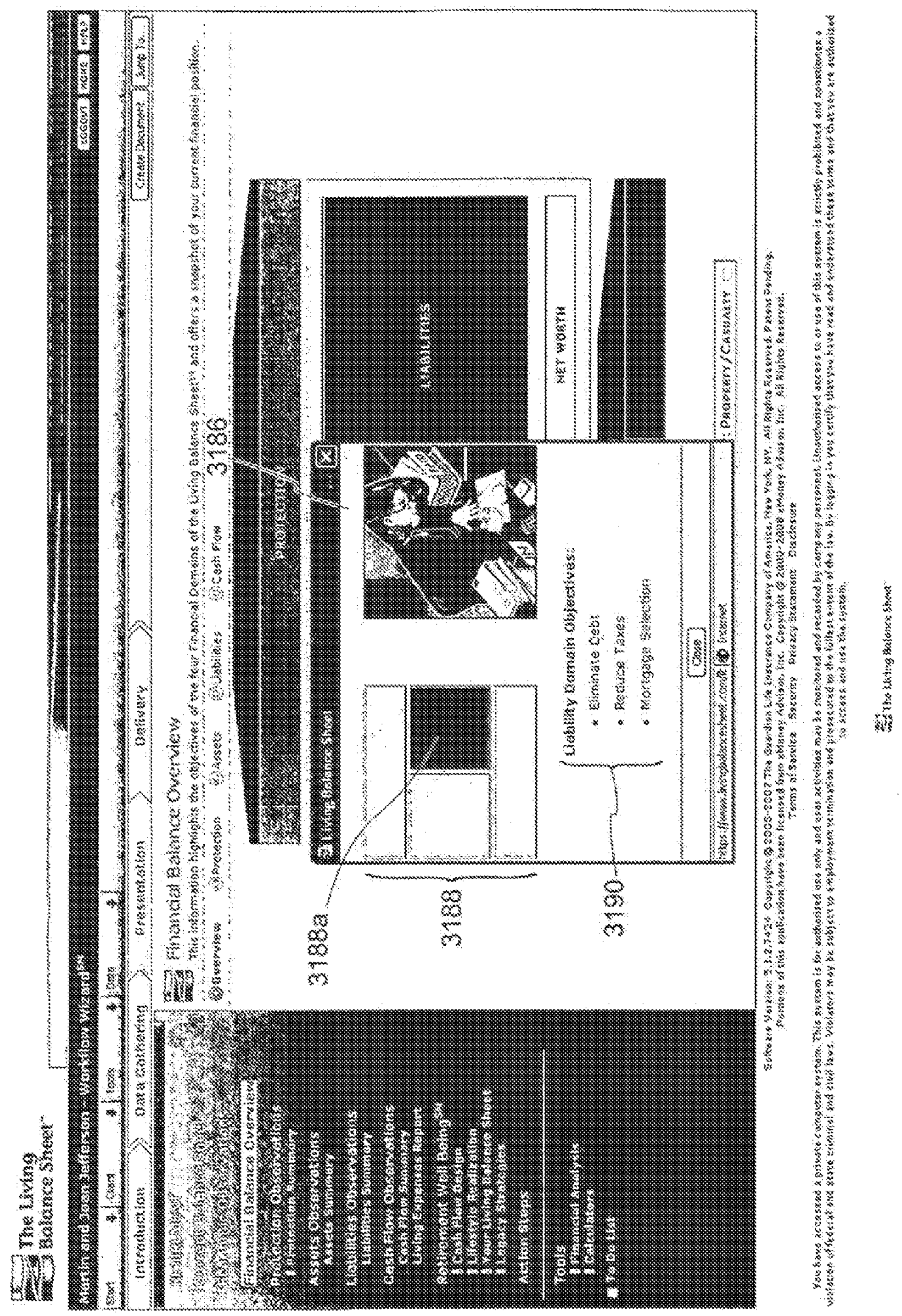

A user can also select the liabilities category by clicking on liabilities section 3184 (FIG. 329). The program can process the request and, as shown in FIG. 332, information can be displayed, preferably, in window 3186. Window 3186 can have graphic 3188 providing a representation of diagram 3166 so as to illustrate to a user the category being discussed. For example, area 3188*a* of graphic 3188 can be highlighted to show that the liabilities category is being discussed. Area 3188*a* can be highlighted in the same color as liabilities section 3184 (e.g., both area 3188*a* and section 3184 can be red). Discussion area 3190 can also be displayed to provide a user with liabilities objective(s).

Figure 333:
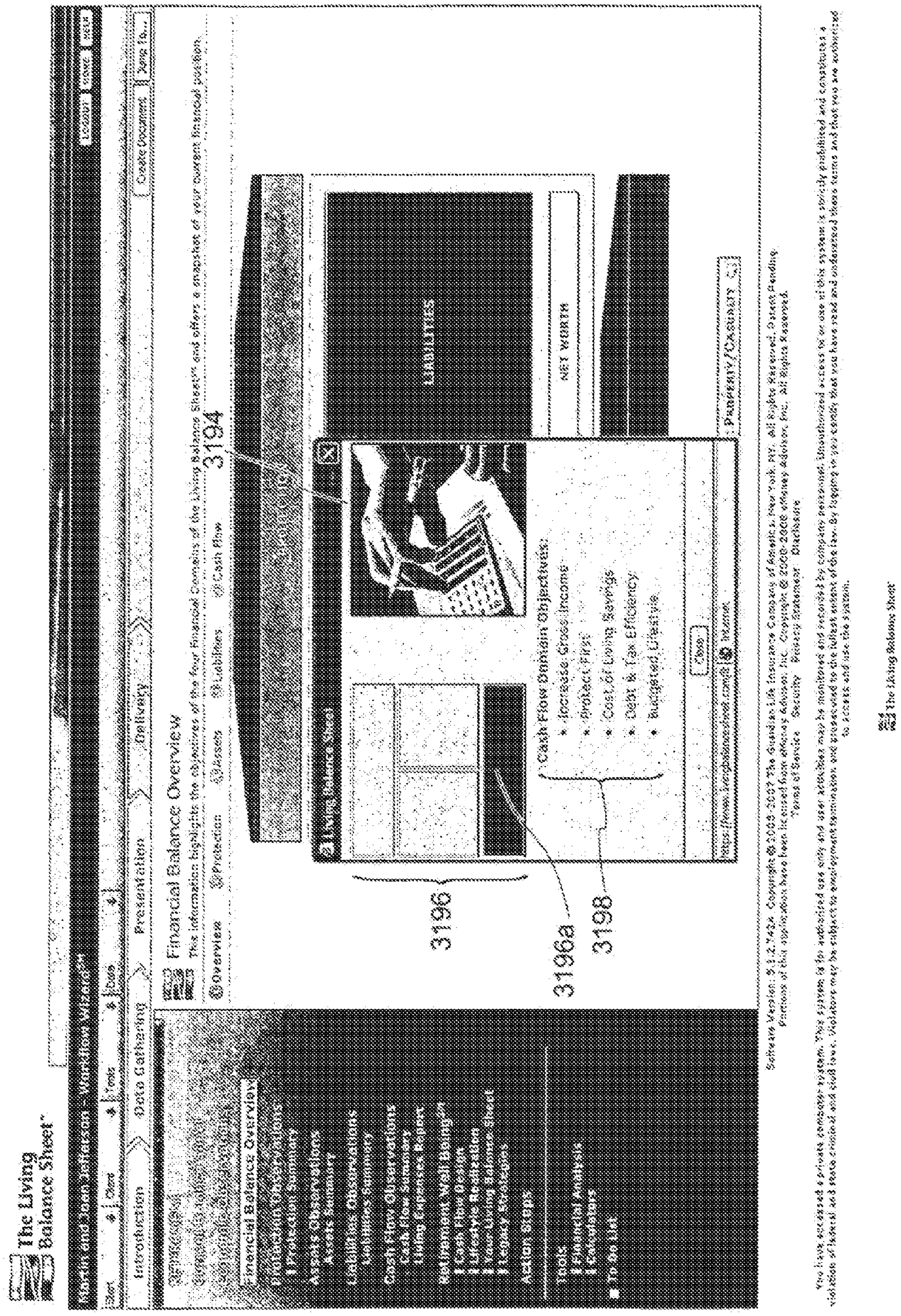

A user can select the cash flow category by clicking on cash flow section 3192 (FIG. 329). The program can process the request and, as shown in FIG. 333, information can be displayed, preferably, in window 3194. Window 3194 can have graphic 3196 providing a representation of diagram 3166 so as to illustrate to a user the category being discussed. For example, area 3196*a* of graphic 3196 can be highlighted to show that the cash flow category is being discussed. Area 3196*a* can be highlighted in the same color as cash flow section 3192 (e.g., both area 3196*a* and section 3192 can be green). Discussion area 3198 can also be displayed to provide a user with cash flow objective(s).

Figure 334:
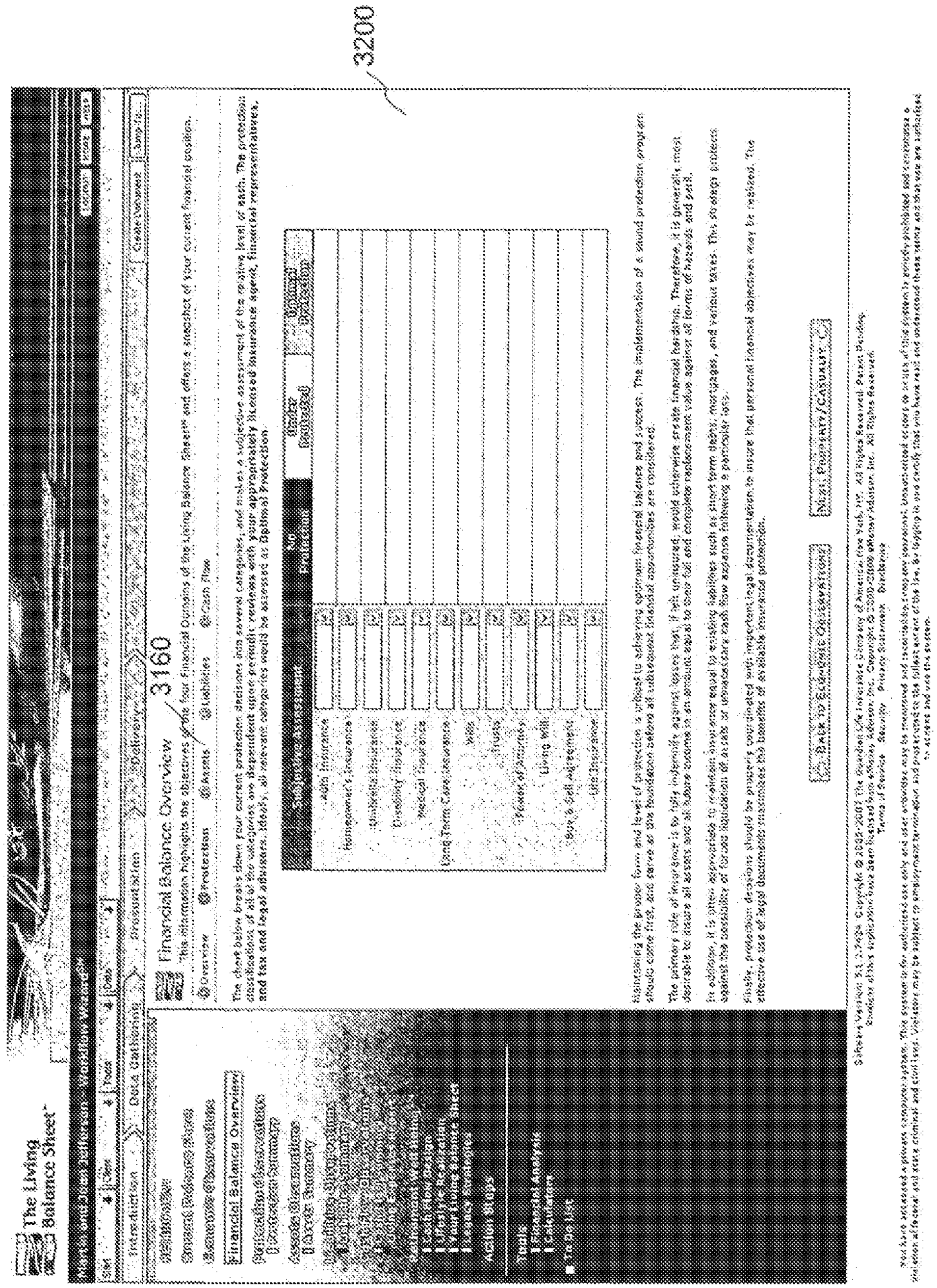

In order for a user to fully understand his/her protection, a summary chart can be provided. As shown in FIG. 329, a user can select protection option 3158. The program can process the request and, as shown in FIG. 334, page 3200 can be displayed. Page 3200 can provide a tool, the purpose and function of which are described with reference to FIGS. 130-132 discussed above.

Figure 443:
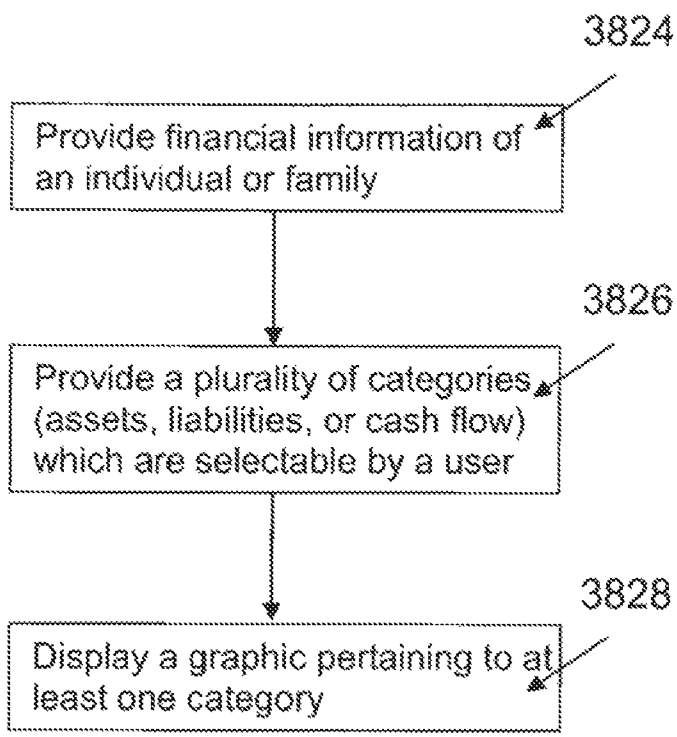

Moreover, the program can give a user tools to understand the make-up of the user's assets, liabilities and cash flow. In general, as shown in FIG. 443, financial information of an individual or family can be provided (step 3824). A plurality of categories (assets, liabilities, or cash flow) can also be provided which are selectable by a user (step 3826), and a graphic pertaining to at least one category can be displayed (step 3828), wherein the graphic can illustrate one or more subcategories related to the category based on the financial information. The graphic can include a breakdown of assets based on one of liquidity and tax status, a breakdown of liabilities based on one of interest rate and time to pay debt, or a breakdown of cash flow based on whether income is earned, unearned, guaranteed or variable.

Figure 336:
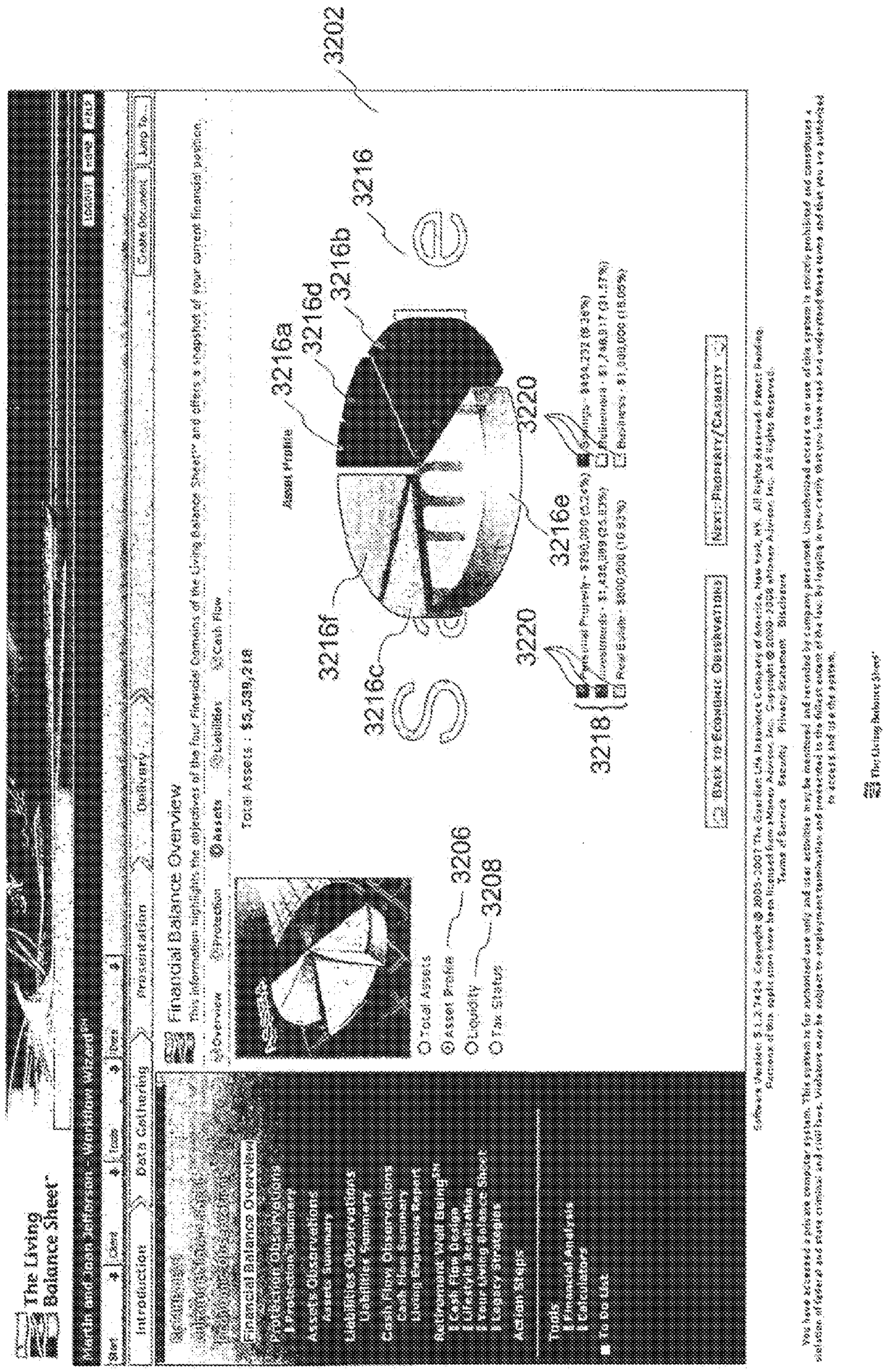

A user can select assets option 3160 as shown in FIG. 334. The program can process the request and display page 3202 as shown in FIG. 336. The page can have one or more options which can be selected by a user such as, for example, total assets option 3204, asset profile option 3206, liquidity option 3208 and tax status option 3210. If a user selects total asset option 3204, graphic 3212 can be displayed which illustrates a user's total assets. In a preferred embodiment, graphic 3212 is a pie chart; however, graphic can be a bar chart, line chart, etc. Legend 3214 can be provided and show the dollar amount and/or percentage of total assets.

Figure 335:
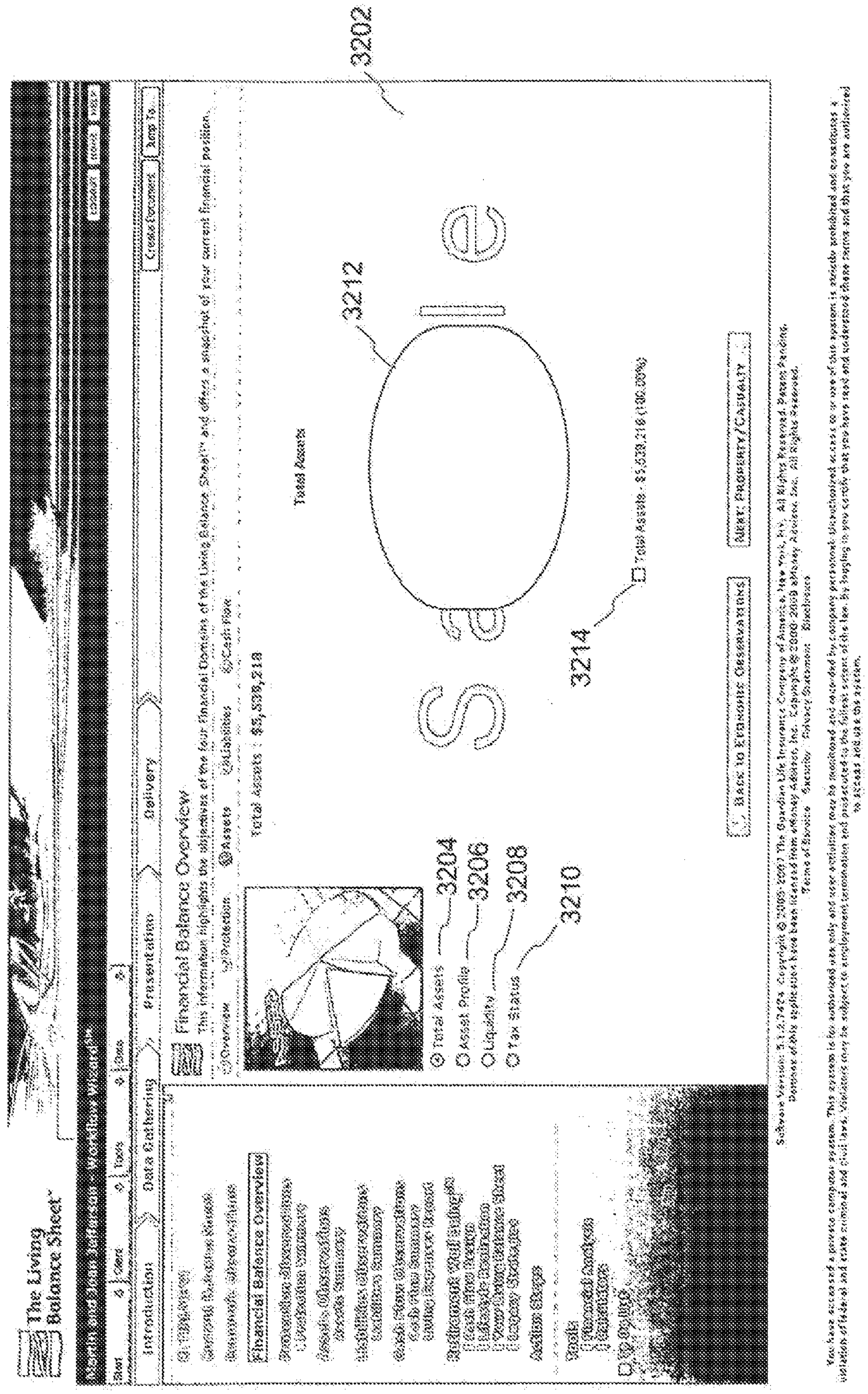

A user can select asset profile 3206 (FIG. 335). The program can process the request and, as shown in FIG. 336, graphic 3216 can be displayed on page 3202. Graphic 3216 can illustrate a breakdown of a user's assets by categories which as in other illustrations can be generated from information stored for a current client that is the subject of the tool.

In a preferred embodiment, graphic 3216 is a pie chart with different categories of assets represented by different slices of the pie chart. Legend 3218 can be provided and show the dollar amount and/or percentage of each of a user's asset. The slices can be marked on the pie chart itself or can be different colors with legend 3218 providing the user with information on which slice of the pie is related to a particular asset category. For example, legend 3218 can illustrate that personal property is represented by slice 3216*a*, investments is represented by slice 3216*b*, real estate is represented by slice 3216*c*, saving is represented by slice 3216*d*, retirement is represented by slice 3216*e*, and business is represented by slice 3216*f*. Legend 3218 can have indicia 3220 to show a user the color of the pie slice associated with the asset category.

Figure 337:
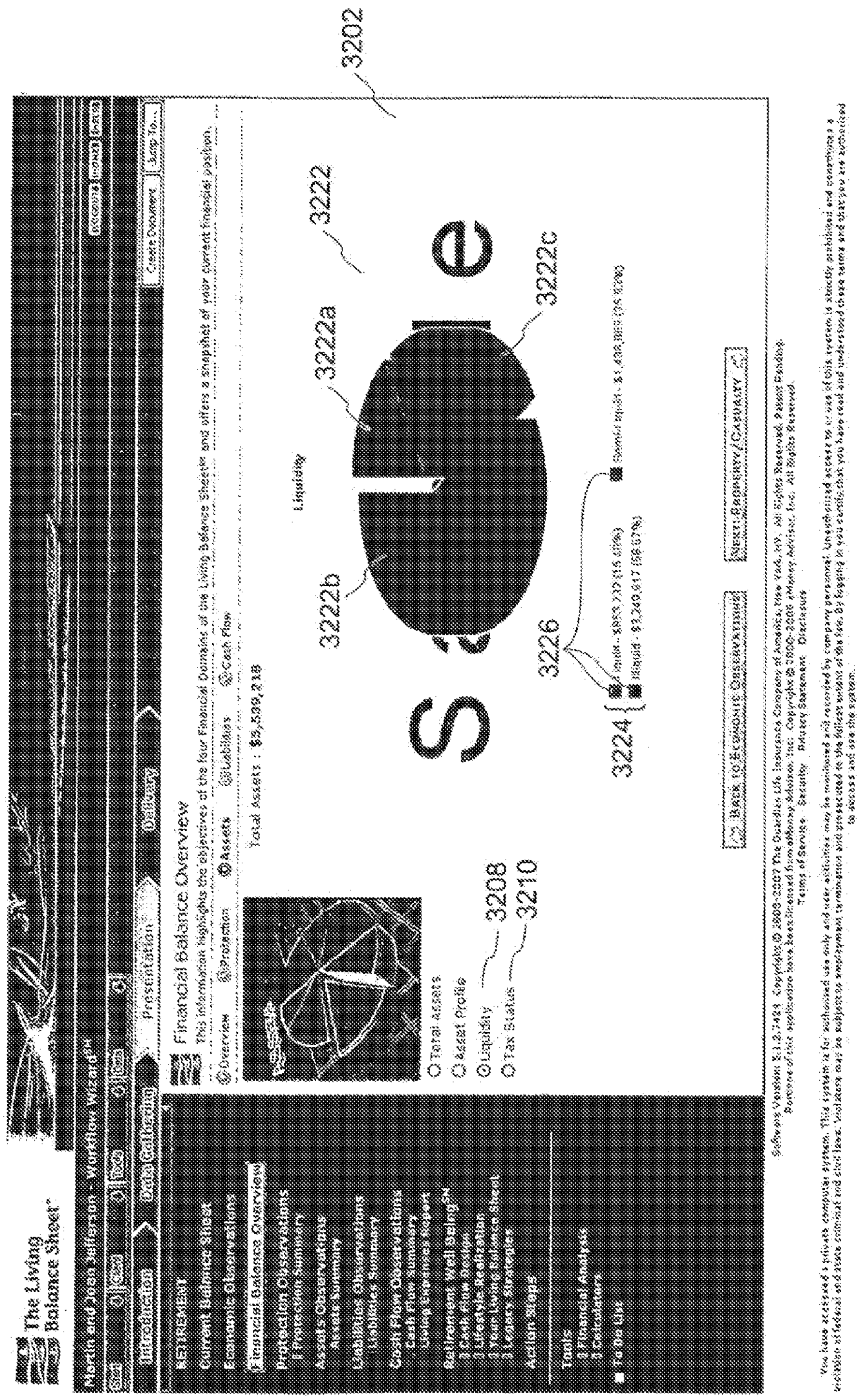

A user can select liquidity option 3208 (FIG. 336). The program can process the request and display graphic 3222 on page 3202 as shown in FIG. 337. Graphic 3222 can illustrate a breakdown of a user's assets by liquidity. In a preferred embodiment, graphic 3222 is a pie chart with different categories of asset liquidity represented by different slices of the pie chart. Legend 3224 can be provided and show the dollar amount and/or percentage of assets which are liquid, semi-liquid or illiquid. The slices can be marked on the pie chart itself or can be different colors with legend 3224 providing the user with information on which slice of the pie is related to a particular liquidity. For example, legend 3224 can illustrate that liquid (e.g., savings, CD, money market account, bonds) is represented by slice 3222*a*, illiquid (e.g., personal property, real estate, business) is represented by slice 3222*b* and semi-liquid (e.g., assets one needs to sell to create liquidity such as investments, profit sharing, 401K) is represented by slice 3222*c*. Legend 3224 can have indicia 3226 to show a user the color of the pie slice associated with the liquidity category.

Figure 338:
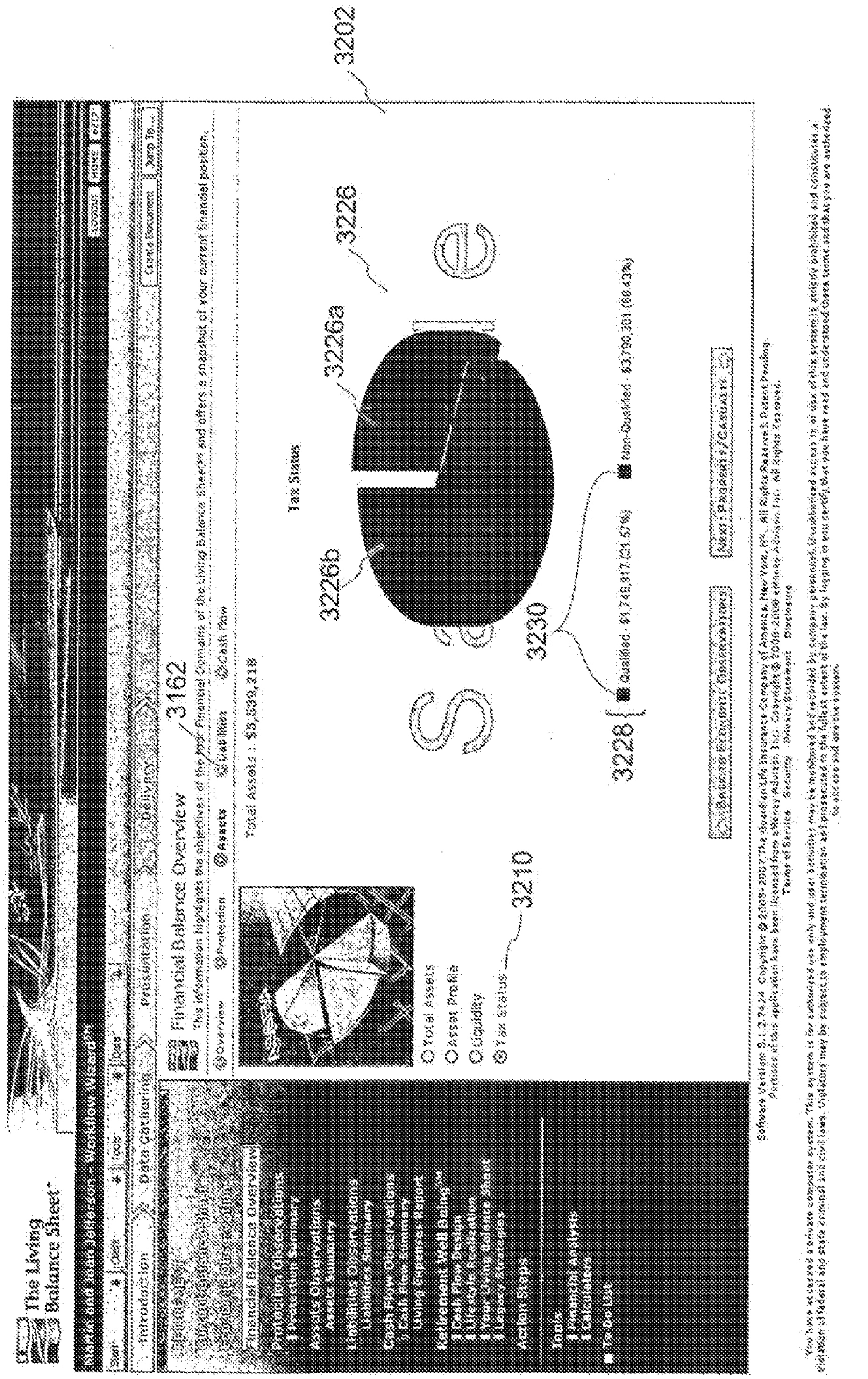

Moreover, a user can select tax status option 3210 (FIG. 337). The program can process the request and display graphic 3226 on page 3202 as shown in FIG. 338. Graphic 3226 can illustrate a breakdown of tax status of a user's assets. In a preferred embodiment, graphic 3226 is a pie chart with different categories of tax represented by different slices of the pie chart. Legend 3228 can be provided and show the dollar amount and/or percentage of assets which are taxable (qualified) and not taxable (non-qualified). Qualified assets include those assets that a user needs to qualify for in order to invest money and whose growth is tax deferred such as a pension, IRA, and 401K. Unqualified assets are those assets where tax has already been paid by the user such as CDs, mutual funds, life insurance, business, and savings. The slices can be marked on the pie chart itself or can be different colors with legend 3228 providing the user with information on which slice of the pie is related to a particular tax status. For example, legend 3228 can illustrate that qualified is represented by slice 3226*a* and non-qualified is represented by slice 3226*b*. Legend 3228 can have indicia 3230 to show a user the color of the pie slice associated with the tax status category.

Figure 339:
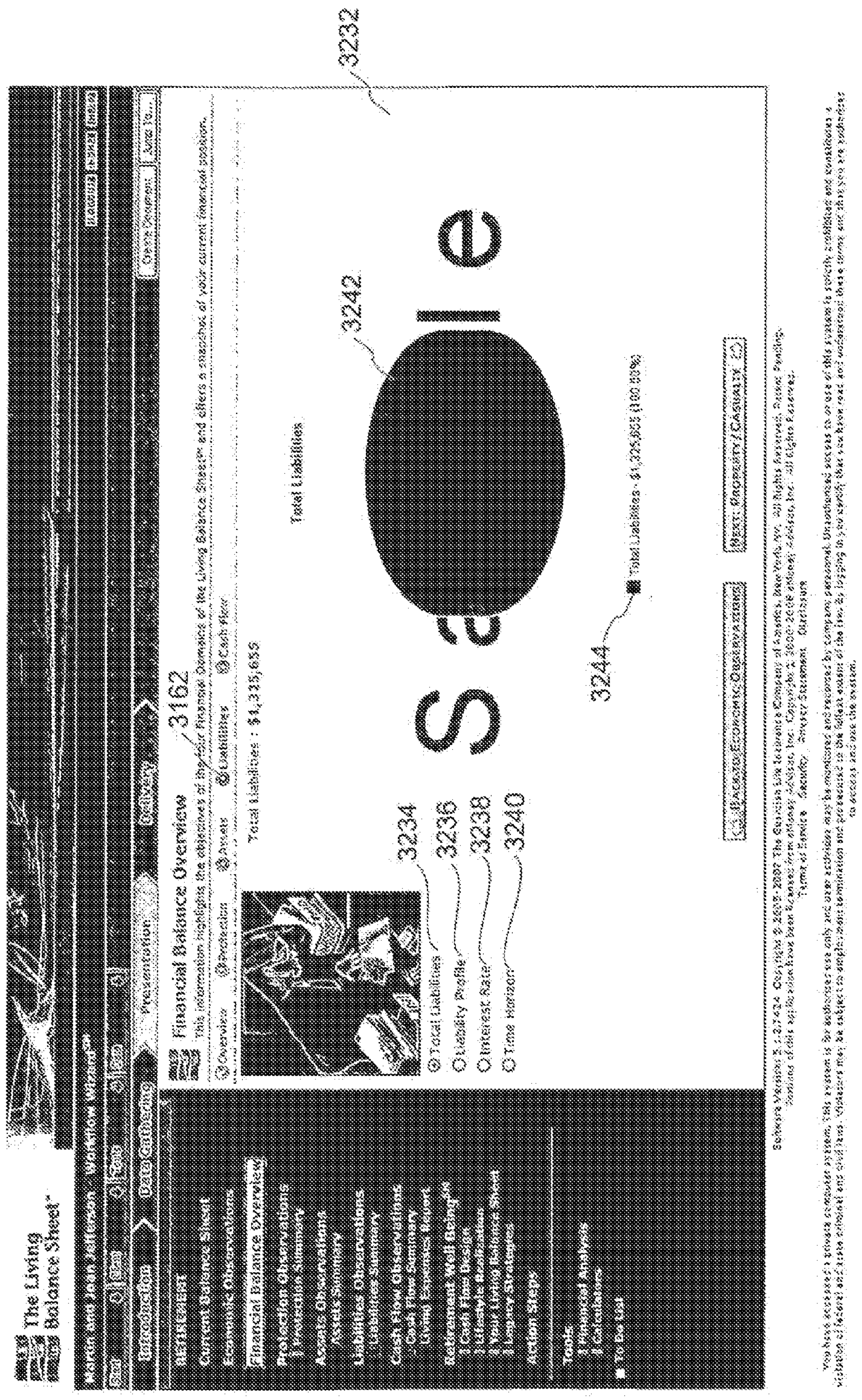

Similar to assets, the program can also provide a tool to understand the make-up of the user's liabilities. As shown in FIG. 338, a user can select liabilities option 3162. The program can process the request and display page 3232 as shown in FIG. 339. The page can have one or more options which can be selected by a user such as, for example, total liabilities option 3234, liability profile option 3236, interest rate option 3238 and time horizon option 3240. If a user selects total liabilities option 3234, graphic 3242 can be displayed which illustrates a user's total liabilities. In a preferred embodiment, graphic 3242 is a pie chart; however, graphic can be a bar chart, line chart, etc. Legend 3244 can be provided and show the dollar amount and/or percentage of total liabilities.

Figure 340:
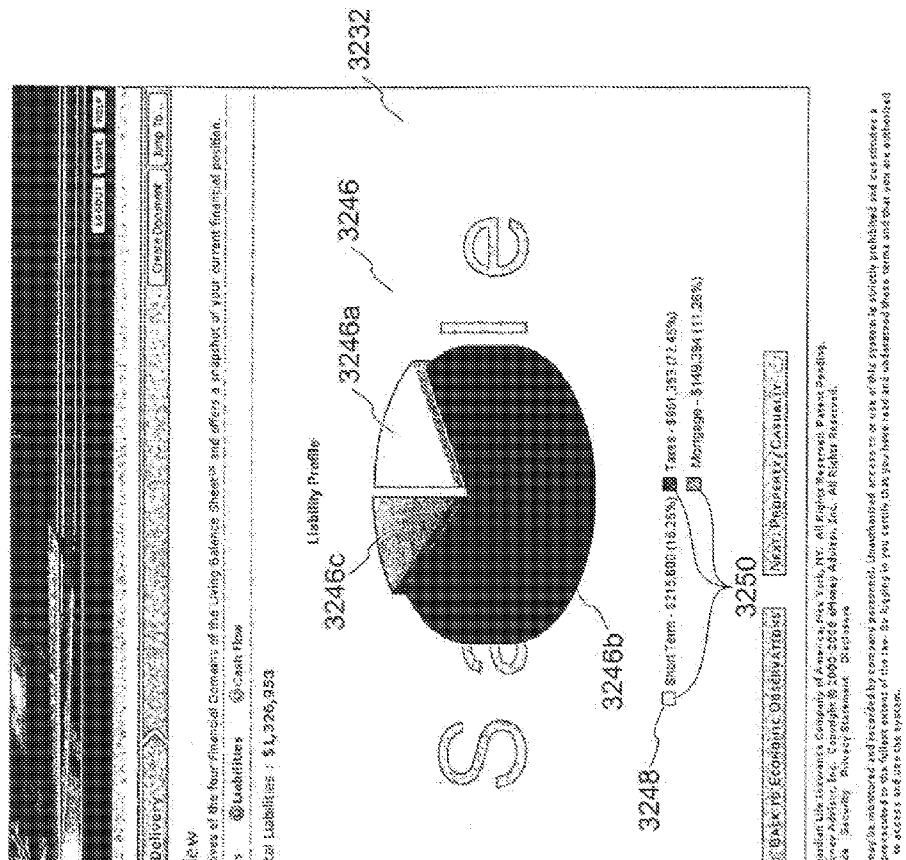

A user can select liabilities profile 3236 (FIG. 339). The program can process the request and, as shown in FIG. 340, graphic 3246 can be displayed on page 3232. Graphic 3246 can illustrate a breakdown of a user's liabilities by categories. In a preferred embodiment, graphic 3246 is a pie chart with different categories of liabilities represented by different slices of the pie chart. Legend 3248 can be provided and show the dollar amount and/or percentage of each of a user's liabilities. The slices can be marked on the pie chart itself or can be different colors with legend 3248 providing the user with information on which slice of the pie is related to a particular liability category. For example, legend 3248 can illustrate that short term liabilities are represented by slice 3246*a*, taxes are represented by slice 3246*b*, and mortgage is represented by slide 3246*c*. Legend 3248 can have indicia 3250 to show a user the color of the pie slice associated with the liability category.

Figure 341:
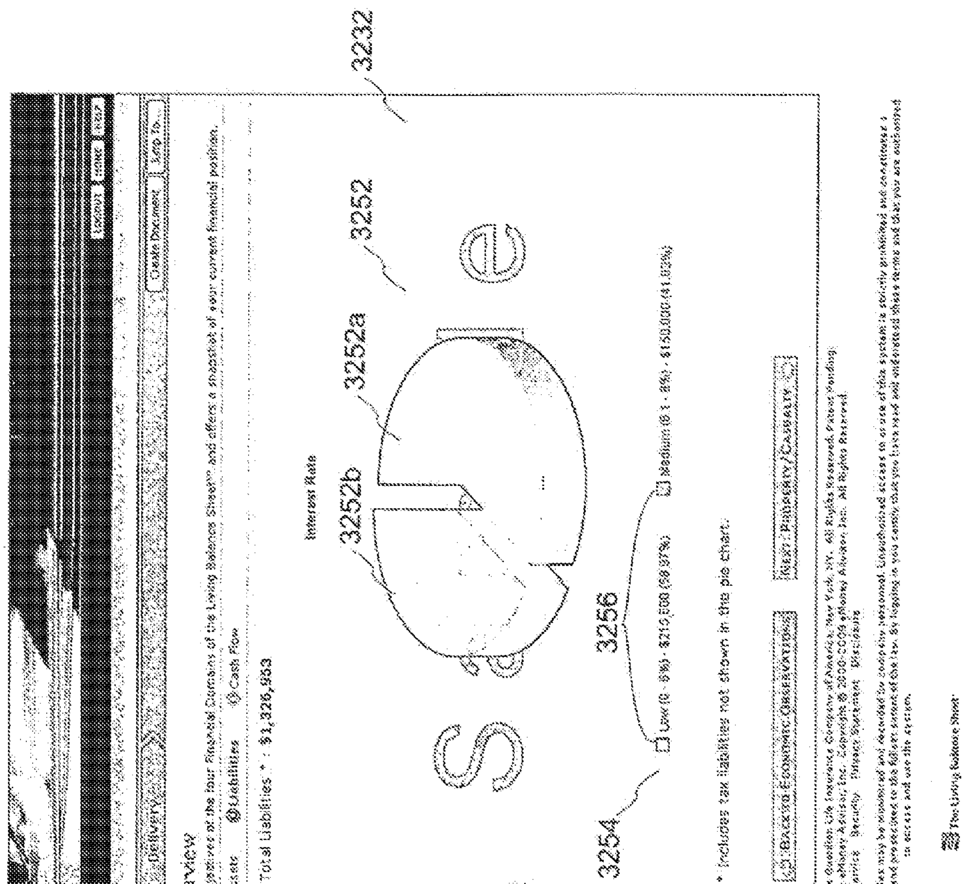

A user can also select interest rate option 3238 (FIG. 340). The program can process the request and display graphic 3252 on page 3232 as shown in FIG. 341. Graphic 3252 can illustrate a breakdown of interest rates on a user's liabilities (e.g., interest rate on credit cards, mortgages, home equity loans, car loans, etc.). In a preferred embodiment, graphic 3252 is a pie chart with different interest rates represented by different slices of the pie chart. Legend 3254 can be provided and show the dollar amount and/or percentage of liabilities at various interest rates. The slices can be marked on the pie chart itself or can be different colors with legend 3254 providing the user with information on which slice of the pie is related to a particular interest rate. For example, legend 3252 can illustrate that an interest rate of 0-6% is represented by slice 3252*a* and 6.1-8% is represented by slice 3252*b*. Legend 3254 can have indicia 3256 to show a user the color of the pie slice associated with the interest rate category.

Figure 342:
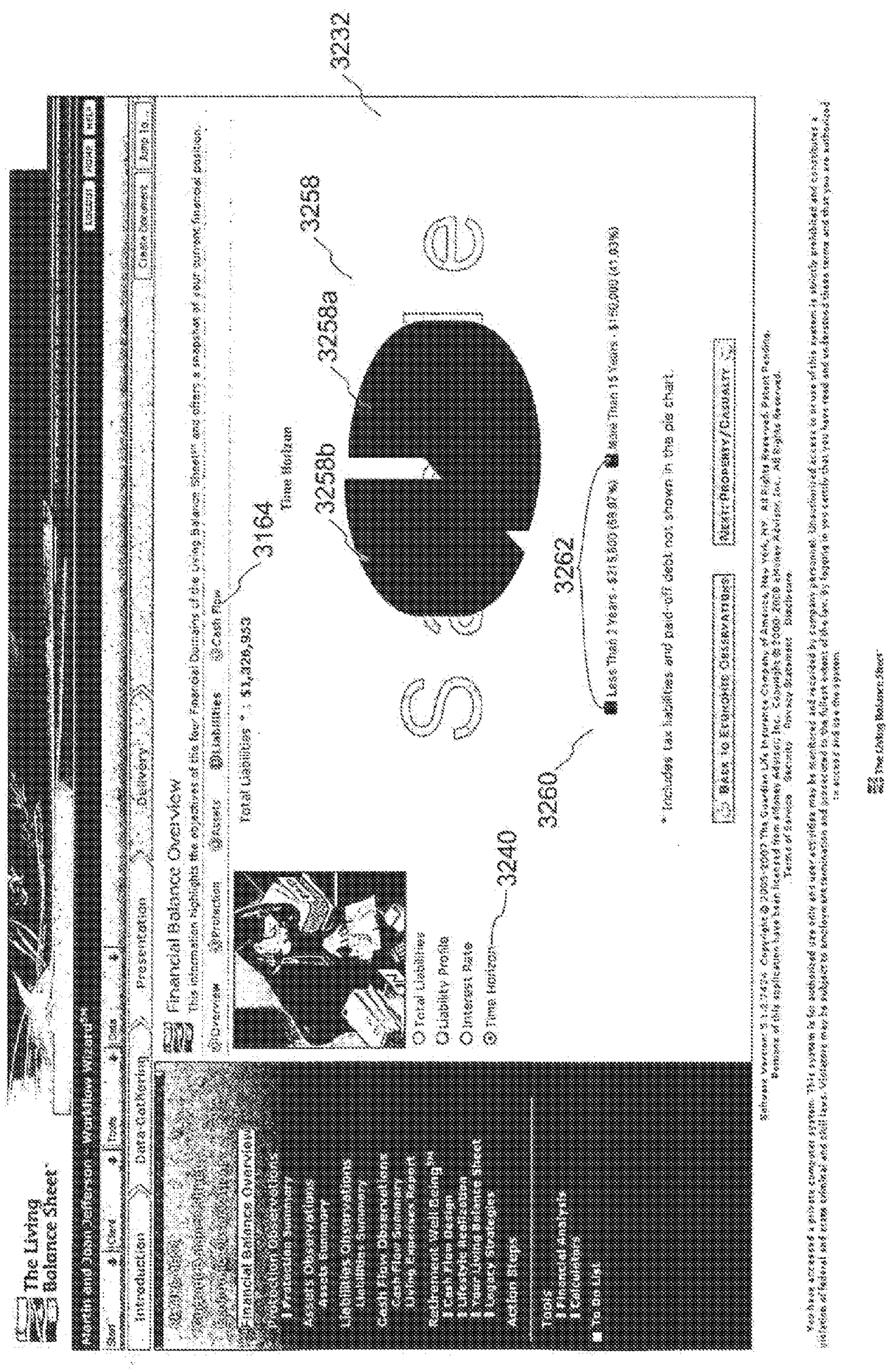

Moreover, a user can select time horizon option 3240 (FIG. 341). The program can process the request and display graphic 3258 on page 3232 as shown in FIG. 342. Graphic 3258 can illustrate a breakdown of the time period to pay back a user's liabilities (e.g., time period on a mortgage, car home, home equity line of credit, etc.). In a preferred embodiment, graphic 3258 is a pie chart which different time period for payoff represented by different slices of the pie chart. Legend 3260 can be provided and show the dollar amount and/or percentage of liabilities which are payable during a certain time period (e.g., 2-6 years, 7-15 years, more than 15 years). Liabilities can include, for example, student loans, home loans, line of credits, mortgages. The slices can be marked on the pie chart itself or can be different colors with legend 3260 providing the user with information on which slice of the pie is related to a particular time period for payoff For example, legend 3260 can illustrate that a payoff period of 2-6 years is represented by slice 3258*a* and a payoff period of more than 15 years is represented by slice 3258*b*. Legend 3260 can have indicia 3262 to show a user the color of the pie slice associated with a particular time period. It will be appreciated that while specific periods of time are shown, the graphic can have longer or short time periods of time periods starting or ending at different years (e.g., 1-4 years, 5-6 years, less than 3 years, more than 4 years, etc.).

Figure 343:
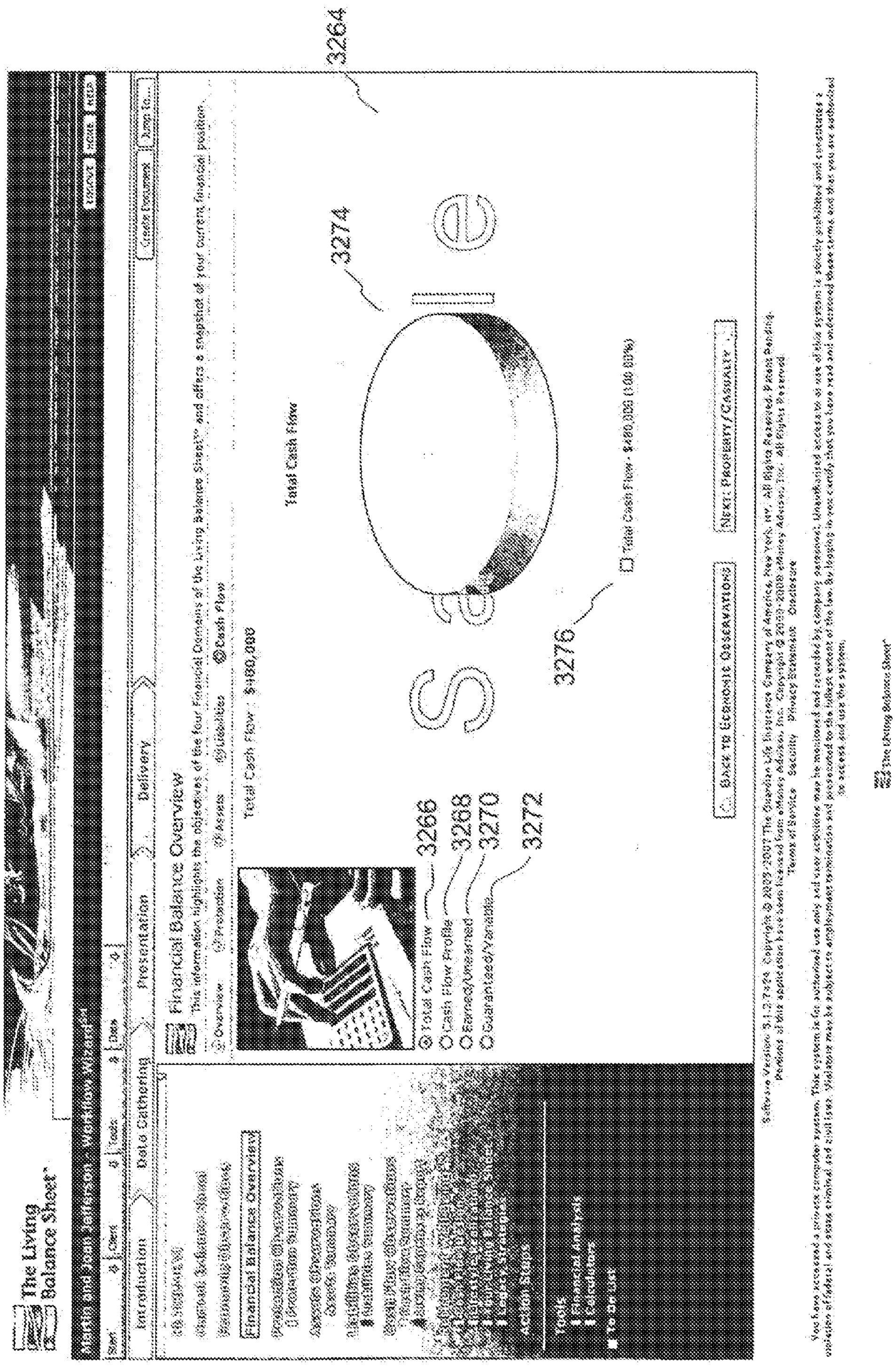

The user can also be provided with a break-down of the user's cash flow. As shown in FIG. 342, a user can select cash flow option 3164. The program can process the request and display page 3264 as shown in FIG. 343. Page 3264 can have one or more options which can be selected by a user such as, for example, total cash flow option 3266, cash flow profile option 3268, earned/unearned option 3270 and guaranteed/variable option 3272. If a user selects total cash flow option 3266, graphic 3274 can be displayed which illustrates a user's total cash flow.

Figure 344:
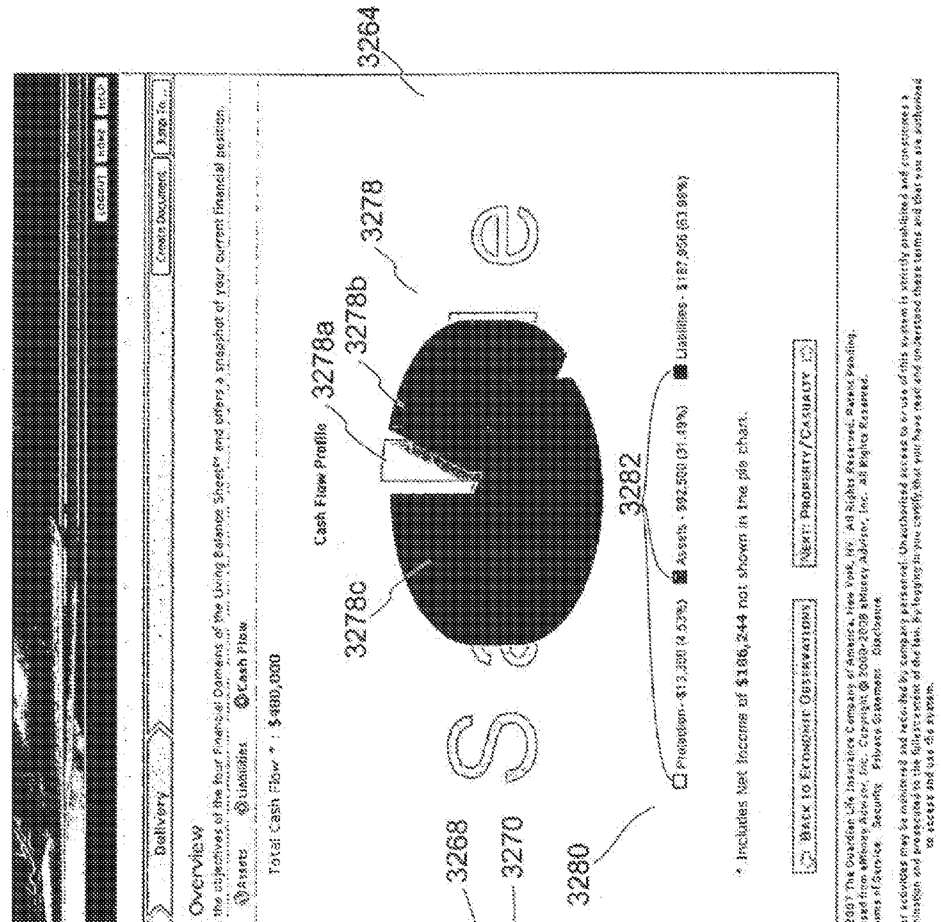

In a preferred embodiment, graphic 3274 is a pie chart; however, graphic can be a bar chart, line chart, etc. Legend 3276 can be provided and show the dollar amount and/or percentage of total cash flow. A user can also select cash flow profile option 3268 (FIG. 343). The program can process the request and, as shown in FIG. 344, graphic 3278 can be displayed on page 3264. Graphic 3278 can illustrate a breakdown of a user's cash flow by categories. In a preferred embodiment, graphic 3278 is a pie chart with different categories of cash flow represented by different slices of the pie chart. Legend 3280 can be provided and show the dollar amount and/or percentage of various cash flow of a user. The slices can be marked on the pie chart itself or can be different colors with legend 3280 providing the user with information on which slice of the pie is related to a particular cash flow category. For example, legend 3280 can illustrate that protection cash flow (i.e., the amount of money being spent on various protection such as insurance) is represented by slice 3278*a*, asset cash flow (i.e., the amount of money put into assets such as money being put into savings, stocks, mutual funds, permanent life insurance etc.) is represented by slice 3278*b*, and liability cash flow (i.e., the amount of money used to pay liabilities such as credit cards, loans, term insurance, taxes, etc.) is represented by slice 3278*c*. Legend 3280 can have indicia 3282 to show a user the color of the pie slice associated with the cash flow category.

Figure 345:
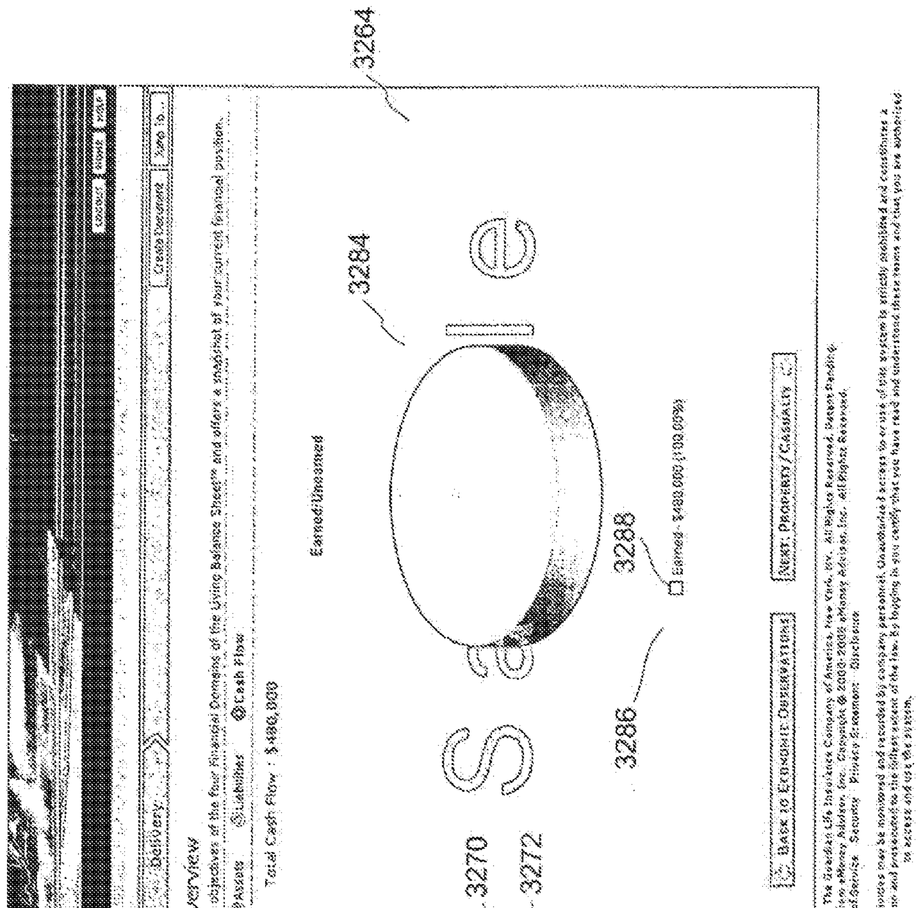

Additionally, a user can select earned/unearned option 3270 (FIG. 344). The program can process the request and display graphic 3284 on page 3264 as shown in FIG. 345. Graphic 3284 can illustrate a breakdown of earned cash flow (e.g., salary, bonus, interest income) and unearned cash flow (e.g., rental income, dividends, capital gains, annuity, pension, social security, income from a trust). In a preferred embodiment, graphic 3284 is a pie chart with earned and unearned cash flow represented by different slices of the pie chart. Legend 3286 can be provided and show the dollar amount and/or percentage of earned cash flow and unearned cash flow. The slices can be marked on the pie chart itself or can be different colors with legend 3286 providing the user with information on which slice of the pie is related to earned cash flow and unearned cash flow. For example, legend 3286 can illustrate that earned cash flow is represented by slice 3284 and unearned cash flow is represented by a slice (not shown). Legend 3286 can have indicia 3288 to show a user the color of the slice associated with the cash flow category. It will be appreciated that in certain scenarios, such as shown in FIG. 345, there may only be earned cash flow (or only unearned cash flow). In such a scenario, graphic 3284 and legend 3286 will only show a single category of cash flow (i.e., either earned or unearned cash flow).

Figure 346:
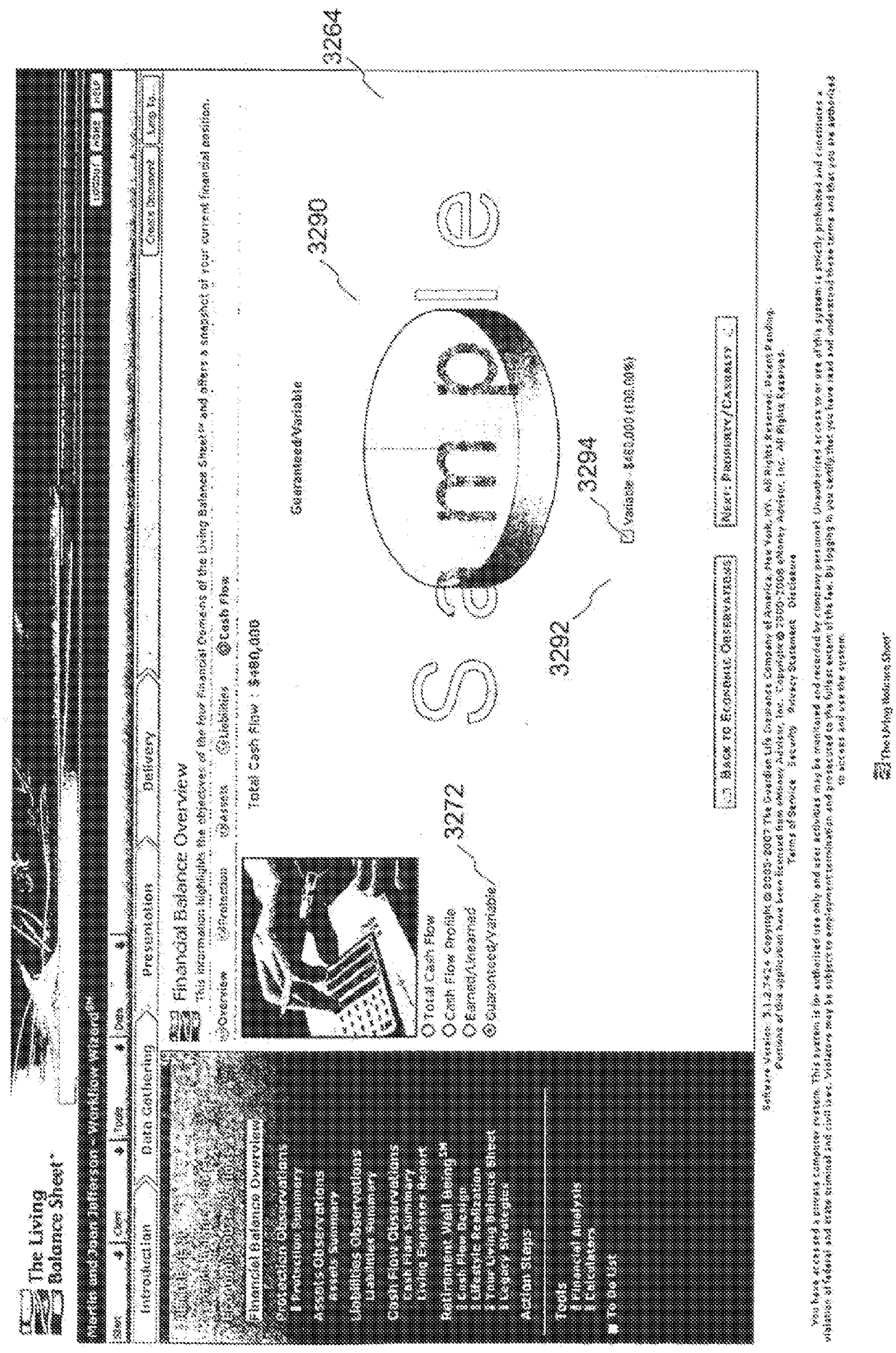

A user can also select guaranteed/variable option 3272 (FIG. 345). The program can process the request and display graphic 3290 on page 3264 as shown in FIG. 346. Graphic 3290 can illustrate guaranteed cash flow (e.g., defined benefit plan (pension), social security, guaranteed annuity, deferred compensation) and variable cash flow (e.g., interest income, variable annuity, asset allocated money (dividends; interest on savings, stocks, mutual funds)). In a preferred embodiment, graphic 3290 is a pie chart with guaranteed cash flow and variable cash flow represented by different slices of the pie chart. Legend 3292 can be provided and show the dollar amount and/or percentage of cash flow which is guaranteed and variable. The slices can be marked on the pie chart itself or can be different colors with legend 3292 providing the user with information on which slice of the pie is related to guaranteed cash flow and which slice is related to variable cash flow. For example, legend 3294 can illustrate that guaranteed cash flow is represented by slice 3290 and variable cash flow is represented by a slice (not shown). Legend 3290 can have indicia 3294 to show a user the color of the pie slice associated with guaranteed or variable cash flow. It will be appreciated that in certain scenarios, such as shown in FIG. 346, there may only be guaranteed cash flow (or only variable cash flow). In such a scenario, graphic 3290 and legend 3292 will only show a single category of cash flow (i.e., either guaranteed or variable cash flow).

Figure 444:
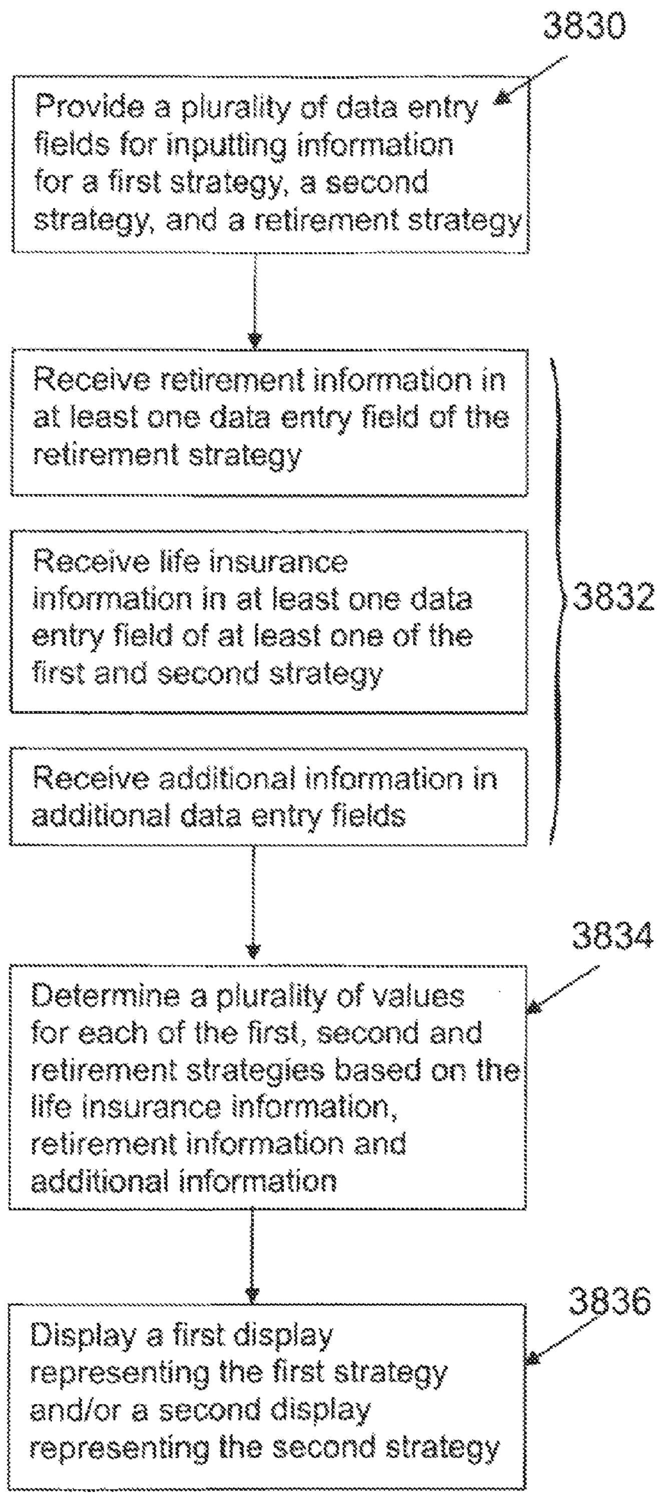

A user can be provided with specific tools for understanding his/her income and lifestyle during retirement as well as estate planning after death. In general, as shown in FIG. 444, a plurality of data entry fields can be provided for inputting information for a first strategy, a second strategy, and a retirement strategy (step 3830). Retirement information can be received in at least one data entry field of the retirement strategy, life insurance information can be received in at least one data entry field of at least one of the first and second strategy, and additional information can be received in additional data entry fields (step 3832). Based on the life insurance information, retirement information and additional information, a plurality of values can be determined for each of the first, second and retirement strategies (step 3834). A first display representing the first strategy and/or a second display representing the second strategy can be displayed (step 3836). The display can include information pertaining to the retirement strategy and can be a graph, a chart or a table.

Figure 347:
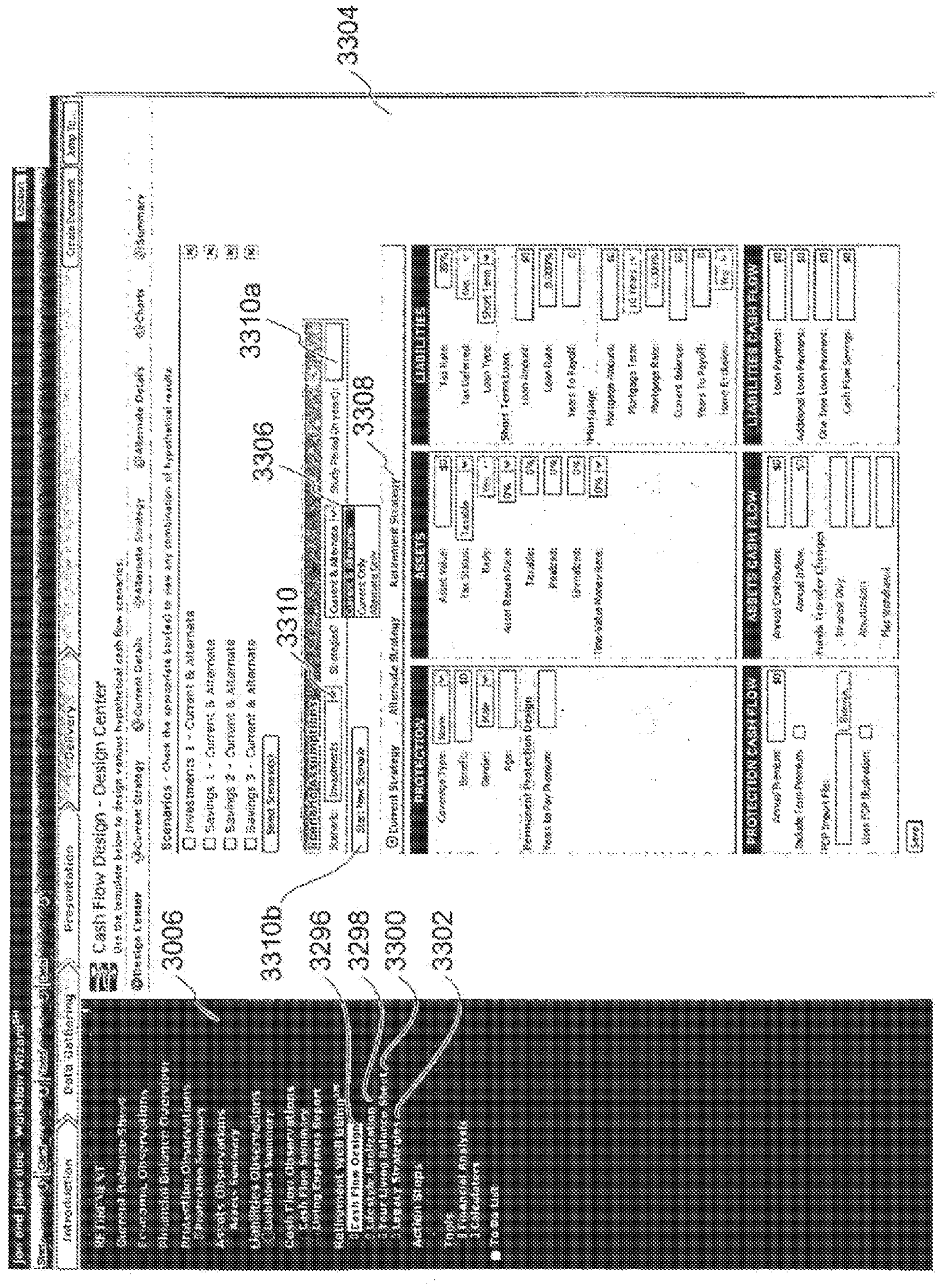
Figure 348:
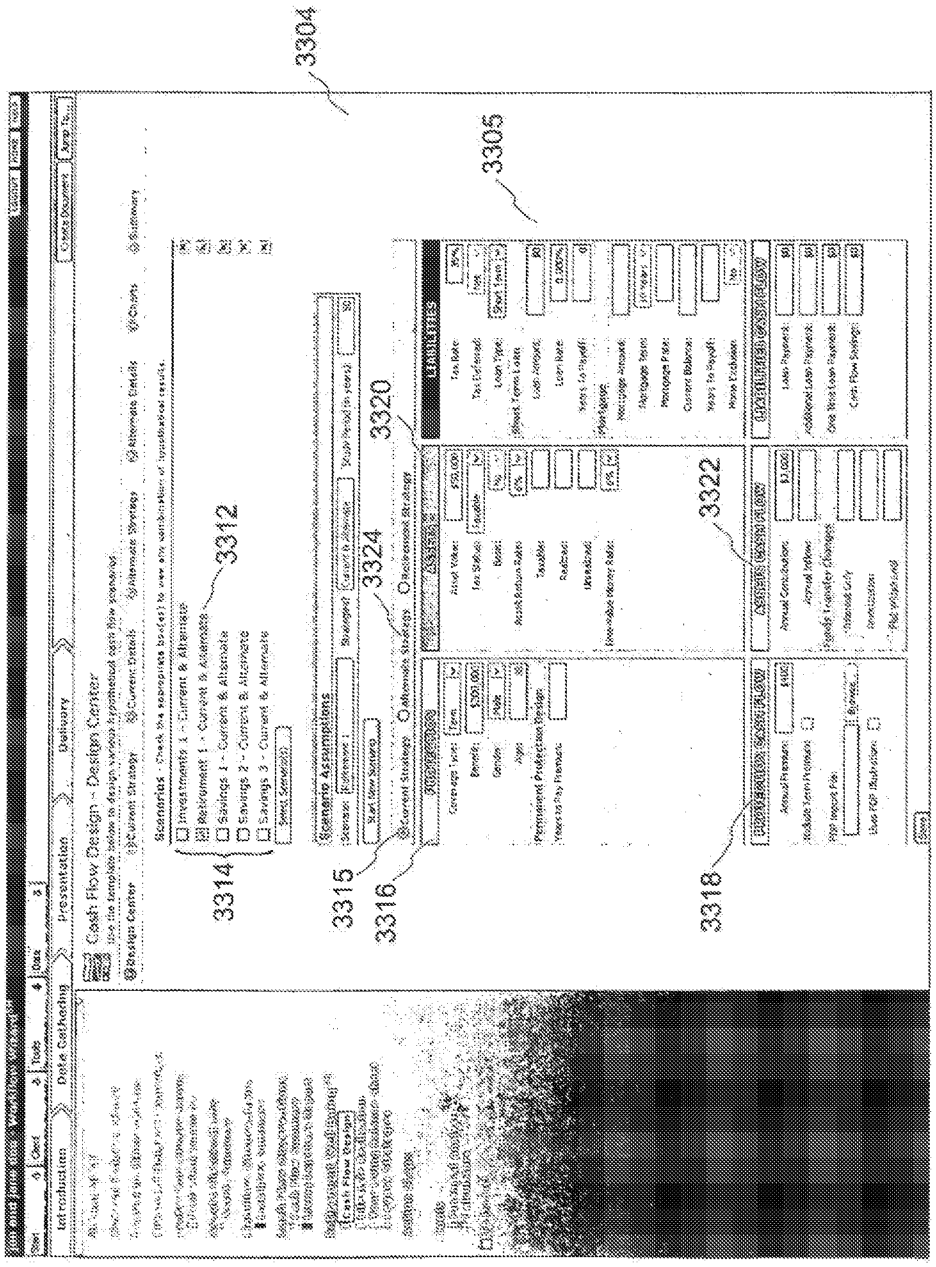

As shown in FIG. 347, list of options field 3006 can provide a Retirement Well Being® category having one or more links such as cash flow design link 3296, lifestyle realization link 3298, Your Living Balance Sheet® link 3300 and legacy strategies link 3302. Each link provides a user with tool(s) that can assist a user (who is approaching retirement, at retirement or just retired) to understand his/her lifestyle or financial condition during retirement. One tool shows a user his/her strategies for maximizing retirement income and provide for the user's legacy. If a user chooses cash flow design link 3296, the program can process the request and, as shown in FIG. 348, display cash flow design page 3304. Cash flow design page 3304 functions similarly to cash flow design page 2250 described in FIGS. 246-248 in that it enables a user to input information related to the four interdependent domains or categories—protection, assets, liabilities and cash flow—and to analyze and compare an unlimited number of strategies based on the inputted information. Moreover, cash flow design page allows a user to make assumptions which drives the monetary amounts in Your Living Balance Sheet® page, discussed below.

Cash flow design page 3304 can provide a user with a selection of a particular strategy to be analyzed. For example, page 3304 can have drop-down menu 3306 that allows a user to select current & alternate strategies, current strategy only or alternate strategy only. In this way, a user can analyze current and alternate strategies separately from each other. With cash flow design page 3304, if a user selects "alternate only" from menu 3306, most (if not all) data entry fields in the alternate strategy can receive information inputted by a user. In addition to current and alternate strategies, cash flow design page 3304 can also provide a user with a retirement strategy option 3308.

In particular, the cash flow design page can provide a user with the ability to create different retirement scenario to understand the user's income during retirement (i.e., after accumulation). Upon choosing a scenario from a drop down menu 3310 (e.g., retirement), selecting a strategies setting 3306 (e.g., current & alternate strategy) and study period 3310*a*, and clicking on Start New Scenario button 3310*b* (FIG. 347), "Retirement 1" scenario 3312 can appear in area 3314. The program can process the request and display page 3304 with current strategy chart 3305 as shown in FIG. 348 such that current & alternate strategy is fixed. A user can select current strategy option 3315 and enter various assumptions/information in the data entry fields in the various categories (protection, assets, liabilities, cash flow). For example, in protection category 3316, the user can input term life insurance with a $200,000 death benefit, male gender and current age of 35. In protection cash flow category 3318, the user can enter a life insurance premium of $400 per year. In assets category 3320, the user can enter an asset value of $50,000 which is taxable, a 6% asset return rate (interest rate), and a time-value of money rate of 6%. In assets cash flow category 3322, the user can enter an annual contribution to assets of $3000 (e.g., the amount of money a user puts into savings each year).

Figure 349:
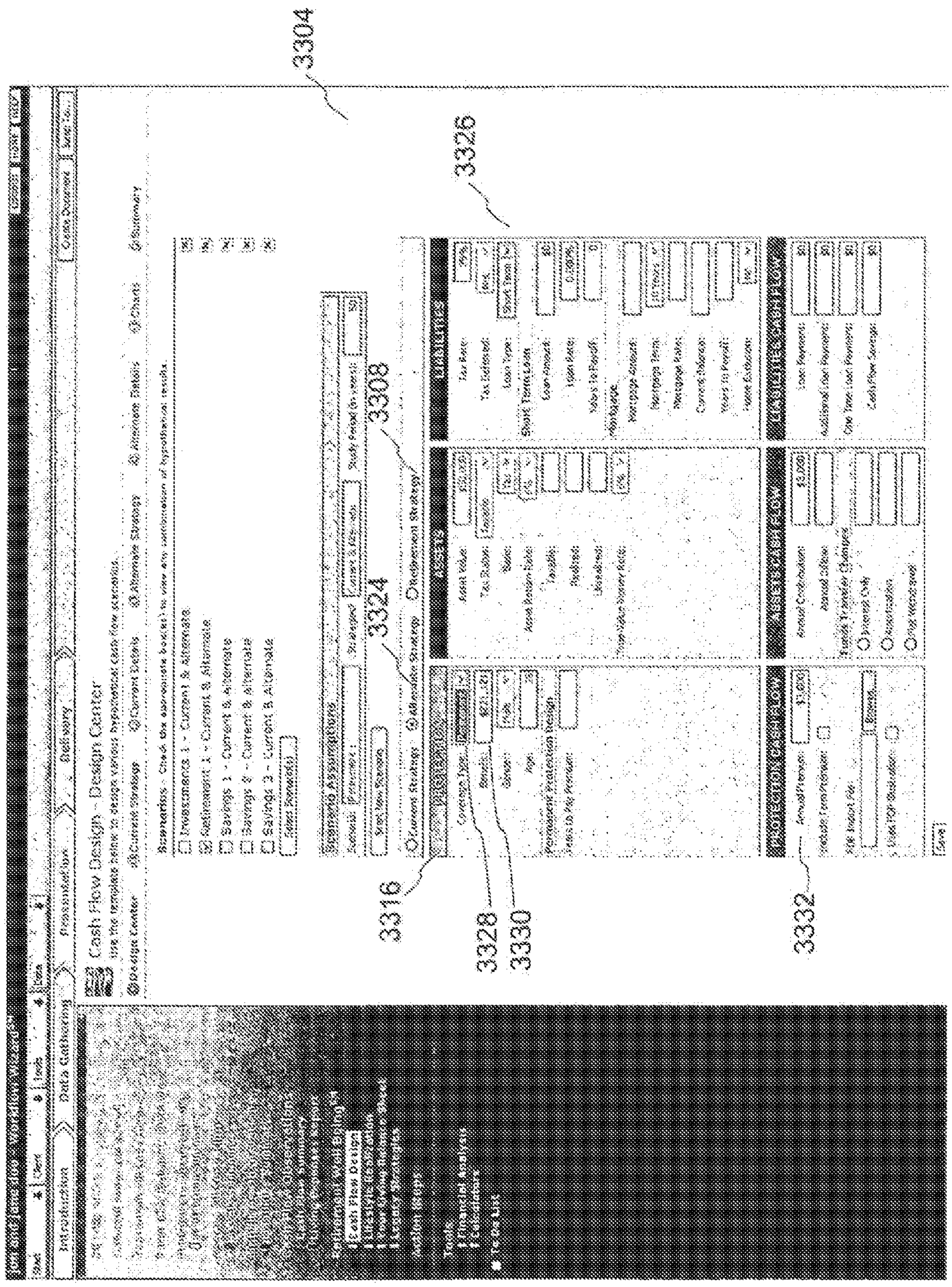
Figure 350:
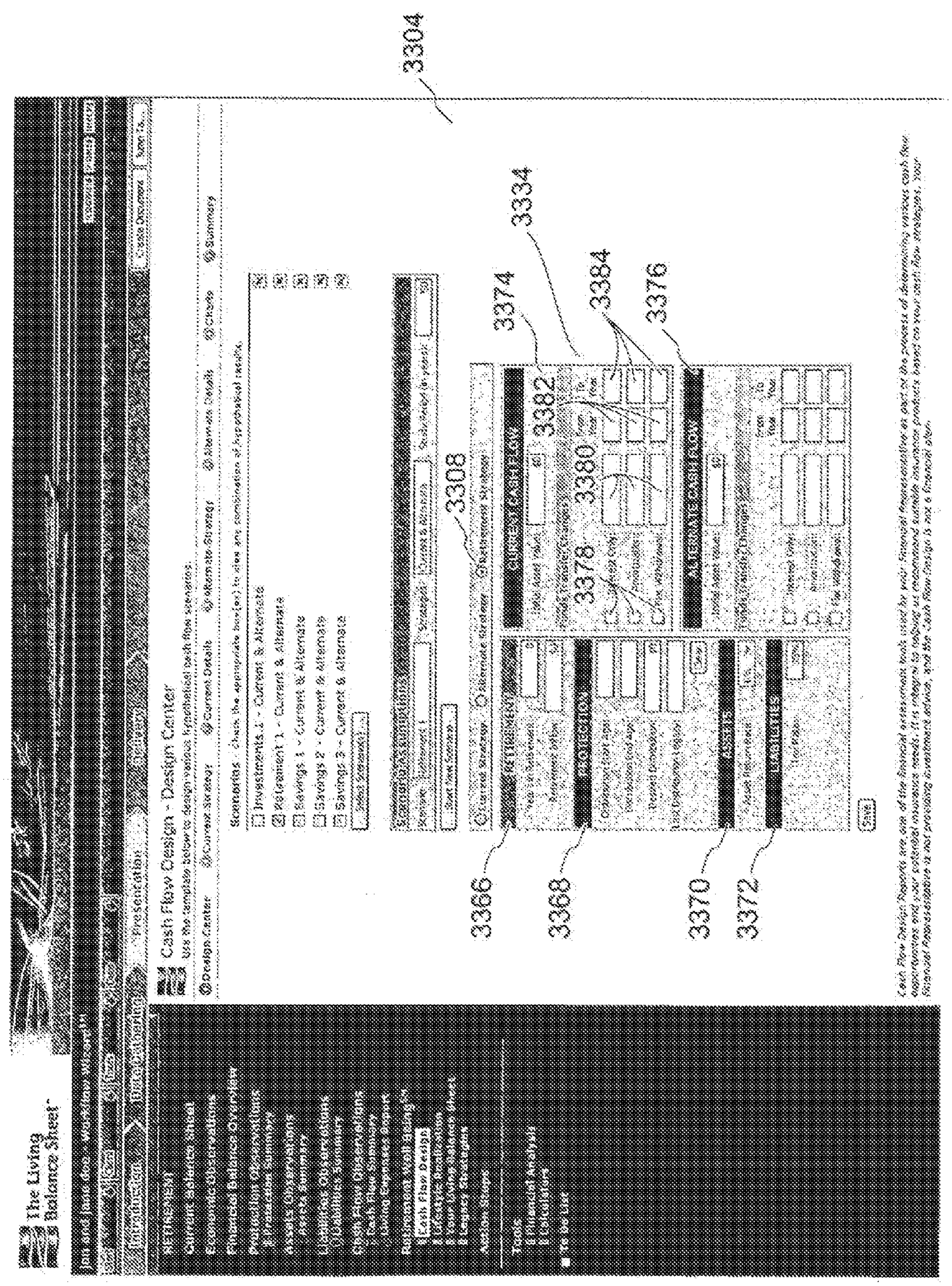

Thereafter, a user can select alternate strategy option 3324 (FIG. 348). The program can process the request and, as shown in FIG. 349, display alternate strategy chart 3326 on page 3304. A drop-down menu 3328 can be provided in protection category 3316 and a user can select "permanent" (life insurance). Based on information entered in the current strategy, the death benefit of life insurance can be automatically populated in data entry field 3330. In particular, the $3,000 annual contribution entered in asset cash flow category 3322 of FIG. 348 can be used to pay the annual life insurance premium rather than being saved. In particular, data entry field 3332 will show an annual premium of $3,000 which will buy a user permanent life insurance with a death benefit of $221,121. Upon filling in alternate strategy chart 3326, a user can select retirement strategy option 3308. In response to the selection of option 3308 in FIG. 349, retirement strategy chart 3334 can be displayed on page 3304 as shown in FIG. 350.

Retirement strategy chart 3334 can have data entry fields for inputting information about retirement as well as the four interdependent domains or categories—protection, assets, liabilities and cash flow. Specifically, chart 3334 can have retirement section 3366, protection section 3368, asset section 3370, liabilities section 3372, current cash flow section 3374 and alternate cash flow section 3376. Retirement section 3366 can have one or more fields for entering, for example, an estimated number of years in retirement and retirement inflow (i.e., the amount of money a user will be earning during retirement from social security, pension, part time job, income from a trust, etc.). Protection section 3368 can have one or more fields for entering, for example, distribution starting age (i.e., age when money will be taken out of assets for retirement income), distribution end age (i.e., age when money will stop being taken out of assets for retirement income such as the expected age at death), desired distribution (i.e., the amount of money/income a person desires/needs each year during retirement to maintain a certain lifestyle), and last distribution legacy (i.e., the amount death benefit left over to be distributed to a user's legacy). Assets section 3370 can have one or more fields for entering, for example, asset return rate or interest rate (which may be populated by information entering in the current strategy chart 3305). Liabilities section 3372 can have one or more fields for entering, for example, income tax rate (which may be populated by information previously entered by a user). Current cash flow section 3374 and alternate cash flow section 3376 can have one or more fields for receiving, for example, initial asset value (i.e., the value of assets at retirement) as well as fund transfer changes such as interest only transfer (income derived only from interest), amortization (income derived from depleting assets to $0), and flat withdrawal (a fixed amount of income taken from assets such as a savings account). It should be noted that initial asset value can be calculated by the program and automatically populated in the initial asset value field. While sections 3374 and 3376 are shown as having the same type and number of data entry fields, it will be appreciated that these section 3374 and 3376 can have different types and numbers of data entry fields.

Sections 3374 and 3376 can be provided to enable a user to compare different retirement strategies. Each fund transfer change can have area 3378 for selecting the particular fund transfer change, area 3380 for receiving a monetary value, area 3382 for inputting a starting age of income being paid to a user during retirement, and area 3384 for inputting an end age of income being paid to a user during retirement. In the event that an amount of money has been inputted for a particular fund transfer change, an indicia (e.g., check mark) can be placed in area 3378 by the program. While separate areas 3382 and 3384 can be used, in an alternative embodiment a single area may be provided for entering a number of years that income will be paid (as opposed to a start and end age). One or more of areas 3380 can be automatically populated by entering information in areas 3382, 3384. For example, entering the start and end years for amortization, can result in a yearly amortized amount appearing in area 3380. In another embodiment, one or more areas 3378 can be automatically populated with a checkmark by entering information in areas 3380, 3382 or 3384. For example, entering an amount for flat withdrawal in area 3380 can cause a checkmark to appear in area 3378.

Figure 351:
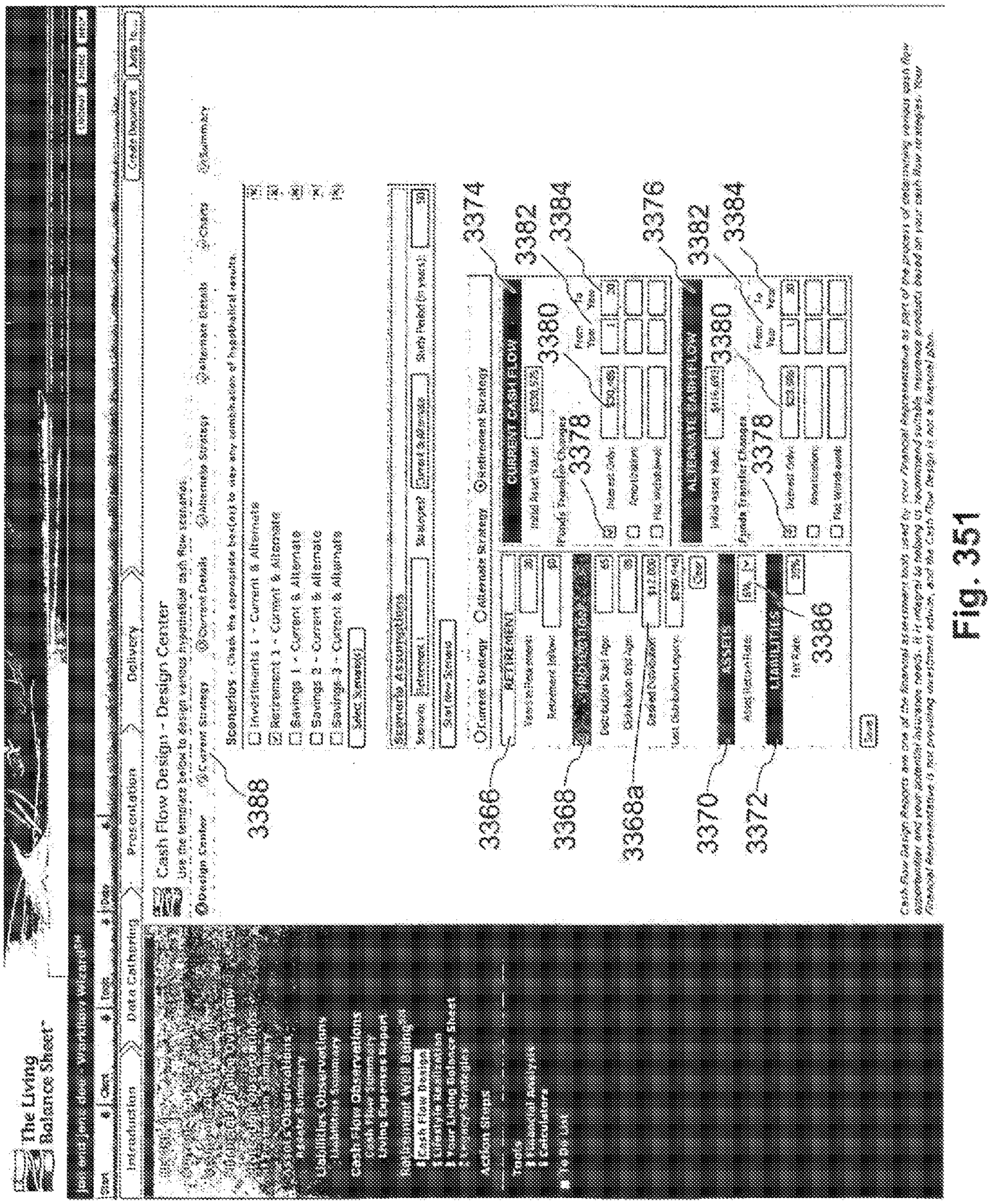

FIG. 351 illustrates an exemplary embodiment where a user has inputted 20 years of retirement in section 3366; and a distribution start age of 65, a distribution end age of 85, and a desired distribution of $12,000 in field 3368*a* in section 3368. Based on the inputted information, the program can automatically calculate the last distribution legacy which, in this case, is $289,940. A drop-down menu 3386 can be provided in the assets section 3370 so that a user can select an asset return rate which, in this scenario, is 6%. An income tax rate of 35% can be inputted in liabilities section 3372. The initial asset value for the current strategy can be automatically calculated to be $538,575 by the program and entered in the current cash flow section 3374. A user can select area 3378 next to interest only. The program can calculate the interest value to be $30,485 and can enter the amount in area 3380. A user can input interest only fund transfer change from year 1 to 20 by entering "1" in area 3382 and "20" in area 3384. Moreover, the initial asset value for the alternate strategy can be automatically calculated to be $416,693 by the program and entered in the alternate cash flow section 3376. A user can select area 3378 next to interest only. The program can calculate the interest value to be $23,586 and can enter the amount in area 3380. A user can input interest only fund transfer change from year 1 to 20 by entering "1" in area 3382 and "20" in area 3384.

Figure 352:
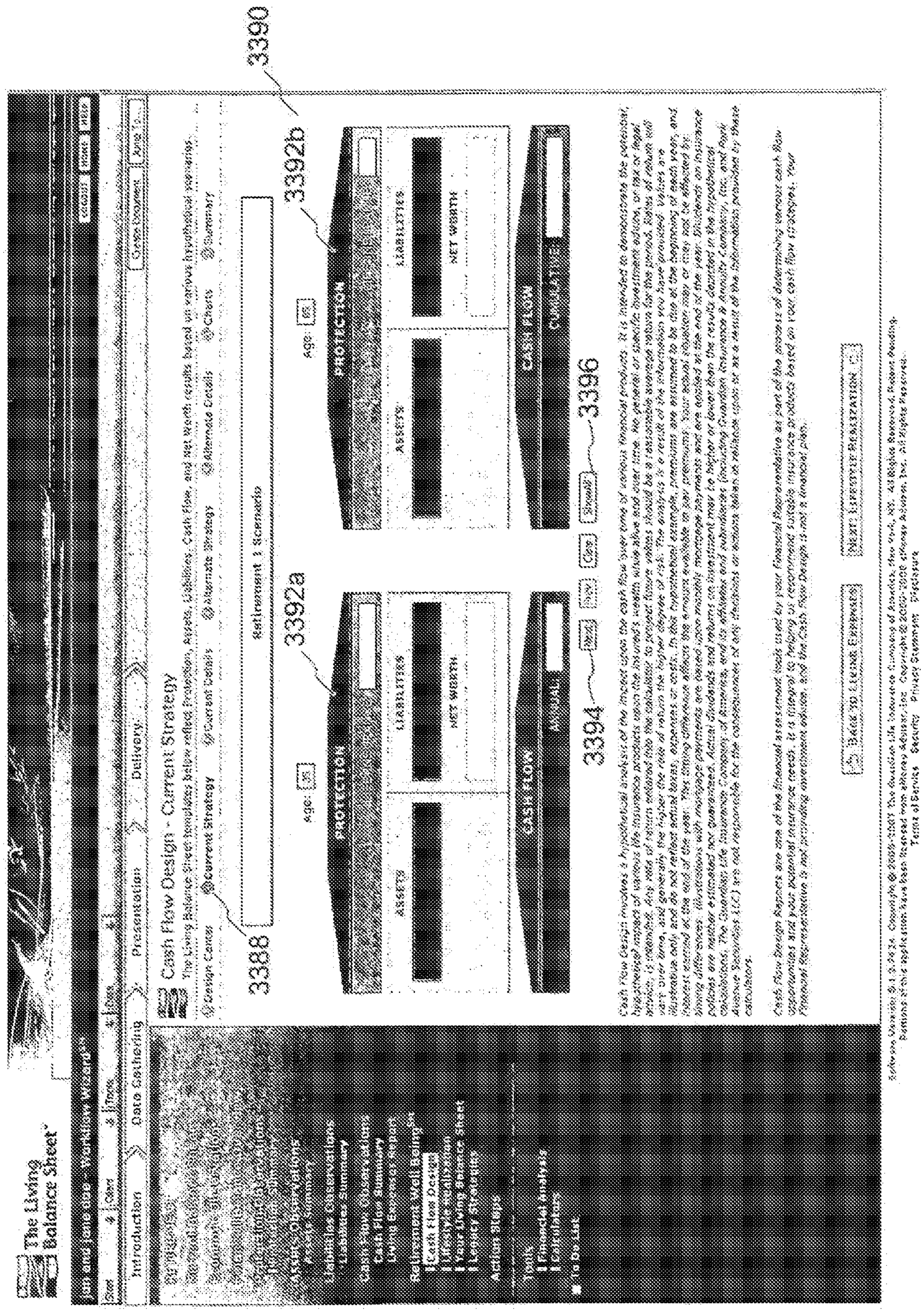
Figure 353:
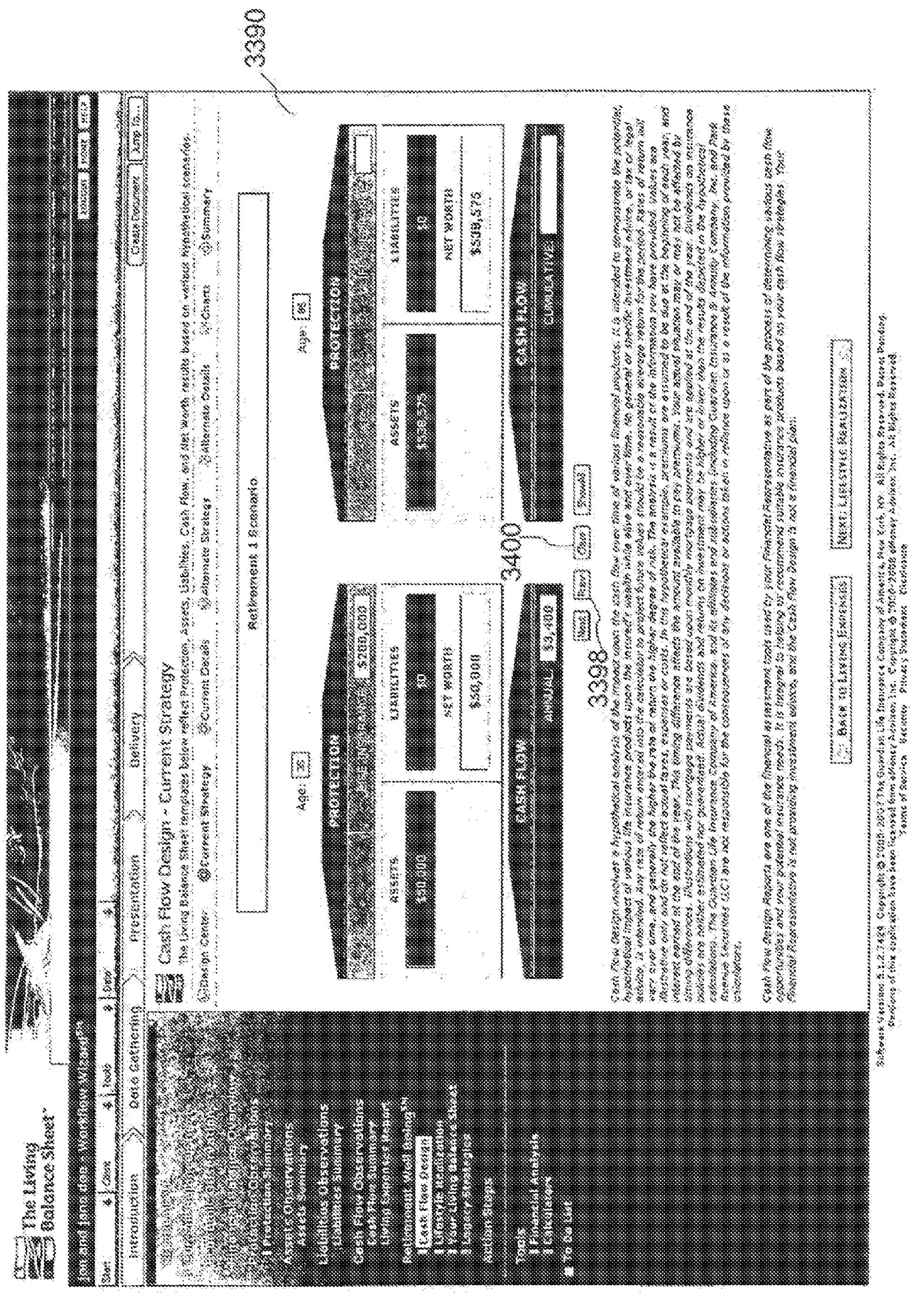
Figure 354:
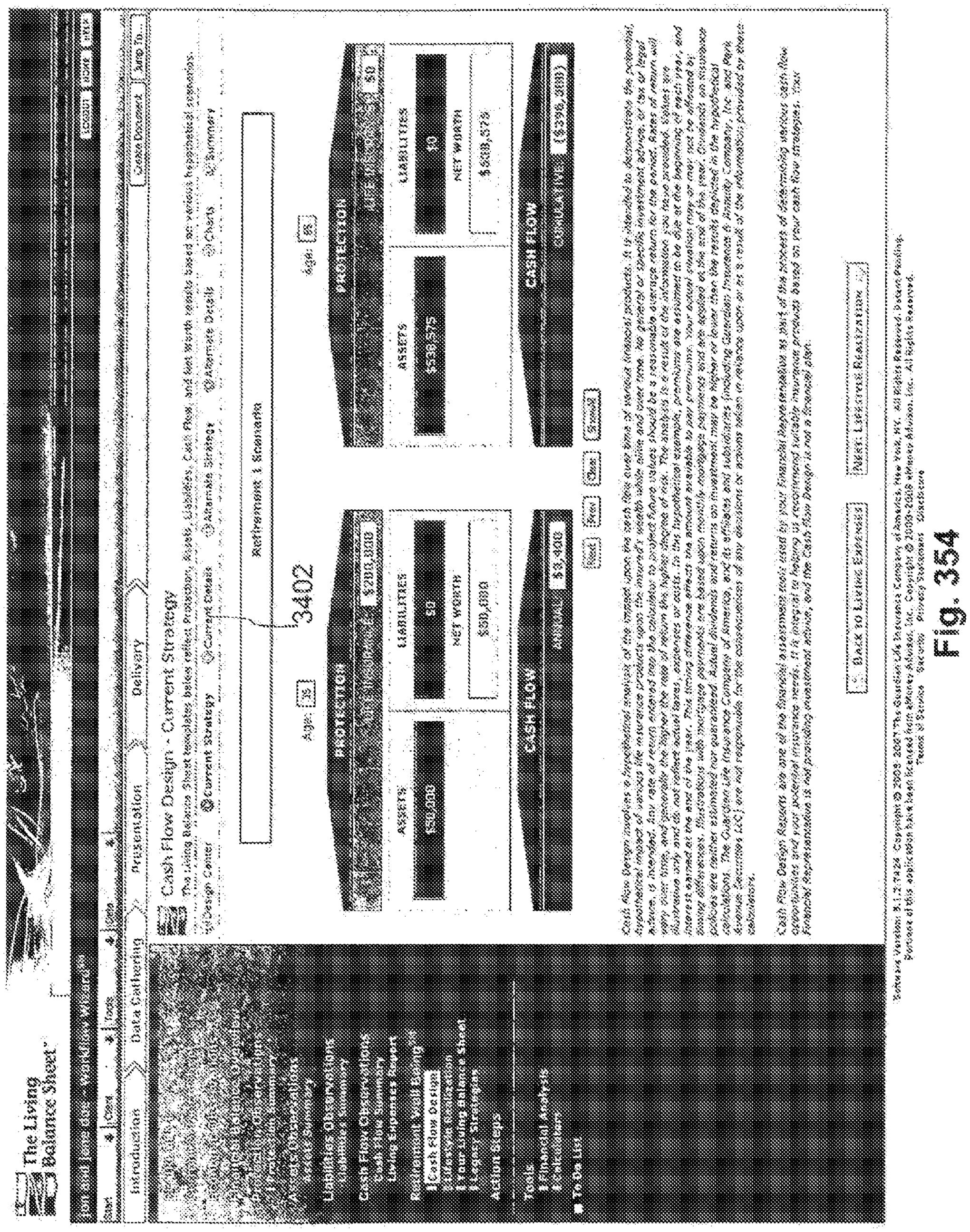

Once information for the current, alternate and retirement strategy have been entered and saved, a user can select current strategy option 3388 of FIG. 351. The program can process the request and, as shown in FIG. 352, can display diagrams 3392*a*, 3392*b* on current strategy page 3390. Diagram can display information about the current strategy at year 35 (age at beginning of the study period) and at year 85 (age at end of the study period (e.g., death)). The various fields in diagrams 3392*a*, 3392*b* can be blank as shown in FIG. 352, partially filled such as in FIG. 353 or completely filled as in FIG. 354. Diagrams 3392*a*, 3392*b* can show net worth as well as the four interdependent domains or categories—protection, assets, liabilities and cash flow. Monetary values for net worth, protection, assets, liabilities and cash flow can also be presented. If one or more fields of diagrams 3392*a*, 3392*b* are blank, a user can select a button such as "next" button 3394. Each time a user clicks or selects next button 3394, one or more fields of diagrams 3392*a*, 3392*b* can be populated with information such as monetary values. In addition, page 3390 can have another button such as "showall" button 3396. When a user clicks or selects showall button 3396, all the fields of diagrams 3392*a*, 3392*b* can be populated with information such as monetary values as shown in FIG. 354. Page 3390 can also have a "Prey" or "previous" button 3398 that can be selected by a user to remove one or more values from various fields in diagrams 3392*a*, 3392*b*. For example, when diagrams 3392*a*, 3392*b* are displayed with fields filled with values as in FIG. 354, previous button 3398 can be selected to remove values from one or more fields such as shown in FIG. 353. A "clearall" button 3400 can also be provided such that when diagrams 3392*a*, 3392*b* display monetary values in some or all of the fields in diagrams 3392*a*, 3392*b* and clearall button 3400 is selected, all fields can be cleared of values such as shown in FIG. 352.

Figure 244:
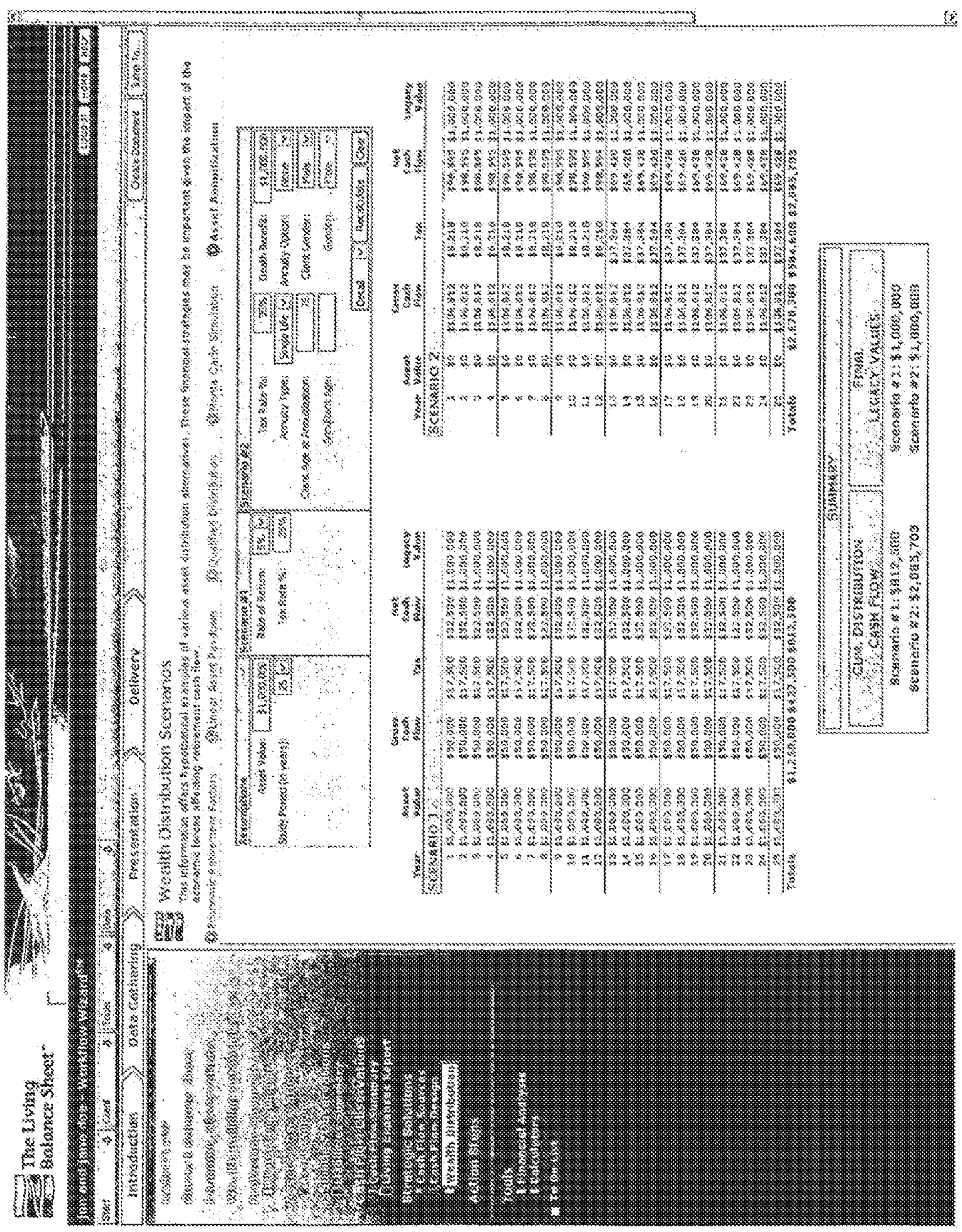
Figure 355:
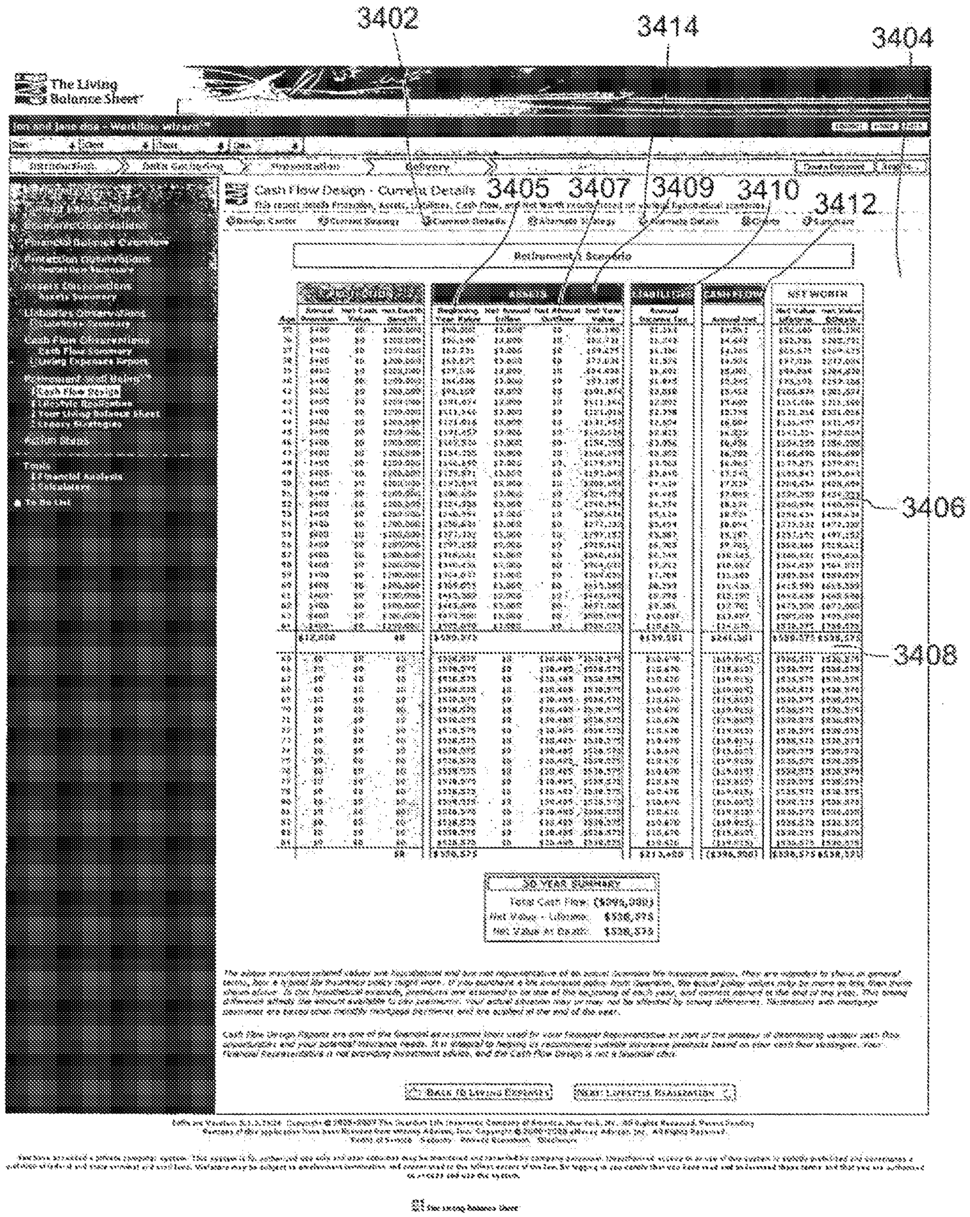

As shown in FIG. 354, a user can select current details options 3402. The program can process the request and current details page 3404 can be displayed as shown in FIG. 355. Current details page 3404 can have a chart 3406 with an indicator, break, or space such as space 3408 positioned therein. Space 3408 can provide a visual illustration to a user of the starting age of retirement (i.e., where the accumulation stage ends and the retirement or distribution stage begins). In the scenario shown in FIG. 355, accumulation stage extends from age 35 to 64 and retirement stage extends from age 65 to 84. In a preferred embodiment, all values calculated during retirement can be based on the total amounts in the protection, assets, liabilities, cash flow and net worth columns prior to retirement (such as shown in space 3408). FIG. 355 illustrates that beginning year value of assets at the start of retirement (in this scenario, age 65) is $538,575 (the amount shown in the initial asset value field of section 3374 of FIG. 351 and beginning year value section 3405 of asset column 3407 of FIG. 355). In the interest only scenario as selected in current cash flow section 3374 of FIG. 351, in the current strategy a user is only living off interest income from his/her assets during retirement. Chart 3406 illustrates that 6% interest on $538, 575 is $30,485 (the amount shown in field 3380 of FIG. 351 and assets category 3407 in net annual column 3409 of FIG. 355), $10,670 of which goes towards paying taxes (shown in liabilities column 3410, annual income tax) and $19,815 of which is remaining for distribution to a user during retirement (shown in cash flow column 3412, annual net). Total cash flow during retirement is $396,300 and a user will leave $706,633 to his/her legacy. Those skilled in the art will appreciate that while the charts, for example, in FIGS. 242 and 244 dealt with a user's financial condition during an accumulation stage (up to retirement), as shown in FIG. 355 chart 3406 illustrates a user's financial condition during the accumulation and retirement stage.

As shown in FIG. 355, a user can select alternate strategy option 3414. The program can process the request and display alternate strategy page 3416. Similar to current strategy page 3390, alternate strategy page 3416 can have diagrams 3418*a*, 3418*b* which can show information for a starting age and ending age, respectively, and, in particular, monetary values for protection, assets, liabilities, cash flow and net worth for an alternate strategy.

Figure 356:
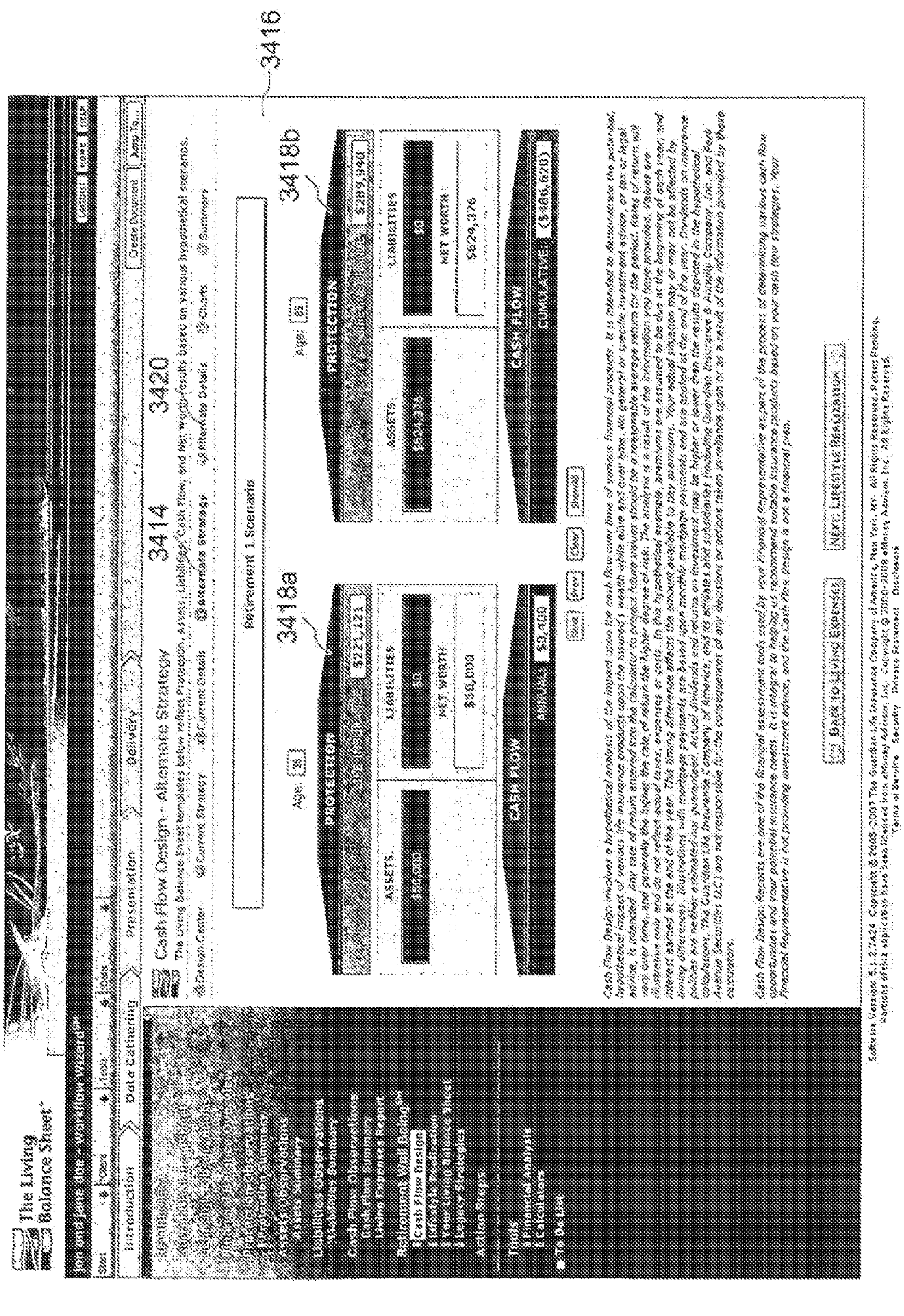
Figure 357:
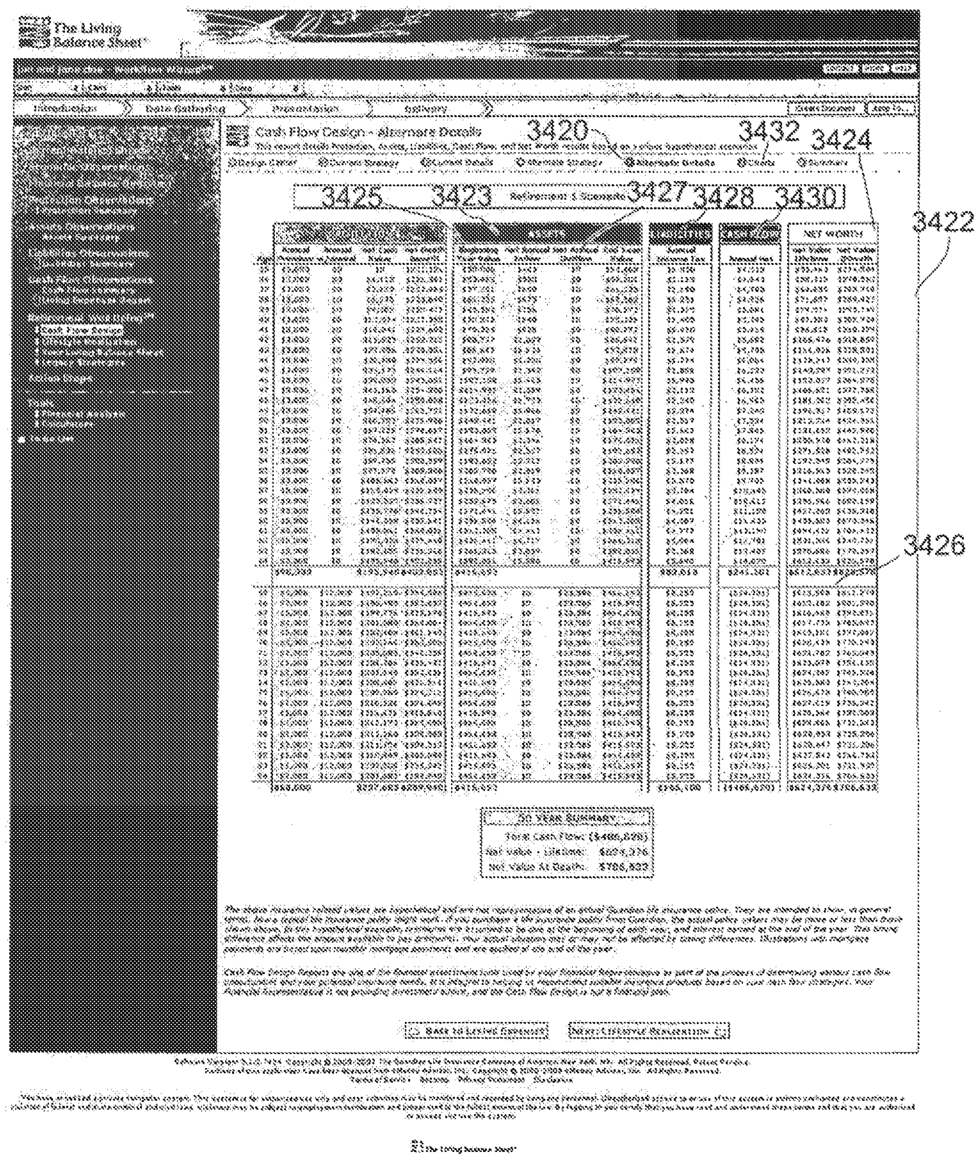

A user can select alternate details options 3420 as shown in FIG. 356. The program can process the request and display alternate details page 3422 (FIG. 357). Alternate details page 3422 can have a chart 3424 with an indicator, break, or space such as space 3426 positioned therein. Space 3426 can provide a visual illustration to a user of the end of the accumulation stage and/or beginning of the retirement state (i.e., starting age of retirement). In a preferred embodiment, all values calculated during retirement can be based on the total amounts in the protection, assets, liabilities, cash flow and net worth columns prior to retirement. FIG. 357 illustrates that beginning year value of assets at the start of retirement (in this scenario, age 65) is $416,693 (the amount shown in the initial asset value field of section 3376 of FIG. 351 and assets category 3423 in beginning year value column 3425 of FIG. 357). In the alternate strategy, during retirement, a user is living only on interest income from his/her assets as selected in alternate cash flow section 3376 of FIG. 351. Chart 3424 illustrates that interest at 6% on $416,693 is $23,586 (the amount shown in field 3380 of FIG. 351 and in assets category 3423 in net annual outflow column 3427 of FIG. 357), $8255 of which is put towards taxes (shown in liabilities column 3428, annual income tax) and $15,331 of which is remaining for distribution to a user.

Since alternate strategy involves the purchase of permanent life insurance, chart 3424 illustrates that a user has accumulated a cash value of $195,940 which a user can withdraw and use during retirement. In this strategy, $12,000 per year is withdrawn from the cash value and is part of cash flow. As shown in cash flow column 3430 (annual net), the total cash flow during retirement is $486,620 (or $24,331 per year—$15,331 from interest and $12,000 from life insurance cash value less $3000 for the annual life insurance premium). Moreover, a user will leave $538,575 (the full amount of assets at retirement) to his/her legacy. As such, the cash flow during retirement is higher in the alternate strategy than the current strategy because of the money from cash value of life insurance ($486,620 for the alternate strategy compared to $396,300 for the current strategy). Additionally, the legacy value for the alternate strategy is higher than for the current strategy as a result of the purchase of life insurance ($706,633 for the alternate strategy compared to $538,575 for the current strategy).

Figure 358:
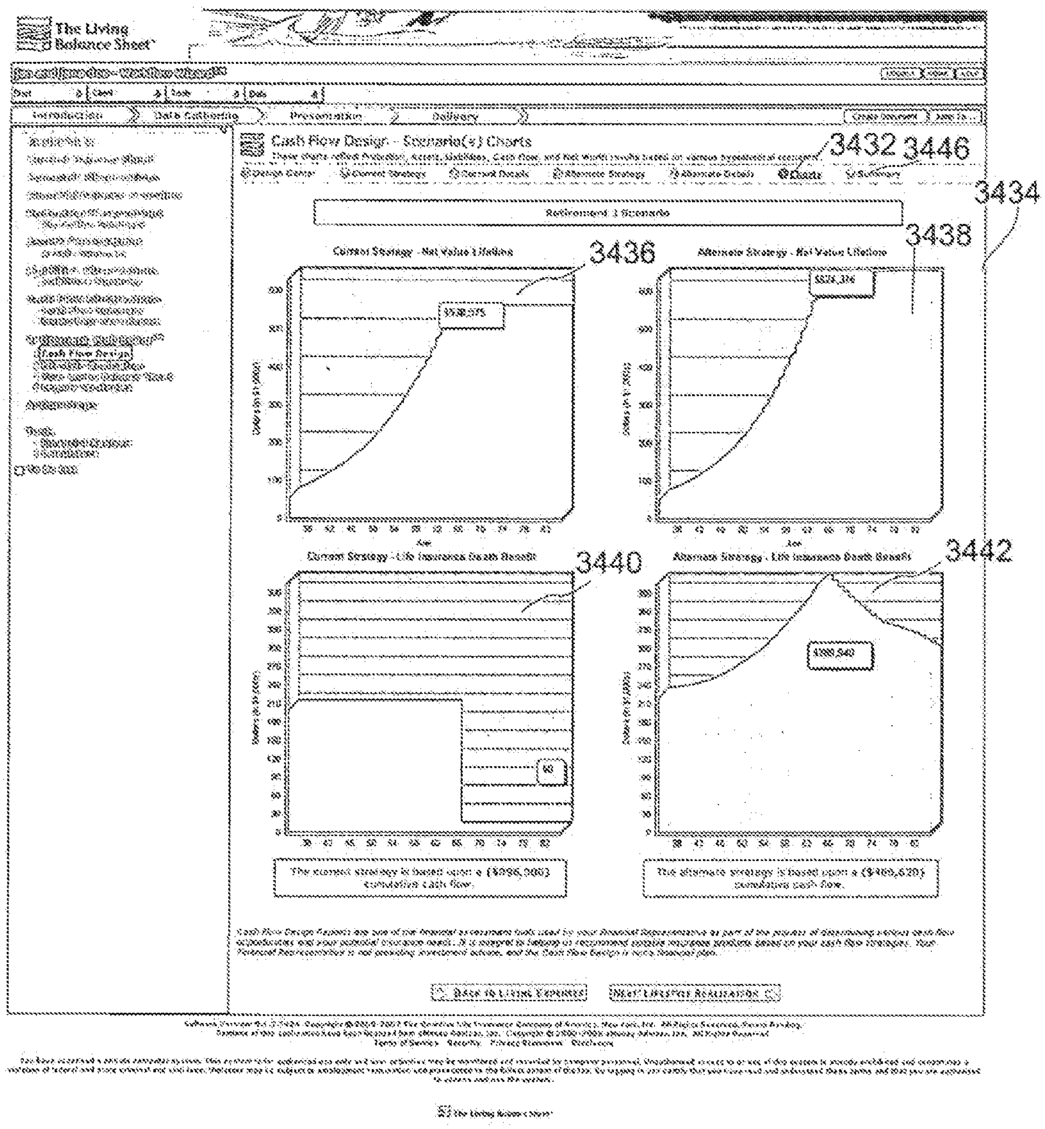

As shown in FIG. 357, a user can select chart option 3432, in response to which the program can process the request and display chart page 3434 as shown in FIG. 358. Page 3434 can have one or more charts which display information about the current and alternate strategies. In particular, page 3434 can have current strategy—net value lifetime chart 3436, alternate strategy—net value lifetime chart 3438, current strategy—life insurance death benefit chart 3440, alternate strategy—life insurance death benefit chart 3442. Chart 3436 can show that, during the accumulation phase, from the start of the study period (e.g., age 35) until retirement (e.g., age 65), a user can accumulate $538,575 in savings. During retirement (e.g., from age 65-85), chart 3436 illustrates that savings remains constant until death due to interest on the money being withdrawn by the user. On the other hand, chart 3438 shows that in the alternate strategy, a user will have more money during the accumulation stage (e.g., from age 35 to 65). This results from the purchase of permanent life insurance and, particularly, the cash value of a life insurance plan. The cash value is added to the amount saved by a user for a total value of $624,376. Moreover, during retirement (e.g., from age 65-85) as a user withdraws money from the cash value, the cash value is still increasing until age 79. At age 80, cash value begins to decrease. Nevertheless, the cash value will be higher after retirement than at the beginning of retirement. A side-by-side comparison of the chart 3436 and 3438 illustrates the difference that purchasing permanent life insurance has on the lifetime net value.

With regard to death benefit for the current strategy, chart 3440 can show that, during the accumulation phase, from the start of the study period (e.g., age 35) until retirement (e.g., age 65), a user can have a term life insurance death benefit of $200,000. Since term life is assumed to expire prior to retirement (at 65 or about 30 years after issuance), during retirement (e.g., from age 65-85), chart 3440 illustrates that the death benefit or amount left to a user's legacy is $0. On the other hand, chart 3442 shows that in the alternate strategy the value of the death benefit will increase to $403,885 during the accumulation stage (until age 65) (the increase in cash value increases the death benefit). Chart 3442 also shows that during retirement the death benefit will decrease to $289,940 (as cash value is withdrawn, the death benefit payout—i.e., an amount equal to the policy death benefit minus withdrawn cash value—decreases). A side-by-side comparison of charts 3440 and 3442 illustrates the affect purchasing permanent life insurance has on the death benefit or legacy value.

Figure 359:
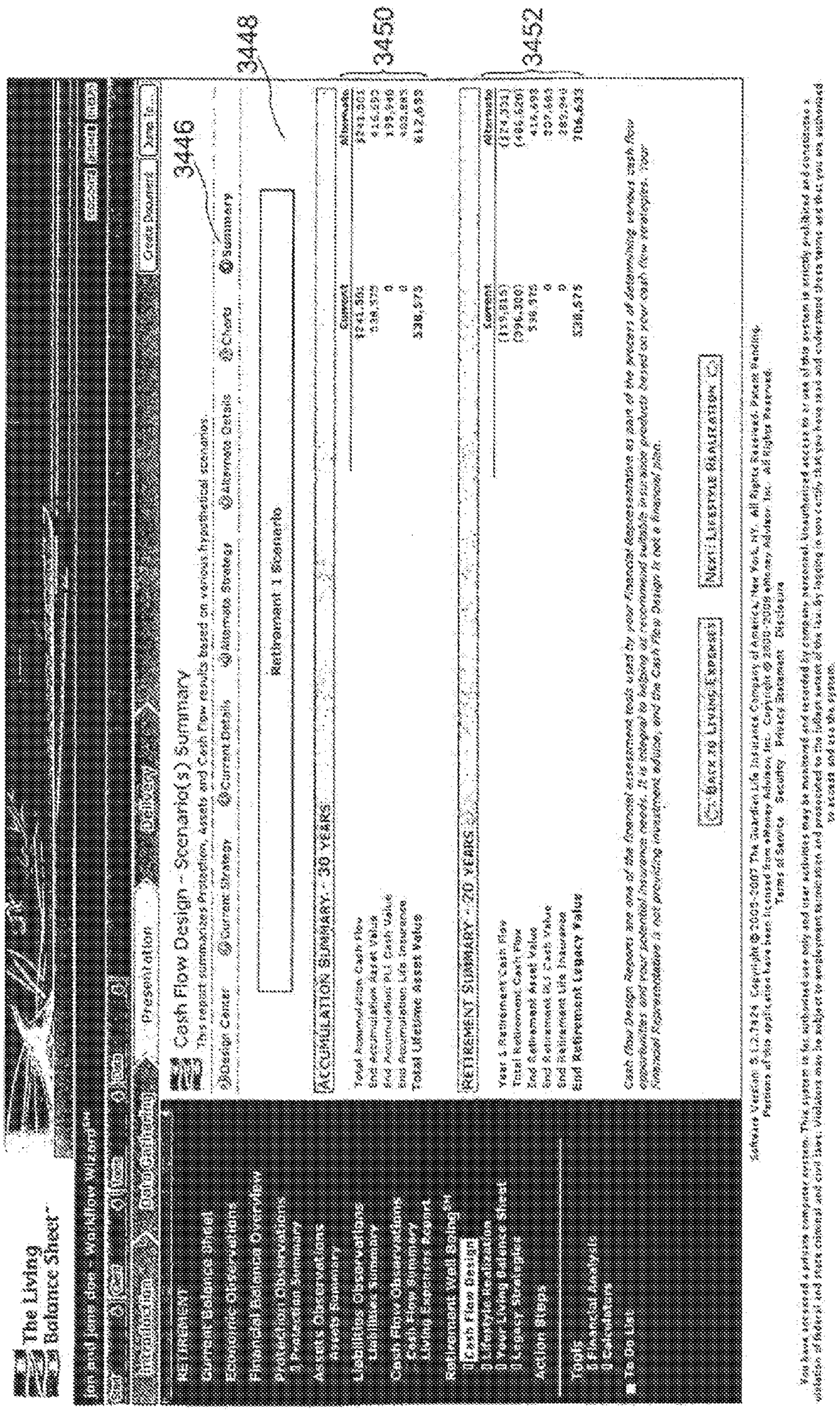

Moreover, a user can select summary option 3446 (FIG. 358). The program can process the request and, as shown in FIG. 359, display summary page 3448. Page 3448 can show a comparison of current and alternate strategies during the accumulation stage before retirement and the distribution stage after retirement. Specifically, page 3448 can have an area 3450 which can provide a summary of the current and alternate strategies during the accumulation stage and an area 3452 which can provide a summary of current and alternate strategies during the retirement stage. For example, area 3450 can show categories such as total accumulated cash flow, end accumulation asset value, end accumulation PLI (permanent life insurance) cash value, end accumulation life insurance and/or total lifetime asset value; however, more or fewer categories can be shown. Area 3452 can show categories such as year 1 retirement cash flow, total retirement cash flow, end retirement asset value, end retirement PLI cash value, end retirement life insurance and end retirement legacy. Again, more or fewer categories can be shown.

Area 3450 can illustrate to a user that in the current strategy a user may accumulate assets of $538,575 while, in the alternate strategy, a user may accumulate assets of $612,633. This side-by-side comparison of assets can illustrate to a user the advantage of purchasing permanent life insurance and, in particular, how cash value of permanent life insurance results in more wealth in the alternate strategy. Moreover, area 3452 can illustrate to a user that in the current strategy a user may have a cash flow during retirement of $396,300 and leave $538,575 to his/her legacy at death whereas, in the alternate strategy, a user may have a cash flow during retirement of $486,620 and leave $706,633 to his/her legacy at death. Once again, the side-by-side comparison of retirement cash flow and legacy value can illustrate to a user the advantage of purchasing permanent life insurance. The cash value of permanent life insurance can be withdrawn, or drawn down, by a user during retirement, thereby increasing retirement cash flow above that of the current strategy. The death benefit of the life insurance policy increases legacy value above that of the current strategy.

Figure 360:
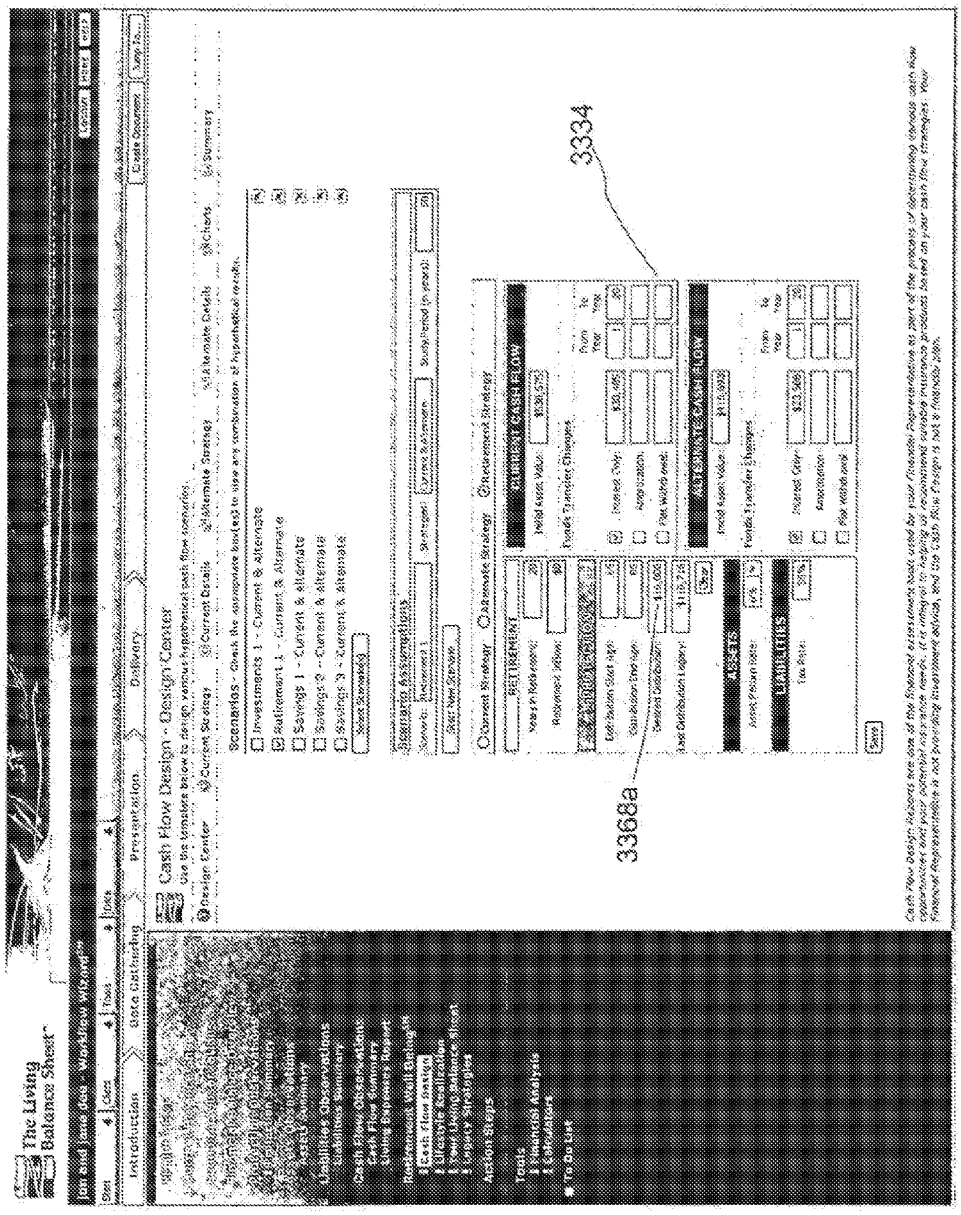
Figure 361:
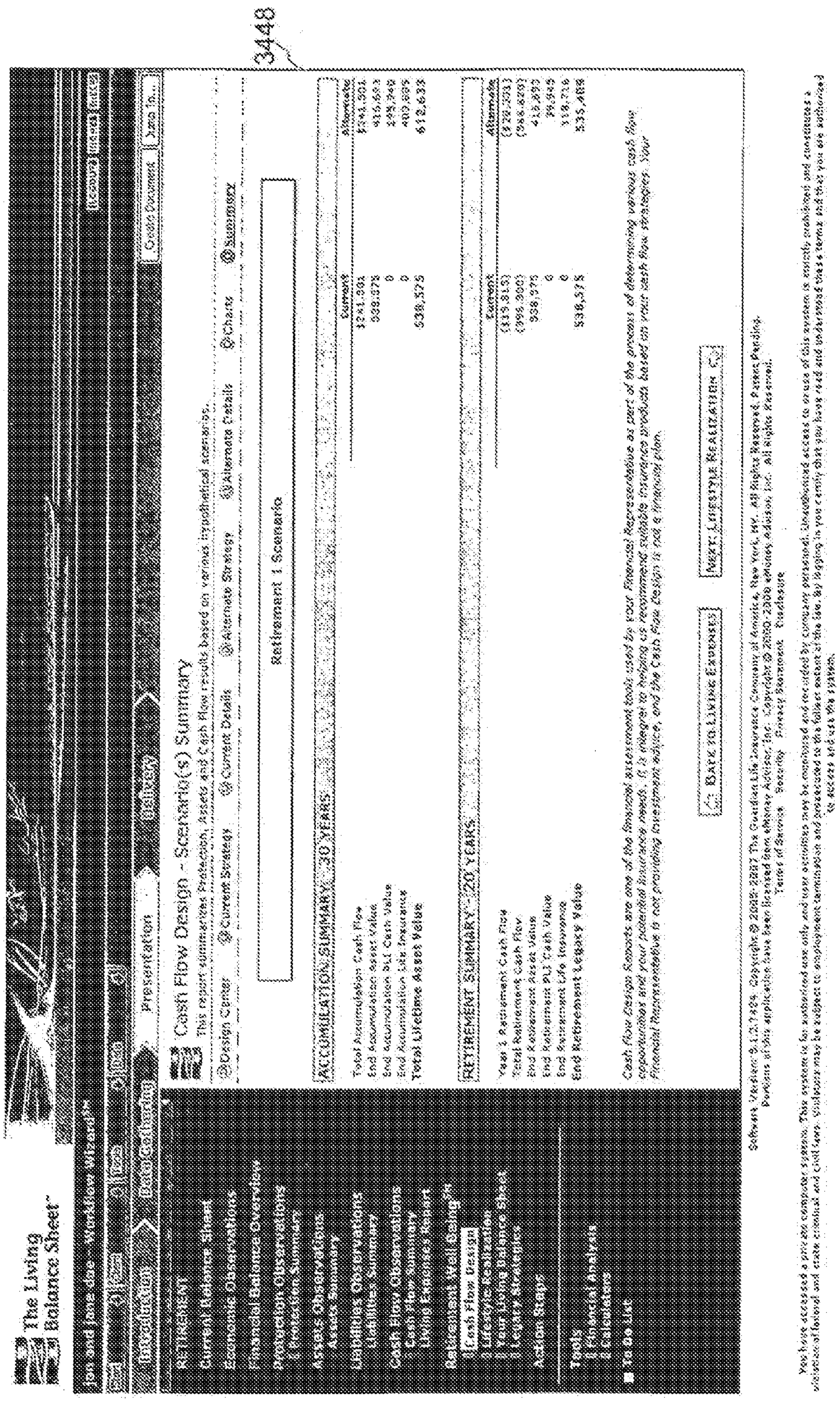

As shown in FIG. 360, in an alternative scenario, a user can change the $12,000 distribution entered in data entry field 3368*a* of FIG. 351 to $16,000 in retirement strategy chart 3334. The program can recalculate values for fields in the diagrams, charts and areas so that the changes can be propagated in current strategy page 3390, current details page 3404, alternate strategy page 3416, alternate details page 3422, chart page 3434 and summary page 3448. As shown in summary page 3448 of FIG. 361, such a change can result in significantly more cash flow or income during retirement in the alternate strategy ($566,520) than in the current strategy ($396,300) while, at the same time, keeping the legacy value for the two strategies substantially the same ($538,575 for current strategy versus $535,409 for alternate strategy). As such, a user can see the advantage of purchasing permanent life insurance. The user can receive substantially more money during retirement and provide just as much for his/her legacy even when a user withdrew less from assets during retirement.

Figure 362:
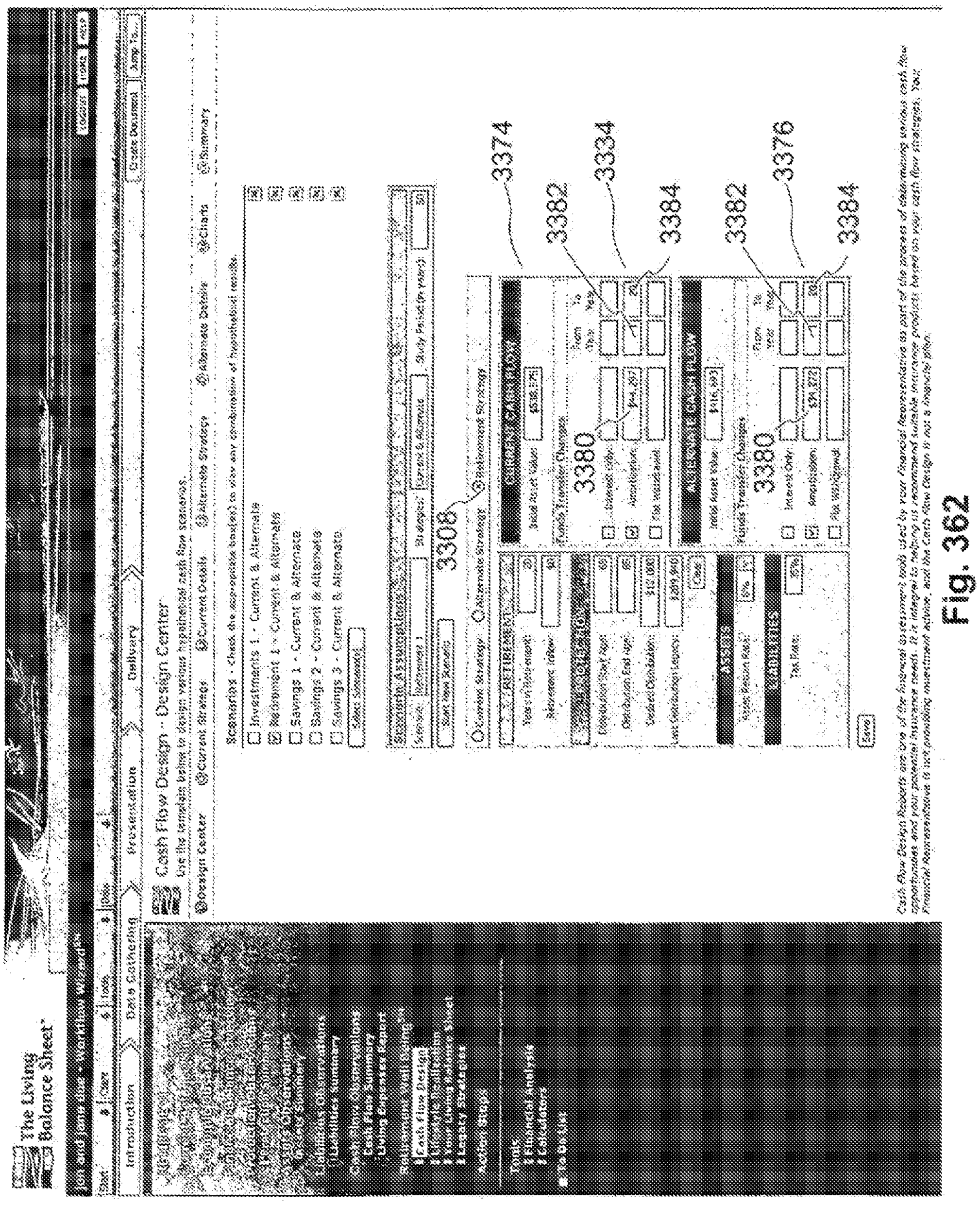

As shown in FIG. 362, in another alternate scenario, amortization can be selected in sections 3374 and 3376 of chart 3334. A user can input a start year and an end year (e.g., year 1 of retirement to year 20 of retirement) in fields 3382, 3384, respectively, and the program can calculate yearly cash flow or distribution based on asset value at retirement (i.e., $538,575 for the current strategy and $416,693 for the alternate strategy). In other words, the program can calculate the amount of money to distribute each year so that at the end of year 20, the asset value is $0. In a preferred embodiment, the amount distributed every year can be the same so long as the amount remaining at the end of retirement is $0. The yearly cash distribution calculated by the program can be displayed in field 3380 of the current cash flow section 3374 (in the amount of $44,297) and field 3880 of the alternate strategy section 3376 (in the amount of $34,272).

Figure 363:
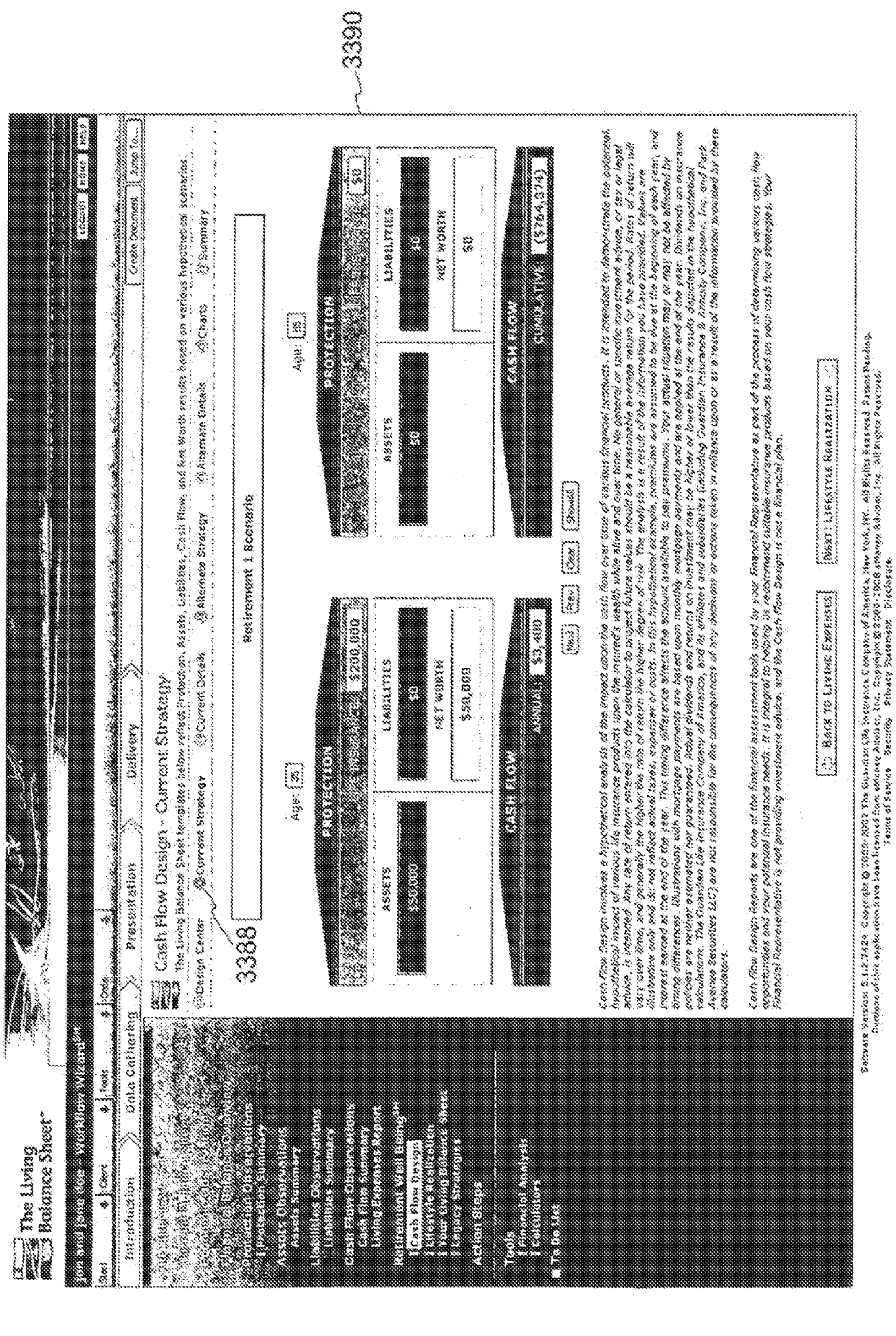
Figure 364:
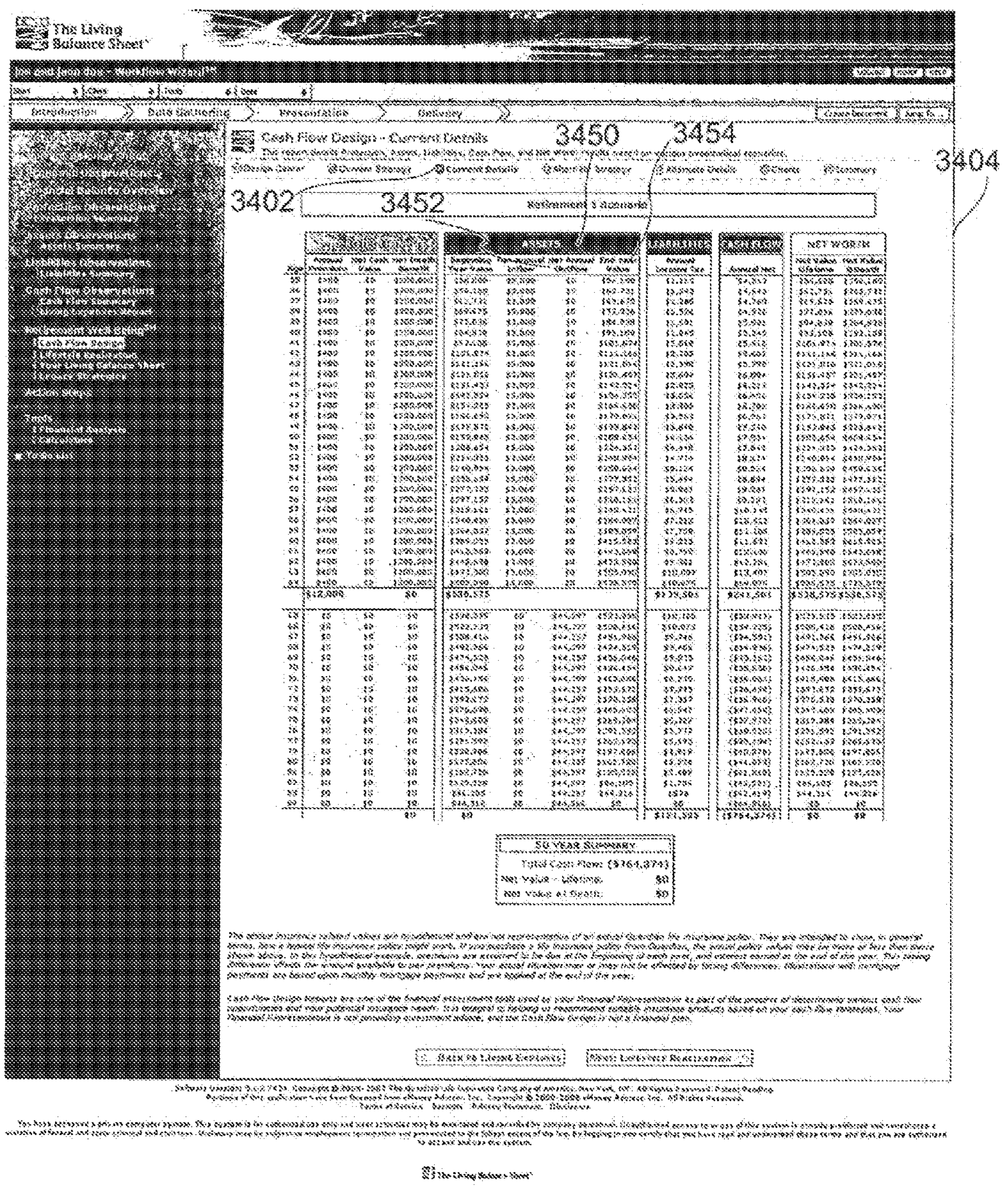
Figure 365:
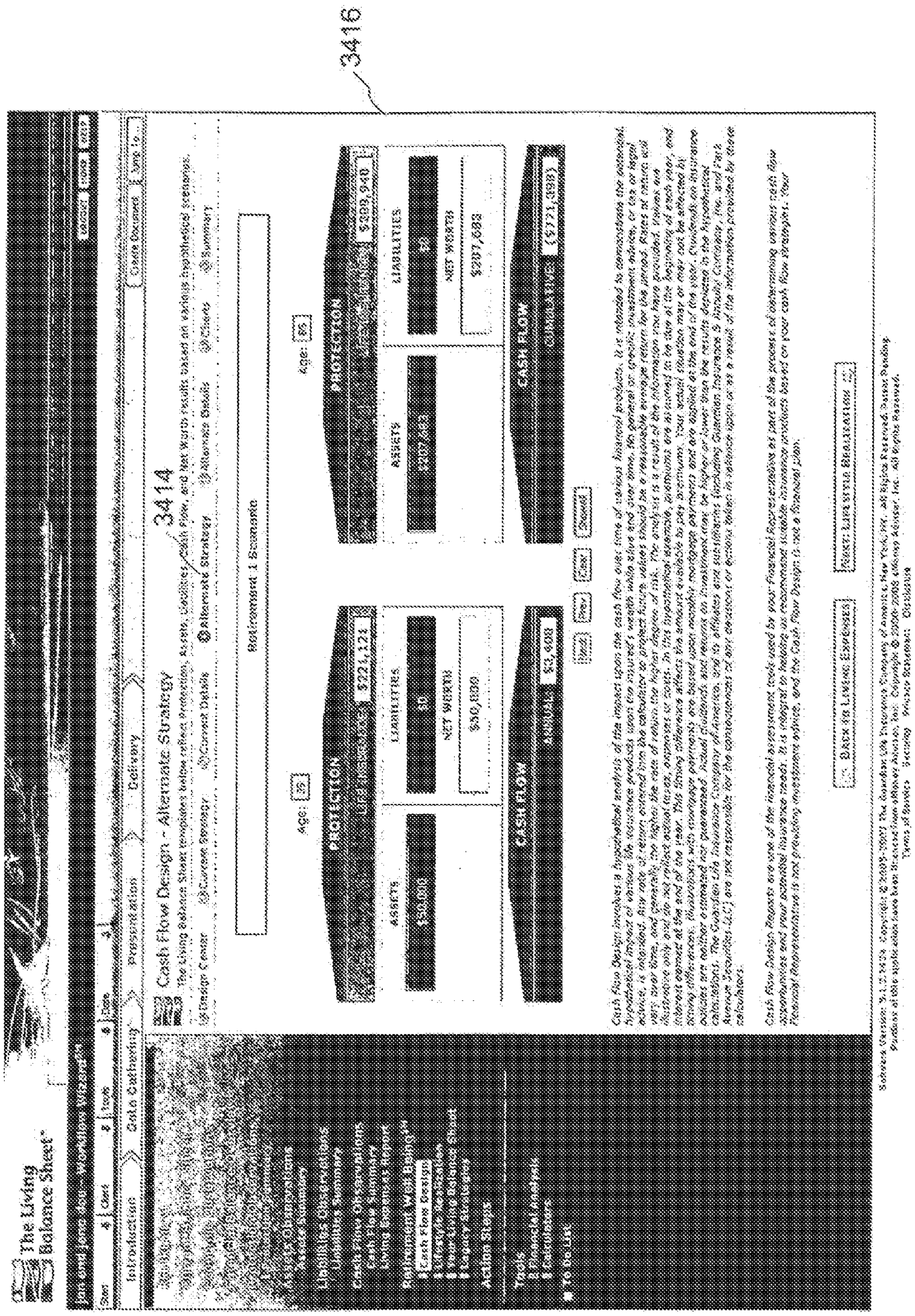
Figure 366:
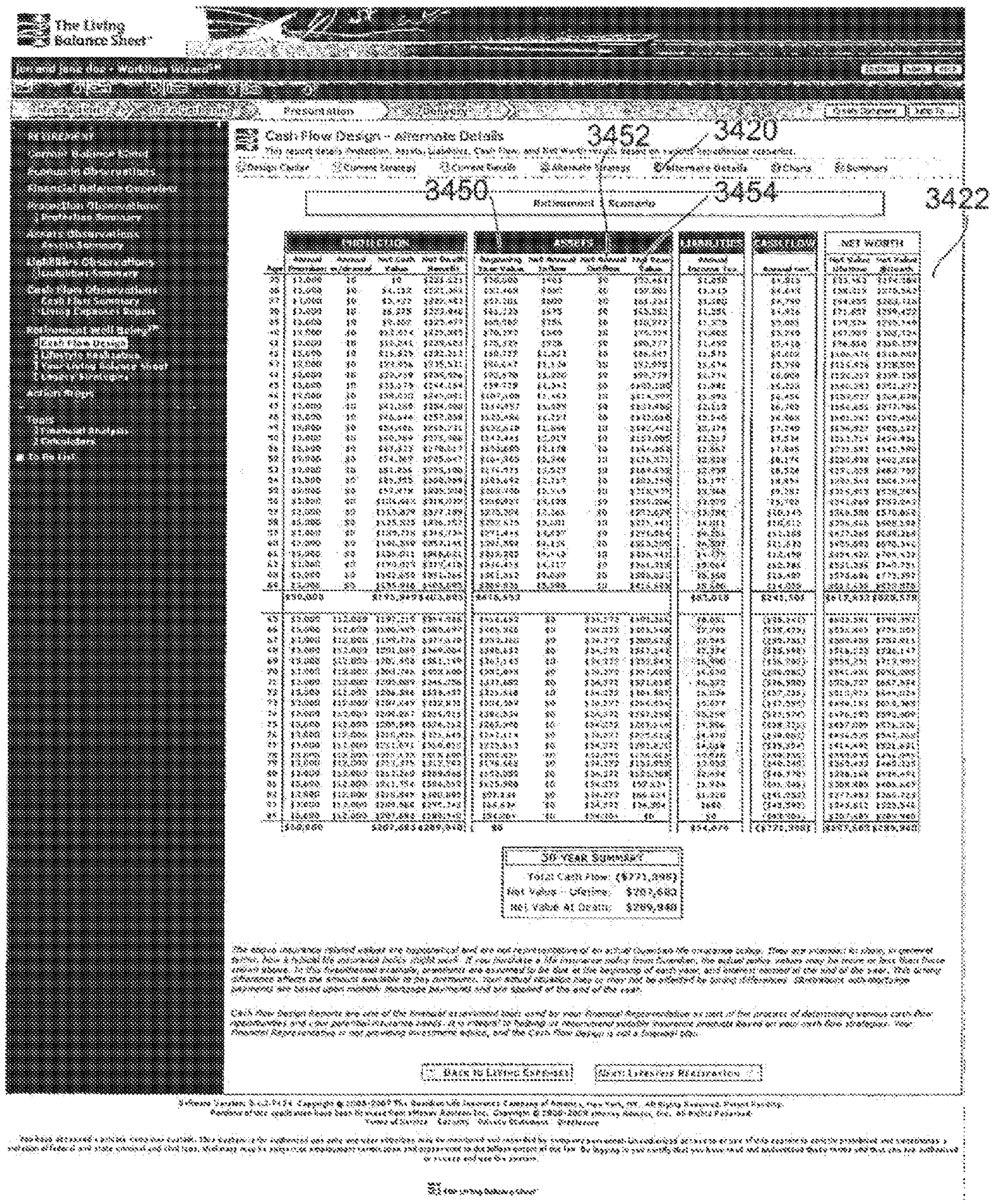
Figure 367:
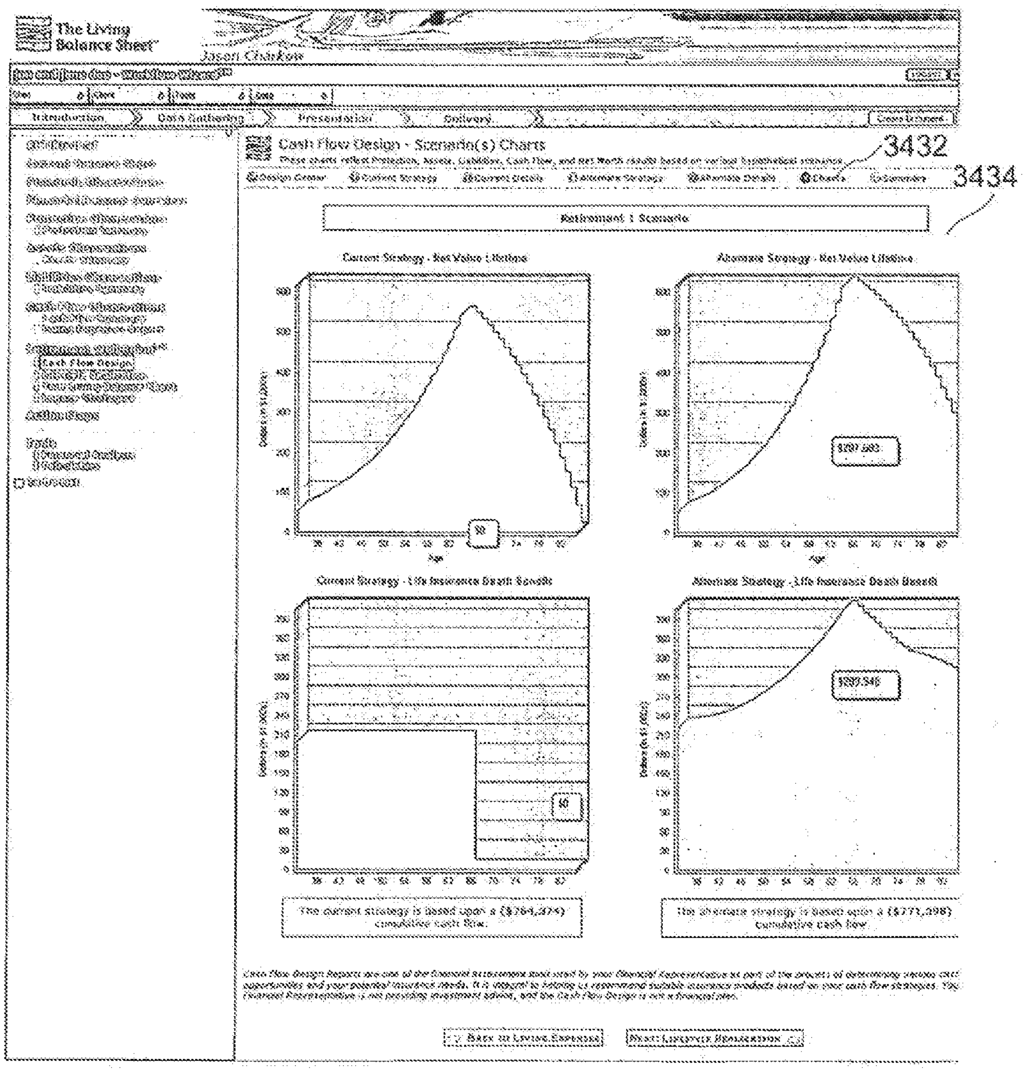
Figure 368:
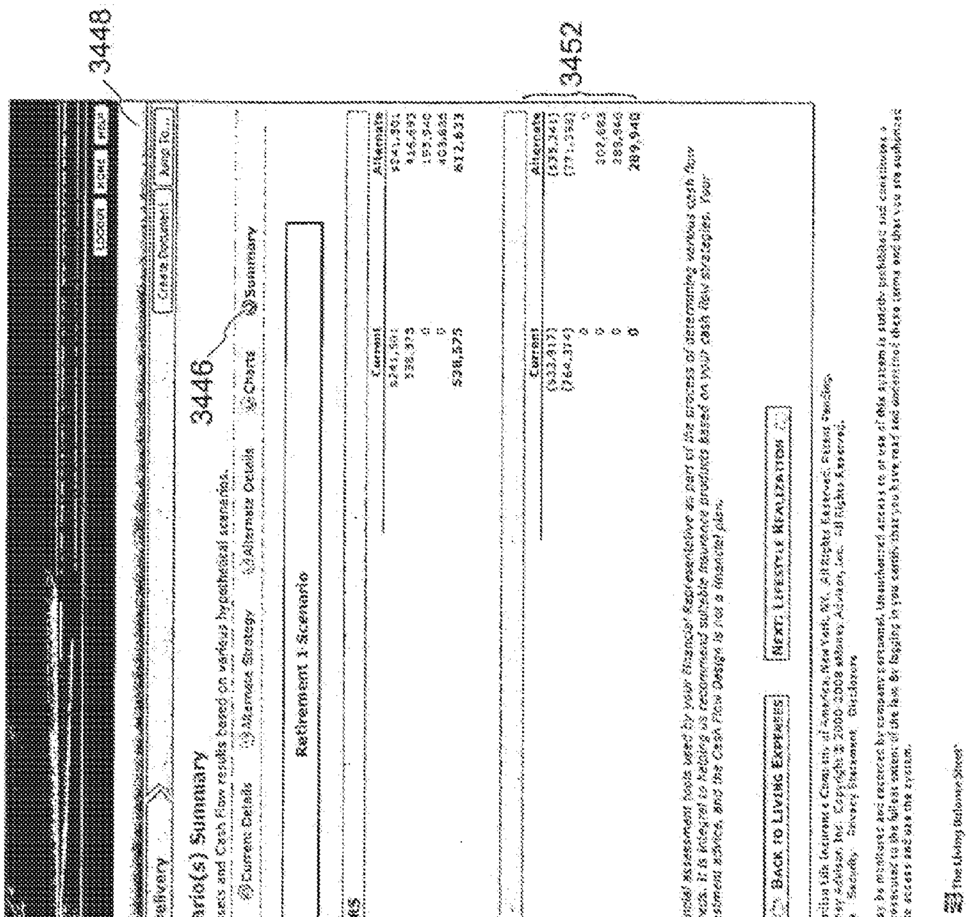

Once the information for the retirement strategy option 3308 has been entered, similar to the previous strategy, a user can select current strategy option 3388 to display page 3390 (FIG. 363), current details option 3402 to display page 3404 (FIG. 364), alternate strategy option 3414 to display page 3416 (FIG. 365), alternate details option 3420 to display page 3422 (FIG. 366), charts option 3432 to display page 3434 (FIG. 367) and summary option 3446 to display page 3448 (FIG. 368). As shown in assets category 3450 of FIG. 364 (for current strategy) and, in particular, net annual outflow column 3452, during each year of retirement, 44,297 is taken out of total asset value shown in end year value column 3454. As shown in assets category 3450 of FIG. 366 (for alternate strategy) and, in particular, net annual outflow column 3452, during each year of retirement, $34,272 is taken out of total asset value shown in end year value column 3454. Such a reduction in asset value each year results in an asset value of $0 at the end of retirement for both current and alternate strategies as shown in end year value column 3454 of FIGS. 364 and 366.

In a scenario where both current and alternate strategies involve amortization of assets, as shown in retirement summary area 3452 of FIG. 368, the current strategy can result in a cash flow of $764,374 whereas, the alternate strategy can result in a cash flow of $771,398. Moreover, legacy value for the current strategy is $0 and for the alternate strategy is $289,940. The summary page 3448 illustrates to a user the advantage of purchasing permanent life insurance when a user amortizes assets for retirement income. While in both scenarios assets are depleted to $0, the death benefit of the permanent life insurance policy allows a user following the alternate strategy to provide for his/her legacy at death. At the same time, the alternate strategy provides for more yearly retirement income than the current strategy.

Figure 369:
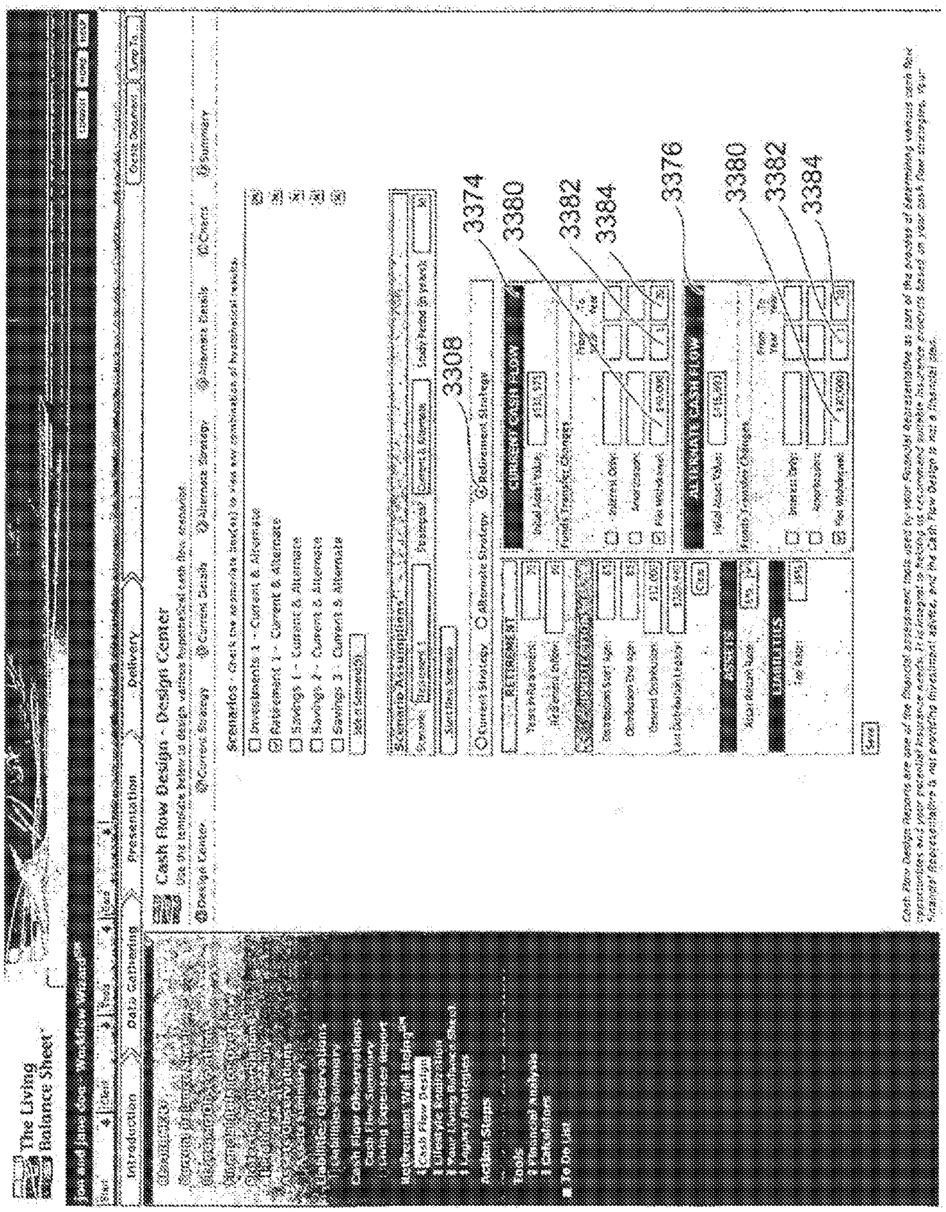

As shown in FIG. 369, in another alternative scenario, flat withdrawal can be selected in sections 3374 and 3376. A user can input an amount of yearly withdrawal in field 3380, a start year and an end year (e.g., year 1 of retirement to year 20 of retirement) in fields 3382, 3384, respectively. As shown, the amount distributed from assets each year in the current strategy is $40,000 and in the alternate strategy, $30,000.

Figure 370:
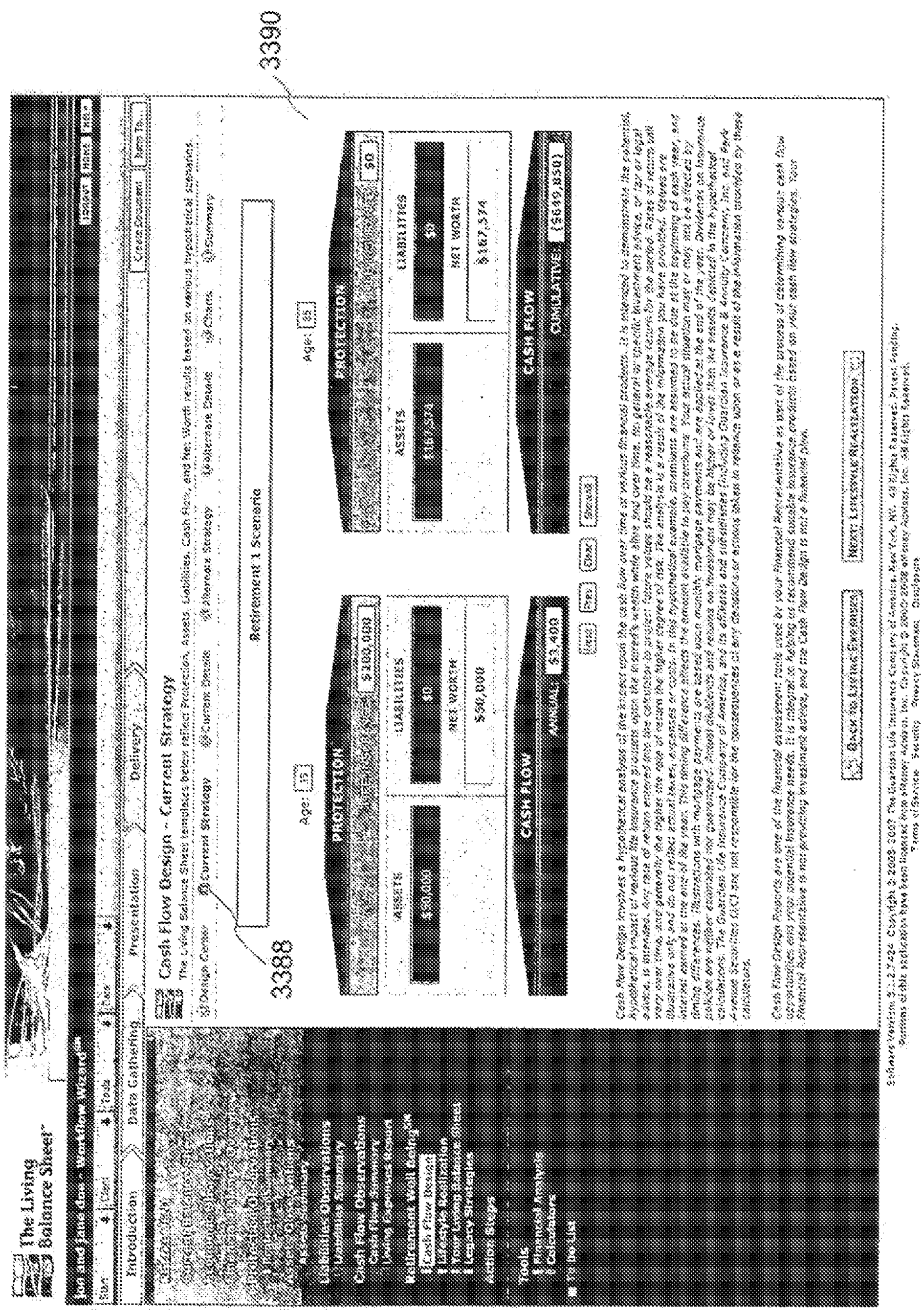
Figure 371:
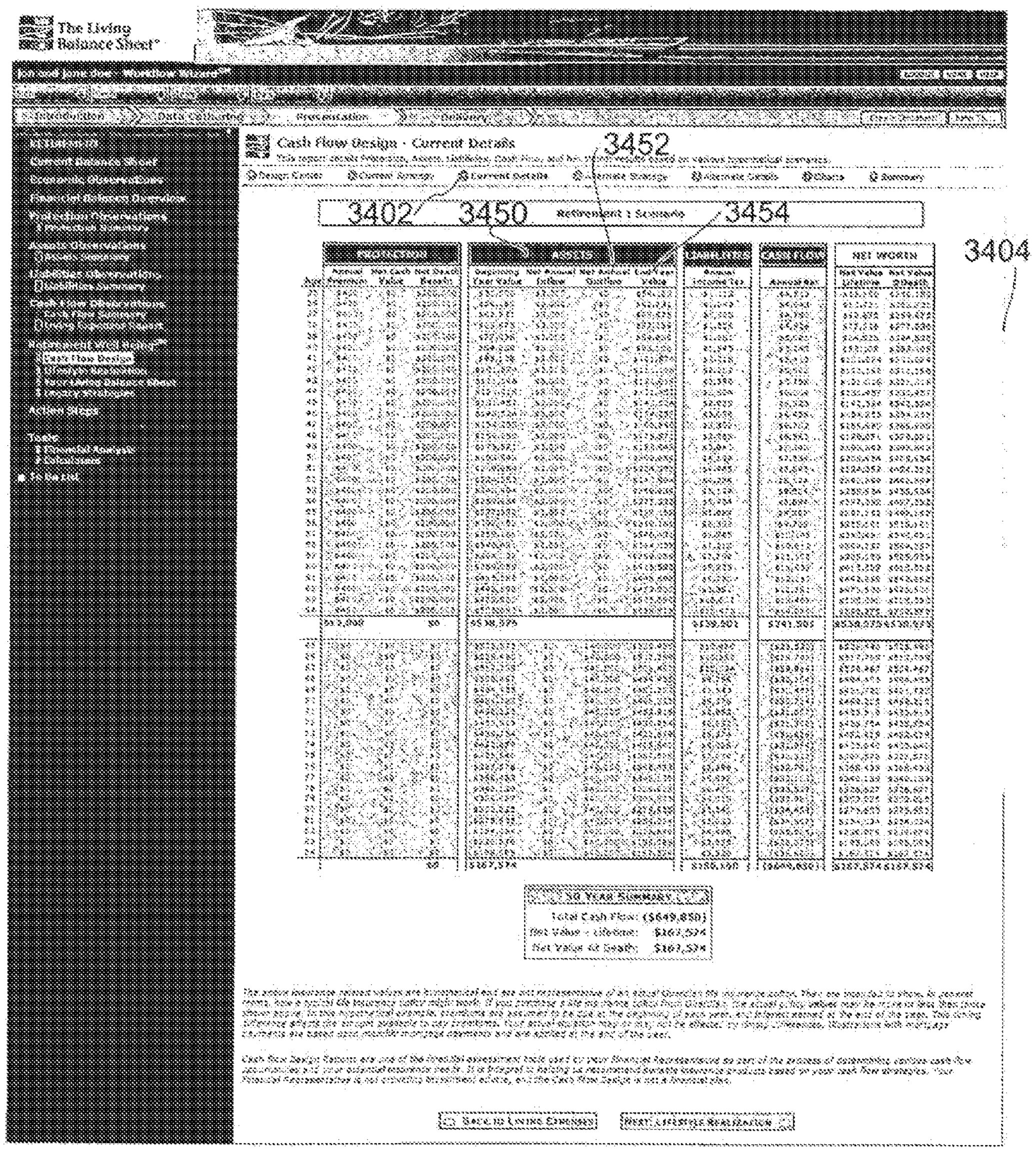
Figure 372:
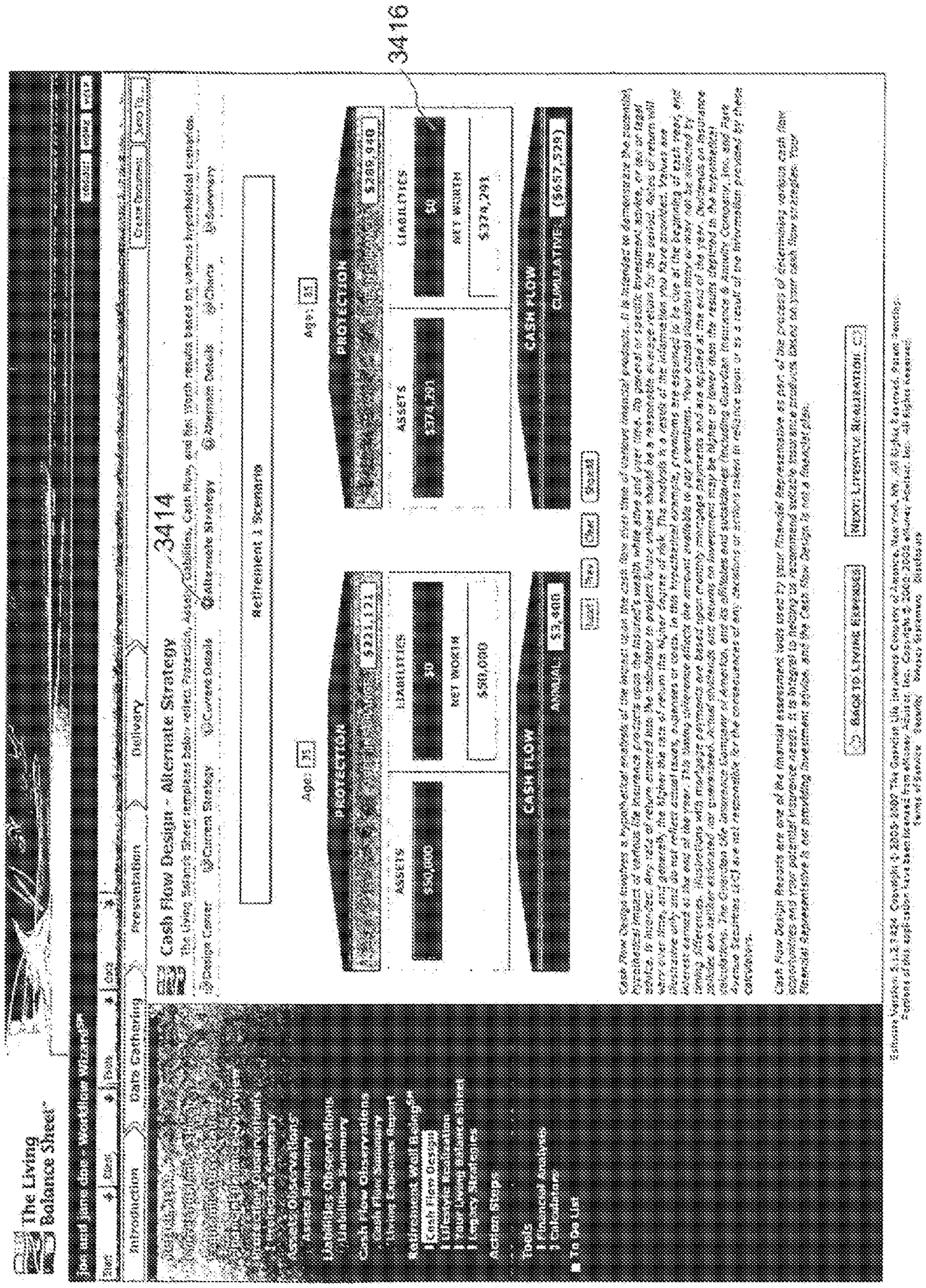
Figure 373:
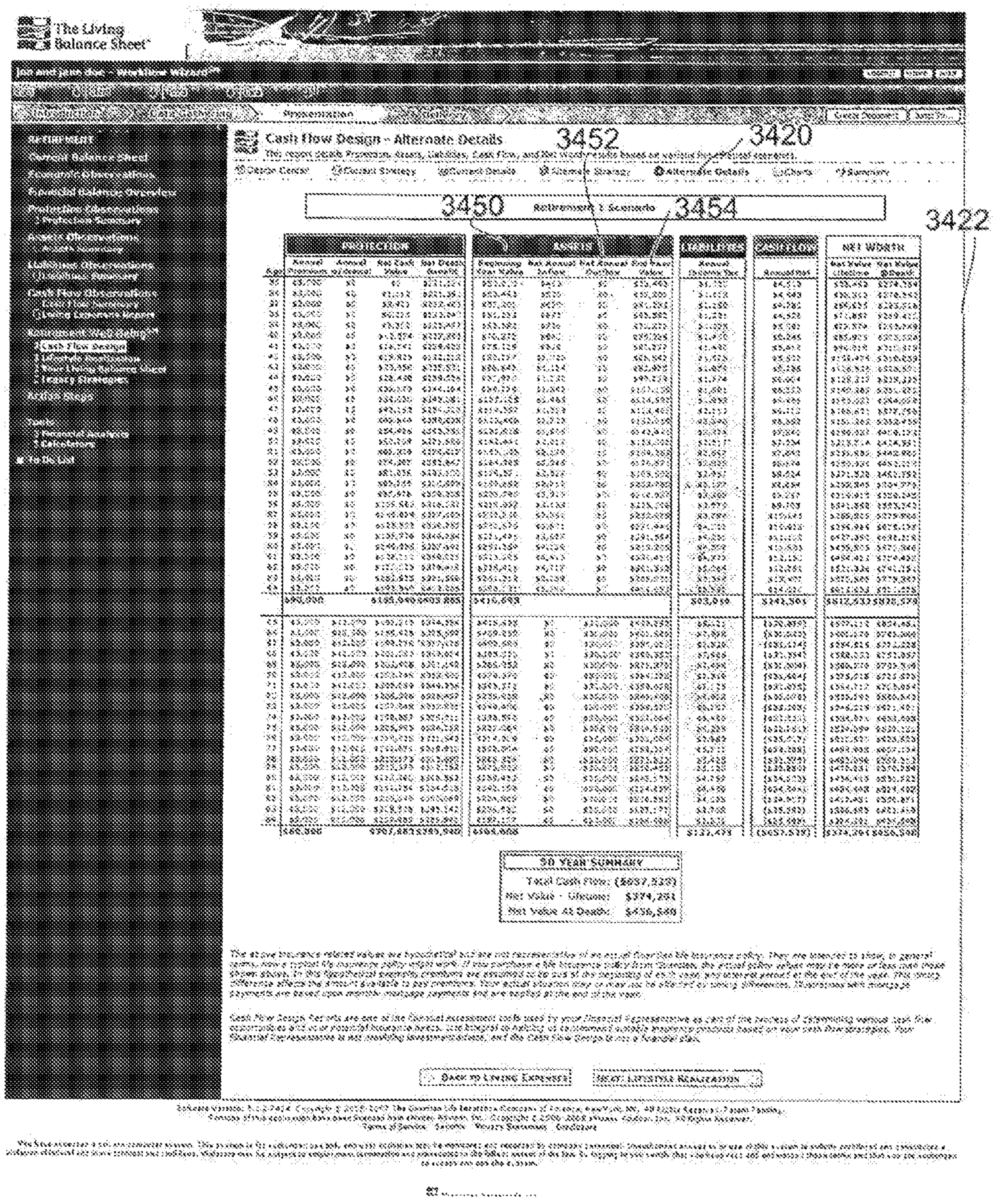
Figure 374:
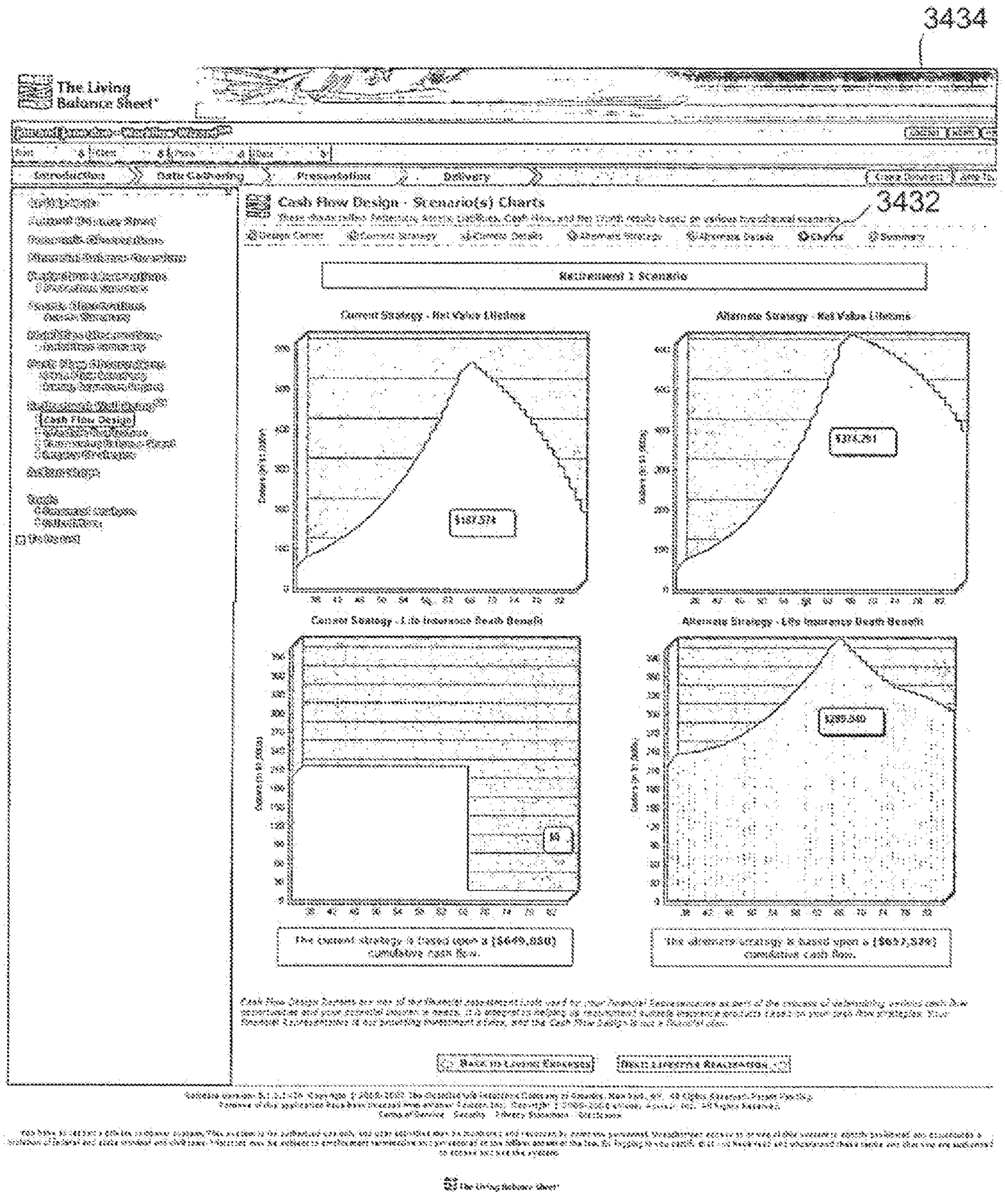
Figure 375:
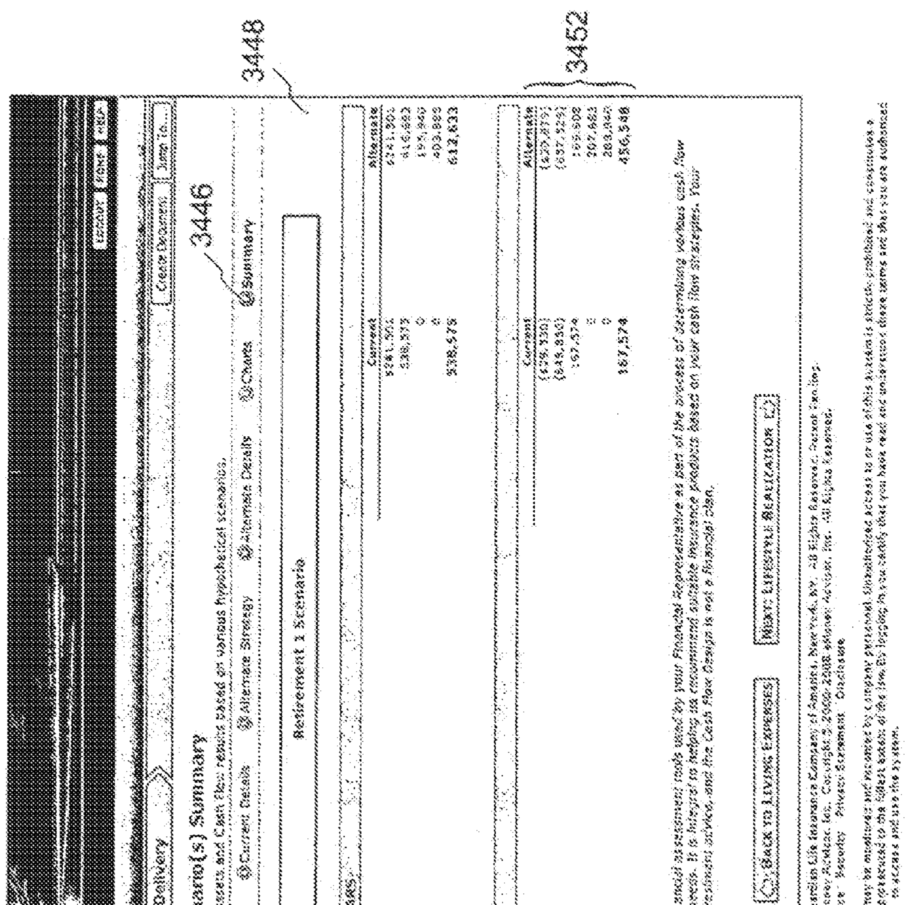

Once the information for the retirement strategy option 3308 has been entered, similar to the previous strategy, a user can select current strategy option 3388 to display page 3390 (FIG. 370), current details option 3402 to display page 3404 (FIG. 371), alternate strategy option 3414 to display page 3416 (FIG. 372), alternate details option 3420 to display page 3422 (FIG. 373), charts option 3432 to display page 3434 (FIG. 374) and summary option 3446 to display page 3448 (FIG. 375). As shown in assets category 3450 of FIG. 371 (for current strategy) and, in particular, net annual outflow column 3452, during each year of retirement $40,000 is taken out of total asset value shown in end year value column 3454. As shown in assets category 3450 of FIG. 373 (for alternate strategy) and, in particular, net annual outflow column 3452, during each year of retirement $30,000 is taken out of total asset value shown in end year value column 3454.

In a scenario where both current and alternate strategies involve flat withdrawal, as shown in retirement summary area 3452 of FIG. 375, the current strategy can result in a total retirement cash flow of $649,850 whereas, the alternate strategy can result in a cash flow of $657,529. Moreover, end retirement legacy value for the current strategy is $167,574 and for the alternate strategy is $456,548. The summary page 3448 illustrates to a user the advantage of purchasing permanent life insurance when a user takes flat withdrawal from assets for retirement income. Even though less money is being withdrawn every year in the alternate strategy ($30,000) than the current strategy ($40,000), the user will have more cash flow in the alternate strategy because of cash value of the life insurance policy which can be withdrawn. Additionally, while the current strategy leaves a user with $167,574 in assets to be left to his/her legacy, the alternate strategy has a greater legacy value which is a combination of death benefit from life insurance and remaining assets at death.

Figure 376:
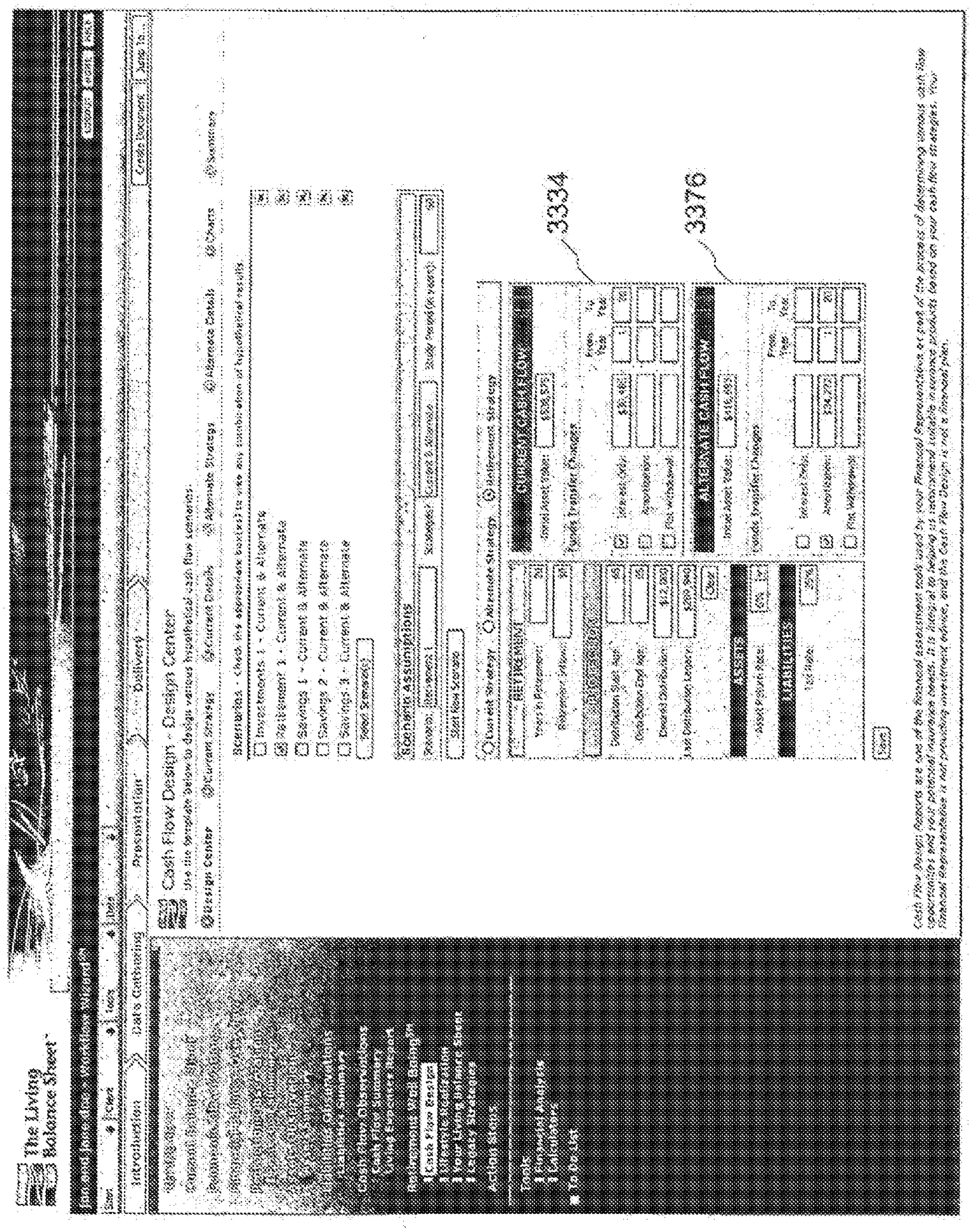
Figure 377:
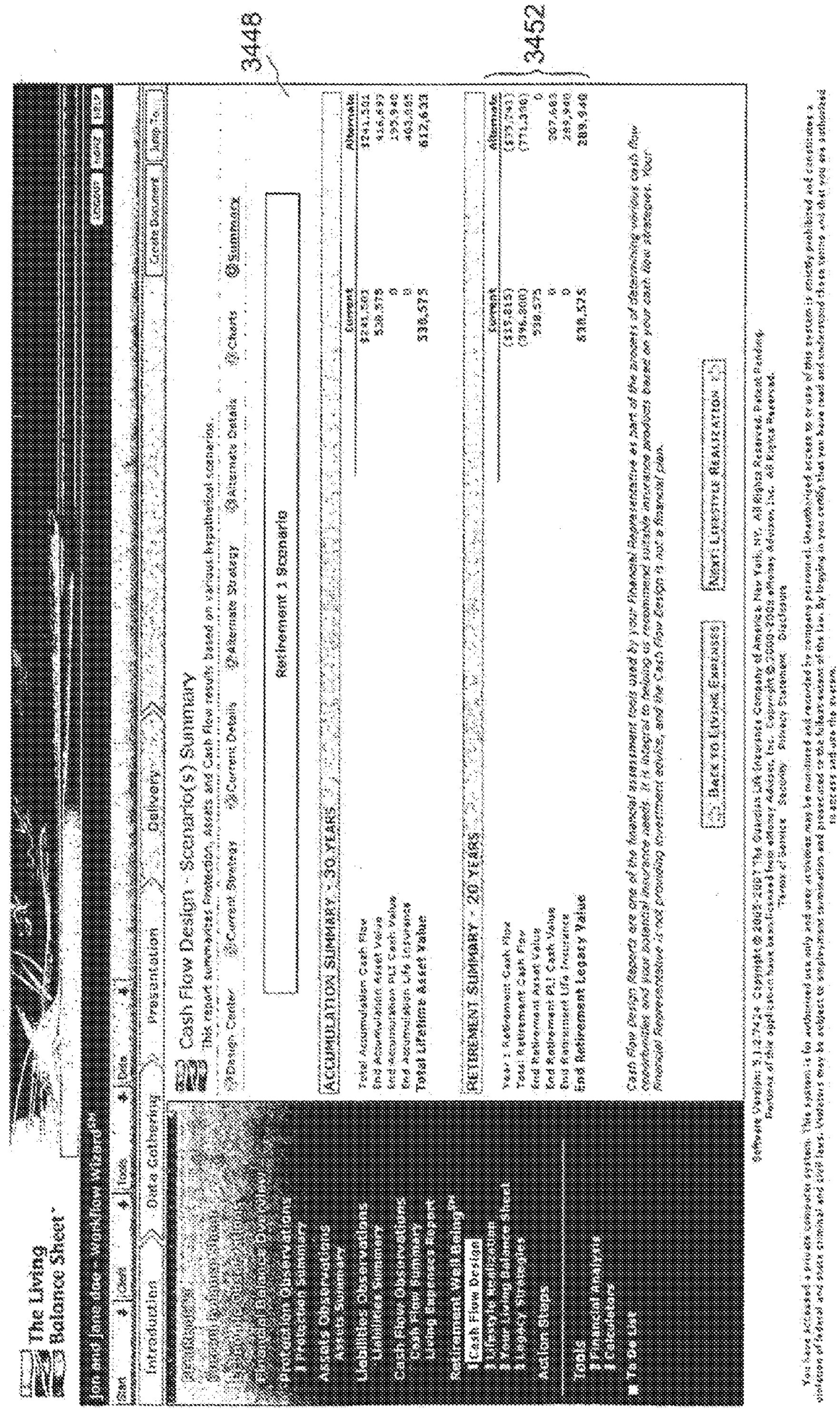

FIG. 376 illustrates that different payouts can be selected in different strategies. For example, a user can select an interest only payout for the current strategy in section 3374 and amortization payout for the alternate strategy in section 3376. As shown on summary page 3448 in FIG. 377, such a scenario can result in a user having considerably more retirement income in the alternate strategy that the current strategy. In particular, as shown in area 3452, the alternate strategy can provide retirement income or cash flow of $771,398 as compared to the current strategy which can provide cash flow of $396,300—a difference of $375,098. At death, a user will leave $538,575 to his/her legacy in the current strategy and $289,940 in the alternate strategy—a different of $248,635. Such a scenario illustrates that by purchasing permanent life insurance, a user can receive more money during retirement than in the current strategy and still provide for his/her legacy. While a user's legacy in the alternate strategy will not receive as much money as in the current strategy, the user will receive more money during retirement. So, by receiving $375,099 more during retirement a user is leaving their legacy $248,635 less at death.

Figure 378:
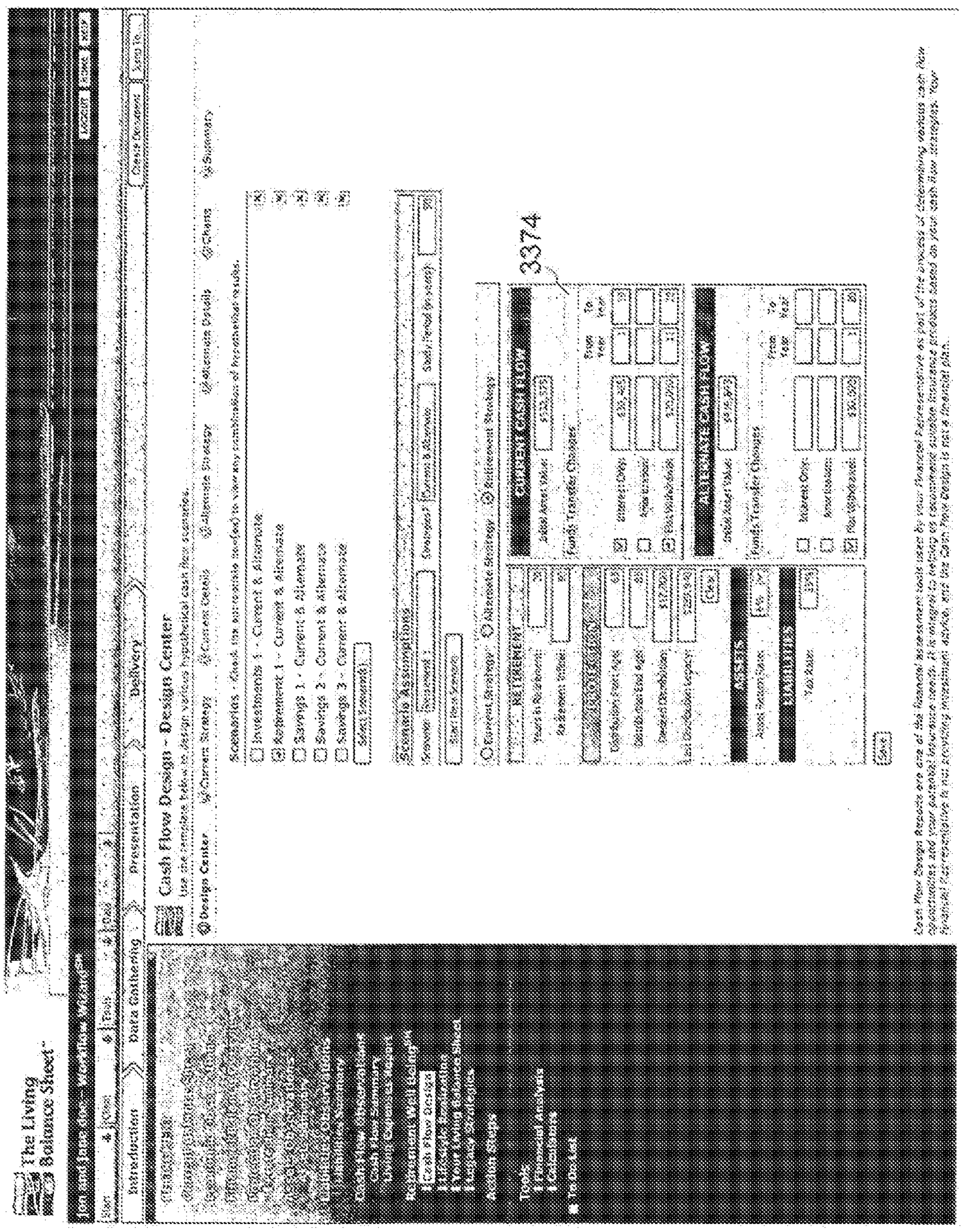
Figure 379:
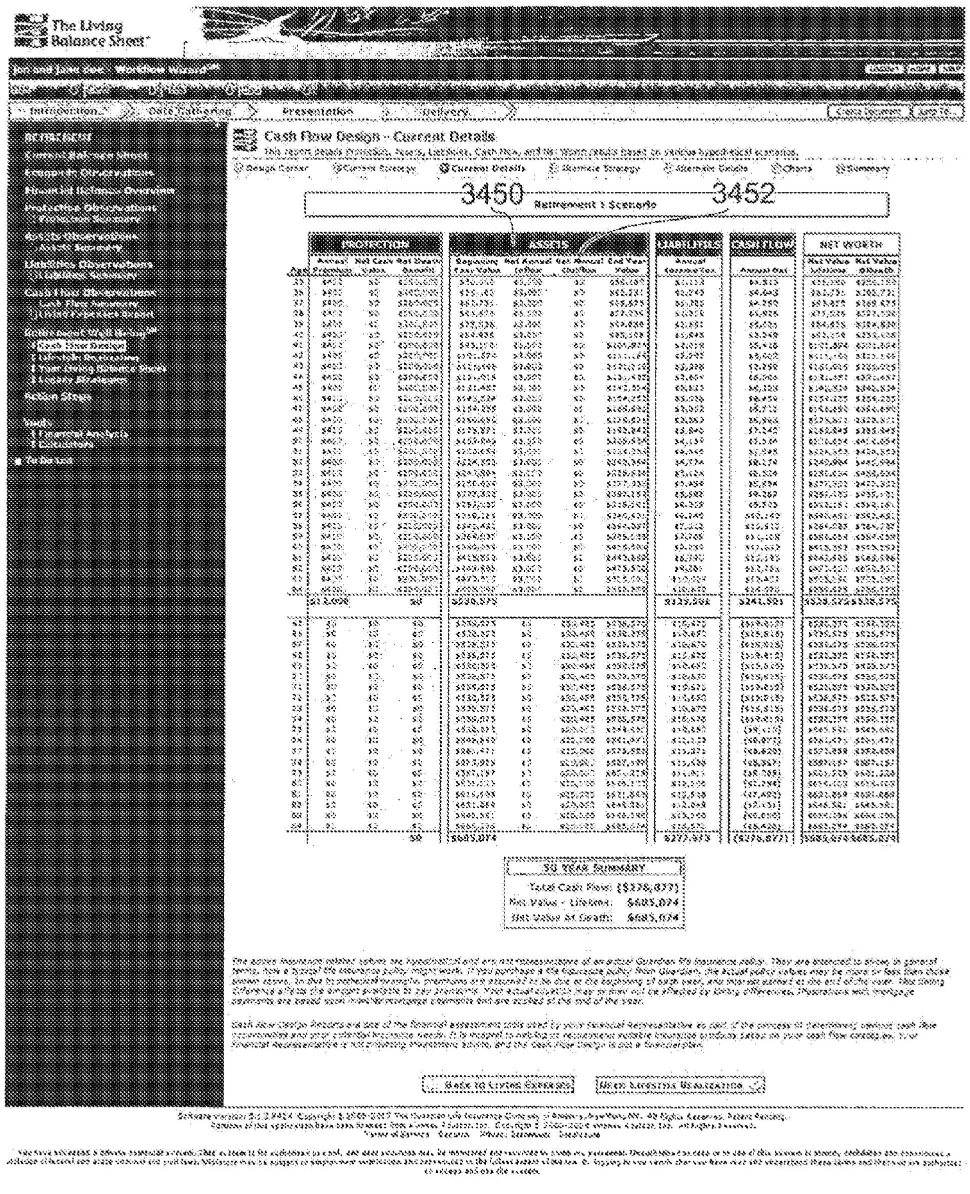
Figure 380:
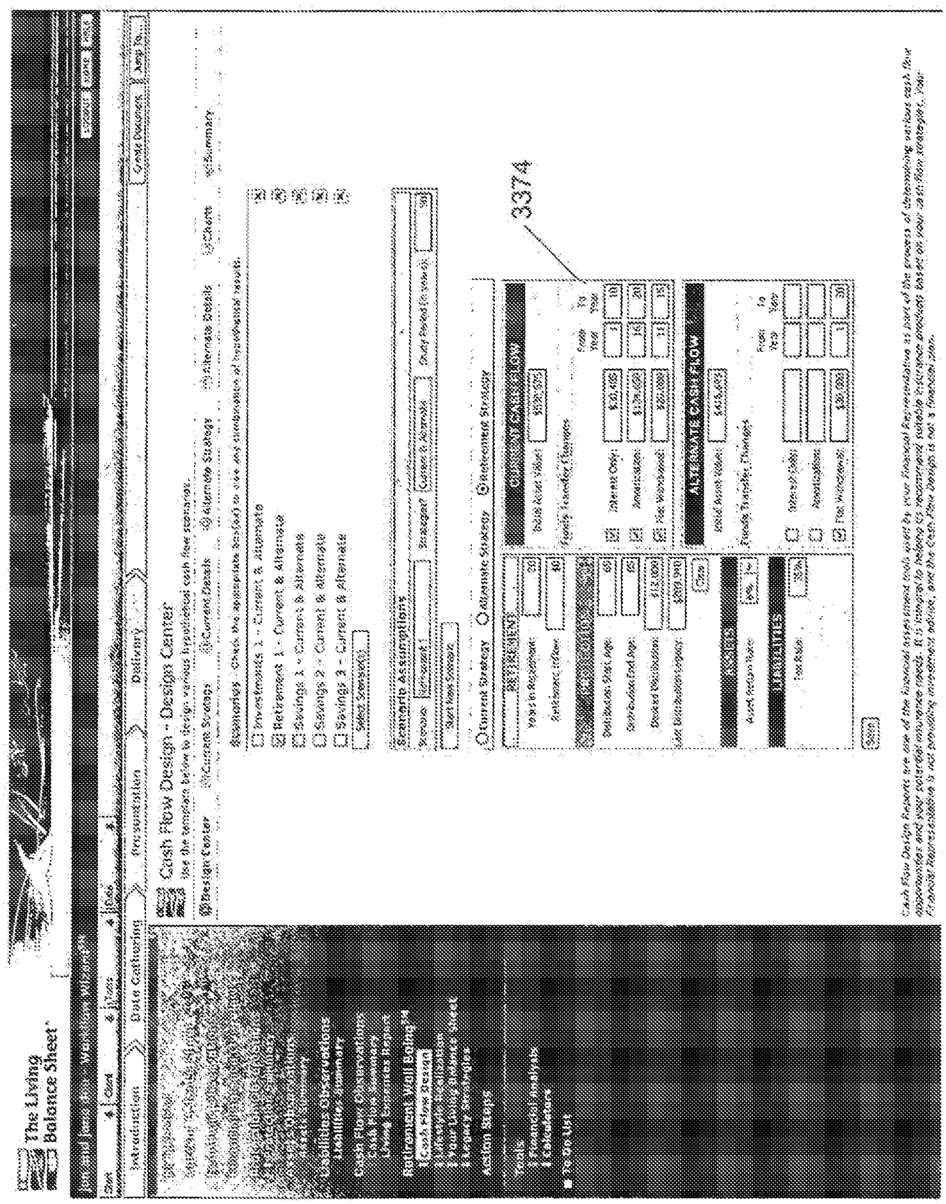
Figure 381:
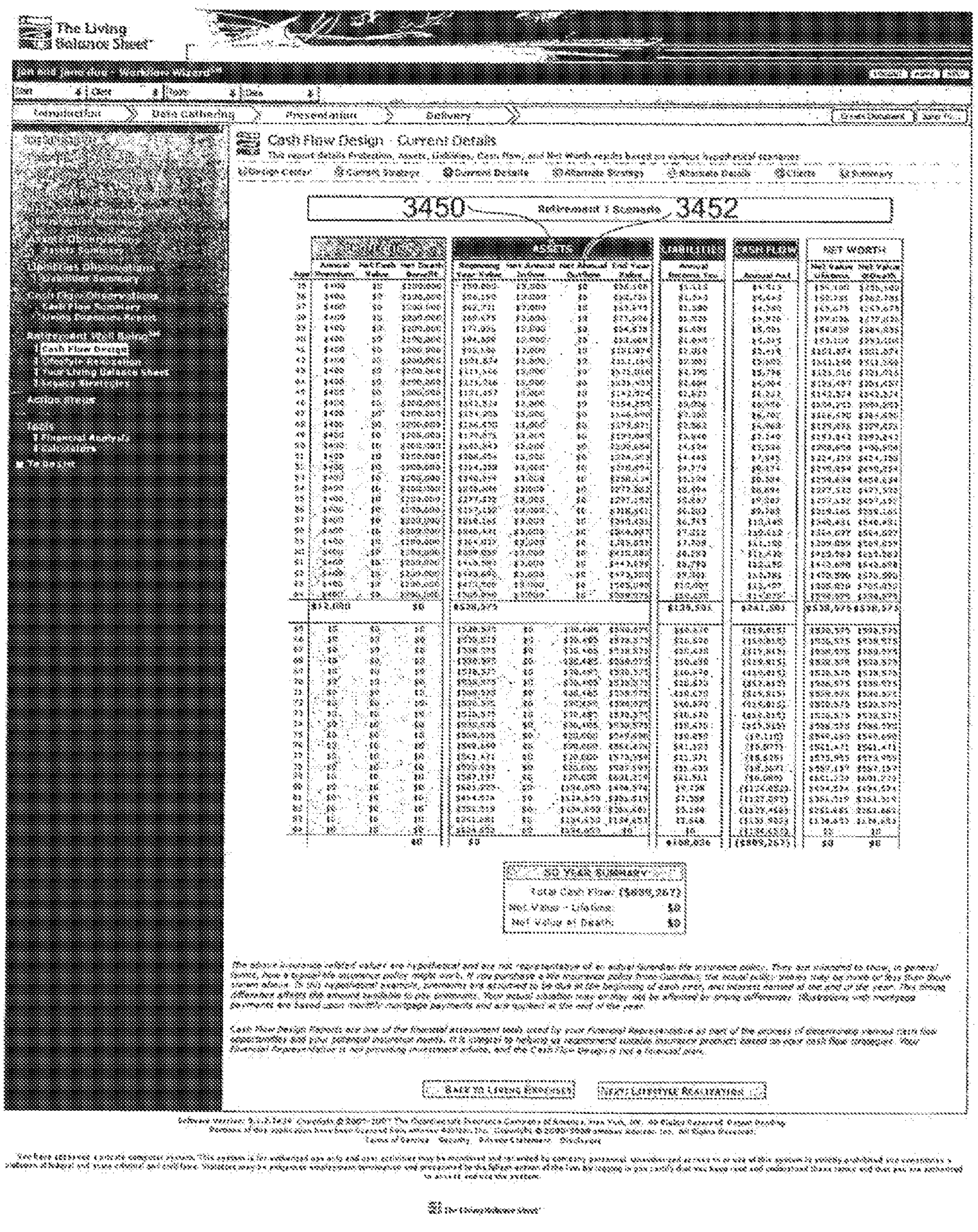

Moreover, FIG. 378 illustrates that a user can select any different payout options in the same strategy. For example, in the current cash flow section 3374 a user can select interest only payout from years 1 to 10 and flat withdrawal for the rest of retirement from years 11-20. As shown in FIG. 379 and, in particular, net annual outflow column 3452 of assets category 3450, only interest of $30,485 will be withdrawn during the first ten years of retirement and a flat withdrawal of $20,000 will be withdrawn for the last ten years of retirement. FIG. 380 illustrates another combination of payout options in the same strategy. For example, in the current cash flow section 3374 a user can select interest only payout from years 1 to 10, flat withdrawal from years 11-15 and amortization from years 16-20. As shown in FIG. 381 and, in particular, net annual outflow column 3452 of assets category 3450, only interest of $30,485 will be withdrawn during the first ten years of retirement, a flat withdrawal of $20,000 can be withdrawn from years 11 to 15 and the rest of the assets can be amortized from years 16 to 20 until assets are $0 resulting in $134,650 per year until year 20 (year 20 will be approximately $134,650). It will be appreciated for the current or alternate strategy in section 3374, 3376, respectively, a user can select any combination of payout options so long as the payout options occur during different time periods during retirement.

Figure 382:
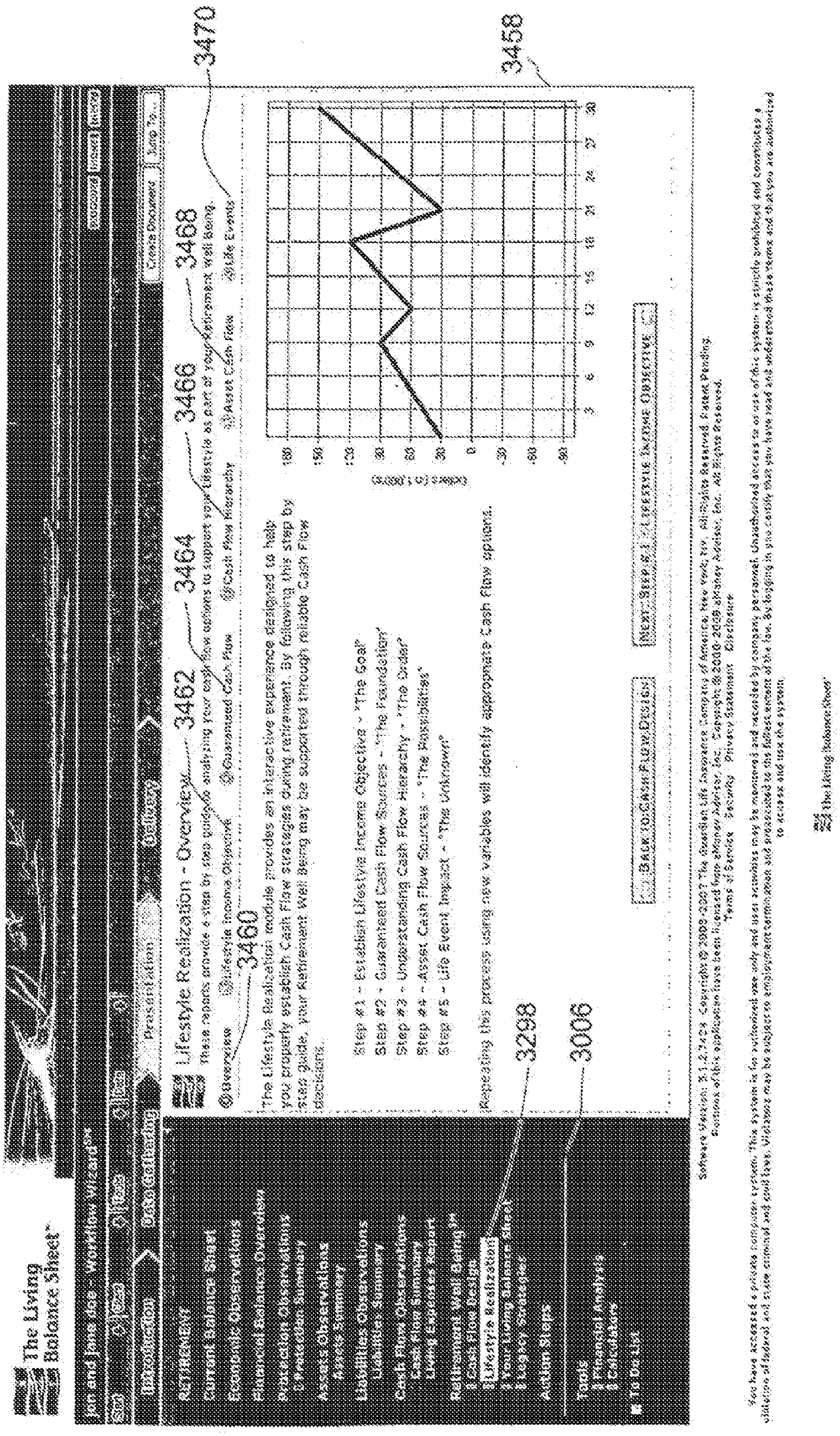

A user can be provided with a tool for designing cash flow strategies during retirement. As shown in FIG. 382, a user can select lifestyle realization link 3298 from Retirement Well Being® category in list of options field 3006. Such a link provides a user with tools to help establish cash flow strategies during retirement. The tools can show whether an estimated amount of money (chosen by a user) will meet the user needs during retirement and maintain a lifestyle during retirement (which is comfortable for the user). Such tools are different than previous scenarios which were based on what a user's lifestyle will be given the current state of the user's finances. In particular, such tools can be useful for a user who is about to retire, at retirement or recently retired to help the user plan for retirement.

Upon selection of link 3298, the program can process the request and overview page 3458 can be displayed. A list of options can be provided such as overview option 3460, lifestyle income objective option 3462, guaranteed cash flow option 3464, cash flow hierarchy option 3466, asset cash flow option 3468 and life event option 3470. The list of options can be stationary such that as options are selected and different pages associated with the option are displayed, the list of options remain in the same place on the page.

Overview page 3458 can list various steps associated with the life realization tools. For example, the steps can correspond to the options 3462, 3464, 3466, 3468, 3470. In a preferred embodiment, Step #1 is establishing lifestyle income objective—"The Goal" (option 3462); Step #2 is guaranteed cash flow sources—"The Foundation" (option 3464); Step #3 is understanding cash flow hierarchy—"The Order" (option 3466); Step #4 is asset cash flow sources—"The Possibility" (option 3468); and Step #5 is life event impact—"The Unknown" (option 3470). While the options are in steps (or in an order), a user can select any option or step (out of order).

Figure 445:
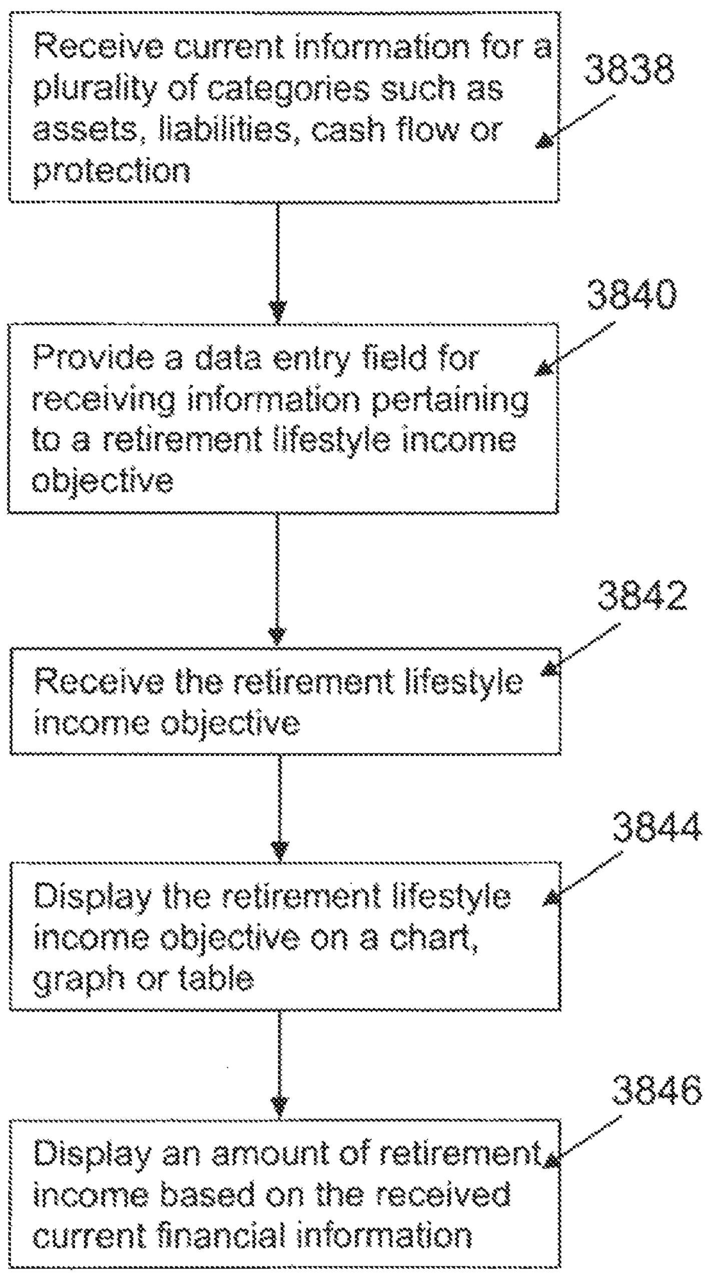

As part of the lifestyle realization review, a user can be provided with a tool for establishing a hypothetical lifestyle income objective. In general, as shown in FIG. 445, current information can be received for a plurality of categories such as assets, liabilities, cash flow or protection (step 3838). A data entry field can be provided for receiving information pertaining to a retirement lifestyle income objective (step 3840), and the retirement lifestyle income objective can be received (step 3842). The retirement lifestyle income objective can be displayed on a chart, graph or table (step 3844). An amount of retirement income based on the received current financial information can be displayed on the display (step 3846).

Figure 383:
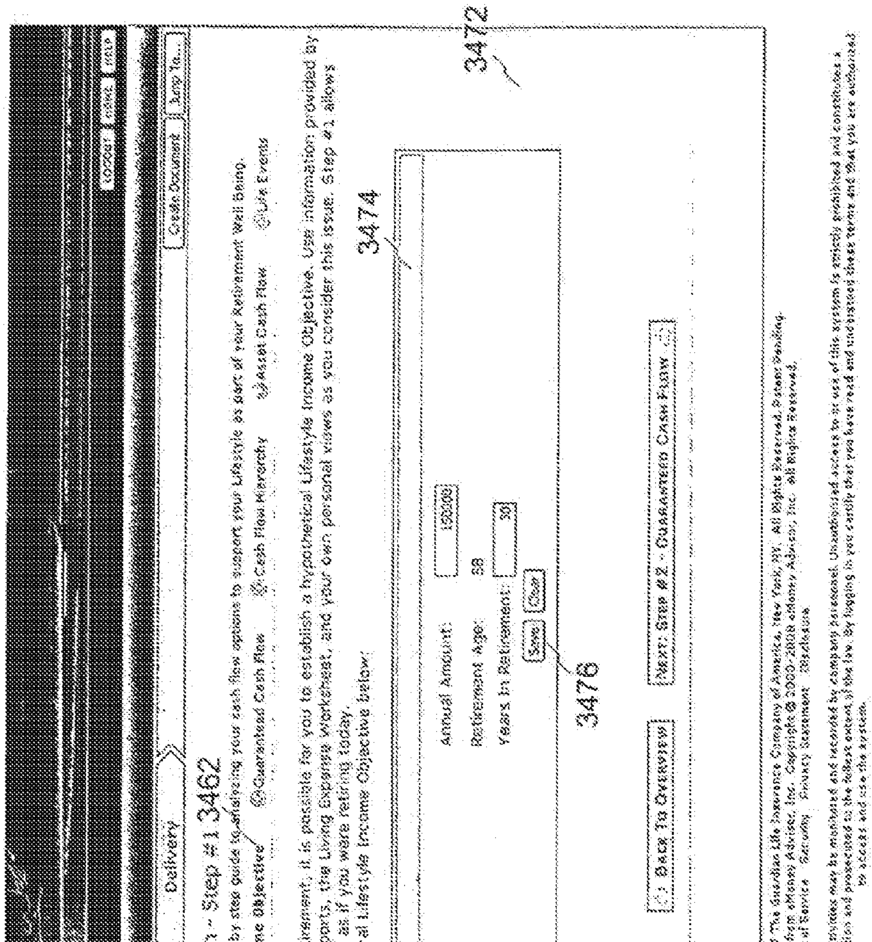
Figure 384:
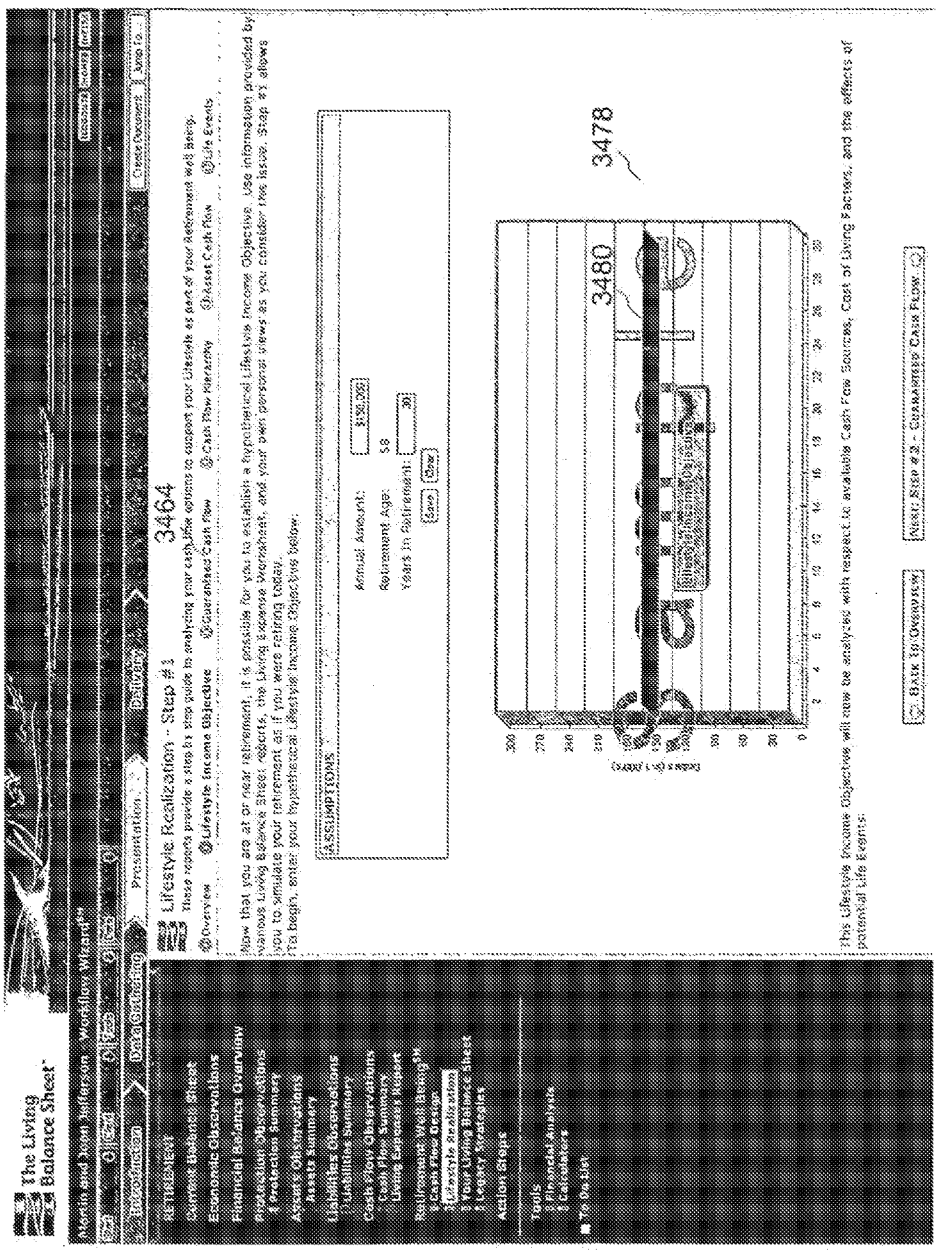

A user can select lifestyle income objective option 3462 (FIG. 382). The program can process the request and display page 3472 as shown in FIG. 383. Page 3472 can have an assumption field 3474 which can have one or more data entry fields. For example, field 3474 can have a data entry field for inputting information about annual amount (i.e., the amount of money a user estimates that he/she will need every year during retirement), retirement age and years in retirement. In a preferred embodiment, the retirement age field can be fixed such that a user cannot alter the retirement age. The information for retirement age may be automatically entered by the program based on previously inputted information. In an exemplary embodiment, a user may determine that he/she needs $150,000 per year during retirement and will be retired for 30 years. Moreover, retirement age can be shown as 58. After entry of the information, a user can select a button such as save button 3476. Information in field 3474 can be stored and diagram 3478 can be display as shown in FIG. 384. Diagram 3478 can be a chart plotting dollars against retirement years. An indicator such as line 3480 can be positioned on diagram 3478 to show the level of income that is required each year during retirement.

Figure 385:
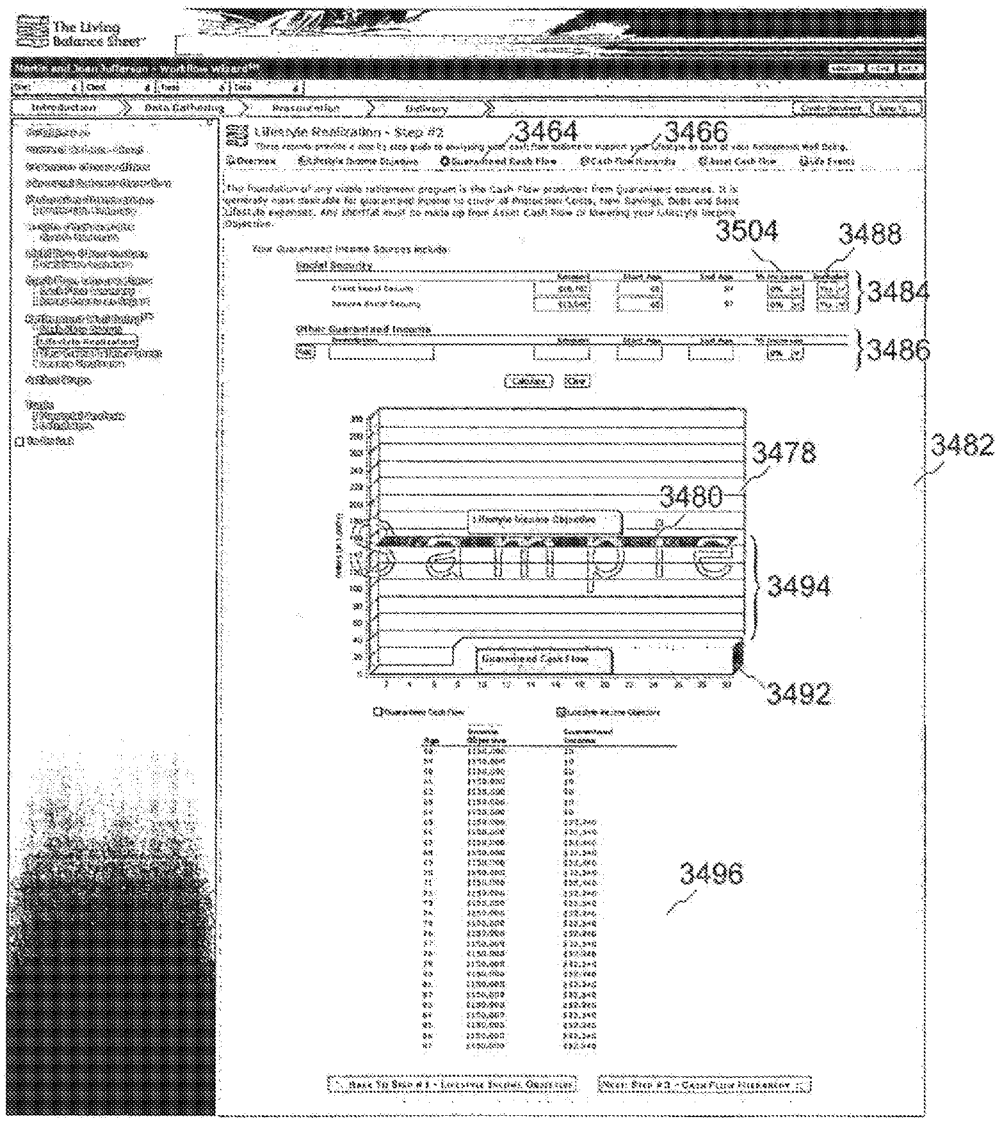

Another tool can be provided that can illustrate to a user whether the income objective is realistic based on the user's current or projected financial condition (i.e., based on fixed and guaranteed income). As shown in FIG. 384, a user can select guaranteed cash flow option 3464. The program can process the request and guaranteed cash flow page 3482 can be displayed (FIG. 385). Page 3482 can have one or more areas for inputting information about guaranteed sources of income during retirement. For example, page 3482 can have area 3484 with social security income source and area 3486 which can enable a user to add additional sources of guaranteed income (e.g., inheritance, part time job during retirement, deferred benefit plans, pension, trust income, etc.). While social security information is provided in area 3484, other guaranteed source of income can be provide in area 3484 instead of or in addition to social security. Area 3484 can have data field for entering information about social security (e.g., amount, starting age, % increase in social security). Drop-down menu 3488 can also be provide which allows a user to select whether he/she and/or the user's spouse will receive social security (by choosing "Yes") or will not receive social security (by choosing "No"). Drop-down menu 3504 can also be provided in area 3484 and/or 3486 to indicate whether there will be an increase in income. Such a tool allows a user to adjust their projected yearly living expense early on in retirement, rather than waiting until the user runs out of money.

In one scenario, a user can enter a social security amount of $18,792 with a start age of 65 and 0% increase in income and a spouse social security amount of $13,548 with a start age of 65 and 0% increase in income. Thereafter, a user can select or click a button such as calculate button 3490 and diagram 3478 can be displayed on page 3482. Indicators such as line 3480 and bars 3492 can appear on diagram 3478. Bars 3492 can be a different color than line 3480. Space or gap 3494 between line 3480 and bars 3492 can illustrate to a user the amount of money needed to meet a user's estimated yearly retirement income needs (i.e., the amount of money a user is short). Such a tool provides a user with an understanding that the user needs to plan for retirement to eliminate or reduce the space/gap and maintain the lifestyle the user is accustomed to living. In particular, such a tool illustrates the amount of income a user will need to fill the space/gap between guaranteed income and an estimated retirement income objective (i.e., the space/gap may illustrate to a user the amount of money needed to meet expected retirement needs). Alternatively, the tool can demonstrate to a user that the user will be required to live a lesser lifestyle (lower estimated retirement income) or spend down his/her assets. Instead of or in addition to the diagram, table 3496 can be provided to show retirement income objective ($150,000) and guaranteed income over each year of retirement.

Figure 386:
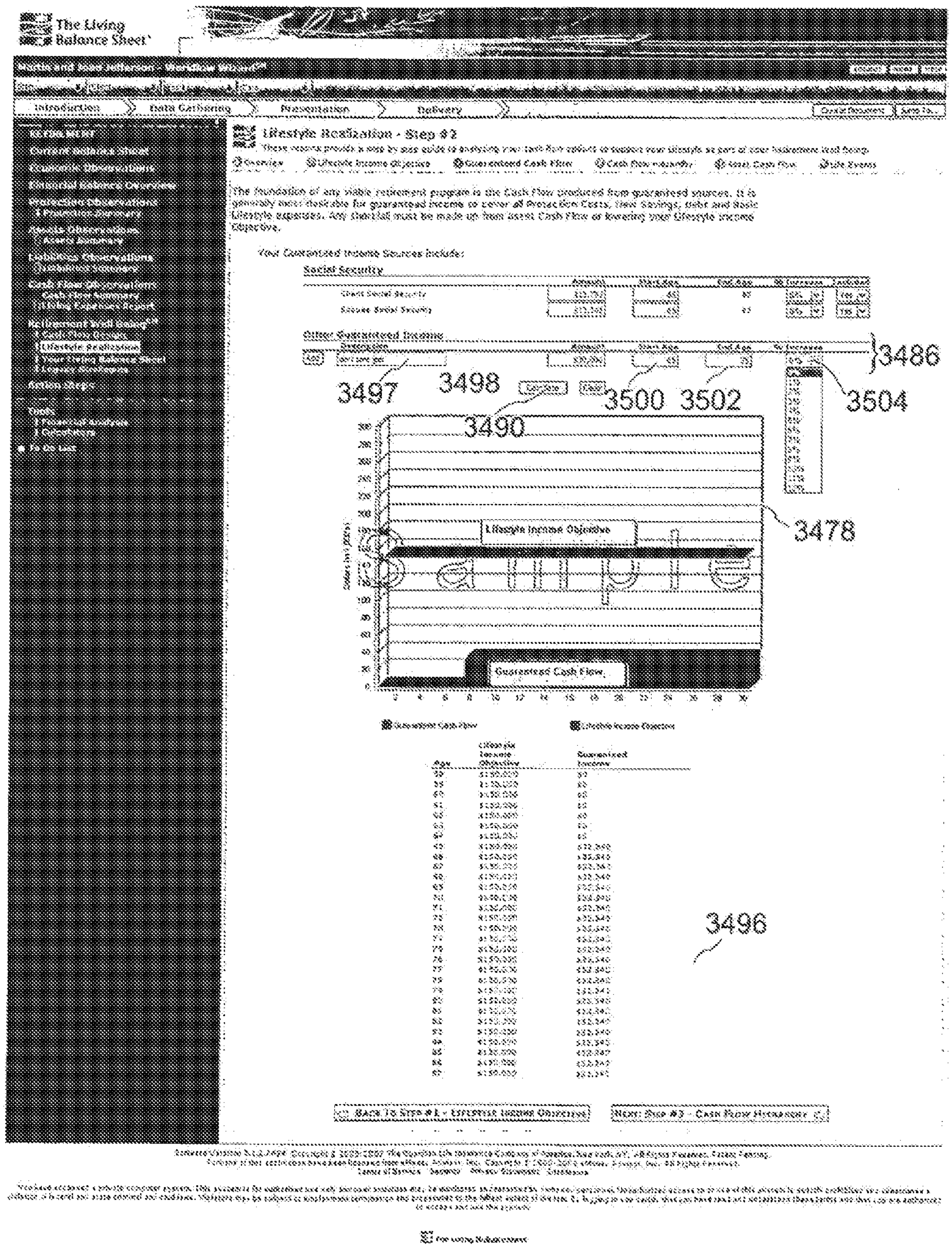
Figure 387:
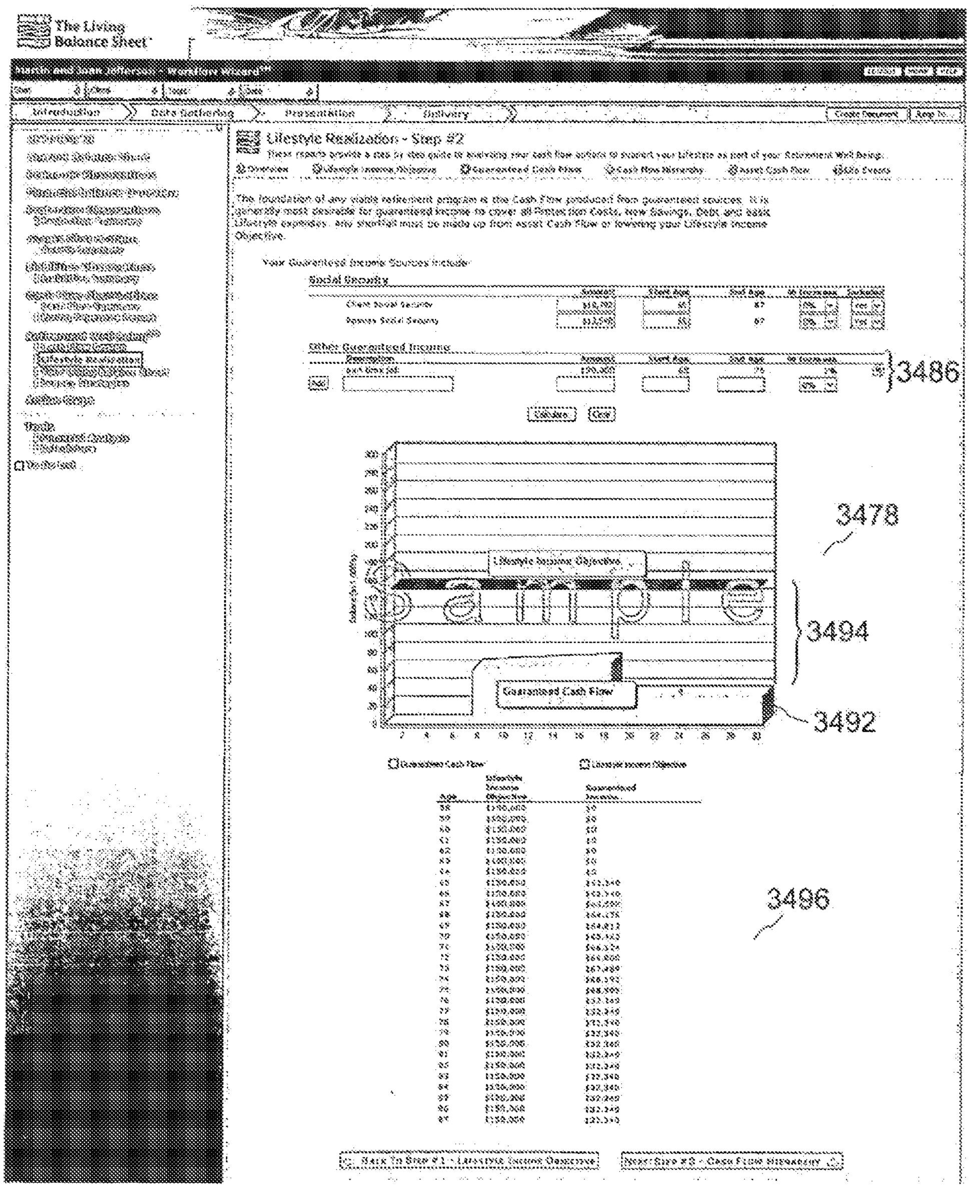

Area 3486 can provide a user with the ability to input any other type of guaranteed income in various data entry fields such as description, amount, start and end age, and percent increase in income. For example, as shown in FIG. 386, the user can enter information about a part time job. A user can enter "Part time job" in data entry field 3497, $30,000 in field 3498, a start age of 65 in field 3500, an end age of 75 in field 3502 and an increase of 2% in drop-down menu 3504. A user can select calculate button 3490 to update area 3486, diagram 3478 and table 3496 such as shown in FIG. 387. As shown in FIG. 387, area 3486 can show "Part time job," amount, start and end age and percentage increase in a fixed form. Diagram 3478 can show an increase in income from years 65 to 75 so that space 3494 is reduced in size indicating that a user is getting closer to his/her retirement income objective. Table 3496 can also show an increase in income from years 65 to 75 and indicate that a user is getting closer to his/her income objective. It will be appreciated that an unlimited number of sources of guaranteed income can also be inputted in area 3486.

Figure 446:
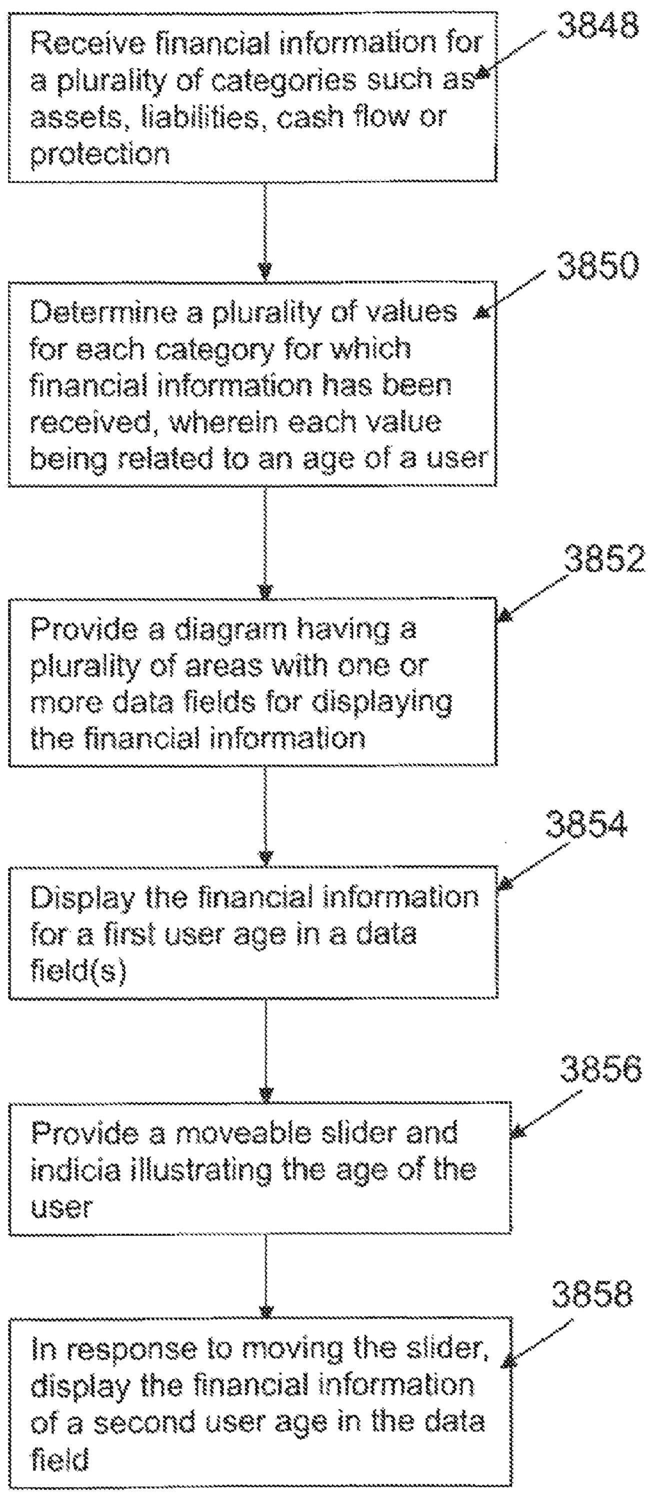

Moreover, a user can be provided with a tool to evaluate a summary of cash flow. In general, as shown in FIG. 446, financial information can be received for a plurality of categories such as assets, liabilities, cash flow or protection (step 3848). A plurality of values can be determined for each category for which financial information has been received, each value being related to an age of a user (step 3850). A diagram having a plurality of areas with one or more data fields for displaying the financial information can be provided (step 3852). The financial information can be displayed for a first user age in a data field(s) (step 3854). A moveable slider and indicia illustrating the age of the user can also be provided (step 3856). In response to moving the slider, the financial information for a second user age can be displayed in the data field(s) (step 3858).

Figure 388:
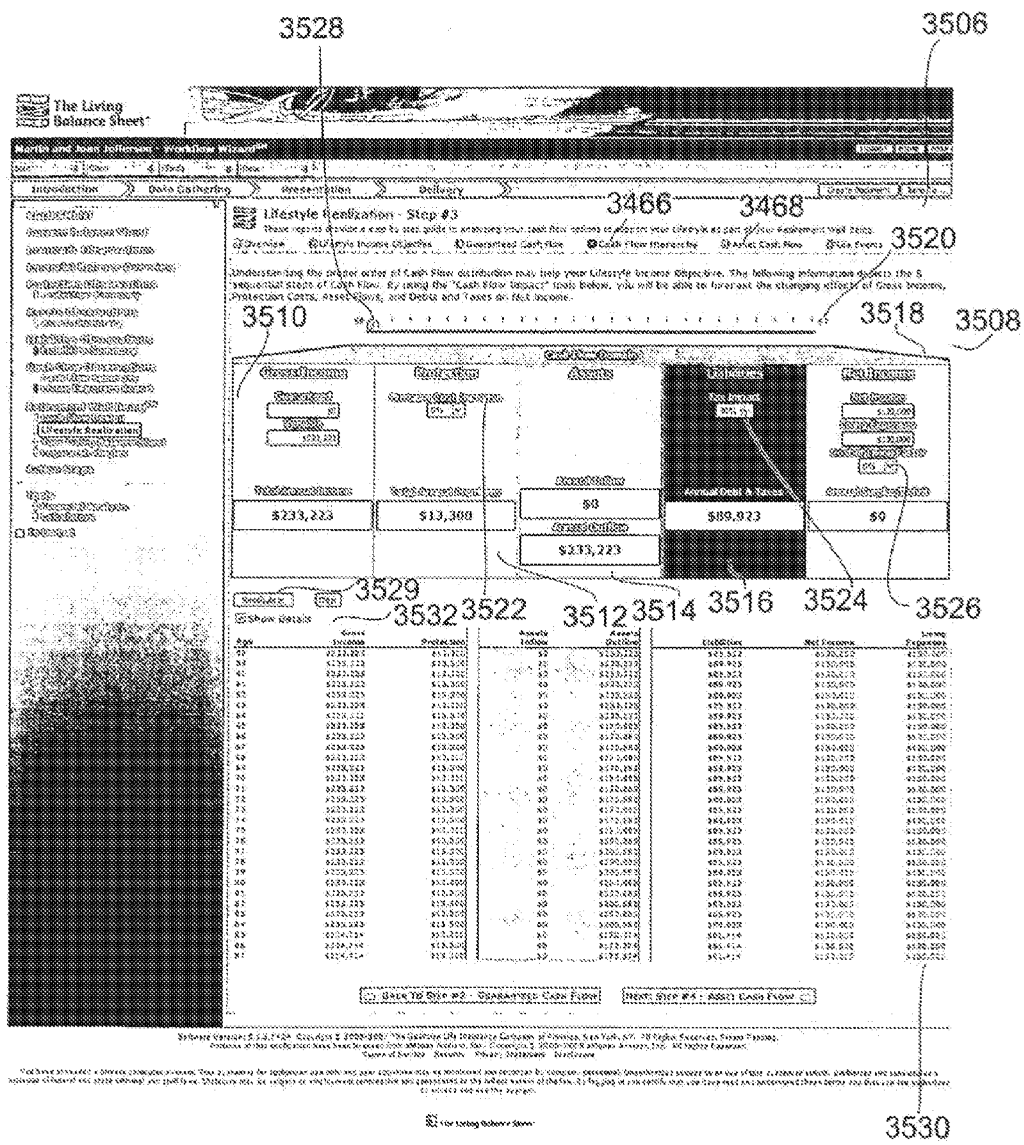

As shown in FIG. 386, a user can select cash flow hierarchy option 3466. The program can process the request and display cash flow hierarchy page 3506 as shown in FIG. 388. Page 3506 can have interactive cash flow domain chart 3508. Chart 3508 can have categories such as gross income category 3510, protection category 3512, assets category 3514, liabilities category 3516 and net income category 3518. Page 3506 can also have slider 3520 to illustrate the age for which the information contained in the chart 3508 pertains. Information in the various fields of each category can be automatically inputted by the program based on information previous entered by a user and/or agent/representative during data collection or on the guaranteed cash flow page 3482.

For example, at age 58, in gross income category 3510, guaranteed income is $0, variable income is $233,223 and total annual income is $233,223; in protection category 3512, total annual premiums (for life insurance) is $13,300; in assets category 3514, annual inflow (e.g., money from part-time job, salary) is $0 and annual outflow is $233,223 (same as variable income in category 3510 which is the amount of money one needs over and above guaranteed income); in liabilities category, annual debt & taxes is $89,923; and in net income category 3518, net income is $130,000, living expenses are $130,000 and annual surplus/deficit is $0. Chart 3508 can also be provided with user editable data entry fields such as data entry field 3522, 3524 and 3526. Chart 3508 can unbundle various liabilities such as insurance cost increases, tax impact and cost of living factor so that different percentage can be imputed. Data entry field 3522 can be used to change cost of premium increases; data entry field 3524 can be used to change tax impact (tax rate); and data entry field 3526 can be used to change increase in cost of living factor (e.g., inflation) so that a user can study the affects of these changes on gross income, protection, assets, liabilities and net income. If a user changes any one of data entry fields 3522, 3524, 3526, a button such as recalculate button 3529 can be provided so that the program can update values for each year for chart 3508 and table 3530.

Figure 389:
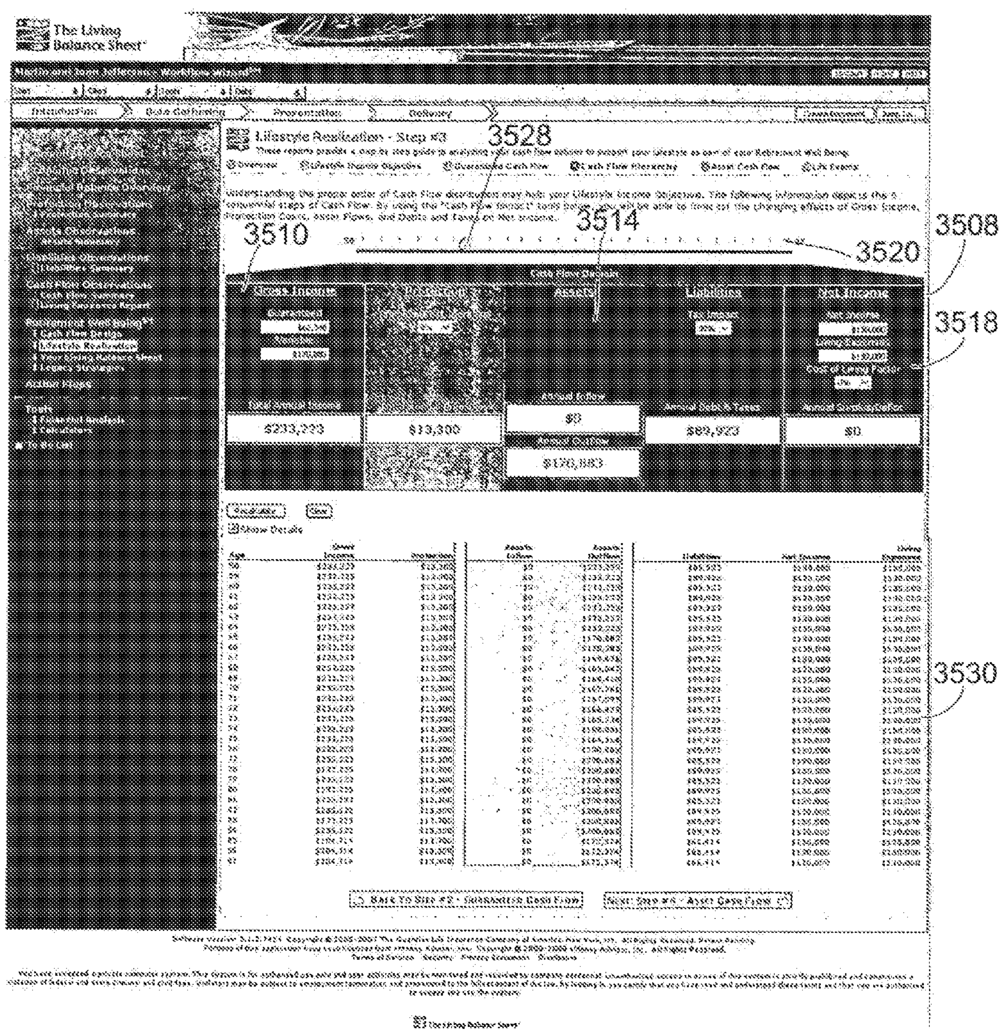

Table 3530 can be provided to show one or more of the various factors from the data entry fields for one or more category such as gross income, protection, assets inflow, assets outflow, liabilities, net income and living expenses for each year of retirement. It should be noted that table 3530 can be hidden by selecting area 3532 so that only chart 3508 appears on page 3506. As a user selects and drags pointer 3528 of slider 3520, all fields in categories 3510, 3512, 3514, 3516, 3518 can be changed from year to year. For example, as shown in FIG. 389, if a user moves pointer 3528 of slider 3520 to age 65, chart 3508 can show gross income is $233,223, asset outflow is $170,883 (which is the same as variable income in gross income category 3510), and liabilities are $89,923. Chart 3508 can also show net income and living expenses remain at $130,000, protection remains at $13,300, and asset inflow remains at $0. Chart 3508 now shows that guaranteed income in the gross income category, which comes from social security income inputted in area 3484 and part-time job inputted in area 3486 of guaranteed cash flow page 3482, is $62,340. Even though asset outflow falls to $170,883, gross income is $233,223 factoring in social security income of $32,340 starting at age 65. Gross income less the amount of expenses (protection, asset outflow, liabilities and living expenses) equals net income. Ideally, if gross income only includes guaranteed income, net income should equal $0. If expenses are greater than guaranteed income, a user will have to take money from his/her assets/savings (i.e., a user will need variable income). So, a user will need to have a considerable amount of savings to last through retirement.

It will be appreciated that, in a preferred embodiment, annual outflow of assets category 3514 is the same as variable income as shown in gross income category 3510. Annual outflow is the desired amount of retirement income to meet a user's retirement objectives. The program can calculate gross income as annual outflow (or variable income) plus guarantee income; and net income as total annual income minus total annual premiums minus annual debt & taxes. Asset outflow and liabilities can change from year to year based on information previously entered by the user during data collection.

As illustrated in FIG. 389, it should also be noted that the values displayed in the fields of chart 3508 can correspond to the value in table 3530 for the particular year being analyzed—in this case, age 65. So, as a user scrolls through various ages during retirement using pointer 3528, the information in table 3530 for a particular year is displayed in the fields in chart 3508. In a preferred embodiment, annual inflow of assets category 3514 and annual surplus/deficit of net income category 3518 can remain at $0 during retirement to show a user is using all of his/her money during retirement, not adding to his/her assets and that net income and living expense should balance each other out so that the user has $0 annual surplus/deficit.

Figure 447:
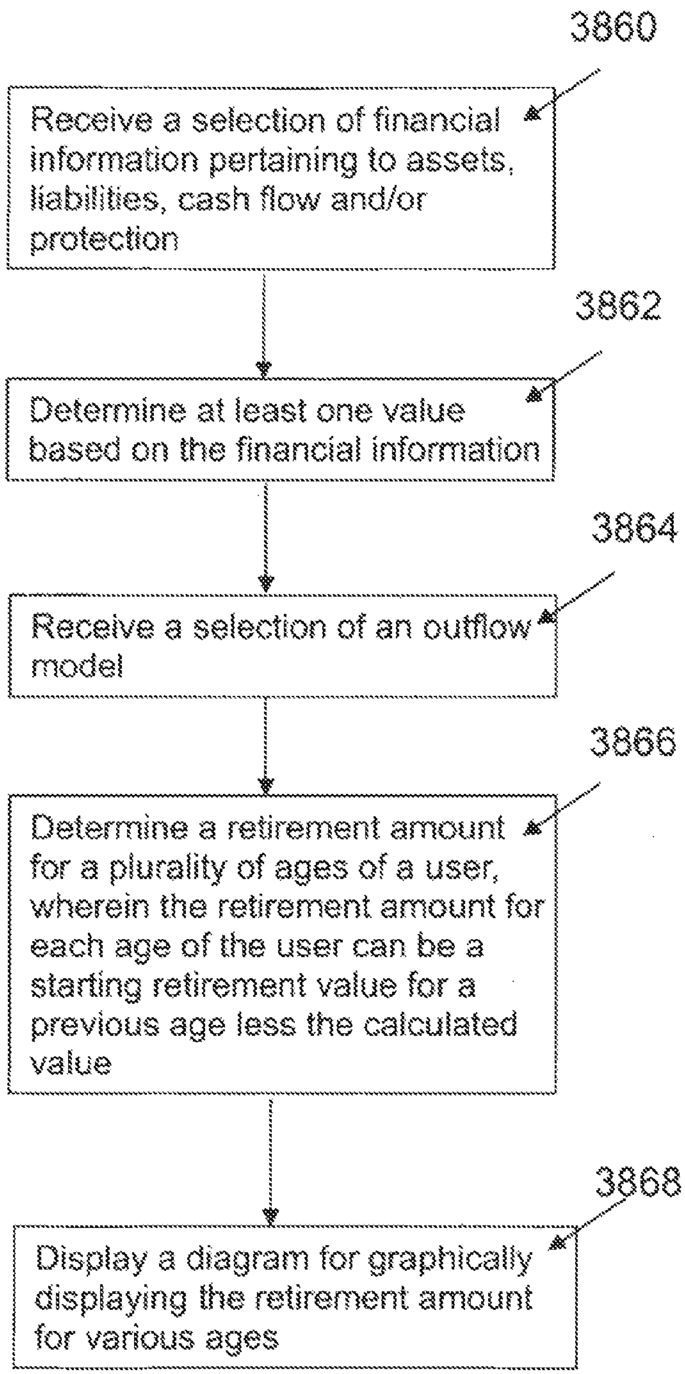

The program can provide a tool for showing a user the effect of divesting assets during retirement (taking retirement income from assets). In particular, such a tool can illustrate that if a user is required to live off his/her asset with no outside income, the user may prematurely deplete his/her assets (i.e., before death). In general, as shown in FIG. 447, a selection of financial information pertaining to assets, liabilities, cash flow and/or protection can be received (step 3860). At least one value (which can include an outflow amount) can be determined based on the financial information (step 3862), and a selection of an outflow model can be received (step 3864). A retirement amount can be determined for a plurality of ages of a user, the retirement amount for each age of the user can be a starting retirement value for a previous age less the calculated value (step 3866). A diagram can be displayed for graphically displaying the retirement amount for various ages (step 3868). The diagram can have a first area of positive outflow and a second area of negative outflow.

Figure 390:
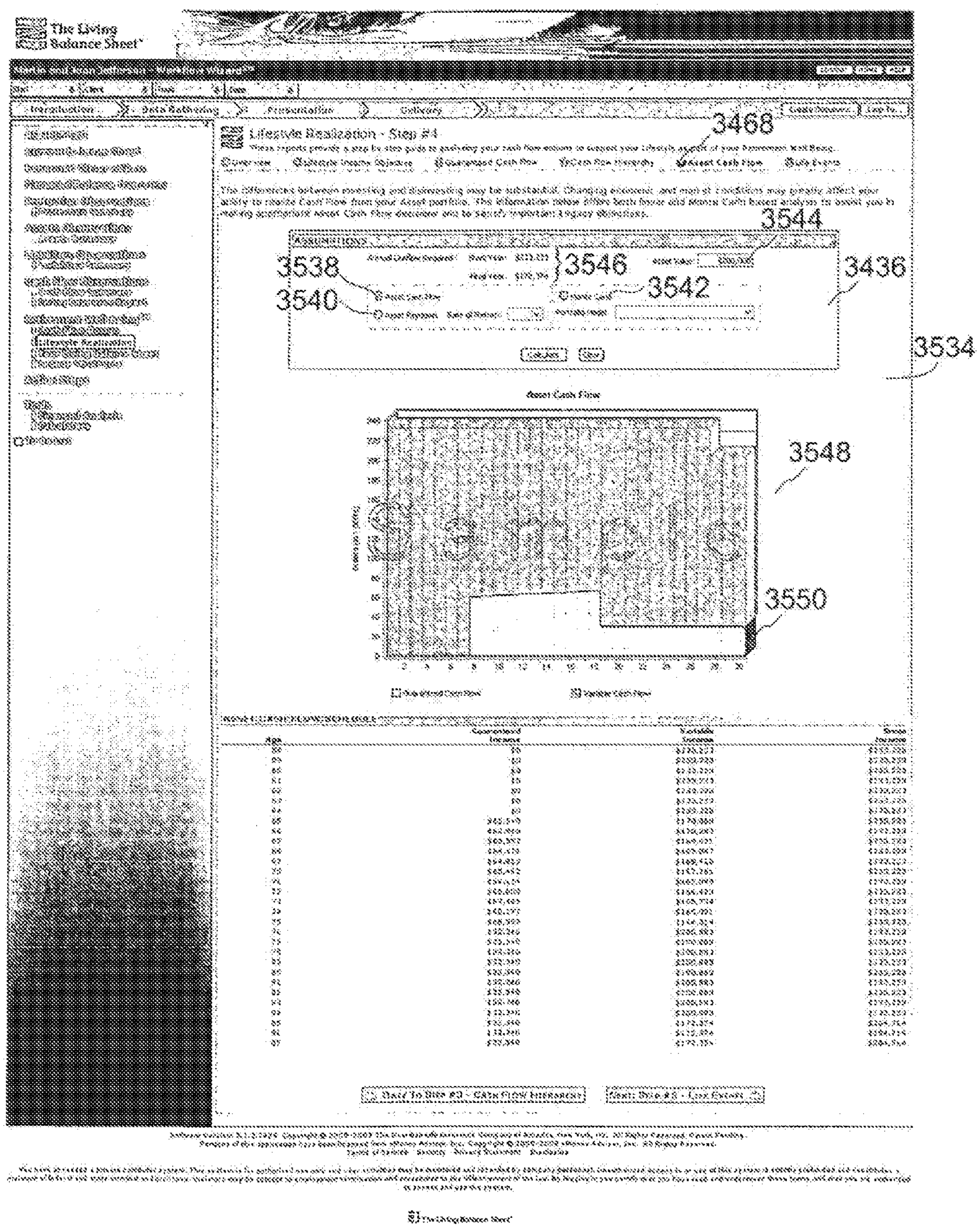

As shown in FIG. 388, a user can select asset cash flow option 3468. The program can process the request and display page 3534 (FIG. 390). Page 3534 can provide a tool to demonstrate asset flow when the user is divested of his/her assets during retirement. Page 3534 can have assumption field 3436 which can have asset value data entry field 3544 as well as asset cash flow option 3538, asset paydown option 3540 and Monte Carlo option 3542. In a preferred embodiment, an area such as area 3546 can be provided to illustrate annual outflow required for the start (first) year of retirement and/or the final (last) year of retirement. For example, as shown in FIG. 390, start year annual outflow can be $233,223 and final year annual outflow can be $172,374. The annual outflow can be the same as that provided on page 3506.

If the user selects asset cash flow option 3538, graph 3548 can be displayed on page 3534. Graph 3548 can show asset cash flow during retirement and, in particular, guaranteed cash flow and variable cash flow. In an embodiment where the graph is a bar graph, the portion of the bar that is variable cash flow can be represented by one color and the portion of the bar that is guaranteed can be represented by another, different color. The graph can track the cash flow information, specifically, gross income (total annual income) provided as shown in table 3530 of page 3506. Guaranteed cash flow area 3550 can be similar to guaranteed cash flow bars 3492 in FIG. 387. The monetary values for bars 3492 can come from areas 3484 (social security) and/or 3486 (other guaranteed income) of page 3482 (FIG. 385).

Figure 391:
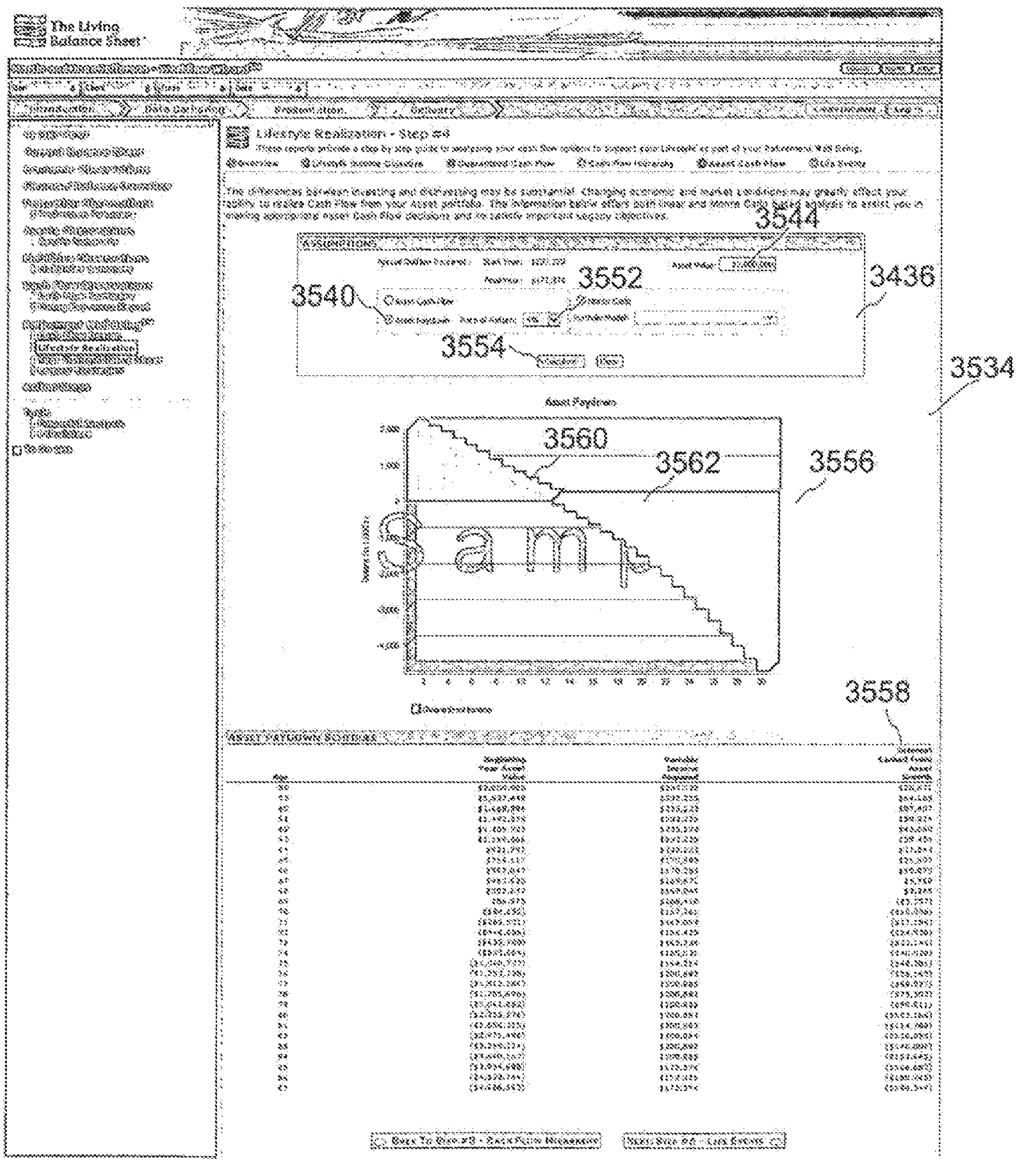

Alternatively, as shown in FIG. 391, a user can select asset paydown option 3540 and enter an asset value (e.g., $2 million) in data entry field 3544 of assumption field 3436 and an annual rate of return (interest rate) in drop-down menu 3552 (e.g., 4%). A user can select or click a button such as calculate button 3554 such that graph 3556 and/or table 3558 appears on page 3534. With an asset of $2 million and assets outflow shown in FIG. 388 and table 3558 of FIG. 391, at a 4% interest rate, graph 3556 and table 3558 illustrates to a user that the user will deplete his/her assets by year 12. In particular, graph 3556 can have area 3560 which can show the depletion of assets up to $0. Area 3562 can also be provided to show when a user's assets drop below $0. Area 3560 can be a first color (e.g., green) and area 3562 can be a second, different color (e.g., red) to provide a visual illustration to a user of when the user has depleted assets. Table 3558 can show a negative asset value by parenthesis around monetary values. Moreover, graph 3556 (area 3562) and table 3558 can illustrate how the user will be considerably below the value of his/her assets during retirement. Such a tool can show a customer that they will not have enough to make it through retirement.

Figure 392:
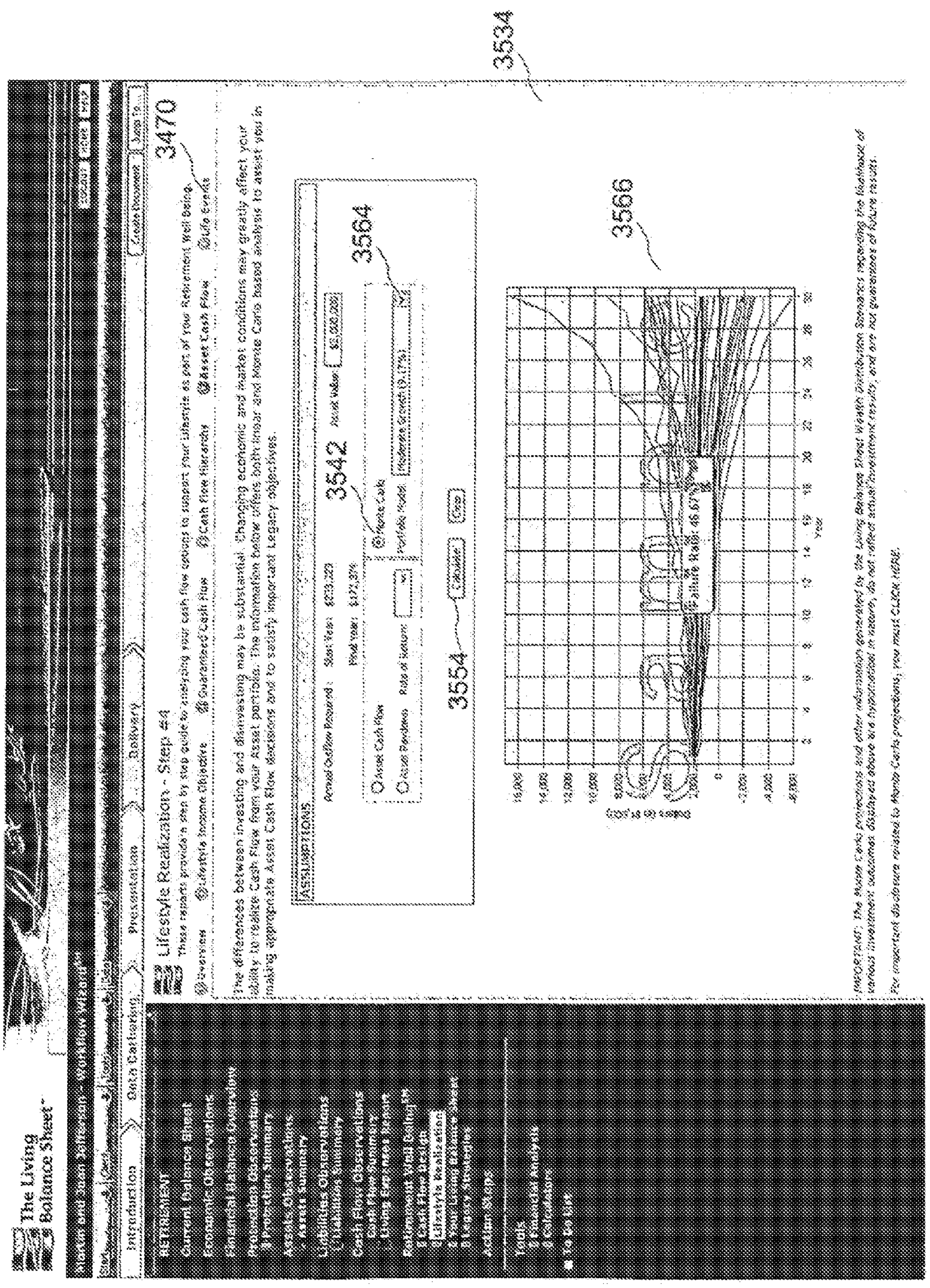

Furthermore, as shown in FIG. 392, a user can select Monte Carlo option 3542 and an interest rate based on an investment strategy/model in drop-down menu 3564. For example, a rate of 9.17% for a moderate growth strategy/model can be selected. The Monte Carlo tool can function the same way as the Monte Carlo tool of FIGS. 236-239. Calculate button 3554 can then be selected and graph 3566 can be displayed on page 3534. Even at an interest rate of 9.17%, such a tool shows a user that a $2 million asset will be depleted 46.67% of the time. At higher interest rates, the failure rate is less. For example, investing in ultra aggressive growth funds with returns of 10.07%, the failure rate would be less than 46.67%. Alternatively, should a more conservative portfolio model be selected, it will be appreciated that the failure rate could be 0%. Since the lifetime income objective line is driven up by increase in liabilities such as cost of living expenses, inflation, etc., a user needs to take money out of savings and/or get a higher rate of return. Thus, asset cash flow page 3534 illustrates to a user the need for money management (working with a financial consultant) during retirement to ensure a user earns the highest level of interest (highest rate of return) at a risk level that is comfortable to the user.

Figure 393:
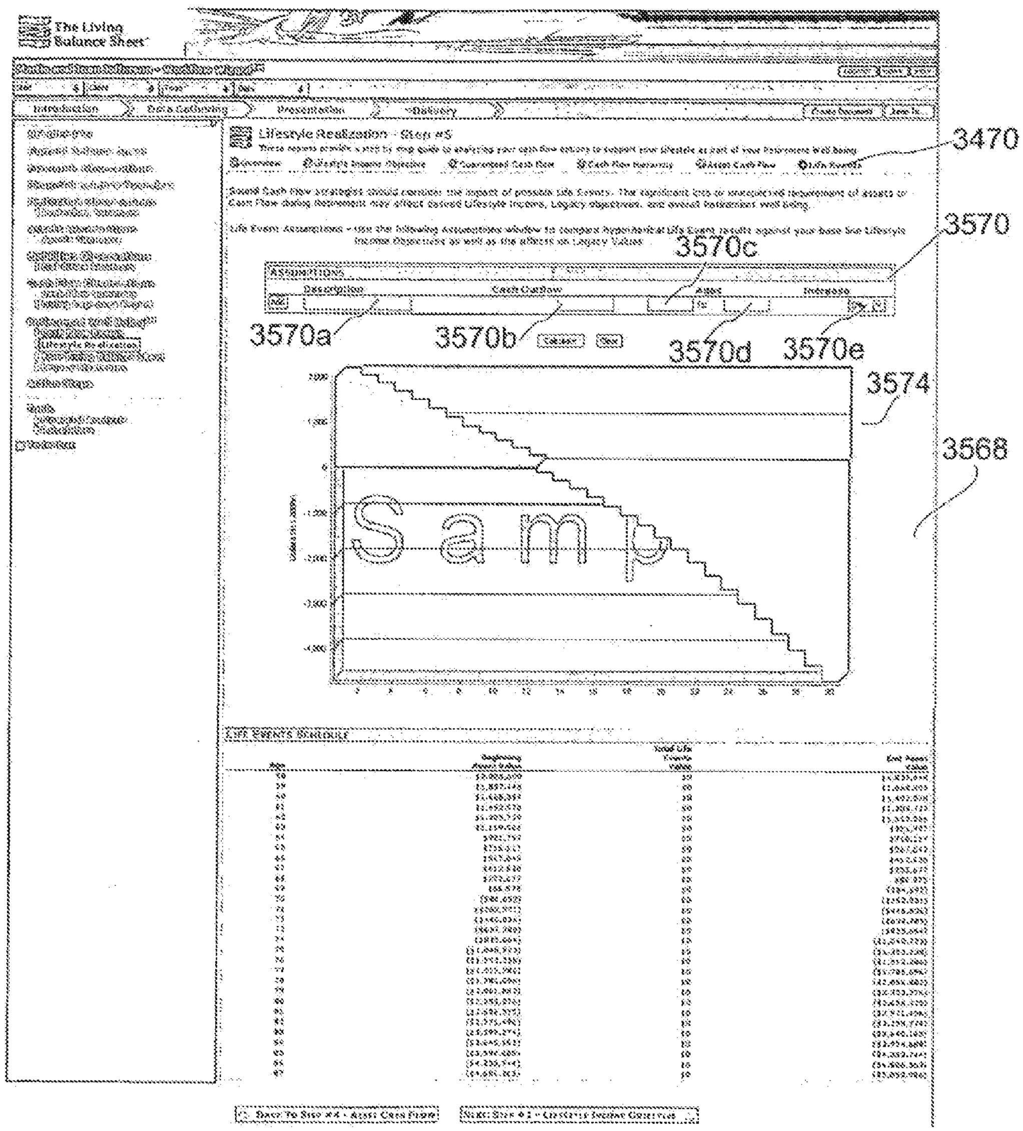
Figure 394:
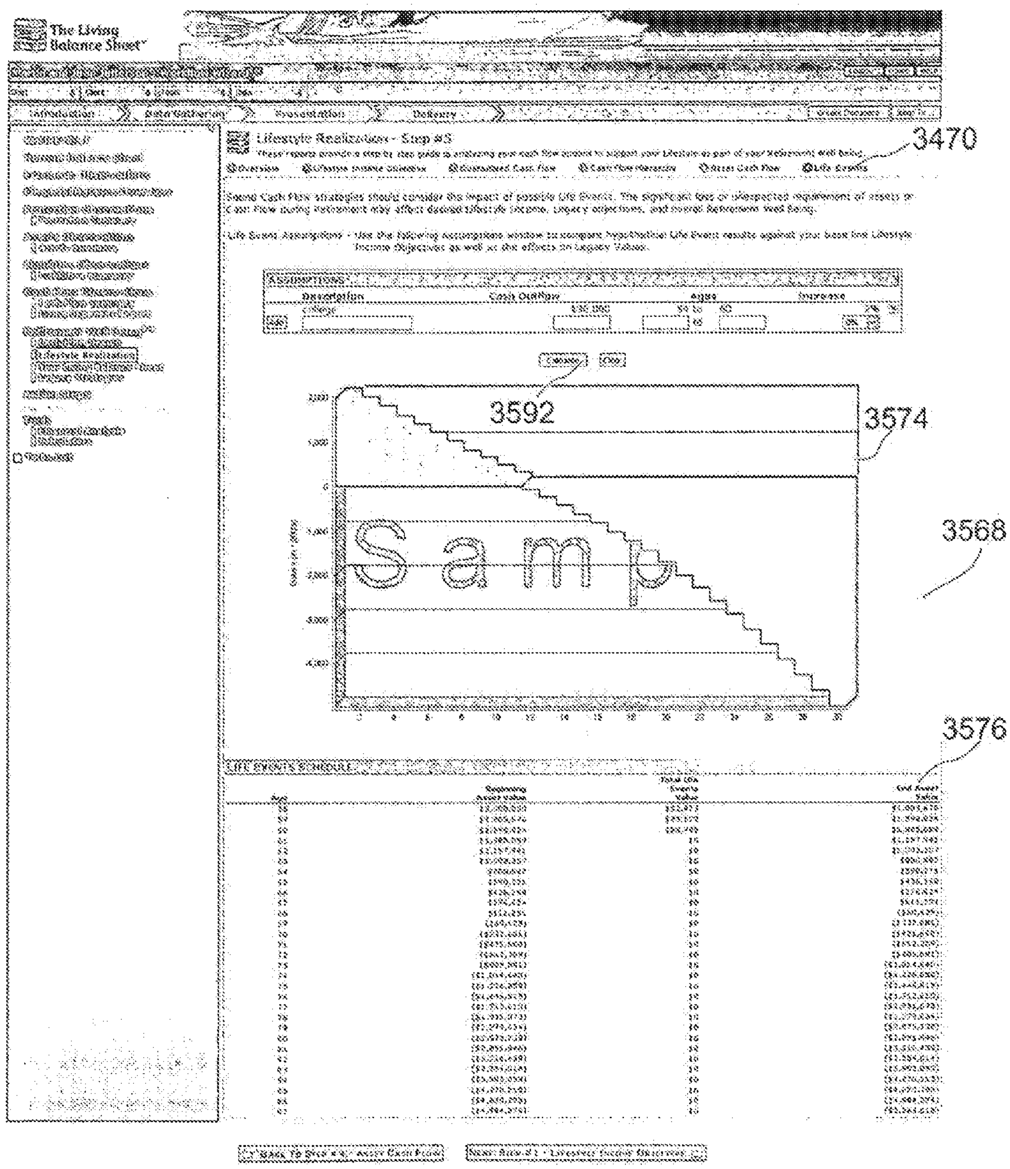

As shown in FIG. 392, a user can select life event option 3470. The program can process the request and display page 3568 (FIG. 393). Assumptions field 3570 can be provided on page 3568. Page 3568 can provide tool to show a user that unexpected life events can increase the rate at which a user spends down his/her assets and throw off desired retirement goals. For example, assumptions field 3570 allows a user to enter an unlimited number of scenarios that may occur during retirement such as the need for a new car, illness, college, weddings, home repairs, nursing home, assisted living, lawsuit payout may also be inputted. Assumptions field 3570 also allows a user to enter the expense of the event as well as ages through which the event runs (one year or multiple years)—a car can be a one year expense whereas illness or college can be an expense over multiple years. As shown in FIG. 393, a user can enter a description of the life event in field **3570*a*, the amount of money/expense of the life even in field 3570*b*, start age in field 3570*c*, end age in field 3570*d* and a yearly percentage increase in the expense in filed 3570*e*. The starting $2 million asset value can come from the amount entered in field 3544 (FIG. 391) and annual outflow can come from table 3530 in FIG. 388. As shown in FIG. 394, a user can enter information related to college expenses. Once a user enters the information, calculate button 3592 can be selected and a graph 3574 and/or table 3576 can be displayed. In a scenario where a person pays for 6 years of college towards the beginning of retirement, such an expense can cause a user to run out of money in year 11 as compared to year 12 as shown in graph 3556 and table 3558 of FIG. 391**.

Figure 450:
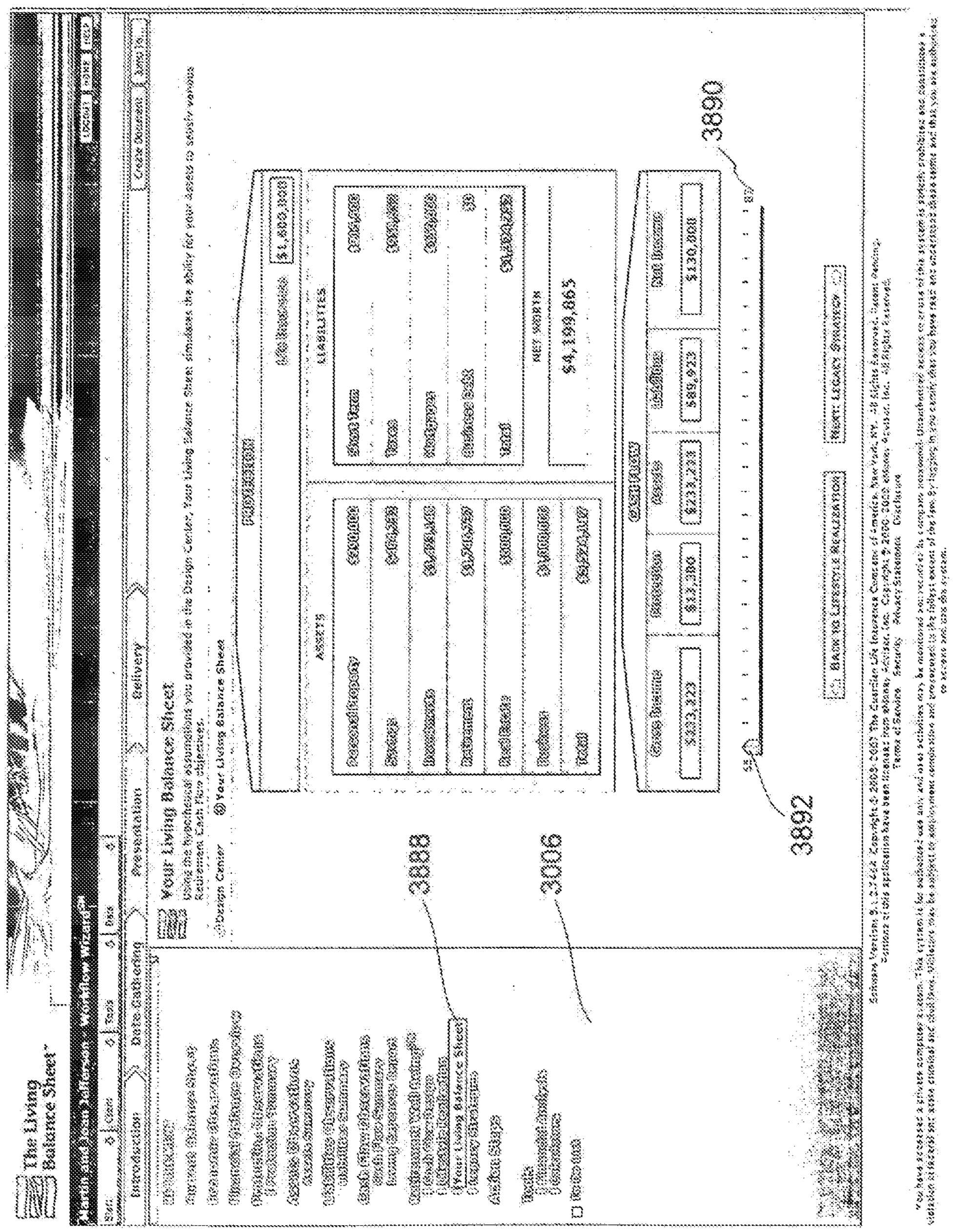
Figure 451:
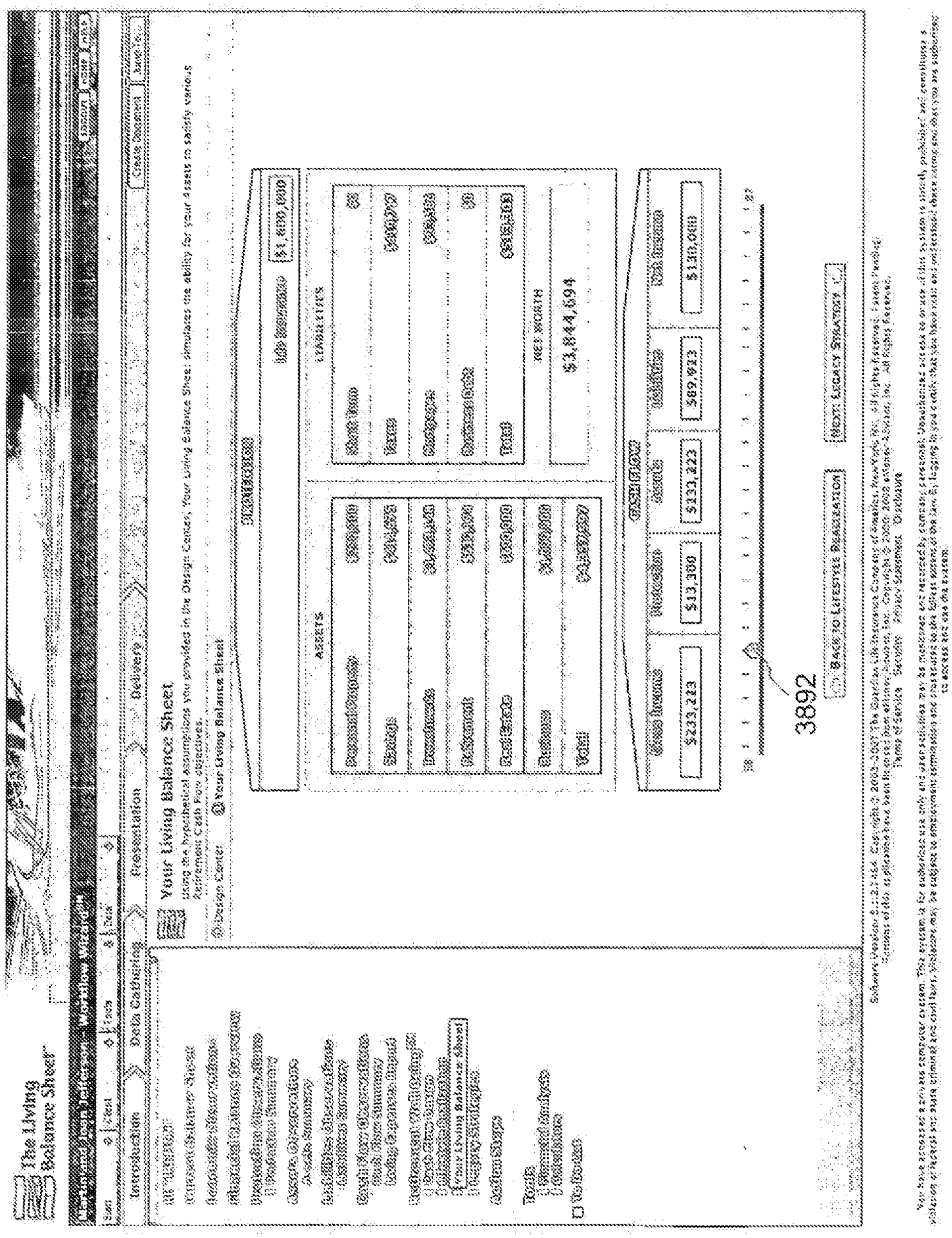
Figure 452:
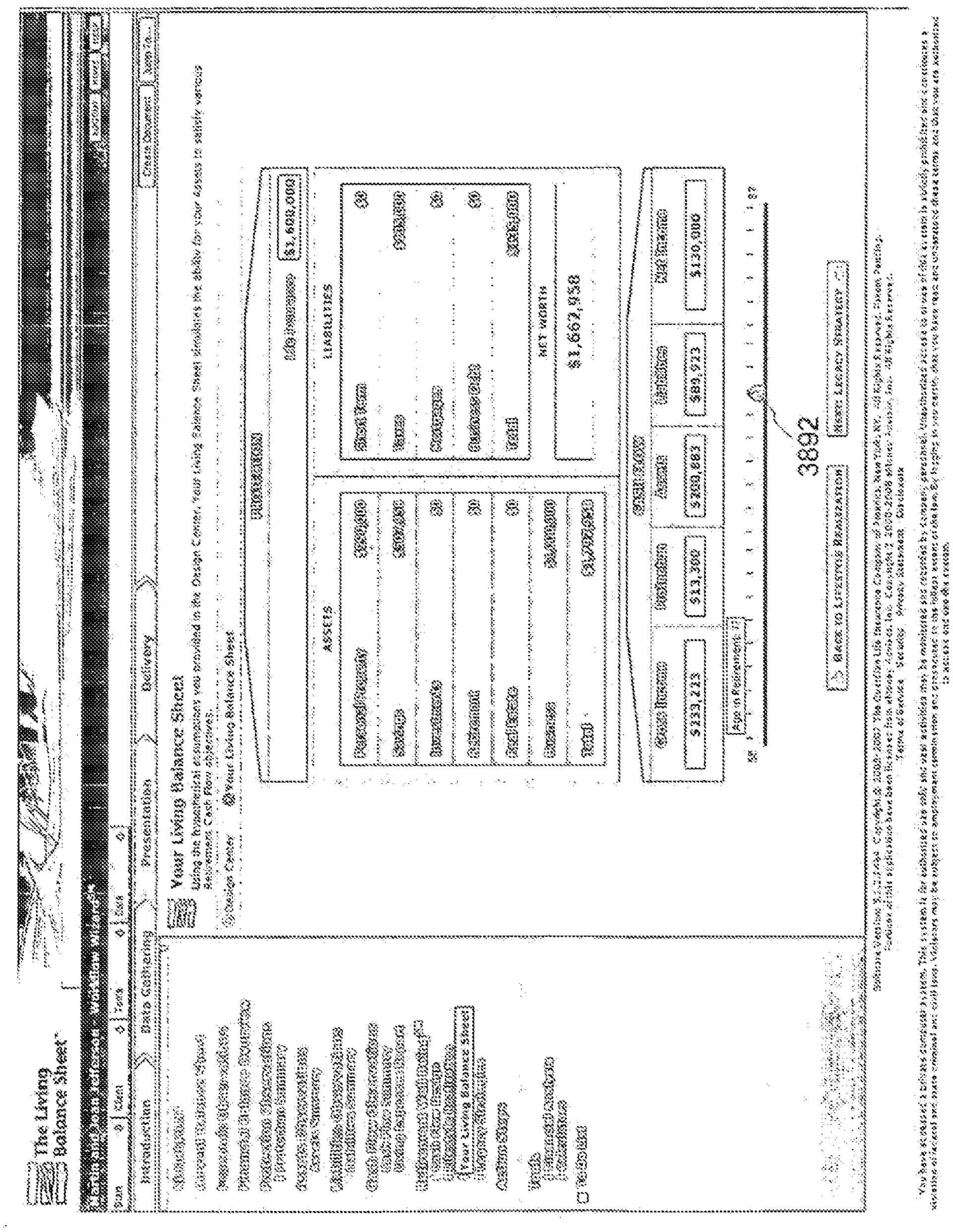

A user can be provided with a tool illustrating all aspects of the user's finances. As shown in FIG. 450, a user can select Your Living Balance Sheet® link 3888 from Retirement Well Being® category in list of options field 3006. Such a tool shows a user how his/her assets, liabilities and cash flow change throughout retirement. Slider 3890 can be provided which shows the age of the user. Pointer 3892 can also be provided and can moved by the user along slider 3890. As shown in FIGS. 450-452, as pointer 3892 moves along slider 3890, various sub-categories under assets, liabilities and cash flow can change, illustrating a change in a user's finances over time (e.g., during retirement). For some user's protection information (e.g., the amount of a life insurance policy) and net worth may also change over time. It will be appreciated that the information which forms the basis of the values of the sub-categories can come from up-to-date information. For example, the system can constantly aggregate information about a user's finances (e.g., mortgage and credit card debt, stocks, bonds, mutual funds, 401K) from various companies and/or reporting agencies. Such a system can provide a user with an accurate picture of his/her finances on a daily basis.

Figure 395:
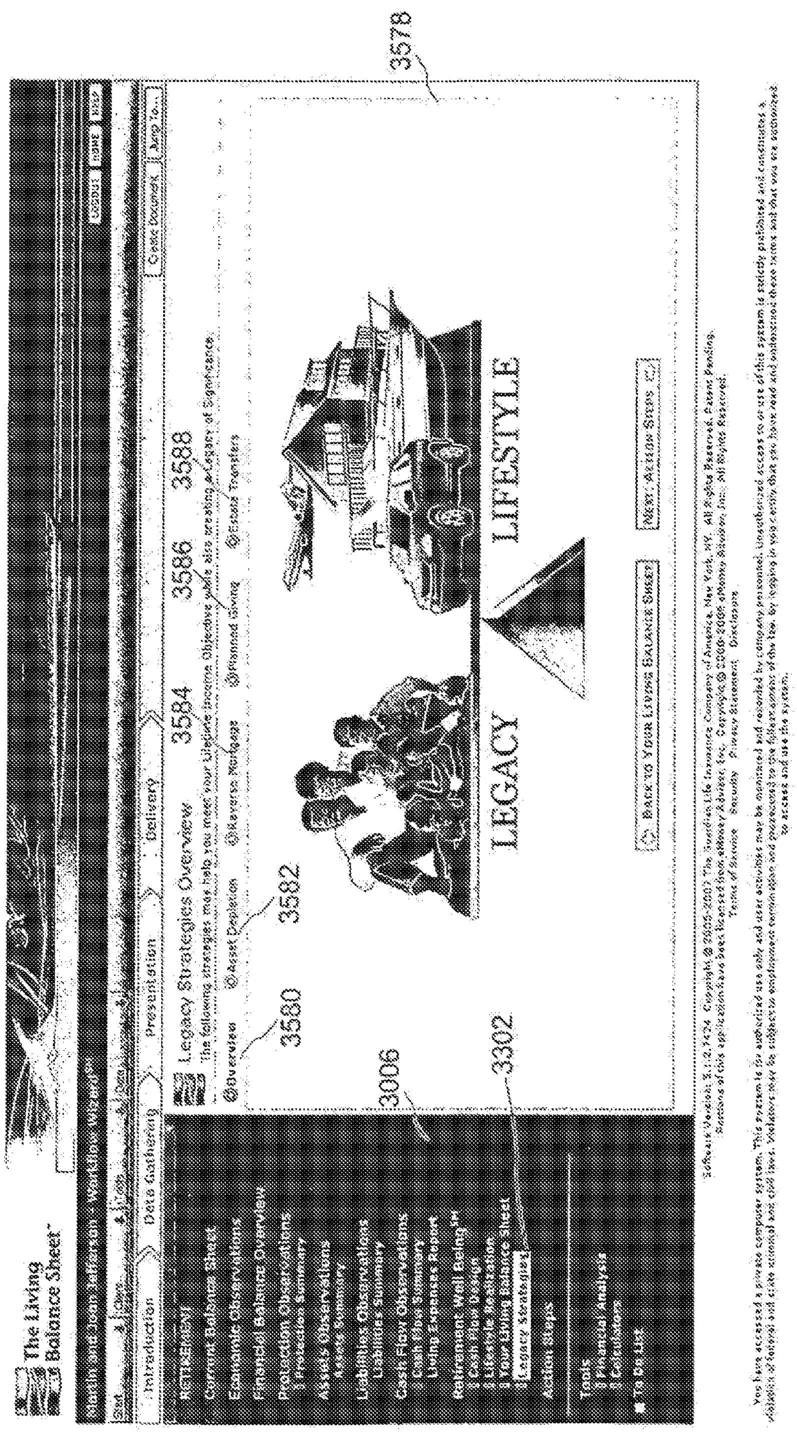

Furthermore, a user can be provide with a tool for understanding estate planning strategies. As shown in FIG. 395, a user can select legacy strategies link 3302 from Retirement Well Being® category in list of options field 3006. Such a link provides a user with tools to help plan estate strategies and, in particular, help a user to make changes in estate planning strategies earlier rather than later. Upon selection of link 3302, the program can process the request and overview page 3578 can be displayed. A list of options can be provided such as overview option 3580, asset depletion option 3582, reverse mortgage option 3584, planned giving option 3586, and estate transfer option 3588. The list of options can be stationary such that as options are selected and different pages associated with the option is displayed, the list of options remain in the same place on the page. Overview page 3578 can have a graphic such as shown in FIG. 395.

Figure 396:
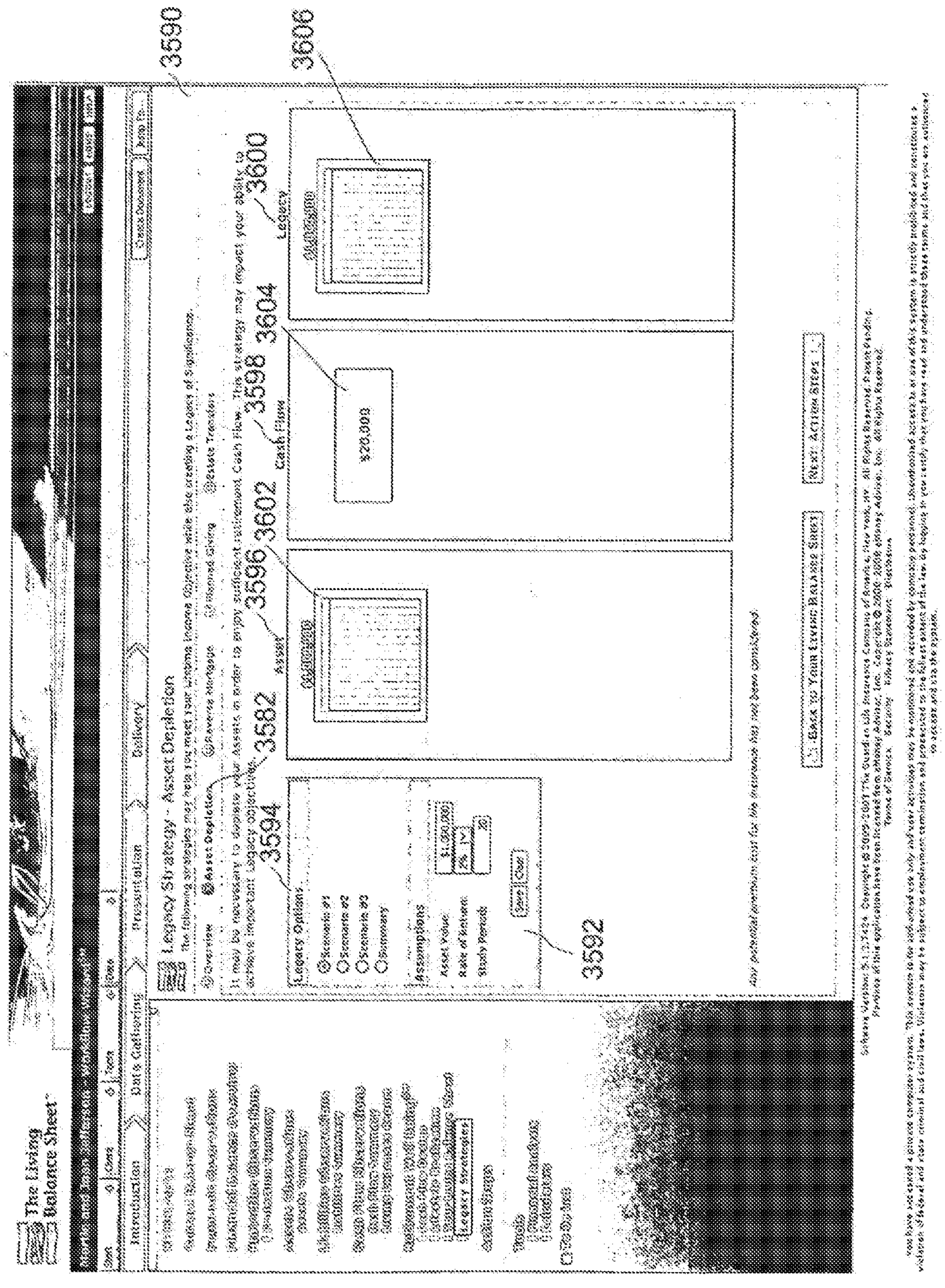
Figure 448:
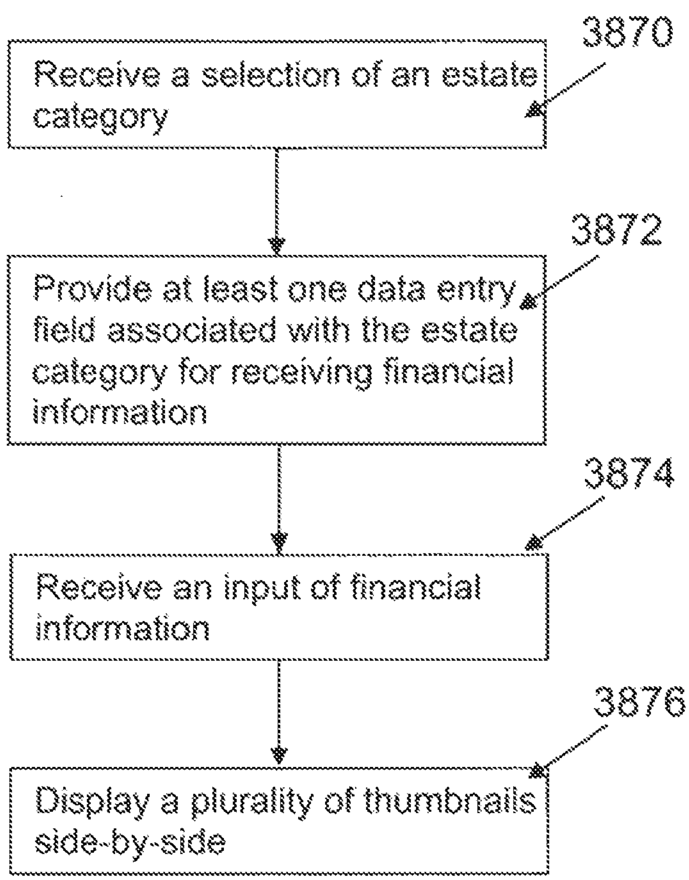

A user can select asset depletion option 3582 (FIG. 395). The program can process the request and display page 3590 as shown in FIG. 396. Such a tool can provide a user with an illustration of how to deplete (live off of) assets during retirement and still provide for the user's legacy. In general, as shown in FIG. 448, a selection of an estate category can be received (step 3870). At least one data entry field associated with the estate category can be provided for receiving financial information (step 3872). An input of financial information can be received (step 3874). A plurality of thumbnails can be displayed side-by-side (step 3876). Each thumbnail can represent an estate planning strategy for the selected estate category based on the financial information, and can include a monetary value and/or a representation of financial information.

Page 3590 can have assumptions field 3592 which can have fields for inputting, for example, asset value, rate of return (interest rate) and study period. Legacy option field 3594 can also be provides to illustrate a number of scenarios and/or a summary to a user. A user can input information in assumptions field such as an asset value of $1 million, a 2% rate of return and a study period of 20 years. If a user selects Scenario #1, a diagram can be presented. The diagram can have asset column 3596, cash flow column 3598 and legacy column 3600. Each column can have one or more thumbnails which can have graphics therein. For example, asset column 3596 can have thumbnail 3602 with a graph (e.g., a bar chart), cash flow column 3598 can have thumbnail 3604 with a monetary value representing cash flow (e.g., $20,000 or 2% interest on a $1 million asset), and legacy column 3600 can have thumbnail 3606 which can be thumbnail 3602. The diagram on page 3590 can provide a user with a visual indicator of a scenario where a user has a $1 million asset, lives off interest of $20,000 per year and leaves the full $1 million to his/her legacy.

Figure 397:
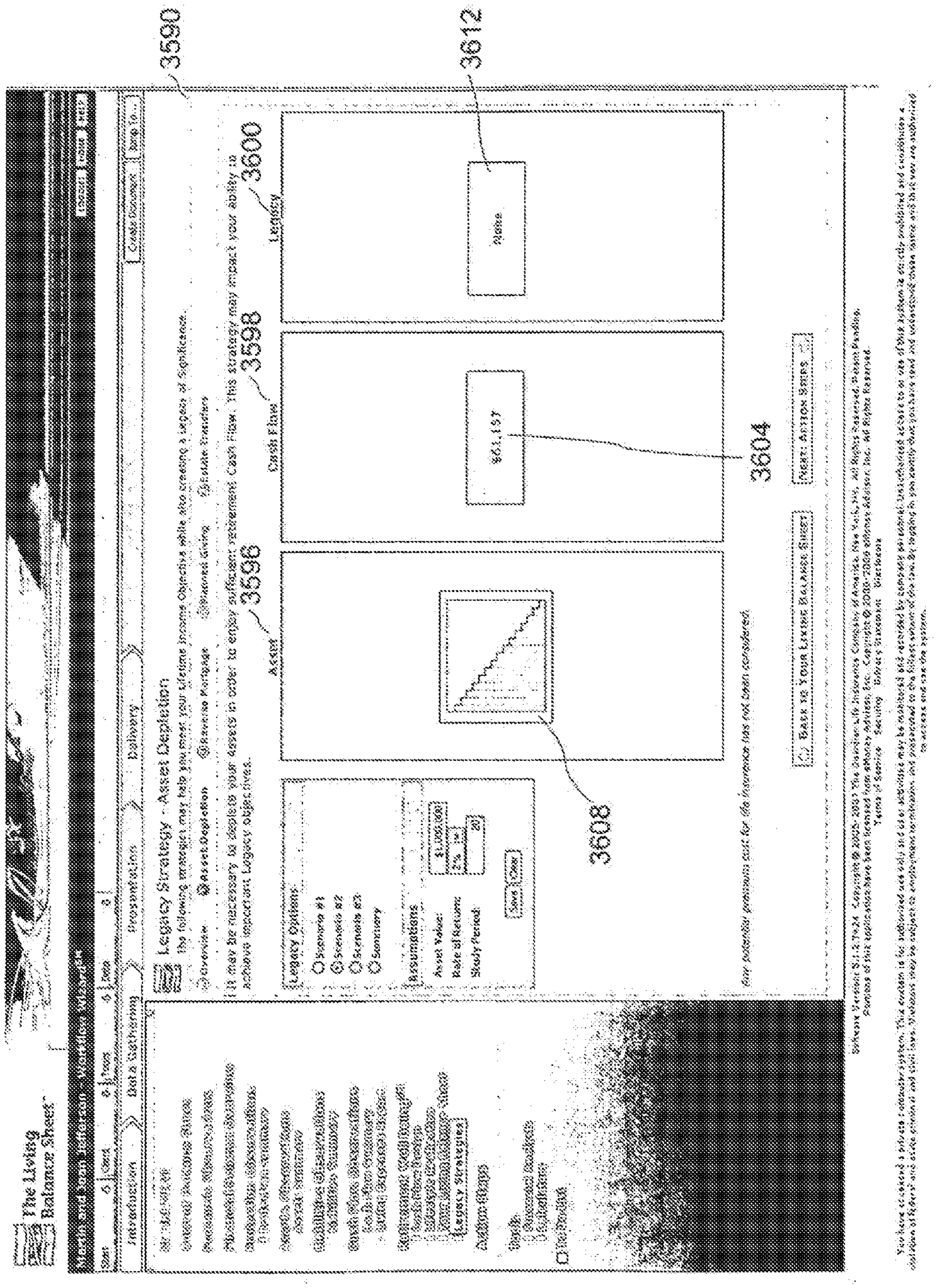
Figure 398:
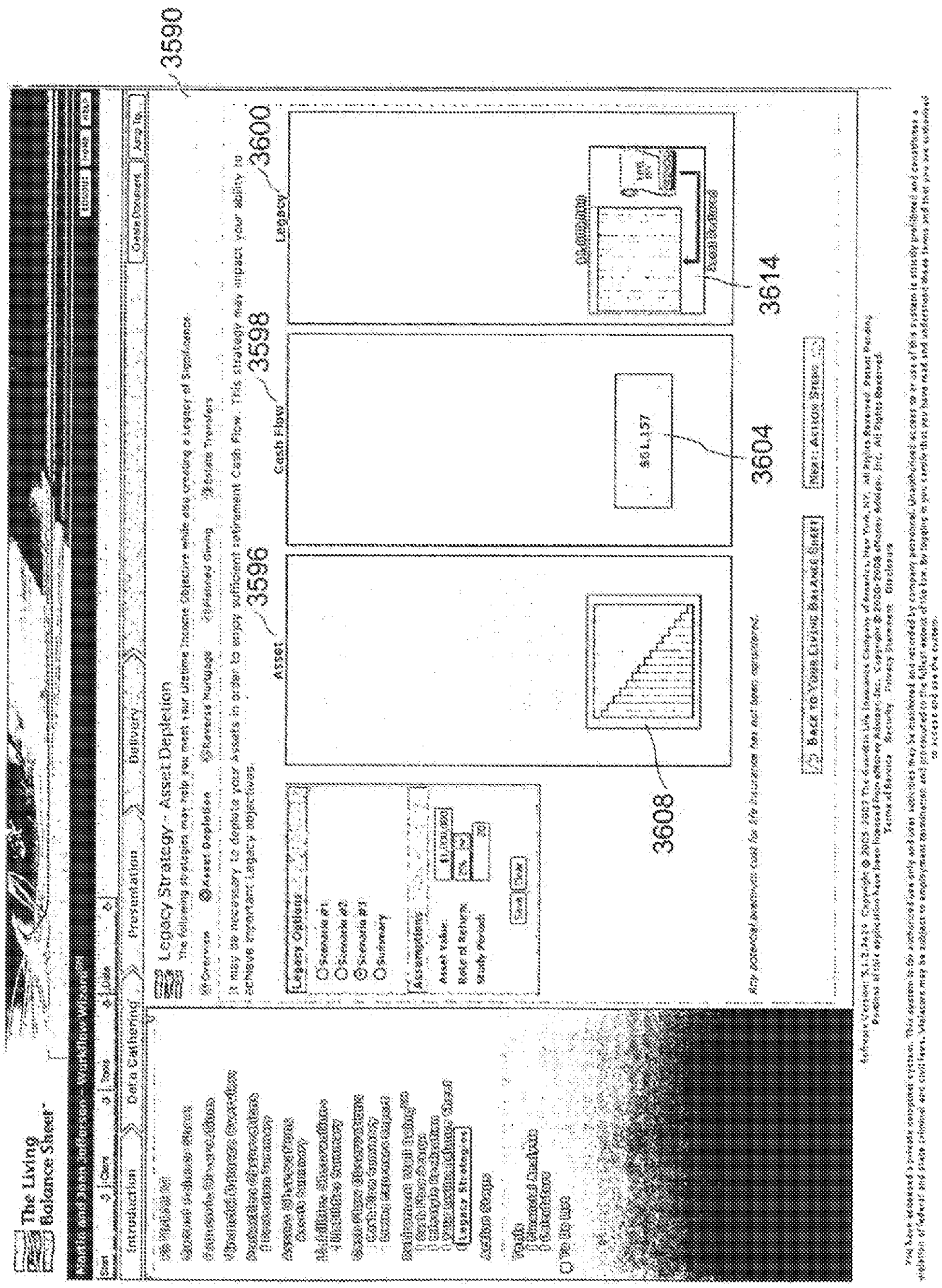
Figure 399:
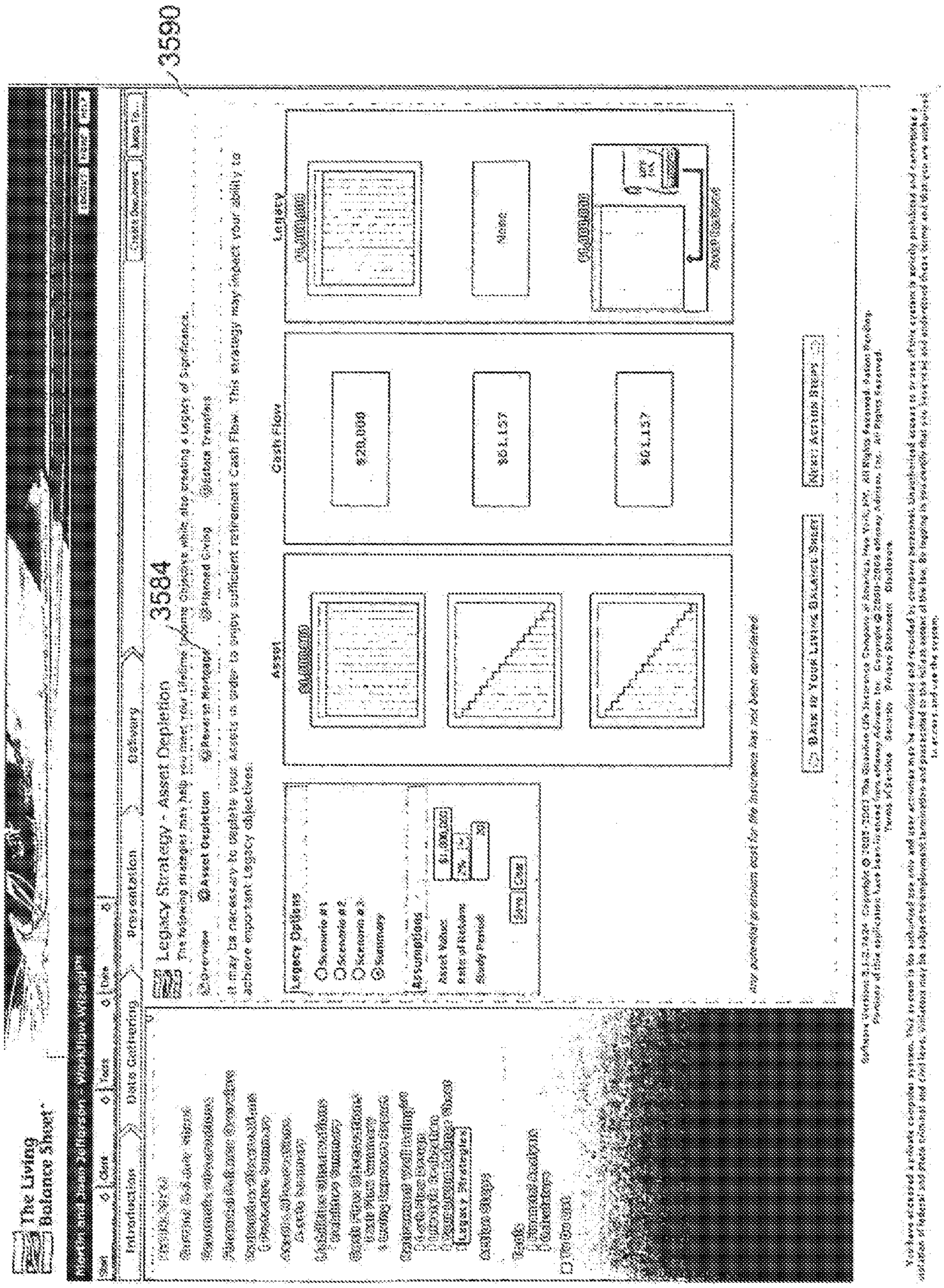

As shown in FIG. 397, if a user selects Scenario #2, asset column 3596 can have thumbnail 3608 with a graph different than the graph of thumbnail 3602 (e.g., a bar chart showing a decrease in value), cash flow column 3598 can have thumbnail 3604 with a monetary value representing cash flow (e.g., $61,157 or $1 million asset amortized over the study period), and legacy column 3600 can have thumbnail 3612 which can show no money left to legacy—$0 or "None." The diagram on page 3590 can provide a user with a visual indicator of a scenario where a user has a $1 million asset, depletes the asset during retirement by using $61,157 per year and leaves nothing to his/her legacy. As shown in FIG. 398, if a user selects Scenario #3, asset column 3596 can have thumbnail 3608, cash flow column 3598 can have thumbnail 3604 with a monetary value representing cash flow (e.g., $61,157 or $1 million asset amortized over the study period), and legacy column 3600 can have thumbnail 3614 which can show a graph and a representation of life insurance. The diagram on page 3590 can provide a user with a visual indicator of a scenario where a user has a $1 million asset, depletes the asset during retirement by using $61,157 per year and through the purchase of life insurance with $1 million death benefit provides a $1 million to his/her legacy (to substitute for the $1 million asset that was depleted). As shown in FIG. 399, if a user selects the summary option, the diagram on page 3590 can show all thumbnails from FIGS. 396-398 to provide the user with a side-by-side comparison of the strategies. In particular, the summary shows the benefits of purchasing permanent life insurance. A user may select any variation of Scenario #1, 2, and 3.

Figure 400:
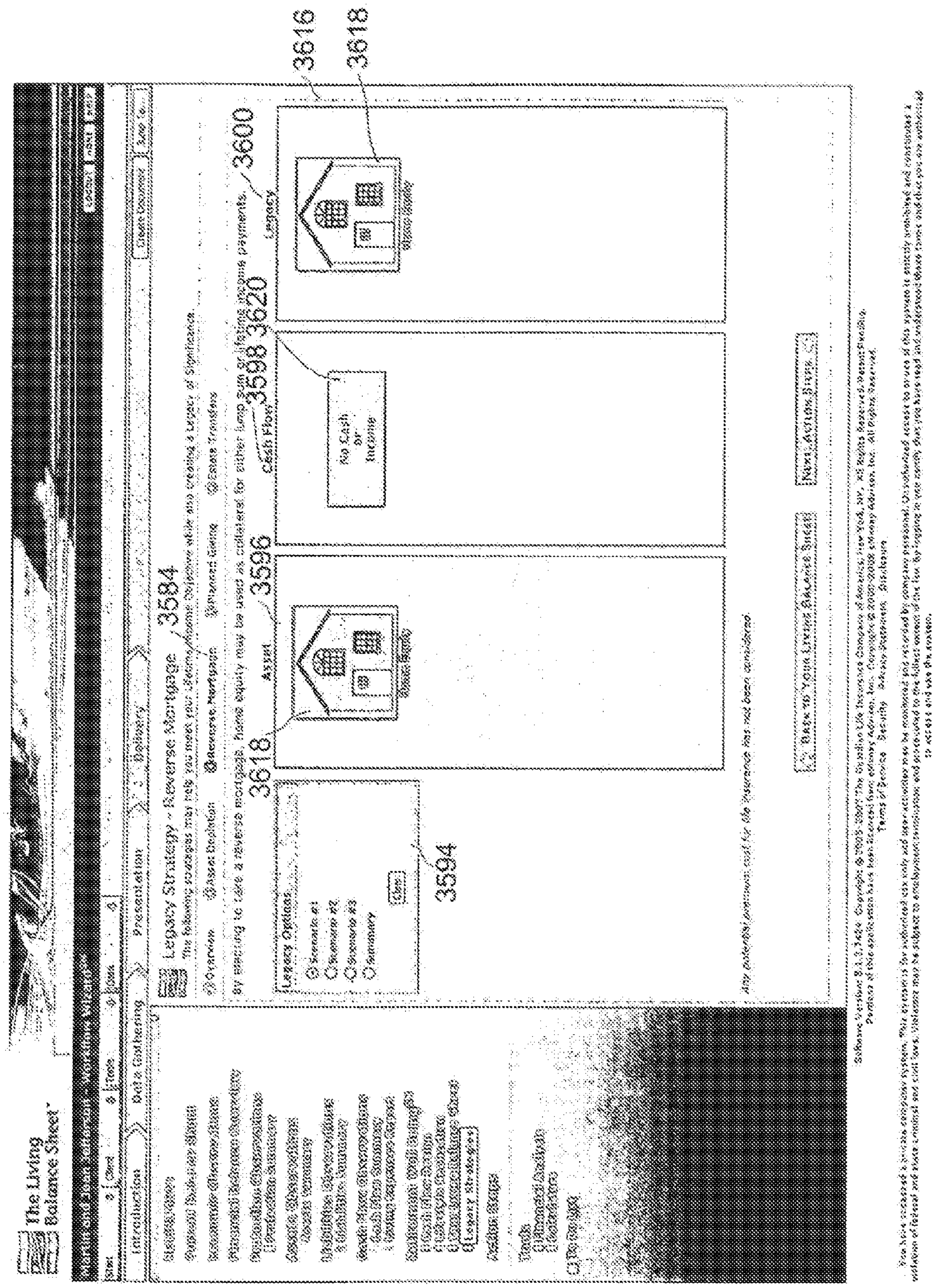

As shown in FIG. 399, a user can select reverse mortgage option 3584. The program can process the request and display page 3616 as shown in FIG. 400. Such a tool can provide a user with an illustration of how to live off equity in the user's house during retirement (through a reverse mortgage) and still provide for the user's legacy. Page 3616 can have legacy option field 3594 to provide a user with a selection of a number of scenarios and/or a summary. If a user selects Scenario #1, a diagram can be presented. The diagram can have asset column 3596, cash flow column 3598 and legacy column 3600. Each column can have one or more thumbnails which can have graphics therein. For example, asset column 3596 can have thumbnail 3618 with a graphic representing a home, cash flow column 3598 can have thumbnail 3620 with an indication that there is no cash or income, and legacy column 3600 can have thumbnail identical to thumbnail 3618. The diagram on page 3616 can provide a user with a visual indicator of a scenario where a user has a home, forgoes touching the home's equity (user does not take a reverse mortgage) and leaves the home to his/her legacy.

Figure 401:
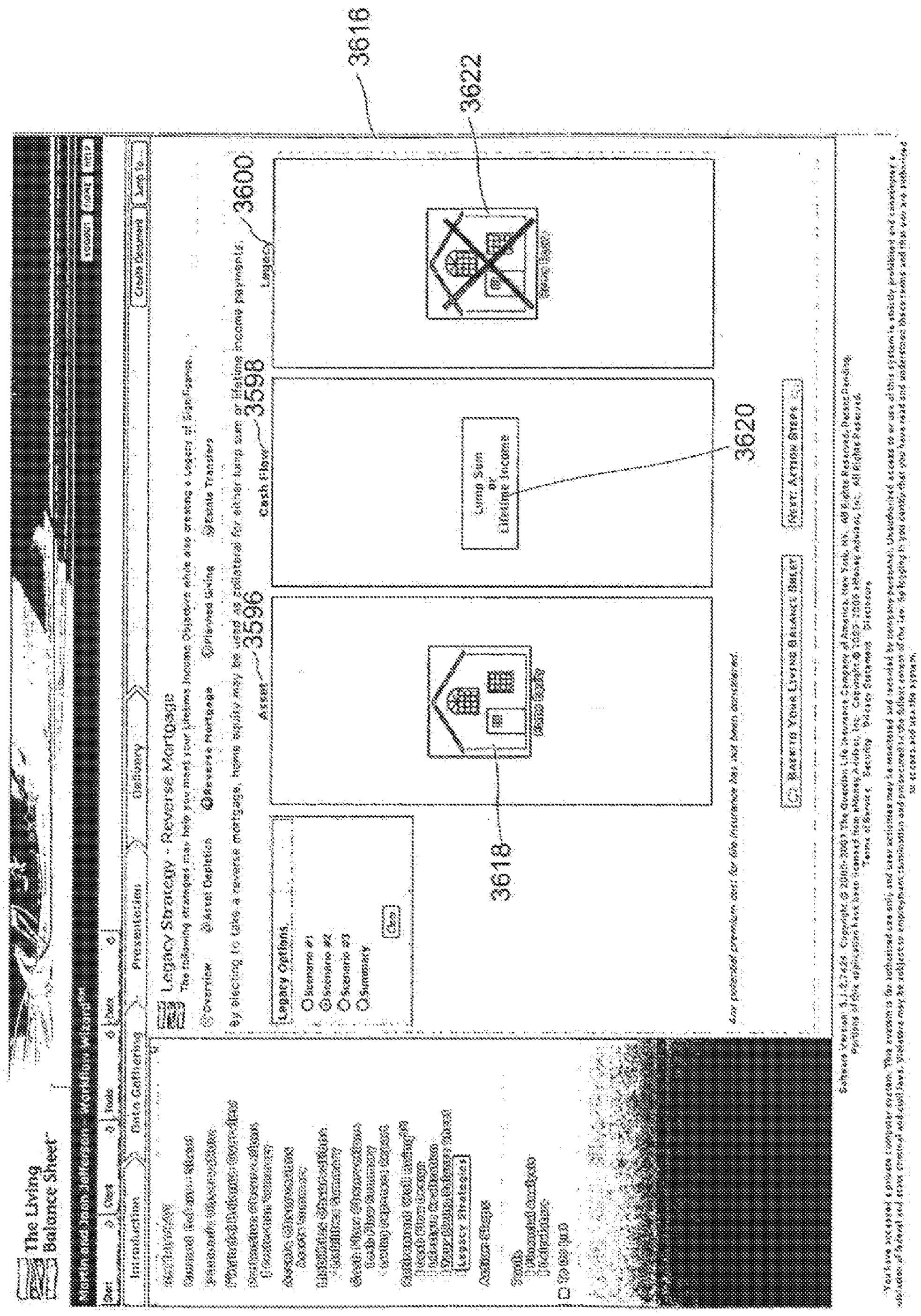
Figure 402:
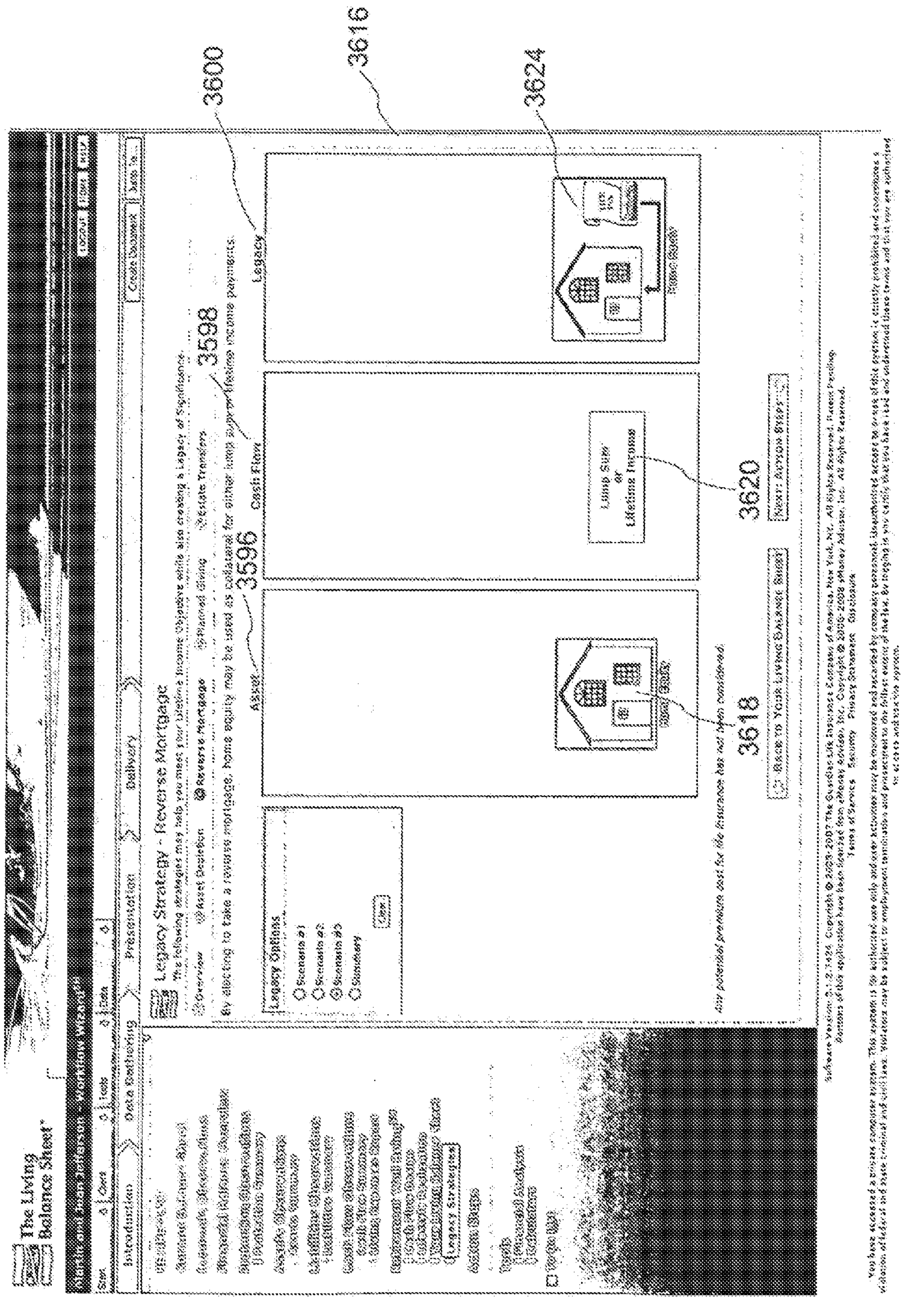
Figure 403:
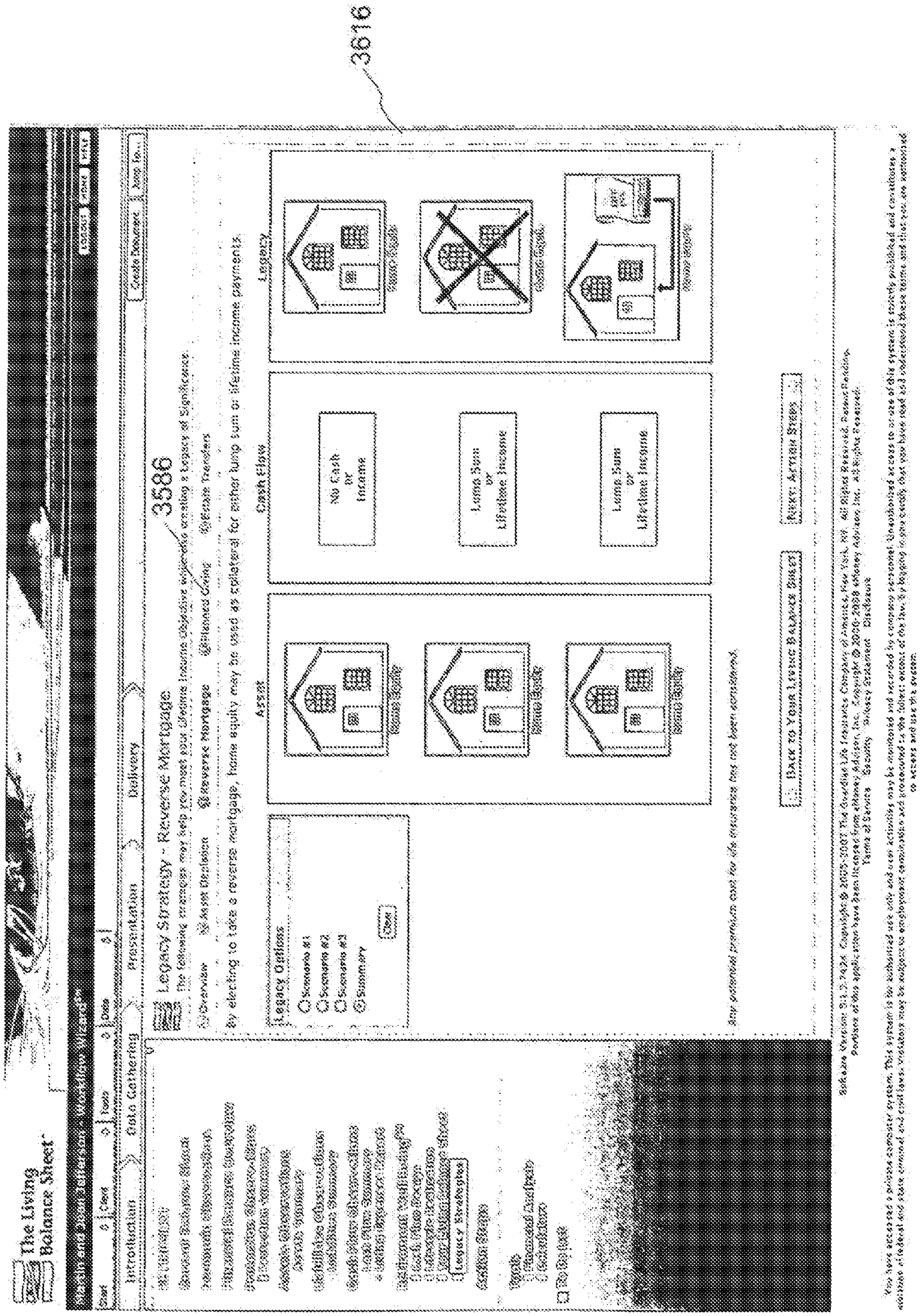

As shown in FIG. 401, if a user selects Scenario #2, asset column 3596 can have thumbnail 3618, cash flow column 3598 can have thumbnail 3620 with an indication that cash flow is a lump sum or lifetime income from, for example, a reverse mortgage, and legacy column 3600 can have thumbnail 3622 which can show no home left to legacy. The diagram on page 3616 can provide a user with a visual indicator of a scenario where a user has a home, depletes the home's equity during retirement either by taking a lump sum or yearly income, and leaves nothing to his/her legacy. As shown in FIG. 402, if a user selects Scenario #3, asset column 3596 can have thumbnail 3618, cash flow column 3598 can have thumbnail 3620 with an indication that cash flow is a lump sum or lifetime income, and legacy column 3600 can have thumbnail 3624 which can show a representation of a home and a representation of life insurance. The diagram on page 3616 can provide a user with a visual indicator of a scenario where a user has a home, depletes the equity in the home during retirement by taking a lump sum or yearly income and through the purchase of life insurance with a death benefit provides money to pay off the reverse mortgage to leave the home to his/her legacy. As shown in FIG. 403, if a user selects the summary option, the diagram on page 3616 can show all thumbnails from FIGS. 400-402 to provide the user with a side-by-side comparison of the strategies. In particular, the summary shows the benefits of purchasing permanent life insurance. A user may select any variation of Scenario #1, 2, and 3.

Figure 404:
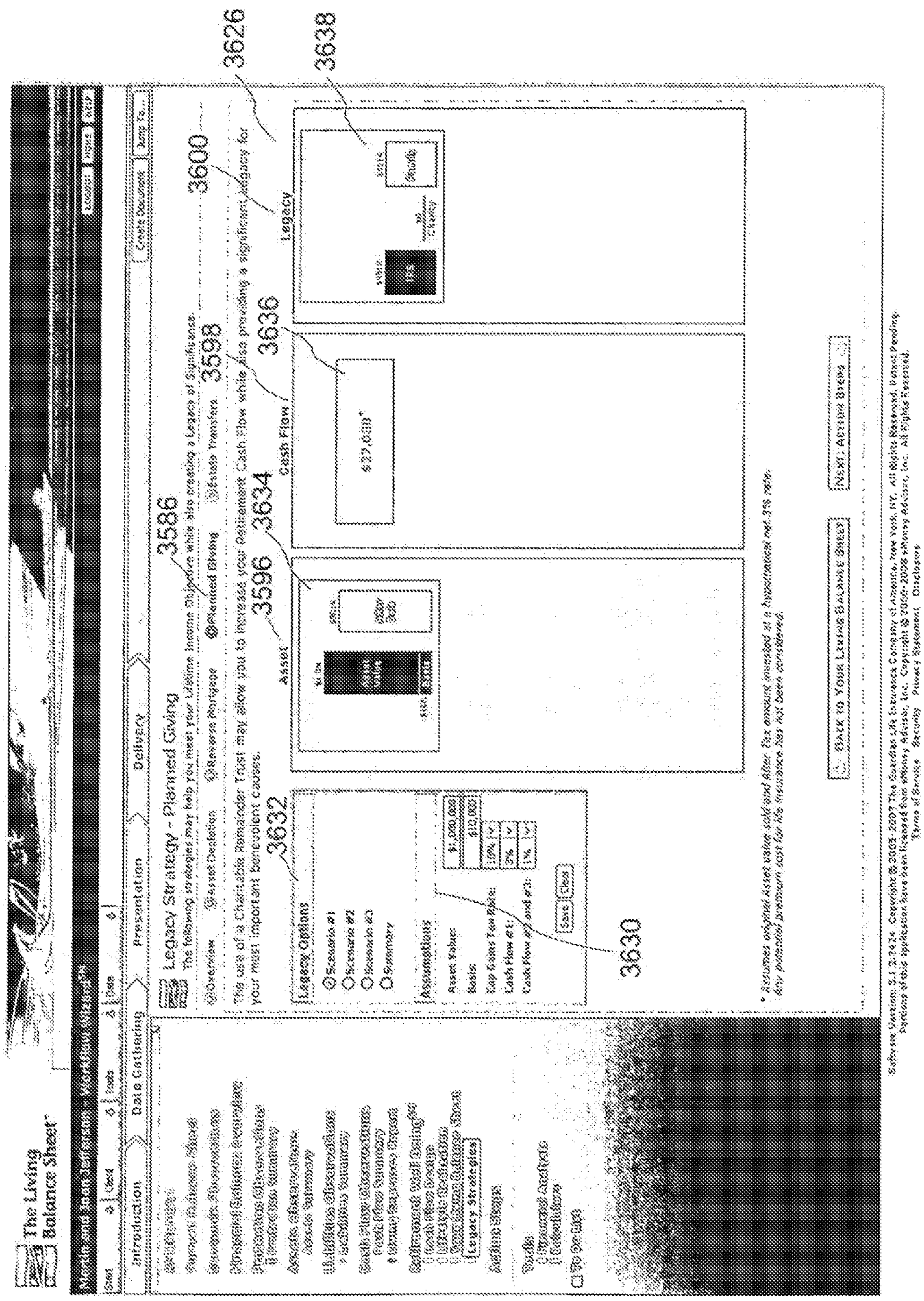

As shown in FIG. 403, a user can select planned giving option 3586. The program can process the request and display page 3626 as shown in FIG. 404. Such a tool can provide a user with an illustration of how to have retirement income and still provide for charity and the user's legacy while avoid taxes. Page 3626 can have assumptions field 3630 which can have fields for inputting, for example, asset value, basis, capital gains tax rate, and various cash flows (e.g., cash flow Nos. 1-3). Legacy option field 3632 can also be provided to illustrate a number of scenarios and/or a summary to a user. A user can input information in assumptions field 3630 such as an asset value of $1 million, a $10,000 basis, capital gains tax rate of 10%, cash flow #1 of 3% and cash flow #2 and #3 of 1%. If a user selects Scenario #1, a diagram can be presented. The diagram can have asset column 3596, cash flow column 3598 and legacy column 3600. Each column can have one or more thumbnails which can have graphics therein. For example, asset column 3596 can have thumbnail 3634 with a graphic therein, cash flow column 3598 can have thumbnail 3636 with a monetary value representing cash flow (e.g., $27,030 or 3% interest on $901,000), and legacy column 3600 can have thumbnail 3638 which can have a graphic therein. For example, thumbnail 3634 can have a bar representing an asset value (e.g., $1 million) with a portion of the bar showing the basis of the asset (e.g., $10,000). Another bar can be provided to show the after sale value of the asset (e.g., $901,000) after paying capital gains tax. The diagram on page 3626 can provide a user with a visual indicator of a scenario where a user has $901,000 after sale of the asset and payment of capital gains, lives off interest of $27,030 per year, and leaves the $451,000 to his/her legacy or family. The IRS will get $451,000 in estate tax and charity will get $0.

Figure 405:
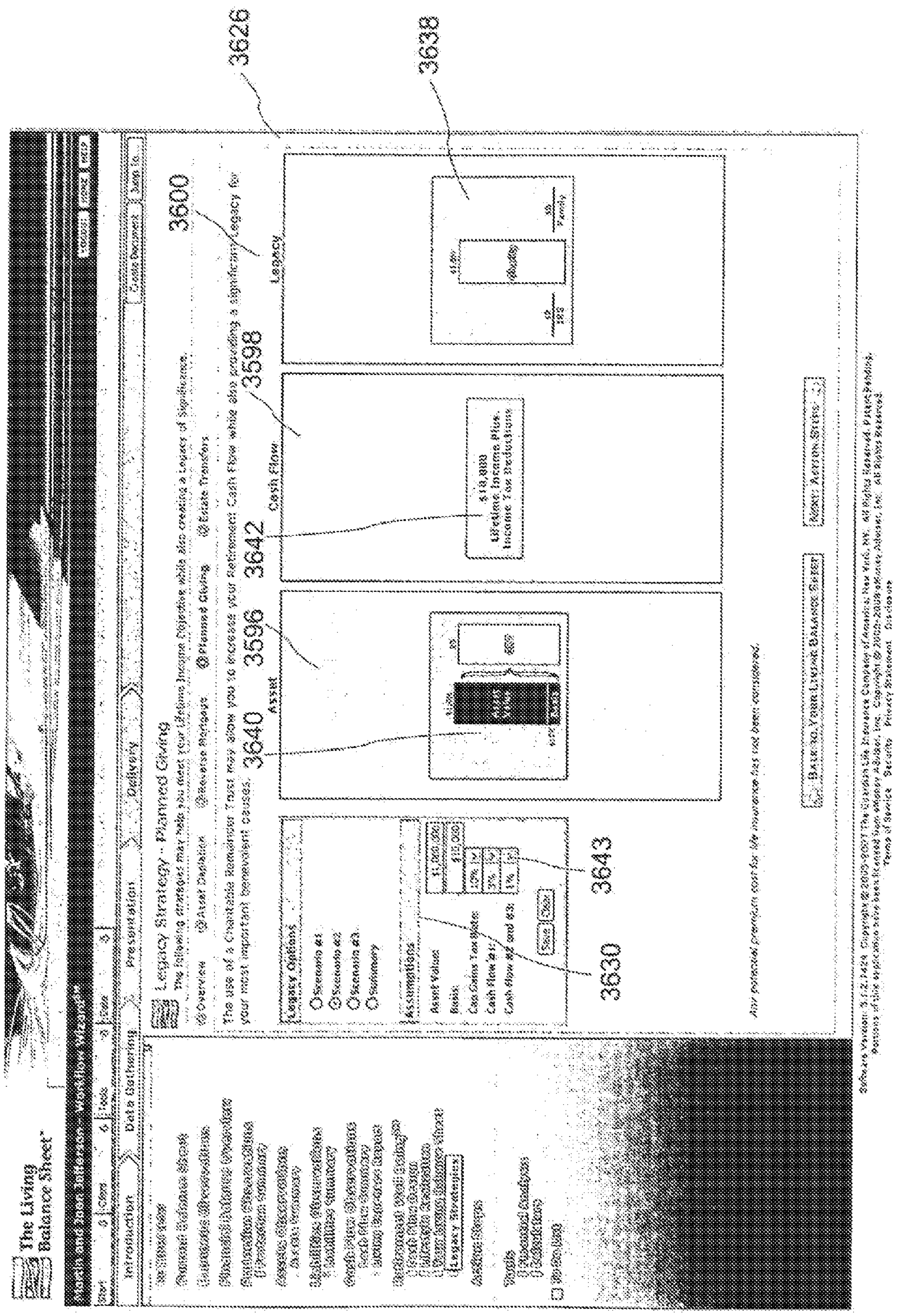

As shown in FIG. 405, if a user selects Scenario #2, asset column 3596 can have thumbnail 3640 with a graphic different than graphic in thumbnail 3634, cash flow column 3598 can have thumbnail 3642 with a monetary value representing cash flow (e.g., 1% of $1 million as indicated in field 3643 of assumptions field 3630), and legacy column 3600 can have thumbnail 3638 which can show all money left to charity and no money left to legacy or family. In addition, thumbnail 3638 can show that $0 is paid to the IRS in tax. The diagram on page 3626 can provide a user with a visual indicator of a scenario where a user has a $1 million asset ($10,000 basis), puts the asset in a charitable remainder trust (CRT), receives $10,000 per year in income and a tax deduction, and leaves all his/her assets to charity, avoiding federal tax to the IRS. As shown in thumbnail 3638, one disadvantage to such a strategy is not providing for legacy or family at death.

Figure 406:
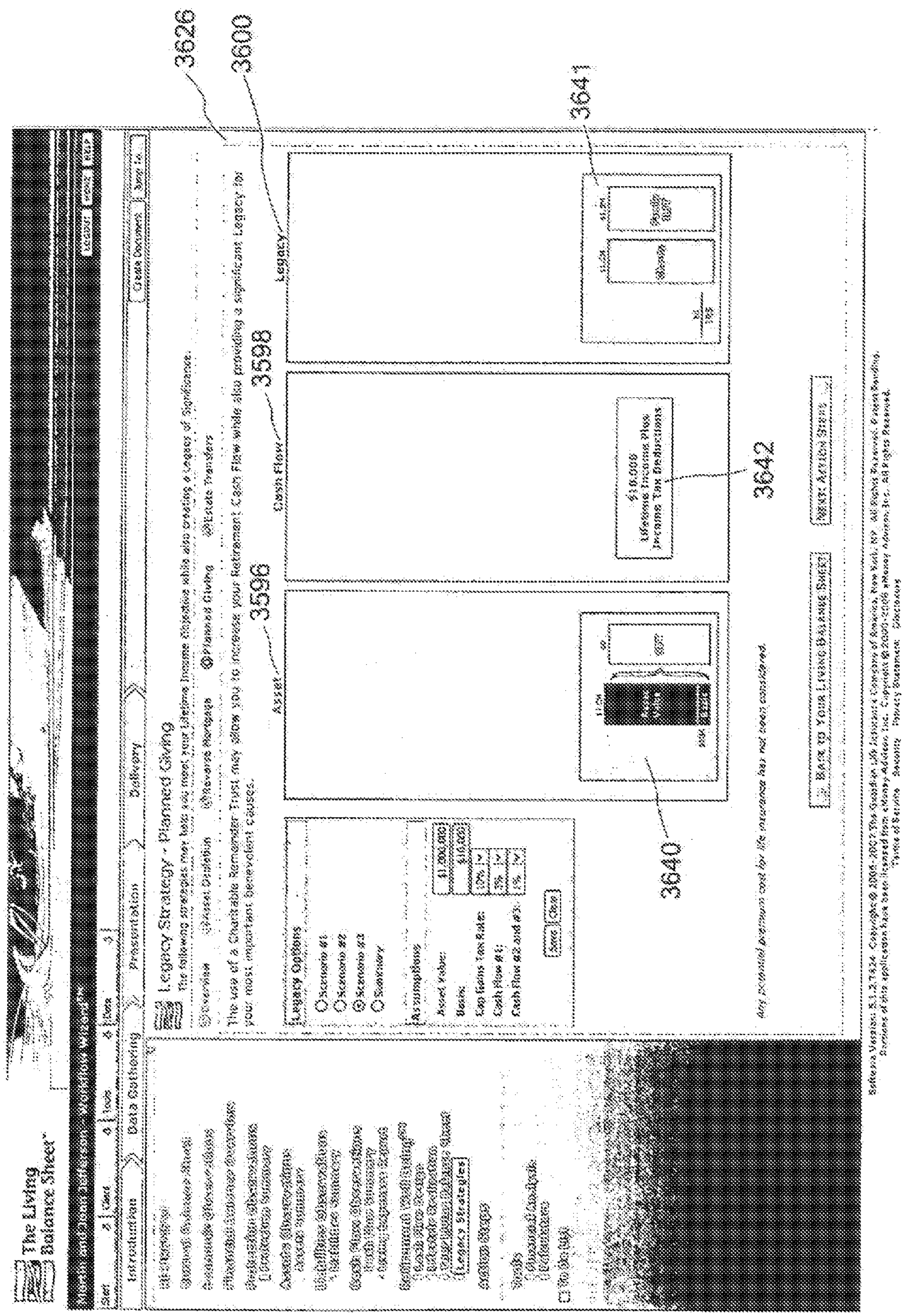
Figure 407:
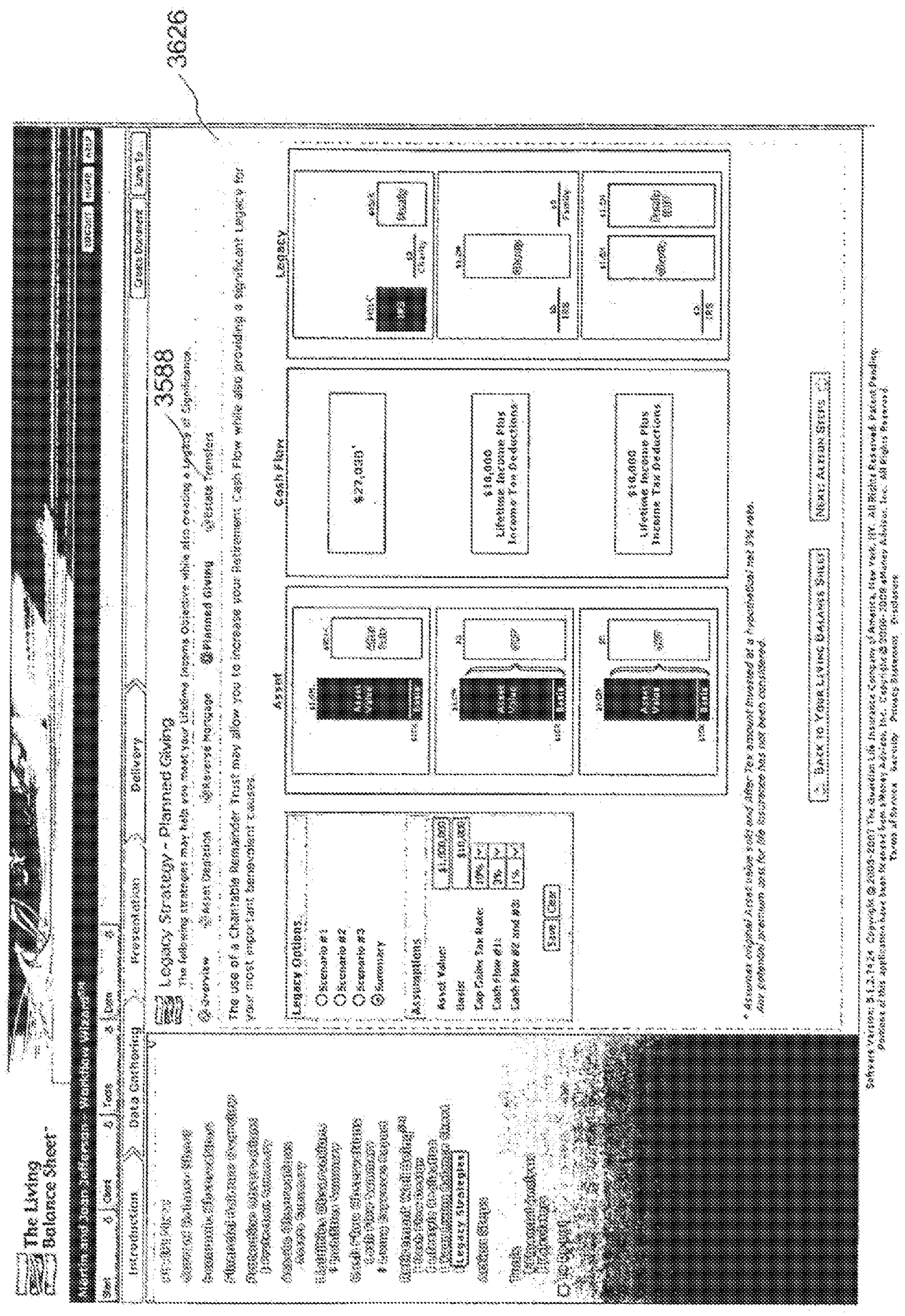

As shown in FIG. 406, if a user selects Scenario #3, asset column 3596 can have thumbnail 3640 (similar to FIG. 405), cash flow column 3598 can have thumbnail 3642 (similar to FIG. 405), and legacy column 3600 can have thumbnail 3641 which can be a graphic. The diagram on page 3626 can provide a user with a visual indicator of a scenario where a user has a $1 million asset ($10,000 basis), puts the asset in a charitable remainder trust (CRT), receives $10,000 per year in income and a tax deduction, and leaves $1 million to charity and $1 million to his/her legacy while avoiding paying federal tax to the IRS. As shown in thumbnail 3641, a user has an irrevocable life insurance trust (ILIT) (the user has purchased permanent life insurance with $1 million in death benefit in the name of a trust). In this way, a user is able to provide the trust proceeds to his/her legacy tax free while giving all $1 million of the user's assets to charity. As shown in FIG. 407, if a user selects the summary option, the diagram on page 3626 can show all thumbnails from FIGS. 404-406 to provide the user with a side-by-side comparison of the strategies. In particular, the summary shows the benefits of purchasing permanent life insurance using an ILIT.

Figure 408:
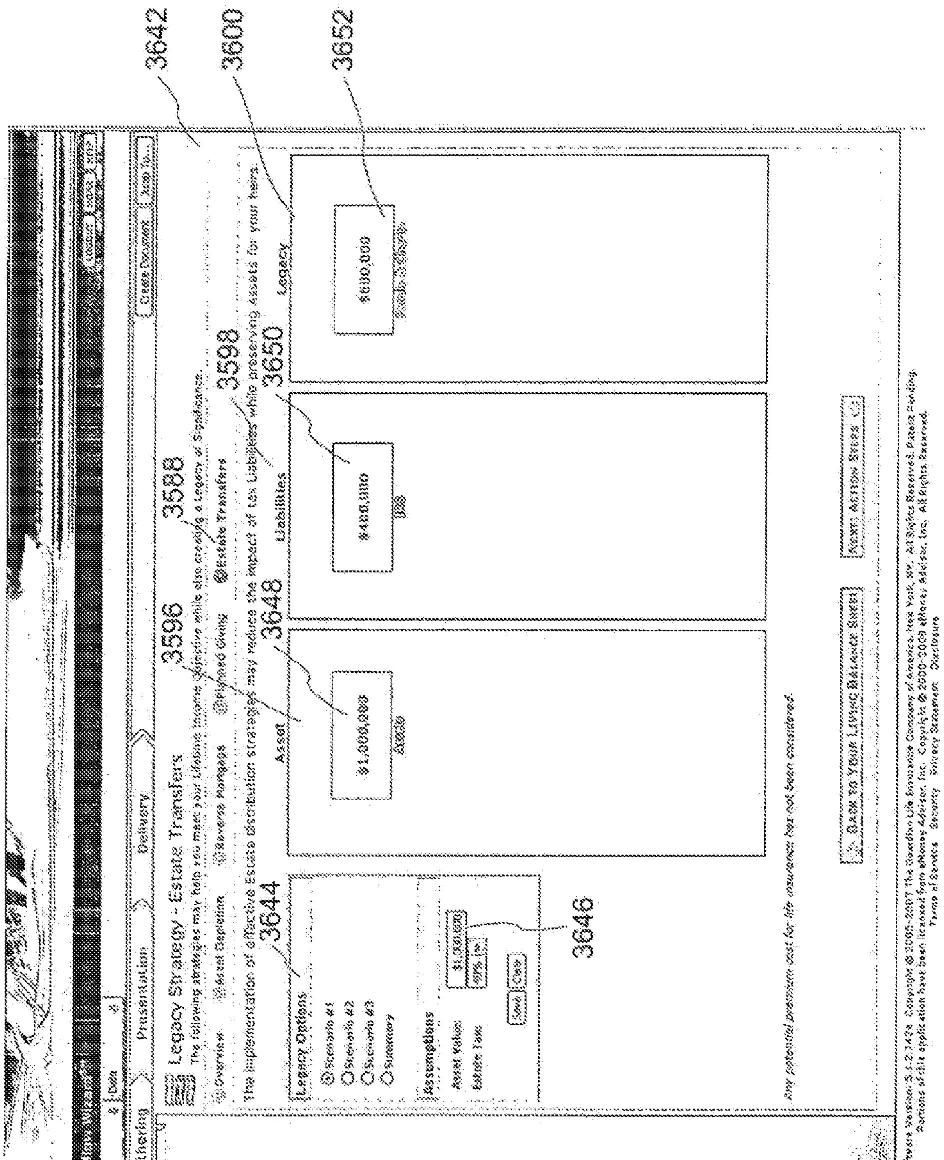

Moreover, as shown in FIG. 407, a user can select estate transfer option 3588. The program can process the request and display page 3642 as shown in FIG. 408. Such a tool can provide a user with an illustration of how to reduce impact of tax liabilities to preserve assets for his/her legacy. Page 3642 can have assumptions field 3646 which can have fields for inputting, for example, asset value and estate tax. Legacy option field 3644 can also be provided to illustrate a number of scenarios and/or a summary to a user. A user can input information in assumptions field 3646 such as an asset value of $1 million and an estate tax of 40%. If a user selects Scenario #1, a diagram can be presented. The diagram can have asset column 3596, liabilities column 3598 and legacy column 3600. Each column can have one or more thumbnails. For example, asset column 3596 can have thumbnail 3648 with a monetary value therein, liabilities column 3598 can have a thumbnail 3650 with a monetary value representing tax amount paid to the IRS (e.g., $400,000 or 40% tax on a $1 million asset), and legacy column 3600 can have thumbnail 3652 which can have a monetary value representing amount of money left to legacy (family) or charity. The diagram on page 3642 can provide a user with a visual indicator of a scenario where a user has a $1 million asset, has a $400,000 tax liability at death and leaves $600,000 to his/her legacy or family.

Figure 409:
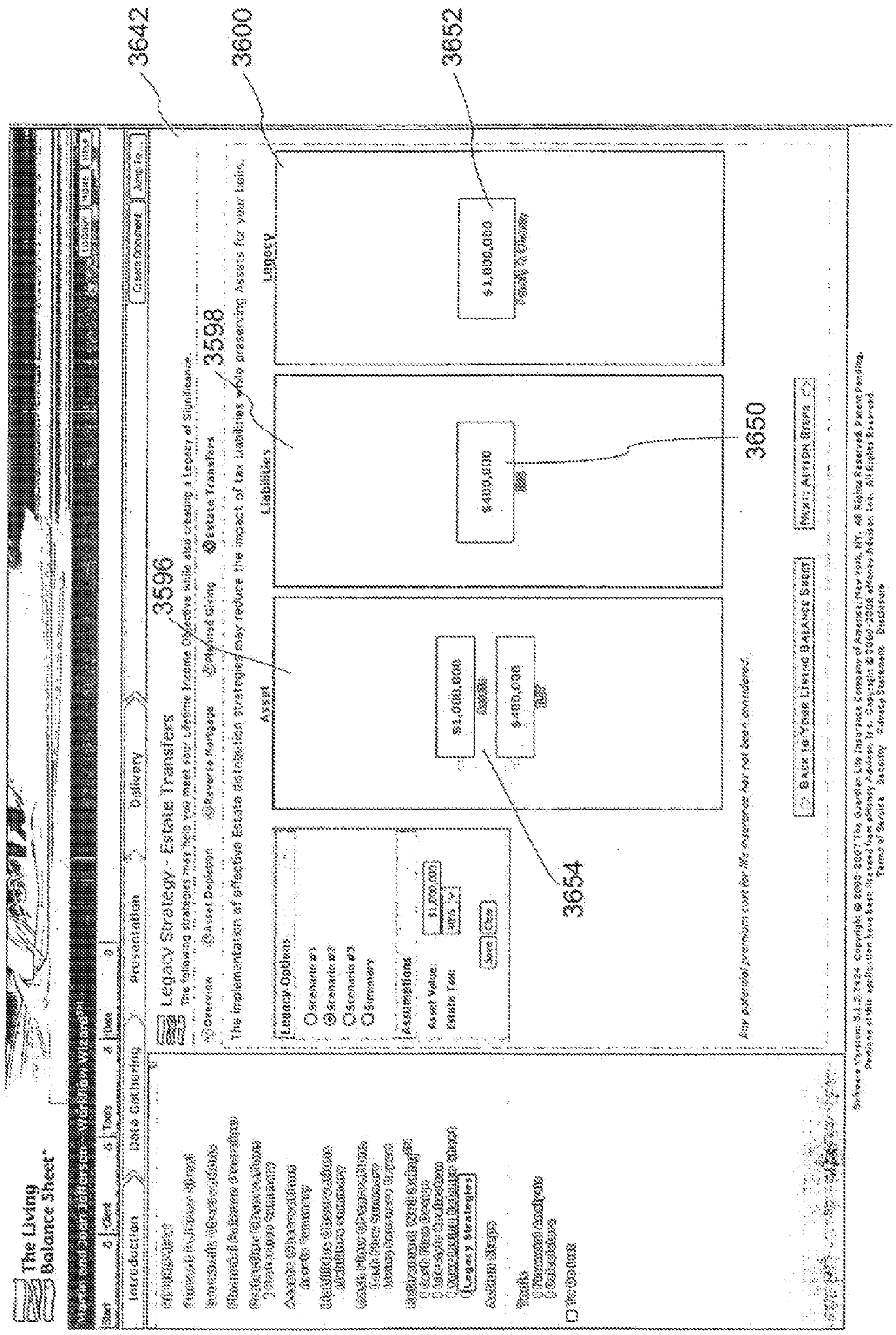

As shown in FIG. 409, if a user selects Scenario #2, asset column 3596 can have one or more thumbnails 3654 with more than one monetary values, liabilities column 3598 can have thumbnail 3650, and legacy column 3600 can have thumbnail 3652. Asset column 3596 can show an asset of $1 million as well as the purchase of permanent life insurance in the name of an irrevocable life insurance trust (ILIT) with a death benefit of $400,000. The diagram on page 3642 can provide a user with a visual indicator of a scenario where a user has a $1 million asset, $400,000 in a life insurance trusts, an estate tax liability of $400,000, and leaves all $1 million to his/her legacy and/or charity.

Figure 410:
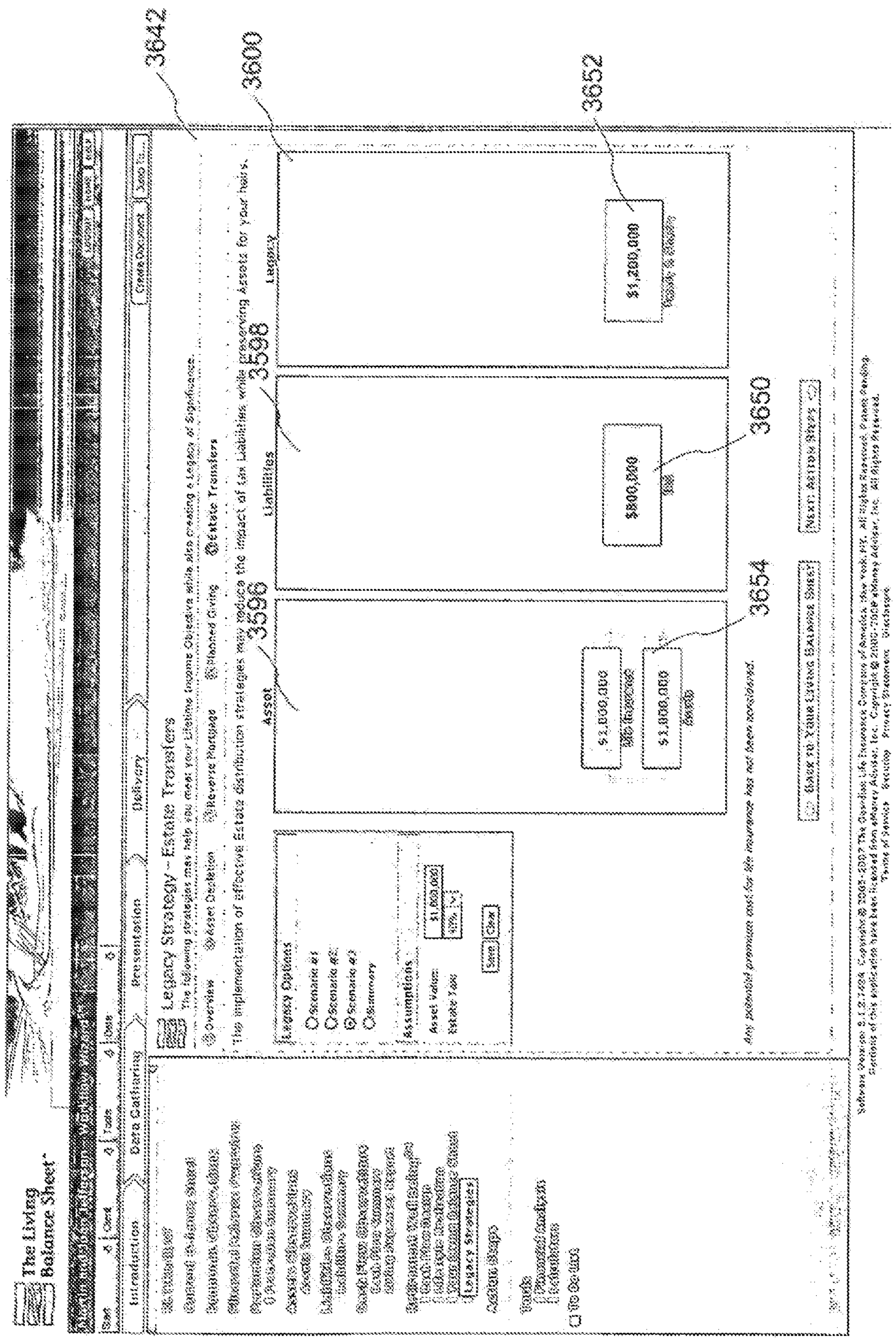
Figure 411:
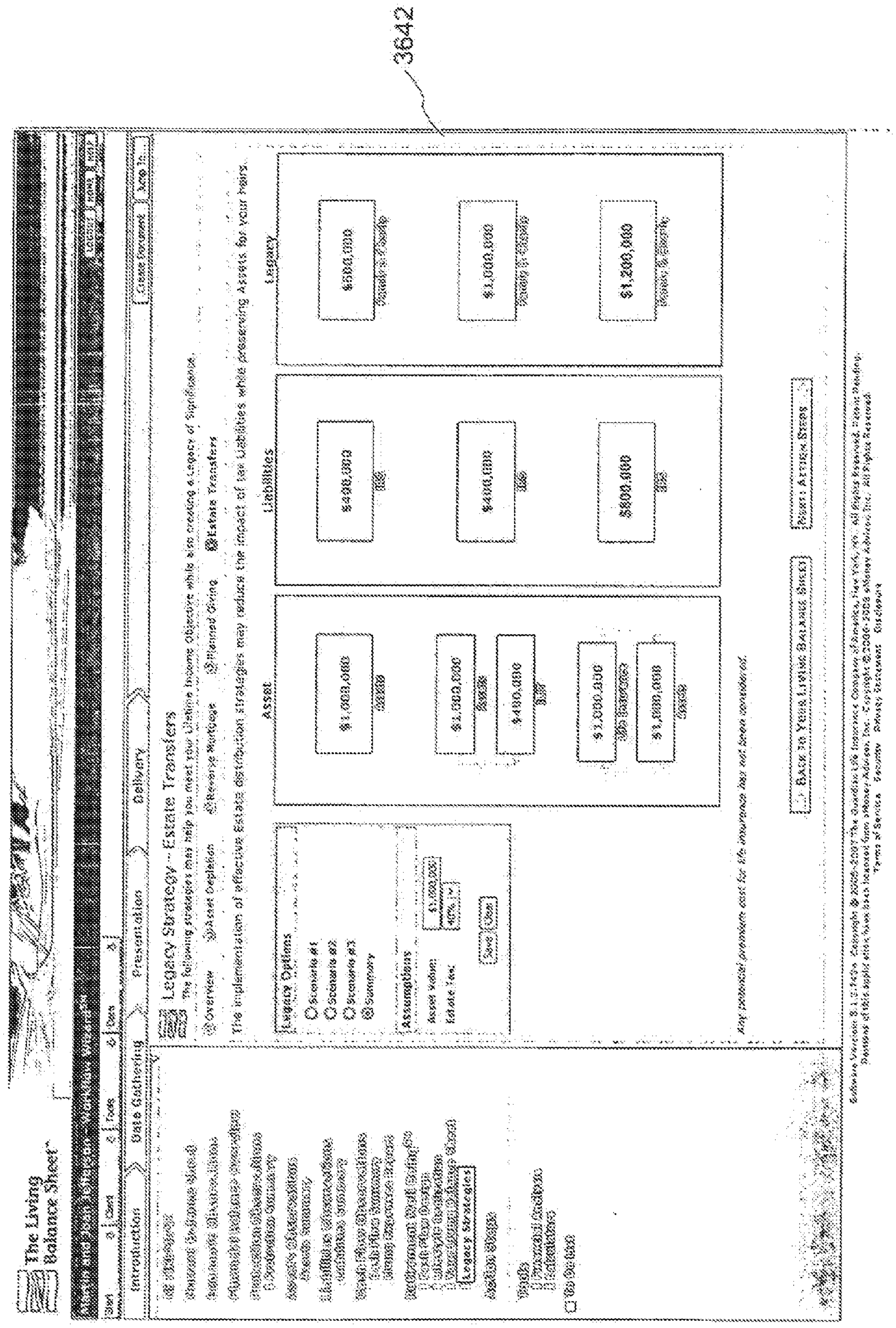

As shown in FIG. 410, if a user selects Scenario #3, asset column 3596 can have one or more thumbnails 3654 with more than one monetary values, liabilities column 3598 can have thumbnail 3650, and legacy column 3600 can have thumbnail 3652. Asset column 3596 can show an asset of $1 million as well as the purchase of permanent life insurance with a death benefit of $1 million. The diagram on page 3642 can provide a user with a visual indicator of a scenario where a user has a $2 million in assets (including a $1 million insurance policy), an estate tax liability of $800,000, and leaves $1.2 million to his/her legacy and/or charity. Such a scenario illustrates to a user the advantage of purchasing life insurance without using a ILIT. In particular, while the same amount of money will be left to the user's legacy or charity whether the user has an ILIT or not, with no ILIT, the user is free to use the cash value during retirement for income or to borrow. If the insurance policy is in the name of an ILIT, a user's use of the cash value will be restricted. As shown in FIG. 411, if a user selects the summary option, the diagram on page 3642 can show all thumbnails from FIGS. 408-410 to provide the user with a side-by-side comparison of strategies. A user may select any variation of Scenario #1, 2, and 3.

Figure 412:
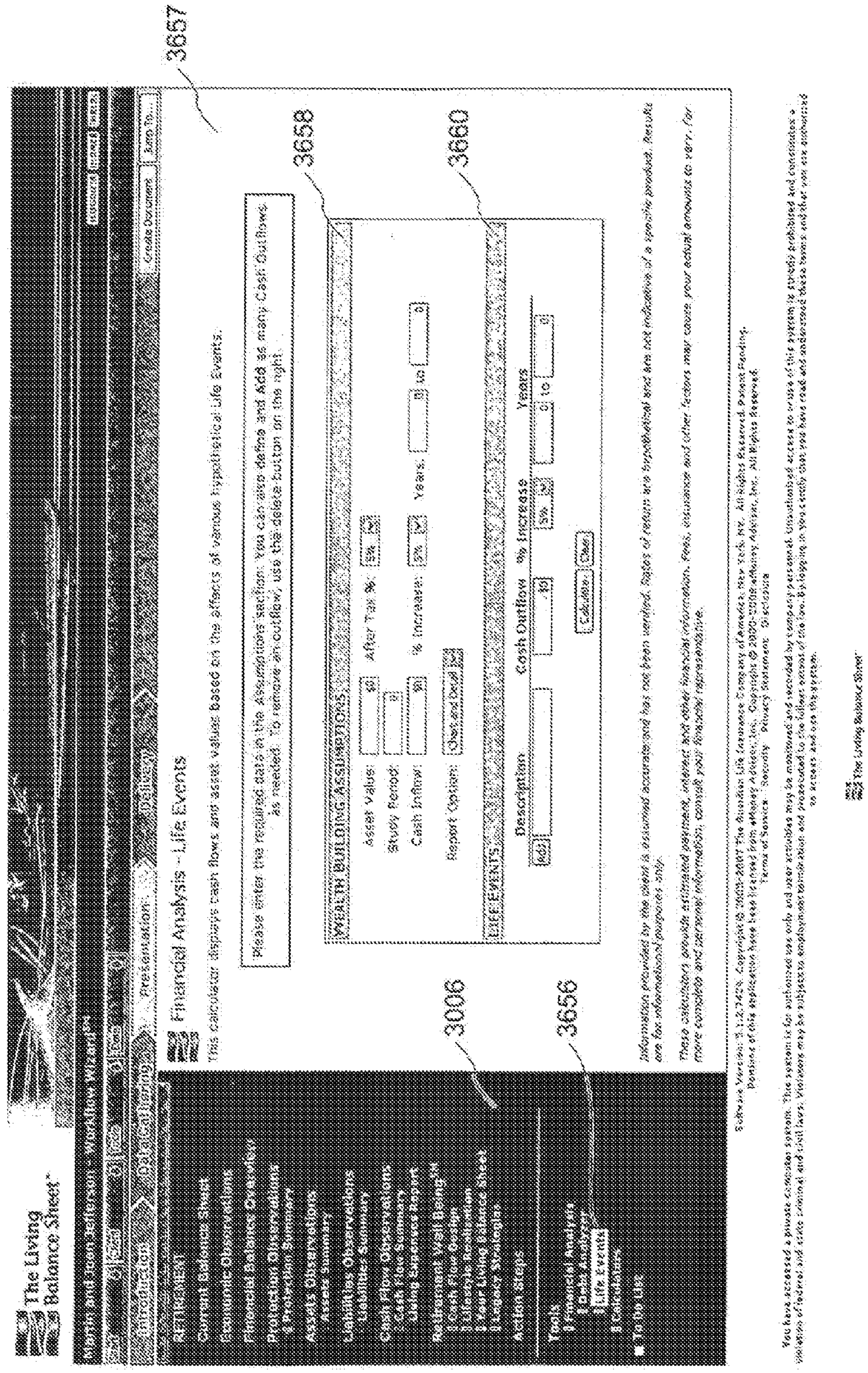

As shown in FIG. 412, list of options field 3006 can provide a Tools category having one or more links such as, for example, life events link 3656. Life event link provides a user with a tool that can assist in understanding how various life events (expected or unexpected) can affect a user's lifestyle or financial condition during retirement. If a user chooses life events link 3656, the program can process the request and display life events page 3657. Page 3657 can have assumptions field such as wealth building assumptions field 3658 which can include data entry fields for inputting information such as asset value, study period, cash inflow, after tax percentage rate (e.g., interest rate), percentage increase in cash inflow, years of cash flow and/or report options (e.g., chart, details, chart & details). A life events field 3660 can also be provided and can have data entry fields for inputting information such as description of the life event, cash outflow (i.e., the amount of money the life event costs), percentage increase in the life events and/or years during which the life event occurs.

Figure 413:
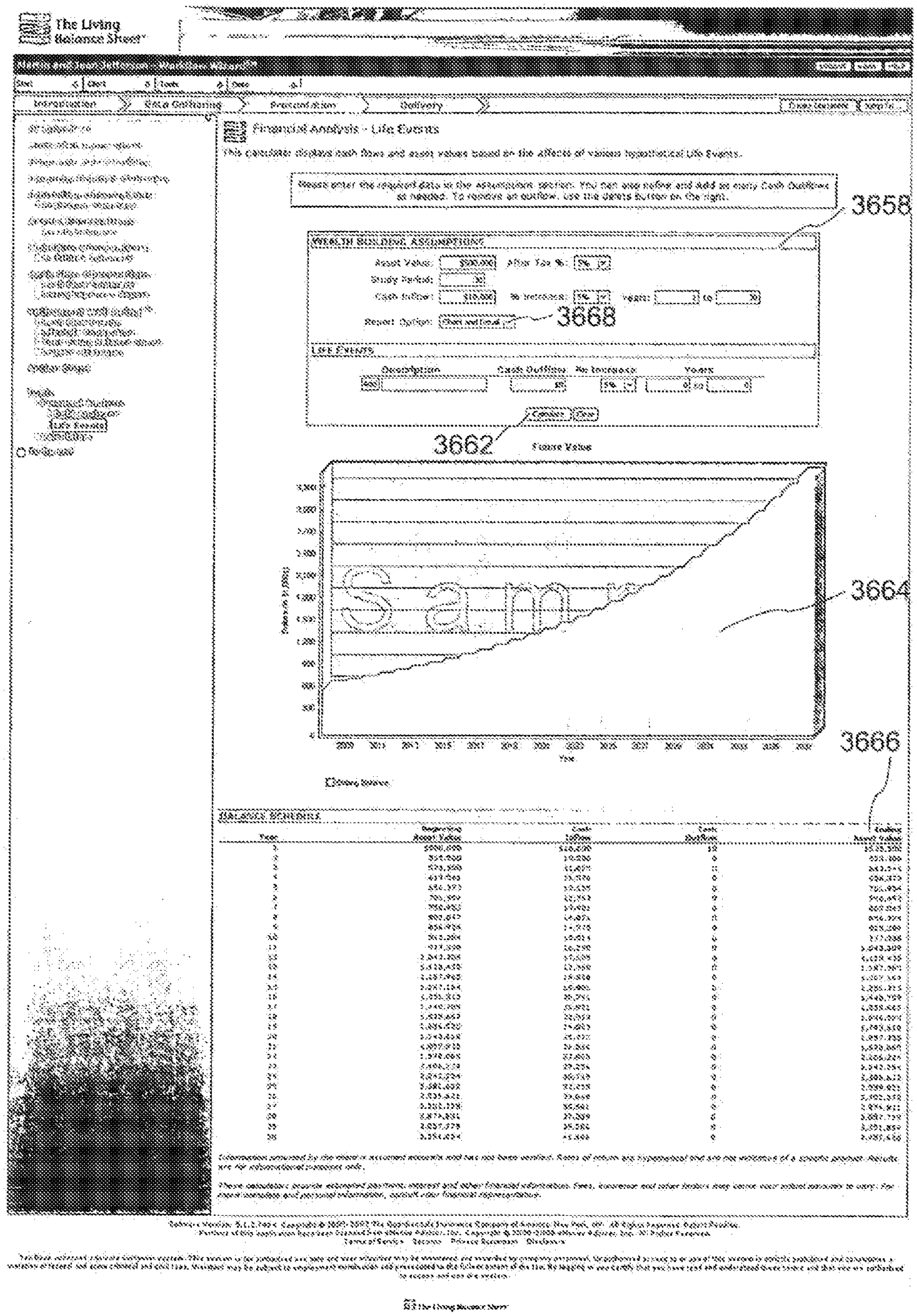
Figure 415:
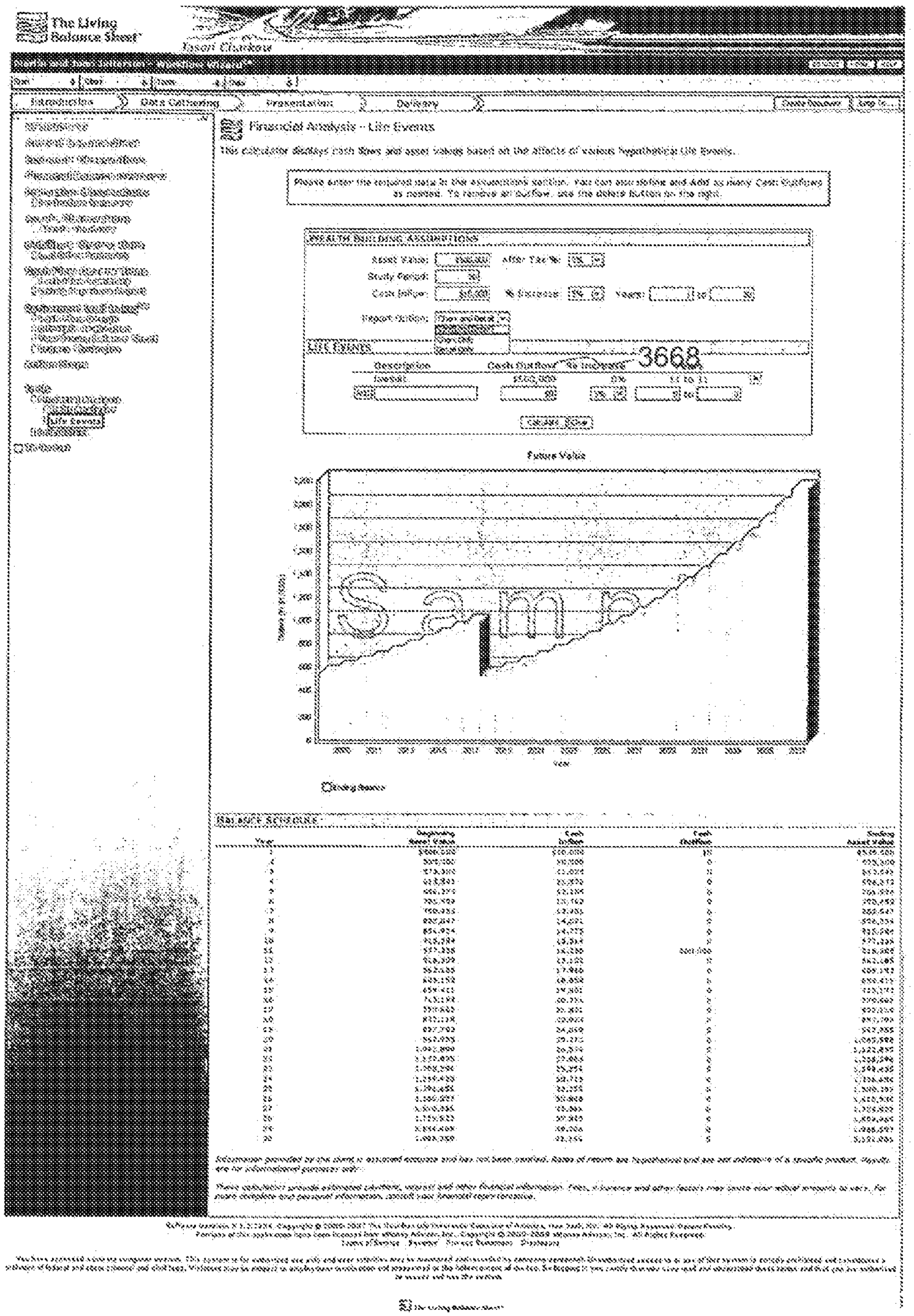

In an exemplary embodiment, as shown in FIG. 413, a user can enter in assumptions field 3658, an asset value of $500,000, an after tax rate of 5%, a study period of 30 years, $10,000 per year of cash inflow which increases at 5% per year from years 1 to 30. A user can select a button such as calculate button 3662 and graph 3664 and/or table 3666 can be displayed. A user can control whether graph 3664 and/or table 3666 is displayed by selecting an option in drop-down menu 3668. If the user selects "Chart and Detail" from menu 3668 (FIG. 415), both graph 3664 and table 3666 can be displayed. If the user selects "Chart Only" from menu 3668 (FIG. 415), only graph 3664 will be displayed and if the user selects "Detail Only" from menu 3668 (FIG. 415), only table 3666 will be displayed. Such an illustration can demonstrate to a user that over 30 years, a user will have an asset of $3,457,650.

Figure 414:
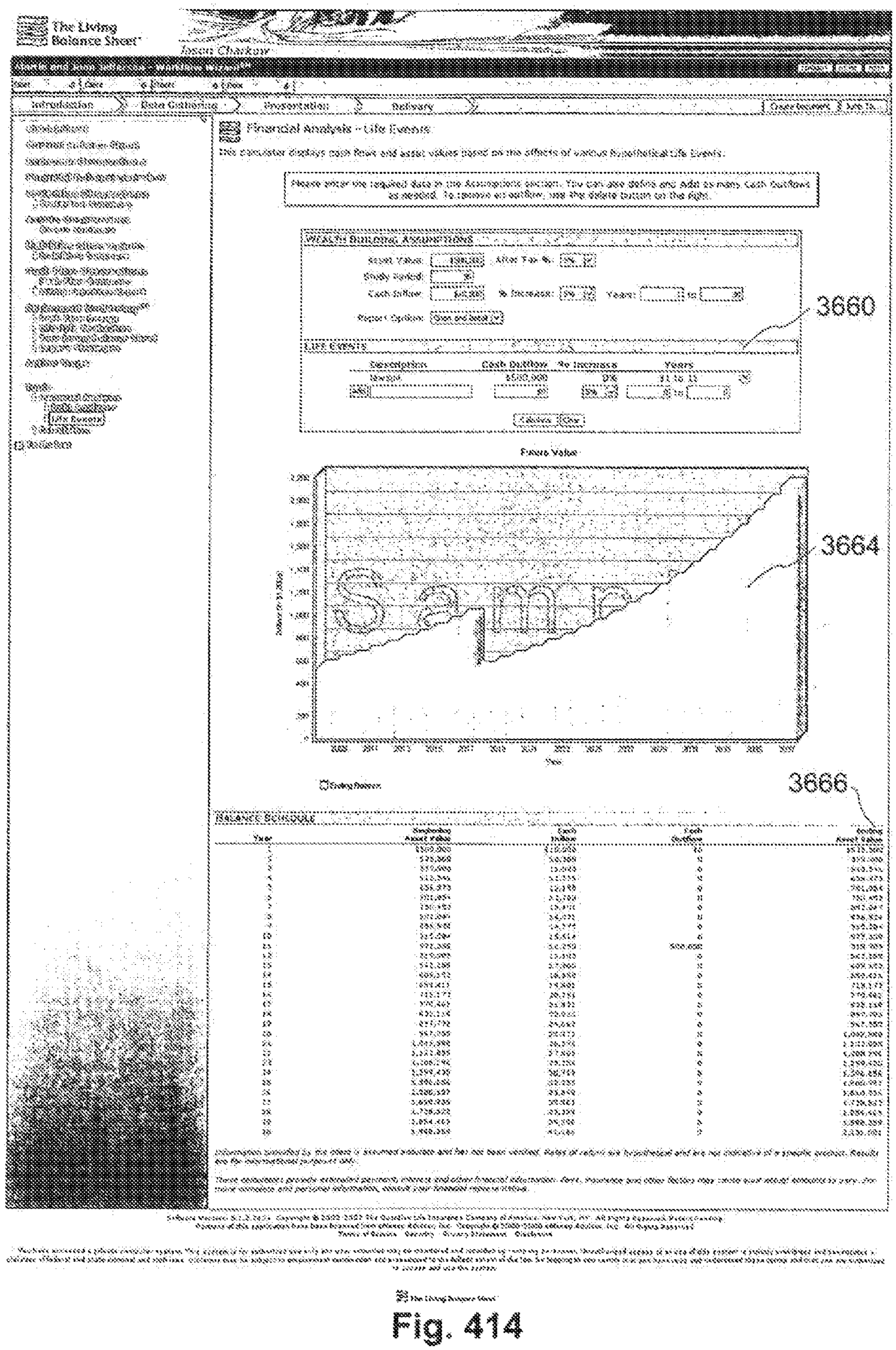

As shown in FIG. 414, life events field 3660 can be used to show the effects life events have on assets. For example, a user can input information about a lawsuit (e.g., a lawsuit related to a car accident) that took place in year 11 and cost the user $500,000. Such a scenario can demonstrate to a user the drastic effects such a life event can have on his/her assets. Graph 3664 and table 3666 show a dip in year 11 and that in year 30, a user will have only accumulated $2,131,001. So a life event of $500,000 will have affect the user's asset by more than $1.3 million. In other words, the user would have accumulated $1.3 million less than what the user would have accumulated had the life event never have occurred. Such a tool illustrates to the user the importance of preparing for the future—in this case, the importance of purchasing umbrella liability insurance and keeping it in force during retirement. Such insurance would have paid for the user's $500,000 litigation costs and allowed the user to accumulate assets of $3,457,650. It will be appreciated that an unlimited number of life events can be inputted into field 3660 for any year(s).

Figure 449:
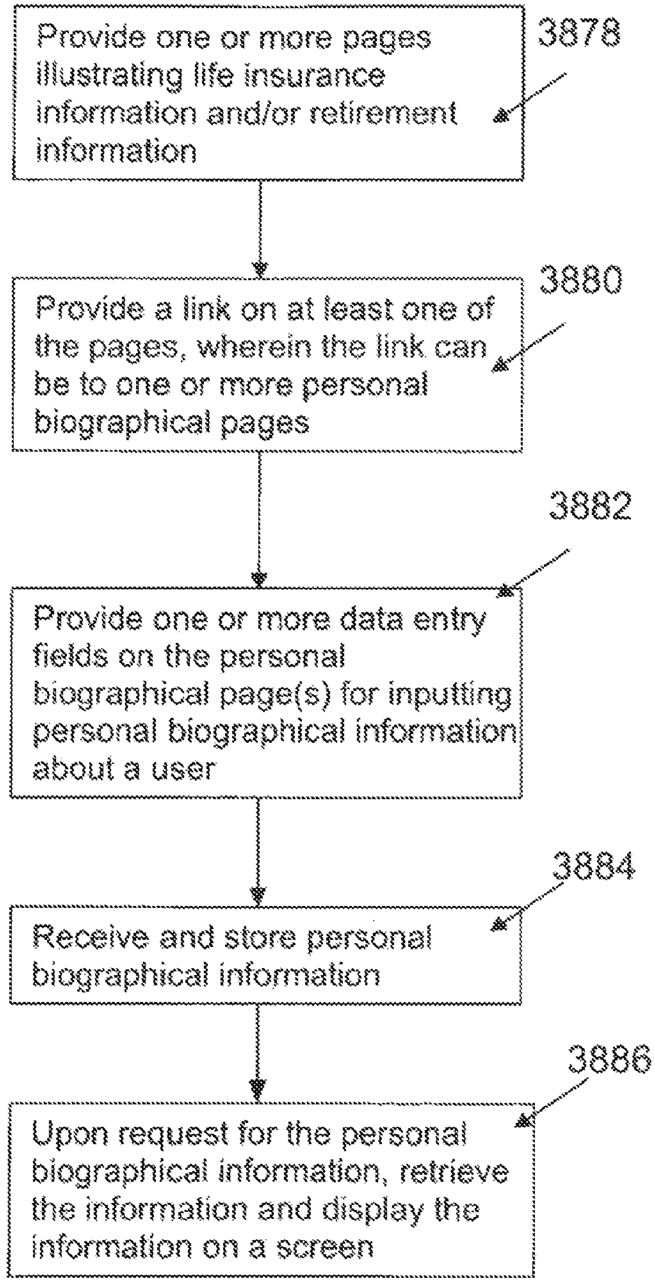

A personal biography section can also be provided or integrated into the program. Although a personal biography can be part of the same site as FIGS. 275-415, in a preferred embodiment, a personal biography section is located on a client site. In general, as shown in FIG. 449, one or more pages illustrating life insurance information and/or retirement information can be provided (step 3878). A link on at least one of the pages can be provided, the link can be to one or more personal biographical pages (step 3880). One or more data entry fields can be provided on the personal biographical page(s) for inputting personal biographical information about a user (step 3882). The personal biographical information can be received and stored (step 3884) and, upon request for the personal biographical information, the information can be retrieved and displayed on a screen (step 3886).

Figure 416:
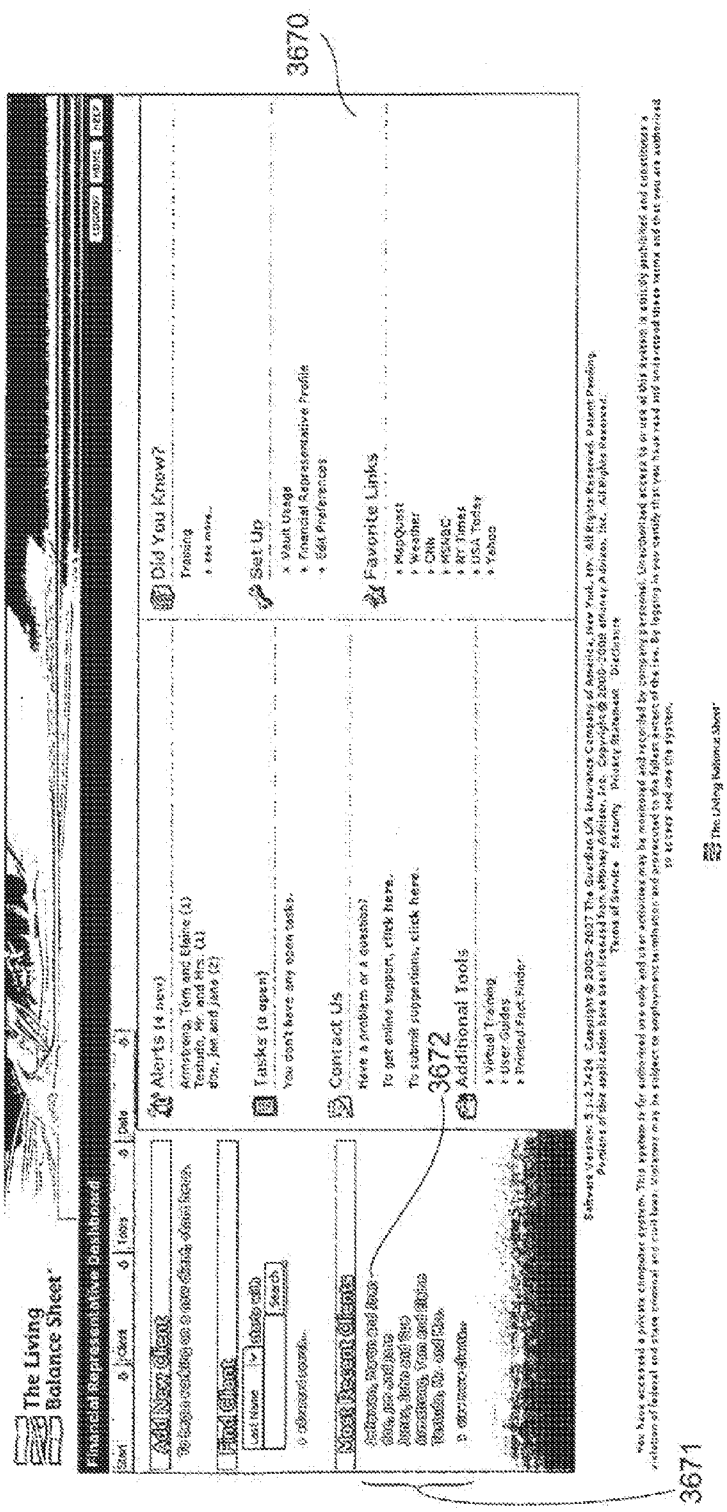
Figure 417:
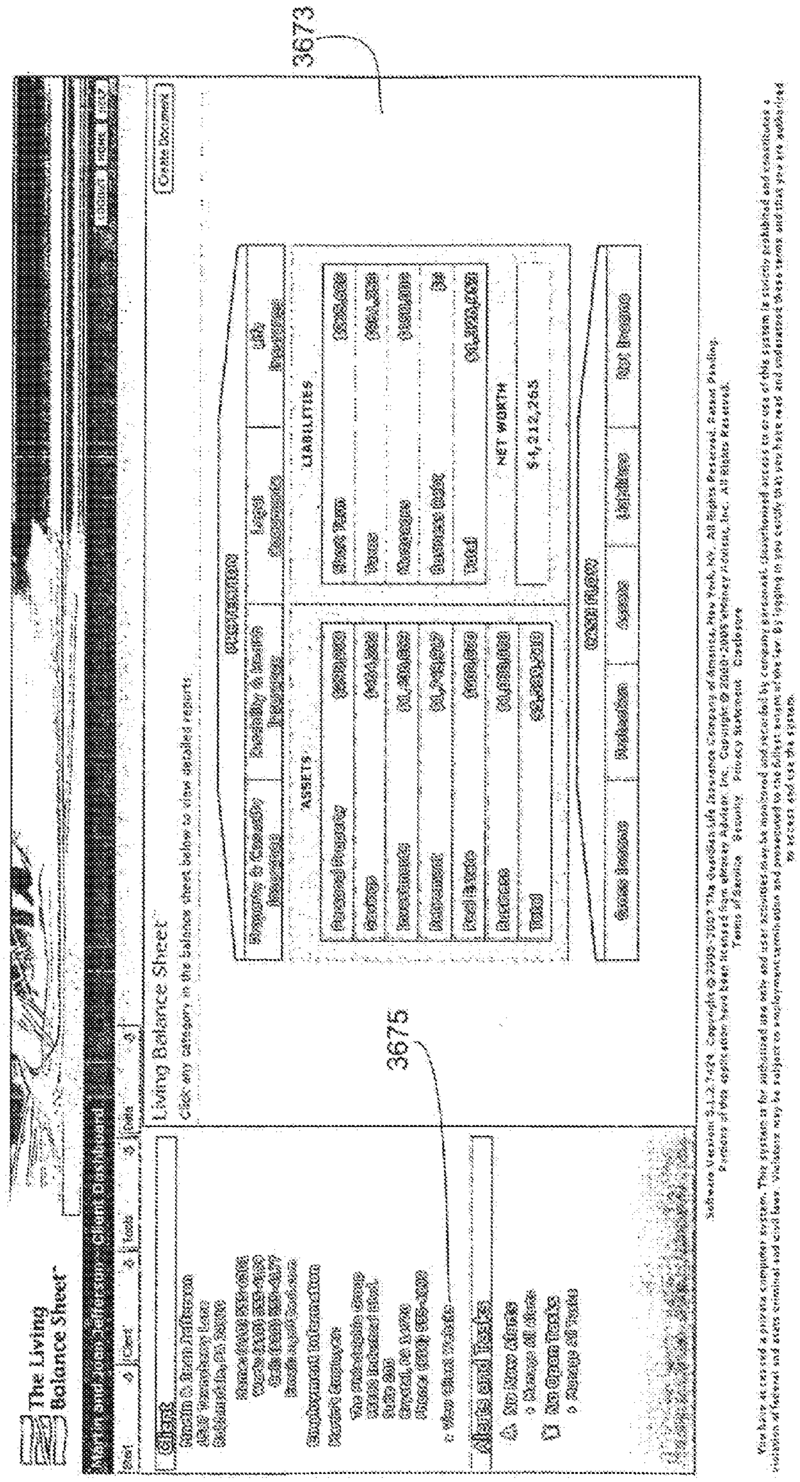
Figure 418:
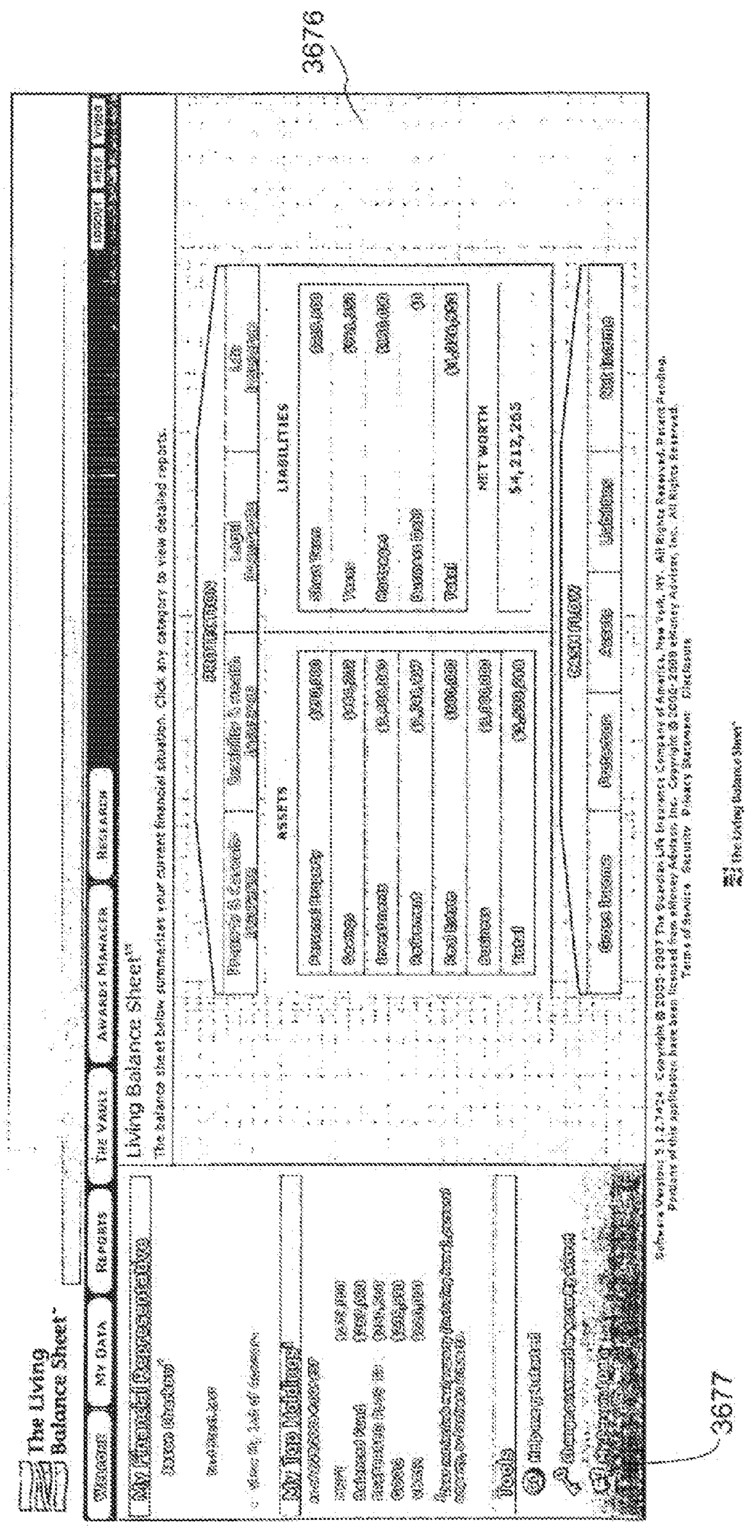
Figure 419:
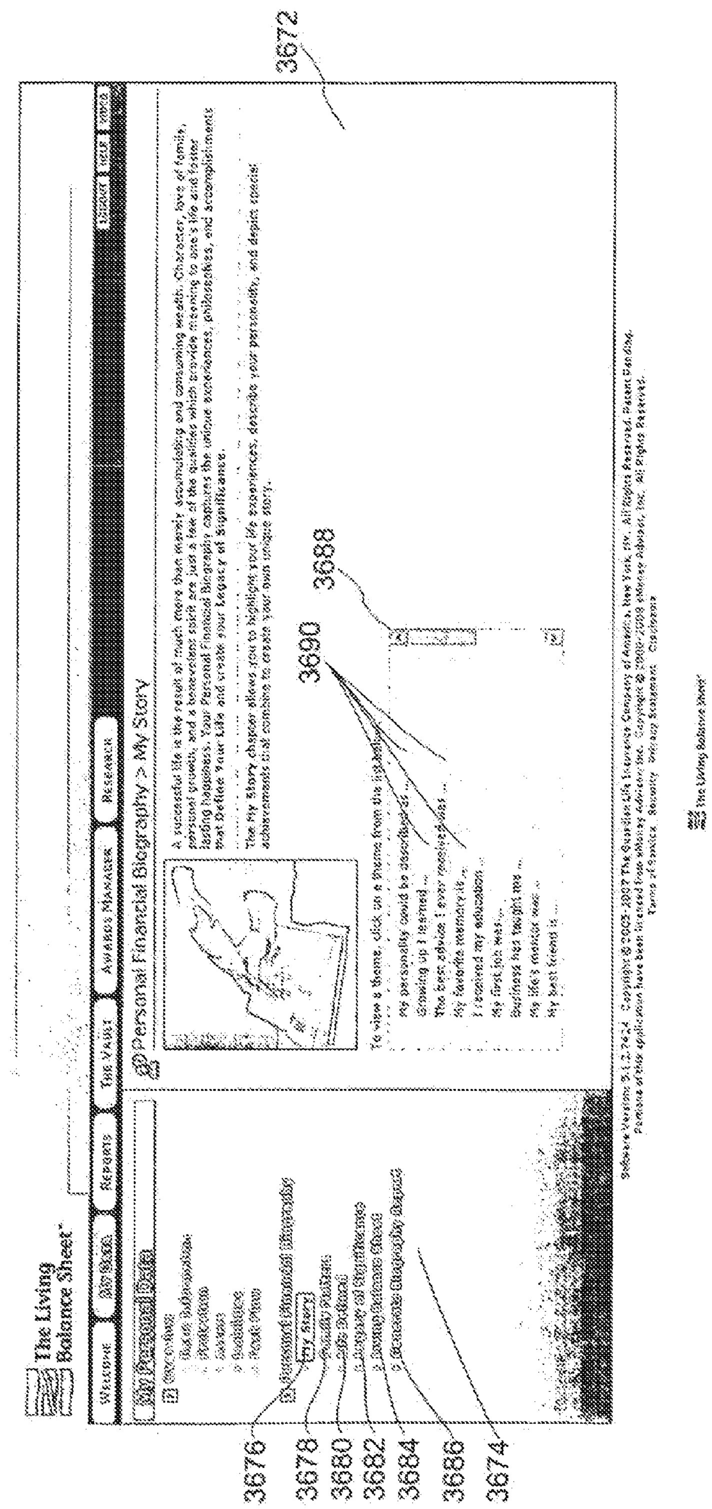
Figure 420:
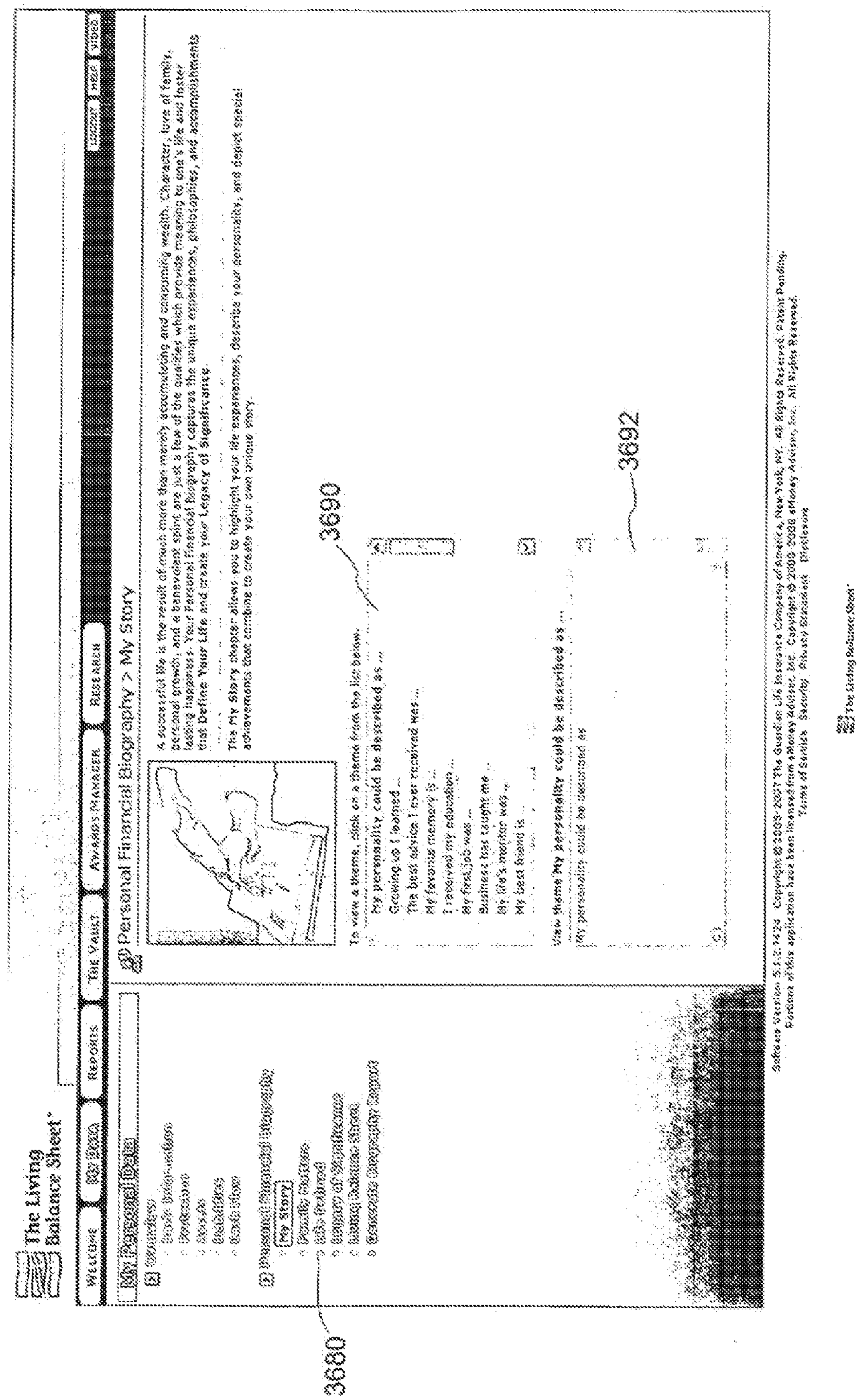

While a client site can be accessed in more than one way, in a preferred embodiment as shown in FIG. 416, page 3670 can be provided which includes client information area 3671. A user can select client link 3672 (e.g., Martin and Joan Jefferson) which, as shown in FIG. 417, can result in page 3673 being displayed. Thereafter, a user can select link 3675 such as "View Client Website" link. Upon selecting link 3675, the program can process the request and connect a user to a client site so that page 3676 (FIG. 418) is displayed. A user can then select another link 3677 such as "My Personal Data" link and, as shown in FIG. 419, page 3672 having list of options field 3674 can be presented to a user. Field 3674 can have a Personal Financial Biography$^{SM}$ module with links such as "My Story" link 3676, "Family Matters" link 3678, "Life Defined" link 3680, "Legacy of Significance" link 3682, "Living Balance Sheet®" link 3684 and "Generate Biography Report" link 3686. A user can select link 3676 and the program can process the request to display My Story page 3672 as shown in FIG. 419. Such a page can allow the user to highlight his/her life experiences, describe the user's personality and/or depict achievements to create a story unique to the user. Page 3672 can have an area such as theme area 3688 which can provide a user with a plurality of theme selections. These theme selections can give a user a general theme or topic to write information about themselves. One or more theme links 3690 can be provided in area 3688. Upon selection of a theme link such as "My personality could be described as . . . " link, this theme can be highlighted or made to stand out in some way and text area 3692 can be provided as shown in FIG. 420. Area 3692 can provide a user with space to input text (words, sentence, paragraphs or pages of information) related to the particular theme chosen by the user. Area 3692 can be automatically populated with the theme. For example, the phrase "My personality could be described as . . . " can appear in area 3692.

Figure 421:
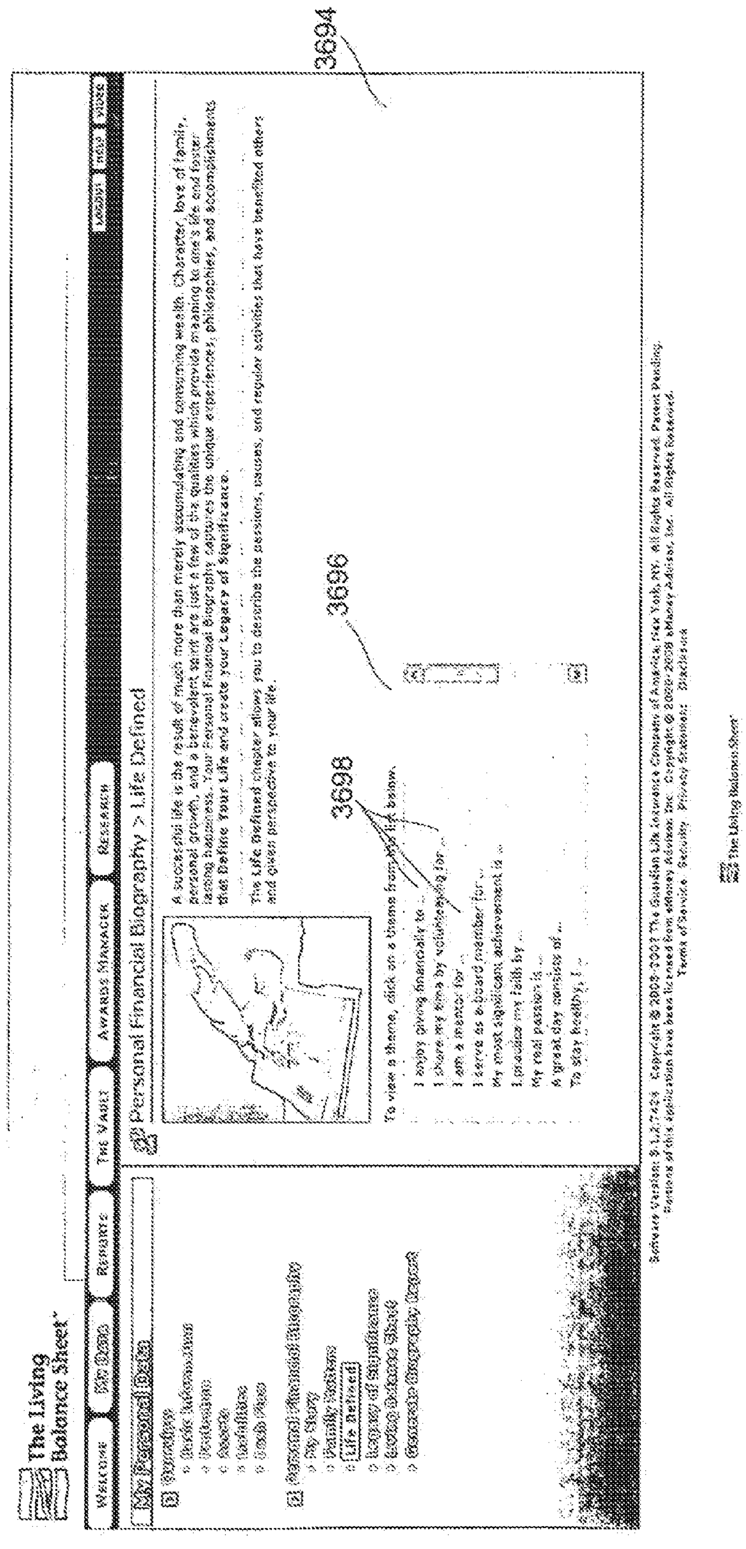
Figure 422:
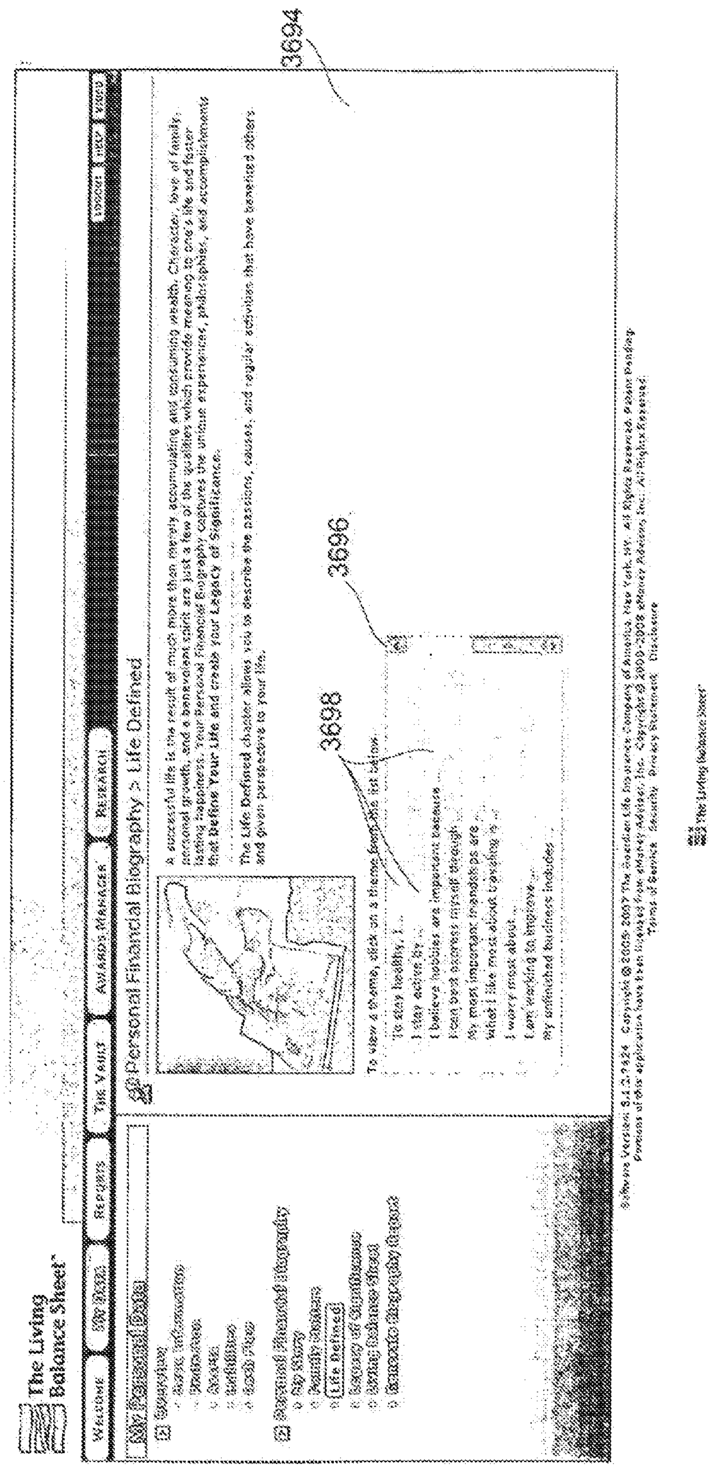
Figure 423:
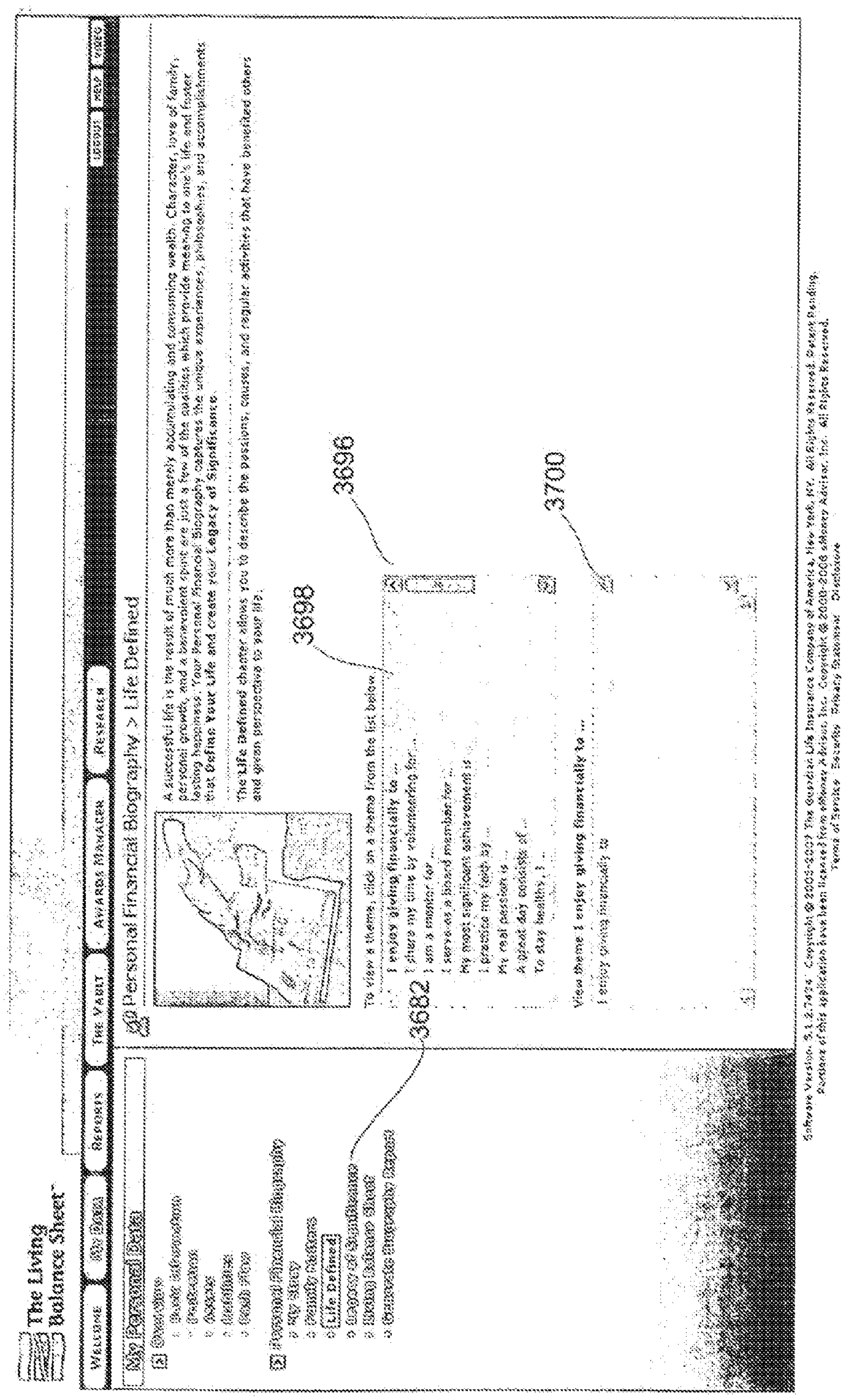

Moreover, if a user selects family matter link 3678, a page (not shown) can be displayed which enables a user to enter information about various family matters or issues that a user wants his legacy to know after the user is deceased. A user can also select link 3680 (FIG. 420) and the program can process the request to display Life Defined page 3694 as shown in FIG. 421. Such a page can allow the user to describe the user's passions, causes and/or regular activities that have benefited others and can give a perspective on the user's life. As shown in FIGS. 421 and 422, page 3694 can have an area such as theme area 3696 which can provide a user with a plurality of theme selections. These theme selections can give a user a general theme or topic to write information about themselves. One or more theme links 3698 can be provided in area 3696. Upon selection of a theme link such as "I enjoy giving financially to . . . " link, this theme can be highlighted or made to stand out in some way and text area 3700 can be provided as shown in FIG. 423. Area 3700 can provide a user with space to input text (words, sentence, paragraphs or pages of information) related to the particular theme chosen by the user. Area 3700 can be automatically populated with the theme. For example, the phrase "I enjoy giving financially to . . . " can appear in area 3700.

Figure 424:
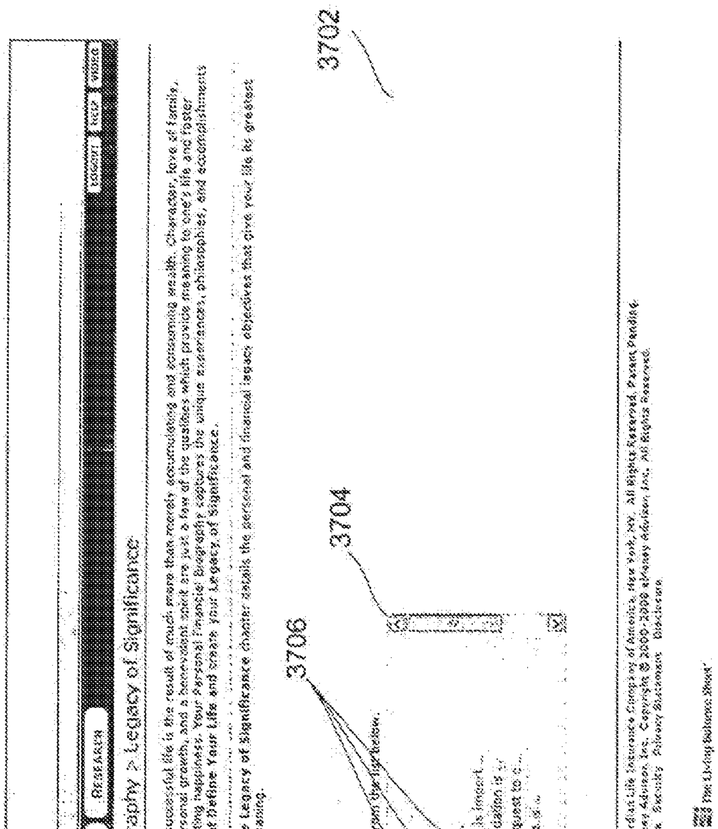
Figure 425:
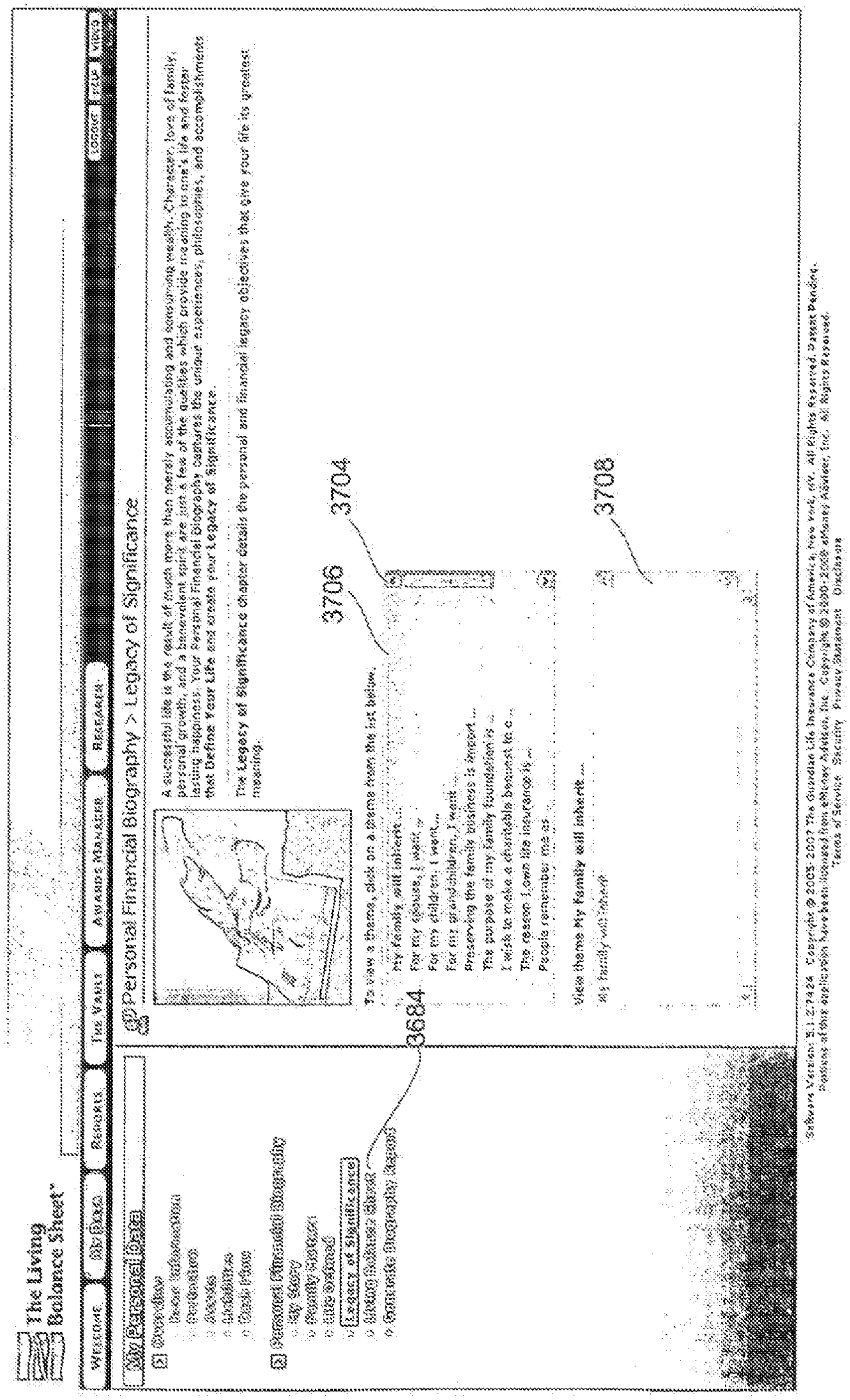

As shown in FIG. 423, a user can select link 3682 and the program can process the request to display Legacy of Significance page 3702 as shown in FIG. 424. Such a page can allow the user to detail the personal and financial legacy objectives that gives the user's life meaning. As shown in FIG. 424, page 3702 can have an area such as theme area 3704 which can provide a user with a plurality of theme selections. These theme selections can give a user a general theme or topic to write information about themselves. One or more theme links 3706 can be provided in area 3704. Upon selection of a link such as "My family will inherit . . . " link, this theme can be highlighted or made to stand out in some way and text area 3708 can be provided as shown in FIG. 425. Area 3708 can provide a user with space to input text (words, sentence, paragraphs or pages of information) related to the particular theme chosen by the user. Area 3708 can be automatically populated with the theme. For example, the phrase "My family will inherit . . . " can appear in area 3708.

Figure 426:
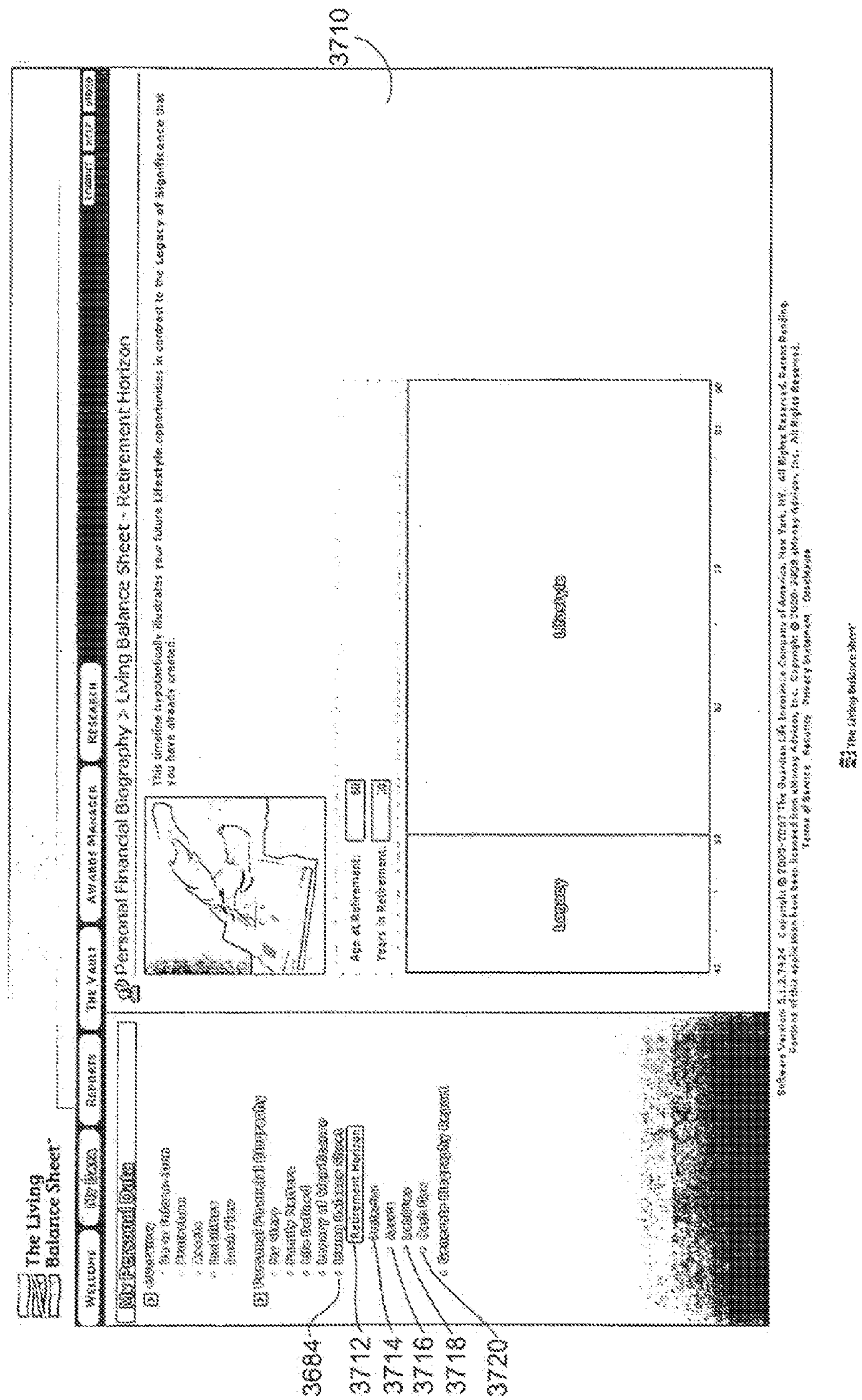

A user can also select link 3684 (FIG. 425) and the program can process the request to display Retirement Horizon page 3710 as shown in FIG. 426. Living Balance Sheet® link 3684 can have a plurality of category links such as Retirement Horizon category link 3712, Protection category link 3714, Assets category link 3716, Liabilities category link 3718 and Cash Flow category link 3720. It will be appreciated that upon selection of Living Balance Sheet® link 3684, a page associated with any category link can be display.

Figure 427:
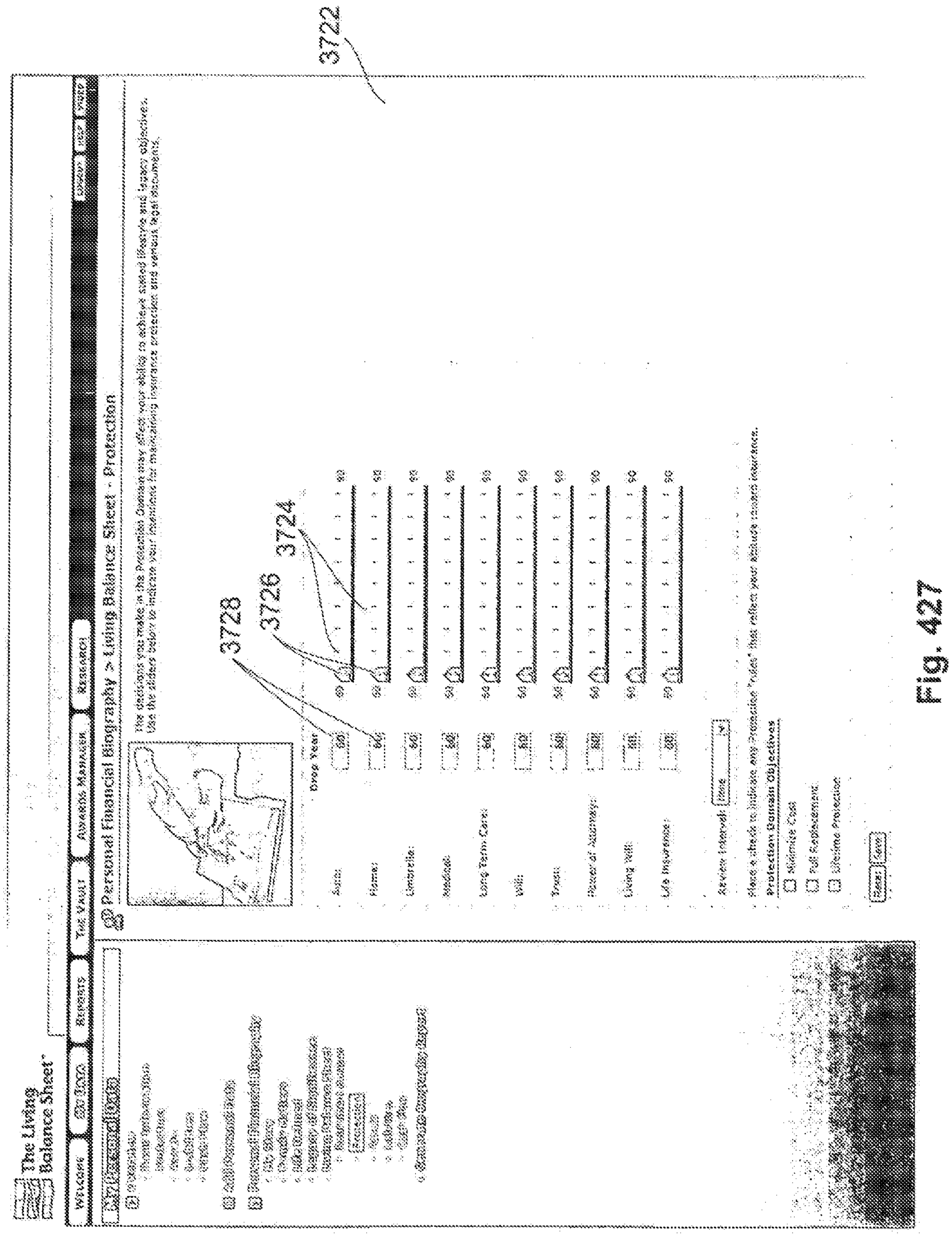
Figure 428:
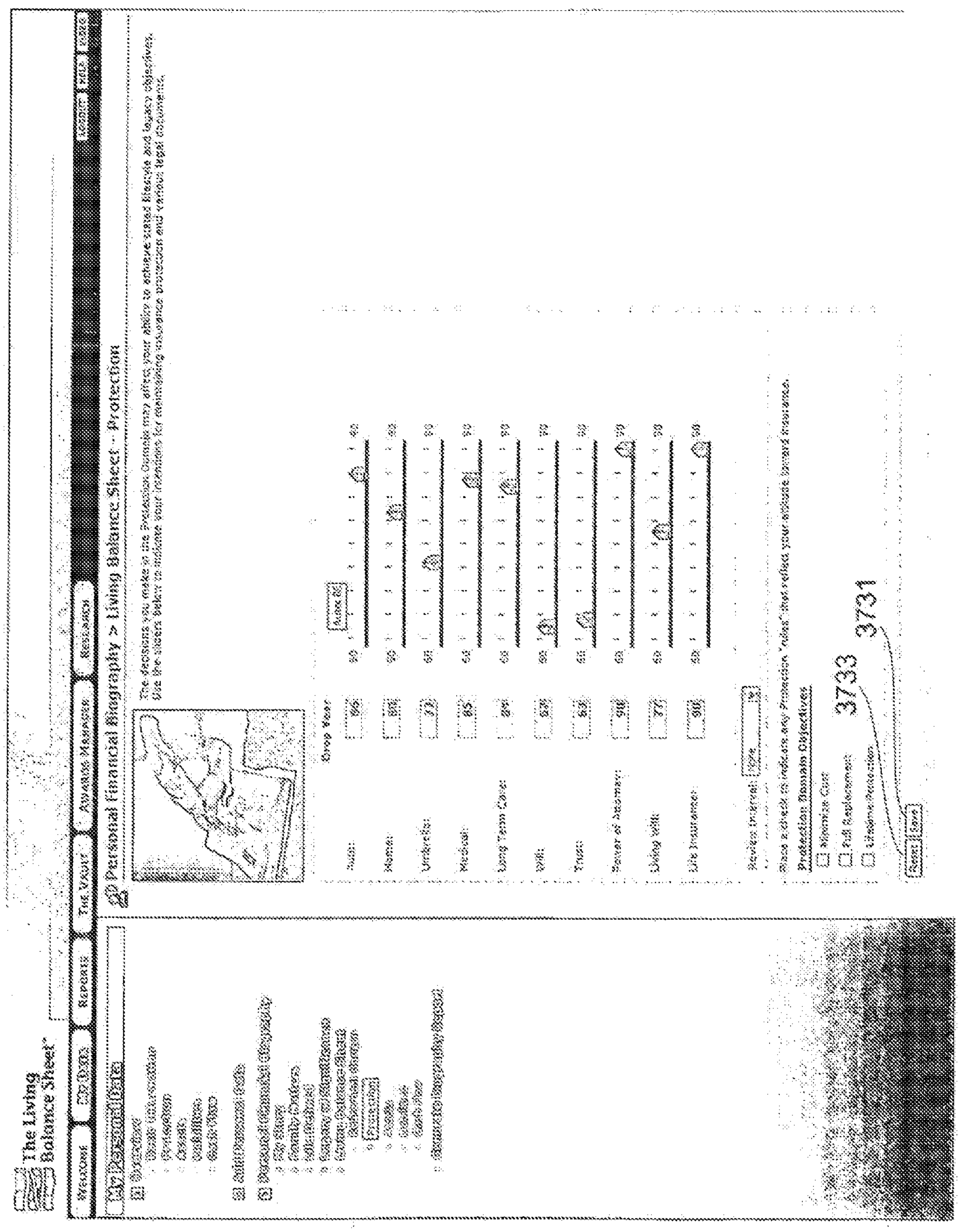

As shown in FIG. 426, page 3710 can display a timeline illustrating lifestyle opportunities during retirement compared to the legacy that the user has built during accumulation years. Such an illustration can demonstrate to a user that there is a significant period during retirement that the user needs to consider with regard to the lifestyle a user wants to maintain/lead and asset's the user wants to maintain during retirement (to provide for his/her legacy at death). The legacy area can be made larger and lifestyle area can be made smaller as a user increases the age of retirement. A user can select Protection Category link 3714 and, as shown in FIG. 427, Protection page 3722 can be displayed. Page 3722 can serve as a data collection page for an agent, insurance company or financial institution. Page can have tools such as sliders 3724 to enable a user to select the user's intention for maintaining various insurance protection and legal documents and, in particular, the age at which the user intends to give up insurance protection and legal documents. Insurance protection and legal documents can include auto insurance, home insurance, umbrella insurance, medical insurance, long term care insurance, wills, trusts, power of attorney, living will and life insurance. A user can to move pointer 3726 along slider 3724 to indicate the age at which a user will drop insurance and legal documents. Field 3728 can provide a numerical value for the age selected by the user and shown by pointer 3726 on slider 3724. FIG. 428 illustrates selection of various ages for each category and the movement of pointer 3726 along slider 3724.

Figure 429:
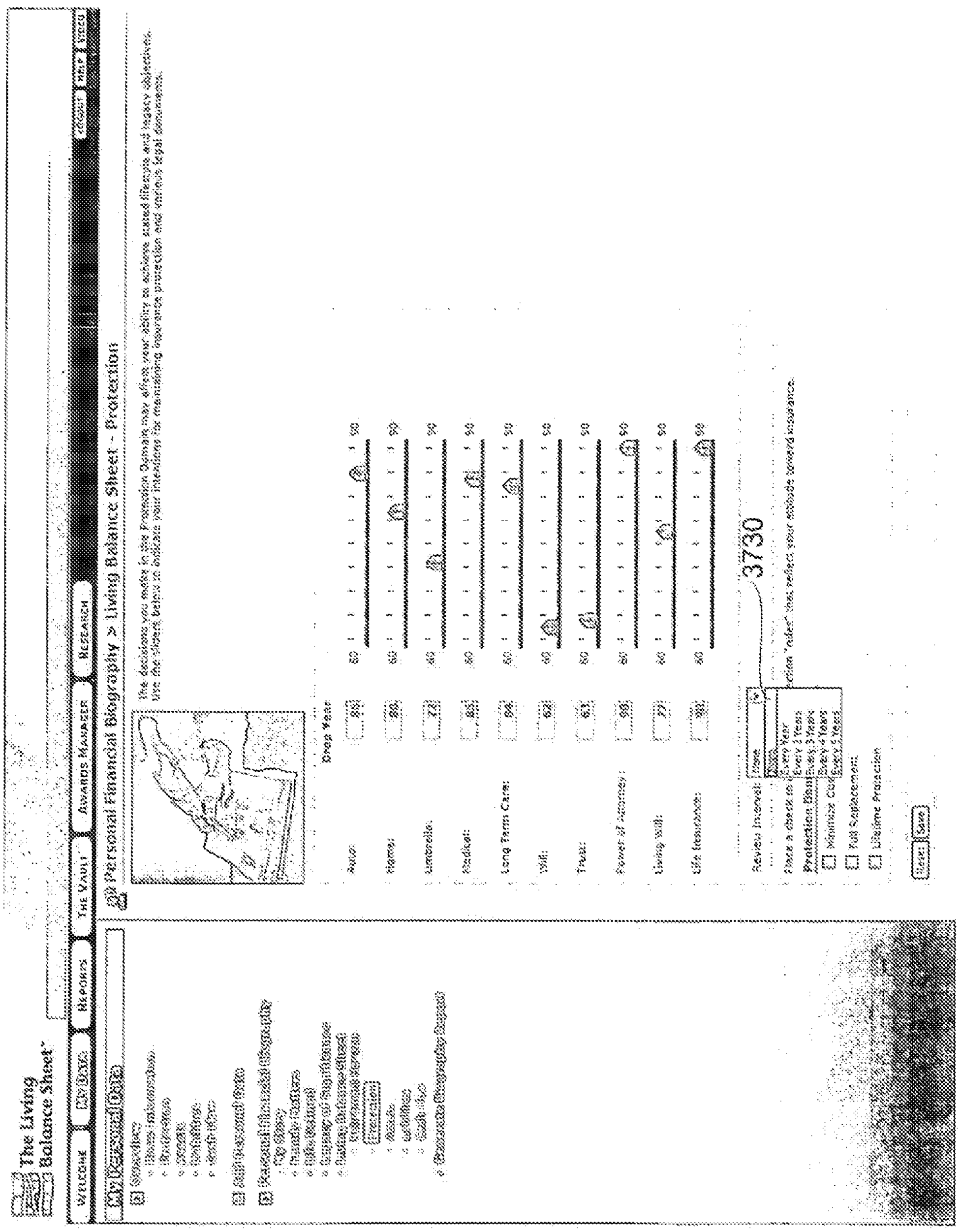
Figure 430:
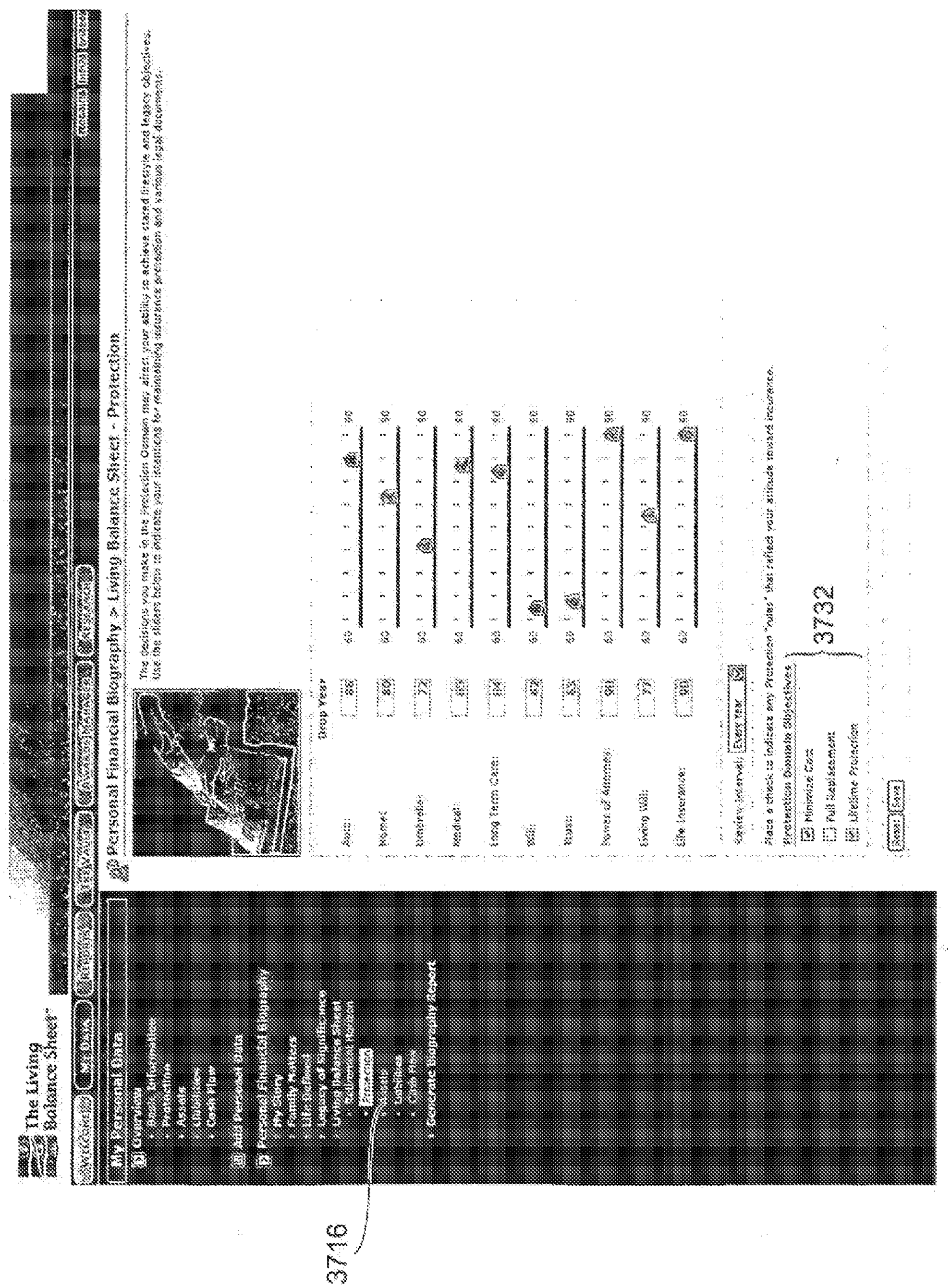

Drop-down menu 3730 (FIG. 429) can also be provided by which a user can choose an interval at which to review his/her selection (e.g., none, every year, every 2, 3, 4 or 5 years, etc). For example, selection of the interval can result in the program providing the user with a reminder at a particular point in time to re-evaluate his/her selection. Moreover, FIG. 430 illustrates that a user can select one or more protection domain objectives in area 3732 to reflect the user's attitude toward insurance (i.e., why the user purchases insurance). Such information can be used by an insurance or financial planning professional to help guide the user or other clients in retirement planning. As shown in FIG. 428, save button 3731 can be provided to save a user's selections and reset button 3733 can be provided to clear or reset all selection.

Figure 431:
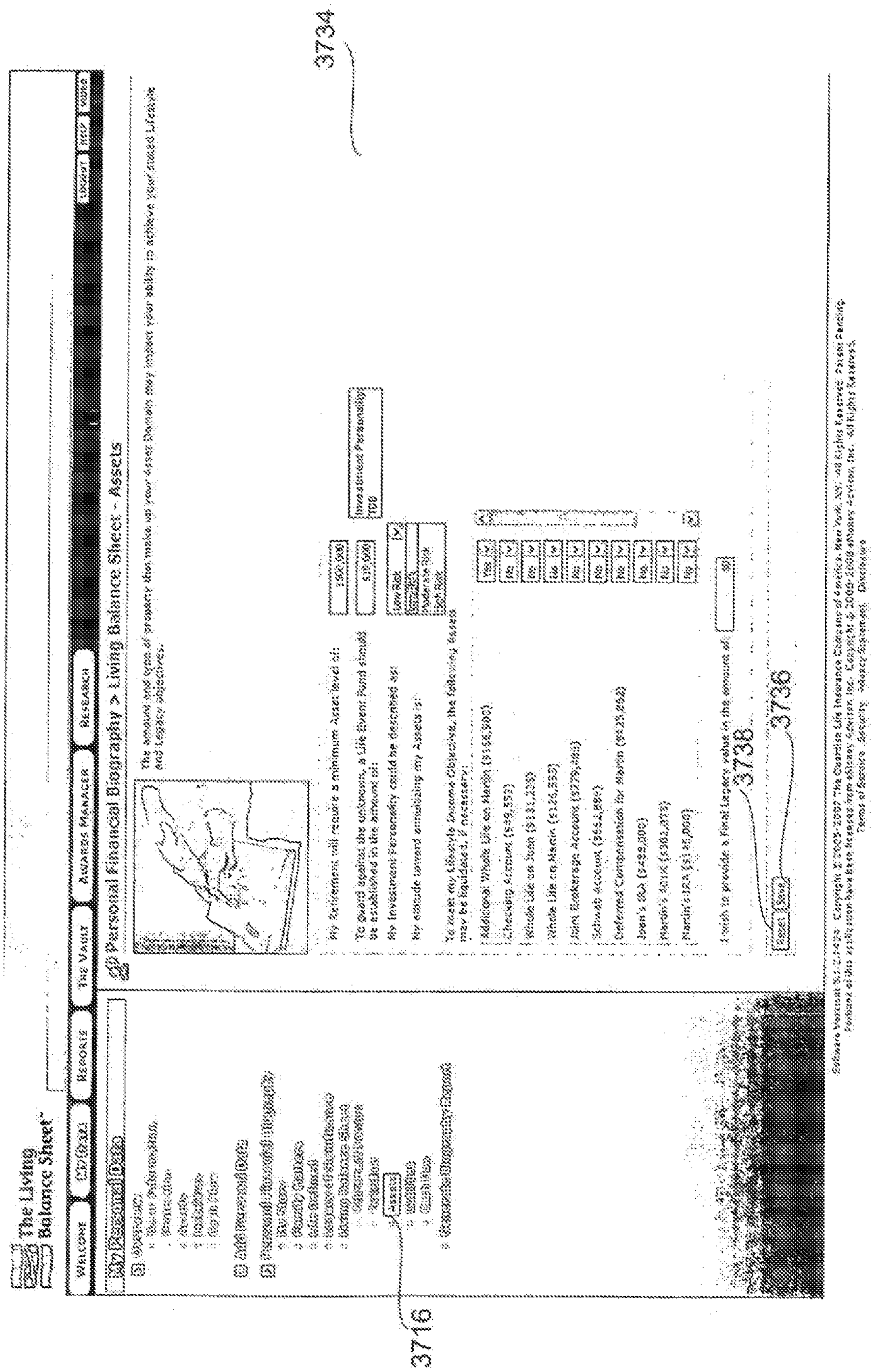
Figure 432:
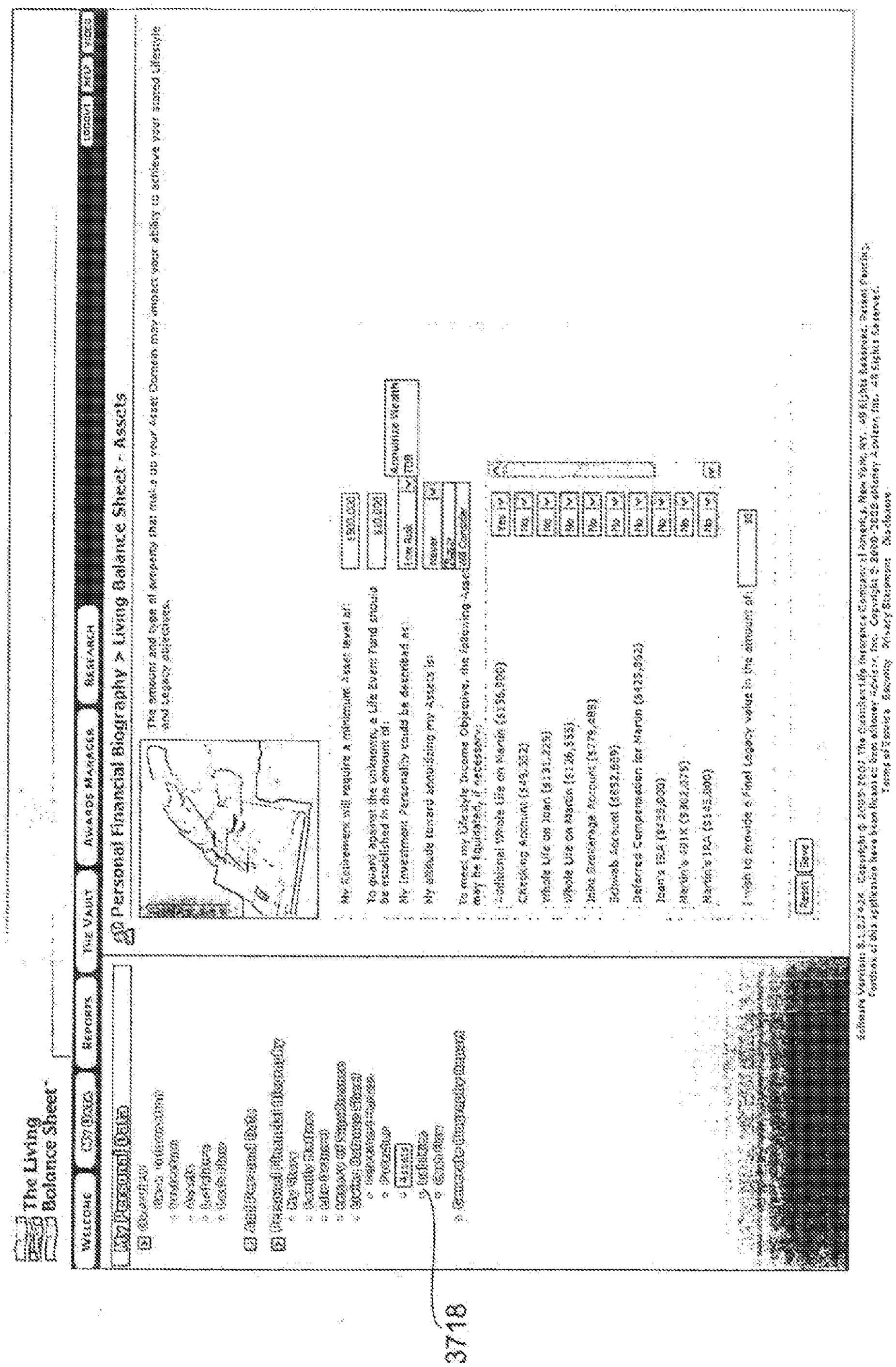

As shown in FIG. 430, a user can select Assets category link 3716. The program can process the request to display Assets page 3734 as shown in FIG. 431. Page 3734 can present to a user information and options with regards to assets. FIGS. 431 and 432 illustrates the various information/options such as minimal asset level at retirement, life event fund, investment personality (e.g., low risk, moderate risk, high risk), attitude towards annuitizing assets (spending down assets to $0) (e.g., never, will consider), and assets the user is willing to liquidate. Save button 3736 can be provided to save a user's selections and reset button 3738 can be provided to clear or reset all selection.

Figure 433:
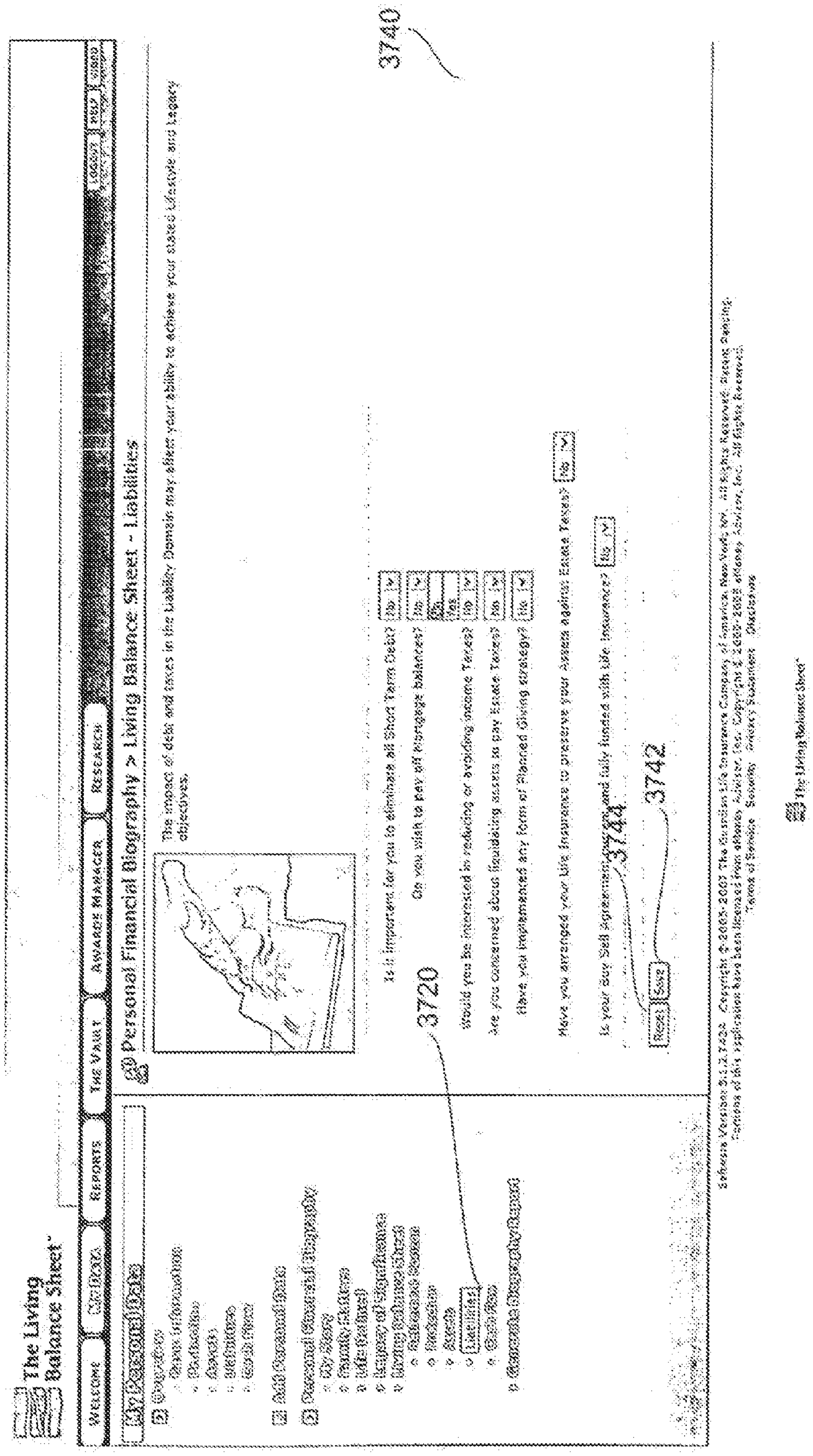

Furthermore, a user can select Liabilities category link 3718 (FIG. 432). The program can process the request to display Liabilities page 3740 as shown in FIG. 433. Page 3740 can present to a user information and options with regards to liabilities. FIG. 433 illustrates the various information/options such as importance of eliminating short term debt, paying off mortgage balance, reducing/avoiding income taxes, concern about liquidating assets to pay estate tax, implementation of planned giving strategy, preserving assets against estate tax with life insurance, and/or whether buy/sell agreement is current and funded with life insurance. Save button 3742 can be provided to save a user's selections and reset button 3744 can be provided to clear or reset all selection.

Figure 434:
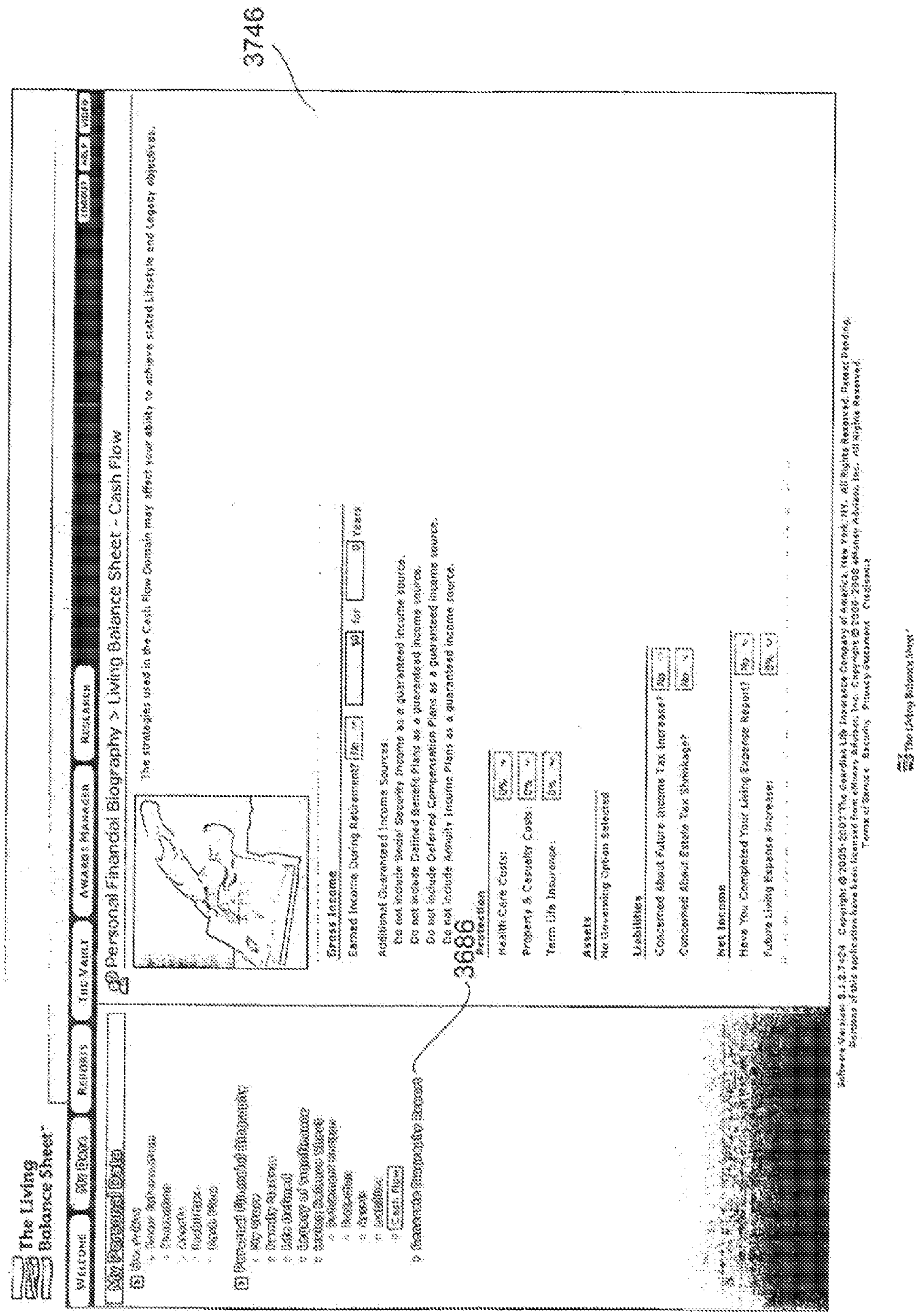

A user can select Cash Flow category link 3720 (FIG. 433). The program can process the request to display Cash Flow page 3746 as shown in FIG. 434. Page 3746 can present to a user information and options with regards to cash flow. A save and reset button can be provided which functions to save/reset buttons described above.

Figure 435:
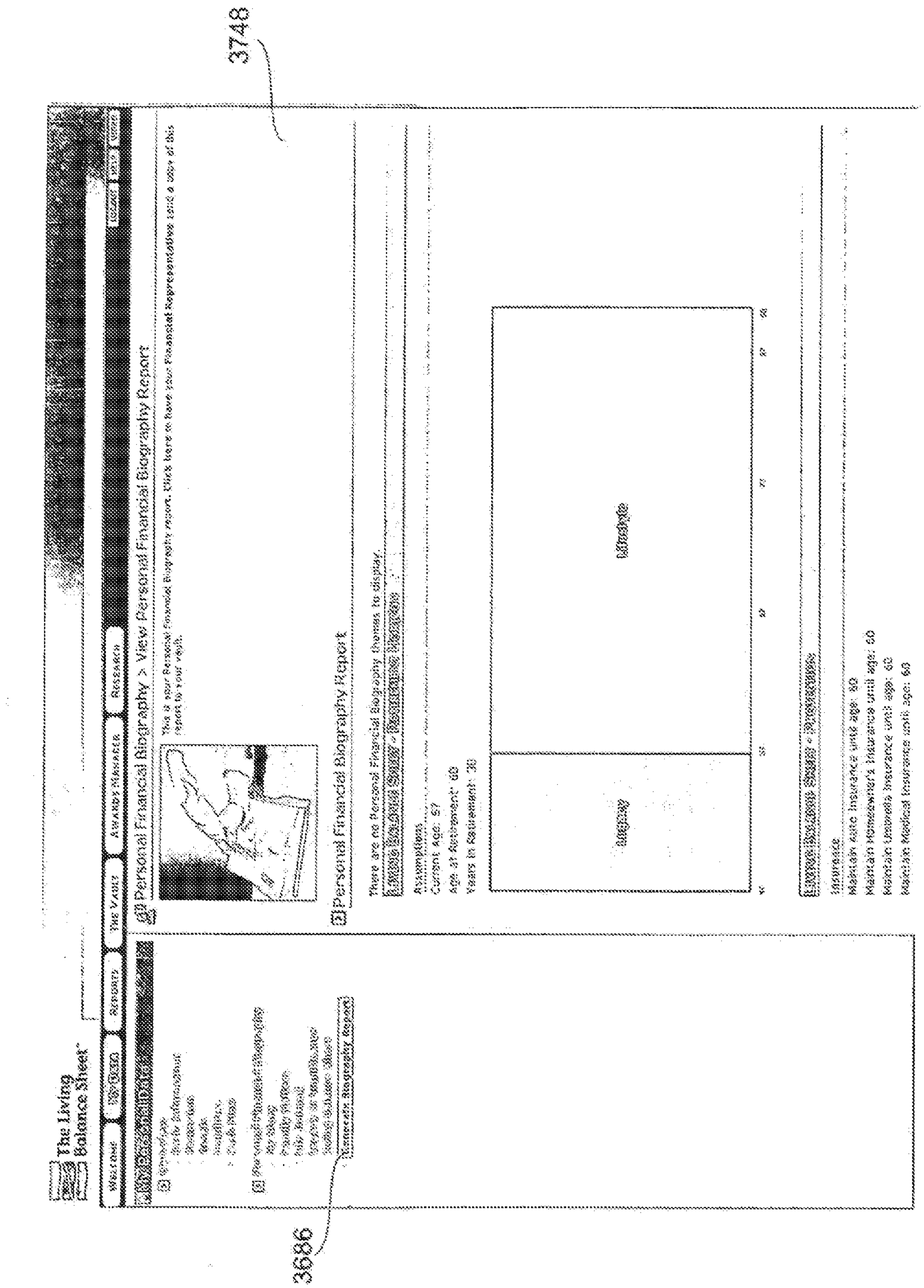
Figure 436:
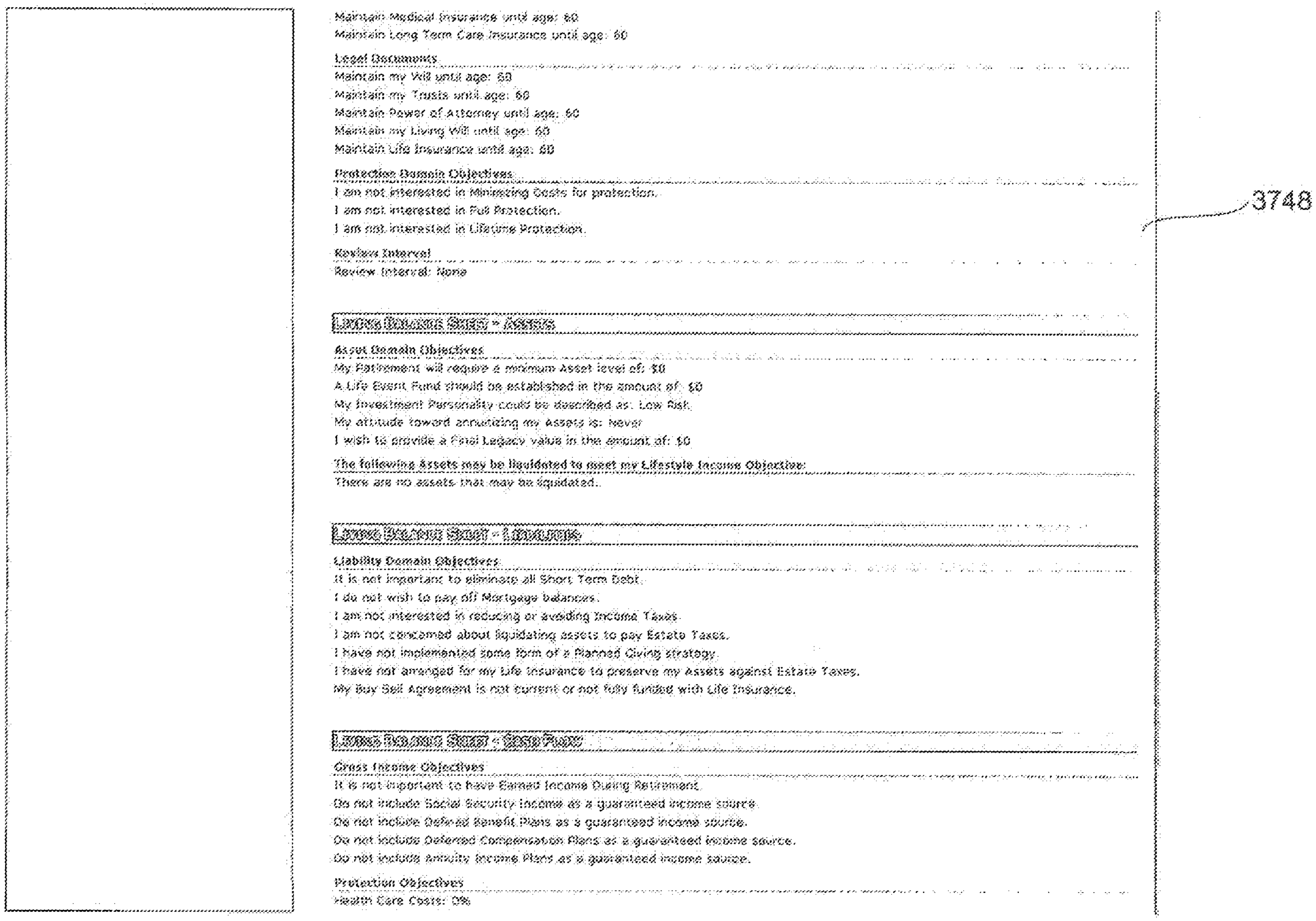

Once information has been inputted on pages 3710, 3722, 3734, 3740, and/or 3746, a user can select Generate Biography Report 3686 (FIG. 434). The program can process the request and display page 3748 as shown in FIGS. 435-437. Page 3748 can provide a summary of some or all the information entered on pages 3710, 3722, 3734, 3740, and/or 3746.

Figure 438:
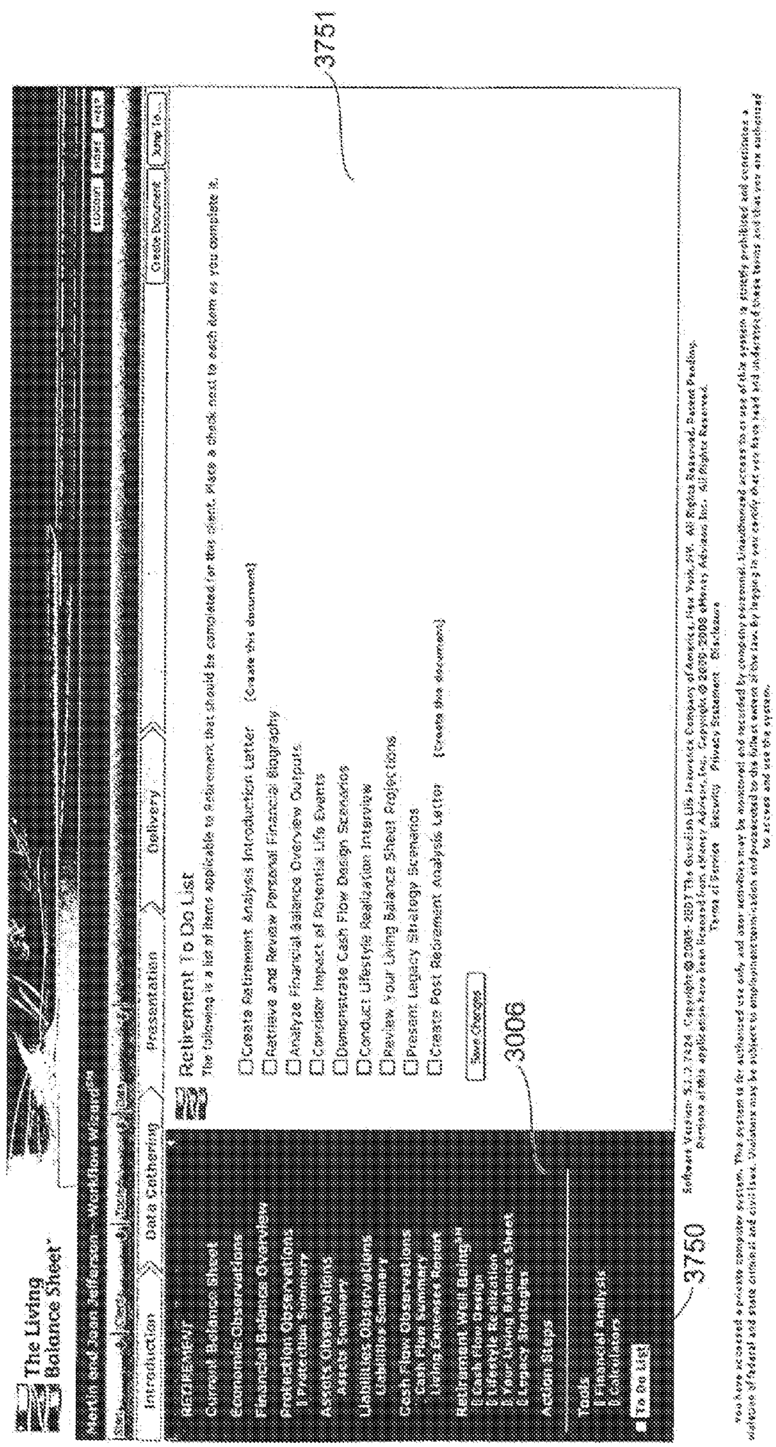
Figure 439:
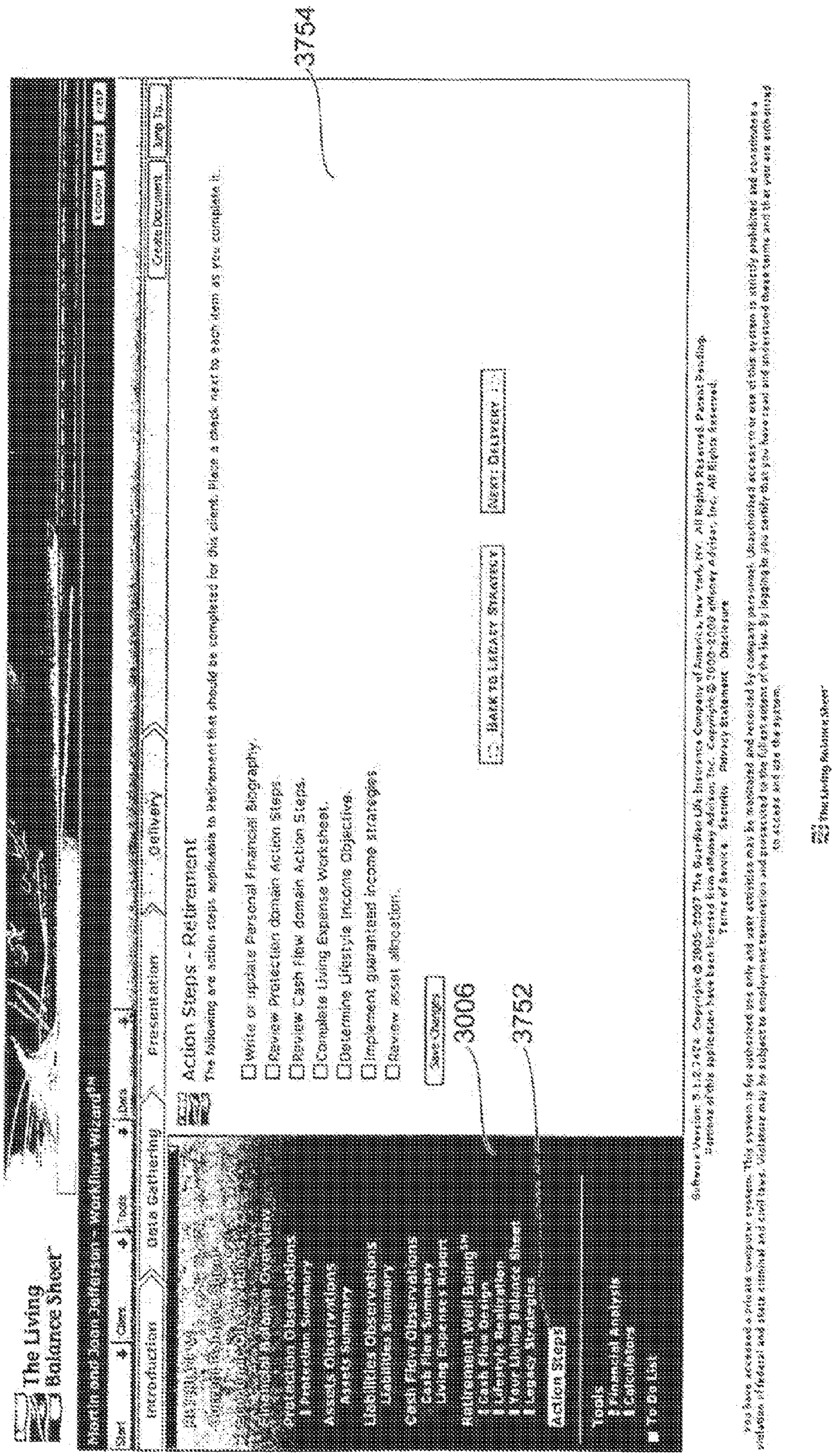

As shown in FIG. 438, list of options field 3006 can have a To Do List link 3750. Selection of link 3750 can cause page 3751 to be displayed, Page 3751 can have a checklist of tasks related to retirement that an agent or representative should perform with regard to a user such as during discussion with the user. Similarly, FIG. 439 shows Action Steps link 3752 in list of options field 3006. Upon selecting link 3752, the program can process the request and page 3754 can be displayed. Page 3754 can have a list of steps related to retirement that should be completed for a particular user. Pages 3751, 3754 can have areas next to the task or actions that are selectable to provide an indication (e.g., check mark) to the agent/representative that a particular task/action has been completed.

It will be appreciated that the program can also be designed and configured to allow a user to access stored data (entered by the client or agent/representative) from a PDA, BlackBerry or cell phone/iPhone. Whether a user has access to the information can be controlled by the agent/representative. A user can also access information such as stock quotes and weather.

Note that the above display pages and processes were presented in particular sequence. However, variations in the order of the process steps, features, and the sequence of display pages, or the separate display or implementation of display pages are also contemplated.

One or more applications may be implemented (e.g., separately, in combination, or as a single application) to provide such insurance related display pages, features, or systems. Note that applications such as applets or modules can be used in or to implement display pages or features thereof.

For convenience and clarity, the word "page" is used herein to describe a graphical user interface through which a user or client interacts with the insurance services environment. Other terms may also be used for these features.

For the sake of brevity, it should be understood that certain structure and functionality, or aspects thereof of embodiments of the invention that are evident from the illustrations of the figures have not been necessarily restated herein. Moreover, the fact that certain terms are capitalized has no bearing on their meaning. Such terms can be either descriptive or non-descriptive.

A computer readable medium such as a floppy disk, CD-ROM, DVD, etc. may be use to store the processes, techniques, software, and information illustratively described herein. The computer readable medium (one or more instances thereof) may store software in object code. In this way, computer readable instructions are stored so that when executed they cause one or more computers to perform or provide the features illustratively described herein.

It is to be understood that the invention is not to be limited to the exact configuration as illustrated and described herein. Accordingly, all expedient modifications readily attainable by one of ordinary skill in the art from the disclosure set forth herein, or by routine experimentation there from, are deemed to be within the spirit and scope of the invention as defined by the appended claims.

What is claimed is:

1. A method of providing an interactive financial planning tool with a personal biography section, comprising:

receiving a user request, wherein the user request triggers the display of a corresponding personal biographical information collection page, wherein the corresponding personal biographical information collection page provides one or more input areas, wherein the one or more input areas includes one or more selection tools configured to receive user input;

receiving user input that results from user interaction with at least one of the input areas or at least one of the selection tools, wherein at least a portion of the user input is representative of a user's attitude toward financial decisions associated with a particular financial domain;

generating a personal financial biography report using a computer, wherein at least one portion of the personal financial biography report is associated with a particular financial domain, wherein the at least one portion includes information that describes a user's attitude toward at least one financial decision; and, providing the generated personal financial biography report for display on a client device.

2. The method of claim 1, wherein the input area includes a list of selections pertaining to at least one theme or a region to input text related to a theme that is not already listed.

3. The method of claim 1, wherein the selection tool includes a slider.

4. The method of claim 3, the method further comprising:

influencing the comparison by moving the slider in order to adjust one or more aspects of four interdependent financial domains.

5. The method of claim 1, wherein the displayed personal biographical information collection page includes one or more of the following pages: a my story page, a family matters page, a life defined page, a legacy of significance page, and/or a living balance sheet page.

6. The method of claim 1, wherein the predetermined period of time is the period of time the user will be in retirement.

7. The method of claim 6, wherein the comparison illustrates periods during retirement that the user needs to consider with regard to the lifestyle a user wants to maintain and assets the user wants to maintain during retirement to provide for the user's legacy at death.

8. A method of providing an interactive tool including a personal biography portion, comprising:

providing a personal biography page;

providing a plurality of input areas on the personal biography page for inputting personal biographical information about a user, wherein a first input area is configured to receive user input that is representative of a user's attitude toward financial decisions associated with a particular financial domain, wherein a second input area is configured to receive a request for personal biographical information; and, providing a personal financial biography report using a computer wherein at least one portion of the personal financial biography report is associated with a particular financial domain, wherein the at least one portion includes information that describes a user's attitude toward at least one financial decision associated with a particular financial domain.

9. The method of claim 8, wherein the input area includes a list of selections pertaining to at least one theme and/or a region to input text related to a theme that is not already listed.

10. The method of claim 9, the method further comprising:

receiving a user input that results from user interaction with one or more of the input areas, wherein a series of one or more inputs builds a personal financial biography that captures the unique experiences, philosophies, and accomplishments that define a user's life and create a legacy of significance.

11. The method of claim 10, the method further comprising:

determining a hypothetical lifestyle income objective to maintain during a predetermined period of time.

12. The method of claim 11, the method further comprising:

generating a comparison between the personal financial biography and a hypothetical lifestyle income objective that visually conveys a relationship that exists between the personal financial biography and a hypothetical lifestyle income objective.

* * * * *